US009552206B2

(12) United States Patent
Johnson et al.

(10) Patent No.: US 9,552,206 B2
(45) Date of Patent: Jan. 24, 2017

(54) INTEGRATED CIRCUIT WITH CONTROL NODE CIRCUITRY AND PROCESSING CIRCUITRY

(75) Inventors: William M. Johnson, Austin, TX (US); Murali S. Chinnakonda, Austin, TX (US); Jeffrey L. Nye, Austin, TX (US); Toshio Nagata, Plano, TX (US); John W. Glotzbach, Allen, TX (US); Hamid R. Sheikh, Allen, TX (US); Ajay Jayaraj, Sugarland, TX (US); Stephen Busch, Grasse (FR); Shalini Gupta, San Francisco, CA (US); Robert J.P. Nychka, Canton, TX (US); David H. Bartley, Dallas, TX (US); Ganesh Sundararajan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 82 days.

(21) Appl. No.: 13/232,774

(22) Filed: Sep. 14, 2011

(65) Prior Publication Data

US 2012/0131309 A1 May 24, 2012

Related U.S. Application Data

(60) Provisional application No. 61/415,210, filed on Nov. 18, 2010, provisional application No. 61/415,205, filed on Nov. 18, 2010.

(51) Int. Cl.
*G06F 15/16* (2006.01)
*G06F 15/80* (2006.01)
(Continued)

(52) U.S. Cl.
CPC ............. *G06F 9/30076* (2013.01); *G06F 8/40* (2013.01); *G06F 9/30* (2013.01); *G06F 9/3012* (2013.01);
(Continued)

(58) Field of Classification Search
CPC ................................ G06F 15/16; G06F 15/80
(Continued)

(56) References Cited

U.S. PATENT DOCUMENTS 4,862,350 A * 8/1989 Orr ...................... G06F 15/167 709/213
4,992,933 A * 2/1991 Taylor ............................ 712/22
(Continued)

OTHER PUBLICATIONS

Reduced Instruction Set Computing, Aug. 20, 2010, Wikipedia, pp. 1-10.*
(Continued)

*Primary Examiner* — Andrew Caldwell
*Assistant Examiner* — Jyoti Mehta
(74) *Attorney, Agent, or Firm* — Lawrence J. Bassuk; Frank D. Cimino

(57) ABSTRACT

Traditionally, providing parallel processing within a multi-core system has been very difficult. Here, however, a system is provided where serial source code is automatically converted into parallel source code, and a processing cluster is reconfigured “on the fly” to accommodate the parallelized code based on an allocation of memory and compute resources. Thus, the processing cluster and its corresponding system programming tool provide a system that can perform parallel processing from a serial program that is transparent to a user. Generally, a control node connected to the address and data leads of a host processor uses messages to control the processing of data in a processing cluster. The cluster includes nodes of parallel processors, shared function memory, a global load/store, and hardware accelerators all connected to the control node by message busses. A crossbar data interconnect routes data to the cluster circuits separate from the message busses.

7 Claims, 323 Drawing Sheets

(51) Int. Cl.
*G06F 9/30* (2006.01)
*G06F 9/355* (2006.01)
*G06F 9/38* (2006.01)
*G06F 9/45* (2006.01)

(52) U.S. Cl.
CPC ....... *G06F 9/30054* (2013.01); *G06F 9/30101* (2013.01); *G06F 9/355* (2013.01); *G06F 9/3552* (2013.01); *G06F 9/3853* (2013.01); *G06F 9/3887* (2013.01); *G06F 9/3891* (2013.01); *G06F 15/16* (2013.01); *G06F 15/80* (2013.01); *G06F 15/8053* (2013.01)

(58) Field of Classification Search
USPC .............................................................. 712/1
See application file for complete search history.

(56) References Cited

U.S. PATENT DOCUMENTS 5,218,709 A * 6/1993 Fijany ...................... B25J 9/161 712/15
5,560,034 A * 9/1996 Goldstein ............. G06F 9/3879 345/502
5,815,723 A * 9/1998 Wilkinson et al. ............. 712/20
6,173,381 B1 * 1/2001 Dye ........................ G06F 12/08 345/555
2006/0294344 A1 * 12/2006 Hsu et al. ..................... 712/228
2007/0094430 A1 * 4/2007 Speier et al. ................. 710/200
2008/0162951 A1 * 7/2008 Kenkare et al. .............. 713/300
2009/0183035 A1 * 7/2009 Butler et al. .................... 714/48
2010/0064116 A1 * 3/2010 Low ........................ H04L 49/90 712/31

OTHER PUBLICATIONS

Memory Controller, Feb. 25, 2009, Wikipedia, pp. 1-3.*

How Computers work: The CPU and memory, Dec. 15, 2003, pp. 1-4.*

Jeff Tyson, How RAM works, Feb. 1, 2003, 8 pages, [retrieved from the internet on Sep. 23, 2015], retrieved from URL www.skillsource.org/train_serv/classes/ComputerLiteracy/Ch3/HowstuffworksRAM.htm.*

* cited by examiner

FIG. 24

```
#INCLUDE "SIMPLE_ISP_DEF.H"
SUBROUTINE VOID SIMPLE_ISP3( SIMPLE_ISP3_OUT* SIMPLE_ISP3_OUTPUT )
{
  UPAIR EE_Y0, EE_Y1, EE_Y2, EE_Y3;
  EE_3X3(SIMPLE_ISP3_INPUTV.EEBUFFERY0[SIMPLE_ISP3_INPUTS.CIRC_ADDR_CNTL-1],
         SIMPLE_ISP3_INPUTV.EEBUFFERY1[SIMPLE_ISP3_INPUTS.CIRC_ADDR_CNTL-1],
         SIMPLE_ISP3_INPUTV.EEBUFFERY2[SIMPLE_ISP3_INPUTS.CIRC_ADDR_CNTL-1],
         SIMPLE_ISP3_INPUTV.EEBUFFERY3[SIMPLE_ISP3_INPUTS.CIRC_ADDR_CNTL-1],
         SIMPLE_ISP3_INPUTV.EEBUFFERY0[SIMPLE_ISP3_INPUTS.CIRC_ADDR_CNTL],
         SIMPLE_ISP3_INPUTV.EEBUFFERY1[SIMPLE_ISP3_INPUTS.CIRC_ADDR_CNTL],
         SIMPLE_ISP3_INPUTV.EEBUFFERY2[SIMPLE_ISP3_INPUTS.CIRC_ADDR_CNTL],
         SIMPLE_ISP3_INPUTV.EEBUFFERY3[SIMPLE_ISP3_INPUTS.CIRC_ADDR_CNTL],
         EE_Y0, EE_Y1, EE_Y2, EE_Y3);
  SIMPLE_ISP3_OUTPUT->Y0 = EE_Y0;
  SIMPLE_ISP3_OUTPUT->Y1 = EE_Y1;
  SIMPLE_ISP3_OUTPUT->Y2 = EE_Y2;
  SIMPLE_ISP3_OUTPUT->Y3 = EE_Y3;
}
SUBROUTINE VOID EE_3X3(LINE& Y0PRV, LINE& Y1PRV, LINE& Y2PRV, LINE& Y3PRV,
                       LINE& Y0CUR, LINE& Y1CUR, LINE& Y2CUR, LINE& Y3CUR,
                       UPAIR& Y0OUT, UPAIR& Y1OUT, UPAIR& Y2OUT, UPAIR& Y3OUT)
{...}
SUBROUTINE PAIR EEFILT3X3(UPAIR Y0, UPAIR Y1, UPAIR Y2, UPAIR Y3, UPAIR Y4,
                          UPAIR Y5, UPAIR Y6, UPAIR Y7, UPAIR Y8)
{...}
SUBROUTINE UPAIR EEENHANCE(UPAIR PIX, PAIR HPF)
{
   PAIR SCLH, SCLL;
   PAIR ENH;
  UPAIR OUT;
SCLH = _CLIP((_PMPYHL(HPF, SIMPLE_ISP3_INPUTS.IPIPE_EESTRENGTH) +
       (UPAIR)32) >> 6, -2048, 2047);
SCLL = _CLIP((_PMPYLL(HPF, SIMPLE_ISP3_INPUTS.IPIPE_EESTRENGTH) +
       (UPAIR)32) >> 6, -2048, 2047);
ENH = _PCMV((UPAIR)(_PABS(HPF)) <
       (UPAIR)_PACKLL(SIMPLE_ISP3_INPUTS.IPIPE_EETHRESHOLD,
       SIMPLE_ISP3_INPUTS.IPIPE_EETHRESHOLD), 0, _PACKLL(SCLH, SCLL));
  OUT = _PCLIP(_PADD(PIX, ENH), 0, 1023);
  RETURN OUT;
}
```

1808

KERNEL: *SIMPLE_ISP3.CPP*

2000

```
STRUCT RGB2YCC_PARAMS {
  SHORTS
  IPIPE_RGB2YCCMATRIX [9];
  SHORTS
  IPIPE_RGB2YCCOFFSET [3];
};
STRUCT EE_PARAMS {
CIRC        CIRC_ADDR_CNTL;
SHORTS      IPIPE_EECOEFS[3];
SHORTS      IPIPE_EETHRESHOLD;
SHORTS      IPIPE_EESTRENGTH;
};
STRUCT RGB {
  UPAIR RGB_RED0, RGB_RED1,
        RGB_RED2, RGB_RED3;
  UPAIR RGB_GRN0, RGB_GRN1,
        RGB_GRN2, RGB_GRN3;
  UPAIR RGB_BLU0, RGB_BLU1,
        RGB_BLU2, RGB_BLU3;
};
STRUCT YCC {
  LINE EEBUFFERY0[3];
  LINE EEBUFFERY1[3];
  LINE EEBUFFERY2[3];
  LINE EEBUFFERY3[3];
};
STRUCT OUTY {
  UPAIR Y0, Y1, Y2, Y3;
};
STRUCT OUTC {
  UPAIR CB0, CB1;
  UPAIR CR0, CR1;
};
```

```
#INCLUDE ''SIMPLE_ISP_STRUCT.H''
TYPEDEF EE_PARAMS    SIMPLE_ISP3_INS;
TYPEDEF YCC    SIMPLE_ISP3_INV;
TYPEDEF OUTY   SIMPLE_ISP3_OUT;
```

```
#INCLUDE ''SIMPLE_ISP_STRUCT.H''

TYPEDEF RGB2YCC_PARAMS
               SIMPLE_ISP2_INS;
TYPEDEF RGB    SIMPLE_ISP2_INV;

TYPEDEF YCC    SIMPLE_ISP2_OUT0;
TYPEDEF OUTC   SIMPLE_ISP2_OUT1;
```

```
// PARAMETERS -> TMC T20-DMEM
#PRAGMA DATA_ATTRIBUTE(''INPUT'')
SIMPLE_ISP3_INS SIMPLE_ISP3_INPUTS;

// INPUT STRUCTURE -> TMC SIMD-DMEM
#PRAGMA DATA_ATTRIBUTE(''INPUT'')
SIMPLE_ISP3_INS SIMPLE_ISP3_INPUTV;
```

```
#DEFINE CFA_RB_BILINEAR        0
#DEFINE IPIPELUT_NFTHRESHOLD   0
#DEFINE IPIPELUT_NFRECIP       1
#DEFINE IPIPELUT_GAMMA_VAL     2
#DEFINE IPIPELUT_GAMMA_SLP     3
```

```
SUBROUTINE VOID SIMPLE_ISP3(SIMPLE_ISP3_OUT* SIMPLE_ISP3_OUTPUT);
SUBROUTINE VOID EEBUFFER(UPAIR& EE_Y0, UPAIR& EE_Y1, UPAIR& EE_Y2, UPAIR& EE_Y3);
SUBROUTINE VOID EE_3X3(LINE& Y0PRV, LINE& Y1PRV, LINE& Y2PRV, LINE& Y3PRV,
                       LINE& Y0CUR, LINE& Y1CUR, LINE& Y2CUR, LINE& Y3CUR,
                       UPAIR& Y0OUT, UPAIR& Y1OUT, UPAIR& Y2OUT, UPAIR& Y3OUT);
SUBROUTINE PAIR EEFILT3X3(UPAIR Y0, UPAIR Y1, UPAIR Y2, UPAIR Y3, UPAIR Y4,
                          UPAIR Y5, UPAIR Y6, UPAIR Y7, UPAIR Y8);
SUBROUTINE UPAIR EEENHANCE(UPAIR PIX, PAIR HPF);
```

FIG. 30

FROM FIG. 32A

1710
```
VOID SIMPLE_ISP_EMUL_SYS(INT HEIGHT, INT SIMD_SIZE,
FRAME* INPUTBUFFER, FRAME* OUTPUTBUFFERY,
FRAME* OUTPUTBUFFERCB, FRAME* OUTPUTBUFFERCR){
```

1712
```
//CREATE INSTANCES
 SET_SIMD_SIZE(SIMD_SIZE);
ISP_READ = NEW BAYER_READ_C(HEIGHT, SIMD_SIZE,0);
 SET_CTX_ID(0); STAGE0 = NEW SIMPLE_ISP0_C;
 SET_CTX_ID(1); STAGE1 = NEW SIMPLE_ISP1_C;
 SET_CTX_ID(2); STAGE2 = NEW SIMPLE_ISP2_C;
 SET_CTX_ID(3); STAGE3 = NEW SIMPLE_ISP3_C;
 SET_CTX_ID(4); ISP_WRITE = NEW YC_WRITE(HEIGHT,SIMD_SIZE,0);
```

1714
```
//SET OUTPUT POINTERS
ISP_READ->OUTPUT_PTR = &STAGE0->SIMPLE_ISP0_INPUTV;
STAGE0->OUTPUT_PTR   = &STAGE1->SIMPLE_ISP1_INPUTV;
STAGE1->OUTPUT_PTR   = &STAGE2->SIMPLE_ISP2_INPUTV;
STAGE2->OUTPUT_PTR0  = &STAGE3->SIMPLE_ISP3_INPUTV;
STAGE2->OUTPUT_PTR1  = &ISP_WRITE->YC_WRITE_INPUTV;
STAGE3->OUTPUT_PTR   = &ISP_WRITE->YC_WRITE_INPUTV;

//SET INPUT FRAME POINTERS
ISP_READ->INPUTBUFFER = INPUTBUFFER;

//SET OUTPUT FRAME POINTERS
ISP_WRITE->OUTPUTBUFFERY  = OUTPUTBUFFERY;
ISP_WRITE->OUTPUTBUFFERCB = OUTPUTBUFFERCB;
ISP_WRITE->OUTPUTBUFFERCR = OUTPUTBUFFERCR;
```

1716
```
//INITIALIZATION
CIRC_S_C_STRUCT[4] = {
  {&STAGE0->CIRC_ADDR_CNTL,0,0,0,0,0,0,0},
  {&STAGE1->CIRC_ADDR_CNTL,0,0,0,0,0,0,0},
  {&STAGE2->CIRC_ADDR_CNTL,0,0,0,0,0,0,0},
  {&STAGE3->CIRC_ADDR_CNTL,0,0,0,0,0,0,0}
};
STAGE0_INIT(&STAGE0->SIMPLE_ISP0_INPUTS,C_STRUCT[0],0);
STAGE1_INIT(&STAGE1->SIMPLE_ISP1_INPUTS,C_STRUCT[1],1);
STAGE2_INIT(&STAGE2->SIMPLE_ISP2_INPUTS,C_STRUCT[2],2);
STAGE3_INIT(&STAGE3->SIMPLE_ISP3_INPUTS,C_STRUCT[3],3);
```

1718
```
//CREATE ITERATOR AND CALL WITH TRAVERSE() POINTER
ISP_LOOP = NEW FRAME_LOOP_C(HEIGHT,4,C_STRUCT);
VOID (*EXECUTE)(INT,INT,INT,CIRC_S*) = &TRAVERSE;
ITERATOR_SIMPLE_ISP_INST->RUN(EXECUTE);
```

1720
```
//DELETE OBJECTS
DELETE ISP_LOOP;DELETE ISP_READ;
DELETE STAGE0;DELETE STAGE1;DELETE STAGE2;DELETE STAGE3;
DELETE ISP_WRITE; }
```

```
SUBROUTINE VOID STAGE3_INIT
  (  &SIMPLE_ISP3_INPUTS INIT_INST,
     CIRC_S* C_S, INT DELAY_OFFSET  )
{
     INIT_INST->IPIPE_EECOEFS [0] = 80;
     INIT_INST->IPIPE_EECOEFS [1] =-16;
     INIT_INST->IPIPE_EECOEFS [2] = -4;
     INIT_INST->IPIPE_EETHRESHOLD = 30;
     INIT_INST->IPIPE_EESTRENGTH  = 80;
     _INIT_CIRC (C_S, (3-DELAY_OFFSET) %3,
             3 , 1, DELAY_OFFSET, 1, 0)
};
```

3702

NODE PROCESSOR DATA MEMORY DESCRIPTOR

| WORD | BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| N | *RESERVED* | | | | | | | CONTEXT_BASE_ADDR N*2+1 | | | | | | | | | *RESERVED* | | | | | | | CONTEXT_BASE_ADDR N*2 | | | | | | | | |

3703-2

| WORD | BITS | FIELD NAME | DESCRIPTION |
|---|---|---|---|
| N | 24:16 | CONTEXT_BASE_ADDR N*2+1 | CONTEXT BASE ADDRESS FOR CONTEXT N*2+1 (WORD-ALIGNED) |
| | 8:0 | CONTEXT_BASE_ADDR N*2 | CONTEXT BASE ADDRESS FOR CONTEXT N*2 (WORD-ALIGNED) |

3703-1

3704 SIMD DATA MEMORY DESCRIPTOR

| WORD | BITS 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | *RESERVED* | | | | | | | CONTEXT_BASE_ADDRESS | | | | | | | | |
| 1 | BK | 14 | *RES* | HORIZ_POSITION | | | | | | | | *RES* | #INPUTS | | | IN |
| 2 | LF | *RES* | LF_CNTX# | | | | *RESERVED* | | LF_SEG | | *RESERVED* | | LF_NODE | | | |
| 3 | RT | *RES* | RT_CNTX# | | | | *RESERVED* | | RT_SEG | | *RESERVED* | | RT_NODE | | | |

| WORD | BITS | FIELD NAME | DESCRIPTION | |
|---|---|---|---|---|
| 0 | 8:0 | CONTEXT_BASE_ADDRESS | SIMD-DMEM BASE ADDRESS FOR CONTEXT | 3705 |
| 1 | 15 | BK | LOOP BACK TO FIRST CONTEXT DESCRIPTOR (1:LAST DESCRIPTOR IN LIST) | 3706 |
| | 14 | TH | CONTEXT IS MANAGED AS A THREAD (ORDERED DATA INPUT AND OUTPUT) | 3707 |
| | 12:5 | HORIZ_POSITION | RELATIVE POSITION OF THIS CONTEXT FROM THE LEFT BOUNDARY | 3708 |
| | 3:1 | #INPUTS | NUMBER OF INPUTS (SCALAR OR VECTOR) | 3709 |
| | 0 | IN | INPUT DEPENDENT | 3710 |
| 2 | 15 | LF | LEFT-BOUNDARY CONTEXT | 3711 |
| | 13:10 | LF_CNTX# | CONTEXT NUMBER SHARED ON THE LEFT SIDE OF THIS CONTEXT | 3712 |
| | 7:6 | LF_SEG | SEGMENT IDENTIFIER OF THE NODE SHARING CONTEXT ON THE LEFT | 3713 |
| | 3:0 | LF_NODE | NODE IDENTIFIER OF THE NODE SHARING CONTEXT ON THE LEFT | 3714 |
| 3 | 15 | RT | RIGHT-BOUNDARY CONTEXT | 3715 |
| | 13:10 | RT_CNTX# | CONTEXT NUMBER SHARED ON THE RIGHT SIDE OF THIS CONTEXT | 3716 |
| | 7:6 | RT_SEG | SEGMENT IDENTIFIER OF THE NODE SHARING CONTEXT ON THE RIGHT | 3717 |
| | 3:0 | RT_NODE | NODE IDENTIFIER OF THE NODE SHARING CONTEXT ON THE RIGHT | 3718 |

FIG. 43

3719
DESTINATION DESCRIPTOR

| WORD | BITS | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 4 | THDST | SRC_TAG | | | DEST_CNTX/THREAD_ID | | | | *RES* | SEG_ID | | *RES* | NODE_ID | | | |
| 5 | THDST | SRC_TAG | | | DEST_CNTX/THREAD_ID | | | | *RES* | SEG_ID | | *RES* | NODE_ID | | | |
| 6 | THDST | SRC_TAG | | | DEST_CNTX/THREAD_ID | | | | *RES* | SEG_ID | | *RES* | NODE_ID | | | |
| 7 | THDST | SRC_TAG | | | DEST_CNTX/THREAD_ID | | | | *RES* | SEG_ID | | *RES* | NODE_ID | | | |

| WORD | BITS | FIELD NAME | DESCRIPTION | |
|---|---|---|---|---|
| 4-7 | 15 | THDST | THREAD DESTINATION | 3720 |
| | 14:13 | SRC_TAG | SOURCE TAG OF THIS SOURCE AT THE DESTINATION | 3721 |
| | 11:8 | DEST_CNTX/THREAD_ID | DESTINATION CONTEXT NUMBER OR THREAD IDENTIFIER | 3722 |
| | 6:5 | SEG_ID | SEGMENT IDENTIFIER OF DESTINATION | 3723 |
| | 3:0 | NODE_ID | NODE IDENTIFIER OF DESTINATION | 3724 |

LEFT INPUT CONTEXT BUFFER

| WORD | BITS | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 0 | V | HI | LO | *UNUSED* | | | | | | | | | DEST_CONTEXT# | | | |
| 1 | *UNUSED* | | | | | | | CONTEXT_OFFSET | | | | | | | | |
| 2 | DATA_HIGH | | | | | | | | | | | | | | | |
| 3 | DATA_LOW | | | | | | | | | | | | | | | |

| WORD | BITS | FIELD NAME | DESCRIPTION | |
|---|---|---|---|---|
| 0 | 15 | V | ENTRY VALID | 3808 |
| | 14 | HI | WRITE HIGH 16 BITS | 3809 |
| | 13 | LO | WRITE LOW 16 BITS | 3810 |
| | 3:0 | DEST_CONTEXT# | ABSOLUTE CONTEXT NUMBER OF DESTINATION CONTEXT | 3811 |
| 1 | 8:0 | CONTEXT_OFFSET | OFFSET WITHIN THE CONTEXT FOR THE WRITE | 3812 |
| 2 | 15:0 | DATA_HIGH | BITS 31:16 OF DATA WRITTEN TO THE LEFT-SIDE CONTEXT RAM | 3813 |
| 3 | 15:0 | DATA_LOW | BITS 15:0 OF DATA WRITTEN TO THE LEFT-SIDE CONTEXT RAM | 3814 |

PENDING PERMISSIONS

| WORDS | BITS 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 8 | DST_TAG | | | RT | DATATYPE | | SRC_CNTX/THREAD_ID | | | | SRC_SEG | | SRC_NODE | | | |
| 9 | DST_TAG | | | RT | DATATYPE | | SRC_CNTX/THREAD_ID | | | | SRC_SEG | | SRC_NODE | | | |
| 10 | DST_TAG | | | RT | DATATYPE | | SRC_CNTX/THREAD_ID | | | | SRC_SEG | | SRC_NODE | | | |
| 11 | DST_TAG | | | RT | DATATYPE | | SRC_CNTX/THREAD_ID | | | | SRC_SEG | | SRC_NODE | | | |

| WORD | BITS | FIELD NAME | DESCRIPTION | |
|---|---|---|---|---|
| 8-11 | 15:13 | DST_TAG | DESTINATION TAG FOR PENDING *SOURCE PERMISSION* | 4203 |
| | 12 | RT | RT BIT FROM THE ORIGINAL *SOURCE NOTIFICATION* | 4204 |
| | 11 | DATATYPE | DATA TYPE OF INPUT (00-NONE/FEEDBACK;01-SCALAR;10-VECTOR;11-BOTH) | 4205 |
| | 9:6 | SRC_CNTX/THREAD_ID | SOURCE CONTEXT NUMBER OR THREAD IDENTIFIER | 4206 |
| | 5:4 | SRC_SEG | SOURCE SEGMENT IDENTIFIER | 4207 |
| | 3:0 | SRC_NODE | SOURCE NODE IDENTIFIER | 4208 |

4210 DATAFLOW STATE

| WORDS | BITS | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 12 | LRVIN | RLVIN | *RESERVED* | | | | | | PGMQ_ID | | | LVIN | LVLC | CVIN | RVIN | RVLC |
| 13 | INST3 | | INST2 | | INST1 | | INST0 | | OUTST3 | | OUTST2 | | OUTST1 | | OUTST0 | |
| 14 | PERMISSIONCOUNT3 | | | | PERMISSIONCOUNT2 | | | | PERMISSIONCOUNT1 | | | | PERMISSIONCOUNT0 | | | |
| 15 | INTM | | INEN | DELAYCOUNT | | | | *RES* | VALFLAG3 | | VALFLAG2 | | VALFLAG1 | | VALFLAG0 | |

| WORDS | BITS | FIELD NAME | DESCRIPTION | |
|---|---|---|---|---|
| 12 | 15 | LRVIN | LEFT-SIDE CONTEXT RVIN (LOCAL COPY) | 4211 |
| | 14 | RLVIN | RIGHT-SIDE CONTEXT LVIN (LOCAL COPY) | 4212 |
| | 7:5 | PGMQ_ID | PROGRAM QUEUE IDENTIFIER (INTERNAL) FOR THIS CONTEXT | 4213 |
| | 4 | LVIN | LEFT VALID INPUT | 4214 |
| | 3 | LVLC | LEFT VALID LOCAL | 4215 |
| | 2 | CVIN | CENTER VALID INPUT | 4216 |
| | 1 | RVIN | RIGHT VALID INPUT | 4217 |
| | 0 | RVLC | RIGHT VALID LOCAL | 4218 |
| 13 | 15:8 | INST[N] | INPUT STATE FOR *SRC_TAG* N | 4219 |
| | 7:0 | OUTST[N] | OUTPUT STATE FOR *DST_TAG* N | 4220 |
| 14 | 15:0 | PERMISSIONCOUNT[N] | PERMISSION COUNT FOR *DST_TAG* N | 4221 |
| 15 | 15:14 | INTM | INPUT TERMINATION STATE | 4222 |
| | 13 | INEN | INPUT ENABLED | 4223 |
| | 12:9 | DELAYCOUNT | NUMBER OF FEEDBACK DELAYS SATISFIED | 4224 |
| | 7:0 | VALFLAG[N] | EXPECTED *SET_VALID* FOR *SRC_TAG* N (MSB:VECTOR, LSB:SCALAR) | 4225 |

4230 PROGRAM QUEUE

| WORD | BITS | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| 0 | TE | CT | PRE | RDY | FDBK | *RESERVED* | | | PGM_ID | | | |
| 1 | BASE_CTX# | | | | PRE-EMPT_CTX# | | | | NEXT_CTX# | | | |
| 2 | START_PC | | | | | | | | | | | |
| 3 | END | TASK_INTERVAL | | | | | | | | | | |

| WORD | BITS | FIELD NAME | DESCRIPTION |
|---|---|---|---|
| 0 | 11 | TE | TERMINATE WHEN PROGRAM ENDS IN ALL CONTEXTS (VS. DATA-DRIVEN) |
| | 10 | CT | CONTROLLING NODE FOR THIS PROGRAM |
| | 9 | PRE | PRE-EMPTION OCCURRED (PRE-EMPT_CTX# FIELD IS VALID) |
| | 8 | RDY | READY FOR EXECUTION IN ONE OF THE THREE INDICATED CONTEXTS |
| | 7 | FDBK | PROGRAM CONTEXTS HAVE FEEDBACK DEPENDENCIES TO RESOLVE BEFORE EXECUTION |
| | 3:0 | PGM_ID | PROGRAM IDENTIFIER (UNIQUE TO THIS NODE, FOR TERMINATION MESSAGE) |
| 1 | 11:8 | BASE_CTX# | BASE CONTEXT NUMBER FOR THIS PROGRAM |
| | 7:4 | PRE-EMPT_CTX# | PRE-EMPTIVE CONTEXT NUMBER |
| | 3:0 | NEXT_CTX# | NEXT SEQUENTIAL CONTEXT NUMBER FOR THIS PROGRAM |
| 2 | 11:0 | START_PC | INITIAL PC FOR THE PROGRAM (INSTRUCTION ALIGNED) |
| 3 | 11 | END | THE BASE CONTEXT HAS EXECUTED AND END INSTRUCTION |
| | 10:0 | TASK_INTERVAL | CURRENT INTERVAL BETWEEN TASK BOUNDARIES (SET BY BASE CONTEXT) |

FIG. 69

BOUNDARY BOUNDARY
INDEX -2 -1 0 1 2 ...... N-3 N-2 N-1 N N+1
MIRROR C B A B C ...... X Y Z Y X
REPEAT A A A B C ...... X Y Z Z Z

DIAGRAM OF A PARTITION SHOWING BUSSES FOR THE DIRECT AND REMOTE PATHS

DIAGRAM OF LS UNIT DATA PATH

DIAGRAM OF A PIPELINE FOR A NODE OR RISC PROCESSOR

5502

| WORD | BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| N | IN | #INP | | *RES* | | CONTEXT_BASE_ADDR N*2+1 | | | | | | | | | | | IN | #INP | | *RES* | | CONTEXT_BASE_ADDR N*2 | | | | | | | | | | |

| WORD | BITS | FIELD NAME | DESCRIPTION |
|---|---|---|---|
| N | 31 | IN | INPUT DEPENDENCE FOR CONTEXT N*2+1 (SCALAR ONLY) |
| | 30:29 | #INP | NUMBER OF INPUTS FOR CONTEXT N*2+1 (SCALAR ONLY) |
| | 26:16 | CONTEXT_BASE_ADDR N*2+1 | CONTEXT BASE ADDRESS FOR CONTEXT N*2+1 (WORD-ALIGNED) |
| | 15 | IN | INPUT DEPENDENCE FOR CONTEXT N*2 (SCALAR ONLY) |
| | 14:13 | #INP | NUMBER OF INPUTS FOR CONTEXT N*2 (SCALAR ONLY) |
| | 10:0 | CONTEXT_BASE_ADDR N*2 | CONTEXT BASE ADDRESS FOR CONTEXT N*2 (WORD-ALIGNED) |

| HALF WORD | WORD BITS | | | | | | | | | | | | | | | |
|---|---|---|---|---|---|---|---|---|---|---|---|---|---|---|---|---|
| | 31/15 | 30/14 | 29/13 | 28/12 | 27/11 | 26/10 | 25/9 | 24/8 | 23/7 | 22/6 | 21/5 | 20/4 | 19/3 | 18/2 | 17/1 | 16/0 |
| 0 | BK | OTE | SRC_TAG | | *RESERVED* | | INITIAL_DEST | | | | INITIAL_SEG | | INITIAL_NODE | | | |
| 1 | PERMISSIONCOUNT | | | | *RESERVED* | | NEXT_DEST | | | | NEXT_SEG | | NEXT_NODE | | | |

| HALF WORD | WORD BITS | FIELD NAME | DESCRIPTION |
|---|---|---|---|
| 0 | 15 | BK | LAST ENTRY ON LIST |
| | 14 | OTE | OUTPUT TERMINATION ENABLE |
| | 13:12 | SRC_TAG | SOURCE TAG OF THIS SOURCE AT THE DESTINATION |
| | 9:6 | INITIAL_DEST | CONTEXT NUMBER OR THREAD ID OF THE FIRST DESTINATION |
| | 5:4 | INITIAL_SEG | SEGMENT IDENTIFIER OF THE FIRST DESTINATION |
| | 3:0 | INITIAL_NODE | NODE IDENTIFIER OF THE FIRST DESTINATION |
| 2 | 31:28 | PERMISSIONCOUNT | PERMISSION COUNT FOR THREAD DESTINATION (=1111'B FOR NON-THREAD) |
| | 25:22 | NEXT_DEST | CONTEXT NUMBER OR THREAD ID OF THE NEXT DESTINATION |
| | 21:20 | NEXT_SEG | SEGMENT IDENTIFIER OF THE NEXT DESTINATION |
| | 19:16 | NEXT_NODE | NODE IDENTIFIER OF THE NEXT DESTINATION |

*READ THREAD SOURCE CODE EXAMPLE*

```
STRUCT NF_IN{
  LINE GR[3]; LINE R[3];
  LINE B[3]; LINE GB[3];
};

EXTERN STRUCT NF_IN NSF_IN;

ENUM POSN {GR, R, B, GB};

VOID GLS_READ (VOID *SYS_IN
               INT HEIGHT,INT STRIDE) {

FRAME *F_IN = NEW FRAME(RAW8);

FOR(INT I=0; I<=HEIGHT/2; I++){
/* SET INPUT VARIABLES FROM SYSTEM FRAME BUFFER */
  NSF_IN->GR[I%3] = F_IN->GET(SYS_IN, GR);
  NSF_IN->R[I%3] = F_IN->GET(SYS_IN, R);
  NSF_IN->B[I%3] = F_IN->GET(SYS_IN+STRIDE, B);
  NSF_IN->GB[I%3] = F_IN->GET(SYS_IN+STRIDE, GB);
  SYS_IN += 2*STRIDE;
  }
DELETE F_IN;}
```

5704

FRAME *CLASS*

```
CLASS FRAME
{
  INT ATTR; //PIXEL FORMAT
PUBLIC:
  FRAME(INT INST_ATTR){
    ATTR = INST_ATTR;
  }
  LINE GET (LINE *LINE_IN, POSN IN_POSN){
    RETURN _LDSYS(LINE_IN, IN_POSN, &ATTR);}
  NULL PUT (LINE *LINE_OUT, POSN OUT_POSN
            LINE LINE_IN){
    _STSYS(LINE_OUT, OUT_POSN, LINE_IN, &ATTR);}
}
```

*ASSEMBLY PSEUDO-CODE* 5706

```
LDSYS (SYS_IN), 0, (ATTR), VR2;
VOUTPUT VR2, NSF_IN->GR[I%3];
LDSYS (SYS_IN), 1, (ATTR), VR5
LDSYS (SYS_IN+STRIDE), 2, (ATTR), VR6
VOUTPUT VR5, NSF_IN->R[I%3];
VOUTPUT VR6, NSF_IN->B[I%3];
LDSYS (SYS_IN+STRIDE), 3, (ATTR), VR5;
VOUTPUT.SV VR5, NSF_IN->GB[I%3];
```

| WORD | BITS | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 0 | DST_TAG | | | *RES* | SRC_CNTX/THREAD_ID | | | | *RES* | SRC_SEG | | *RES* | SRC_NODE | | | |
| 1 | DST_TAG | | | *RES* | SRC_CNTX/THREAD_ID | | | | *RES* | SRC_SEG | | *RES* | SRC_NODE | | | |
| 2 | DST_TAG | | | *RES* | SRC_CNTX/THREAD_ID | | | | *RES* | SRC_SEG | | *RES* | SRC_NODE | | | |
| 3 | DST_TAG | | | *RES* | SRC_CNTX/THREAD_ID | | | | *RES* | SRC_SEG | | *RES* | SRC_NODE | | | |
| 4 | INTM | END | INEN | VIN | *RES* | | #SETVAL | | INST3 | | INST2 | | INST1 | | INST0 | |

| WORD | BITS | FIELD NAME | DESCRIPTION | |
|---|---|---|---|---|
| 0-3 | 15:13 | DST_TAG | DESTINATION TAG FOR PENDING *SOURCE PERMISSION* | 5951 |
| | 11:8 | SRC_CNTX/THREAD_ID | SOURCE CONTEXT NUMBER OR THREAD IDENTIFIER | 5949 |
| | 6:5 | SRC_SEG | SOURCE SEGMENT IDENTIFIER | 5952 |
| | 3:0 | SRC_NODE | SOURCE NODE IDENTIFIER | 5953 |
| 4 | 15 | INTM | INPUT TERMINATED (*OUTPUT TERMINATION* RECEIVED) | 5954 |
| | 14 | END | CONTEXT EXECUTION HAS ENCOUNTERED AN *END* INSTRUCTION | 5955 |
| | 13 | INEN | INPUT ENABLED | 5956 |
| | 12 | VIN | VALID INPUT | 5957 |
| | 9:8 | #SETVAL | NUMBER OF *SET_VALID* SIGNALS RECEIVED | 5958 |
| | 7:0 | INST[N] | INPUT STATE FOR SRC_TAG N | 5959 |

<table>
<tr><th colspan="9">HEADER BITS</th></tr>
<tr><td>8</td><td>7</td><td>6</td><td>5</td><td>4</td><td>3</td><td>2</td><td>1</td><td>0</td></tr>
<tr><td>0</td><td>0</td><td>0</td><td colspan="2">11'B</td><td colspan="4">0001'B</td></tr>
</table>

<table>
<tr><th colspan="32">DATA BITS</th></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>RS</td><td colspan="2">00'B</td><td colspan="4">THREAD_ID</td><td colspan="3">RES</td><td colspan="5">PARAMETER_COUNT</td><td colspan="6">RESERVED</td><td colspan="11">START_PC</td></tr>
<tr><td colspan="21">RESERVED</td><td colspan="11">DESTINATION_LIST_BASE</td></tr>
<tr><td colspan="32">PARAMETER_LIST (OPTIONAL)</td></tr>
<tr><td colspan="32">↓ ↓ ↓ ↓</td></tr>
<tr><td colspan="32">PARAMETER_LIST (OPTIONAL)</td></tr>
</table>

6061

| BITS | FIELD NAME | DESCRIPTION | |
|---|---|---|---|
| 30:29 | TYPE | TYPE=00'B FOR READ THREAD | 6062 |
| 28:25 | THREAD_ID | THREAD IDENTIFIER OF READ THREAD | 6063 |
| 21:17 | PARAMETER_COUNT | NUMBER OF PARAMETERS ON LIST (POSSIBLY ZERO, 30 MAXIMUM) | 6064 |
| 10:0 | START_PC | INITIAL PC OF THREAD (INSTRUCTION-LINE ALIGNED) | 6065 |
| 2ND WORD 10:0 | DESTINATION_LIST_BASE | BASE ADDRESS OF DESTINATION ARRAY (HALFWORD ALIGNED) | 6066 |

HEADER BITS

| 8 | 7 | 6 | 5 | 4 | 3 | 2 | 1 | 0 |
|---|---|---|---|---|---|---|---|---|
| 0 | 0 | 0 | 11'B | | 0001'B | | | |

DATA BITS

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| *RS* | 01'B | | THREAD_ID | | | | *RES* | | | PARAMETER_COUNT | | | | | *RESERVED* | | | | | | START_PC | | | | | | | | | | |
| PARAMETER_LIST (OPTIONAL) | | | | | | | | | | | | | | | | | | | | | | | | | | | | | | | |
| ↓ ↓ ↓ ↓ | | | | | | | | | | | | | | | | | | | | | | | | | | | | | | | |
| PARAMETER_LIST (OPTIONAL) | | | | | | | | | | | | | | | | | | | | | | | | | | | | | | | |

6068

| BITS | FIELD NAME | DESCRIPTION | |
|---|---|---|---|
| 30:29 | TYPE | TYPE=01'B FOR WRITE THREAD | 6069 |
| 28:25 | THREAD_ID | THREAD IDENTIFIER OF WRITE THREAD | 6070 |
| 22:17 | PARAMETER_COUNT | NUMBER OF PARAMETERS ON LIST (POSSIBLY ZERO, 30 MAXIMUM) | 6071 |
| 10:0 | START_PC | INITIAL PC OF THREAD (INSTRUCTION-LINE ALIGNED) | 6072 |

| HEADER BITS | | | | | | | | |
|---|---|---|---|---|---|---|---|---|
| 8 | 7 | 6 | 5 | 4 | 3 | 2 | 1 | 0 |
| 0 | 0 | 0 | 11'B | | 0001'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| *RS* | 11'B | | THREAD_ID | | | | *RESERVED* | | | | | | | | | | | | | | | | | | | | | | | | |
| SYSTEM_BASE_ADDRESS | | | | | | | | | | | | | | | | | | | | | | | | | | | | | | | |

| BITS | FIELD NAME | DESCRIPTION |
|---|---|---|
| 30:29 | TYPE | TYPE=11'B FOR MESSAGE READ THREAD |
| 28:25 | THREAD_ID | THREAD IDENTIFIER OF MESSAGE READ THREAD |

HEADER BITS

| 8 | 7 | 6 | 5 | 4 | 3 | 2 | 1 | 0 |
|---|---|---|---|---|---|---|---|---|
| 0 | 0 | 1 | DSTSEG | | DSTNODE | | | |

DATA BITS

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 01'B | | RT | *RESERVED* | | | | DSTCTX#THID | | | | *RES* | | SRCTX#THID | | | | *RS* | SRSEG | | *RS* | SRNODE | | | | TH | SRC_TAG | | *RS* | DST_TAG | | |

| HEADER | FIELD NAME | DESCRIPTION |
|---|---|---|
| 5:4 | DSTSEG | DESTINATION SEGMENT ID. SET TO 2'B11 FOR CONTROL NODE |
| 3:0 | DSTNODE | DESTINATION NODE ID. SET TO 4'H2 FOR CONTROL NODE |

| DATA | FIELD NAME | DESCRIPTION |
|---|---|---|
| 31:30 | 01'B | (ENCODING BITS) |
| 29 | RT | RIGHT BOUNDARY SOURCE |
| 24:21 | DSTCTX#THID | DESTINATION CONTEXT NUMBER OR THREAD ID |
| 18:15 | SRCTX#THID | SOURCE CONTEXT NUMBER OR THREAD ID |
| 13:12 | SRSEG | SOURCE SEGMENT IDENTIFIER |
| 10:7 | SRNODE | SOURCE NODE IDENTIFIER |
| 6 | TH | SOURCE IS A THREAD (ORDERING APPLIES) |
| 5:4 | SRC_TAG | SOURCE TAG (INDEX INTO PENDING PERMISSION LIST OF DESTINATION) |
| 2:0 | DST_TAG | DESTINATION TAG (INDEX INTO DESTINATION LIST OF SOURCE) |

| HEADER BITS | | | | | | | | |
|---|---|---|---|---|---|---|---|---|
| 8 | 7 | 6 | 5 | 4 | 3 | 2 | 1 | 0 |
| 0 | 0 | 1 | SRSEG | | SRNODE | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 11'B | | RT | P_INCR | | | | SRCTX#THID | | | | *RES* | | DSTCTX#THID | | | | *RS* | DSTSEG | | *RS* | DSTNODE | | | | TH | *RES* | | | DST_TAG | | |

| HEADER | FIELD NAME | DESCRIPTION |
|---|---|---|
| 5:4 | SRSEG | SEGMENT ID OF THE SOURCE. SET TO 2'B11 FOR GLS UNIT 1408 |
| 3:0 | SRNODE | NODE ID OF THE SOURCE. SET TO 4'H2 FOR GLS UNIT 1408 |

| DATA | FIELD NAME | DESCRIPTION |
|---|---|---|
| 31:30 | 11'B | (ENCODING BITS) |
| 29 | RT | RIGHT BOUNDARY DESTINATION, OR THREAD PERMISSION FORWARD RIGHT |
| 28:25 | P_INCR | AN INCREMENT OF THE NUMBER OF PERMITTED OUTPUTS TO A THREAD |
| 24:21 | SRCTX#THID | SOURCE CONTEXT NUMBER OR THREAD ID |
| 18:15 | DSTCTX#THID | DESTINATION CONTEXT NUMBER OR THREAD ID |
| 13:12 | DSTSEG | DESTINATION SEGMENT ID |
| 10:7 | DSTNODE | DESTINATION NODE ID |
| 6 | TH | DESTINATION IS A THREAD (ORDERING APPLIES) |
| 2:0 | DST_TAG | DESTINATION TAG (INDEX INTO DESTINATION LIST OF SOURCE) |

6078

| HEADER BITS | | | | | | | | |
|---|---|---|---|---|---|---|---|---|
| 8 | 7 | 6 | 5 | 4 | 3 | 2 | 1 | 0 |
| 0 | 0 | 1 | DSTSEG | | DSTNODE | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 10'B | | *RESERVED* | | | | | DSTCTX#THID | | | | *RES* | | TMCTX#THID | | | | *RS* | TMSEG | | *RS* | TMNODE | | | | TH | *RESERVED* | | | | | |

| HEADER | FIELD NAME | DESCRIPTION |
|---|---|---|
| 5:4 | DSTSEG | DESTINATION SEGMENT ID = 3 FOR GLS UNIT 1408 |
| 3:0 | DSTNODE | DESTINATION NODE ID = 2 FOR GLS UNIT 1408 |

| DATA | FIELD NAME | DESCRIPTION |
|---|---|---|
| 31:30 | 10'B | (ENCODING BITS) |
| 24:21 | DSTCTX#THID | DESTINATION CONTEXT NUMBER OR THREAD ID |
| 18:15 | TMCTX#THID | TERMINATING SOURCE CONTEXT NUMBER OR THREAD ID |
| 13:12 | TMSEG | TERMINATING SOURCE SEGMENT ID |
| 10:7 | TMNODE | TERMINATING SOURCE NODE ID |
| 6 | TH | TERMINATING SOURCE IS A THREAD |

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | SEG_ID =3 | | NODE_ID=1 | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0000'B | | | | *RESERVED* | | | | | | | | | | | | | | | | | | | | | | | | | | | |

| BITS | FIELD NAME | DESCRIPTION |
|---|---|---|
| 31:28 | 0000'B | (ENCODING BITS) |
| NOTE: HEADER SEG_ID.NODE_ID OF 01.0000 CAN BE USED TO HALT ALL NODES (MULTI-CAST MESSAGE) | | |

6080

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | SEG_ID =3 | | NODE_ID=1 | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0001'B | | | | *RESERVED* | | | | | | | COUNT_N | | | | | *RESERVED* | | | | | | | | | | | | | | | |

| BITS | FIELD NAME | DESCRIPTION |
|---|---|---|
| 31:28 | 0001'B | (ENCODING BITS) |
| 20:16 | COUNT_N | NUMBER OF INSTRUCTIONS TO STEP |

NOTE: HEADER SEG_ID.NODE_ID OF 01.0000 CAN BE USED TO STEP ALL NODES (MULTI-CAST MESSAGE)

6081

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | SEG_ID =3 | | NODE_ID=1 | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0010'B | | | | *RESERVED* | | | | | | | | | | | | | | | | | | | | | | | | | | | |

| BITS | FIELD NAME | DESCRIPTION |
|---|---|---|
| 31:28 | 0010'B | (ENCODING BITS) |

NOTE: HEADER SEG_ID.NODE_ID OF 01.0000 CAN BE USED TO HALT ALL NODES (MULTI-CAST MESSAGE)

6082

HEADER BITS

| 8 | 7 | 6 | 5 | 4 | 3 | 2 | 1 | 0 |
|---|---|---|---|---|---|---|---|---|
| 1 | 1 | 0 | SEG_ID | | NODE_ID | | | |

DATA BITS

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0100'B | | | | *RS* | TGT | | CONTEXT# | | | | *RESERVED* | | | | | | | | | | SELECTOR | | | | | | | | | | |

| BITS | FIELD NAME | DESCRIPTION |
|---|---|---|
| 31:28 | 0100'B | (ENCODING BITS) |
| 26:25 | TGT | TARGET (00-IMEM; 01-FMEM; 10-SIMD REGS; 11-SIMD-DMEM/VMEM) |
| 24:21 | CONTEXT# | CONTEXT NUMBER FOR READ (BASE ADDRESS FROM DESCRIPTOR) |
| 10:0 | SELECTOR | ALIGNED SELECTOR (LINE NUMBER OR REGISTER NUMBER) |

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | SEG_ID | | NODE_ID | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0110'B | | | | *RS* | TGT | | CONTEXT# | | | | DATA_COUNT | | | | | *RESERVED* | | | | | SELECTOR | | | | | | | | | | |
| DATA | | | | | | | | | | | | | | | | | | | | | | | | | | | | | | | |
| ↓ ↓ ↓ ↓ | | | | | | | | | | | | | | | | | | | | | | | | | | | | | | | |
| DATA | | | | | | | | | | | | | | | | | | | | | | | | | | | | | | | |

| BITS | FIELD NAME | DESCRIPTION |
|---|---|---|
| 31:28 | 0110'B | (ENCODING BITS) |
| 26:25 | TGT | TARGET (00-IMEM; 01-FMEM; 10-SIMD REGS; 11-SIMD-DMEM/VMEM) |
| 24:21 | CONTEXT# | CONTEXT NUMBER FOR READ (BASE ADDRESS FROM DESCRIPTOR) |
| 20:16 | DATA_COUNT | COUNT OF THE NUMBER OF DATA WORDS |
| 10:0 | SELECTOR | ALIGNED SELECTOR (LINE NUMBER OR REGISTER NUMBER) |

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | SEG_ID = 3 | | NODE_ID = 1 | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1000'B | | | | TR | BK_ID | | 0000 | | | | 0 | *RESERVED* | | | | | | | | 000000000000 | | | | | | | | | | | |

| BITS | FIELD NAME | DESCRIPTION |
|---|---|---|
| 31:28 | 1000'B | (ENCODING BITS) |
| 27 | TR | TRACEPOINT |
| 26:25 | BK_ID | TRACEPOINT IDENTIFIER |
| 24:21 | | SET TO 0 |
| 20 | | SET TO 0 |
| 11:0 | | SET TO 0 |

HEADER BITS

| 8 | 7 | 6 | 5 | 4 | 3 | 2 | 1 | 0 |
|---|---|---|---|---|---|---|---|---|
| 1 | 1 | 0 | SEG_ID = 3 | | NODE_ID = 1 | | | |

DATA BITS

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1000'B | | | | TR | BK_ID | | CONTEXT# | | | | CN | *RESERVED* | | | | | | | | IMEM_LINE | | | | | | | | | | | |

| BITS | FIELD NAME | DESCRIPTION |
|---|---|---|
| 31:28 | 1000'B | (ENCODING BITS) |
| 27 | TR | TRACEPOINT (0 FOR BREAKPOINT) |
| 26:25 | BK_ID | BREAKPOINT (OR TRACEPOINT) IDENTIFIER |
| 24:21 | CONTEXT# | CONTEXT NUMBER OF BREAKPOINT (OR TRACEPOINT) |
| 20 | CN | ENABLE COMPARISON (=1) ON CONTEXT NUMBER |
| 11:0 | IMEM_LINE | IMEM LINE NUMBER TO SET INTO BREAKPOINT/TRACEPOINT |

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | SEG_ID | | NODE_ID | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1001'B | | | | *RS* | BK_ID | | *RESERVED* | | | | | | | | | | | | | | | | | | | | | | | | |

| BITS | FIELD NAME | DESCRIPTION |
|---|---|---|
| 31:28 | 1001'B | (ENCODING BITS) |
| 26:25 | BK_ID | BREAKPOINT (OR TRACEPOINT) IDENTIFIER |

| HEADER BITS | | | | | | | | |
|---|---|---|---|---|---|---|---|---|
| 8 | 7 | 6 | 5 | 4 | 3 | 2 | 1 | 0 |
| 1 | 1 | 1 | SEG_ID | | NODE_ID | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1 | CX | *RESERVED* | | | | | CONTEXT# | | | | *RESERVED* | | | | | | | | | | | | T20-DMEM_OFFSET | | | | | | | | |

| BITS | FIELD NAME | DESCRIPTION |
|---|---|---|
| 31 | 1 | (ENCODING BIT) |
| 30 | CX | READ CONTEXT SAVE OR CONTEXT-STATE AREA |
| 24:21 | CONTEXT# | CONTEXT NUMBER FOR READ (BASE ADDRESS FROM DESCRIPTOR) |
| 8:0 | T20-DMEM_OFFSET | OFFSET IN PROCESSOR DATA MEMORY, OR CONTEXT AREA (WORD-ALIGNED) |

HEADER BITS

| 8 | 7 | 6 | 5 | 4 | 3 | 2 | 1 | 0 |
|---|---|---|---|---|---|---|---|---|
| 1 | 1 | 1 | SEG_ID | | NODE_ID | | | |

DATA BITS

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | CX | *RS* | HI | LO | *RES* | | CONTEXT# | | | | *RESERVED* | | | | | | | | | | | | T20-DMEM_OFFSET | | | | | | | | |
| HIGH HALFWORD | | | | | | | | | | | | | | | | LOW HALFWORD | | | | | | | | | | | | | | | |

| BITS | FIELD NAME | DESCRIPTION |
|---|---|---|
| 31 | 0 | (ENCODING BIT) |
| 30 | CX | WRITE CONTEXT SAVE OR CONTEXT-STATE AREA (DEBUGGER) |
| 28 | HI | WRITE HIGH HALFWORD |
| 27 | LO | WRITE LOW HALFWORD |
| 24:21 | CONTEXT# | CONTEXT NUMBER FOR LOCAL WRITE (BASE ADDRESS FROM DESCRIPTOR) |
| 8:0 | T20-DMEM_OFFSET | OFFSET IN PROCESSOR DATA MEMORY, OR CONTEXT AREA (WORD-ALIGNED) |

FIG. 172

| MESSAGE TYPE | PURPOSE |
|---|---|
| NODE INSTRUCTION MEMORY INITIALIZATION | SEND TO A DESTINATION WHEN THE GLS UNIT 1408 IS READY TO SEND INSTRUCTION MEMORY DATA |
| SOURCE NOTIFICATION | SOURCE NOTIFICATION MESSAGE IS FROM THE GLS UNIT 1408 TO A DESTINATION TO INDICATE THAT IT IS READY TO SEND DATA VIA THE GLOBAL INTERCONNECT FOR READ THREAD |
| SOURCE PERMISSION | SOURCE PERMISSION IS SENT TO THE NODE THAT SENT SOURCE NOTIFICATION FOR WRITE THREAD |
| CONTROL NODE CONFIGURATION READ THREAD INPUT | SENT AS TO CONTROL NODE FOR ACTION RAM LIST UPDATE AS PART OF INITIALIZATION |
| OUTPUT TERMINATION | |
| THREAD TERMINATION | |
| HALT ACK | DEBUG MESSAGE SENT IN RESPONSE TO HALT MESSAGE |
| NODE STATE READ RESPONSE | DEBUG MESSAGE SENT IN RESPONSE TO NODE STATE READ MESSAGE. THE MESSAGE CONTAINS THE DATA CONTENTS OF THE REQUESTED RESPONSE |
| TASK/BRANCH TRACE VECTOR MESSAGE | TASK/BRANCH TRACE VECTOR MESSAGE |
| BREAKPOINT/TRACEPOINT MATCH | DEBUG MESSAGE TO SENT ONCE GLS PROCESSOR 5402 REACHES THE SET POINT |
| DATA MEMORY READ RESPONSE | SENT AS RESPONSE TO THE READ THE GLS DATA MEMORY 5403 MESSAGE |
| UPDATE DATA MEMORY | THIS MESSAGE IS SENT BY THE GLS UNIT 1408 DURING READ THREAD EXECUTION. IT CONTAINS THE SCALAR DATA CORRESPONDING TO THE READ THREAD |

| HEADER BITS | | | | | | | | |
|---|---|---|---|---|---|---|---|---|
| 8 | 7 | 6 | 5 | 4 | 3 | 2 | 1 | 0 |
| 0 | 1 | 0 | SEG_ID | | NODE_ID | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| *RESERVED* | | | | | | | | | | | | | | | | | | | START OFFSET | | | | | | | | | | | | |

| BITS | FIELD NAME | DESCRIPTION |
|---|---|---|
| 12:0 | START_OFFSET | FOR INSTRUCTION MEMORY INITIALIZATION START_OFFSET IS 10:0.<br>FOR SFM FUNCTION-MEMORY INITIALIZATION THE START_OFFSET IS 12:0 |
| 31:13 | RESERVED | |

| HEADER BITS | | | | | | | | |
|---|---|---|---|---|---|---|---|---|
| 8 | 7 | 6 | 5 | 4 | 3 | 2 | 1 | 0 |
| 0 | 0 | 1 | 11'B | | 0000'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 00'B | | *RESERVED* | | | | | | | | | | | TMTHREAD | | | | *RS* | 11'B | | *RS* | 0010'B | | | | 1 | *RESERVED* | | | | | |

| BITS | FIELD NAME | DESCRIPTION |
|---|---|---|
| 31:30 | 00'B | (ENCODING BITS) |
| 18:15 | TMTHREAD | THREAD IDENTIFIER OF TERMINATING THREAD |
| 13:12 | TMSEG | 11'B FOR GLS UNIT 1408 |
| 10:7 | TMNODE | 0010'B FOR GLS UNIT 1408 |
| 6 | TH | A THREAD IS TERMINATING (TH=1) |

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | 11'B | | 0000'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0011'B | | | | *RES* | | | CONTEXT# | | | | *RES* | | SEG_ID | | *RS* | NODE_ID | | | | *RESERVED* | | | | | | | | | | | |
| *RESERVED* | | | | | | | | | | | | | | | | | | | | CURRENT_PC | | | | | | | | | | | |

| BITS | FIELD NAME | DESCRIPTION |
|---|---|---|
| 31:28 | 0011'B | (ENCODING BITS) |
| 24:21 | CONTEXT# | ACTIVE CONTEXT NUMBER |
| 18:17 | SEG_ID | SEGMENT ID OF SIGNALING NODE |
| 15:12 | NODE_ID | NODE ID OF SIGNALING NODE |

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | 11'B | | 0000'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0101'B | | | | *RESERVED* | | | | | | | DATA_COUNT | | | | | *RESERVED* | | | | | | | | | | | | | | | |
| DATA | | | | | | | | | | | | | | | | | | | | | | | | | | | | | | | |
| ↓ ↓ ↓ ↓ | | | | | | | | | | | | | | | | | | | | | | | | | | | | | | | |
| DATA | | | | | | | | | | | | | | | | | | | | | | | | | | | | | | | |

| BITS | FIELD NAME | DESCRIPTION |
|---|---|---|
| 31:28 | 0101'B | (ENCODING BITS) |
| 20:16 | DATA_COUNT | COUNT OF THE NUMBER OF DATA WORDS |

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | 11'B | | 0000'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1011'B | | | | 1 | BK_ID | | LENGTH | | | | *RES* | | SEG_ID | | *RS* | NODE_ID | | | | *RESERVED* | | | | | | | | | | | |
| *TRACE VECTOR* | | | | | | | | | | | | | | | | | | | | | | | | | | | | | | | |
| ⋮ | | | | | | | | | | | | | | | | | | | | | | | | | | | | | | | |
| *TRACE VECTOR* | | | | | | | | | | | | | | | | | | | | | | | | | | | | | | | |

| BITS | FIELD NAME | DESCRIPTION |
|---|---|---|
| 31:28 | 1011'B | (ENCODING BITS) |
| 27 | 1 | TRACEPOINT MATCH |
| 26:25 | BK_ID | BREAKPOINT (OR TRACEPOINT) IDENTIFIER |
| 24:21 | LENGTH | LENGTH OF TRACE PAYLOAD |
| 18:17 | SEG_ID | SEGMENT ID OF SIGNALING NODE |
| 15:12 | NODE_ID | NODE ID OF SIGNALING NODE |

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | 11'B | | 0000'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1010'B | | | | TR | BK_ID | | CONTEXT# | | | | *RES* | | SEG_ID | | *RS* | NODE_ID | | | | *RESERVED* | | | | | | | | | | | |
| *RESERVED* | | | | | | | | | | | | | | | | | | | | CURRENT_PC | | | | | | | | | | | |

| BITS | FIELD NAME | DESCRIPTION |
|---|---|---|
| 31:28 | 1010'B | (ENCODING BITS) |
| 27 | TR | TRACEPOINT MATCH |
| 26:25 | BK_ID | BREAKPOINT (OR TRACEPOINT) IDENTIFIER |
| 24:21 | CONTEXT# | ACTIVE CONTEXT NUMBER |
| 18:17 | SEG_ID | SEGMENT ID OF SIGNALING NODE |
| 15:12 | NODE_ID | NODE ID OF SIGNALING NODE |

| HEADER BITS | | | | | | | | |
|---|---|---|---|---|---|---|---|---|
| 8 | 7 | 6 | 5 | 4 | 3 | 2 | 1 | 0 |
| 1 | 1 | 1 | 11'B | | 0000'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| T20-DMEM_DATA | | | | | | | | | | | | | | | | | | | | | | | | | | | | | | | |

| BITS | FIELD NAME | DESCRIPTION |
|---|---|---|
| 31:0 | T20-DMEM DATA | DATA CONTENTS AT REQUESTED LOCATION |

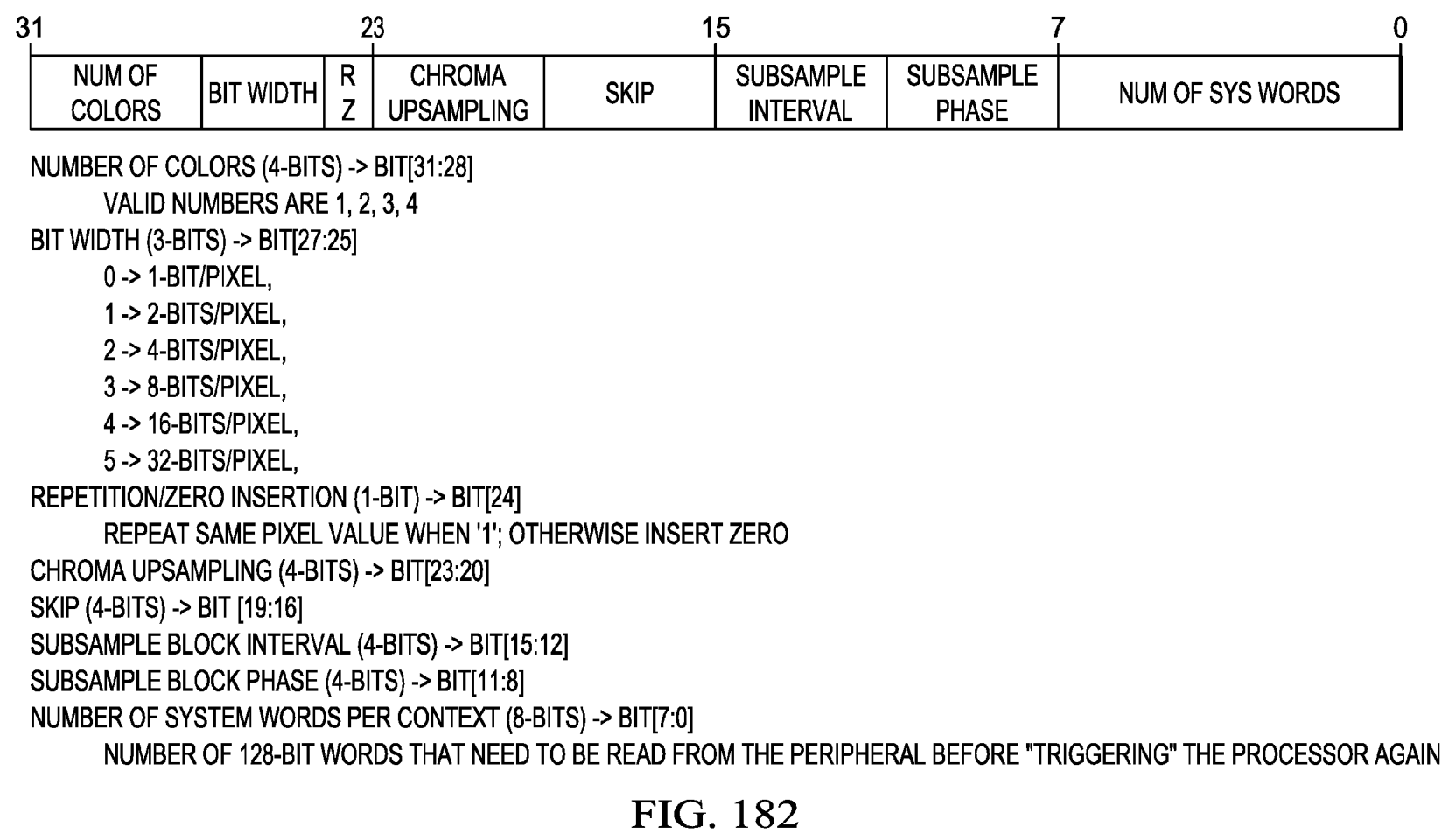

31 23 15 7 0

| | | | | | | | |
|---|---|---|---|---|---|---|---|
| NUM OF COLORS | BIT WIDTH | R Z | CHROMA UPSAMPLING | SKIP | SUBSAMPLE INTERVAL | SUBSAMPLE PHASE | NUM OF SYS WORDS |

NUMBER OF COLORS (4-BITS) -> BIT[31:28]
VALID NUMBERS ARE 1, 2, 3, 4
BIT WIDTH (3-BITS) -> BIT[27:25]
0 -> 1-BIT/PIXEL,
1 -> 2-BITS/PIXEL,
2 -> 4-BITS/PIXEL,
3 -> 8-BITS/PIXEL,
4 -> 16-BITS/PIXEL,
5 -> 32-BITS/PIXEL,
REPETITION/ZERO INSERTION (1-BIT) -> BIT[24]
REPEAT SAME PIXEL VALUE WHEN '1'; OTHERWISE INSERT ZERO
CHROMA UPSAMPLING (4-BITS) -> BIT[23:20]
SKIP (4-BITS) -> BIT [19:16]
SUBSAMPLE BLOCK INTERVAL (4-BITS) -> BIT[15:12]
SUBSAMPLE BLOCK PHASE (4-BITS) -> BIT[11:8]
NUMBER OF SYSTEM WORDS PER CONTEXT (8-BITS) -> BIT[7:0]
NUMBER OF 128-BIT WORDS THAT NEED TO BE READ FROM THE PERIPHERAL BEFORE "TRIGGERING" THE PROCESSOR AGAIN

FIG. 182

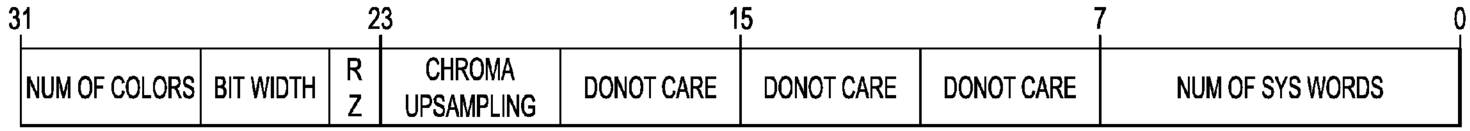

NUMBER OF COLORS (4-BITS) -> BIT[31:28]
VALID NUMBERS ARE 1, 2, 3, 4
BIT WIDTH (3-BITS) -> BIT[27:25]
0 -> 1-BIT/PIXEL,
1 -> 2-BITS/PIXEL,
2 -> 4-BITS/PIXEL,
3 -> 8-BITS/PIXEL,
4 -> 16-BITS/PIXEL,
5 -> 32-BITS/PIXEL,
REPETITION/ZERO INSERTION (1-BIT) -> BIT[24]
REPEAT SAME PIXEL VALUE WHEN '1'; OTHERWISE INSERT ZERO
CHROMA DOWNSAMPLING (4-BITS) -> BIT[23:20]
BIT[19:8] -> NO APPLICABLE FOR WRITE THREAD
NUMBER OF SYSTEM WORDS PER CONTEXT (8-BITS) -> BIT[7:0]

FIG. 193

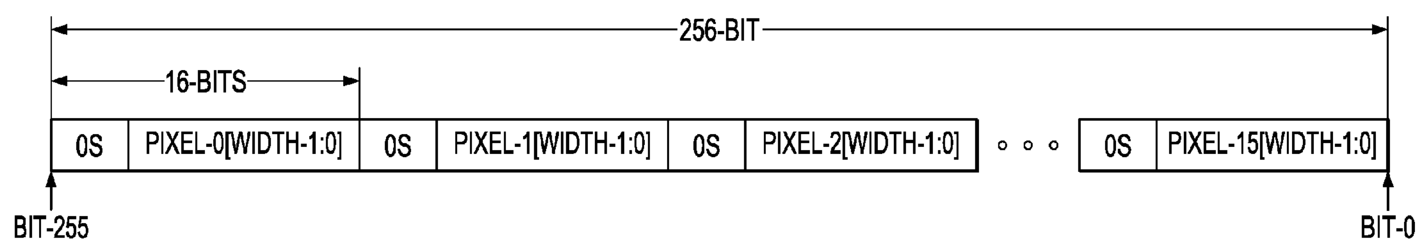

32-BIT PIXELS OCCUPY TWO 16-BIT
16-BIT PIXELS HAS NO ZERO APPENDED

HEADER BITS

| 8 | 7 | 6 | 5 | 4 | 3 | 2 | 1 | 0 |
|---|---|---|---|---|---|---|---|---|
| 0 | 0 | 1 | 11'B | | 0001'B | | | |

6304

DATA BITS

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 00'B | | *RESERVED* | | | | | | | | | | | TMTHREAD | | | | *RS* | 11'B | | *RS* | 0010'B | | | | 1 | *RESERVED* | | | | | |

6306 6308 6314 6310 6312

| BITS | FIELD NAME | DESCRIPTION |
|---|---|---|
| 31:30 | 00'B | (ENCODING BITS) |
| 18:15 | TMTHREAD | THREAD IDENTIFIER OF TERMINATING THREAD (THREAD ID TO BE USED TO EXTRACT ACTION HEADER); OR PROGRAM IDENTIFIER OF TERMINATING PROGRAM (USED AD PROG_ID FOR ACTION LIST BASE ADDRESS DERIVATION) |
| 13:12 | TMSEG | 11'B FOR GLOBAL LS-UNIT; OR SEGMENT IDENTIFIER OF TERMINATING PROGRAM |
| 10:7 | TMNODE | 0010'B FOR GLOBAL LS-UNIT, OR NODE IDENTIFIER OF TERMINATING PROGRAM (NODE_ID TO BE USED TO EXTRACT ACTION HEADER) |
| 6 | TH | A THREAD IS TERMINATING (TH=1); OR A PROGRAM IS TERMINATING (TH=0) |

FIG. 200

| ACTION LIST ENTRY BITS | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MSG OPS | | | SEG_ ID | | NODE_ID | | | | MESSAGE PAYLOAD | | | | | | | | | | | | | | | | | | | | | | | | | | | | | | | |
| 000'B | | | 00'B | | 0010'B | | | | ACTION LIST END (PAYLOAD DOES NOT MATTER) | | | | | | | | | | | | | | | | | | | | | | | | | | | | | | | |

ACTION LIST ENTRY BITS

| 40–38 | 37–36 | 35–32 | 31–8 | 7–0 |
|---|---|---|---|---|
| MSG OPS | SEG_ ID | NODE_ID | MESSAGE PAYLOAD-0 | |
| 000'B | 00'B | 1000'B | *RESERVED* | NEXT_LIST_ENTRY |
| | | | | |
| | | | | |
| | | | | |
| | | | | |
| 000'B | 00'B | 0000'B | *RESERVED* | PAYLOAD COUNT=7 |
| 000'B | 00'B | 0001'B | MESSAGE PAYLOAD-1 | |
| 000'B | 00'B | 0001'B | MESSAGE PAYLOAD-2 | |
| 000'B | 00'B | 0001'B | MESSAGE PAYLOAD-3 | |
| 000'B | 00'B | 0001'B | MESSAGE PAYLOAD-4 | |
| 000'B | 00'B | 0001'B | MESSAGE PAYLOAD-5 | |
| 000'B | 00'B | 0001'B | MESSAGE PAYLOAD-6 | |
| 000'B | 00'B | 0001'B | MESSAGE PAYLOAD-7 | |
| 000'B | 00'B | 0010'B | ACTION LIST END | |

FIG. 207

| ACTION LIST ENTRY BITS | | | | |
|---|---|---|---|---|
| 40 39 38 | 37 36 | 35 34 33 32 | 31 30 29 28 27 26 25 24 23 22 21 20 19 18 17 16 15 14 13 12 11 10 9 8 | 7 6 5 4 3 2 1 0 |
| MSG OPS | SEG_ ID | NODE_ID | MESSAGE PAYLOAD-0 | |
| 000'B | 00'B | 0001'B | MESSAGE PAYLOAD-1 | |
| 000'B | 00'B | 0001'B | MESSAGE PAYLOAD-2 | |
| 000'B | 00'B | 1000'B | *RESERVED* | NEXT_LIST_ENTRY |
| | | | | |
| | | | | |
| | | | | |
| | | | | |
| 000'B | 00'B | 0000'B | *RESERVED* | PAYLOAD COUNT=7 |
| 000'B | 00'B | 0001'B | MESSAGE PAYLOAD-3 | |
| 000'B | 00'B | 0001'B | MESSAGE PAYLOAD-4 | |
| 000'B | 00'B | 0001'B | MESSAGE PAYLOAD-5 | |
| 000'B | 00'B | 0001'B | MESSAGE PAYLOAD-6 | |
| 000'B | 00'B | 0001'B | MESSAGE PAYLOAD-7 | |
| 000'B | 00'B | 0001'B | MESSAGE PAYLOAD-8 | |
| 000'B | 00'B | 0001'B | MESSAGE PAYLOAD-9 | |
| *MSG OPS* | *SEG_ ID* | *NODE_ID* | *NEW MESSAGE PAYLOAD-0* | |
| | | | | |
| | | | | |
| | | | | |
| | | | | |

FIG. 209

ACTION LIST ENTRY BITS

| 40 39 38 | 37 36 | 35 34 33 32 | 31 30 29 28 27 26 25 24 23 22 21 20 19 18 17 16 15 14 13 12 11 10 9 8 | 7 6 5 4 3 2 1 0 |
|---|---|---|---|---|
| MSG OPS | SEG_ ID | NODE_ID | MESSAGE PAYLOAD-0 | |
| 000'B | 00'B | 0000'B | *RESERVED* | PAYLOAD COUNT=10 |
| 000'B | 00'B | 0001'B | MESSAGE PAYLOAD-1 | |
| 000'B | 00'B | 0001'B | MESSAGE PAYLOAD-2 | |
| 000'B | 00'B | 1000'B | *RESERVED* | NEXT_LIST_ENTRY |
| | | | | |
| | | | | |
| | | | | |
| | | | | |
| 000'B | 00'B | 0001'B | MESSAGE PAYLOAD-3 | |
| 000'B | 00'B | 0001'B | MESSAGE PAYLOAD-4 | |
| 000'B | 00'B | 0001'B | MESSAGE PAYLOAD-5 | |
| 000'B | 00'B | 0001'B | MESSAGE PAYLOAD-6 | |
| 000'B | 00'B | 0001'B | MESSAGE PAYLOAD-7 | |
| 000'B | 00'B | 0001'B | MESSAGE PAYLOAD-8 | |
| 000'B | 00'B | 0001'B | MESSAGE PAYLOAD-9 | |
| *MSG OPS* | *SEG_ ID* | *NODE_ID* | *NEW MESSAGE PAYLOAD-0* | |
| | | | | |
| | | | | |
| | | | | |
| | | | | |

FIG. 211

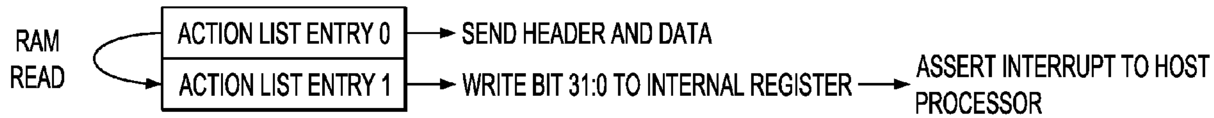
FIG. 212
| ACTION LIST ENTRY BITS | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MSG OPS | | | SEG_ ID | | NODE_ID | | | | MESSAGE PAYLOAD | | | | | | | | | | | | | | | | | | | | | | | | | | | | | | | |
| 000'B | | | 00'B | | 0010'B | | | | INTERRUPT INFO TO THE HOST | | | | | | | | | | | | | | | | | | | | | | | | | | | | | | | |
FIG. 213
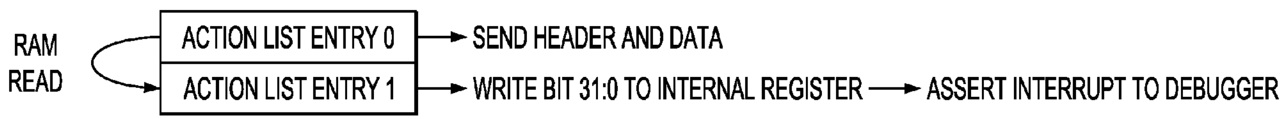
FIG. 214
| ACTION LIST ENTRY BITS | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MSG OPS | | | SEG_ ID | | NODE_ID | | | | MESSAGE PAYLOAD | | | | | | | | | | | | | | | | | | | | | | | | | | | | | | | |
| 000'B | | | 00'B | | 0010'B | | | | INTERRUPT INFO TO THE DEBUGGER | | | | | | | | | | | | | | | | | | | | | | | | | | | | | | | |
FIG. 215

| ACTION LIST ENTRY BITS | | | |
|---|---|---|---|
| 40 39 38 | 37 36 | 35 34 33 32 | 31 30 29 28 27 26 25 24 23 22 21 20 19 18 17 16 15 14 13 12 11 10 9 8 7 6 5 4 3 2 1 0 |
| MSG OPS | SEG_ ID | NODE_ID | MESSAGE PAYLOAD-0 |
| 000'B | 00'B | 0001'B | MESSAGE PAYLOAD-1 |
| 000'B | 00'B | 0001'B | MESSAGE PAYLOAD-2 |
| 000'B | 00'B | 0001'B | MESSAGE PAYLOAD-3 |
| 000'B | 00'B | 0001'B | MESSAGE PAYLOAD-4 |
| 000'B | 00'B | 0001'B | MESSAGE PAYLOAD-5 |
| 000'B | 00'B | 0001'B | MESSAGE PAYLOAD-6 |
| 000'B | 00'B | 0001'B | MESSAGE PAYLOAD-7 |
| MSG OPS | SEG_ ID | NODE_ID | NEW MESSAGE PAYLOAD-0 |
| 000'B | 00'B | 0001'B | NEW MESSAGE PAYLOAD-1 |
| 000'B | 00'B | 0001'B | NEW MESSAGE PAYLOAD-2 |
| 000'B | 00'B | 0001'B | NEW MESSAGE PAYLOAD-3 |
| 000'B | 00'B | 0001'B | NEW MESSAGE PAYLOAD-4 |
| 000'B | 00'B | 0001'B | NEW MESSAGE PAYLOAD-5 |
| 000'B | 00'B | 0001'B | NEW MESSAGE PAYLOAD-6 |
| 000'B | 00'B | 0001'B | NEW MESSAGE PAYLOAD-7 |
| MSG OPS | SEG_ ID | NODE_ID | ANOTHER NEW MESSAGE PAYLOAD-0 |
| ⋮ | | | |

FIG. 217

| ACTION LIST ENTRY BITS | | | | |
|---|---|---|---|---|
| 40 39 38 | 37 36 | 35 34 33 32 | 31 30 29 28 27 26 25 24 23 22 21 20 19 18 17 16 15 14 13 12 11 10 9 8 | 7 6 5 4 3 2 1 0 |
| MSG OPS | SEG_ ID | NODE_ID | MESSAGE PAYLOAD-0 | |
| 000'B | 00'B | 0001'B | MESSAGE PAYLOAD-1 | |
| 000'B | 00'B | 0001'B | MESSAGE PAYLOAD-2 | |
| 000'B | 00'B | 1000'B | *RESERVED* | NEXT_LIST_ENTRY |
| | | | | |
| | | | | |
| | | | | |
| | | | | |
| 000'B | 00'B | 0001'B | MESSAGE PAYLOAD-3 | |
| 000'B | 00'B | 0001'B | MESSAGE PAYLOAD-4 | |
| 000'B | 00'B | 0001'B | MESSAGE PAYLOAD-5 | |
| 000'B | 00'B | 1000'B | *RESERVED* | NEXT_LIST_ENTRY |
| | | | | |
| | | | | |
| | | | | |
| | | | | |
| 000'B | 00'B | 0001'B | MESSAGE PAYLOAD-6 | |
| 000'B | 00'B | 0001'B | MESSAGE PAYLOAD-7 | |
| 000'B | 00'B | 0001'B | MESSAGE PAYLOAD-8 | |
| 000'B | 00'B | 1000'B | *RESERVED* | NEXT_LIST_ENTRY |
| | | | ⋮ | |

FIG. 219

| BITS | FIELD NAME | DESCRIPTION |
|---|---|---|
| 31:28 | 0011'B | (ENCODING BITS) |
| 24:21 | CONTEXT# | ACTIVE CONTEXT NUMBER |
| 18:17 | SEG_ID | SEGMENT ID OF SIGNALING NODE |
| 15:12 | NODE_ID | NODE ID OF SIGNALING NODE |

6700

6702

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | 11'B | | 0001'B | | | |

6704

6706

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1010'B | | | | 0 | BK_ID | | CONTEXT# | | | | *RES* | | SEG ID | | *RS* | NODE_ID | | | | *RESERVED* | | | | | | | | | | | |
| *RESERVED* | | | | | | | | | | | | | | | | | | | | CURRENT_PC | | | | | | | | | | | |

6708 6710 6712 6714 6716 6718

| BITS | FIELD NAME | DESCRIPTION |
|---|---|---|
| 31:28 | 1010'B | (ENCODING BITS) |
| 27 | TR | TRACEPOINT MATCH = 0 |
| 26:25 | BK_ID | BREAKPOINT (OR TRACEPOINT) IDENTIFIER |
| 24:21 | CONTEXT# | ACTIVE CONTEXT NUMBER |
| 18:17 | SEG_ID | SEGMENT ID OF SIGNALING NODE |
| 15:12 | NODE_ID | NODE ID OF SIGNALING NODE |

FIG. 221

| BITS | FIELD NAME | DESCRIPTION |
|---|---|---|
| 31:28 | 1010'B | (ENCODING BITS) |
| 27 | TR | TRACEPOINT MATCH = 1 |
| 26:25 | BK_ID | BREAKPOINT (OR TRACEPOINT) IDENTIFIER |
| 24:21 | CONTEXT# | ACTIVE CONTEXT NUMBER |
| 18:17 | SEG_ID | SEGMENT ID OF SIGNALING NODE |
| 15:12 | NODE_ID | NODE ID OF SIGNALING NODE |

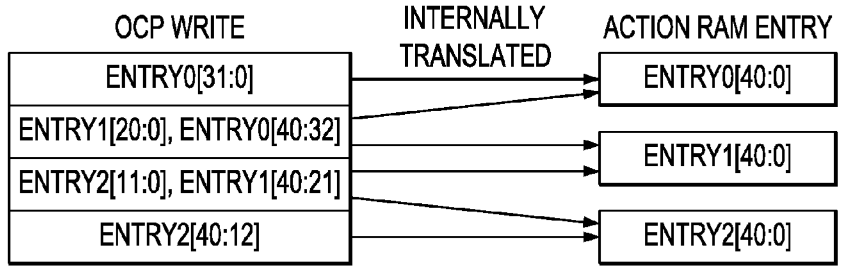

| DATA BITS 31–26 | DATA BITS 25–16 | DATA BITS 15–10 | DATA BITS 9–0 | |
|---|---|---|---|---|
| *RESERVED* | 7106 NODE_1_TERM_HEADER | *RESERVED* | NODE_0_TERM_HEADER | 7102 |
| *RESERVED* | 7108 NODE_3_TERM_HEADER | *RESERVED* | NODE_2_TERM_HEADER | 7104 |
| | ↓ ↓ | | ↓ ↓ | |
| *RESERVED* | 7110 NODE_15_TERM_HEADER | *RESERVED* | NODE_14_TERM_HEADER | 7112 |
| *RESERVED* | 7114 THREAD_1_TERM_HEADER | *RESERVED* | THREAD_0_TERM_HEADER | 7120 |
| *RESERVED* | 7116 THREAD_3_TERM_HEADER | *RESERVED* | THREAD_2_TERM_HEADER | 7122 |
| | ↓ ↓ | | ↓ ↓ | |
| *RESERVED* | 7118 THREAD_15_TERM_HEADER | *RESERVED* | THREAD_14_TERM_HEADER | 7124 |

FIG. 231

| ACTION LIST ENTRY BITS | | | | | |
|---|---|---|---|---|---|
| 40 39 38 | 37 36 | 35 34 33 32 | 31 30 29 28 27 26 25 24 23 22 21 20 19 18 17 16 15 14 13 12 11 10 9 8 | 7 6 5 4 3 2 1 0 | |
| 000'B | 00'B | 0000'B | *RESERVED* | PAYLOAD_COUNT | 7410 |
| 000'B | 00'B | 0001'B | MESSAGE_CONTINUATION_PAYLOAD | | 7412 |
| 000'B | 00'B | 0010'B | ACTION_LIST_END | | 7414 |
| 000'B | 00'B | 0011'B | HOST_INTERRUPT_INFO_END | | 7416 |
| 000'B | 00'B | 0111'B | DEBUG_NOTIFICATION_INFO_END | | 7418 |
| 000'B | 00'B | 1000'B | *RESERVED* | NOP | 7420 |
| OP | SEG_ID | NODE_ID | MESSAGE PAYLOAD | | 7408 |
| 7402 | 7404 | 7406 | | | |

7500

7502 HEADER BITS

| 8 | 7 | 6 | 5 | 4 | 3 | 2 | 1 | 0 |
|---|---|---|---|---|---|---|---|---|
| 1 | 1 | 1 | 11'B | | 0001'B | | | |

7504 DATA BITS

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 (7506) | *RESERVED* | | | | | | ENTRY_40:32 (7508) | | | | | | | | | *RESERVED* | | | | | | | | ACTION_LIST_LINE (7510) | | | | | | | |
| ENTRY_31:0 | | | | | | | | | | | | | | | | | | | | | | | | | | | | | | | |

| BITS | FIELD NAME | DESCRIPTION |
|---|---|---|
| 31 | 0 | (ENCODING BIT) |
| 24:16 | ENTRY_40:32 | UPPER 9 MSBS OF ENTRY (LOWER 32 BITS IN SECOND WORD OF MESSAGE) |
| 7:0 | ACTION_LIST_LINE | LINE NUMBER IN ACTION LIST RAM (ENTRY-ALIGNED) |

FIG. 234

| HEADER0 BITS | | | | | | | | |
|---|---|---|---|---|---|---|---|---|
| 7 | 6 | 5 | 4 | 3 | 2 | 1 | 0 | |
| EXT | MSG LN | MSG OPCODE | | | TMSG OPCODE | | | |
| HEADER BITS | | | | | | | | |

| HEADER | FIELD NAME | DESCRIPTION |
|---|---|---|
| 7 | EXT | HEADER EXTENSION (B0 - NO EXTENSION; B1 - EXTENSION) |
| 6 | MSGLN | MESSAGE LENGTH IN BEATS (OR 32-BIT WORDS)<br>0 - ONE BEAT;<br>1 - TWO BEATS; |
| 5:3 | MSGOPCODE | TPIC MESSAGE OPCODE |
| 2:0 | TMSGOPCODE | TRACE MESSAGE OPCODE<br>B000 - SINGLE FRAGMENT MESSAGE;<br>B001 - LAST FRAGMENT OF A MULT-FRAGMENT MESSAGE;<br>B010 - FIRST FRAGMENT OF A MULT-FRAGMENT MESSAGE;<br>B011 - CONTINUING FRAGMENT OF A MULTI-FRAGMENT MESSAGE;<br>B100 - TIMESTAMP PRESENT AT END OF SINGLE FRAGMENT MESSAGE;<br>B101 - TIMESTAMP PRESENT AT END OF LAST FRAGMENT OF A MULT-FRAGMENT MESSAGE;<br>B110 - RESERVED;<br>B111 - RESERVED; |

FIG. 236

| HEADER1 BITS | | | | | | | |
|---|---|---|---|---|---|---|---|
| 7 | 6 | 5 | 4 | 3 | 2 | 1 | 0 |
| EXT | OVF | DST SEGID | | DSTNODEID | | | |

HEADER BITS

| HEADER | FIELD NAME | DESCRIPTION |
|---|---|---|
| 7 | EXT | HEADER EXTENSION (B0 - NO EXTENSION; B1 - EXTENSION) |
| 6 | OVF | OVERFLOW BIT (B0 - NO OVERFLOW SINCE LAST COMPLETE MESSAGE; B1 - OVERFLOW SINCE LAST COMPLETE MESSAGE) |
| 5:4 | DESTSEGID | DESTINATION SEGMENT ID |
| 3:0 | DSTNODEID | DESTINATION NODE ID |

FIG. 237

| HEADER2 BITS | | | | | | | |
|---|---|---|---|---|---|---|---|
| 7 | 6 | 5 | 4 | 3 | 2 | 1 | 0 |
| 0 | RESERVED | | | REQINFO | | | |

HEADER BITS

| HEADER | FIELD NAME | DESCRIPTION |
|---|---|---|
| 7 | EXT | HEADER EXTENSION (B0 - NO EXTENSION) |
| 6:4 | RESERVED | SOURCE SEGMENT ID |
| 3:0 | REQINFO | REQINFO ASSOCIATED WITH TPIC MESSAGE |

FIG. 238

| HEADER1 BITS | | | | | | | |
|---|---|---|---|---|---|---|---|
| 7 | 6 | 5 | 4 | 3 | 2 | 1 | 0 |
| 1 | OVF | SEGID | | NODEID | | | |

| HEADER0 BITS | | | | | | | |
|---|---|---|---|---|---|---|---|
| 7 | 6 | 5 | 4 | 3 | 2 | 1 | 0 |
| 1 | 1 | MOPCODE | | | 0 | 0 | 0 |

| HEADER2 BITS | | | | | | | |
|---|---|---|---|---|---|---|---|
| 7 | 6 | 5 | 4 | 3 | 2 | 1 | 0 |
| 0 | 0 | 0 | 0 | REQINFO | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT 0 | | | | | | | | | | | | | | | | | | | | | | | | | | | | | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT 1 | | | | | | | | | | | | | | | | | | | | | | | | | | | | | | | |

| HEADER1 BITS | | | | | | | |
|---|---|---|---|---|---|---|---|
| 7 | 6 | 5 | 4 | 3 | 2 | 1 | 0 |
| 1 | OVF | SEGID | | NODEID | | | |

| HEADER0 BITS | | | | | | | |
|---|---|---|---|---|---|---|---|
| 7 | 6 | 5 | 4 | 3 | 2 | 1 | 0 |
| 1 | 1 | MOPCODE | | | 0 | 1 | 0 |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT 0 | | | | | | | | | | | | | | | | | | | | | | | | | | | | | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT 1 | | | | | | | | | | | | | | | | | | | | | | | | | | | | | | | |

| HEADER0 BITS | | | | | | | |
|---|---|---|---|---|---|---|---|
| 7 | 6 | 5 | 4 | 3 | 2 | 1 | 0 |
| 0 | 1 | MOPCODE | | | 0 | 1 | 1 |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT 0 | | | | | | | | | | | | | | | | | | | | | | | | | | | | | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT 1 | | | | | | | | | | | | | | | | | | | | | | | | | | | | | | | |

| HEADER0 BITS | | | | | | | |
|---|---|---|---|---|---|---|---|
| 7 | 6 | 5 | 4 | 3 | 2 | 1 | 0 |
| 0 | 1 | MOPCODE | | | 0 | 0 | 1 |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT 0 | | | | | | | | | | | | | | | | | | | | | | | | | | | | | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT 1 | | | | | | | | | | | | | | | | | | | | | | | | | | | | | | | |

| TS BYTE(N) BITS | | | | | | | |
|---|---|---|---|---|---|---|---|
| 7 | 6 | 5 | 4 | 3 | 2 | 1 | 0 |
| C | TS[(7*N)+6:7*N] | | | | | | |

| HEADER BITS | | |
|---|---|---|
| HEADER | FIELD NAME | DESCRIPTION |
| 7 | CONTINUITY | CONTINUITY BIT (B0 - END OF TIMESTAMP; B1 - TIMESTAMP CONTINUES TO NEXT BYTE) |
| 6:0 | TIMESTAMP VALUE | N=0..7 (UP TO 7 BITS OF TIMESTAMP WHICH HAVE CHANGED) |

FIG. 243

| HEADER1 BITS | | | | | | | |
|---|---|---|---|---|---|---|---|
| 7 | 6 | 5 | 4 | 3 | 2 | 1 | 0 |
| 0 | OVF | SEGID | | NODEID | | | |

| HEADER0 BITS | | | | | | | |
|---|---|---|---|---|---|---|---|
| 7 | 6 | 5 | 4 | 3 | 2 | 1 | 0 |
| 1 | 0 | MOPCODE | | | 1 | 0 | 0 |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| MESSAGE PAYLOAD - BEAT0 | | | | | | | | | | | | | | | | | | | | | | | | | | | | | | | |

| TS BYTE 1 BITS | | | | | | | |
|---|---|---|---|---|---|---|---|
| 7 | 6 | 5 | 4 | 3 | 2 | 1 | 0 |
| 0 | TS[13:7] | | | | | | |

| TS BYTE 0 BITS | | | | | | | |
|---|---|---|---|---|---|---|---|
| 7 | 6 | 5 | 4 | 3 | 2 | 1 | 0 |
| 1 | TS[6:0] | | | | | | |

| HEADER BITS | | | | | | | | |
|---|---|---|---|---|---|---|---|---|
| 8 | 7 | 6 | 5 | 4 | 3 | 2 | 1 | 0 |
| 0 | 1 | 0 | SEG_ID | | NODE_ID | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| *RESERVED* | | | | | | | | | | | | | | | | | | | | | START_LINE | | | | | | | | | | |

| BITS | FIELD NAME | DESCRIPTION |
|---|---|---|
| 10:0 | START_LINE | FIRST INSTRUCTION LINE TO BE INITIALIZED |

7522

| HEADER BITS | | | | | | | | |
|---|---|---|---|---|---|---|---|---|
| 8 | 7 | 6 | 5 | 4 | 3 | 2 | 1 | 0 |
| 0 | 1 | 1 | 11'B | | 0001'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1 | *RESERVED* | | | | | | | | | #DESTS | | | | | | *RESERVED* | | | | | | | | | | | | #CONTEXTS | | | |
| PROCESSOR CONTEXT DESCR 1 | | | | | | | | | | | | | | | | PROCESSOR CONTEXT DESCR 0 | | | | | | | | | | | | | | | |
| PROCESSOR CONTEXT DESCR 3 | | | | | | | | | | | | | | | | PROCESSOR CONTEXT DESCR 2 | | | | | | | | | | | | | | | |
| ↓ ↓ ↓ | | | | | | | | | | | | | | | | ↓ ↓ ↓ | | | | | | | | | | | | | | | |
| PROCESSOR CONTEXT DESCR N (ODD) | | | | | | | | | | | | | | | | PROCESSOR CONTEXT DESCR N (EVEN) | | | | | | | | | | | | | | | |
| DESTINATION LIST | | | | | | | | | | | | | | | | DESTINATION LIST | | | | | | | | | | | | | | | |
| DESTINATION LIST | | | | | | | | | | | | | | | | DESTINATION LIST | | | | | | | | | | | | | | | |
| ↓ ↓ ↓ | | | | | | | | | | | | | | | | ↓ ↓ ↓ | | | | | | | | | | | | | | | |
| DESTINATION LIST | | | | | | | | | | | | | | | | DESTINATION LIST | | | | | | | | | | | | | | | |

HEADER BITS

| 8 | 7 | 6 | 5 | 4 | 3 | 2 | 1 | 0 |
|---|---|---|---|---|---|---|---|---|
| 0 | 0 | 1 | 01'B | | 1110'B | | | |

DATA BITS

| 31 | 30–12 | 11–8 | 7–4 | 3–0 |
|---|---|---|---|---|
| 1 | *RESERVED* | #TABLES | *RESERVED* | #CONTEXTS |

| 31–16 | 15–0 |
|---|---|
| CONTEXT DESCR 1 | CONTEXT DESCR 0 |
| CONTEXT DESCR 3 | CONTEXT DESCR 2 |
| ↓ ↓ ↓ ↓ | ↓ ↓ ↓ ↓ |
| CONTEXT DESCR N (ODD) | CONTEXT DESCR N (EVEN) |
| FMEM TABLE DESCR 0 | |
| FMEM TABLE DESCR 1 | |
| ↓ ↓ ↓ ↓ | |
| FMEM TABLE DESCR N | |
| SIMD CONTEXT DESCR 0 WORD 1 | SIMD CONTEXT DESCR 0 WORD 0 |
| SIMD CONTEXT DESCR 0 WORD 3 | SIMD CONTEXT DESCR 0 WORD 2 |
| DEST DESCR 0 WORD 1 | DEST DESCR 0 WORD 0 |
| DEST DESCR 0 WORD 3 | DEST DESCR 0 WORD 2 |
| SIMD CONTEXT DESCR 1 WORD 1 | SIMD CONTEXT DESCR 1 WORD 0 |
| SIMD CONTEXT DESCR 1 WORD 3 | SIMD CONTEXT DESCR 1 WORD 2 |
| DEST DESCR 1 WORD 1 | DEST DESCR 1 WORD 0 |
| ↓ ↓ ↓ ↓ | ↓ ↓ ↓ ↓ |
| DEST DESCR N WORD 3 | DEST DESCR N WORD 2 |

| HEADER BITS | | | | | | | | |
|---|---|---|---|---|---|---|---|---|
| 8 | 7 | 6 | 5 | 4 | 3 | 2 | 1 | 0 |
| 0 | 1 | 1 | 01'B | | 1111'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | *RESERVED* | | | | | | | | | | | | | | | | | | START_ADDRESS | | | | | | | | | | | | |

| BITS | FIELD NAME | DESCRIPTION |
|---|---|---|
| 31 | 0'B VALUE | (ENCODING BIT TO DISTINGUISH FROM SFM CONTROL INITIALIZATION) |
| 12:0 | START_ADDRESS | STARTING ADDRESS (BANK-ALIGNED) |

| HEADER BITS | | | | | | | | |
|---|---|---|---|---|---|---|---|---|
| 8 | 7 | 6 | 5 | 4 | 3 | 2 | 1 | 0 |
| 1 | 1 | 1 | SEG_ID | | NODE_ID | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | *RES* | HI | LO | *RES* | | CONTEXT# | | | | *RESERVED* | | | | | | | | | | | | T20-DMEM_LINE | | | | | | | | |
| HIGH HALFWORD | | | | | | | | | | | | | | | | LOW HALFWORD | | | | | | | | | | | | | | | |

| BITS | FIELD NAME | DESCRIPTION |
|---|---|---|
| 31 | 0 | (ENCODING BIT) |
| 30 | CX | CX=0 FROM SOURCE; NO WRITES TO CONTEXT AREA |
| 28 | HI | WRITE HIGH HALFWORD |
| 27 | LO | WRITE LOW HALFWORD |
| 24:21 | CONTEXT# | CONTEXT NUMBER FOR LOCAL WRITE (BASE ADDRESS FROM DESCRIPTOR) |
| 8:0 | T20-DMEM_LINE | LOCATION IN PROCESSOR DATA MEMORY (WORD-ALIGNED) |

| HEADER BITS | | | | | | | | |
|---|---|---|---|---|---|---|---|---|
| 8 | 7 | 6 | 5 | 4 | 3 | 2 | 1 | 0 |
| 1 | 1 | 1 | 11'B | | 0000'B | | | |

| DATA BITS | | | | |
|---|---|---|---|---|
| 31 | 30:25 | 24:16 | 15:8 | 7:0 |
| 0 | *RESERVED* | ENTRY_40:32 | *RESERVED* | ACTION_LIST_LINE |
| ENTRY_31:0 | | | | |

| BITS | FIELD NAME | DESCRIPTION |
|---|---|---|
| 31 | 0 | (ENCODING BIT) |
| 24:16 | ENTRY_40:32 | UPPER 9 MSBS OF ENTRY (LOWER 32 BITS IN SECOND WORD OF MESSAGE) |
| 7:0 | ACTION_LIST_LINE | LINE NUMBER IN ACTION LIST RAM (ENTRY-ALIGNED) |

| HEADER BITS | | | | | | | | |
|---|---|---|---|---|---|---|---|---|
| 8 | 7 | 6 | 5 | 4 | 3 | 2 | 1 | 0 |
| 0 | 0 | 0 | SEG_ID | | NODE_ID | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| TE | CT | *RS* | PGM_ID | | | | BASE_CTX# | | | | *RES* | | | | | | | | | START_PC | | | | | | | | | | | |

| BITS | FIELD NAME | DESCRIPTION |
|---|---|---|
| 31 | TE | TERMINATE WHEN THE PROGRAM ENDS IN ALL CONTEXTS |
| 30 | CT | CONTROLLING NODE (CONTROLS THE PC SOURCE TO INSTRUCTION MEMORY) |
| 28:25 | PGM_ID | UNIQUE PROGRAM IDENTIFIER (USED TO TAG A TERMINATION MESSAGE) |
| 24:21 | BASE_CTX# | BASE CONTEXT NUMBER (INDEX OF DESCRIPTOR FOR BASE CONTEXT) |
| 11:0 | START_PC | INITIAL PROGRAM COUNTER FOR THE PROGRAM (INSTRUCTION-LINE ALIGNED) |

FIG. 259

| WORD | BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| N+16 | SZ | RESERVED | | | | | | | | | | | | | | | | | | | | | | TABLE_BASE_ADDR N | | | | | | | | |
| N+17 | PIXEL_MASK_HI | | | | | | | | | | | | | | | | PIXEL_MASK_LO | | | | | | | | | | | | | | | |

7702 7706 7704 7708

| WORD | BITS | FIELD NAME | DESCRIPTION |
|---|---|---|---|
| N+16 | 31 | SZ | DATA SIZE (0:16 BITS, 1:32 BITS) |
| | 8:0 | TABLE_BASE_ADDR N | TABLE BASE ADDRESS IN FMEM (BANK-ALIGNED) |
| N+17 | 31:16 | PIXEL_MASK_HI | MASK FOR FORMING TABLE INDEXES (HIGH 16 BITS) |
| | 15:0 | PIXEL_MASK_LO | MASK FOR FORMING TABLE INDEXES (LOW 16 BITS) |

7700

8600

| WORD | BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| N | *RESERVED* | | | | | | | CONTEXT_BASE_ADDR N*2+1 | | | | | | | | | *RESERVED* | | | | | | | CONTEXT_BASE_ADDR N*2 | | | | | | | | |

| WORD | BITS | FIELD NAME | DESCRIPTION |
|---|---|---|---|
| N | 24:16 | CONTEXT_BASE_ADDR N*2+1 | CONTEXT BASE ADDRESS FOR CONTEXT N*2+1 (WORD-ALIGNED) |
| | 8:0 | CONTEXT_BASE_ADDR N*2 | CONTEXT BASE ADDRESS FOR CONTEXT N*2 (WORD-ALIGNED) |

8700

| WORD | BITS | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 0 | FM | *RESERVED* | | CONTEXT_BASE_ADDRESS | | | | | | | | | | | | |
| 1 | BLK | TH | *RES* | HG_POSN | | | | | | | | *RES* | #INPUTS | | | IN |
| 2 | V_INPUT(LINE)/BLK_INPUT (BLOCK) | | | | | | | | HG_INPUT(LINE)/BLK_INPUT (BLOCK) | | | | | | | |
| 3 | CN | *RES* | CN_CNTX# | | | | *RESERVED* | | CN_SEG | | SHR | *RES* | CN_NODE/SHRCNTX# | | | |

| WORD | BITS | FIELD NAME | DESCRIPTION |
|---|---|---|---|
| 0 | 15 | FM | CONTEXT IS IN FUNCTION-MEMORY (0: CONTEXT IS IN VECTOR-MEMORY) |
| | 12:0 | CONTEXT_BASE_ADDRESS | VECTOR-MEMORY/FUNCTION-MEMORY BASE ADDRESS FOR CONTEXT (128-BYTE ALIGNED) |
| 1 | 15 | BLK | *BLOCK* DEPENDENCY CHECKING (0=*LINE*) |
| | 14 | TH | CONTEXT IS MANAGED AS A THREAD (ORDERED DATA INPUT AND OUTPUT) |
| | 12:5 | HG_POSN | CURRENT POSITION IN THE HORIZONTAL GROUP (FOR *LINE* DATA) |
| | 3:1 | #INPUTS | NUMBER OF INPUTS (SCALAR OR VECTOR) |
| | 0 | IN | INPUT DEPENDENT |
| 2 | 15:8 | V_INPUT/BLK_INPUT | VERTICAL INPUT POSITION OR BLOCK INPUT COUNT (MSBS) |
| | 7:0 | HG_INPUT/BLK_INPUT | HORIZONTAL GROUP INPUT POSITION OR BLOCK INPUT COUNT (LSBS) |
| 3 | 15 | CN | CONTINUATION CONTEXT ENABLE (FOR OVERLAPPING INPUT/OUTPUT) |
| | 13:10 | CN_CNTX# | CONTINUATION CONTEXT NUMBER |
| | 7:6 | CN_SEG | CONTINUATION SEGMENT IDENTIFIER |
| | 5 | SHR | SHARED CONTEXT NUMBER IN BITS 3:0 |
| | 3:0 | CN_NODE/SHRCNTX# | CONTINUATION NODE IDENTIFIER OR SHARED CONTEXT NUMBER |

| WORD | BITS | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 12 | #SETVALV3 | | | | #SETVALV2 | | | | #SETVALV1 | | | | #SETVALV0 | | | |
| 13 | INST3 | | INST2 | | INST1 | | INST0 | | OUTST3 | | OUTST2 | | OUTST1 | | OUTST0 | |
| 14 | PERMISSIONCOUNT3 | | | | PERMISSIONCOUNT2 | | | | PERMISSIONCOUNT1 | | | | PERMISSIONCOUNT0 | | | |
| 15 | INTM | END | INEN | DELAYCOUNT | | | | *RES* | VALFLAG3 | | VALFLAG2 | | VALFLAG1 | | VALFLAG0 | |

| WORD | BITS | FIELD NAME | DESCRIPTION |
|---|---|---|---|
| 12 | 15:0 | #SETVALV[N] | NUMBER OF VECTOR *SET_VALID*SIGNALS RECEIVED FOR *SRC_TAG* N |
| 13 | 15:8 | INST[N] | INPUT STATE FOR *SRC_TAG* N |
| | 7:0 | OUTST[N] | OUTPUT STATE FOR *DST_TAG* N |
| 14 | 15:0 | PERMISSIONCOUNT[N] | PERMISSION COUNT FOR *DST_TAG* N |
| 15 | 15 | INTM | INPUT TERMINATED (*OUTPUT TERMINATION* RECEIVED) |
| | 14 | END | CONTEXT EXECUTION HAS ENCOUNTERED AN END INSTRUCTION |
| | 13 | INEN | INPUT ENABLED |
| | 12:9 | DELAYCOUNT | NUMBER OF FEEDBACK DELAYS SATISFIED |
| | 7:0 | VALFLAG[N] | EXPECTED INPUT VALID FOR *SRC_TAG* N (MSB:VECTOR, LSB:SCALAR) |

FIG. 282

DIAGRAM OF SHARED SFM CONTEXT
ENABLING INPUT DEPENDENCY
CHECKING ON LINE AND BLOCK INPUT

9000

| WORDS | BITS | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 12 | V_INPUT | | | | | | | | V/HG_INPUT | | | HG_INPUT | | | | |
| 13 | INST3 | | INST2 | | INST1 | | INST0 | | OUTST3 | | OUTST2 | | OUTST1 | | OUTST0 | |
| 14 | PERMISSIONCOUNT3 | | | | PERMISSIONCOUNT2 | | | | PERMISSIONCOUNT1 | | | | PERMISSIONCOUNT0 | | | |
| 15 | INTM | END | INEN | FILL | HG_POSN | | | | | | | | *RES* | #SETVAL | | |

| WORDS | BITS | FIELD NAME | DESCRIPTION |
|---|---|---|---|
| 12 | 15:8 | V_INPUT | VERTICAL INPUT POSITION (MSBS) |
| | 7:5 | V/HG_INPUT | ALLOCATED TO VERTICAL OR HORIZONTAL INPUT BASED ON V_RANGE |
| | 4:0 | HG_INPUT | INDEX TO THE INPUT POSITION WITHIN A HORIZONTAL GROUP (LSBS) |
| 13 | 15:8 | INST[N] | INPUT STATE FOR SRC_TAG N |
| | 7:0 | OUTST[N] | OUTPUT STATE FOR DST_TAG N |
| 14 | 15:12 | PERMISSIONCOUNT3 | PERMISSION COUNT FOR OUTPUT 3 (4TH DESTINATION) |
| | 11:8 | PERMISSIONCOUNT2 | PERMISSION COUNT FOR OUTPUT 2 (3RD DESTINATION) |
| | 7:4 | PERMISSIONCOUNT1 | PERMISSION COUNT FOR OUTPUT 1 (2ND DESTINATION) |
| | 3:0 | PERMISSIONCOUNT0 | PERMISSION COUNT FOR OUTPUT 0 (1ST DESTINATION) |
| 15 | 15 | INTM | INPUT TERMINATED (*OUTPUT TERMINATION* RECEIVED) |
| | 14 | END | CONTEXT EXECUTION HAS ENCOUNTERED AN END INSTRUCTION |
| | 13 | INEN | INPUT ENABLED |
| | 12 | FILL | INPUT BLOCK FILLED |
| | 11:4 | HG_POSN | CURRENT POSITION IN THE HORIZONTAL GROUP |
| | 2:0 | #SETVAL | NUMBER OF *SET_VALID* SIGNALS RECEIVED |

FIG. 308

LD-0: EXECUTE CYCLE OF PROCESSOR DATA MEMORY LOAD
RLD-0: EXECUTE CYCLE OF VECTOR PACKED LOAD CAUSING INPUT DEPENDENCY CHECK FAIL (AND TASK SWITCH)

RLD-0: EXECUTE CYCLE OF VECTOR PACKED LOAD WITH BANK CONFLICT
RLD-1: EXECUTE CYCLE OF VECTOR PACKED LOAD CAUSING INPUT DEPENDENCY CHECK FAIL (AND EVENTUAL TASK SWITCH)

LD-0: EXECUTE CYCLE OF PROCESSOR DATA MEMORY LOAD
END: DECODE CYCLE OF END

LD-0: EXECUTE CYCLE OF PROCESSOR DATA MEMORY LOAD
RLD-0: EXECUTE CYCLE OF VECTOR PACKED LOAD CAUSING INPUT DEPENDENCY CHECK FAIL (AND TASK SWITCH)

9100

HEADER BITS

| 8 | 7 | 6 | 5 | 4 | 3 | 2 | 1 | 0 |
|---|---|---|---|---|---|---|---|---|
| 0 | 1 | 1 | 01'B | | 1111'B | | | |

DATA BITS

| 31–22 | 21–16 | 15–12 | 11–8 | 7–4 | 3–0 |
|---|---|---|---|---|---|
| RESERVED | #DESTS | RESERVED | #TABLES | RESERVED | #CONTEXTS |
| T20-DMEM/T80-FMEM CONTEXT DESCR 0 | | | | | |
| T20-DMEM/T80-FMEM CONTEXT DESCR 1 | | | | | |
| ↓ ↓ ↓ ↓ | | | | | |
| T20-DMEM/T80-FMEM CONTEXT DESCR N | | | | | |
| FUNCTION-MEMORY TABLE DESCR 0 | | | | | |
| FUNCTION-MEMORY TABLE DESCR 1 | | | | | |
| ↓ ↓ ↓ ↓ | | | | | |
| FUNCTION-MEMORY TABLE DESCR N | | | | | |
| DESTINATION LIST (bits 31–16) | | DESTINATION LIST (bits 15–0) | | | |
| DESTINATION LIST | | DESTINATION LIST | | | |
| ↓ ↓ ↓ ↓ | | ↓ ↓ ↓ ↓ | | | |
| DESTINATION LIST | | DESTINATION LIST | | | |

| HEADER BITS | | | | | | | | |
|---|---|---|---|---|---|---|---|---|
| 8 | 7 | 6 | 5 | 4 | 3 | 2 | 1 | 0 |
| 0 | 1 | 1 | 01'B | | 1111'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 000000000000'B | | | | | | | | | | | | LINE_COUNT | | | | | | | | | | | | | | | | | | | |

| BITS | FIELD NAME | DESCRIPTION |
|---|---|---|
| 11:0 | LINE_COUNT | NUMBER OF 16X16-BIT DATA PACKETS WRITTEN OVER THE INTERCONNECT |

| HEADER BITS | | | | | | | | |
|---|---|---|---|---|---|---|---|---|
| 8 | 7 | 6 | 5 | 4 | 3 | 2 | 1 | 0 |
| 0 | 0 | 1 | 11'B | | 0001'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 00'B | | *RESERVED* | | | | | | | | | | | TMPGM_ID | | | | *RS* | TMSEG | | *RS* | TMNODE | | | | TH | *RESERVED* | | | | | |

| BITS | FIELD NAME | DESCRIPTION |
|---|---|---|
| 31:30 | 00'B | (ENCODING BITS) |
| 27:24 | TMPGM_ID | PROGRAM IDENTIFIER OF TERMINATING PROGRAM |
| 13:12 | TMSEG | SEGMENT IDENTIFIER OF TERMINATING PROGRAM |
| 10:7 | TMNODE | NODE IDENTIFIER OF TERMINATING PROGRAM |
| 6 | TH | A THREAD IS TERMINATING (TMC:TH=0/SF-MEM:TH=1) |

| HEADER BITS | | | | | | | | |
|---|---|---|---|---|---|---|---|---|
| 8 | 7 | 6 | 5 | 4 | 3 | 2 | 1 | 0 |
| 0 | 0 | 0 | 01'B | | 1111'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| TE | *RES* | | PGM_ID | | | | *RES* | | PARAMETER_COUNT | | | | | | *RESERVED* | | | | | | START_PC | | | | | | | | | | |
| *RESERVED* | | | | | | | BASE_CTX# | | | | #INP | | IN | *RESERVED* | | | | | | | DESTINATION_LIST_BASE | | | | | | | | | | |
| PARAMETER_LIST (OPTIONAL) | | | | | | | | | | | | | | | | | | | | | | | | | | | | | | | |
| ↓ ↓ ↓ ↓ | | | | | | | | | | | | | | | | | | | | | | | | | | | | | | | |
| PARAMETER_LIST (OPTIONAL) | | | | | | | | | | | | | | | | | | | | | | | | | | | | | | | |

| BITS | FIELD NAME | DESCRIPTION |
|---|---|---|
| 31 | TE | TERMINATE WHEN THE PROGRAM ENDS IN ALL CONTEXTS |
| 28:25 | PGM_ID | UNIQUE PROGRAM IDENTIFIER (USED TO TAG TERMINATION MESSAGE) |
| 22:17 | PARAMETER_COUNT | NUMBER OF PARAMETERS ON LIST (POSSIBLY ZERO) |
| 10:0 | START_PC | INITIAL PC OF THREAD (INSTRUCTION-LINE ALIGNED) |
| 2ND WORD | | |
| 24:21 | BASE_CTX# | BASE CONTEXT NUMBER (INDEX OF DESCRIPTOR FOR BASE CONTEXT) |
| 20:19 | #INP | NUMBER OF INPUTS (NUMBER OF *SET_VALID* SIGNALS EXPECTED) |
| 18 | IN | INPUT DEPENDENT (*#INP* FIELD VALID) |
| 10:0 | DESTINATION_LIST_BASE | BASE ADDRESS OF DESTINATION ARRAY (HALFWORD ALIGNED) |

<table>
<tr><th colspan="9">HEADER BITS</th></tr>
<tr><td>8</td><td>7</td><td>6</td><td>5</td><td>4</td><td>3</td><td>2</td><td>1</td><td>0</td></tr>
<tr><td>0</td><td>1</td><td>1</td><td colspan="2">01'B</td><td colspan="4">1111'B</td></tr>
</table>

<table>
<tr><th colspan="32">DATA BITS</th></tr>
<tr><td>31</td><td>30</td><td>29</td><td>28</td><td>27</td><td>26</td><td>25</td><td>24</td><td>23</td><td>22</td><td>21</td><td>20</td><td>19</td><td>18</td><td>17</td><td>16</td><td>15</td><td>14</td><td>13</td><td>12</td><td>11</td><td>10</td><td>9</td><td>8</td><td>7</td><td>6</td><td>5</td><td>4</td><td>3</td><td>2</td><td>1</td><td>0</td></tr>
<tr><td>1</td><td colspan="19">RESERVED</td><td colspan="4">#TABLES</td><td colspan="4">RESERVED</td><td colspan="4">#CONTEXTS</td></tr>
<tr><td colspan="16">PROCESSOR CONTEXT DESCR 1</td><td colspan="16">PROCESSOR CONTEXT DESCR 0</td></tr>
<tr><td colspan="16">PROCESSOR CONTEXT DESCR 3</td><td colspan="16">PROCESSOR CONTEXT DESCR 2</td></tr>
<tr><td colspan="16">↓ ↓ ↓ ↓</td><td colspan="16">↓ ↓ ↓ ↓</td></tr>
<tr><td colspan="16">PROCESSOR CONTEXT DESCR N (ODD)</td><td colspan="16">PROCESSOR CONTEXT DESCR N (EVEN)</td></tr>
<tr><td colspan="32">FMEM TABLE DESCR 0</td></tr>
<tr><td colspan="32">FMEM TABLE DESCR 1</td></tr>
<tr><td colspan="32">↓ ↓ ↓ ↓</td></tr>
<tr><td colspan="32">FMEM TABLE DESCR N</td></tr>
<tr><td colspan="16">SIMD CONTEXT DESCR 0 WORD 1</td><td colspan="16">SIMD CONTEXT DESCR 0 WORD 0</td></tr>
<tr><td colspan="16">SIMD CONTEXT DESCR 0 WORD 3</td><td colspan="16">SIMD CONTEXT DESCR 0 WORD 2</td></tr>
<tr><td colspan="16">SIMD DEST DESCR 0 WORD 1</td><td colspan="16">SIMD DEST DESCR 0 WORD 0</td></tr>
<tr><td colspan="16">SIMD DEST DESCR 0 WORD 3</td><td colspan="16">SIMD DEST DESCR 0 WORD 2</td></tr>
<tr><td colspan="16">SIMD CONTEXT DESCR 1 WORD 1</td><td colspan="16">SIMD CONTEXT DESCR 1 WORD 0</td></tr>
<tr><td colspan="16">SIMD CONTEXT DESCR 1 WORD 3</td><td colspan="16">SIMD CONTEXT DESCR 1 WORD 2</td></tr>
<tr><td colspan="16">SIMD DEST DESCR 1 WORD 1</td><td colspan="16">SIMD DEST DESCR 1 WORD 0</td></tr>
<tr><td colspan="16">↓ ↓ ↓ ↓</td><td colspan="16">↓ ↓ ↓ ↓</td></tr>
<tr><td colspan="16">SIMD DEST DESCR N WORD 3</td><td colspan="16">SIMD DEST DESCR N WORD 2</td></tr>
</table>

| HEADER BITS | | | | | | | | |
|---|---|---|---|---|---|---|---|---|
| 8 | 7 | 6 | 5 | 4 | 3 | 2 | 1 | 0 |
| 0 | 1 | 1 | 01'B | | 1111'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | *RESERVED* | | | | | | | | | | | | | | | | | | | | | | | | | | | | | | |

| BITS | FIELD NAME | DESCRIPTION |
|---|---|---|
| 31 | 0'B VALUE | (ENCODING BIT TO DISTINGUISH FROM PROCESSOR DATA MEMORY INITIALIZATION) |

| HEADER BITS | | | | | | | | |
|---|---|---|---|---|---|---|---|---|
| 8 | 7 | 6 | 5 | 4 | 3 | 2 | 1 | 0 |
| 0 | 0 | 0 | 11'B | | 0010'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| *RS* | 10'B | | THREAD_ID | | | | *RESERVED* | | | | | | | | | | | | | | DESTINATION_LIST_BASE | | | | | | | | | | |

| BITS | FIELD NAME | |
|---|---|---|
| 30:29 | TYPE | TYPE=10'B FOR MULTI-CAST THREAD |
| 28:25 | THREAD_ID | THREAD IDENTIFIER OF READ/WRITE THREAD |
| 10:0 | DESTINATION_LIST_BASE | BASE ADDRESS OF MULTI-CAST DESTINATIONS LIST (HALFWORD ALIGNED) |

9408

| HEADER BITS | | | | | | | | |
|---|---|---|---|---|---|---|---|---|
| 8 | 7 | 6 | 5 | 4 | 3 | 2 | 1 | 0 |
| 1 | 1 | 0 | 11'B | | 0001'B | | | |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 1010'B | | | | TR | BK_ID | | CONTEXT# | | | | *RES* | | SEG_ID | | *RS* | NODE_ID | | | | *RESERVED* | | | | | | | | | | | |
| *RESERVED* | | | | | | | | | | | | | | | | | | | | CURRENT_PC | | | | | | | | | | | |

| BITS | FIELD NAME | DESCRIPTION |
|---|---|---|
| 31:28 | 1010'B | (ENCODING BITS) |
| 27 | TR | TRACEPOINT MATCH |
| 26:25 | BK_ID | BREAKPOINT (OR TRACEPOINT) IDENTIFIER |
| 24:21 | CONTEXT# | ACTIVE CONTEXT NUMBER |
| 18:17 | SEG_ID | SEGMENT ID OF SIGNALING NODE |
| 15:12 | NODE_ID | NODE ID OF SIGNALING NODE |

| DATA BITS | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 010'B | | | SEG | | NODE | | | | INST_SIZE | | | | | | CN | NUMBER_OF_LINES | | | | | | | | | | | | | | | |
| RESERVED | | | | | | | | | | | | | | | | | | | | | START_LINE | | | | | | | | | | |
| SYSTEM_ADDRESS (BYTE-ALIGNED) | | | | | | | | | | | | | | | | | | | | | | | | | | | | | | | |
| RESERVED | | | | | | | | | | | | | | | | | | | | | | | | | | | | | | | |
| | | | | | | | | | | | | | | | | | | | | | | | | | | | | | | | |

9902 9904 9906 9908 9910 9912

| BITS | FIELD NAME | DESCRIPTION |
|---|---|---|
| 31:29 | ENCODING | INSTRUCTION MEMORY INITIALIZATION MESSAGE OP CODE |
| 28:27 | SEG | SEGMENT IDENTIFIER OF DESTINATION NODE |
| 26:23 | NODE | NODE IDENTIFIER OF DESTINATION NODE |
| 22:17 | INST_SIZE | SIZE OF INSTRUCTION LINE IN BYTES (PADDED IF NECESSARY)<br>5 -> GLS UNIT 1408<br>10 -> SFM 1410<br>32 -> NODE INSTRUCTION MEMORY |
| 16 | CN | CONTINUATION OF PREVIOUS INSTRUCTION MEMORY INITIALIZATION |
| 15:0 | NUMBER_OF_LINES | NUMBER OF INSTRUCTION LINES |
| | | |
| 10:0 | START_LINE | STARTING ADDRESS OF THE INSTRUCTION MEMORY RAM |

| DATA BITS (fields span bits: 011'B 31–29, SEG 28–27, NODE 26–23, RESERVED 22–17, CN 16, NUMBER_OF_BLOCKS 15–0; RESERVED 31–13, START_ADDRESS 12–0) | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 011'B | | | SEG | | NODE | | | | *RESERVED* | | | | | | CN | NUMBER_OF_BLOCKS | | | | | | | | | | | | | | | |
| RESERVED | | | | | | | | | | | | | | | | | | | START_ADDRESS | | | | | | | | | | | | |
| SYSTEM_ADDRESS (32-BYTE-ALIGNED) | | | | | | | | | | | | | | | | | | | | | | | | | | | | | | | |
| RESERVED | | | | | | | | | | | | | | | | | | | | | | | | | | | | | | | |
| | | | | | | | | | | | | | | | | | | | | | | | | | | | | | | | |

10002, 10004, 10006, 10008, 10010

| BITS | FIELD NAME | DESCRIPTION |
|---|---|---|
| 31:29 | ENCODING | DMEM INITIALIZATION MESSAGE OP CODE |
| 28:27 | SEG | SEGMENT IDENTIFIER OF DESTINATION NODE |
| 26:23 | NODE | NODE IDENTIFIER OF DESTINATION NODE |
| 16 | CN | CONTINUATION OF PREVIOUS LUT INITIALIZATION |
| 15:0 | NUMBER_OF_BLOCKS | NUMBER OF 32-BYTE LUT BLOCKS |
| | | |
| 12:0 | START_ADDRESS | STARTING ADDRESS OF THE FMEM/LUT |

DATA BITS

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 100'B | | | SEG | | NODE | | | | *RESERVED* | | | | | | CN | NUMBER_OF_WORDS | | | | | | | | | | | | | | | |
| SYSTEM_ADDRESS (WORD-ALIGNED) | | | | | | | | | | | | | | | | | | | | | | | | | | | | | | | |

10102, 10104, 10106, 10108, 10110

| BITS | FIELD NAME | DESCRIPTION |
|---|---|---|
| 31:29 | ENCODING | ACTION LIST TO CONTROL NODE MESSAGE OP CODE |
| 28:27 | SEG | SEGMENT IDENTIFIER OF DESTINATION NODE |
| 26:23 | NODE | NODE IDENTIFIER OF DESTINATION NODE |
| 16 | CN | CONTINUATION OF PREVIOUS LUT INITIALIZATION |
| 15:0 | NUMBER_OF_BLOCKS | NUMBER OF PACKED MESSAGE ACTION WORDS |

FIG. 350

*SIMPLEISP0123.CPP* (MAIN PROGRAM)

```
#INCLUDE "TMC.H"
#INCLUDE "SIMPLE_ISP0_IO.H"
#INCLUDE "SIMPLE_ISP1_IO.H"
#INCLUDE "SIMPLE_ISP2_IO.H"
#INCLUDE "SIMPLE_ISP3_IO.H"

//INCLUDES SIMPLE_ISP3_OUT ALSO
EXTERN SIMPLE_ISP2_OUT1
       YC_WRITE_INPUTV;

#INCLUDE "SIMPLE_ISP0_INPUT.H"
#INCLUDE "SIMPLE_ISP1_INPUT.H"
#INCLUDE "SIMPLE_ISP2_INPUT.H"
#INCLUDE "SIMPLE_ISP3_INPUT.H"

#INCLUDE "SIMPLE_ISP0_FUNC.H"
#INCLUDE "SIMPLE_ISP1_FUNC.H"
#INCLUDE "SIMPLE_ISP2_FUNC.H"
#INCLUDE "SIMPLE_ISP3_FUNC.H"

#INCLUDE "SIMPLE_ISP0.CPP"
#INCLUDE "SIMPLE_ISP1.CPP"
#INCLUDE "SIMPLE_ISP2.CPP"
#INCLUDE "SIMPLE_ISP3.CPP"

// MAIN PROGRAM
PROGRAM SIMPLE_ISP()
{
  SIMPLE_ISP0(&SIMPLE_ISP1_INPUTV);
  SIMPLE_ISP1(&SIMPLE_ISP2_INPUTV);
  SIMPLE_ISP2(&SIMPLE_ISP3_INPUTV,
              &YC_WRITE_INPUTV);
  SIMPLE_ISP3(&YC_WRITE_INPUTV);
}
```

FIG. 372

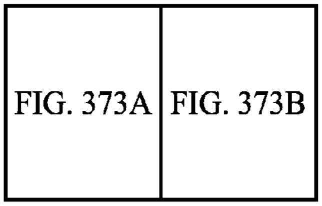

FIG. 373

```
#INCLUDE "SIMPLE_ISP_DEF.H"

//INPUT TYPE DEFINITIONS
#INCLUDE "SIMPLE_ISP0_IO.H"
#INCLUDE "SIMPLE_ISP1_IO.H"
#INCLUDE "SIMPLE_ISP2_IO.H"
#INCLUDE "SIMPLE_ISP3_IO.H"

//OUTPUT VARIABLE DECLARATIONS
#PRAGMA DATA_ATTRIBUTE("OUTPUT",0)
EXTERN SIMPLE_ISP0_INV
       SIMPLE_ISP0_INPUTV;
EXTERN SIMPLE_ISP0_INS
       SIMPLE_ISP0_INPUTS;
#PRAGMA DATA_ATTRIBUTE("OUTPUT",1)
EXTERN SIMPLE_ISP1_INS
       SIMPLE_ISP1_INPUTS;
EXTERN SIMPLE_ISP2_INS
       SIMPLE_ISP2_INPUTS;
#PRAGMA DATA_ATTRIBUTE("OUTPUT",2)
EXTERN SIMPLE_ISP3_INS
       SIMPLE_ISP3_INPUTS;

SIMPLE_ISP0_INS* STAGE0_PTRS;
SIMPLE_ISP1_INS* STAGE1_PTRS;
SIMPLE_ISP2_INS* STAGE2_PTRS;
SIMPLE_ISP3_INS* STAGE3_PTRS;

//CLASS DECLARATIONS
#INCLUDE "FRAME_LOOP.H"
#INCLUDE "BAYER_READ.H"

//INSTANCE DECLARATIONS
FRAME_LOOP_C* ISP_LOOP;
BAYER_READ_C* ISP_READ;

//PROGRAM INITIALIZATION
#INCLUDE "STAGE0_INIT.CPP"
#INCLUDE "STAGE1_INIT.CPP"
#INCLUDE "STAGE2_INIT.CPP"
#INCLUDE "STAGE3_INIT.CPP"
```

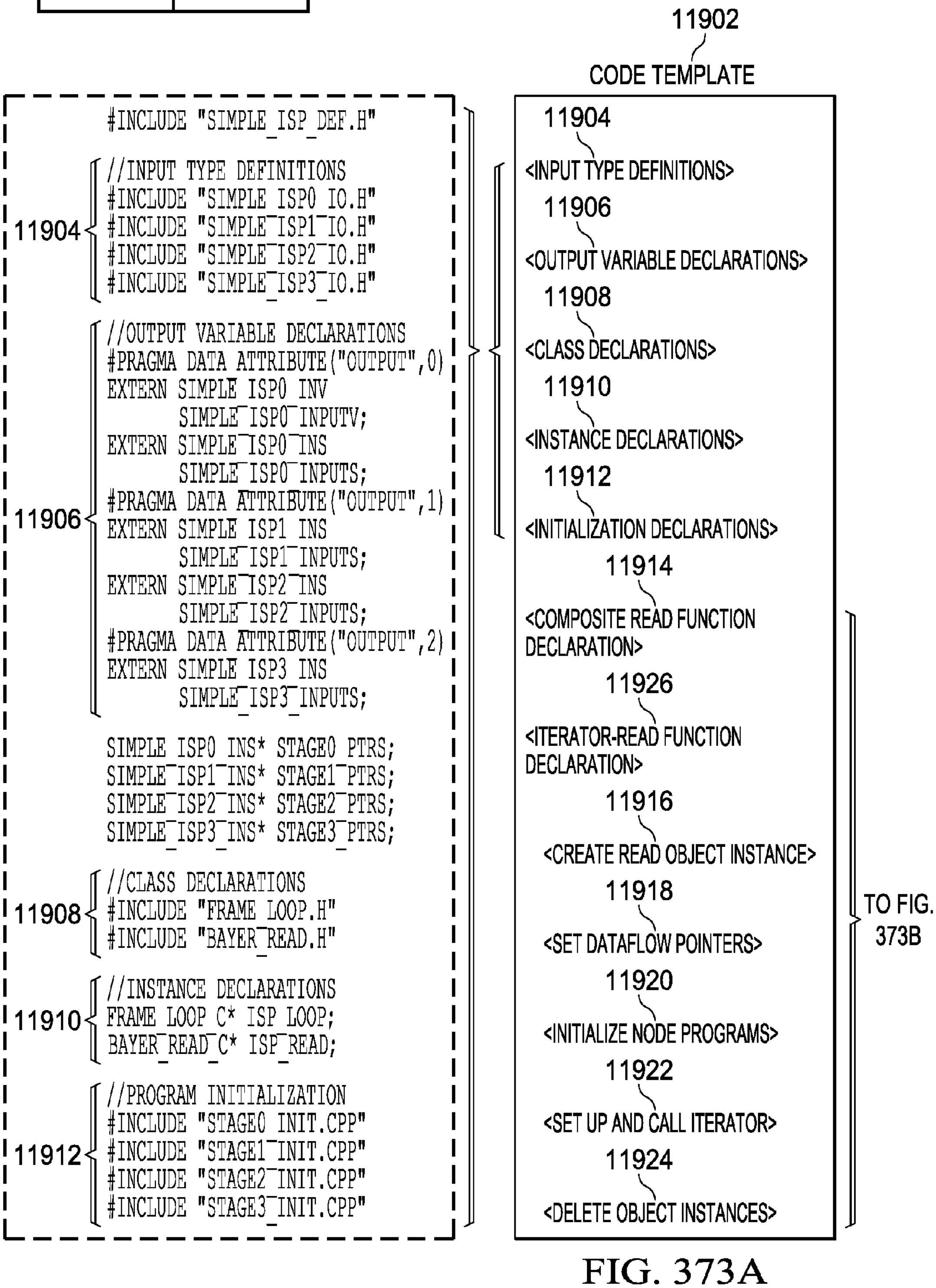

FIG. 373A

11914
```
//COMPOSITE READ THREAD
VOID COMPOSITE_READ(INT IDX, INT HEIGHT, INT WIDTH,
                    INT CIRC_NO, CIRC_S* C_S) {
  FOR( INT I=0; I<CIRC_NO; I++ )
     SET_CIRC(C_S[I],HEIGHT, WIDTH,IDX);
  ISP_READ->RUN(IDX);
  _SET_VALID(); //SETS DEST CONTEXTS VALID }
```

11926
```
VOID ISP_ITER_READ(INT HEIGHT, INT WIDTH,
         FRAME* INPUTBUFFER, INT FD_OFFSET)
{
```

11916
```
//CREATE INSTANCE
ISP_READ = NEW BAYER_READ_C(HEIGHT,WIDTH, FD_OFFSET);
```

11918
```
//SET OUTPUT POINTERS
ISP_READ->OUTPUT_PTR = &SIMPLE_ISP0_INPUTV;
STAGE0_PTRS = &SIMPLE_ISP0_INPUTS;
STAGE1_PTRS = &SIMPLE_ISP1_INPUTS;
STAGE2_PTRS = &SIMPLE_ISP2_INPUTS;
STAGE3_PTRS = &SIMPLE_ISP3_INPUTS;

//SET INPUT FRAME POINTERS
ISP_READ->INPUTBUFFER = INPUTBUFFER;
```

11920
```
//INITIALIZATION
CIRC_S C_STRUCT[4] = {
  {&STAGE0_PTRS->CIRC_ADDR_CNTL,0,0,0,0,0,0,0},
  {&STAGE1_PTRS->CIRC_ADDR_CNTL,0,0,0,0,0,0,0},
  {&STAGE2_PTRS->CIRC_ADDR_CNTL,0,0,0,0,0,0,0},
  {&STAGE3_PTRS->CIRC_ADDR_CNTL,0,0,0,0,0,0,0}
};

STAGE0_INIT(STAGE0_PTRS,C_STRUCT[0],0);
STAGE1_INIT(STAGE1_PTRS,C_STRUCT[1],1);
STAGE2_INIT(STAGE2_PTRS,C_STRUCT[2],2);
STAGE3_INIT(STAGE3_PTRS,C_STRUCT[3],3);
```

11922
```
/* CREATE ITERATOR AND CALL WITH COMPOSITE_READ() POINTER */
ISP_LOOP = NEW FRAME_LOOP_C(HEIGHT,4,C_STRUCT);
VOID (*EXECUTE)(INT,INT,INT,INT,CIRC_S*)= &COMPOSITE_READ;
ITERATOR_SIMPLE_ISP_INST->RUN(EXECUTE);
```

11924
```
//DELETE OBJECTS
  DELETE ISP_LOOP; DELETE ISP_READ;
}
```

FROM FIG. 373A

FIG. 373B

```
#INCLUDE ''YC_WRITE.H''

YC_WRITE_C* ISP_WRITE;

VOID ISP_WRITE (INT HEIGHT,
                INT WIDTH,
                FRAME* OUTPUTBUFFERY,
                FRAME* OUTPUTBUFFERCB,
                FRAME* OUTPUTBUFFERCR)
{
  ISP_WRITE =
  NEW YC_WRITE(HEIGHT,WIDTH);

  //SET OUTPUT FRAME POINTERS
  ISP_WRITE->OUTPUTBUFFERY = OUTPUTBUFFERY;
  ISP_WRITE->OUTPUTBUFFERCB = OUTPUTBUFFERCB;
  ISP_WRITE->OUTPUTBUFFERCR = OUTPUTBUFFERCR;

  WHILE( !TERM ) ISP_WRITE->RUN();

//DELETE OBJECT
  DELETE ISP_WRITE;
}
```

FIG. 374

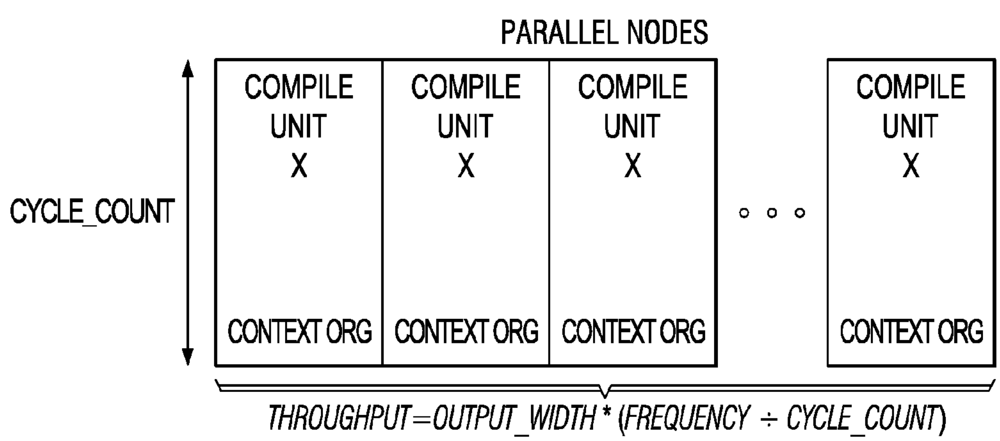

FIG. 375

INTEGRATED CIRCUIT WITH CONTROL NODE CIRCUITRY AND PROCESSING CIRCUITRY

CROSS-REFERENCE TO RELATED APPLICATIONS

This application claims priority to:

U.S. Patent Provisional Application Ser. No. 61/415,210, entitled "PROGRAMMABLE IMAGE CLUSTER (PIC)," filed on Nov. 18, 2010; and U.S. Patent Provisional Application Ser. No. 61/415,205, entitled "SYSTEM PROGRAMMING TOOL AND COMPILER," filed on Nov. 18, 2010; and Each application is hereby incorporated by reference for all purposes.

TECHNICAL FIELD

The disclosure relates generally to a processor and, more particularly, to a processing cluster.

BACKGROUND

Generally, system-on-a-chip designs (SoCs) are based on a combination of programmable processors (central processing units (CPUs), microcontrollers (MCUs), or digital signals processors (DSPs)), application-specific integrated circuit (ASIC) functions, and hardware peripherals and interfaces. Typically, processors implement software operating environments, user interfaces, user applications, and hardware-control functions (e.g., drivers). ASICs implement complex, high-level functionality such as baseband physical-layer processing, video encode/decode, etc. In theory, ASIC functionality (unlike physical-layer interfaces) can be implemented by a programmable processor; in practice, ASIC hardware is used for functionality that is generally beyond the capabilities of any actual processor implementation.

Compared to ASIC implementations, programmable processors provide a great deal of flexibility and development productivity, but with a large amount of implementation overhead. The advantages of processors, relative to ASICs are:

Re-use. An application developed once can be implemented on other processors that are at least binary compatible and often only source-level compatible.

Verification leverage. Interfaces are standard, and hardware verification can use relatively standard infrastructure for processor verification from one implementation to the next.

Overlapped development. Software development can be done in parallel with hardware development, or even afterwards.

Track evolving requirements. Since the implementation is based on software, a single hardware platform can satisfy different performance and/or feature requirements.

The disadvantages of processors, relative to ASICs are:

Inefficient algorithm mapping. Processors implement specific sets of native datatypes, such as character, short integers, and integers, and these often don't map well to the actual datatypes required by a set of applications, particularly for signal and media processing.

Area inefficiency. To provide flexibility, processor features are normally a union of the requirements of a set of applications, but not optimized for any particular one. Moreover, the requirement to execute existing applications implies that legacy features have to be carried forward to new designs regardless of their fundamental value.

Power inefficiency. This is related to area inefficiency, but there are additional causes, particularly in high-performance implementations. It is common for the hardware devoted to fundamental algorithm operations to be a small subset of the overall implementation, with the remainder devoted to pipelining, branch prediction, caches, etc. As a result, power dissipated is much larger than the power required by fundamental operations.

Energy inefficiency. To support code generation, processors normally spend approximately 30% of execution time performing fundamental operations: the remaining cycles are spent for load, store, flow control (branch) and procedure linkage. If the application executes in a conventional operating environment (RTOS or HLOS), this percentage can be significantly smaller, because of the cycles spent in the operating environment. So the power inefficiency, combined with the number of overhead cycles not directly related to the fundamental application, results in a relatively large energy dissipation compared to what is actually required by the application.

Poor performance scalability. There are two reasons for this. Deep sub-micron process technology, particularly interconnect and transistor scaling effects, lead to performance scaling that is much lower than the "historical" factor of roughly doubling performance every two years. However, even if scaling could keep this pace, the algorithm requirements have grown at a much steeper rate—for example, video processing grows quadratically with resolution.

Not surprisingly, a motivation for ASICs (other than hardware interfaces or physical layers) is to overcome the weaknesses of processor-based solutions. However, ASIC-based designs also have weaknesses that mirror the advantages of processor-based designs. The advantages of ASICs, relative to processors are:

Efficient algorithm mapping. ASIC hardware is customized to the data types, formats, and operations required by the application.

Power Efficiency. Active area can be near the minimum required, because this area is customized to what the application can require and no more.

Energy Efficiency. Not only is active area minimized, but operational hardware (non-control) can be utilized at close to 100%, so cycle count is minimized. Hardware is controlled by state machines, adding little or no cycle overhead Performance scalability. Functions can be pipelined or performed in parallel, to the level of throughput required. Communication mostly uses short, local interconnect and isn't as sensitive to interconnect scaling as is involved in controlling and clocking a large processor.

The disadvantages of ASICs, relative to processors are:

Low re-use. The large amount of customization accomplished with ASICs implies that very little of a particular design has applicability elsewhere.

No verification leverage. Verification is tied to the blocks and interfaces specific to the design, and each design has custom verification environment.

Serial Development. Algorithms and requirements are defined before the design can begin, and little change is possible after design begins

- Poor adaptability. Algorithms and requirements should remain mostly "frozen" throughout development—or very nearly so. There is little opportunity to trade off performance and area for multiple cost-performance targets.
- Area inefficiency. To provide any sort of flexibility, for example targeting multiple video codecs, hardware is replicated, since the potential for re-use is limited. This is analogous to the area overhead in processors required to provide generality.

Parallel processing, though very simple in concept, is very difficult to use effectively. It is easy to draw analogies to real-world example of parallelism, but computing does not share the same underlying characteristics, even though superficially it might appear to. There are many obstacles to executing programs in parallel, particularly on a large number of cores.

Turning to FIG. 1, an example of a conversion of a conventional serial program 102 to a functionally equivalent parallel program 104 can be seen. As shown, the serial program 102 (and the corresponding parallel program 104) are generally comprised of code sequences or subroutines 120 and 122 that each include a number of instructions. In particular for code sequence 120, a value for a variable x is defined by function 106, and this variable x is used to define a value for a variable z in function 108 of code sequence 122. When executed as serial program 102 on a single processor, the value for variable x is transmitted from definition (by function 106) to use (in function 108) in a processor register or memory (cache) location, taking no more than a few cycles.

However, when code sequences 120 and 122 are converter from serial program 102 to parallel program 104 so as to be executed on two processors, several issues arise. First, sequences 120 and 122 are controlled by two separate program counters so that if the sequences 120 and 122 are left "as is" there is generally no way to ensure that the value for variable x is valid on the attempted read in sequence 122. In fact, in the simplest case, assuming both code sequences 120 and 122 execute sequentially starting at the same time, the value for variable x is not defined in time, because there are many more instructions to the definition of variable x in sequence 120 than there are to the use of variable x in sequence 122. Second, the value for variable x cannot be transmitted through a register or local cache because, although code sequences 120 and 122 have a common view of the address for variable x, the local caches map these addresses to two, physically distinct memory locations. Third, although not shown directly in the FIG. 1, there can be a second update of the value in variable x in sequence 120, but this subsequent update of variable x by sequence 120 should not occur until the previous value has been read by sequence 122.

For at least these reasons, the serial program 102 should be extensively modified to achieve correct parallel execution. First, sequence 120 should wait until sequence 120 signals that variable x has been written, which causes code sequence 122 to incurs delay 112. Delay 112 is generally a combination the cycles that sequence 120 takes to write variable x and delay 110 (the cycles to generate and transmit the signal). This signal is usually a semaphore or similar mechanism using shared memory that incurs the delay of writing and reading shared memory along with delays incurred for exclusive access to the semaphore. The write of variable x in sequence 120 also is subject to a barrier in that sequence 122 cannot be enabled to read variable x until sequence 122 can obtain the correct value for variable x. Generally, there can be no ordering hazards between writing the value and signaling that it has been written, caused by buffering, caching, and so forth, which usually delays execution in sequence 120 some number of cycles (represented by delay 114) compared to writes of unshared data directly into a local cache.

Second, sequence 122 generally cannot read its local cache directly to obtain variable x because the write of variable x by sequence 120 would have caused an invalidation of the cache line containing code sequence 120. Sequence 122 incurs additional delay 116 to obtain the correct value from level-2 (L2) cache for sequence 120 or from shared memory. Third, sequence 122 generally imposes additional delays (due in part to delay 118) on sequence 120 before any subsequent write by sequence 120 so that all reads in sequence 122 are complete before sequence 120 changes the value of variable x. This not only can stall the progress of sequence 120 but can also delay the new value of variable x such that sequence 122 has to wait again for the new value. Because of the number of cycles that sequence 122 spends obtaining the value for variable x, sequence 120 could potentially be ahead in subsequent iterations even though it was behind in the first iteration, but synchronization between sequences 120 and 122 tends to serialize both programs so there is little, if any, overlap.

The operations used to synchronize and ensure exclusive access to shared variables normally are not safe to implement directly in application code because of the hazards that can be introduced (e.g., timing-dependent deadlock). Thus, these operations are usually implemented by system calls, which cases delays due to procedure call and return and, possibly, context switching. The net effect is that a simple operation in sequential code (i.e., serial program 102) can be transformed into a much more complex set of operations in the "parallel" code (i.e., parallel program 104), and have a much longer execution time. The result is that parallel programming is limited to applications that do not incur significant overhead for parallel execution. This implies that: 1) there is essentially no data interaction between programs (e.g., web servers); 2) the amount of data shared is a small portion of the datasets used in computing (e.g., finite-element analysis); or 3) the number of computing cycles is very large in proportion to the amount of data shared (e.g., graphics).

Even if the overhead of parallel execution is small enough to make it worthwhile, overhead can significantly limit the benefit. This is especially true for parallel execution on more than two cores. This limitation is captured in a simplified equation for the effect, known as Amdahl's Law, which compares the performance of single-core execution to that of multiple-core execution. According to Amdahl's Law, a certain percentage of single-core execution cannot feasibly be executed in parallel because the overhead is too high. Namely, the overhead incurred is the sum of the percentage of time spent without parallel execution and the percentage of time spent for synchronization and communication.

Turning to FIG. 2, a graph can be seen that depicts speedup in execution rate versus parallel overhead for a multi-core systems (ranging from 2 to 16 cores), where speedup is the single-processor execution time divided by the parallel-processor execution time. As can be seen, the parallel overhead has to be close to zero to obtain a significant benefit from large number of cores. But, since the overhead tends to be very high if there is any interaction between parallel programs, it is normally very difficult to efficiently use more than one or two processors for anything but completely decoupled programs.

Further limiting the applicability of parallel processing is the cost of multiple cores. In FIG. 3, the die areas of processors 302, 306, and 310 are compared. Processor 310 has 16 high-performance general-purpose cores 312, processor 306 has 16 moderate-performance general-purpose cores 308, and processor 302 has 16 high-performance custom cores 304. As can be seen, the high-performance general-purpose processor 310 uses the largest amount of area, and the application-specific processor 302 uses the least amount of area.

Turning to FIG. 4, the throughput of processors 302, 306, and 310 can be seen. The block for processor 302 illustrates die area assuming that throughput (results 402) is determined only by the basic operation required by an application—assuming that only the functional units determine throughput, thus maximizing the operations per cycle per $mm^2$ (comparable to what could be accomplished with a hard-wired ASIC). The block for processor 306 illustrates the effect of including loads, stores, branches, and procedure calls into the mix of operations, where it can be assumed that these operations (in sum) to represent roughly two-third of the cycles taken, reducing throughput by a factor of 3. To achieve the same throughput as that determined by the basic functions, the number of cores should be increased by a factor of 3 to compensate. The block for processor 310 illustrates the effect of adding system calls, synchronization, context switches, and so forth, which reduces throughput by another factor of 3, requiring a factor of 3 increase in the number of cores to compensate.

There is another dimension to the difficulty of parallel computing; namely, it is the question of how the potential parallelism in an application is expressed by a programmer. Programming languages are inherently serial, text-based. Transforming a serial language into a large number of parallel processes is a well-studied problem that has yielded very little in actual results.

Turning to FIG. 5, an example of a conversion of serial source code 502 to parallel implementation 504 with conventional symmetric multiprocessing (SMP) using OPENMP® (which is a register trademark of OpenMP Architecture Review Board Corp., 1906 Fox Drive Champaign, Ill. 61820) can be seen. OPENMP® programming involves using a set of pre-defined "pragmas" or compiler directives that allow the programmer to aid the compiler in locating opportunities for parallel execution. These "pragmas" are ignored by compilers that do not implement OPENMP®, so the source code can be compiled to execute serially, with equivalent results to the parallel implementation (though the parallel implementation can introduce errors that do not appear in the serial implementation).

As shown, this example illustrates the use of several directives, which are embedded in the text following the headers ("#pragma omp"). Specifically, these directives include loops 506 and 508 and function 510, and each of loops 506 and 508 respectively employs functions 512 and 514. This source code 502 is shown as a parallel implementation 504 and is executed on four threads over four processors. Since these threads are created by serial operating-system code 502, the threads are not generally created at exactly the same time, and this lack of overlap increases the overall execution time. Also, the input and result vectors are shared. Reading the input vectors generally can require synchronization periods 516-1, 516-3, 516-5, and 516-7 to ensure there are no writers updating the data (a relatively short operation). Writing the results in write periods 518, 520, 522, 524, 526, 528, 530, and 532 can require synchronization periods 516-2, 516-4, 516-6, and 516-8 because one thread can be updating the result vectors at any given time (even though in this case the vector elements being updated are independent, serializing writes is a general operation that applies to shared variables). After another synchronization and communication period 516-9, 516-10, 516-11, and 516-12, the threads obtain multiple copies of the result vectors and compute function 510.

As shown, there can be significant overhead to parallel execution and a lack of parallel overlap, which is why parallel execution is made conditional on the vector length. It might be uncommon for the compiler to chose to implement the code in parallel, as a function of the system and the average vector length. However, when the code is implemented in parallel, there are a couple of subtle issues related to the way the code is written. To improve efficiency, the programmer should recognize that the expression for function 510 can be executed by multiple threads and obtain the same value and should explicitly declare function 510 as a private variable even though the expression that assigns function 510 contains only shared variables. Declaring function 510 as shared would result in four threads serializing to perform the same, lengthy computation to update the shared variable function 510 with the same value. This serialization time is on the order of four times the amount of time taken to complete the earlier, parallel vector adds, making it impossible to benefit from parallel execution and making vector length the wrong criteria for implementing the code in parallel since this serialization time is directly proportional to vector length. Furthermore, whether or not function 510 can be private is a function of the expression that assigns the value. For example, assume that function 510 is later changed to include a shared variable "offset" as follows:

(1) scale=sum(a,0,n)+sum(z,0,n)+offset++;

In this case, function 510 should be declared as shared, but it is insufficient. This change implies that the code should not be allowed to execute in parallel because of serialization overhead. Code development and maintenance not only includes the target functionality, but also how changes in the functionality affect and interact with the surrounding parallelism constructs.

There is another issue with the code 502 in this example, namely, an error introduced for the purpose of illustration. The loop termination variable n is declared as private, which is correct because variable n is effectively a constant in each thread. However, private variables are not initialized by default, so variable n should be declared as shared so that the compiler initializes the value for all threads. This example works well when the compiler chooses a serial implementation but fails for a parallel one. Since this code 502 is conditionally parallel, the error is not easy to test for.

This example is a very simple error because it will likely usually fail, assuming that the code can be forced to execute in parallel (depending on how uninitialized variables are handled). However, there are an almost infinite number of synchronization and communication errors that can be introduced with OpenMP directives (this example is a communication error)—and many of these can result in intermittent failures depending on the relative timing and performance of the parallel code, as well as the execution order chosen by the scheduler.

Thus, there is a need for an improved processing cluster and associated tool chain.

SUMMARY

An embodiment of the present disclosure, accordingly, provides a method. The method comprises receiving source code, wherein the source code includes an algorithm module that encapsulates an algorithm kernel within a class declaration; traversing the source code with a system programming tool to generate hosted application code from the source code for a hosted environment; allocating compute and memory resources of a processor based at least in part on the source code with the system programming tool, wherein the processor includes a plurality of processing nodes and a processing core; generating node application code for a processing environment based at least in part on the allocated compute and memory resources of the processor with the system programming tool; and creating a data structure in the processor based at least in part on the allocated compute and memory resources with the system programming tool.

An embodiment of the present disclosure, accordingly, provides an apparatus. The apparatus comprises address leads; data leads; a host processor coupled to the address leads and the data leads; memory circuits coupled to the address leads and the data leads; and processing cluster circuitry coupled to the address leads and the data leads, the processing cluster circuitry including: control node circuitry having address inputs coupled to the address leads, data inputs coupled to the data leads, and serial messaging leads; and parallel processing circuitry coupled to the serial messaging leads.

An embodiment of the present disclosure, accordingly, provides an apparatus. The apparatus comprises address leads; data leads; a host processor coupled to the address leads and the data leads; memory circuits coupled to the address leads and the data leads; and processing cluster circuitry coupled to the address leads and the data leads, the processing cluster circuitry including: global load store circuitry having external data inputs and outputs coupled to the data leads, and node data leads; and parallel processing circuitry coupled to the node data leads.

An embodiment of the present disclosure, accordingly, provides an apparatus. The apparatus comprises address leads; data leads; a host processor coupled to the address leads and the data leads; memory circuits coupled to the address leads and the data leads; and processing cluster circuitry coupled to the address leads and the data leads, the processing cluster circuitry including: shared function memory circuitry data inputs and outputs coupled with the data leads; and parallel processing circuitry coupled to the data leads.

An embodiment of the present disclosure, accordingly, provides an apparatus. The apparatus comprises address leads; data leads; a host processor coupled to the address leads and the data leads; memory circuits coupled to the address leads and the data leads; and processing cluster circuitry coupled to the address leads and the data leads, the processing cluster circuitry including node circuitry having parallel processing circuitry coupled to the data leads.

An embodiment of the present disclosure, accordingly, provides an apparatus. The apparatus comprises address leads; data leads; a host processor coupled to the address leads and the data leads; memory circuits coupled to the address leads and the data leads; and processing cluster circuitry coupled to the address leads and the data leads, the processing cluster circuitry including first circuitry, second circuitry, and third circuitry coupled to the data leads, serial messaging leads connected between the first circuitry, the second circuitry, and the third circuitry, and the first, second, and third circuitry each including messaging circuitry for sending and receiving messages.

An embodiment of the present disclosure, accordingly, provides an apparatus. The apparatus comprises address leads; data leads; a host processor coupled to the address leads and the data leads; memory circuits coupled to the address leads and the data leads; and processing cluster circuitry coupled to the address leads and the data leads, the processing cluster circuitry including reduced instruction set computing (RISC) processor circuitry for executing program instructions in a first context and a second context and the RISC processor circuitry executing an instruction to shift from the first context to the second context in one cycle.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and the specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

BRIEF DESCRIPTION OF THE VIEWS OF THE DRAWINGS

For a more complete understanding of the present disclosure, and the advantages thereof, reference is now made to the following descriptions taken in conjunction with the accompanying drawings, in which:

FIG. 24 is a more detailed example of the source code for the algorithm kernel of FIG. 18;

FIG. 25 is a diagram of inputs to algorithm modules;

FIG. 26 is a diagram of an input/output (IO) data type module;

FIG. 27 is a IO data type module having multiple output types;

FIG. 28 is an example of an input declaration;

FIG. 29 is an example of a constants declaration or file;

FIG. 30 is an example of a function-prototype header file for a kernel "simple_ISP3";

FIG. 43 is a diagram of an example format of a SIMD data memory descriptors;

FIG. 46 is an example of a format for a destination descriptor;

FIG. 51 is a diagram depicting an example format for a left input context buffer;

FIGS. 67 and 69 are examples of tables of information stored in a context-state RAM; FIG. 68 is a diagram depicting dataflow state;

FIG. 121 is a diagram of a pipeline for a node processor or RISC processor;

FIG. 124 is an example of a context descriptor format;

FIG. 125 is an example of a destination list format;

FIG. 127 is an example of GLS processor Read Thread and Pseudo-Assembly;

FIG. 142 is an example format for dataflow-state entries;

FIGS. 149 and 150 are an example of the format for a schedule read thread message and response to the schedule read thread message;

FIGS. 151 and 152 are an example of the format for a schedule write thread message and response to the schedule read thread message;

FIGS. 153 and 154 are an example of the format for a schedule configuration read message and response to the schedule configuration read message;

FIGS. 155 and 156 are an example of the format for a source notification message and response to the source notification message;

FIGS. 157 and 158 are an example of the format for a source permission message and response to the source permission message;

FIG. 159 is an example of the format for the output termination message;

FIG. 166 is an example of the format for a node state read message;

FIG. 167 is an example of the format for a node state write message;

FIG. 168 is an example of the format for an enable task/branch trace message;

FIG. 169 is an example of the format for a set breakpoint/tracepoint message 6085;

FIG. 170 is an example of the format for a clear breakpoint/tracepoint message;

FIG. 171 is an example of the format for a read data memory message;

FIG. 172 is an example of the format for an update data memory message;

FIG. 173 is an example of the format for messages related to egress message processing;

FIG. 174 is an example of the format for node instruction memory initialization message;

FIGS. 175 to 180 are an examples of the formats for thread termination, HALT_ACK message, node state read response, task/branch trace vector, break/tracepoint match, and data memory read response messages;

FIG. 181 is a diagram depicting an example operation of the GLS unit;

FIG. 182 is a diagram of an example of the format and type operation that should to be performed by the block and stored in the parameter RAM;

FIGS. 183 to 187 are diagrams depicting an example operation of the GLS unit;

FIG. 188 is an example the indexing performed for filling the pending permission table;

FIG. 189 is a state diagram for an example operation of the GLS unit;

FIG. 190 is an example of information writing to a parameter RAM;

FIG. 191 is an example of the write thread execution timeline;

FIG. 192 is an example of an address determination;

FIG. 193 is an example of the format written into the parameter RAM by GLS processor for write thread;

Figure 195:
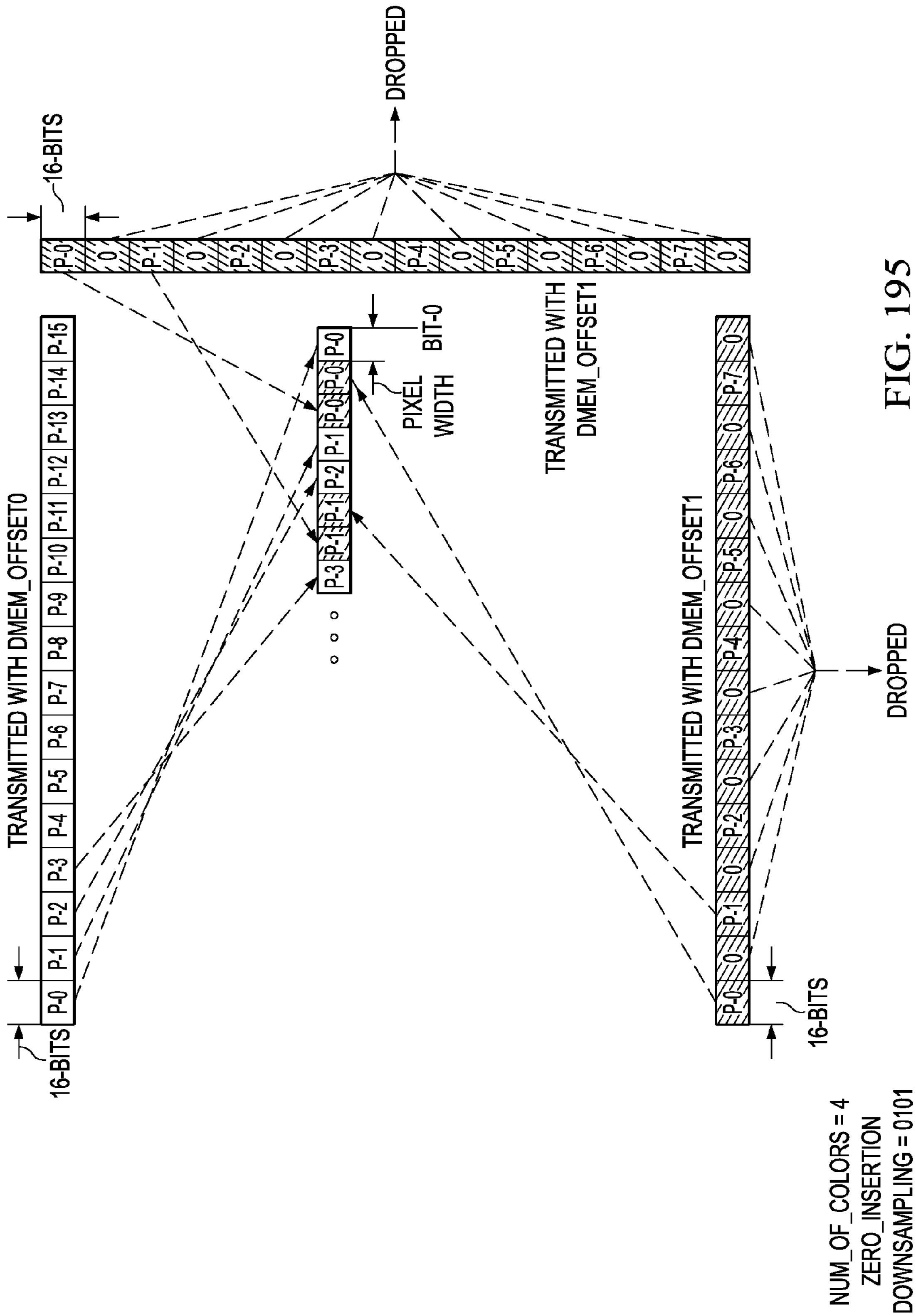
Figure 196:
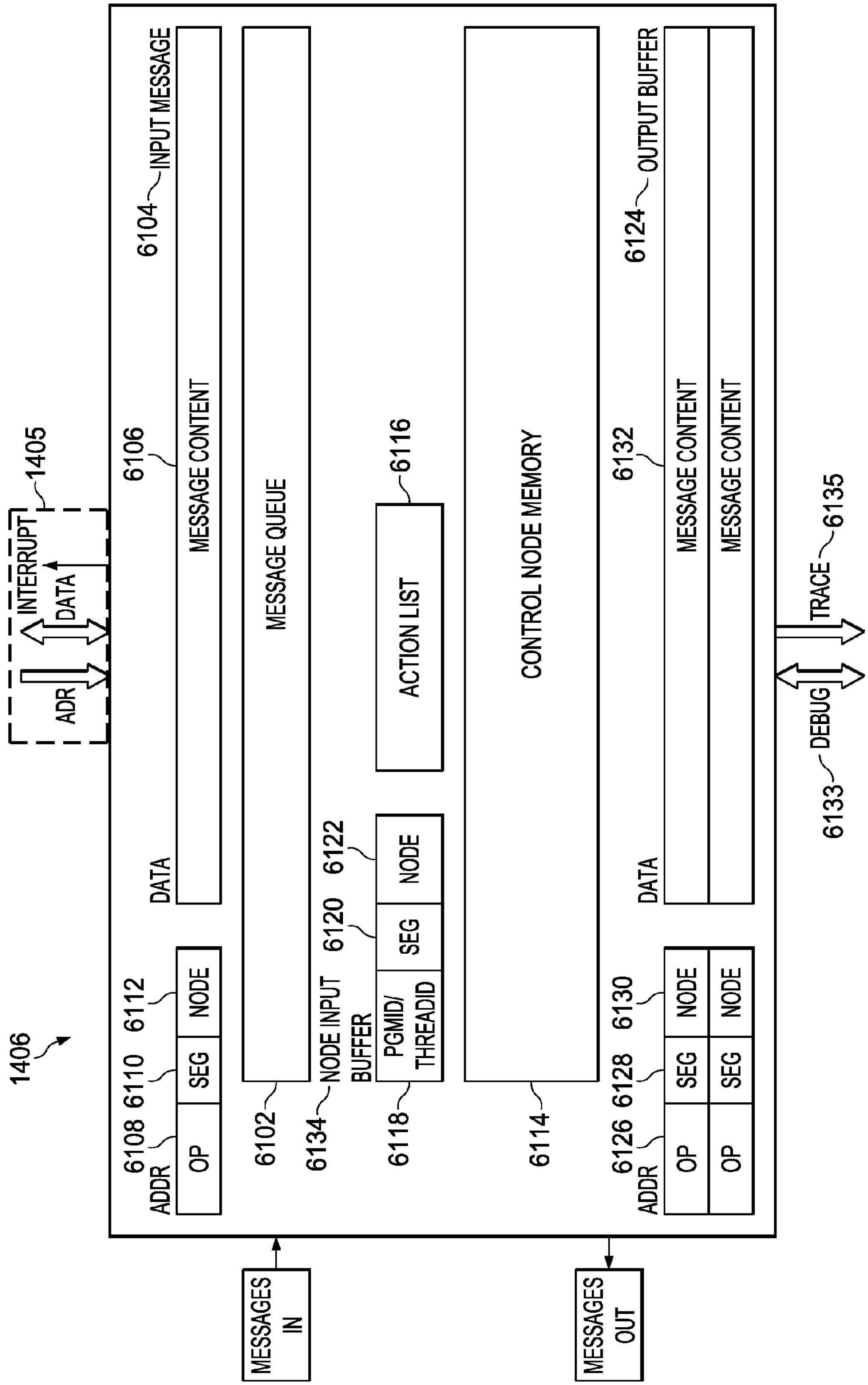
Figure 197:
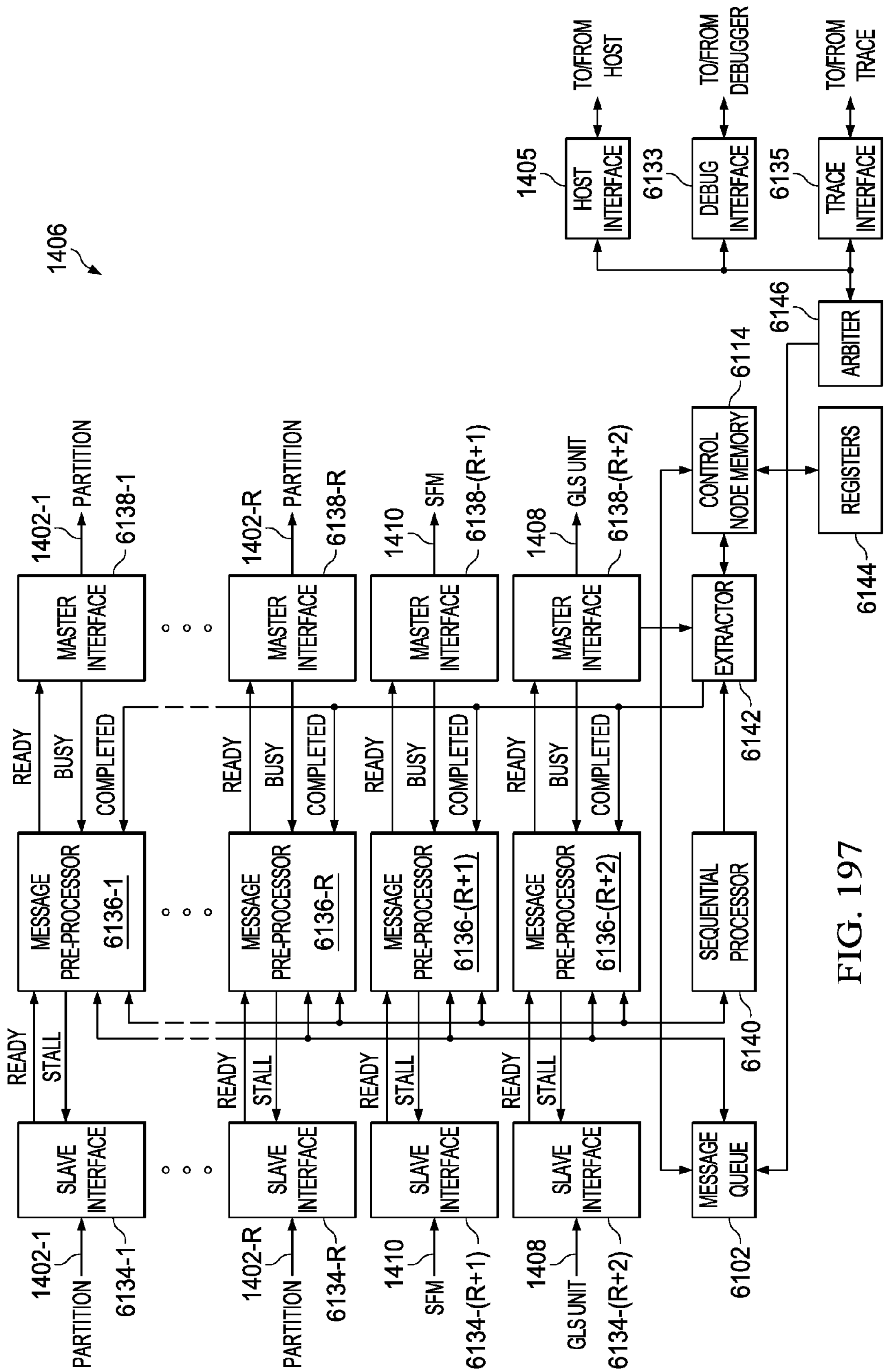
Figure 198:
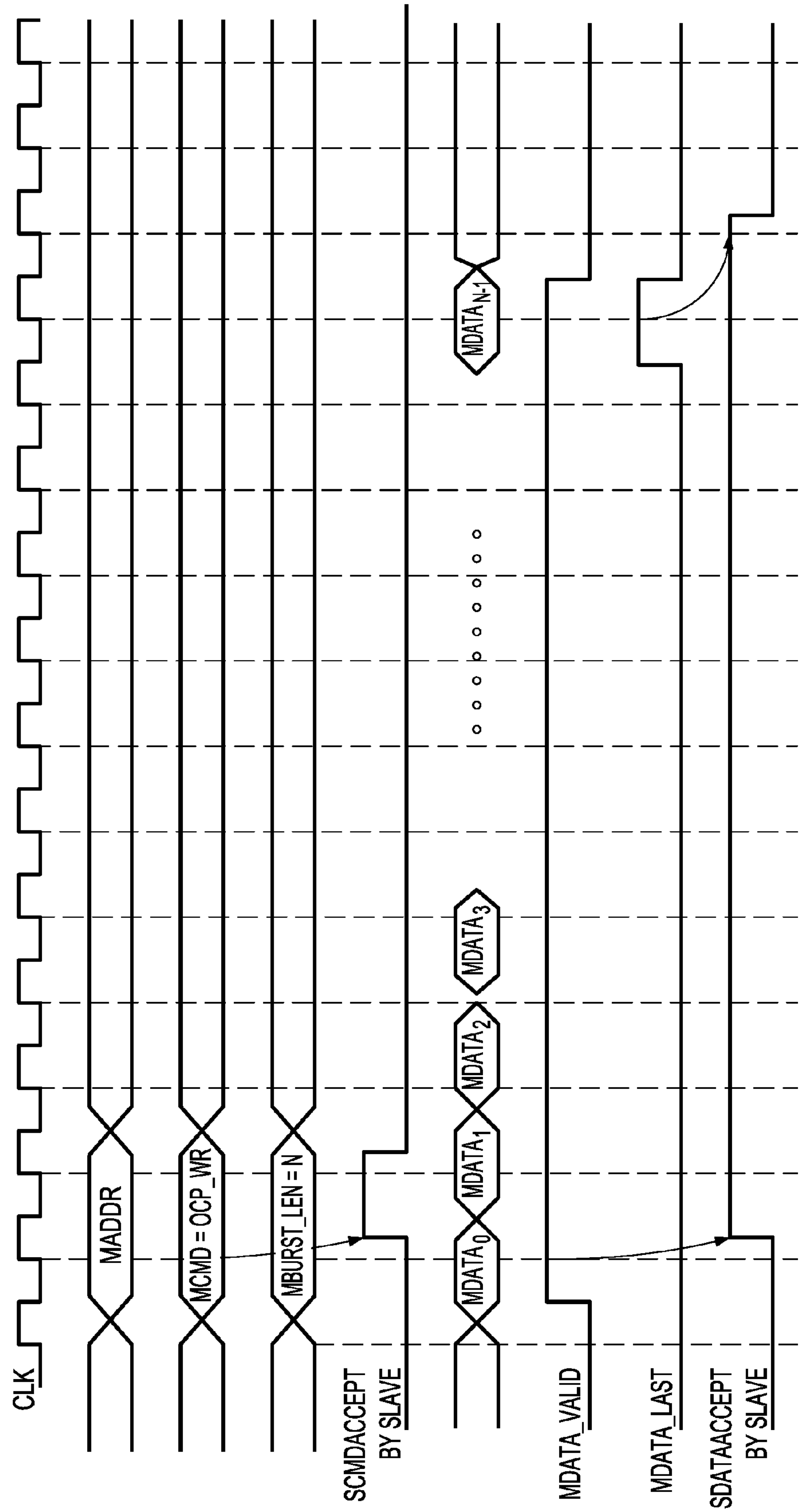
Figure 199:
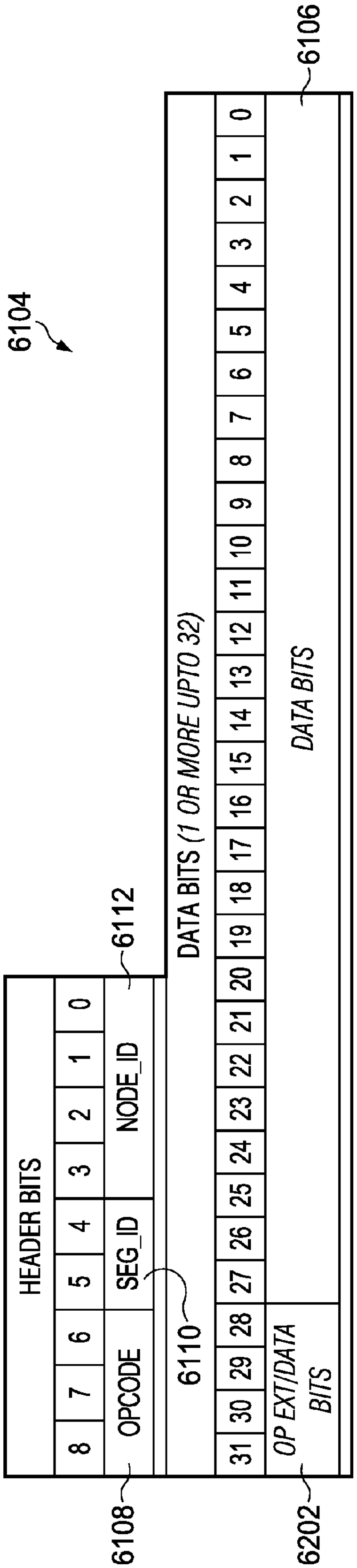
Figure 202:
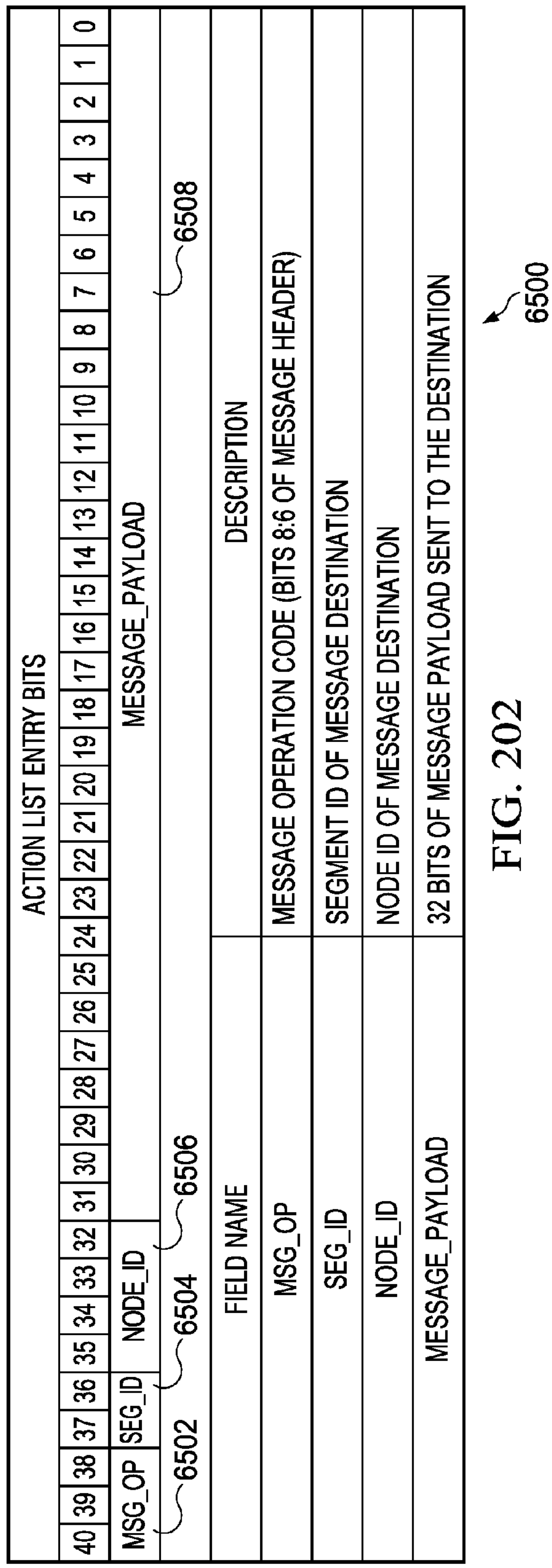
Figure 201:
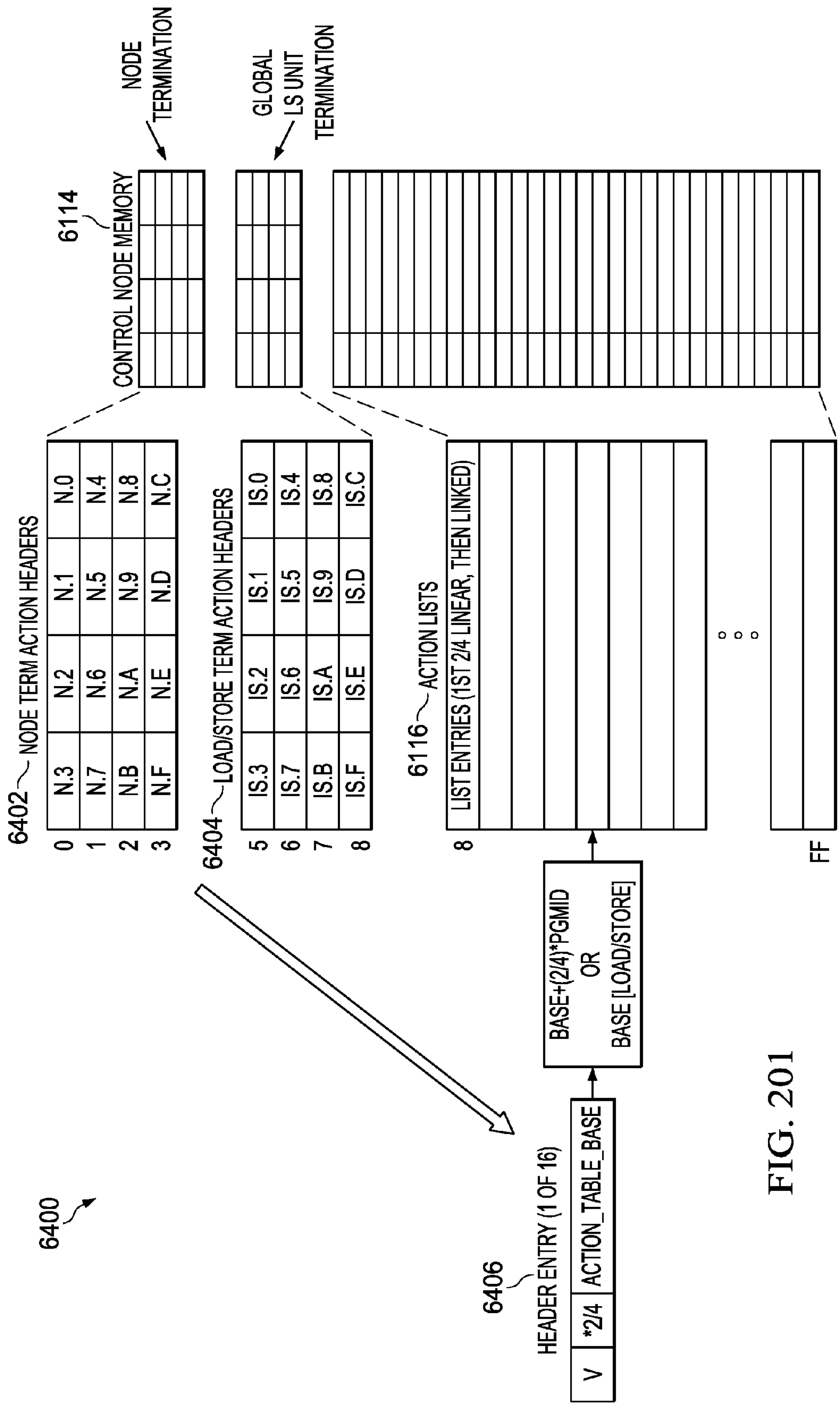
Figures 203, 204:
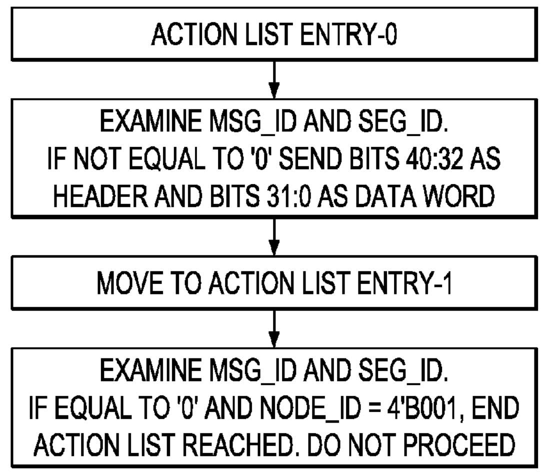
Figure 205:
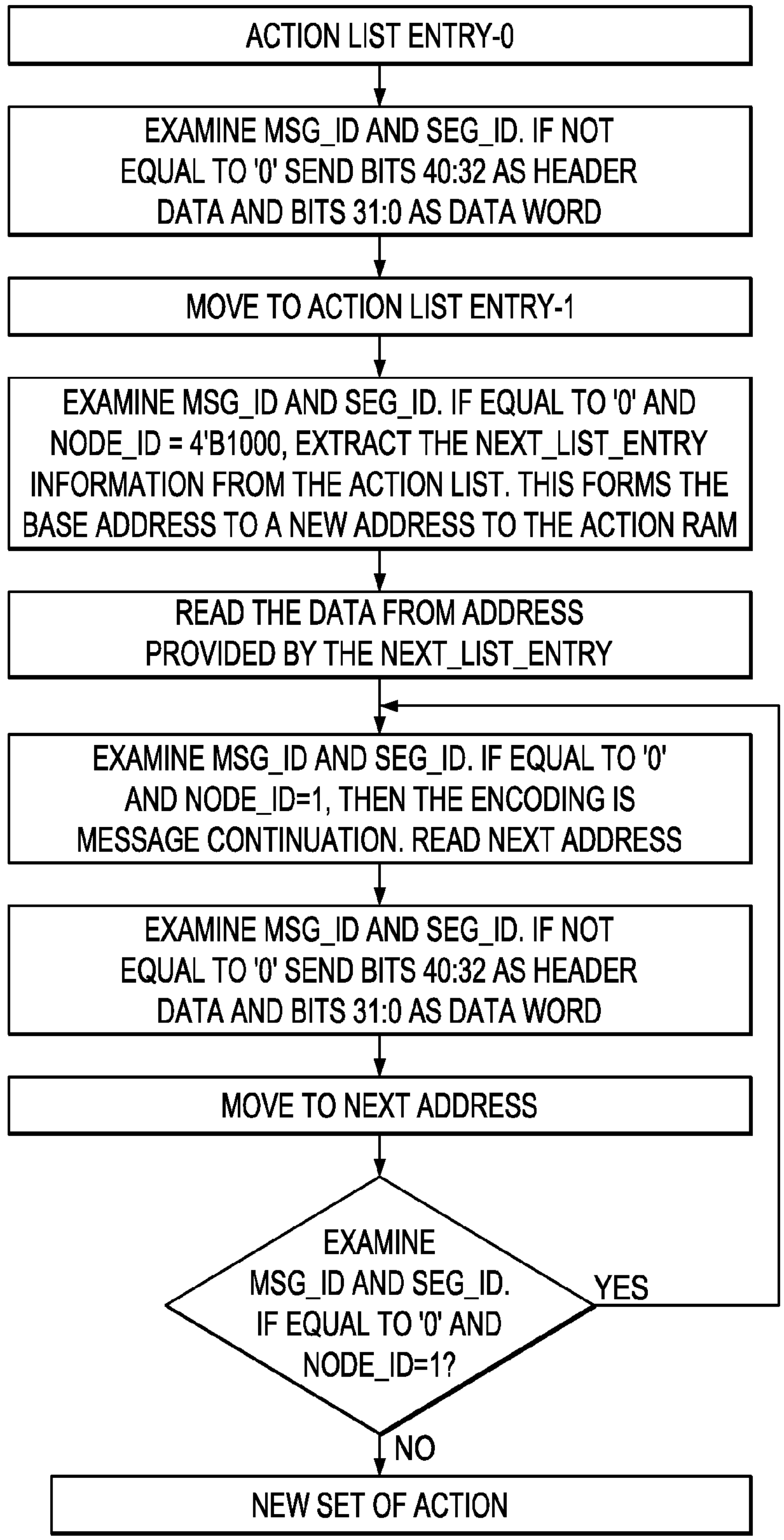
Figure 206:
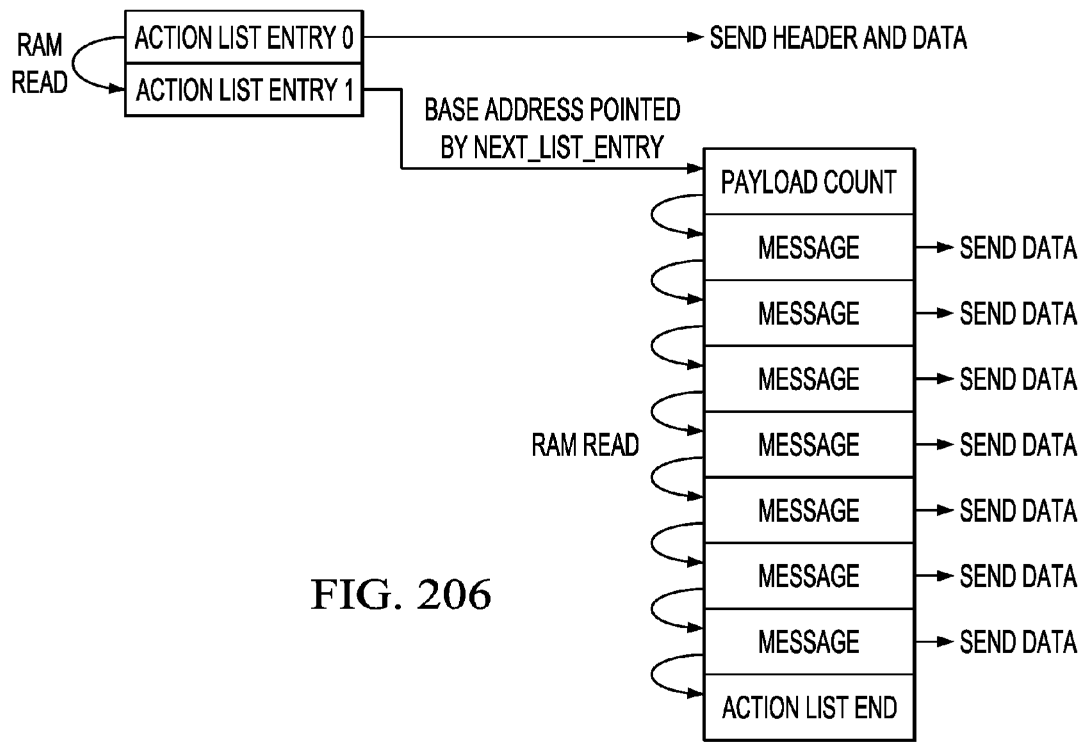
Figure 208:
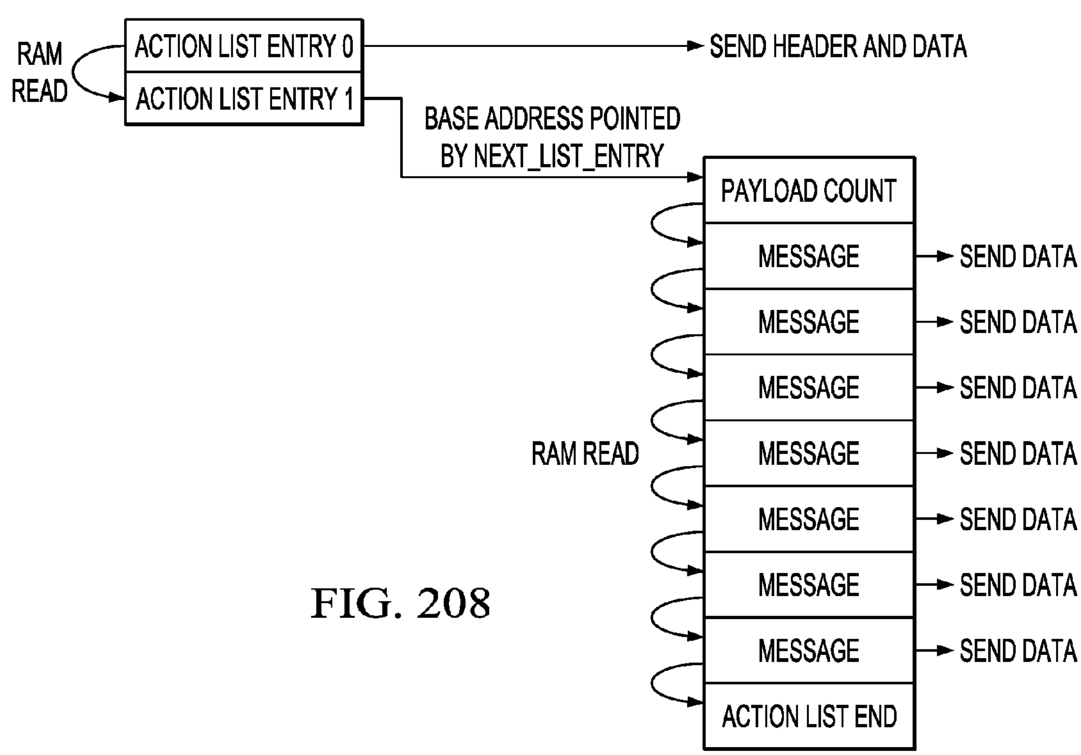
Figure 220:
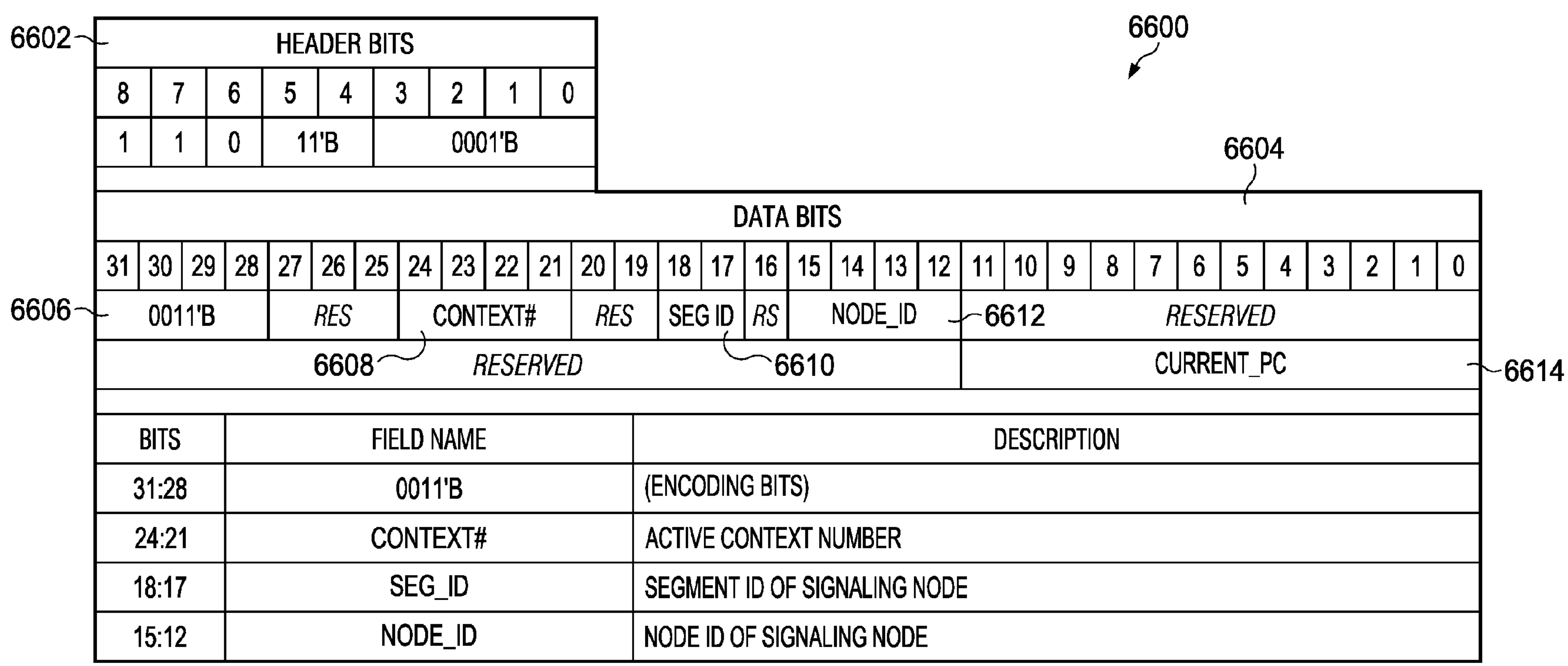
Figure 222:
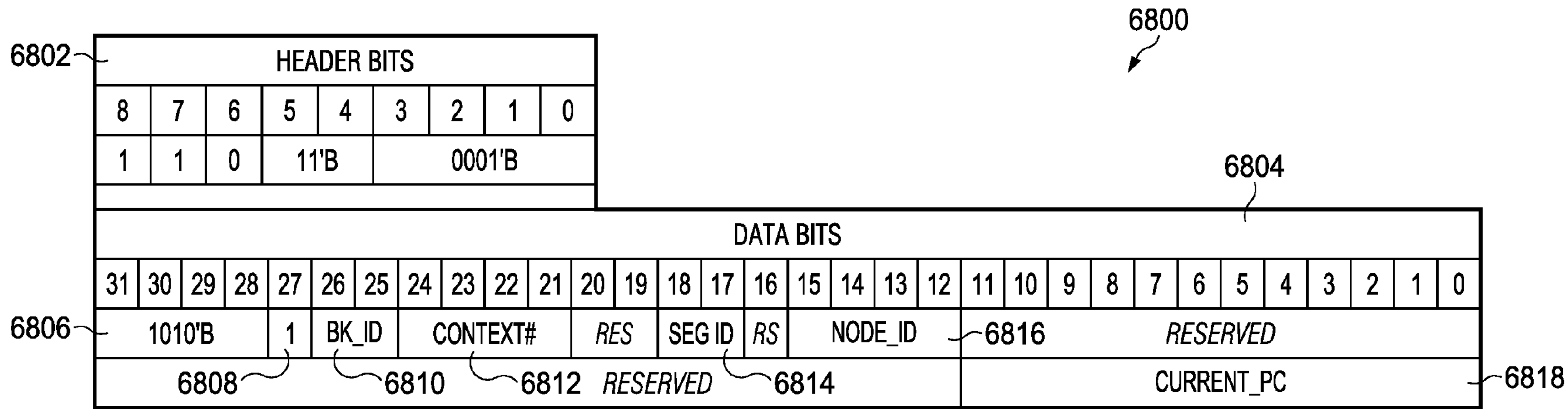

FIGS. 194 and 195 are examples of operations performed by the GLS unit;

FIGS. 196 and 197 are a diagram of an example of a control node;

FIG. 198 is a timing diagram of an example of the protocol between the slave and master;

FIG. 199 is a diagram of a message;

FIG. 200 is an example of the format of a termination message;

FIG. 201 is a an example of termination message handling flow;

FIG. 202 is a an example of the format of a message entry in an action list;

FIGS. 203 and 204 are diagrams for an example process for how the control node handles the Action List encoding;

FIGS. 205 to 219 are flow diagrams depicting examples of encodings;

FIG. 220 is an example of a HALT_ACK Message;

FIG. 221 is an example of a Breakpoint Message;

FIG. 222 is an example of a Tracepoint Message

Figure 223:
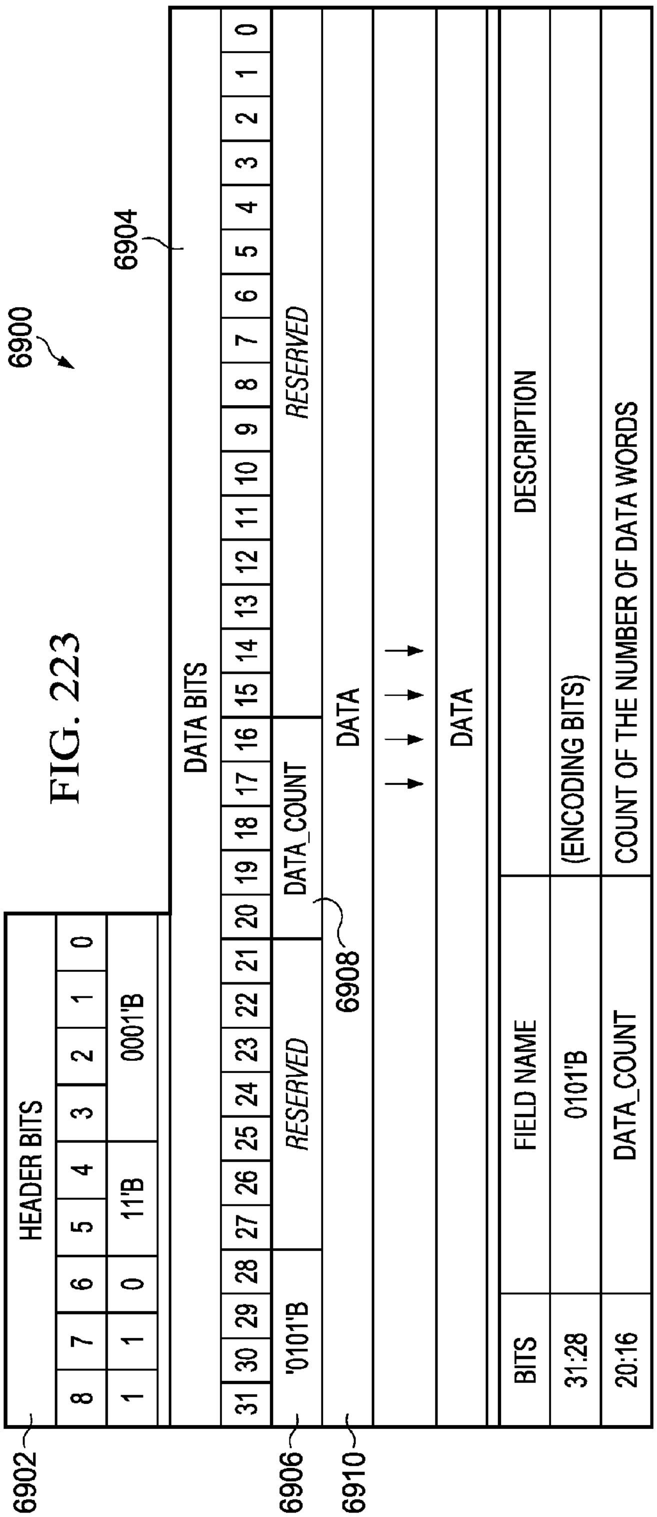
Figure 224:
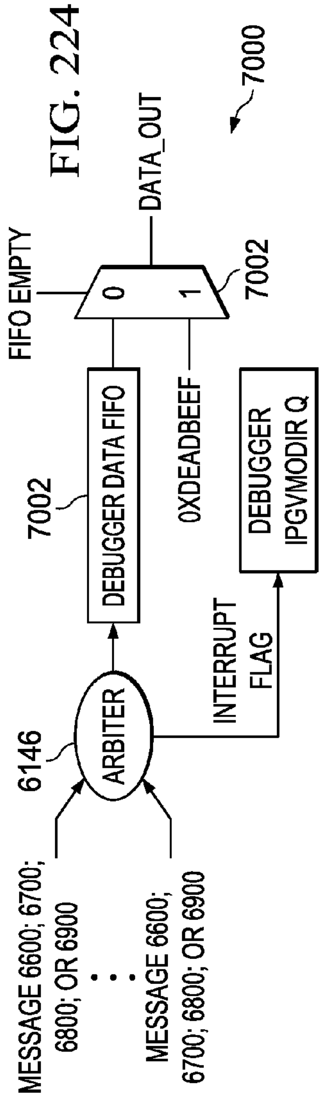
Figure 225:
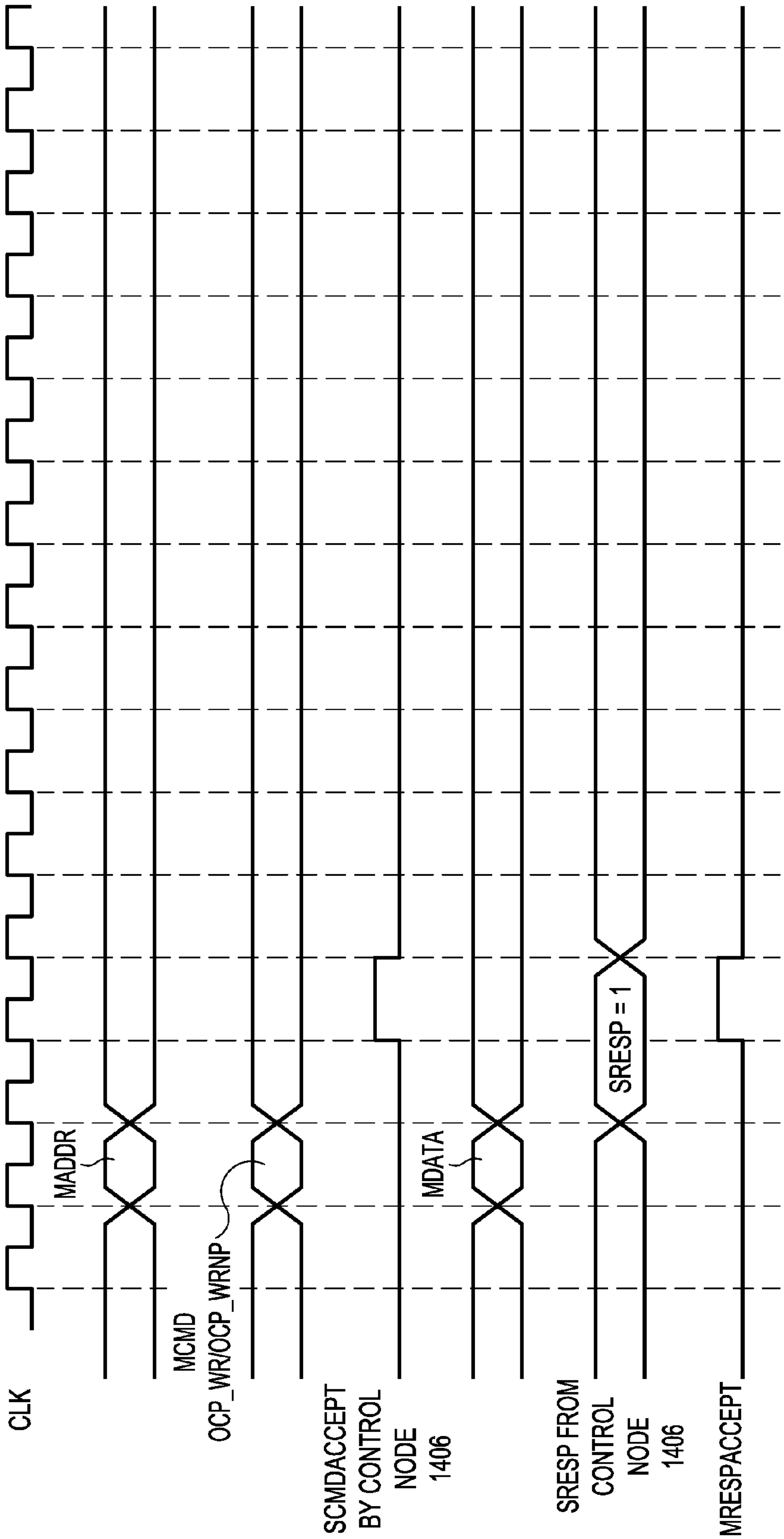
Figure 226:
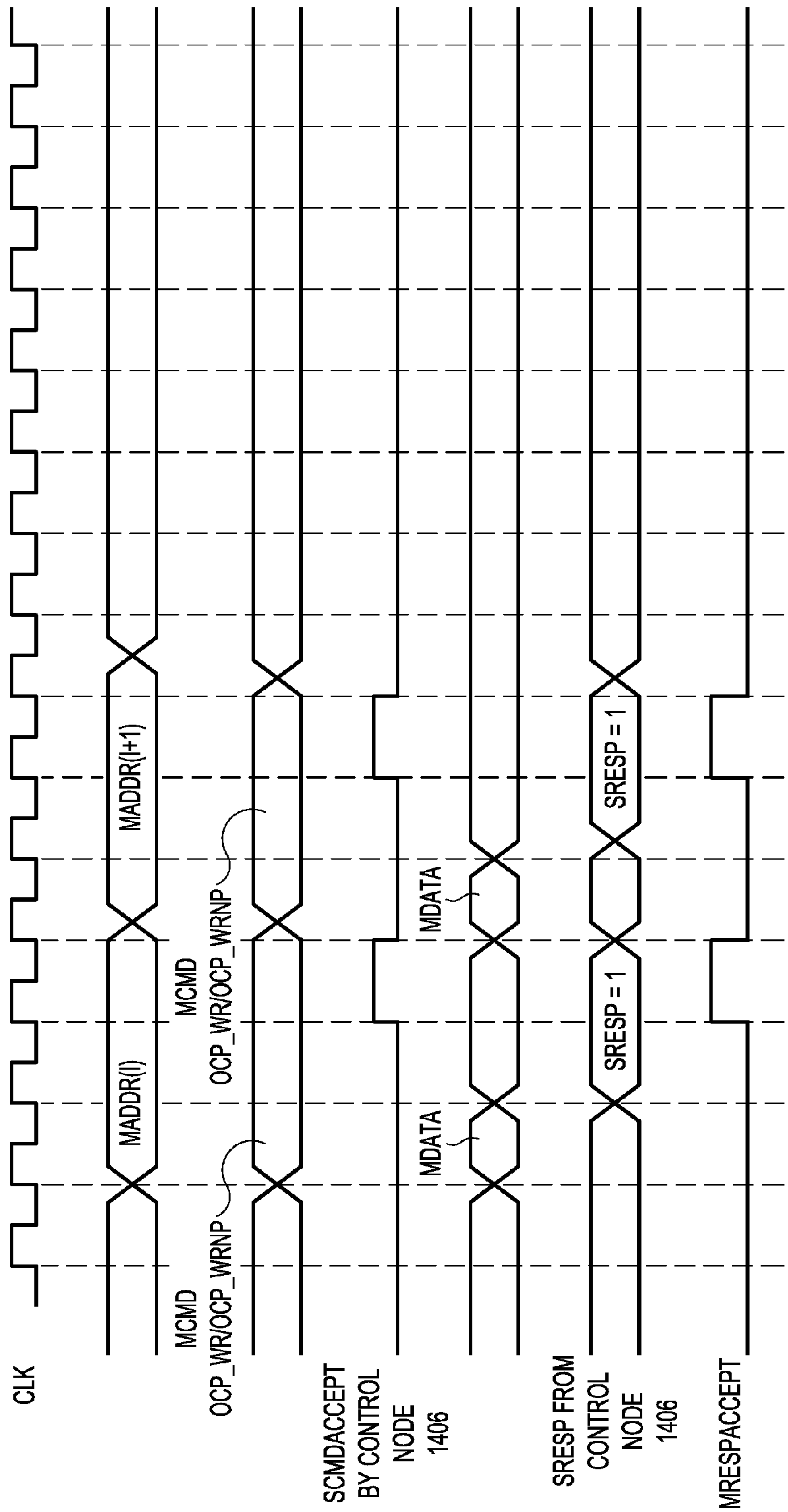
Figure 227:
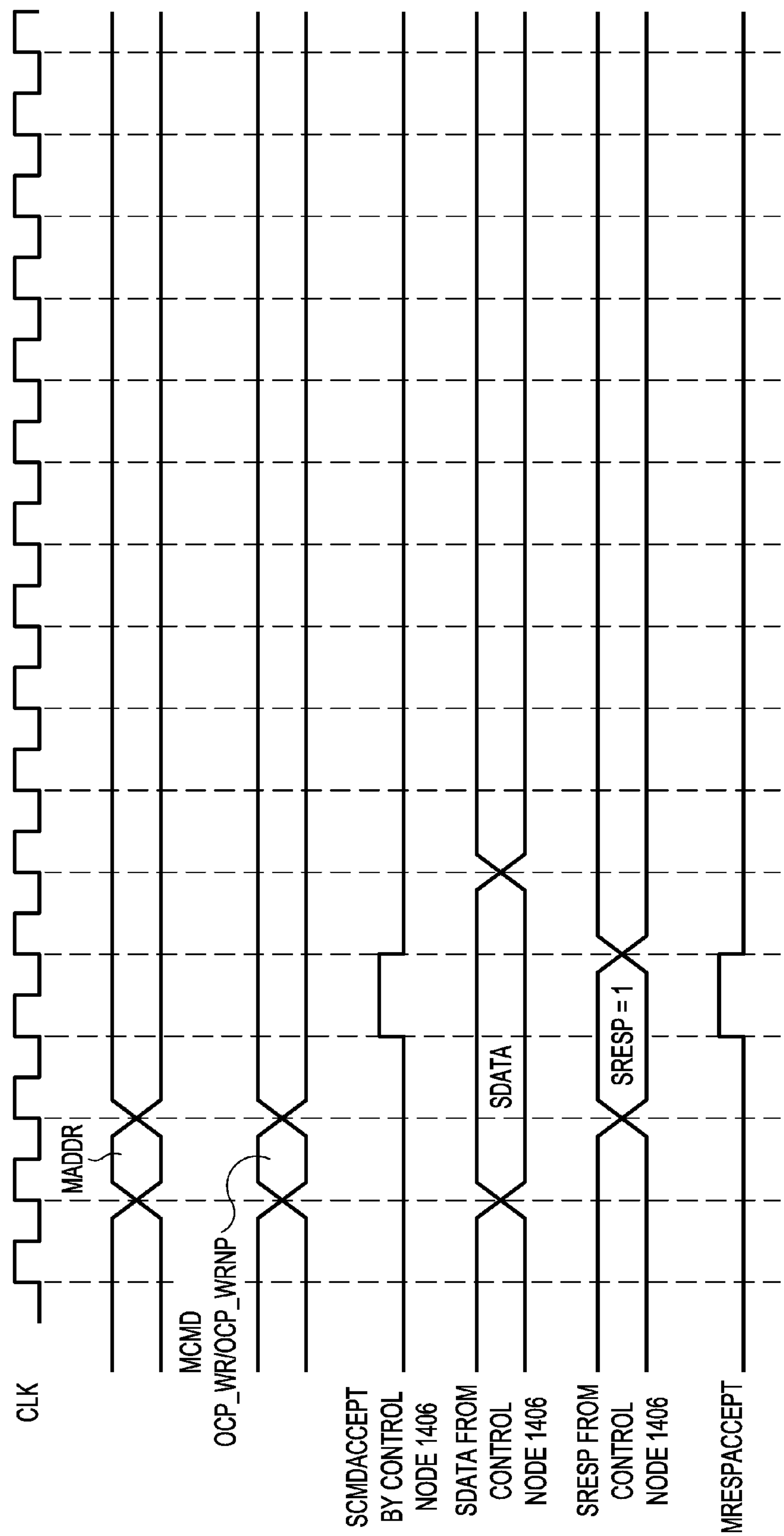
Figure 228:
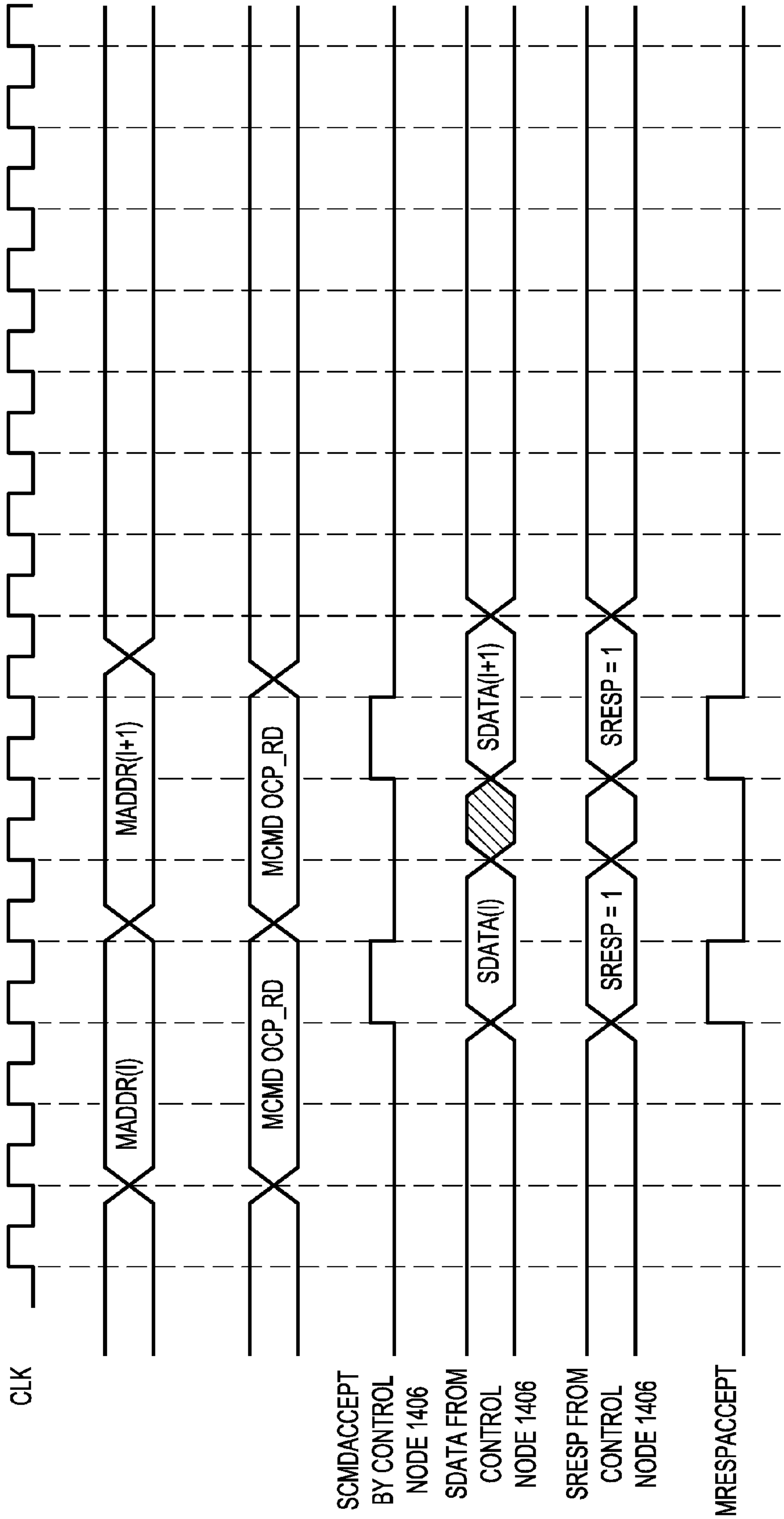
Figure 229:
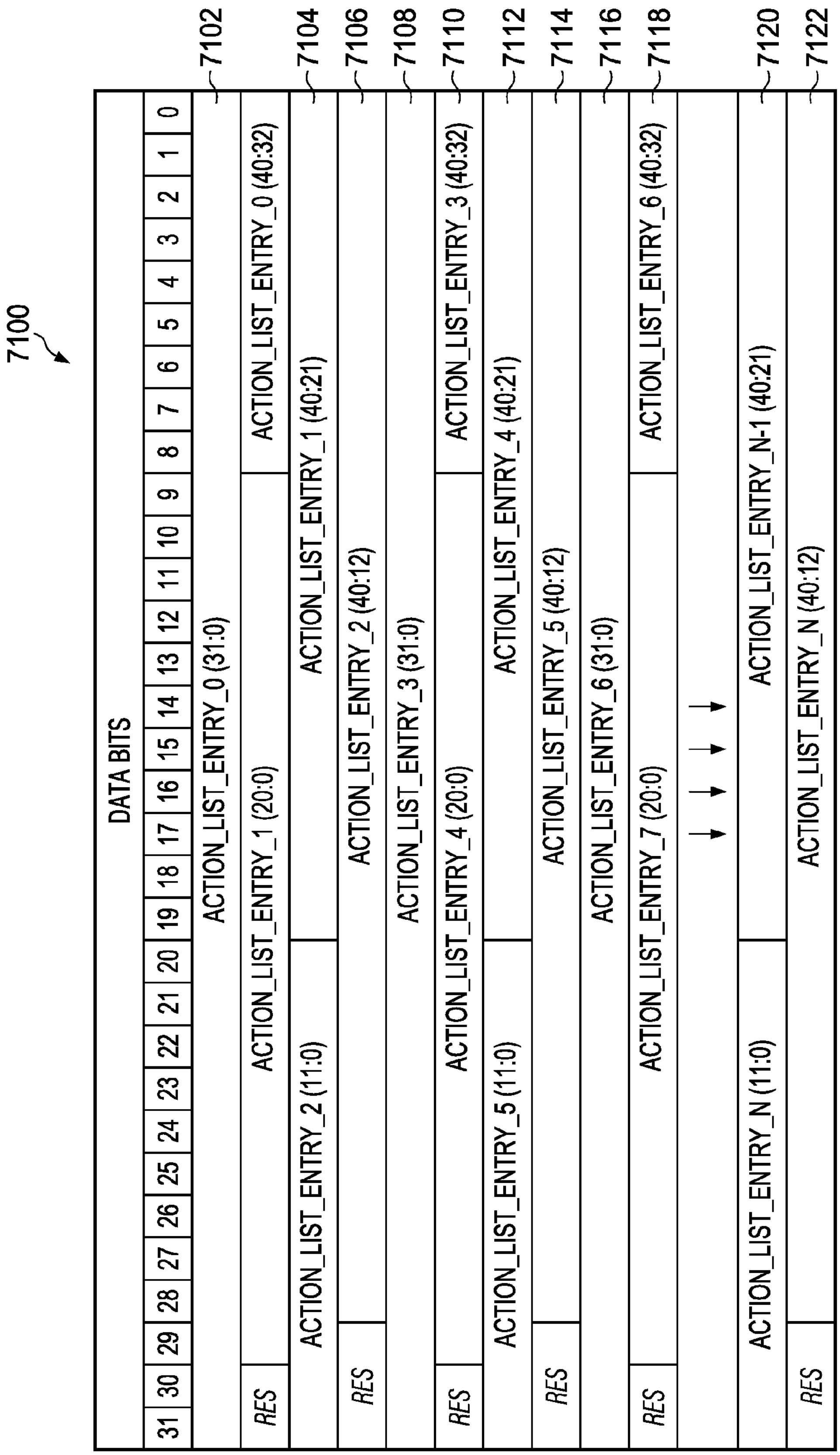
Figure 232:
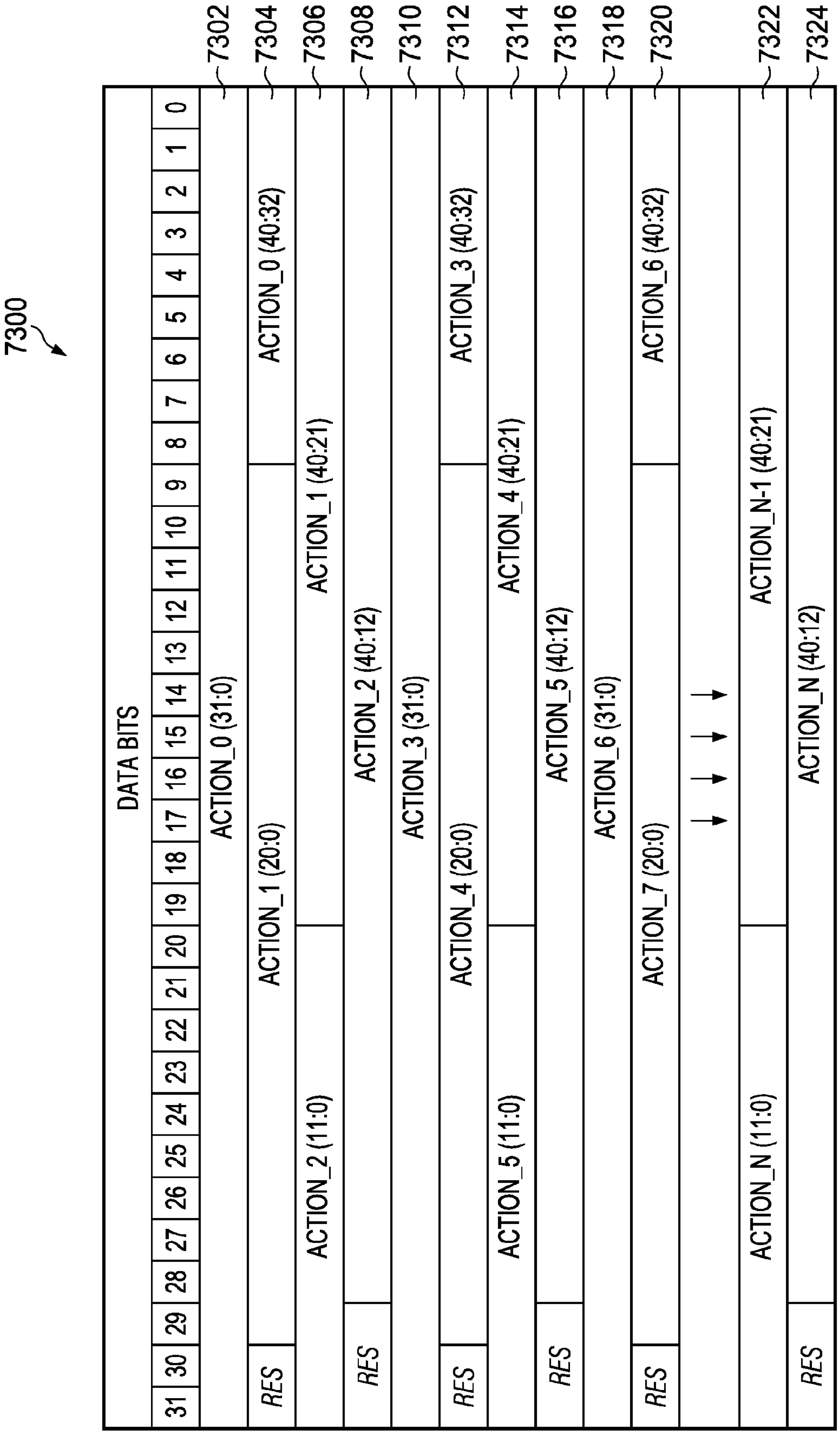
Figures 233, 235:
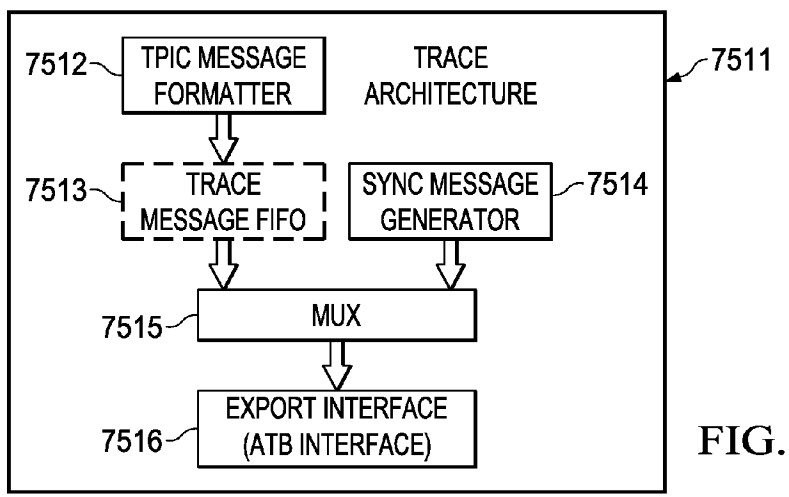
Figure 239:
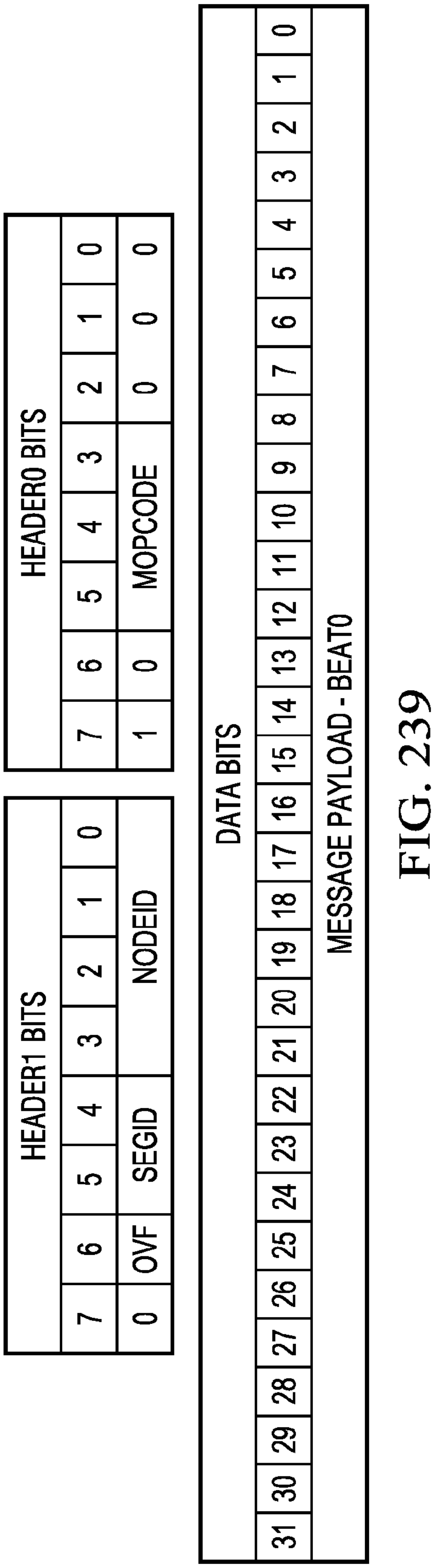
Figure 240:
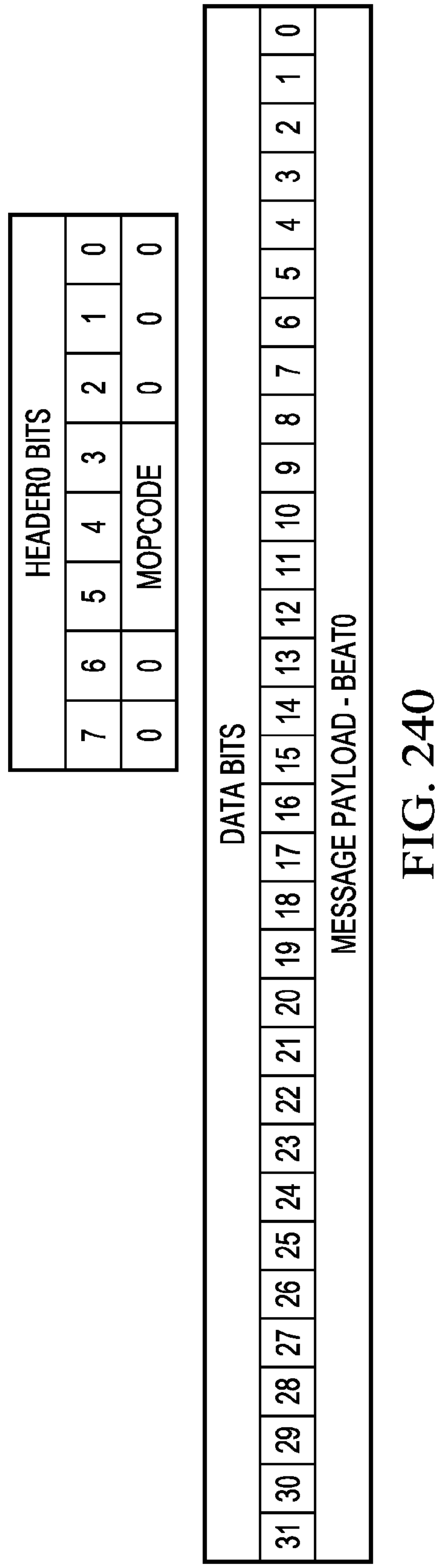
Figure 245:
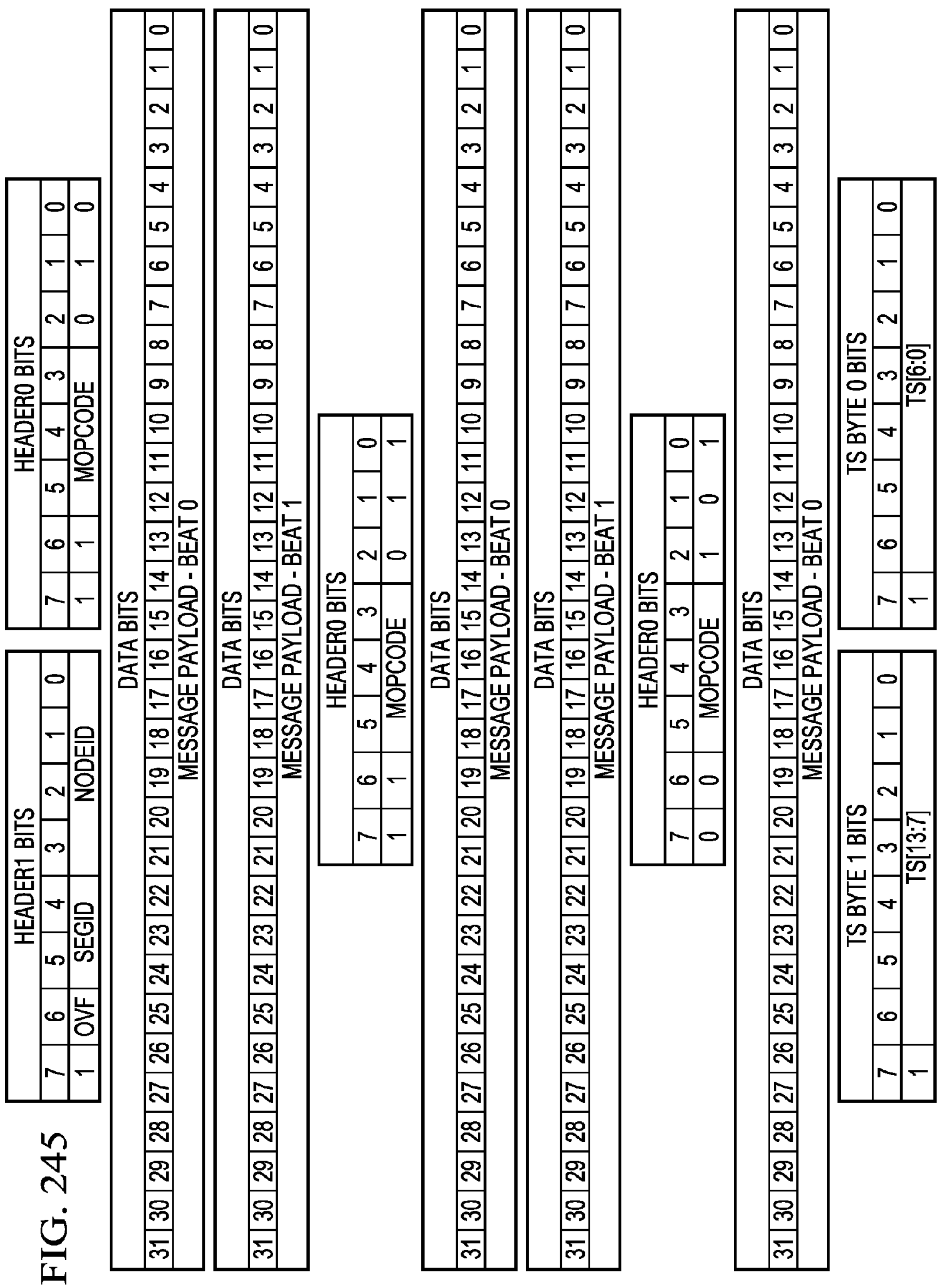
Figure 246:
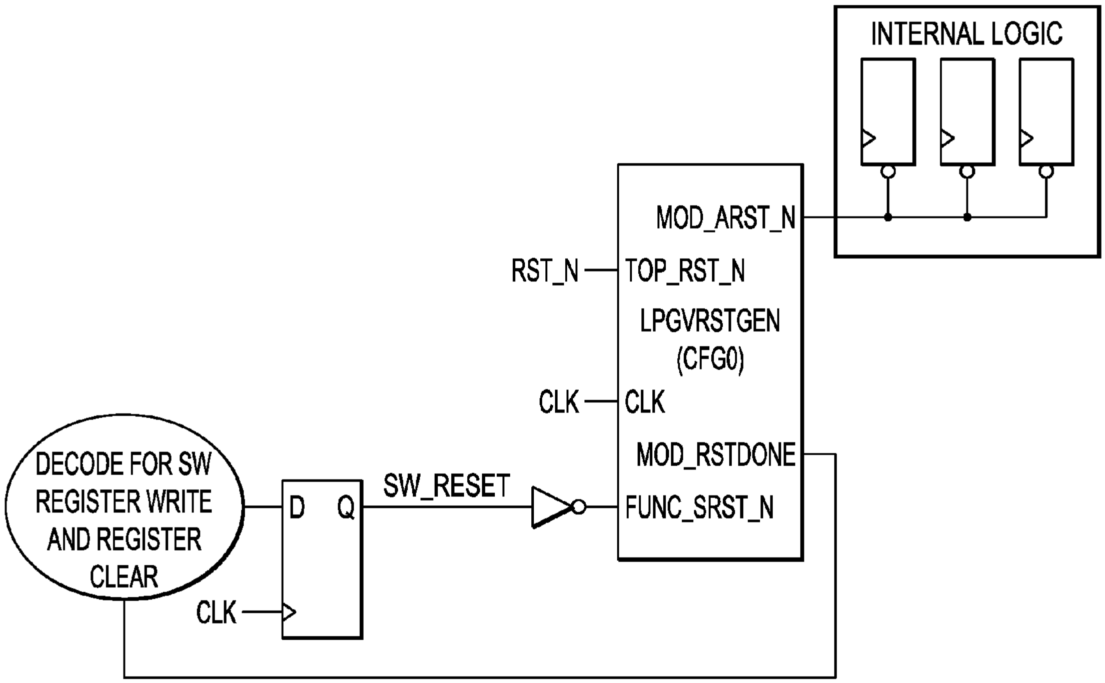
Figure 247:
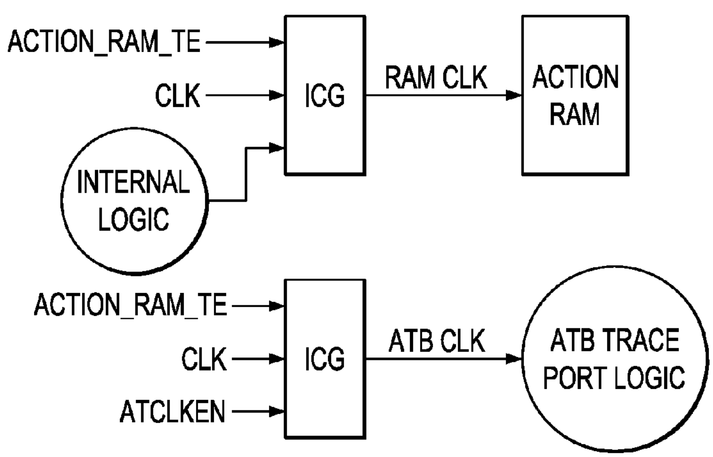
Figures 248, 251:
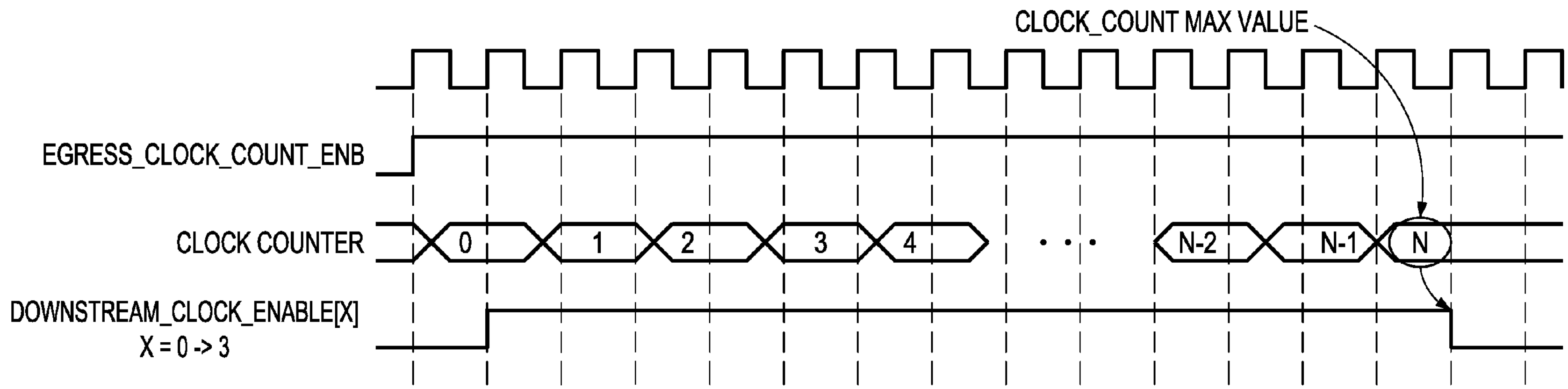
Figure 249:
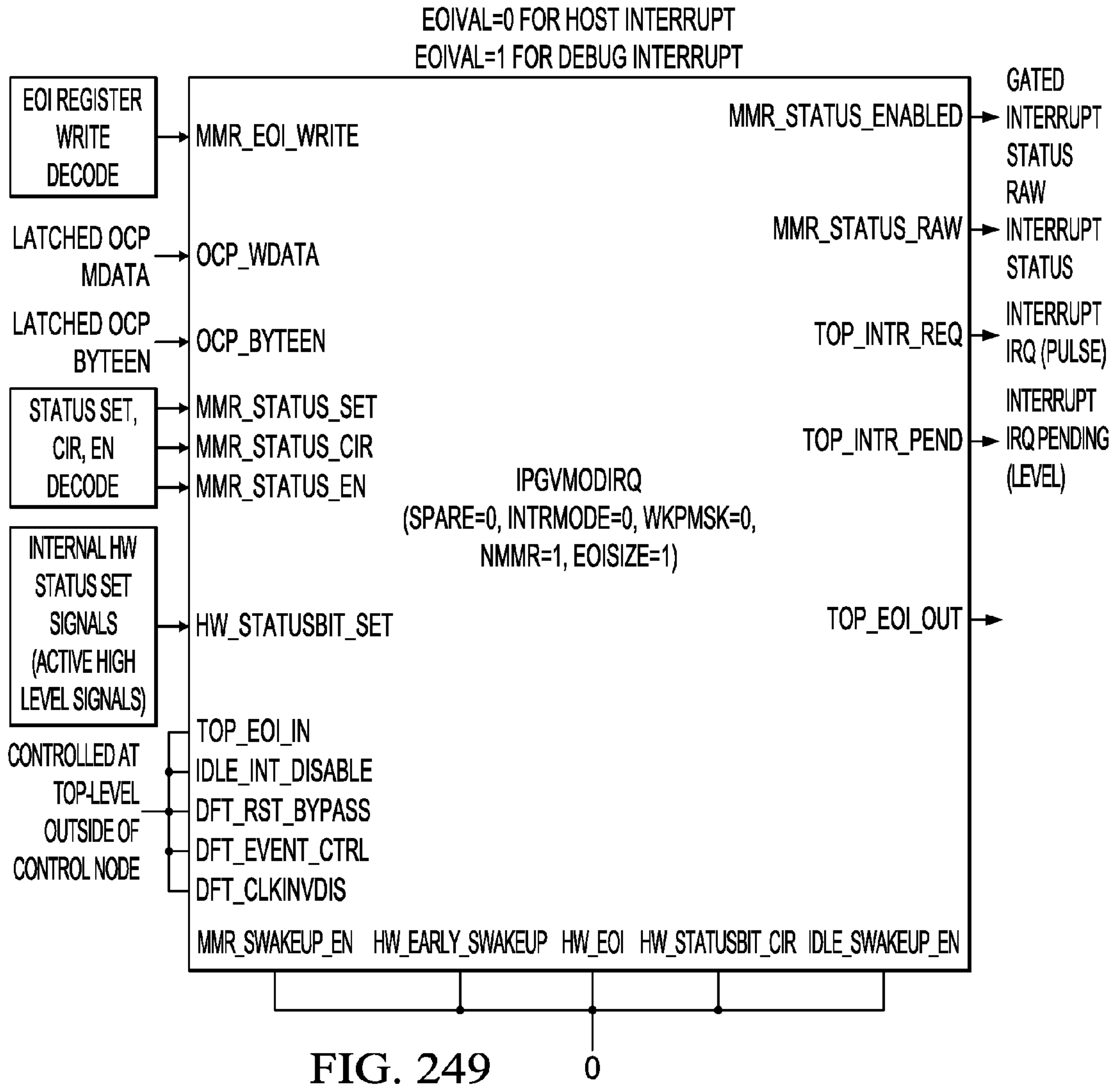
Figure 250:
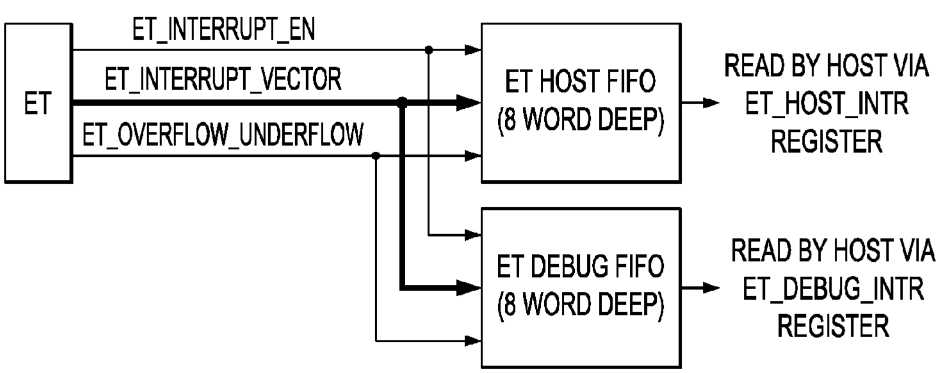
Figure 252:
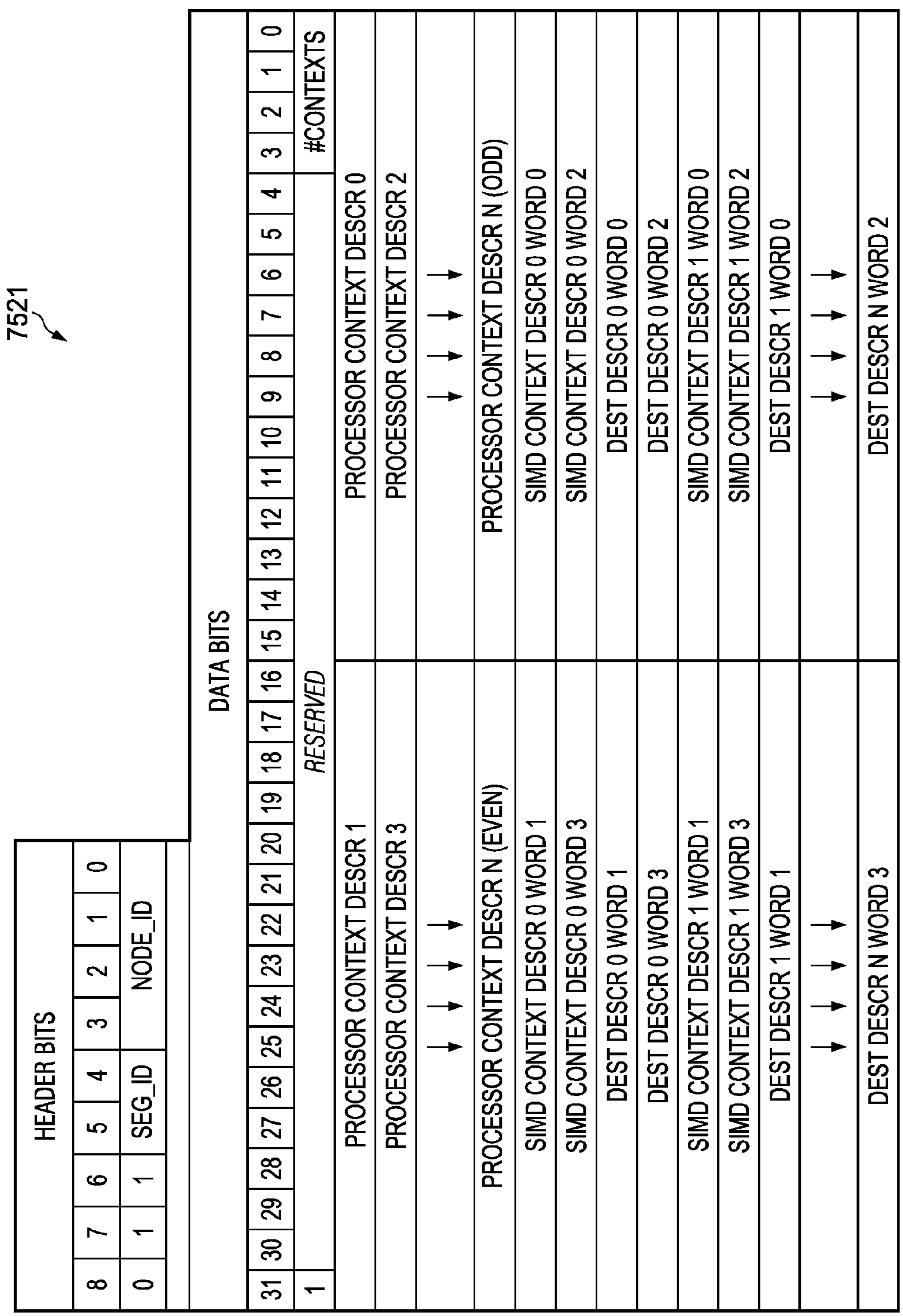
Figure 256:
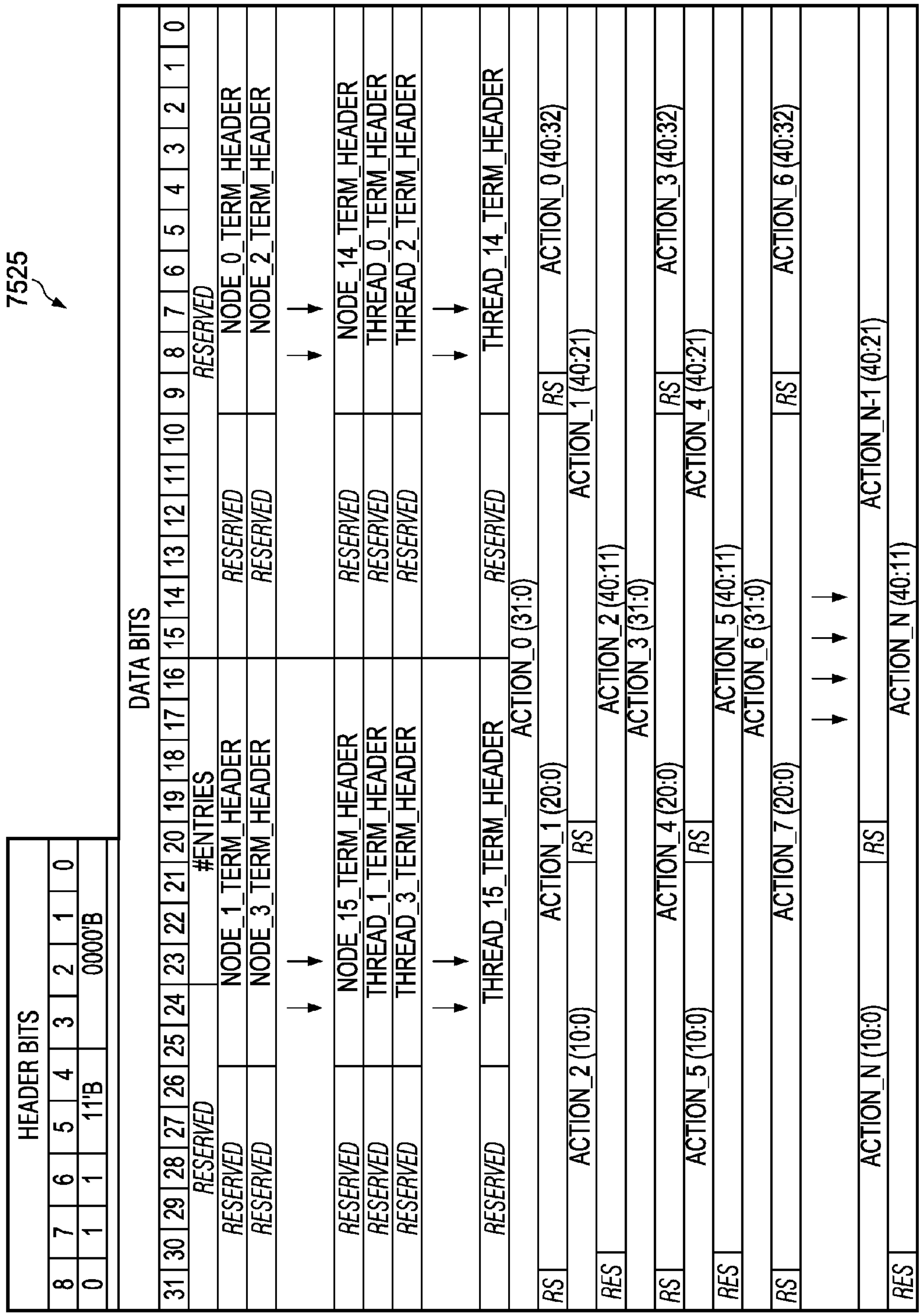
Figure 260:
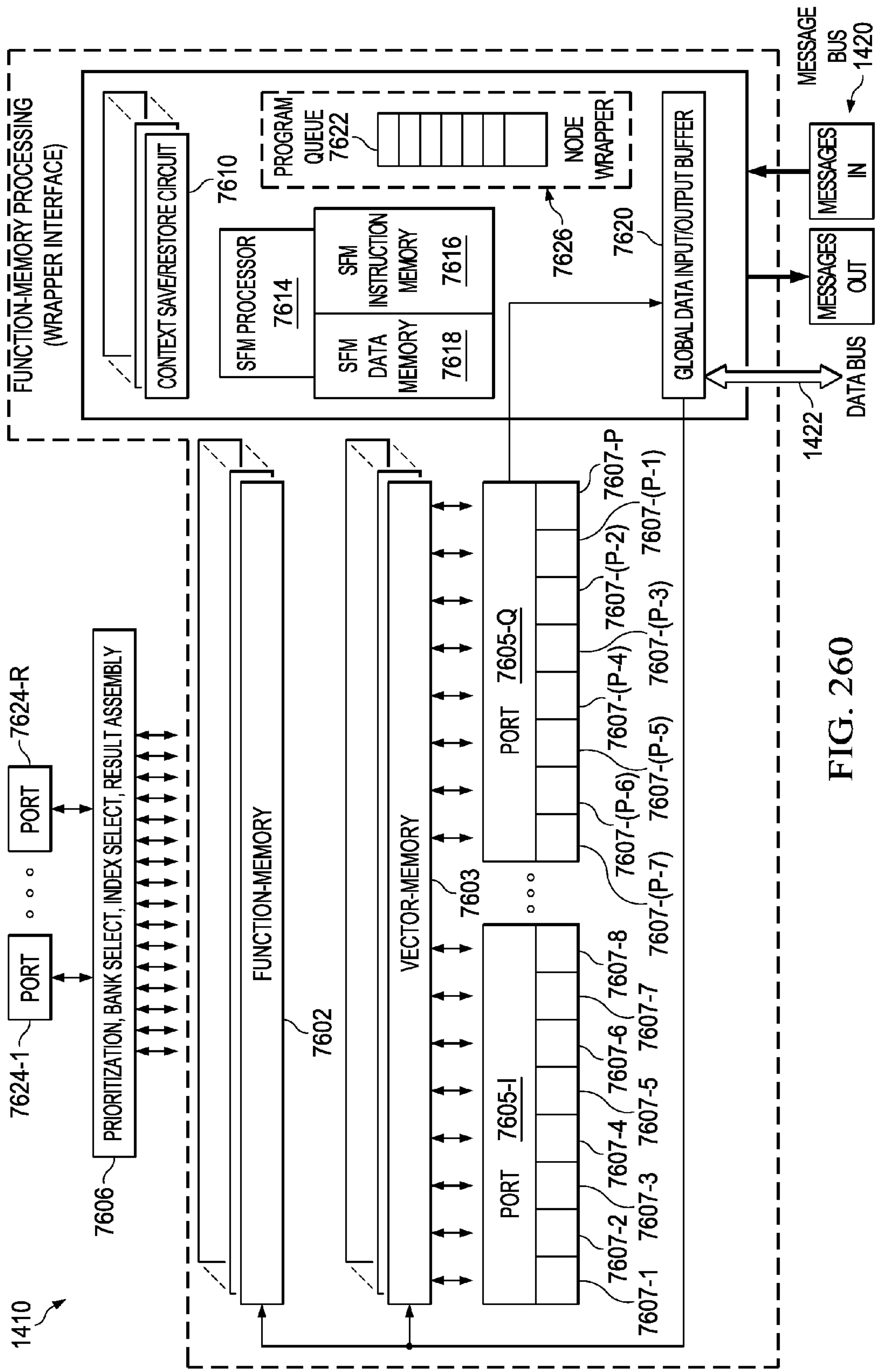
Figures 261, 262:
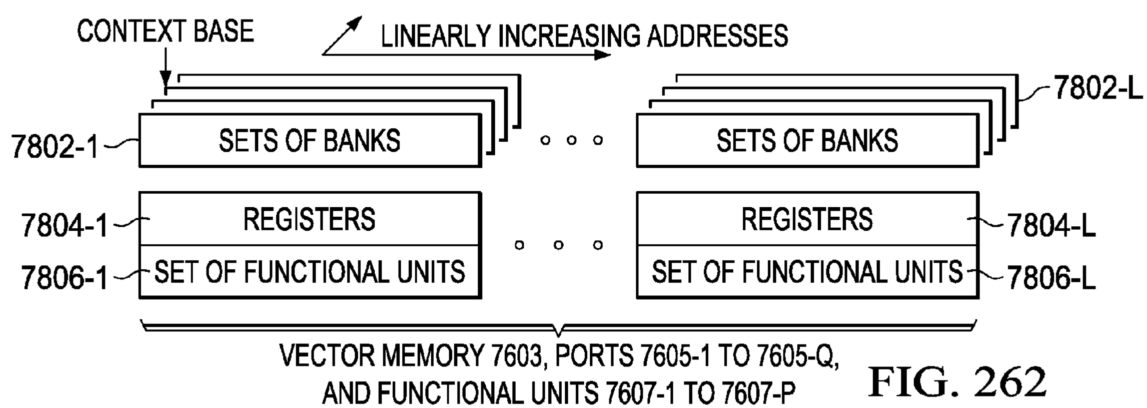
Figure 263:
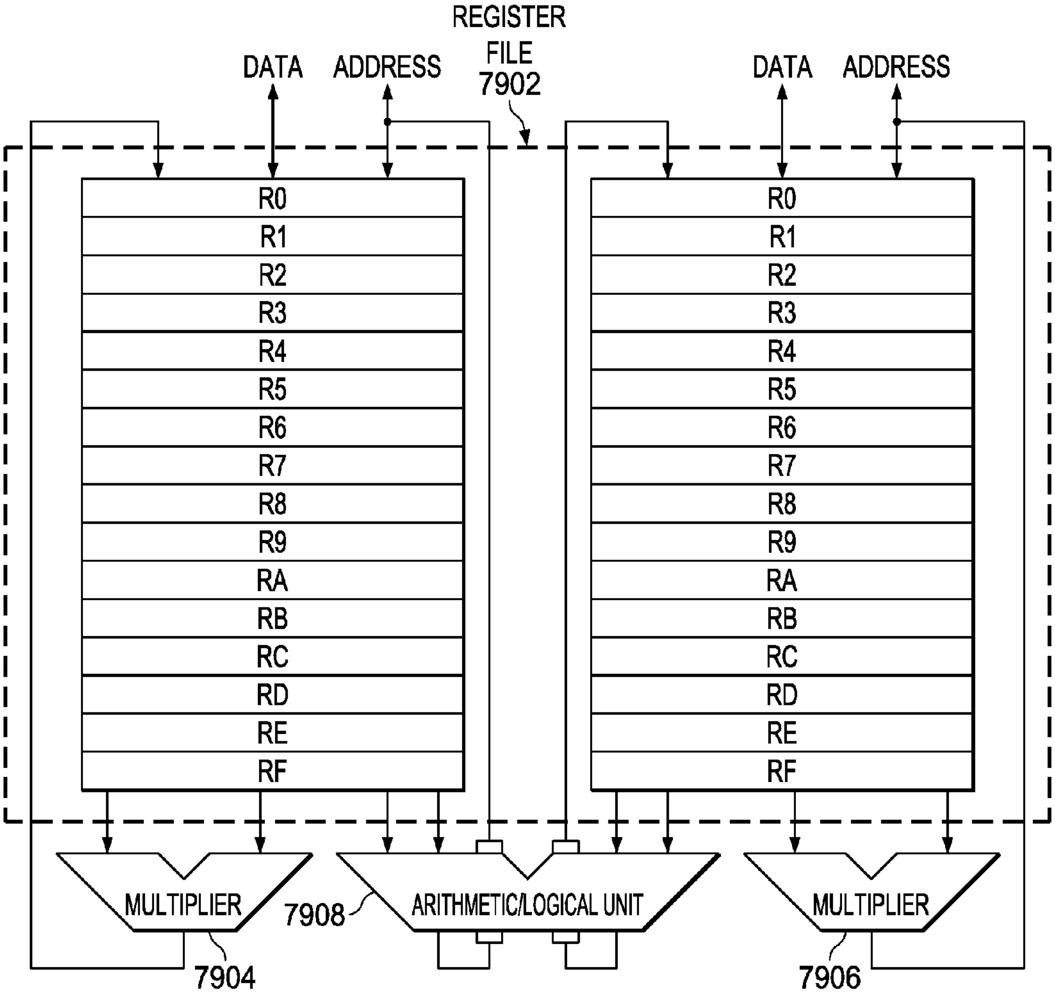
Figure 264:
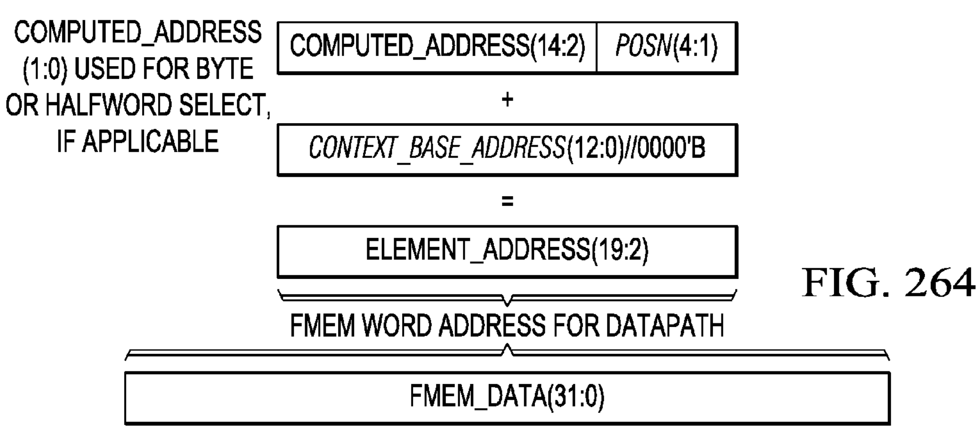
Figure 265:
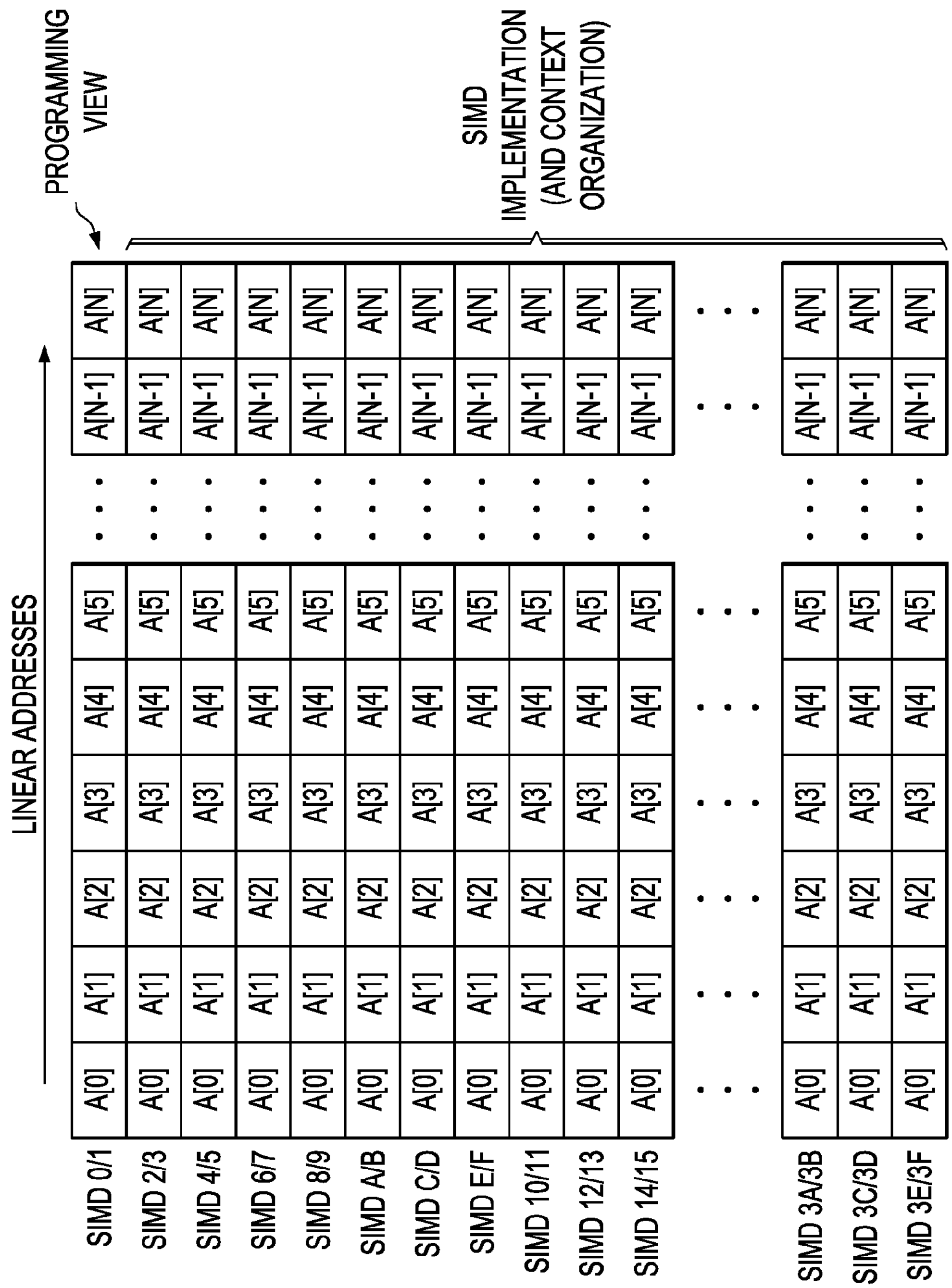
Figure 266:
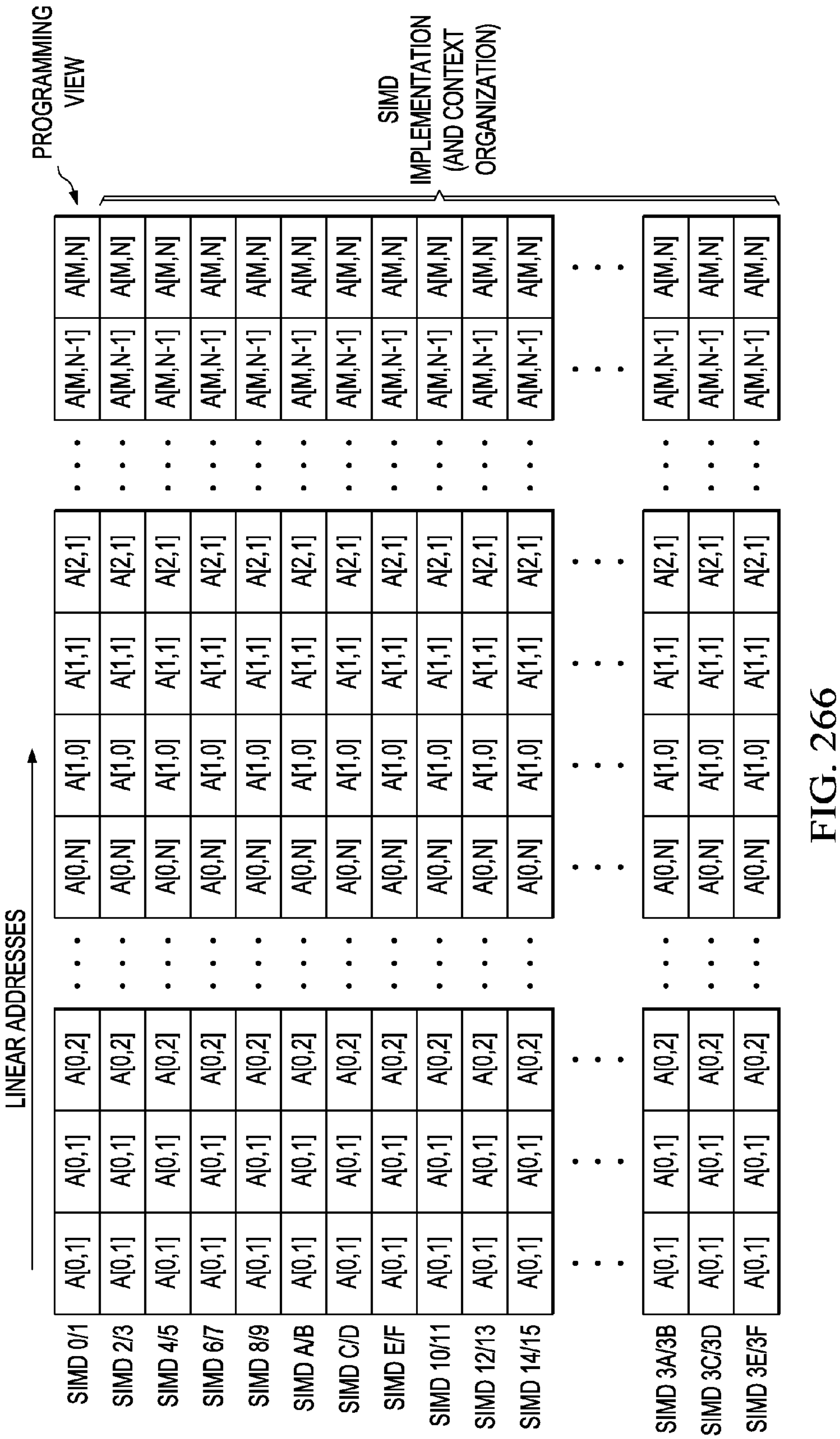
Figure 267:
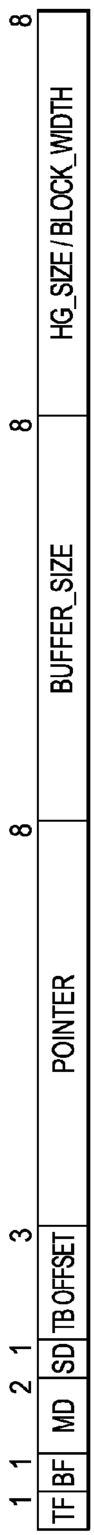
Figure 268:
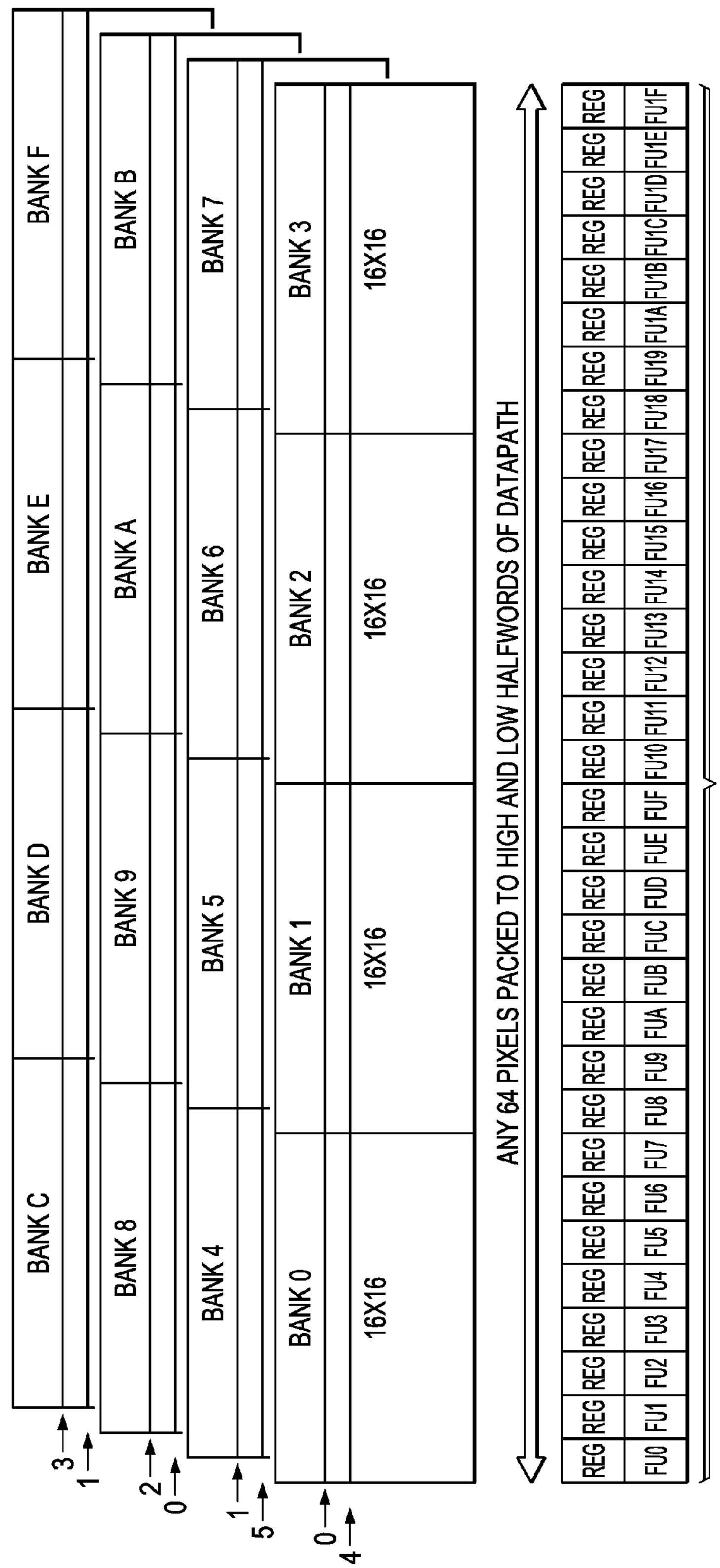
Figure 269:
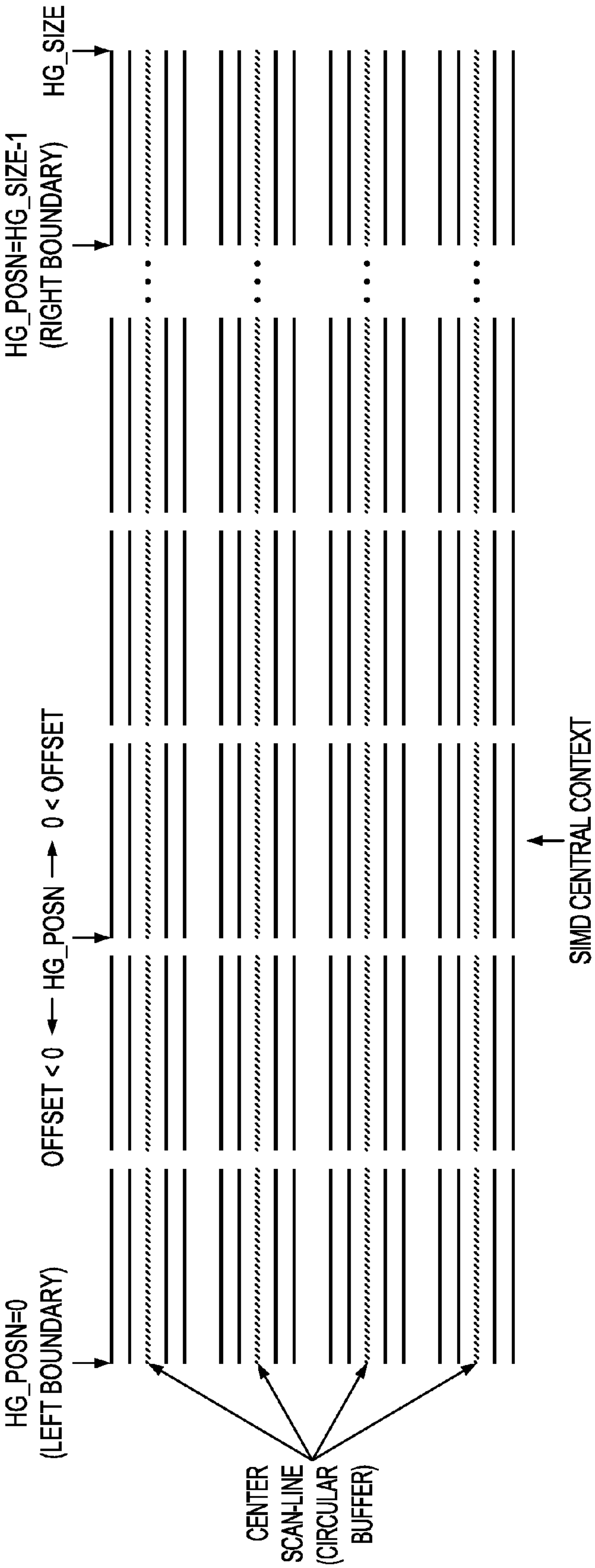
Figure 270:
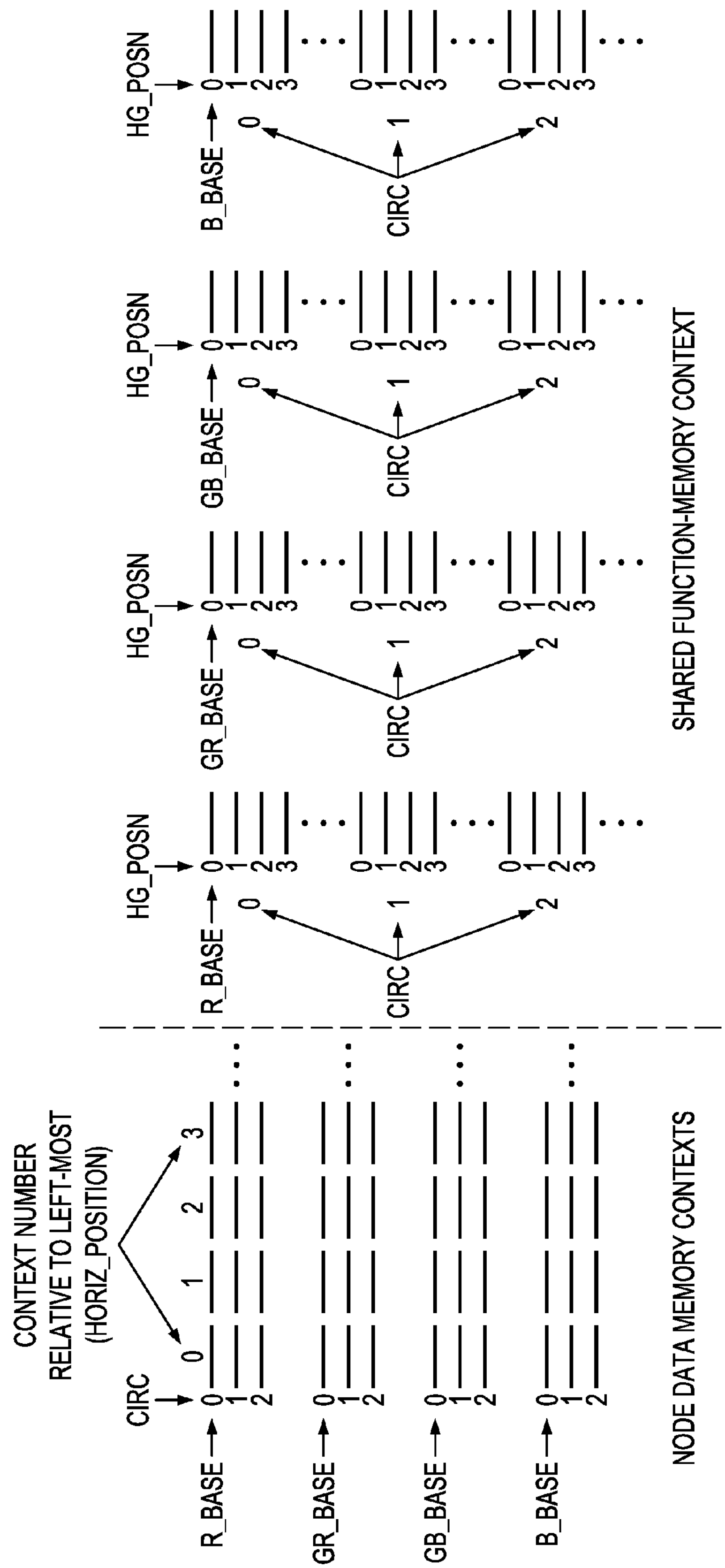
Figure 271:
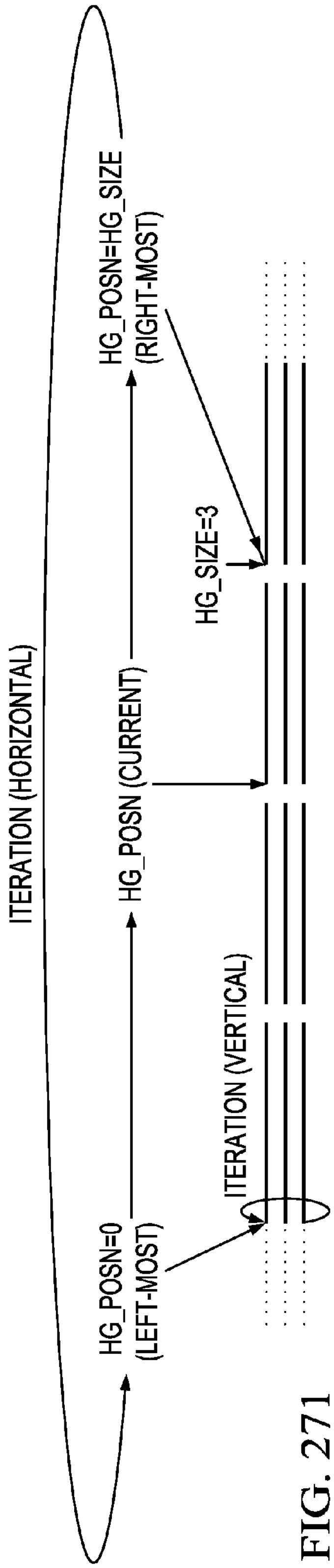
Figure 272:
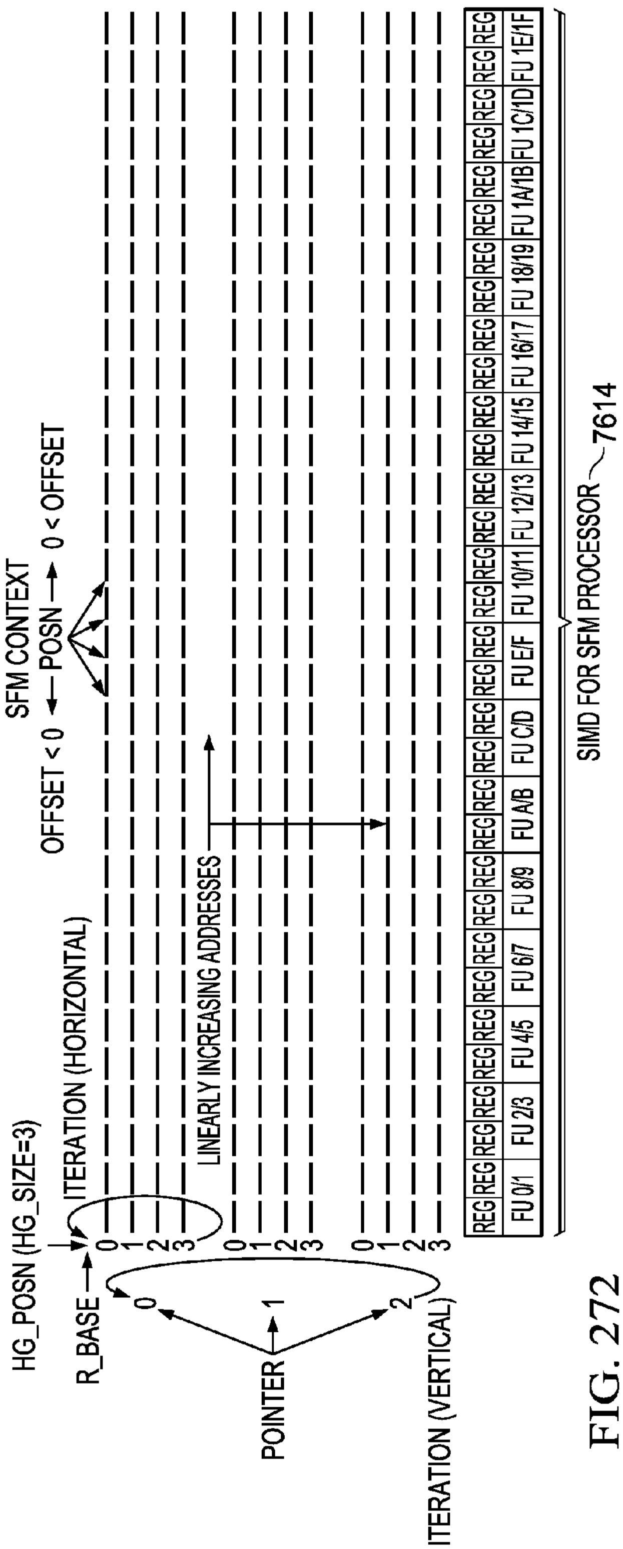
Figure 273:
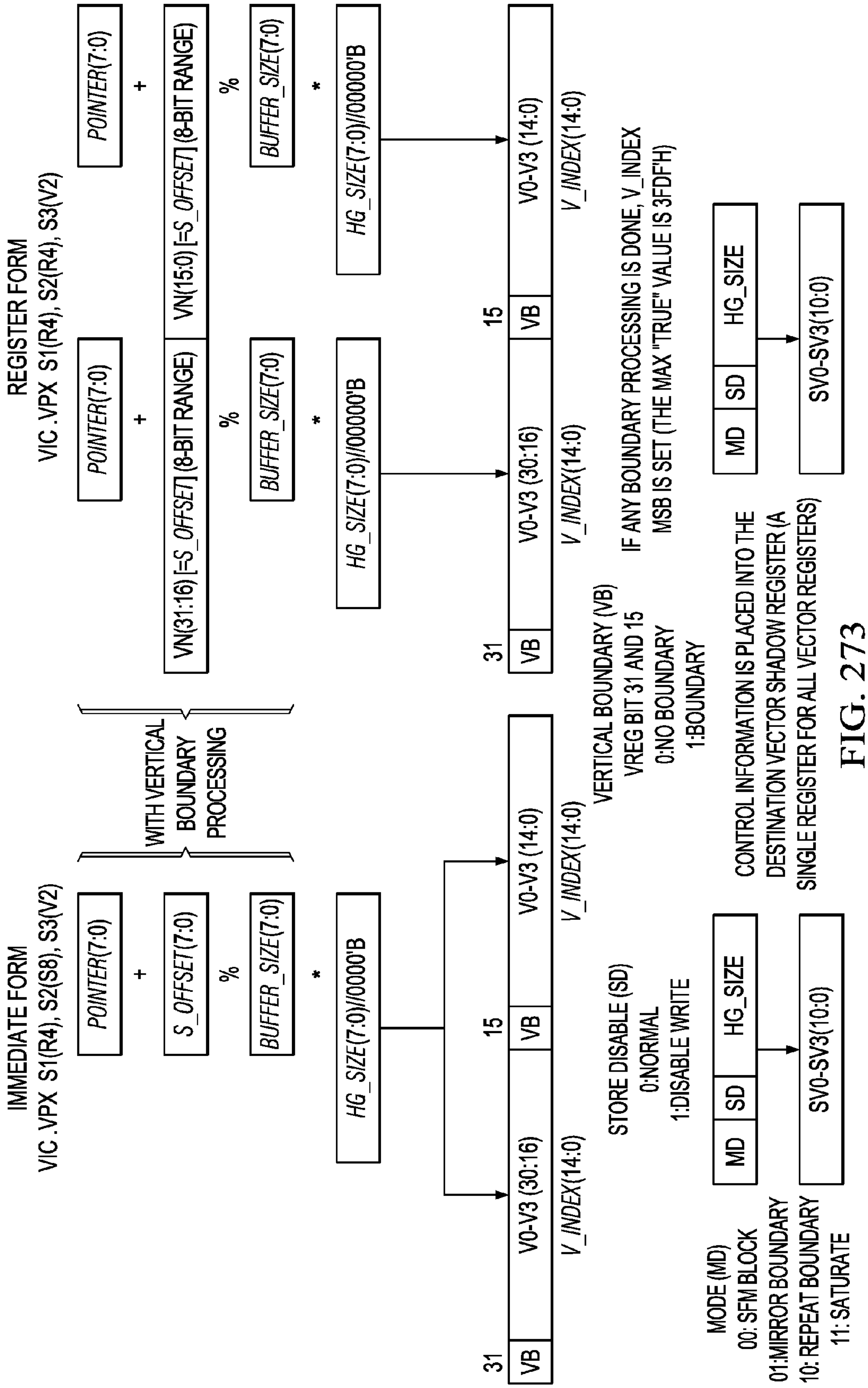
Figure 274:
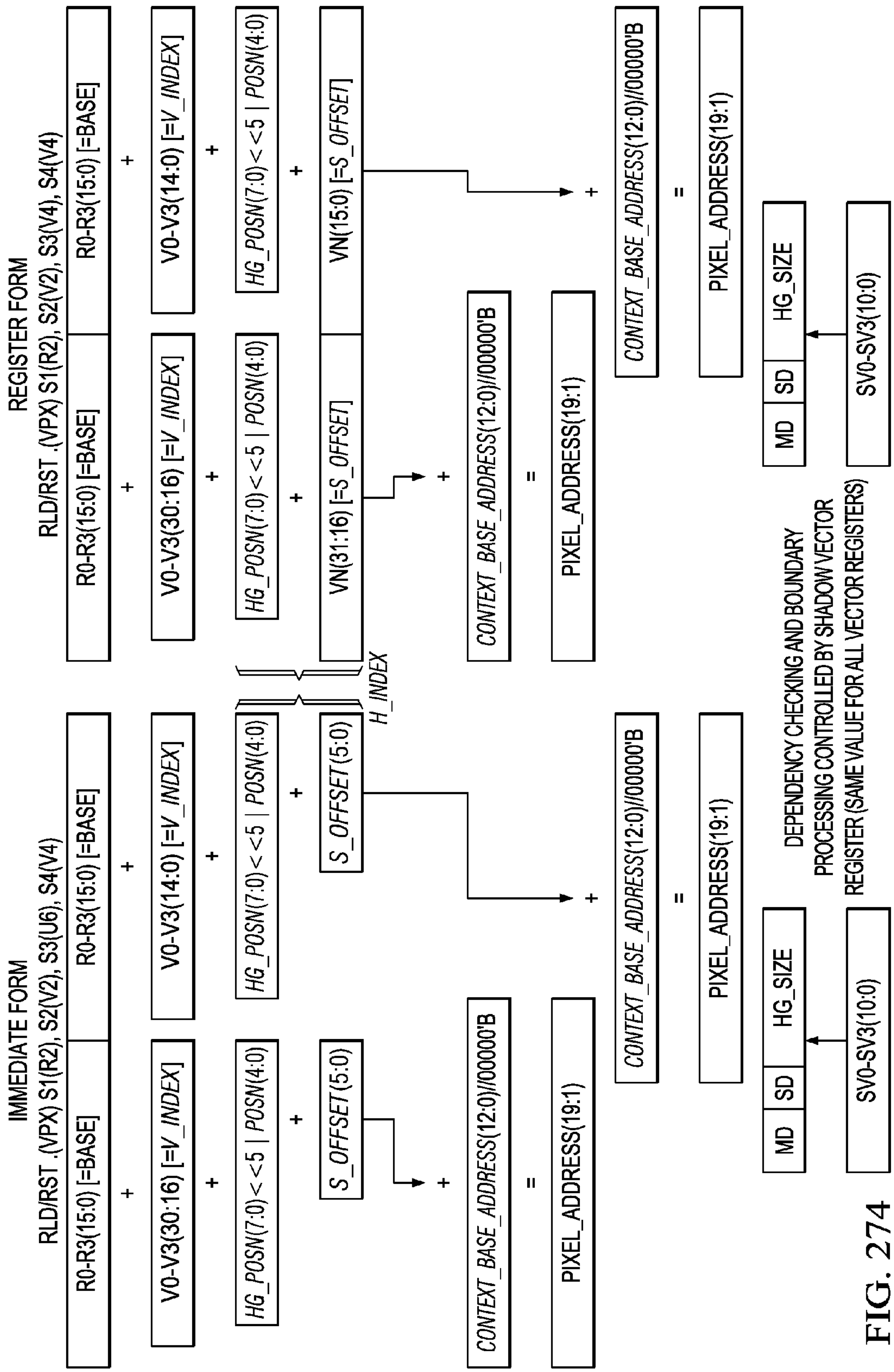
Figure 275:
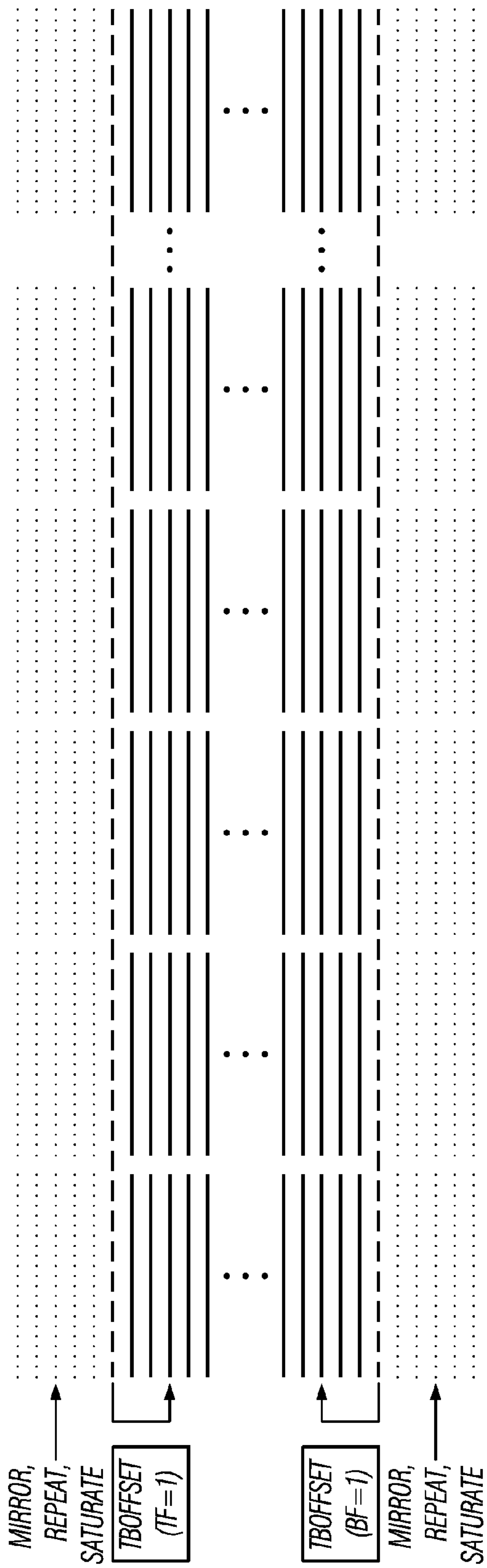
Figure 276:
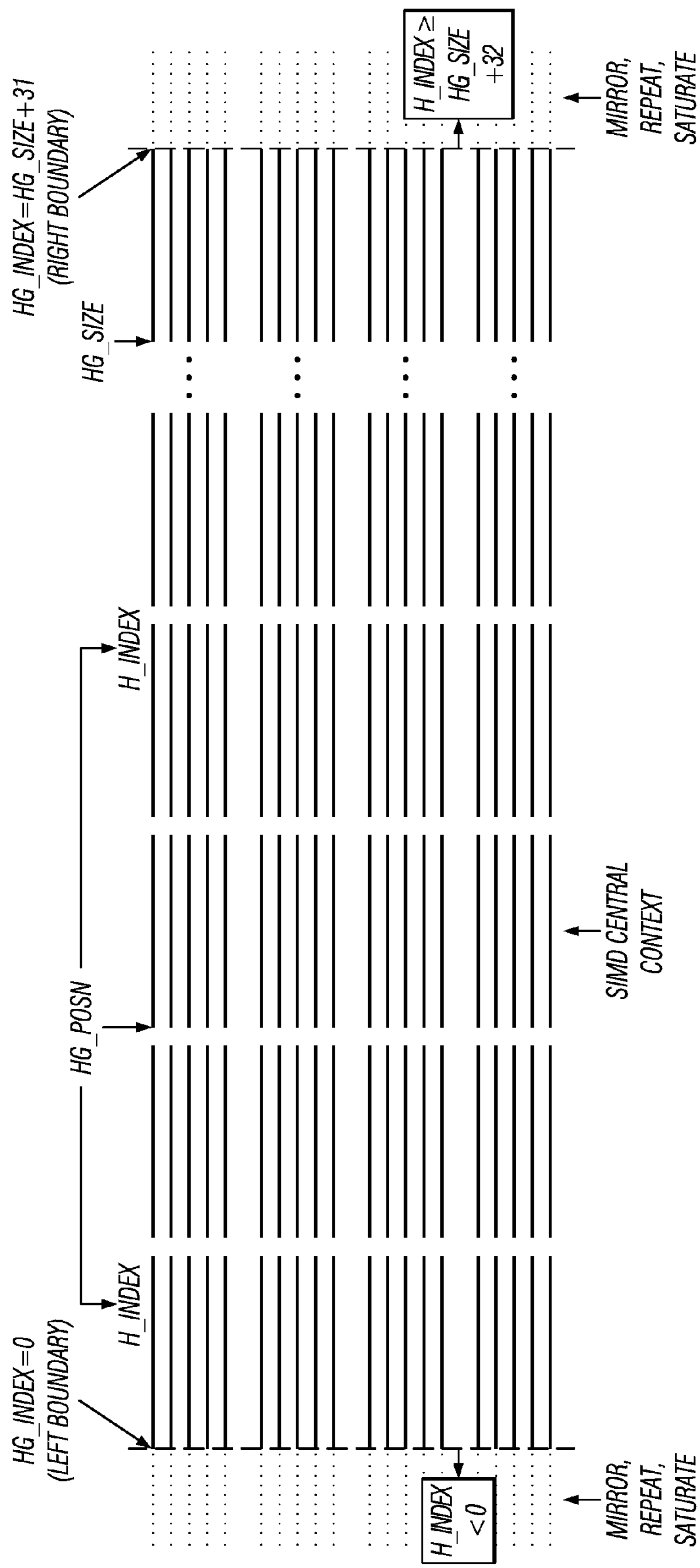
Figures 277, 280:
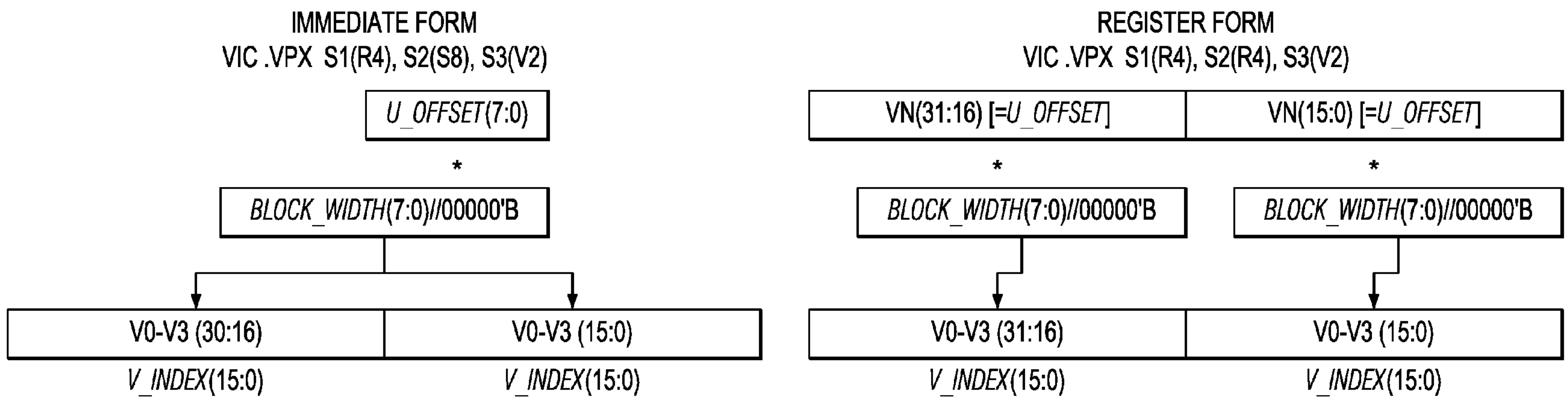
Figure 278:
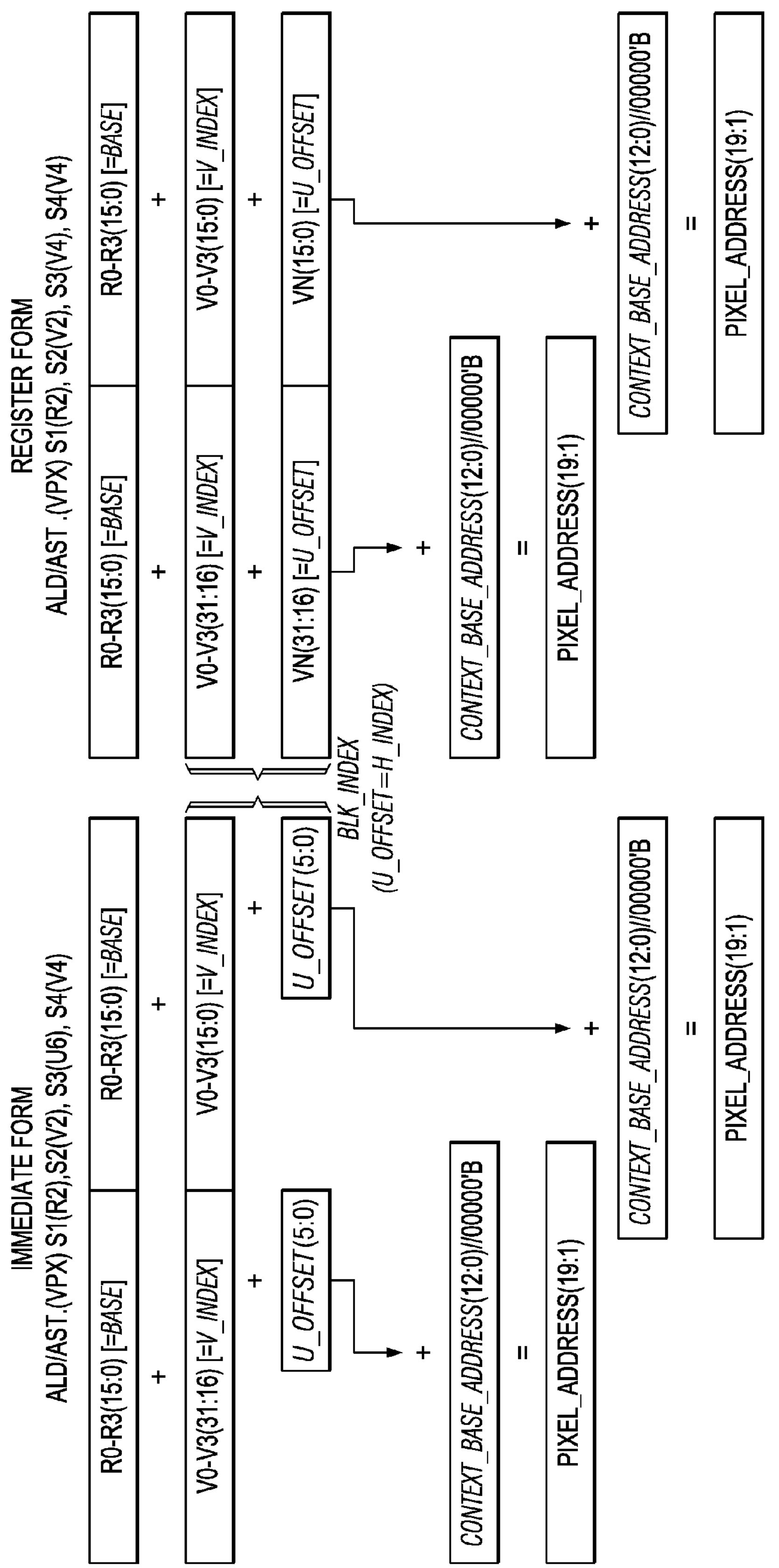
Figure 279:
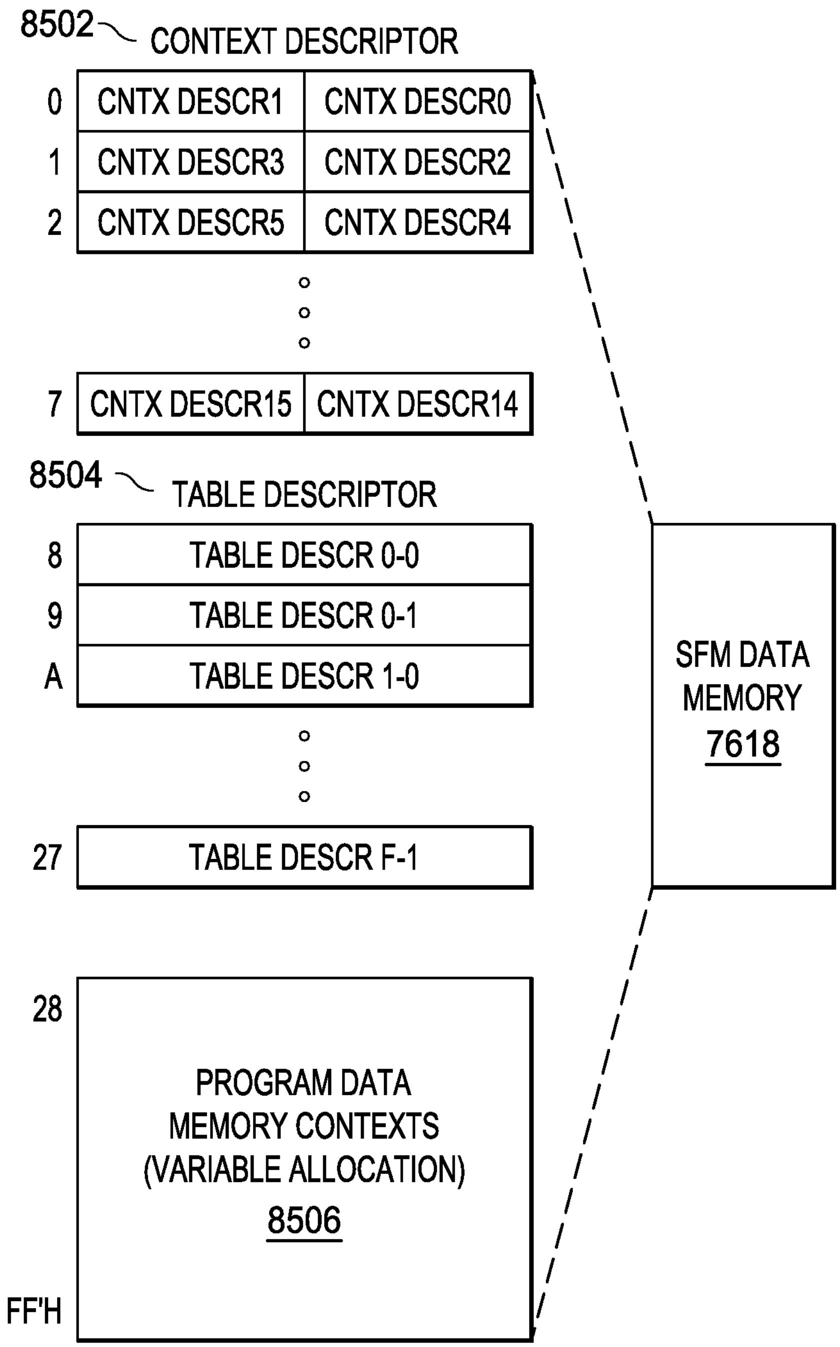
Figure 283:
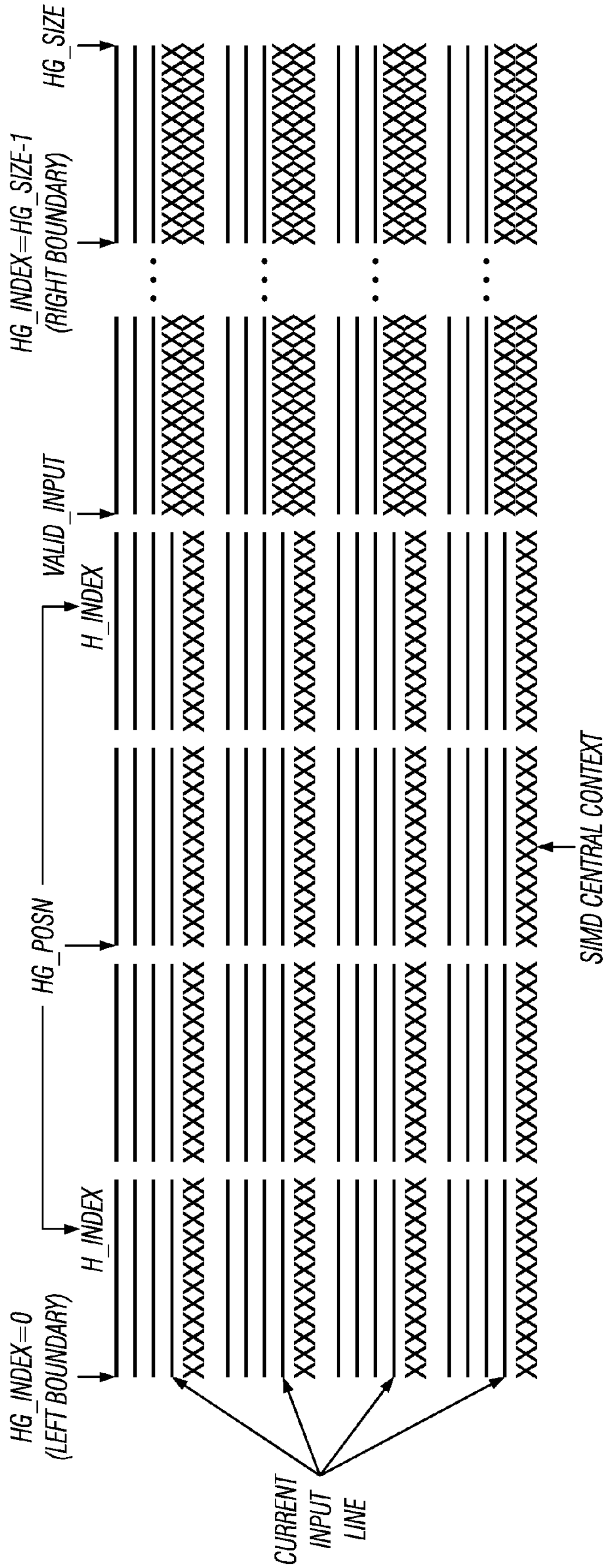
Figure 284:
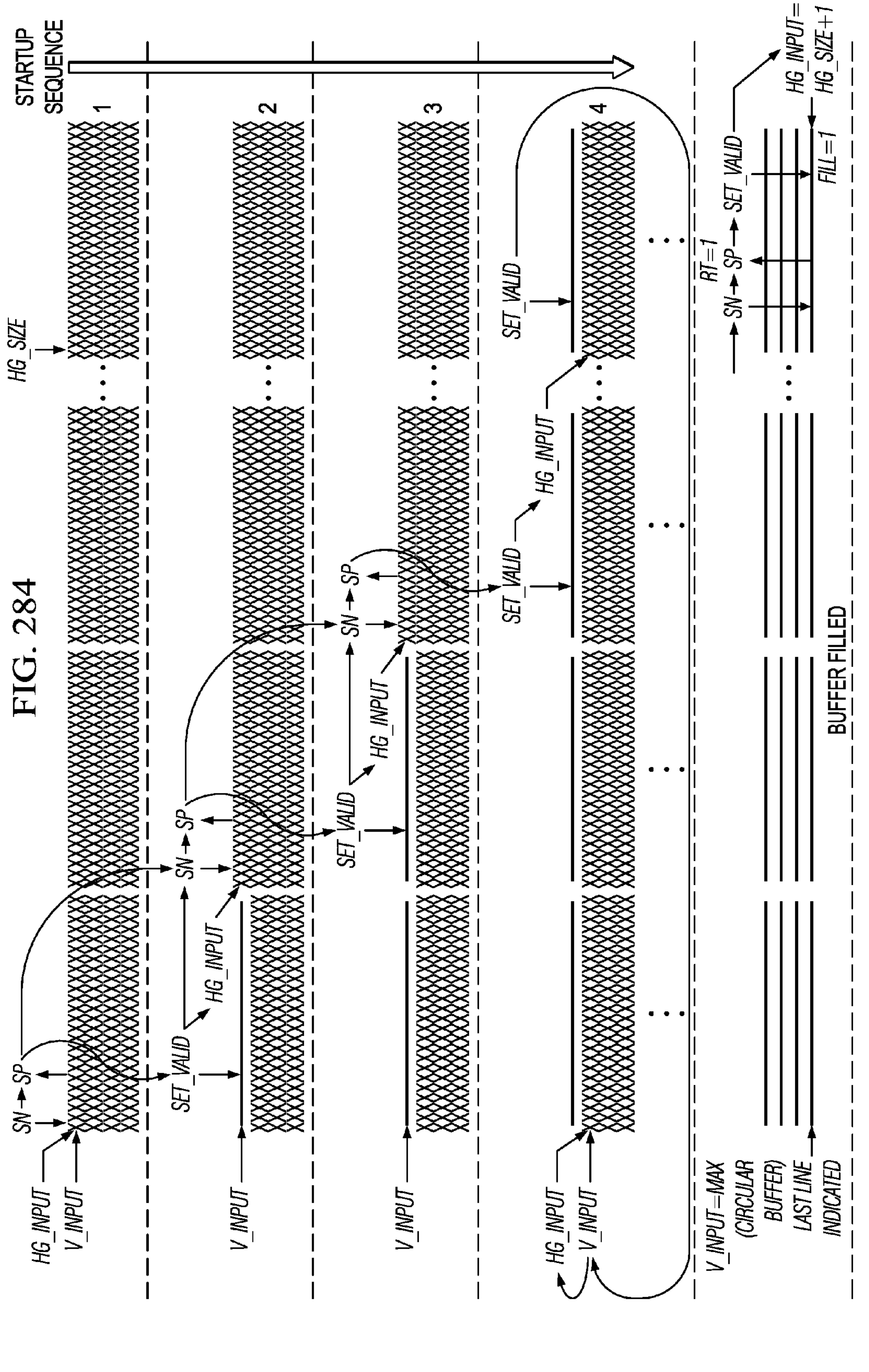
Figure 285:
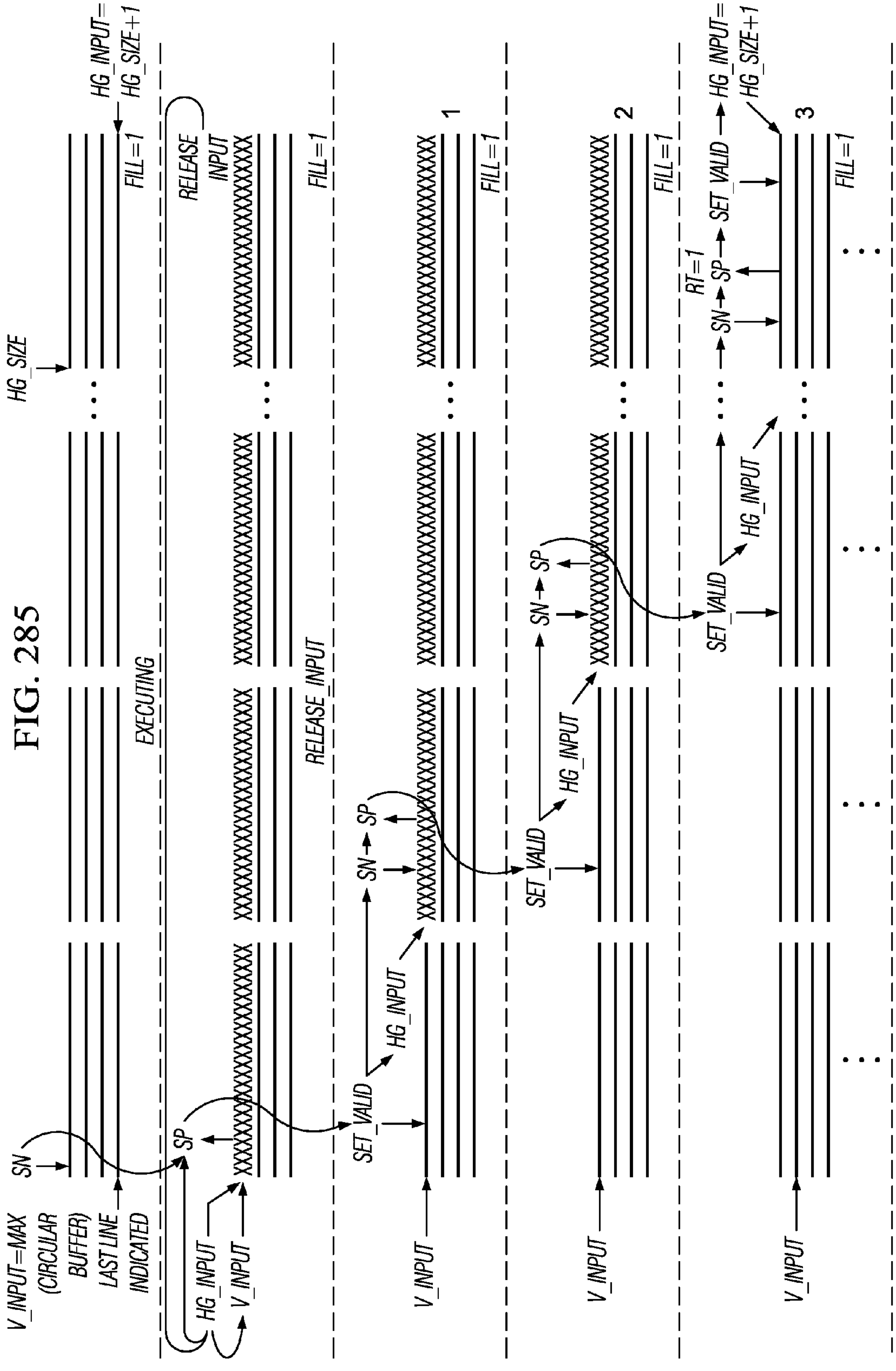
Figure 286:
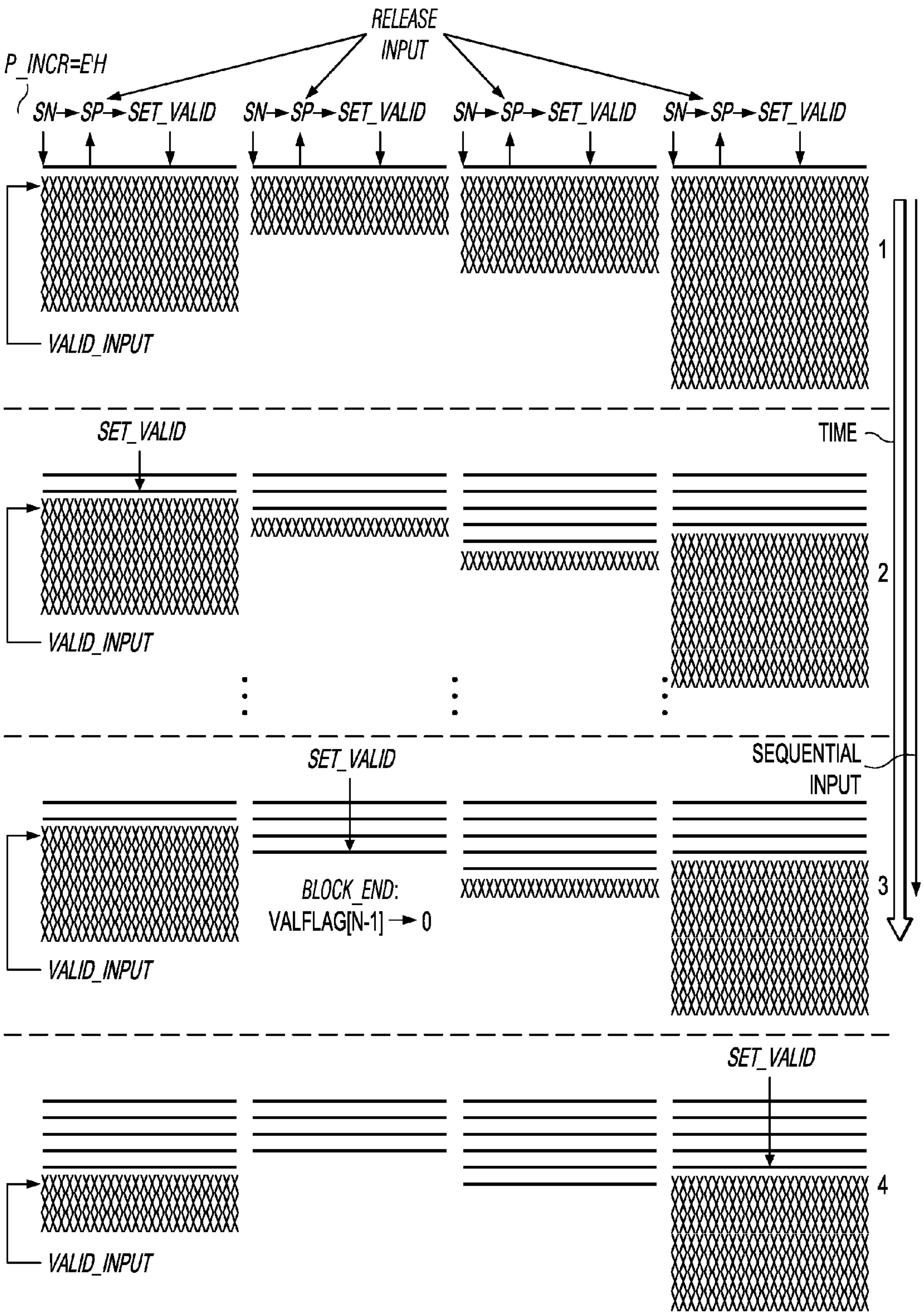
Figure 287:
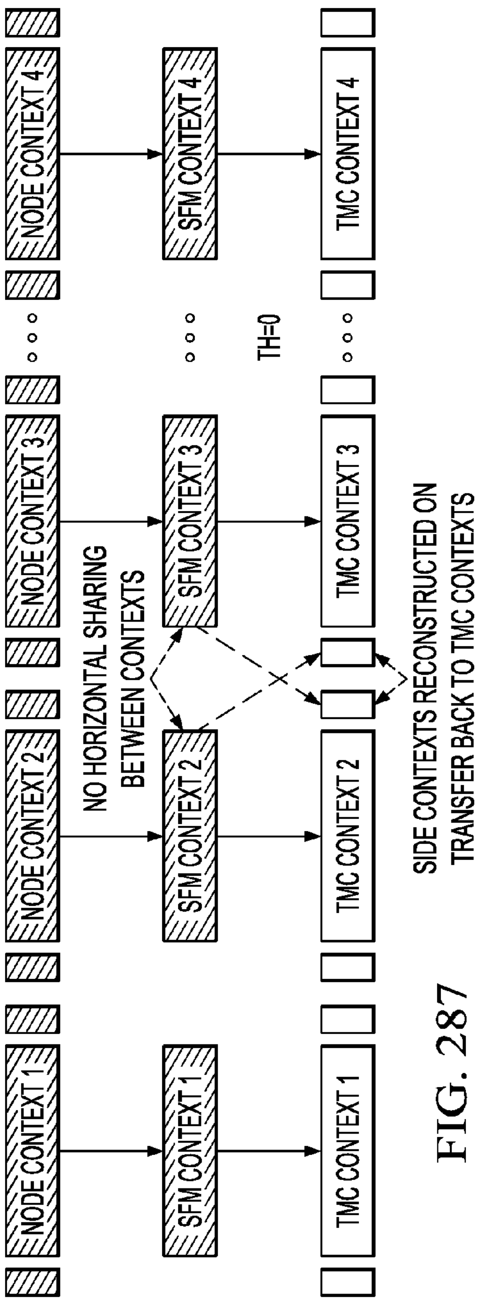
Figure 288:
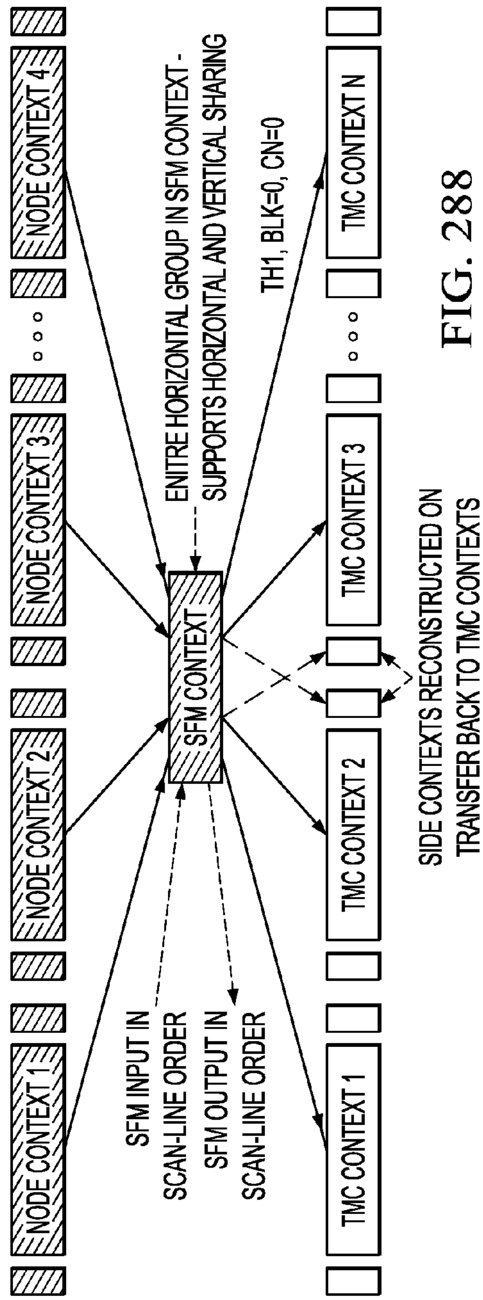
Figure 289:
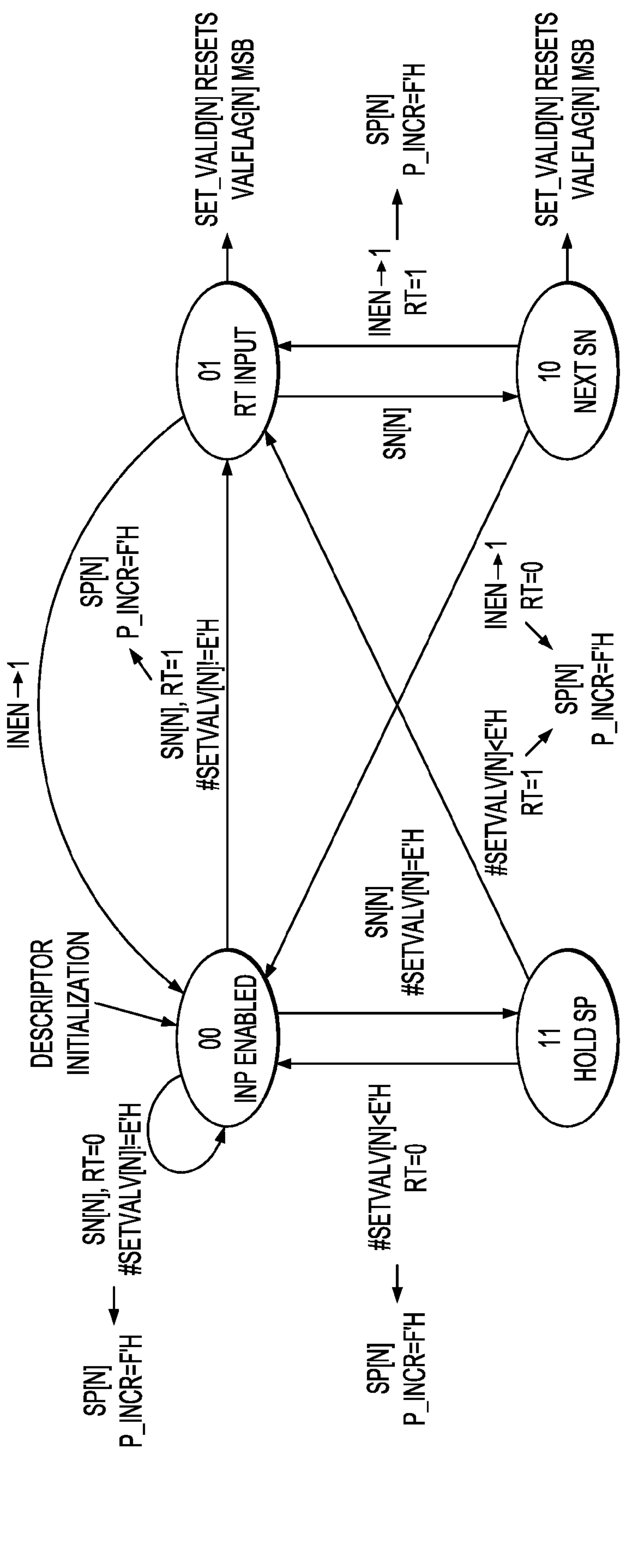
Figure 290:
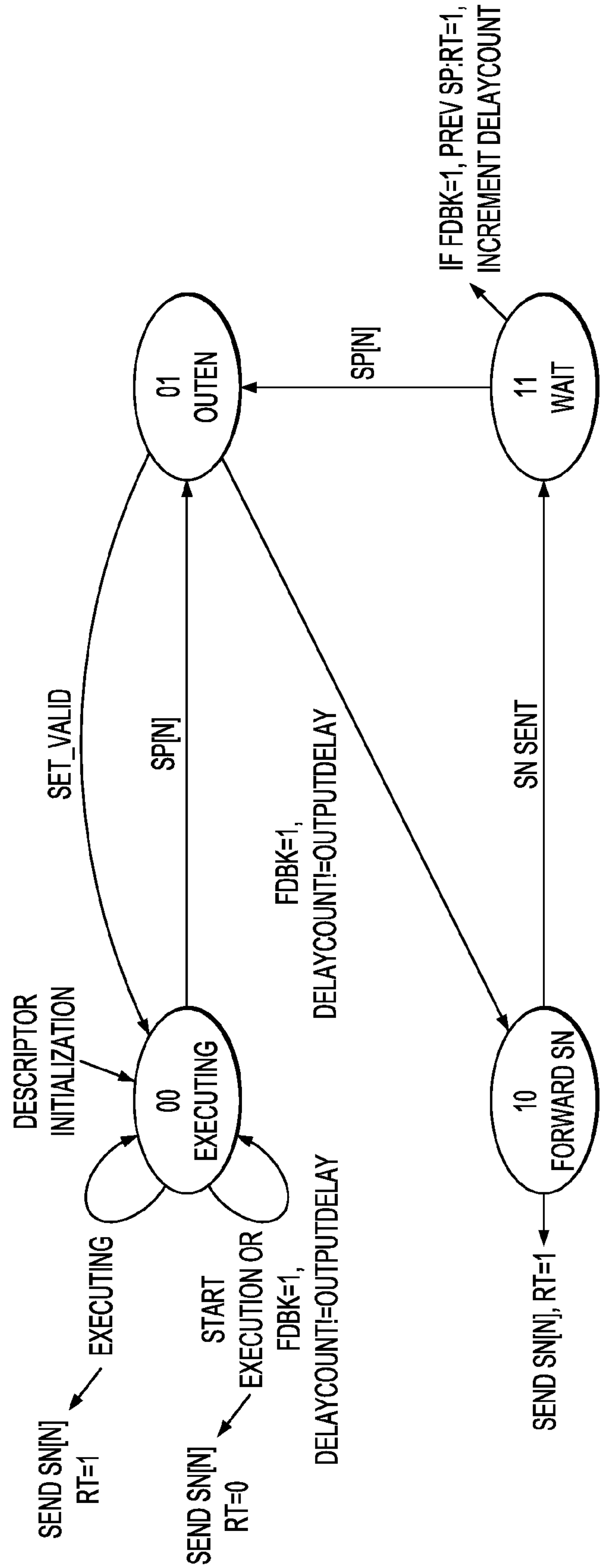
Figure 291:
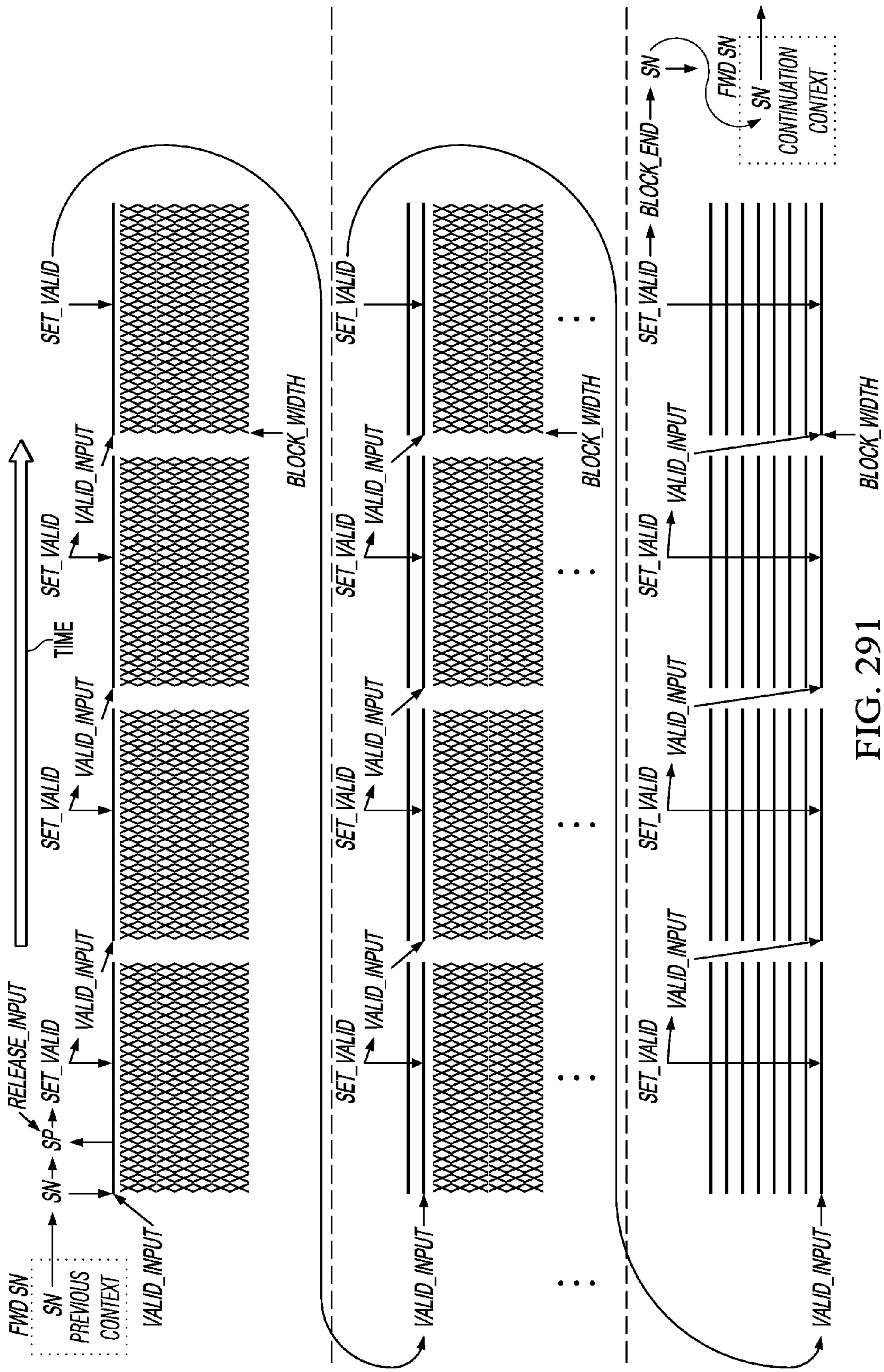
Figure 292A:
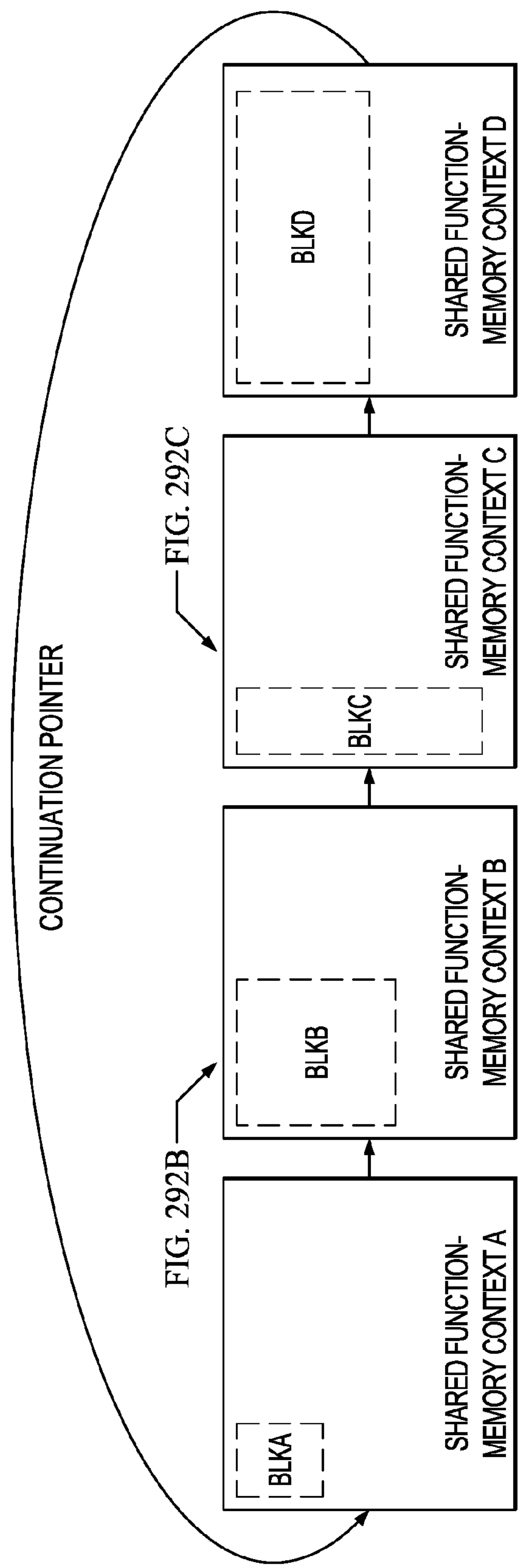
Figure 292B:
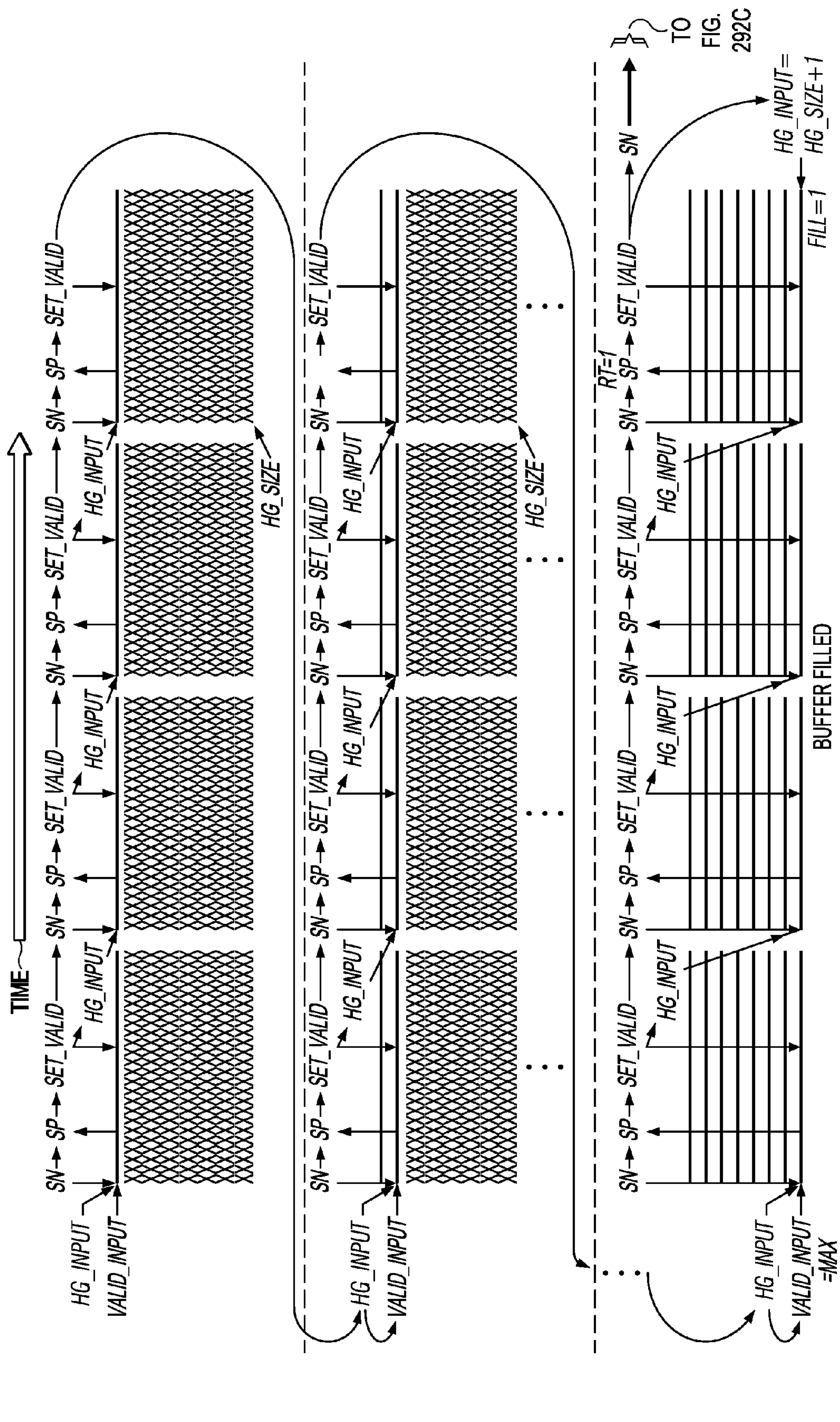
Figure 292C:
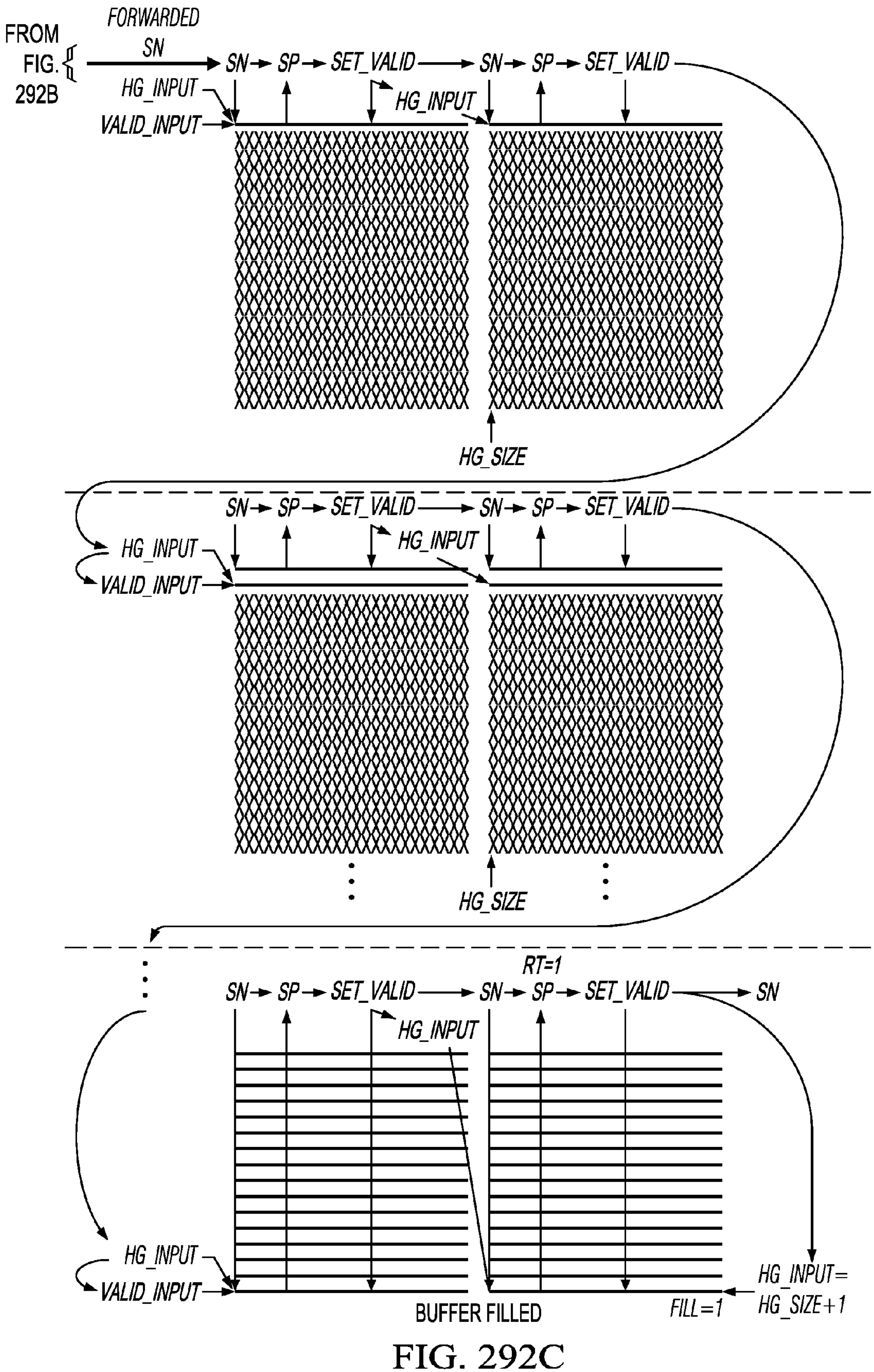
Figure 293:
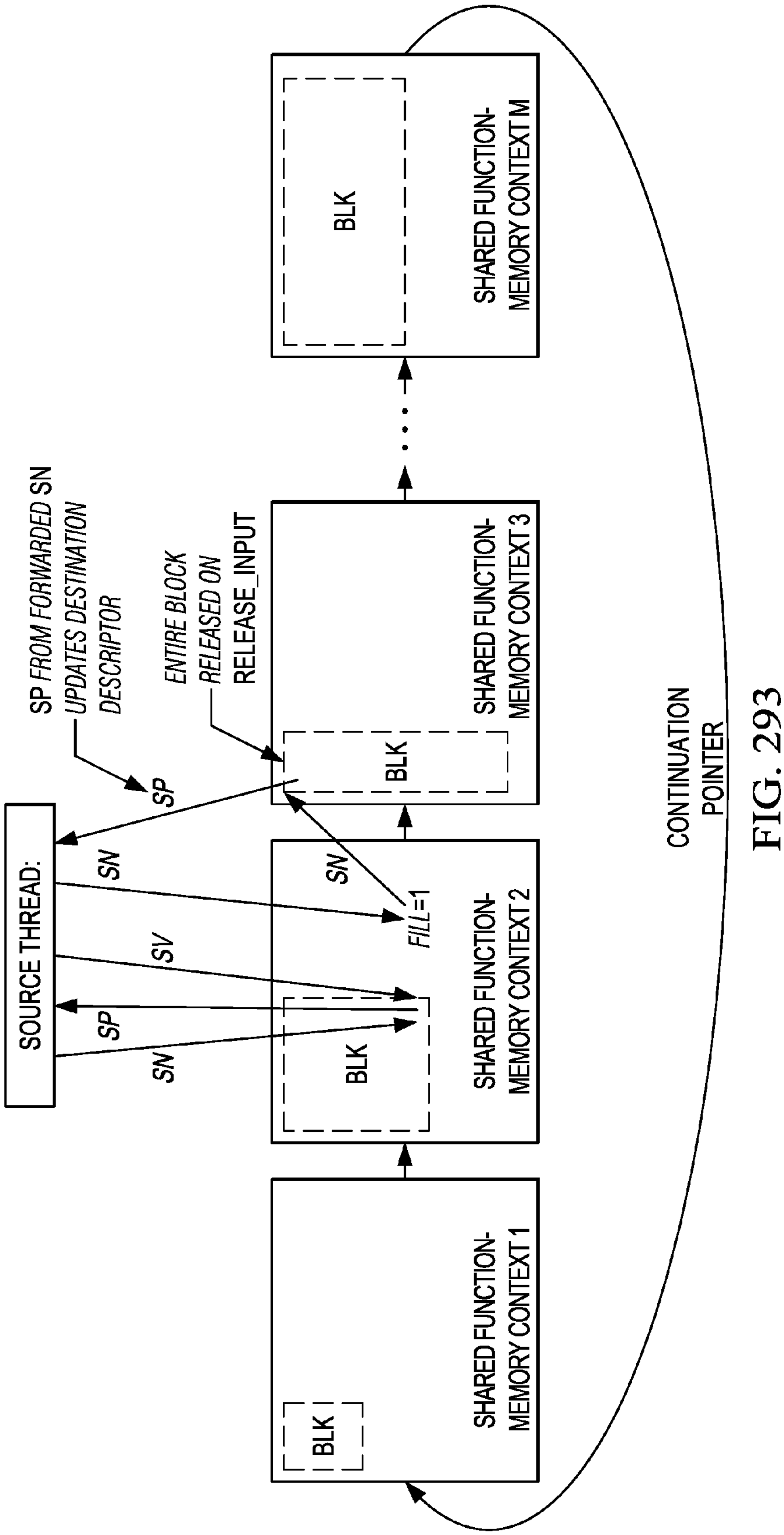
Figure 294:
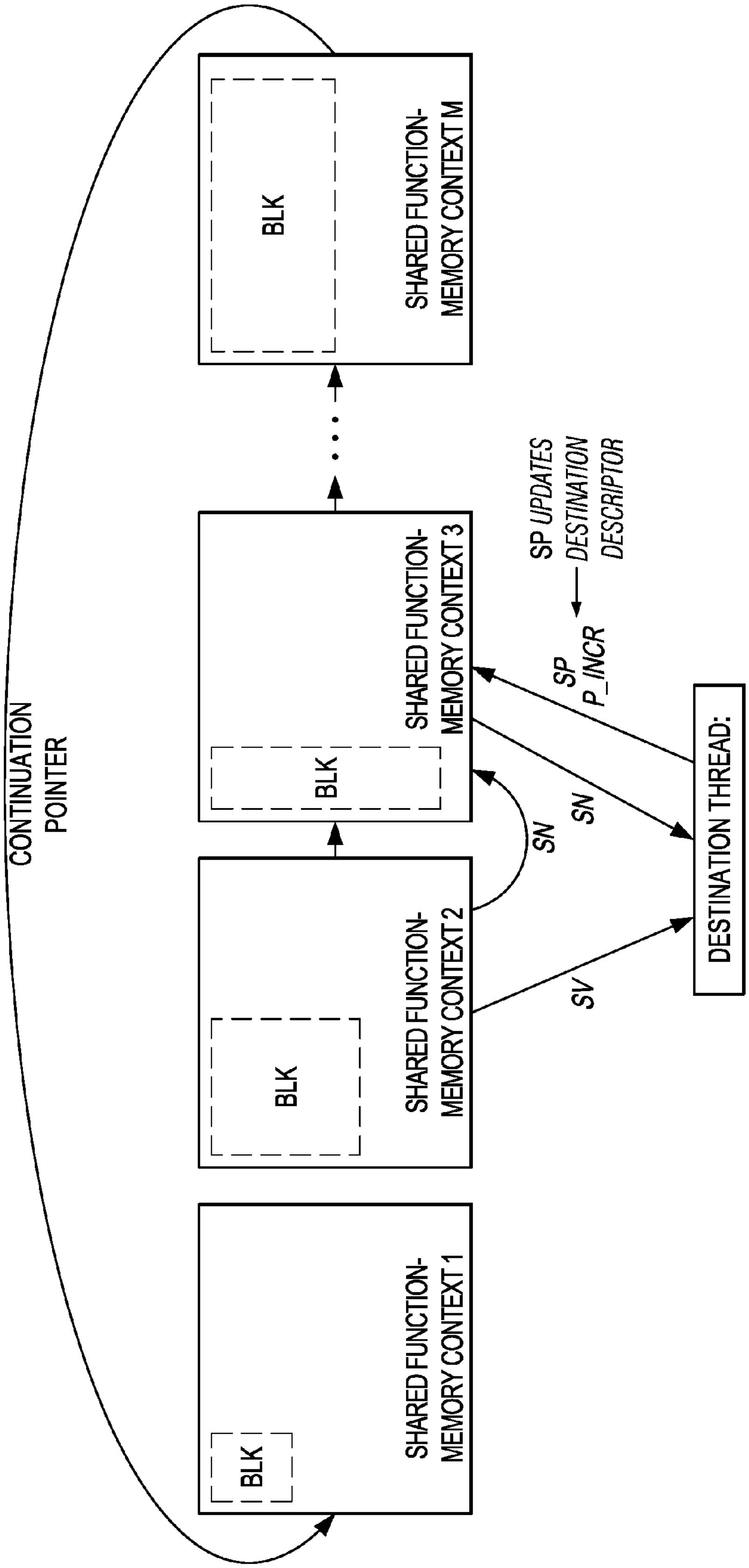
Figure 295:
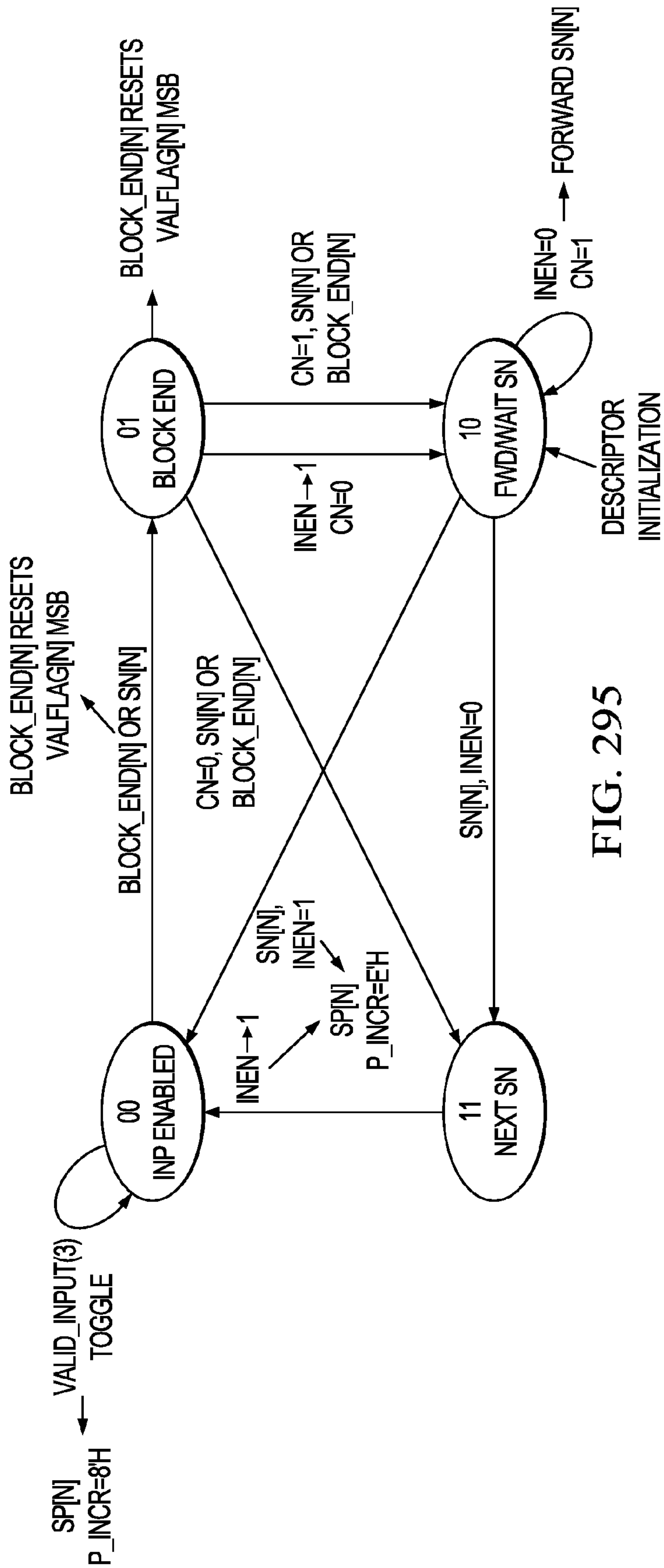
Figure 296:
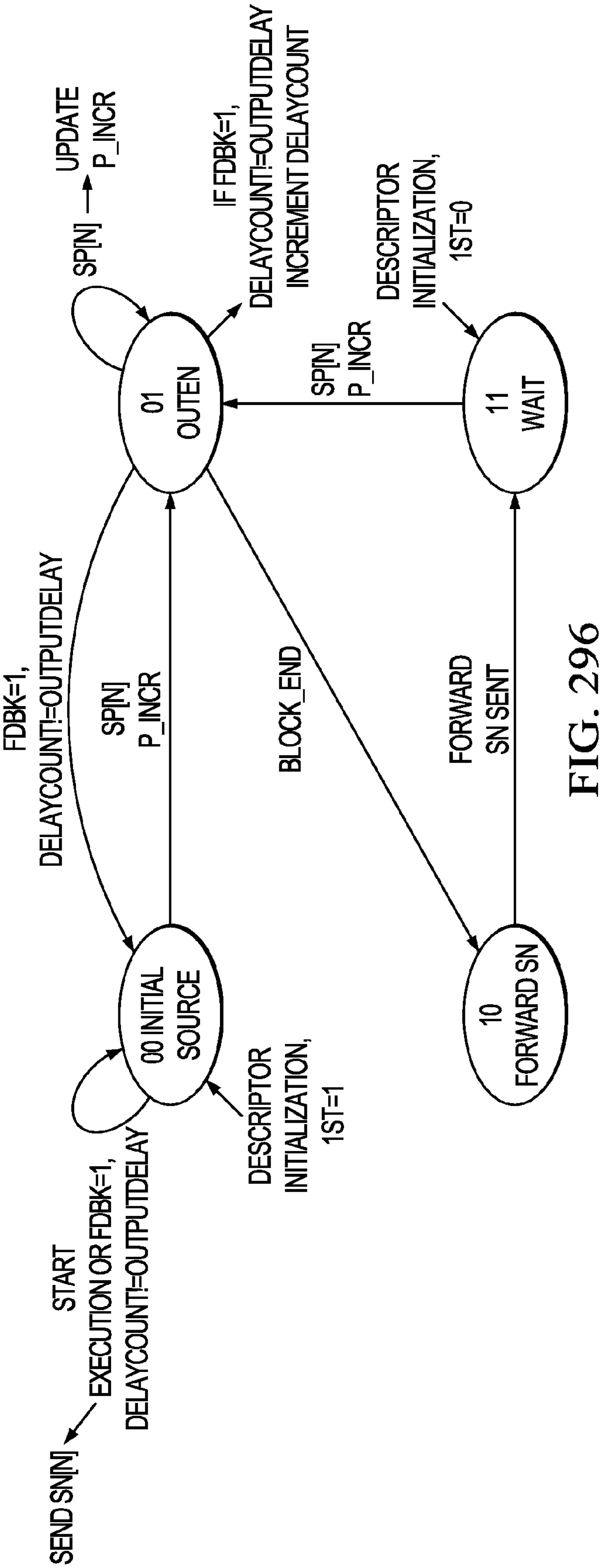
Figure 297:
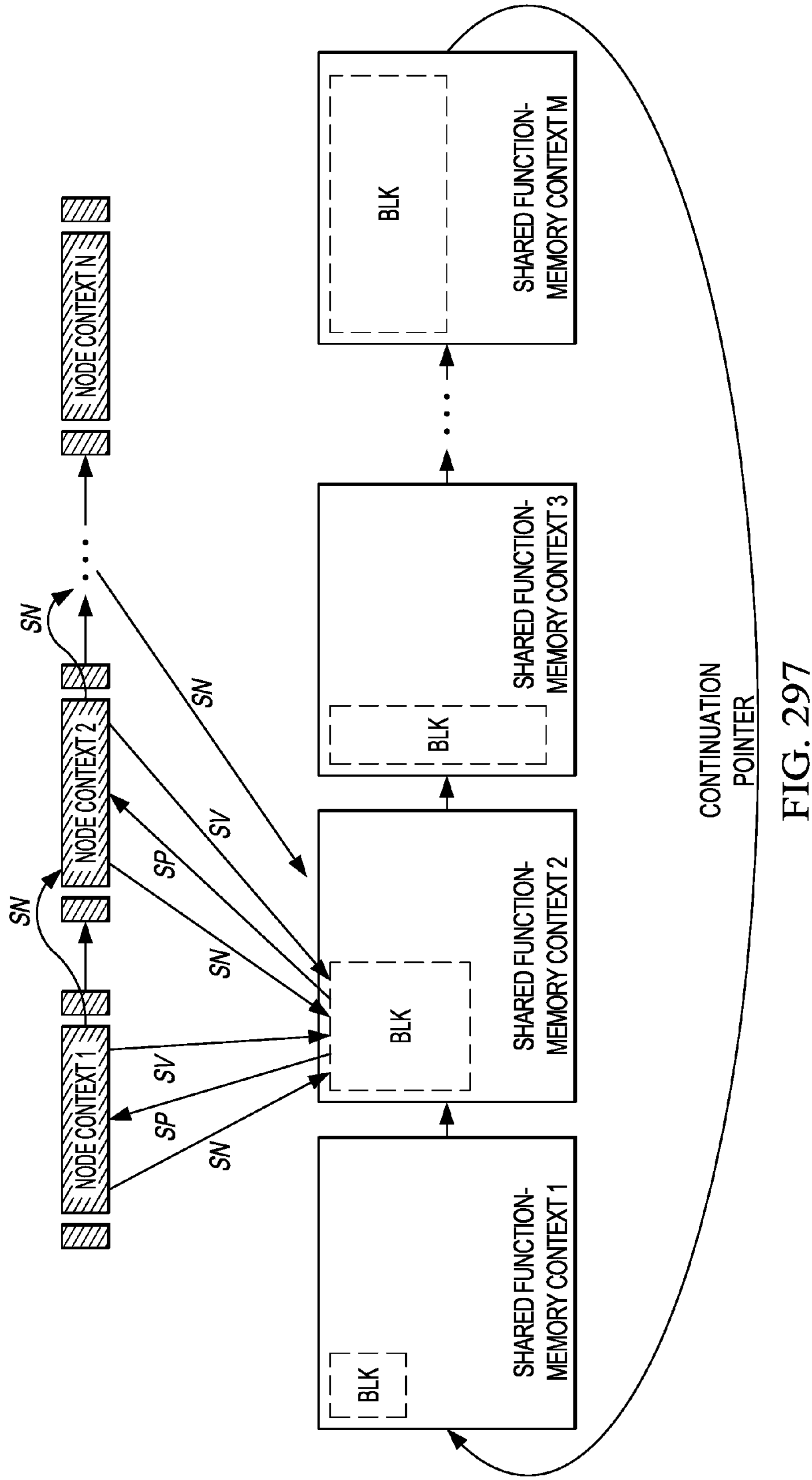
Figure 298:
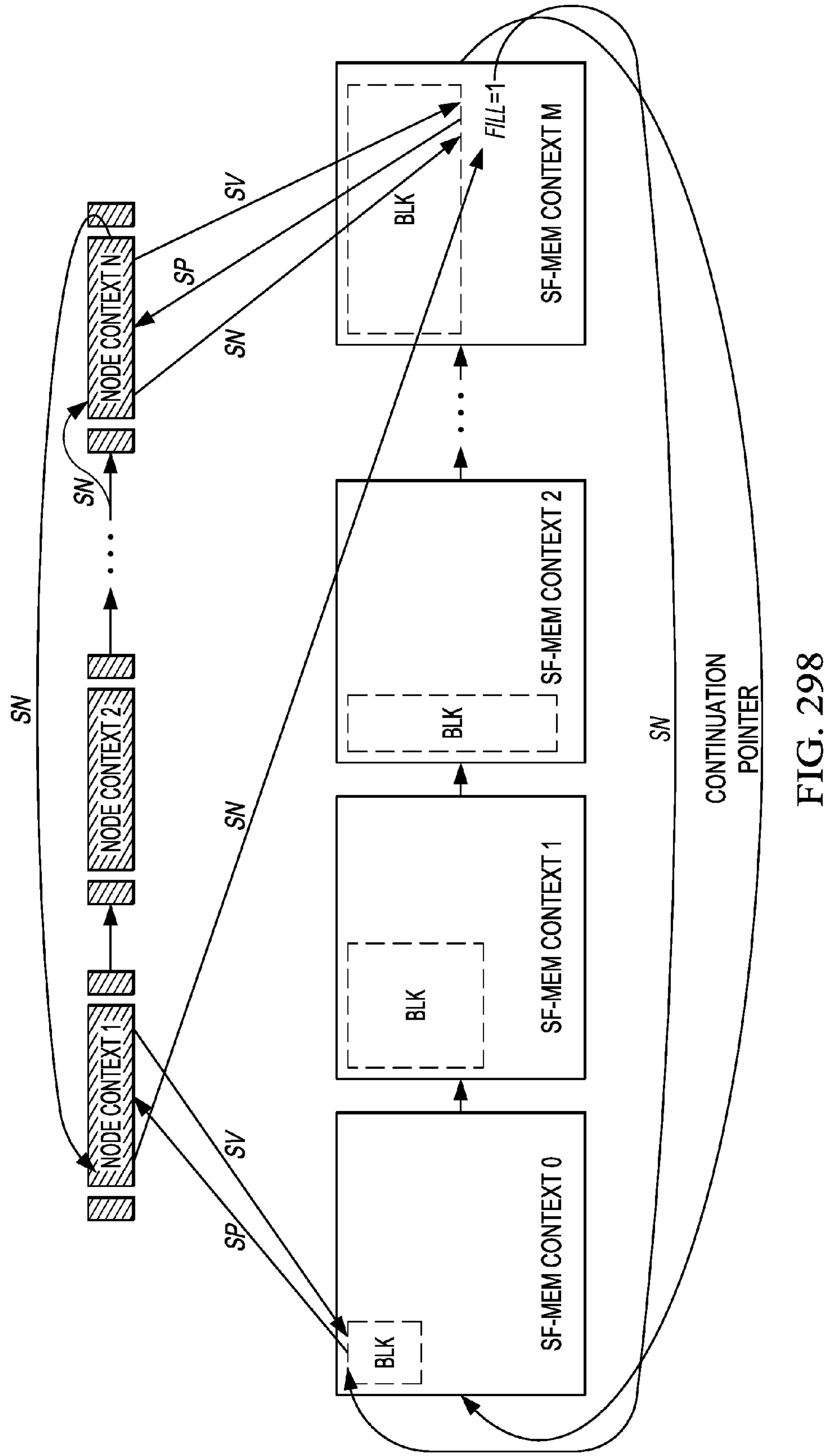
Figure 299:
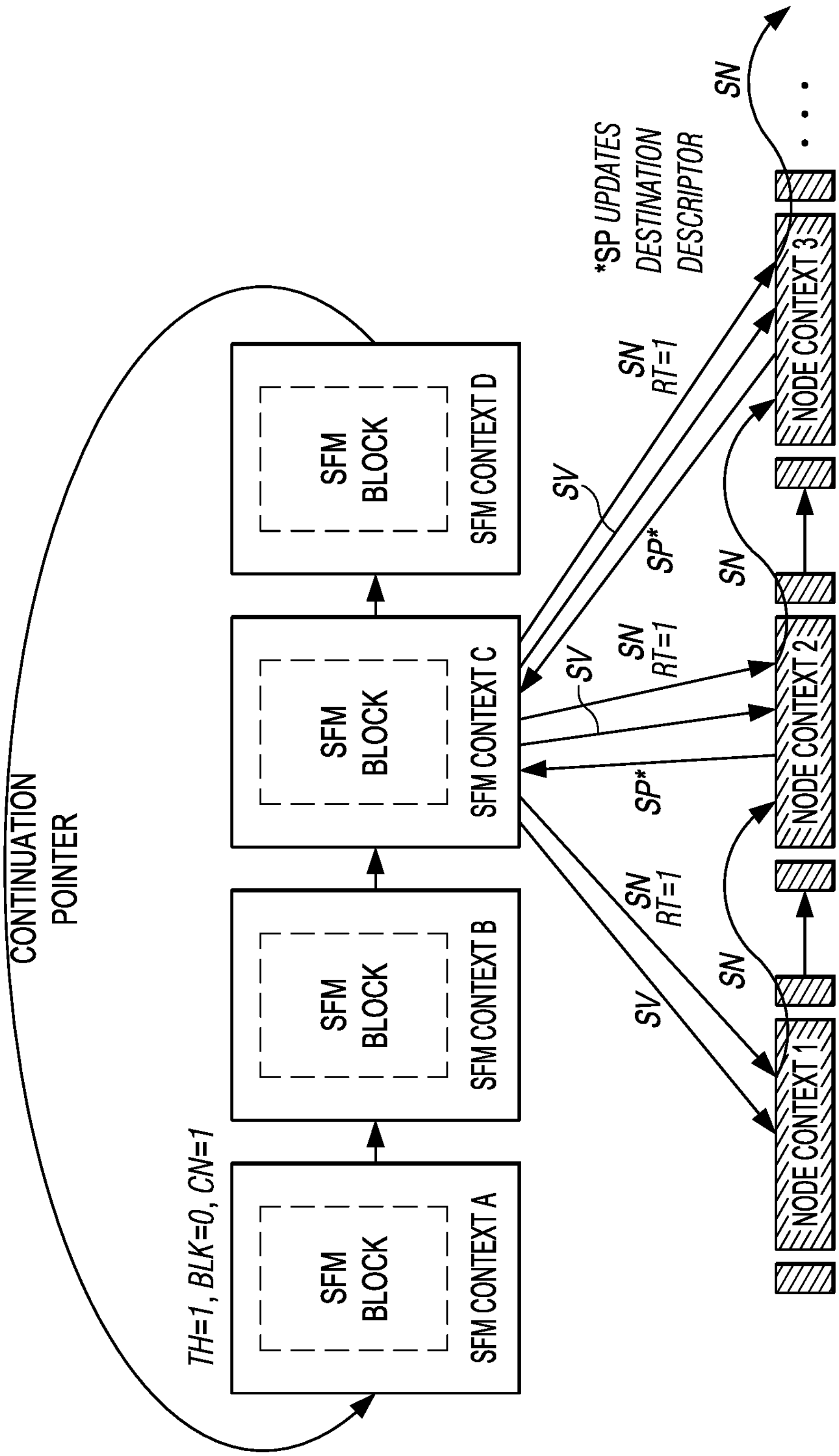
Figure 300:
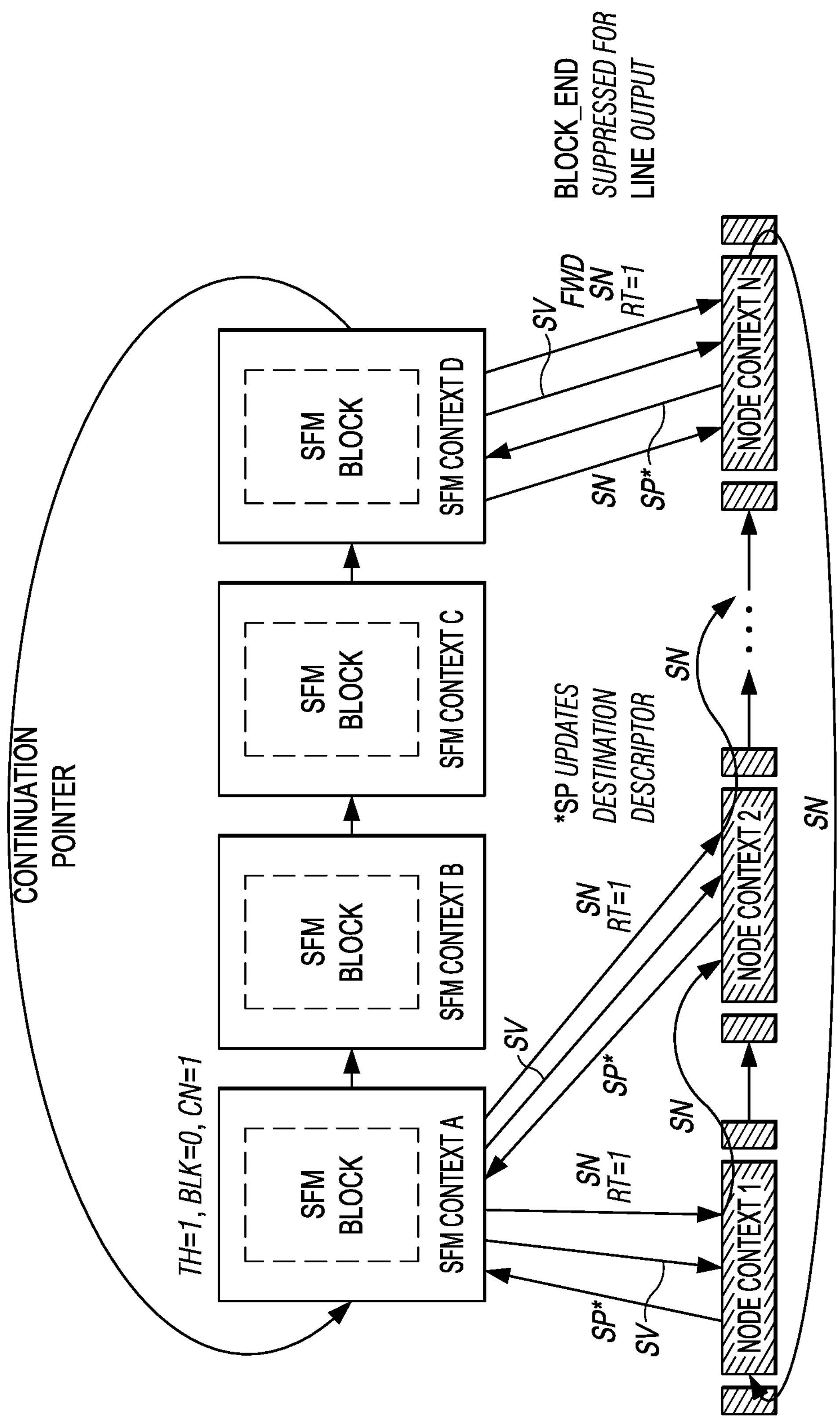
Figure 301:
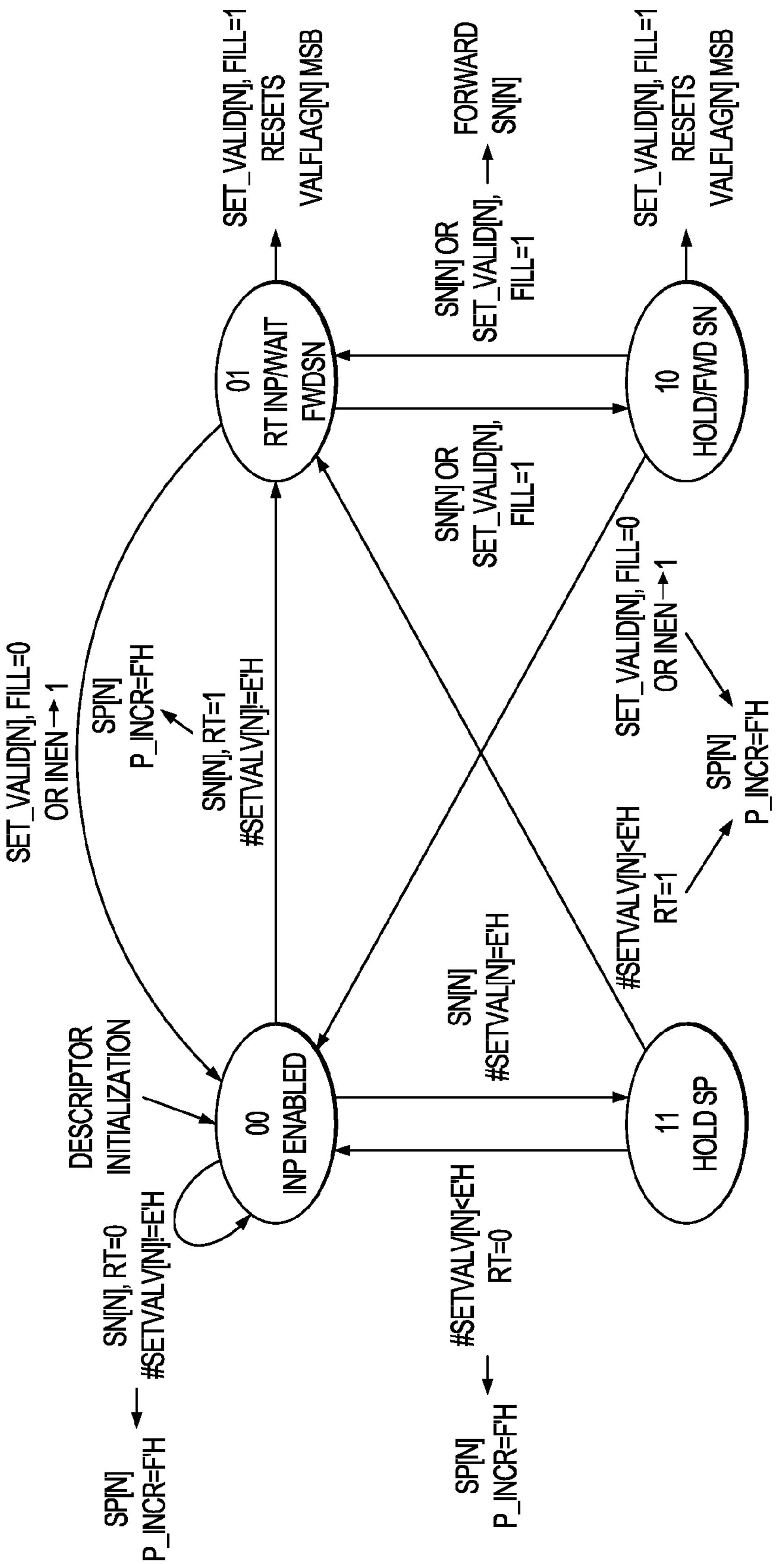
Figure 302:
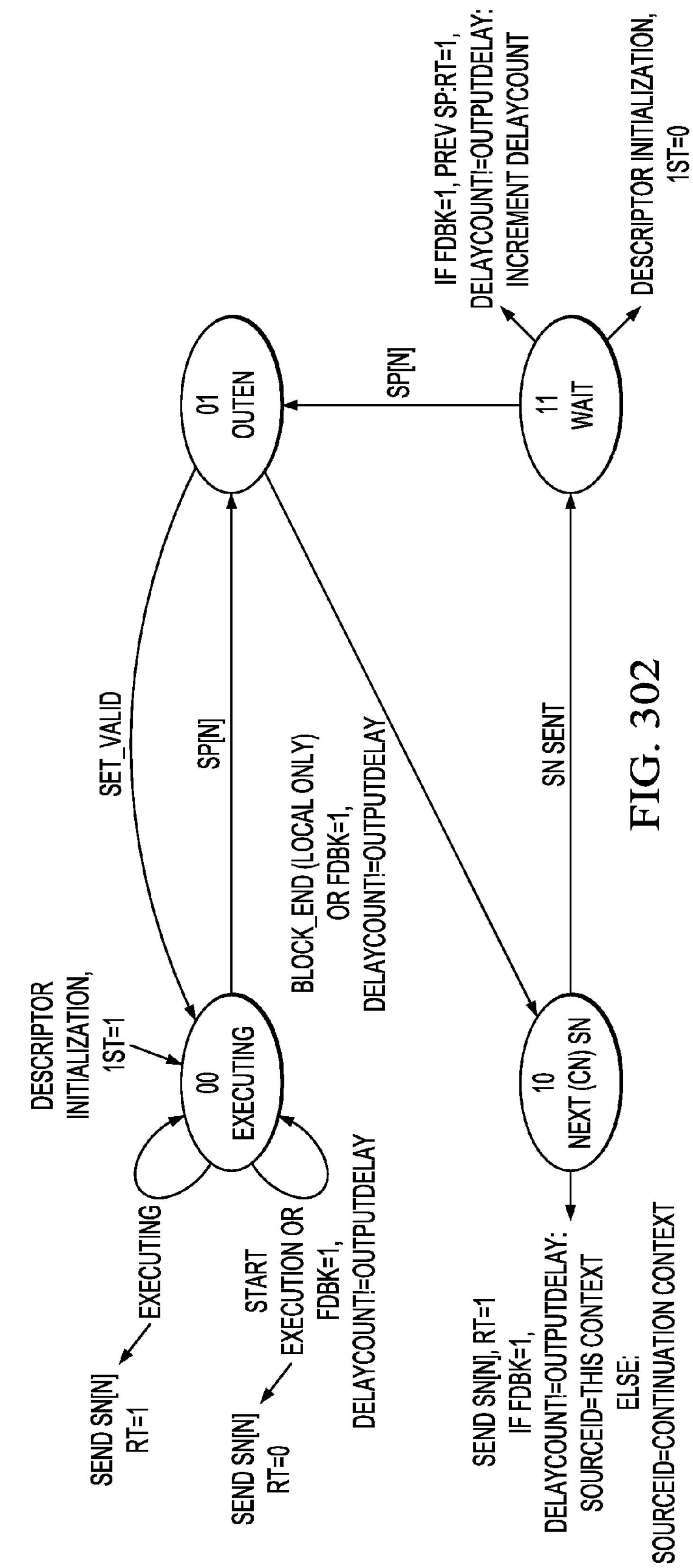
Figure 303:
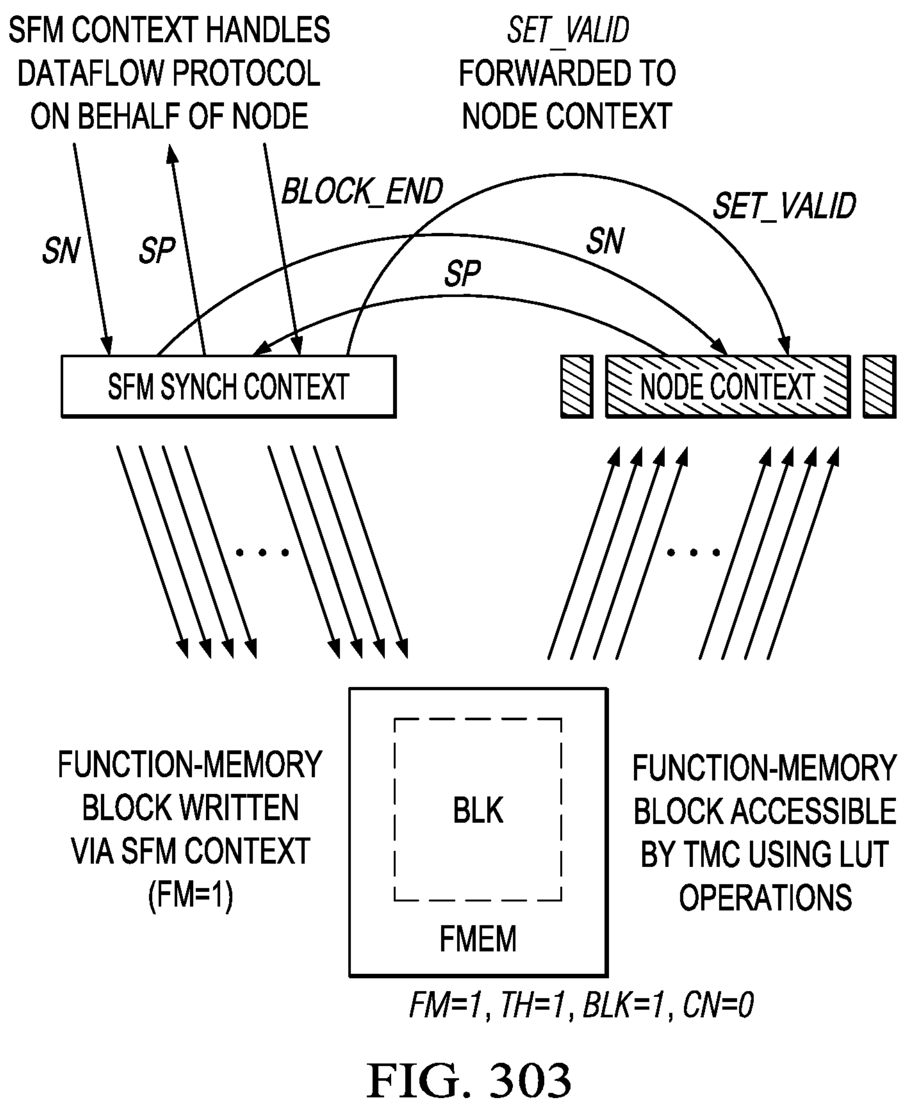
Figure 304:
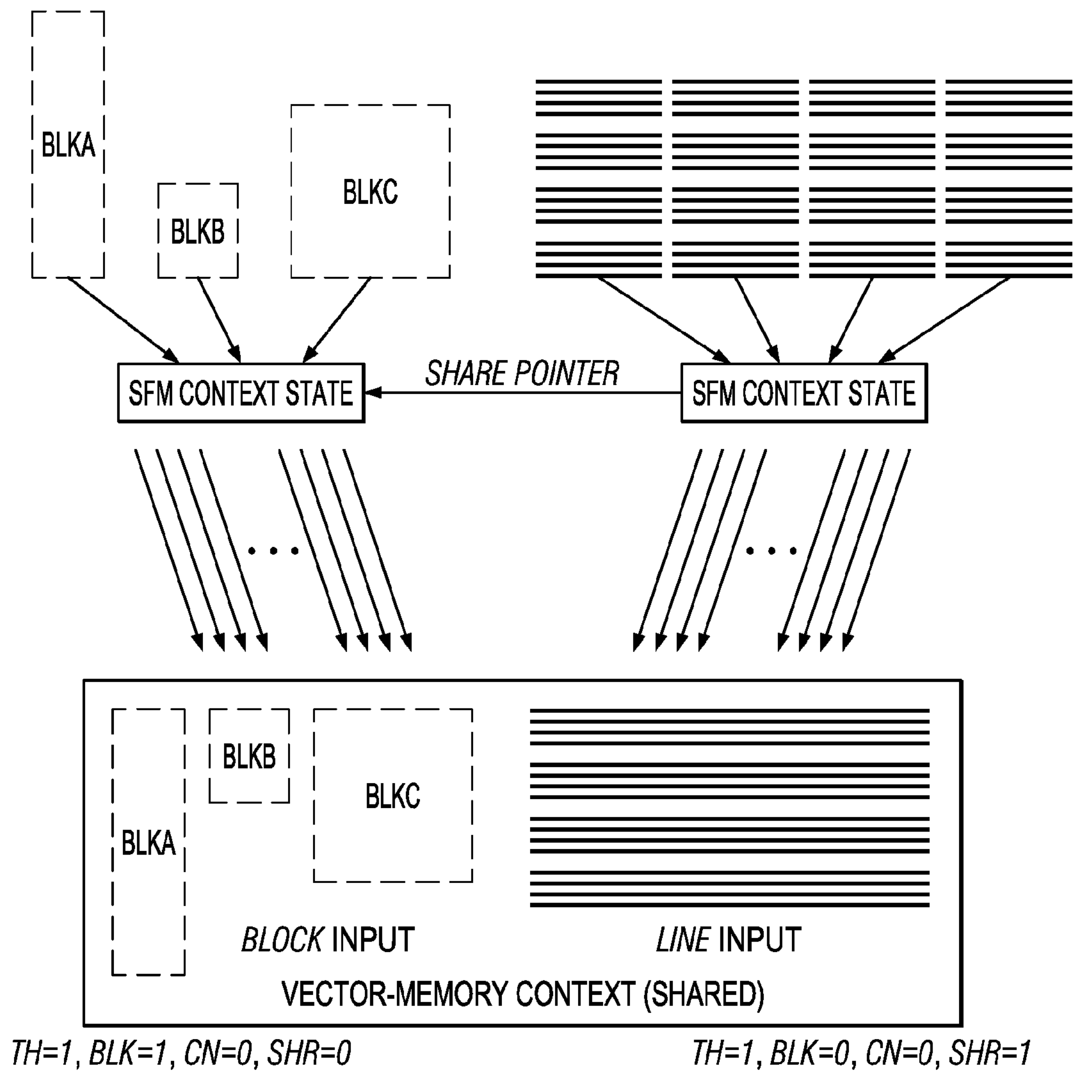
Figure 305:
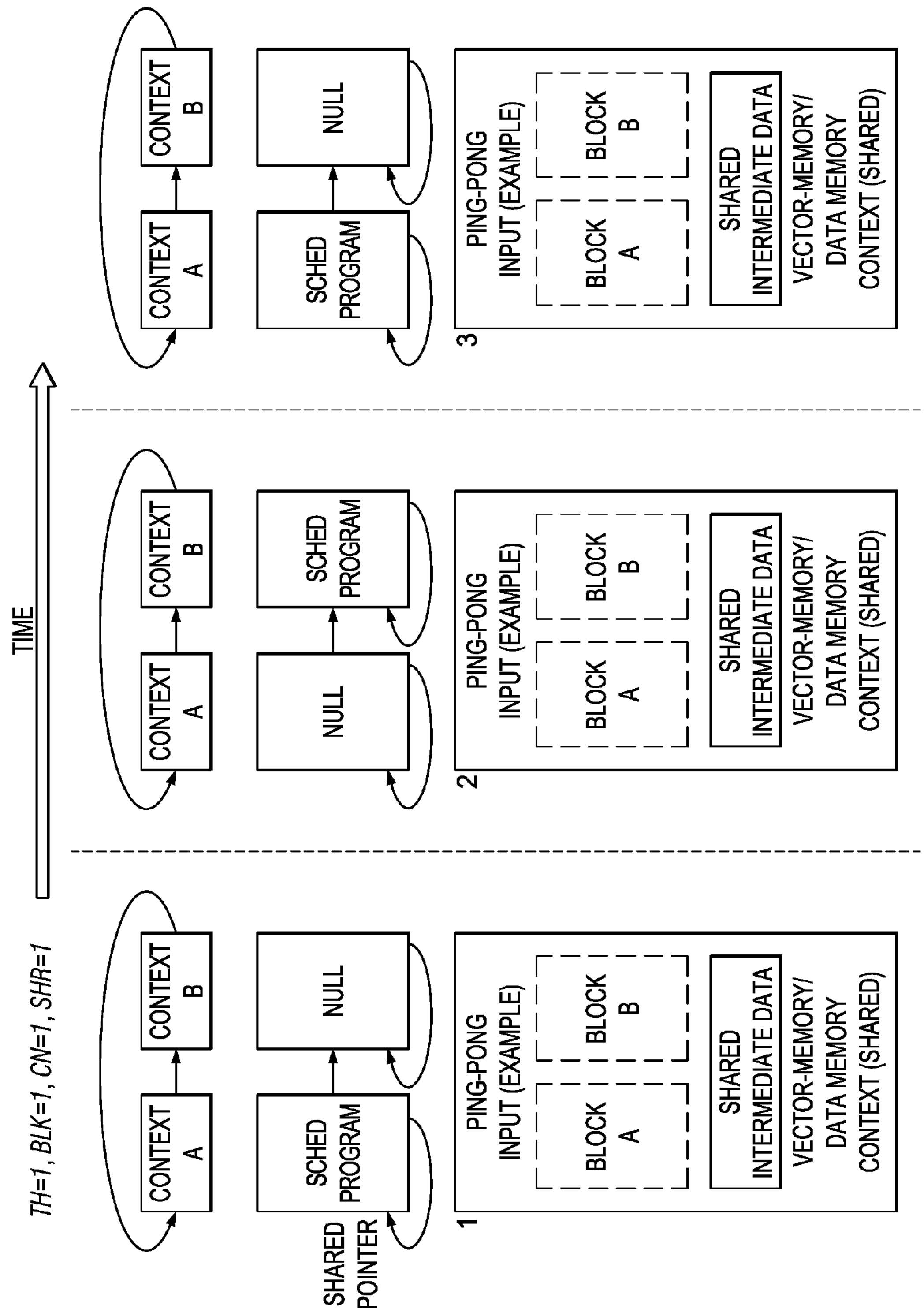
Figure 306:
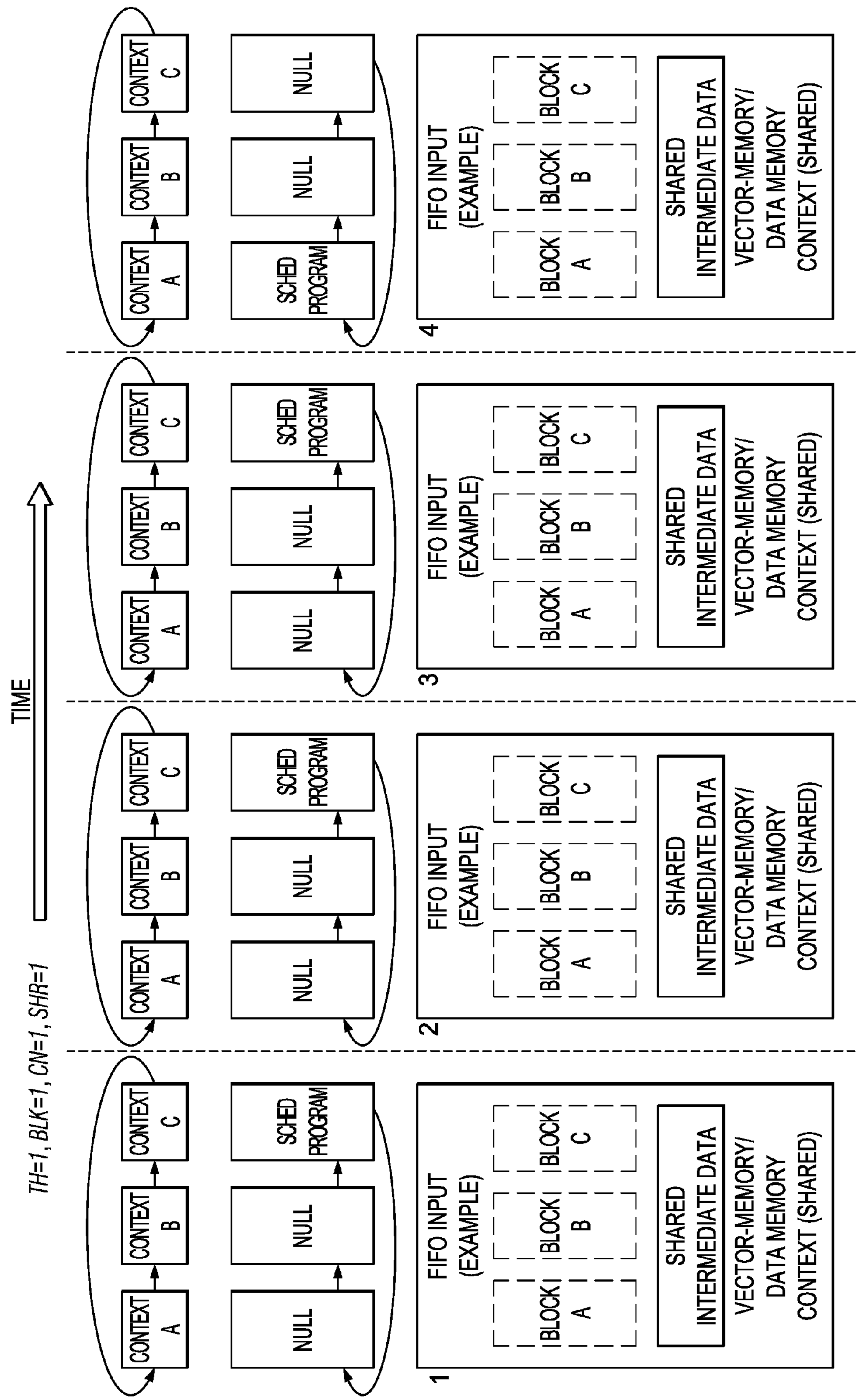
Figure 307:
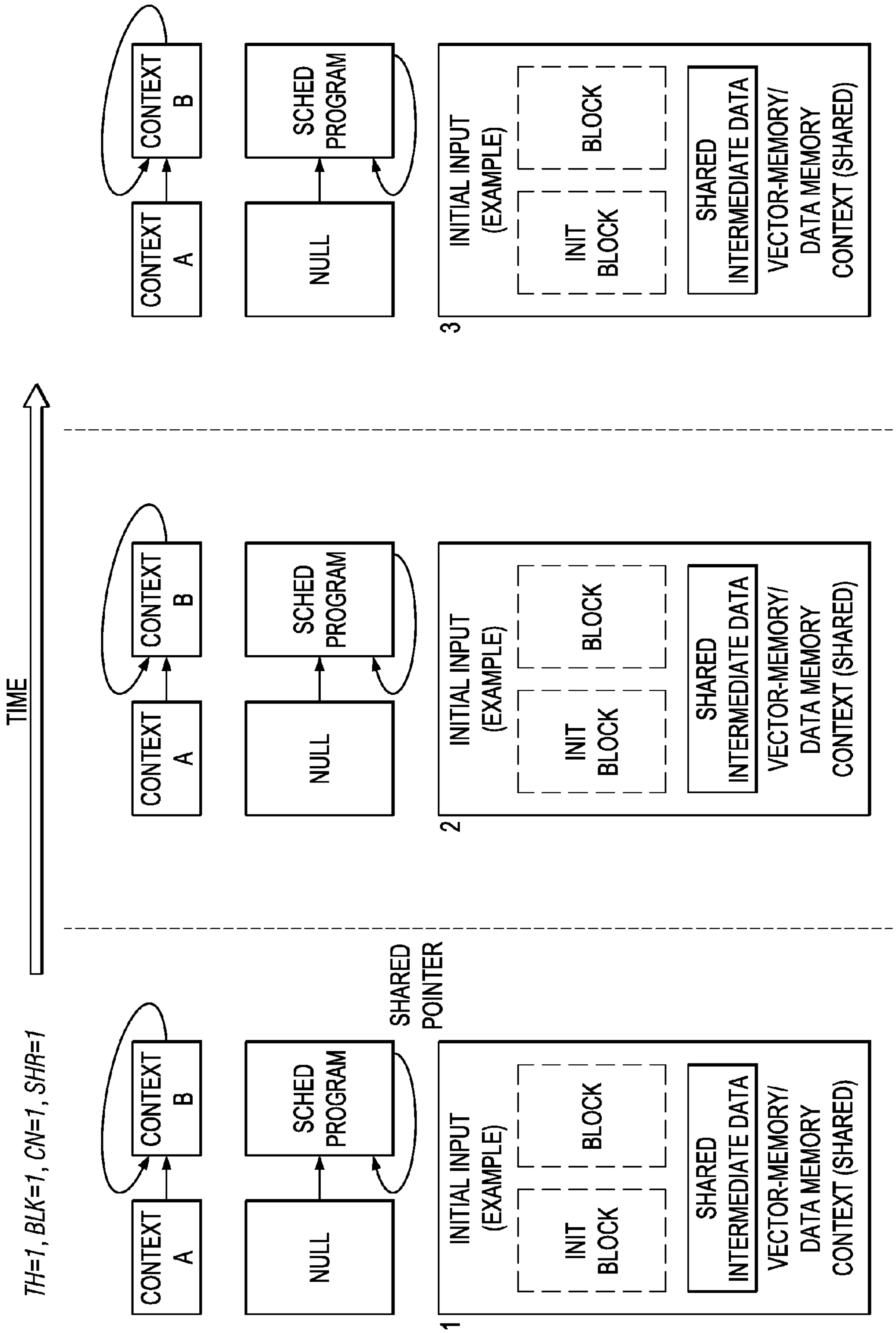
Figure 309:
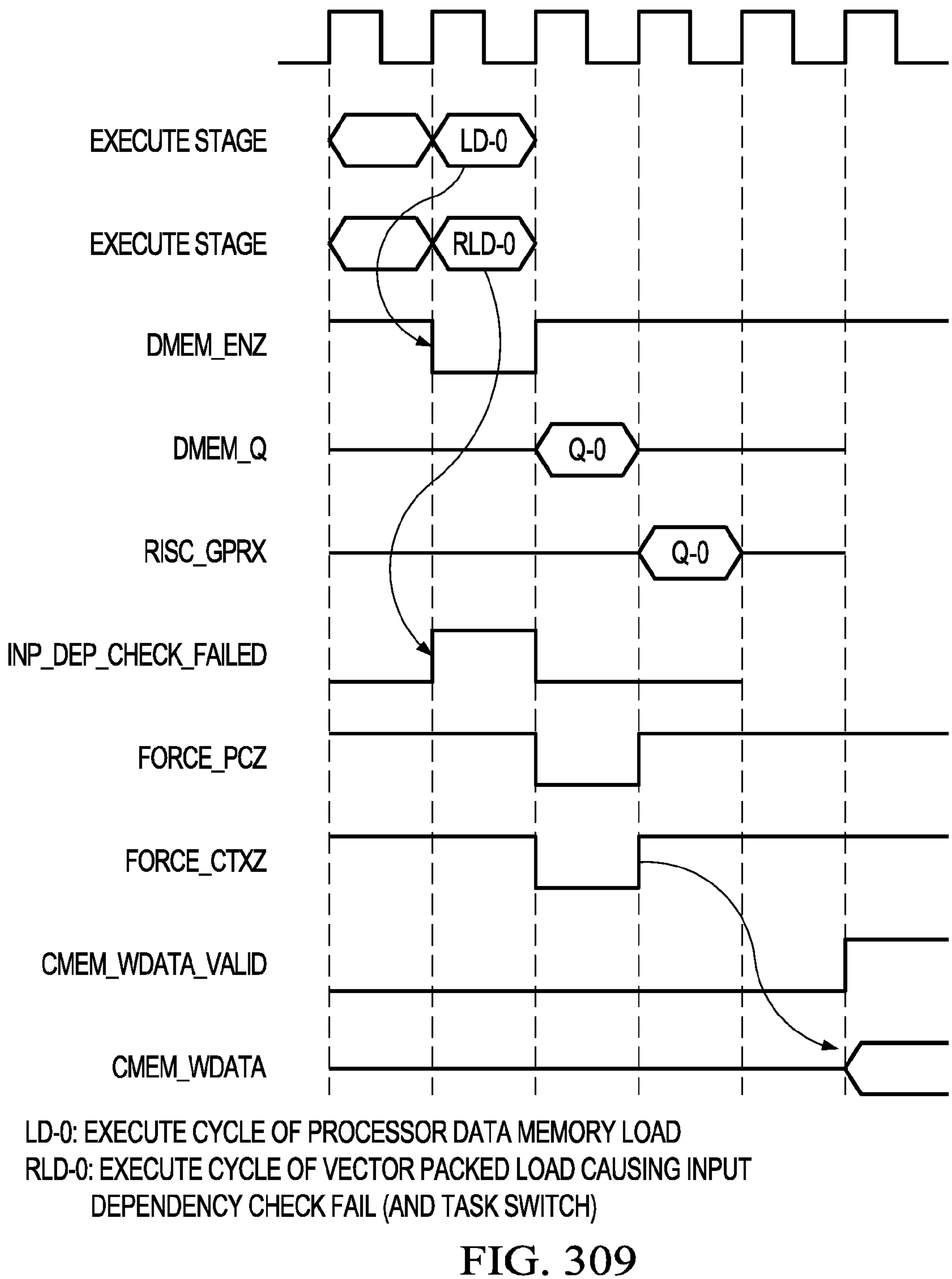
Figure 310:
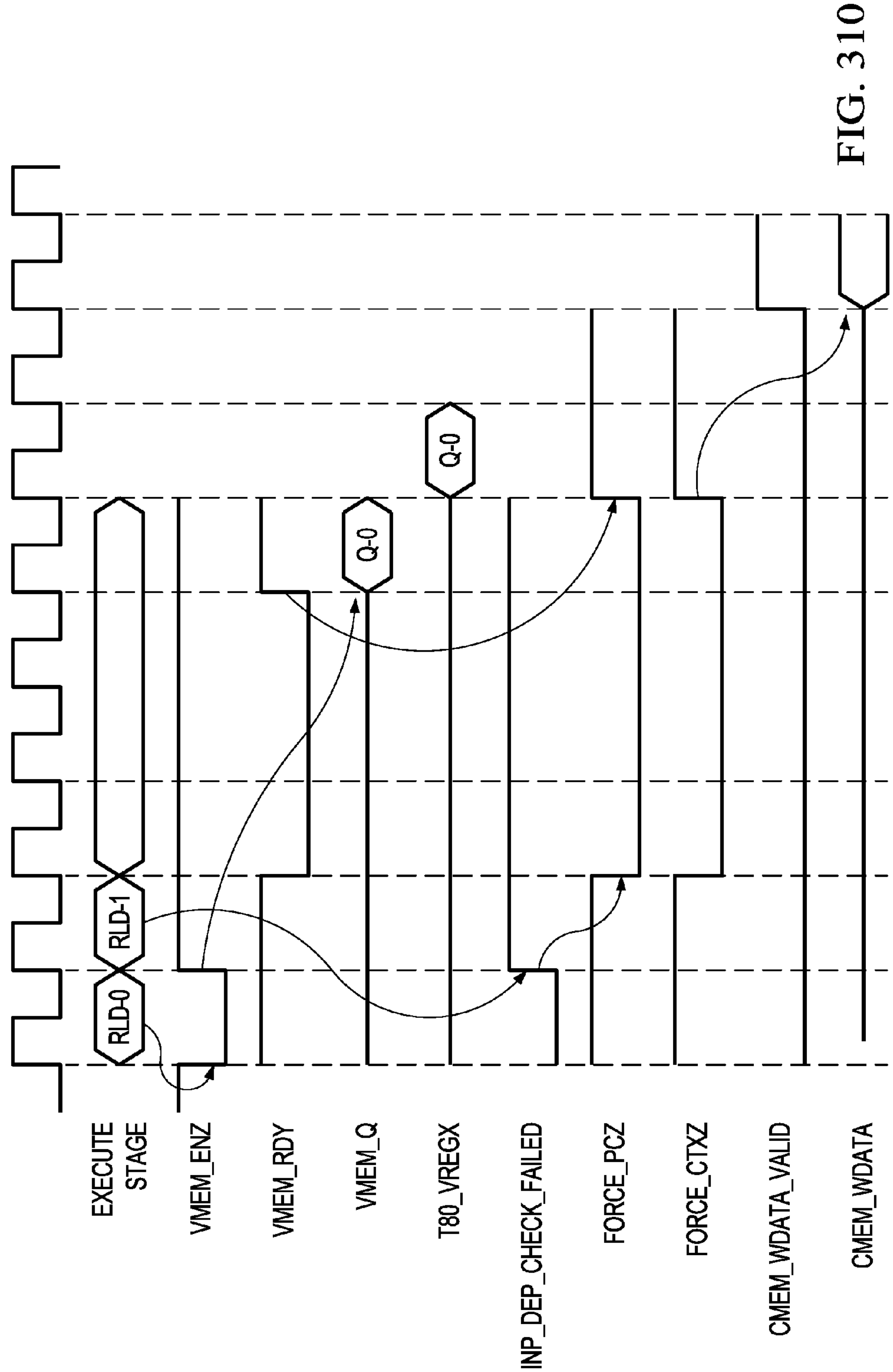
Figure 311:
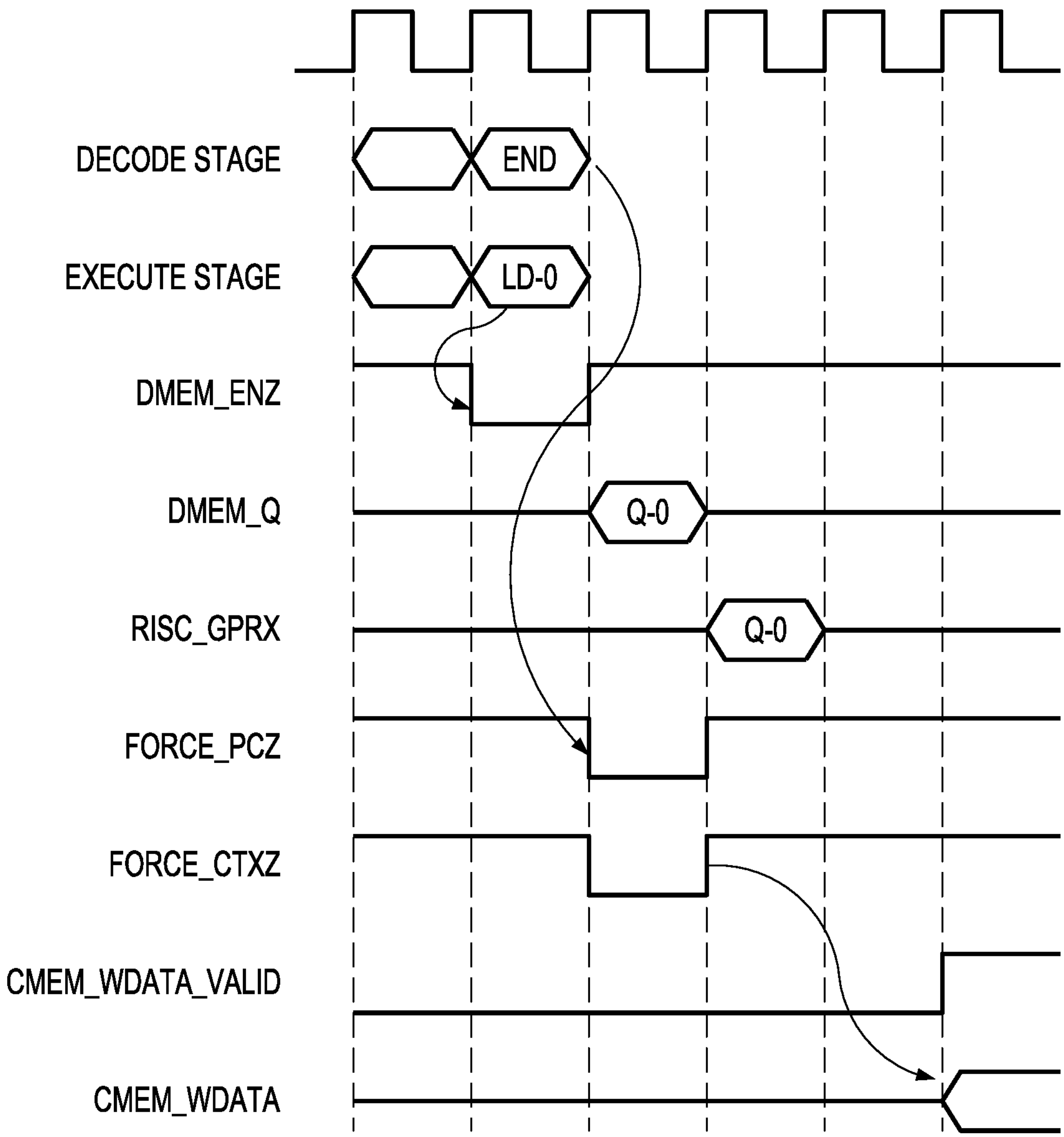
Figure 312:
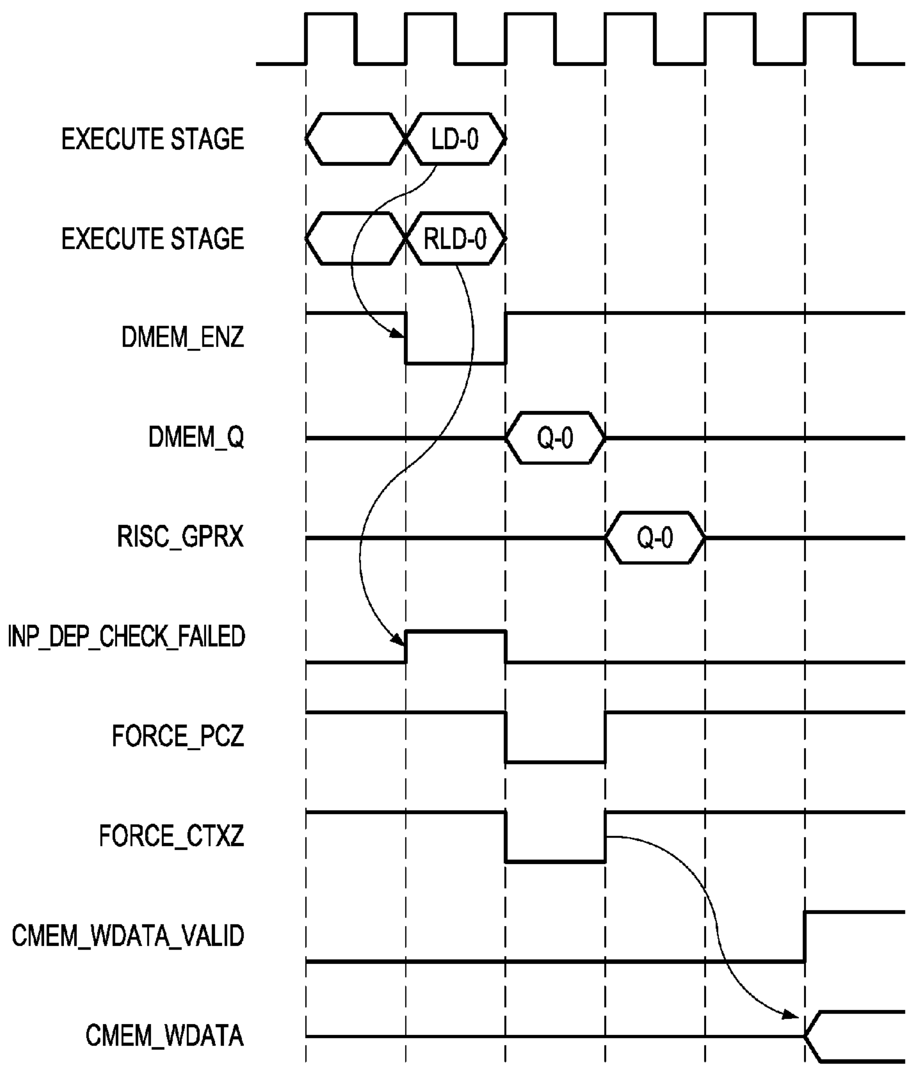
Figure 321:
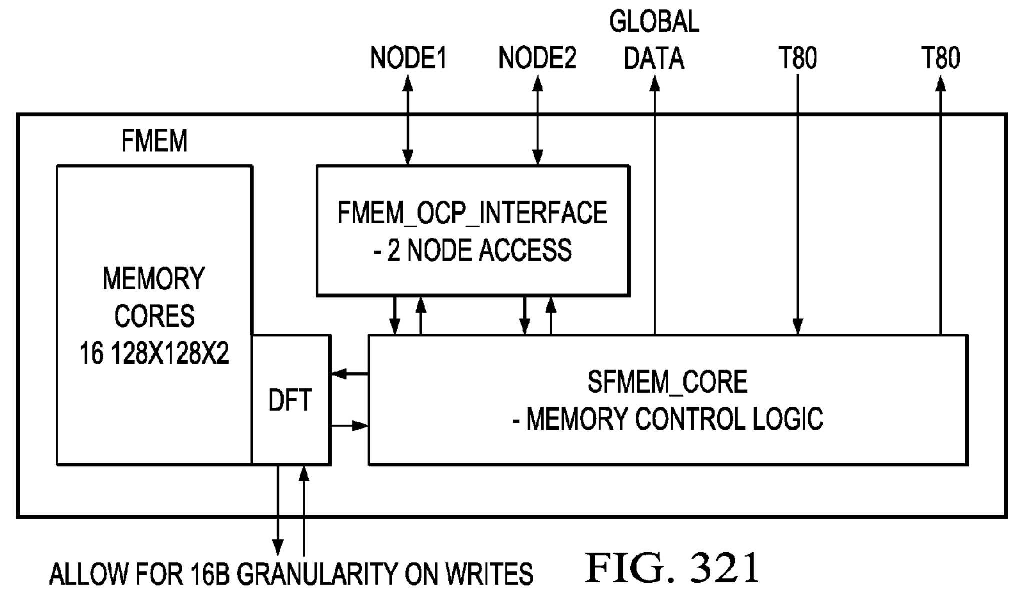
Figure 328:
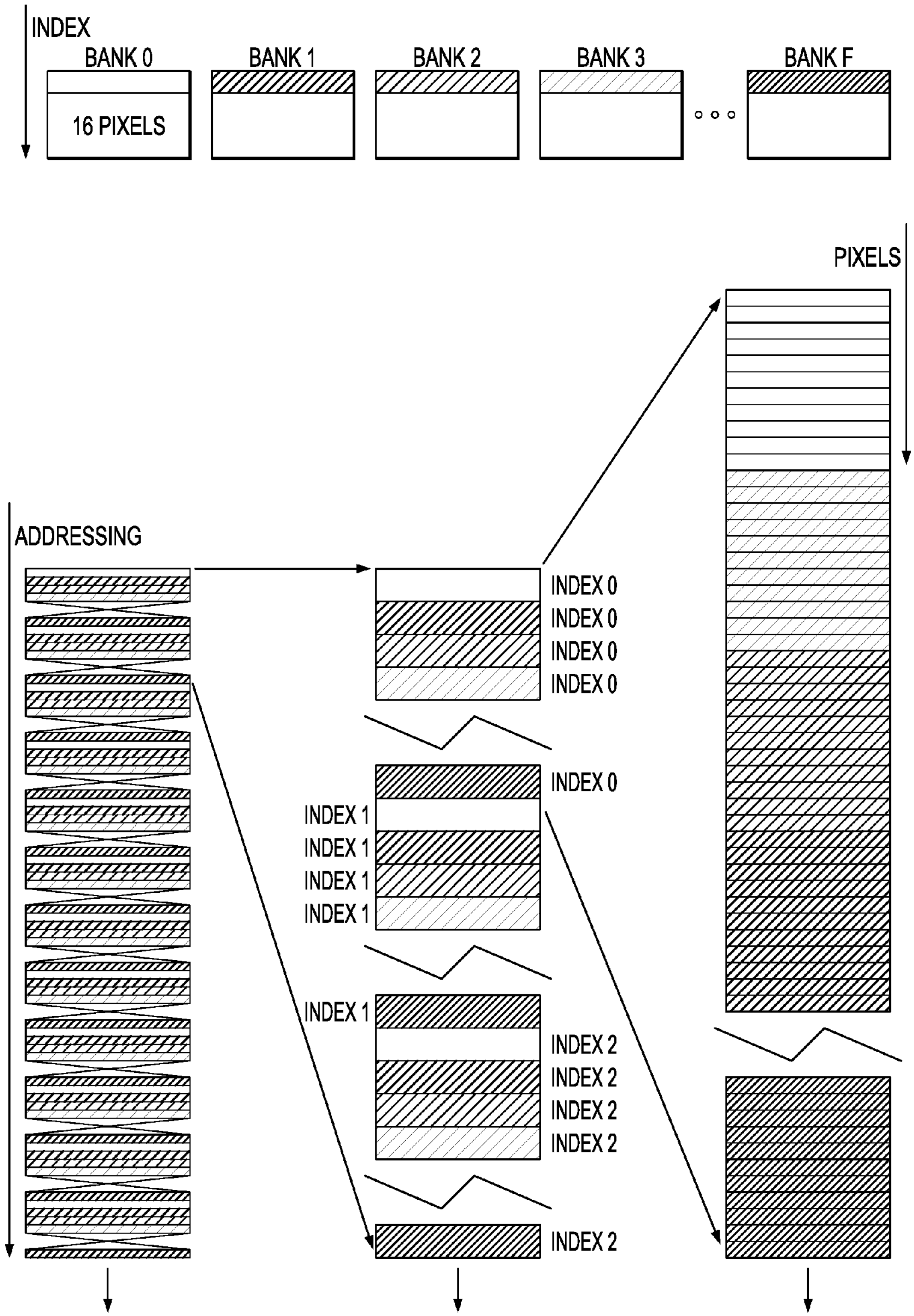
Figure 329:
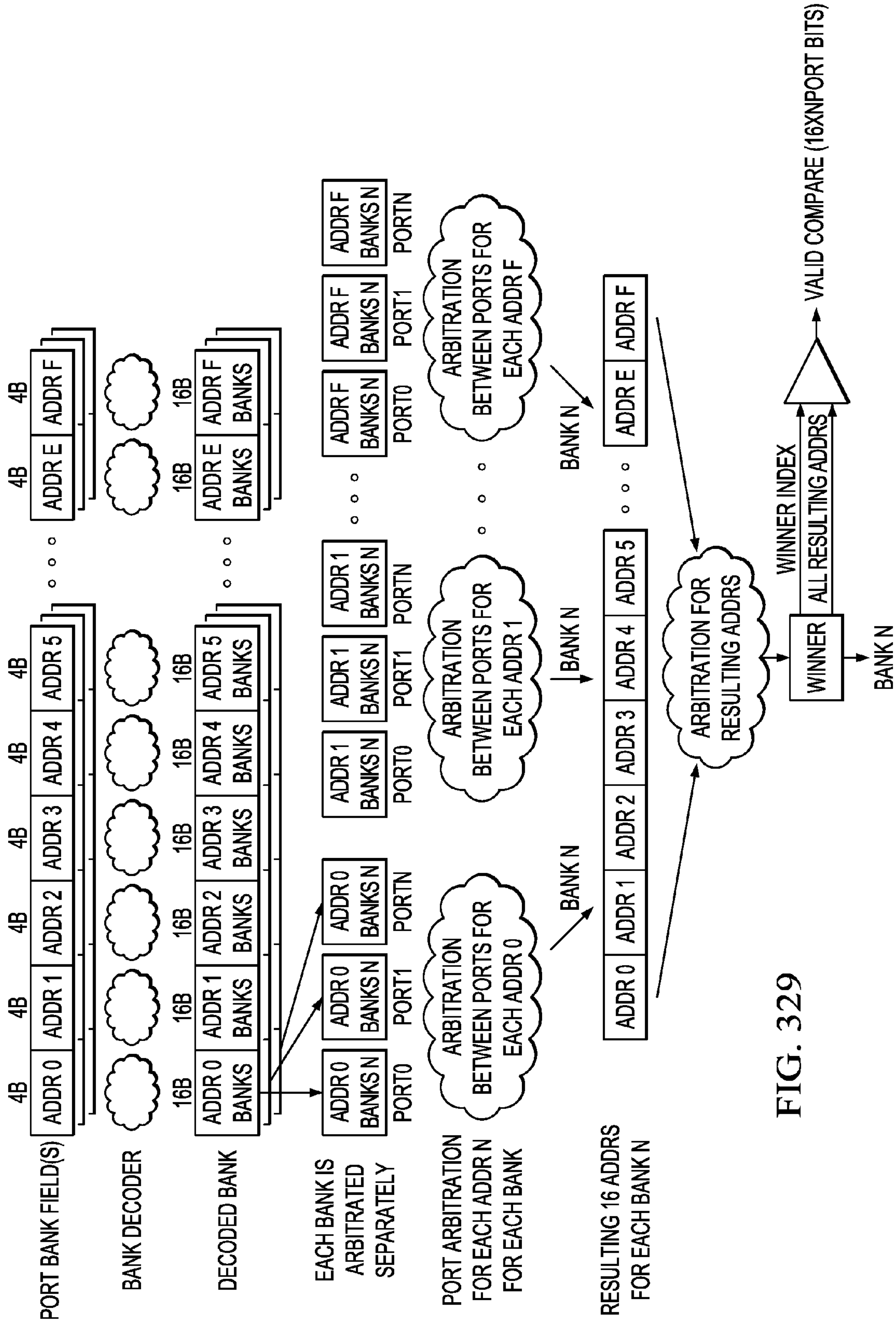
Figure 330:
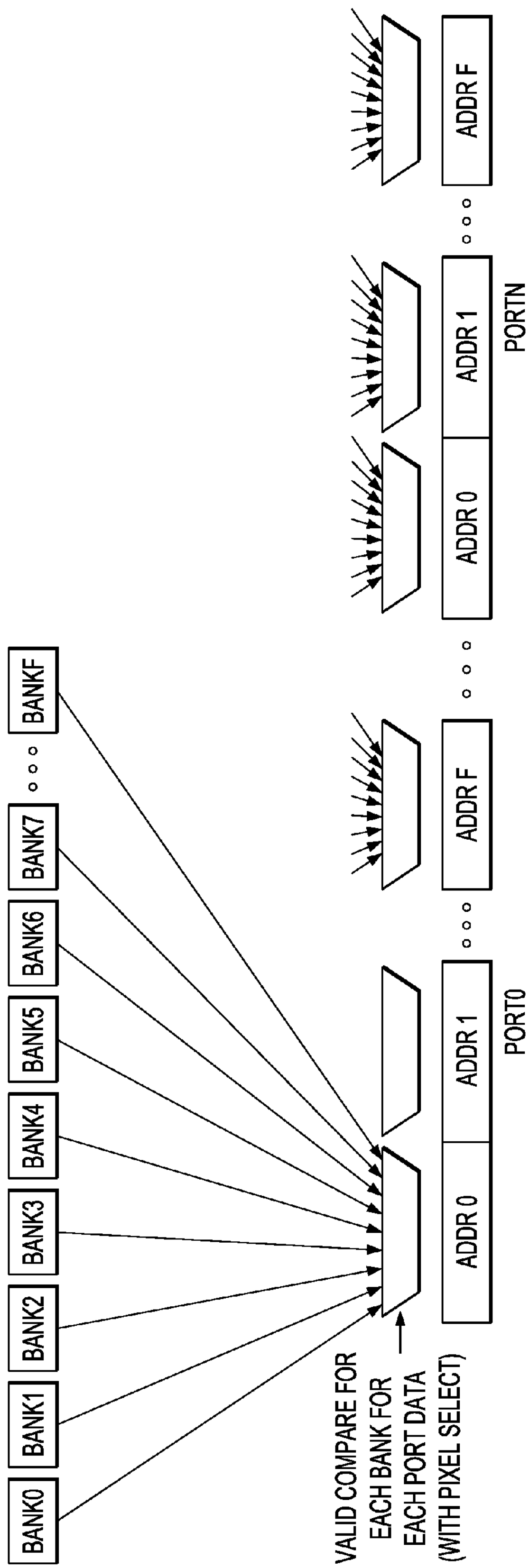
Figure 331:
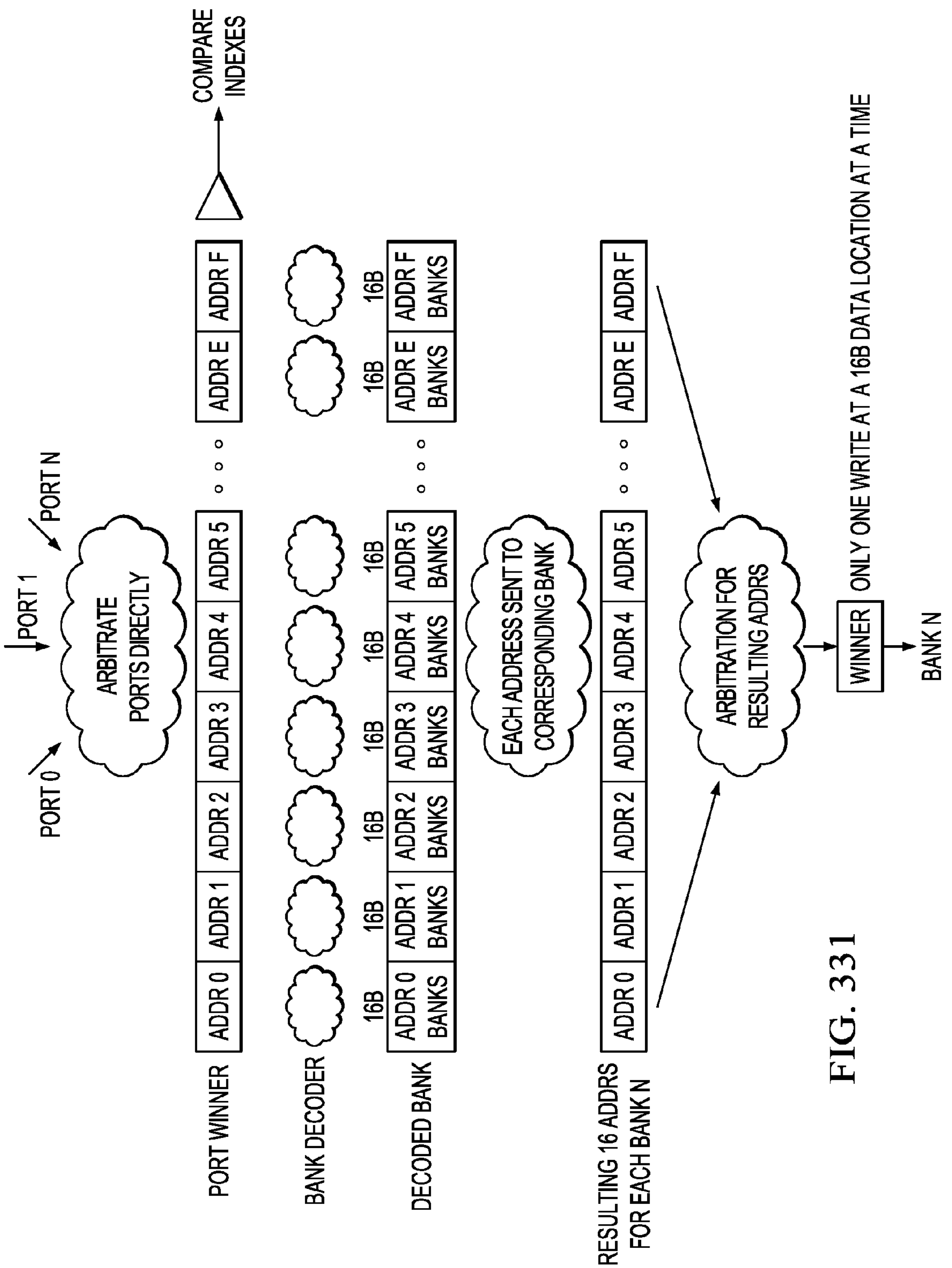
Figure 332:
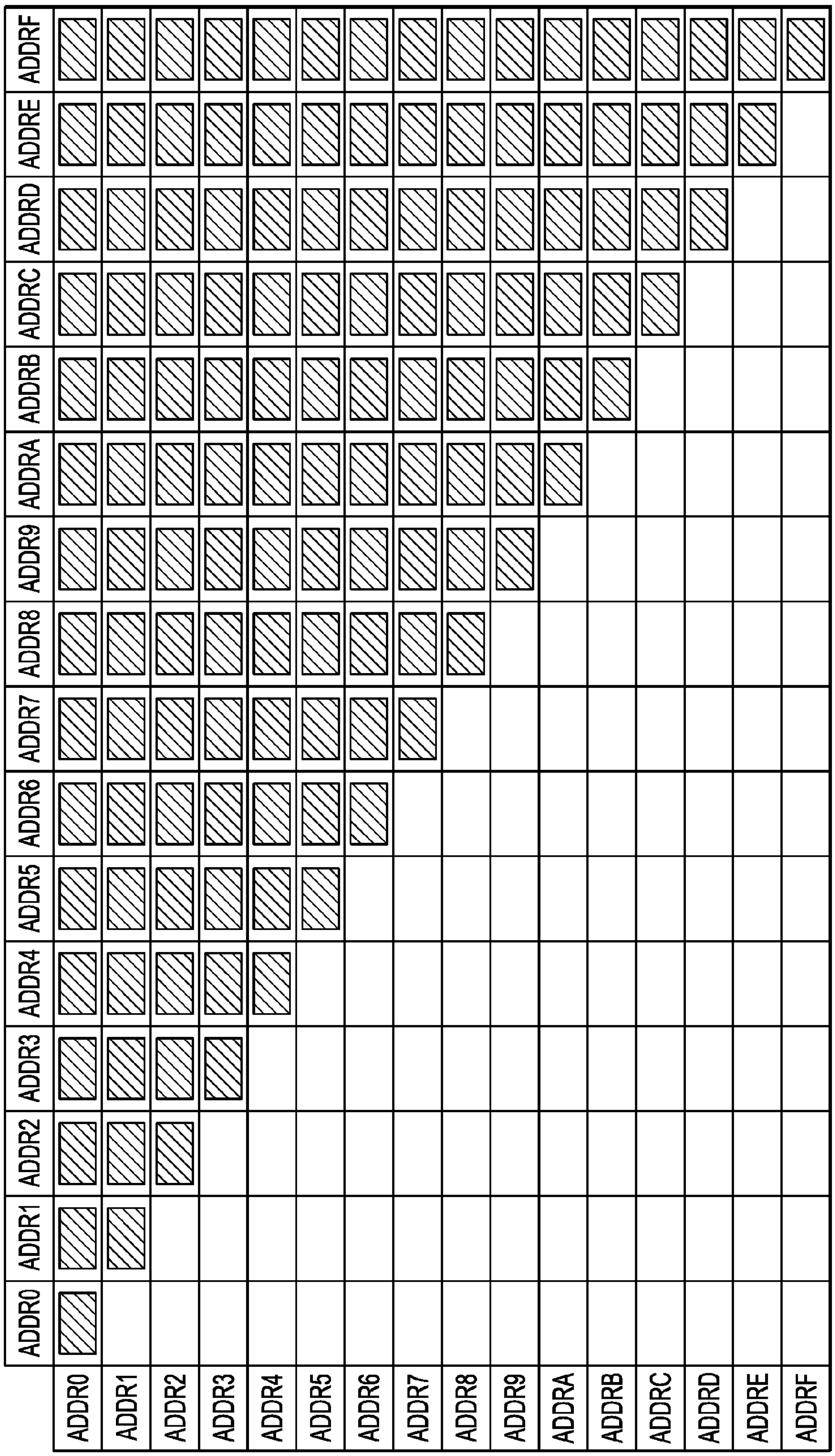
Figure 333:
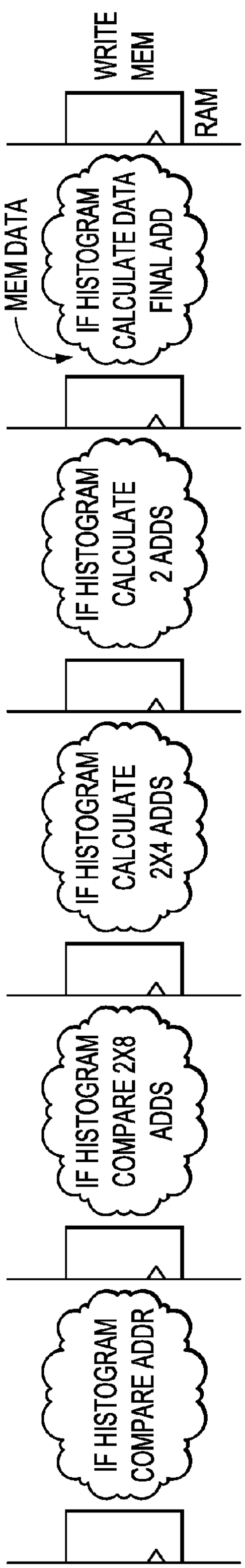
Figure 334:
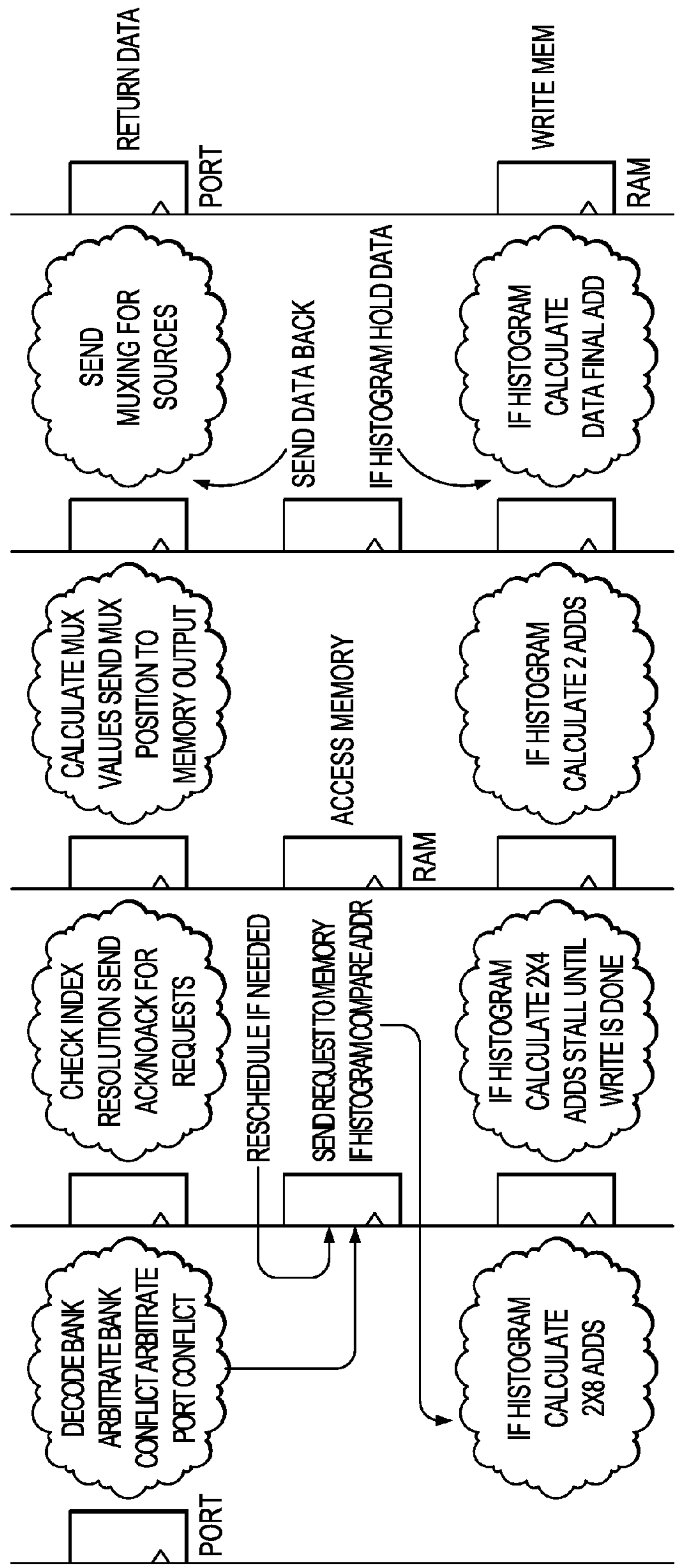
Figure 335:
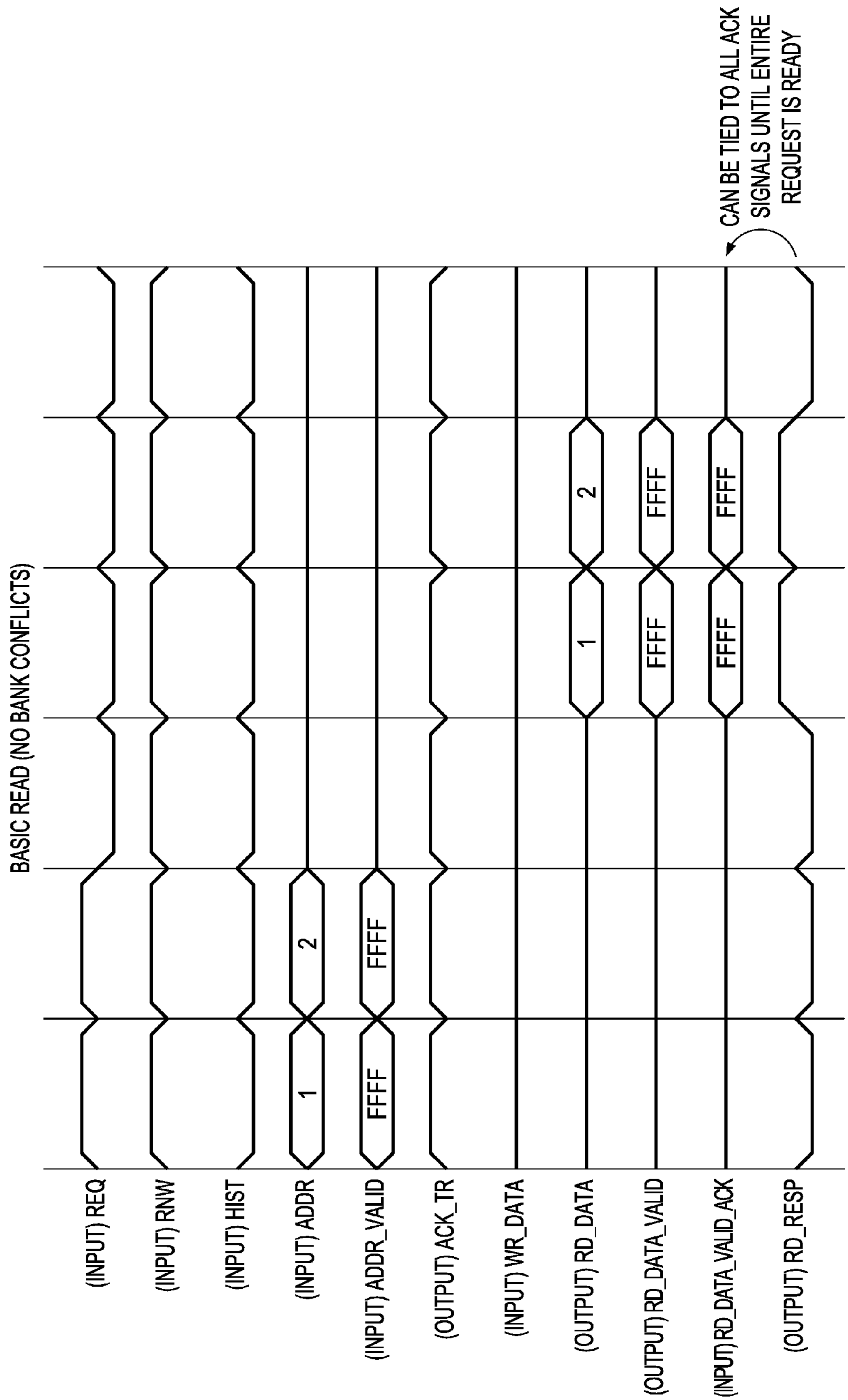
Figure 336:
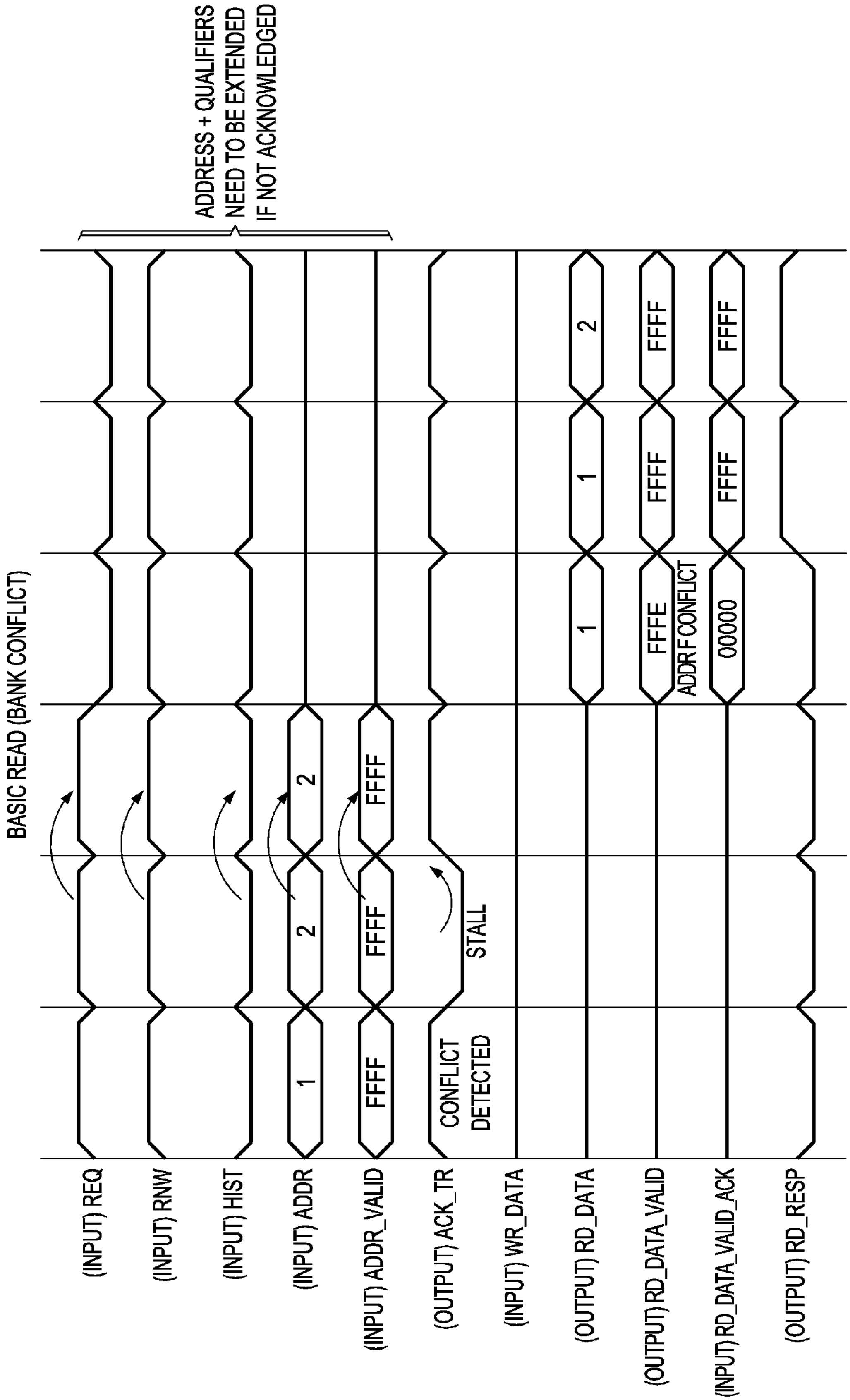
Figure 337:
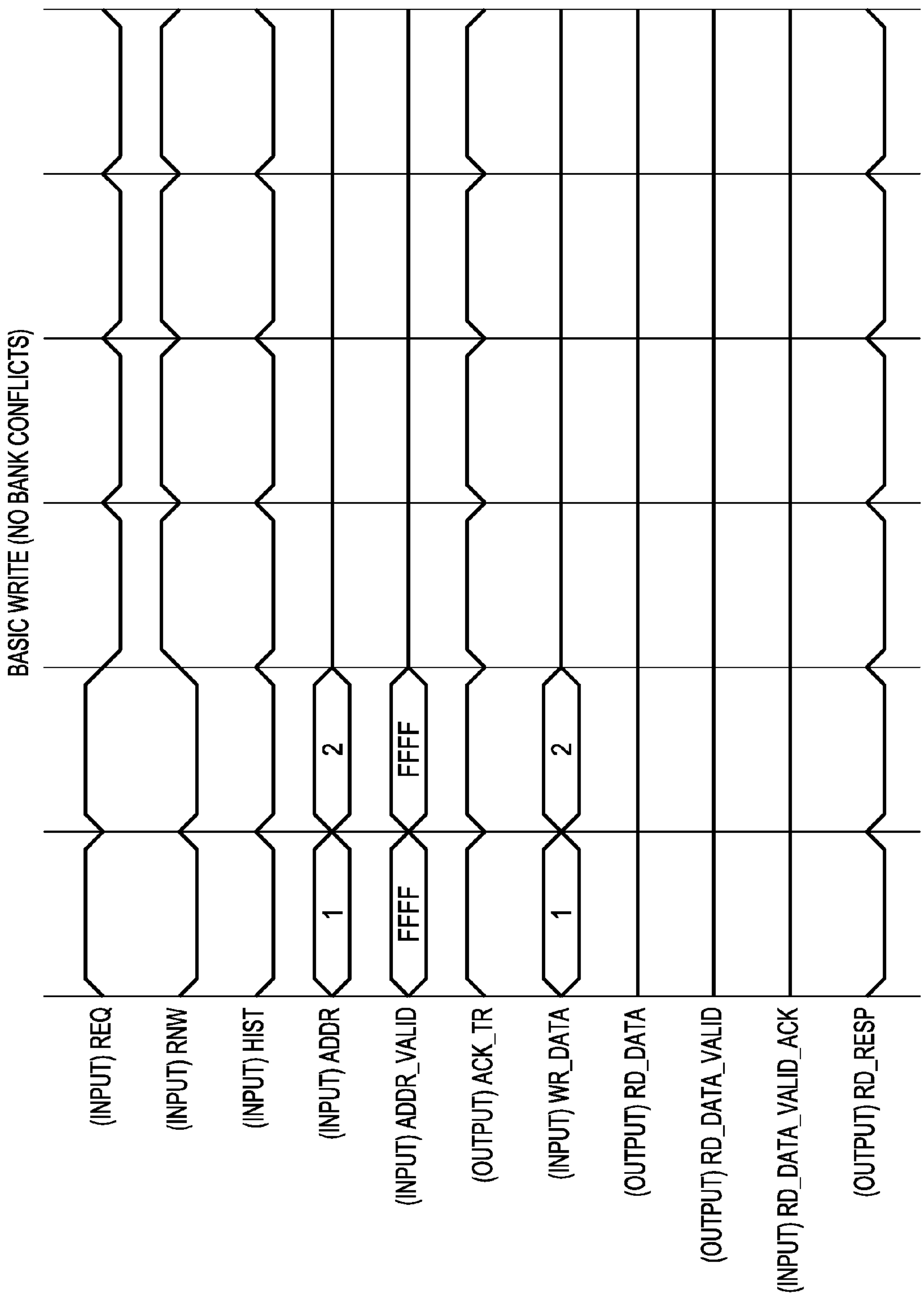

FIG. 223 is an example of a Node State Read Response message;

FIG. 224 is a diagram of an arbiter;

FIGS. 225 to 228 are examples of the supported OCP protocol for single writes (posted or non-posted) with idle cycles, back-to-back single writes (posted or non-posted) with no idle cycles, single read with idle cycles, and single read with no idle cycles can, respectively;

FIGS. 229 and 230 are a diagram of the control node sending written entries in a "packed" form;

FIG. 231 is a diagram of termination headers for nodes and for threads;

FIG. 232 is a diagram of a packed format the message queue generally expects for payload data;

FIG. 233 is a diagram of an action or message generally comprised of a header and a message payload;

FIG. 234 is a diagram of a special action update message for control node memory;

FIG. 235 is a diagram of an example of a trace architecture;

FIGS. 236 to 245 are diagrams of examples of trace messages;

FIG. 246 is an example of reset circuitry;

FIG. 247 is a diagram depicting examples of clock domains;

FIG. 248 is a diagram depicting an example of clock controls;

FIG. 249 is a diagram depicting an example of interrupt circuitry;

FIG. 250 is an example of error handling by the event translator;

FIG. 251 is an example of a format for a node instruction memory initialization message;

FIG. 252 is an example of a format for a node control initialization message;

FIG. 253 is an example of a format for a GLS control initialization message;

FIG. 254 is an example of a format for an SFM control initialization message;

FIG. 255 is an example of a format for an SFM function-memory initialization message;

FIG. 256 is an example of a format for a control node configuration read thread message;

FIG. 257 is an example of a format for an update data memory message;

FIG. 258 is an example of a format for an update action list RAM message;

FIG. 259 is an example of a format for a schedule node program message;

FIG. 260 is a block diagram of shared function-memory;

FIG. 261 is a diagram of the format of the LUT and histogram table descriptors;

FIG. 262 is a diagram of the SIMD data paths for the shared function-memory;

FIG. 263 is a diagram of a portion of one SIMD data path;

FIG. 264 is an example of address formation;

FIGS. 265 and 266 are an examples of addressing performed for vectors and arrays that are explicitly in a source program;

FIG. 267 is an example of a program parameter;

FIG. 268 is an example of how horizontal groups can be stored in function-memory contexts;

FIG. 269 is an example of pixel data from a node data memory context (Line datatype) mapped to a single shared function-memory context;

FIG. 270 is an example of pixel data from a node data memory contexts (Line datatype) is mapped to a single shared function-memory context;

FIG. 271 is an example of a high-level view of this iteration, oriented to the node view;

FIG. 272 is an example of a detailed view of iteration of FIG. 270;

FIG. 273 is an example relating vertical vector-packed addressing;

FIG. 274 is an example relating horizontal vector-packed addressing;

FIG. 275 is an example of boundary processing in the vertical direction;

FIG. 276 is an example of boundary processing in the horizontal direction;

FIG. 277 is an example of the operation of the instructions that compute the vertical index for Block data;

FIG. 278 is shows the operation of the instructions that perform a vector-packed access of Block data (loads and stores use the same addressing);

FIG. 279 is an example of the organization for the SFM data memory;

FIG. 280 is a example of the format for a context descriptor stored in SFM data memory;

FIG. 281 is an example of the format context descriptor for function-memory;

FIG. 282 is an example of the dataflow state entry for an SFM context;

FIG. 283 is an example of how the SFM wrapper tracks valid Line input;

FIG. 284 is an example of a dataflow protocol for circular block inputs—startup;

FIG. 285 is an example of a dataflow protocol for circular block inputs—stead-state line fill;

FIG. 286 is an example of vertical boundary processing;

FIG. 287 is an example of horizontal boundary processing;

FIG. 288 is an example of variable-sized block inputs to continuation contexts;

FIG. 289 is an example of a dataflow protocol for a continuation context;

FIG. 290 is an example of variable-sized block inputs to continuation contexts;

FIG. 291 is an example of source thread context transitioning continuation contexts;

FIG. 292 is an example of sequencing multiple source node contexts to a shared function-memory context;

FIG. 293 is an example of multiple source node contexts transitioning continuation contexts;

FIG. 294 is an example of source continuation contexts transitioning thread input;

FIG. 295 is an example of source continuation contexts transitioning multiple node contexts;

FIG. 296 is an example of the OutSt transitions for Block output from an SFM context;

FIG. 297 is an example of the sequence of dataflow messages for multiple source node contexts, in a horizontal group, to sequence their input to an SFM context in a continuation group;

FIG. 298 is an example of the sequence of dataflow messages for multiple source node contexts, in a horizontal group, to transition input from one continuation context to the next;

FIG. 299 is an example of the sequence of dataflow messages for an SFM context, in a continuation group, to sequence its output to multiple node contexts in a horizontal group;

FIG. 300 is an example of the sequence of dataflow messages for an SFM context, in a continuation group;

FIG. 301 is an example of the InSt transitions for ordered LineArray input from multiple node source contexts;

FIG. 302 is an example of the OutSt transitions for LineArray output to multiple node destination contexts;

FIG. 303 is an example of the operation of a synchronization context for the input of an function-memory to a node context;

FIG. 304 is an example of the use of a shared SFM context to enable input dependency checking on both Line and Block input;

FIG. 305 is an example of how program scheduling and the share pointer can be used to implement ping-pong block input to the shared context;

FIG. 306 is an example of a more general use of shared continuation contexts;

FIG. 307 is another example of the use of shared continuation contexts;

FIG. 308 is a diagram of dataflow state for shared function-memory context;

FIGS. 309 to 312 are diagrams depicting an example of a task switch;

FIG. 313 is a diagram of a local data memory initialization message;

FIG. 314 is a diagram of a function-memory initialization message;

FIG. 315 is a diagram of schedule program message;

FIG. 316 is a diagram of a termination message;

FIG. 317 is an example of an SFM control initialization message;

FIG. 318 is an example of an SFM LUT initialization message;

FIG. 319 is an example of a schedule multi-cast thread message;

FIG. 320 is an example of a breakpoint/tracepoint match message;

FIG. 321 is an example of the context of the SFM controller;

FIGS. 322 to 327 are examples of address formats;

FIG. 328 is an example of a full addressing sequence;

FIG. 329 is an example of read arbitration for the first two sequences;

FIG. 330 is an example of returning address within a region;

FIG. 331 is an example of the write arbitration;

FIG. 332 is an example of index comparisons;

FIG. 333 is an example of the data of addresses added together across four pipeline stages;

FIG. 334 is an example of the SFM pipeline that allows for back to back reads and writes;

FIG. 335 is an example of a port interface read with no conflicts;

FIG. 336 is an example of a port interface read with bank conflicts;

FIG. 337 is an example of a port interface write with no conflicts

Figure 115:
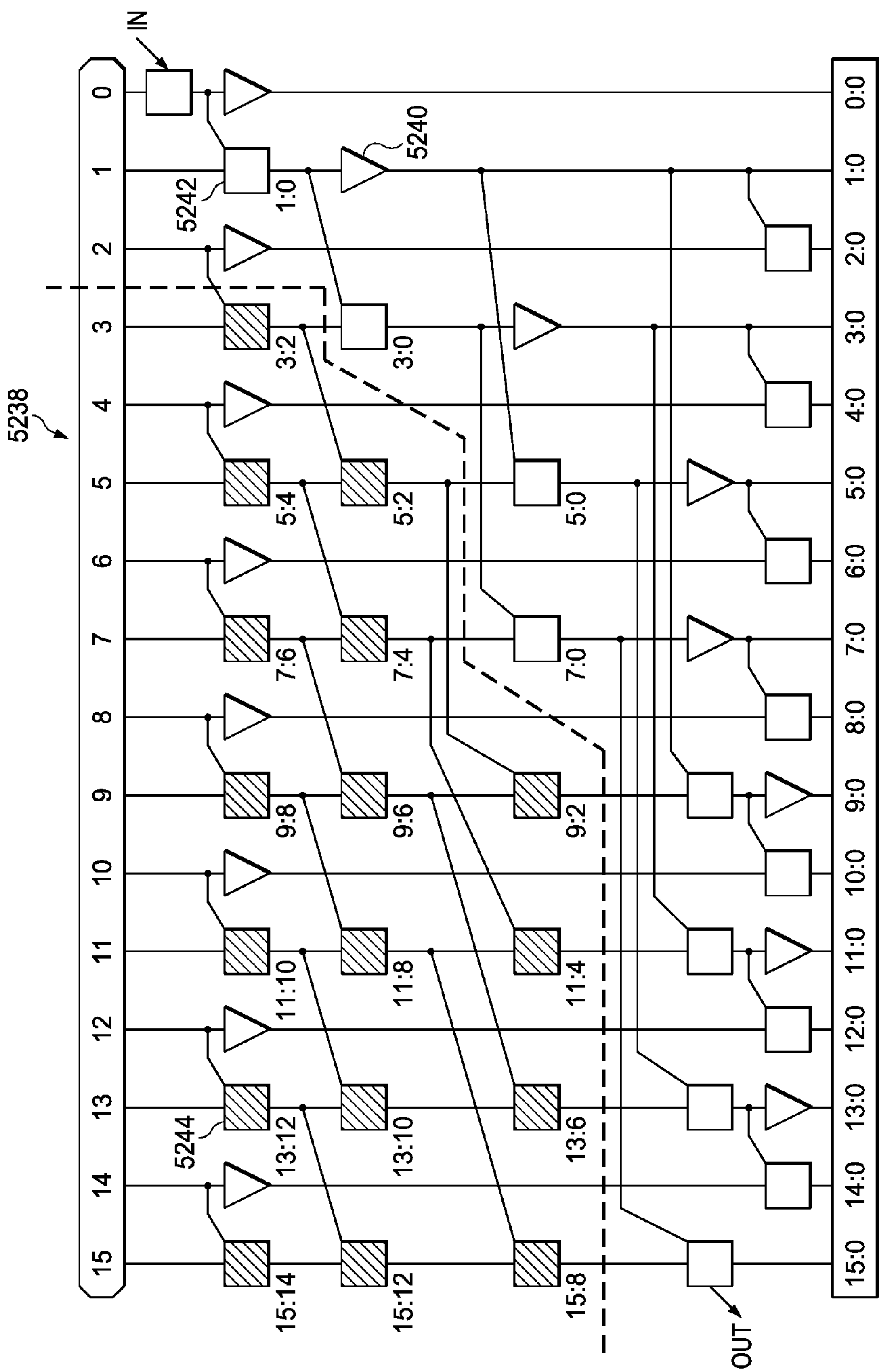
Figure 338:
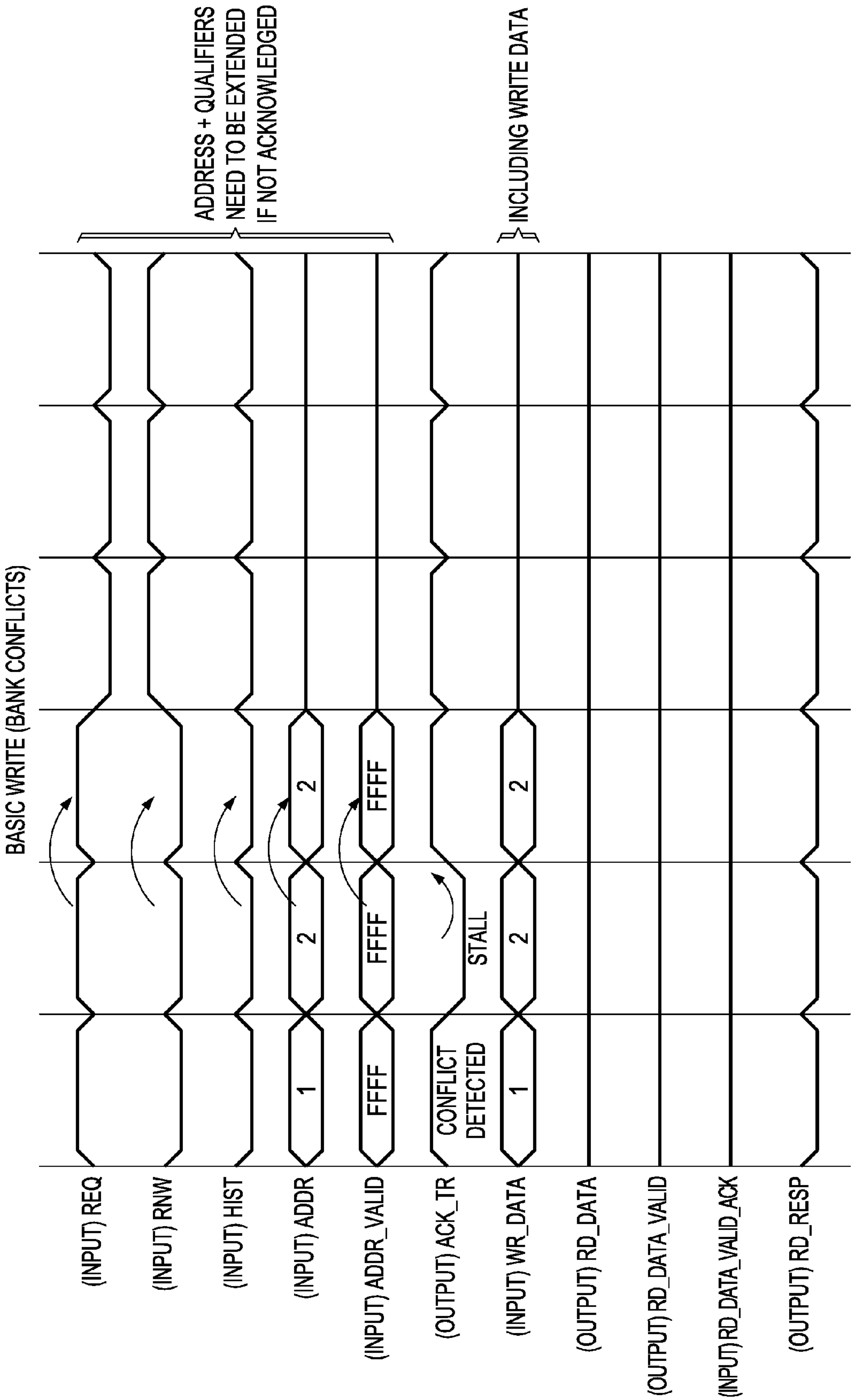
Figure 339:
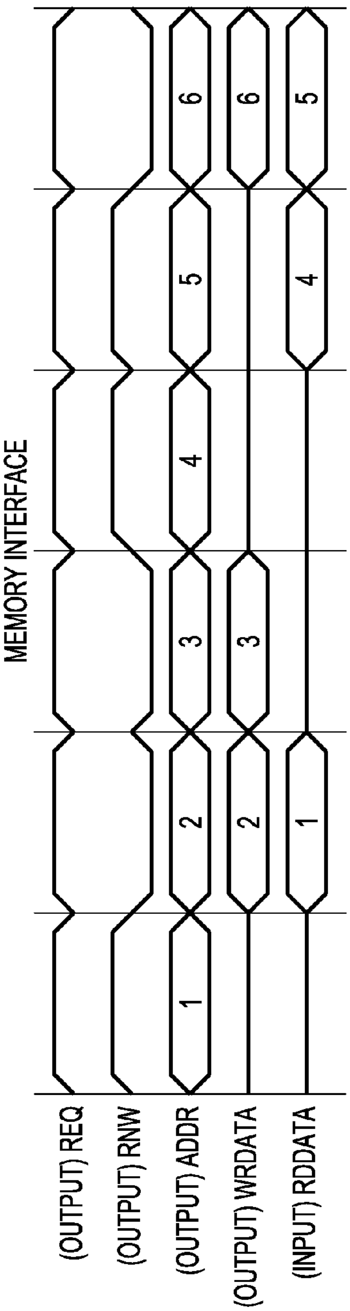
Figure 340:
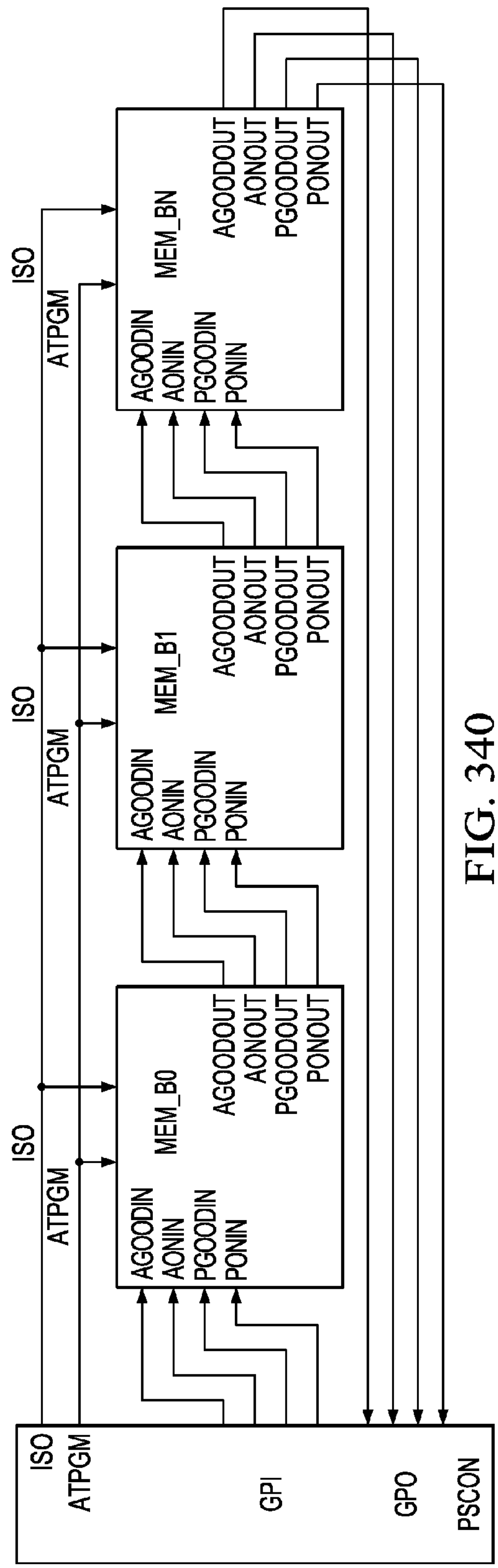
Figure 341:
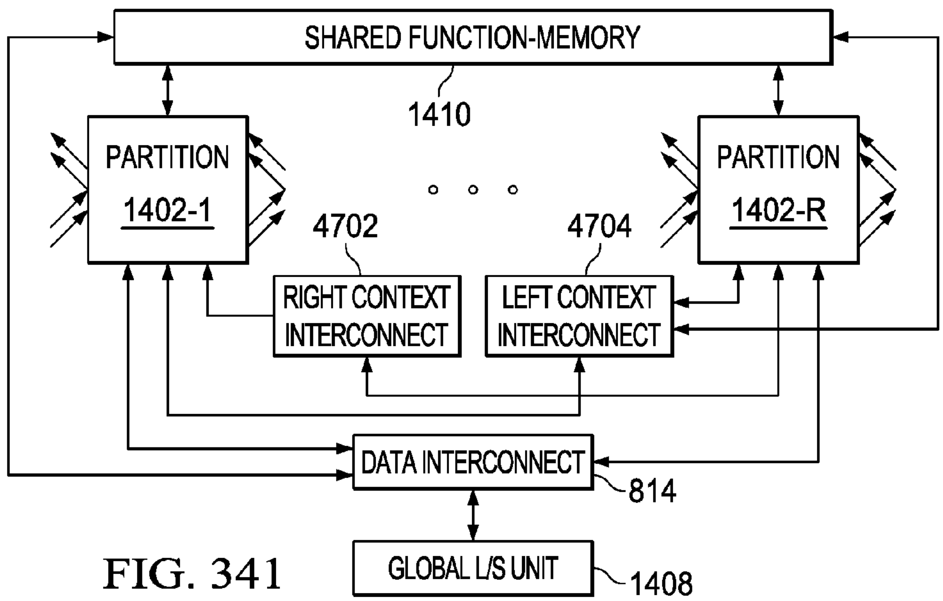
Figure 342:
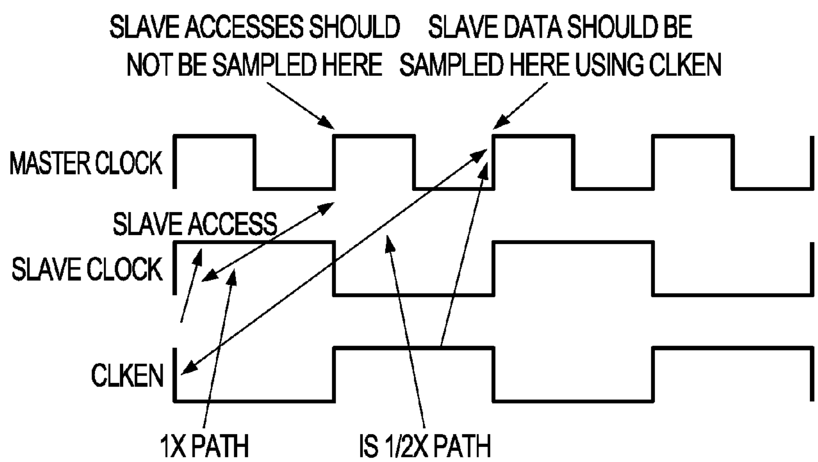
Figure 343:
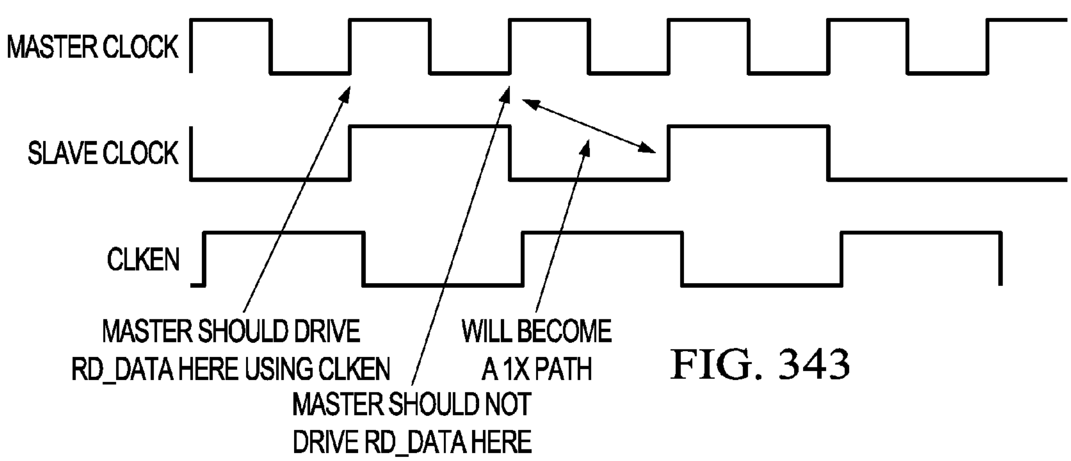
Figure 344:
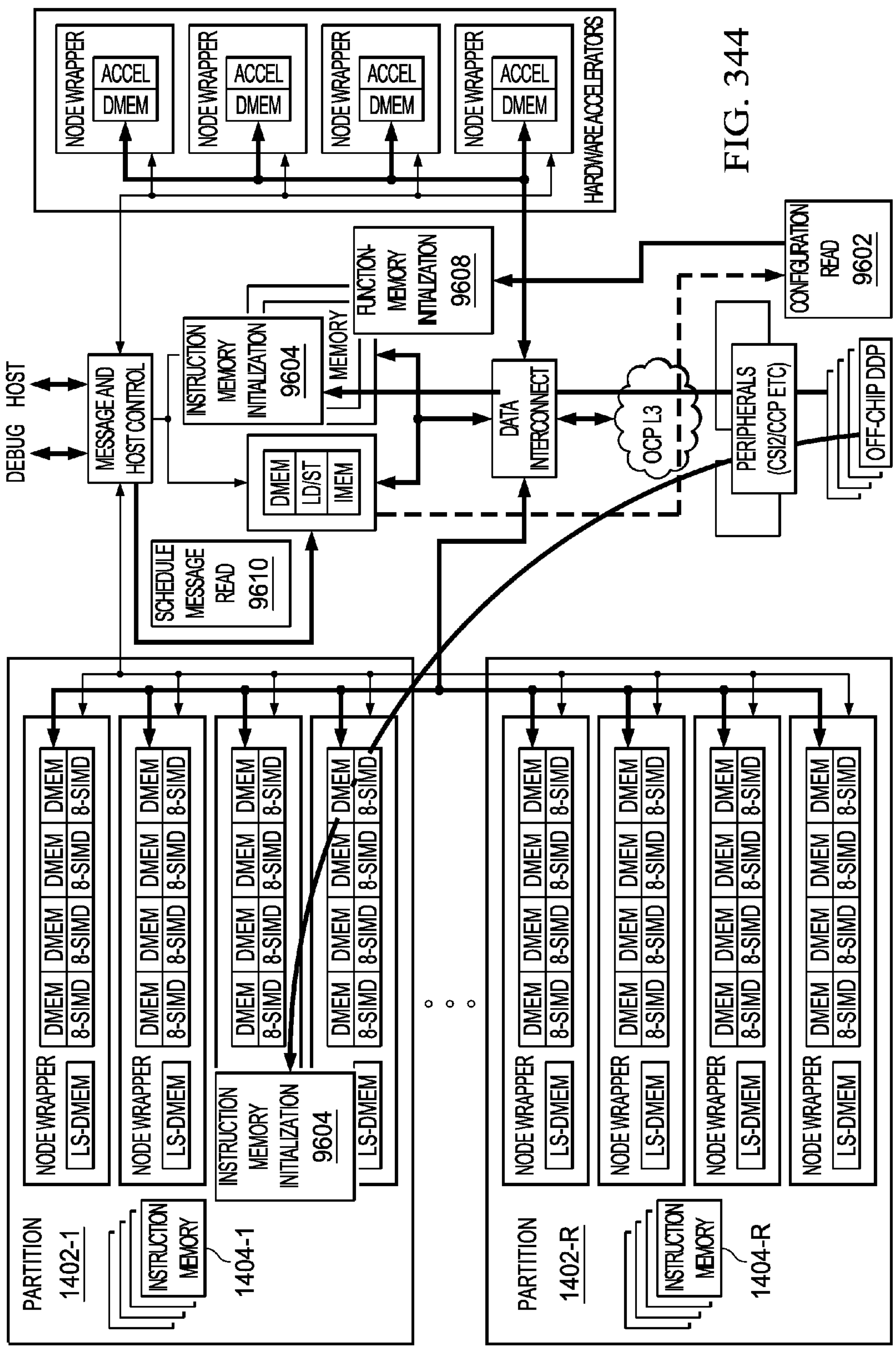
Figure 345:
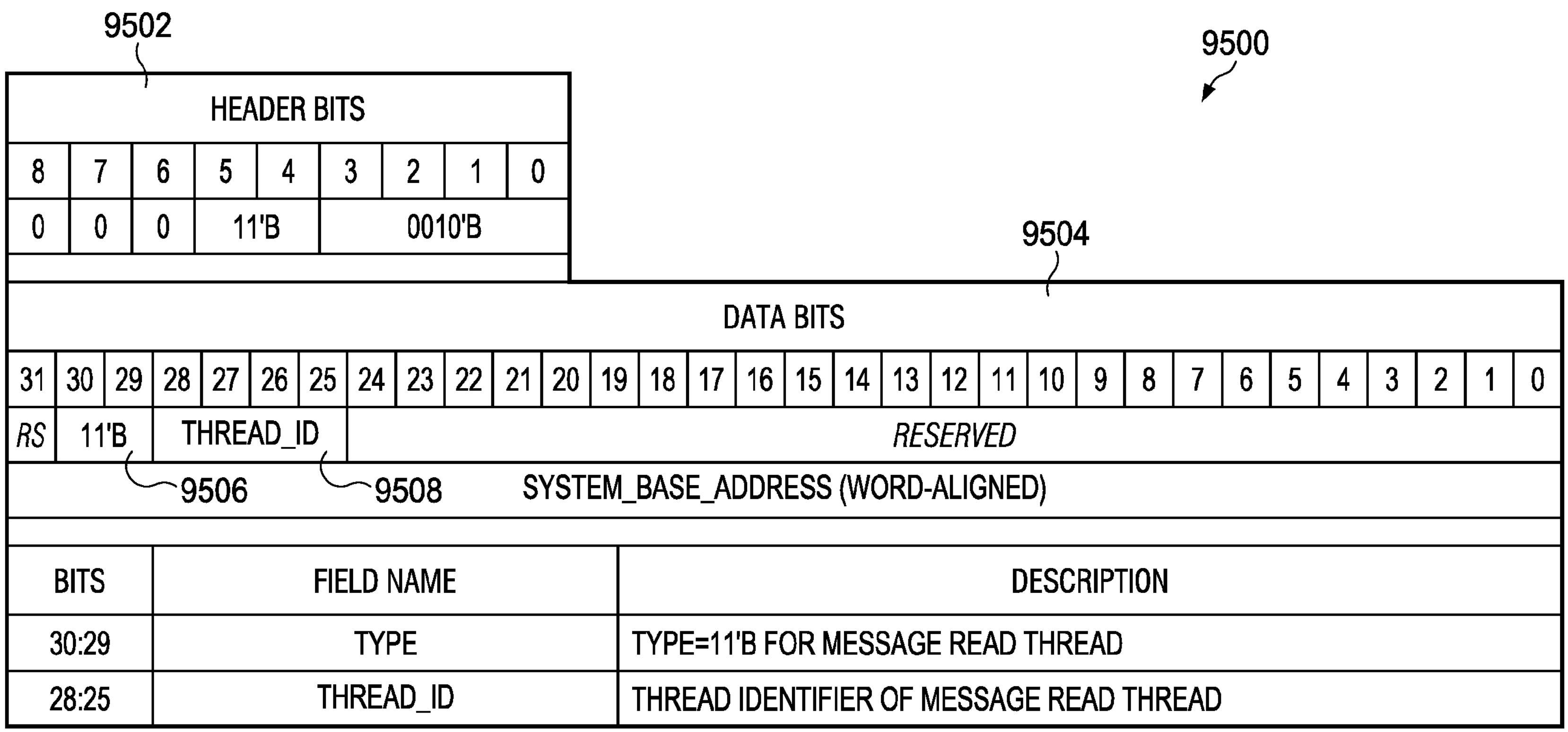
Figure 346:
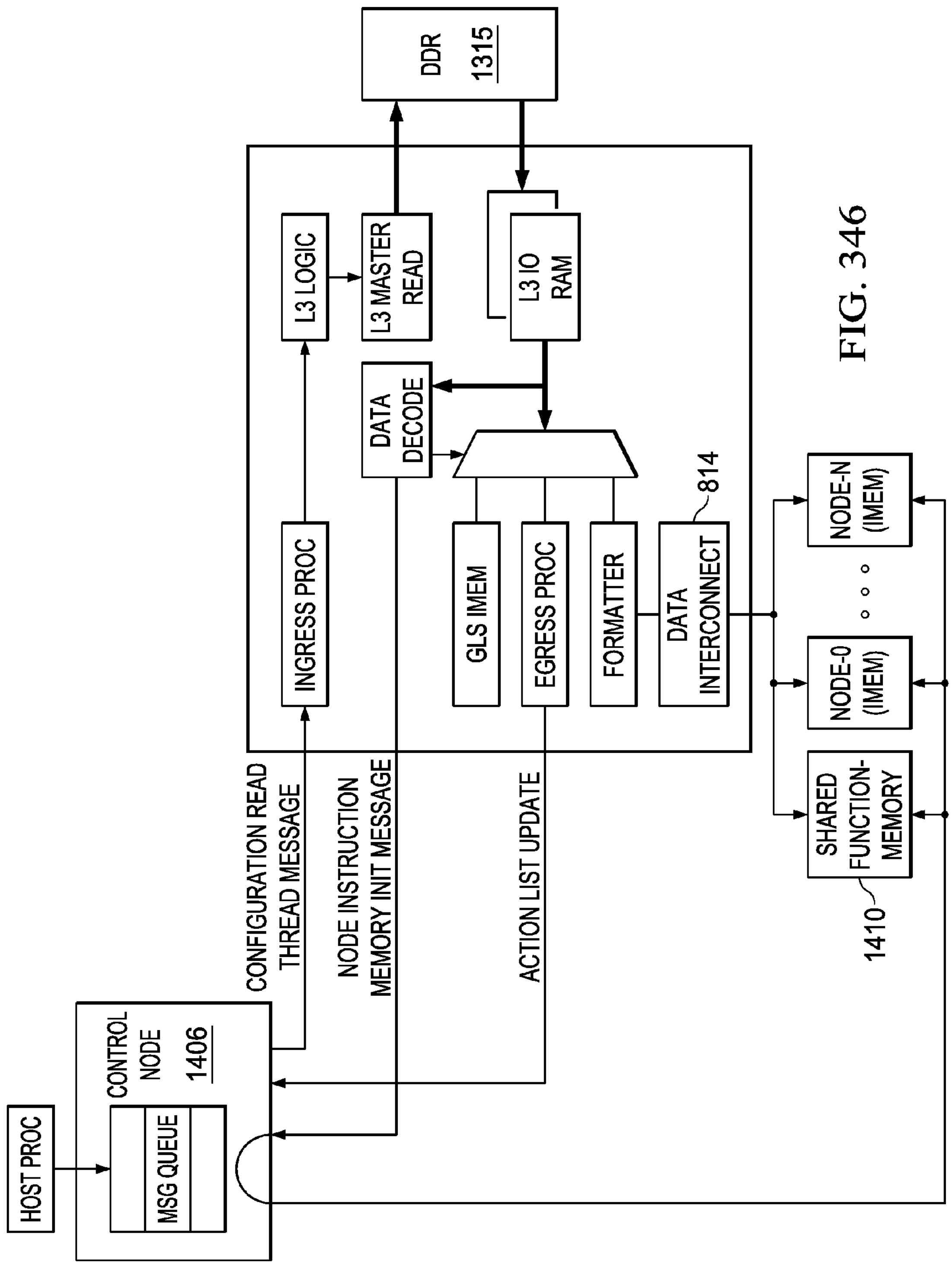
Figure 347:
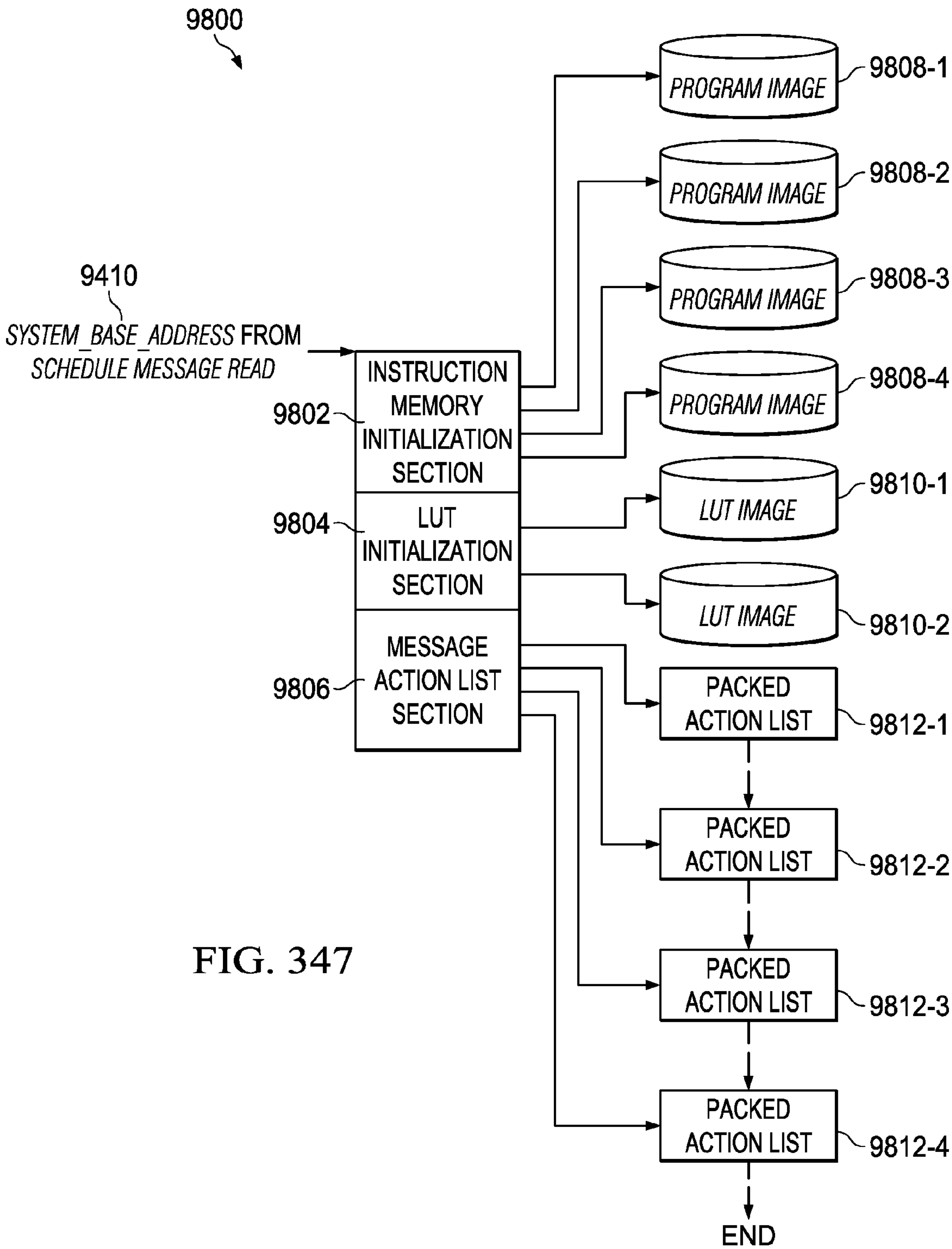
Figure 356:
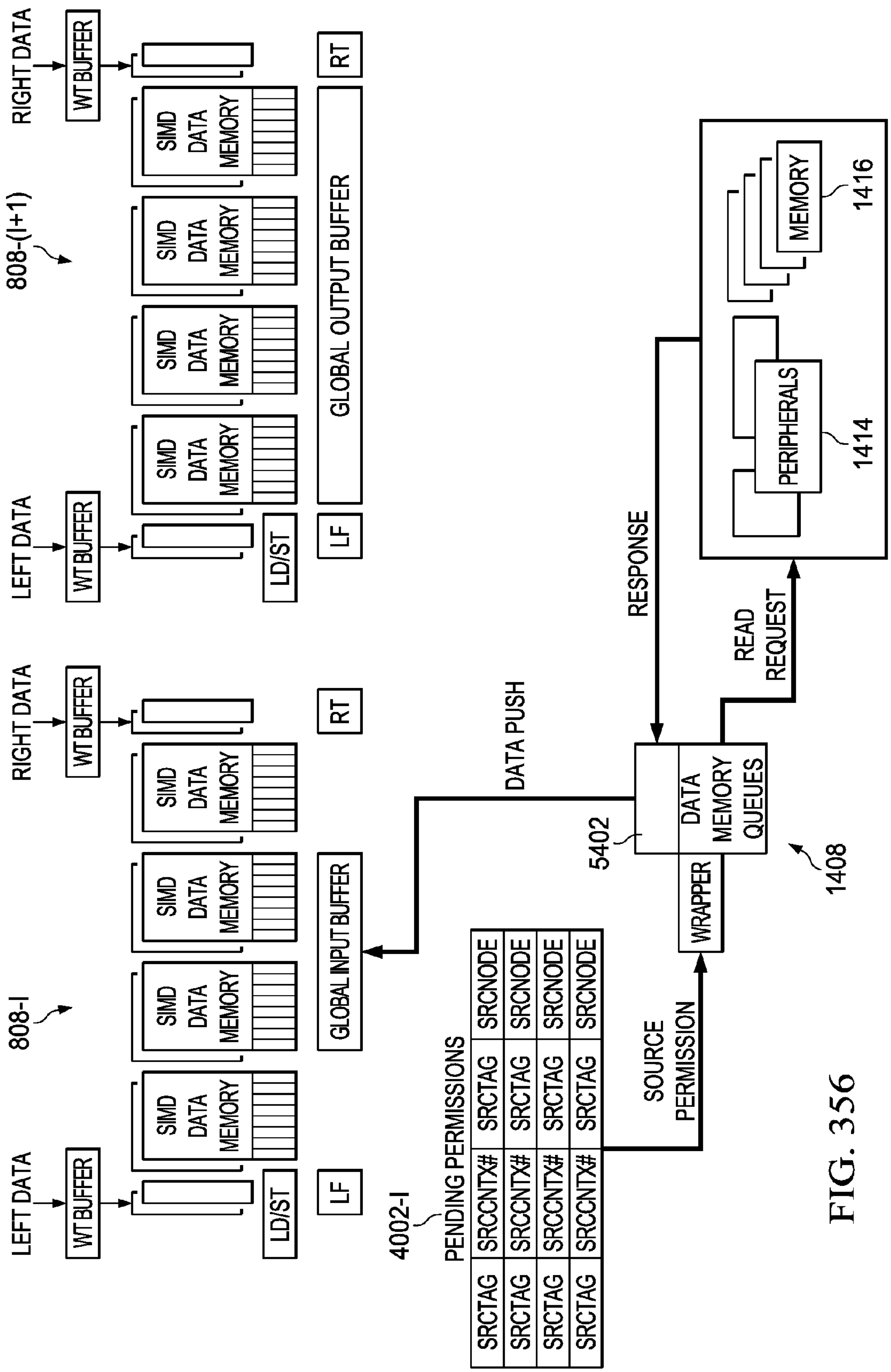
Figure 357:
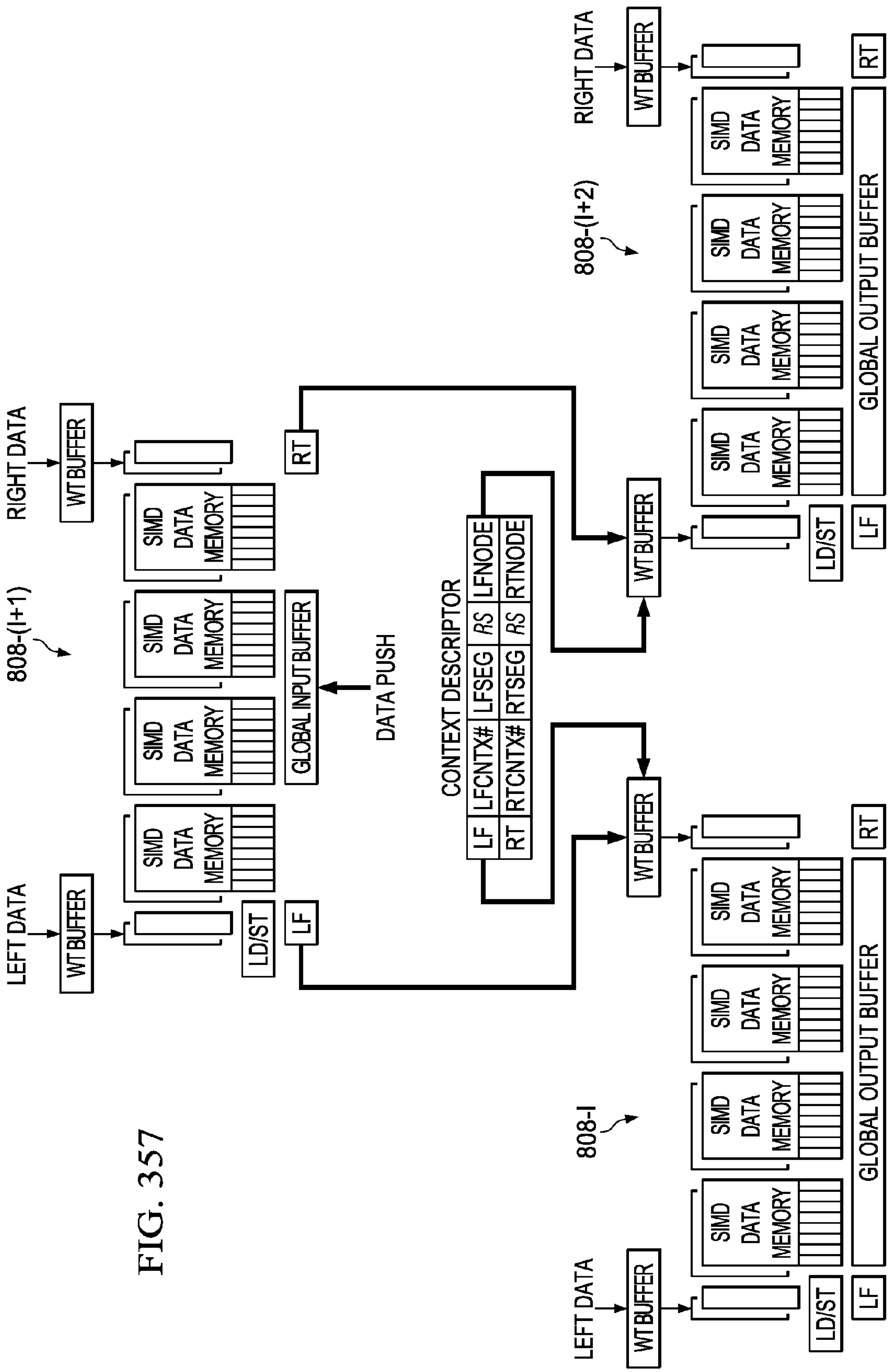
Figure 358:
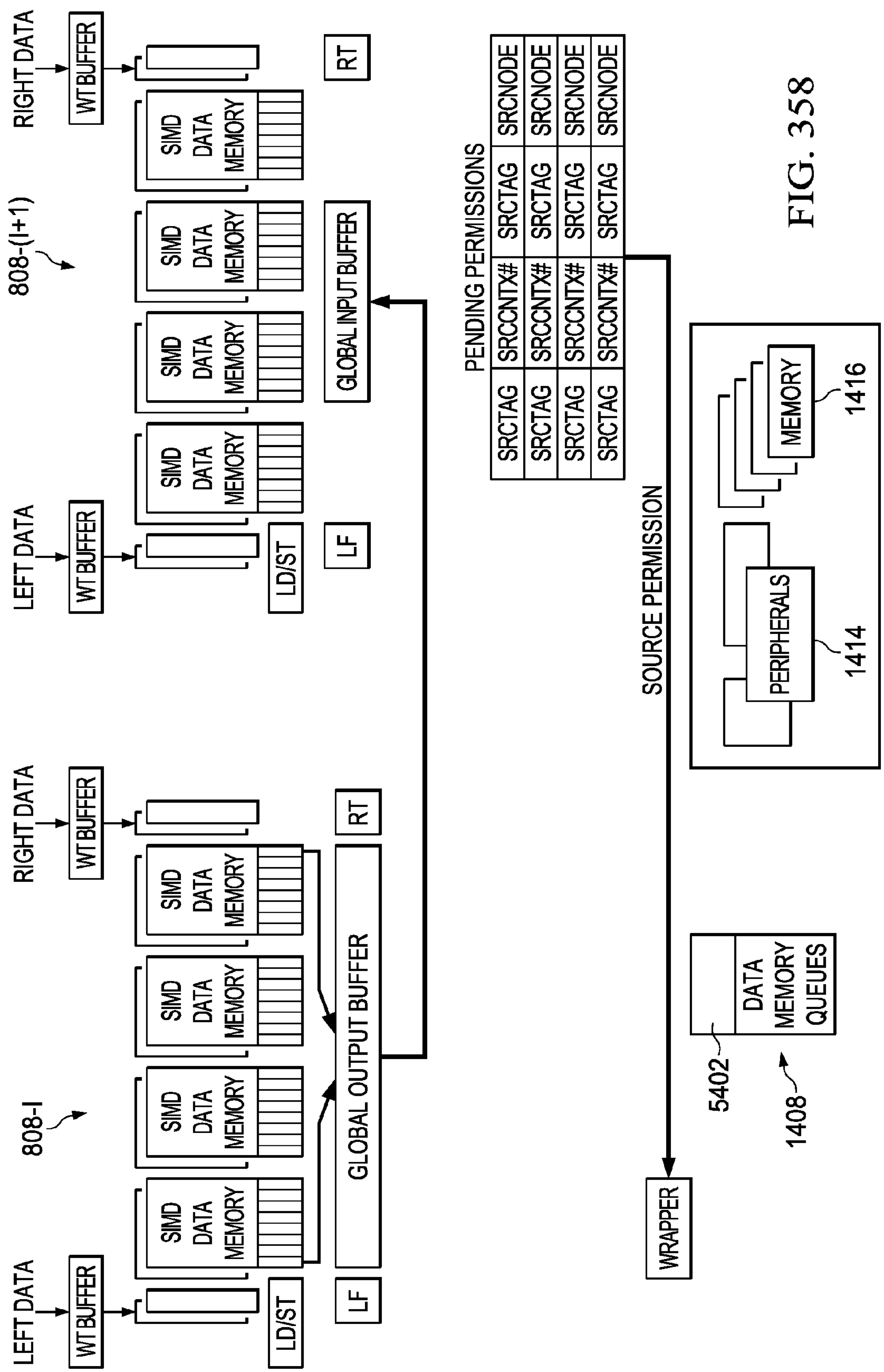
Figure 359:
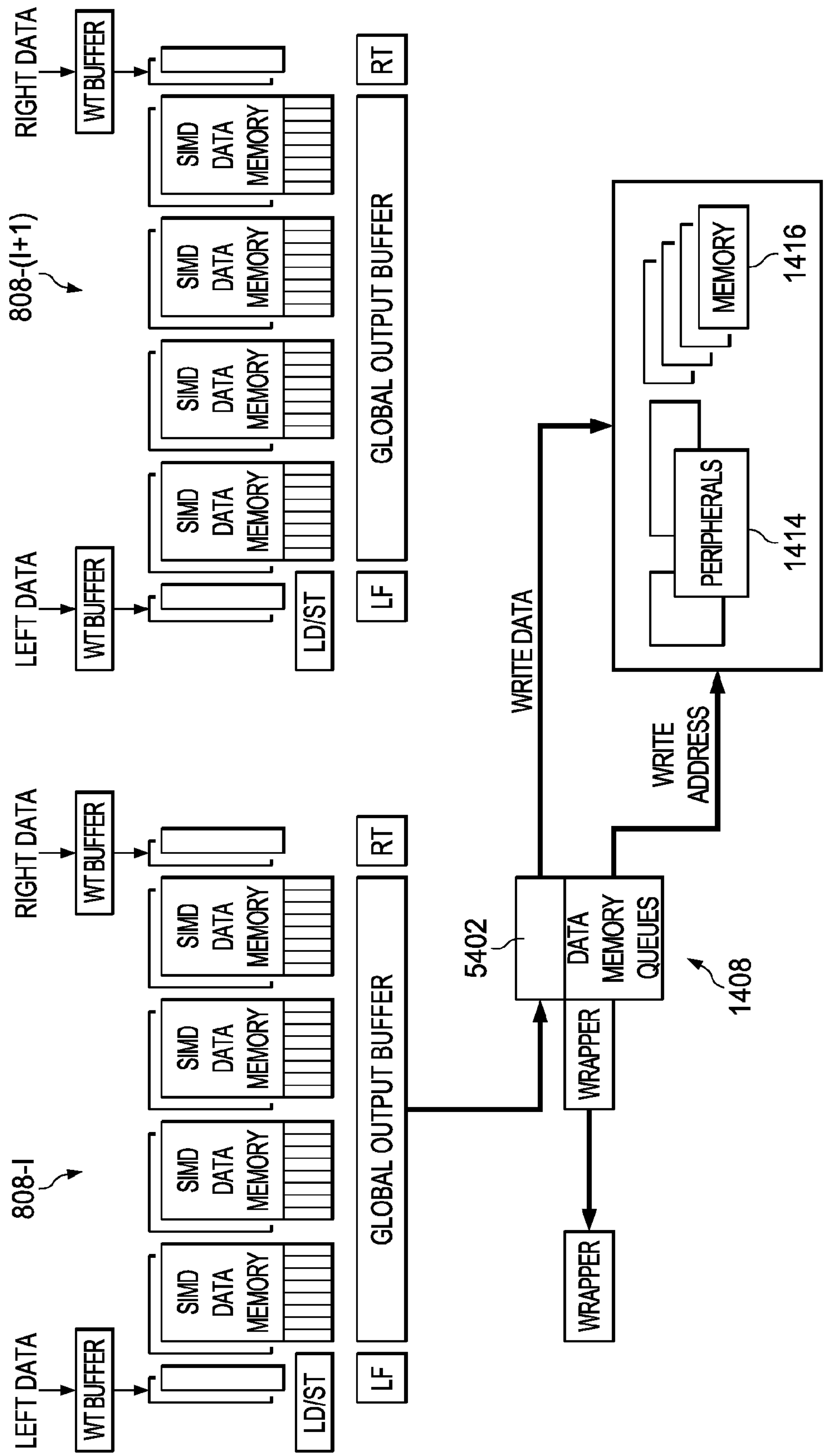
Figure 360:
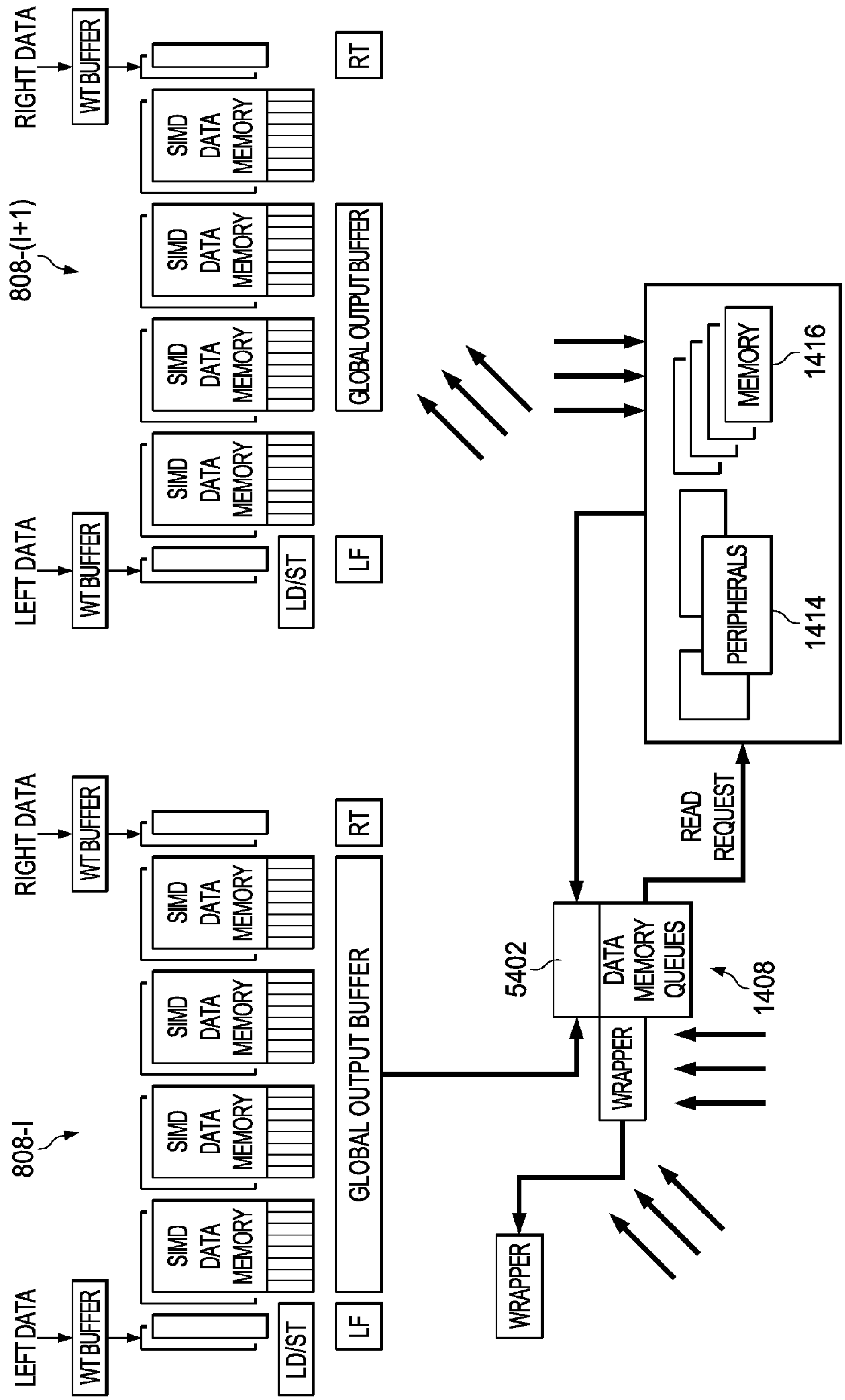
Figure 361:
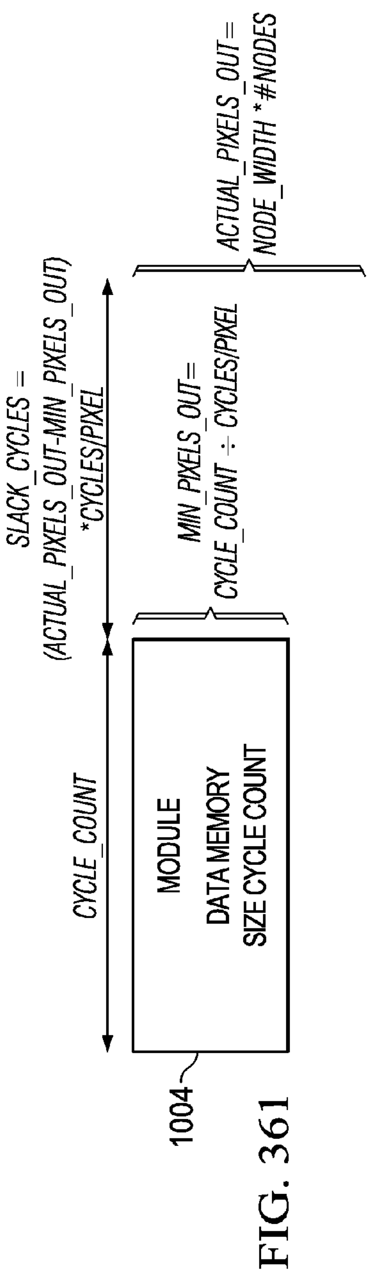
Figure 362:
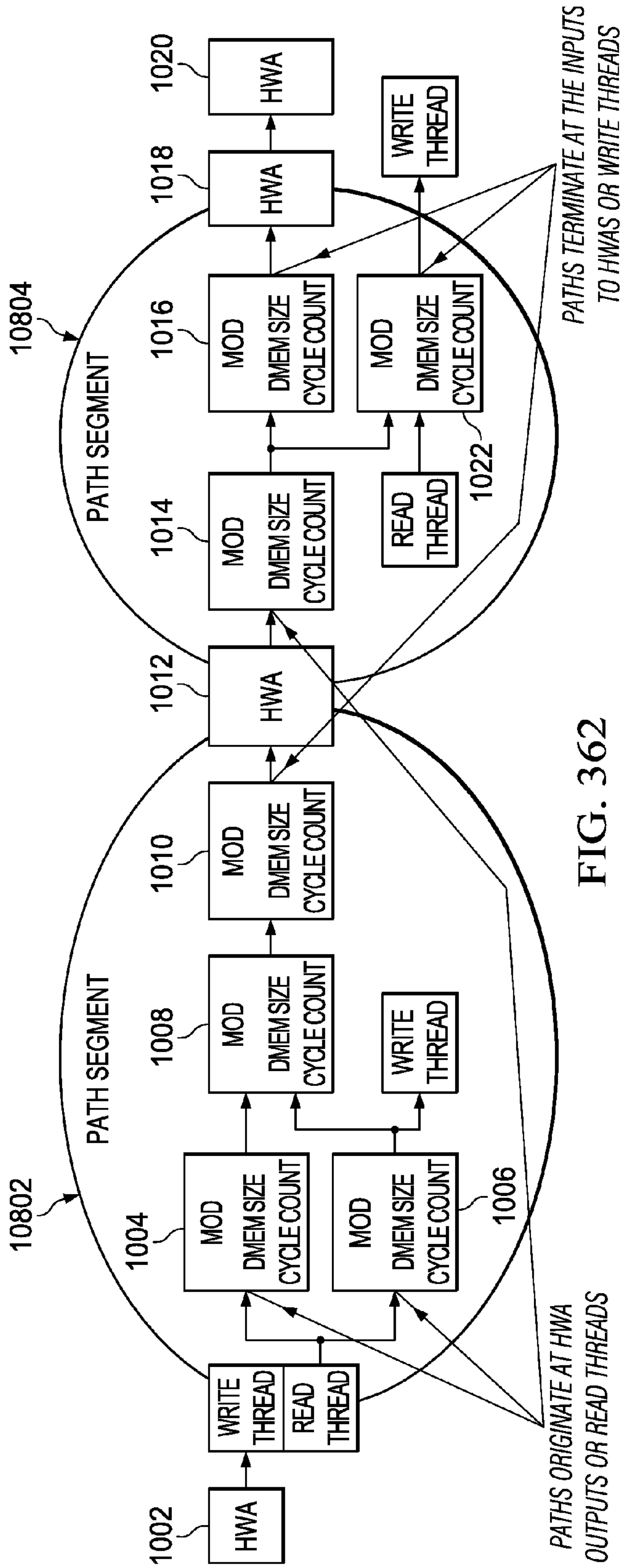
Figure 363:
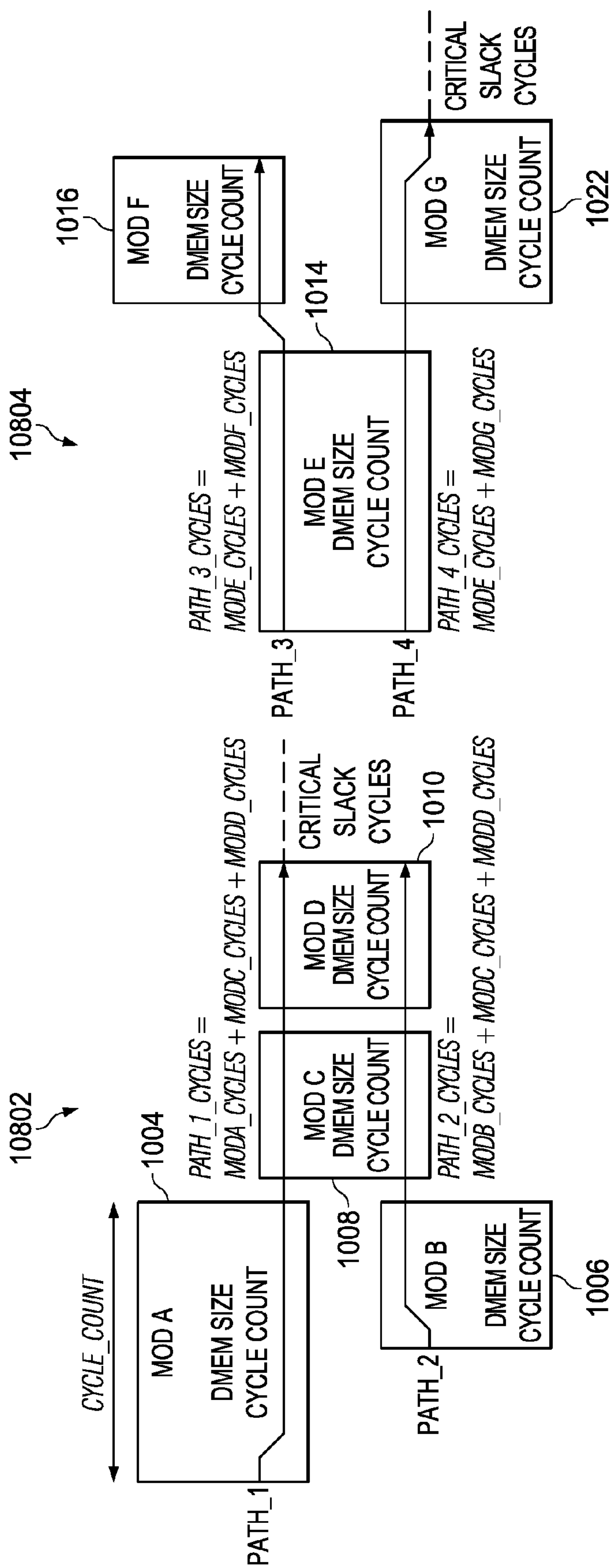
Figure 364:
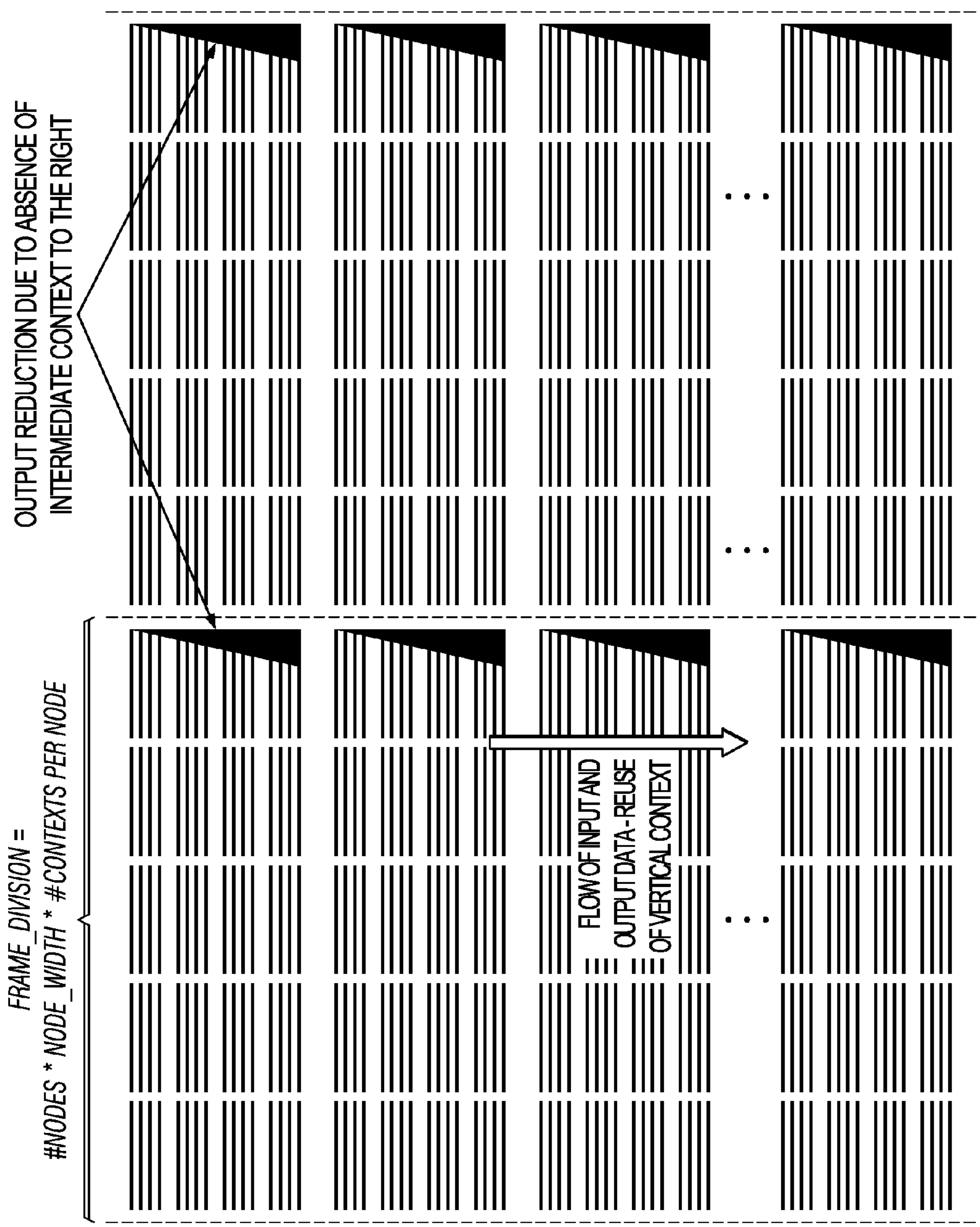
Figure 365:
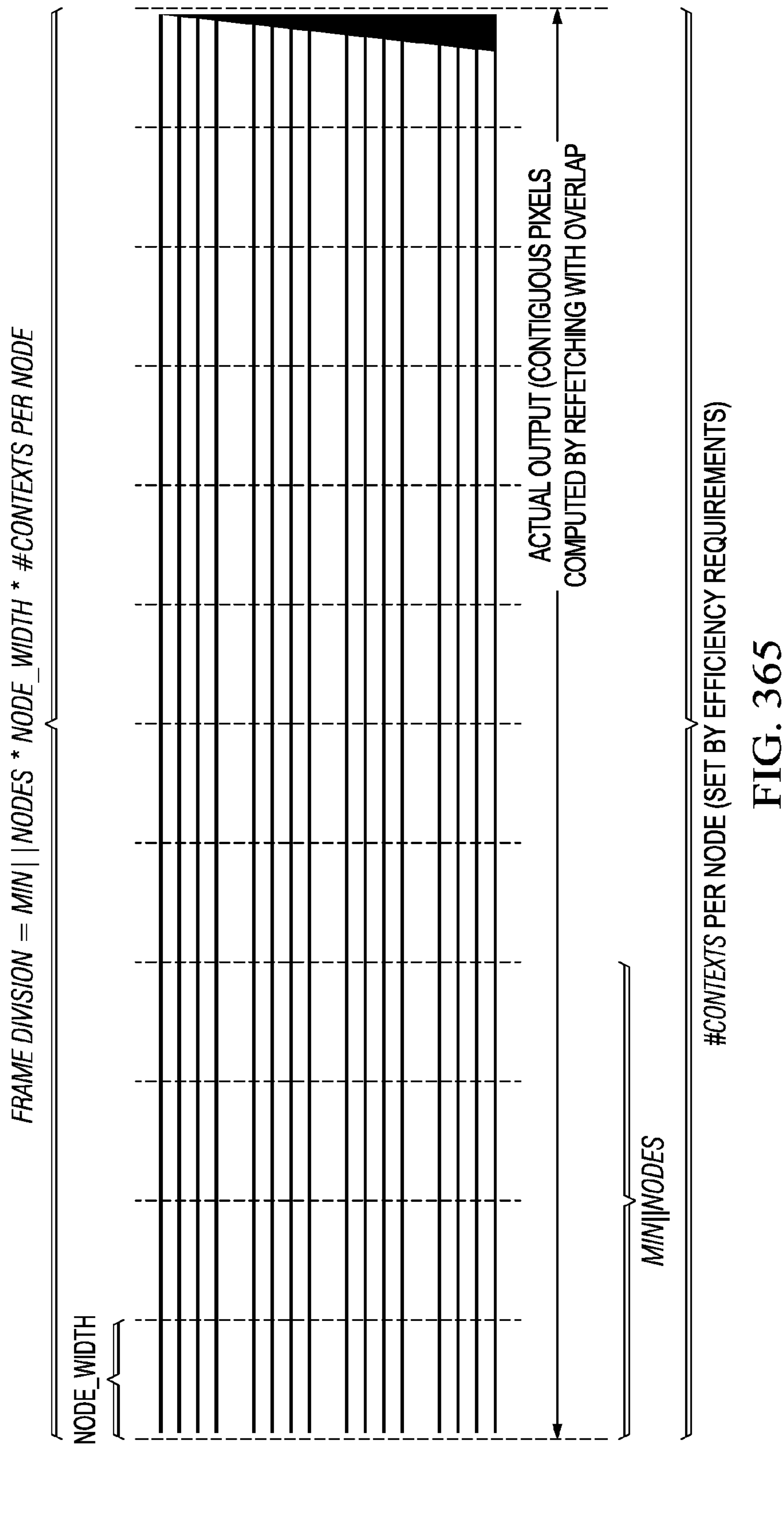
Figure 366:
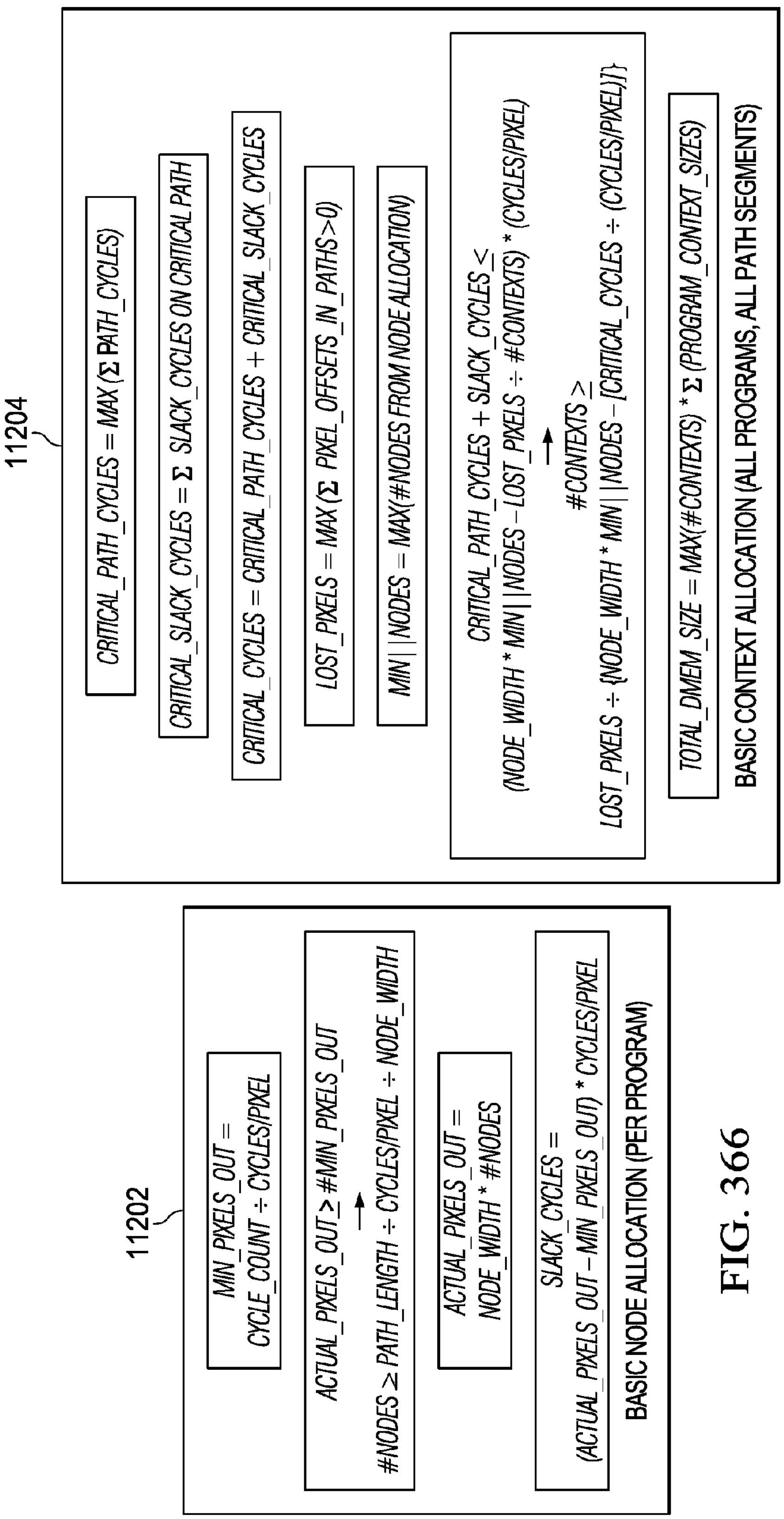
Figure 367:
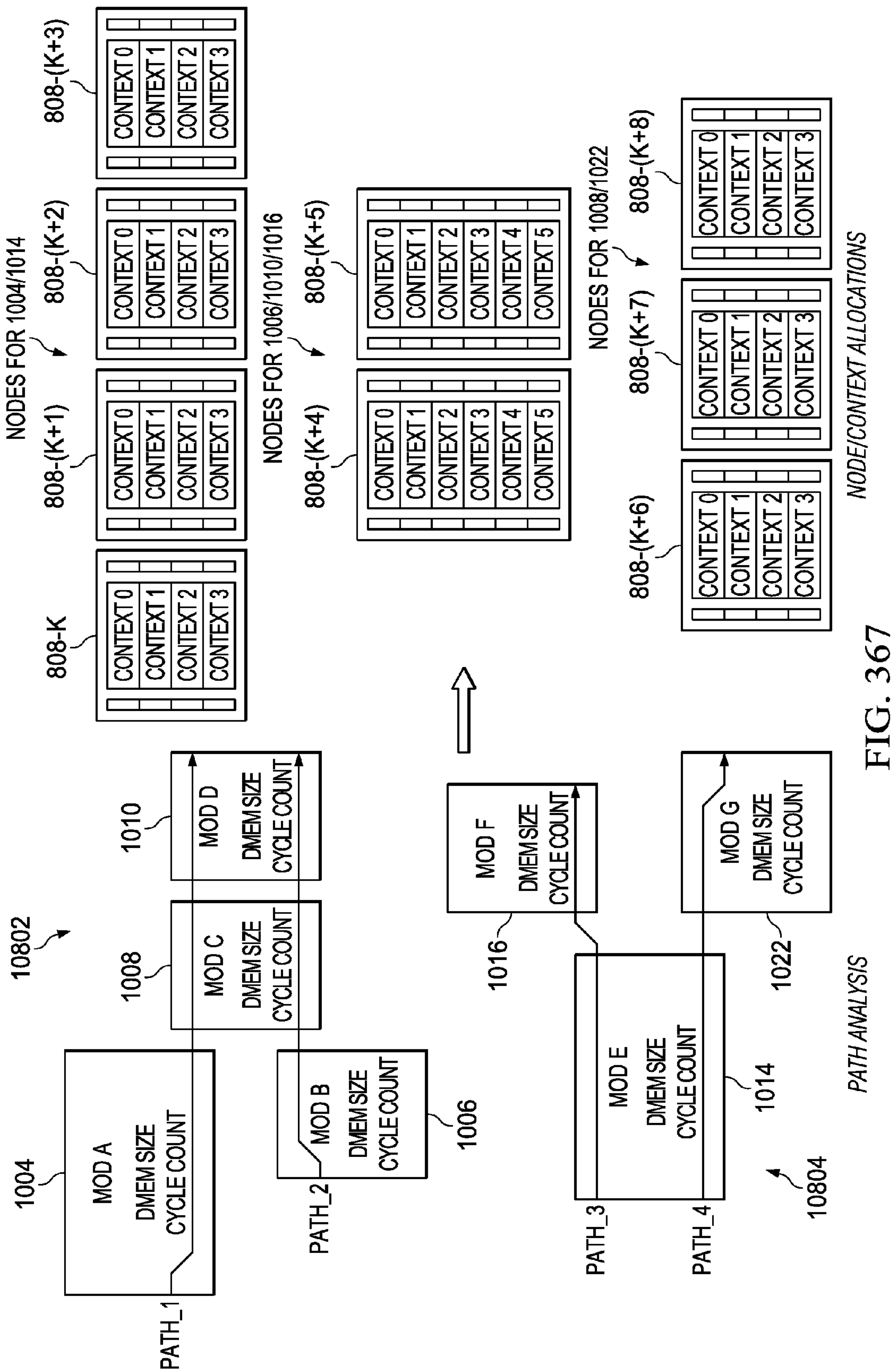
Figure 368:
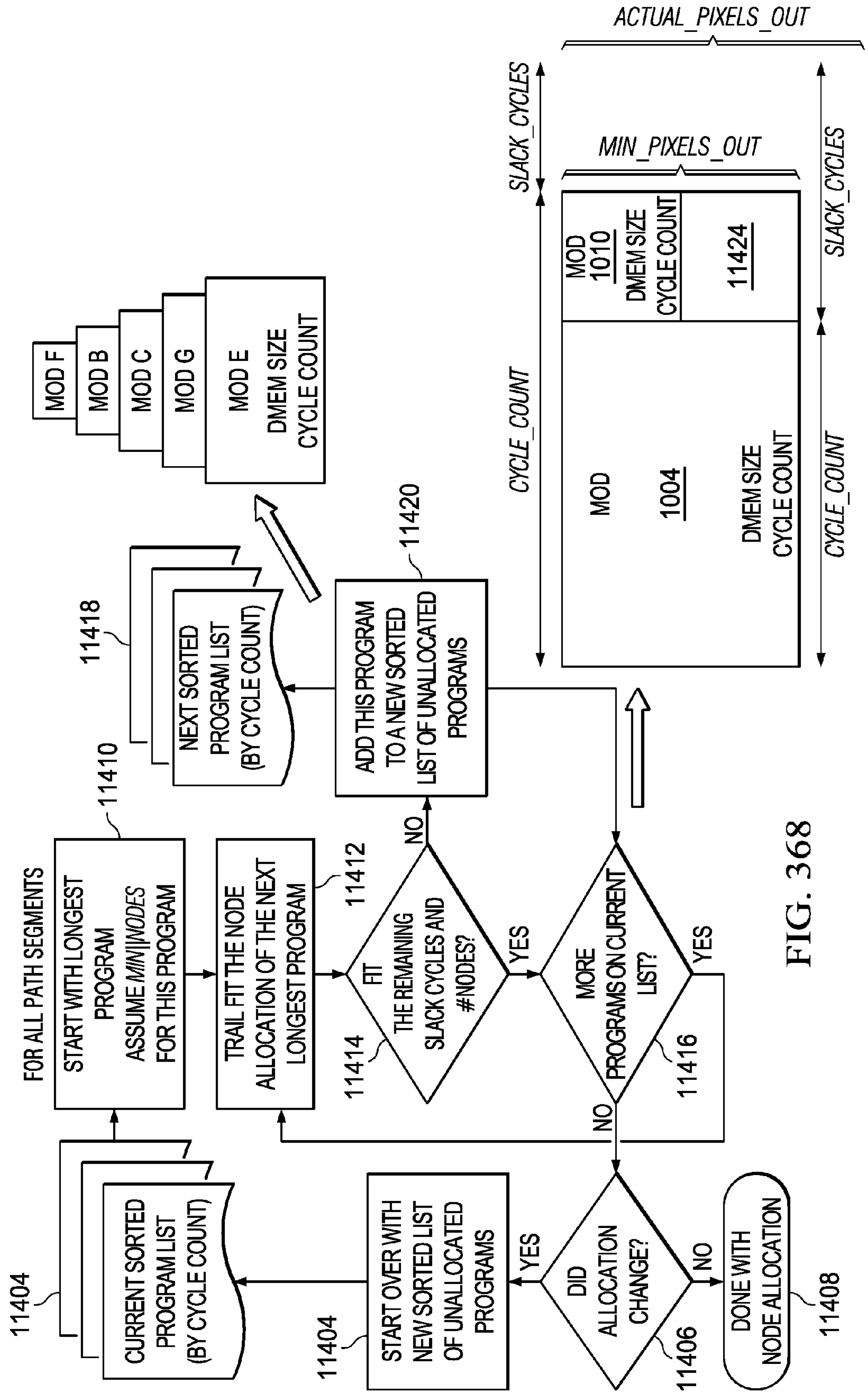
Figure 369:
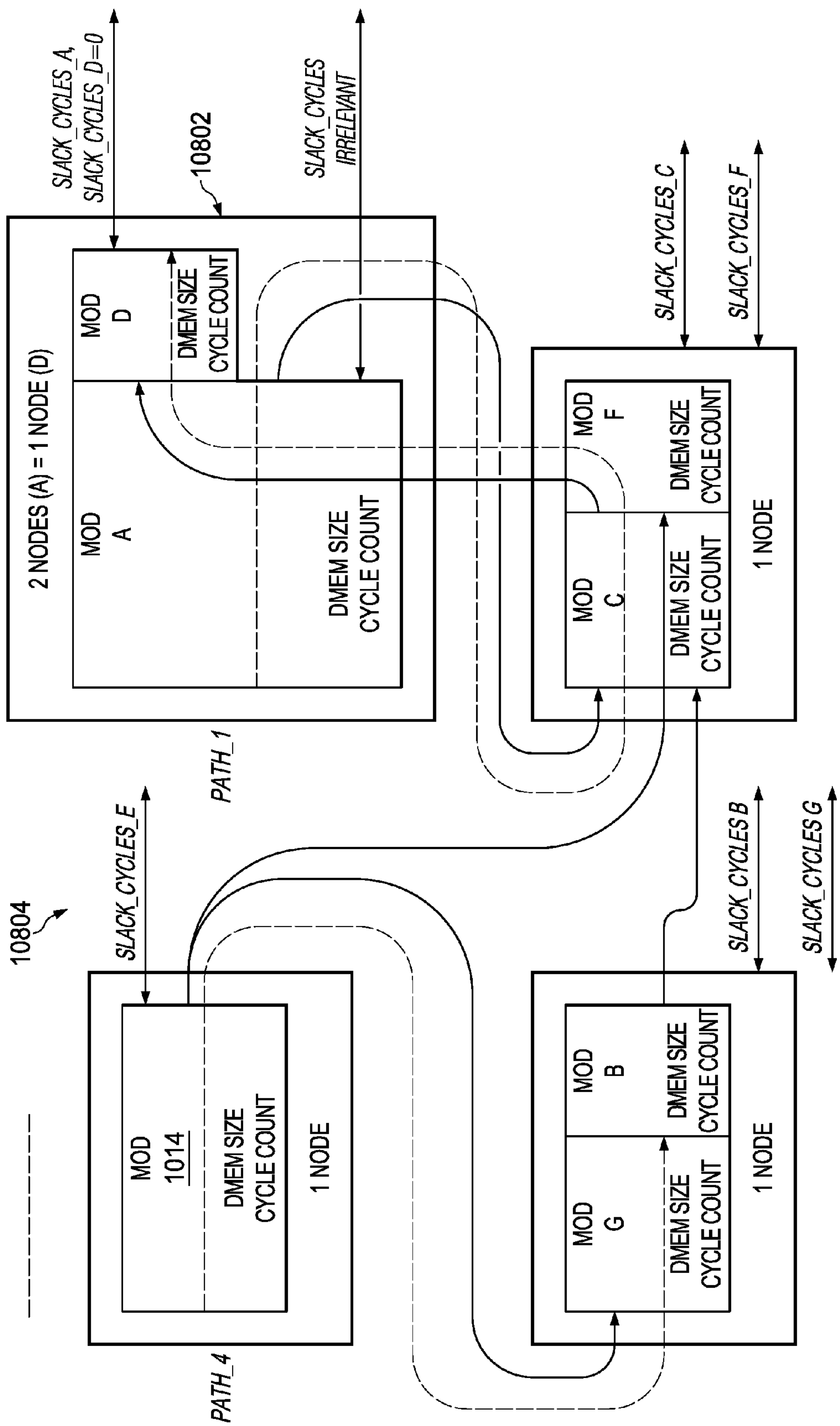
Figure 370:
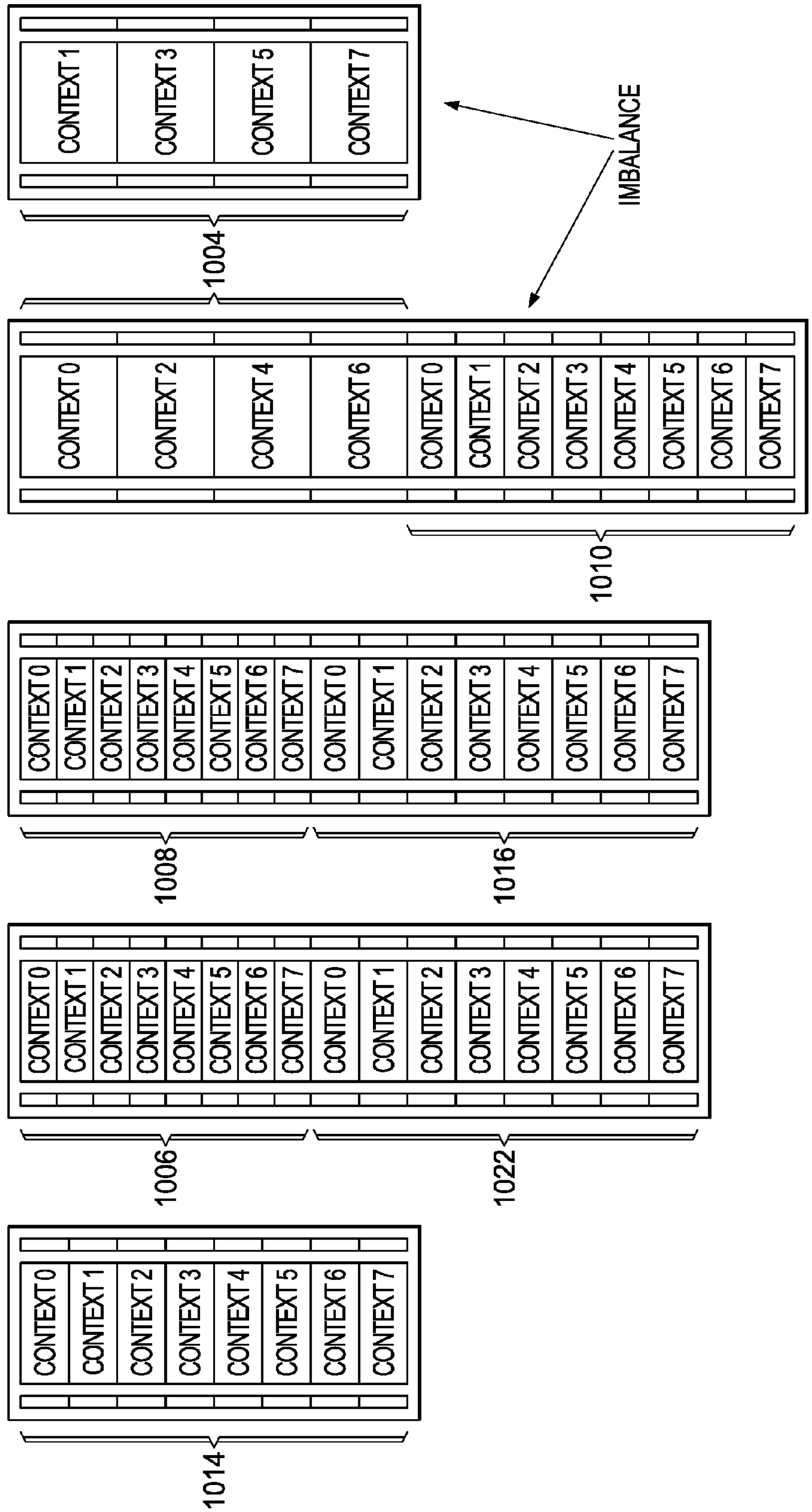
Figure 371:
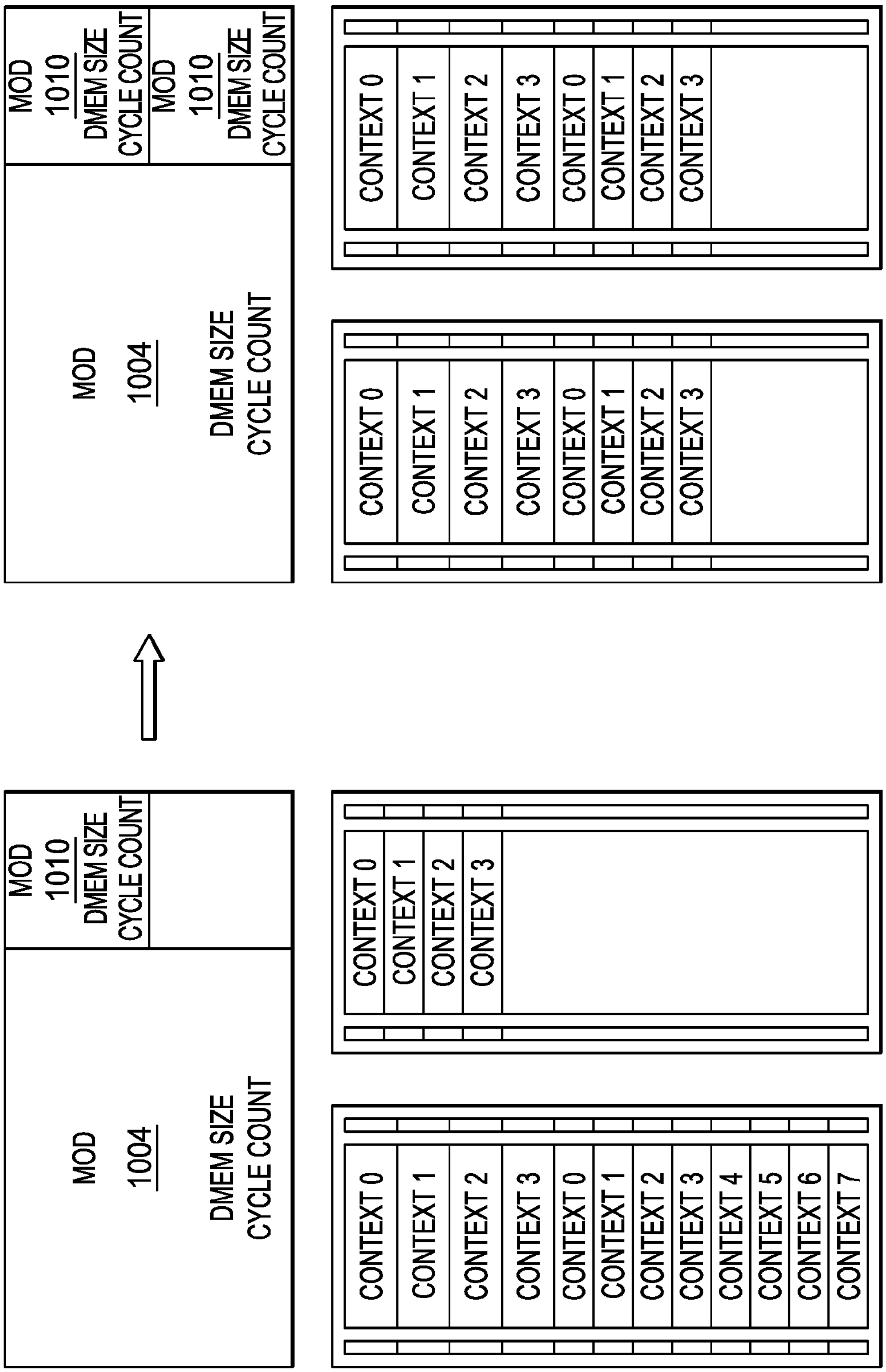
Figure 376:
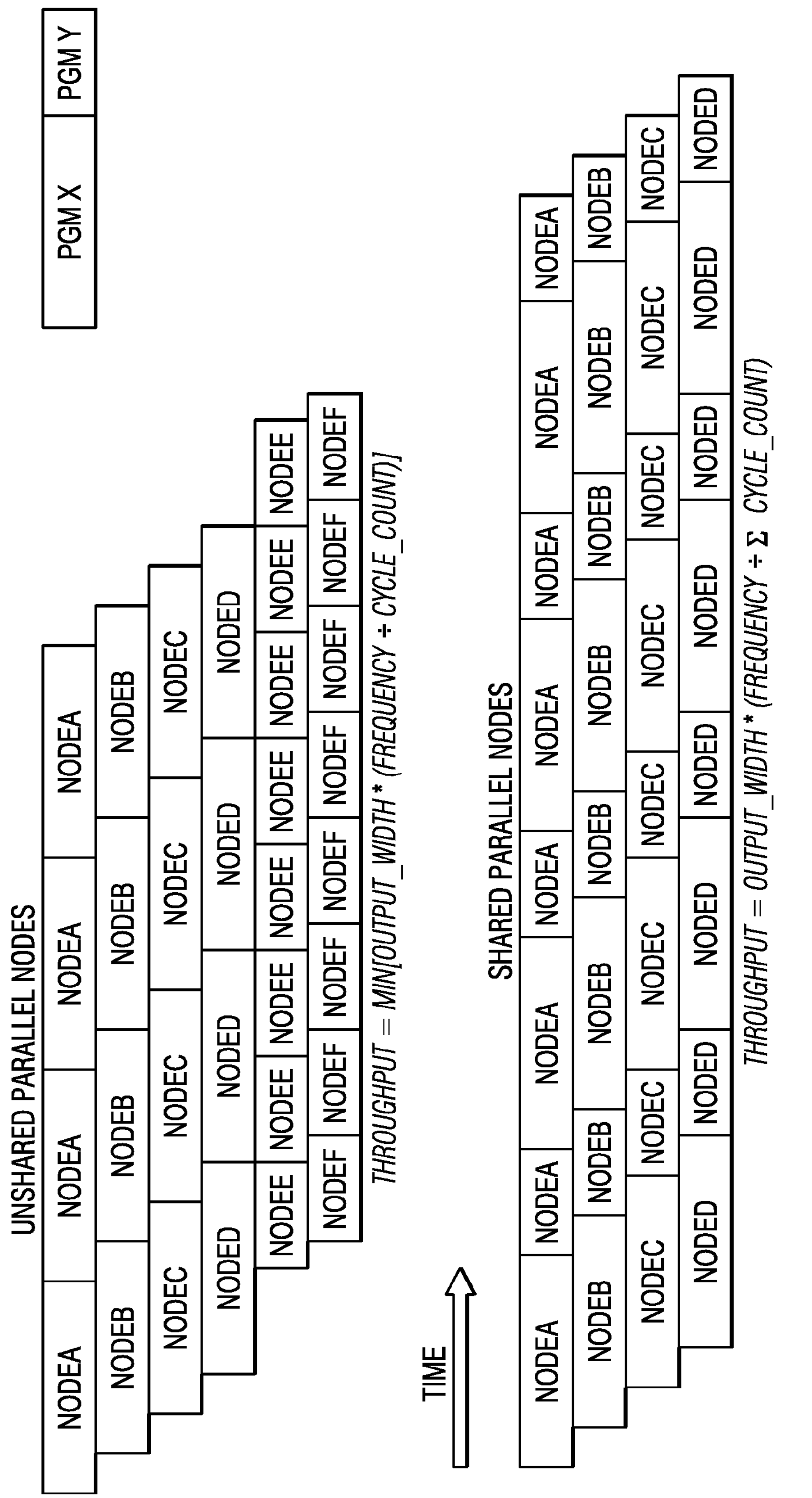
Figure 377:
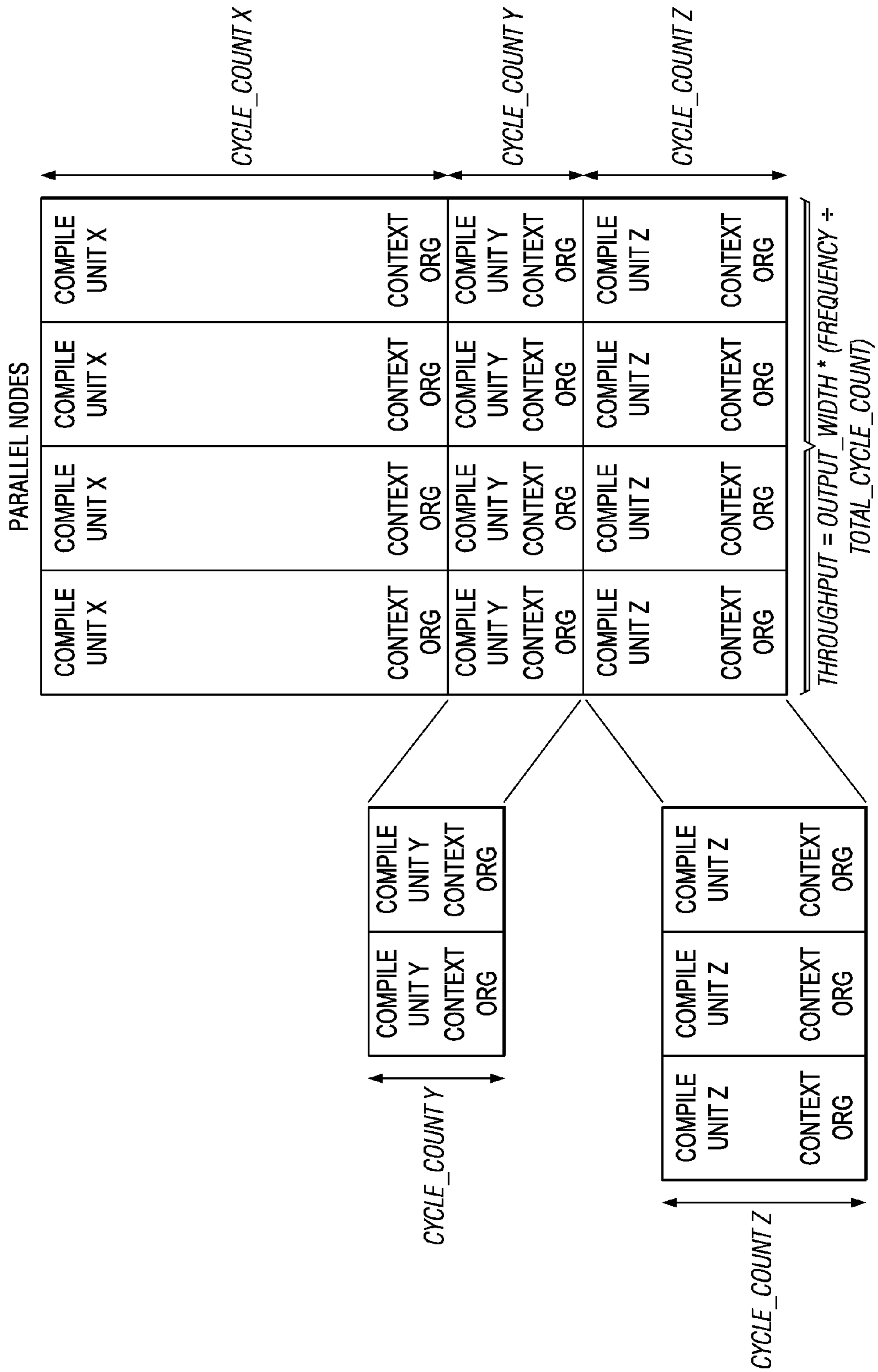
Figure 378:
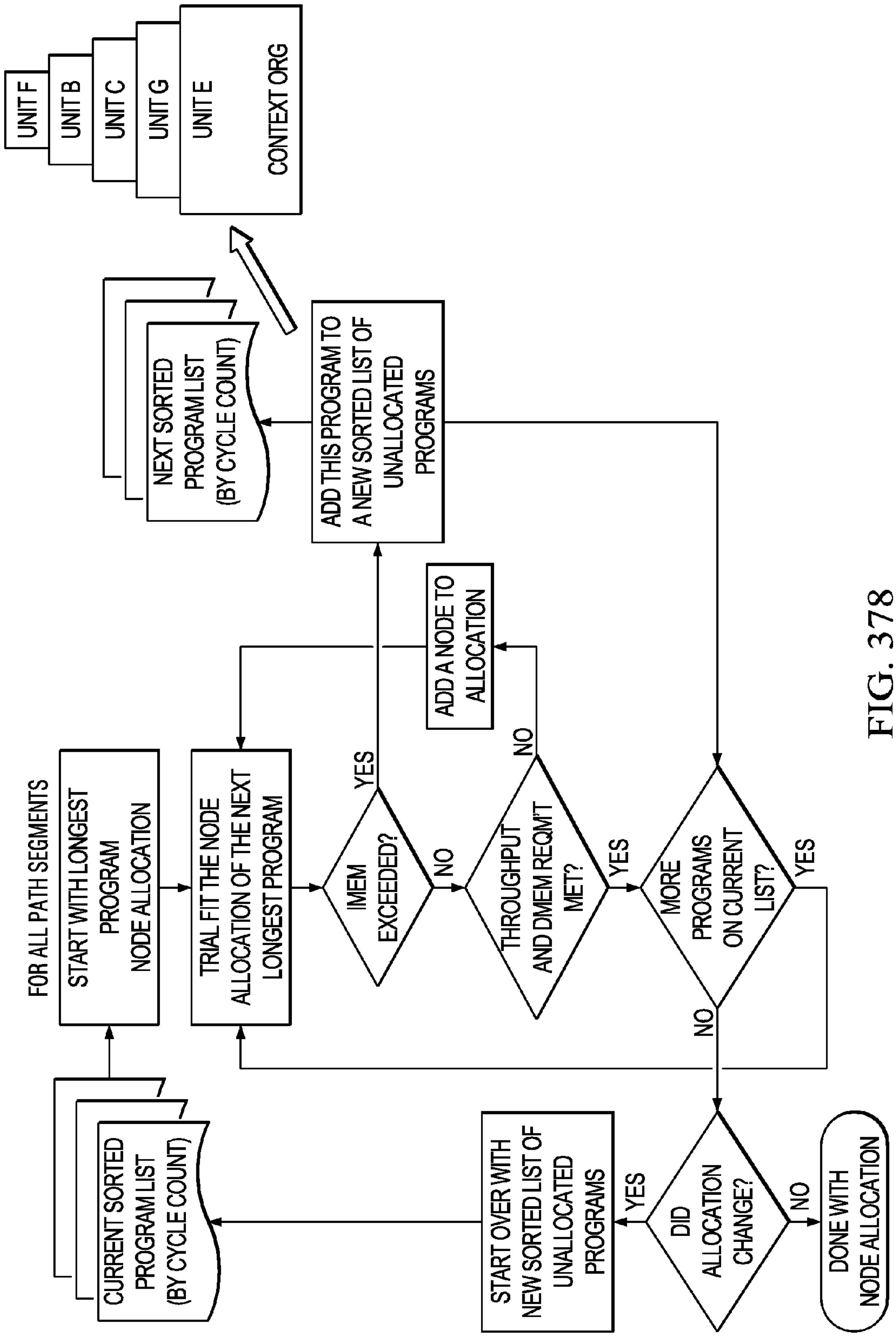
Figure 379:
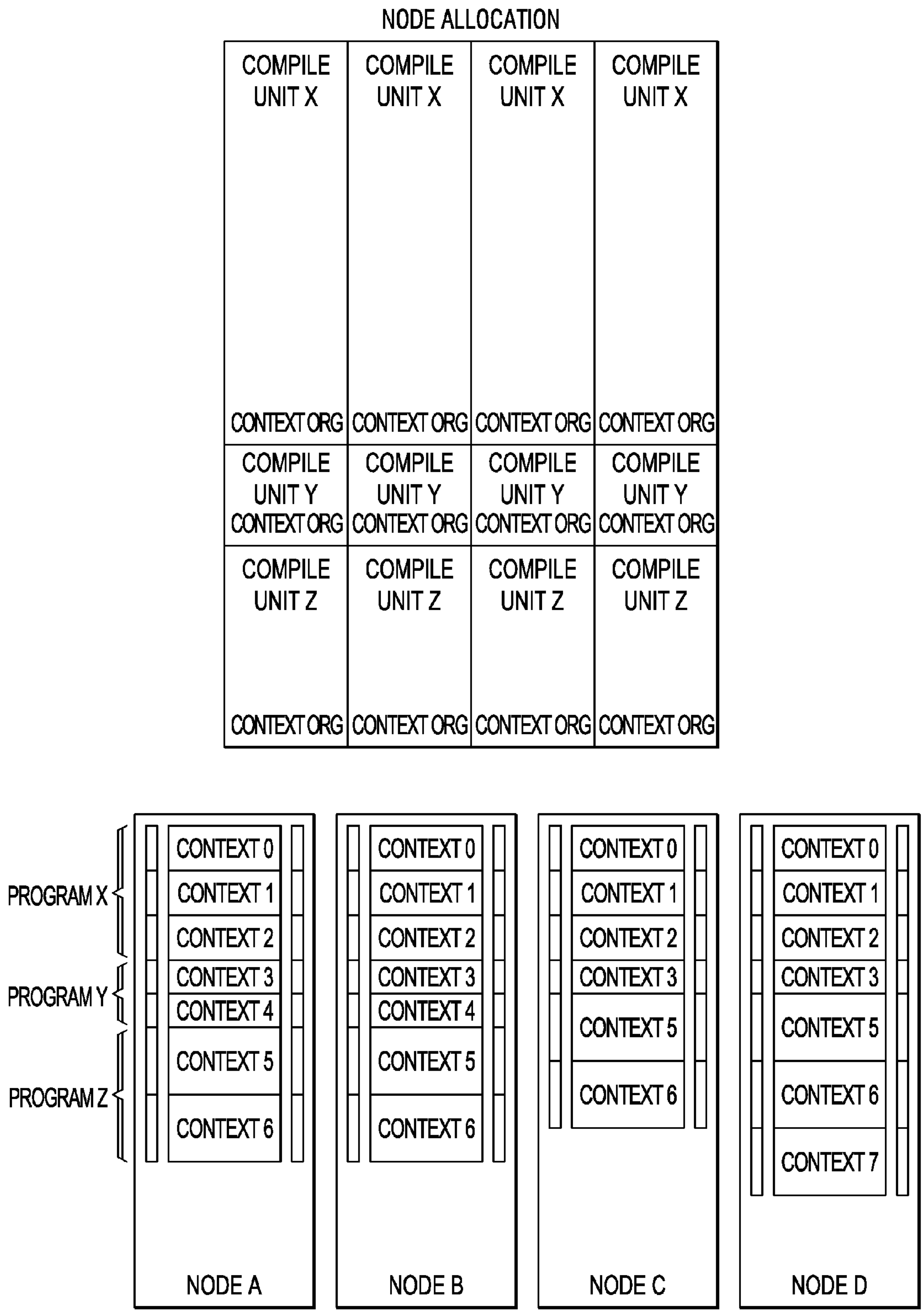
Figure 380:
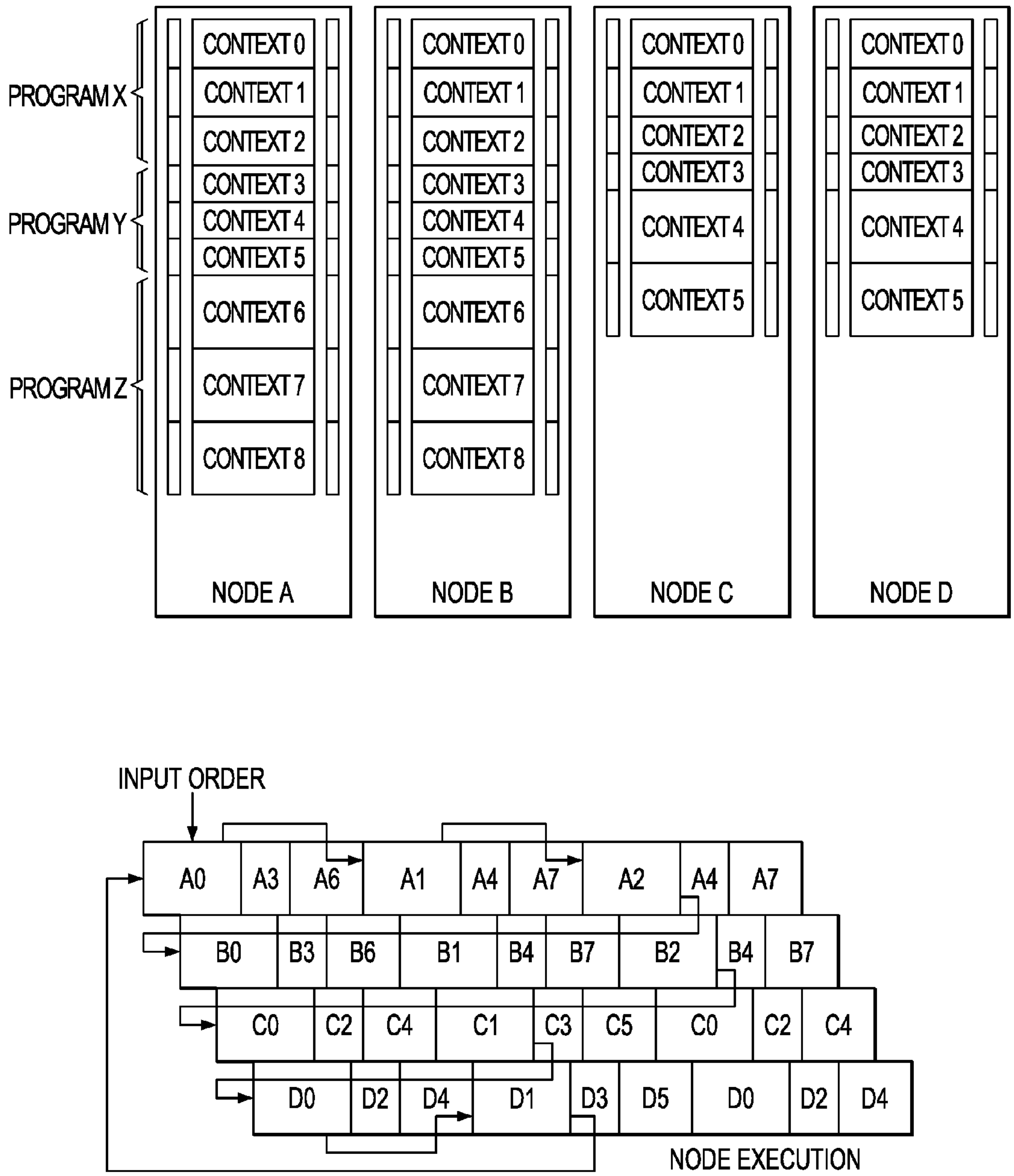
Figure 381:
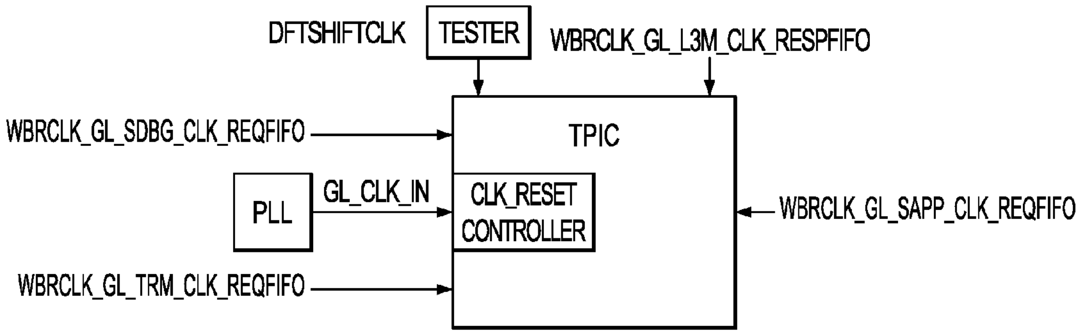
Figure 382:
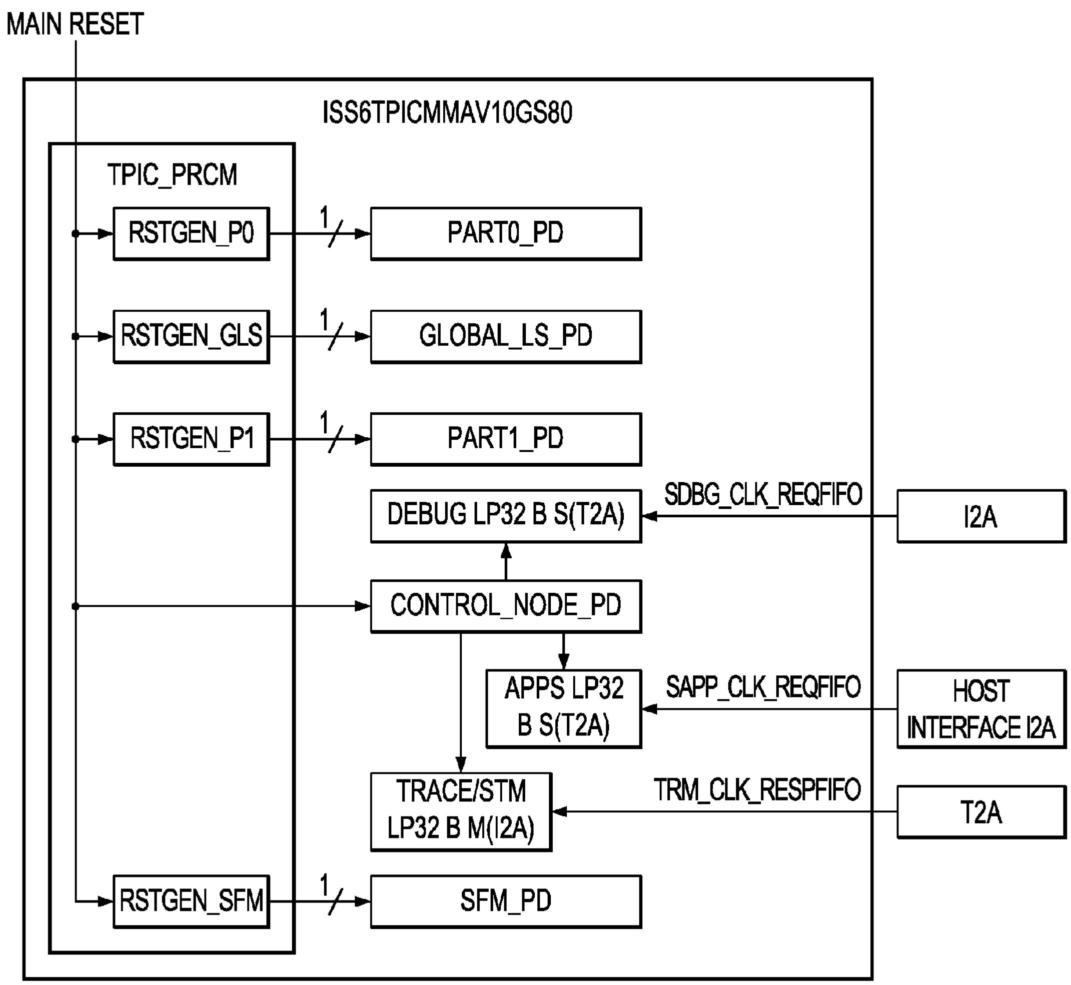
Figure 383:
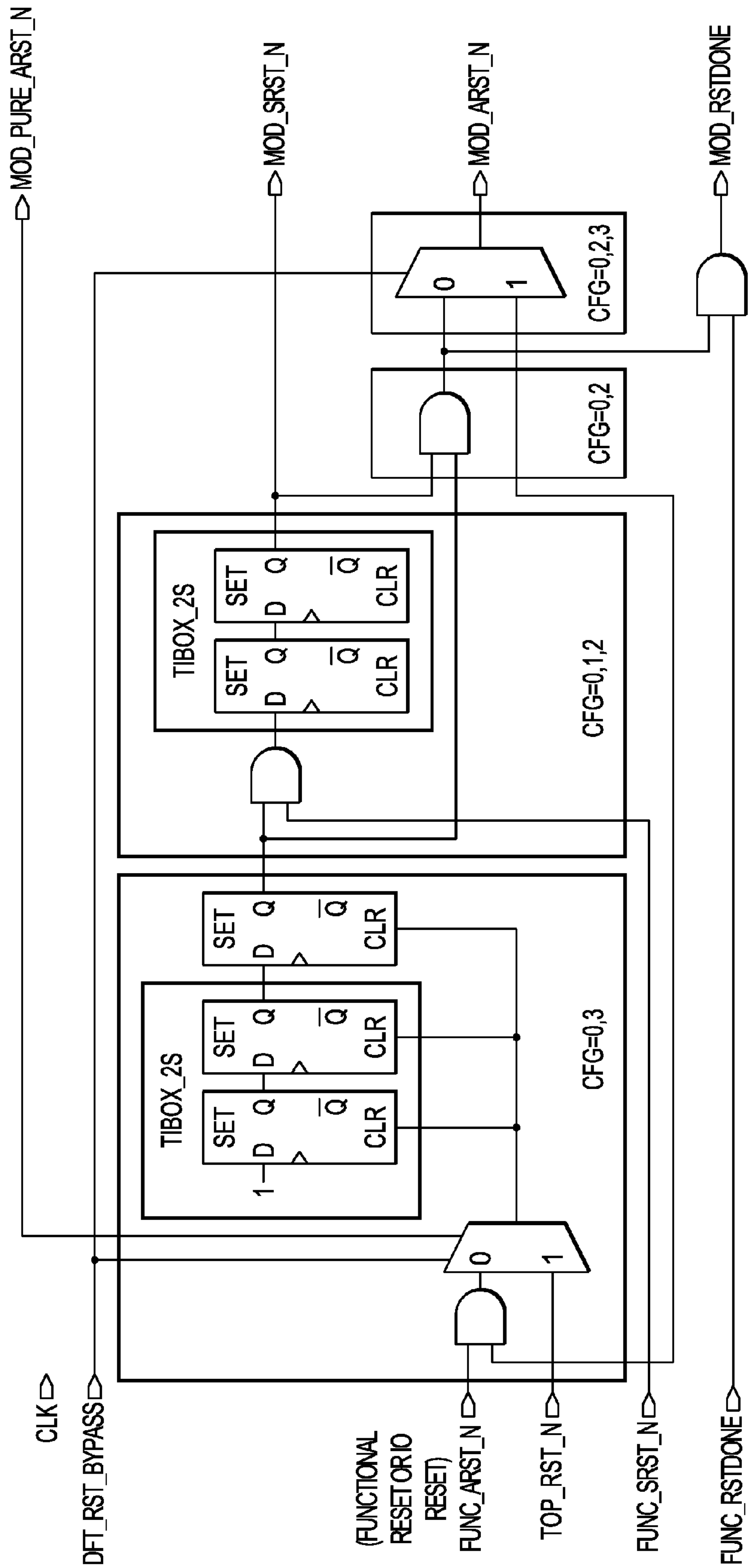
Figure 384:
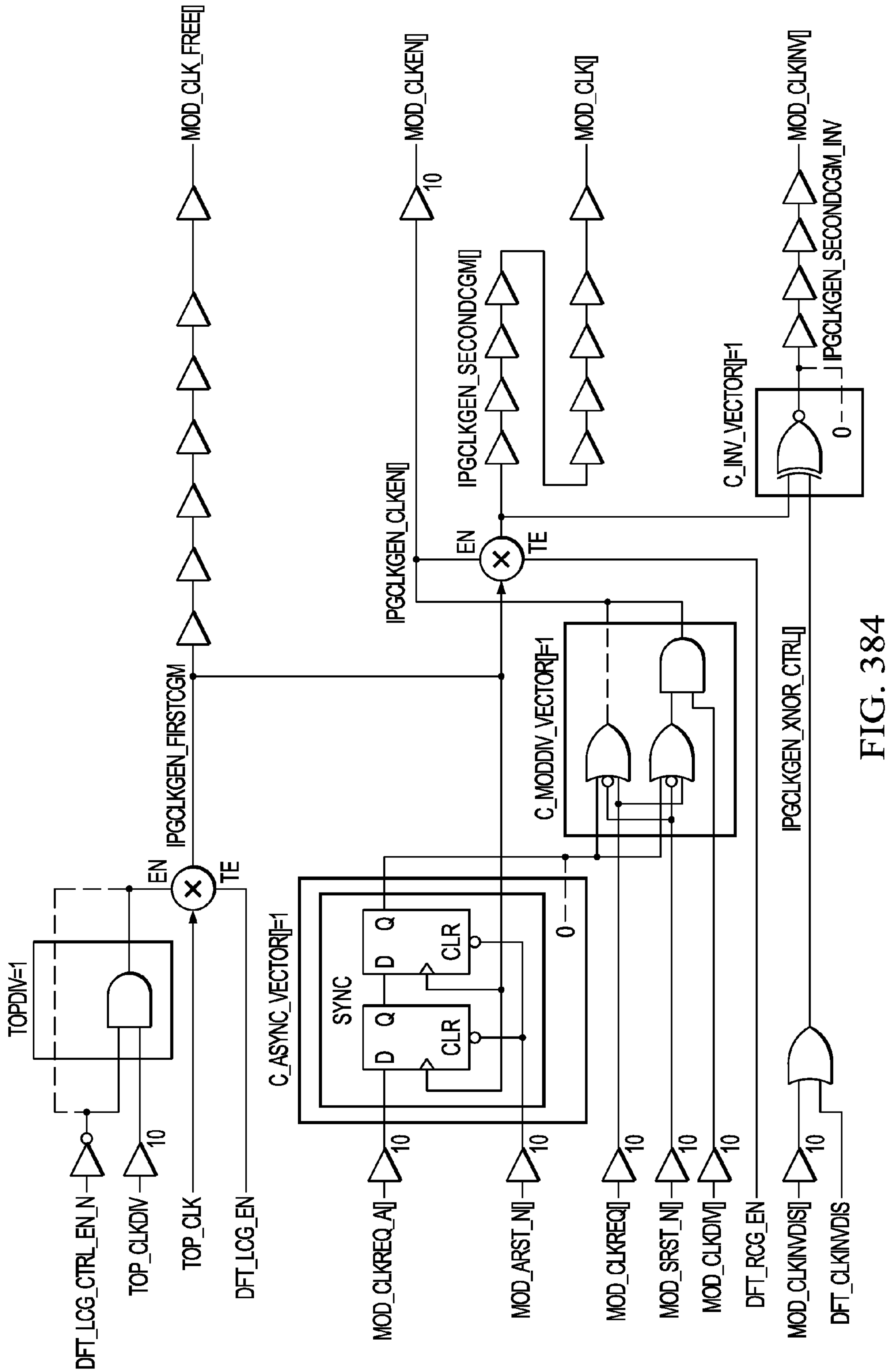
Figure 385:
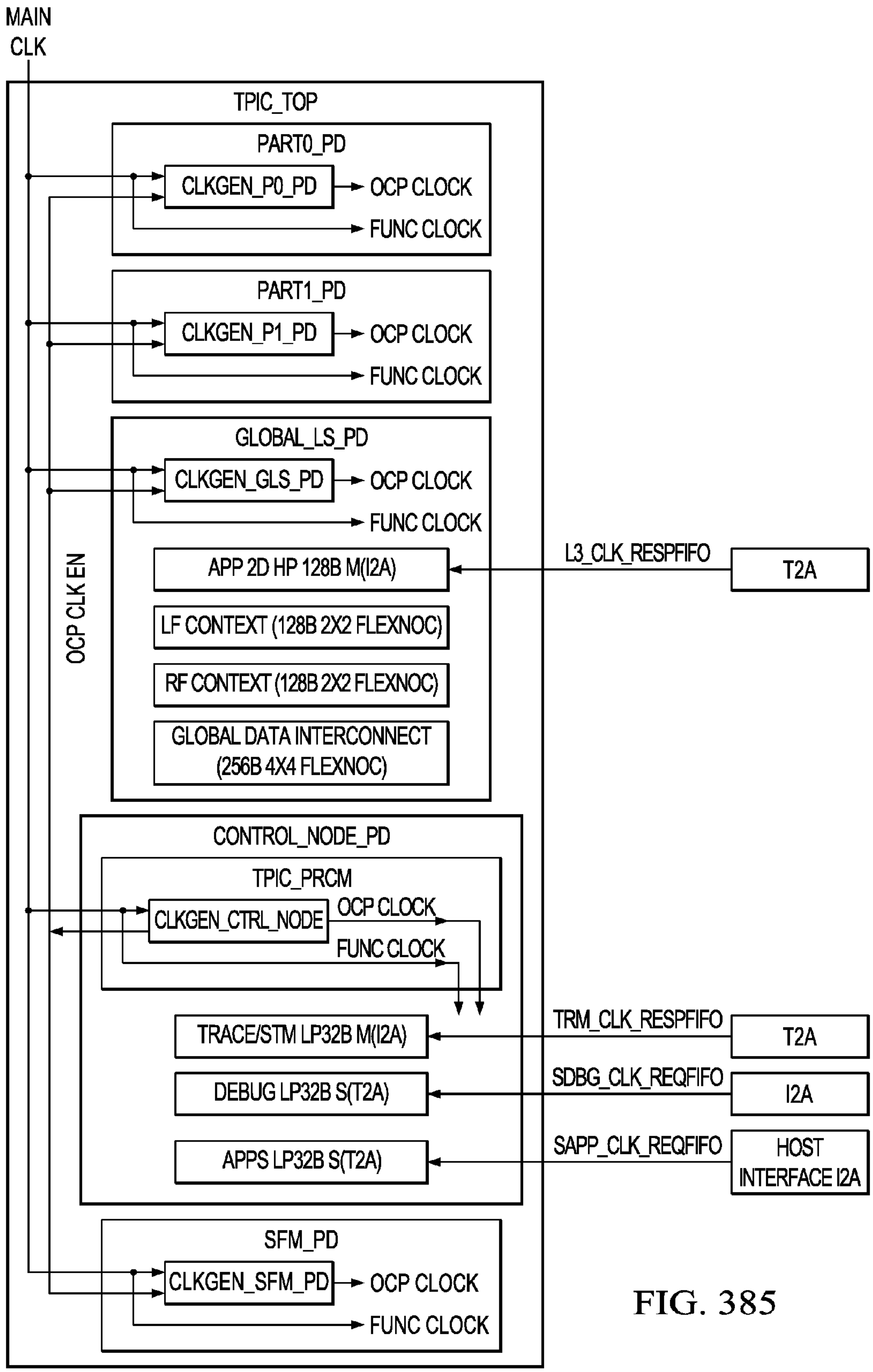
Figure 386:
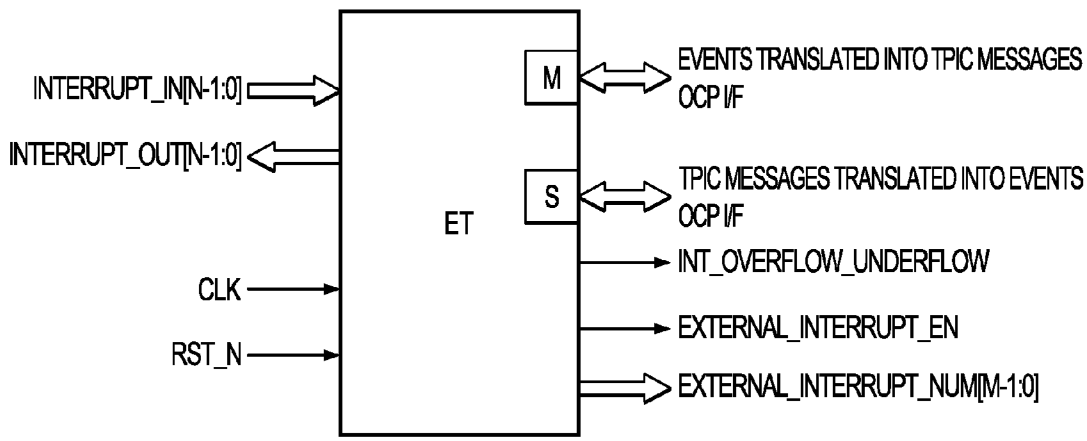
Figure 387:
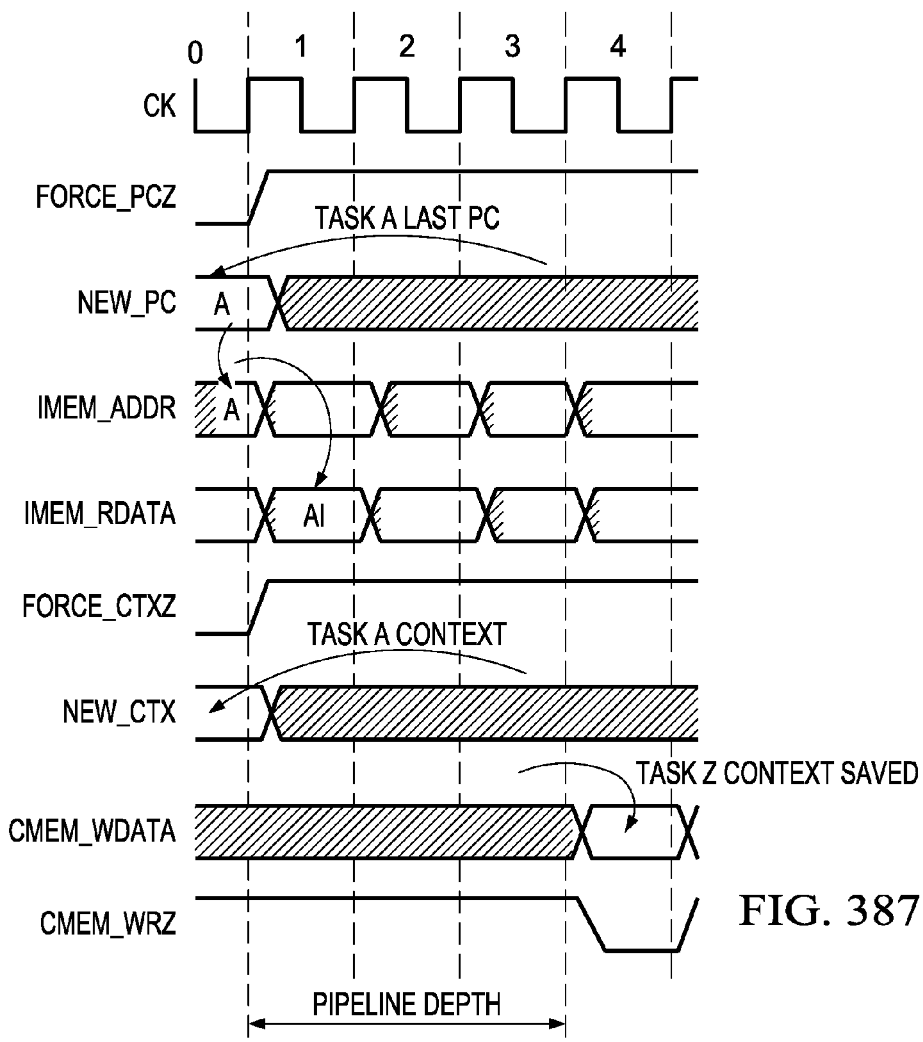

FIG. 338 is an example of a port interface write with bank conflicts;

FIG. 339 is an example of memory interface timing;

FIG. 340 is an example of a SFM power management signal chain;

FIG. 341 is a diagram of the interconnect architecture for a processing cluster;

FIG. 342 is an example of master sampling slave data;

FIG. 343 is an example of a master driving to slave that runs at ½ its clock;

FIG. 344 is a diagram of the message flow for initialization;

FIG. 345 is a diagram of the schedule message read thread from the control node to the GLS unit;

FIG. 346 is an example of a fetches and process a configuration structure;

FIG. 347 is a diagram of a configuration structure;

FIG. 348 is a diagram of the instruction memory initialization section;

FIG. 349 is a diagram of the LUT initialization section;

FIG. 350 is a diagram of the message action list section;

FIGS. 351 to 355 are examples of memory operations;

FIG. 356 is a diagram example of a read thread;

FIG. 357 is an example of a node writing data into a context from the global input buffer and setting the shared side contexts on the left and right;

FIG. 358 is an example of a node-to-node write;

FIG. 359 is an example of a write thread;

FIG. 360 is an example of a multi-cast thread;

FIG. 361 is an example of basic node allocation for a processing cluster;

FIG. 362 is a diagram of programmable modules grouped into path segments;

FIG. 363 is a diagram of each path in a segment having several paths through the programmable blocks;

FIG. 364 is an illustration of a frame-division processing for a processing cluster;

FIG. 365 is an example of compensation for a "lost" output context;

FIG. 366 depicts the calculations for allocation;

FIG. 367 depicts an example of node allocation for segments;

FIG. 368 shows a basic algorithm for node allocation;

FIG. 369 depicts segments illustrating an example result of basic node allocation;

FIG. 370 is a diagram of an example context allocation for the node allocation of FIG. 115;

FIG. 371 is a diagram of module allocation;

FIG. 372 is an example of autogenerated source code resulting from an allocation decision;

FIG. 373 provides examples of sections of autogenerated code for input type definitions and output variable declarations;

FIG. 374 is an example of a write thread;

FIGS. 375-380 are diagrams of an alternative resource allocation protocol;

FIG. 381 is an example of clocking for the processing cluster;

FIG. 382 is an example of the general reset distribution of processing cluster;

FIGS. 383 and 384 are examples of the structure and schematic of the ipgvrstgen module;

FIGS. 385 and 386 are examples of the interfaces between ET and other modules; and FIG. 387 is a diagram of an example of a zero cycle context switch.

DETAILED DESCRIPTION

Refer now to the drawings in which depicted elements are, for the sake of clarity, not necessarily shown to scale and in which like or similar elements are designated by the same reference numeral through the several views.

1. Overview

Figure 1:
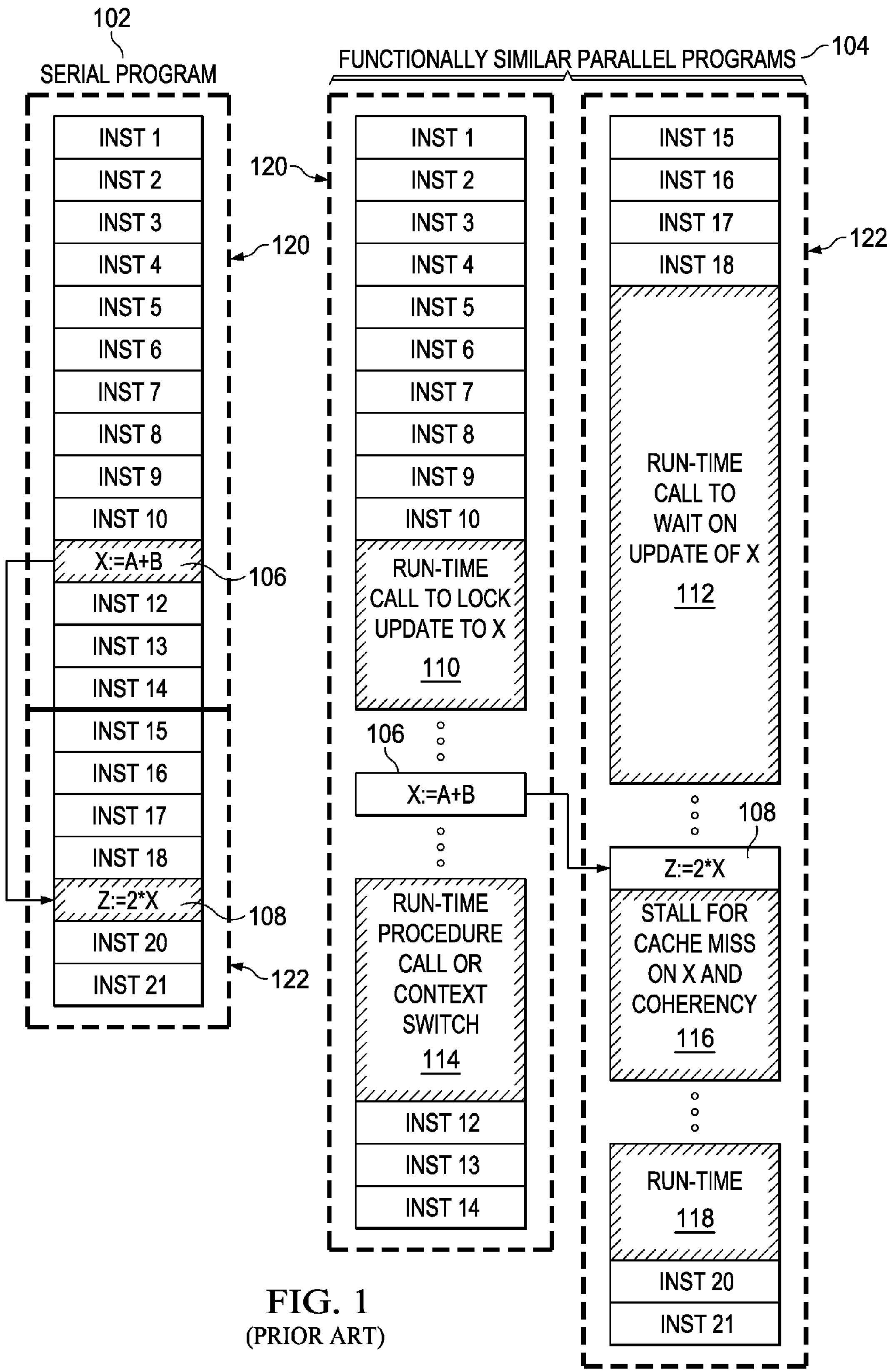
FIG. 1 is a diagram of serial and parallel program flows.
Figure 2:
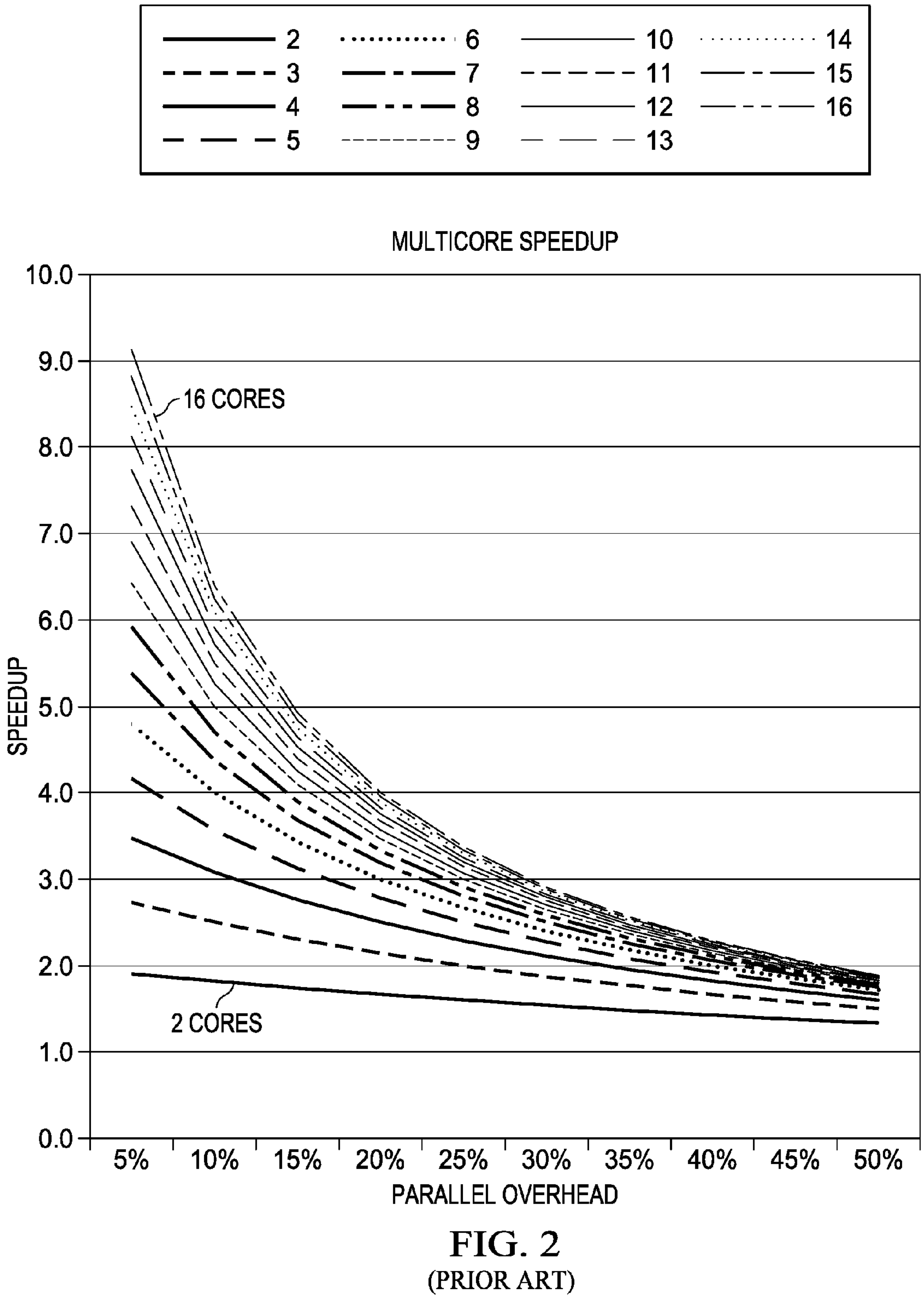
FIG. 2 is a graph of multicore speedup parameters.
Figure 3:
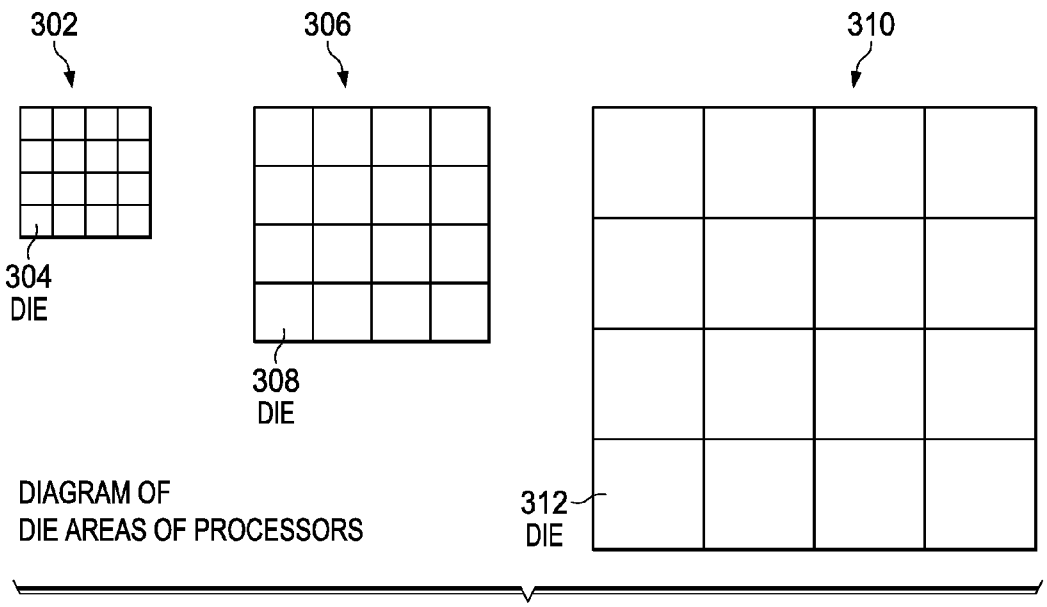
FIG. 3 is a diagram of die areas of processors.
Figure 4:
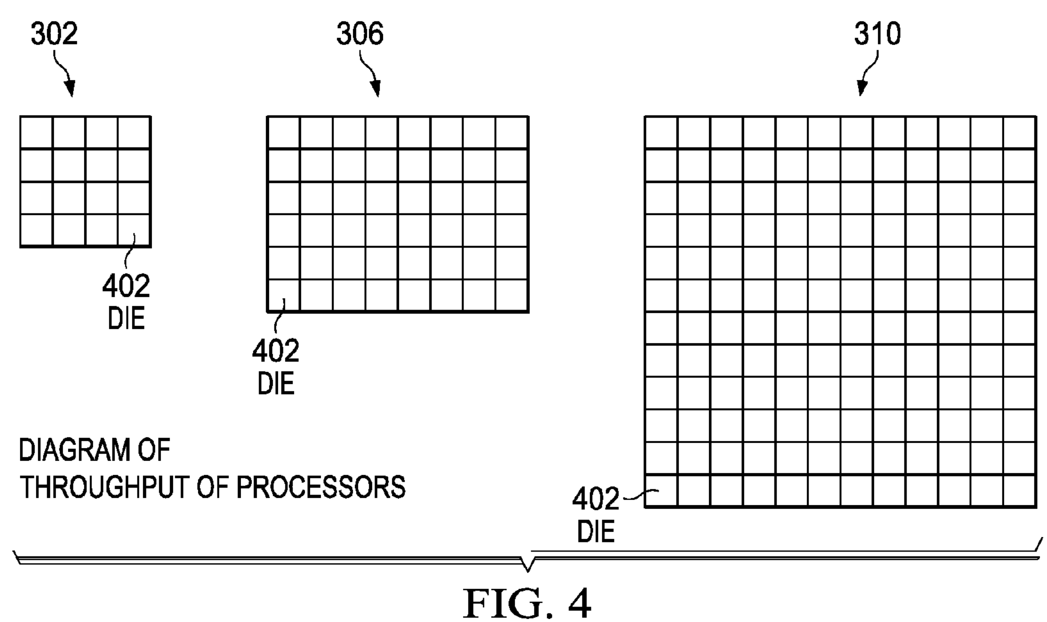
FIG. 4 is a diagram of throughput of processors.
Figure 5:
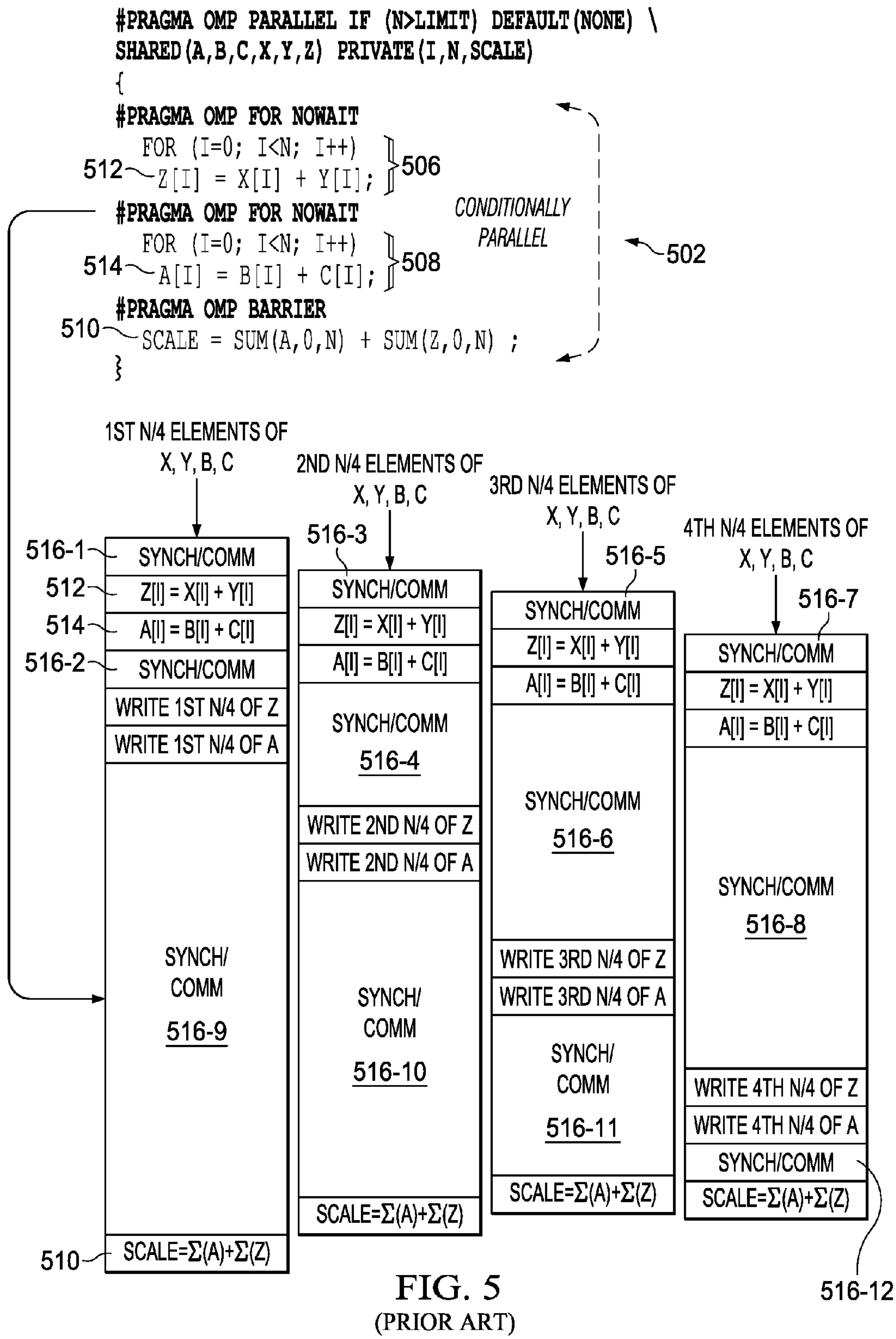
FIG. 5 is a diagram of serial and parallel program flows.
Figure 6:
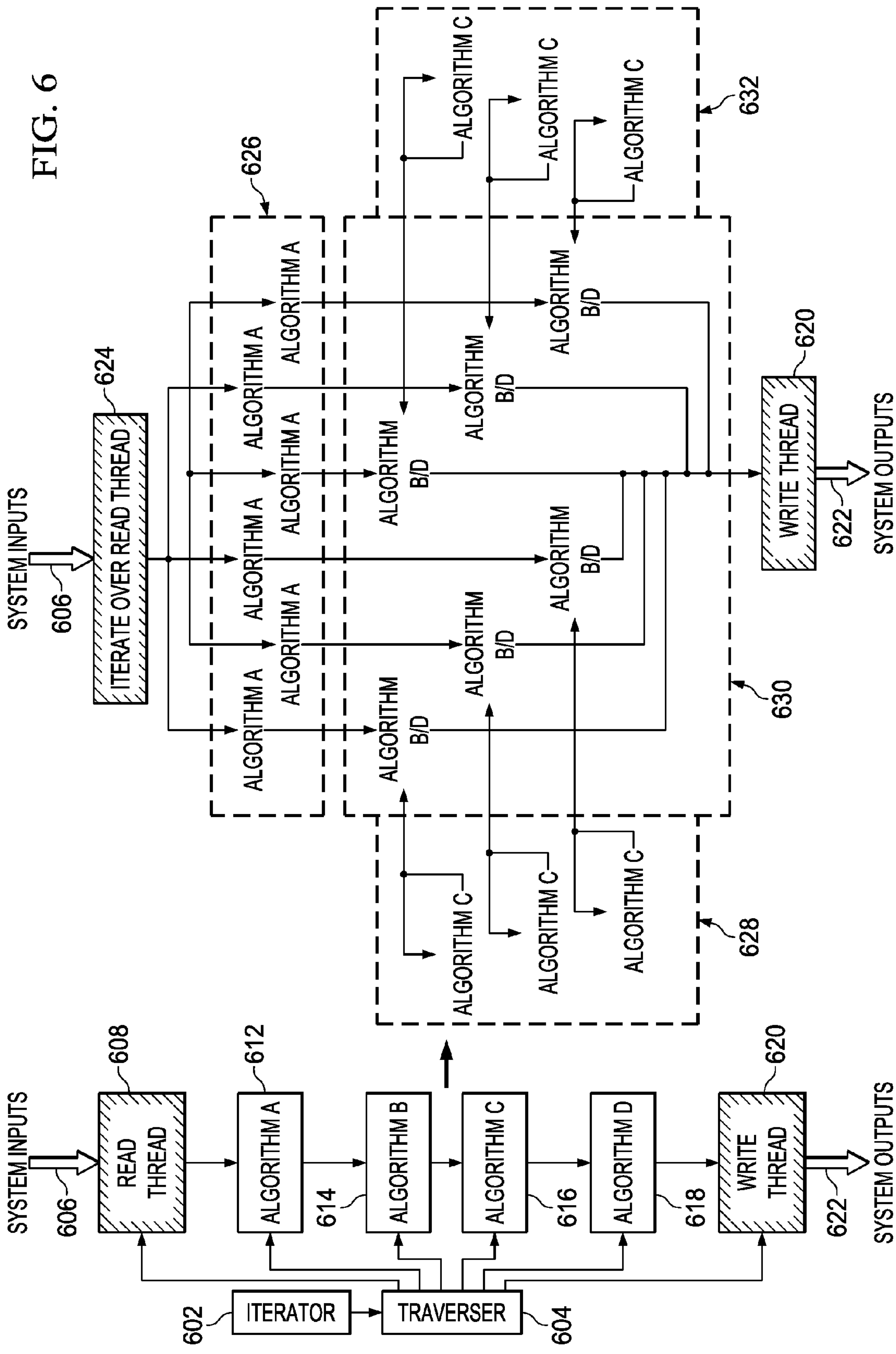
FIG. 6 is a diagram of a conversion of a serial program to a parallel program in accordance with an embodiment of the disclosure.

Turning to FIG. 6, an example of a conversion of a serial program 601 to a parallel implementation 603 in accordance with an embodiment of the present disclosure can be seen. Here, the serial program 601 is emulated in a hosted environment (i.e., C++) such that for serial execution: (1) data dependencies are generally resolved using procedure call order; (2) there are true object instantiations; and (3) the objects are communicated using pointers to public input structures. To accomplish this, an iterator 602 and traverser 604 are employed to restructure the serial program 601 (which is generally comprise of a read thread 608 that receives system inputs 606, serial modules 610, 612, 616, and 618, and a write thread 320 that writes system outputs 622 to create parallel implementation 603.

However, the source code for the serial program 601 is structured for autogeneration. When structure for autogeneration, an interate-over-read thread module 624 is generated to perform system reads for parallel modules 626 (which is comprised of parallel iterations of serial module 610), and the outputs from parallel module 626 are provided to parallel module 630 (which is generally comprised of parallel iterations of the serial modules 612 and 618). This parallel module 630 can then use parallel modules 628 and

630 (which are generally comprised of parallel iterations of serial module 616) to generate outputs for read thread 620.

With the parallel implementation 603, there are several desirable features. First, data dependencies are generally resolved by hardware. Second, there are no objects; instead standalone programs with "global" variables in private contexts are employed. Third, programs can communicate using hardware pointers and symbolic linkage of "externs" in source programs. Fourth, there is variable allocation of computing resources, and sources can be merged (e.g. modules 612 and 618) for efficiency.

Figure 7:
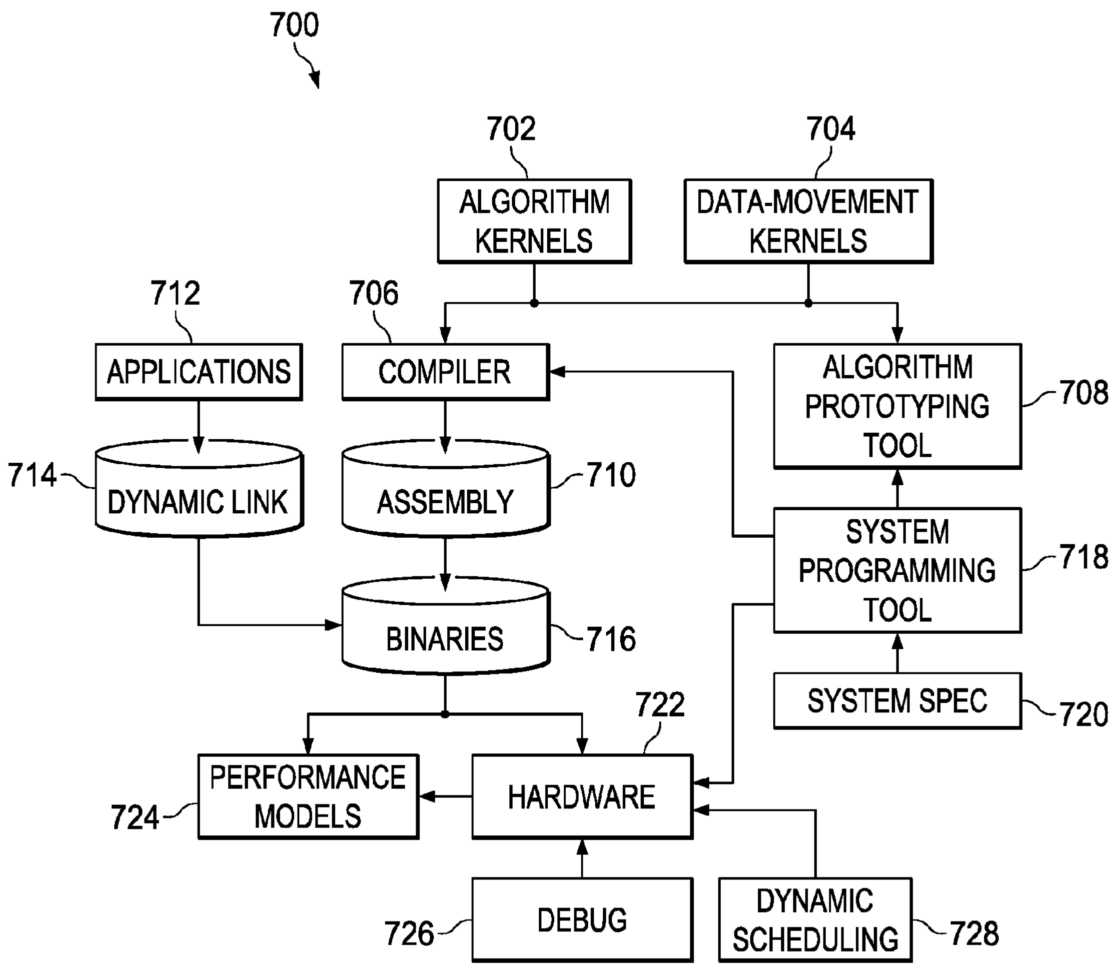
FIG. 7 is a diagram of a system in accordance with an embodiment of the present disclosure.

In order to implement such a parallel processing environment, a new architecture is generally desired. In FIG. 7, a system 700 in accordance with an embodiment of the present disclosure can be seen. This system 700 employs software tools that can compile source code (from a user) into a parallel implementation on hardware 722. Namely, system 700 employs a compiler 706 and algorithm prototyping tool 708 to generate assembly 710 and binaries 716 from algorithm kernels 702 and data-movement kernels 704. These kernels 702 and 704 are typically written in a high-level language (i.e., C++) and are structured to be autogenerated into a parallel implementation. System programming tool 718 can provide controls to the compiler 706 and algorithm prototyping tool 708 (based at least in part on the system specifications 720) to assist in generating the assembly 710 and binaries 716 for hardware 722 and can provide controls directly to hardware 722 to implement message, control, and configuration data structures. Debugging tool 726 can also be used to assist in implement message, control, and configuration data structures. Other applications 712 can also be implemented through dynamic links 714. Dynamic scheduling tool 728 and performance models 724 may also be implemented. Effectively, the system programming tool 718 and complier 706 (as well as other system tools) configure the hardware 722 to conform to a desired parallel implementation based on the application or algorithm kernel 702 and data-movement kernel 704.

Figure 8:
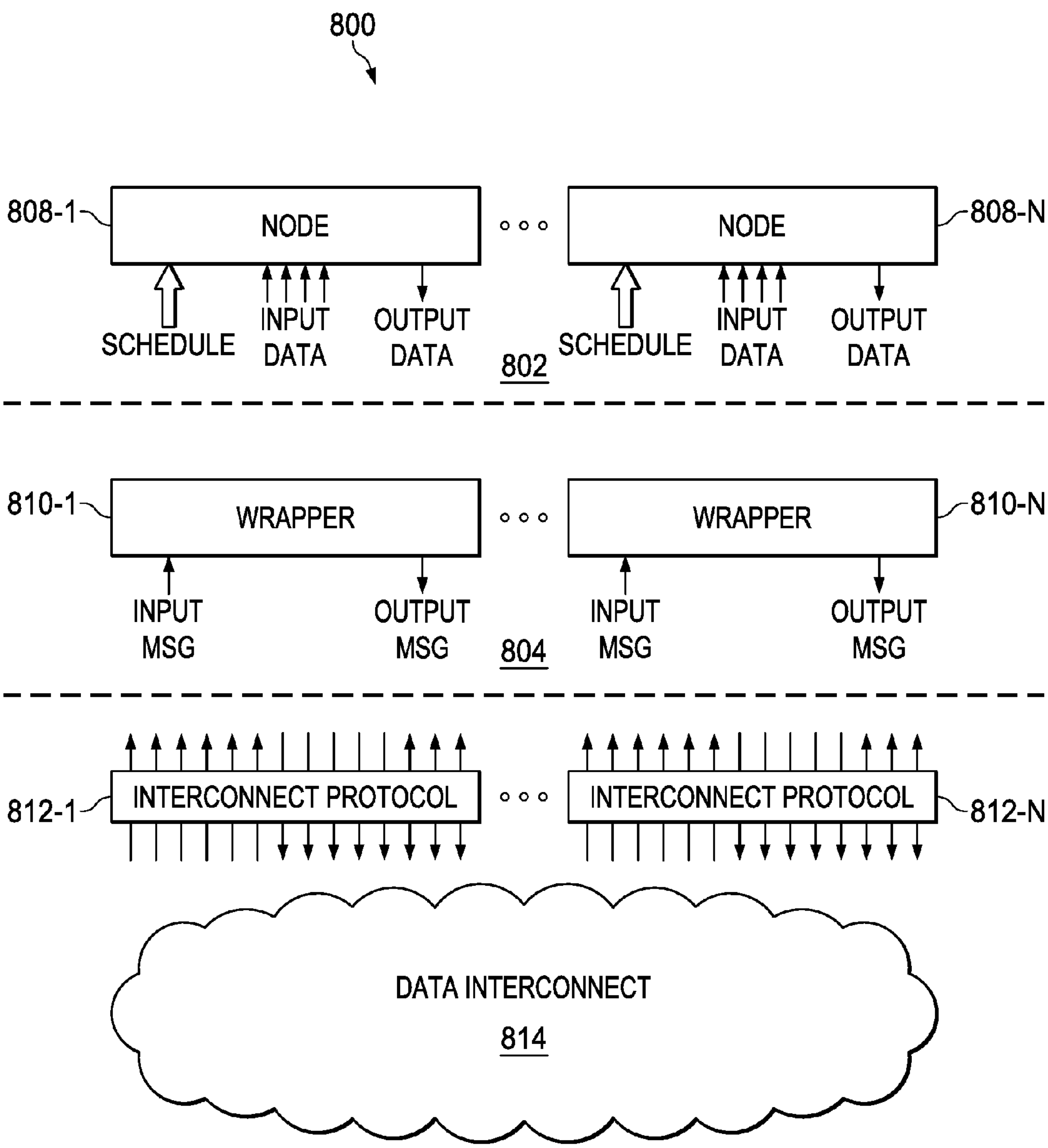
FIG. 8 is a diagram of a system interconnect for the hardware of FIG. 7.

In FIG. 8, a system interconnect diagram 800 for hardware 722 can be seen. As shown, the hardware 722 is generally comprised of three layers 802, 804, and 806. The first layer 802 generally includes nodes 808-1 to 808-N, which schedule programs, read input variables (input data), and write output variables (output data). Generally, these nodes 808-1 to 808-N perform operations. The second layer 804 is a messaging layer that includes wrappers or node wrappers 810-1 to 810-N, and the third layer 806 is an interconnect layer that uses data interconnect protocols 812-1 to 812-N (which are generally separate and independent of the messaging in layer 804), and data interconnect 814 to link nodes 808-1 to 808-N together in the desired parallel implementation.

Preferably, dataflow for hardware 722 is designed to minimize the cost of data communication and synchronization. Input variables to a parallel program can be assigned directly by a program executing on another core. Synchronization operates such that an access of a variable implies both that the data is valid, and that it has been written only once, in order, by the most recent writer. The synchronization and communication operations require no delay. This is accomplished using a context-management state, which can introduce interlocks for correctness. However, dataflow is normally overlapped with execution and managed so that these stalls rarely, if ever, occur. Furthermore, techniques of system 700 generally minimize the hardware costs of parallelism by enabling nearly unlimited processor customization, to maximize the number of operations sustained per cycle, and by reducing the cost of programming abstractions—both high-level language (HLL) and operating system (OS) abstractions—to zero.

One limitation on processor customization is that the resulting implementation should remain an efficient target of a HLL (i.e. C++) optimizing compiler, which is generally incorporated into complier 706. The benefits typically associated with binary compatibility are obtained by having cores remain source-code compatible within a particular set of applications, as well as designing them to be efficient targets of a compiler (i.e. complier 706). The benefits of generality are obtained by permitting any number of cores to have any desired features. A specific implementation has only the required subset of features, but across all implementations, any general set of features is possible. This can include unusual data types that are not normally associated with general-purpose processors.

Data and control flow are performed off "critical" paths of the operations used by the application software. This uses superscalar techniques at the node level, and uses multi-tasking, dataflow techniques, and messaging at the system level. Superscalar techniques permit loads, stores, and branches to be performed in parallel with the operational data path, with no cycle overhead. Procedure calls are not required for the target applications, and the programming model supports extensive in-lining even though applications are written in a modular form. Loads and stores from/to system memory and peripherals are performed by a separate, multi-threaded processor. This enables reading program inputs, and writing outputs, with no cycle overhead. The microarchitecture of nodes 808-1 to 808-N also supports fine-grained multi-tasking over multiple contexts with 0-cycle context switch time. OS-like abstractions, for scheduling, synchronization, memory management, and so forth are performed directly in hardware by messages, context descriptors, and sequencing structures.

Additionally, processing flow diagrams are normally developed as part of application development, whether programmed or implemented by an ASIC. Typically, however, these diagrams are used to describe the functionality of the software, the hardware, the software processes interacting in a host environment, or some combination thereof. In any case, the diagrams describe and document the operation of the hardware and/or software. System 700, instead, directly implements specifications, without requiring users to see the underlying details. This also maintains a direct correspondence between the graphical representation and the implementation, in that nodes and arcs in the diagram have corresponding programs (or hardware functions) and dataflow in the implementation. This provides a large benefit to verification and debug.

2. Parallelism

Typically, "parallelism" refers to performing multiple operations at the same time. All useful applications perform a very large number of operations, but mainstream programming languages (such as C++) express these operations using a sequential model of execution. A given program statement is "executed" before the next, at least in appearance. Furthermore, even applications that are implemented by multiple "threads" (separately executed binaries) are forced by an OS to conform to an execution model of time-multiplexing on a single processor, with a shared memory that is visible to all threads and which can be used for communication—this fundamentally imposes some amount of serialization and resource contention on the implementation.

To achieve a high level of parallelism, it should be possible to overlap any operations expressed by the original application program or programs, regardless of where in the HLL source operations appear. The only useful measure of overlap counts only the operations that matter to the end result of the application, not those that are required for flow control, abstractions, or to achieve correctness in a parallel system. The correct measure of parallelism effectiveness is throughput—the number of results produced per unit time—not utilization, or the relative amount of time that resources are kept busy doing something.

Ideally, the degree of overlap should be determined only by two fundamental factors: data dependencies and resources. Data dependencies capture the constraint that operations cannot have correct results unless they have correct inputs, and that no operation can be performed in zero time. Resources capture the constraint of cost—that it's not possible, in general, to provide enough hardware to execute all operations in parallel, so hardware such as functional units, registers, processors, and memories should be re-used. Ideally, the solution should permit the maximum amount of overlap permitted by a given resource allocation and a given degree of data interaction between operations. Parallel operations can be derived from any scope within an application, from small regions of code to the entire set of programs that implement the application. In rough terms, these correspond to the concepts of fine-, medium-, and coarse-grained parallelism.

"Instruction parallelism" generally refers to the overlapped execution of operations performed by instructions from a small region of a program. These instruction sequences are short—generally not more than a few 10's of instructions. Moreover, an instruction normally executes in a small number of cycles—usually a single cycle. And, finally, the operations are highly dependent, with at least one input of every operation, on average, depending on a previous operation within the region. As a result, executing instructions in parallel can require very high-bandwidth, low-latency data communication between operations: on the order of the number of parallel operations times the number of operands per operation, communicated in a single cycle via registers or direct forwarding. This data bandwidth makes it very expensive to execute a large number of instructions in parallel using this technique, which is the reason its scope is limited to a small region of the program.

Supporting a high degree of processor customization, to enable efficient multi-core systems, can reduce the effectiveness, or even feasibility, of compiler code generation. For a feature of the processor to be useful, the compiler 706 should be able to recognize a mapping from source code to the instruction set, to emit instructions using the feature. Furthermore, to the degree allowed by the processor resources, the compiler 706 should be able to generate code that has a high execution rate, or the number of desired operations per cycle.

Nodes 808-1 to 808-N are generally the basic target template for complier 706 for code generation. Typically, these nodes 808-1 to 808-N (which are discussed in greater detail below) include two processing units, arranged in a superscalar organization: a general-purpose, 32-bit reduced instruction set (RISC) processor; and a specialized operational data path customized for the application. An example of this RISC processor is described below. The RISC processor is typically the primary target for complier 706 but normally performs a very small portion of the application because it has the inefficiencies of any general-purpose processor. Its main purpose is to generally ensure correct operation regardless of source code (though not necessarily efficient in cycle count), to perform flow control (if any), and to maintain context desired by the operational data path.

Most of the customization for the application is in the operational data path. This has a dedicated operand data memory, with a variable number of read and write ports (accomplished using a variable number of banks), with loads to and stores from a register file with a variable number of registers. The data path has a number of functional units, in a very long instruction word (VLIW) organization—up to an operation per functional unit per cycle. The operational data path is completely overlapped with the RISC processor execution and operand-memory loads and stores. Operations are executed at an upper limit of the rate permitted by data dependencies and the number of functional units.

The instruction packet for a node 808-1 to 808-N generally comprises a RISC processor instruction, a variable number of load/store instructions for the operand memory, and a variable number of instructions for the functional units in the data path (generally one per functional unit). The compiler 706 schedules these instructions using techniques similar to those used for an in-order superscalar or VLIW microarchitecture. This can be based on any form of source code, but, in general, coding guidelines are used to assist the compiler in generating efficient code. For example, conditional branches should be used sparingly or not at all, procedures should be in-line, and so on. Also, intrinsics are used for operations that cannot be mapped well from standard source code.

There is also another dimension of instruction parallelism. It is possible to replicate the operational data path in a single input multiple data (SIMD) organization, if appropriate to the application, to support a higher number of operations per cycle. This dimension is generally hidden from the compiler 706 and is not usually expressed directly in the source code, allowing the hardware 722 to be sized for the application.

"Thread parallelism" generally refers to the overlapped execution of operations in a relatively large span of instructions. The term "thread" refers to sequential execution of these instructions, where parallelism is accomplished by overlapping multiples of these instruction sequences. This is a broad classification, because it includes entire programs executed in parallel, code at different levels of program abstraction (applications, libraries, run-time calls, OS, etc.), or code from different procedures within the same level of abstraction. These all share the characteristic that only moderate data bandwidth is required between parallel operations (i.e., for function parameters or to communicate through shared data structures). However, thread parallelism is very difficult to characterize for the purposes of data-dependency analysis and resource allocation, and this introduces a lot of variation and uncertainty in the benefits of thread parallelism.

Thread parallelism is typically the most difficult type of parallelism to use effectively. The basic problem is that the term "thread" means nothing more than a sequence of instructions, and threads have no other, generalized characteristics in common with other threads. Typically, a thread can be of any length, but there is little advantage to parallel execution unless the parallel threads have roughly the same execution times. For example, overlapping a thread that executes in a million cycles with one that executes in a thousand cycles is generally pointless because there is a 0.1% benefit assuming perfect overlap and no interaction or interference.

Additionally, threads can have any type of dependency relationship, from very frequent access to shared, global variables, to no interaction at all. Threads also can imply exclusion, as when one thread calls another as a procedure, which implies that the caller does not resume execution until the callee is complete. Furthermore, there is not necessarily anything in the thread itself to describe these dependencies. The dependencies should be detected by the threads' address sequences, or the threads should perform explicit operations such as using lock mechanisms to generally provide correct ordering and dependency resolution.

Finally, a thread can be any sequence of any instructions, and all instructions have resource dependencies of some sort, often at several levels in the system such as caches and shared memories. It is impossible, in general, to schedule thread overlap so there is no resource contention. For example, sharing a cache between two threads increases the conflict misses in the cache, which has an effect similar to reducing the size of the cache for a single thread by a factor of four, so what is overlapped consists of a much higher percentage of cache reload time due both to higher conflict misses and to an increase reload time resulting from higher demand on system memory. This is one of the reasons that "utilization" is a poor measure of the effectiveness of overlapped execution, as opposed to throughput. Overlapped stalls increase utilization but do nothing for throughput, which is what users care about.

Figure 9:
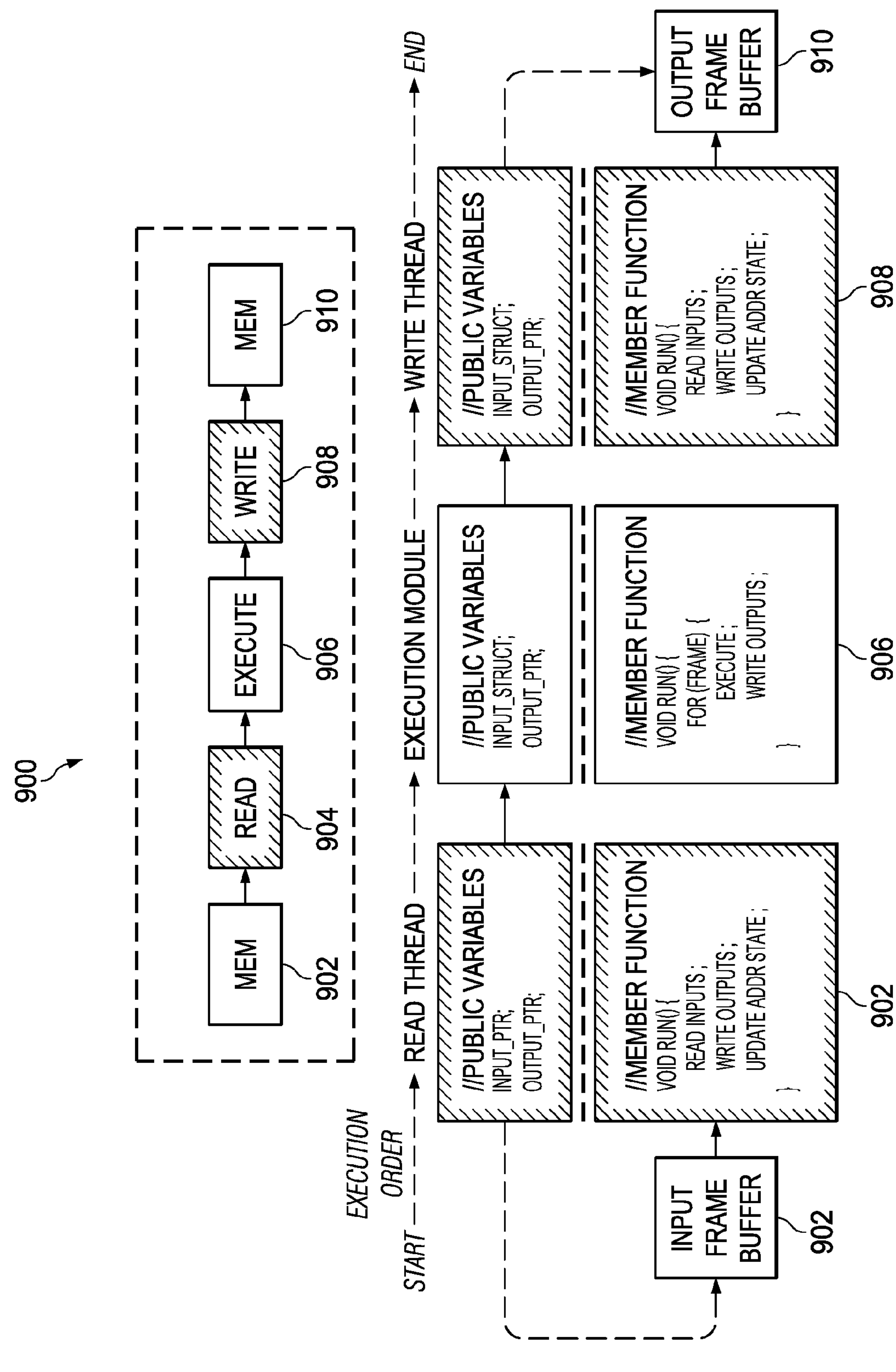
FIG. 9 is a diagram of a generalized execution sequence for a memory-to-memory operation.

System 700, however, uses a specific form of "thread" parallelism, which is based on objects, that avoids these difficulties, as illustrated in FIG. 9. This generalized execution sequence 900 shows a memory-to-memory operation, which is structured in the form of three object instances: (1) a read thread 904 that accesses memory 902 and places data into an input data structure that is a public variable of a second object; (2) an execution module 906 that operates on this data and produces results into the input variable of a third object; and (3) a write thread 908 that writes the results of the execution module back into memory 910. Sequential execution is maintained by calling the member functions of these objects 904, 906, and 908 in sequence from left to right. Structuring programs in this way provides several advantages.

Objects serve as a basic unit for scheduling overlapped execution because each object module (i.e., 904, 906, and 908) can be characterized by execution time and resource utilization. Objects implement specific functionality, instead of control flow, and execution time can be determined from parameters such as buffer size and/or the degree of loop iteration. As a result, objects (i.e., 904, 906, and 908) can be scheduled onto available resources with a high degree of control over the effectiveness of overlapped execution.

Objects also typically have well-defined data dependencies given directly by the pointers to input data structures of other objects. Inputs are typically read-only. Outputs are typically write-only, and general read/write access is generally only allowed to variables contained within the objects (i.e., 904, 906, and 908). This provides a very well-structured mechanism for dependency analysis. It has benefits to parallelism similar to those of functional languages (where functional languages can communicate through procedure parameters and results) and closures (where closures are similar to functional languages except that a closure can have local state that is persistent from one call to the next, whereas in functional languages local variables are lost at the end of a procedure). However, there are advantages to using objects for this purpose instead of parameter-passing to functions, namely Passing data in public variables provides the generality of global variables, in that variables can be written from multiple sources. Thus, objects do not constrain dataflow as one-to-one, procedure-call interfaces do. However, public variables avoid the drawbacks of sharing global variables, since each object instance has its own copy of input state, and replicating objects, for parallelism, also replicates this state.

Objects can have externally-accessible state that is persistent from one invocation to the next, so that only changes in state desire be communicated between invocations. Parameter passing to functions generally can require that all input state be marshaled for the call. Functional languages generally require that even constants are passed for each call, and, while closures have persistent state, this is state not accessible from outside the closure.

Objects separate application components from their deployment in a particular use-case. For example, a given filtering algorithm can appear at multiple stages in a processing chain depending on the use-case. Instead of requiring different versions of source code to reflect this difference (different code structure depending on the filter locations within the use-case), separate instances of the same object class (the filter) can be used in both cases, with the connection topology reflected in the configuration of the pointers and the sequence of execution, which are independent of the object class.

Objects, used in this style, map very well to an execution model of a number of concurrent processing nodes with private memories. Procedure-call interfaces, on the other hand, imply that that a caller is "suspended" during a called procedure. Resource contention between objects is easy to determine and control, because objects can be mapped from one extreme of every object having a dedicated resource allocation—and executing completely overlapped—to the other extreme of all objects sharing the same resources and executing serially.

This style also maps very well to structured communication between overlapped objects, using simple interconnect. Outputs are written directly to inputs, implying a single, point-to-point transfer over the interconnect. Sources write directly to destinations, using any defined addressing mode for any defined data type. Data doesn't have to be assembled into transfer payloads, for example, and data dependencies are resolved between sources and destinations in a distributed fashion, instead of using shared locks, and so forth.

"Data Parallelism" generally refers to the overlapped execution of operations which have very few (or no) data dependencies, or which have data dependencies that are very well structured and easy to characterize. To the degree that data communication is required at all, performance is normally sensitive only to data bandwidth, not latency. As a side effect, the overlapped operations are typically well balanced in terms of execution time and resource requirements. This category is sometimes referred to as "embarrassingly parallel." Typically, there are four types of data parallelism that can be employed: client-server, partitioned-data, pipelined, and streaming.

In client-server systems, computing and memory resources are shared for generally unrelated applications for multiple clients (a client can be a user, a terminal, another computing system, etc.). There are few data dependencies between client applications, and resources can be provided to minimize resource conflicts. The client applications typically require different execution times, but all clients together can present a roughly constant load to the system that, combined with OS scheduling, permits efficient use of parallelism.

In partitioned-data systems, computing operates on large, fixed-size datasets that are mostly contained in private memory. Data can be shared between partitions, but this sharing is well structured (for example, leftmost and rightmost columns of arrays in adjacent datasets), and is a small portion of the total data involved in the computation. Computing is naturally overlapped, since all compute nodes perform the same operations on the same amount of data.

In pipelined systems, there is a large amount of data sharing between computations, but the application can be divided into long phases that operate on large amounts of data and that are independent of each other for the duration of the phase. At the end of a phase, data is passed to the next phase. This can be accomplished either by copying data directly, by exchanging pointers to the data, or by leaving the data in place and swapping to the program for the next phase to operate on the data. Overlap is accomplished by designing the phases, and the resource allocation, so that each phase can require approximately the same execution time.

In streaming systems, there is a large amount of data sharing between computations, but the application can be divided into short phases that operate on small amounts of input data. Data dependencies are satisfied by overlapping data transmission with execution, usually with a small amount of buffering between phases. Overlap is accomplished by matching each phase to the overall requirements of end-to-end throughput.

The framework of system 700 generally encompasses all of these levels of parallel execution, enabling them to be utilized in any combination to increase throughput for a given application (the suitability of a particular granularity depends on the application). This uses a structured, uniform set of techniques for rapid development, characterization, robustness, and re-use.

Figure 10:
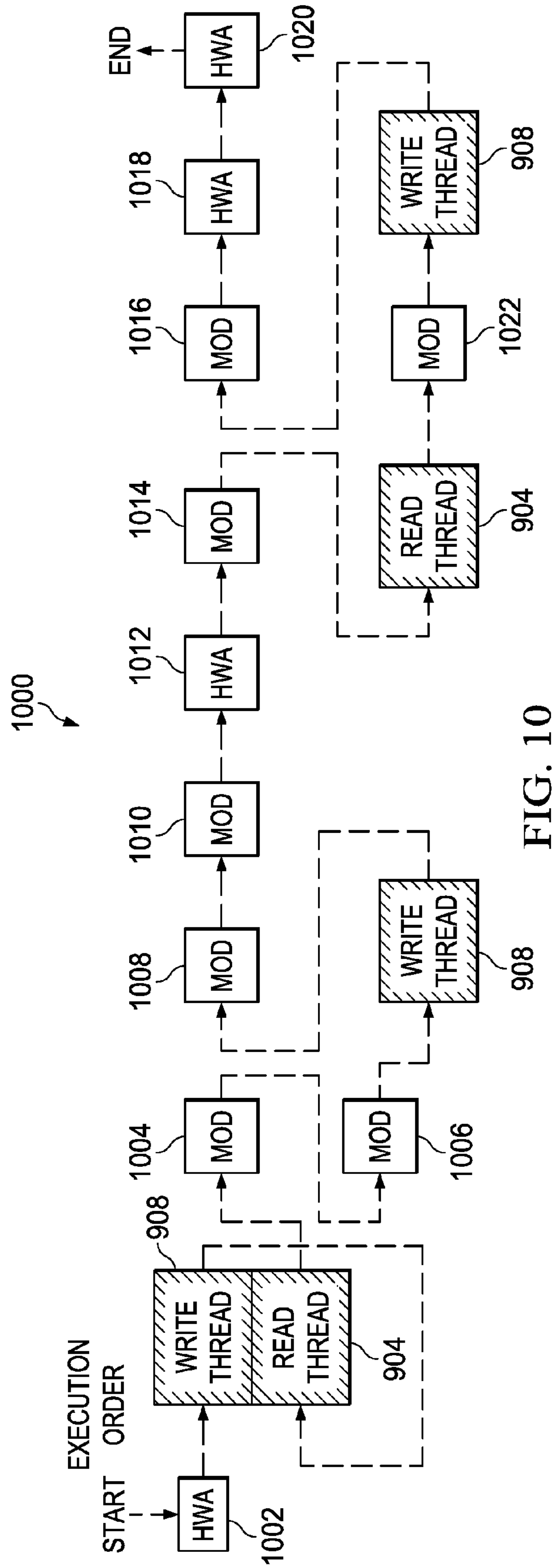
FIG. 10 is a diagram of a generalized, object-based, sequential execution sequence in a streaming system.

Turning now to FIG. 10, a generalized form of a streaming system can be seen. This generalized object-based sequential execution sequence 1000 enables point-to-point communication of any set of data, of any types, between any source-destination pairs. In sequence or use-case graph 1000, there are numerous modules 1004, 1006, 1008, 1010, 1014, 1016, and 1022, and hardware elements 1002, 1012, 1018, and 1020. The execution sequence is defined by a user. Because the execution sequence 1000 is sequential, no parallelism primitives are exposed to the programmer. Instead, parallelism is implemented by the system 700, mapping this sequential model to a "correct" parallel execution model.

Figure 11:
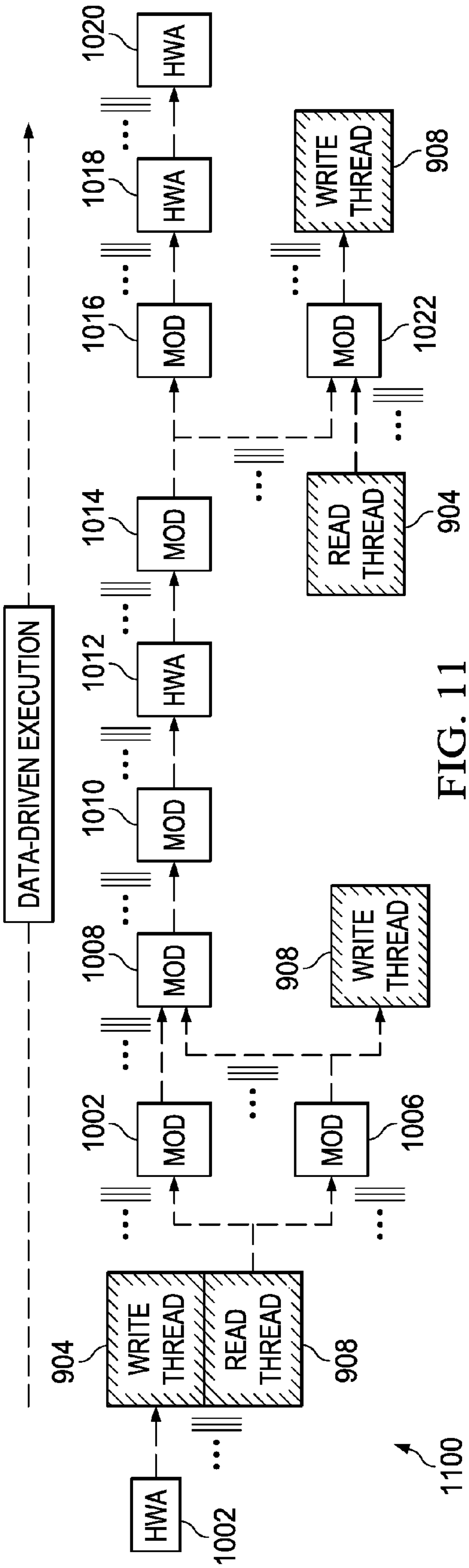
FIG. 11 is a diagram of a parallel execution model over a multi-core processor.
Figure 12:
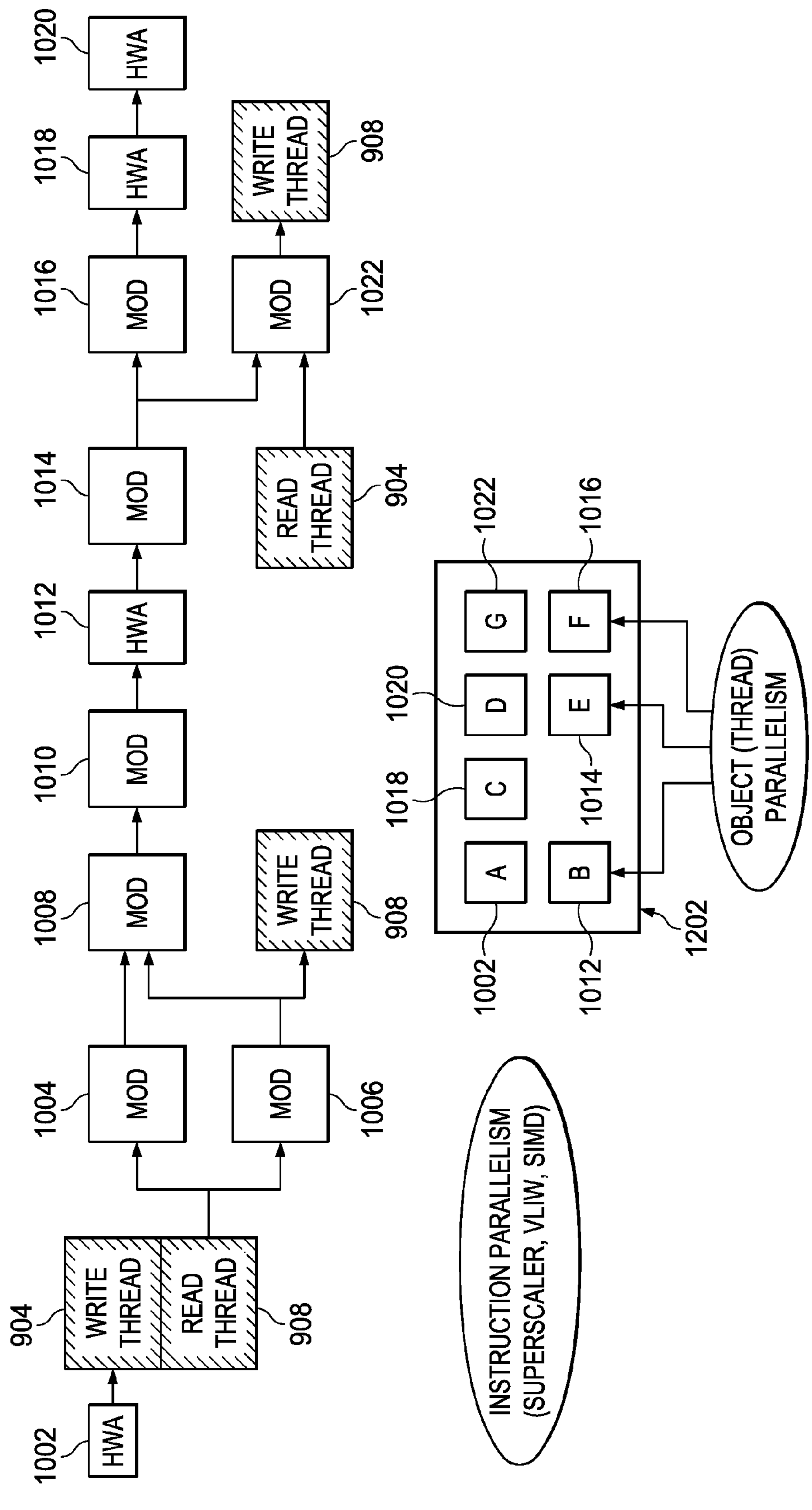
FIG. 12 is a diagram of a parallel execution model over multi-core processor.

Even though this example in FIG. 10 generally conforms to a serial execution model, it also can be mapped almost directly onto a parallel execution model over multi-core processor 1202 shown in FIGS. 11 and 12. Object instances (and hardware accelerators) can execute using read-only input and read/write internal state with write-only outputs through pointers to external state (with no local memory allocated for outputs). This results in the possibility that execution can be completely overlapped, with some additional requirement that there be a mechanism to resolve dependencies between sources and destinations. Parallel readers and writers of state are explicitly and clearly defined, and there is a writer for any shared state.

The dependency mechanism generally ensures that destination objects do not execute until all input data is valid and that sources do not over-write input data until it is no longer desired. In system 700, this mechanism is implemented by the dataflow protocol. This protocol operates in the background, overlapped with execution, and normally adds no cycles to parallel operation. It depends on compiler support to indicate: 1) the point in execution in which a source has provided all output data, so that destinations can begin execution; and 2) the point in execution where a destination no longer can require input data, so it can be over-written by sources. Since programs generally behave such that inputs are consumed early in execution, and outputs are provided late, this permits the maximum amount of overlap between sources and destinations—destinations are consuming previous inputs while sources are computing new inputs.

The dataflow protocol results in a fully general streaming model for data parallelism. There is no restriction on the types of, or the total size of, transferred data. Streaming is based on variables declared in source code (i.e., C++), which can include any user-defined type. This allows execution modules to be executed in parallel, for example modules 1004 and 1006, and also allows overall system throughput to be limited by the block that has the longest latency between successive outputs (the longest cycle time from one iteration to the next). With one exception, this permits the mapping of any data-parallel style onto a system 700.

Figure 13:
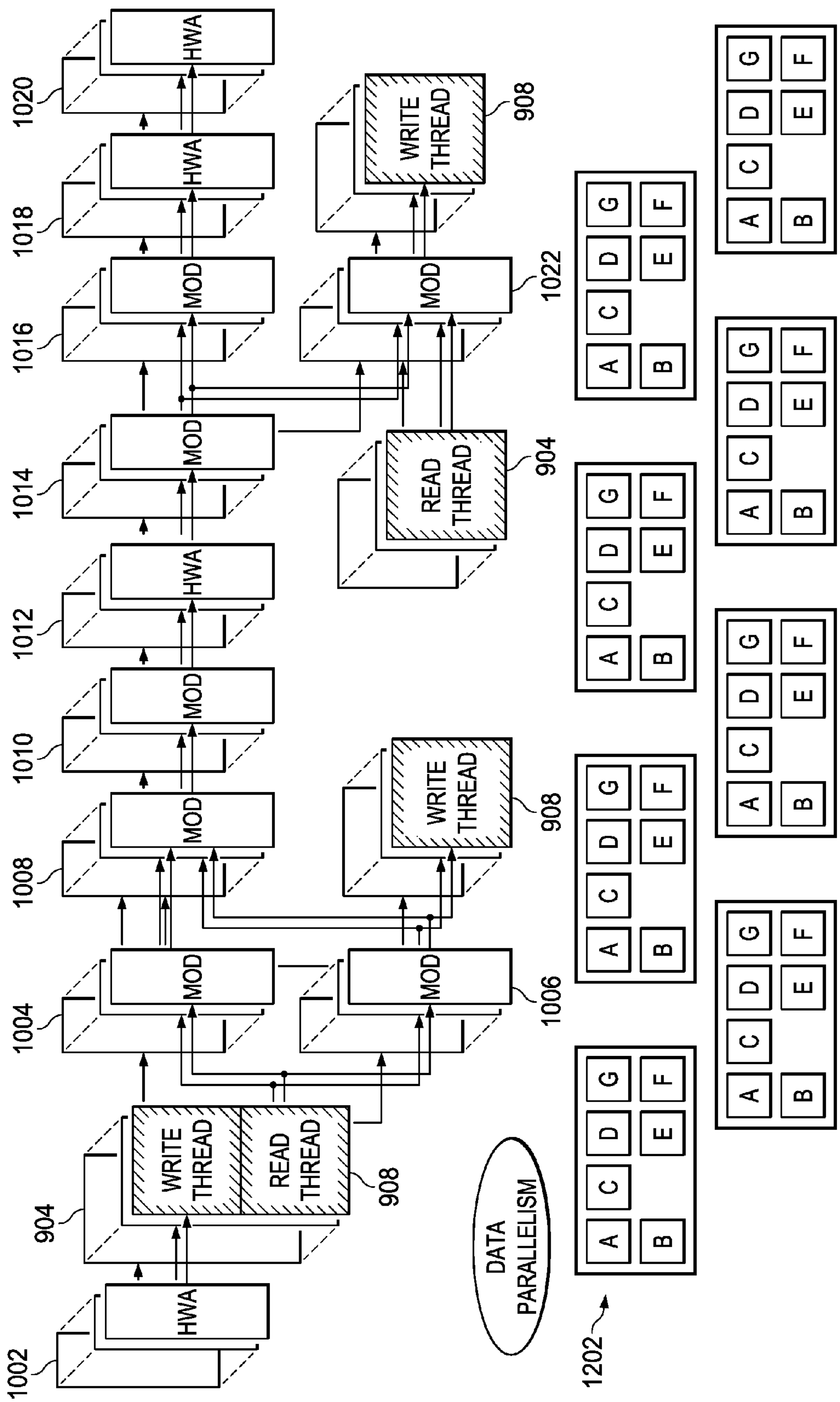
FIG. 13 is a diagram of the execution modules of FIGS. 11 and 12 replicated multiple times to operate on different portions of the same dataset.

An exception to mapping data-parallel systems arises in partitioned-data parallelism as shown in FIG. 13. Here, the same execution module is replicated multiple times to operate on different portions of the same dataset. System 700 includes mechanisms for extensive data sharing between multiple instances of the same object class executing the same program (this is described as local context management). In this case, multiple objects executing in parallel can be considered, logically, as a single instance of the object operating on a large context.

As already mentioned, data parallelism is not effective unless the overlapped threads have roughly the same execution time. This problem is overcome in system 700 using static scheduling to balance execution time within throughput requirements (assuming there are sufficient resources). This scheduling increases the throughput of long threads (with the same effect as reducing execution time) by replicating objects and partitioning data, and increases the effective execution time of short threads by having them share computing resources—either multi-tasking on a shared compute node, or by physically combining source code into a single thread.

3. General Processor Architecture

3.1. Example Application

Figure 14:
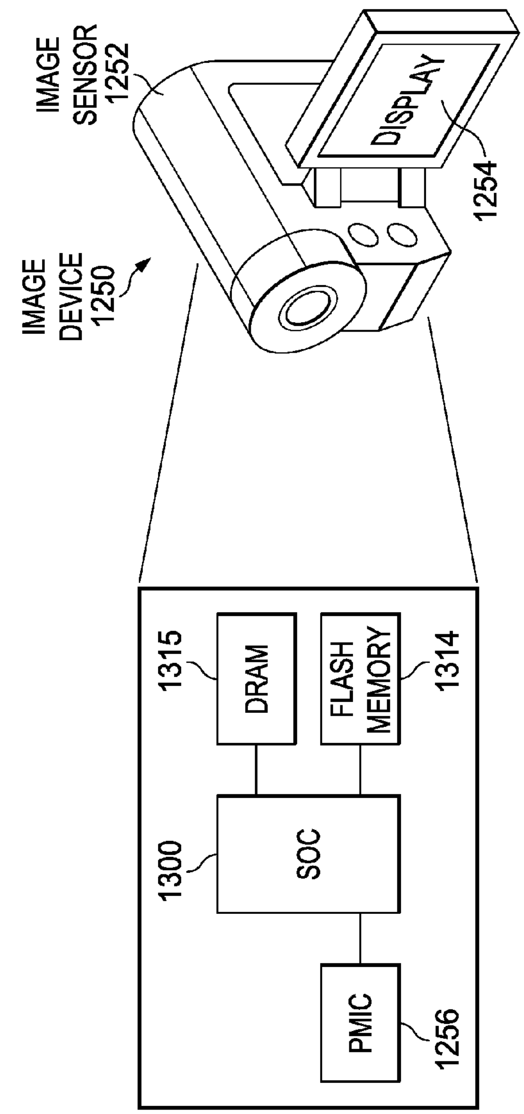
FIG. 14 is a diagram of a system in accordance with an embodiment of the present disclosure.

An example of application for an SOC that performs parallel processing can be seen in FIG. 14. In this example, an imaging device 1250 is shown, and this imaging device 1250 (which can, for example, be a mobile phone or camera) generally comprises an image sensor 1252, an SOC 1300, a dynamic random access memory (DRAM) 1315, a flash memory 1314, display 1254, and power management integrated circuit (PMIC) 1256. In operation, the image sensor 1252 is able to capture image information (which can be a still image or video) that can be processed by the SOC 1300 and DRAM 1315 and stored in a nonvolatile memory (namely, the flash memory 1314). Additionally, image information stored in the flash memory 1314 can be displayed to the use over the display 1254 by use of the SOC 1300 and DRAM 1315. Also, imaging devices 1250 are oftentimes portable and include a battery as a power supply; the PMIC 1256 (which can be controlled by the SOC 1300) can assist in regulating power use to extend battery life.

Figure 15A:
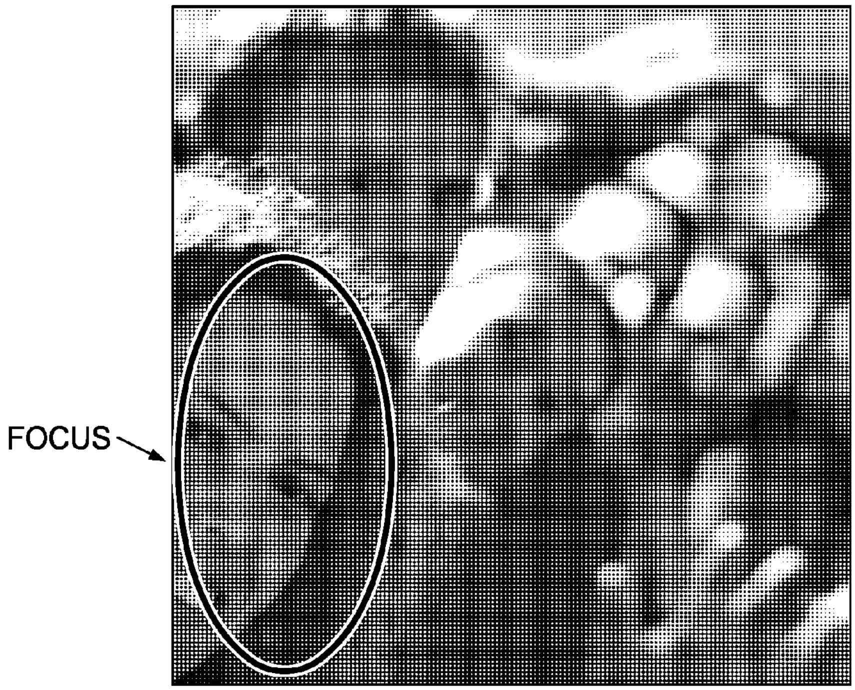
FIGS. 15A and 15B are photographs depicting digital refocusing the system of FIG. 14.
Figure 15B:
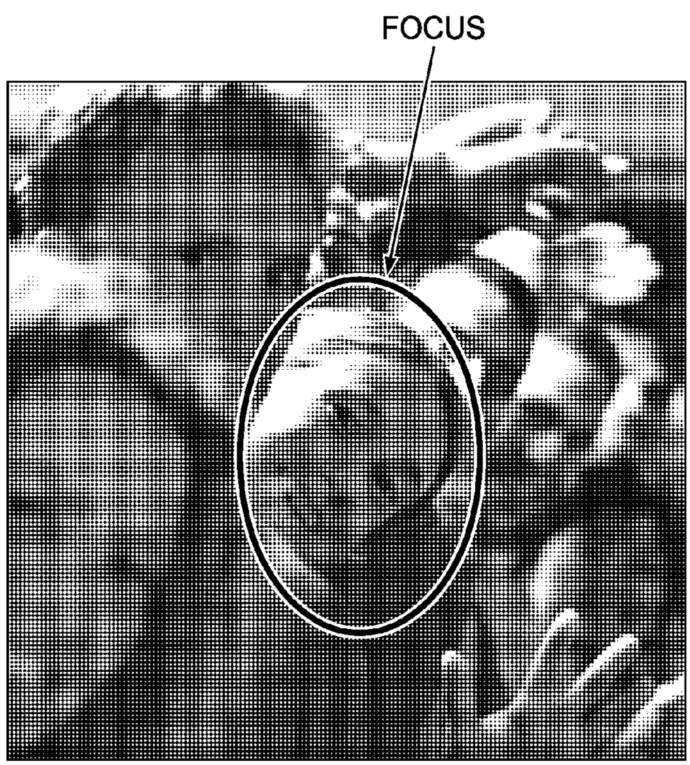

There are a variety of processing operations that can be performed by the SOC 1300 (as employed in imaging device 1250. In FIGS. 15A and 15B, an example of image processing can be seen. In this example, a still image or picture is "digitally refocused." Specifically, SOC 1300 is able to process the image information (for a single image) so as to change the focus from the first person to the third person.

3.2. SOC

Figure 16:
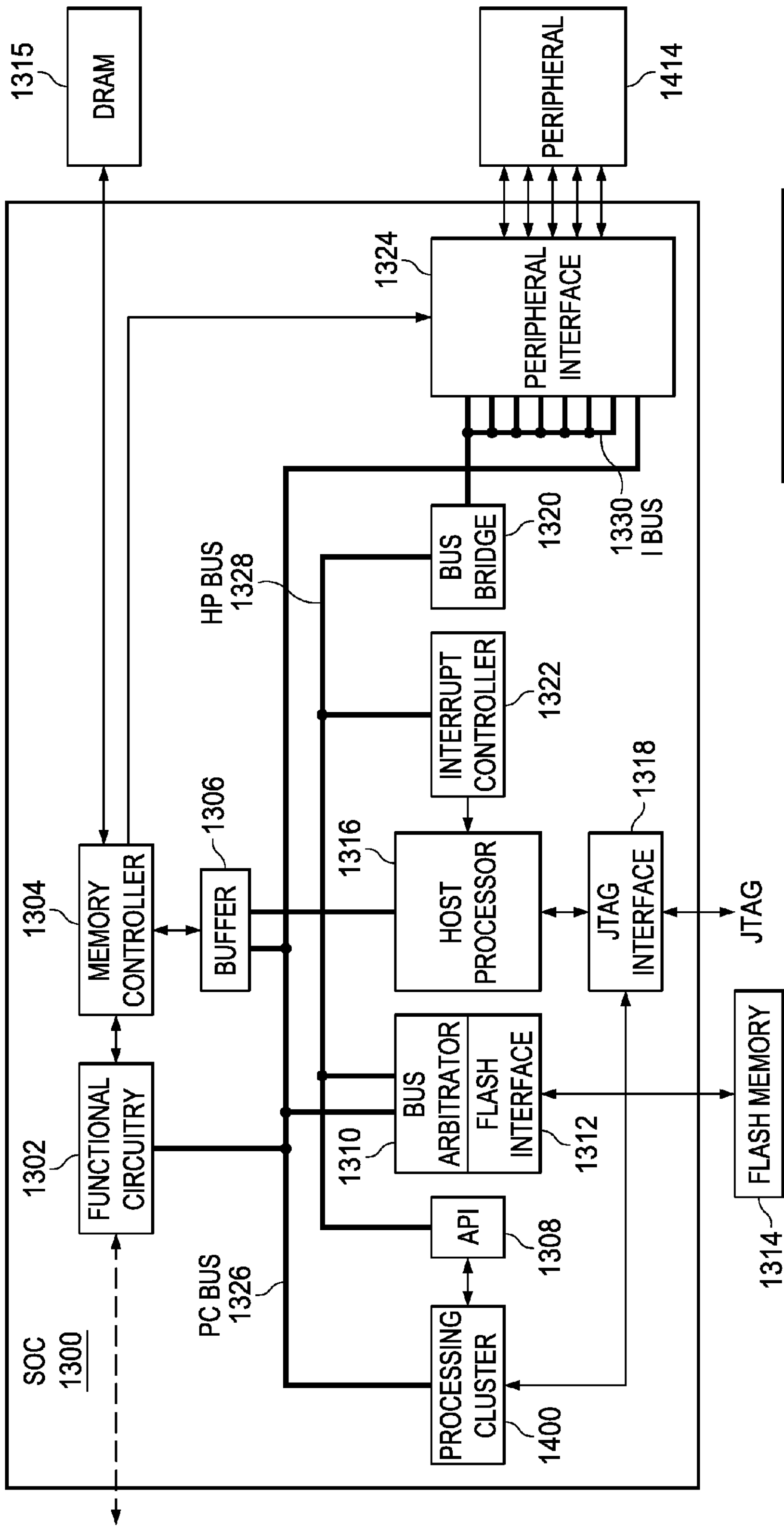
FIG. 16 is a diagram of the SOC n accordance with an embodiment of the present disclosure.

In FIG. 16, an example of a system-on-chip or SOC 1300 is depicted in accordance with an embodiment of the present disclosure. This SOC 1300 (which is typically an integrated circuit or IC, such as an OMAP™ integrated circuit) generally comprises a processing cluster 1400 (which generally performs the parallel processing described above) and a host processor 1316 that provides the hosted environment (described and referenced above). The host processor 1316 can be wide (i.e., 32 bits, 64 bits, etc.) RISC processor (such as an ARM Cortex-A9) and that communicates with the bus arbitrator 1310, buffer 1306, bus bridge 1320 (which allows the host processor 1316 to access the peripheral interface 1324 over interface bus or Ibus 1330), hardware application programming interface (API) 1308, and interrupt controller 1322 over the host processor bus or HP bus 1328. Processing cluster 1400 typically communicates with functional circuitry 1302 (which can, for example, be a charged coupled device or CCD interface and which can communicate with off-chip devices), buffer 1306, bus arbitrator 1310, and peripheral interface 1324 over the processing cluster bus or PC bus 1326. With this configuration, the host processor 1316 is able to provide information (i.e., configure the processing cluster 1400 to conform to a desired parallel implementation) through API 1308, while both the processing cluster 1400 and host processor 1316 can directly access the flash memory 1256 (through flash interface 1312) and DRAM 1254 (through memory controller 1304). Additionally, test and boundary scan can be performed through Joint Test Action Group (JTAG) interface 1318.

3.3. Processing Cluster

Figure 17:
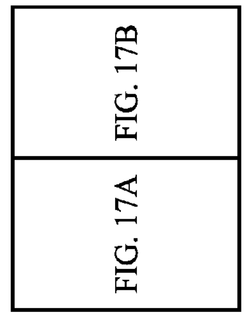
FIG. 17 is a diagram of a parallel processing cluster in accordance with an embodiment of the present disclosure.
Figure 17A:
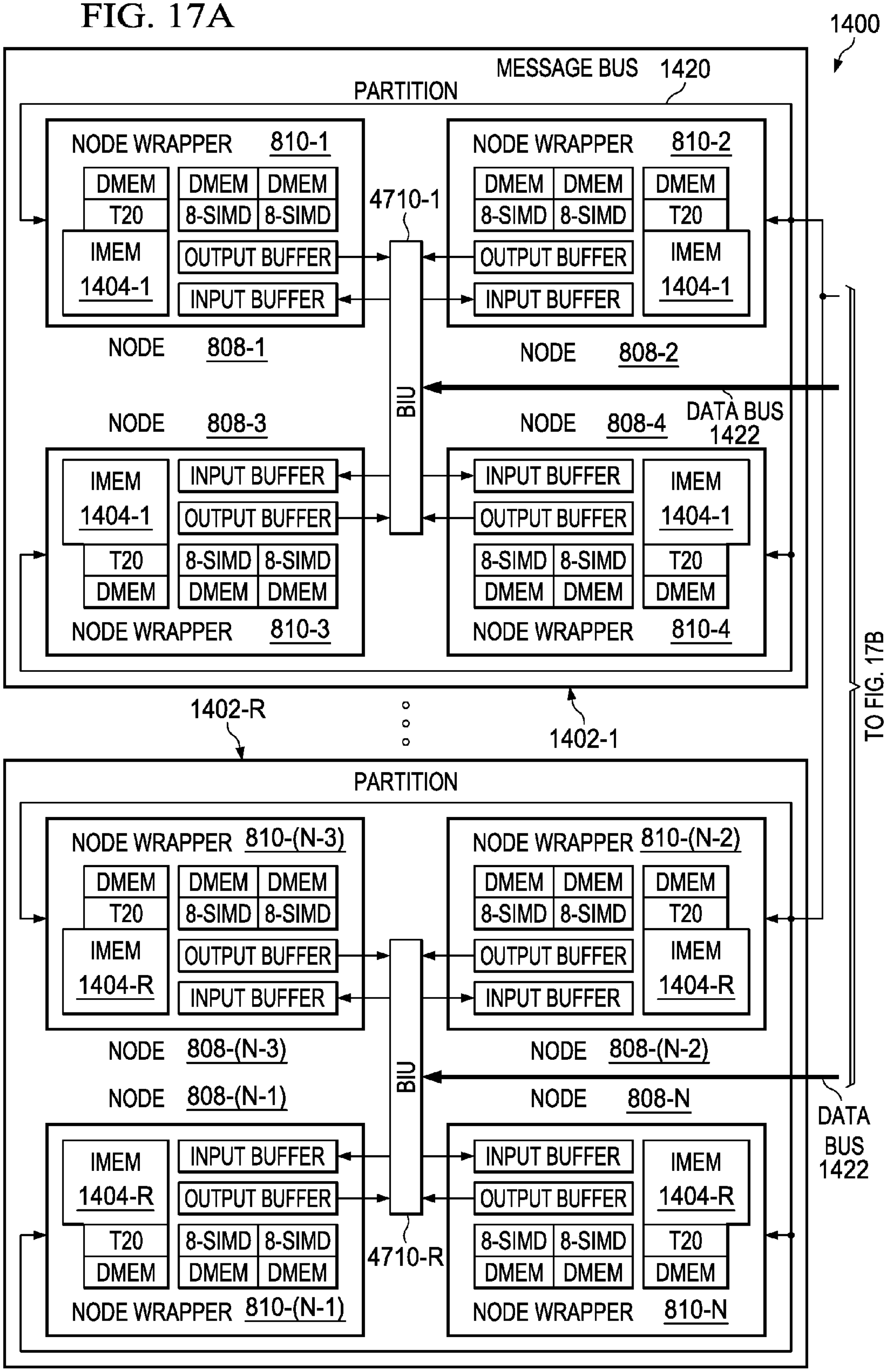
Figure 17B:
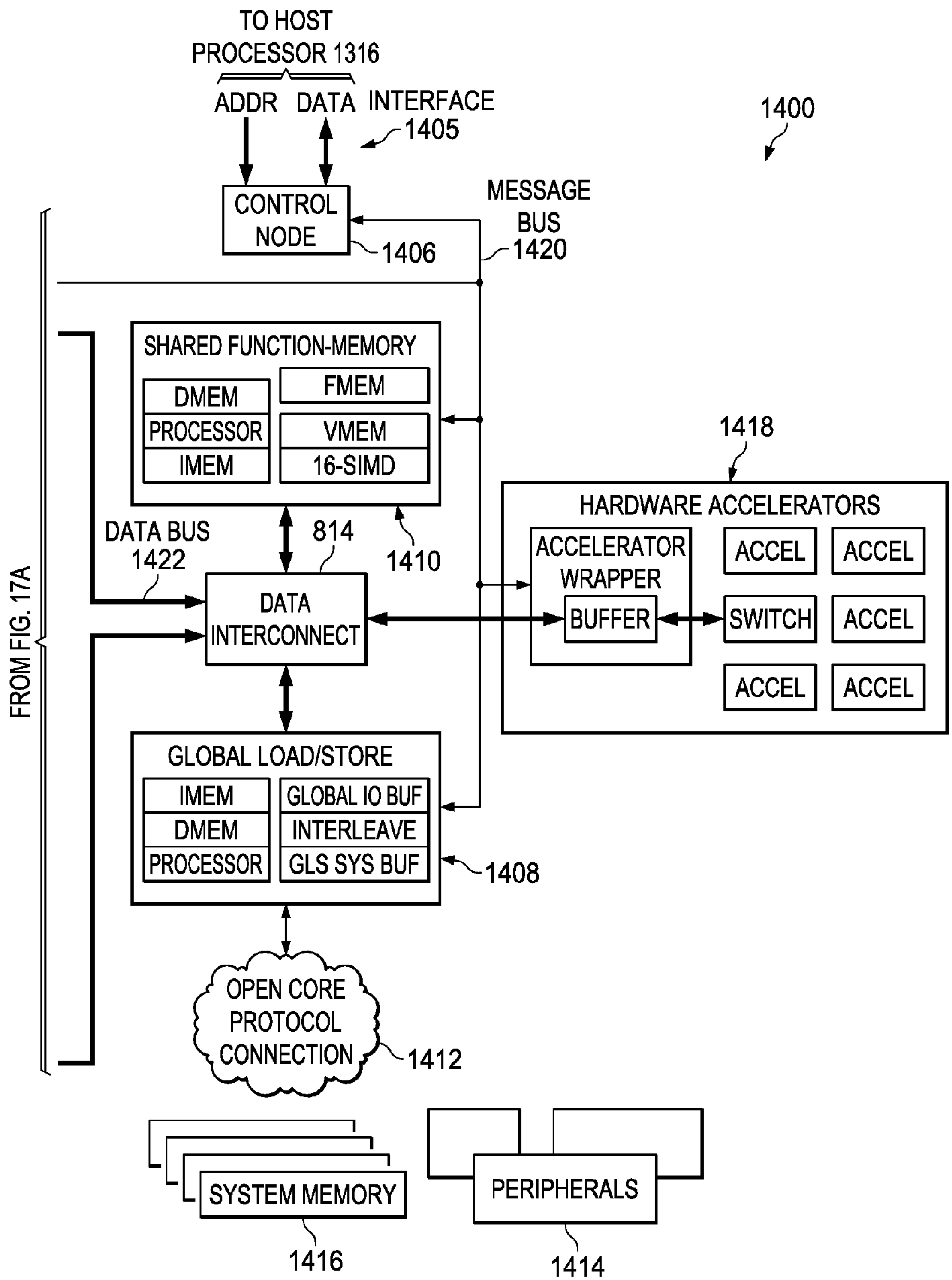

Turning to FIG. 17, an example of the parallel processing cluster 1400 is depicted in accordance with an embodiment of the present disclosure. Typically, processing cluster 1400 corresponds to hardware 722. Processing cluster 1400 generally comprises partitions 1402-1 to 1402-R which include nodes 808-1 to 808-N, node wrappers 810-1 to 810-N, instruction memories 1404-1 to 1404-R, and bus interface units or (BIUs) 4710-1 to 4710-R (which are discussed in detail below). Nodes 808-1 to 808-N are each coupled to data interconnect 814 (through its respectively BIU 4710-1 to 4710-R and the data bus 1422), and the controls or messages for the partitions 1402-1 to 1402-R are provided from the control node 1406 through the message bus 1420. The global load/store (LS) unit 1408 and shared function-memory 1410 also provide additional functionality for data movement (as described below). Additionally, a level 3 or L3 cache 1412, peripherals 1414 (which are generally not included within the IC), memory 1416 (which is typically flash memory 1256 and/or DRAM 1254 as well as other memory that is not included within the SOC 1300), and hardware accelerators (HWA) unit 1418 are used with processing cluster 1400. An interface 1405 is also provided so as to communicate data and addresses to control node 1406.

Figure 18:
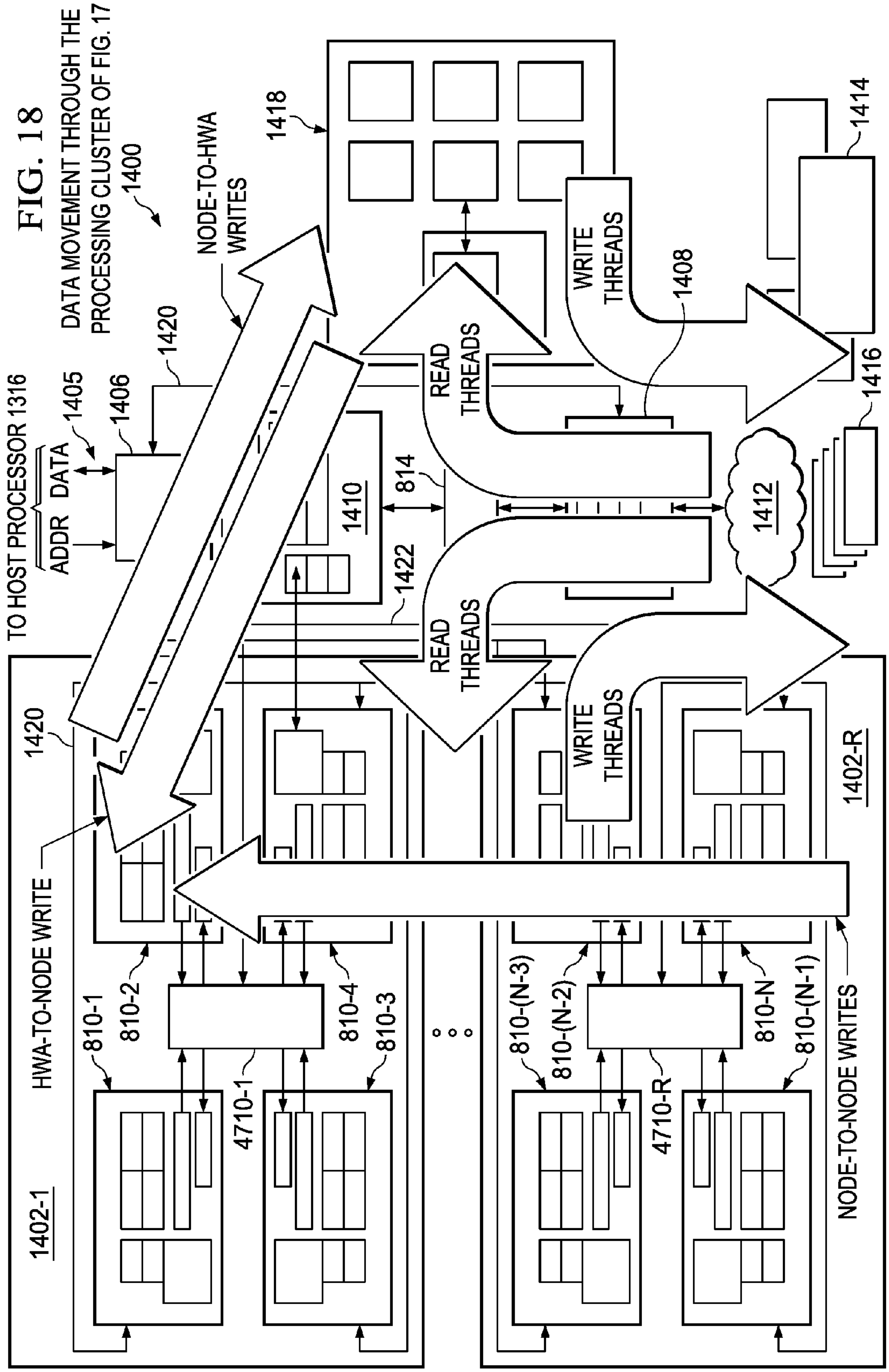
FIG. 18 is a diagram of data movement through the processing cluster depicted in FIG. 17.

In FIG. 18, the data movement through processing cluster 1400 can be seen. The read threads fetch data from memory 1416 or peripherals 1414 and write into the data memory for nodes 808-1 to 808-N or to hardware accelerators units 1418. These read threads are generally controlled by the GLS unit 1408. The write threads are outputs from nodes 808-1 to 808-N written to memory 1416 or peripherals 1414 or from hardware accelerators unit 1418, which is also generally controlled by the GLS unit 1408. Node-to-node writes transmit data from one node (i.e., 808-*i*) to another node (i.e., 808-*k*), based on a node (i.e., 808-*i*) executing an output instruction. Node-to-HWA writes transmit data from a node (i.e., 808-*i*) to the hardware-accelerator wrapper (within hardware accelerators unit 1418). From a node's (i.e., 808-*i*) perspective, these node-to-HWA writes appear as a node-to-node write but are treated differently by the destination. HWA-to-node writes transmit data from a hardware accelerator to a destination node (i.e., 808-*i*). At the destination node (i.e., 808-*i*), it is treated as a node-to-node write.

Multi-cast threads are also possible. Multi-cast threads are generally any combination of the above types, with the limitation that the same source data is sent to all destinations. If the source data is not homogeneous for all destinations, then the multiple-output capability of the destination descriptors is used instead, and output-instruction identifiers are used to distinguish destinations. Destination descriptors can have mixed types of destinations, including nodes, hardware accelerators, write threads, and multi-cast threads.

Processing cluster 1400 generally uses a "push" model for data transfers. The transfers generally appear as posted writes, rather than request-response types of accesses. This has the benefit of reducing occupation on global interconnect (i.e., data interconnect 814) by a factor of two compared to request-response accesses because data transfer is one-way. There is generally no desire to route a request through the interconnect 814, followed by routing the response to the requestor, resulting in two transitions over the interconnect 814. The push model generates a single transfer. This is important for scalability because network latency increases as network size increases, and this invariably reduces the performance of request-response transactions.

The push model, along with the dataflow protocol (i.e., 812-1 to 812-N), generally minimize global data traffic to that used for correctness, while also generally minimizing the effect of global dataflow on local node utilization. There is normally little to no impact on node (i.e., 808-*i*) performance even with a large amount of global traffic. Sources write data into global output buffers (discussed below) and continue without requiring an acknowledgement of transfer success. The dataflow protocol (i.e., 812-1 to 812-N) generally ensures that the transfer succeeds on the first attempt to move data to the destination, with a single transfer over interconnect 814. The global output buffers (which are discussed below) can hold up to 16 outputs (for example), making it very unlikely that a node (i.e., 808-*i*) stalls because of insufficient instantaneous global bandwidth for output. Furthermore, the instantaneous bandwidth is not impacted by request-response transactions or replaying of unsuccessful transfers.

Finally, the push model more closely matches the programming model, namely programs do not "fetch" their own data. Instead, their input variables and/or parameters are written before being invoked. In the programming environment, initialization of input variables appears as writes into memory by the source program. In the processing cluster 1400, these writes are converted into posted writes that populate the values of variables in node contexts.

The global input buffers (which are discussed below) are used to receive data from source nodes. Since the data memory for each node 808-1 to 808-N is single-ported, the write of input data might conflict with a read by the local SIMD. This contention is avoided by accepting input data into the global input buffer, where it can wait for an open data memory cycle (that is, there is no bank conflict with the SIMD access). The data memory can have 32 banks (for example), so it is very likely that the buffer is freed quickly. However, the node (i.e., 808-*i*) should have a free buffer entry because there is no handshaking to acknowledge the transfer. If desired, the global input buffer can stall the local node (i.e., 808-*i*) and force a write into the data memory to free a buffer location, but this event should be extremely rare. Typically, the global input buffer is implemented as two separate random access memories (RAMs), so that one can be in a state to write global data while the other is in a state to be read into the data memory. The messaging interconnect is separate from the global data interconnect but also uses a push model.

At the system level, nodes 808-1 to 808-N are replicated in processing cluster 1400 analogous to SMP or symmetric multi-processing with the number of nodes scaled to the desired throughput. The processing cluster 1400 can scale to a very large number of nodes. Nodes 808-1 to 808-N are grouped into partitions 1402-1 to 1402-R, with each having one or more nodes. Partitions 1402-1 to 1402-R assist scalability by increasing local communication between nodes, and by allowing larger programs to compute larger amounts of output data, making it more likely to meet desired throughput requirements. Within a partition (i.e., 1402-*i*), nodes communicate using local interconnect, and do not require global resources. The nodes within a partition (i.e., 1404-*i*) also can share instruction memory (i.e., 1404-*i*), with any granularity: from each node using an exclusive instruction memory to all nodes using common instruction memory. For example, three nodes can share three banks of instruction memory, with a fourth node having an exclusive bank of instruction memory. When nodes share instruction memory (i.e., 1404-*i*), the nodes generally execute the same program synchronously.

The processing cluster 1400 also can support a very large number of nodes (i.e., 808-*i*) and partitions (i.e., 1402-*i*). The number of nodes per partition, however, is usually limited to 4 because having more than 4 nodes per partition generally resembles a non-uniform memory access (NUMA) architecture. In this case, partitions are connected through one (or more) crossbars (which are described below with respect to interconnect 814) that have a generally constant cross-sectional bandwidth. Processing cluster 1400 is currently architected to transfer one node's width of data (for example, 64, 16-bit pixels) every cycle, segmented into 4 transfers of 16 pixels per cycle over 4 cycles. The processing cluster 1400 is generally latency-tolerant, and node buffering generally prevents node stalls even when the interconnect 814 is nearly saturated (note that this condition is very difficult to achieve except by synthetic programs).

Typically, processing cluster 1400 includes global resources that are shared between partitions:

(1) Control Node 1406, which implements the system-wide messaging interconnect (over message bus 1420), event processing and scheduling, and interface to the host processor and debugger (all of which is described in detail below).

(2) GLS unit 1408, which contains a programmable RISC processor (i.e., GLS processor 5402, which is described in detail below), enabling system data movement that can be described by C++ programs that can be compiled directly as GLS data-movement threads. This enables system code to execute in cross-hosted environments without modifying source code, and is much more general than direct memory access because it can move from any set of addresses (variables) in the system or SIMD data memory (described below) to any other set of addresses (variables). It is multi-threaded, with (for example) 0-cycle context switch, supporting up to 16 threads, for example.

(3) Shared Function-Memory 1410, which is a large shared memory that provides a general lookup table (LUT) and statistics-collection facility (histogram). It also can support pixel processing using the large shared memory that is not well supported by the node SIMD (for cost reasons), such as resampling and distortion correction. This processing uses (for example) a six-issue RISC processor (i.e., SFM processor 7614, which is described in detail below), implementing scalar, vector, and 2D arrays as native types.

(4) Hardware Accelerators 1418, which can be incorporated for functions that do not require programmability, or to optimize power and/or area. Accelerators appear to the subsystem as other nodes in the system, participate in the control and data flow, can create events and be scheduled, and are visible to the debugger. (Hardware accelerators can have dedicated LUT and statistics gathering, where applicable.)

(5) Data Interconnect 814 and System Open Core Protocol (OCP) L3 connection 1412. These manage the movement of data between node partitions, hardware accelerators, and system memories and peripherals on the data bus 1422. (Hardware accelerators can have private connections to L3 also.)

(6) Debug interfaces. These are not shown on the diagram but are described in this document.

3.4. Example Application

Because nodes 808-1 to 808-N can be targeted to scan-line-based, pixel-processing applications, the architecture of the node processors 4322 (described below) can have many features that address this type of processing. These include features that are very unconventional, for the purpose of retaining and processing large portions of a scan-line.

Figure 19:
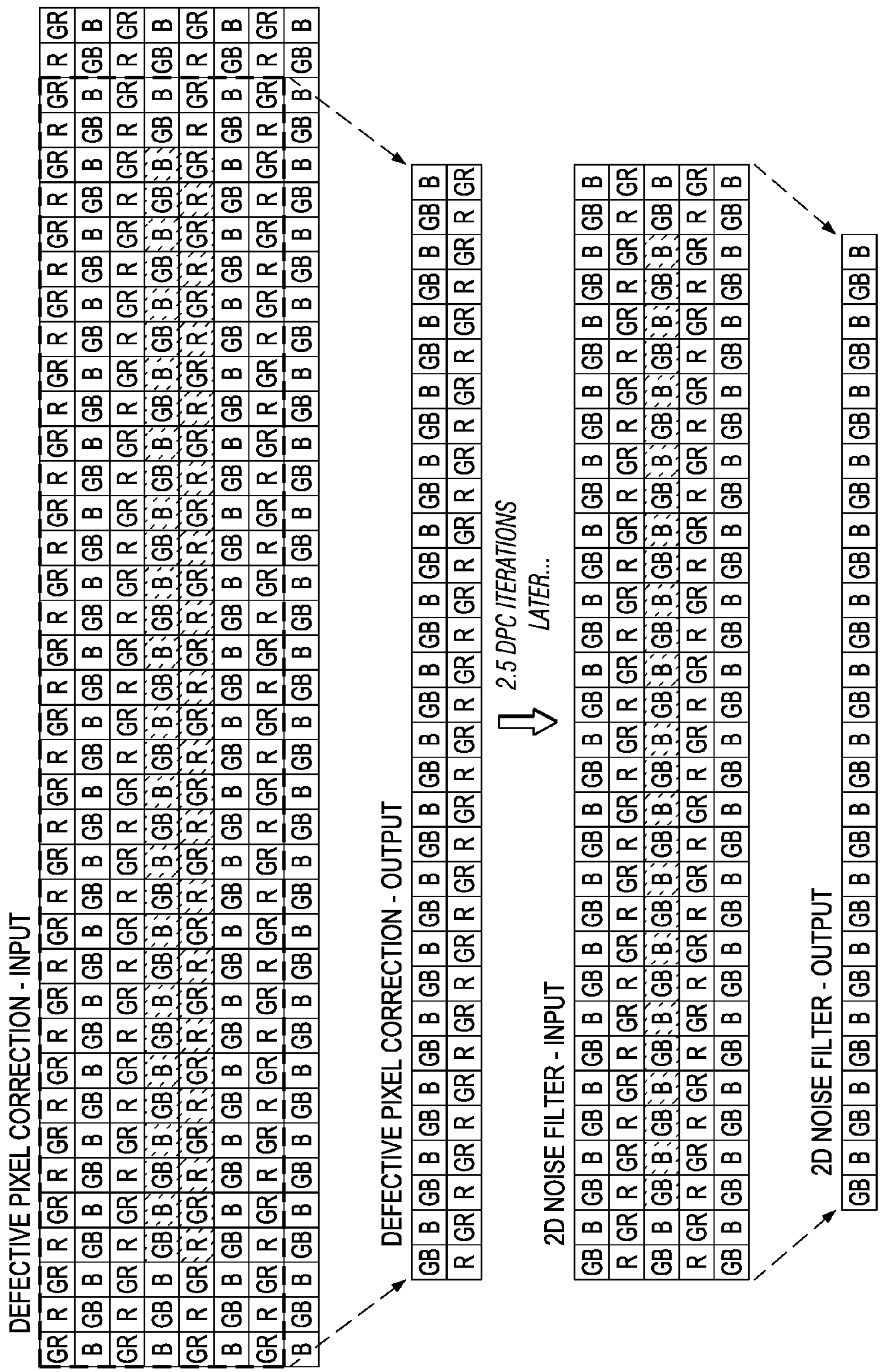
FIG. 19 is a diagram of an example of the first two stages of processing on Bayer image input.

In FIG. 19, an example of the first two stages of processing on Bayer image input. Node processors (i.e., 4322) generally do not operate on Bayer data directly, but instead on de-interleaved data. Bayer data is shown for illustration. The first processing stage is defective pixel correction (DPC). This stage for this example takes 312 pixels as input to generate two lines of 32 corrected output pixels: the locations of these pixels correspond to the hashed region of the input data, and inputs outside of the bordered region are input-only without corresponding output. The next processing stage is a 2-dimensional noise filter. This stage processes 160 pixels from the output of the DPC stage (after 2½ iterations of DPC, each iteration generating 64 pixels) to generate 28 corrected and filtered pixels.

As shown in this example, each processing stage operates on a region of the image. For a given computed pixel, the input data is a set of pixels in the neighborhood of that pixel's position. For example, the right-most Gb pixel result from the 2D noise filter is computed using the 5×5 region of input pixels surrounding that pixel's location. The input dataset for each pixel is unique to that pixel, but there is a large amount of re-use of input data between neighboring pixels, in both the horizontal and vertical directions. In the horizontal direction, this re-use implies sharing data between the memories used to store the data, in both left and right directions. In the vertical direction, this re-use implies retaining the content of memories over large spans of execution.

In this example, 28 pixels are output using a total of 780 input pixels (2.5×312), with a large amount of re-use of input data, arguing strongly for retaining most of this context between iterations. In a steady state, 39 pixels of input are required to generate 28 pixels of output, or, stated another way, output is not valid in 11 pixel positions with respect to the input, after just two processing stages. This invalid output is recovered by recomputing the output using a slightly different set of input data, offset so that the re-computed output data is contiguous with the output of the first computed output data. This second pass provides additional output, but can require additional cycles, and, overall, the computation is around 72% efficient in this example.

This inefficiency directly affects pixel throughput, because invalid outputs create the desire for additional computing passes. The inefficiency is directly proportional to the width of the input dataset, because the number of invalid output pixels depends on the algorithms. In this example, tripling the output width to 84 pixels (input width 95 pixels) increases efficiency from 72% to 87% (over 2× reduction in inefficiency—28% to 13%). Thus, efficient use of resources is directly related to the width of the image that these resources are processing. The hardware should be capable of storing wide regions of the image, with nearly unrestricted sharing of pixel contexts both in the horizontal and vertical directions within these regions.

4. Application Programming Model

"Top-level programming" refers to a program that describes the operation of an entire use-case at the system level, including input from memory 1416 and/or peripherals 1414. Namely, top-level programming generally defines a general input/output topology of algorithm modules, possibly including intermediate system memory buffers and hardware accelerators, and output to memory 1416 and/or peripherals 1414.

Figure 20:
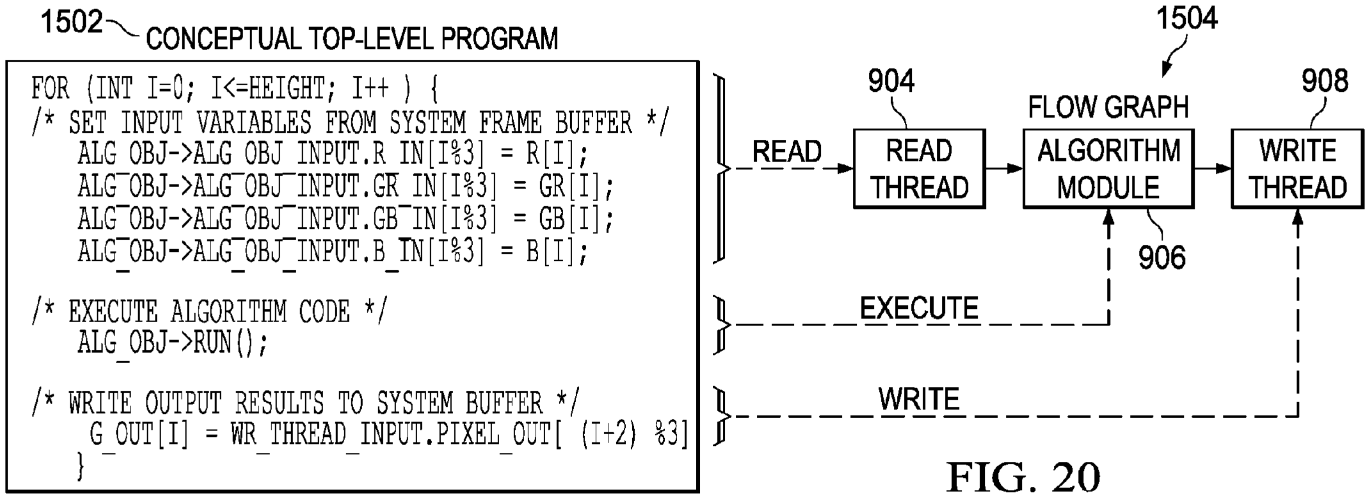
FIG. 20 is a diagram of the logical flow of a simplified, conceptual example of a memory-to-memory operation using a single algorithm module.

A very simple, conceptual example, for a memory-to-memory operation using a single algorithm module is shown in FIG. 20. This example excludes many details, and is not functionally correct, but is simplified for illustration. This also is not how the program is actually structured for system 700, but simply shows the logical flow. For example, the read and write threads are not shown as distinct objects in the example.

In this example, the top-level program source code 1502 generally corresponds to flow graph 1504. As shown, code 1502 includes an outer FOR loop that iterates over an image in the vertical direction, reading from de-interleaved system frame buffers (R[i], Gr[i], Gb[i], B[i]) and writing algorithm module inputs. The inputs are four circular buffers in the algorithm object's input structure, containing the red (R), green near red (Gr), green near blue (Gb), and blue (B) pixels for the iteration. Circular buffers are used to retain state in the vertical direction from one invocation to the next, using a fixed amount of statically-allocated memory. Circular addressing is expressed explicitly in this example, but nodes (i.e., 808-*i*) directly support circular addressing, without the modulus function, for example. After the algorithm inputs are written, the algorithm kernel is called though the procedure "run" defined for the algorithm class. This kernel iterates single-pixel operations, for all input pixels, in the horizontal direction. This horizontal iteration is part of the implementation of the "Line" class. Multiple instances of the class (not relevant to this example) can be used to distinguish their contexts. Execution of the algorithm writes algorithm outputs into the input structure of the write thread (Wr_Thread_input). In this case, the input to the write thread is a single circular buffer (Pixel_Out). After completion of the algorithm, the write thread copies the new line of from its input buffer to an output frame buffer in memory (G_Out [i]).

Figure 21:
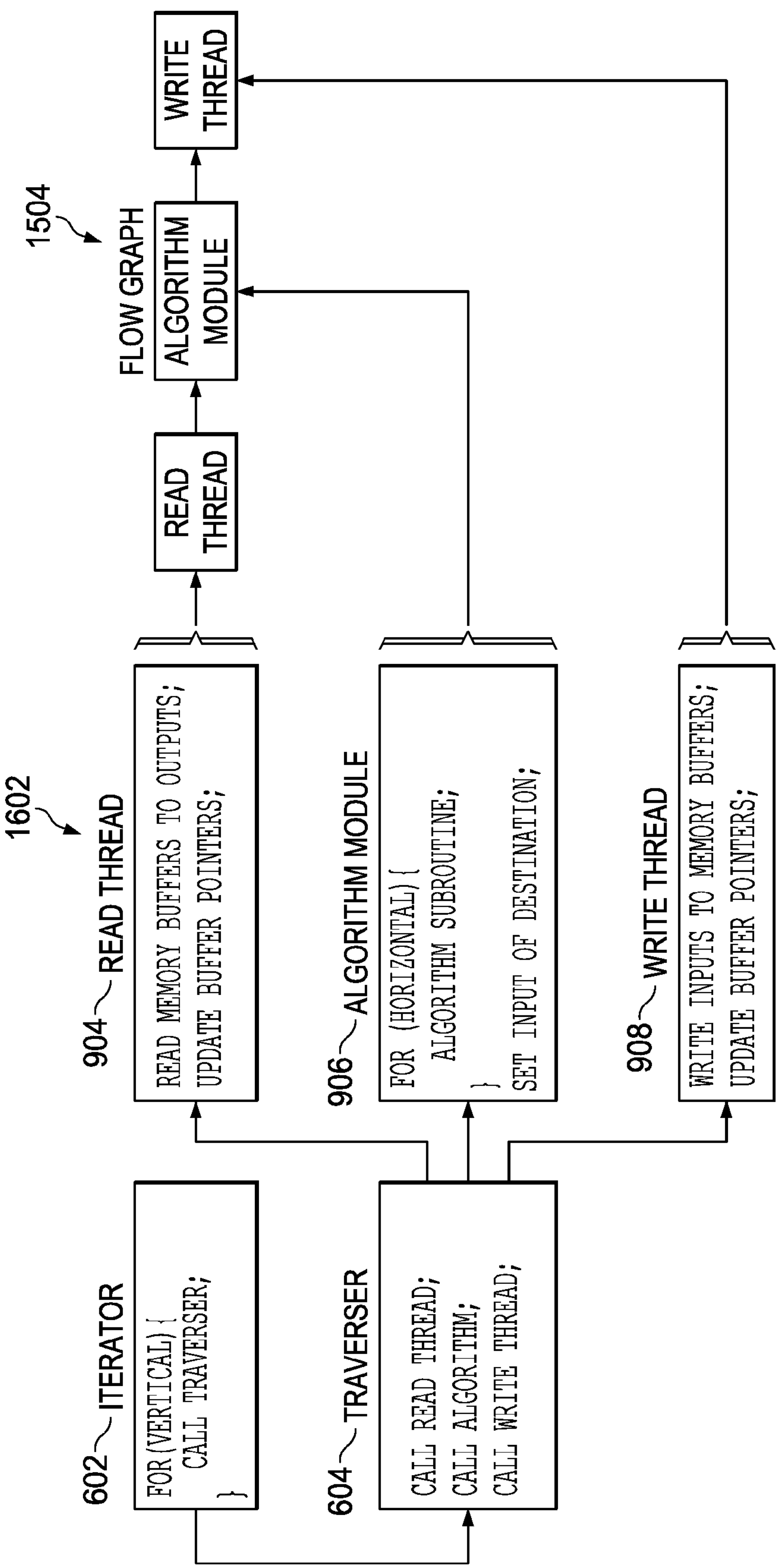
FIG. 21 is a diagram of a more detailed abstract representation of a top-level program.

Turning to FIG. 21, a more detailed abstract representation of a top-level program 1602 can be seen. The read thread 904, execution module 906, and write thread 908 are all instances of objects, using object declarations provided by the programmer. The iterator 602 is also provided by the programmer, describing the sequencing for the top-level program 1602. In this example the iterator is a FOR loop, but can be any style of sequencing, such as following linked lists, command parsing, and so forth. The iterator 1602 sequences the top-level program by calling traverser 604 that is provided by system programming tool 718, which (as shown and for example) simply calls the "run" procedures in each object, in a correct order. This permits a clean separation between the iteration method and the instances of objects that implement the top-level program, allowing these to be re-used in other configurations for other use-cases.

4.1. Source Code in a Hosted Environment

Figure 22:
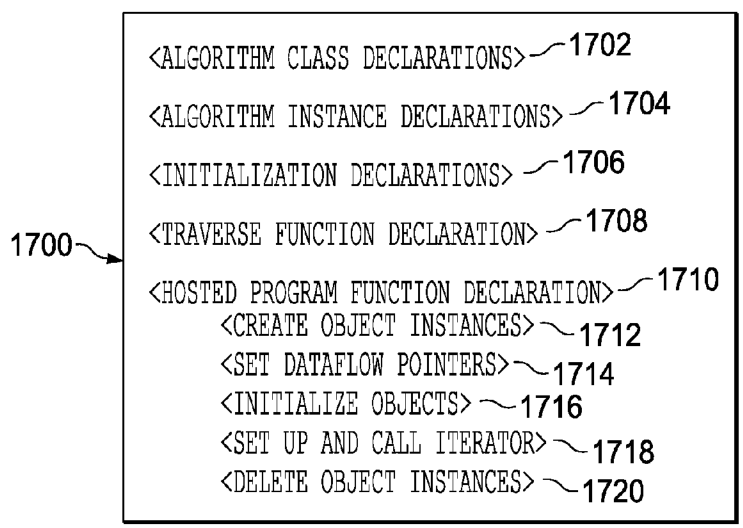
FIG. 22 is a diagram example of an autogenerated source code template.

Looking now to FIG. 22, an example of an autogenerated source code template 1700 can be seen. System programming tool 718 generates source code by traversing the use-case diagram (i.e., 1000) as a graph and emitting source text strings within sections of a code template. This example includes several sections which are algorithm class declarations 1702, object declarations 1704, a set of initialization procedure declarations 1706, a traverse function 1708 that the system programming tool 708 generates for the use-case, and the declaration of a function that implements the use-case 1710. This hosted-program function 1710, in turn, generally comprises a number of sub-sections, which are create object instances 1712, setup object state 1714 and 1716 (which includes dataflow pointers, circular-buffer addressing context, and parameter initialization), create and call the iterator with a pointer to the traverse function 1718, and delete the objects after execution is completed 1720. The hosted-program function 1710 is intended to be called by user-supplied "main" program that serves as a test bench for software development.

Figure 23:
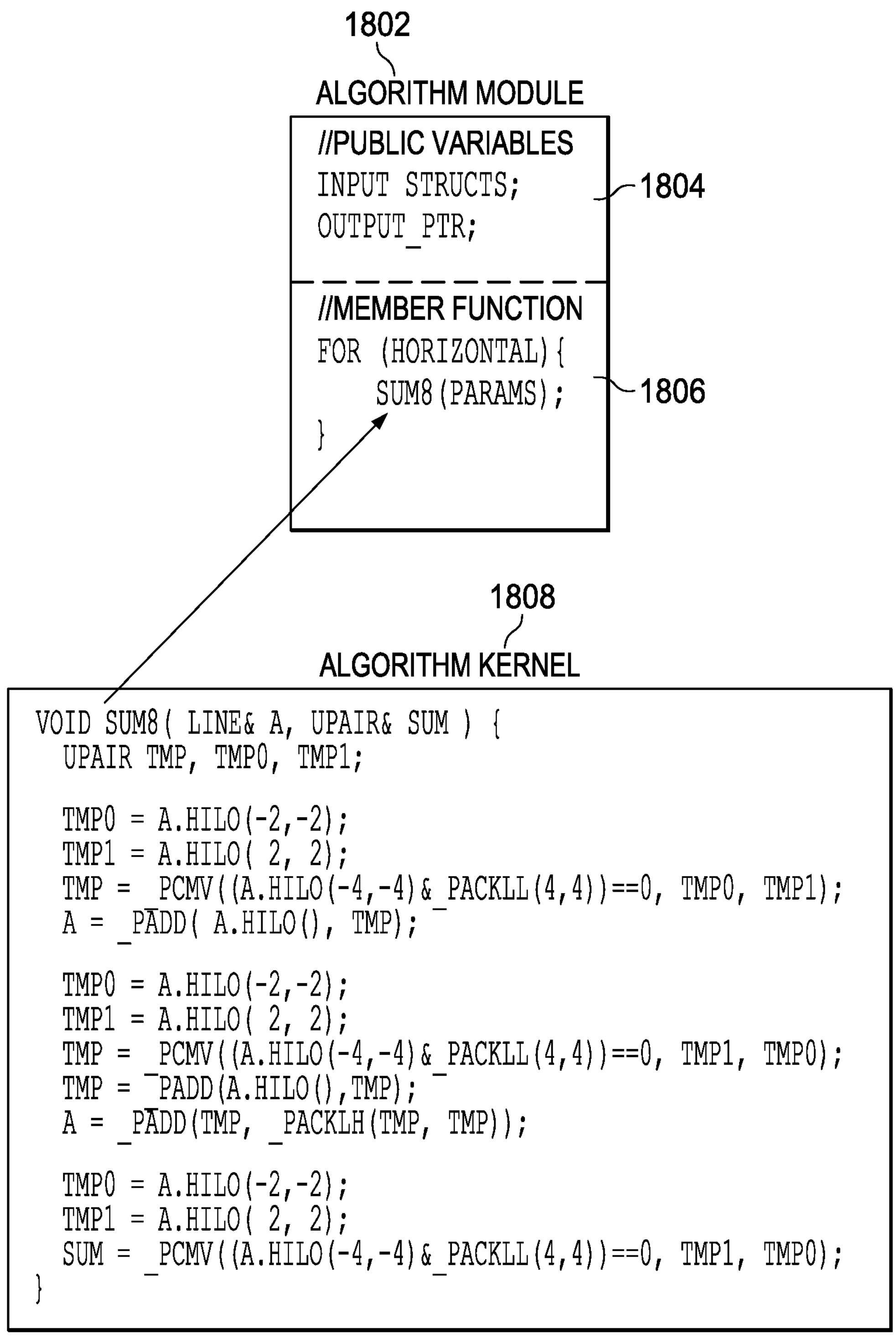
FIG. 23 is a diagram of an algorithm module.

A foundation for the programming abstractions of system 700, object-based thread parallelism, and resource allocation is the algorithm module 1802, which is shown in FIG. 23. An example of an algorithm module 1802 that encapsulates an algorithm kernel 1808 (which is written by a user) can be seen. The object instance 1802 generally comprises public variables 1804 and a member function 1806. Here, object instance 1802 cleanly separates algorithm kernels (i.e., 1808) from specific instances deployed in a particular use-case, and member function(s) 1806 iterate the kernel 1808 for a particular use-case (parameterized).

Turning to FIG. 24, a more detailed example of the source code for algorithm kernel 1808 can be seen. This algorithm kernel 1808 is an example of an algorithm kernel for the third processing stage of a simple image pipeline ("simple_ISP"). For brevity, some of the code is omitted, and the example excludes variable and type declarations that are described later. For efficiency, the kernel 1808 is written using a subset of C++, with intrinsics, instead of fully general, standard C++. This kernel 1808 describes the operations that the algorithm performs to output a pair of pixels (these pixels are produced in the same data path, which supports both paired and unpaired operations). The methods for expanding on this primitive operation to perform entire use-cases on entire images are described in later example.

The kernel 1808 is written as a standalone procedure and can include other procedures to implement the algorithm. However, these other procedures are not intended to be called from outside the kernel 1808, which is called through the procedure "simple_ISP3." The keyword SUBROUTINE is defined (using the #define keyword elsewhere in the source code) depending on whether the source-code compilation is targeted to a host. For this example, SUBROUTINE is defined as "static inline." The compiler 706 can expand these procedures in-line for pixel processing when architecture (i.e., processing cluster 1400) may not provide for procedure calls, due to cost in cycles and hardware (memory). In other host environments, the keyword SUBROUTINE is blank and has no effect on compilation. The included file "simple_ISP_def.h" is also described below.

Intrinsics are used to provide direct access to pixel-specific data types and supported operations. For example, the data type "uPair" is an unsigned pair of 16-bit pixels packed into 32 bits, and the intrinsic "_pcmv" is a conditional move of this packed structure to a destination structure based on a specific condition tested for each pixel. These intrinsics enable the compiler 706 to directly emit the appropriate instructions, instead of having to recognize the use from generalized source code matching complex machine descriptions for the operations. This generally can require that the programmer learn the specialized data types and operations, but hides all other details such as register allocation, scheduling, and parallelism. General C++ integer operations can also be supported, using 16-bit short and 32-bit long integers.

An advantage of this programming style is that the programmer does not deal with: (1) the parallelism provided by the SIMD data paths; (2) the multi-tasking across multiple contexts for efficient execution in the presence of dependencies on a horizontal scan line (for image processing); or (3) the mechanics of parallel execution across multiple nodes (i.e., 808-*i*). Furthermore, the programs (which are generally written in C++) can be used in any general development environment, with full functional equivalence. The application code can be used in outside environment for development and testing, with little knowledge of the specifics of system 700 and without requiring the use of simulators. This code also can be used in a SystemC model to achieve cycle-approximate behavior without underlying processor models Inputs to algorithm modules are defined as structures—declared using the "struct" keyword—containing all the input variables for the module. Inputs are not generally passed as procedure parameters because this implies that there is a single source for inputs (the caller). To map to ASIC-style data flows, there should be a provision for multiple source modules to provide input to a given destination, which implies that object inputs are independent public variables that can be written independently. However, these variables are not declared independently, but instead are placed in an input data structure. This is to avoid naming conflicts, as described below.

The input and output data structures for the application are defined by the programmer in a global file (global for the application) that contains the structure declarations. An example of an input/output (IO) structure 2000, which shows the definitions of these structures for the "simple_ISP" example image pipeline, can be seen in FIG. 25. The structures can be given any name meaningful to the application, and, even though the name of this file is "simple_ISP_struct.h," the file name does not desire to follow a convention. The structures can be considered as providing naming scopes analogous to application programming interface (API) parameters for the applications modules (i.e., 1802).

An API generally documents a set of uniquely-named procedures whose parameter names are not necessarily unique because the procedures may appear within the scope of the uniquely-named procedure. As discussed above, algorithm modules (i.e. 1802) cannot generally use procedure-call interfaces, but structures provide a similar scoping mechanism. Structures allow inputs to have the scope of public variables but encapsulate the names of member variables within the structure, similar to procedure declarations encapsulating parameter names. This is generally not an issue in the hosted environment because the public variables (i.e., 1804) are also encapsulated in an object instance that has a unique name. Instead, as explained below, this is an issue related to potential name conflicts because system programming tool 718 removes the object encapsulation in order to provide an opportunity to generally optimize the resource allocation. The programming abstractions provided by objects are preserved, but the implementation allows algorithm code to share memory usage with other, possibly unrelated, code. This results in public variables having the scope of global variables, and this introduces the requirement for public variables (i.e., 1804) to have globally-unique names between object instances. This is accomplished by placing these variables into a structure variable that has a globally unique name. It should also be noted that using structures to avoid name conflicts in this way does not generally have all the benefits of procedure parameters. A source of data has to use the name of the structure member, whereas a procedure parameter can pass a variable of any name, as long as it has a compatible type.

Nodes 808-1 to 808-N also have two different destination memories: the processor data memory (discussed in detail below) and the SIMD data memory (which is discussed in detail below). The processor data memory generally contains conventional data types, such as "short" and "int" (named in the environment as "shorts" and "intS" to denote abstract), scalar data memory data in nodes 808-1 to 808-N (which is generally used to distinguish this data from other conventional data types and to associate the data with a unique context identifier). There can also a special 32-bit (for example) data type called "Circ" that is used to control the addressing of circular buffers (which is discussed in detail below). SIMD data memory generally contains what can be considered either vectors of pixels ("Line), using image processing as an example, or words containing two signed or unsigned values ("Pair" and "uPair"). Scalar and vector inputs have to be declared in two separate structures because the associated memories are addressed independently, and structure members are allocated in contiguous addresses.

To autogenerate source code for a use-case, it is strongly preferred that system programming tool 718 can instantiate instances of objects, and form associations between object outputs and inputs, without knowing the underlying class variables, member functions, and datatypes. It is cumbersome to maintain this information in system programming tool 718 because any change in the underlying implementation by the programmer should generally reflected in system programming tool 718. This is avoided using naming conventions in the source code, for public variables, functions, and types that are used for autogeneration. Other, internal variables and so on can be named by the programmer.

Turning to FIG. 26, IO data type module 2100 can be seen. The contents of module 2100 generally define input and output data types for the algorithm "simple_ISP3," called "simple_ISP3_io.h" (which is an example of a naming convention used by the system programming tool 718). The code of module 2100 generally contains type definitions for input and output variables of an instance of this class. There are two type names for input and output. One name is meaningful to the application programmer (for example, "ycc") and is generally intended to be hidden from the system programming tool 718, which is defined in "simple_ISP_struct.h". It should also be noted that "simple_ISP_struct.h" is not a convention because it is included in other "*_io.h" files provided by the programmer. The other type name ("simple_ISP3_INV") follows the naming convention for the system programming tool 718, using the name of the class. These types are generally equivalent to each other—the "typedef" generally provides a way to use the type in the system programming tool 718, which derived from the object-class name known by system programming tool 718, in a way that is independent of the programming view of the type. For example, tying the application type name to the class name would remove the association with luma and chroma pixels (Y, Cr, Cb), and would prevent re-using this structure definition for other algorithm modules in the same application—each one would have to be given a different name even if the member variables are the same.

Both input and output types are defined by the same naming convention, appending the algorithm name with "_INS" for scalar input to processor data memory, "_INV" for vector input to SIMD data memory, and "_OUT" for output. If a module has multiple inputs (which can vary by use-case), input variables—different members of the input structure—can be set independently by source objects.

If a module has multiple output types, each is defined separately, appending the algorithm name with "_OUT0," "_OUT1," and so forth, as shown in the IO data type module 2200 of FIG. 27. In this example, the algorithm provides two types of outputs based on the same input data and common intermediate results. It would be cumbersome to require that this algorithm be divided into two parts, each with a single output, which would cause a loss of the commonality between input and intermediate state and would increase resource requirements. Instead, the module can declare multiple output types, which is reflected in the use-case diagram (i.e., 1000) that is described below. It is also possible, based on the use-case, for a single module output to provide data to multiple destinations, which is called a multi-cast transfer. Any module output can be multi-cast, and the use-case diagram (i.e., 1000) specifies what outputs are multi-cast, and to what destinations, again as described below.

Turning now to FIG. 28, an example of an input declaration 2300 can be seen. In this example, the declarations are in a file named "simple_ISP3_input.h" by convention, and inputs are declared for the two forms of input data: one for the processor data memory, and another for the SIMD data memory. Each of these declarations is preceded by the statement "#pragma DATA_ATTRIBUTE("input")." This informs the compiler 706 that the variable is for read-only input, which is information the compiler 706 uses to mark dependency boundaries in the generated code. This information is used, in turn, to implement the dataflow protocol. Each input data structure follows a naming convention so that the system programming tool 718 can form pointer to the structure (which is logically a pointer to all input variables in the structure) for use by one or more source modules.

Typically, the processor data memory input associated with the algorithm contains configuration variables, of any general type—with the exception of the "Circ" type to control the addressing of circular buffers in the SIMD data memory (which is described below). This input data structure follows a naming convention, appending the algorithm name with "_inputS" to indicate the scalar input structure to processor data memory. The SIMD data memory input is a specified type, for example "Line" variables in the "simple_ISP3_input" structure (type "ycc"). This input data structure follows a similar naming convention, appending the algorithm name with "_inputV" to indicate the vector input structure to SIMD data memory. Additionally, the processor data memory context is associated with the entire vector of input pixels, whatever width is configured. Here, this width can span multiple physical contexts, possibly in multiple nodes 808-1 to 808-N. For example, each associated processor data memory context contains a copy of the same scalar data, even though the vector data is different (since it is logically different elements of the same vector). The GLS unit 1408 provides these copies of scalar parameters and maintains the state of "Circ" variables. The programming model provides a mechanism for software to signal the hardware to distinguish different types of data. Any given scalar or vector variable is placed at the same address offsets in all contexts, in the associated data memory.

Turning to FIG. 29, an example of a constants declaration or file 2400 can be seen. In particular, constants declaration 2400 is an example of a sample of a file for "simple_ISP" used to define constants used in the application. This declaration 2400 generally permits constants to be referenced by text that has a meaning for the application. For example, lookup tables are identified by immediate values. In this example, the lookup table containing gamma values has a LUT ID of 2, but instead of using the value 2, this LUT is referenced by the defined constant "IPIPELUT_GAMMA_VAL". Typically, this declaration 2400 is not used by system programming tool 718 directly, but is included in the algorithm kernels (i.e., 1808) associated with the application. Additionally, there is no naming convention.

FIG. 30 is an example of a function-prototype header file 2500 for the kernel "simple_ISP3" (described below). Typically, header 2500 is not used in the hosted environment. The header file 2500 is included in the source, by system programming tool 718, for the conventional purpose of providing prototypes of function declarations so that the ".cpp" source code can refer to a function before it has been completely declared.

Figure 31:
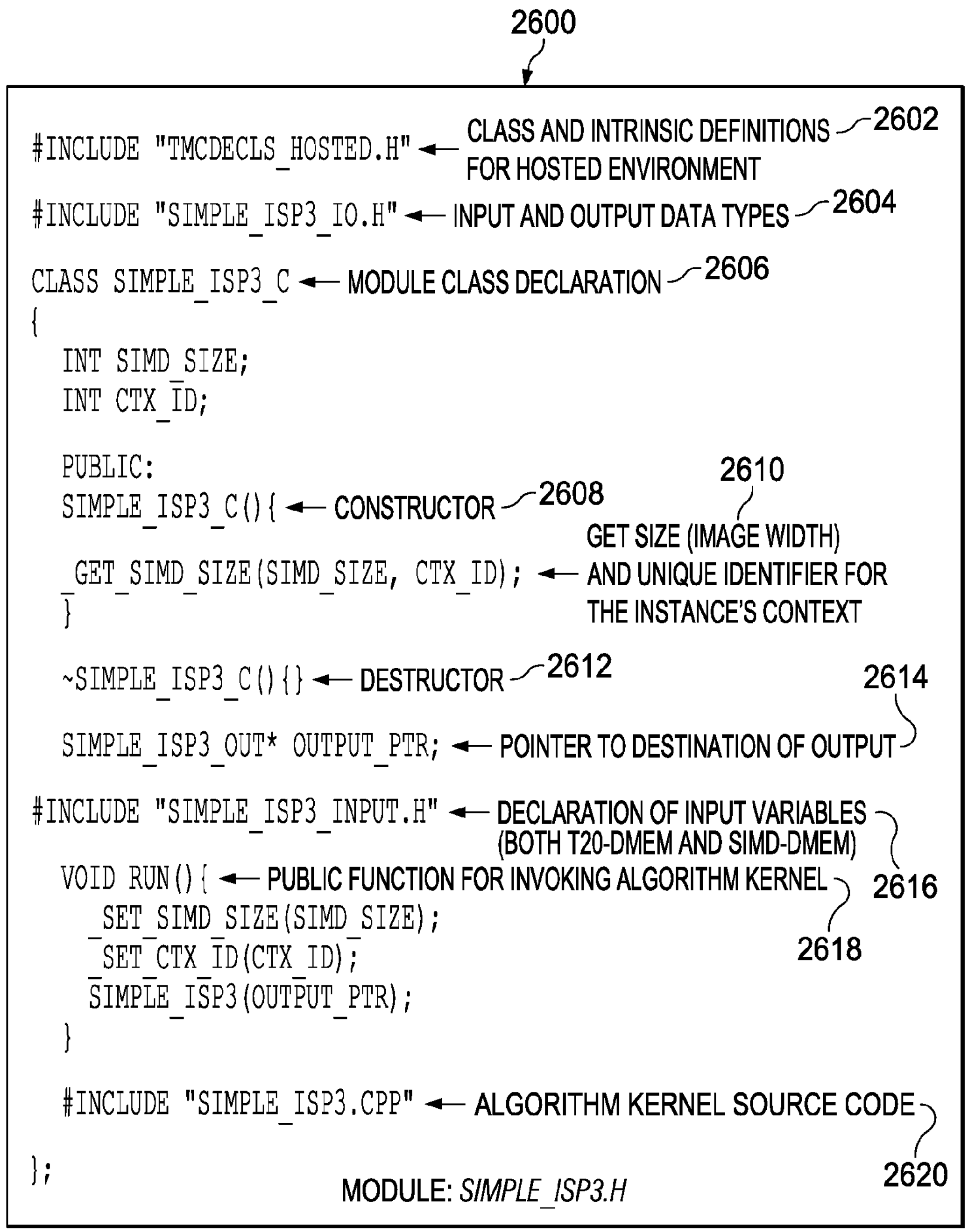
FIG. 31 is an example of a module-class declaration.

Turning now to FIG. 31, an example of a module-class declaration 2600 is provided. This declaration 2600 follows a standard template, with naming conventions, to permit system programming tool 718 to create instances of the module, to configure them as required, to form source-destination pairs through pointers, and to invoke the execution of each instance. The class is declared using the name of the algorithm followed by "_c" (in this case, simple_ISP3_c) as show with declaration 2606. The system programming tool 718 uses this name to create instances of the algorithm object, and the name of the object is tied to a named component (block) in the use-case diagram (i.e., 1000), since there can be multiple instances, and each should have a unique name. Private variables (such as "simd_size" and "ctx_id") are set by the object constructor 2608 when an object is instantiated. These provide "handles", for example, to the width of the "Line" variables in the instance and an identifier for the "Line" context (e.g., implemented by the "simd" and "Line" classes that are defined for the hosted environment defined in "tmcdecls_hosted.h"). These settings can be based on static variables in the "simd" class. A conventional destructor 2612 is also declared, to de-allocate memory associated with the instance when it is no longer desired. A public variable, named "output_ptr", is declared as a pointer to the output type, in this case a pointer 2614 to the type "simple_ISP3_OUT", for example." If there is more than one output, these pointers are typically named "output_ptr0", "output_ptr1", and so on. These are the variables set by system programming tool 718 to define the destination of the output data for this instance.

The file "simple_ISP3_input.h", for example, is included as declaration 2618 to define the public input variables of the object. This is a somewhat unusual place to include a header file, but it provides a convenient way to define inputs in both multiple environments using a single source file. Otherwise, additional maintenance would be required to keep multiple copies of these declarations consistent between the multiple environments. A public function 2620 is declared, named "run", that is used to invoke the algorithm instance. This hides the details of the calling sequence to the algorithm kernel (i.e., 1808), in this case the number of output pointers that are passed to the kernel (i.e., 1808). The calls "_set_simd_size(simd_size)" and "_set_ctx_id(ctx_id)", for example, define the width of "Line" variables and uniquely identify the SIMD data memory variable contexts for the object instance. These are used during the execution of the algorithm kernel (i.e., 1808) for this instance. Finally, the algorithm kernel "simple_ISP3.*cpp*" or 1808 is included as member function 2622. This is also somewhat unconventional, including a ".cpp" file in a header file instead of vice versa, but is done for reasons already described—to permit common, consistent source code between multiple environments.

4.2. Autogeneration from Source Code in a Hosted Environment

Figure 32:
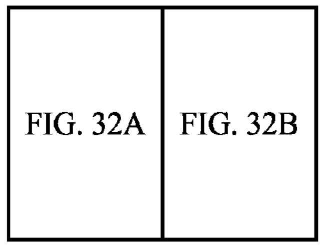
FIG. 32 is a detailed example of autogenerated code or hosted application code, which generally conforms to the template of FIG. 22.
Figure 32A:
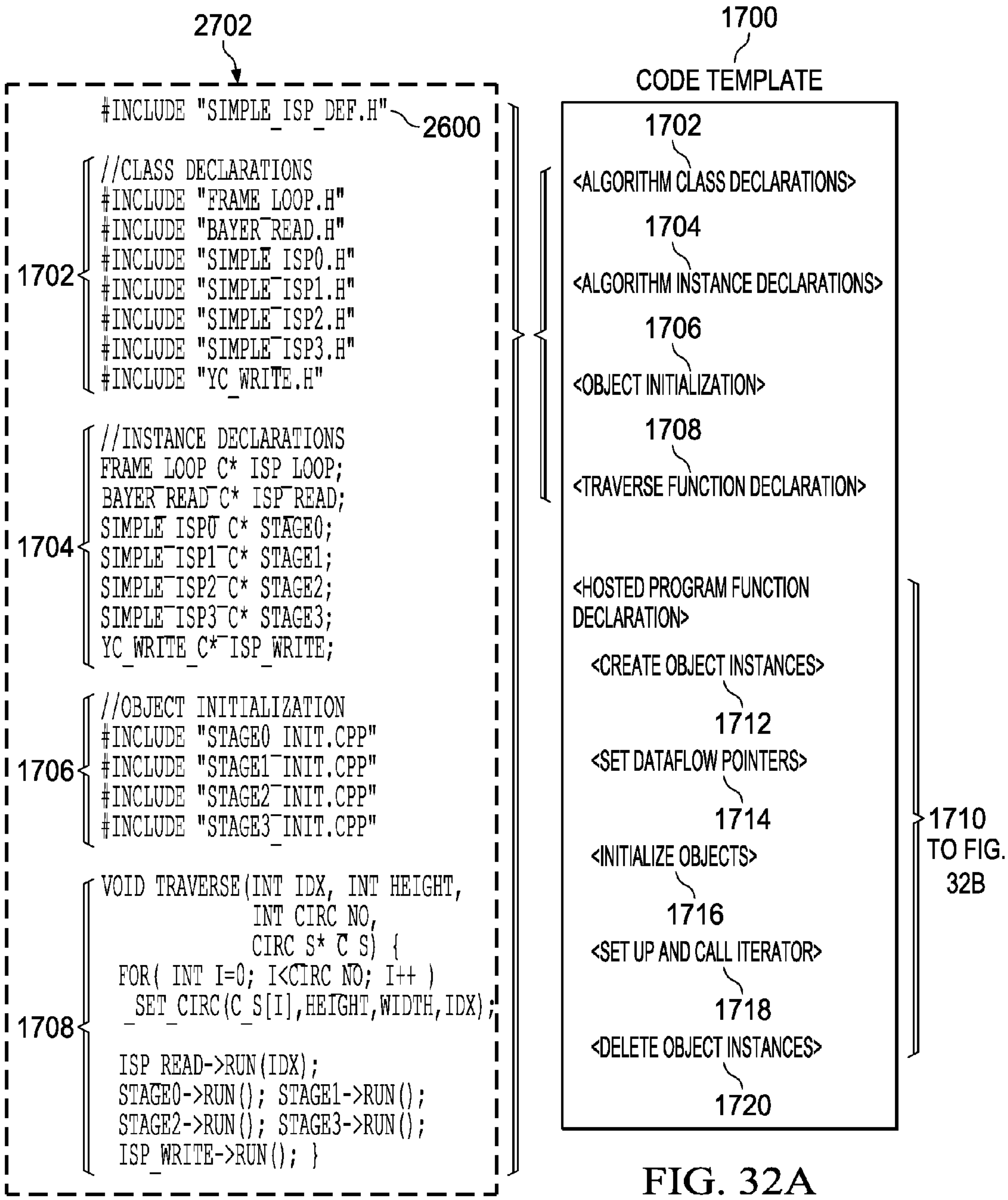

In FIG. 32, a detailed example of autogenerated code or hosted application code 2702, which generally conforms to template 1700, can be seen. This autogenerated code or hosted application code 2702 is generated by the system programming tool 718. Typically, the system programming tool also allocating compute and memory resources in the in processing cluster 1400, builds application source code for compilation by node-specific compilers (which is described below) based on the resource allocation using the meta-data provided by compiling algorithm modules separately, and creates the data structures, in system memory, for the use-case(s), which is fetched by a configuration-read thread in the GLS unit 1408 and distributed throughout the processing cluster 1400.

As show, the algorithm class and instance declarations 1702 and 1704 are generally are straightforward cases. The first section (class declarations) includes the files that declare the algorithm object classes for each component on the use-case diagram (i.e., 1000), using the naming conventions of the respective classes to locate the included files. The second section (instance declarations) declares pointers to instances of these objects, using the instance names of the components. The code 2702 in this example also shows the inclusion of the file 2600, which is "simple_ISP_def.h" that defines constant values. This file is normally—but not necessarily—included in algorithm kernel code 1808. It is included here for completeness, and the file "simple_ISP_def.h" includes a "#ifndef" pre-processor directive to generally ensure that the file is included once. This is a conventional programming practice, and many pre-processor directives have been omitted from these examples for clarity.

The initialization section 1706 includes the initialization code for each programmable node. The included files are named by the corresponding components in the use-case diagram (i.e., 1000 and described below). Programmable nodes are typically initialized in following order: iterators-.fwdarw.read threads.fwdarw.write threads are passed parameters, similar to function calls, to control their behavior. Programmable nodes do not generally support a procedure-call interface; instead, initialization is accomplished by writing into the respective object's scalar input data structure, similar to other input data.

In this example, most of the variables set during initialization are based on variables and values determined by the programmer. An exception is the circular-buffer state. This state is set by a call to "_init_circ". The parameters passed to "_init_circ", in the order shown, are:

(1) a pointer to the "circ_s" structure for this buffer;

(2) the initial pointer into the buffer, which depends on "delay_offset" and the buffer size;

(3) the size of the buffer in number of entries;

(4) the size of an entry in number of elements;

(5) "delay_offset", which determines how many iterations are required before the buffer generates valid outputs;

(6) a bit to protect against invalid output (initialized to 1); and (7) the offset from the top boundary for the first data received (initialized to 0).

This approach permits both the programmer and system programming tool 718 to determine buffer parameters, and to populate the "c_s" array so that the read thread can manage all circular buffers in the use-case, as a part of data transfer, based on frame parameters. It also permits multiple buffers within the same algorithm class to have independent settings depending on the use-case.

The traverse function 1708 is generally the inner loop of the iterator 602, created by code autogeneration. Typically, it updates circular-buffer addressing states for the iteration, and then calls each algorithm instance in an order that satisfies data dependencies. Here, the traverse function 1708 is shown for "simple_ISP". This function 1708 is passed four parameters:

(1) an index (idx) indicating the vertical scan line for the iteration;

(2) the height of the frame division;

(3) the number of circular buffers in the use-case ("circ_no"); and (4) the array of circular-buffer addressing state for the use-case, "c_s".

Before calling the algorithm instances, traverse function 1708 calls the function "_set_circ" for each element in the "c_s" array, passing the height and scan-line number (for example). The "_set_circ" function updates the values of all "Circ" variables in all instances, based on this information, and also updates the state of array entries for the next iteration. After the circular-buffer addressing state has been set, traverse function 1708 calls the execution member functions ("run") in each algorithm instance. The read thread (i.e., 904) is passed a parameter (i.e., the index into the current scan-line).

The hosted-program function 1710 is called by a user-supplied testbench (or other routine) to execute to use case on an entire frame (or frame division) of user-supplied data. This can be used to verify the use-case and to determine quality metrics for algorithms. As shown in this example, the hosted-function 1710 is used for "simple_ISP". This function 1710 is passed two parameters indicating the "height" and width ("simd_size") of the frame, for example. The function 1710 is also passed a variable number of parameters that are pointers to instances of the "Frame" class, which describe system-memory buffers or other peripheral input. The first set of parameters is for the read thread(s) (i.e., 904), and the second is for the write thread(s) (i.e., 908). The number of parameters in each set depends on the input and output data formats, including information such as whether or not system data is interleaved. In this example, the input format is interleaved Bayer, and the output is de-interleaved YCbCr. Parameters are declared in the order of their declarations in the respective threads. The corresponding system data is provided in data structures provided by the user in the surrounding testbench, with pointers passed to the hosted function.

Hosted-program function 1710 also includes creation of object instances 1712. The first statement in this example is a call to the function "_set_simd_size", which defines the width of the SIMD contexts (normally, an entire scan-line). This is used by "Frame" and "Line" objects to determine the degree of iteration within the objects (in the horizontal direction). This is followed by an instantiation of the read thread (i.e., 906). This thread is constructed with a parameter indicating the height and width of the frame. Here, the width is expressed as "simd_size", and the third parameter is used in frame-division processing. It might appear that the iterator (i.e., 602) has to know the height, since iteration is over all scan-lines. However, number of iterations is generally somewhat higher than the number of scan-lines, to take into account the delays caused by dependent circular buffers. The total number of iterations is sufficient to fill and all buffers and provide all valid outputs. However, the read thread (i.e., 904) should not iterate beyond the bottom of the frame, so it should know the height in order to conditionally disable the system access. Following this, there is a series of paired statements, where the first sets a unique value for the context identifier of the object that is about to be instantiated and where the second instantiates the object. The context identifier is used in the implementation of the "Line" class to differentiate the contexts of different SIMD instantiation. A unique identifier is associated with all "Line" variables that are created as part of an object instance. The read thread (i.e. 904) does not generally desire a context identifier because it reads directly from the system to the context(s) of other objects. The write thread (i.e., 908) does generally desire a context identifier because it has the equivalent of a buffer to store outputs from the use-case before they are stored into the system.

After the algorithm objects have been instantiated, their output pointers can be set according to the use-case diagram 1714. This relies on all objects consistently naming the output pointers. It also relies on the algorithm modules defining type names for input structures according to the class name, rather than a meaningful name for the underlying type (the meaningful name can still be used in algorithm coding). Otherwise, the association of component outputs to inputs directly follows the connectivity in the use-case graph (i.e., 1000).

Additionally, the hosted-program function 1710 includes the object initialization section 1716 for the "simple_ISP" use-case, for example. The first statement creates the array of "circ_s" values, one array element per circular buffer, and initializes the elements (this array is local to the hosted function, and passed to other functions as desired). The initialization values relevant here are the pointers to the "Circ" variables in the object instances. These pointers are used during execution to update the circular-addressing state in the instances. Following this, the initialization function provided (and named by) the programmer is called for each instance. The initialization functions are passed:

(1) a pointer to the scalar input structure of the instance;

(2) a pointer to the "c_struct" array entry for the corresponding circular buffer; and (3) the relative "delay_offset" of the instance.

An initiation 1718 of an instance of the iterator "frame_loop" can be seen. This initiation 1718 uses the name from the use-case diagram. The constructor for this instance sets the height of the frame, a parameter indicating the number of circular buffers (four buffers in this case), and a pointer to the "c_struct" array. This array is not used directly by the iterator (i.e., 602), but is passed to the traverse function 1708, along with the number of circular buffers. The number of circular buffers is also used to increase the number of iterations; for example, four buffers would require three additional iterations to generate all valid outputs. The read and write thread (i.e., 904 and 908, respectively) are constructed with the height of the frame, so the correct amount of system data is read and written despite the additional iterations. The remaining statements create a pointer to the traverse function 1708 and call the iterator (i.e., 602) with this pointer. The pointer is used to call traverse function 1708 within the main body of the iterator (i.e., 602).

Finally, the hosted-program function 1710 in includes a delete object instances function 1720. This function 1720 simply de-allocates the object instances and frees the memory associated with them, preventing memory leaks for repeated calls to the hosted function.

Figures 33, 34:
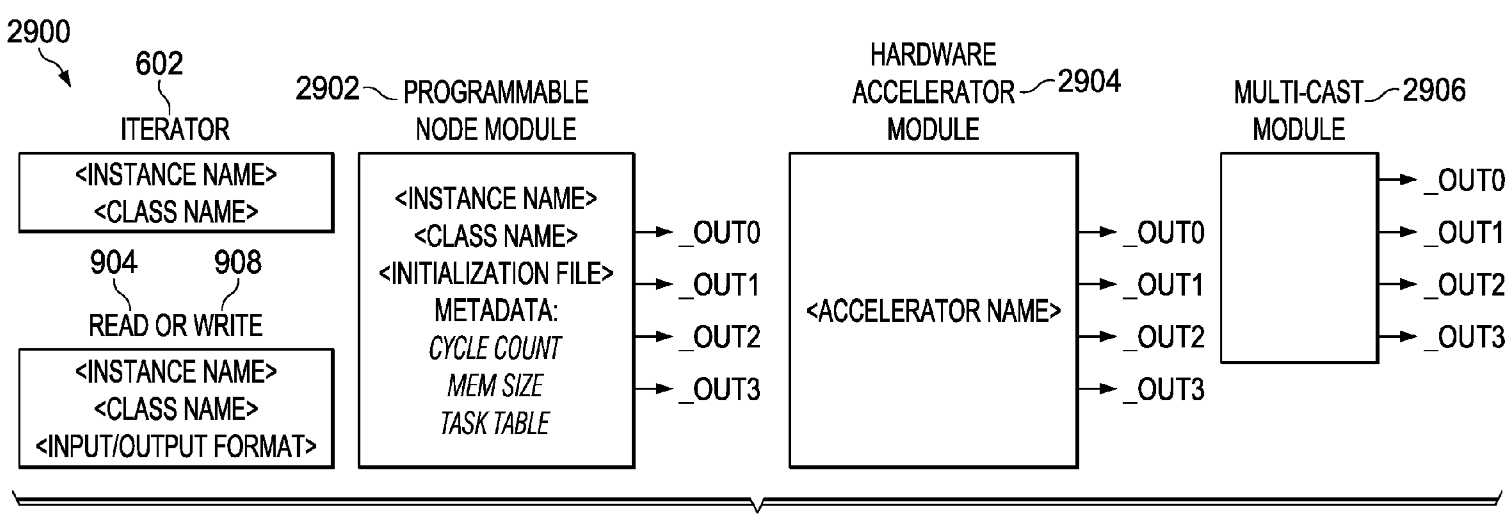
FIG. 33 is a sample of an initialization function for the module "simple_ISP3", called "Block3_init.cpp"
FIG. 34 is a use case diagram.

FIG. 33 shows a sample of an initialization function 2800 for the module "simple_ISP3", called "Block3_init.cpp", which is written and named by the programmer. The initialization function 2800 is written as a procedure, similar to an algorithm kernel 1808 but generally much shorter. Here, the keyword "SUBROUTINE" is used because this procedure is executed in-line. The procedure has three input parameters: "init_inst"; "c_s"; and "delay_offset". The parameter "init_inst" is a pointer to the scalar input structure for the algorithm class, in this case "simple_ISP3", which generally permits the initialization code to be used with any instance of the class. The parameter "c_s" is a pointer into an array of type "circ_s", and this array is defined by autogenerated code, with each entry corresponding to an instance of a circular buffer in the use-case. This array is also used to manage the state of the respective circular buffers during execution, and the initialization procedure is passed a pointer for the entry corresponding to the buffer being initialized, to permit the programmer to initialize the information that depends on the specific algorithm. The parameter "delay_offset" is a parameter that defines the relative delay of the buffer in the dataflow (described below). The algorithm kernel (i.e., 1808) is written as if there is no delay, and adjustments are made to the associated "Circ" variable during initialization.

4.3. Use-Case Diagrams

As can be seen in FIG. 34, the use-case diagram 2900 is a diagram illustrating an application program. The diagram is generally intended to:

(1) specify which algorithm objects are allocated to the program, and the relationships of data sources and destinations;
(2) provide a mechanism for assigning unique names to instances, which is generally useful when multiple instances of the same class are used because basing the instance name on the class name alone is generally not sufficient;
(3) allow the programmer to specify how object instances are initialized for each instance, while different instances of the same algorithm module can be initialized differently;
(4) enable the system programming tool 718 to automatically build source code to emulate the program in a hosted environment;
(5) provide meta-data associated with algorithm kernels (i.e., 1808) so that the system programming tool 718 can allocate computing and memory resources efficiently; and
(6) specify system connectivity, so that the system programming tool can generate the message structures desired to configure the hardware for the configuration, after determining the appropriate resource allocation and building and compiling the source code.

As shown, diagram 2900 includes components of the use-case diagram, for example, the iterator 602, read and write threads 904 and 908, a programmable node module 2902, a hardware accelerator module 2904, and multi-cast module 2906. These are components form nodes in the dataflow graph with up to four outputs (for example).

A read thread 904 or write thread 908 is specified by thread name, the class name, and the input or output format. The thread name is used as the name of the instance of the given class in the source code, and the input or output format is used to configure the GLS unit 1408 to convert the system data format (for example, interleaved pixels) into the de-interleaved formats required by SIMD nodes (i.e., 808-*i*). Messaging supports passing a general set of parameters to a read thread 904 or write thread 908. In most cases, the thread class determines basic characteristics such as buffer addressing patterns, and the instances are passed parameters to define things such as frame size, system address pointers, system pixel formats, and any other relevant information for the thread 904 or 908. These parameters are specified as input parameters to the thread's member function and are passed to the thread by the host processor based on application-level information. Multiple instance of multiple thread classes can be used for different addressing patterns, system data types, an so forth.

An iterator 602 is generally defined by iterator name and class name. As with read threads 904 and write threads 908, the iterator 602 can be passed parameters, specified in the iterator's function declaration. These parameters are also passed by the host processor based on application information. An iterator 602 can be logically considered an "outer loop" surrounding an instance of a read thread 904. In hardware, other execution is data-driven by the read thread 904, so the iterator 602 effectively is the "outer loop" for all other instances that are dependent on the read thread—either directly or indirectly, including write threads 908. There is typically one iterator 602 per read thread 904. Different read threads 904 can be controlled by different instances of the same iterator class, or by instances of different iterator classes, as long as the iterators 602 are compatible in terms of causing the read threads 904 to provide data used by the use-case.

An algorithm-module instance (i.e., 1802), associated with a programmable node module 2902, is specified by module instance name, the class name, and the name of the initialization header file. These names are used to locate source files, instantiate objects, to form pointers to inputs for source objects, and to initialize object instances. These all rely on the naming conventions described above. Each algorithm class has associated meta-data, shown in the FIG. 29 but not directly specified by the programmer. This meta-data is determined by information from the compiler 706, based on compiling an instance of the object as a stand-alone program. This is information, such as cycle count for one iteration of execution, the amount of instruction and data memory (both scalar and vector), and a table listing the number of cycles taken by each task boundary inserted by the compiler to resolve side-context dependencies. This information is stored with the class files, based on the interfaces defined between system programming tool 718 and the compiler 706, and is used by system programming tool 718 to construct the actual source files that are compiled for the use-case. The actual source files depend on the resources available and throughput requirements, and the system programming tool 718 controls the structure of source code to achieve an optimum or near-optimum allocation.

Accelerators (from 1418) are identified by accelerator name in accelerator module 2904. The system programming tool 718 cannot allocate these resources, but can create the desired hardware configuration for dataflow into and out of any accelerators. It is assumed that the accelerators can support the throughput.

Multi-cast modules 290 permit any object's outputs to be routed to multiple destinations. There is generally no associated software; it provides connectivity information to system programming tool 718 for setting up multi-cast threads in the GLS unit 1408. Multi-cast threads can be used in particular use-cases, so that an algorithm can be completely independent of various dataflow scenarios. Multi-cast threads also can be inserted temporarily into a use-case, for example so that an output can be "probed" by multi-casting to a write thread 908, where it can be inspected in memory 1416, as well as to the destination required by the use-case.

Figure 35:
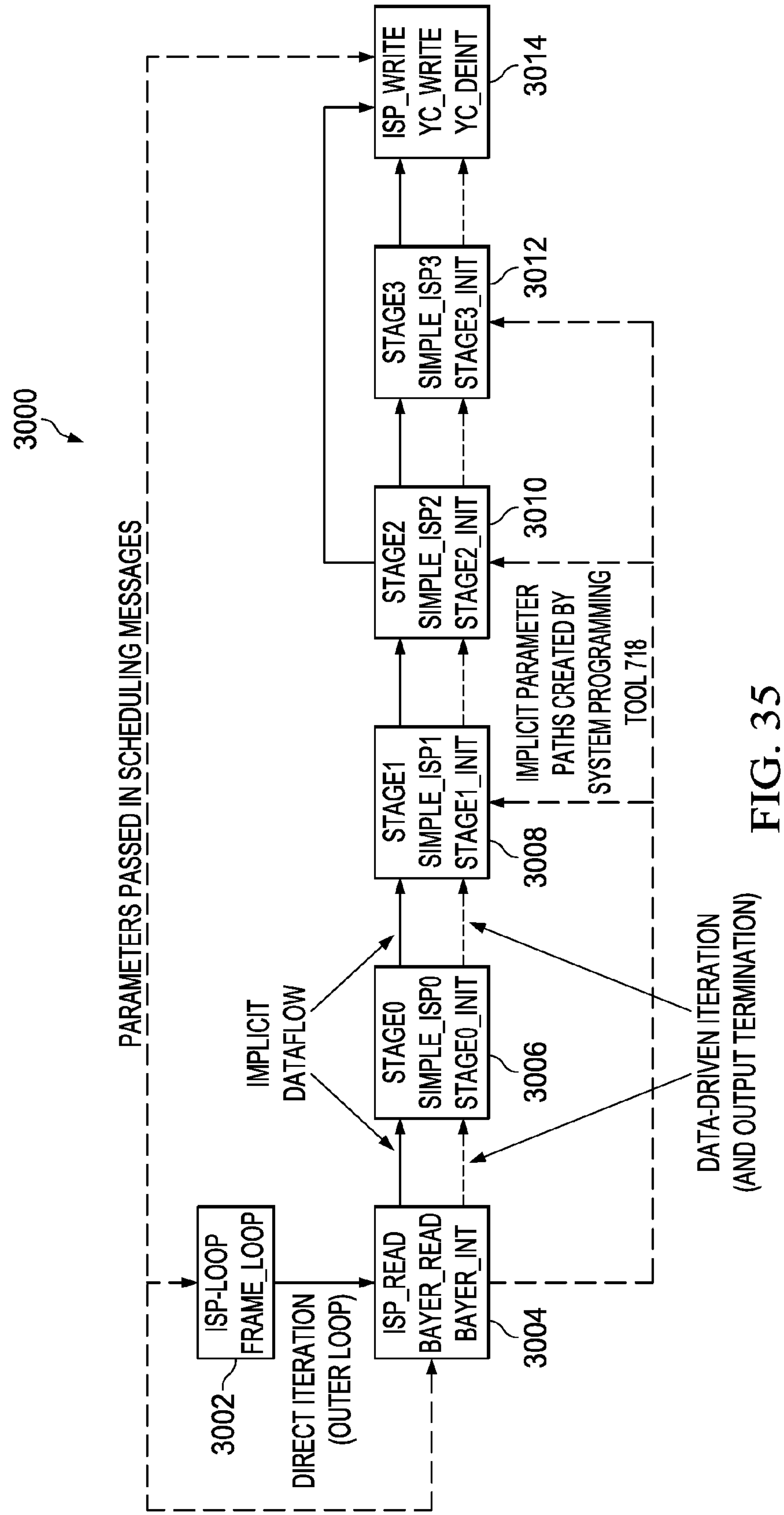
FIG. 35 is an example use-case diagram for a "simple_ISP" application.

Turning to FIG. 35, an example use-case diagram 3000 for the "simple_ISP" application can be seen. This is a very simple example of dataflow, corresponding to the autogenerated source code 1702 generated by the system programming tool 718, from this use-case. Here, the node programs or stages 3006, 3008, 3010, and 3012 are implemented as described below, but these programs, by themselves, contain no provision for system-level data and control flow, and no provision for variable initialization and parameter passing. These are provided by the programs that execute as global LS threads.

Here, diagram 3000 shows two types each of data and control flow. Explicit dataflow is represented by solid arrows. Implicit or user-defined dataflow, including passing parameters and initialization, is represented by dashed arrows. Direct control flow, determined by the iterator 602, is represented by the arrow marked "Direct Iteration (outer loop)." Implied control flow, determined by data-driven execution, is represented by dashed arrows. Internal data and control flow, from stage 3006 output to 3012 input, is accomplished by the node programming flow (as described below). All other data and control flow is accomplished by the global LS threads.

Additionally, the source code that is converted to auto-generated source code (i.e., 2702) by system programming tool 718 is generally free-form, C++ code, including procedure calls and objects. The overhead in cycle count is usually acceptable because iterations typically result in the movement of a very large amount of data relative to the number of cycle spent in the iteration. For example, consider a read thread (i.e., 904) that moves interleaved Bayer data into three node contexts. In each context, this data is represented as four lines of 64 pixels each—one line each for R, Gr, B, and Gb. Across the three contexts, this is twelve, 64-pixels lines total, or 768 pixels. Assuming that all 16 threads are active and presenting roughly equivalent execution demand (this is very rarely the case), and a throughput of one pixel per cycle (a likely upper limit), each iteration of a thread can use 768/16=48 cycles. Setting up the Bayer transfer can require on the order of six instructions (three each for R-Gr and Gb-B), so there are 42 cycles remaining in this extreme case for loop overhead, state maintenance, and so forth.

4.5. Complier

Figure 36:
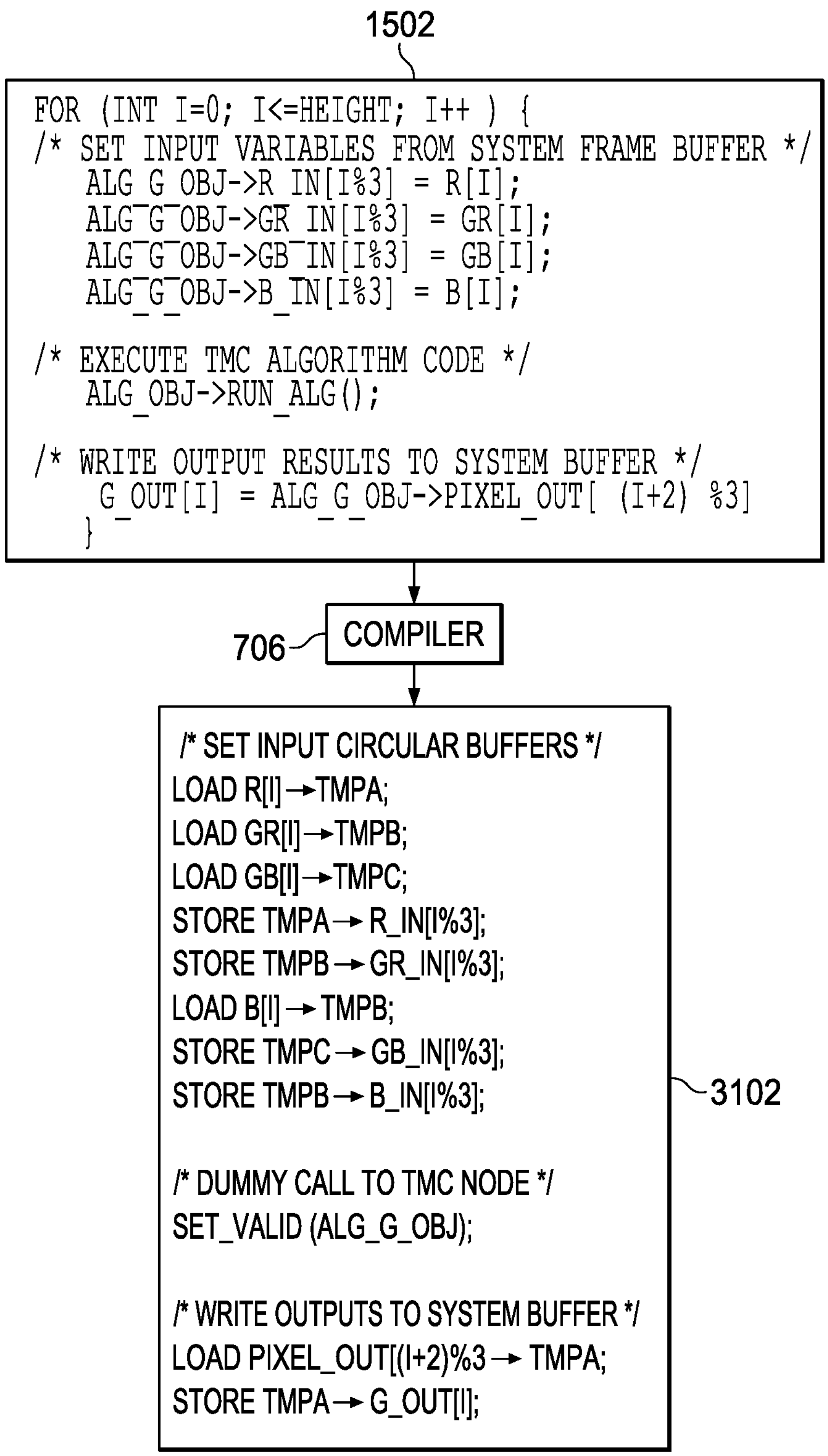
FIG. 36 is an example of the operation of the complier.

Turning to FIG. 36, an example of the operation of the complier 706 can be seen. Typically, compiler 706 is comprised of two or more separate compilers: one for the host environment and one for the nodes (i.e., 808-1) and/or the GLS unit 1408. As shown, source code 1502 is converted to assembly pseudo-code 3102 by compiler 706 (for GLS unit 1408, which is described in greater detail below. In this example, the load of R[i] on the first line associates the system address(es) for the Frame line R[i] with the register tmpA. The Frame format corresponding to object R[i] can have, and normally does have, a very different size and organization compared to the corresponding Line object R_In[i %3]—for example, being in a packed format instead of on 16-bit, short-integer alignments, and having the width of an entire frame instead of the width of a horizontal group. One of the functions of the GLS unit 1408 is to generally implement functional equivalence between the original source code—as compiled and executed on any host—and the code as compiled and executed as binaries on the GLS unit processor (or GLS processor 5402, which is described in greater detail below) and/or node processor 4322 (which is described in greater detail below). Namely, for the GLS processor 5402, this can be a function of the Request Queue and associated control 5408 (which is described in greater detail below.

5. System Programming (Generally)

Figure 37:
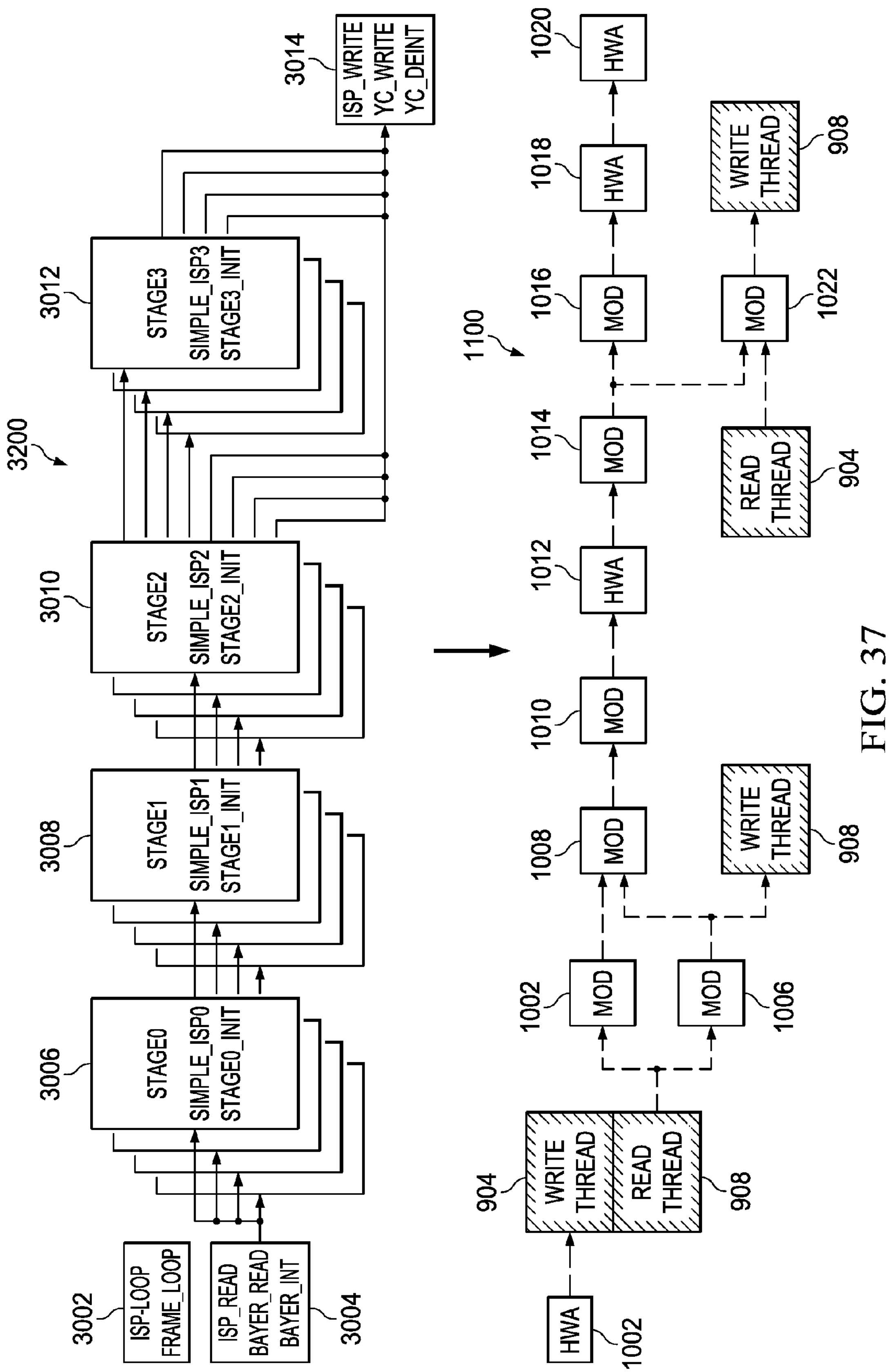
FIG. 37 is a conceptual arrangement for how the "simple_ISP" application is executed in parallel.

Turning to FIG. 37, a conceptual arrangement 3200 for how the "simple_ISP" application is executed in parallel. Since this is a monolithic program (a memory-to-memory operation), with simple dataflow, it can be parallelized by replicating (in concept) instances of algorithm modules. The read thread distributes input data to the instances, and the outputs are re-assembled at the write thread to be written as sequential output to the system.

5.1. Parallel Object Execution Example

Figure 38:
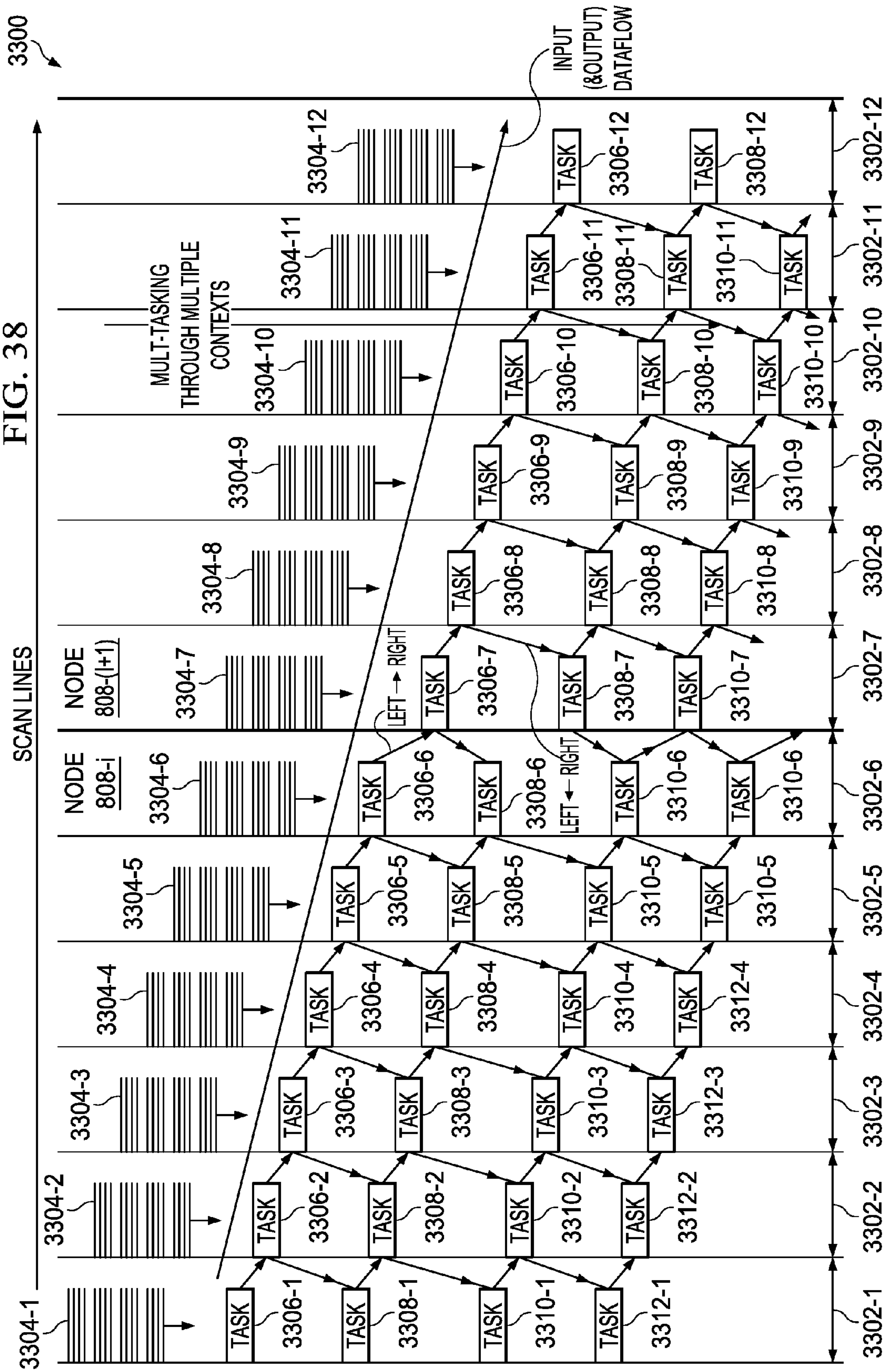
FIG. 38 is a diagram of an execution of an application on example systems.

In FIG. 38, an example of the execution of an application for systems 700 and 1400 can be seen. Here, in this case twelve "instances" 3302-1 to 3302-12 are executed in six contexts 3304-1 3304-6 on two nodes 808-*i* and 808-(*i*+1). Each context 3304-1 3304-6 is 64 pixels wide, and contexts 3304-1 3304-6 are linked as a horizontal group of 768 continuous pixels on four scan-lines (vertical direction). The read thread (i.e., 904) provides scan-line data sequentially, into these contiguous contexts. The contexts 3304-1 3304-6 execute using multi-tasking (execution of tasks 3306-1 to 3306-12, 3308-1 to 3308-12, 3310-1 to 3310-12, and 3312-1 to 3312-12) on each node 808-*i* and 808-(*i*+1) (to satisfy dependencies on pixels in contexts to the left and right), with parallel execution between nodes 808-*i* and 808-(*i*+1) (also subject to data dependencies in the horizontal direction). The parallelism between nodes 808-*i* and 808-(*i*+1) is the "true" parallelism, but multiple contexts 3304-1 3304-6 support data parallelism by permitting streaming of pixel data into and out processing cluster 1400, overlapped with execution. Pixel throughput is determined by the number of cycles from the input to stage 3006 to the output of stage 3012, the number of parallel nodes (i.e., 808-*i*), and the node frequency of the nodes (i.e., 808-*i*). In this example, two nodes 808-1 and 808-(*i*+1) generate 128 pixels per iteration. If the end-to-end latency is 600 cycles, at 400 MHz, the throughput is (128 pixels)*(400 Mcycle/sec)÷(600 cycles), or 85 Mpixel/sec. This form of parallelism, however, is too restrictive because it is a monolithic program, using partitioned-data parallelism.

5.2. Example Uses of Circular Buffers

Circular buffers can be used extensively in pixel and signal processing, to manage local data contexts such as a region of scan lines or filter-input samples. Circular buffers are typically used to retain local pixel context (for example), offset up or down in the vertical direction from a given central scan line. The buffers are programmable, and can be defined to have an arbitrary number of entries, each entry of arbitrary size, in any contiguous set of data memory locations (the actual location is determined by compiler data-structure layout). In some respects, this functionality is similar to circular addressing in the C6x.

However, there are a few issues introduced by the application of circular buffers here. Pixel processing (for example) can require boundary processing at the top and bottom edges of the frame. This provides data in place of "missing" data beyond the frame boundary. The form of this processing, and the number of "missing" scan lines provided, depends on the algorithm. The implementation provided here of a circular buffer is generally independent of the actual location of the buffer in the dataflow. Dependent buffers are generally "filled" at the top of a frame and "drained" at the bottom. The actual state of any particular buffer depends on where it is located in the dataflow relative to other buffers.

Figure 39:
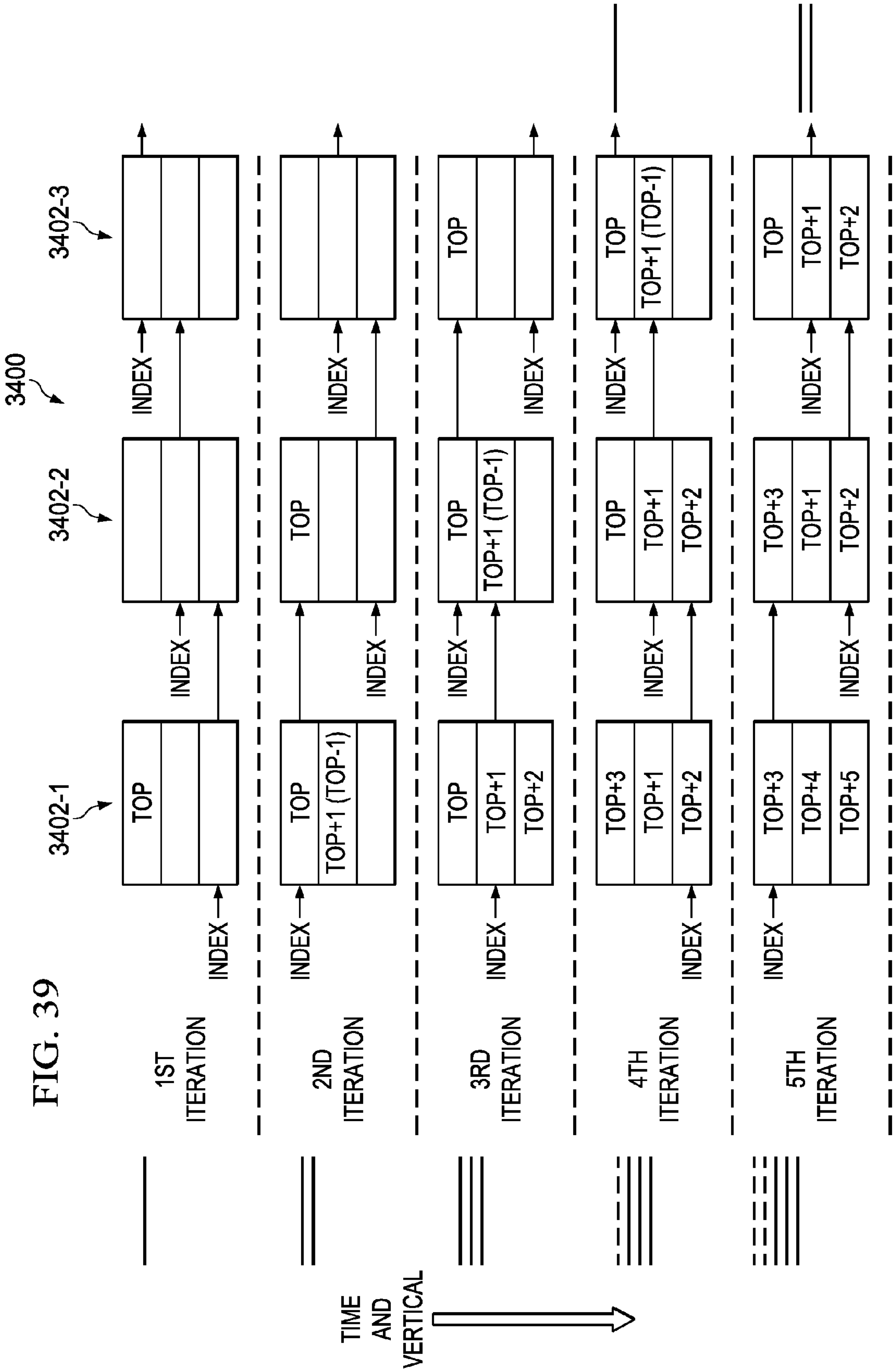
FIG. 39 is a diagram of three circular buffers in three stages of the processing chain.

Turning to FIG. 39, there are three circular buffers 3402-1 3402-2, and 3402-3 in three stages of the processing chain 3400. This processing is embedded in an iteration loop that provides data one scan-line at a time to buffer 3402-1, which in turn provides data to buffer 3402-2, and so on. Each iteration of the loop increments the index into the circular buffer at each stage, starting with the indexes as shown; these relative locations are generally used to properly manage the relative dataflow delays between the buffers.

The first iteration provides input data at the first scan-line of the frame (top) to buffer 3402-1. In this example, this is not sufficient for buffer 3402-1 to generate valid output. The circular buffers 3402-1 to 3402-3 have three entries each, implying that entries from three scan-lines are used to calculate an output value. At this point, the buffer index points to the entry that is logically one line before the first scan-line (above the frame). Neither buffer 3402-2 nor buffer 3402-3 has valid input at this point. The second iteration provides data at the second scan-line (top+1) to buffer 3402-1, and the index points to the first scan-line. In this example, boundary processing can provide the equivalent of three scan-lines of data because the second scan-line is logically reflected above the top boundary. The entry after the index generally serves two purposes, providing data to represent a value at top−1 (above the boundary), and actual data at top+1 (the second scan-line). This is sufficient to provide output data to buffer 3402-2, but this data is not sufficient for buffer 3402-3 to generate valid output so that buffer 3402-2 has no input. The third iteration provides three scan-line inputs to buffer 3402-1, which provides a second input to buffer 3402-2. At this point, buffer 3402-2 uses boundary processing to generate output to buffer 3402-3. On the fifth iteration, all stages 3402-1 to 3402-3 have valid datasets for generating output, but each is offset by a scan-line due to the delays in filling the buffers through the processing stages. For example, in the fifth iteration, buffer 3402-1 generates output at top+3, buffer 3402-2 at top+2, and buffer 3402-3 at top+1.

Generally, it is not possible for algorithm kernels (i.e., 1808) to completely specify initial settings or the behavior of their circular buffers (i.e., 3402-1) because, among other things, this depends on how many stages removed they are from input data. This information is available from the system programming tool 718, based on the use-case diagram. However, the system programming tool 718 also does not completely specify the behavior of circular buffers (i.e., 3402-1) because, for example, the size of the buffers and the specifics of boundary processing depend on the algorithm. Thus, the behavior of circular buffers (i.e., 3402-1) is determined by a combination of information known to the application and to system programming tool 817. Furthermore, the behavior of a circular buffer (i.e., 3402-1) also depends on the position of the buffer relative to the frame, which is information known to the read thread (i.e., 906), at run time.

5.3. Contexts and Mapping of Programs to Nodes 5.3.1 Contexts and Descriptors (Generally)

SIMD data memory and node processor data memory (i.e., 4328 and which is described below in detail) are partitioned into a variable number of contexts, of variable size. Data in the vertical frame direction is retained and re-used within the context itself, using circular buffers. Data in the horizontal frame direction is shared by linking contexts together into a horizontal group (in the programming model, this is represented by the datatype Line). It is important to note that the context organization is mostly independent of the number of nodes involved in a computation and how they interact with each other. A purpose of contexts is to retain, share, and re-use image data, regardless of the organization of nodes that operate on this data.

Figure 40:
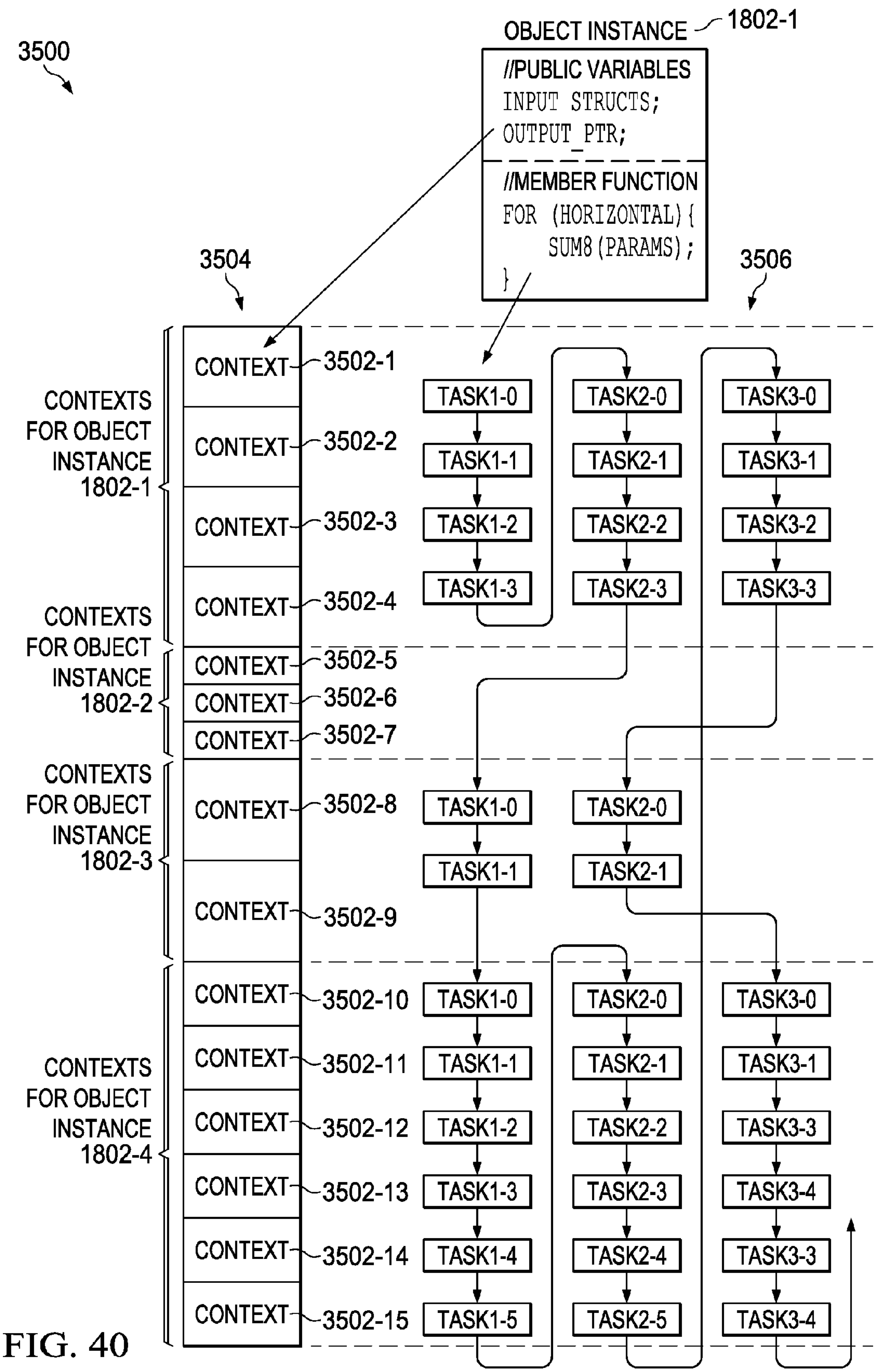
FIG. 40 is a memory diagram with contexts located in memory.

Turning to FIG. 40, a memory diagram 3500 cab be seen. In this memory diagram 3500 contexts 3502-1 to 3502-15 are located in memory 3504 and generally correspond to a data set (such as the public variables 1804-1 for object instances or algorithm module 1802-1) to perform tasks (such as those set forth by member function 1804-1 and seen in member function diagram 3506). As shown, there are several sets of contexts 3502-1 to 3502-4, 3502-5 to 3502-7, 3502-8 to 3502-9, and 3502-10 to 3502-15, which correspond to object instances 1802-1 to 1802-4. Object instances (i.e., 1802-1) can share node computing and memory resources depending on throughput requirements, and object instances (i.e., 1802-1) can be modeled using independent contexts, where contexts can encapsulate public and private variables.

Figure 41:
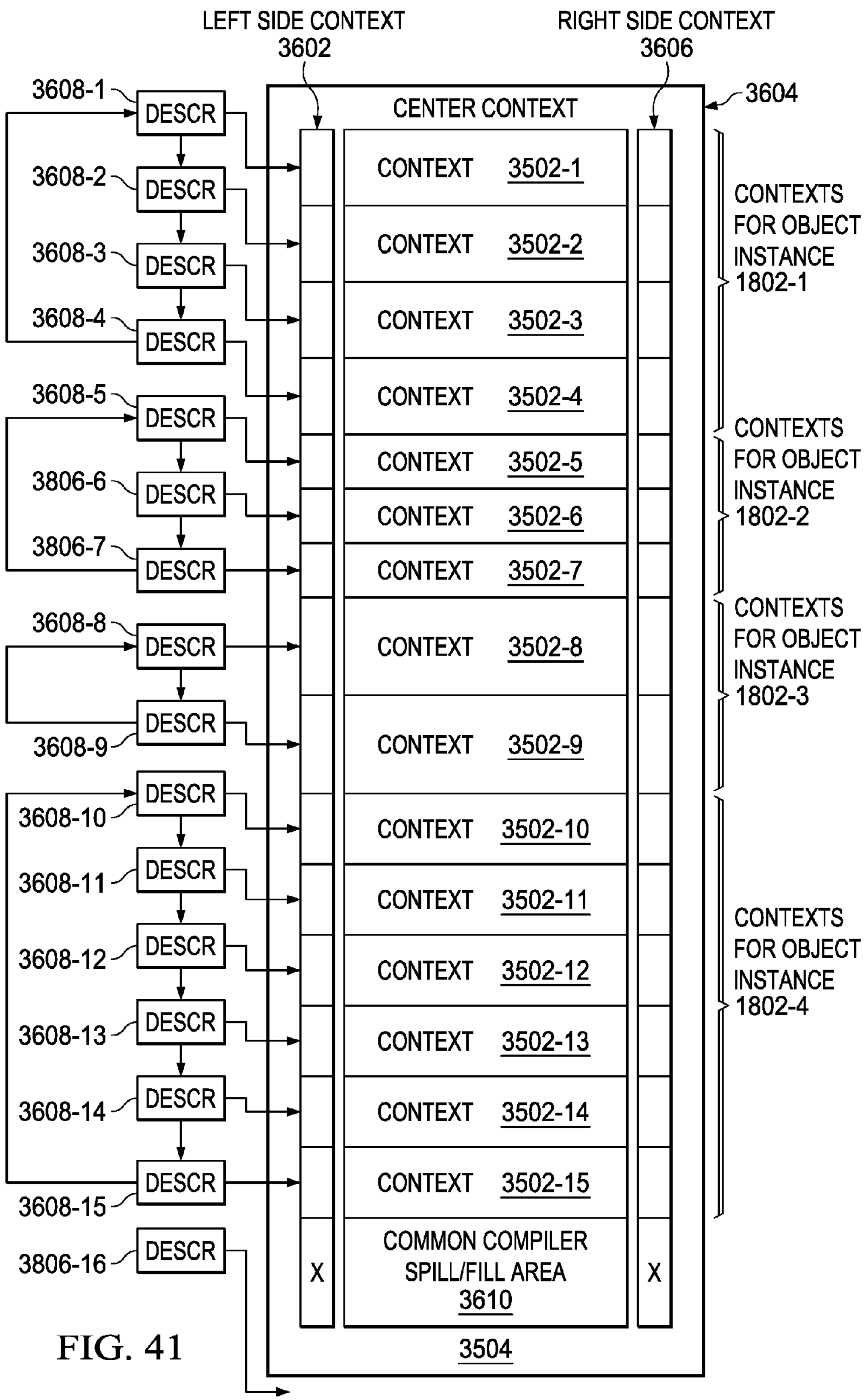
FIG. 41 is an example of the memory in greater detail.

Variable allocation is provided for the number of contexts, and sizes of contexts, to object instances in which contexts (i.e., 3502-1) allocated to the same object class can be considered separate object instances. Also, context allocation can includes both scalar and vector (i.e., SIMD) data, where scalar data can include parameters, configuration data, and circular-buffer state. Additionally, there are several ways of overlapping data transfer with computation: (1) using 2 contexts (or more) for double-buffering (or more); (2) compiler flags when input state is no longer desired—next transfer in parallel with completing execution; and (3) addressing modes permit the implementation of circular buffers (e.g. first-in-first-out buffers or FIFOs). Data transfer at the system level can look like variable assignment in the programming model with the system 700 matching context offsets during a "linking" phase. Moreover, multi-tasking can be used to most efficiently schedule node resources so as to run whatever contexts are ready with system-level dependency checking that enforces a correct task order and registers that can be saved and restored in a single cycle—no overhead for multi-tasking Turning to FIG. 41, an example of the memory 3504 can be seen in greater detail. As shown, each context 3502-1 to 3502-15 includes a left side context 3602, center context 3604, and right side context 3606, and there is a descriptor 3608-1 to 3608-15 associated with each context 3502-1 to 3502-15. The descriptors specify the context base address in data memory, segment node identifiers, context base number of the center context destination (for the "Output" instruction), segment node identifiers and context base numbers of the next context to receive data, and how data flows are distributed and merged. Typically, context descriptors are organized as a circular buffer (i.e., 3402-1) in linear memory, with the end marked by the Bk bit. Additionally, descriptors are generally contained in a "hidden" area of memory and not accessible by software, but an entire descriptor can be fetched in one cycle. Additionally, hardware maintains copies of this information as used for control (i.e., active tasks, task iteration control, routing of inputs to contexts and offsets, routing of outputs to destination nodes, contexts, and offsets). Descriptors (i.e., 3608-1) are also initialized along with the global program data in data memory, which is derived from system programming tool 718.

Typically, a variable number of contexts (i.e., 3502-1), of variable sizes, are allocated to a variable number of programs. For a given program, all contexts are generally the same size, as provided by the system programming tool 718. SIMD data memory not allocated to contexts is available for access from all contexts, using a negative offset from the bottom of the data memory. This area is used as a compiler 706 spill/fill area 3610 for data that does not desire to be preserved across task boundaries, which generally avoids the requirement that this memory be allocated to each context separately.

Each descriptor 3702 for node processor data memory (4328 and which is described below in detail) can contains a field (i.e., 3703-1 and 3703-2) that specifies the base address of the associated context (which can be seen in FIG. 42). Fields can be aligned on halfword boundaries. The base addresses in node processor data memory, for contexts 0-15 (for example), can be contained in locations 00'h-08'h, respectively, in the node processor data memory, with even contexts at even halfword locations. Each descriptor 3702 can contains a base address for the first location of the corresponding context.

Turning to FIG. 43, a format for a SIMD data memory context descriptor 3704 can be seen. Each descriptor 3704 for SIMD data memory can contains a field 3705 that specifies the base address of the associated context in SIMD data memory. These descriptors 3704 can also contain information to describe task iteration over related contexts and to describe system dataflow. The descriptors are usually stored the context-state RAM or context-state memory (i.e., 4326, which is described below in detail), a wide, dedicated memory supporting quick access of all information for multiple descriptors, because these descriptors are used to control concurrent task sequencing and system-dataflow operations. Since the node processor data memory descriptor generally indicates the base address of the local area for the context and, typically, has no other control function, the term "descriptor" with regard to node contexts generally refers to the SIMD data memory descriptor.

SIMD data memory descriptors 3704 are usually organized as linear lists, with a bit in the descriptor indicating that it is the last entry in the list for the associated program. When a program is scheduled, part of the scheduling message indicates the base context number of the program. For example, the message scheduling program B (object instance 1802-2) in the FIG. 41 would indicate that its base context descriptor is descriptor 4. Program B executes in three contexts described by descriptors 4-6; these contexts correspond to three different areas of the image. Programs normally multi-task between their contexts, as described later.

5.3.2. Side-Context Pointers

Figures 42, 44:
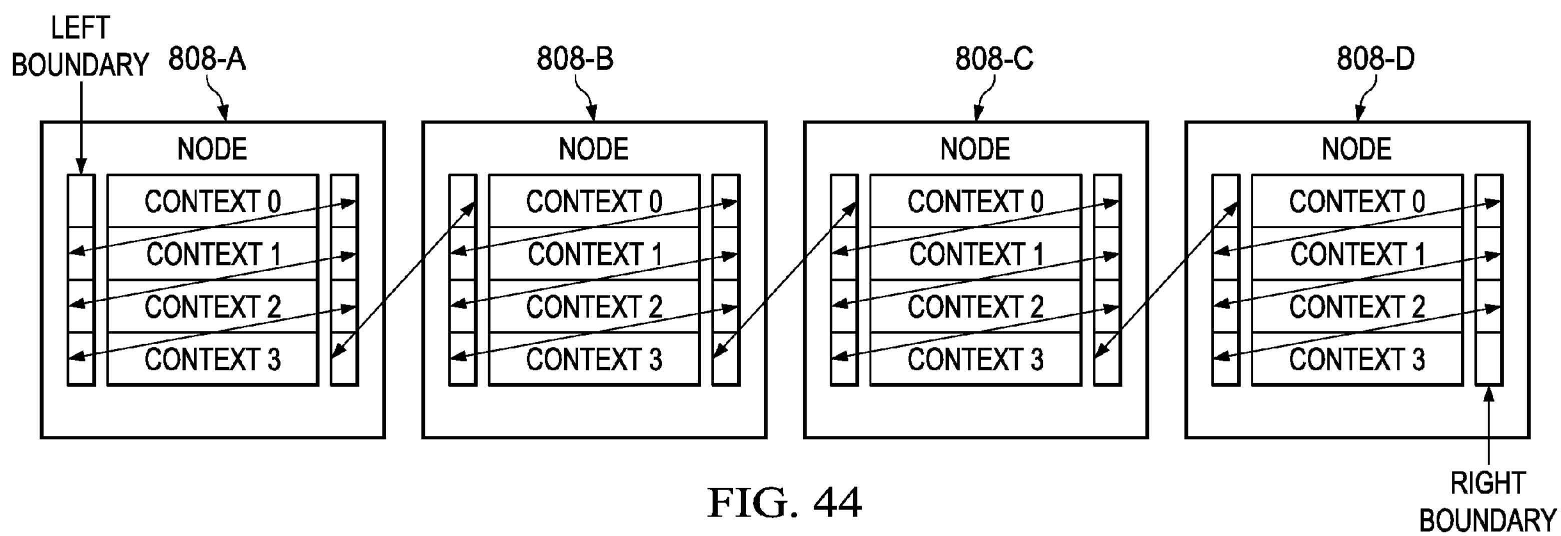
FIG. 42 is a diagram of an example format for a node processor data memory descriptor.
FIG. 44 is a diagram of an example of side-context pointers being used to link segments of the horizontal scan-line into horizontal groups.

Turning to FIG. 44, an example of how side-context pointers are used to link segments of the horizontal scan-line into horizontal groups can be seen. As shown, there are four nodes (labeled node 808-*a* through node 808-*d*) with each node having four contexts. For an example application of image processing, adjacent horizontal pixels are generally within contiguous contexts on the same node, except for the last context on that node, which links, on the right, to the left side of the first context in an adjacent node. Because of dependencies on data provided using side-context pointers, this organization of horizontal groups can cause contexts executing the same program to be in different stages of execution. Since a context can begin execution while others are still receiving input, this maximizes the overlap of program input and output with execution, and minimizes the demand that nodes place on shared resources such as data interconnect 814.

Typically, the horizontal group begins on the left at a left boundary, and terminates on the right at a right boundary. Boundary processing applies to these contexts for any attempt to access left-side or right-side context. Boundary processing is valid at the actual left and right boundaries of the image. However, if an entire scan-line does not fit into the horizontal group, the left- and right-boundary contexts can be at intermediate points in the scan-line, and boundary processing does not produce correct results. This means that any computation using this context generates an invalid result, and this invalid data propagates for every access of side context. This is compensated for by fetching horizontal groups with enough overlap to create valid final results. This reflects the inefficiency discussed earlier that is partially compensated for by wide horizontal groups (relatively small overlap is required, compared to the total number of pixels in the horizontal group).

Note that the side-context pointers generally permit the right boundary to share side context with the left boundary. This is valid for computing that progresses horizontally across scan lines. However, since in this configuration contexts are used for multiple horizontal segments, this does not permit sharing of data in the vertical direction. If this data is required, this implies a large amount of system-level data movement to save and restore these contexts.

A context (i.e., 3602-1) can be set so that it is not linked to a horizontal group, but instead is a standalone context providing outputs based on inputs. This is useful for operations that span multiple regions of the frame, such as gathering statistics, or for operations that don't depend specifically on a horizontal location and can be shared by a horizontal group. A standalone context is threaded, so that input data from sources, and output data to destinations, is provided in scan-line order.

5.3.3. SIMD Data Memory Descriptor

Turning back to FIG. 43, SIMD data memory descriptors are organized as linear lists, with a bit 3706 in the descriptor indicating that it is the last entry in the list for the associated program. When a program is scheduled, part of the scheduling message indicates the base context number of the program. For example, a message scheduling program (object instance 1802-2 of FIG. 39) would indicate that its base context descriptor is descriptor 3608-5. Program (object instance 1802-2 of FIG. 39) executes in three contexts 3502-5 to 3502-7 described by descriptors 3608-5 to 3806-7; these contexts correspond to three different areas of (for example) an image, which may not necessarily be contiguous.

Node addresses are generally structures of two identifiers. One part of the structure is a "Segment_ID", and the second part is a "Node_ID". This permits nodes (i.e., 808-*i*) with similar functionality to be grouped into a segment, and to be addressed with a single transfer using multi-cast to the segment. The "Node_ID" selects the node within the segment. Null connections are indicated by Segment_ID.Node_ID=00.0000'b. Valid bits are not required because invalid descriptors are not referenced. The first word of the descriptor indicates the base address of the context in SIMD data memory. The next word contains bits 3706 and 3707 indicating the last descriptor on the list of descriptors allocated to a program (Bk=1 for the last descriptor) and whether the context is a standalone, threaded context (Th=1). The second word also specifies horizontal position from the left boundary (field 3708), whether the context depends on input data (field 3710), and the number of data inputs in field 3709, with values 0-7 representing 1-8 inputs, respectively (input data can be provided by up to four sources, but each source can provide both scalar and vector data). The third and fourth words contain the segment, node, and context identifiers for the contexts sharing data on the left and right sides, respectively, called the left-context pointer and right-context pointer in fields 3711 to 3718.

5.3.4. Center-Context Pointers

Figure 45:
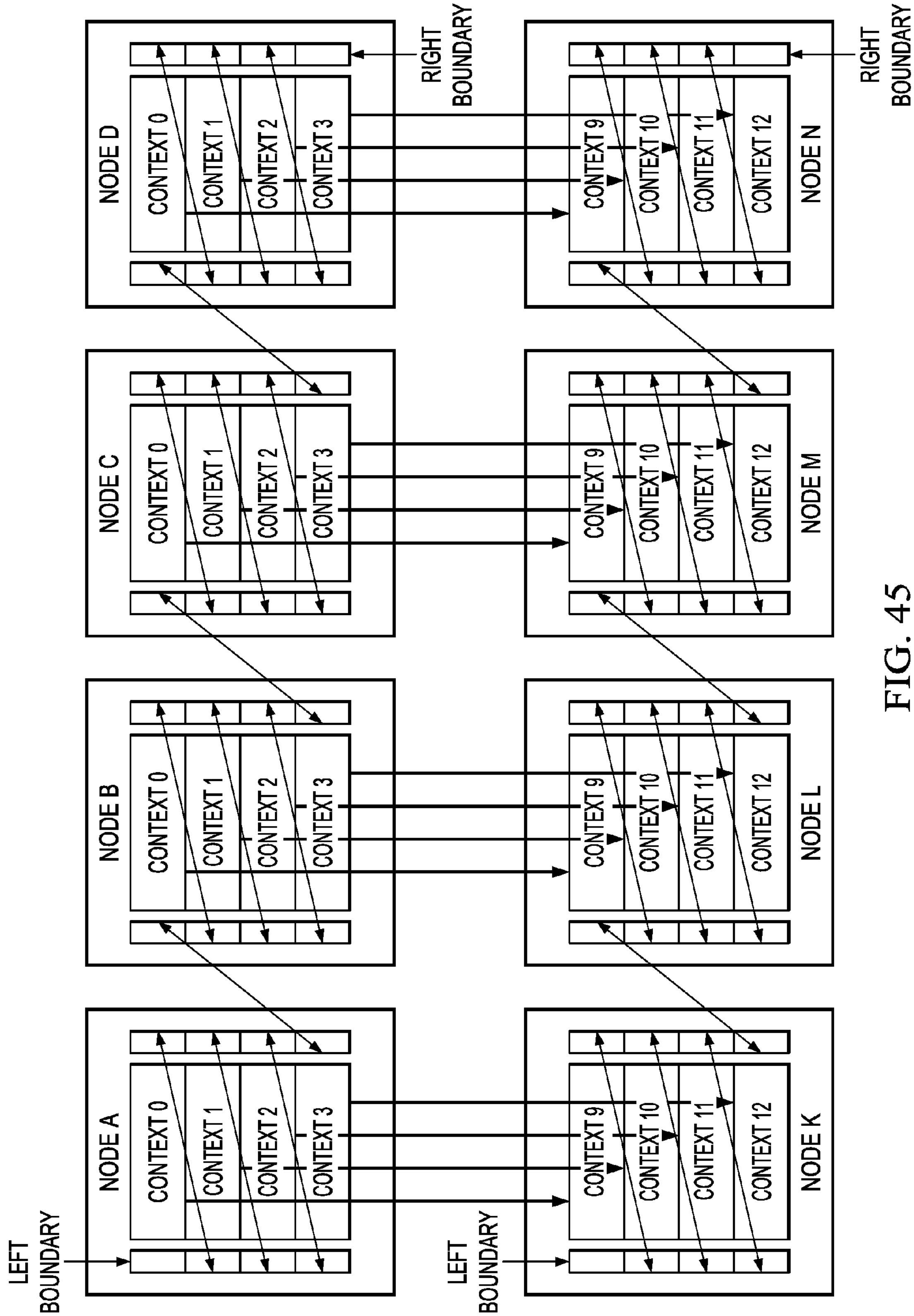
FIG. 45 is a diagram of an example of a center-context pointers used to describe an routing.

The context-state RAM or memory also has up to four entries describing context outputs, in a structure called a destination descriptor (the format of which can be seen in FIG. 37E and is described in detail below). Each output is described by a center-context pointer, similar in content to the side-context pointers, except that the pointer describes the destination of output from the context. In FIG. 45, center-context pointers describe an example of how one context's outputs are routed to another context's inputs (a partial set of pointers is shown for clarity—other pointers follow the same pattern). In the example of FIG. 43, eight nodes (labeled node 808-*a* through node 808-*d* and node 808-*k* through node 808-*n*) are shown, with each having four contexts. As with side-context pointers, related contexts can reside either on different nodes or the same node. Input and output between nodes is usually between related horizontal groups—that is, those that represent the same position in the frame. For this reason, the four contexts on the first node output to the first contexts on four destination nodes and so on. The number of source nodes is generally independent of the number of destination nodes, but the number of contexts should be the same in order to share data properly.

5.3.5. Destination Descriptors

In FIG. 46, an example of a format for a destination descriptor 3719 can be seen. The destination descriptors 3719 generally have a bit 3720 (ThDst) indicating that the destination is a thread (input is ordered), and a two-bit field 3721 (Src_Tag) used to identify this source to the destination. Each context can receive input from up to four sources, and the Src_Tag value is usually unique for each source at the receiving context (they are not necessarily unique in the destination descriptor). Data output uses fields 3722 to 3724 (which respectively include Seg_ID, Node_ID, and Node Dest_Cntx/Thread_ID) to route the data to the destination, and also sends Src_Tag with the data to identify the source. Invalid descriptors are indicated by Seg_ID=Node_ID=0.

A context (i.e., 3502-1) normally has at least one destination for output data, but it is also possible that a single program in a context (i.e., 3502-1) can output several different sets of data, of different types, to different destinations. The capability for multiple outputs is generally employed in two situations:

(1) The programmer creates an algorithm module (i.e., 1802) with outputs to different destinations, possibly of different data types. The system programming tool 718 identifies this case and abstracts the details of the implementation. This abstraction is used because system programming tool 718 has a lot of flexibility in resource allocation, to achieve efficiency and scalability. Multiple outputs can be implemented a number of different ways, depending on system resources and throughput requirements, including the possibilities that outputs are node-to-node, context-to-context on a single node, or occur within a context, with no data movement between contexts or nodes.

(2) Depending on resource requirements, system programming tool 718 can combine modules (i.e., 1802) that have single outputs into a larger, single program, to improve performance by exposing new compiler optimization opportunities, and to reduce demands on memory resources by re-using temporary and register-spill locations. Thus, system programming tool 718, itself, can create situations where the same program has outputs to different destinations. This situation also is abstracted from the programmer (who has no direct control in this case).

Figure 47:
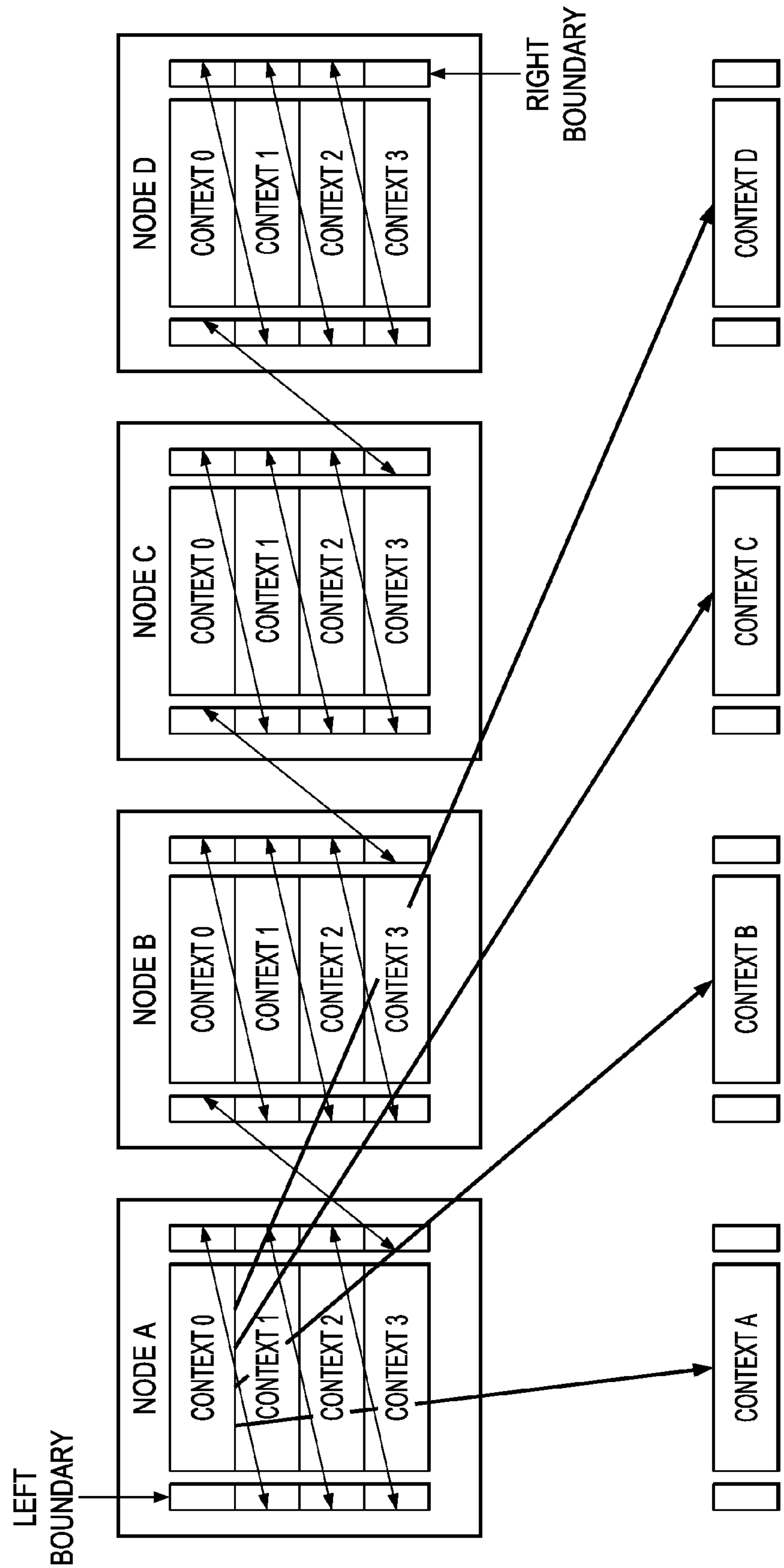
FIG. 47 is a diagram depicting an example of destination descriptors being used to support a generalized system dataflow.

Destination descriptors support a generalized system dataflow and can be seen in FIG. 47. In FIG. 47, four nodes (labeled node 808-*a* through node 808-*d*) are shown with each having four contexts. The destination descriptor entries are in four words of the context-state entry. The descriptor contains a table of four center-context pointers for four different destinations. The limit is four outputs because a numbered output is identified by a 2-bit field (described later; this is a design limitation, not architectural). Word numbers in the table refer to words in a line of the context-state RAM. A node "output" instruction identifies which descriptor entry is associated with the instruction. The identifier directly indexes the destination descriptor.

5.4. Task Balancing

In basic node (i.e., 808-*i*) allocation, throughput is met by adjusting and balancing the effective cycle counts so that data sources produce output at the required rate. This is determined by true dependencies between source and destination programs. For example, scan-based pixel processing has a much more complex set of dependencies than those between serially-connected sources and destinations, and the potential stalls introduced should be analyzed by system programming tool 718. As discussed in this section, this can be done after resource allocation, because it depends on context configurations, but has to occur before compiling source code, because the compiler uses information from system programming tool 718 to avoid these stalls.

In scan-based processing, data is shared not only between outputs and inputs, but also between contexts that are co-coordinating on different segments of a horizontal group. This sharing is essential to meet throughput, so that the number of pixels output by a program can be adjusted according to the cycle count (increasing cycles implies increasing pixels output, to maintain the required throughput in terms of pixels per cycle). To accomplish this, the program executes in multiple contexts, either in parallel or multi-tasked, and these contexts should logically appear as a single program operating on the total width of allocated contexts. Input and intermediate data associated with the scan lines are shared across the co-coordinating contexts, in both left-to-right and right-to-left directions.

Figure 49:
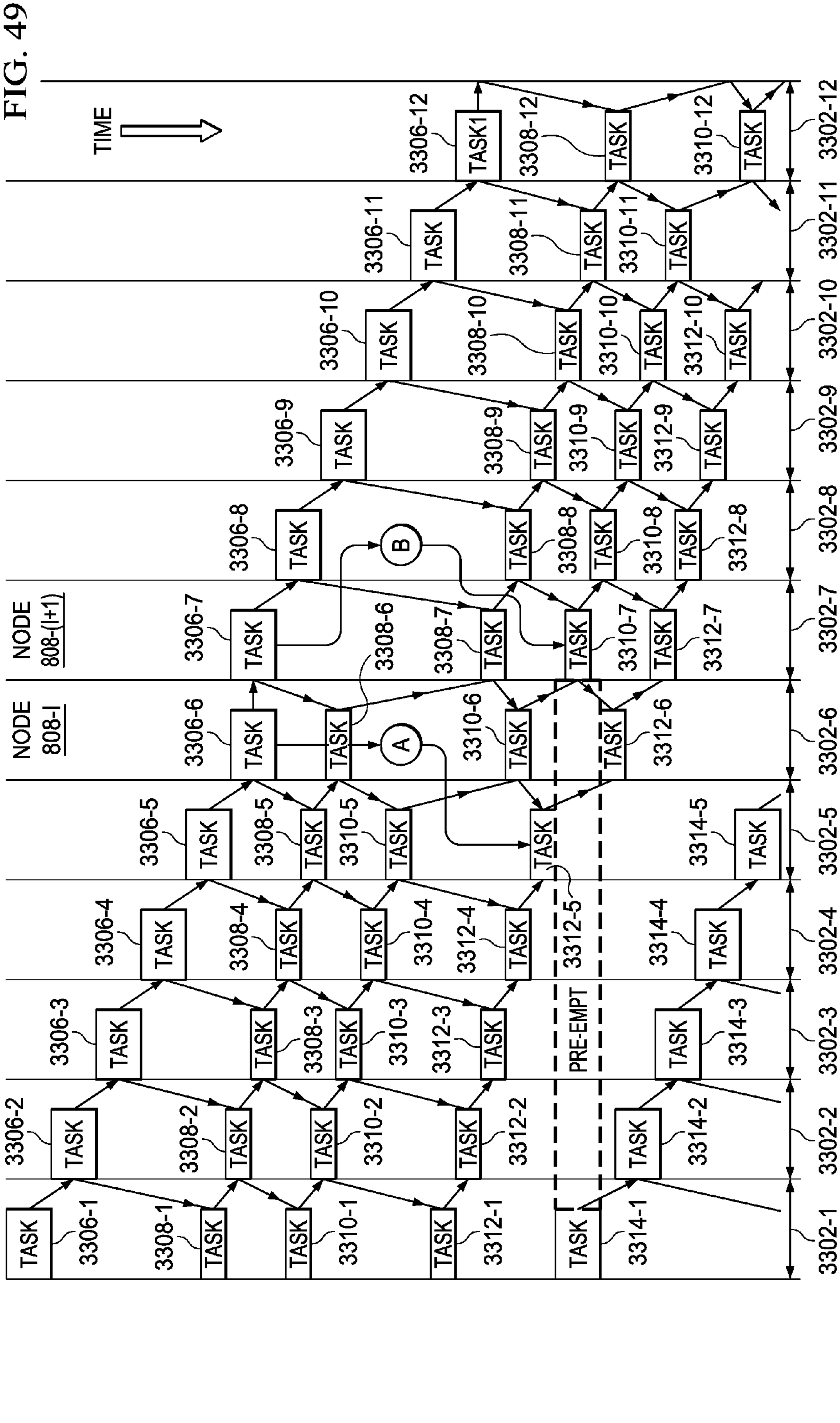
FIG. 49 is a diagram of an execution of an application on example systems.
Figure 50:
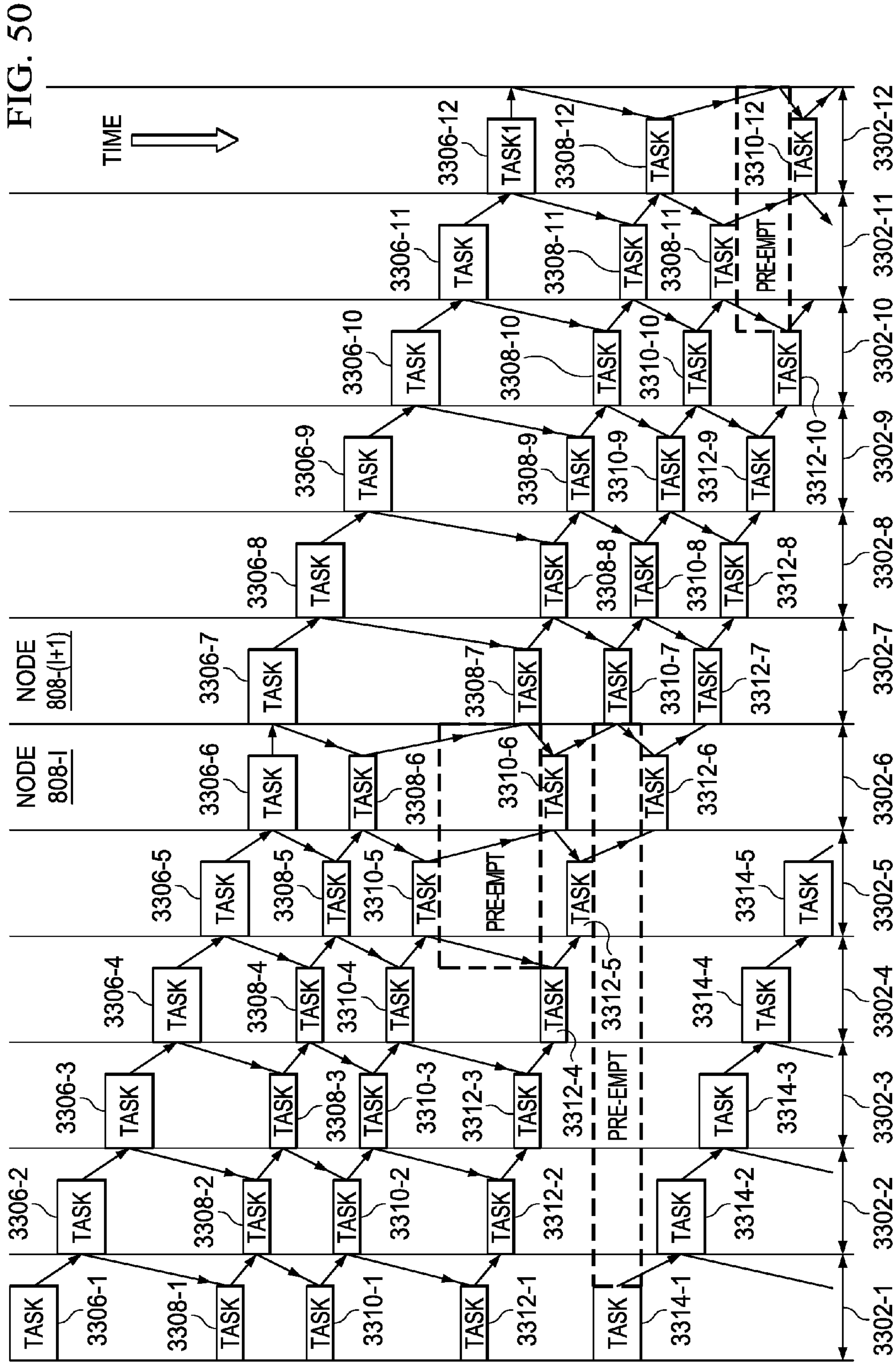
FIG. 50 is a diagram of pre-emption examples in execution of an application on example systems.

To meet throughput for scan-line-based applications, all dependencies should be considered, including those reflected through shared side-contexts. Nodes (i.e., 808-*i*) use task and program pre-emption (i.e., 3802, 3804, and 3806) to reduce the impact of these dependencies, but this is not generally sufficient to prevent all dependency stalls, as shown in FIGS. 49 and 50. As shown, the pre-emption 3802 (which is discussed below) of task 3310-6 (the $3^{rd}$ program task in the $6^{th}$ context) on node 808-*i* cannot be guaranteed to prevent a stall; in this case, there is a stall on task 3312-6. This stall is caused by the imbalance of node utilization by tasks, the difference in time between path "A" and path "B" (assuming, for example, that task 3312-6 is the last one in the program and cannot be pre-empted to schedule around the stall).

These side-context stalls are a complex function of task sizes (cycles between task boundaries, determined by the source code and code generation), the task sequence in the presence of task pre-emption, the number of tasks, the number of contexts, and the context organization (intra-node or inter-node). There is no closed-form expression that can predict whether or not stalls can occur. Instead, the system programming tool 718 builds the dependency graph, as shown in the figure, to determine whether or not there is a likelihood of side-context dependency stalls. The meta-data that the compiler 706 provides, as a result of compiling algorithm modules as stand-alone programs, includes a table of the tasks and their relative cycle counts. The system programming tool 718 uses this information to construct the graph, after resource allocation determines the number of contexts and their organizations. This graph also comprehends task pre-emption (but not program pre-emption, for simplicity).

If the graph does indicate the possibility of one or more dependency stalls, system programming tool 718 can eliminate the stalls by introducing artificial task boundaries to balance dependencies with resource utilization. In this example, the problem is the size of tasks 3306-1 to 3306-6 (for node 808-*i*) with respect to subsequent, dependent tasks; an outlier in terms of task size is usually the cause since it causes the node 808-*i* to be occupied for a length of time that does not satisfy the dependencies of contexts in previous nodes (i.e., 808-(*i*−1)), which are dependent on right-side context from subsequent nodes. The stall is removed by splitting each of tasks 3306-1 to 3306-6 into two sub-tasks. This task boundary has to be communicated to the compiler 706 along with the source files (concatenating task tables for merged programs). The compiler 706 inserts the task boundary because SIMD registers are not live across these boundaries, and so the compiler 706 allocates registers and spill/fill accordingly. This can alter the cycle count and the relative location of the task boundary, but task balancing is not very sensitive to the actual placement of the artificial boundary. After compilation, the system programming tool 718 reconstructs the dependency graph as a check on the results.

5.5. Context Management 5.5.1. Context Management Terminology

Dependency checking can be complex, given the number of contexts across all nodes that possibly share data, the fact that data is shared both though node input/output (I/O) and side-context sharing, and the fact that node I/O can include system memory, peripherals, and hardware accelerators. Dependency checking should properly handle: 1) true dependencies, so that program execution does not proceed unless all required data is valid; and 2) anti-dependencies, so that a source of data does not over-write a data location until it is no longer desired by the local program. There are no output dependencies—outputs are usually in strict program and scan-line order.

Figure 48:
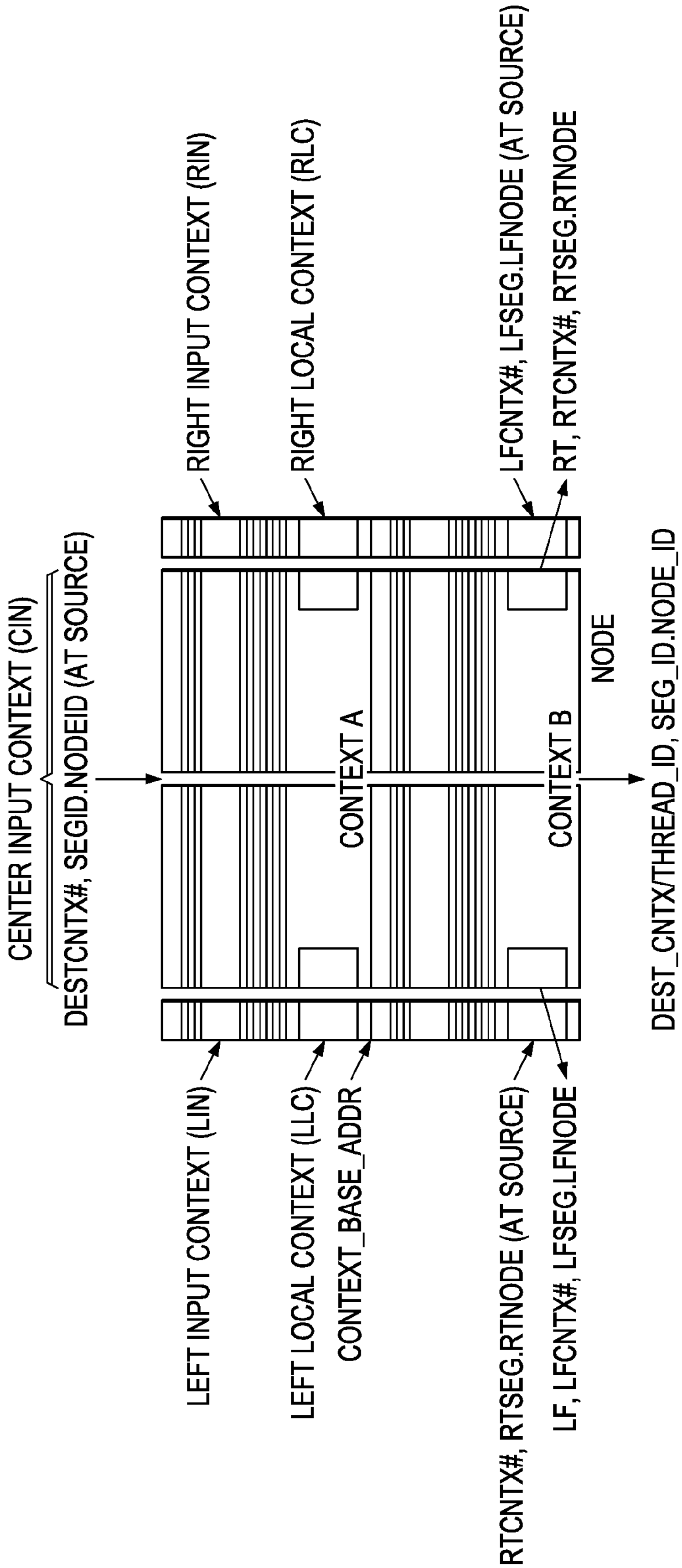
FIG. 48 is a diagram depicting nomenclature for contexts.

Since there are many styles of sharing data, terminology is introduced to distinguish the types of sharing and the protocols used to generally ensure that dependency conditions are met. The list below defines the terminology in the FIG. 48, and also introduces other terminology used to describe dependency resolution:

- Center Input Context (Cin): This is data from one or more source contexts (i.e., 3502-1) to the main SIMD data memory (excluding the read-only left- and right-side context random access memories or RAMs).
- Left Input Context (Lin): This is data from one or more source contexts (i.e., 3502-1) that is written as center input context to another destination, where that destination's right-context pointer points to this context. Data is copied into the left-context RAM by the source node when its context is written.
- Right Input Context (Rin): Similar to Lin, but where this context is pointed to by the left-context pointer of the source context.
- Center Local Context (Clc): This is intermediate data (variables, temps, etc.) generated by the program executing in the context.
- Left Local Context (Llc): This is similar to the center local context. However, it is not generated within this context, but rather by the context that is sharing data through its right-context pointer, and copied into the left-side context RAM.
- Right Local Context (Rlc): Similar to left local context, but where this context is pointed to by the left-context pointer of the source context.
- Set Valid (Set_Valid): A signal from an external source of data indicating the final transfer which completes the input context for that set of inputs. The signal is sent synchronously with the final data transfer.
- Output Kill (Output_Kill): At the bottom of a frame boundary, a circular buffer can perform boundary processing with data provided earlier. In this case, a source can trigger execution, using Set_Valid, but does not usually provide new data because this would over-write data required for boundary processing. In this case, the data is accompanied by this signal to indicate that data should not be written.
- Number of Sources (#Sources): The number of input sources specified by the context descriptor. The context should receive all required data from each source before execution can begin. Scalar inputs to node processor data memory 4328 are accounted for separately from vector inputs to SIMD data memory (i.e., 4306-1)—there can be a total of four possible data sources, and sources can provide either scalar or vector data, or both.
- Input_Done: This is signaled by a source to indicate that there is no more input from that source. The accompanying data is invalid, because this condition is detected by flow control in the source program, not synchronous with data output. This causes the receiving context to stop expecting a Set_Valid from the source, for example for data that's provided once for initialization.
- Release_Input: This is an instruction flag (determined by the compiler) to indicate that input data is no longer desired and can be overwritten by a source.
- Left Valid Input (Lvin): This is hardware state indicating that input context is valid in the left-side context RAM. It is set after the context on the left receives the correct number of Set_Valid signals, when that context copies the final data into the left-side RAM. This state is reset by an instruction flag (determined by the compiler 706) to indicate that input data is no longer desired and can be overwritten by a source.
- Left Valid Local (Lvlc): The dependency protocol generally guarantees that Llc data is usually valid as a program executes. However, there are two dependency protocols, because Llc data can be provided either concurrently or non-concurrently with execution. This choice is made based on whether or not the context is already valid when a task begins. Furthermore, the source of this data is generally prevented from overwriting the data before it has been used. When Lvlc is reset, this indicates that Llc data can be written into the context.
- Center Valid Input (Cvin): This is hardware state indicating that the center context has received the correct number of Set_Valid signals. This state is reset by an instruction flag (determined by the compiler 706) to indicate that input data is no longer desired and can be overwritten by a source.
- Right Valid Input (Rvin): Similar to Lvin except for the right-side context RAM.
- Right Valid Local (Rvlc): The dependency protocol guarantees that the right-side context RAM is usually available to receive Rlc data. However, this data is not always valid when the associated task is otherwise ready to execute. Rvlc is hardware state indicating that Rlc data is valid in the context.
- Left-Side Right Valid Input (LRvin): This is a local copy of the Rvin bit of the left-side context. Input to the center context also provides input to the left-side context, so this input cannot generally be enabled until the left-side input is no longer desired (LRvin=0). This is maintained as local state to facilitate access.
- Right-Side Left Valid Input (RLvin): This is a local copy of the Lvin bit of the right-side context. Its use is similar to LRvin to enable input to the local context, based on the right-side context also being available for input.
- Input Enabled (InEn): This indicates that input is enabled to the context. It is set when input has been released for the center, left-side, and right-side contexts. This condition is met when Cvin=LRvin=RLvin=0.

5.5.1. Local Context Management

Local context management controls dataflow and dependency checking between local shared contexts on the same node (i.e., 808-*i*) or logically adjacent nodes. This concerns shared left side contexts 3602 or right side contexts 3606, copied into the left-side or right-side context RAMs or memories 5.5.1.1. Task Switching to Break Circular Side-Context Dependencies Contexts that are shared in the horizontal direction have dependencies in both the left and right directions. A context (i.e., 3502-1) receives Llc and Rlc data from the contexts on its left and right, and also provides Rlc and Llc data to those contexts. This introduces circularity in the data dependencies: a context should receive Llc data from the context on its left before it can provide Rlc data to that context, but that context desires Rlc data from this context, on its right, before it can provide the Llc context.

This circularity is broken using fine-grained multi-tasking. For example, tasks 3306-1 to 3306-6 (from FIG. 49) can be an identical instruction sequence, operating in six different contexts. These contexts share side-context data, on adjacent horizontal regions of the frame. The figure also shows two nodes, each having the same task set and context configuration (part of the sequence is shown for node 808-(*i*+1)). Assume that task 3306-1 is at the left boundary for illustration, so it has no Llc dependencies. Multi-tasking is illustrated by tasks executing in different time slices on the same node (i.e., 808-*i*); the tasks 3306-1 to 3306-6 are spread horizontally to emphasize the relationship to the horizontal position in the frame.

As task 3306-1 executes, it generates left local context data for task 3306-2. If task 3306-1 reaches a point where it can require right local context data, it cannot proceed, because this data is not available. Its Rlc data is generated by task 3306-2 executing in its own context, using the left local context data generated by task 3306-1 (if required). Task 3306-2 has not executed yet because of hardware contention (both tasks execute on the same node 808-*i*). At this point, task 3306-1 is suspended, and task 3306-2 executes. During the execution of task 3306-2, it provides left local context data to task 3306-3, and also Rlc data to task 3308-1, where task 3308-1 is simply a continuation of the same program, but with valid Rlc data. This illustration is for intra-node organizations, but the same issues apply to inter-node organizations. Inter-node organizations are simply generalized intra-node organizations, for example replacing node 808-*i* with two or more nodes.

A program can begin executing in a context (i.e., 3502-1) when all Lin, Cin, and Rin data is valid for that context (if required), as determined by the Lvin, Cvin, and Rvin states. During execution, the program creates results using this input context, and updates Llc and Clc data—this data can be used without restriction. The Rlc context is not valid, but the Rvlc state is set to enable the hardware to use Rin context without stalling. If the program encounters an access to Rlc data, it cannot proceed beyond that point, because this data may not have been computed yet (the program to compute it cannot necessarily execute because the number of nodes is smaller than the number of contexts, so not all contexts can be computed in parallel). On the completion of the instruction before Rlc data is accessed, a task switch occurs, suspending the current task and initiating another task. The Rvlc state is reset when the task switch occurs.

The task switch is based on an instruction flag set by the compiler 706, which recognizes that right-side intermediate context is being accessed for the first time in the program flow. The compiler 706 can distinguish between input variables and intermediate context, and so can avoid this task switch for input data, which is valid until no longer desired. The task switch frees up the node to compute in a new context, normally the context whose Llc data was updated by the first task (exceptions to this are noted later). This task executes the same code as the first task, but in the new context, assuming Lvin, Cvin, and Rvin are set—Llc data is valid because it was copied earlier into the left-side context RAM. The new task creates results which update Llc and Clc data, and also update Rlc data in the previous context. Since the new task executes the same code as the first, it will also encounter the same task boundary, and a subsequent task switch will occur. This task switch signals the context on its left to set the Rvlc state, since the end of the task implies that all Rlc data is valid up to that point in execution.

At the second task switch, there are two possible choices for the next task to schedule. A third task can execute the same code in the next context to the right, as just described, or the first task can resume where it was suspended, since it now has valid Lin, Cin, Rin, Llc, Clc, and Rlc data. Both tasks should execute at some point, but the order generally does not matter for correctness. The scheduling algorithm normally attempts to chose the first alternative, proceeding left-to-right as far as possible (possibly all the way to the right boundary). This satisfies more dependencies, since this order generates both valid Llc and Rlc data, whereas resuming the first task would generate Llc data as it did before. Satisfying more dependencies maximizes the number of tasks that are ready to resume, making it more likely that some task will be ready to run when a task switch occurs.

It is important to maximize the number of tasks ready to execute, because multi-tasking is used also to optimize utilization of compute resources. Here, there are a large number of data dependencies interacting with a large number of resource dependencies. There is no fixed task schedule that can keep the hardware fully utilized in the presence of both dependencies and resource conflicts. If a node (i.e., 808-*i*) cannot proceed left-to-right for some reason (generally because dependencies are not satisfied yet), the scheduler will resume the task in the first context—that is, the left-most context on the node (i.e., 808-*i*). Any of the contexts on the left should be ready to execute, but resuming in the left-most context maximizes the number of cycles available to resolve those dependencies that caused this change in execution order, because this enables tasks to execute in the maximum number of contexts. As a result, pre-empt (i.e., pre-empt 3802), which are times during which the task schedule is modified, can be used.

Turning to FIG. 50, examples of pre-emption can be seen. Here, task 3310-6 cannot execute immediately after task 3310-5, but tasks 3312-1 through 3312-4 are ready to execute. Task 3312-5 is not ready to execute because it depends on task 3310-6. The node scheduling hardware (i.e., node wrapper 810-*i*) on node 810-*i* recognizes that task 3310-6 is not ready because Rvlc is not set, and the node scheduling hardware (i.e., node wrapper 810-*i*) starts the next task, in the left-most context, that is ready (i.e., task 3312-1). It continues to execute that task in successive contexts until task 3310-6 is ready. It reverts to the original schedule as soon as possible—for example, only task 3314-1 pre-empts 2212-5. It still is important to prioritize executing left-to-right.

To summarize, tasks start with the left-most context with respect to their horizontal position, proceed left-to-right as far as possible until encountering either a stall or the right-most context, then resume in the left-most context.

This maximizes node utilization by minimizing the chance of a dependency stall (a node, like node 808-*i*, can have up to eight scheduled programs, and tasks from any of these can be scheduled).

The discussion on side-context dependencies so far has focused on true dependencies, but there is also an anti-dependency through side contexts. A program can write a given context location more than once, and normally does so to minimize memory requirements. If a program reads Llc data at that location between these writes, this implies that the context on the right also desires to read this data, but since the task for this context hasn't executed yet, the second write would overwrite the data of the first write before the second task has read it. This dependency case is handled by introducing a task switch before the second write, and task scheduling ensures that the task executes in the context on the right, because scheduling assumes that this task has to execute to provide Rlc data. In this case, however, the task boundary enables the second task to read Llc data before it is modified a second time.

5.5.1.2. Left-Side Local Context Management

The left-side context RAM is typically read-only with respect to a program executing in a local context. It is written by two write buffers which receive data from other sources, and which are used by the local node to perform dependency checking. One write buffer is for global input data, Lin, based on data written as Cin data in the context on the left. The Lin buffer has a single entry. The second buffer is for Llc data supplied by operations within the same context on the left. The Llc buffer has 6 entries, roughly corresponding to the 2 writes per cycle that can be executed by a SIMD instruction, with a 3-entry queue for each of the 2 writes (this is conceptual—the actual organization is more general). These buffers are managed differently, though both perform the function of separating data transfer from RAM write cycles and providing setup time for the RAM write.

The Lin buffer stores input data sent from the context on the left, and holds this data for an available write cycle into the left-side context RAM. The left-side context RAM is typically a single-port RAM and can read or write in a cycle (but not both). These cycles are almost always available because they are unavailable in the case of a left-side context access within the same bank (on one of the 4 read ports, 32 banks), which is statistically very infrequent. This is why there is usually one buffer entry—it is very unlikely that the buffer is occupied when a second Lin transfer happens, because at the system level there are at least four cycles between two Cin transfers, and usually many more than four cycles. The hardware checks this condition, and forces the buffer to empty if desired, but this is to generally ensure correctness—it is nearly impossible to create this condition in normal operation.

An example of a format for the Lin buffer 3807 can be seen in FIG. 51, but since the Lin buffer is generally a hardware structure, to write an entry from the Lin buffer 3807, the Dest_Context# (field 3811) is used to access the associated context descriptor (which may be held in a small cache for performance, since the context is persistent during execution). The Context_Offset (field 3812) is added to the Context_Base_Address in the descriptor to obtain the absolute SIMD data memory address for the write. Since a SIMD can (for example) write the upper 16 bits, lower 16 bits, or both, there can be separate enables for the two halves of the 32-bit data word. Typically, the buffer 3807 also includes fields 3808, 3809, 3810, 3813, and 3814, which, respectively, are the entry valid bit, high write bit, low write bit, high data, and low data.

Dependency checking on the Lin buffer 3807 can be based on the signal sent by the context on the left when it has received Set_Valid signals from all of its sources (i.e., sources which have not signaled Input_Done). This sets the Lvin state. If Lvin is not set for a context, and the SIMD instruction attempts to access left-side context, the node (i.e., 808-*i*) stalls until the Lvin state is set. The Lvin state is ignored if there is no left-side context access. Also, as will be discussed below, there is a system-level protocol that prevents anti-dependencies on Lin data, so there is almost no situation where the context on the left will attempt to overwrite Lin data before it has been used.

The Llc write buffer stores local data from the context on the left, to wait for available RAM cycles. The format and use of an Llc buffer entry is similar to the Lin buffer entry and can be a hardware-only structure. Some differences with the Lin buffer are that there are multiple entries—six instead of one—and the context offset field, in addition to specifying the offset for writing the left-side RAM, is used also to detect hits on entries in the buffer and forward from the buffer if desired. This bypasses the left-side context RAM, so that the data can be used with virtually no delay.

As described above, Llc data is updated in the left-side context RAMs in advance of a task switch to compute Rlc data using—or to ensure that Llc data is used in—the context on the right. Llc data can be used immediately by the node on the right, though the nodes are not necessarily executing a synchronous instruction sequence. In almost all cases, these nodes are physically adjacent: within a partition, this is true by definition; between partitions, this can be guaranteed by node allocation with the system programming tool 718. In these cases, data is copied into the Llc write buffers feeding the left-side context RAMs quickly enough that data can be used without stalls, which can be an important property for performance and correctness of synchronous nodes.

Llc data can be transferred from source to destination contexts in a single cycle, and there is no penalty between update and use. Llc dependency checking can be done concurrently with execution, to properly locate and forward data as described below, and to check for stall conditions. The design goal is to transmit Llc data within one cycle for adjacent contexts, either on the same node or a physically adjacent node.

Forwarding from the Llc write buffer can be performed when the buffer is written with data destined for the current context (that is, a task is executing in the context concurrently with data transfer from the source). Concurrent contexts arise when the last context on one node is sharing data concurrently with the first context on the adjacent node to the right (for example, in FIG. 50, 3306-6 on node 808-*i* can be a concurrent source for 3306-7 on node 808-(*i*+1)). This distinction can be used since dependency checking and forwarding are not correct when data is being written to a context that will be used by a future task, rather than one executing concurrently. For example, in FIG. 50, task 3306-6 on node 808-*i* provides Llc data to task 3306-7 on node 808-(*i*+1) during the execution of task 3306-9 on node 808-(*i*+1), and this should not cause dependency checking or forwarding to task 3306-9.

For a given configuration of context descriptors, the right-context pointer of a source context forms a fixed relationship with its destination context. Thus each destination context has static association with the source, for the duration of the configuration. This static property can be important because, even if the source context is potentially concurrent, the source node can be executing ahead of, synchronously with, behind, or non-concurrently with, the destination context, since different nodes can have private program counters or PCs and private instruction memories. The detection of potential concurrency is based on static context relationships, not actual task states. For example, a task switch can occur into a potentially concurrent context from a non-concurrent one and should be able to perform dependency checking even if the source context has not yet begun execution.

If the source context is not concurrent with the destination, then there is no dependency checking or forwarding in the Llc buffer. An entry is allocated for each write from the source, and the information in the entry used to write the left-side context RAM. The order of writes from the source is generally unimportant with respect to writes into the destination context. These writes simply populate the destination context with data that will be used later, and the source cannot write a given location twice without a context switch that permits the destination to read the value first. For this reason, the Llc buffer can allocate any entries, in any order, for any writes from the source.

Also, regardless of the order in which they were allocated, the buffer can empty any two entries which target non-accessed banks (that is, when there are no left-side context accesses to the banks). Six entries are provided (compared to the single entry for the Lin buffer) because SIMD writes are much more frequent than global data writes. Despite this, there statistically are still many available write cycles, since any two entries can be written in any order to any set of available banks, and since the left-side RAM banks are available more frequently that center RAM banks, because they are free except when the SIMD reads left-side context (in contrast to the center context which is usually accessed on a read). It is very unlikely that the write buffer will encounter an overflow condition, though the hardware does check for this and forces writes if desired. For example, six entries can be specified so that the Llc buffer can be managed as a first-in-first-out (FIFO) of two writes per cycle, over three cycles, if this simplifies the implementation. Another alternative can be to reduce the number of entries and using random allocation and de-allocation.

When the non-concurrent source task suspends, this is signaled to the destination context and sets the Lvlc state in that context. This state indicates that the context should not use the dependency checking mechanism for concurrent contexts. It also is used for anti-dependency checking. The source context cannot again write into the destination context until it has been processed and its task has ended, resetting the Lvlc state. This condition is checked because task pre-emption can re-order execution, so that the source node resumes execution before the destination node has used the Llc data. This is a stall condition that the scheduler attempts to work around by further pre-emption.

Since adjacent nodes (i.e., 808-*i* and 808-(*i*+1)) can use different program counters or PCs and instruction memories and since these adjacent nodes have different dependencies and resource conflicts, a source of Llc data does not necessarily execute synchronously with its destination, even if it is potentially concurrent. Potentially concurrent tasks might or might not execute at the same time, and their relative execution timing changes dynamically, based on system-level scheduling and dependencies. The source task may: 1) have executed and suspended before the destination context executes; 2) be any number of instructions ahead of—or exactly synchronous with—the destination context; 3) be any number of instructions behind the destination context; or 4) execute after the destination context has completed. The latter case occurs when the destination task does not access new Llc context from the source, but instead is supplying Rlc context to a future task and/or using older Llc context.

The Llc dependency checking generally operates correctly regardless of the actual temporal relationship of the source and destination tasks. If the source context executes and suspends before the destination, the Llc buffer effectively operates as described above for non-concurrent tasks, and this situation is detected by the Lvlc state being set when the destination task begins. If the Lvlc state is not set when a concurrent task begins execution, Llc buffer dependency checking should provide correct data (or stall the node) even though the source and destination nodes are not at the same point in execution. This is referred to as real-time Llc dependency checking Real-time Llc dependency checking generally operates in one of two modes of operation, depending on whether or not the source is ahead of the destination. If the source is ahead of the destination (or synchronous with it), source data is valid when the destination accesses it, either from the Llc write buffer or the left-side context RAM. If the destination is ahead of the source, it should stall and wait on source data when it attempts to read data that has not yet been provided by the source. It cannot stall on just any Llc access, because this might be an access for data that was provided by some previous task, in which case it is valid in the left-side RAM and will not be written by the source. Dependency checking should be precise, to provide correct data and also prevent a deadlock stall waiting for data that will never arrive, or to avoid stalling a potentially large number of cycles until the source task completes and sets the Lvlc state, which releases the stall, but very inefficiently.

To understand how real-time dependencies are resolved, note that, though the source and destination contexts can be offset in time, the contexts are executing the same instruction sequence and generating the same SIMD data memory write sequence. To some degree, the temporal relationship does not matter because there is a lot of information available to the destination about what the source will do, even if the source is behind: 1) writes appear at the same relative locations in the instruction sequence; 2) write offsets are identical for corresponding writes; and 3) a write to a dependent Llc location can occur once within the task.

For real-time dependency checking, the temporal relationship of the source and destination is determined by a relative count of the number of active write cycles—that is, cycles in which one or more writes occur (the number of writes per cycle is generally unimportant). For example, there can be two, 16-bit counters in each node (i.e., 808-*i*), associated with Llc dependency checking. One counter, the source write count, is incremented for an active write cycle received from a source context, regardless of the source or destination contexts. When a source task completes, the counter is reset to 0, and begins counting again when the next source task begins. The second counter, the destination write counter, is incremented for an active write cycle in the destination context, but when the source task has not completed when the destination task is executing (determined by the Lvlc state). These counters, along with other information, determine the temporal relationship of source and destination and how dependency checking is accomplished.

When a destination task begins and Lvlc state is not set, this indicates that the source task has not completed (and may not have begun). The destination task can execute as long as it does not depend on source data that has not been provided, and it should stall if it is actually dependent on the source. Furthermore, this dependency checking should operate correctly even in extreme cases such as when the source has not begun execution when the destination does, but does start at a later point in time and then moves ahead of the destination. The destination generally checks the following conditions:

(1) whether or not the source is active;
(2) whether or not the source is ahead; and
(3) whether a read of Llc context depends on data yet to be written by a source that is behind.

It is relatively easy for the destination to detect that the source is active, because the contexts have a fixed relationship. The source context can signal when it is in execution, because its context descriptor is currently active. If the source is active, whether or not it is ahead is determined by the relationship of the source and destination write counters. If the source counter is greater than the destination counter, the source is ahead. If the source counter is less than the destination counter, it is behind. If the source counter is equal to the destination counter, the source and destination contexts are executing synchronously (at least temporarily). If a destination context is behind or synchronous with the source context, then it accesses valid data either from the left-side RAM or the Llc write buffer. If the destination context is ahead of the source context, it should keep track of future source context writes and stall on an Llc access to a location that hasn't been written yet. This is accomplished by writing into the left-side RAM (the value is unimportant), and resetting a valid bit in the written location. Because dependent writes are unique, any number of locations can be written in this way to indicate true dependencies, and there are no output dependencies (i.e. there are no multiple writes to be ordered for destination reads).

So Llc real-time dependency checking generally operates as follows:

When a concurrent destination begins execution, and the Lvlc state is not set, the destination enables the destination write counter to count active destination write cycles.

If the source context is active, and the source write count is greater than or equal to the destination write count, the destination accesses data either from the left-side RAM or the Llc write buffer (if there is a hit on a valid entry).

If the source context is not active, or the source write count is less than the destination write count, the destination writes into the left-side RAM and resets valid bits in written locations.

If the destination attempts to access Llc context, and the valid bit is reset, a stall occurs unless the source write counter is equal to or greater than the destination write counter and the read hits in a valid write-buffer entry.

When the left-side RAM is written from the Llc write buffer, the write sets the valid bit in the location.

If the source completes before the destination, the Lvlc state is set. The destination write counter is reset to 0, and the destination resumes operation as for a non-concurrent task.

If the destination completes before the source, the destination write counter is reset to 0, and it is available for the next destination context if desired. The source will eventually write into the just-suspended context and set valid bits for later access.

5.5.1.3. Right-Side Local Context Management

As described above, Rlc data is provided by task sequencing. There will usually be a task switch between the write and the read, and, in most cases, the next task will not desire this Rlc data, because task scheduling prefers tasks that generate both Llc data and Rlc data, rather than a previous task that uses Rlc data.

Rlc dependencies cannot generally be checked in real time because the source and destination tasks do not execute the same instructions (the code is sequential, not concurrent), and this is a key property enabling real-time dependency checking for Llc data. It is required that the source task has suspended, setting the Rvlc state, before the destination task can access right-side context (it stalls on an attempted access of this context if Rvlc is reset). This can stall a task unnecessarily, because it does not detect that the read is actually dependent on a recent write, but there is no way to detect this condition. This is one reason for providing task pre-emption, so that the SIMD can be used efficiently even though tasks are not allowed to execute until it is known that all right-side source data should have been written. When the destination tasks suspends, it resets the Rvlc state, so it should be set again by the source after it provides a new set of Rlc context. There are write buffers for Rin and Rlc data, to avoid contention for RAM banks on the right-side context RAM. These buffers have the same entry format and size as the Lin and Llc write buffers. However, the Rlc write buffer is not used for forwarding as the Llc write buffer is.

5.5.2. Global Context Management

Global context management relates to node input and output at the system level. It generally ensures that data transfer into and out of nodes is overlapped as much as possible with execution, ideally completely overlapped so there are no cycles spent waiting on data input or stalled for data output. A feature of processing cluster 1400 is that no cycles are spent, in the critical path of computation, to perform loads or stores, or related synchronization or communication. This can be important, for example, for pixel processing, which is characterized by very short programs (a few hundred instructions) having a very large amount of data interaction both between nodes whose contexts relate through horizontal groups, and between nodes that communicate with each other for various stages of the processing chain. In nodes (i.e., 808-*i*), loads and stores are performed in parallel with SIMD operations, and the cycles do not appear in series with pixel operations. Furthermore, global-context management operates so that these loads and stores also imply that the data is globally coherent, without any cycles taken for synchronization and communication. Coherency handles both true and anti-dependencies, so that valid data is usually used correctly and retained until it is no longer desired.

5.5.2.1. Context-Coherency Protocols

In general, input data is provided by a system peripheral or memory, flows into node contexts, is processed by the contexts, possibly including dataflow between nodes and hardware accelerators, and results are output to system peripherals and memory. Contexts can have multiple inputs sources, and can output to multiple destinations, either independently to different destinations or multi-casting the same data to multiple destinations. Since there are possibly many contexts on many nodes, some contexts are normally receiving inputs, while other contexts are executing and producing results. There is a large amount of potential overlap of these operations, and very likely that node computing resources can approach full utilization, because nodes execute on one set of contexts at a time out of the many contexts available. The system-coherency protocols guarantee correct operation at all times. Even though hardware can be kept fully busy in steady state, this cannot always be guaranteed, especially during startup phases or transitions between different use-cases or system configurations.

Data into and out of the processing cluster 1400 is under control of the GLS unit 1408, which generates read accesses from the system into the node contexts, and writes context output data to the system. These accesses are ultimately determined by a program (from a hosted environment) whose data types reflect system and data which is compiled onto the GLS processor 5402 (described in detail below). The program copies system variables into node program-input variables, and invokes the node program by asserting Set_Valid. The node program computes using input and retained private variables, producing output which writes to other processing cluster 1400 contexts and/or to the system. The programs are structured so that they can be compiled in a cross-hosted development (i.e., C++) environment, and create correct results when executed sequentially. When the target is the processing cluster 1400, these programs are compiled as separate GLS processor 5402 (described below) and node programs, and executed in parallel, with fine-grained multi-tasking to achieve the most efficient use of resources and to provide the maximum overlap between input/output and computation.

Because context-input data is contained in program variables, the input is fully general, representing any data types with any layout in data memory. The GLS processor 5402 program marks the point at which the code performs the last output to the node program. This in turn marks the final transfer into the node with a Set_Valid signal (either scalar data to node processor data memory, vector data to SIMD data memory, or both). Output is conditional on program flow, so different iterations of the GLS processor 5402 program can output different combinations of vector and scalar data, to different combinations of variables and types.

The context descriptor indicates the number of input sources, from one to four sources. There is usually one Set_Valid for every unique input—scalar and/or vector input from each source. The context should receive an expected number of Set_Valid signals from each source before the program can begin execution. The maximum number of Set_Valid signals can (for example) be eight, representing both scalar and vector from four sources. The minimum number of Set_Valid signals can (for example) be zero, indicating that no new input is expected for the next program invocation.

Set_Valid signals can (for example) be recorded using a two-bit valid-input flag, ValFlag, for each source: the MSB of this flag is set to indicate that a vector Set_Valid is expected from the source, and the LSB is set to indicate that scalar Set_Valid is expected. When a context is enabled to receive input (described below), valid-flag bits are set according to the number of source: one pair if set if there is one source, two pairs if there are two source, and so on, indicating the maximal dependency on each source. Before input is received from a source, that source sends a Source Notification message (described below) indicating that the source is ready to provide data, and indicating whether its type is scalar, vector, both, or none (for the current input set): the type is determined by the DataType field in the source's destination descriptor, and updates the ValFlag field from its initial value (the initial value is set to record a dependency before the nature of the dependency is known). As Set_Valid signals are received from a source (synchronous with data), the corresponding ValFlag bits are reset. The receipt of all Set_Valid signals is indicated by all ValFlag bits being zero.

Figure 52:
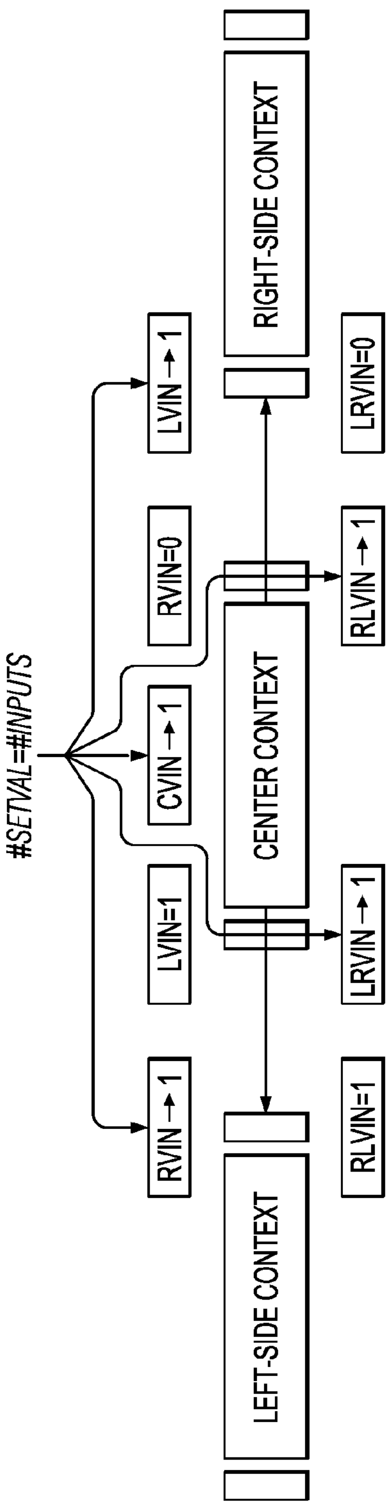
FIGS. 52 to 64 are diagrams of examples of a dataflow protocol.

When the desired number of Set_Valid signals has been received, the context can set Cvin and also can use side-context pointers to set Rvin and Lvin of the contexts shared to the left and right (FIG. 52, which shows typical states). When the context sets Rvin and Lvin of side contexts, it can also set its local copies of these bits, LRvin and RLvin. Note that this normally does not enable the context for execution because it should have its own Lvin and Rvin bits set to begin execution. Since inputs are normally provided left-to-right, input to the local context normally enables execution in the left-side context (by setting its Rvin). Execution in the local context is generally enabled by input to the right-side context (setting the local context's Rvin—Lvin is already set by input to the left-side context). Normally the Set_Valid signals are received well in advance of execution, overlapped with other activity on the node. Hardware attempts to schedule tasks to accomplish this.

A similar process for transfer of input data from GLS unit 1408 can be used for input from other nodes. Nodes output data using an instruction which transfers data to the Global Output buffer. This instruction indicates which of the destination-descriptor entries is to be used to specify the destination of the data. Based on a compiler-generated flag in the instruction which performs the final output, the node signals Set_Valid with this output. The compiler can detect which variables represent output, and also can determine at what point in the program there is no more output to a given destination. The destination does not generally distinguish between data sent by the GLS UNIT 1408 and data sent by another node; both are treated the same, and affect the count of inputs in the same way. If a program has multiple outputs to multiple destinations, the compiler 706 marks the final output data for each output in the same way, both scalar and vector output as applicable.

Because of conditional program flow, it is possible that the initial Source Notification message indicates expected data that is not generally provided, because the data is output under program conditions that are not satisfied. In this case, the source signals Input_Done in a scalar data transfer, indicating that all input has been provided from the source despite the initial notification: the data in this transfer is not valid, and is not written into data memory. The Input_Done signal resets both ValFlag bits, indicating valid data from the corresponding source. In this case, data that was previously provided is used instead of new input data.

The compiler 706 marks the final output depending on the program flow-control that generates the output to a given destination. If the output does not depend on flow-control, there is no Input_Done signal, since the Set_Valid is usually signaled with the final data transfer. If the output does depend on flow-control, Input_Done follows the last output in the union of all paths that perform output, of either scalar or vector data. This uses an encoding of the instruction that normally outputs scalar data, but the accompanying data is not valid. The use of this encoding can be to signal to the destination that there is no more current output from the source.

As mentioned previously, context input data can be of any type, in any location, and accessed randomly by the node program. The point at which the hardware, without assistance, can detect that input data is no longer desired is when the program ends (all tasks have executed in the context). However, most programs generally read input data relatively early in execution, so that waiting until the program ends makes it likely that there are a significant number of cycles that could be used for input which go unused instead.

This inefficiency can be avoided using a compiler-generated flag, Release_Input, to indicate the point in the program where input data is no longer desired. This is similar in concept to the detection of the Set_Valid point, except that it is based on compiler recognizing at what point in the code input variables will not generally be accessed again. This is the earliest point at which new inputs can be accepted, maximizing potential overlap of data transfer and computation.

Figure 53:
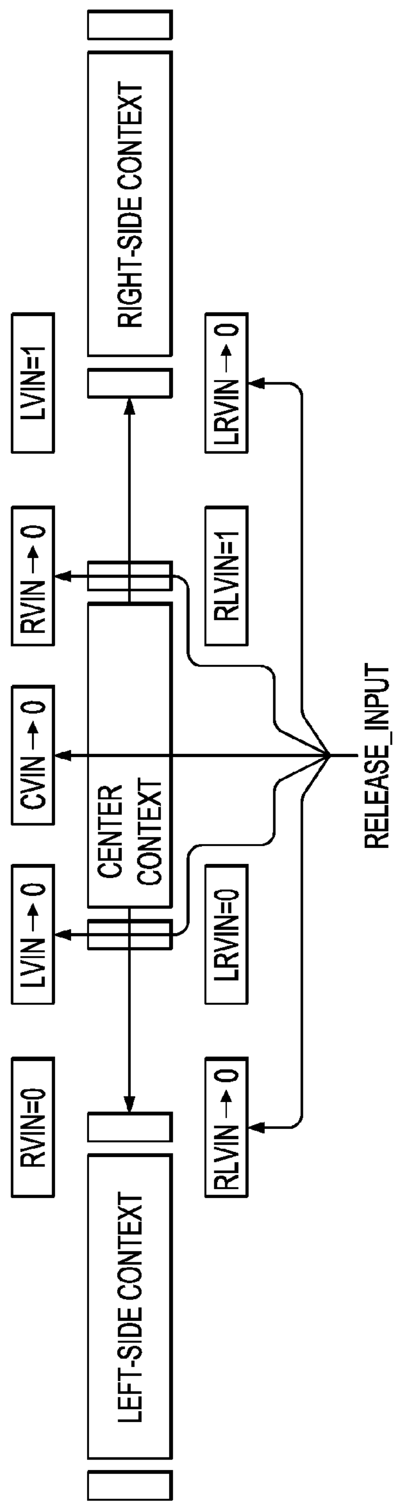

The Release_Input flag resets the Cvin, Lvin, and Rvin of the local context (FIG. 53 which shows typical states). When the context resets Lvin and Rvin, it also resets the copies of these bits, RLvin and LRvin, in the left-side and right-side contexts. Note that this normally doesn't enable the context to receive input, because inputs should be released in all three contexts (left, center, and right) before it can be overwritten by data received as Cin data to the local context. Since execution is normally left-to-right, a Release_Input in the local context normally enables input to the left-side context (by resetting its RLvin). Input to the local context is enabled by a Release_Input in the right-side context (resetting the local context's RLvin—LRvin is already reset by a Release_Input in the left-side context). The local copies of valid-input bits (LRvin and RLvin) are provided to simplify the implementation, so that decisions to enable input can be based entirely on local state (Cvin=LRvin=RLvin=0), instead of having to "fetch" state from other contexts. Input is enabled by setting the Input Enabled (InEn) bit.

Once a context receives all required Set_Valid signals indicating that all input data is valid, it cannot receive any more input data until the program indicates that input data is no longer desired. It is undesirable to stall the source node using in-band handshaking signals during an unwanted transfer, since this would tie up global interconnect resources for an extended period of time—potentially with hundreds of rejected transfers before an accepted one. Considering the number of source and destination contexts that can be in this situation, it is very likely that global interconnect 814 would be consumed by repeated attempts to transfer, with a large, undesired use of global resources and power consumption.

Instead, processing cluster 1400 implements a dataflow protocol that uses out-of-band messages to send permissions to source contexts, based on the availability of destination contexts to receive inputs. This protocol also enables ordering of data to and from threads, which includes transfers to and from system memory, peripherals, hardware accelerators, and threaded node contexts—the term thread is used to indicate that the dataflow should have sequential ordering. The protocol also enables discovery of source-destination pairs, because it is possible for these to change dynamically. For example, a fetch sequence from system memory by the GLS unit 1408 is distributed to a horizontal group of contexts, though neither the program for the GLS processor (discussed below) nor the GLS unit 1408 has any knowledge of the destination context configuration. The context configuration is reflected in distributed context descriptors, programmed by Tsys based on memory-allocation requirements. This configuration can vary from one use-case to another even for the same set of programs.

For node contexts, source and destination associations are formed by the sources' destination descriptors, indicating for each center-context pointer where that output is to be sent. For example, the left-most source context is configured to send to a left-most destination context (it can be either on the same node or another). This abstracts input/output from the context configurations, and distributes the implementation, so there is no centralized point of control for dependencies and dataflow, which would likely be a bottleneck limiting scalability and throughput.

Figure 54:
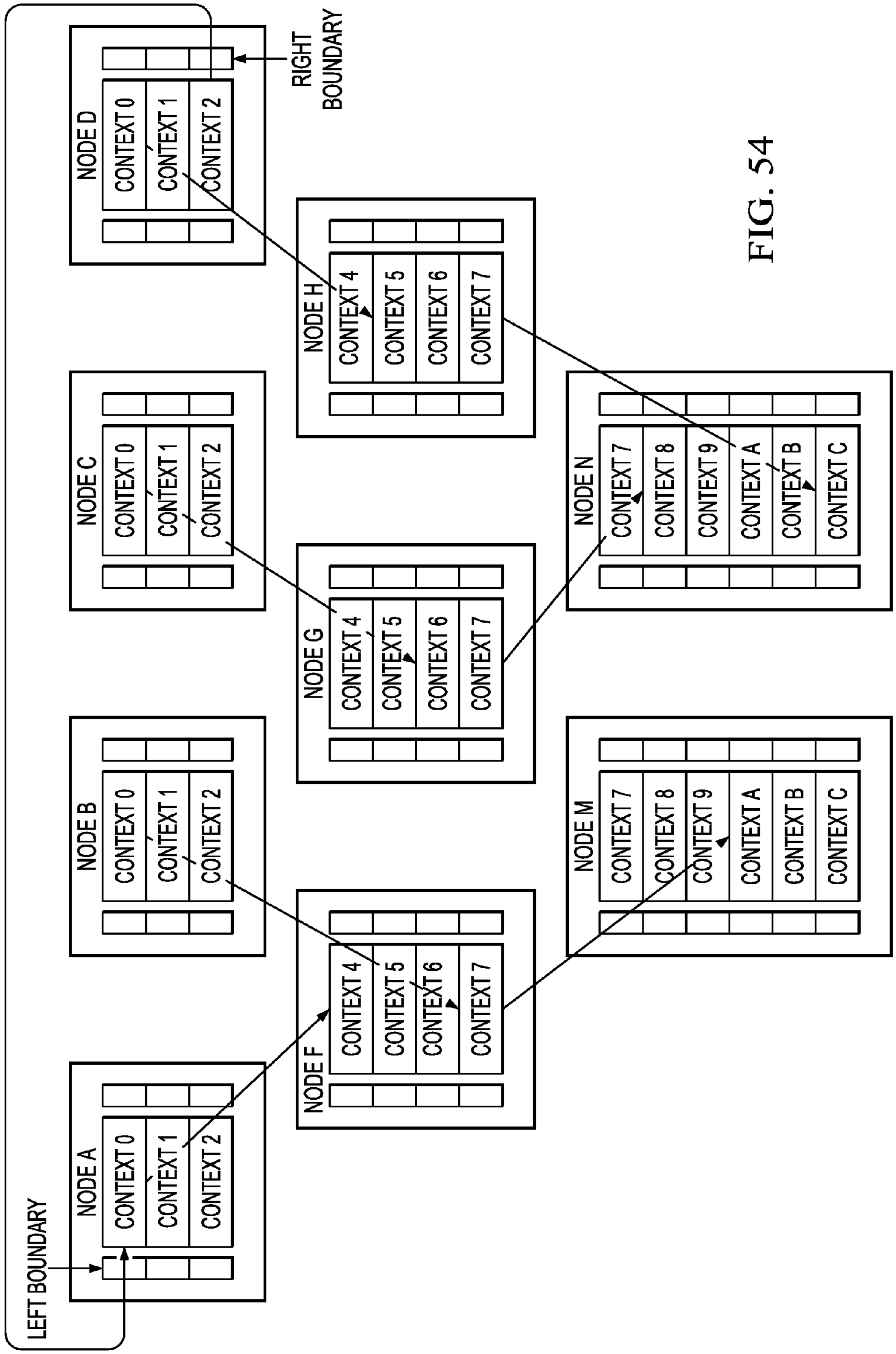

In FIG. 54, an example of how center contexts are associated regardless of organization can be seen. Here, Here, four nodes (labeled node 808-*a* through node 808-*d*), with three contexts each, output to three nodes (labeled node 808-*f* through node 808-*h*), with four contexts each. These contexts in turn output to two nodes (labeled node 808-*m* through node 808-*n*), with six contexts each.

Image context (for example) generally cannot be retained and re-used in a frame unless there is an equivalent number of node contexts at all stages of processing. There is a one-to-one relationship between the width of the frame and the width of the contexts, and data cannot be retained for re-use unless this relationship is preserved. For this reason, the figure shows all node groups implementing twelve contexts. Since the number of contexts is constant, the association of contexts is fixed for the duration of the configuration.

FIG. 54 illustrates that, even though the number of contexts is a constant, there can be a complex relationship within the configuration. In this example, nodes 808-*a* to 808-*d*, contexts 0, output to contexts 4 and 7 on node f, context 6 on node 808-*g*, and context 5 on node 808-*h*. Also, nodes 808-*f* to 808-*h*, context 7, output to node 808-*m*, context A, and node 808-*n*, contexts 8 and C. The figure omits a very large number of these associations, for clarity, but it should be understood that, for example, nodes 808-*a* to 808-*d* contexts 1 output to nodes 808-*g* to 808-*h*, to the contexts following those that receive input from contexts 0. These output associations are implied by the associations formed by side-context pointers, and the system programming tool 718 generally ensures that adjacent source contexts output to adjacent destination contexts. Right-boundary contexts contain right-context pointers looping back to the associated left-boundary contexts, as shown between node 808-*d*, context 2, and node 808-*a*, context 0. This is not required or used for data sharing, but instead provides a mechanism to order context outputs when required.

Figure 55:
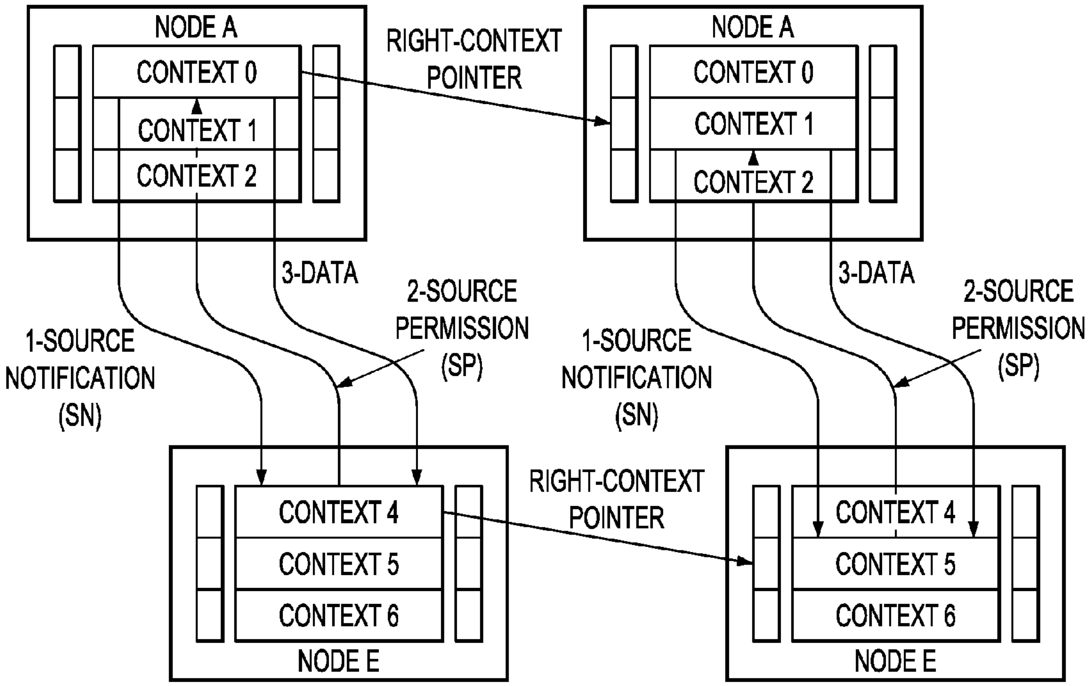

The dataflow protocol operates by source and destination contexts exchanging messages in advance of actual data transfer. FIG. 55 illustrates the operation of the dataflow protocol for node-to-node transfers. After initialization, transfers are assumed to be enabled, and the first set of outputs from sources to destinations can occur without any prior enabling. However, once a Set_Valid has been sent from a source context, the context cannot send subsequent data until the destination contexts have released input (LRvin, Cvin, RLvin reset), referred to as input enabled (InEn=1). This is signaled by exchanging messages as shown in FIG. 55. Additionally, FIG. 55 shows the operation of the dataflow protocol on a partial set of source and destination contexts. Message transfers and the data transfers are shown by the arcs, where both message and data transfers are uni-directional. The arrows indicate right-context pointers (not relevant here but important for later discussion). The sequence of the dataflow protocol in this example is as follows.

The center-context pointer for node 808-*a*, context 0, points to node 808-*e*, context 4, and the center-context pointer for node a (the same node, though shown separately), context 1, points to node 808-*e* (also the same destination node shown separately), context 5. When each context is ready to begin execution, its pointer is used to send a Source Notification (SN) message to the destination context, indicating that the source is ready to transmit data.

Nodes become ready to execute independently, and there is no guaranteed order to these messages. The SN message is addressed to the destination context using its Segment_ID-.Node_ID and context number, collectively called the destination identifier (ID). The message also contains the same information for the source context, called the source identifier (ID). When the destination context is ready to accept data, it replies with a Source Permission (SP) message, enabling the source context to generate outputs. The source context also updates the destination descriptor with the destination ID received in the SP message: there are cases, described later, where the SP is received from a context different than the one to which the SN was sent, and in this case the SP is received from the actual intended destination.

Once the source output is set valid, the source context can no longer transmit data to the destination (note that normally the node does not stall, but instead executes other tasks and/or programs in other contexts). When the source context becomes ready to execute again, it sends a second SN message to the destination context. The destination context responds to the SN message with an SP message when InEn is set. This enables the source context to send data, up to the point of the next Set_Valid, at which point the protocol should be used again for every set of data transfers, up to the point of program termination in the source context.

A context can output to several destinations and also receive data from multiple sources. The dataflow protocol is used for every combination of source-destination pairs. Sources originate SN messages for every destination, based on destination IDs in the context descriptor. Destinations can receive multiples of these messages and should respond to every one with an SP message to enable input. The SN message contains a destination tag field (Dst_Tag) identifying the corresponding destination descriptor: for example, a context with three outputs has three values for the Dst_Tag field, numbered 0-2, corresponding to the first, second, and third destination descriptors. The SP uses this field to indicate to the source which of its destinations is being enabled by the message. The SN message also contains a source tag field (Src_Tag) to uniquely identify the source to the destination. This enables the destination to maintain state information for each source.

Both the Src_Tag and the Dst_Tag fields should be assigned sequential values, starting with 0. This maintains a correspondence between the range of these values and fields that specify the number of sources and/or destinations. For example, if a context has three sources, it can be inferred that the Src_Tag values have the values 0-2.

Figure 56:
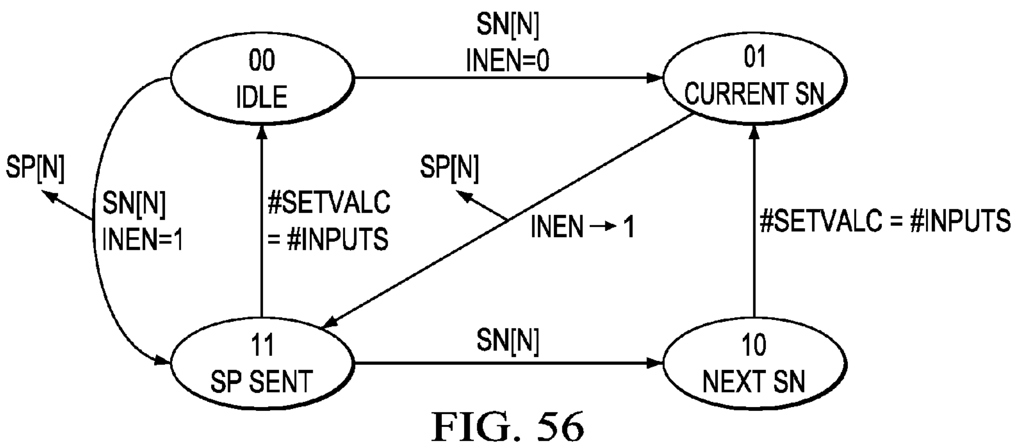

Destinations can maintain source state for each source, because source SN messages and input data are not synchronized among sources. In the extreme, a source can send an SN, the destination can respond with an SP message, and the source provide input, up to the point of Set_Valid, before any other source has sent even an SN message (this is not common, but cannot be prevented). Under these conditions, the source can provide a second SN message for a subsequent input, and this should be distinguished from SN messages that will be received for current input. This is accomplished by keeping two bits of state information for each source, as shown in FIG. 56. Here, SN[n] indicates a Source Notification for Src_Tag=n (the tag for the source at the destination), and SP[n] indicates the corresponding Source Permission to that source. From the idle state (00'b), an SN results in an immediate SP if InEn=1, and the state transitions to 11'b; if InEn=0, the SN is recorded, and the state transitions to 01'b. When InEn is set in the state 01'b, an SP is sent for the recorded SN, and the state transitions to 11'b. In the state 11'b, there are two possibilities:

- The context receives all Set_Valid signals, and is set valid. This places the state back into the idle state until a subsequent SN is received for the Src_Tag.
- The context receives a second SN before it is set valid. The context records this SN and transitions to the state 10'b, indicating that the recorded SN is for a subsequent input. From this state, when the context is set valid, the state transitions to 01'b, indicating that there is a permission to be sent for the recorded SN message when InEn is set.

As a result of the dataflow protocol, contexts can output data in any order, there is no timing relationship between them, and transfers are known to be successful ahead of time. There are no stalls or retransmissions on interconnect. A single exchange of dataflow message enables all transfers from source to destination, over the entire span of execution in the context, so the frequency of these messages is very low compared to the amount of data-exchange that is enabled. Since there is no retransmission, the interconnect is occupied for the minimum duration required to transfer data. It is especially important not to occupy the interconnect for exchanges that are rejected because the receiving context is not ready—this would quickly saturate the available bandwidth. Also, because data transfers between contexts have no particular ordering with other contexts, and because the nodes provide a larger amount of buffering in the global input and global output buffers, it is possible to operate the interconnect at very high utilization without stalling the nodes. Because it enables execution to be dataflow-driven, the dataflow protocol tends to distribute data traffic evenly at the processing cluster 1400 level. This is because, in steady state, transfers between nodes tend to throttle to the level of input data from the system, meaning that interconnect traffic will relate to the relatively small portion of the image data received from the system at any given time. This is an additional benefit permitting efficient utilization of the interconnect.

Data transfer between node contexts has no ordering with respect to transfers between other contexts. From a conceptual, programming standpoint: 1) input variables of a program are set to their correct values before a program is invoked; 2) both the writer and the reader are sequential programs; and 3) the read order does not matter with respect to the write order. In the system, inputs to different contexts are distributed in time, but the Set_Valid signal achieves functionality that is logically equivalent to the programming view of a procedure call invoking the destination program. Data is sent as a set of random accesses to destinations, similar to writing function input parameters, and the Set_Valid signal marks the point at which the program would have been "called" in a sequential order of execution.

The out-of-order nature of data transfer between nodes cannot be maintained for data involving transfers to and from system memory, peripherals, hardware accelerators, and threaded node (standalone) contexts. Outside of the processing cluster 1400, data transfers are normally highly ordered, for example tied to a sequential address sequence that writes a memory buffer or outputs to a display. Within the processing cluster 1400, data transfer can be ordered to accommodate a mismatch between node context organizations. For example, ordering provides a means for data movement between horizontal groups and single, standalone contexts or hardware accelerators.

It can be difficult and costly to reconstruct the ordering expected and supplied by system devices using the dataflow mechanisms that transfer data out-of-order between nodes, because this could require a very large amount of buffering to re-order data (roughly the number of contexts times the amount of input and output data per context). Instead, it is much simpler to use the dataflow protocol to keep node input/output in order when communicating with these devices. This reduces complexity and hardware requirements.

To understand how ordering can be imposed, consider context outputs that are being sent to a hardware accelerator. The accelerator wrapper that interfaces the processing cluster 1400 to hardware accelerators can be designed specifically to adapt to that set of accelerators, to permit re-use of existing hardware. Accelerators often operate sequentially on a small amount of context, very different than nodes operating in parallel on large contexts. For node-to-node transfers, exchanges of dataflow messages set up context associations and impose flow control to satisfy dependencies for entire programs in all contexts. For an accelerator, the flow control should be on a per-context, per-node basis so that the accelerator can operate on data in the expected order.

The term thread is used to describe ordered data transfer to and from system memory 1416, peripherals, hardware accelerators, and standalone node contexts, referring to the sequential nature of the transfer. Horizontal groups contain information related to the ordering required by threads, because contexts are ordered through right-context pointers from the left boundary to the right boundary. However, this information is distributed among the contexts and is not available in one particular location. As a result, contexts should transmit information through the right-context pointers, in co-operation with the dataflow protocol, to impose the proper ordering.

Data received from a thread into a horizontal group of contexts is written starting at the left boundary. Conceptually, data is written into this context before transfers occur to the next context on its right (in reality, these can occur in parallel and still retain the ordering information). That context, in turn, receives data from the thread before transfers occur to the context on its right. This continues up to the right boundary, at which point the thread is notified to sequence back to the left boundary for subsequent input.

Analogously, data output from a horizontal group of contexts to a thread begins at the left boundary. Conceptually, data is sent from this context before output occurs from the context on its right (though, again, in reality these can occur in parallel). That context, in turn, sends data to the thread before transfers occur from the context on its right. This continues up to the right boundary, at which point the output sequences back to the left boundary for subsequent output.

Figure 57:
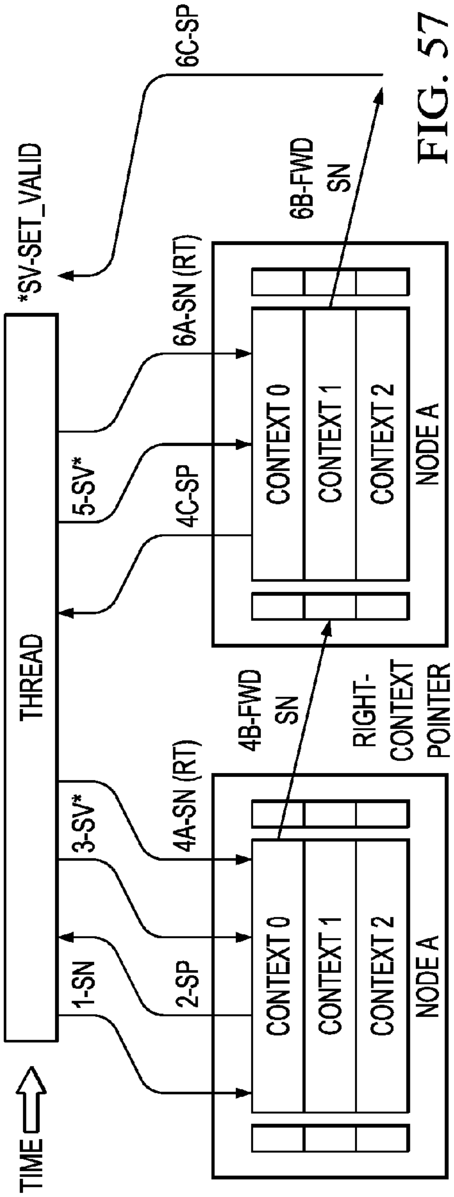

FIG. 57 shows how the dataflow protocol, along with local side-context communication using right-context pointers, is used to order context inputs from a thread to a destination that is otherwise unordered. The thread has an associated destination descriptor, but there is a single descriptor entry to provide access to all destination contexts. The organization of destination contexts is abstracted from the thread—it should be able to provide data correctly regardless of the number and location of contexts in a horizontal group. The thread is initialized to input to the left-boundary context, and the dataflow protocol permits it to "discover" the order and location of other contexts using information provided by those contexts.

When the thread is ready to provide input data, it sends an SN message to the left-boundary context (which is identified by a static entry in its destination descriptor). This SN indicates that the source is a thread (setting a bit in the message, Th=1). The SN message normally enables the destination context to indicate that it is ready for input, but a node context is ready by definition after initialization. In response to the SN message, the destination sends an SP message to the thread. This enables output to the context, and also provides the destination ID for this data (in general, the data is transferred to a context other than the one that receives the original SN message, as described below, though at start-up both the message and the data are sent to the left-boundary context). The thread records the destination ID in the destination descriptor, and uses this for transmitting data.

When the thread is ready to transmit data to the next ordered context, it sends a second SN to the left-boundary context (this occurs, at the latest, after the Set_Valid point, as shown in the figure, but can occur earlier as described below). This message has a bit set (Rt), indicating that the receiving context should forward the SN message to the next ordered context. This is accomplished by the receiving context notifying the context given by the right-context pointer that this context is going to receive data from a thread, including the thread source ID (segment, node, and thread IDs) and Src_Tag. This uses local interconnect, using the same path to the right-side context that is used to transmit side-context data.

The context to the right of the left boundary responds to this notification by sending its own SP to the thread, containing its own destination ID. This information, and the fact that the permission has been received, is stored in the thread's destination descriptor, replacing the destination ID of the left-boundary context (which is now either unused or stored in a private data buffer).

For read threads that access the system, the forwarded SN message can be transmitted before the Set_Valid point, in order to overlap system transfers and mitigate the effects of system latency (node thread sources cannot overlap because they execute sequential programs). If sufficient local buffering is available and system accesses are independent (e.g. no de-interleaving is required), the thread can initiate a transfer to the next context using the forwarded SP message, up to the point of having all reads pending for all contexts. The thread sends a number of SN messages to the sequence of destination contexts, depending on buffer availability. When all input to a context is complete, with Set_Valid, buffers are freed, and the transfer for the next destination ID can begin using the available buffers.

This process repeats up to the right-boundary context. The SP message contains a bit to indicate that the responding context is at the right boundary (Rt=1), and this indicates to the read thread the location of the boundary. At this point, the thread normally increments to the next vertical scan-line (a constant offset given by the width of the image frame, and independent of the context organization). It then repeats the protocol starting with an SN message, except in this case the SP messages are used to indicate that the destination contexts (center and side) are ready to receive data, in addition to notifying the thread of the context order. If a context receives a forwarded SN message and is not enabled for input, it records the SN message, and responds when it is ready.

When the thread is ready to transmit data for the next line, it repeats the protocol starting with an SN message, except in this case the SN message is sent to the right-boundary context with Rt=1. This is forwarded to the left-boundary context. Even though the right-boundary context does not provide side-context data to the left-boundary context, its right-context pointer points back to the left-boundary context, so that the thread can use an SN message to the right-boundary context to enable forwarding back to the left boundary.

Node thread contexts should have two destination descriptors for any given set of destination contexts. The first of these contains destination ID the left-boundary context, and doesn't change during operation. The second contains the destination ID for the current output, and is updated during operation according to information received in SP messages. Since a node has four destination descriptors, this allows usually two outputs for thread contexts. The left-boundary destination IDs are contained in the first two words, and the destination IDs for the current output are in the second two words. A Dst_Tag value of 0 selects the first and third words, and a Dst_Tag value of 1 selects the second and fourth words.

Figure 58:
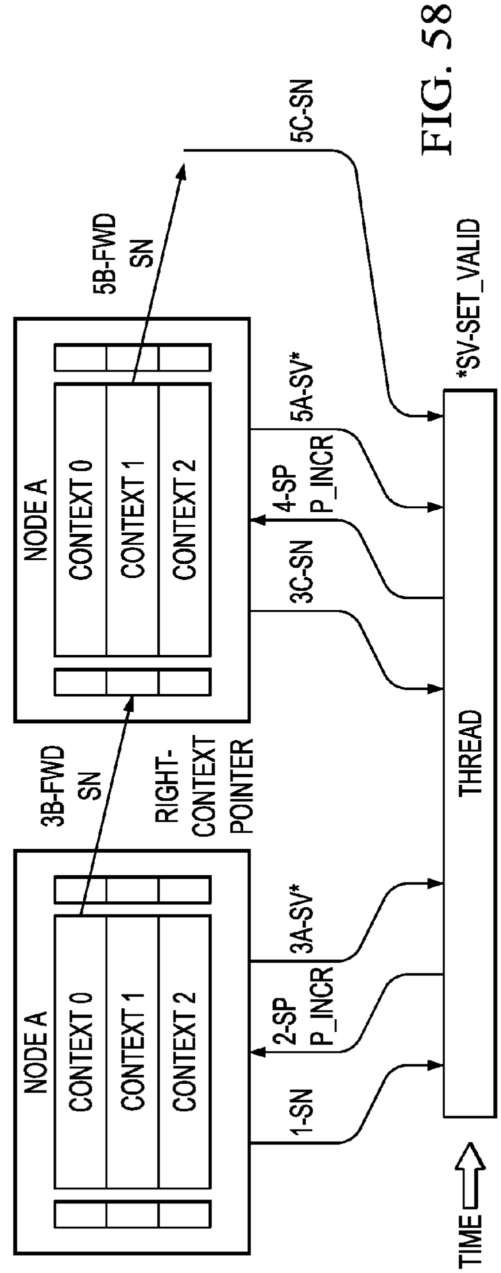

FIG. 58 shows how the dataflow protocol, along with local side-context communication using right-context pointers, is used to order context outputs to a thread. When the left-boundary context is ready to begin execution, it sends an SN message to the thread. When the thread is ready to receive the data (based either on completing earlier processing or allocating a buffer for the new input), the thread responds with an SP message. The SP message has a form of control beyond simply enabling output from the source: there is a 4-bit field to indicate how many data transfers are enabled (permission increment, or P_Incr). This limits the number of outputs from the context to the thread, up to the number specified by P_Incr. The ability to limit output using P_Incr permits the thread to enable input even if it does not have sufficient buffering for all input data that might be received. A value of 0001'b for P_Incr enables one input, a value of 0010'b enables two inputs, and so on—except that a value of 1111'b enables an unlimited number of inputs (this is useful for node threads, which are guaranteed to have sufficient DMEM allocated for input data). The source decrements the permitted count for every output (except when P_Incr=1111'b), and disables output when the count reaches 0. The thread can enable additional input at any time by sending another SP message: the P_Incr value provided by this SP message adds to the current number of permitted outputs at the source.

When the source outputs the final data, with Set_Valid, if forwards the SN message to the context given by the right-context pointer, indicating that the context should send an SN message to the thread, including the thread's destination ID and Dst_Tag (these are used to update destination descriptor, because a previous value may be stale). This uses local interconnect, using the same path to the right-side context that is used to transmit side-context data. This context then sends an SN message to the thread when it is ready to output, with its own source ID, and the thread responds with an SP message when it is ready. As with all SP message responses, this contains a destination ID that the source places in its destination descriptor—the responding destination can be different than the one the original SN message is sent to (destinations can be re-routed). This SP message enables output from the source, also including a P_Incr value.

When the context at the right boundary sends an SN message to the thread, it indicates that the source context is at a right boundary (the Rt bit is set). This can cause the thread to sequence to the next scan-line, for example. Furthermore, the right-context pointer of the right-boundary context points back to the left-boundary context. This is not used for side-context data transfer, but instead permits the right-boundary context to forward the SN message for the thread to the left-boundary context.

Unlike thread sources, which can enable multiple contexts to receive data to mitigate system latency, thread destinations can be enabled for one source at a time. As long as the destination thread has sufficient input bandwidth, it should not affect performance of processing cluster 1400. Threads that output to the system should provide enough buffering to ensure that performance is generally not affected by instantaneous system bandwidth. Buffer availability is communicated using P_Incr, so the buffer can be less than the total transfer size.

If a program attempts to output to a destination that is not enabled for output, it is undesirable to stall, because this could consume execution resources for a long period of time. Instead, there is a special form of task-switch instruction that tests for the output being enabled for a particular Dst_Tag (this is executed on the scalar core and is very unlikely to affect performance). The node processor (i.e., 4322) compiler generates this instruction before any output with the given Dst_Tag, and this causes a task switch if output is not enabled, so that the scheduler can attempt to execute another program. This task switch usually cannot be implemented by hardware-only, because SIMD registers are not preserved across the task boundary, and the compiler should allocate registers accordingly.

The combination of dependencies and ordering restrictions creates a potential deadlock condition that is avoided by special treatment during code generation. When a program attempts to access right-side context, and the data is not valid, there is a task switch so that the context on the right can execute and produce this data. However, one of these contexts can be enabled for output to a thread, normally the one on the left (or neither). If the context on the right attempts output, it cannot make progress because output is not enabled, but the context on the left cannot be enabled to execute until the one on the right produces right-context data and sets Rvlc.

To avoid this, code generation collects all output to a particular destination within the same task interval, the interval with the final output (Set_Valid). This permits the context on the left to forward the SN and enable output for the context on the right, avoiding this deadlock. The context on the right also produces output in the same task interval, so all such side-context deadlock is avoided within the horizontal group.

Note that there are two task-switch instructions involved in this case: the one begins the task interval for the side-context dependency and the one that tests for output being enabled. These usually cannot be the same instruction because the test for output enables is conditional on the output being enabled. The output-enable test and output instructions should be grouped as closely as possible, ideally in sequence. This provides the maximum time for the context on the right to receive the forwarded SN, exchange SN-SP messages with the destination, and enable output before the output-enable test. The round trip from SN to SP is typically 6-10 cycles, so this benefits all but very short task intervals.

Delaying the outputs to occur in the same interval usually does not affect performance, because the final output is the one that enables the destination, and the timing of this instruction is not changed by moving the others (if required) to occur in the same task interval. However, there is a slight cost in memory and register pressure, because output values have to be preserved until the corresponding output instructions can be executed, except when the instructions already naturally occur in the same interval.

Figure 59:
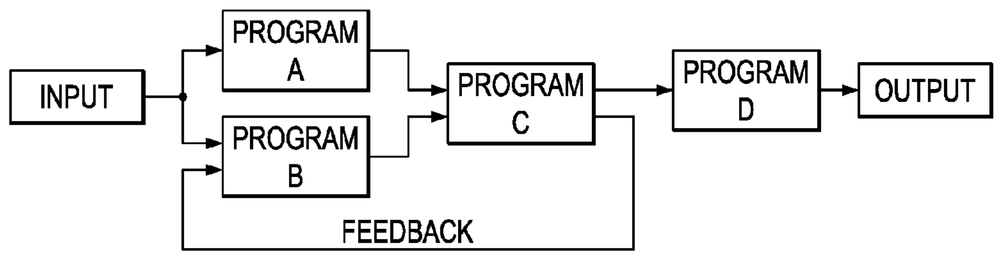

Dataflow in processing cluster 1400 programs can initiated at system inputs and terminates at system outputs. There can be any number of programs, in any number of contexts, operating between the system input and output: the relative delay of a program output from system inputs is given by the OutputDelay field in the context descriptor(s) for that program (this field is set by the system programming tool 718). In addition to feed-forward dataflow paths from system input to output, there can also be feedback paths from a program to another program that precedes it in the feed-forward path (the OutputDelay of the feedback source is larger than the OutputDelay of the destination). A simple example of program feedback is illustrated in FIG. 59. In this example, the OutDelay value for programs A and B is 0001'b, and for programs C and D is 0010'b and 0011'b, respectively. Feedback is represented by the blue arrow from C output to B input.

The intent in this case is for A and B to execute after the first set of inputs from the system. It is generally impossible for the output of C to be provided to B for this first set of inputs, because C depends on input from B before it can execute. Instead of operating on input from C, B should use some initial value for this input, which can be provided by the same program that provides system input: it can write any variable in B at any point in execution, so during initialization it can write data that's normally written as feedback from C. However, B has to ignore the dependency on C up to the point where C can provide data.

It is usually sufficient for correctness for B to ignore the dependency on C the first time it executes, but this is undesirable from a performance standpoint. This would permit B (and A) to execute, providing input to C, but then B would be waiting for C to complete its feedback output before executing again. This has the effect of serializing the execution of B with C: B executes and provides input to C, then waits for C to provide feedback output before it executes again (this also serializes A, because C permits input from A when it is enabled to receive new input).

The desired behavior, for performance, is to execute A and B in parallel, pipelined with C and D. To accomplish this, B should ignore the lack of input from C until the third set of input from the system, which is received along with valid data from C. At this point, all four programs can execute in parallel: A and B on new system input, and C and D pipelined using the results of previous system input.

The feedback from C to B is indicated by FdBk=1 bit in C's destination descriptor for B. This enables C to satisfy the dependencies of B without actually providing valid data. Normally, C sends an SN message to B after it begins execution. However, if FdBk is set, C sends an SN to B as soon as it is scheduled to execute (all contexts scheduled for C send SNs to their feedback destinations). These SNs indicate a data type of "none" (00'b), which has the effect of resetting both ValFlag bits for this input to B, enabling it for execution once it receives system input.

The SP from B in response to the SN enables C to transmit another SN, with type set to 00'b, for the next set of inputs. The total number of these initial SNs is determined by the OutputDelay field in the context descriptor for C. C maintains a DelayCount field to track the number of initial SN-SP exchanges that have occurred. When DelayCount is equal to OutputDelay, C is enabled to execute using valid inputs by definition, and the SN messages reflect the actual output of C given by the destination-descriptor DataType field.

This technique supports any number of feedback paths from any program to any previous program. In all almost cases, the OutputDelay is determined by the number of program stages from system input to the context's program output, regardless of the number and span of feedback paths from the program. The value of OutputDelay determines how many sets of system inputs are required before the feedback data is valid.

Source contexts maintain output state for each destination to control the enabling of outputs to the destination, and to order outputs to thread destinations. There are two bits of state for each output: one bit is used for output to non-threads (ThDst=0), and both bits are used for outputs to threads (ThDst=1). Outputs to threads are more complex because of the desire to both forward SNs and to hold back SNs to the thread until ordering restrictions are met. To simplify the discussion, these are presented as separate state sequences.

Figure 60:
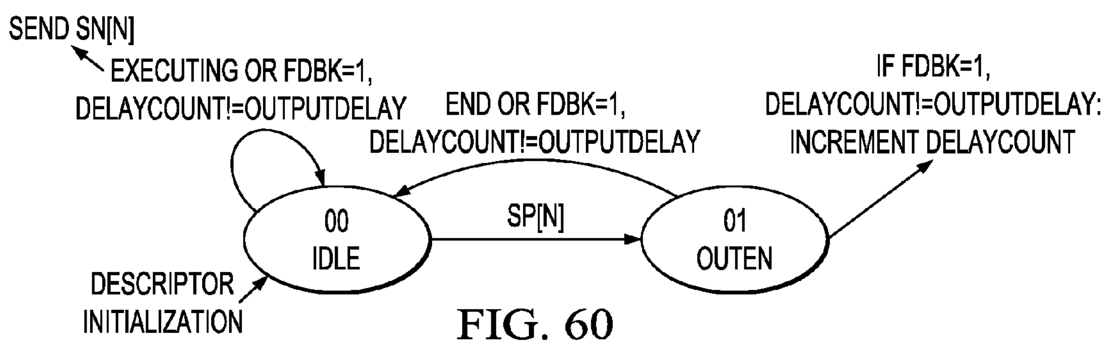

The output-state transitions for ThDst=0 are shown in FIG. 60 (both state bits are shown even though one is meaningful in this case). In the figure, SN[n] indicates a Source Notification for Dst_Tag=n (the tag for the destination descriptor), and SP[n] indicates the corresponding Source Permission from the destination. The SN message to all non-thread destinations are triggered in the idle state (00'b, also the initialization state) when the program begins execution, at which point it is known that there will be output, but which is normally well in advance that output. The SP message response contains the Dst_Tag, and places the corresponding output into a state where the output is enabled (01'b). Outputs remain enabled until the program executes an END instruction, at which point the output state transitions back to idle.

If the output is feedback, this triggers an SN message with Type=00'b as long as the value of DelayCount is less than OutputDelay. DelayCount is incremented for every SP received, until it reaches the value OutputDelay. At this point, the output state is 01'b, which enables output for normal execution (the final SP is a valid SP even though it's a response to a feedback output). By the definition of OutputDelay, the context receives valid input at this point and is enabled to execute. The program has to execute an END instruction before it is enabled to send a subsequent SN, which occurs when the program executes again.

Figure 61:
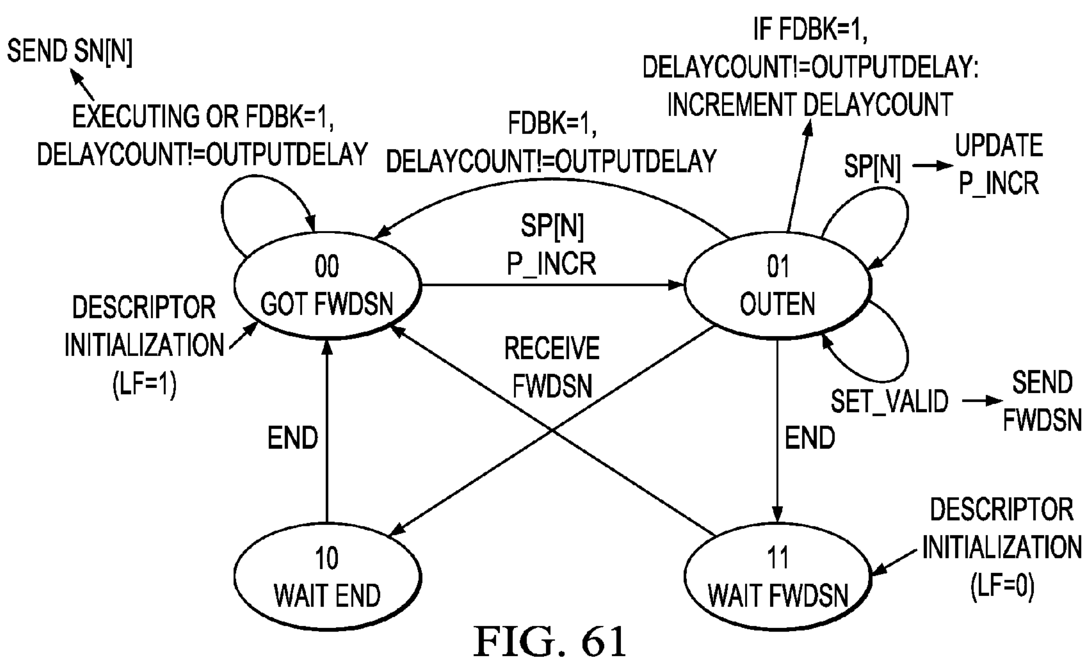

The output-state transitions for ThDst=1 are shown in FIG. 61. In this case, the SN message cannot be sent until two conditions are satisfied: that ordering restrictions have been met (a forwarded SN has been received) and the program has begun execution. After initialization, to meeting ordering restrictions, the left-boundary context can be enabled to output, so if Lf=1, the state is initialized to 00'b, which enables an SN when the context begins execution. All other contexts, with Lf=0, are initialized to the state 11'b, where they wait to receive a forwarded SN, indicating that their output is the next in order. For the state 00'b, an SN is sent when the context begins execution, and the SP response enables input (01'b). When outputs are enabled, additional SPs can be received to update the number of permitted outputs with P_Incr.

When the final vector output occurs, with Set_Valid the context forwards the SN message for the Dst_Tag using the right-context pointer. In most cases, the next event is that the program executes an END instruction, and the output state transitions back into the state where it is waiting for a forwarded SN message. However, the forwarded SN message enables other contexts to output and also forward SNs, so there is nothing to prevent a race condition where the context that just forwarded the SN receives a subsequent SN while it is still executing. This SN message should be recorded and wait for subsequent execution. This is accomplished by the state 10'b, which records the forwarded SN message and waits until the program executes an END instruction before entering the state '00b, where the SN is sent when the program begins execution again.

If the output to the thread is feedback, this triggers an SN message with Type=00'b as long as the value of DelayCount is less than OutputDelay. Since the output is to a thread destination, all dependencies for the horizontal group can be released by the left-most context, so this is the context that transmits feedback SN messages. DelayCount is incremented for every SP message received in the state 00'b, until it reaches the value OutputDelay. At this point, the output state is 01'b, which enables left-most context output for normal execution (the final SP message is a valid SP even though it is a response to a feedback output). By the definition of OutputDelay, the context receives valid input at this point and is enabled to execute. When the final vector output occurs, with Set_Valid, the context forwards the SN message, and normal operation begins.

Figure 62:
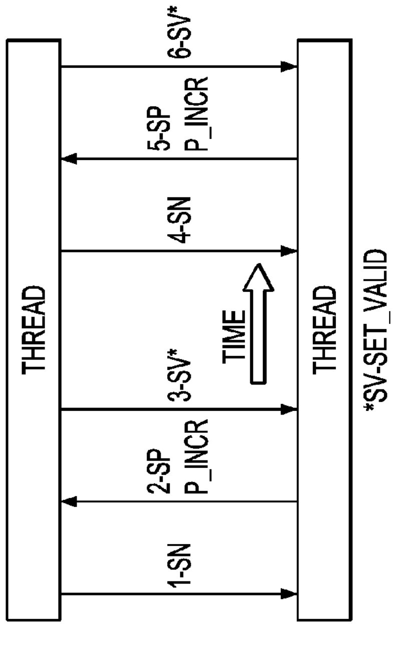

FIG. 62 shows the operation of the dataflow protocol for transfers from a thread to another thread. This is similar to the protocol between pairs of non-threaded contexts, in that an exchange of SN and SP messages enables output, except that P_Incr is used in the SP messages. Data is ordered by definition.

Figure 63:
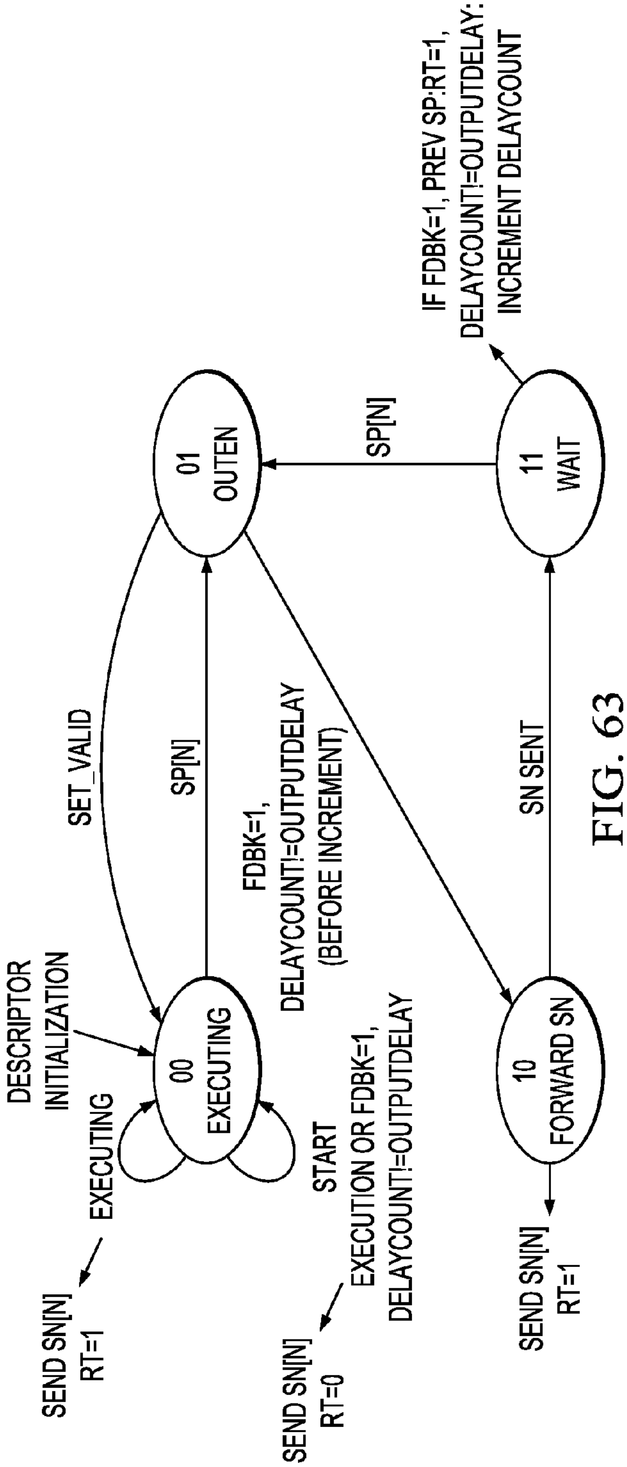

The output-state transitions for Th=1, ThDst=0 are shown in FIG. 63. The SN to the first context of a non-thread destination is triggered in the idle state (00'b, also the initialization state) when the program begins execution. The SP message response contains the Dst_Tag, and places the corresponding output into a state where the output is enabled (01'b). Outputs remain enabled until the program signals a Set_Valid to this context, at which point the output state transitions back to idle (00'b). If the program is still executing (normally in an iteration loop), it sends an SN message with Rt=1 to enable the first destination context to forward to the next destination context, to satisfy ordering restrictions. This results in an SP message from the new destination (with a new destination ID that updates the destination descriptor).

If the output is feedback, this triggers an SN message with Type=00'b as long as the value of DelayCount is less than OutputDelay. However, in this case the SN message has to be forwarded to all destination contexts, and the DelayCount value has to reflect an SN message to all of these context contexts. Since the context isn't executing, it cannot distinguish, in the state 00'b, whether or not the SN message should have Rt set or not. Instead, the state 10'b is used in the feedback case to send the SN message with Rt=1, at which point the state transitions to 11'b and the context waits for the SP message from the next context: in this state, if Rt=1 in the previous SP message, indicating the right-boundary context, DelayCount is incremented. The next SP message causes a transition to the 01'b state. The transition 01'b.fwdarw.10'b.fwdarw.11'b.fwdarw.01'b continues until an SN message with RT=1 has been sent to the right-boundary context, and DelayCount has then been incremented to the value OutputDelay. At this point, the output state is 01'b, which enables output for normal execution (the final SP message is a valid SP message, from the left-boundary context, even though it is a response to a feedback output). By the definition of OutputDelay, the context receives valid input at this point and is enabled to execute. When the program signals Set_Valid it transitions to the state 00'b and normal operation resumes.

The output-state transitions for Th=1, ThDst=1 are shown in FIG. 63 (both state bits are shown even though one is meaningful in this case). The SN message to the destination is triggered in the idle state (00'b, also the initialization state) when the program begins execution. The SP message response enables input (01'b) up to the number of transfers determined by P_Incr. When output is enabled, additional SP messages can be received to update the number of permitted outputs with P_Incr. Outputs remain enabled until the program executes an END instruction, at which point the output state transitions back to idle.

If the output to the thread is feedback, this triggers an SN message with Type=00'b as long as the value of DelayCount is less than OutputDelay. DelayCount is incremented for every SP message received in the state 00'b, until it reaches the value OutputDelay. At this point, the output state is 01'b, which enables context output for normal execution (the final SP message is a valid SP message even though it's a response to a feedback output). By the definition of OutputDelay, the context receives valid input at this point and is enabled to execute. The program has to execute an END instruction before it's enabled to send a subsequent SN message, which occurs when the program executes again.

Programs can be configured to iterate on dataflow, in that they continue to execute on input datasets as long as these datasets are provided. This eliminates the burden of explicitly scheduling the program for every new set of inputs, but creates the requirement for data sources to signal the termination of source data, which in turn terminates the destination program. To support this, the dataflow protocol includes Output Termination messages that are used to signal the termination of a source program or a GLS read thread.

Output Termination (OT) messages are sent to the output destinations of a terminating context, at the point of termination, to indicate to the destination that the source will generate no more data. These messages are transmitted by contexts in turn as they terminate, in order to terminate all dataflow between contexts. Messages are distributed in time, as successive contexts terminate, and terminated contexts are freed as early as possible for new programs or inputs. For example, a new scan-line at the top of a frame boundary can be fetched into left-most contexts as right-side contexts are finishing execution at the bottom boundary of the previous frame.

Figure 64:
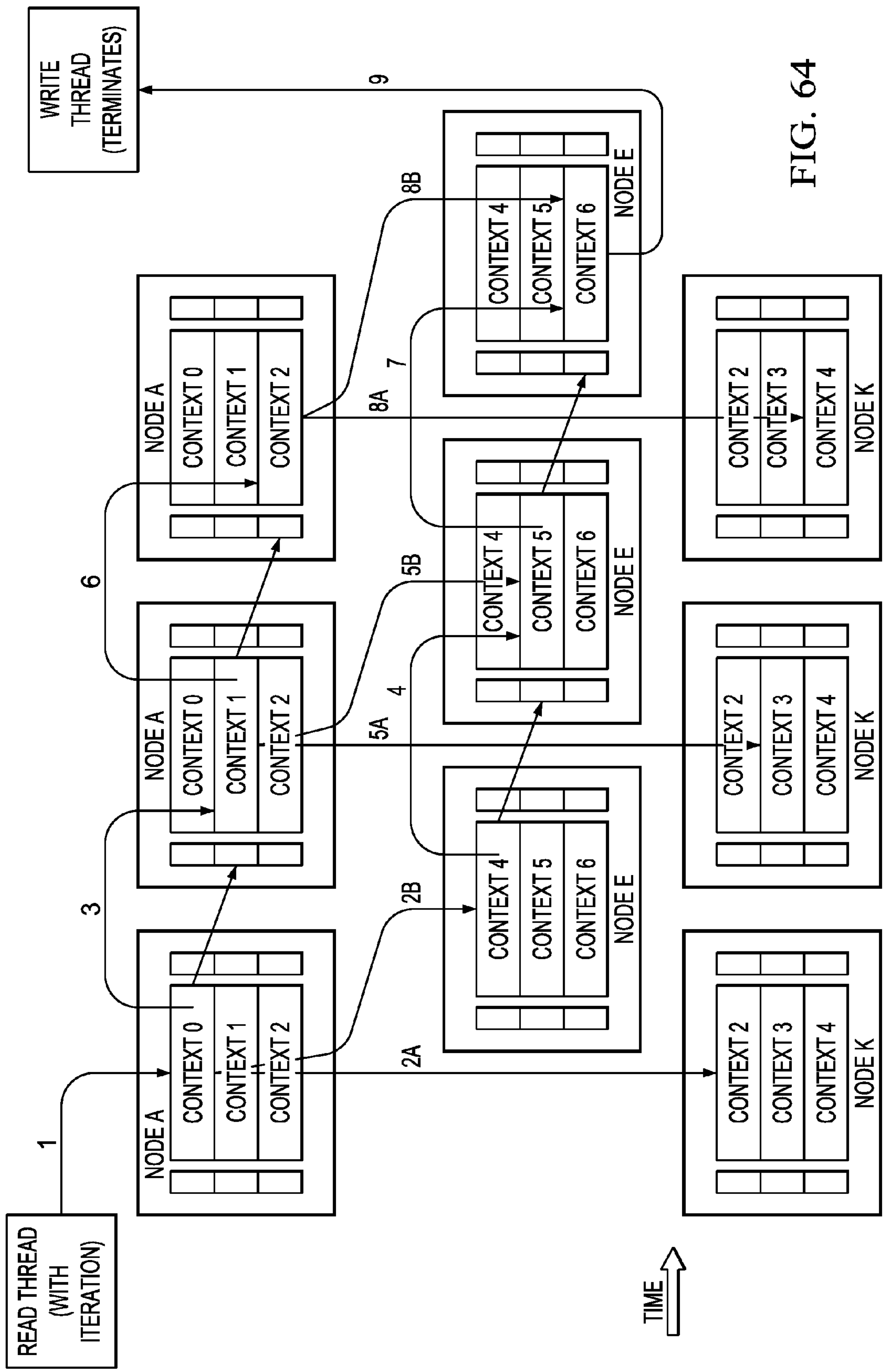

FIG. 64 shows the sequencing of OT messages, illustrating how a termination condition is "gracefully" propagated through all dataflow associations. In general (though not necessarily), the termination is first detected by an iteration loop in a read thread, for example to iterate in the vertical direction of a frame division: the loop terminates after the last vertical line has been transmitted. The termination of the read thread causes an OT to be sent to all destinations of the read thread. The figure shows a single destination, but a read thread can send to multiple destinations, similar to a node program. In the case of horizontal groups, the destination of the read thread is considered to be the left-boundary context of the group—the other contexts are abstracted from the thread and do not receive OT messages directly, as described below. The context receiving the OT from the read thread notes the event in the context, but takes no action until the context completes execution, or unless it has already completed, at which point it sends an OT to its destination(s). This message transmission uses the following rules to ensure that all destinations are notified properly:

An OT from a thread is sent to the left-boundary context that is a destination of the thread (this was the first output destination from the thread, which is static information available to the thread). All other possible destinations of the read thread should be notified. This is accomplished by the left-boundary context, when it terminates due to the original message, signaling the termination to the context given by its right-context pointer: this is similar to the signaling used to order thread transfers. This local signaling indicates that the terminating source is a thread, so that this context in turn can notify its right-side context upon termination. This action repeats up to the right-boundary context, but it generally occurs as each context terminates, not immediately. When all program contexts have terminated on a node, the node sends a Node Program Termination message to the Control Node 1406, and can be scheduled for new sets of input data or new programs as other contexts in the horizontal group terminate.

If an OT is received from a non-thread context, and an output or outputs are to other non-thread contexts, an OT is sent to all such destination contexts when the receiving context terminates. These messages indicate that the source is not a thread, so the receiving contexts desire not propagate the termination through right-context pointers as they do for a thread.

If any destination context is a thread (ThDst=1), the OT cannot be sent to the destination until it is known that all associated contexts in the horizontal group have terminated (until this is true, the thread should remain active and cannot terminate). When a left-boundary context terminates, it signals this event to the context given by its right-context pointer (at the same time, it can be sending an OT to other non-thread contexts). The right-side context takes the same action upon termination, following the right-context pointers to the right-boundary context. Generally, the right-boundary context sends an OT to the thread(s), one message for each thread destination (there can be more than one).

A node program should terminate in all contexts on the node, and transmit all OTs, before it sends a Node Program Termination message to the Control Node. This is required so that dependent events (such as reconfiguration, or scheduling a new set of programs) can assume that all resources associated with the program are freed on the node. These message sequences serialize in the Control Node (which implements the messaging distribution), so there are no race conditions between OT and Node Program Termination messages.

Typically, dataflow termination is ultimately determined by a software condition, for example the termination of a FOR loop that moves data from a system buffer. Software execution is usually highly decoupled from data transfer, but the termination condition is detected after the final data transfer in hardware. Normally, the GLS processor 5402 (which is discussed in detail below) task that initiates the transfer is suspended while hardware completes the transfer, to enable other tasks to execute for other transfers. The task is re-scheduled when all hardware transfers are complete, and after being re-scheduled can the termination condition be detected, resulting in OT messages.

When the destination receives the OT, it can be in one of two states: either still executing on previous input, or finished execution by executing an END instruction and waiting on new input. In the first case, the OT is recorded in a context-state bit called Input Termination (InTm), and the program terminates when it executes an END instruction. In the second case, the execution of the END instruction is recorded in a context-state bit called End, and the program terminates when it receives an OT. To properly detect the termination condition, the context should reset End at the earliest indication that it is going to execute at least one more time: this is when it receives any input data, either scalar or vector, from the interconnect, and before any local data buffering. This generally cannot be based on receiving an SN, which is usually an earlier indication that data is going to be received, because it's possible to receive an SN from a program that does not provide output due to program conditions that cause it to terminate before outputting data.

It also should not matter whether a source producing data is also the one that sends the OT. All sources terminate at the same logical point in execution, and all are required to hold their OT until after they complete output for the final transfer and terminate. Thus, at least one input arrives before any OT.

Receipt of any termination signal is sufficient to terminate a program in the receiving context when it executes an END instruction. Other termination signals can be received by the context before or after termination, but they are ignored after the first one has been received.

Figure 65:
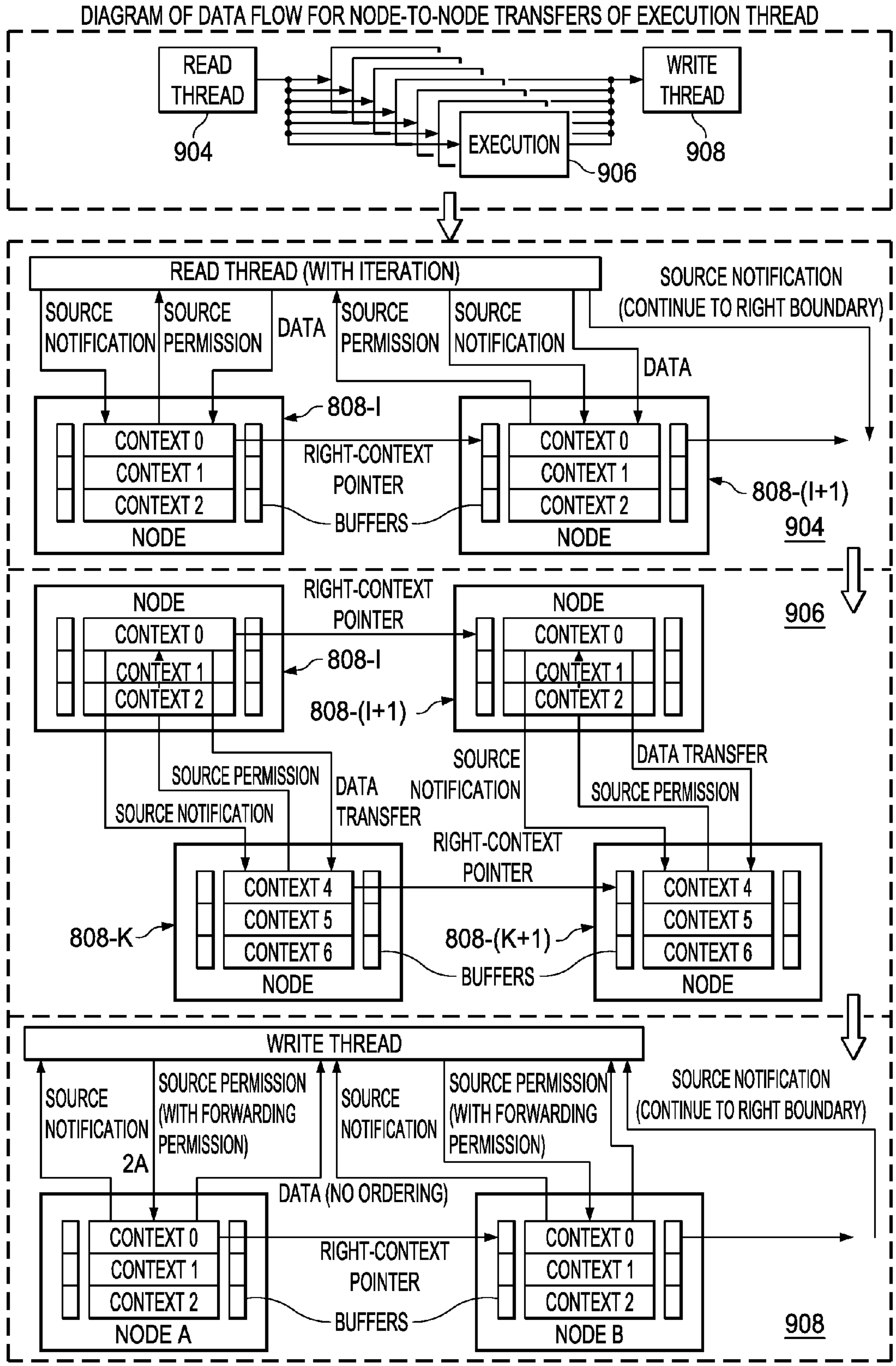
FIG. 65 is a diagram depicting operation of a dataflow protocol for node-to-node transfers for an execution thread.

Turning to FIG. 65, another example of a dataflow protocol can be seen. This protocol is performed in the background using messaging. Transfers are generally enabled in advance of the actual transfer. There are generally three cases: (1) ordered input from system distributed to contexts; (2) out-of-order flow between contexts; and (3) ordered output from contexts to system. Also, this protocol allows program dataflow to be abstracted from the system configuration. There are independent of the number of source and destination contexts, ordering, and context configurations where the hardware "discovers" the topology automatically. Data is buffered and transmitted independently of this protocol. Transfers are also generally known to succeed ahead of time.

Figure 66:
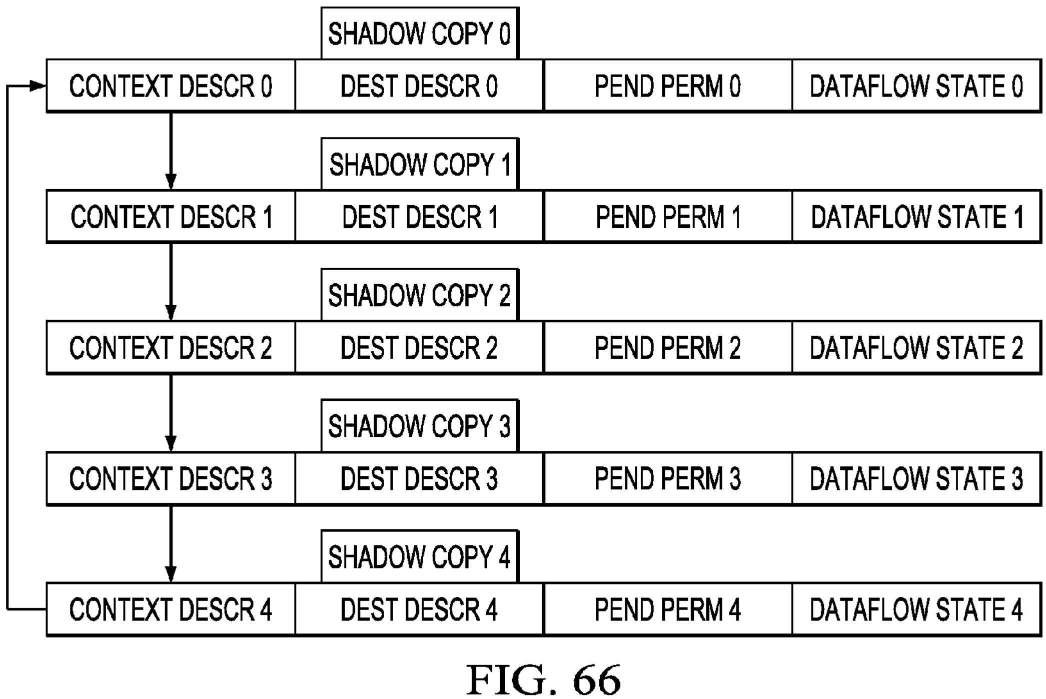
FIG. 66 is a diagram depicting states that are sequenced up to the point of termination.

Additionally, the dataflow protocol can be implemented using information stored in the context-state RAM. An example for a program allocated five contexts is shown in FIG. 66. The structure of the context descriptors ("Context Descr" in the figure) and the destination descriptors ("Dest Descr") were described above. FIG. 66 also shows shadow copies of the destination descriptors, that are used to retain the initial values of these descriptors. These are required because the dataflow protocol updates destination descriptors with the context of SP messages, but the initial values are still required, for two purposes. The first use is for a thread context to be able to locate the left-boundary context of a non-thread destination, in order to send an OT to this destination. The second use is to re-initialize the destination descriptors upon termination. This permits the context to be re-scheduled to execute the same program, without requiring further steps to set the destination descriptors back to their initial values The remaining entries of the context-state RAM are used to buffer information related to the dataflow protocol and to control operation in the context. The first of these entries is a table of pending SP messages, which are to be sent once the context is free for new input, in a pending permission table. The second is a set of control information related to context dependencies and the dataflow protocol, called the dataflow state.

In FIGS. 67 and 68, the dataflow protocol is typically implemented using information stored in the context-state RAM (within a Context Save Memory, which is described below). Typically, the context-state RAM is a large, wide RAM, which can, for example, have 16 lines by 256 bits per context. The context state for each context generally includes four groups of fields: a context descriptor (described above), a destination descriptor (described above), pending permissions table, and dataflow state table. Each of these four groups can, for example, be about 64 bits each (with each group having 16 bits). The pending permissions table and dataflow state table are generally used to buffer information related to the dataflow protocol and to control operation in the context.

Looking first to the pending permissions 4202, which can be seen in FIG. 67, it is a table of pending Source Permission messages, which are to be sent once the context is free for new input. As shown, has four entries, storing the information received in Source Notification messages:

(1) Dst_Tag, which is the destination tag for a pending Source Permission message and which is, for example, comprised of three bits in field 4203;
(2) Rt, which is the original Rt bit from the Source Notification message and which is, for example, comprised of one bit in field 4204
(3) DataType, which, for example, is a comprised of two bits in field 4205 and which is the data of the input that is denoted as follows:
i. 00—None/Feedback
ii. 01—Scalar
iii. 10—Vector
iv. 11—Both Scalar and Vector
(4) Src_Cntx/Thread_ID, which is the context number or thread identifier and which is, for example, comprised of four bits in field 4206;
(5) Src_Seg, which is a source segment identifier and which is, for example, comprised of two bits in field 4207; and
(6) Src_Node, which is the source node identifier and which is, for example, comprised of four bits in field 4208.

If a notification message is received before the context can receive new input, the pending permission table buffers the information required to respond once the input is freed. This information is used to generate Source Permission messages as soon as the context is freed for new input. The context can receive this new input while the context completes execution based on the previous input (but there is no subsequent access to the previous input).

Now looking to the dataflow state 4210, which can be seen in FIG. 68, it is a set of control information related to context dependencies and the dataflow protocol. As shown, there are the formats of words (i.e., words 12-15), containing the dataflow state. As shown, it can, for example, includes the following information:

(1) LRvin, which is a local copy of a left-side context Rvin and which, for example, is comprised of one bit in field 4211
(2) RLvin, which is a local copy of a right-side context Lvin and which, for example, is comprised of one bit in field 4212
(3) PgmQ_ID, which is program queue identifier (internal) for this context and which, for example, is comprised of three bits in field 4213
(4) Lvin, which is a left valid input and which, for example, is comprised of one bit in field 4214
(5) Lvlc, which is a left valid local and which, for example, is comprised of one bit in field 4215
(6) Cvin, which is a center valid input and which, for example, is comprised of one bit in field 4216
(7) Rvin, which is a right valid input and which, for example, is comprised of one bit in field 4217
(8) Rvlc, which is a right valid local and which, for example, is comprised of one bit in field 4218
(9) InSt[n], which is an input state for Src_Tag and which, for example, is comprised of eight bits in field 4219
(10) OutSt[n], which is an output state for Src_Tag and which, for example, is comprised of eight bits in field 4220
(11) PermissionCount[n], which is a permission count for Dst_Tag n and which, for example, is comprised of sixteen bits in field 4221
(12) InTm, which is an input termination state and which, for example, is comprised of two bits in field 4222
(13) InEn, which is an input enabled and which, for example, is comprised of one bit in field 4223
(14) DelayCount, which is a number of feedback delays satisfied and which, for example, is comprised of four bits in field 4224
(15) ValFlag[n], which is expected Set_Valid for Src_Tag n (MSB:vector, LSB:scalar) and which, for example, is comprised of eight bits in field 4225

5.5.2.3. Program Scheduling

The node wrapper (i.e., 810-*i*), which is described below, schedules active, resident programs on the node (i.e., 808-*i*) using a form of pre-emptive multi-tasking. This generally optimizes node resource utilization in the presence of unresolved dependencies on input or output data (including side contexts). In effect, the execution order of tasks is determined by input and output dataflow. Execution can be considered data-driven, although scheduling decisions are usually made at instruction-specified task boundaries, and tasks cannot be pre-empted at any other point in execution.

The node wrapper (i.e., 810-*i*) can include an 8-entry queue, for example, for active resident programs scheduled by a Schedule Node Program message. This queue 4206, which can be seen in FIG. 69, stores information for scheduled programs, in the order of message receipt, and is used to schedule execution on the node. Typically, this queue 4206 is a hardware-structure, so the actual format is not generally relevant. The table shown in FIG. 69 is shown to illustrate the information used to schedule program execution.

Scheduling decisions are usually made at task boundaries because SIMD-register context is not preserved across these boundaries and the compiler 706 allocates registers and spill/fill accordingly. However, the system programming tool 718 can force the insertion of task boundaries to increase the possibility of optimum task-scheduling decisions, by increasing the opportunities for the node wrapper to make scheduling decisions.

Real-time scheduling typically prioritizes programs in queue order (mostly round-robin), but actual execution is data-dependent. Based on dependency stalls known to exist in the next sequential task to be scheduled, the scheduler can pre-empt this task to execute the same program (a subsequent task) in an earlier context, and can also pre-empt a program to execute another program further down in the program queue. Pre-empted tasks or programs are resumed at the earliest opportunity once the dependencies are resolved.

Tasks are generally maintained in queue order as long as they have not terminated. Normally, the wrapper (i.e., 810-*i*) schedules a program to execute all tasks in all contexts before scheduling the next entry on the queue. At this point, the program that has just completed all tasks in all contexts can either remain resident on the queue or can terminate, based on a bit in the original scheduling message (Te). If the program remains resident, it is terminated eventually by an Output Termination message—this allows the same program to iterate based on dataflow rather than constantly being rescheduled. If it terminates early, based the Te bit, this can be used to perform finer-grained scheduling of task sequences using the control node 1406 for event ordering.

Generally, hardware maintains, in the context-state RAM, an identifier of the program-queue entry associated with the context. Program-queue entries are assigned by hardware as a result of scheduling messages. This identifier is generally used by hardware to remove the program-queue entry when all execution has terminated in all contexts. This is indicated by Bk=1 in the descriptor of the context that encounters termination. The End bit in the program queue is a hint that a previous context has encountered an END instruction, and it used to control scheduling decisions for the final context (where Bk=1), when the program is possibly about to be removed from the queue 4230. Each context transmits its own set of Output Termination messages when the context terminates, but a Node Program Termination message is not sent to the control node 1406 until all associated contexts have completed execution.

When a program is scheduled, the base context number is used to detect whether or not any output of the program is a feedback output, and the queue-entry FdBk bit is set if and destination descriptor has FdBk set. This indicates that all associated context descriptors should be used to satisfy feedback dependencies before the program executes. When there is no feedback, the dataflow protocol doesn't start operating until the program begins execution.

Assuming no dependency stalls, program execution begins at the first entry of the task queue, at the initial program counter or PC and base context given by this entry (received in the original scheduling message). When the program encounters a task boundary, the program uses the initial PC to begin execution in the next sequential context (the previous task's PC is stored in the context save area of processor data memory, since it is part of the context for the previous task). This proceeds until the context with the Bk bit set is executed—at this point, execution resumes in the base context, using the PC from that context save area (along with other processor data memory context). Execution normally proceeds in this fashion, until all contexts have ended execution. At this point, if the Te bit is set, the program terminates and is removed from the program queue—otherwise it remains on the queue. In the latter case, new inputs are received into the program's contexts, and scheduling at some point will return to this program in the updated contexts.

As just described, tasks normally execute contexts from left to right, because this is the order of context allocation in the descriptors and implemented by the dataflow protocol. As explained above, this is a better match to the system dataflow for input and outputs, and satisfies the largest set of side-context dependencies. However, at the boundaries between nodes (i.e., between nodes 808-*i* and 808-(*i*+1)), it is possible that the task which provides Rlc data, in an adjacent node, has not begun execution yet. It is also possible, for example, because of data rates at the system level, that a context has not received a Set_Valid or a Source Permission message to allow it to begin execution. The scheduler first uses task pre-emption to attempt to schedule around the dependency, then, in a more general case, uses program pre-emption to attempt to schedule around the dependency. Task and program pre-emption are described below.

Now, referring back to FIG. 48, task execution can be modified by task pre-emption. If the next sequential context is not ready—either because Rlc source data is not yet valid, Llc destination context is not available to be written, input context is not yet valid, or the context is not yet enabled for output (assuming a non-zero number of inputs and/or outputs)—the scheduler first attempts to schedule a continuation task for the same program in the base context. Starting in the base context provides the maximum amount of time for the pre-empted context to satisfy its dependency. The context number of the pre-empted task is left in the Next_Ctx# field of the program-queue entry, the base context number is set into the Pre-empt_Ctx# field, and the Pre bit set to indicate that this context has been scheduled out-of-order (it is called the pre-emptive context). The program continues execution using pre-emptive context numbers, executing sequential contexts, until either the pre-empted context has its dependency satisfied, or the pre-empted context becomes the next sequential context and the dependency is still not resolved. If the pre-empted context becomes ready, it is scheduled to execute at the next task boundary. At this point, if the pre-empted context is not the next sequential context in the pre-emptive sequence, then the next sequential (unexecuted) pre-emptive context number is left in the Pre-empt_Ctx# field, and the Pre bit remains set. This indicates that, when the execution reaches the last sequential context, execution should resume with the context in the Pre-empt_Ctx# field. At this point, the pre-emptive context number is copied into the Next_Ctx# field, and the Pre bit is reset. From this point, normal sequential execution resumes (but pre-emption can occur again later on). If the pre-empted context becomes ready and it is also the next context to execute in the pre-emptive sequence, the Pre bit is simply reset and sequential execution resumes.

There is usually one entry on the program queue to track pre-emptive contexts, so task pre-emption is effectively nested one-deep. If a stalled context is encountered when there is a valid entry in the Pre-empt_Ctx# field (the Pre bit is set), the scheduler cannot use task pre-emption to schedule around the stall, and uses program pre-emption instead. In this case, the program-queue entry remains in its current state, so that it can be properly resumed when the dependency is resolved.

If the scheduler cannot avoid stalls using task pre-emption, it attempts to use program pre-emption instead. The scheduler searches the program queue, in order, for another program that is ready to execute, and schedules the first program that has a ready task. Analogous to task pre-emption, the scheduler will schedule the pre-empted program at the earliest task boundary after the pre-empted program becomes ready. At this point, execution returns to round-robin order within the program queue until the next point of program pre-emption.

To summarize, the schedule prefers scheduling tasks in context order given by the descriptors, until all contexts have completed execution, followed by scheduling programs in program-queue order. However, it can schedule tasks or programs out-of-order—first attempting tasks and then programs—but restoring the original order as soon as possible. Data dependencies keep programs in a correct order, so actual order doesn't matter for correctness. However, preferring this scheduling order is likely the most efficient in terms of matching system-level input and output.

The scheduler uses pointers into the program queue that indicate both the next program in sequential order and the pre-emptive program. It is possible that all programs are executed in the pre-emptive sequence without the pre-empted program becoming ready, and in this case the pre-emptive pointer is allowed to wrap across the sequential program (but the sequential program retains priority whenever it becomes ready). This wrapping can occur any number of times. This case arises because system programming tool 718 sometimes has to increase the node allocation for a program to provide sufficient SIMD data memory, rather than because of throughput requirements. However, increasing the node allocation also increases throughput for the program (i.e., more pixels per iteration than required)—by a factor determined by the number of additional nodes (i.e., using three nodes instead of one triples the potential throughput of this program). This means that the program can consume input and produce output much faster than it can be provided or consumed, and the execution rate is throttled by data dependencies. Pre-emption has the effect in this case of allowing the node allocation to make progress around the stalled program, effectively bringing the pre-empted program back down to the overall throughput for the use-case.

The scheduler also implements pre-emption at task boundaries, but makes scheduling decisions in advance of these boundaries. It is important that scheduling add no overhead cycles, and so scheduling cannot wait until the task boundary to determine the next task or program to execute—this can take multiple accesses of the context-state RAM. There are two concurrent algorithms used to decide between task pre-emption and program pre-emption. Since task boundaries are generally imperative—determined by the program code—and since the same code executes in multiple contexts, the scheduler can know the interval between task boundaries in the current execution sequence. The left-most context determines this value, and enables the hardware to count the number of cycles between the beginning of a task in this context and the next task switch. This value is placed in the program queue (it varies from task to task).

During execution in the current context, the scheduler can also inspect other entries on the program queue in the background, assuming that the context-state RAM is not desired for other purposes. If either the base, next, or pre-emptive context is ready in another program, the task-queue entry for that program is set ready (Rdy=1). At that point, this background scheduling operation returns to the next sequential program, and repeats the search: this keeps ready tasks in roughly round-robin order. By counting down the current task interval, the scheduler can determine when it is several cycles in advance of the next task boundary. At this point it can inspect the next task in the current program, and, if that task is not ready, it can decide on task pre-emption, if there is a pre-emptive task that can be run, or it can decide to schedule the next ready program in the program queue. In this manner, the scheduling decision is known with reasonably high accuracy by the time the task boundary is encountered. This also provides sufficient time to prepare for the task switch by fetching the program counter or PC for the next task from the context save area.

6. Node Architecture 6.1. Overview

Figure 70:
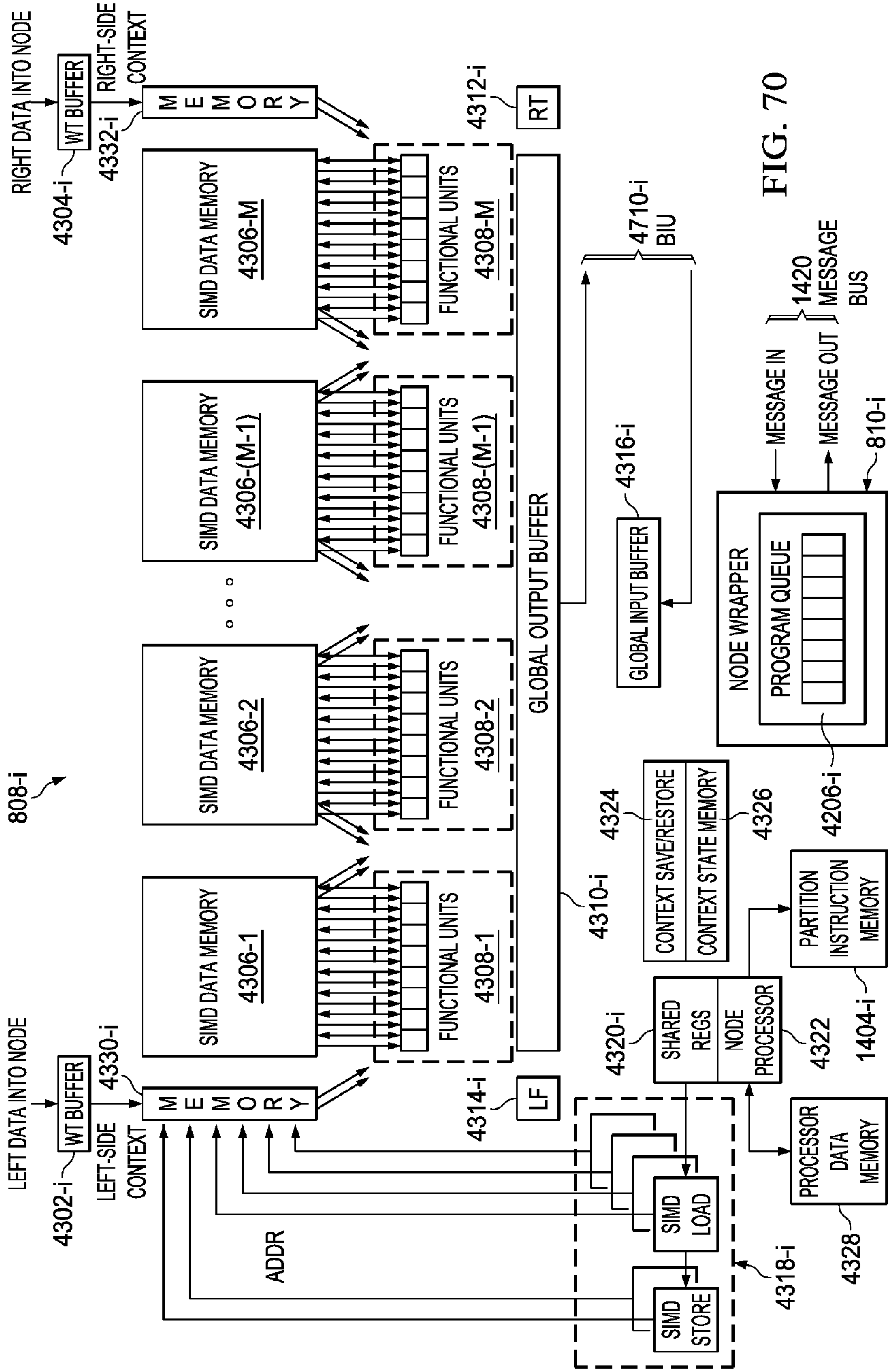
FIGS. 70 and 71 are diagrams of portions of a node or computing element in the processing cluster.

Turning to FIG. 70, an example of a node 808-*i* can be seen in greater detail. Node 808-*i* is the computing element in processing cluster 1400, while the basic element for addressing and program flow-control is RISC processor or node processor 4322. Typically, this node processor 4322 can have a 32-bit data path with 20-bit instructions (with the possibility of a 20-bit immediate field in a 40-bit instruction). Pixel operations, for example, are performed in a set of 32 pixel functional units, in a SIMD organization, in parallel with four loads (for example) to, and two stores (for example) from, SIMD registers from/to SIMD data memory (the instruction-set architecture of node processor 4322 is described in section 7 below). An instruction packet describes (for example) one RISC processor core instruction, four SIMD loads, and two SIMD stores, in parallel with a 3-issue SIMD instruction that is executed by all SIMD functional units 4308-1 to 4308-M.

Typically, loads and stores (from load store unit 4318-*i*) move data between SIMD data-memory locations and SIMD local registers, which can, for example, represent up to 64, 16-bit pixels. SIMD loads and stores use shared registers 4320-*i* for indirect addressing (direct addressing is also supported), but SIMD addressing operations read these registers: addressing context is managed by the core 4320. The core 4320 has a local memory 4328 for register spill/fill, addressing context, and input parameters. There is a partition instruction memory 1404-*i* provided per node, where it is possible for multiple nodes to share partition instruction memory 1404-*i*, to execute larger programs on datasets that span multiple nodes.

Node 808-*i* also incorporates several features to support parallelism. The global input buffer 4316-*i* and global output buffer 4310-*i* (which in conjunction with Lf and Rt buffers 4314-*i* and 4312-*i* generally comprise input/output (IO) circuitry for node 808-*i*) decouple node 808-*i* input and output from instruction execution, making it very unlikely that the node stalls because of system IO. Inputs are normally received well in advance of processing (by SIMD data memory 4306-1 to 4306-M and functional units 4308-1 to 4308-M), and are stored in SIMD data memory 4306-1 to 4306-M using spare cycles (which are very common). SIMD output data is written to the global output buffer 4210-*i* and routed through the processing cluster 1400 from there, making it unlikely that a node (i.e., 808-*i*) can stalls even if the system bandwidth approaches its limit (which is also unlikely). SIMD data memories 4308-1 to 4306-M and the corresponding SIMD functional unit 4306-1 to 4306-M are each collectively referred as a “SIMD units”

SIMD data memory 4306-1 to 4306-M is organized into non-overlapping contexts, of variable size, allocated either to related or unrelated tasks. Contexts are fully shareable in both horizontal and vertical directions. Sharing in the horizontal direction uses read-only memories 4330-*i* and 4332-*i*, which are typically read-only for the program but writeable by the write buffers 4302-*i* and 4304-*i*, load/store (LS) unit 4318-*i*, or other hardware. These memories 4330-*i* and 4332-*i* can also be about 512×2 bits in size. Generally, these memories 4330-*i* and 4332-*i* correspond to pixel locations to the left and right relative to the central pixel locations operated on. These memories 4330-*i* and 4332-*i* use a write-buffering mechanism (i.e. write buffers 4302-*i* and 4304-*i*) to schedule writes, where side-context writes are usually not synchronized with local access. The buffer 4302-*i* generally maintains coherence with adjacent pixel (for example) contexts that operate concurrently. Sharing in the vertical direction uses circular buffers within the SIMD data memory 4306-1 to 4306-M; circular addressing is a mode supported by the load and store instructions applied by the LS unit 4318-*i*. Shared data is generally kept coherent using system-level dependency protocols described above.

Context allocation and sharing is specified by SIMD data memory 4306-1 to 4306-M context descriptors, in context-state memory 4326, which is associated with the node processor 4322. This memory 4326 can, for example, 16×16×32 bit or 2×16×256 bit RAM. These descriptors also specify how data is shared between contexts in a fully general manner, and retain information to handle data dependencies between contexts. The Context Save/Restore memory 4324 is used to support 0-cycle task switching (which is described above), by permitting registers 4320-*i* to be saved and restored in parallel. SIMD data memory 4306-1 to 4306-M and processor data memory 4328 contexts are preserved using independent context areas for each task.

SIMD data memory 4306-1 to 4306-M and processor data memory 4328 are partitioned into a variable number of contexts, of variable size. Data in the vertical frame direction is retained and re-used within the context itself. Data in the horizontal frame direction is shared by linking contexts together into a horizontal group. It is important to note that the context organization is mostly independent of the number of nodes involved in a computation and how they interact with each other. The primary purpose of contexts is to retain, share, and re-use image data, regardless of the organization of nodes that operate on this data.

Typically, SIMD data memory 4306-1 to 4306-M contains (for example) pixel and intermediate context operated on by the functional units 4308-1 top 4308-M. SIMD data memory 4306-1 to 4306-M is generally partitioned into (for example) up to 16 disjoint context areas, each with a programmable base address, with a common area accessible from all contexts that is used by the compiler for register spill/fill. The processor data memory 4328 contains input parameters, addressing context, and a spill/fill area for registers 4320-*i*. Processor data memory 4328 can have (for example) up to 16 disjoint local context areas that correspond to SIMD data memory 4306-1 to 4306-M contexts, each with a programmable base address.

Typically, the nodes (i.e., node 808-*i*), for example, have three configurations: 8 SIMD registers (first configuration); 32 SIMD registers (second configuration); and 32 SIMD registers plus three extra execution units in each of the smaller functional unit (third configuration).

Figure 71A:
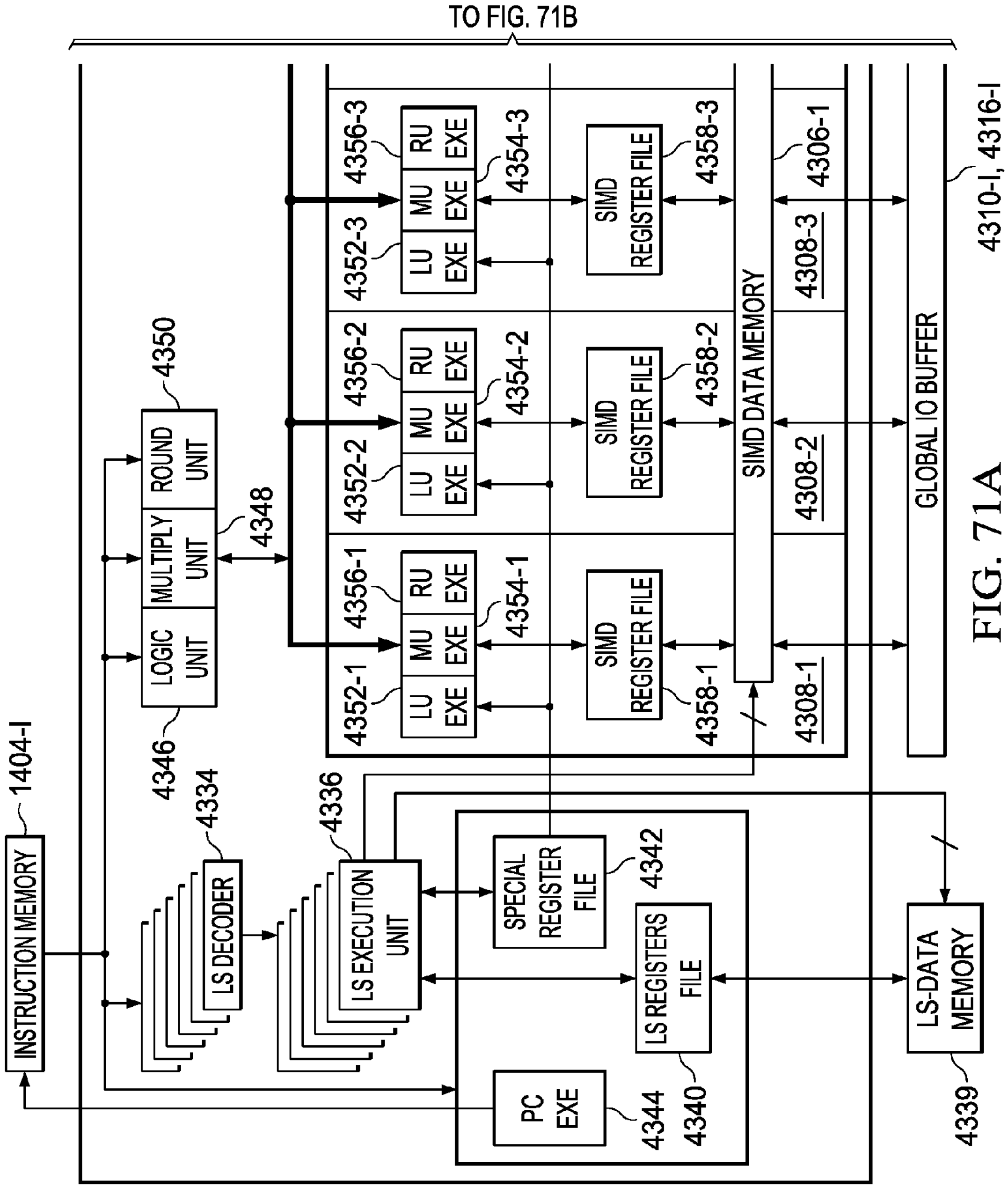
Figure 71:
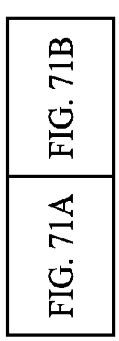
Figure 71B:
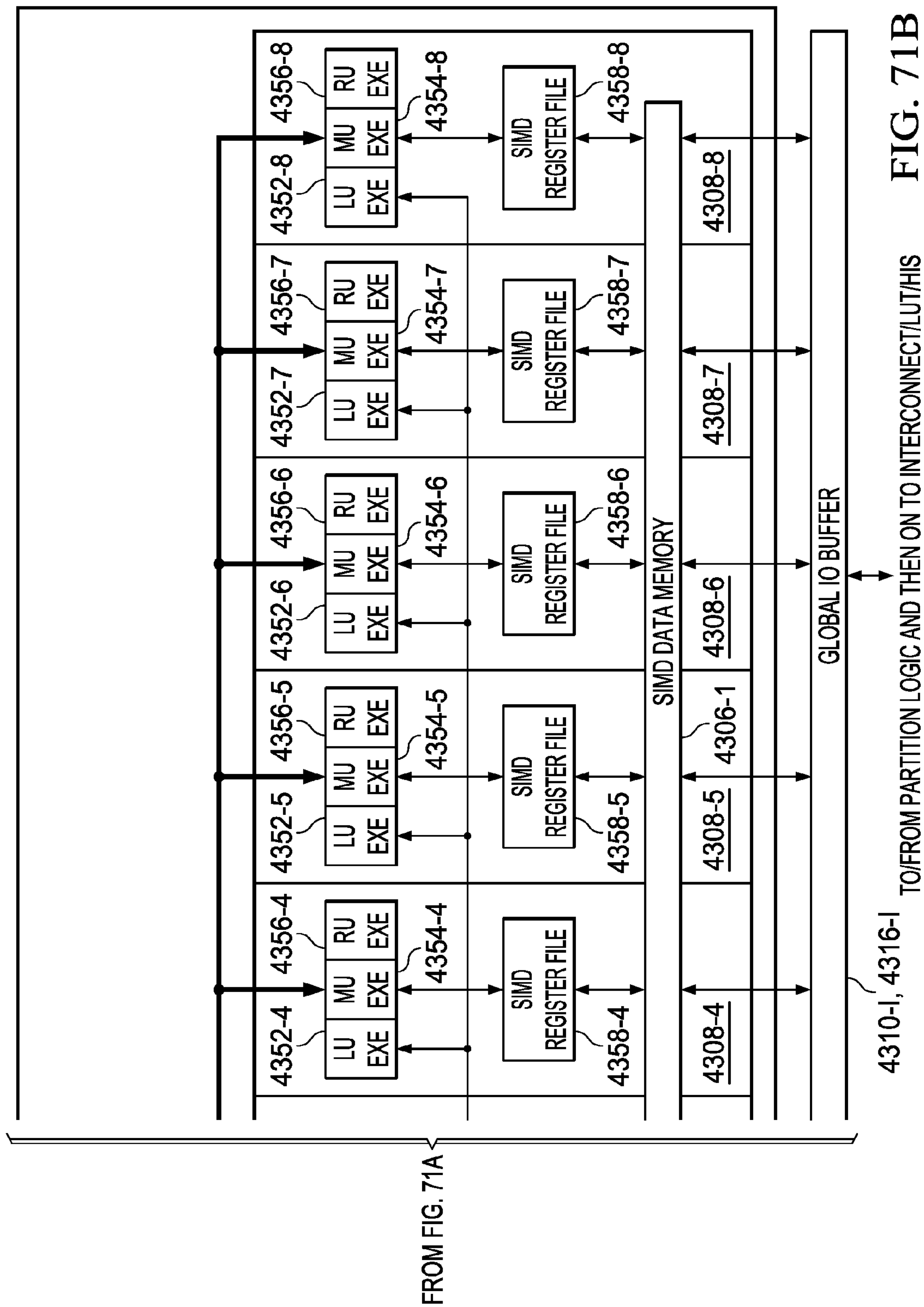

As an example, FIG. 71 shown an example of SIMD unit (namely, SIMD data memory 4306-1 and SIMD functional unit 4308-1), node processor 4322, and LS unit 4318-*i* in greater detail can be seen. As shown in this example, SIMD functional unit 4308-*i* is generally comprised of eight, smaller functional units 4338-1 to 4338-8 uses the third configuration.

Looking first to the processor core, the node processor 4322 generally executes all the control related instructions and holds all the address register values and special register values for SIMD units shown in register files 4340 and 4342 (respectively). Up to six (for example) memory instructions can be calculated in a cycle. For address register values, the address source operands are sent to node processor 4322 from the SIMD unit shown, and the node processor 4322 sends back the register values, which are then used by SIMD unit for address calculation. Similarly, for special register values, the special register source operands are sent to node processor 4322 from the SIMD unit shown, and the node processor 4322 sends back the register values.

Node processor 4322 can have (for example) 15 read ports and six write ports for SIMD. Typically, the 15 read ports include (for example) 12 read ports that accommodate two operands (i.e., lssrc and lssrc2) for each of six memory instructions and three ports for special register file 4312. Typically, special register file 4342 include two registers named RCLIPMIN and RCLIPMAX, which should be provided together and which are generally restricted to the lower four registers of the 16 entry register file 4342. RCLIPMAX and RCLIPMIN registers are then specified directly in the instruction. The other special registers RND and SCL are specified by a 4-bit register identifier and can be located anywhere in the 16 entry register file 4342. Additionally, node processor 4322 includes a program counter execution unit 4344, which can update the instruction memory 1404-*i*.

Turning now to the LS unit 4318-*i* and SIMD unit, the general structure for each can be seen in FIG. 71. As shown, the LS unit 4318-*i* generally comprises LS decoder 4334, LS execution unit 4336, logic unit 4346, multiply unit 4348, right execution unit 4350, and LS data memory 4339; however the details regarding the data path for LS unit 4318-*i* are provided below. Each of the smaller functional units 4338-1 through 4338-8 generally (and respectively) comprises SIMD register files 4358-1 to 4358-8 (which can each include 32 registers, for example), left logic units 4352-1 to 4352-8, multiply units 4354-1 to 4354-8, and right logic units 4356-1 to 4356-8. These left logic units 4352-1 to 4352-8, multiply units 4354-1 to 4354-8, and right logic units 4356-1 to 4356-8 are generally duplications of left, middle, and right units 4346, 4348, and 4350, respectively. Additionally, similar to the LS unit 4318-*i*, the data path for each functional unit 4338-1 to 4338-8 is described below.

Additionally, for the three example configurations for a node (i.e., node 808-*i*), the sizes of some components (i.e., logic unit 4352-1) or the corresponding instruction may vary, while others may remain the same. The LS data memory 4339, lookup table, and histogram remain relatively the same. Preferably, the LS data memory 4339 can be about 512*32 bits with the first 16 locations holding the context base addresses and the remaining locations being accessible by the contexts. The lookup table or LUT (which is generally within the PC execution unit 4344) can have up to 12 tables with a memory size of 16 Kb, wherein four bits can be used to select table and 14 bits can be used for addressing. Histograms (which are also generally located in the PC execution unit 4344) can have 4 tables, where the histogram shares the 4-bit ID with LUT to select a table and uses 8 bits for addressing. In Table 1 below, the instructions sizes for each of the three example configurations can be seen, which can correspond to the sizes of various components.

TABLE 1

| Component | First Configuration | Second Configuration | Third Configuration |
|---|---|---|---|
| Instruction memory (i.e., 1404-i), which is assumed to be shared with four nodes (i.e., 808-i) | Four sets of 1024 × 182 bits | Four sets of 1024 × 252 bits | Four sets of 1024 × 318 bits |
| Round unit (i.e., 3450) instruction | 16 bits | 22 bits | 22 bits |
| Multiply unit (i.e., 4348) instruction | 16 bits | 24 bits | 24 bits |
| Logic unit (i.e., 4346) instruction | 16 bits | 24 bits | 24 bits |
| LS unit instructions | 132 bits | 160 bits | 156 bits |
| Node processor 4322 instruction | 0 bits | 20 bits for | 20 bits |
| Context switch indication | 2 bits for | 2 bits | 2 bits |

TABLE 1-continued

| Component | First Configuration | Second Configuration | Third Configuration |
|---|---|---|---|
| arrangement of instruction line (Instruction Packet Format) | Context:C:LS1: LS2:LS3:LS4:LS5: LS6:LU:MU:RU | Context:C:LS1: T20:LS2:LS3: LS4:LS5:LS6: LU:MU:RU | Context:C:LS1: T20:LS2:LS3: LS4:LS5:LS6: LU:MU:RU |

6.3. SIMD Data Memory Examples

FIGS. 70 and 71 are two examples of arrangements for each SIMD data memory 4306-1 to 4306-M, but other arrangements are possible. Each SIMD data memory 4306-1 to 4306-M is generally comprised of a several memory banks. For example, each SIMD data memory 4306-1 to 4306-M can have 32 banks, having 6 ports to support 16 pixels, which is about 512×192 bits.

Figure 72:
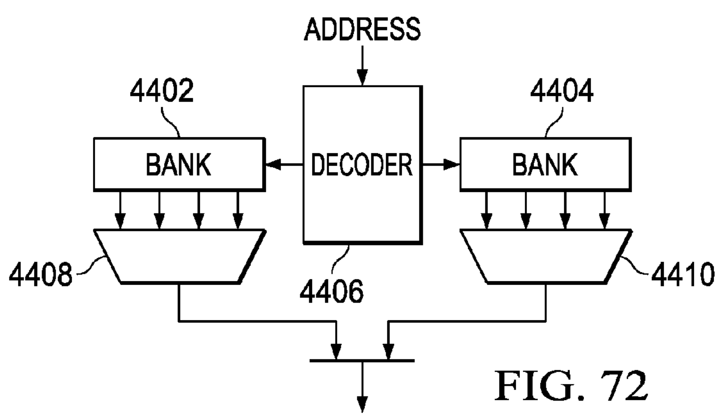
FIG. 72 is a diagram of an arrangement for a SIMD data memory.

Looking first to FIG. 72, this example of a SIMD data memory (i.e., 4306-*i*) employs two banks 4402 and 4404 with a single decoder 4406 that communicates with each bank 4402 and 4406. Each of the banks 4402 and 4404 is multiplexed by multiplexers 4408 and 4410, respectively. The outputs from multiplexers 4408 and 4410 are then merged to generate the output from the SIMD data memory. As an example, this SIMD data memory can be 256×96 bits, with each bank 4402 and 4404 being 64×192 bits and each multiplexer outputting 48 bits.

Figure 73:
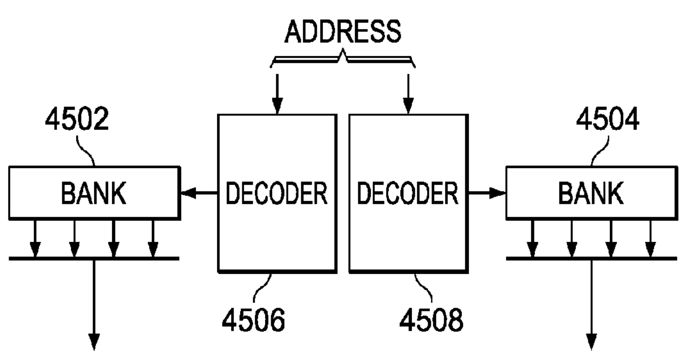
FIG. 73 is another diagram of an arrangement for a SIMD data memory.

Turning to FIG. 73, in this example of SIMD data memory (i.e., 4306-*i*), two separate decoders 4506 and 4508 are used. Each decoder 4506 and 4508 is associated with banks 4502 and 4504, respectively. The outputs from each bank 4506 and 4508 are then merged. As an example, this SIMD data memory can be 128×192 bits, with each bank 4502 and 4504 being 64×192 bits.

6.4. SIMD Functional Unit Example

As shown in FIGS. 70 and 71, each of SIMD functional units 4308-1 to 4308-M is comprised of many, smaller functional units (i.e., 4338-1 to 4338-8) that can perform compute operations.

Figure 74:
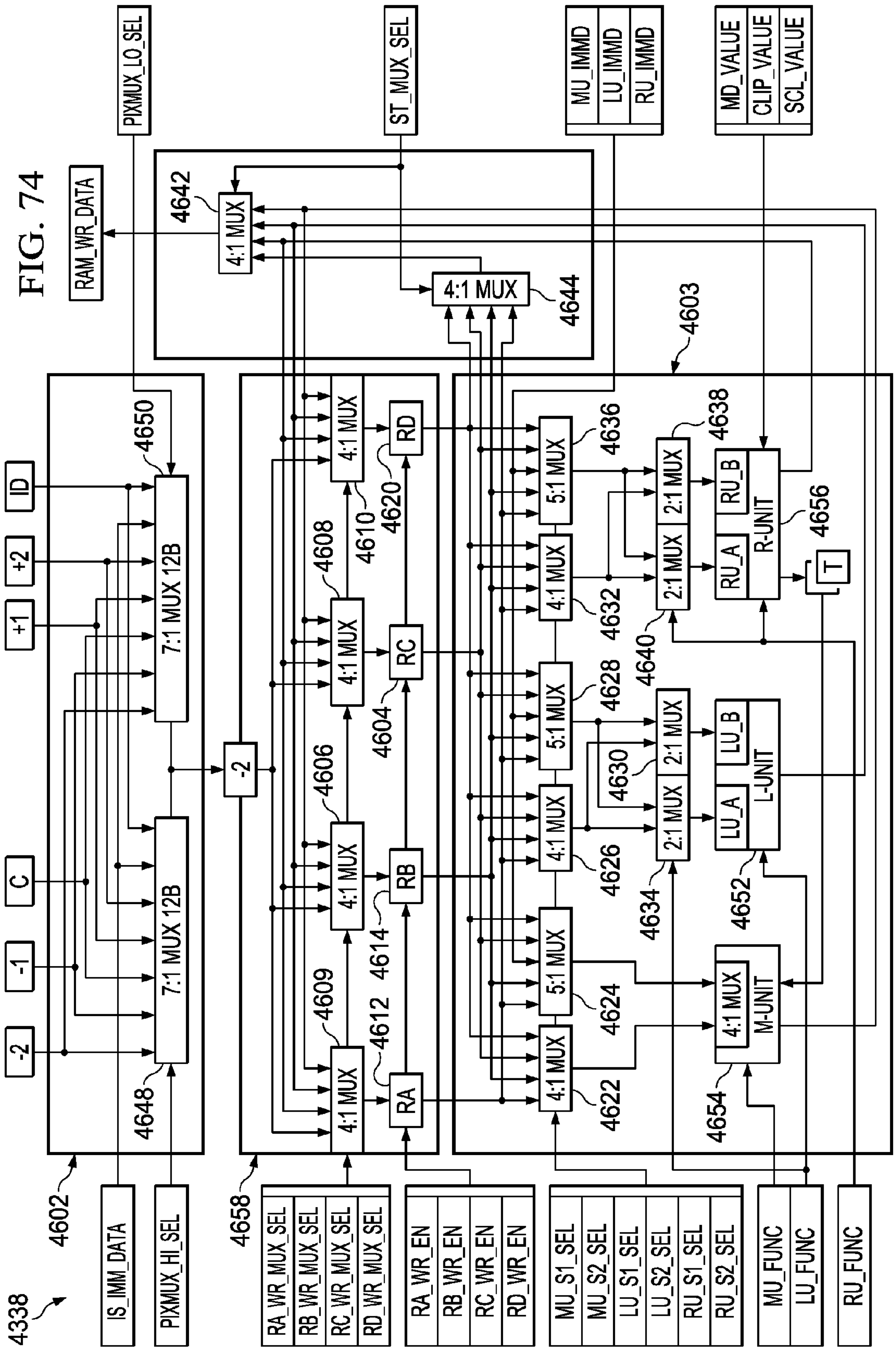
FIG. 74 is a diagram of an example data path for one of the smaller functional units.

In FIG. 74, an example data path for one of the many, smaller functional units (i.e., 4338-1 to 4338-8) can be seen. The SIMD data paths all generally execute the same 3-issue, Very Long Instruction Word (VLIW) instruction on different, neighboring sets of pixels (for example). A data path contains three functional units: one multiplier (Munit) and two for arithmetic, logical, and shift operations (Lunit and Runit). The latter two functional units can operate on packed data types containing two, 16-bit pixels, so the peak pixel operational throughput is five operations per SIMD data path per cycle, or 160 operations per node per cycle overlapped with up to four loads and two stores per cycle. Further parallelism is possible by operating multiple nodes in parallel, each executing up to 160 pixel operations per cycle. The node and system architectures are oriented around achieving a significant portion of this peak rate.

As shown, the functional unit (referred to here as 4338) includes a multiplexer or mux 4602, register file (referred to here as 4358), execution unit 4603, and mux 4644. Mux 4602 (which can be referred to as a pixel mux for imaging applications) includes muxes 4648 and 4650 (which are each, for example, 7:1 muxes). As shown, the register file 4658 generally comprises muxes 4604, 4606, 4608, and 4610 (which are each, for example, 4:1 muxes) and registers 4612, 4614, 4618, and 4620. Execution unit 4603 generally comprises muxes 4622, 4624, 4626, 4628, 1630, 4632, 4634, 4638, and 4640, (which are each, for example, one of a 2:1, 4:1, or 5:1 mux), multiply unit (referred to here as 4354), left logic unit (referred to here as 4352), and right logic unit (referred to here as 4656). Muxes 4244 and 4246 (which can, for example be 4:1 muxes) are also included. Typically, the mux 4602 can perform pixel selection (for example) based on an address that is provided. In Table 2 below, an example of pixel selection and pixel address can be seen.

TABLE 2

| Pixel Address | Pixel select |
|---|---|
| 000 | Center lane pixel |
| 001 | +1 pixel (right) |
| 010 | +2 pixel (right) |
| 011 | Not select any pixel |
| 111 | −1 pixel (left) |
| 110 | −2 pixel (left) |
| 101 | Not select any pixel |
| 100* | Select pre-set value (0 to F) depending on position |

In operation, functional unit 4338 performs operations in several stages. In the first stage, instructions are loaded from instruction memory (i.e., 1404-*i*) to an instruction register (i.e., LS register file 4340). These instructions are then decoded (by LS decoder 4334, for example). In the next few stages, there are typically pipeline delays that are one or more cycles in length. During this delay, several of the special register from file 4342 (such as CLIP, RND) can be read. Following the pipeline delays, the register file (i.e., register file 4342) is read, while the operands are muxed, and execution and write back to functional unit registers (i.e., SIMD register file 4358), with the result being forwarded to a parallel store instruction.

Figure 75:
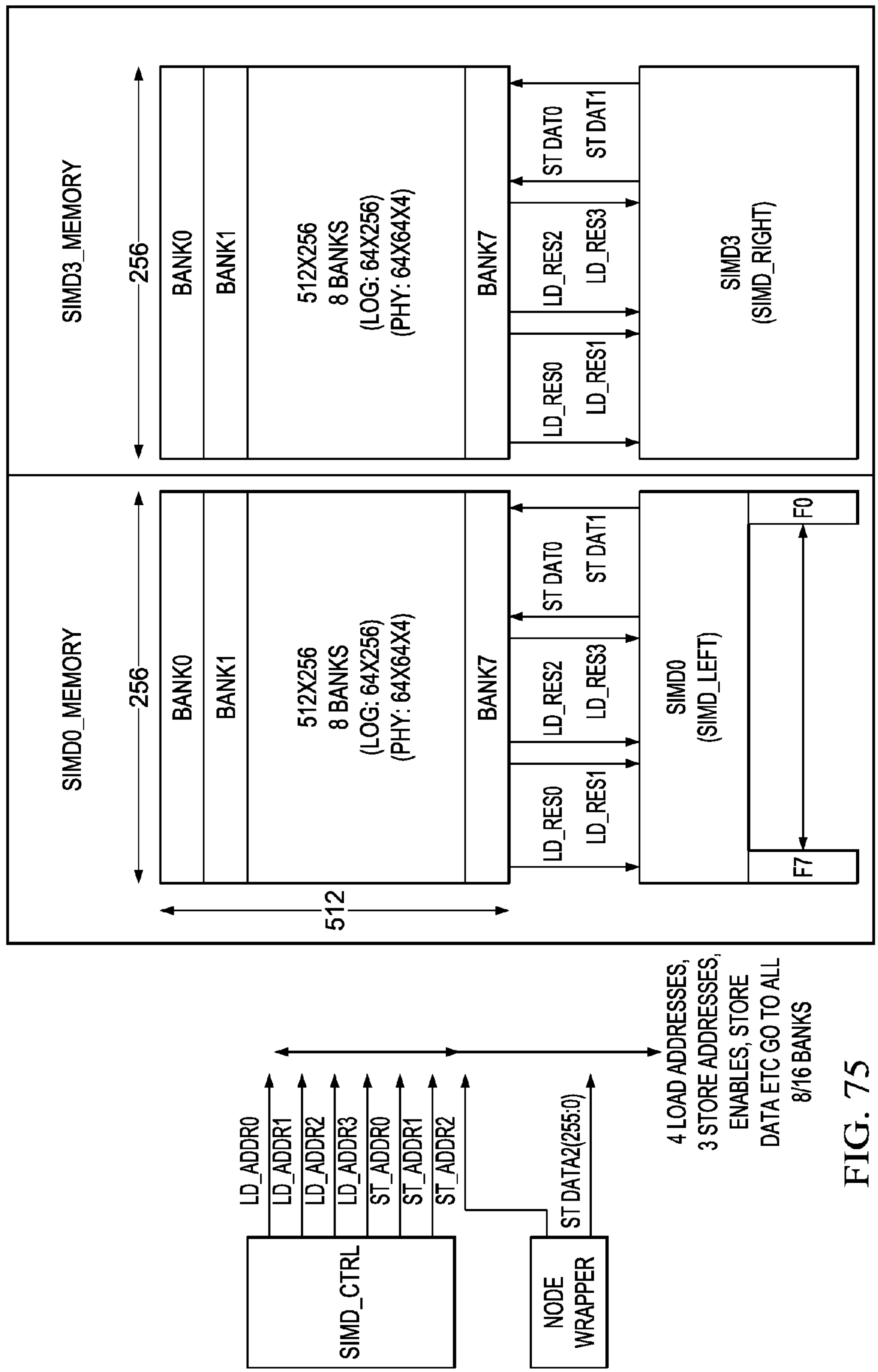
FIGS. 75-77 are diagrams depicting an example SIMD operation.
Figure 76:
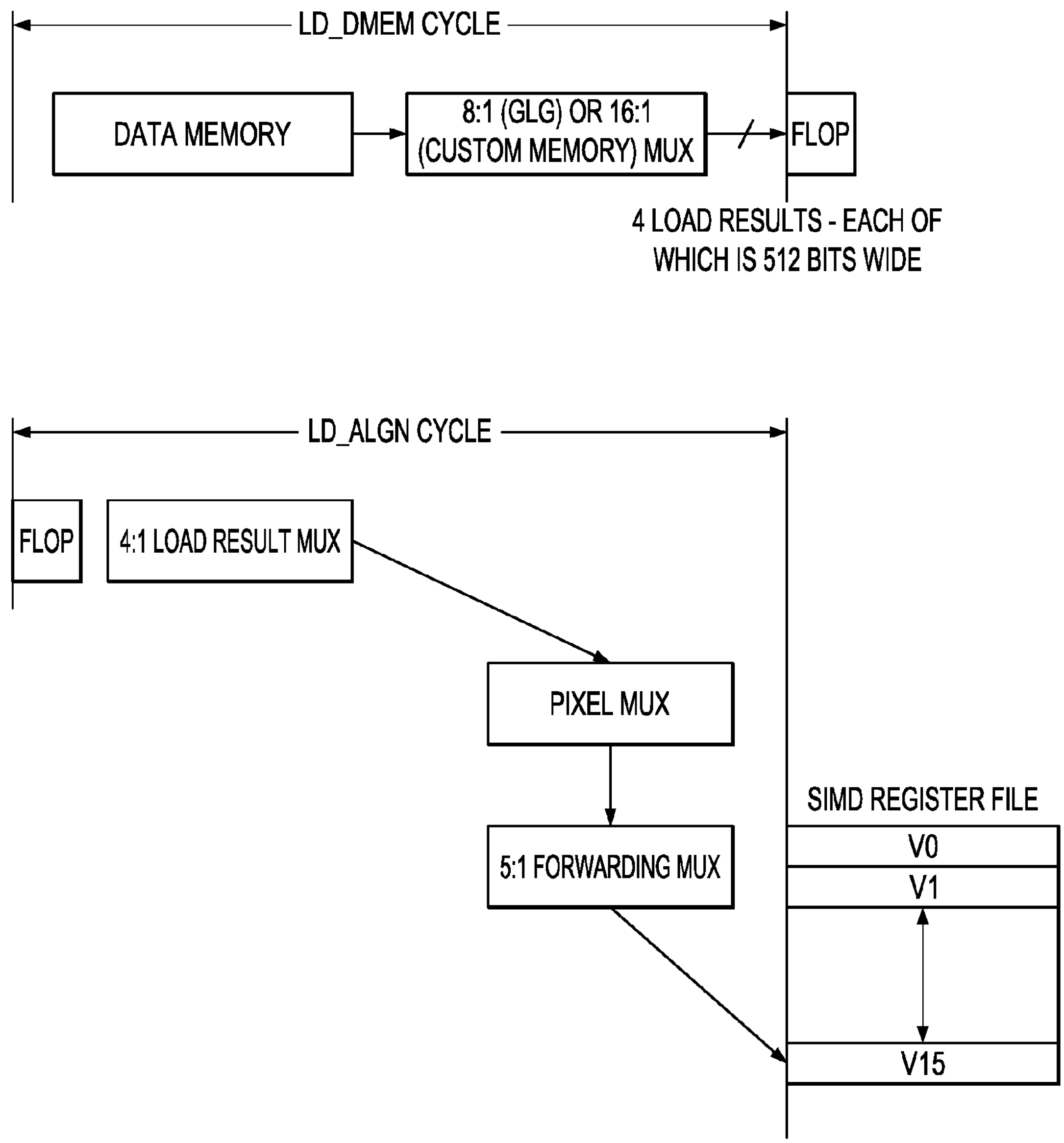
Figure 77:
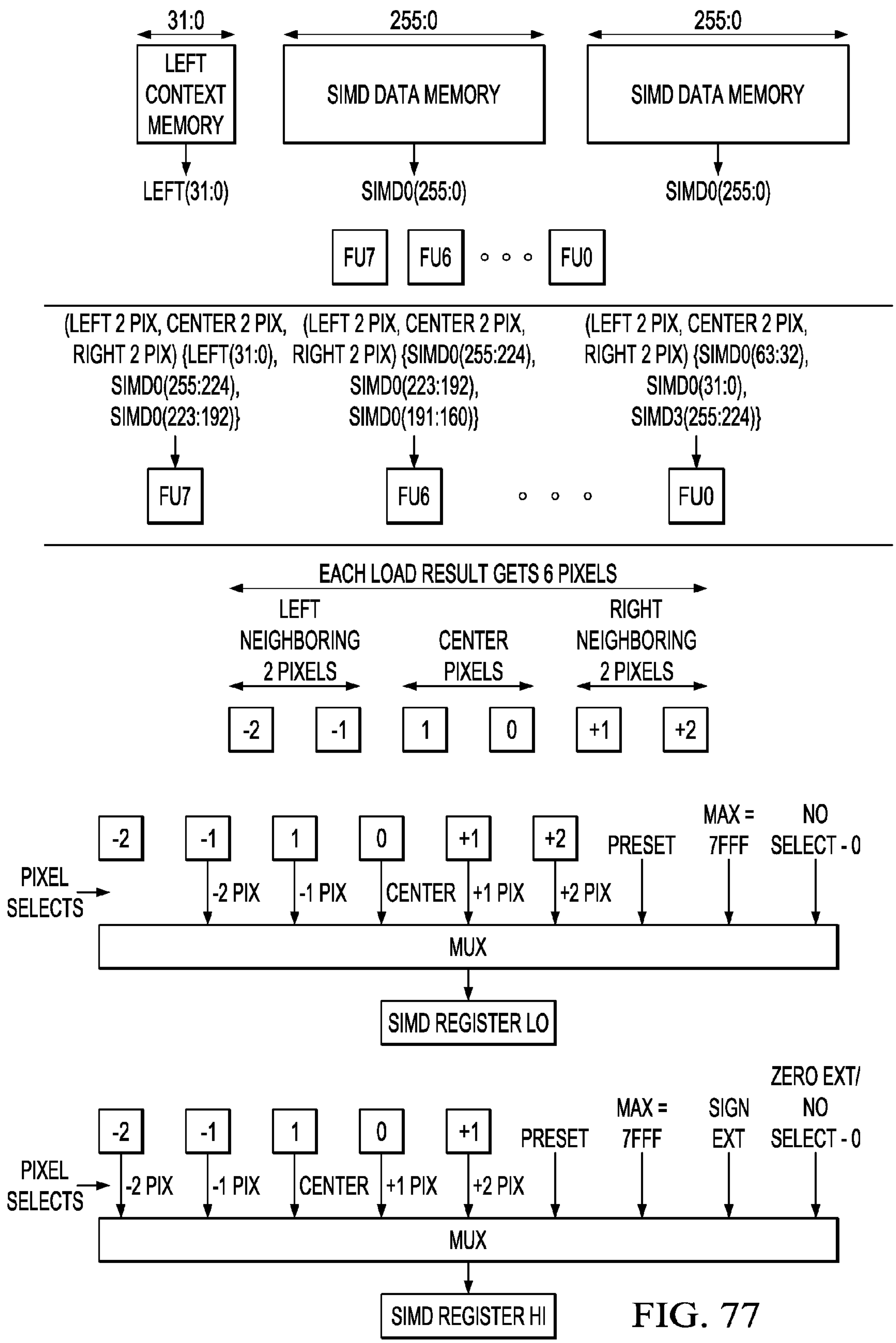

As an example (which is shown in FIGS. 75-77), when for the lower 16 bits, the pixel address is 001, it means, the neighboring pixel immediately to its right desires to get loaded into the lower 16 bits. Similarly when the pixel address is 010, the second neighboring pixel or 2 away from the central pixel lane desires to get loaded into the lower 16 bits. Similarly for the high portion of the register. These can be left neighboring pixels as well. To make this possible every load accesses the entire center context memory—all 512 bits so that any of the 6 pixels can be loaded into the SIMD register. When the pixel mux indicates that left or right neighboring pixels desire to be accessed and we are at the boundary—then the left and right context memories are also accessed—else they are not accessed. For Pixel address=100, following value gets preloaded into registers: {8'h pixel_position, 1'b simd_number, 4'h func_number} where func_number=4'hf for F0.lo pixel and 4'he for F0.hi pixel etc—F7.lo is 4'hl and F7.hi is 4'h0 where F7 is left most functional unit in a SIMD and F0 is the right most functional unit in a SIMD—this functional unit numbering is repeated for each SIMD. In other words the two SIMD are called simd_left (f7, f6 . . . f0) and simd_right (f7, f6 . . . f0). F7.hi is 4'h0 as that is how images are processed—left most pixel is the first pixel we process. There is position dependent processing that takes place and software desires to know the pixel position which it determines using this option. The simd_number is 0 for left most SIMD, 1 for right most SIMD. Pixel_position comes from descriptor and identifies the 32 pixels for pixel position dependent software.

6.5. SIMD Pipeline

Generally, SIMD pipeline for the nodes (i.e., 808-*i*) is an eight stage pipeline. In the first stage, an Instruction Packet is fetched from instruction memory (i.e., 1402-*i*) by the node processor (i.e., 4322). This Instruction Packet is then decoded in the second stage (where addresses are calculated and registers for address are read). In the third stage, bank conflicts are resolved and addresses are sent to the bank (i.e., SIMD data memory 4306-1 to 4306-M). In the fourth stage, data is loaded to the banks (i.e., SIMD data memory 4306-1 to 4306-M). A cycle can then be introduces (in the fifth stage) to provide flexability to the placement of data into the banks (i.e., SIMD data memory 4306-1 to 4306-M). SIMD execution is performed in the sixth stage, and data is stored in stages seven and eight.

The addresses for SIMD loads and SIMD stores are calculated using registers 4320-*i*. These registers 4320-*i* are read in decode stage, while address calculation are also performed. The address calculation can be either immediate address or register plus immediate or circular buffer addressing. The circular buffer addressing can also do boundary processing for loads. No boundary processing takes place for stores. Also, SIMD loads can indicate if the functional unit is accessing its central pixels or its neighboring pixels. The neighboring pixels can be its immediate 2 pixels on the left and right. Thus a SIMD register can (for example) receive 6 pixels—2 central pixels, 2 pixels on the left of the 2 central pixels and 2 pixels on the right of the 2 central pixels. The pixel mux is then used to steer the appropriate pixels into the low and high portion of the SIMD register. The address can be the same for the entire centre context and side context memories—that is all 512 bits of center context, 32 bits of left context and 32 bits of right context memory are accessed using this address—and there are 4 such loads. The data that gets loaded into the 16 functional units can be different as the data in SIMD DMEM's are different.

All addresses generated by SIMD and processor 4322 are offsets and are relative. They are made absolute by the addition of a base. SIMD data memory's base is called Context base and this is provided by node_wrapper which is added to the offset generated by SIMD. This absolute address is what is used to access SIMD data memory. The context base is stored in the context descriptors as described above and is maintained by node wrapper based 810-*i* on which context is executing. Similarly all processor 4322 addresses as well go through this transformation. The base address is kept in the top 8 locations of the data memory 4328 and again node wrapper 810-*i* provides the appropriate base to processor 4322 so that all addresses processor 4322 provides has this base added to its offset.

There is also a global area reserved for spills in SIMD data memory. Following instructions can be used to access the global area:

LD *uc9, ua6, dst

ST dst, *uc9, ua6

Where uc9 is from uc9[8:0]. When uc9[8] is set, then the context base from node wrapper is not added to calculate the address—the address is simply uc9[8:0]. If uc[8] is 0, then context base from wrapper is added. Using this support, variables can be stored from SIMD DMEM top address and grow downward like a stack by manipulating uc9.

6.6. VIP Register and Boundary Processing

Figures 78, 79:
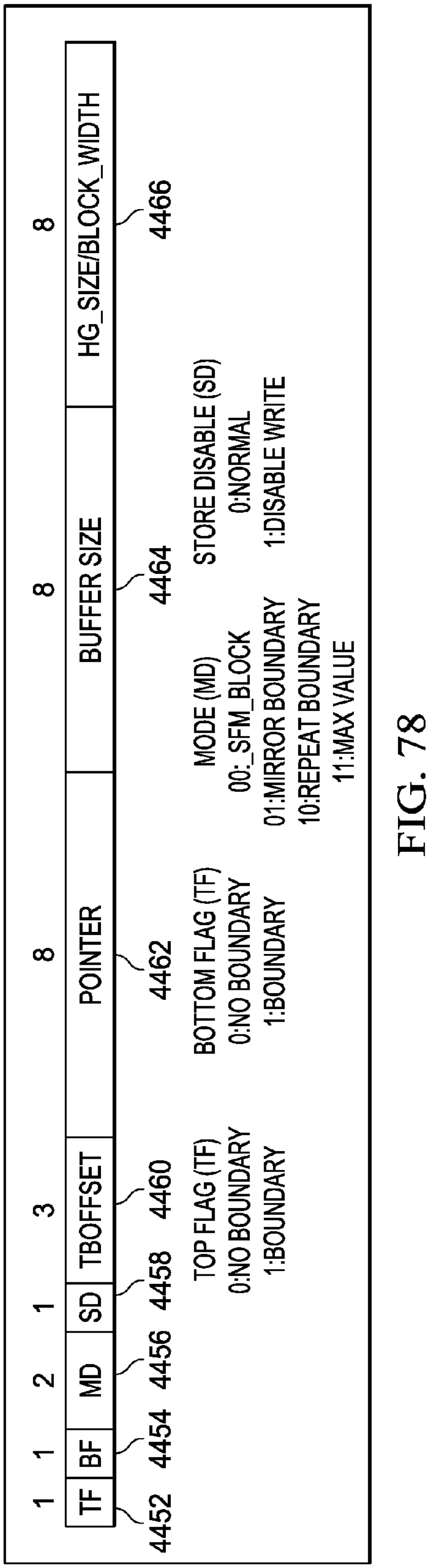
FIG. 78 is a example format for a Vertical Index Parameter (VIP)
FIG. 79 is a diagram of an example of mirroring.

SIMD loads/SIMD stores, scalar output, vector output instructions have 3 different addressing modes—immediate mode, register plus immediate mode, and circular buffer addressing mode. The circular buffer addressing mode is controlled by the Vertical Index Parameter (VIP) that is held in one of the registers 4320-*i* and has the following format shown in FIG. 78. The pointer and buffer size is 4 bits for node (i.e., 808-*i*). Top and Bottom boundary processing are performed when Top flag 4452 or Bottom flag 4454 is set. There is also a store disable 4456 (which is one bit), a mode 4458 (which is which is two bits that indicates a block, mirror boundary, a repeat boundary, and a maximum value), a TBOffset 4460 (which is three bits), a pointer 4462 (which is eight bits), a buffer size 4464 (which is eight bits), and an HG_Size/Block_Width 4466 (which is eight bits). The VIP register usually valid for circular buffer addressing mode—for the other 2 addressing modes, SD 4458 is set to 0. In SIMD, circular buffer addressing instructions are decoded as unique operations. The VIP register is the lssrc2 register and the various fields as shown above are extracted. A SIMD load instruction with circular buffer addressing mode is shown below:

LD .LS1-.LS4 *lssrc(lssrc2),sc4, ua6, dst

Circular buffer address calculation is done as follows:

```
if ((sc4 > 0( & BF & (sc4 > TBOffset))
    if (mode==2'b01)
        m = (2* TBOffset)−sc4
    else
        m = TBOffset
else if ((sc4 < 0) & TF & ((−sc4) > TBOffset))
    if (mode==2'b01)
        m = (−2*TBOffset)−sc4
    else
        m = −TBOffset
else
    m = sc4
```

Circular buffer address calculation is:

```
if (buffer_size == 0)
    Addr = lssrc + pointer + m
else if ((pointer + m >)= buffer_size
    Addr = lssrc + pointer + m − buffer_size
else if ((pointer + m) < 0)
    Addr = lssrc + pointer + m + buffer_size
else
    Addr = lssrc + pointer + m
```

In addition to performing boundary processing at the top and bottom, mirroring/repeating also affects what gets loaded into SIMD registers when we are the left and right boundaries as at the boundaries when we access neighboring pixels, there is no valid data.

When the frame is at the left or right edge, the descriptor will have Lf or Rt bits set. At the edges, the side context memories do not have valid data and hence the data from center context is either mirrored or repeated. Mirroring or repeating is indicated by mode bits in VIP register where: Mirror when mode bits=01; and Repeat when mode bits=10. Pixels at the left and right edges are mirrored/repeated as shown below in FIG. 79. Boundaries are at pixel 0 and N−1 Here as can be seen, if side context pixel −1 is accessed, pixel at location 1 or B is returned. Similarly for side context pixels −2, N and N+1.

When Max_mode is indicated and (TF=1) or (BF=1), then register gets loaded with max value of 16'h 7FFF. When Lf=1 or Rt=1 and max_mode is indicated, then again if side pixels are being accessed, the register gets loaded with max value of 16'h 7FFF. Note that both horizontal boundary processing (Lf=1 or Rt=1) and vertical boundary processing (TF=1 or BF=1 and mode!=2'b00) can happen at same time. Addresses do not matter when max_mode is indicated.

6.6. Partitions 6.6.1. Generally

Now, looking to the node wrapper 810-*i*, it used to schedule programs that reside in partition instruction memory 1404-*i*, signal events on the node 808-*i*, initialize the node configuration, and support node debug. The node wrapper 810-*i* has been described above with respect to scheduling, using its program queue 4230-*i*. Here, however, the hardware structure for the node wrapper 810-*i* is generally described.

Figure 80:
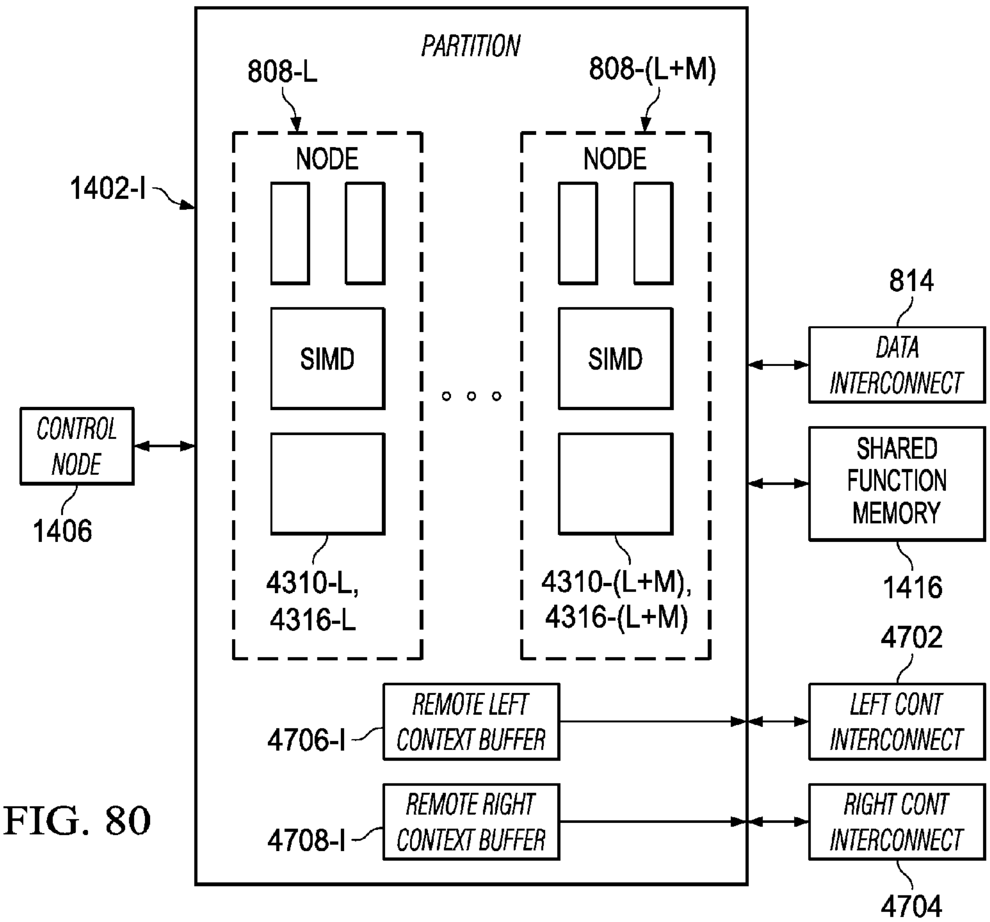
FIG. 80 is a diagram of an example partition.
Figure 81:
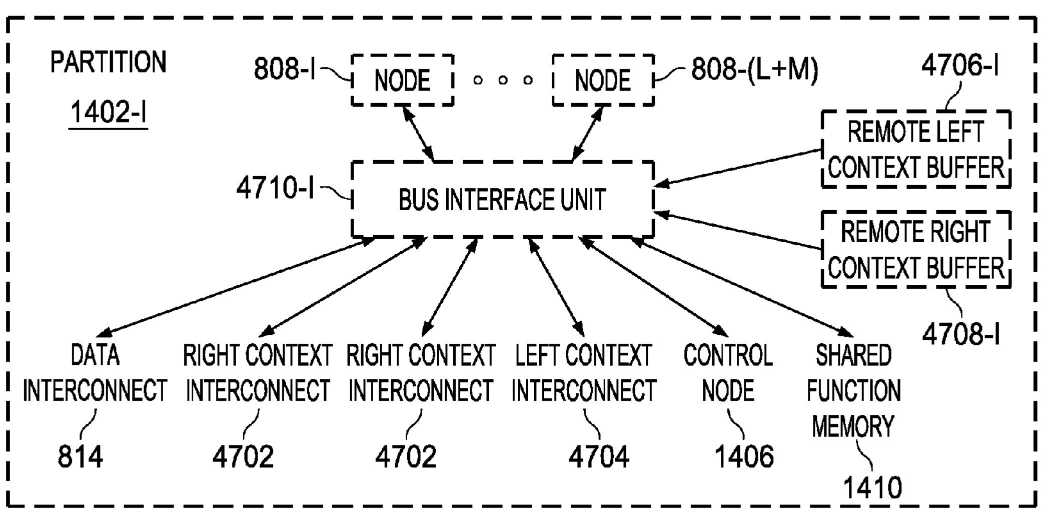
FIG. 81 is a diagram of another example partition.

In FIGS. 80 and 81, a partition can be seen in greater detail. Typically, there can be multiple partitions for a system (i.e., processing cluster 1400). Each partition 1402-*i* to 1402-R can include one or more nodes (i.e., 808-*i*); preferable, each partition (i.e., 1402-*i*) has between one and four nodes. Each node (i.e., 808-*i*) can communicate with one or more instruction memory (i.e., 1404-*i*) subsets.

As shown in FIGS. 80 and 81, example partition 1402-*i* includes nodes 808-1 to 808-(1+m), a remote context buffer 4706-*i*, a remote right context buffer 4708-*i*, and a bus interface unit (BIU) 4810-*i*. BIU 4810-*i* (which typically comprises a crossbar) generally provides an interface between the nodes 808-1 to 808-(1+M) and other components (i.e., control node 1406) using (for example) regular, ad-hoc signaling. Additionally, BIU 4810-*i* can perform the local interconnect, which routes traffic between nodes within a partition, and holds staging flops for all the interconnects.

Figure 82:
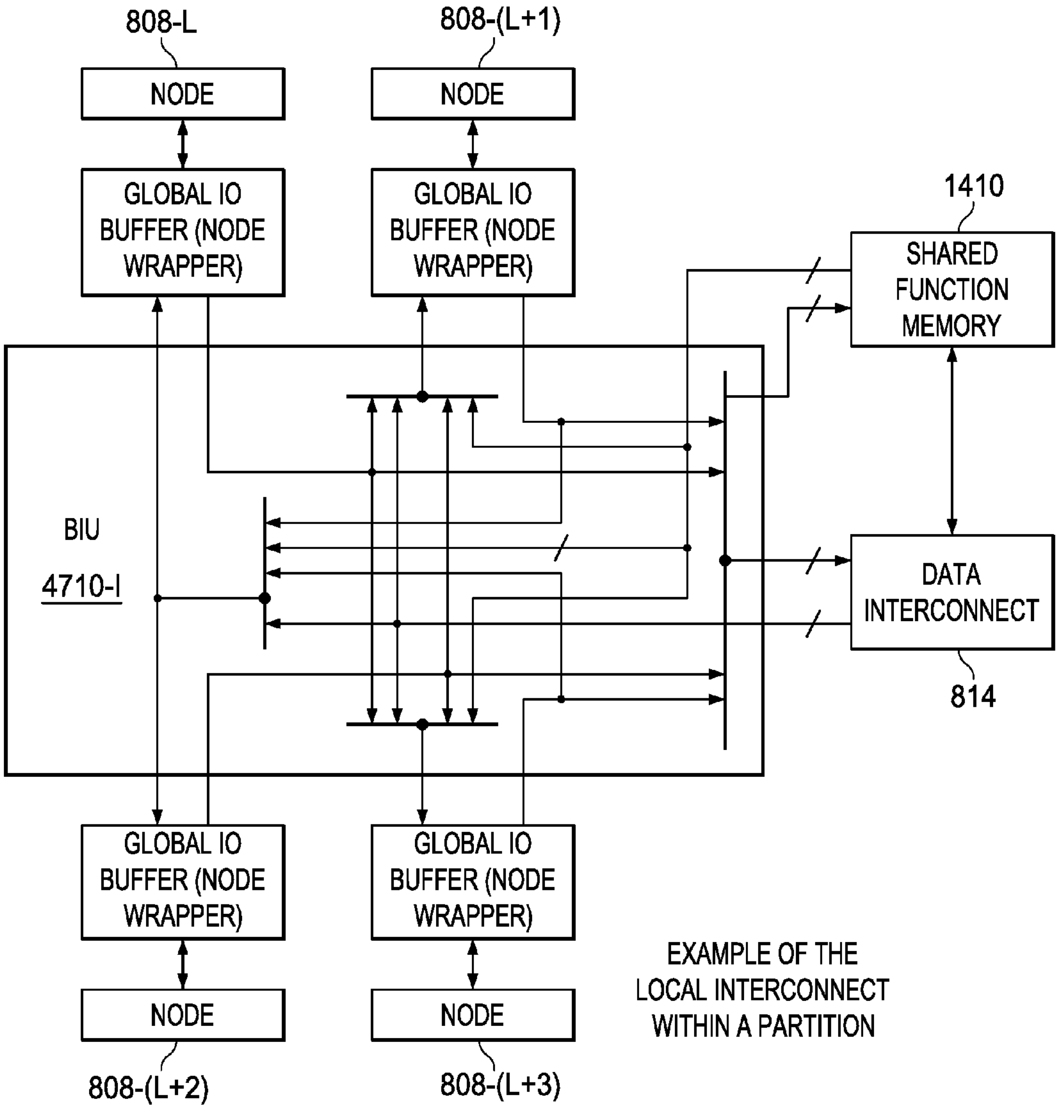
FIG. 82 is a diagram of an example of the local interconnect within a partition.

In FIG. 82, an example of the local interconnect within partition 1402-*i* can be seen (between nodes 808-1 to 808-(1+3). Generally, the global data interconnect is hierarchical in that there is a local interconnect inside the partition which arbitrates between the various nodes (i.e., 808-1 to 808-(1+4)) before communicating with the data interconnect 814. Data from the nodes 808-1 to 808-(1+4) can be written into global IO buffers (which are generally 16×768 bits) in each node 808-1 to 808-(1+3). When a node (i.e., 808-1) wins arbitration, it can send data (i.e., 768 bits for 64 pixels) in several (i.e., 4) beats of bit (i.e., 256 bits for 16 pixels) to the data interconnect 814. Arbitration will be left node to right node with left node having the highest priority. Incoming data from data interconnect 814 will generally be placed in the global IO buffer from where it will update SIMD data memory for the respective node (i.e., 808-1) when there are free cycles. If global IO buffer is full and SIMD is accessing SIMD data memory relatively constantly, which is preventing global IO buffer from updating SIMD data memory and there is incoming data for global IO buffer, node wrapper (i.e., 810-1) will stall SIMD to accept the data from interconnect 814. The local interconnect (through Bus Interface Unit BUI 4710-*i*) in the partition 1402-*i* can also forward data between nodes (i.e., 808-1) in the partition 1402-*i* without using data interconnect 814.

6.6.2 Node Wrapper

Now, looking to the node wrapper 810-*i*, it used to schedule programs that reside in partition instruction memory 1404-*i*, signal events on the node 808-*i*, initialize the node configuration, and support node debug. The node wrapper 810-*i* has been described above with respect to scheduling, using its program queue 4230-*i*. Here, however, the hardware structure for the node wrapper 810-*i* is generally described. Node wrapper 810-*i* generally comprises buffers for messaging, descriptor memory (which can be about 16×256 bits), and program queue 4230-*i*. Generally, node wrapper 810-*i* interprets messages and interacts with the SIMDs (SIMD data memories and functional units) for input/outputs as well as performing the task scheduling and PC to node processor 4322.

Within node wrapper 810-*i* is a message wrapper. This message wrapper has a several level entry (i.e., 2-entry) buffer that is used to hold messages, and when this buffer becomes full and the target is busy, the target can be stalled to empty the buffer. If the target is busy and then buffer is not full, then the buffer holds on to the message waiting for an empty cycle to update target.

Typically, the control node 1406 provides messages to the node wrapper 810-*i*. The messages from control node can follow this example pipeline:

(1) Incoming address, data;

(2) Command is accepted in cycle 2, if data is available—this is also accepted in cycle 2. The reason these are accepted in cycle 2 and not in cycle 1 is that there are some messages that should be serialized and therefore if a subsequent message comes in to same node, it should not be accepted while messages to other nodes can be accepted. This is generally done as multiple nodes share the same connection;

(3) Data is stored in flip-flops (within node wrapper 810-*i*) on rising edge of clock of cycle 3 and sent to multiple nodes;

(4) The 2-entry buffer is updated in node wrapper, buffer is read as soon as something is valid; and (5) Load/store data memory is updated in this cycle or SIMD descriptor or program Q A source notification message can then follow this example pipeline:

(1) Incoming command;

(2) The partition 4710-*i* accepts the command and then stalls any other messages to that particular node until the actions of source notification message are completed;

(3) Command is forwarded to message buffer (within node wrapper 810-*i*);

(4) Set up address for descriptor from context;

(5) Read descriptor memory—check Rvin, Lvin, Cvin—and, if free, then send source permission;

(6) If not free, then set up descriptor;

(7) Update pending permission information—the source notification message completes and at this point, it is free to accept a new message. If it is Cvin, Rvin and Lvin are free then send the command in this cycle for source permission.

The following information is also generally relevant for a source notification message from a read thread (i.e., 904):

(1) If the bus is tied up, then node wrapper (i.e., 810-*i*) holds on to the source permission message until the bus becomes free. Once the OCP transaction is committed, the source notification message completes and a new message can be accepted by that particular node (i.e., 808-*i*);

(2) If it is a read thread (i.e., 904), it also forwards the notification pointed to by the right context descriptor, where there are three possibilities:

a. To a neighboring node using direct path;

b. To itself—uses local path inside node wrapper (i.e., 810-*i*); and c. To a non-neighboring node.

(3) Using this forwarded notification, the node that got the forwarded notification then sends source permission to read thread. Using this source permission, read thread (i.e., 904) can then send a new source notification to this node. The node can then forward the source notification to the next node that is pointed to by right context pointer and the whole process repeats.

(4) It is important to note that when a read thread (i.e., 904) sends an initial source notification, it sends source permission to read thread and forwards the source notification to node pointed to by right context. So using one source notification, two source permissions are sent. Using this source permission, read thread sends a source notification which is then primarily used to forward the notification to a node pointed to by a right context pointer.

6.6.3. Data Endianism

Figure 83:
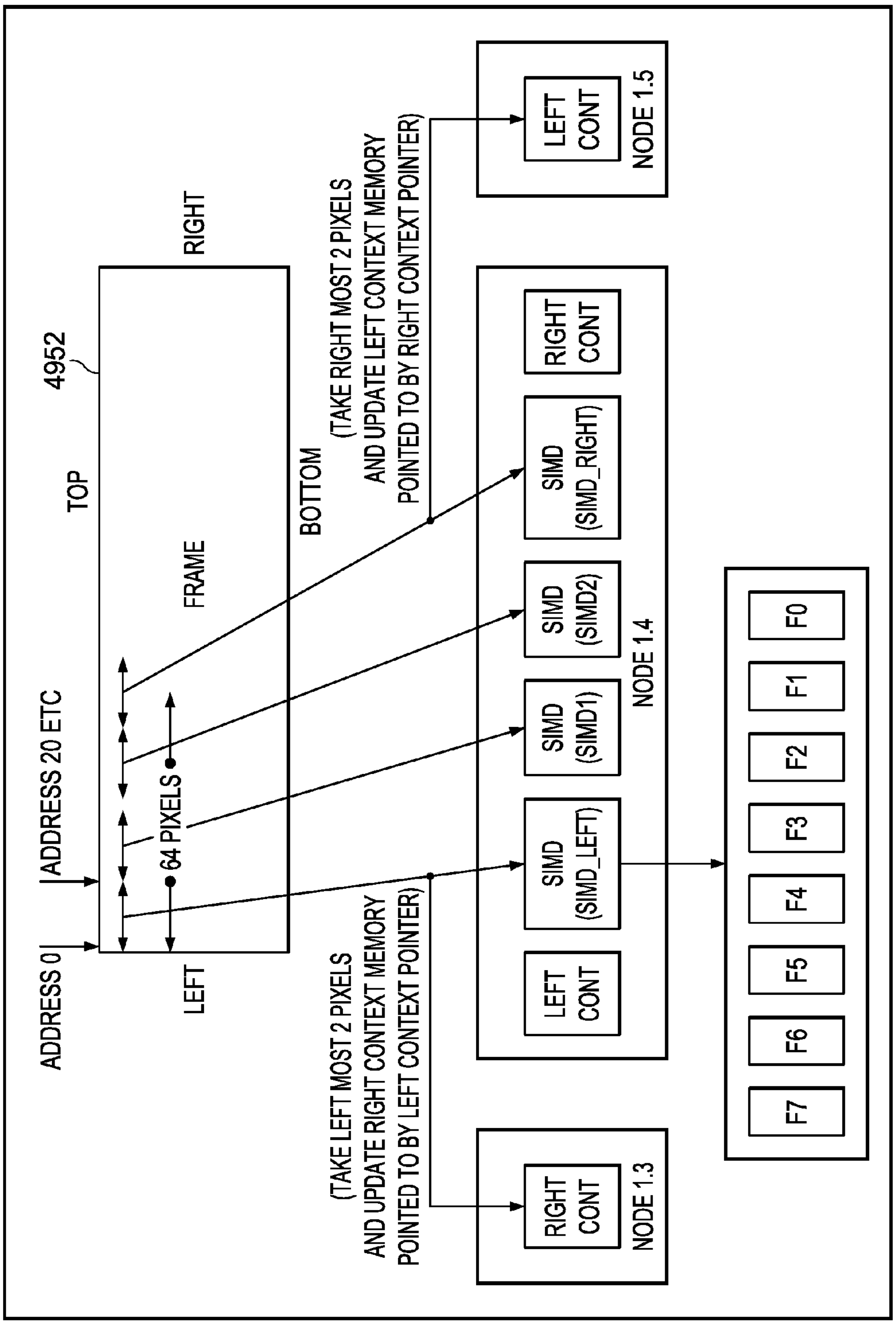
FIG. 83 is a diagram of an example of data endianism.

Turning to FIG. 83, an example of data endianism can be seen. Here, the GLS unit 1408 fetches the first 64 pixels from left side of frame 4952, where left most 16 pixels are at address 0, the next 16 pixels are at address 20 (after 256 bits or 32 bytes), and so forth. After fetching the data, the GLS unit 1408 fetches data and returns data to SIMD's with lower most address and then increasing addresses. The first packet of data is associated with the left most SIMD and not the right most one as one might expect.

Figure 84:
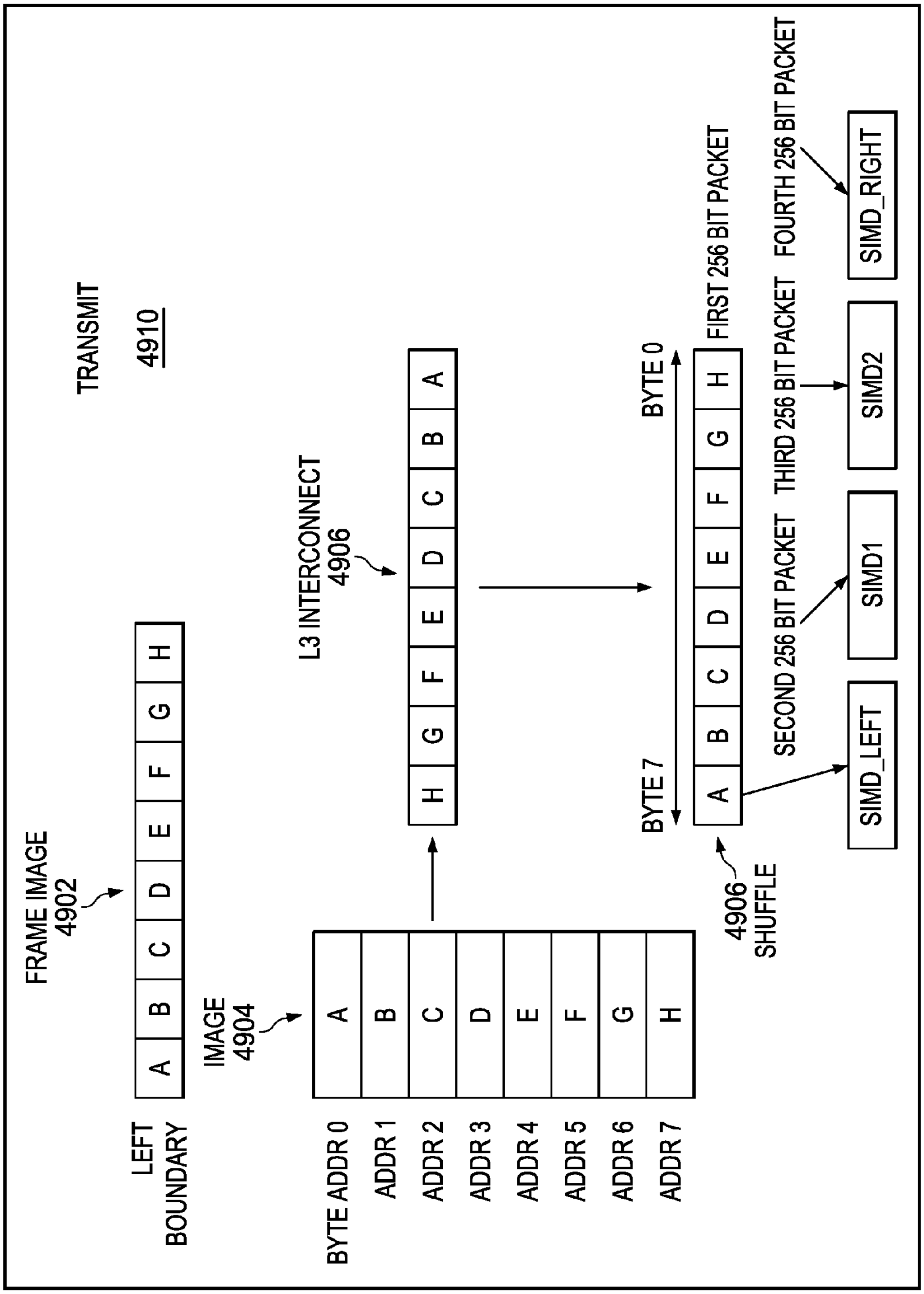
FIG. 84 depicts an example of data movement for an image.

Within a SIMD, the left most pixels are associated with functional units, with F7 being the left most functional unit, then higher addresses going to F6, F5, etc. The SIMD pre-set value which identifies the functional unit and SIMD are set with the following values—pixel_position is an 8 bit value that is in the descriptor context, preset_simd is 4 bit number identifying SIMD number and the least significant 4 bits are the functional unit number—ranging from 0 through f:

f0_preset0_data={pixel_position, preset_simd, 4'hf};
f0_preset1_data={pixel_position, preset_simd, 4'hc};
f1_preset0_data={pixel_position, preset_simd, 4'hd};
f1_preset1_data={pixel_position, preset_simd, 4'hc};
f2_preset0_data={pixel_position, preset_simd, 4'hb};
f2_preset1_data={pixel_position, preset_simd, 4'ha};
f3_preset0_data={pixel_position, preset_simd, 4'h9};
f3_preset1_data={pixel_position, preset_simd, 4'h8};
f4_preset0_data={pixel_position, preset_simd, 4'h7};
f4_preset1_data={pixel_position, preset_simd, 4'h6};
f5_preset0_data={pixel_position, preset_simd, 4'h5};
f5_preset1_data={pixel_position, preset_simd, 4'h4};
f6_preset0_data={pixel_position, preset_simd, 4'h3};
f6_preset1_data={pixel_position, preset_simd, 4'h2};
f7_preset0_data={pixel_position, preset_simd, 4'h1};
f7_preset1_data={pixel_position, preset_simd, 4'h0};

FIG. 84 depicts an example of data movement for an image. The frame image 4902 in this example is separated in to eight portions, labeled A through H. These portions A through H are stored as an image 4904 in system memory 1416, having byte addresses 0 through 7, respectively. The L3 interconnect 1412 provides the portions in reverse order (from H to A) to the GLS unit 1408, which reshuffles the portions (to A through H). GLS unit 1408 then transmits in 4910 the data to the appropriate SIMD for processing.

6.6.4. IO Management

The global IO buffer (i.e., 4310-*i* and 4316-*i*) is generally comprised of two parts: a data structure (which is generally a 16×256 bit structure) and control structure (which is kept generally 4×18 bit structure). Generally, four entries are used for the data structure, since the data structure is 16 entries deep and each line of data occupies four entries. The control structure can be updated in two bursts with the first sets of data and, for example, can have the following fields:

(1) 9 bit address for data memory update
(2) 4-bit context—this will be destination context in the case of output/input
(3) 1-bit set valid
(4) 3-bit control field, which has the following encoding:
  i. 000: input
  ii. 001: reserved
  iii. 010: reserved
  iv. 011: reserved
  v. 100: reserved
  vi. 101: reserved
  vii. 111: NULL
(5) Input killed bit—this bit is used to control the update of SIMD data memory—if this bit is set to 1, then SIMD data memory is not updated.

When input data is provided, following information is also provided, which is what is used to update the control structure:

[8:0]: data memory offset
[12:9]: destination context number
[12]: set_valid
[13]: reserved
[15:14]: memory type
  00: instruction memory
  01: data memory
  10: shared functional memory
  11: reserved
[16]: fill
[17]: reserved
[18]: output/input killed
[25:19]: shared function-memory offset
[31:26]: reserved Typically, the data structure of the global IO buffer (i.e., 4310-*i* and 4316-*i*) can, for example, be made up of six of 16×256 bit buffers. When input data is received from data interconnect 814, the input data is placed in, for example, 4 entries of the first buffer. Once the first buffer is written, the next input will be placed in the second buffer. This way, when first buffer is being read to update SIMD data memory (i.e., 4306-1), the second buffer can receive data. The third through sixth buffers are used (for example) for outputs, lookup tables, and miscellaneous operations like Scalar output and node state read data. The third through sixth buffers are generally operated as one entity and data is loaded horizontally into one entry while the first and second buffers use takes 4 entries. The third through sixth buffers are generally designed to be width of the 4 SIMD's to reduce the time it takes to push output values or a lookup table value into the output buffers to one cycle rather than four cycles it would have taken if there had been one buffer that was loaded vertically like the first and second buffers.

An example of the write pipeline for the example arrangement described above is as follows. On the first clock cycle, a command and data (i.e., burst) are presented, which are accepted on the rising edge of the second clock cycle. In third clock cycle, the data is sent to the all of the nodes (i.e., 4) nodes of the partition (i.e., 1402-*i*). On the rising edge of the fourth clock cycle, the first entry of the first buffer from the global IO buffer (i.e., 4310-*i* and 4316-*i*) is updated. Thereafter, the remaining three entries are updated during the successive three clock cycles. Once entries for the first buffer are written, subsequent writes can be performed for the second buffer. There is a 2-bit (for example) counter that points to the appropriate buffer (i.e., first through sixth) to be written into, which is, for example, cycle seven for the second buffer, and twelve for the third buffer. Typically, four of the buffers can be unified into (for example) a 16×37 bit structure with the following fields:

9 bit address for data memory update—data memory offset
4 bit context—this will be destination context in the case of output/input
1 bit set valid—SV
3 bit control field which has the following encoding:
  000: miscellaneous—node state read, t20 read
  001: LUT
  010: HIS_I 011: HIS_W
100: HIS
101: output
110: scalar output
111: NULL 4 bit LUT/HIS type
2 bit LUT/HIS packed/unpacked information
Output Killed bit
7 bit FMEM offset
2 bit field:

Scalar output indicates lo, hi information
If control field is 000—then following is the definition of these 2 bits:

00: IMEM read
10: SIMD register read
11: SIMD data memory
01: processor read 4 bit context number that is issuing the vector output as this is used to send SN, Rt=1 and for outputs to write threads that desire to forward the SP message Turning now to the communication between global IO buffer (i.e., 4310-*i* and 4316-*i*) and the SIMD data structures of the nodes (i.e., 808-*i*). Global IO buffer read and update of SIMD generally has three phases, which are as follows: (1) center context update; (2) right side context update; and (3) left side context update. To do this, the descriptor is first read using context number that is stored in the control structure, which can be performed in the first two clock cycles (for example). If the descriptor is busy, then read of descriptor is stalled till descriptor can be read. When the descriptor is read in a third clock cycle (for example), the following examples information can be obtained from descriptor:

(1) a 4-bit Right Context;
(2) a 4-bit Right node;
(3) a 4-bit Left Context;
(4) a 4-bit Left node;
(5) a Context Base; and
(6) Lf and Rt bits to see if side context updates should be done.

Typically, the context base is also added to SIMD data memory in this third cycle, and above information is stored on in a fourth cycle. Additionally, in the third clock cycle, a read for a buffer within global IO buffer (i.e., 4310-*i* and 4316-*i*) is setup, and the read is performed in the fourth cycle, reading, for example 256, bits of data. This data is then muxed and flopped in a fifth clock cycle, and the center context can be setup to be updated in a sixth clock cycle. If there is a bank conflict, then it can be stalled. At the same time, the right most two pixels can be sent for update using right context pointer (which generally consists of context number and node number). The right context pointer can be examined to see if there is a direct update to neighboring node (if the node number of current node+1=right context node number−then it is a direct update), a local update to itself (if the node number of current node=right context node number, then it is a local update to its own memories), or remote update to a node that is not a neighbor (if it is not direct or local, then it is a remote update).

Figure 85:
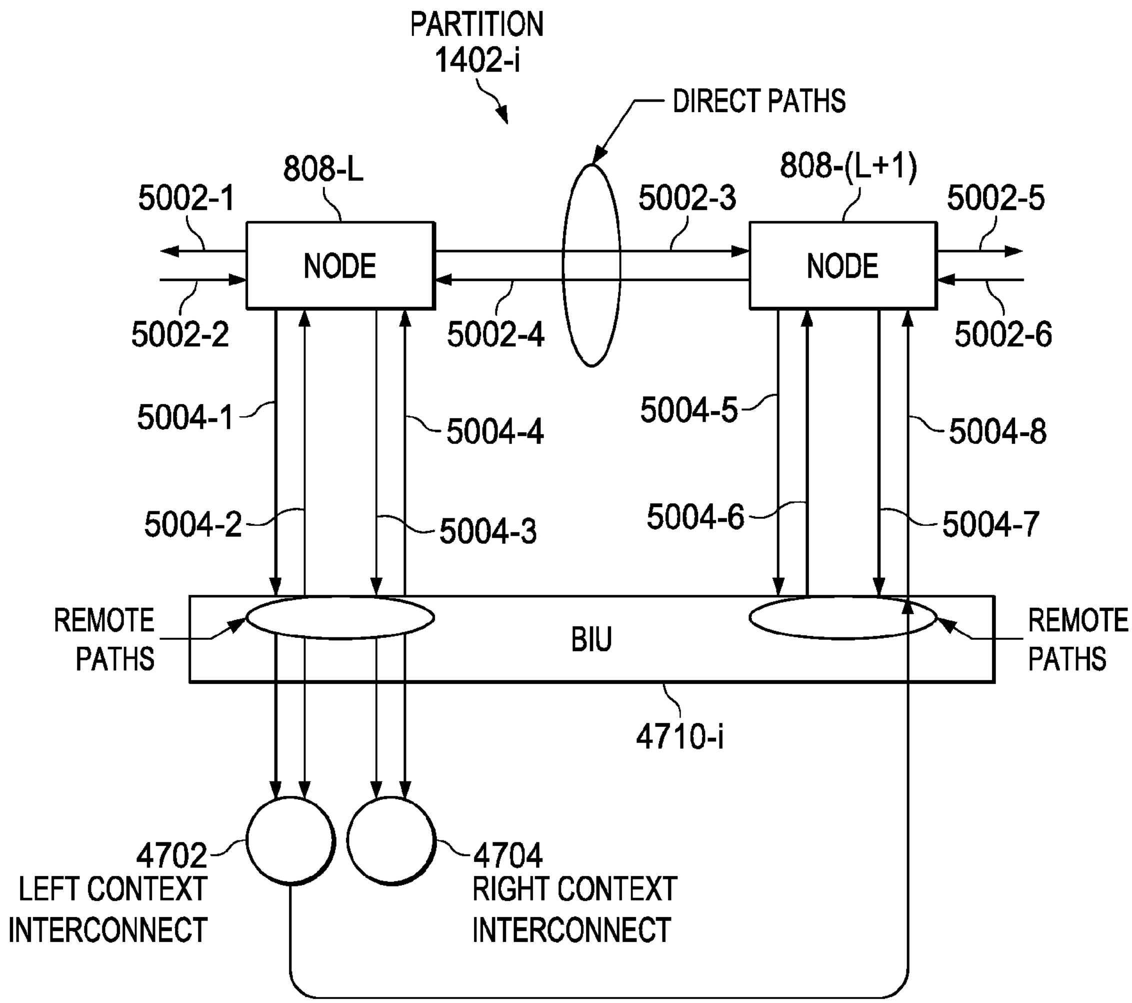
FIG. 85 is a diagram of a partition, which is shown in FIGS. 83 and 84, showing the busses for the direct paths and remote paths.

Looking first to direct/local updates, in the fifth clock cycle described above, there are various pieces of information are sent out on the bus (which can be 115 bits wide). This bus is generally wide enough to carry two stores worth of information for the two stores that are possible in each cycle. Typically, the composition of the bus is as follows:

[3:0]—DIR_CONT (content number);
[7:4]—DIR_CNTR (counter value used for dependency checking);
[16:8]—DIR_ADDR0 (address);
[48:17]—DIR_DATA0 (data);
[49]—DIR_EN0 (enable);
[51:50]—DIR_LOHI0;
[60:52]—DIR_ADDR1 (address);
[92:61]—DIR_DATA1 (data);
[93]—DIR_EN1 (enable);
[95:94]—DIR_LOHI1;
[96]—DIR_FWD_NOT_EN (forwarded notification enable);
[97]—DIR_INP_EN (input initiated side context updates);
[98]—SET_VIN (set_valid of right or left side contexts);
[99]—RST_VIN (reset state bits);
[100]—SET_VLC (set Valid Local state);
[101]—SN_FWD_BUSY;
[102]—INP_KILLED;
[103]—INP_BUF_FULL (indication of a full buffer);
[104]—OE_FWD_BUSY;
[105]—OT_FWD_BUSY;
[106]—SV_TH_BUSY;
[107]—SV_SNRT_BUSY;
[108]—WB_FULL;
[109]—REM_R_FULL;
[110]—REM_L_FULL;
[111]—LOC_LBUF_FULL;
[112]—LOC_RBUF_FULL;
[113]—LOC_RST_BUSY;
[114]—LOC_LST_BUSY;
[118:115]-ACT_CONT; and
[119]—ACT_CONT_VAL Turning to FIG. 85, partition 1402-*i* (which is shown in FIGS. 80 through 82) can be seen, showing the busses for the direct paths (5002-1 to 5002-6) and remote paths (5004-1 to 5004-8). Typically, these buses 5002-1 to 5002-6 and 5004-1 to 5004-8 can be 115 bits wide. As shown, there are direct paths between nodes 808-1 and 808-(1+1) (as well as other nodes within partition 1402-*i*), which are used for inputs and store updates when information is sent using right or left context pointers. Additionally, there are remote paths available through BIU 4170-*i*.

When data is made available through data interconnect 814, the data can include a Set_Valid flag on the thirteen bit ([12]), as detailed above. A program can be dependent on several inputs, which are recorded in the descriptor, namely the In and #Inp bits. The In bit indicates that this program may desire input data and the #In bit indicates the number of streams. Once all the streams are received, the program can begin executing. It is important to remember that for a context to begin executing, Cvin, Rvin and Lvin should be set to 1. When Set Valid is received, the descriptor is checked to see if the number of Set_Valid's received is equal to number of inputs. If the number of Set_Valid's is not equal to number of inputs, then the SetValC field (two bit fields that indicates how many Set_Valid's have been received) is updated. When the number of Set_Valid's is equal to number of inputs, then the Cvin state of descriptor memory is set to 1. When the center context data memory is updated, this will spawn side context updates on the left and right using the left and right context pointers. The side contexts will obtain a context number, which will be used to read the descriptor to obtain the context base to be added to the data memory offset. At about the same point, the side context will obtain the #Inputs and SetValR, SetValL and update Rvin and Lvin in a similar manner to Cvin.

Turning now to remote updates of side contexts, remote updates are sent through a partition's BUI (i.e., 4710-*i*). For remote paths (as shown in FIG. 85), there are no buffers in node wrapper (i.e., 810-*i*); the buffers are located in the BIU (i.e., 4710-*i*). Data is typically captured in a 2 entry buffer in BIU (i.e., 4710-*i*), which can be forwarded to context interconnect (i.e., 4702). Remote updates through left context pointer use left context interconnect 4702, while the right pointer uses the right context interconnect 4704. Generally, the interconnects 4702 and 4704 carry data on a 128-bit data bus. For data received by a partition (i.e., 1402-*i*), remotely, the data is received in a buffer in receiving partition's BIU (4710-*i*), which can then be forwarded to the appropriate node.

Typically, there are two types of remote transactions: master transactions and slave transactions. For master transactions, the buffer in BIU (i.e., 4710-*i*) is generally two entries deep, where each entry is the full bus width wide. For example, each entry can be 115 entries as this buffer can be used for side context update for stores, which can be two every cycles. For slave transaction, however, the buffer in the BIU (i.e., 4710-*i*) is generally three entries deep, being about two stores wide each (for example, 115 bits).

Additionally, each partition does interact with the shared function-memory 1410, but this interaction is described below.

6.6.5. Properties of Dependency Checking for Stores

The dependency checking is based on address (typically 9 bits) match and context (typically 4 bits) match. All addresses are offsets for address comparison. Once the write buffer is read, the context base is added to offset from write buffer and then used for bank conflict detection with other accesses like loads.

When performing dependency, though, there are several properties that are to be considered. The first property is that real time dependency checking should to be done for left contexts. A reason is that sharing is typically performed in real-time using left contexts. When a right context is to be accessed, then a task switch should take place so that a different context can produce the right context data. The second property is that one write can be performed for a memory location—that is two writes should not be performed in a context to same address. If there is a necessity to perform two writes, then a task switch should take place. A reason is that the destination can be behind the source. If the source performs a write followed successively a read and a write again, then at the destination, the read will see the second write's value rather than the first write's value. Using the one write property, the dependency checking relies on the fact that matches will be unique in the write buffers, and no prioritization is required as there are no multiple matches. The right context memory write buffers generally serve as a holding place before the context memory is updated; no forwarding is provided. By design when a right context load executes, the data is already in side context memory. For inputs, both left and right side contexts can be accessed any time.

6.6.6. Left Context Dependency Checking

When center context stores are updated, the side context pointers are used update the left and right contexts. The stores pointed to by right context pointer go and update the left context memory pointed to by the right context pointer. These stores enter a, for example, a six entry Source Write Buffer at the destination. Two stores can enter this buffer every cycle, and two stores can be read out to update left context memory. The source node is sending these stores and updating Source Write Buffer at destination.

As described above, dependency checking is related to the relative location of the destination node with respect to source node. If the Lvlc bit is set, it means that source node is done, and all the data destination desires have been computed. When node executes store, these stores update the left context memory of destination node, and this is the data that should to be provided when side context loads access the left context memory at destination. The left context memory is not updated by destination node; it is updated by source node. If the source node is ahead, then data has already been produced, and destination can readily access this data. If the source node is behind, then data is not ready; therefore, the destination node stalls. This is done by using counters, which are described above. The counters indicate whether source or destination is ahead or behind.

The source and destination node both can execute two stores in a cycle. The counters should to count at the right time in order to determine the dependency checking. For example, if both the counters are at 0, the destination node can execute the stores (source has not started or is synchronous), and after two delay slots, the destination node can execute a left side context load. To implement this scheme, destination node writes a 0 into left context memory ($33^{rd}$ bit or valid bit) so that when load executes, it will see a 0 on valid bit, which should stall the load. Since the store indication from source takes few of cycles to reach its destination, it is difficult to synchronize the source and destination write counters. Therefore, the stores at destination node enter a Destination Write buffer from where the stores will update a 0 into the left context memory. Note that normally a node does not update its left context memory; it is usually updated by a different node that is sharing the left context. But, to implement dependency checking, the destination node writes a 0 into the valid bit or $33^{rd}$ bit of the left context memory. When a load now matches against the destination write buffer, the load is stalled. The stalling destination counter value is saved and when the source counter is equal or greater than the saved stalled destination counter, then load is unstalled.

Now, if the source begins producing stores with same address, then, when stores enter the source write buffer with good data, the stores are compared against the destination write buffer, and if stores match, the "kill" bit is set in the destination write buffer which will prevent the store from updating side context memory with 0 valid bit as source write buffer has good data and it desires to update the side context memory with good data. If the source store does not come from source, the write at destination will update the left side context memory with a 0 into the valid bit or $33^{rd}$ bit. If a load accesses that address, then it will see a 0 and stall (note it is no longer in the destination write buffer). Thus a load can either stall due to: (1) matching against destination write buffer without the kill bit set (if the kill bit is set, then most likely the data is in source write buffer from where it can forward); or (2) does not match the destination write buffer—but finds a valid bit of 0 from side context load data. As mentioned, loads at destination node can forward from source write buffer or take data from side context memory provided the $33^{rd}$ bit or valid bit is 1. If the source write counter is greater than or equal to the destination counter, then the stores will not enter the destination write buffer.

6.6.7. Load Stall in SIMD

It should be noted that, in operation, loads first generate addresses, followed by accessing data memory (namely, SIMD data memory) and an update of the register file with the subsequent results. However, stalls can occur, and when a stall occurs, it occurs during between the accessing of data memory and the update of the register file. Generally, this stall can be due to: (1) a match against the destination write buffer; or (2) no match against the destination write buffer, but load result has its valid bit set as 0. This stall also generally coincides with address generation from subsequence packet of loads. For this load, which has stalled, its information saved so as to be recycled and once the load is successfully completed, and any following loads can proceed ahead of the stalled load. Typically, the save information generally comprises information used to restart the load, such as an address (i.e., an offset and context base), offset alone, pixel address, and so forth.

Following the update of the register file, data memory can be updates. Initially, indicators (i.e., dmem6_sten and dmem7_sten) can be used indicate stores are being set up to update data memory, and if the write buffers are full, then the stores will not be sent in following cycle. However, if the write buffers are not full, the stores can be sent to direct neighboring node, and the write buffer can be updated at the end of this cycle. Additionally, addresses can be compares against write buffers—node wrappers (i.e., 810-*i*) from two nodes are generally close to each other—not more than 1000 μm route as an example. A new counter value is also reflected in this cycle, for example, a "2" if two stores are present.

Typically, there are two local buffers (for example) which are filled from the write buffers when empty. For example, if there is one entry in write buffer, one gets filled. Since, for example, there are two write buffers, the write buffers can be read in a round-robin fashion if destination write buffer is valid; otherwise, the source write buffer is read every time the local buffer is empty. During a write buffer read so as to provide entries for the local buffers, an offset can be added to the context base. If a local buffer contains data, bank conflict detection can be performed with 4 loads. If there are no bank conflicts, both can set up the side context memories.

For the left side context memory, there is one more write buffer used for local and remote stores. Both remote and local stores can happen at about same time, but local stores are given higher priority compared to remote stores. To accommodate this feature, local stores follow same pipeline as direct stores, namely:

(1) stores from execute stage—dmem6_sten and dmem7_sten are enabled—if write buffer is full, then pipeline is stalled and the two stores in this cycle are held locally in node wrapper (i.e., 810-*i*)
(2) stores are placed into write buffer end of this cycle if write buffer was not full in cycle 1. If write buffer was full, then stall signal dm_store_mid_rdy is de-asserted and SIMD will stall.

Remote stores, on the other hand, can be performed as follows:

(1) address and data stored (flopped) into a partition's BIU (i.e., 4710-*i*)
(2) the remote stores are placed into a local buffer that is shared between all nodes of a partition (1402-*i*)
(3) this local buffer is read and the remote stores are nodes (i.e., 808-*i*)
    a. if local store is updating the write buffer in node wrapper (i.e. 810-*i*), then remote store is not read.
(4) write buffer is updated 6.6.8. Write Buffers Structure For the left side context, there can, for example, be three buffers: left source write buffer, a left destination write buffer, and a left local-remote write buffer. Each of these buffers can, for example, be six entries deep. Typically, the left source write buffer includes data, address offset, context base, lo_hi, and context number, where the context number and offset can be used for dependency checking. Additionally, forwarding of data can be provided with this left source write buffer. The left destination write buffer generally includes an address offset, context number, and context base, which can be used for dependency checking for concurrent tasks. The left local-remote write buffer generally includes data, address offset, context base, and lo_hi, but no forwarding is provided because the left local-remote write buffer is generally shared between local and remote paths. Round-robin filling occurs between the 3 write buffers, with a left destination write buffer, and a left local-remote write buffer sharing the round robin bit. Typically, there is one round robin bit; whenever destination write buffer or left local-remote write buffers are occupied then the round robin bit is 0. These buffers can update SIMD data memory, and every cycle the round robin bit can be flips between 0 and 1.

For the right side context, there can, for example, be are two write buffers: a direct traffic write buffer and a right local-remote write buffer. Each of these write buffers can, for example, be six entries deep. Typically, the direct traffic write buffer includes data, address offset, context base, lo_hi, and context number, while the right local-remote write buffer can include data, address offset, context base, and lo_hi. These buffers do not generally have dependency checking or forwarding. Write and read of these buffers is similar to left context write buffer. Generally, the priority between right context write buffer and input write buffer is similar to left side context memory—input write buffer updates go on the second port of the two write ports. Additionally, a separate round robin-bit is used to decide between the two write buffers on the right side.

A reason for a separate local-remote write buffers is that there can be concurrent traffic between direct and local, between direct and remote, and between local and remote. Managing all of this concurrent traffic becomes difficult without having the ability to update write buffer with several (i.e., 4 to 6) stores in one cycle. Building a write buffer that can update these stores in one cycle is difficult from a timing standpoint, and such a write buffer will generally have an area of a size similar to that of separate write buffers.

6.6.9. Write Buffers Stalls

Anytime there is any write buffer stall, other writes can be stalled. For example, if a node (i.e., 808-*i*) is updating direct traffic on the left and right side contexts and one of the buffers become full, traffic on both paths would be stalled. A reason is that, when the SIMD unstalls, the SIMD re-issues stores. It is generally important, though, to ensure that stores are not re-issued again to a write buffer. Due to the pipeline of write buffer allocation, full is indicated when there are several (i.e., 4) writes in the write buffer—that is even though two entries are available as they are empty. This way if there are two stores coming in, they can skid into the available write buffers. Using exact full detection would have required eight write buffers with two buffers for skid. Also note that when there is a stall, the stall does not see if the stall is due to one write buffer available or two write buffers available—it just stalls assuming that two stores were coming from core and two entries were not available.

6.6.10. Context Base Cache and Task Switches

The write buffers should maintain context numbers so that context bases can be added to offsets received from other nodes for updating SIMD data memory. The write buffers generally maintain context bases so that, when there is a task switch, to generally ensure that write buffers are not flushed, as this will be detrimental to performance. Also, it is possible that there could be stores from several different contexts in a write buffer, which would mean that the ability to either store all these multiple context bases or read the descriptor after reading them out of the write buffer (which can also be bad as the pipeline for emptying write buffers becomes longer) is desirable. In order to make sure we do not stall the write buffer allocation because we do not have the context base, descriptors desire to be read for the various paths as soon as tasks are ready to execute—this is done speculatively and the architectural copy is updated in various parts of the pipeline.

6.6.11. Speculative and Architectural States

As soon as a program has been updated, the program counter or PC is available as well as the base context. The base context can be used to: (1) fetch a SIMD context base from a descriptor; (2) fetch a processor data memory context base from a processor data memory; and (3) save side context pointers. This is done speculatively, and, once the program begins executing, the speculative copies are updated into architectural copies.

Architectural copies are updated as follows:

(1) SIMD context base is updated at beginning of a decode stage;

(2) active side context pointers are updated at the beginning of a stage where decisions as to if side context stores are to be used in a direct path or a local path or remote path are made;

(3) SIMD context base for stores are updated at the end of an execute stage; and (4) Descriptor base validity is also checked in the execution stage; if descriptor base is not valid, then store is stalled.

A reason architectural copies are updated in later stages is that there can be stores from the previous task that are using versions from the previous task; stores from two different tasks can be in the pipeline at the same time to facilitate fast context switches or 0 cycle context switches.

Speculative copies are updated at two points:

(1) if information is known about the number of cycles it takes to execute, then several (i.e., 10) cycles before task completion, the descriptor is read for the next context; and (2) if information is not known then, after a task switch takes place, the descriptor is read for the next context.

Task switches are indicated by software using (for example) a 2-bit flag. The task switches can indicate nop, release input context, set valid for outputs, or task switches. The 2-bit flag is decoded in a stage of instruction memory (i.e., 1404-*i*). For example, it can be assume that for a first clock cycle of Task 1 can then result in a task switch in a second clock cycle, and in the second clock cycle, a new instruction from instruction memory (i.e., 1404-*i*) is fetched for Task 2. The 2-bit flag is on a bus called cs_instr. Additionally, the PC can generally originate from two places: (1) from node wrapper (i.e., 810-*i*) from a program if the tasks have not encountered the BK bit; and (2) from context save memory if BK has been seen and task execution has wrapped back.

6.6.12. Task Preemption

Task pre-emption can be explained using two nodes 808-*i* and 808-(*i*+1) of FIG. 50. Node 808-*k* in this example has three contexts (context0, context1, and context2) assigned to program. Also, in this example, nodes 808-*i* and 808-(*i*+1) operate in an intra-node configuration, and node 808-(*k*+1), and the left context pointer for context 0 of node 808-(*k*+1) points to the right context2 of node 808-*k*.

There are relationships between the various contexts in node 808-*k* and reception of set_valid. When set_valid is received for context0, it sets Cvin for context0 and sets Rvin for context1. Since Lf=1 indicates left boundary, nothing should to be done for left context; similarly, if Rf is set, no Rvin should to be propagated. Once context1 receives Cvin, it propagates Rvin to context0, and since Lf=1, context0 is ready to execute. Context1 should generally that Rvin, Cvin and Lvin are set to 1 before execution, and, similarly, the same should be true for context2. Additionally, for context2, Rvin can be set to 1 when node 808-(*k*+1) receives a set_valid.

Rvlc and Lvlc are generally not examined until Bk=1 is reached after which task execution wraps around and at this point Rlvc and Lvlc should be examined. Before Bk=1 is reached, the PC originates from another program, and, afterward, PC originates from context save memory. Concurrent tasks can resolve left context dependencies through write buffers, which have been described above, and right context dependencies can be resolved using programming rules described above.

The valid locals are treated like stores and can be paired with stores as well. The valid local are transmitted to the node wrapper (i.e., 810-*i*), and, from there, the direct, local or remote path can be taken to update Valid locals. These bits can be implemented in flip-flops, and the bit that is set is SET_VLC in the bus described above. The context num is carried on DIR_CONT. The resetting of VLC bits are done locally using previous context number that was saved away prior to the task switch—using a one cycle delayed version of CS_INSTR control.

As described above, there are various parameters that are checked to determine whether a task is ready. For now task pre-emption will be explained using input valids and local valids. But, this can be expanded to other parameters as well. Once Cvin, Rvin and Lvin are 1, a task is ready to execute (if Bk=1 has not been seen). Once task execution wraps around, in addition to Cvin, Rvin and Lvin, Rvlc and Lvlc can be checked. For concurrent tasks, Lvlc can be ignored as real time dependency checking takes over.

Also, when transitioning from between tasks (i.e., Task1 and Task2), the Lvlc for Task1 can be set when Task0 encounters context switch. At this point when the descriptor for Task1 is examined just before Task0 is about to complete using Task Interval counter, Task1 will not be ready as Lvlc is not set. However, Task1 is assumed to ready knowing that current task is 0 and next task is 1. Similarly when Task2 is, say, returning to Task 1, then again Rvlc for Task1 can be set by Task2; Rvlc can be set when context switch indication is present for Task2. Therefore, when Task1 is examined before Task2 is to be complete, Task1 will not be ready. Here again, Task1 is assumed to be ready knowing that current context is 2 and the next context to execute is 1. Of course, all the other variables (like input valids and the valid locals) should be set.

Task interval counter indicates the number of cycles a task is executing, and this data can be captured when the base context completes execution. Using Task0 and Task1 again in this example, when Task0 executes, the task interval counter is not valid. Therefore, after Task0 executes (during stage 1 of Task0 execution), speculative reads of descriptor, processor data memory are setup. The actual read happens in a subsequence stage of Task0 execution, and the speculative valid bits are set in anticipation of a task switch. During the next task switch, the speculative copies update the architectural copies as described earlier. Accessing the next context's information is not as ideal as using the task interval counter as checking whether the next context is valid or not immediately may result in a not ready task while waiting until the end of task completion may actually ready the task as more time has been given for task readiness checks. But, since counter is not valid, nothing else can be done. If there is a delay due to waiting for the task switch before checking to see if a task is ready, then task switch is delayed. It is generally important that all decisions—like which task to execute and so forth are made before the task switch flags are seen and when seen, task switch can occur immediately. Of course, there are cases where after the flag is seen, task switch cannot happen as the next task is waiting for input, and there is no other task/program to go to.

Once counter is valid, several (i.e. 10) cycles before the task is to be completed, the next context to execute is checked to whether it is ready. If it is not ready, then task pre-emption can be considered. If task pre-emption cannot be done as task pre-emption has already been done (one level of task pre-emption can be done), then program pre-emption can be considered. If no other program is ready, then current program can wait for the task to become ready.

When a task is stalled, then it can be awakened by valid inputs or local valid for context numbers that are in Nxt context number as described above. The Nxt context number can be copied with Base Context number when the program is updated. Also, when program pre-emption takes place, the pre-empted context number is stored in Nxt context number. If Bk has not been seen and task pre-emption takes place, then again Nxt context number has the next context that should execute. The wakeup condition initiates the program, and the program entries are checked one by one starting fromentry-0 until a ready entry is detected. If no entry is ready, then the process continues until a readyentry is detected which will then cause a program switch. The wakeup condition is a condition which can be used for detecting program pre-emption. When the task interval counter is several (i.e., 22) cycles (programmable value) before the task is going to complete, each programentry is checked to see if it is ready or not. If ready, then ready bits are set in the program which can be used if there are no ready tasks in current program.

Looking to task preemption, a program can be written as a first-in-first-out (FIFO) and can be read out in any order. The order can be determined by which program is ready next. The program readiness is determined several (i.e., 22) cycles before the currently executing task is going to complete. The program probes (i.e., 22 cycles) should complete before the final probe for the selected program/task is made (i.e., 10 cycles). If no tasks or programs are ready, then anytime a valid input or valid local comes in, the probe is re-started to figure out whichentry is ready.

The PC value to the node processor 4322 is several (i.e., 17) bits, and this value is obtained by shifting the several (i.e., 16) bits from Program left by (for example) 1 bit. When performing task switches using PC from context save memory—no shifting is required.

6.6.13. Outputs

When a context begins executing, the context first sends Source Notification to see if destination is a thread or not, which is indicated by a Source Permission. The reasoning behind the first mode of operation—out of reset is that when first starting, a node does not know if the output is to a thread (ordering required) or node (no ordering required). Therefore, it starts out by sending a SN message. The Lf=1 node generally does this. It will get back a SP message indicating it is not a thread. The SN and SP messages are tied together by a two bit src_tag when it comes to nodes. The Lf=1 node sends out SN message after it examines the output enables—which is most significant bit of the output destination descriptor. For every destination descriptor, a SN is sent. Note that destination can be changed in SP from what was indicated in destination descriptor—therefore usually take the destination information from SP message. Pipeline for this is as follows:

1) node starts executing—assume context 1-0 is executing—IF—by here the speculative copies of the destination descriptors would have been loaded. The real copies are loaded from the speculative copies at the end of IF stage. Each destination descriptor has the following information:
   a. seg, node, context and enable bit
2) in stage 2, the output enables are looked at—the first one is then selected
3) sent to partition_biu in this cycle
4) OCP access for SN is sent
5) The next output that is enabled then sends its information to partition_biu
6) OCP access for next SN is sent Four such SN messages can be sent from Lf=1 node. When a SP message is received, following actions now take place for 1-0:

1) SP comes on message interconnect 814:
   a. OCP access
   b. OCP access—cmd accept is given here
   c. Sent to node wrapper (i.e., 810-*i*)
   d. Rising edge of d), 2 entry buffer is updated and then read
   e. Desc is updated with OE, ThDstFlags
2) it updates the OE and ThDstFlags and
3) then it forwards the permission to its right context pointer—task 1-1. The right context pointer can be direct or local or remote.
4) If it is local, then in cycle f, address is set up to read descriptor
5) In cycle g, descriptor is read and right context pointer is saved away
6) The SP message is forwarded to right context pointed context which then sends a SN message Assuming this program had 1-0, 1-1 and 1-2 tasks with Bk=1 set on 1-2. Then Lf=1 context which is 1-0 sends SN for say two outputs enabled. Then SP message comes in for 1-0—which then forwards the "enable" to 1-1. When SP comes in for 1-1, OE for 1-1 is set to 1. Now that SP messages have been sent, outputs can be executed. If outputs are encountered before OE's are set, then we stall the SIMDs. This stall is like a bank conflict stall encountered in stage 3. Once the OEs are set, then stall goes away.

The program can then issue a set_valid using the 2 bit compiler flag which will reset the OE. Once the OE has been reset and we go back to executing 1-0, 1-1 etc, all contexts will now know that they are not a thread and hence can send a SN message. That is 1-0 which is Lf=1 context plus 1-1 and 1-2 will now send a SN message for outputs enabled. They will each receive a SP which will set their OE's and this time around they will not forward their SP messages like out of reset described earlier.

If the SP message indicates it is threaded, then OE is updated and data is provided to destination. Note that destination can be changed in SP message from what was indicated in destination descriptor—therefore usually take the destination information from SP message. When set_valid is executed by node, it will then forward the SP message it received to the right context pointer which will then send the SN to destination. The forwarding takes place when the output is read from the output buffer—this is so that we can avoid stalls in SIMD when there are back to back set_valid's. The set_valid for vector outputs is what causes the forwarding to happen. Scalar vector outputs do not do the forwarding—however both will reset the OE's.

The ua6[5:0] field (for scalar and vector outptuus) carries the following information:

Ua6[5]: set_valid

Ua6[4:3]: indicates size for scalar output

11: 32 bits

10: upper 16 bits if address bit[1] is 1—else lower 16 bits

00: HG_SIZE

01: unused

Ua6[2:0]: output number (for nodes/SFM—bits 1:0 are used)

Scalar outputs are also sent on message bus 1420 and send set_valid etc on following MReqInfo bits: (1) Bit 0: set_valid (internally remapped to bit 29 of message bus); and (2) Bit 1: output_killed (internally rem-mapped to bit 26 of message bus).

An SP messages is sent when CVIN, LRVIN and RLVIN are all 0's in addition to looking at the states for InSt. SN messages sends a 2 bit dst_tag field on bits 5:4 of payload data. These bits are from the destination descriptors—bits 14:13 which have been initialized by the TSys tool—these are static. The InSt bits are 2 bits wide and since we can have 4 outputs—there are 8 such bits and these occupy 15:8 of word 13 and replace the older pending permission bits and source thread bits. When the SN message comes in, dst_tag is used to index the 4 destination descriptors—if Dst_tag is 00—then InSt0 bits are read out—if pending permissions desires to be updated, word 8 is updated. InSt0 bits are 9:8 and InSt1 bits are 11:10 and so on. If the InSt bits are 00, then SP is sent and SP set 11. If now a SN message comes to same dst_tag, then InSt bits are moved to 10 and no SP message is sent. When CVIN is being set to 1, the InSt bits are checked—if they are 11, they are moved to 00. If they are 10, they are moved to 01. State 01 is equivalent to having a pending permission. When release_input comes, the SP is sent (provided CVIN, LRVIN and RLVIN are all 0's) and state bits are moved to 11 and the process repeats. Note that when release input comes and LRVIN and/or RLVIN are not 0, then when other contexts execute a release input, LRVIN and RLVIN will get locally reset when other contexts forward the release_input to reset LRVIN/RLVIN—at that point we check again if the 3 bits will be 0. If they are going to be 0—then pending permissions will be sent. When InSt=00 and CVIN, LRVIN and RLVIN are not 0's, then InSt bits move to 01 from where pending permissions are sent when release input is executed.

6.6.14. SIMD Stalls

Figure 86:
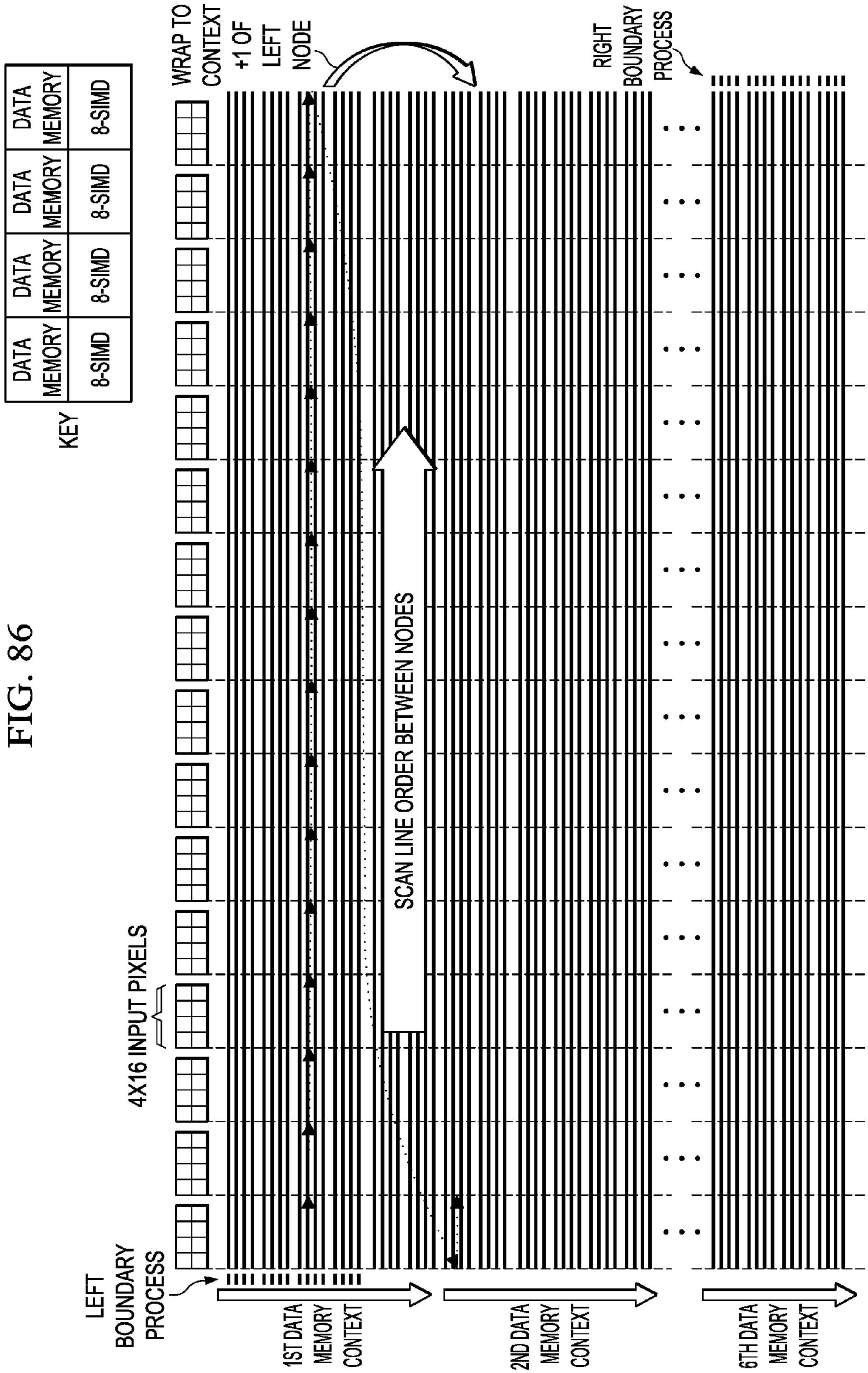
FIGS. 86 to 91 are an example of an inter-node scan line.
Figure 87:
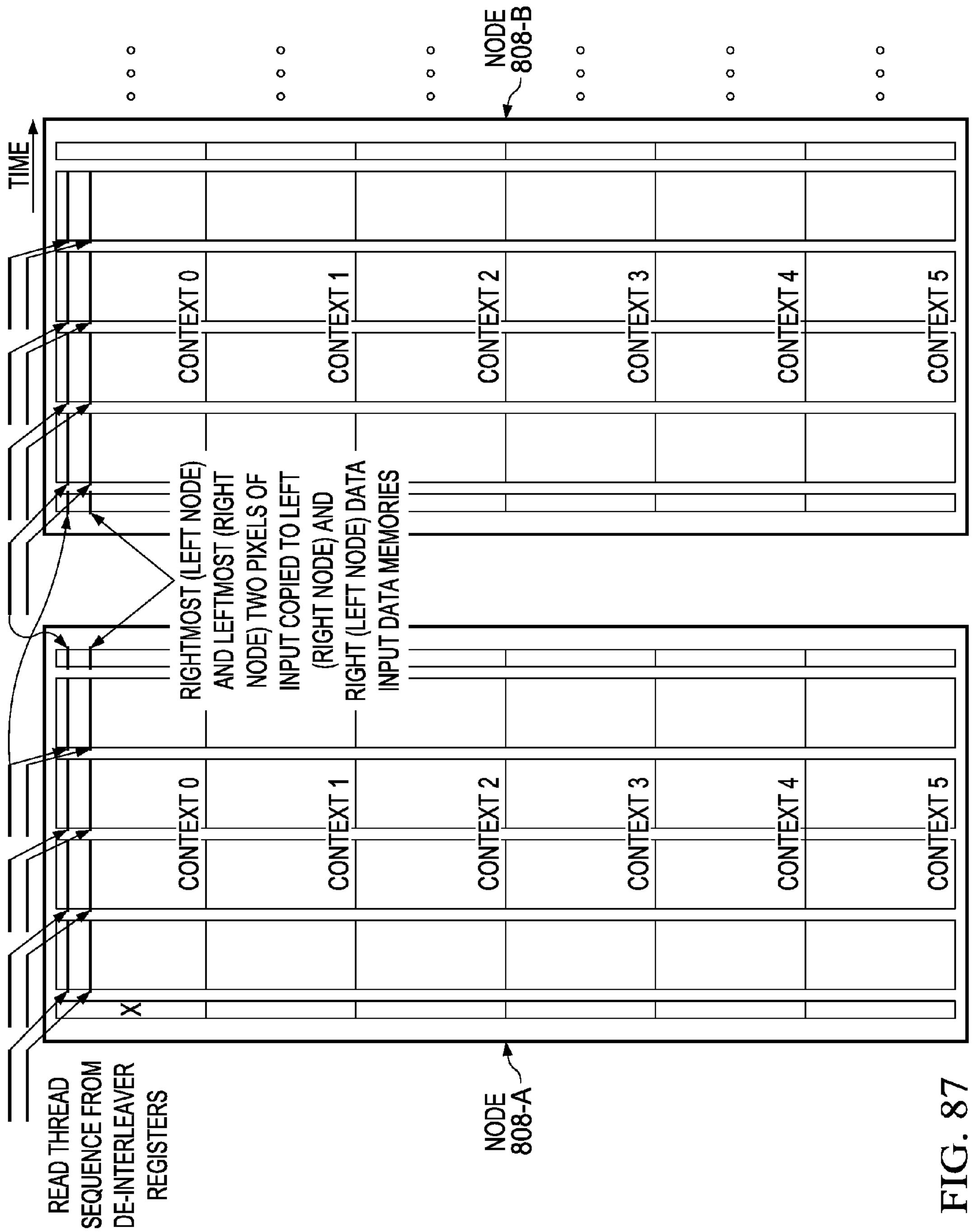
Figure 88:
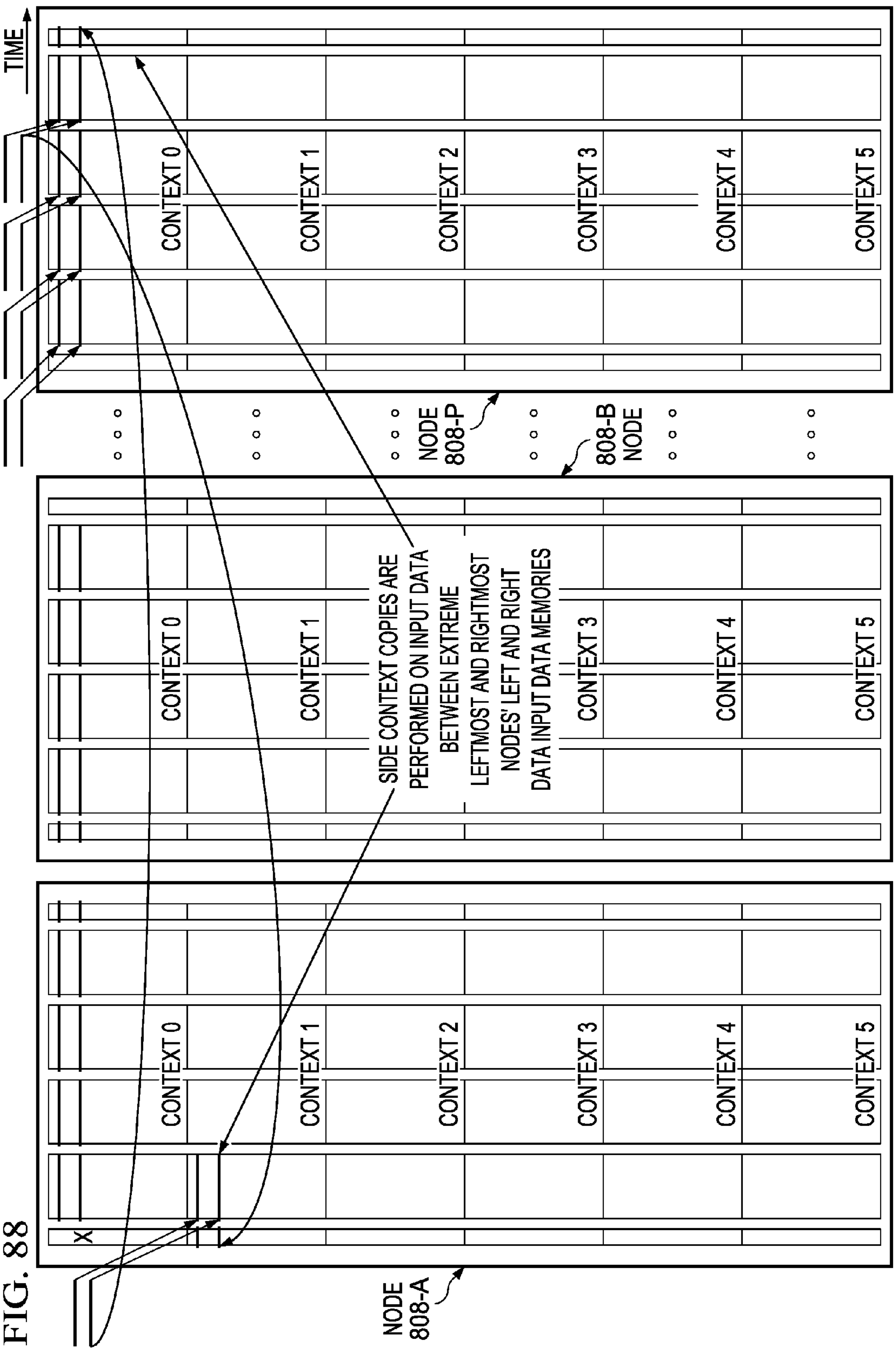
Figure 89:
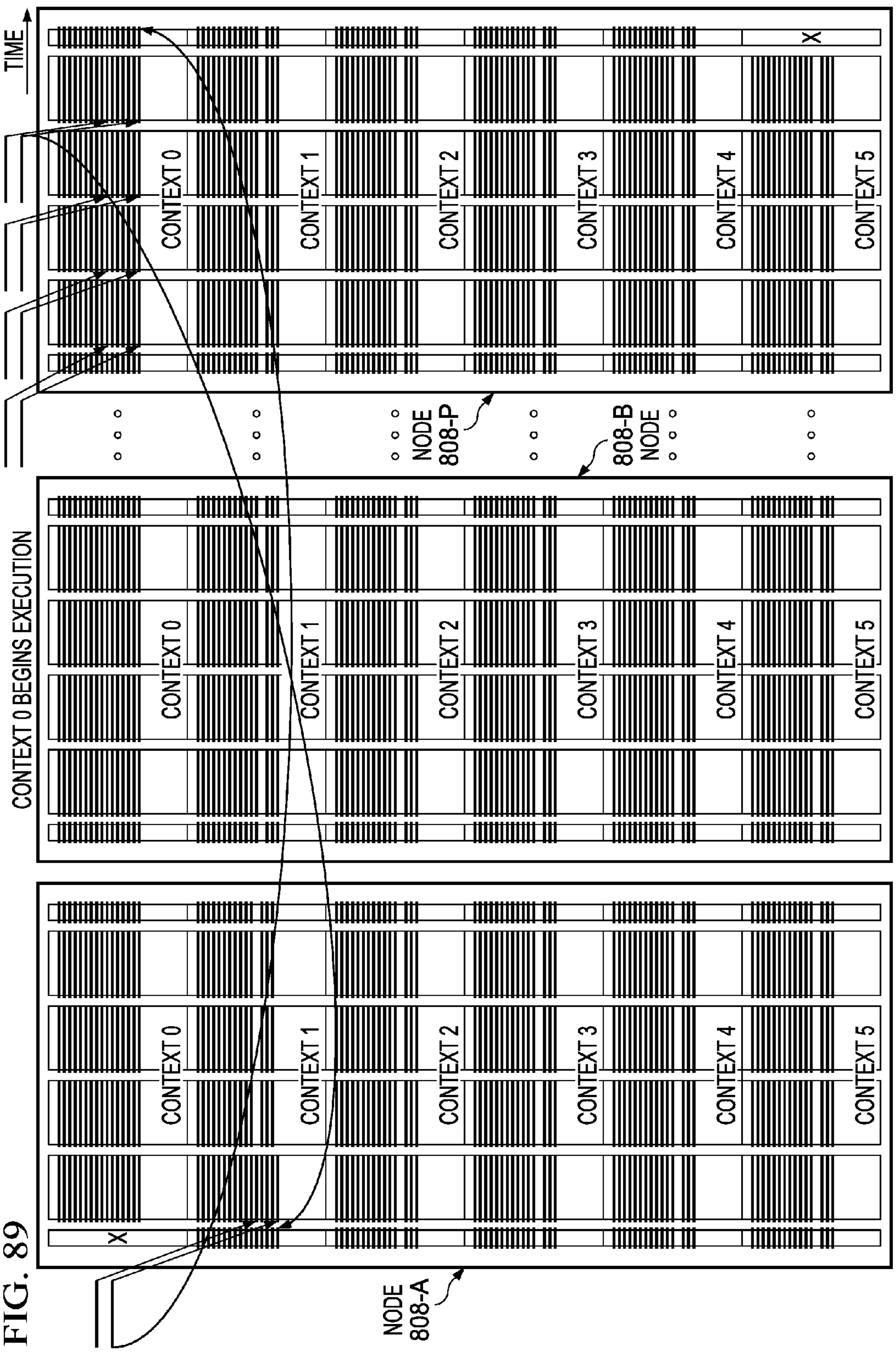
Figure 90:
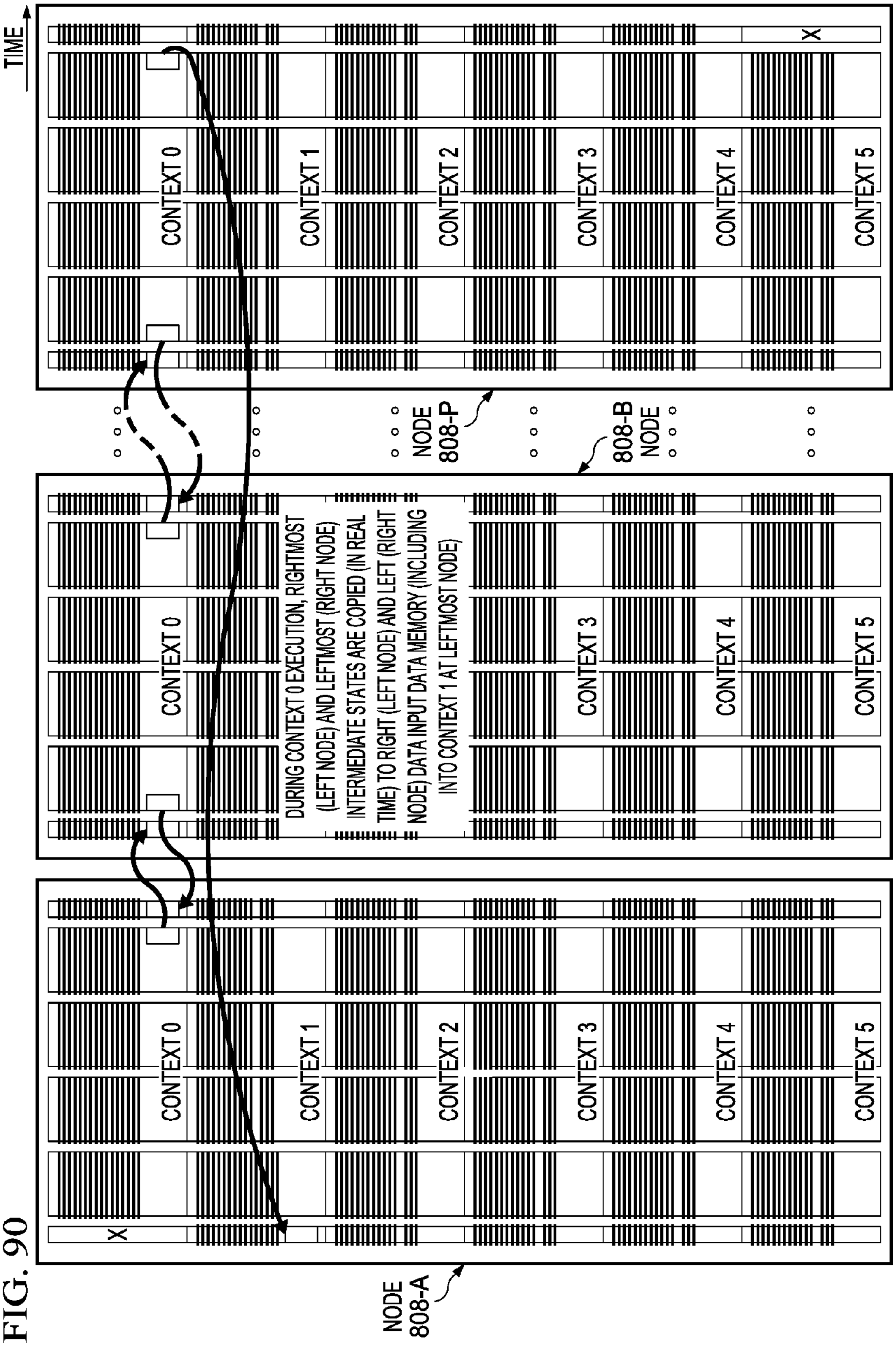
Figure 91:
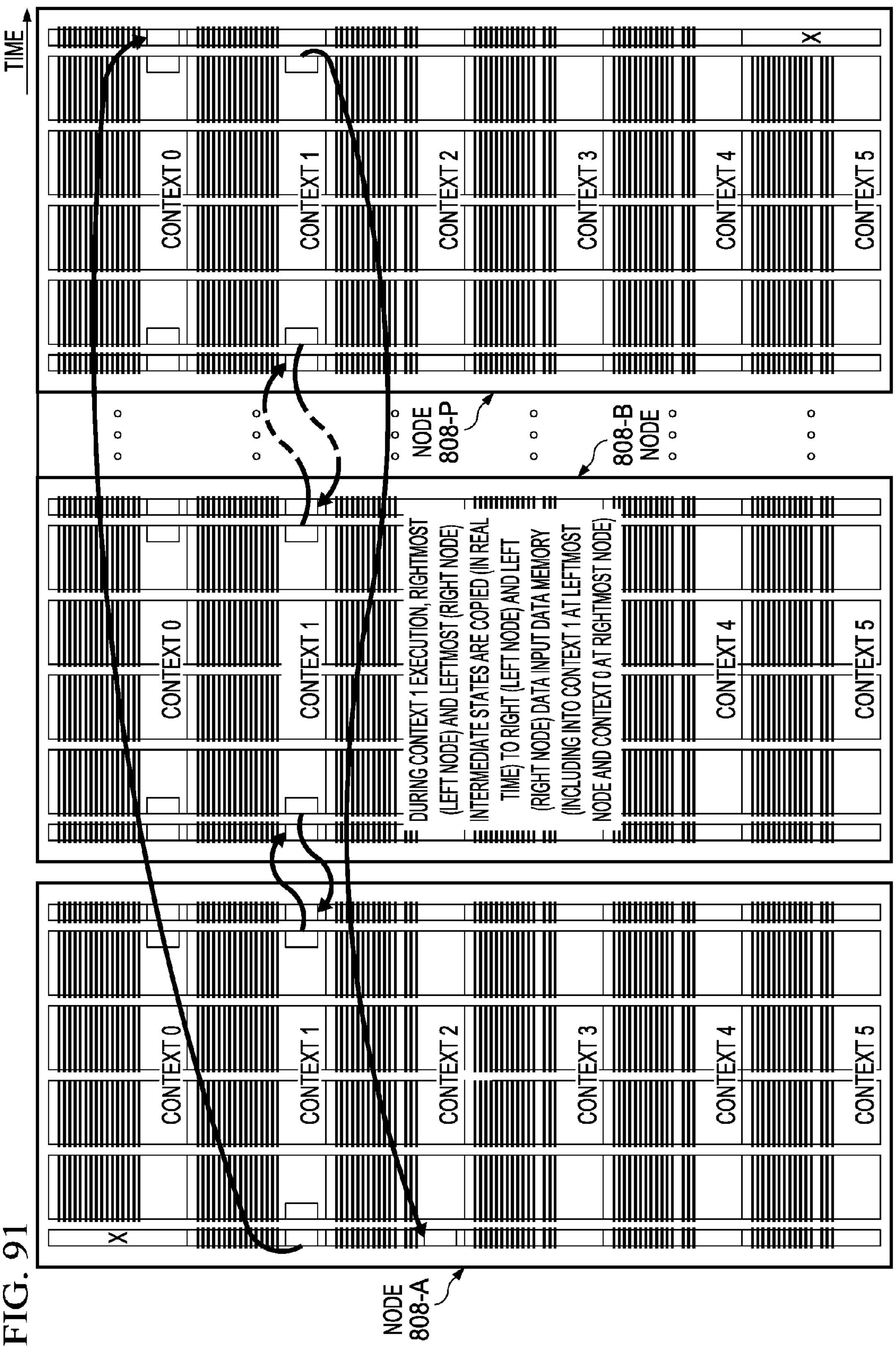

Following are sources of stalls in SIMD:

1) when a side context load occurs—load data may not be ready either because of 33<sup>rd</sup> valid bit not being set to 1 or the load matches with a store in write buffers and data is not there
   a. stage 4 stall—dm_load_not_ready=1 plus appropriate dm_load_left_rdy[3:0] should be set to 0—creates stall till stalling condition gets released—this stall is then released by dm_release_load_stall
   b. $33^{rd}$ valid bit is 0—if wp_left_fwd_en_rdata0 is enabled, then dmem_left_valid[0] of 0 is ignored as data is getting forwarded from write buffer. If wp_left_fwd_en_rdata0=1, then data comes from wp_left_fwd_rdata0—there are 4 bits for dmem_left_valid for the 4 loads that we can execute in a cycle. Once $33^{rd}$ bit is 0 on left side and wp_left_fwd_en_rdata0 is 0, then stall is generated and then released by dm_release_load_stall
2) When stores execute, side context stores are sent to other contexts based on right context pointer and left context pointer in descriptor—these pointers can indicate current node, different context or different node, different context. Different node can be direct-neighboring (adjacent node) or remote in another partition or remote within a partition. When these stores are about to be sent—they can encounter write buffer full cases—which can then stall the simd's. This is a stage 6 stall—detected in stage 6—dm_store_mid_rdy=0 in stage 6 will cause the pipe to stall. This stall is then released by wp_store_stall_released=1.
3) If an output instruction executes and it finds that permissions are not enabled, then the output instruction will stall. The permission indication is on nw_output_en[3:0]. When output instruction is executed—based on what in on ua6[1:0], appropriate nw_output_en[3:0] is checked—if it is not enabled, then output instruction will stall—VOUTPUT on T20 is output instruction—stage 3 stall
4) In addition to permission enable stalls, permission count stalls may also happen if outputs are to threads.
5) 4 LUT instructions can be executed—$5^{th}$ one will stall or if before we get the data back for LUT load, if somebody tries to read the destination register of LUT load, then again pipe will stall . . . LUT instructions are LDSFMEM on LS1—stage 4 stall.
   a. Lut load data back is indicated by lut_wr_simd[3:0] and lut_wr_simd_data[255:0] will update destination register of LUT load—lut_drdy should be asserted on the last packet . . . lut load is done at this point.
6) If outputs, LUT loads or STHIS instructions encounter a buffer full condition—they will stall SIMD—buffer full is indicated by outbuf_full[1:0]. Outbuf_full[0] is checked for LUT, outputs—this desires oneentry in output buffer. Outbuf_full[1] indicates two entries are required and this is checked for STHIS instructions—mnemonic is STFMEM instruction—stage 4 stall.
7) If wrapper is trying to update processor data memory 4328, it will stall the node processor 4322 (it gives first higher priority to T20—but if wrapper's buffers are becoming full, it will then stall T20)—stall_lsdmem is the signal that does that—stage 2 stall.
8) If there is a task switch in s/w, but wrapper has not checked the new task's readiness, then stall_imem_inst_rdy will be asserted and held till wrapper checks task readiness and finds task is ready
9) Bank conflict stalls between 4 loads and 2 stores—make sure we are doing the right thing
10) If END instruction is executed, there is a stall currently to update state—stage 6 stall—this may go away at some point
11) When RELINP instruction is executed, there is a stall currently to see if we have pending permissions set—and then it sends pending permissions before releasing stall—stage 6 stall—this may go away at some point 6.6.15. Scan Line Examples FIGS. 86 to 91 show an example of an inter-node scan line. In FIG. 86, the scan lines are shown to be arranged horizontally in node contexts. This begins at the left boundary (as shown in FIG. 87) and continues along the top boundary. In FIG. 88, a side context from context0 is copied to context1. Context0 can then begin executing (as shown in FIG. 89). As shown in FIG. 90, during Context0 execution, rightmost (left node) and leftmost (right node) intermediate states are copied (in real time) to right (left node) and left (right node) data input data memory (including into Context 1 at leftmost node), and, as shown in FIG. 91, during Context 1 execution, rightmost (left node) and leftmost (right node) intermediate states are copied (in real time) to right (left node) and left (right node) data input data memory (including into Context 1 at leftmost node and Context 0 at rightmost node).

Figure 92:
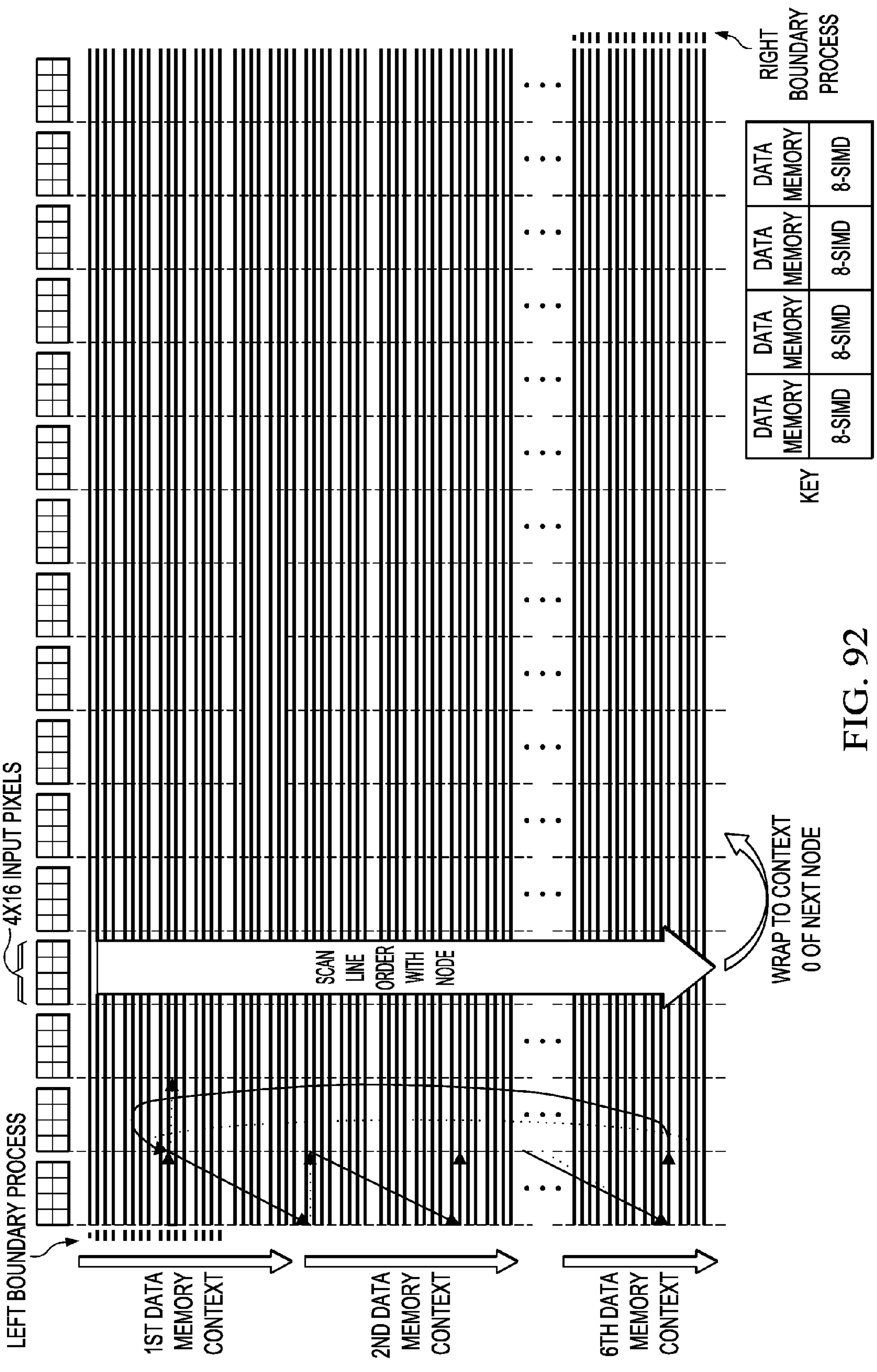
FIGS. 92 to 99 are an example of an inter-node scan line.
Figure 94:
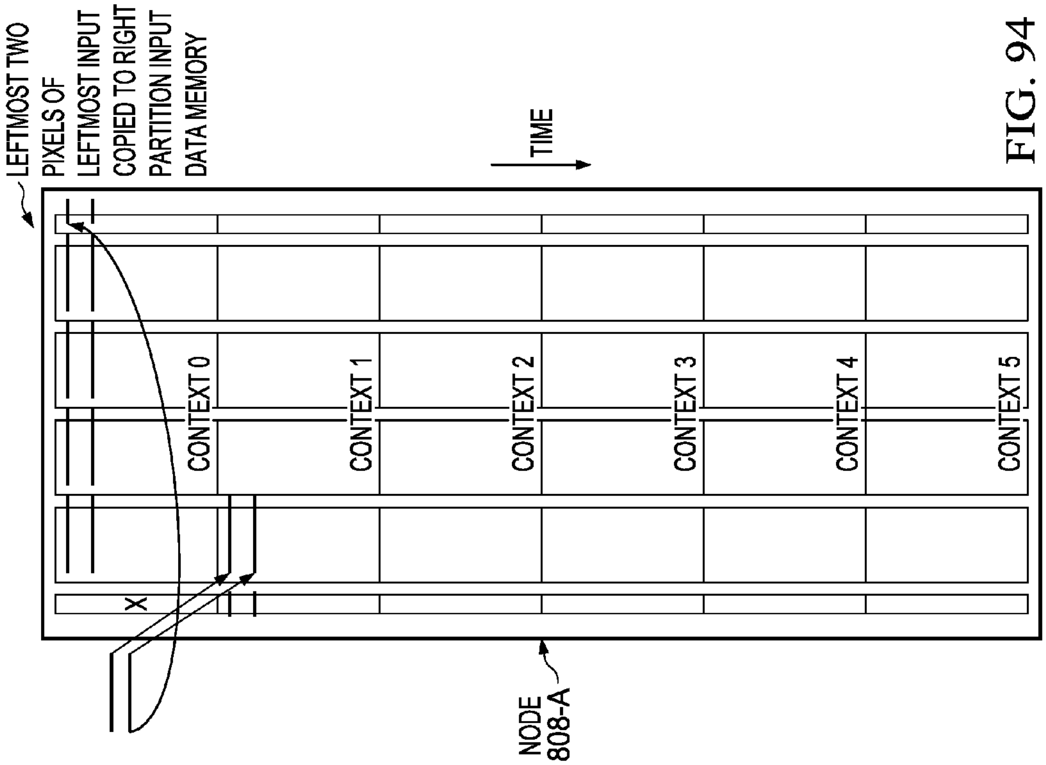
Figure 93:
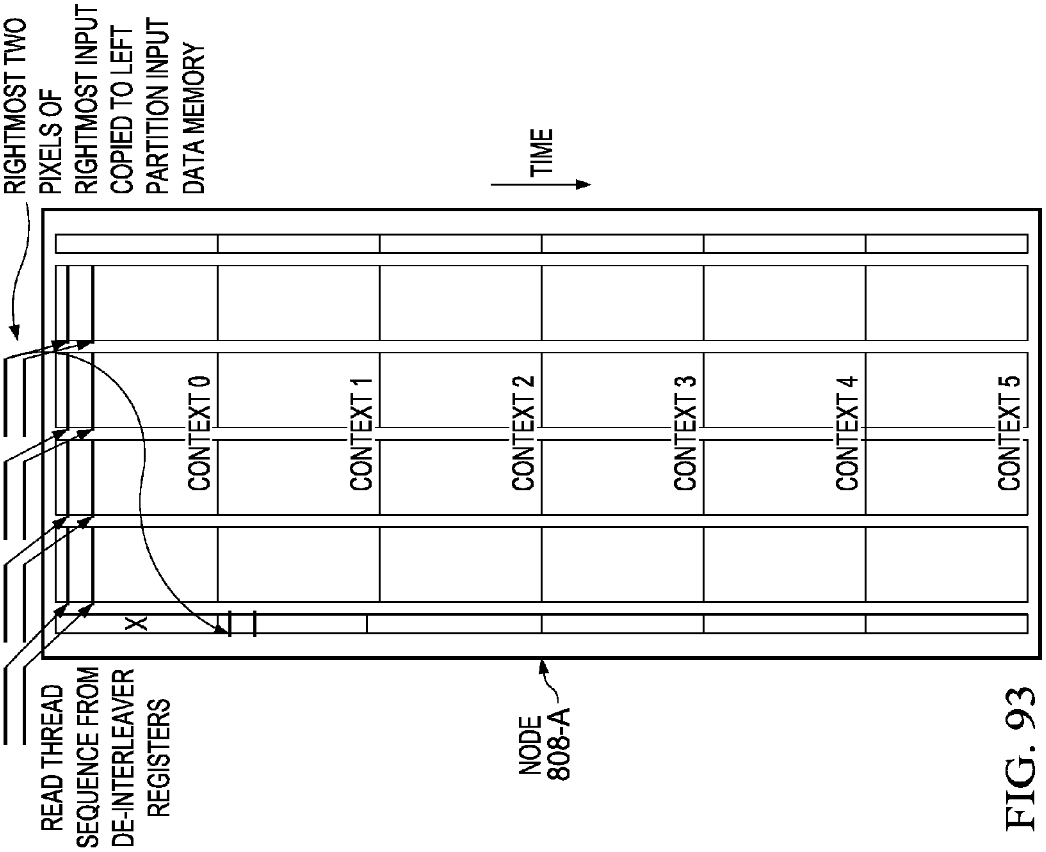
Figure 95:
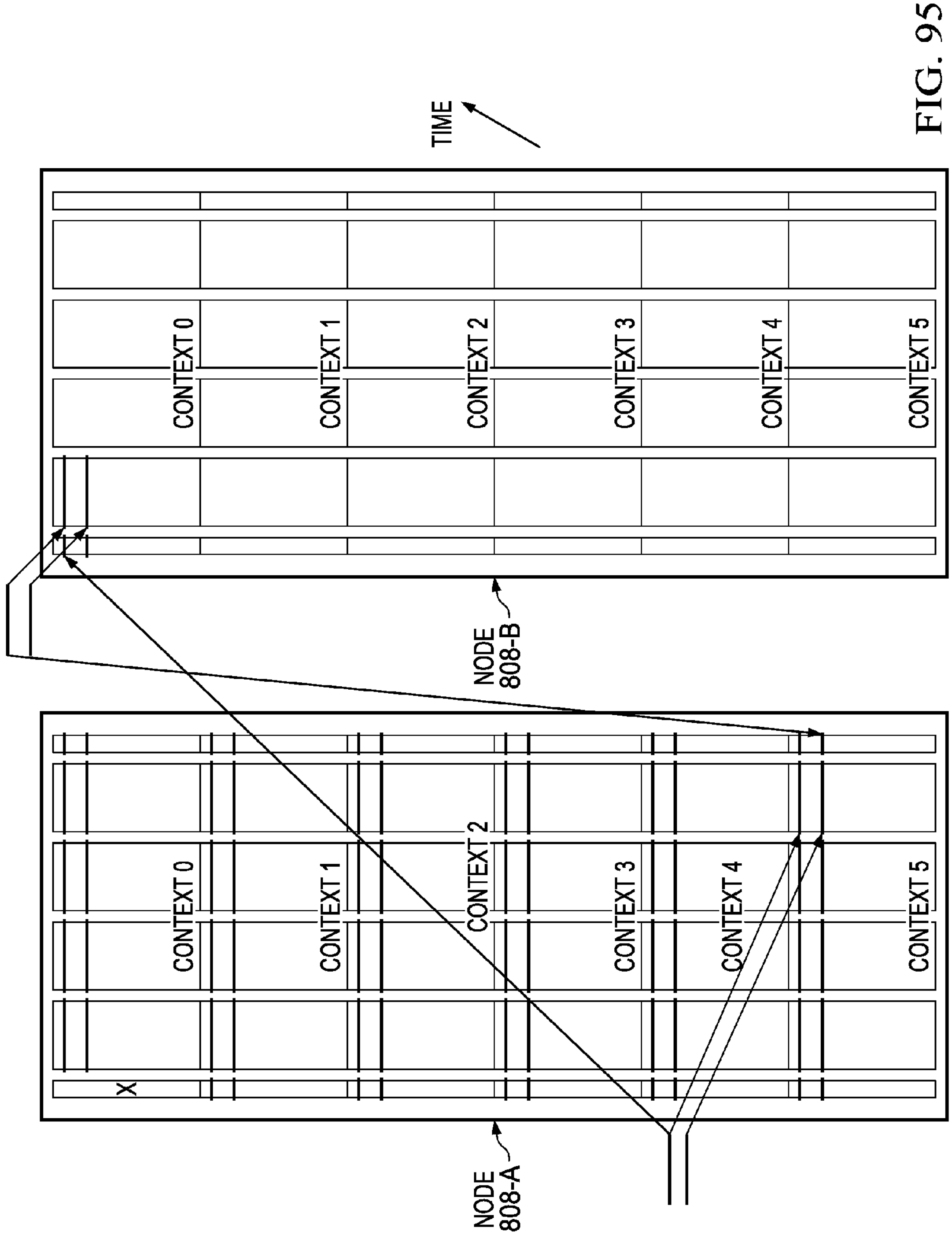
Figure 96:
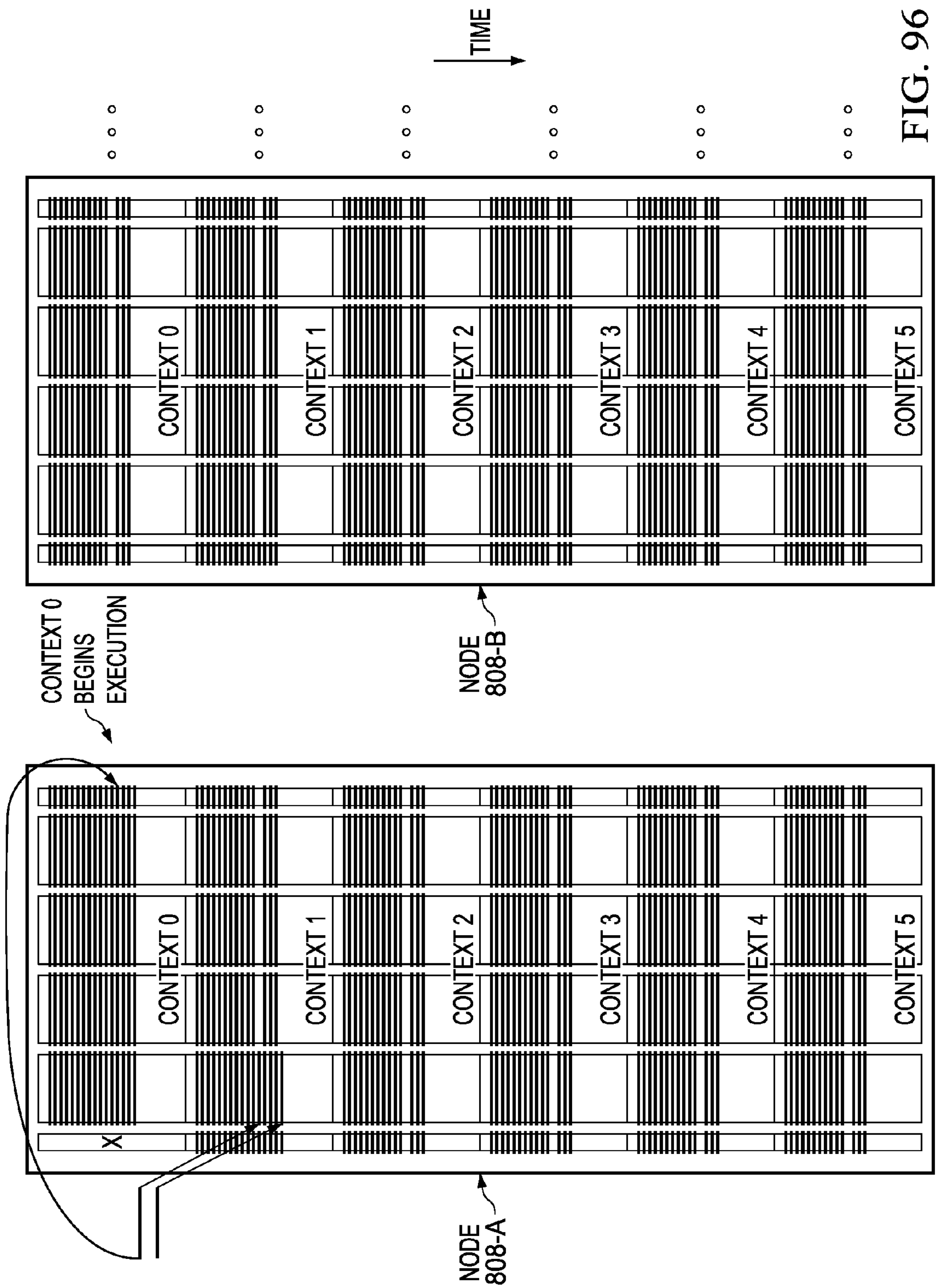
Figure 97:
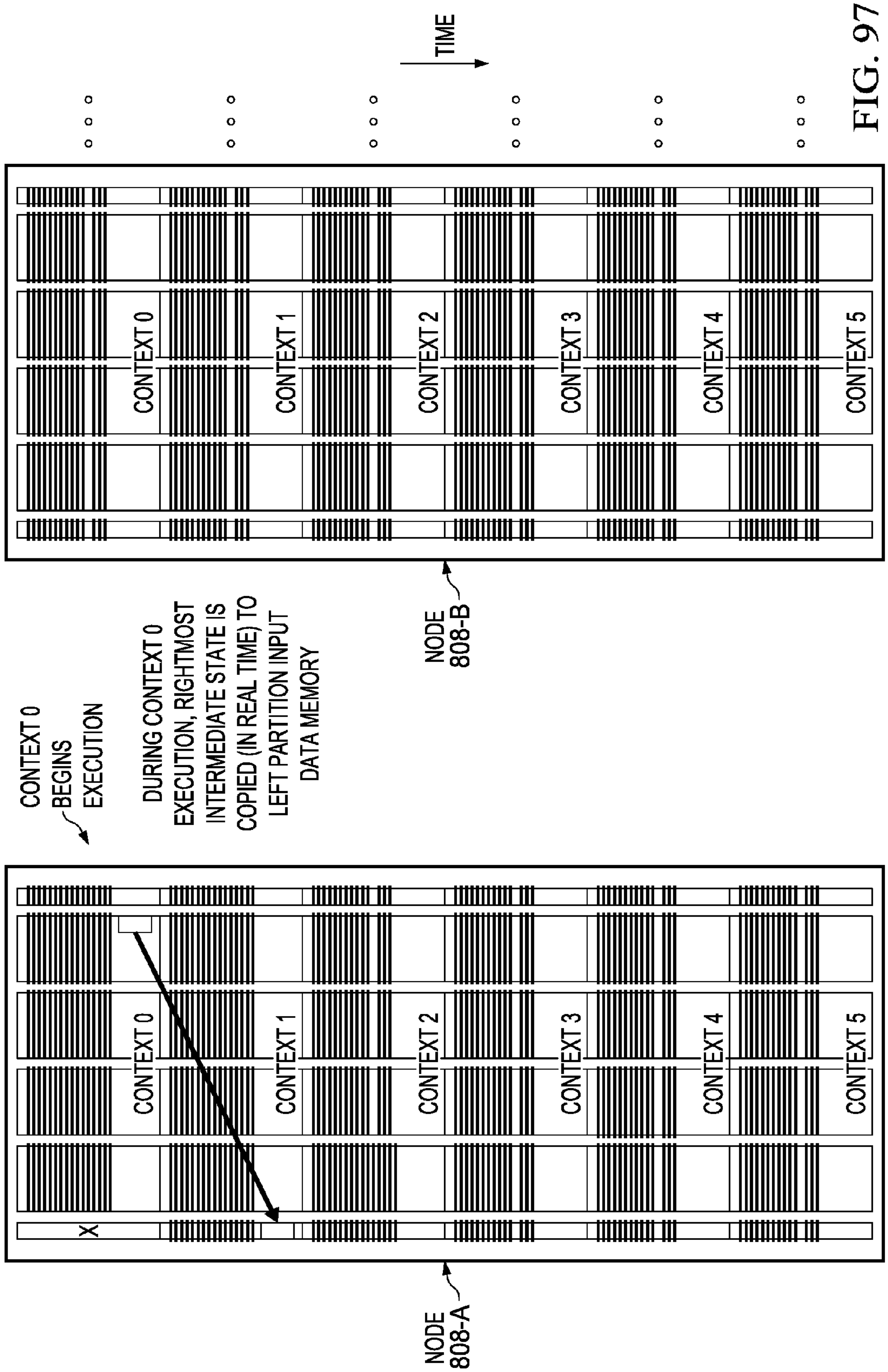
Figure 98:
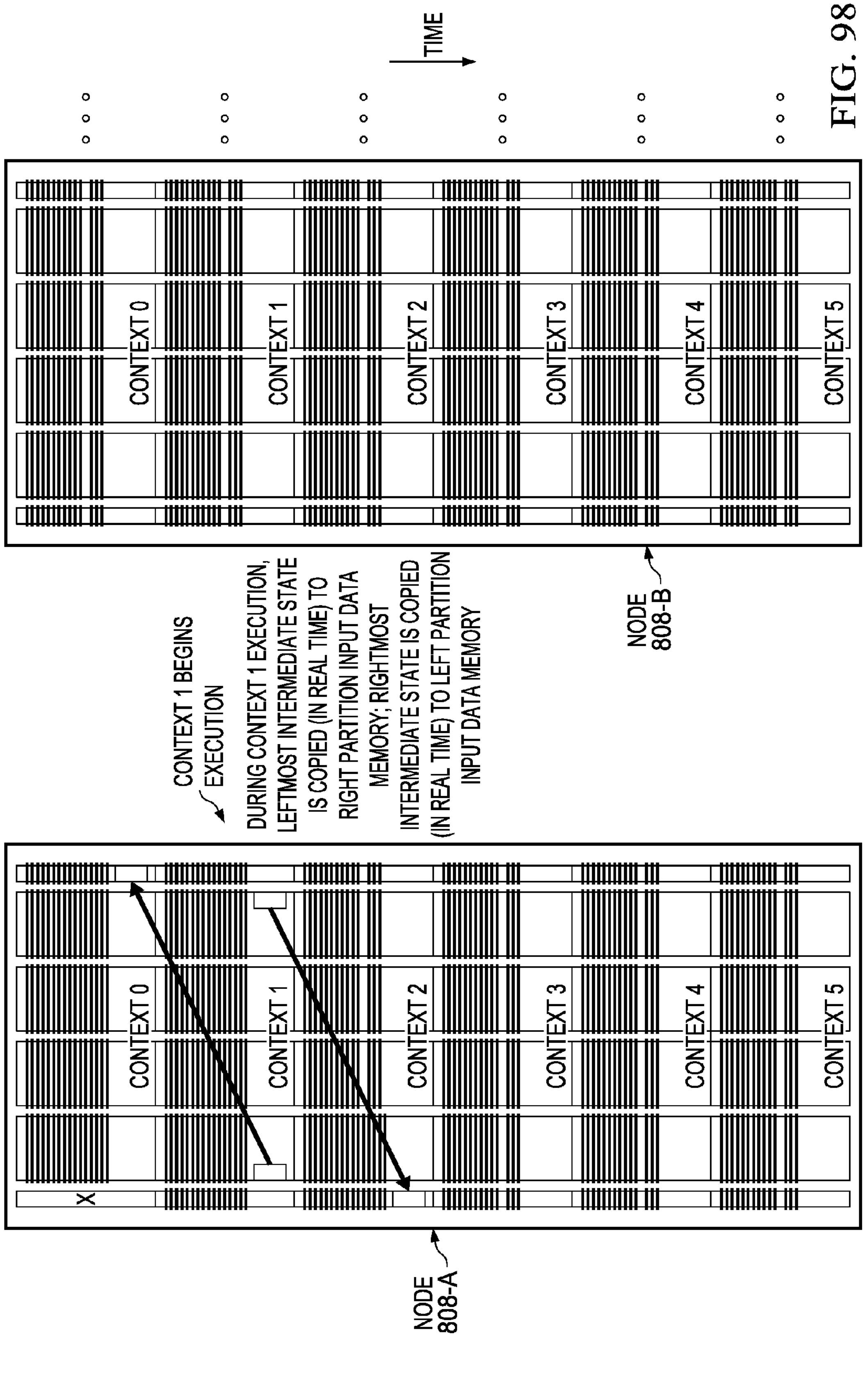
Figure 99:
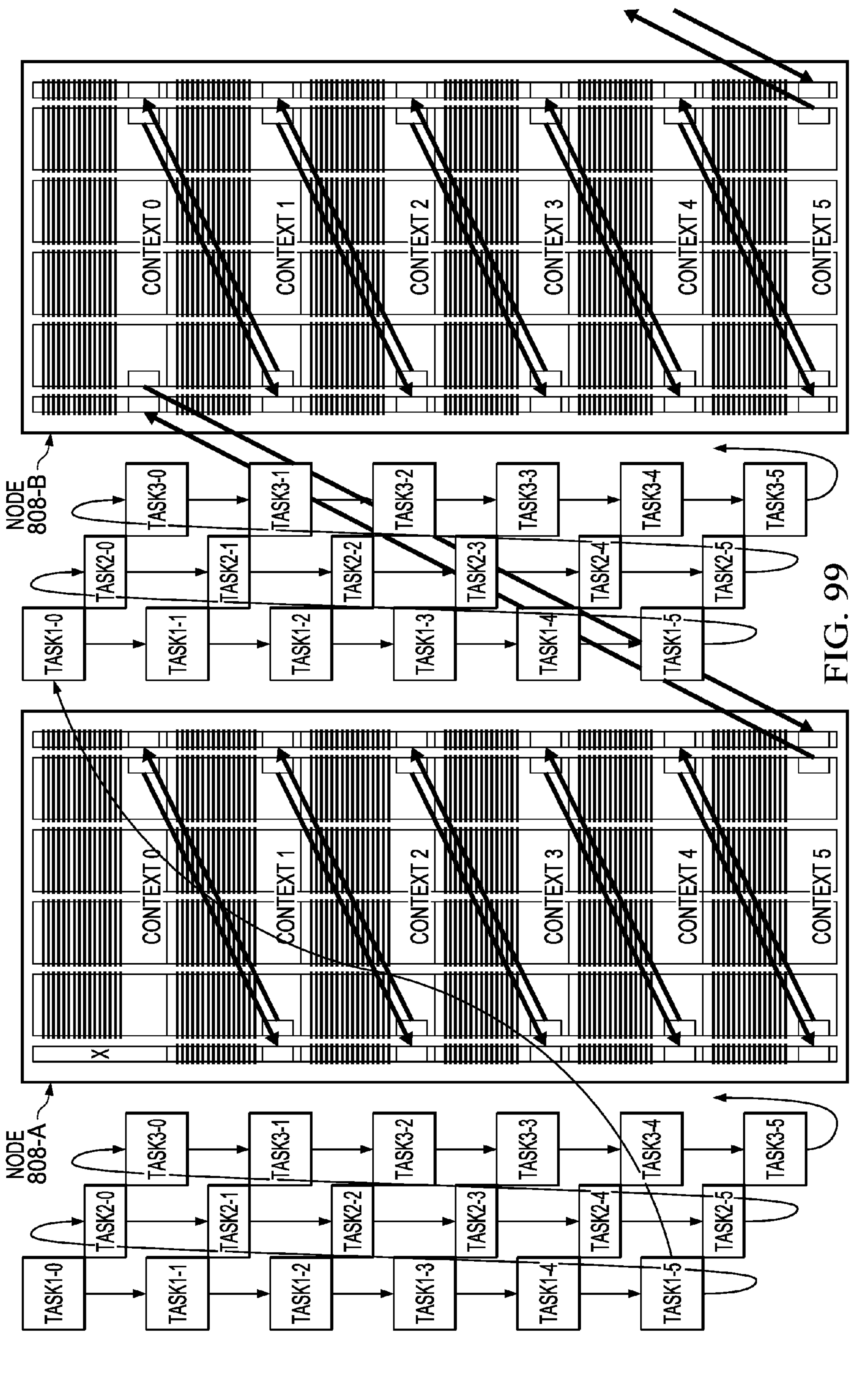

FIGS. 92 to 99 show an example of an inter-node scan line. In FIG. 92, the scan lines are shown to be arranged horizontally in node contexts. This begins at the left boundary (as shown in FIG. 93) and continues along the top boundary (as shown in FIG. 94). In FIG. 95, a side context from context0 is copied to context1. Context0 can then begin executing (as shown in FIG. 96). As shown in FIG. 97, during Context0 execution, rightmost intermediate state is copied (in real time) to left partition input data memory. Then, its it continues as shown in FIGS. 98 and 99.

6.6.16. Task Switch Examples

A task within a node level program (that describes an algorithm) is a collection of instructions that start from side context of input being valid and task switch when the side context of a variable computed during the task is desired or desired. Below is an example of a node level program:

```
/* A__dumb__algorithm.c */
Line A, B, C; /*input*/
Line D, E, F;G /*some temps*/
Line S; /*output*/
D=A.center + A.left + A.right;
D=C.left − D.center + C.right;
E=B.left+2*D.center+B.right;
<task switch>
F=D.left+B.center+D.right;
F=2*F.center+A.center;
G=E.left + F.center + E.right;
G=2*G.center;
<task switch>
S=G.left + G.right;
```

Figure 100:
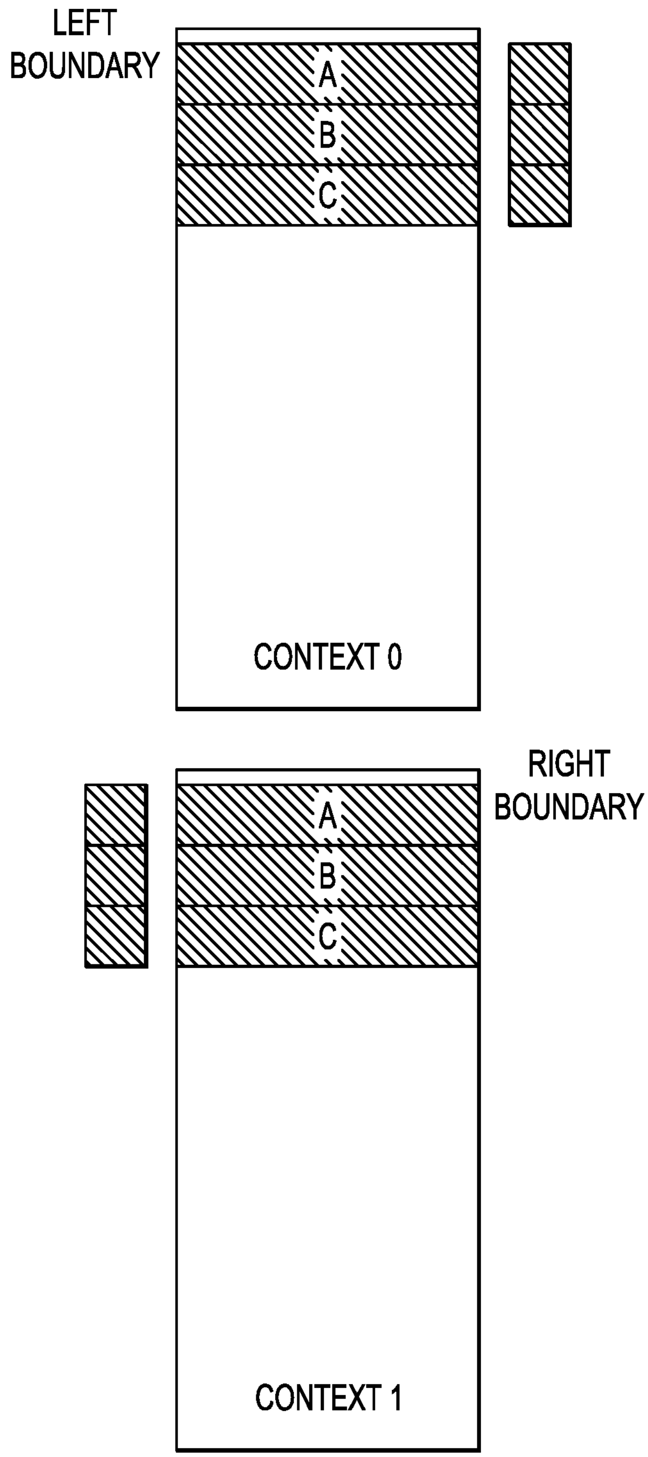
FIGS. 100 to 109 are examples of task switches.
Figure 101:
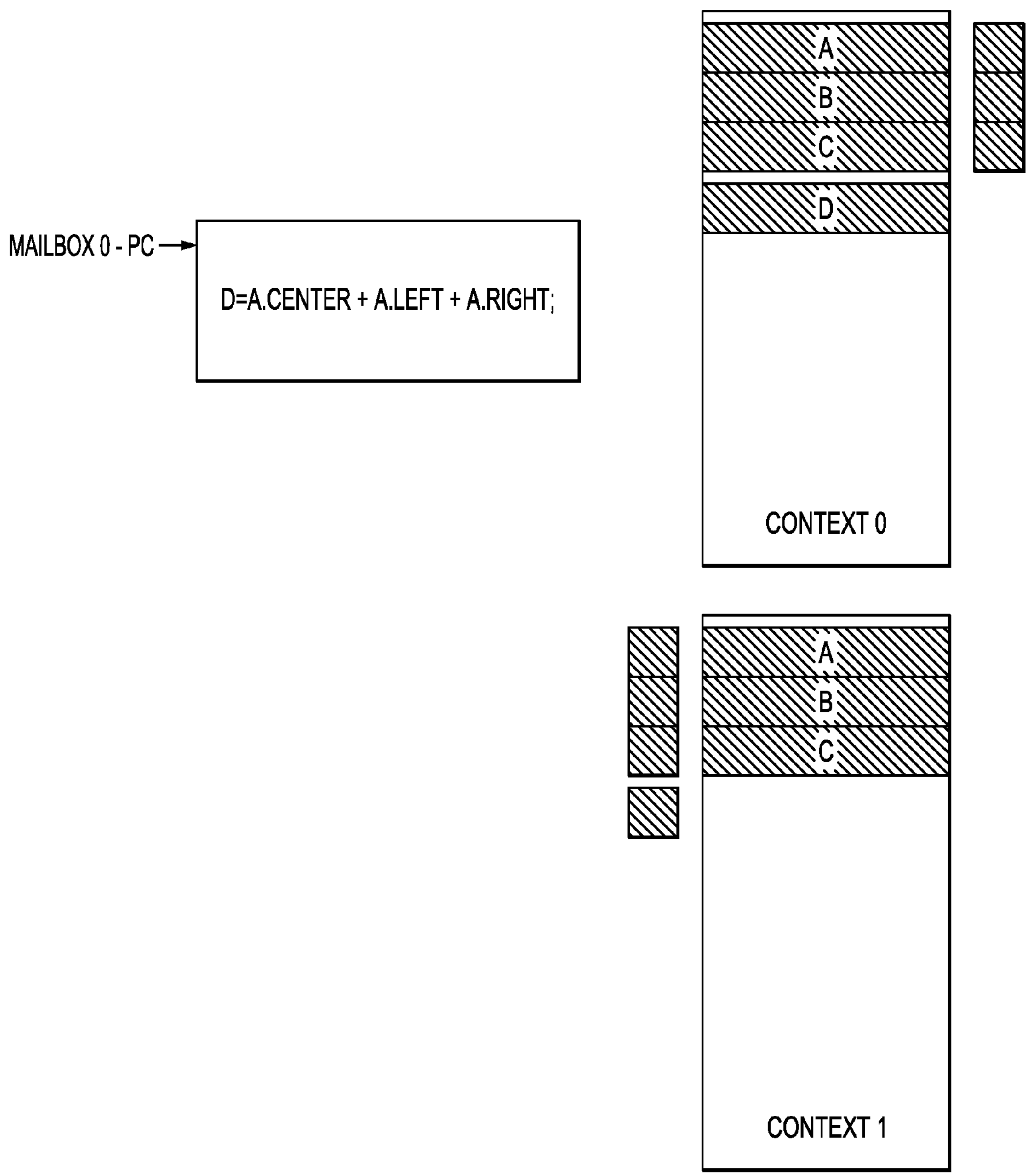
Figure 102:
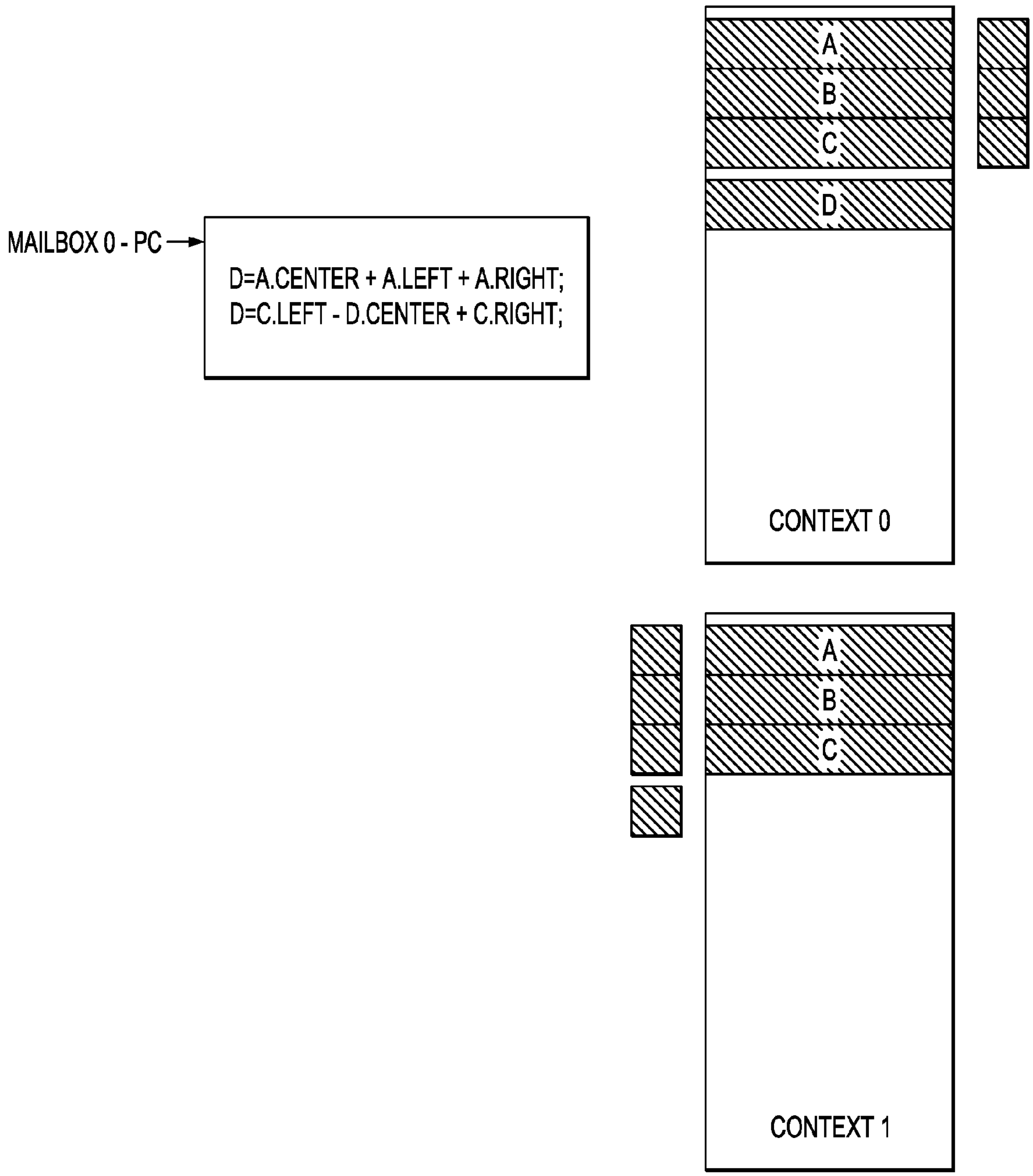
Figure 103:
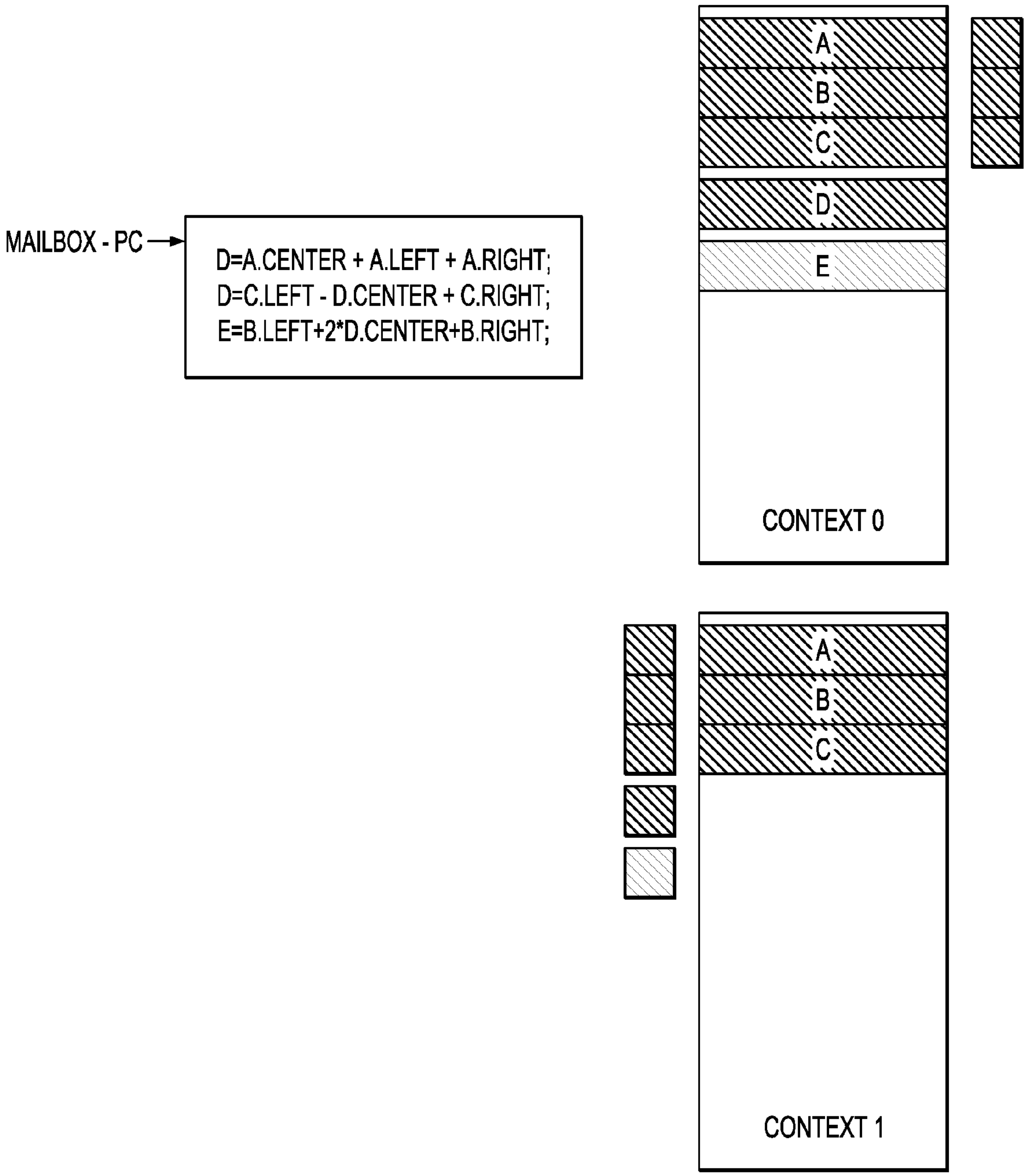
Figure 104:
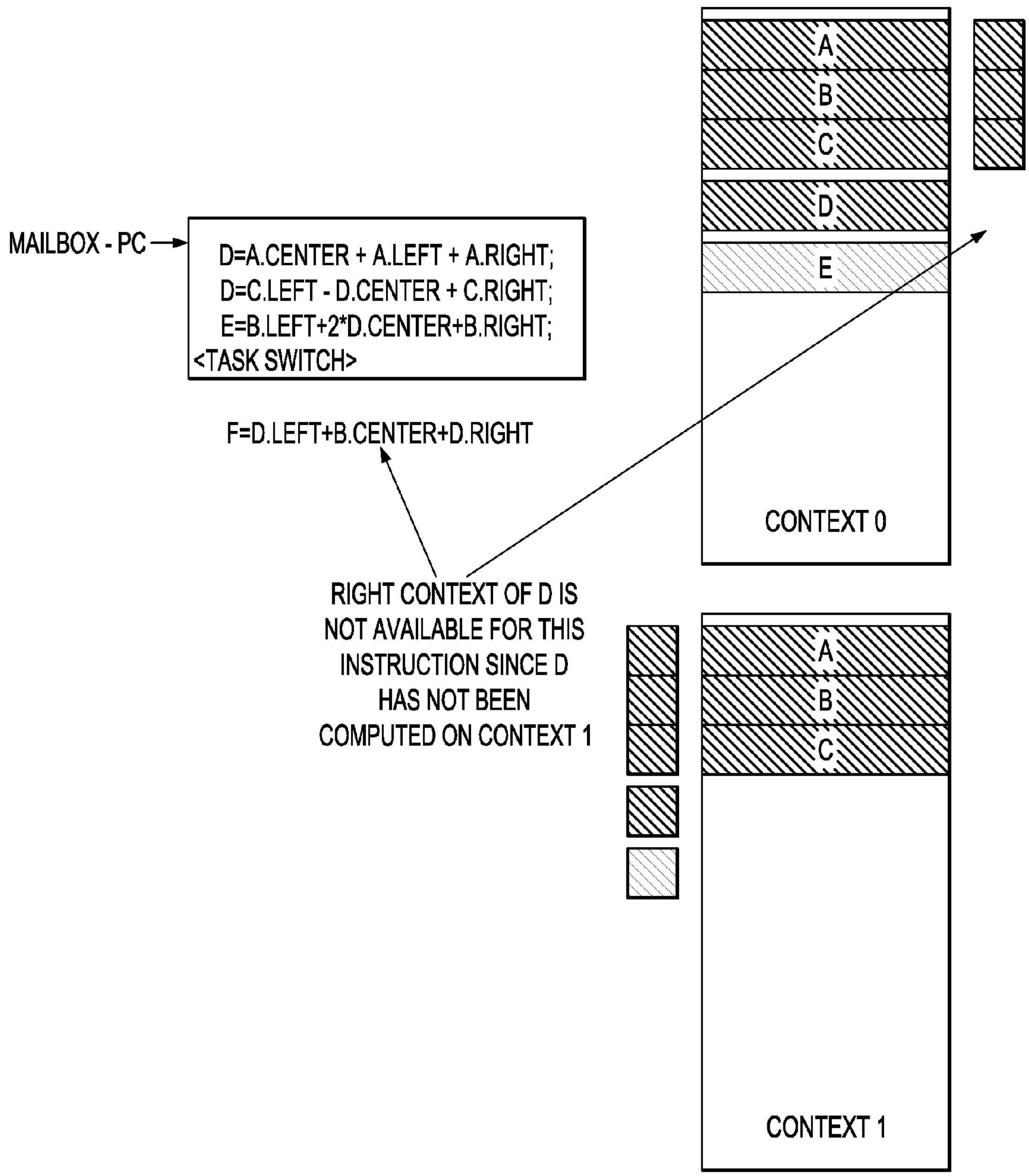
Figure 105:
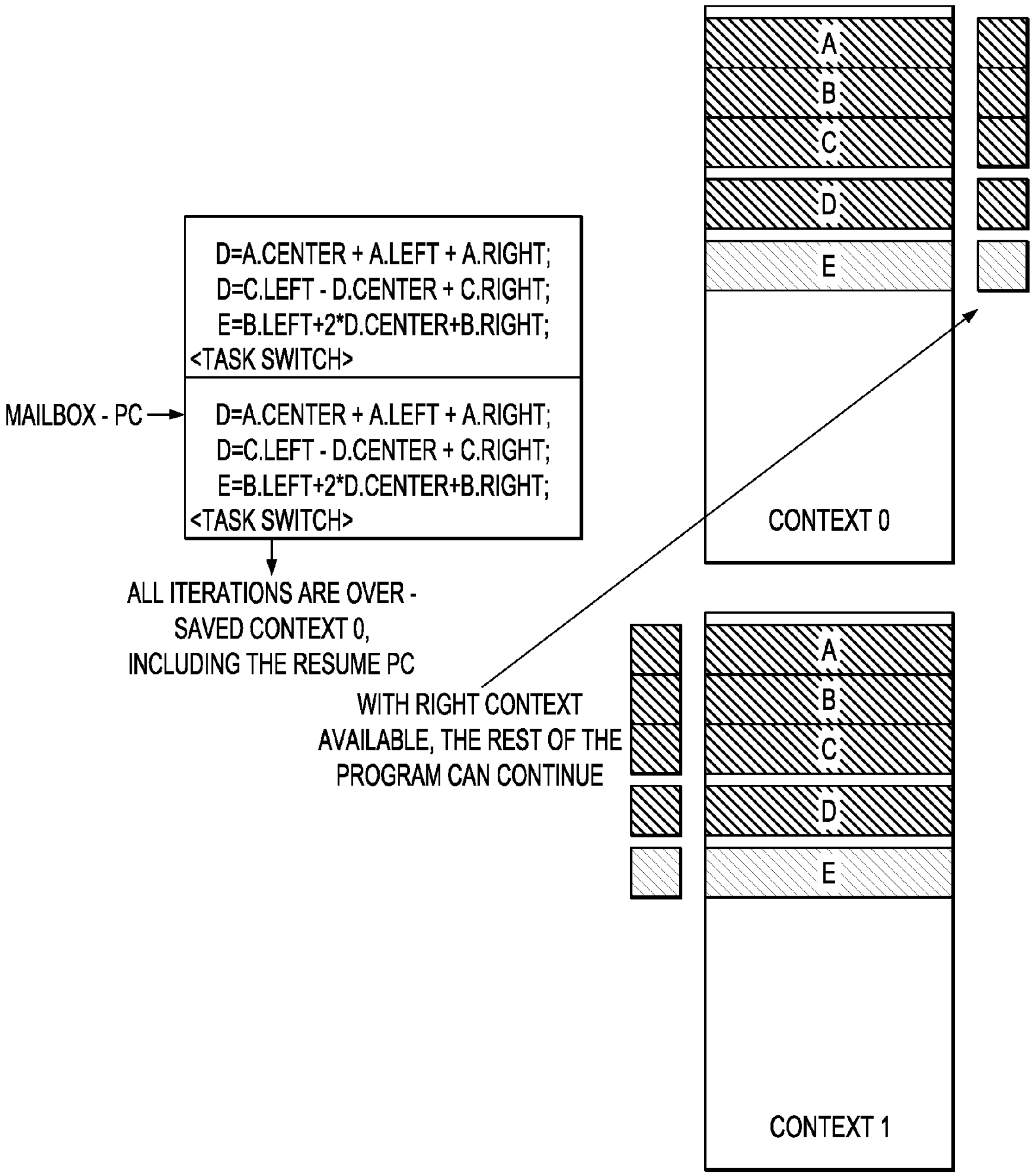
Figure 106:
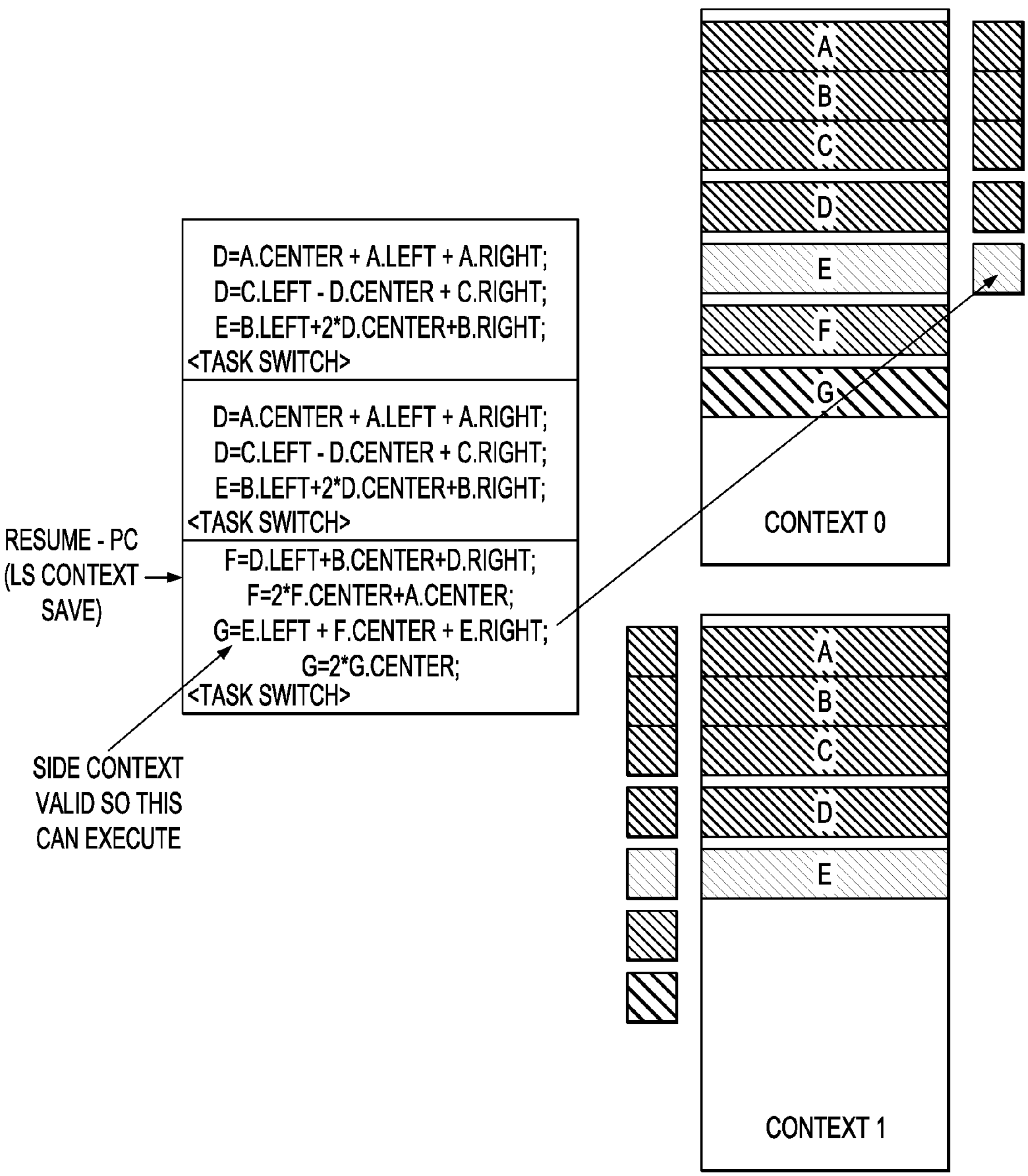
Figure 107:
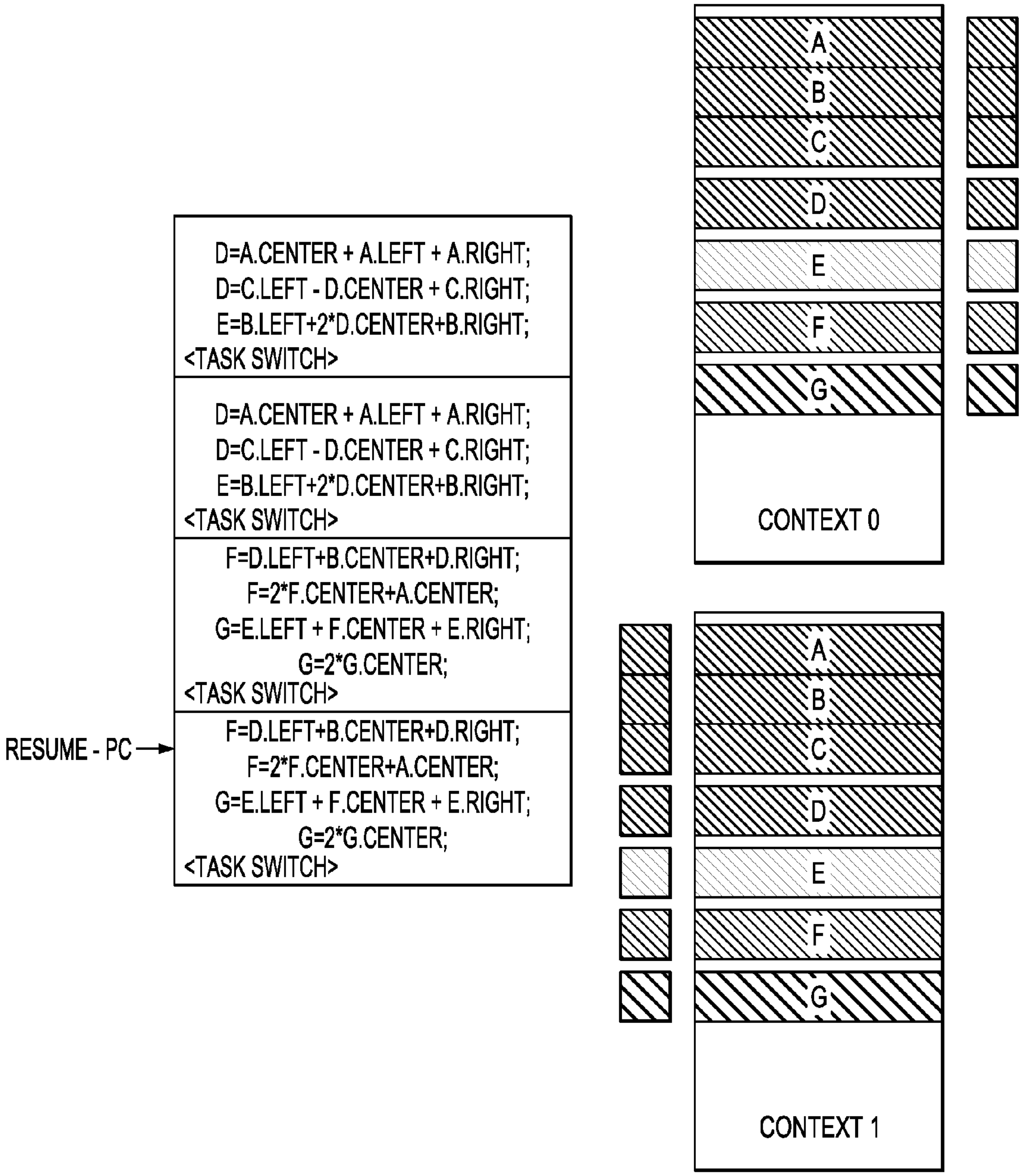
Figure 108:
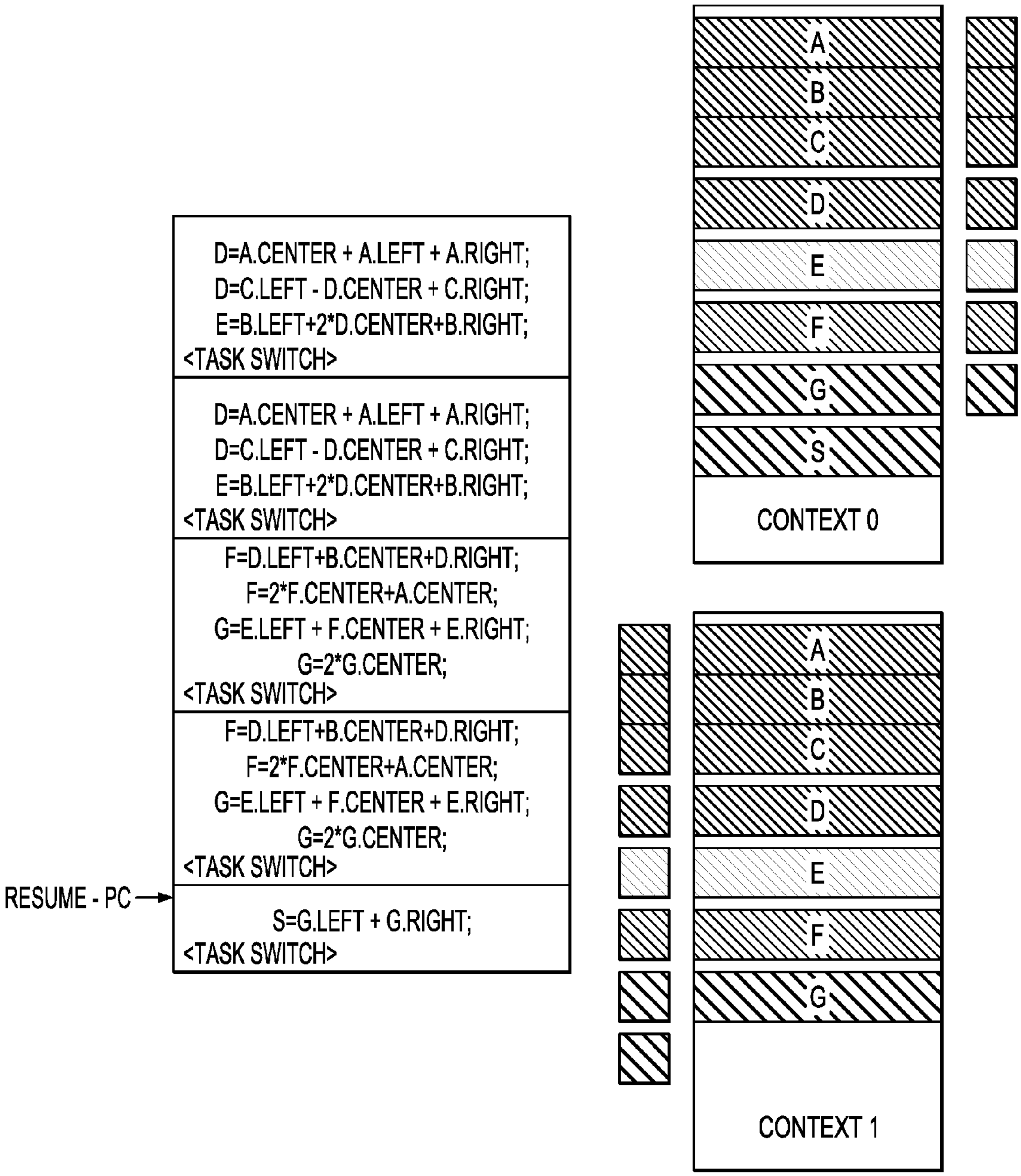
Figure 109:
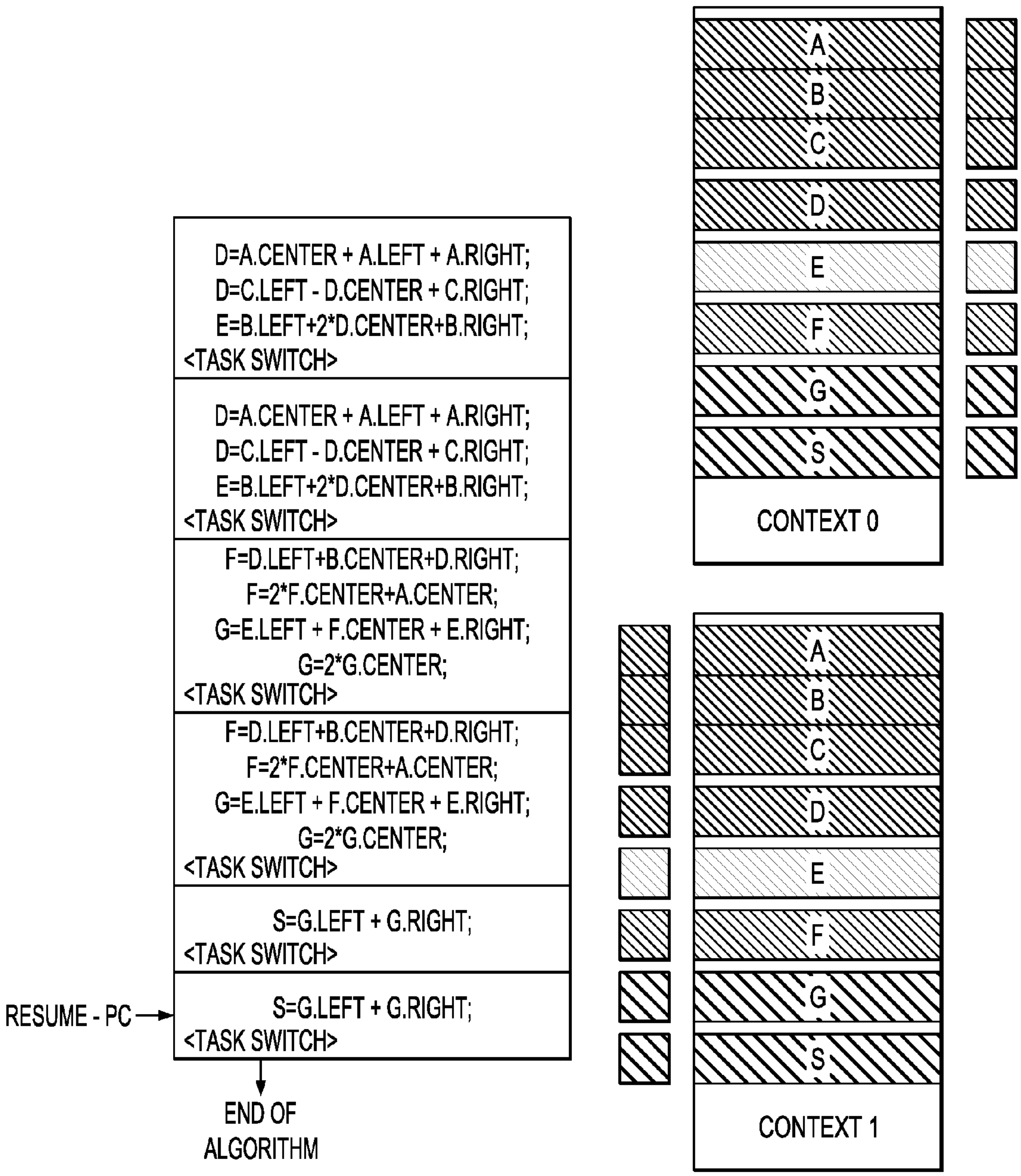

For FIG. 100, the program begins, and, in FIG. 101, the first task begins executing, where the result of the first operation is stored inentry "D" of context0. This is followed by the subsequent operation forentry "D" in FIG. 102. Then, in FIG. 103, the third operation is stored inentry "E" of context0. A task switch then occurs in FIG. 104 because the right context of "D" has not been computed on context1. In FIG. 105, iterations are complete and context0 is saved. In FIG. 106, the next task is performed along with completion of the previous task followed by a task switch. The subsequent tasks are then executed in FIGS. 107 to 109.

6.7. LS Unit

Figure 110:
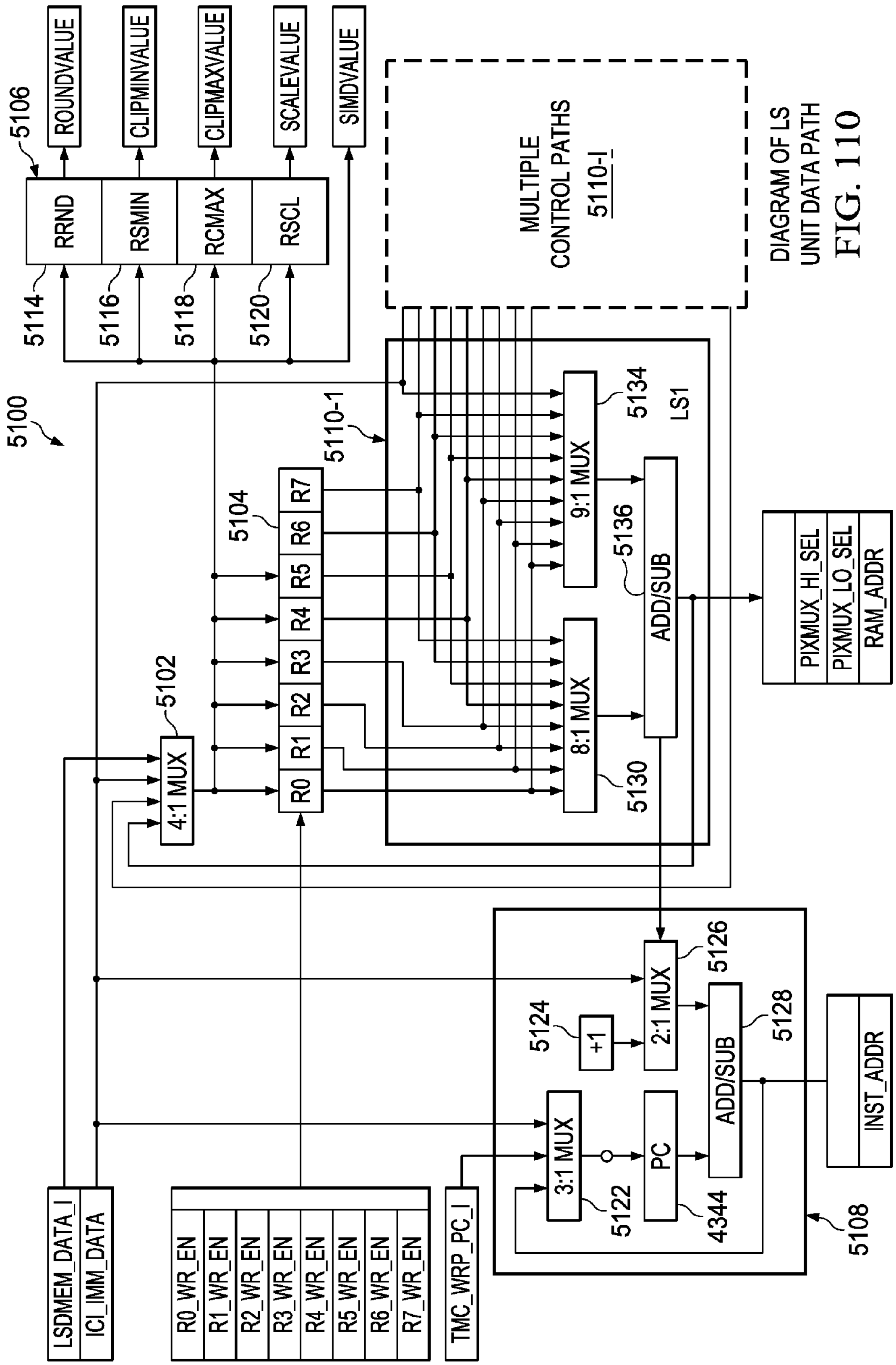
FIG. 110 is an example of a data path for the LS unit in greater detail.

Turning to FIG. 110, an example of a data path 5100 for LS unit (i.e., 4318-*i*) can be seen in greater detail. This data path 5100 generally includes the LS decoder 4334, LS execution unit 4336, LS data memory 4339, LS register file 4340, special register file 4342, and PC execution unit 4344 of FIG. 71. In operation, instruction address path 5108 (which generally includes mux 5122 and 5126, incrementer 5124, and add/subtract unit 5128) generates an instruction address from data contained within instruction memory (i.e., 1404-*i*). Mux 5120 (which can be a 4:1 mux) generates data for register file 5104, portion 5106 of special register file 4342 (which uses registers RRND 5114, RCMIN 5116, RCMAX, and RCSL 5120 to store ROUNDVALUE, CLIPMINVALUE, CLIPMAXVALUE, SCALEVALUE, and SIMDVALUE) from data in the LS data memory 4339 and the instruction memory (i.e., 1404-*i*). The control path 5110 (which uses muxes 5130 and 5132, and add/subtract unit 5134 to generate selection signals for mux 4602 and an address. Additionally, there may be multiple control paths 5110. Instructions (except load/store to SIMD data memory) operates according to the following pipeline:

(1) Load from instruction memory to instruction register;

(2) Decode;

(3) Send request and address to LS data memory 4339 for and SIMD register files (i.e., 4338-1);

(4) Access LS data memory 4339 and route data to SIMD register files (i.e., 4338-1);

(5) Read register file or forwarded SIMD result for store instruction, send request, address, and data to SIMD register files (i.e., 4338-1) for store instructions; and (6) SIMD register files (i.e., 4338-1) is updated for stores.

Load/store to SIMD data memory (i.e., 4306-1) operates according to the following pipeline:

(1) Load from IMEM to instruction register (2) Decode (first half of address calculation).

(3) Decode (second half of address calculation), bank conflict resolution for load, address compare for store to load forwarding;

(4) Access SIMD data memory (i.e., 4306-1) and update register file end of this cycle for load results;

(5) Read register file, address calculation and bank conflict resolution for stores, sending request, address, and data to SIMD data memory for store instructions; and (6) SIMD data memory is updated.

6.8. Instruction Set 6.8.1. Internal Number Representation

Nodes (i.e., 808-*i*) in this example can use two's complement representation for signed values and targets ISP6 functionality. A difference between ISP5 and ISP6 functionalities is the width of operators. For ISP5, the width is generally 24 bits, and for ISP6, the width may change to 26 bits. For packed instructions some registers can be accessed in two halves, <register>.lo and <register>.hi, these halves are generally 12 bits wide.

6.8.2. Register Set

Each functional unit (i.e., 4338-1) has 32 registers each of which is 32 bits wide, which can be accessed as 16 bit values (unpacked) or 32 bit values (packed).

6.8.3. Multiple Instruction Issue

Nodes (i.e., 808-*i*) is typically a 10-instruction issue machine, with the 11 units each capable of issuing a single instruction in parallel. The eleven units are labeled as follows: .LS1, .LS2, .LS3, .LS4, .LS5, .LS6, .LS7, and .LS8 for node processor 4322; .M1 for multiply unit 4348; .L1 for logic unit 4346; and .R1 for round unit 4350. The instruction set is partitioned across these 10 units, with instruction types assigned to a particular unit. In some cases a provision has been made to allow more than one unit to execute the same instruction type. For example, ADD may be executed on either .L1 or .R1, or both. The unit designators (.LS1, .LS2, .LS3, .LS4, .LS5, .LS6, .LS7, .LS8, .M1, .L1, and .R1), which follow the mnemonic, indicate to the assembler what unit is executing the instruction type. An example is as follows:

```
ADD .R1 RA, RB, RC
|| ADD .L1 RB, RC, RD
```

In this example two add instructions are issued in parallel, one executing on the round unit 4350 and one executing on the logic unit 4346. It should also be noted that if parallel instructions write results to the same destination, the result is unspecified. The value in the destination is implementation dependent.

6.8.4. Load Delay Slots

Since the nodes (i.e., 808-*i*) are VLIW machines, the compiler 706 should move independent instructions into the delay slots for branch instruction. The hardware is set up for SIMD instructions with direct load/store data from LS data memory 4339. The compiler 706 will see LS data memory 4339 as a large register file for data, for example:

```
ADD        *(reg_bank+1), *(reg_bank + 2), *reg_bank
which is generally equivalent to:
           LD .LS1 *(reg_bank+1), RA
||         LD .LS2 *(reg_bank+2), RB
||         ST .LS3 *reg_bank,   RC
||         LD .LS4 *(reg_bank+3), RD
||         ADD .L1 RA, RB, RC
||         ADD .R1 RA, RD, RE
```

It should also be note that the value RA will remain until another load or SIMD instruction writes to its register (i.e., register 4612). It is generally not desired to store value RC if the value is used locally within the next instructions. The value RC will remain until another load or SIMD instruction writes to its register (i.e., 4618). Value RE should be used locally and not written back to LS data memory 4339.

6.8.4. Store to Load Forwarding Restrictions

The pipeline is set up so that the compiler 706 can see banks of SIMD data memory (i.e., 4306-1) as a huge register file. There is no store to load forwarding—loads will usually take data from the SIMD data memory (i.e., 4306-1). There should to be two delay slots between store and a dependent load.

6.8.5. Store Instruction, Blocking of Stores

Output instruction is executed as a store instruction. The constant ua6 can be recoded to do the following:

Ua6[5:4]=00 will indicate Store

Ua6=6'b 00_00_00: word store

Ua6=6'b 00_11_00: store lower half-word of dst to lower center lane pixel

Ua6=6'b 00_11_10: store lower half-word of dst to upper center lane pixel

Ua6=6'b 00_00_11: store upper half-word of dst to upper center lane pixel

Ua6=6'b 00_01_11: store upper half-word of dst to lower center lane pixel

However ability to block a store instruction from going outside (or updating SIMD DMEM for store) can be achieved with the circular buffer addressing mode when lssrc2[12] is set to 1 which means block the output/store. When lssrc2[12] is 0, the output/store is executed.

6.8.6. Vector Output and Scalar Output

Vector output instructions output the lower 16 SIMD registers to a different node—it can be shared function-memory 1410 (described below) as well. All 32 bits can be updated.

Scalar outputs output a register value on the message interconnect bus (to control node 1406). Lower 16, upper 16, or entire 32 bits of data can be updated in the remote processor data memory 4328. The sizes are indicated on ua6[3:2], where 01 is the lower 16 bits, 10 is upper 16 bits, 11 is all 32 bits, and 00 is reserved. Additionally, there can be four output destination descriptors. Output instructions use ua6[1:0] to indicate which destination descriptor to use. The most significant bit of ua6 can be used to perform a set_valid indication which signals completion of all data transfers for a context from a particular input, which can trigger execution of a context in the remote node. Address offsets can be 16 bits wide when outputs are to shared function-memory 1410—else node to node offsets are 9 bits wide.

6.8.7. SIMD Data Memory Intra Task Spill Line Support

There is a global area reserved for spills in SIMD data memory (i.e., 4306-1). The following instructions can to be used to access the global area:

LD *uc9, ua6, dst

ST dst, *uc9, ua6 where uc9 is from variable uc9[8:0]. When uc9[8] is set, then the context base from node wrapper (i.e., 810-*i*) is not added to calculate the address—the address is simply uc9 [8:0]. If uc[8] is 0, then context base from wrapper (i.e., 810-*i*) is added. Using this support, variables can be stored from SIMD data memory (i.e., 4306-1) top address and grow downward like a stack by manipulating uc9.

6.8.8. Mirroring and Repeating for Side Context Loads

When the frame is at the left or right edge, the descriptor will have Lf or Rt bits set. At the edges, the side context memories do not have valid data, and, hence, the data from center context is either mirrored or repeated. Mirroring or repeating can be indicated by bit lssrc2[13] (circular buffer addressing mode).

Mirror when lssrc2[13]=0

Repeat when lssrc2[13]=1

Pixels at the left and right edges are mirrored/repeated. Boundaries are at pixel 0 and N. For example, if side context pixel −1 is accessed, pixel at location 1 or B is returned. Similarly for side context pixels −2, N and N+1.

6.8.9. LS Data Memory Address Calculation

The LS data memory 4339 (which can have a size of about 256×12 bit) can have the following regions:

LS data memory descriptors at locations 0x0-0xF, which generally contain the context base address Context specific address is calculated as:

Context specific address=context_base+offset

Context base addresses are in descriptors that are kept in the first 16 locations of LS data memory 4339—context descriptors are prepared by messaging as well.

6.8.10. Special Instructions that Move Data Between the RISC Processor and SIMD

Instructions that can move data between node processor 4322 and SIMD (i.e., SIMD unit including SIMD data memory 4306-1 and functional unit 4308-1) are indicated in Table 3 below:

TABLE 3

| Instruction | Explanation |
|---|---|
| MTV | Moves data from node processor 4322 register to a SIMD register (i.e., within SIMD register file 4318-1) in all functional units (i.e., 4338-1) |
| MFVVR | Moves data from left most SIMD functional unit (i.e., 4338-1) to register file within node processor 4322. |
| MTVRE | Expand register in node processor 4322 to functional units (i.e., 4338-1) take a T20 register and expand it to the 32 functional units |
| MFVRC | Compress the functional unit registers in SIMD to one 32-bit (for example). |

More explanation of companion instructions for node processor 4322 is provided below.

6.8.10. LDSFMEM and STFMEM

The instructions LDSDMEM and STFMEM can access shared function-memory 1410. LDSFMEM reads a SIMD register (i.e., within 4338-1) for address and sends this over several cycles (i.e., 4) to shared function-memory 1410. Shared function-memory 1410 will return (for example) 64 pixels of data over 4 cycles which is then written into SIMD register 16 pixels at a time. These loads for instructions LDSDMEM have a latency of, typically, 10 cycles, but are pipelined so (for example) results for the second LDSF-MEM should come immediately after the first one completes. To obtain high performance, four LDSFMEM instructions should be issued well ahead of its usage. Both LDSFMEM and STFMEM will stall if the IO buffers (i.e., within 4310-*i* and 4316-*i*) become full in node wrapper (i.e., 810-*i*).

6.8.11. Assembly Syntax

The assembler syntax for the nodes (i.e., 808-*i*) can be seen in Table 4 below:

TABLE 4

| Type | Syntax | Explanation |
|---|---|---|
| Comments | ; | a single line comment |
| Section Directives | .text | Indicates a block of executable instructions |
| | .data | Specifies a block of constants or location reserved for constants |
| | .bss | Specifies blocks of allocated memory which are not initialized |
| Constants (examples) | 010101b | Binary Constant |
| | 0777q | Octal Constant |
| | 0FE7h | Hexadecimal |
| | 1.2 | Decimal Constant |
| | 'A' | Character Constant |
| | "My string" | String Constant |
| Equate and Set Directives | <symbol> | String, which begins with an alpha character, then containing a set of alphanumeric characters, underscores "_" or dollar signs "$" |
| | <value> | Well-defined expression, that is all symbols in the expression should be previously defined in the current source code, or it should be a known constant |
| | <symbol> .set <value><br><symbol> .equ <value> | Used to assign a symbol to a constant value |

TABLE 4-continued

| Type | Syntax | Explanation |
|---|---|---|
| Parallel Instruction Syntax | \|\| | indicate parallel instructions |
| | .LS# (i.e., .LS1) | LS unit designator |
| | .M# (i.e., .M1) | Multiply unit designator |
| | .L# (i.e., .L1) | Logic unit designator |
| | .R# (i.e., .R1) | Round unit designator |
| | LD .LS1 03fh, R0<br>\|\| OR .L1 RC, RB, RD | Example of a load and a parallel logic OR executed in the same cycle |
| Explicitly or Implied NOPs | NOP<br>LNOP | NOPs can be issued for either the load-store unit or the .L1/M1/.R1 units. The assembler syntax allows for implied or explicit NOPs. |
| Labels | <string>: | Used to name a memory location, branch target or to indicate the start of a code block; <string> should begin with a letter |
| Load and Store Instructions | LD <des> <smem>, <dmem> | Load; <des> is a unit descriptor; <semem> is the source; <dmem> is the destination |
| | ST <des> <smem>, <dmem> | Store; <des> is a unit descriptor; <semem> is the source; <dmem> is the destination |

6.8.12. Abbreviations

Abbreviations used for instructions can be seen in Table 5 below:

TABLE 5

| Abbreviation | Explanation |
|---|---|
| lssrc, lsdst | Specify the operands for address registers for LS units. |
| Sdst | Specify the operands for special registers for LS units. The valid values for special registers include RCLIPMAX, RCLIPMIN, RRND, and RSCL |
| Src1, src2, dst | Specify the operands for functional unit registers (i.e., 4612). |
| sr1, sr2 | Special register identifiers. sr1 and sr2 are two bit numbers for RCLIPMAX and RCLIPMIN while one indemnifier sr1 is used for RND and SCL and is 4 bits wide. |
| uc<number> | Specifies an unsigned constant of width <number> |
| p2 | Specifies packed, unpacked information for SFMEM operations aka LUT/HIS instructions. |
| sc<number> | Specifies a signed constant of width <number> |
| uk<number> | Specifies an unsigned constant of width <number> for modulo value of circular addressing |
| uc<number> | Specifies an unsigned constant of width <number> for pixel select address from SIMD data memory |
| Unit | The valid values for <Unit> are LU1/RU1/MU1 |

6.8.13. Instruction Set

An example instruction set for each node (i.e., 808-*i*) can be seen in Table 6 below.

TABLE 6

| Instruction/Pseudocode | Issuing Unit | Comments |
|---|---|---|
| ABS src2, dst<br>Dst = \|src2\| | round unit (i.e., 4350) | Absolute value |
| ADD src1, src2, dst<br>Register form:<br>Dst = src1 + src2<br>Immediate form:<br>Dst = src1 + uc4 | logic unit (i.e., 4346)/round unit (i.e., 4350) | Signed and Unsigned Addition |
| ADDU src1, uc5, dst<br>Register form:<br>Dst = src1 & src2 | logic unit (i.e., 4346)/round unit (i.e., | Bitwise AND |

TABLE 6-continued

| Instruction/Pseudocode | Issuing Unit | Comments |
|---|---|---|
| Immediate form:<br>Dst = src1 & uc4 | 4350) | |
| AND src1, src2, dst<br>Register form:<br>Dst = src1 & src2<br>Immediate form:<br>Dst = src1 & uc4 | logic unit (i.e., 4346) | Bitwise AND |
| ANDU src1, uc5, dst<br>Register form:<br>Dst = src1 & src2<br>Immediate form:<br>Dst = src1 & uc4 | logic unit (i.e., 4346) | Bitwise AND |
| CEQ src1, src2, dst<br>Register forms:<br>dst.lo = dst.hi = (src1 == src2) ? 1 : 0<br>Immediate forms:<br>CEQ: dst.lo = dst.hi = (src1 == sc4) ? 1 : 0 | round unit (i.e., 4350) | Compare Equal |
| CEQ src1, sc5, dst<br>Register forms:<br>dst.lo = dst.hi = (src1 == src2) ? 1 : 0<br>Immediate forms:<br>CEQ: dst.lo = dst.hi = (src1 == sc4) ? 1 : 0 | round unit (i.e., 4350) | Compare Equal |
| CEQU src1, uc4, dst<br>dst.lo = dst.hi = unsigned (src1 == uc4) ? 1 : 0 | round unit (i.e., 4350) | Unsigned Compare Equal |
| CGE src1, sc4, dst<br>dst.lo = dst.hi = (src1 >= sc4) ? 1 : 0 | round unit (i.e., 4350) | Compare Greater Than or Equal To |
| CGEU src1, uc4, dst<br>dst.lo = dst.hi = unsigned (src1 >= uc4) ? 1 : 0 | round unit (i.e., 4350) | Unsigned Compare Greater Than or Equal To |
| CGT src1, sc4, dst<br>dst.lo = dst.hi = (src1 > sc4) ? 1 : 0 | round unit (i.e., 4350) | Compare Greater Than |
| CGTU src1, uc4, dst<br>dst.lo = dst.hi = unsigned (src1 > uc4) ? 1 : 0 | round unit (i.e., 4350) | Unsigned Compare Greater Than |
| CLE src1, src2, dst<br>Register forms:<br>dst.lo = dst.hi = (src1 <= src2) ? 1 : 0<br>Immediate forms:<br>dst.lo = dst.hi = (src1 <= sc4) ? 1 : 0 | round unit (i.e., 4350) | Compare Less Than |
| CLE src1, sc4, dst<br>Register forms:<br>dst.lo = dst.hi = (src1 <= src2) ? 1 : 0<br>Immediate forms:<br>dst.lo = dst.hi = (src1 <= sc4) ? 1 : 0 | round unit (i.e., 4350) | Compare Less Than |
| CLEU src1, src2, dst<br>Register forms:<br>dst.lo = dst.hi = unsigned (src1 <= src2) ? 1 : 0<br>Immediate forms:<br>dst.lo = dst.hi = unsigned (src1 <= uc4) ? 1 : 0 | round unit (i.e., 4350) | Unsigned Compare Less Than |
| CLEU src1, uc4, dst<br>Register forms:<br>dst.lo = dst.hi = unsigned (src1 <= src2) ? 1 : 0<br>Immediate forms:<br>dst.lo = dst.hi = unsigned (src1 <= uc4) ? 1 : 0 | round unit (i.e., 4350) | Unsigned Compare Less Than |
| CLIP src2, dst, sr1, sr2<br>If (src2 < RCLIPMIN) dst = RCLIPMIN<br>Else if (src2 >= RCLIPMAX) dst = RCLIPMAX<br>Else dst = src2 | round unit (i.e., 4350) | Min/Max Clip |
| CLIPU src2, dst, sr1, sr2<br>If (src2 < RCLIPMIN) dst = RCLIPMIN<br>Else if (src2 >= RCLIPMAX) dst = RCLIPMAX<br>Else dst = src2 | round unit (i.e., 4350) | Unsigned Min/Max Clip |
| CLT src1, src2, dst<br>Register forms:<br>dst.lo = dst.hi = (src1 < src2) ? 1 : 0<br>Immediate forms:<br>dst.lo = dst.hi = (src1 < sc4) ? 1 : 0 | round unit (i.e., 4350) | Compare Less Than |
| CLT src1, sc5, dst<br>Register forms:<br>dst.lo = dst.hi = (src1 < src2) ? 1 : 0<br>Immediate forms:<br>dst.lo = dst.hi = (src1 < sc4) ? 1 : 0 | round unit (i.e., 4350) | Compare Less Than |
| CLTU src1, src2, dst<br>Register forms:<br>dst.lo = dst.hi = unsigned (src1 < src2) ? 1 : 0<br>Immediate forms:<br>dst.lo = dst.hi = unsigned (src1 < uc4) ? 1 : 0 | round unit (i.e., 4350) | Unsigned Compare Less Than |

TABLE 6-continued

| Instruction/Pseudocode | Issuing Unit | Comments |
|---|---|---|
| CLTU src1, uc4, dst<br>Register forms:<br>dst.lo = dst.hi = unsigned (src1 < src2) ? 1 : 0<br>Immediate forms:<br>dst.lo = dst.hi = unsigned (src1 < uc4) ? 1 : 0 | round unit (i.e., 4350) | Unsigned Compare Less Than |
| LADD lssrc, sc9, lsdst<br>Lsdst[8:0] = lssrc[8:0] + sc9<br>Lsdst[31:9] = 0 | LS unit (i.e., 4318-i) | Load Address Add |
| LD *lssrc(lssrc2),sc4, ua6, dst<br>Register form (circular addressing):<br>if (sc4 > 0 & bottom__flag & sc4 > bottom__offset)<br>if (!mode)<br>m = 2*bottom__offset-sc4<br>else<br>m = bottom__offset<br>else if (sc4 < 0 & top__flag & (−sc4) > top__offset)<br>if (!mode)<br>m = −2*top__offset−sc4<br>else<br>m = −top__offset<br>else<br>m = sc4<br>if lssrc2[7:4]==0<br>Addr = lssrc + (lssrc2[3:0]+m)<br>else if (lssrc2[3:0] + m >= lssrc2[7:4])<br>Addr = lssrc + lssrc2[3:0] + m − lssrc2[7:4]<br>else if (lssrc2[3:0] + m < 0)<br>Addr = lssrc + lssrc2[3:0] + m + lssrc2[7:4]<br>else<br>Addr = lssrc + lssrc2[3:0] + m<br>Temp__Dst = *Addr<br>Register form (non-circular addressing):<br>Temp__Dst = *(lssrc + sc6)<br>Immediate form:<br>Temp__Dst = *uc9<br>Dst__hi = Temp__Dst[ua[5:3]]<br>Dst__lo = Temp__Dst[ua[2:0]] | LS unit (i.e., 4318-i) | Load |
| LD *lssrc(sc6), ua6, dst<br>Register form (circular addressing):<br>if (sc4 > 0 & bottom__flag & sc4 > bottom__offset)<br>if (!mode)<br>m = 2*bottom__offset−sc4<br>else<br>m = bottom__offset<br>else if (sc4 < 0 & top__flag & (−sc4) > top__offset)<br>if (!mode)<br>m = −2*top__offset−sc4<br>else<br>m = −top__offset<br>else<br>m = sc4<br>if lssrc2[7:4]==0<br>Addr = lssrc + (lssrc2[3:0]+m)<br>else if (lssrc2[3:0] + m >= lssrc2[7:4])<br>Addr = lssrc + lssrc2[3:0] + m − lssrc2[7:4]<br>else if (lssrc2[3:0] + m < 0)<br>Addr = lssrc + lssrc2[3:0] + m + lssrc2[7:4]<br>else<br>Addr = lssrc + lssrc2[3:0] + m<br>Temp__Dst = *Addr<br>Register form (non-circular addressing):<br>Temp__Dst = *(lssrc + sc6)<br>Immediate form:<br>Temp__Dst = *uc9<br>Dst__hi = Temp__Dst[ua[5:3]]<br>Dst__lo = Temp__Dst[ua[2:0]] | LS unit (i.e., 4318-i) | Load |
| LD *uc9, ua6, dst<br>Register form (circular addressing):<br>if (sc4 > 0 & bottom__flag & sc4 > bottom__offset)<br>if (!mode)<br>m = 2*bottom__offset−sc4<br>else<br>m = bottom__offset<br>else if (sc4 < 0 & top__flag & (−sc4) > top__offset)<br>if (!mode)<br>m = −2*top__offset−sc4 | LS unit (i.e., 4318-i) | Load |

TABLE 6-continued

| Instruction/Pseudocode | Issuing Unit | Comments |
|---|---|---|
| else | | |
| m = −top__offset | | |
| else | | |
| m = sc4 | | |
| if lssrc2[7:4]==0 | | |
| Addr = lssrc + (lssrc2[3:0]+m) | | |
| else if (lssrc2[3:0] + m >= lssrc2[7:4]) | | |
| Addr = lssrc + lssrc2[3:0] + m − lssrc2[7:4] | | |
| else if (lssrc2[3:0] + m < 0) | | |
| Addr = lssrc + lssrc2[3:0] + m + lssrc2[7:4] | | |
| else | | |
| Addr = lssrc + lssrc2[3:0] + m | | |
| Temp__Dst = *Addr | | |
| Register form (non-circular addressing): | | |
| Temp__Dst = *(lssrc + sc6) | | |
| Immediate form: | | |
| Temp__Dst = *uc9 | | |
| Dst__hi = Temp__Dst[ua[5:3]] | | |
| Dst__lo = Temp__Dst[ua[2:0]] | | |
| LDU *lssrc(lssrc2),sc4, ua6, dst | LS unit (i.e., | Load Unsigned |
| Register form (circular addressing): | 4318-i) | |
| if (sc4 > 0 & bottom__flag & sc4 > bottom__offset) | | |
| if (!mode) | | |
| m = 2*bottom__offset−sc4 | | |
| else | | |
| m = bottom__offset | | |
| else if (sc4 < 0 & top__flag & (−sc4) > top__offset) | | |
| if (!mode) | | |
| m = −2*top__offset−sc4 | | |
| else | | |
| m = −top__offset | | |
| else | | |
| m = sc4 | | |
| if lssrc2[7:4]==0 | | |
| Addr = lssrc + (lssrc2[3:0]+m) | | |
| else if (lssrc2[3:0] + m >= lssrc2[7:4]) | | |
| Addr = lssrc + lssrc2[3:0] + m − lssrc2[7:4] | | |
| else if (lssrc2[3:0] + m < 0) | | |
| Addr = lssrc + lssrc2[3:0] + m + lssrc2[7:4] | | |
| else | | |
| Addr = lssrc + lssrc2[3:0] + m | | |
| Temp__Dst = *Addr | | |
| Register form (non-circular addressing): | | |
| Temp__Dst = *(lssrc + sc6) | | |
| Immediate form: | | |
| Temp__Dst = *uc9 | | |
| Dst__hi = Temp__Dst[ua[5:3]] | | |
| Dst__lo = Temp__Dst[ua[2:0]] | | |
| LDU *lssrc(sc6), ua6, dst | LS unit (i.e., | Load Unsigned |
| Register form (circular addressing): | 4318-i) | |
| if (sc4 > 0 & bottom__flag & sc4 > bottom__offset) | | |
| if (!mode) | | |
| m = 2*bottom__offset−sc4 | | |
| else | | |
| m = bottom__offset | | |
| else if (sc4 < 0 & top__flag & (−sc4) > top__offset) | | |
| if (!mode) | | |
| m = −2*top__offset−sc4 | | |
| else | | |
| m = −top__offset | | |
| else | | |
| m = sc4 | | |
| if lssrc2[7:4]==0 | | |
| Addr = lssrc + (lssrc2[3:0]+m) | | |
| else if (lssrc2[3:0] + m >= lssrc2[7:4]) | | |
| Addr = lssrc + lssrc2[3:0] + m − lssrc2[7:4] | | |
| else if (lssrc2[3:0] + m < 0) | | |
| Addr = lssrc + lssrc2[3:0] + m + lssrc2[7:4] | | |
| else | | |
| Addr = lssrc + lssrc2[3:0] + m | | |
| Temp__Dst = *Addr | | |
| Register form (non-circular addressing): | | |
| Temp__Dst = *(lssrc + sc6) | | |
| Immediate form: | | |
| Temp__Dst = *uc9 | | |

TABLE 6-continued

| Instruction/Pseudocode | Issuing Unit | Comments |
|---|---|---|
| Dst__hi = Temp__Dst[ua[5:3]]<br>Dst__lo = Temp__Dst[ua[2:0]] | | |
| LDU *uc9, ua6, dst<br>Register form (circular addressing):<br>if (sc4 > 0 & bottom__flag & sc4 > bottom__offset)<br>if (!mode)<br>m = 2*bottom__offset−sc4<br>else<br>m = bottom__offset<br>else if (sc4 < 0 & top__flag & (−sc4) > top__offset)<br>if (!mode)<br>m = −2*top__offset−sc4<br>else<br>m = −top__offset<br>else<br>m = sc4<br>if lssrc2[7:4]==0<br>Addr = lssrc + (lssrc2[3:0]+m)<br>else if (lssrc2[3:0] + m >= lssrc2[7:4])<br>Addr = lssrc + lssrc2[3:0] + m − lssrc2[7:4]<br>else if (lssrc2[3:0] + m < 0)<br>Addr = lssrc + lssrc2[3:0] + m + lssrc2[7:4]<br>else<br>Addr = lssrc + lssrc2[3:0] + m<br>Temp__Dst = *Addr<br>Register form (non-circular addressing):<br>Temp__Dst = *(lssrc + sc6)<br>Immediate form:<br>Temp__Dst = *uc9<br>Dst__hi = Temp__Dst[ua[5:3]]<br>Dst__lo = Temp__Dst[ua[2:0]] | LS unit (i.e., 4318-i) | Load Unsigned |
| LDSFMEM *src1, uc4, dst, p2<br>Dst = *[src1]uc4 | LS unit (i.e., 4318-i) | Load from Look Up Table |
| LDK *lssrc, dst<br>Register Form:<br>dst = 0<br>dst[31:0] = *lssrc<br>Immediate Form:<br>dst = 0<br>dst[31:0] = *uc9 | LS unit (i.e., 4318-i) | Load Half-word from LS Data Memory to Functional Unit Register |
| LDK *uc9, dst<br>Register Form:<br>dst = 0<br>dst[31:0] = *lssrc<br>Immediate Form:<br>dst = 0<br>dst[31:0] = *uc9 | LS unit (i.e., 4318-i) | Load Half-word from LS Data Memory to Functional Unit Register |
| LDKLH *lssrc, dst<br>Register Form:<br>dst[31:0] = (*lssrc << 16) \| *lssrc<br>Immediate Form:<br>dst[31:0] = (*uc9 << 16) \| *uc9 | LS unit (i.e., 4318-i) | Load Half-word from LS Data Memory to Functional Unit Register |
| LDKLH *uc9, dst<br>Register Form:<br>dst[31:0] = (*lssrc << 16) \| *lssrc<br>Immediate Form:<br>dst[31:0] = (*uc9 << 16) \| *uc9 | LS unit (i.e., 4318-i) | Load Half-word from LS Data Memory to Functional Unit Register |
| LDKHW .LS1 *lssrc, dst<br>Register Form:<br>tmp__dst[31:0] = *lssrc[9:1]<br>dst[15:0] = lssrc[0] ? tmp__dst[31:16] : tmp__dst[15:0]<br>dst[31:16] = {16{dst[15]}}<br>Immediate Form:<br>dst[31:0] = (*uc10[9:1] << 16) \| *uc9 | LS unit (i.e., 4318-i) | Load Half-word from LS Data Memory to Functional Unit Register |
| LDKHW .LS1 *uc10, dst<br>Register Form:<br>tmp__dst[31:0] = *lssrc[9:1]<br>dst[15:0] = lssrc[0] ? tmp__dst[31:16] : tmp__dst[15:0]<br>dst[31:16] = {16{dst[15]}}<br>Immediate Form:<br>tmp__dst[31:0] = *uc10[9:1]<br>dst[15:0] = uc10[0] ? tmp__dst[31:16] : tmp__dst[15:0]<br>dst[31:16] = {16{dst[15]}} | LS unit (i.e., 4318-i) | Load Half-word from LS Data Memory to Functional Unit Register |
| LDKHWU .LS1 *lssrc, dst | LS unit (i.e., | Load Half-word from |

TABLE 6-continued

| Instruction/Pseudocode | Issuing Unit | Comments |
|---|---|---|
| Register Form:<br>tmp__dst[31:0] = *lssrc[9:1]<br>dst[15:0] = lssrc[0] ? tmp__dst[31:16] : tmp__dst[15:0]<br>dst[31:16] = {16{1'b0}}<br>Immediate Form:<br>tmp__dst[31:0] = *uc10[9:1]<br>dst[15:0] = uc10[0] ? tmp__dst[31:16] : tmp__dst[15:0]<br>dst[31:16] = {16{1'b0}} | 4318-i) | LS Data Memory to Functional Unit Register |
| LDKHWU .LS1 *uc10, dst<br>Register Form:<br>tmp__dst[31:0] = *lssrc[9:1]<br>dst[15:0] = lssrc[0] ? tmp__dst[31:16] : tmp__dst[15:0]<br>dst[31:16] = {16{1'b0}}<br>Immediate Form:<br>tmp__dst[31:0] = *uc10[9:1]<br>dst[15:0] = uc10[0] ? tmp__dst[31:16] : tmp__dst[15:0]<br>dst[31:16] = {16{1'b0}} | LS unit (i.e., 4318-i) | Load Half-word from LS Data Memory to Functional Unit Register |
| LMVK uc9, lsdst<br>Lsdst[8:0] = uc9<br>Lsdst[31:9] = 0 | LS unit (i.e., 4318-i) | Load Immediate Value to Load/Store Register |
| LMVKU .LS1-.LS6 uc16, lsdst<br>Lsdst[15:0] = uc16<br>Lsdst[31:16] = 0 | LS unit (i.e., 4318-i) | Load Immediate Value to Load/Store Register |
| LNOP<br>N/A | LS unit (i.e., 4318-i) | Load-Store Unit NOP |
| MVU uc5, dst<br>Dst = uc5 | multiply unit (i.e., 4346)/logic unit (i.e., 4346) | Move Unsigned Constant to Register |
| MVL src1, dst<br>Dst = src1[11:0] | multiply unit (i.e., 4346)/logic unit (i.e., 4346) | Move Half-Word to Register |
| MVLU src1, dst<br>Dst = src1[11:0] | multiply unit (i.e., 4346)/logic unit (i.e., 4346) | Move Half-Word to Register |
| NEG src2, dst<br>Dst = −src2 | logic unit (i.e., 4346)/round unit (i.e., 4350) | 2's complement |
| NOP<br>N/A | logic unit (i.e., 4346)/round unit (i.e., 4350)/multiply unit (i.e., 4346) | SIMD NOP |
| NOT src2, dst<br>Dst = ~src2 | logic unit (i.e., 4346) | Bitwise Invert |
| OR src1, src2, dst<br>Register form:<br>Dst = src1 \| src2<br>Immediate form:<br>Dst = src1 \| uc5; | logic unit (i.e., 4346) | Bitwise OR |
| ORU src1, uc5, dst<br>Register form:<br>Dst = src1 \| src2<br>Immediate form:<br>Dst = src1 \| uc5; | logic unit (i.e., 4346) | Bitwise OR |
| PABS src2, dst<br>Dst.lo = \|src2.lo\|<br>Dst.hi = \|src2.hi\| | round unit (i.e., 4350) | Packed Absolute Value |
| PACKHH src1, src2, dst<br>Dst = (src1.hi << 12) \| src2.hi | multiply unit (i.e., 4346) | Pack Register, low halves |
| PACKHL src1, src2, dst<br>Dst = (src1.hi << 12) \| src2.lo | multiply unit (i.e., 4346) | Pack Register, low/high halves |
| PACKLH src1, src2, dst<br>Dst = (src1.lo << 12) \| src2.hi | multiply unit (i.e., 4346) | Pack Register, high/low halves |
| PACKLL src1, src2, dst<br>Dst = (src1.lo << 12) \| src2.lo | multiply unit (i.e., 4346) | Pack Register, high halves |

TABLE 6-continued

| Instruction/Pseudocode | Issuing Unit | Comments |
|---|---|---|
| PADD src1, src2, dst<br>Dst.lo = src1.lo + src2.lo<br>Dst.hi = src1.hi + src2.hi | logic unit (i.e., 4346)/round unit (i.e., 4350) | Packed Signed Addition |
| PADDU src1, uc5, dst<br>Dst.lo = src1.lo + uc5<br>Dst.hi = src1.hi + uc5 | logic unit (i.e., 4346)/round unit (i.e., 4350) | Packed Signed Addition |
| PADDU2 src1, src2, dst<br>Dst.lo = (src1.lo + src2.lo) >> 1<br>Dst.hi = (src1.hi + src2.hi) >> 1 | logic unit (i.e., 4346)/round unit (i.e., 4350) | Packed Signed Addition with Divide by 2 |
| PADD2 src1, src2, dst<br>Dst.lo = (src1.lo + src2.lo) >> 1<br>Dst.hi = (src1.hi + src2.hi) >> 1 | logic unit (i.e., 4346)/round unit (i.e., 4350) | Packed Signed Addition with Divide by 2 |
| PADDS src1, src2, uc5, dst<br>Dst.lo = (src1.lo + src2.lo) << uc2<br>Dst.hi = (src1.hi + src2.hi) << uc2 | logic unit (i.e., 4346)/round unit (i.e., 4350) | Packed Signed Addition with Post-Shift Left |
| PCEQ src1, src2, dst<br>Register form:<br>dst.lo = (src1.lo == src2.lo) ? 1 : 0<br>dst.hi = (src1.hi == src2.hi) ? 1 : 0<br>Immediate form:<br>dst.lo = (src1.lo == sc4) ? 1 : 0<br>dst.hi = (src1.hi == sc4) ? 1 : 0 | round unit (i.e., 4350) | Packed Compare Equal |
| PCEQ src1, sc4, dst<br>Register form:<br>dst.lo = (src1.lo == src2.lo) ? 1 : 0<br>dst.hi = (src1.hi == src2.hi) ? 1 : 0<br>Immediate form:<br>dst.lo = (src1.lo == sc4) ? 1 : 0<br>dst.hi = (src1.hi == sc4) ? 1 : 0 | round unit (i.e., 4350) | Packed Compare Equal |
| PCEQU src1, uc4, dst<br>dst.lo = unsigned (src1.lo == uc4) ? 1 : 0<br>dst.hi = unsigned (src1.hi == uc4) ? 1 : 0 | round unit (i.e., 4350) | Unsigned Packed Compare Equal |
| PCGE src1, sc4, dst<br>Register form:<br>dst.lo = (src1.lo >= sc4) ? 1 : 0<br>dst.hi = (src1.hi >= sc4) ? 1 : 0 | round unit (i.e., 4350) | Packed Greater Than or Equal To |
| PCGEU src1, uc4, dst<br>Register form:<br>dst.lo = unsigned (src1.lo <= src2.lo) ? 1 : 0<br>dst.hi = unsigned (src1.hi <= src2.hi) ? 1 : 0<br>Immediate form:<br>dst.lo = unsigned (src1.lo <= uc4) ? 1 : 0<br>dst.hi = unsigned (src1.hi <= uc4) ? 1 : 0 | round unit (i.e., 4350) | Unsigned Packed Greater Than or Equal To |
| PCGT src1, sc4, dst<br>dst.lo = (src1.lo > sc4) ? 1 : 0<br>dst.hi = (src1.hi > sc4) ? 1 : 0 | round unit (i.e., 4350) | Packed Greater Than |
| PCGTU src1, uc4, dst<br>dst.lo = unsigned (src1.lo > uc4) ? 1 : 0<br>dst.hi = unsigned (src1.hi > uc4) ? 1 : 0 | round unit (i.e., 4350) | Unsigned Packed Greater Than |
| PCLE src1, src2, dst<br>Register form:<br>dst.lo = (src1.lo <= src2.lo) ? 1 : 0<br>dst.hi = (src1.hi <= src2.hi) ? 1 : 0<br>Immediate form:<br>dst.lo = (src1.lo <= sc4) ? 1 : 0<br>dst.hi = (src1.hi <= sc4) ? 1 : 0 | round unit (i.e., 4350) | Packed Less Than or Equal to |
| PCLE src1, sc4, dst<br>Register form:<br>dst.lo = (src1.lo <= src2.lo) ? 1 : 0<br>dst.hi = (src1.hi <= src2.hi) ? 1 : 0<br>Immediate form:<br>dst.lo = (src1.lo <= sc4) ? 1 : 0<br>dst.hi = (src1.hi <= sc4) ? 1 : 0 | round unit (i.e., 4350) | Packed Less Than or Equal to |
| PCLEU src1, src2, dst<br>Register form:<br>dst.lo = unsigned (src1.lo <= src2.lo) ? 1 : 0<br>dst.hi = unsigned (src1.hi <= src2.hi) ? 1 : 0<br>Immediate form:<br>dst.lo = unsigned (src1.lo <= uc4) ? 1 : 0<br>dst.hi = unsigned (src1.hi <= uc4) ? 1 : 0 | round unit (i.e., 4350) | Unsigned Packed Less Than or Equal to |
| PCLEU src1, uc4, dst | round unit | Unsigned Packed Less |

TABLE 6-continued

| Instruction/Pseudocode | Issuing Unit | Comments |
| --- | --- | --- |
| Register form:<br>dst.lo = unsigned (src1.lo <= src2.lo) ? 1 : 0<br>dst.hi = unsigned (src1.hi <= src2.hi) ? 1 : 0<br>Immediate form:<br>dst.lo = unsigned (src1.lo <= uc4) ? 1 : 0<br>dst.hi = unsigned (src1.hi <= uc4) ? 1 : 0 | (i.e., 4350) | Than or Equal to |
| PCLIP src2, dst, sr1, sr2<br>If (src2.lo < RCLIPMIN.lo) dst.lo = RCLIPMIN.lo<br>Else if (src2.lo >= RCLIPMAX.lo) dst.lo = RCLIPMAX.lo<br>Else dst.lo = src2.lo<br>If (src2.hi < RCLIPMIN.hi) dst.hi = RCLIPMIN.hi<br>Else if (src2.hi >= RCLIPMAX.hi) dst.hi = RCLIPMAX.hi<br>Else dst.hi = src2.hi | round unit (i.e., 4350) | Packed Min/Max Clip, Low and High Halves |
| PCLIPU src2, dst, sr1, sr2<br>If (src2.lo < RCLIPMIN.lo) dst.lo = RCLIPMIN.lo<br>Else if (src2.lo >= RCLIPMAX.lo) dst.lo = RCLIPMAX.lo<br>Else dst.lo = src2.lo<br>If (src2.hi < RCLIPMIN.hi) dst.hi = RCLIPMIN.hi<br>Else if (src2.hi >= RCLIPMAX.hi) dst.hi = RCLIPMAX.hi<br>Else dst.hi = src2.hi | round unit (i.e., 4350) | Packed Unsigned Min/Max Clip, Low and High Halves |
| PCLT src1, src2, dst<br>Register form:<br>dst.lo = (src1.lo < src2.lo) ? 1 : 0<br>dst.hi = (src1.hi < src2.hi) ? 1 : 0<br>Immediate form:<br>dst.lo = (src1.lo < sc4) ? 1 : 0<br>dst.hi = (src1.hi < sc4) ? 1 : 0 | round unit (i.e., 4350) | Packed Less Than |
| PCLT src1, sc4, dst<br>Register form:<br>dst.lo = (src1.lo < src2.lo) ? 1 : 0<br>dst.hi = (src1.hi < src2.hi) ? 1 : 0<br>Immediate form:<br>dst.lo = (src1.lo < sc4) ? 1 : 0<br>dst.hi = (src1.hi < sc4) ? 1 : 0 | round unit (i.e., 4350) | Packed Less Than |
| PCLTU src1, src2, dst<br>Register form:<br>dst.lo = unsigned (src1.lo < src2.lo) ? 1 : 0<br>dst.hi = unsigned (src1.hi < src2.hi) ? 1 : 0<br>Immediate form:<br>dst.lo = unsigned (src1.lo < uc4) ? 1 : 0<br>dst.hi = unsigned (src1.hi < uc4) ? 1 : 0 | round unit (i.e., 4350) | Unsigned Packed Less Than |
| PCLTU src1, uc4, dst<br>Register form:<br>dst.lo = unsigned (src1.lo < src2.lo) ? 1 : 0<br>dst.hi = unsigned (src1.hi < src2.hi) ? 1 : 0<br>Immediate form:<br>dst.lo = unsigned (src1.lo < uc4) ? 1 : 0<br>dst.hi = unsigned (src1.hi < uc4) ? 1 : 0 | round unit (i.e., 4350) | Unsigned Packed Less Than |
| PCMV src1, src2, src3, dst<br>Register form:<br>Dst.lo = src3.lo ? src1.lo : src2.lo<br>Dst.hi = src3.hi ? src1.hi : src2.hi<br>Immediate form:<br>Dst.lo = src3.lo ? src1.lo : uc5<br>Dst.hi = src3.hi ? src1.hi : uc5 | multiply unit (i.e., 4346)/logic unit (i.e., 4346) | Packed Conditional Move |
| PCMVU src1, uc5, src3, dst<br>Register form:<br>Dst.lo = src3.lo ? src1.lo : src2.lo<br>Dst.hi = src3.hi ? src1.hi : src2.hi<br>Immediate form:<br>Dst.lo = src3.lo ? src1.lo : uc5<br>Dst.hi = src3.hi ? src1.hi : uc5 | multiply unit (i.e., 4346)/logic unit (i.e., 4346) | Packed Conditional Move |
| PMAX src1, src2, dst<br>Dst.hi = (src1.hi>=src2.hi) ? src1.hi : src2.hi<br>Dst.lo = (src1.lo>=src2.lo) ? src1.lo : src2.lo | round unit (i.e., 4350) | Packed Maximum |
| PMAX2 src1, src2, dst<br>tmp.hi = (src1.hi>=src2.hi) ? src1.hi : src2.hi<br>tmp.lo = (src1.lo>=src2.lo) ? src1.lo : src2.lo<br>dst.hi = (tmp.hi>=tmp.lo) ? tmp1.hi : tmp1.lo<br>dst.lo = (tmp.hi>=tmp.lo) ? tmp1.lo : tmp1.hi | round unit (i.e., 4350) | Packed Maximum, with $2^{nd}$ Reorder |
| PMAXU src1, src2, dst<br>Dst.hi = (src1.hi>=src2.hi) ? src1.hi : src2.hi<br>Dst.lo = (src1.lo>=src2.lo) ? src1.lo : src2.lo | round unit (i.e., 4350) | Unsigned Packed Maximum |

TABLE 6-continued

| Instruction/Pseudocode | Issuing Unit | Comments |
|---|---|---|
| PMAX2U src1, src2, dst | round unit | Unsigned Packed |
| tmp.hi = (src1.hi>=src2.hi) ? src1.hi : src2.hi | (i.e., 4350) | Maximum, with $2^{nd}$ |
| tmp.lo = (src1.lo>=src2.lo) ? src1.lo : src2.lo | | Reorder |
| dst.hi = (tmp.hi>=tmp.lo) ? tmp1.hi : tmp1.lo | | |
| dst.lo = (tmp.hi>=tmp.lo) ? tmp1.lo : tmp1.hi | | |
| PMAXMAX2 src1, src2, dst | round unit | Packed Maximum and |
| tmp.hi = (src1.lo>=src2.hi) ? src1.lo : src2.hi | (i.e., 4350) | $2^{nd}$ Maximum |
| tmp.lo = (src1.hi>=src2.lo) ? src1.hi : src2.lo | | |
| dst.hi = (src1.hi>=src2.hi) ? src1.hi : src2.hi | | |
| dst.lo = (src1.hi>=src2.hi) ? tmp.hi : tmp.lo | | |
| PMAXMAX2U src1,src2, dst | round unit | Unsigned Packed |
| tmp.hi = (src1.lo>=src2.hi) ? src1.lo : src2.hi | (i.e., 4350) | Maximum and $2^{nd}$ |
| tmp.lo = (src1.hi>=src2.lo) ? src1.hi : src2.lo | | Maximum |
| dst.hi = (src1.hi>=src2.hi) ? src1.hi : src2.hi | | |
| dst.lo = (src1.hi>=src2.hi) ? tmp.hi : tmp.lo | | |
| PMIN src1, src2, dst | round unit | Packed Minimum |
| Dst.hi = (src1.hi<src2.hi) ? src1.hi : src2.hi | (i.e., 4350) | |
| Dst.lo = (src1.lo<src2.lo) ? src1.lo : src2.lo | | |
| PMIN2 src1, src2, dst | round unit | Packed Minimum, with |
| tmp.hi = (src1.hi<src2.hi) ? src1.hi : src2.hi | (i.e., 4350) | $2^{nd}$ Reorder |
| tmp.lo = (src1.lo<src2.lo) ? src1.lo : src2.lo | | |
| dst.hi = (tmp.hi<tmp.lo) ? tmp1.hi : tmp1.lo | | |
| dst.lo = (tmp.hi<tmp.lo) ? tmp1.lo : tmp1.hi | | |
| PMINU src1, src2, dst | round unit | Unsigned Packed |
| Dst.hi = (src1.hi<src2.hi) ? src1.hi : src2.hi | (i.e., 4350) | Minimum |
| Dst.lo = (src1.lo<src2.lo) ? src1.lo : src2.lo | | |
| PMIN2U src1, src2, dst | round unit | Unsigned Packed |
| tmp.hi = (src1.hi<src2.hi) ? src1.hi : src2.hi | (i.e., 4350) | Minimum, with $2^{nd}$ |
| tmp.lo = (src1.lo<src2.lo) ? src1.lo : src2.lo | | Reorder |
| dst.hi = (tmp.hi<tmp.lo) ? tmp1.hi : tmp1.lo | | |
| dst.lo = (tmp.hi<tmp.lo) ? tmp1.lo : tmp1.hi | | |
| PMINMIN2 src1, src2, dst | round unit | Packed Minimum |
| tmp.hi = (src1.lo<src2.hi) ? src1.lo : src2.hi | (i.e., 4350) | and $2^{nd}$ Minimum |
| tmp.lo = (src1.hi<src2.lo) ? src2.hi : src1.hi | | |
| dst.hi = (src1.hi<src2.hi) ? src1.hi : src2.hi | | |
| dst.lo = (src1.hi<src2.hi) ? tmp.hi : tmp.lo | | |
| PMINMIN2U src1, src2, dst | round unit | Unsigned Packed |
| tmp.hi = (src1.lo<src2.hi) ? src1.lo : src2.hi | (i.e., 4350) | Minimum and $2^{nd}$ |
| tmp.lo = (src1.hi<src2.lo) ? src2.hi : src1.hi | | Minimum |
| dst.hi = (src1.hi<src2.hi) ? src1.hi : src2.hi | | |
| dst.lo = (src1.hi<src2.hi) ? tmp.hi : tmp.lo | | |
| PMPYHH src1, src2, dst | multiply unit | Packed Multiply, high |
| Dst = src1.hi * src2.hi | (i.e., 4346) | halves |
| PMPYHHU src1, src2, dst | multiply unit | Unsigned Packed |
| Dst = src1.hi * src2.hi | (i.e., 4346) | Multiply, high halves |
| PMPYHHXU src1, src2, dst | multiply unit | Mixed Unsigned |
| Dst = src1.hi * src2.hi | (i.e., 4346) | Packed Multiply, high |
| | | halves |
| PMPYHL src1, src2, dst | multiply unit | Packed Multiply, |
| Register forms: | (i.e., 4346) | high/low halves |
| Dst = src1.hi * src2.lo | | |
| Immediate forms: | | |
| Dst = src1.hi * uc5 | | |
| PMPYHL src1, uc4, dst | multiply unit | Packed Multiply, |
| Register forms: | (i.e., 4346) | high/low halves |
| Dst = src1.hi * src2.lo | | |
| Immediate forms: | | |
| Dst = src1.hi * uc5 | | |
| PMPYHLU src1, src2, dst | multiply unit | Unsigned Packed |
| Register forms: | (i.e., 4346) | Multiply, high/low |
| Dst = src1.hi * src2.lo | | halves |
| Immediate forms: | | |
| Dst = src1.hi * uc5 | | |
| PMPYHLXU src1, src2, dst | multiply unit | Mixed Unsigned |
| Register forms: | (i.e., 4346) | Packed Multiply, |
| Dst = src1.hi * src2.lo | | high/low halves |
| Immediate forms: | | |
| Dst = src1.hi * uc5 | | |
| PMPYLHXU src1, src2, dst | multiply unit | Mixed Unsigned |
| Register forms: | (i.e., 4346) | Packed Multiply, |
| Dst = src1.hi * src2.lo | | low/high halves |
| Immediate forms: | | |
| Dst = src1.hi * uc5 | | |
| PMPYLL src1, src2, dst | multiply unit | Packed Multiply, low |
| Register forms: | (i.e., 4346) | halves |
| Dst = src1.lo * src2.lo | | |

TABLE 6-continued

| Instruction/Pseudocode | Issuing Unit | Comments |
|---|---|---|
| Immediate forms:<br>Dst = src1.lo * uc5 | | |
| PMPYLL src1, uc4, dst<br>Register forms:<br>Dst = src1.lo * src2.lo<br>Immediate forms:<br>Dst = src1.lo * uc5 | multiply unit (i.e., 4346) | Packed Multiply, low halves |
| PMPYLLU src1, src2, dst<br>Register forms:<br>Dst = src1.lo * src2.lo<br>Immediate forms:<br>Dst = src1.lo * uc5 | multiply unit (i.e., 4346) | Unsigned Packed Multiply, low halves |
| PMPYLLXU src1, src2, dst<br>Register forms:<br>Dst = src1.lo * src2.lo<br>Immediate forms:<br>Dst = src1.lo * uc5 | multiply unit (i.e., 4346) | Mixed Unsigned Packed Multiply, low halves |
| PNEG src2, dst<br>Dst.lo = −src2.lo<br>Dst.hi = −src2.hi | logic unit (i.e., 4346)/R1 | Packed 2's complement |
| PRND src2, dst, sr1<br>If RRND.lo[3] = 1, Shift_value = 4<br>Else if RRND.lo[2] = 1, Shift value = 3<br>Else if RRND.lo[1] = 1, Shift value = 2<br>Else Shift value = 1<br>If RRND.hi[3] = 1, Shift_value = 4<br>Else if RRND.hi[2] = 1, Shift value = 3<br>Else if RRND.hi[1] = 1, Shift value = 2<br>Else Shift value = 1<br>Dst.lo = (src2.lo + RRND.lo) >> Shift_value.lo<br>Dst.hi = (src2.hi + RRND.hi) >> Shift_value.hi | logic unit i.e., 4346) | Packed Round |
| PRNDU src2, dst, sr1<br>If RRND.lo[3] = 1, Shift_value = 4<br>Else if RRND.lo[2] = 1, Shift value = 3<br>Else if RRND.lo[1] = 1, Shift value = 2<br>Else Shift value = 1<br>If RRND.hi[3] = 1, Shift_value = 4<br>Else if RRND.hi[2] = 1, Shift value = 3<br>Else if RRND.hi[1] = 1, Shift value = 2<br>Else Shift value = 1<br>Dst.lo = (src2.lo + RRND.lo) >> Shift_value.lo<br>Dst.hi = (src2.hi + RRND.hi) >> Shift_value.hi | logic unit (i.e., 4346) | Unsigned Packed Round |
| PSCL src1, dst, sr1<br>If(RSCL[4])<br>Dst.lo = src1.lo >> RSCL[3:0])<br>Else<br>Dst.lo = src1.lo << RSCL[3:0])<br>If(RSCL[9])<br>Dst.hi = src1.hi >> RSCL[8:5])<br>Else<br>Dst.hi = src1.hi << RSCL[8:5]) | logic unit (i.e., 4346) | Packed Scale |
| PSCLU src1, dst, sr1<br>If(RSCL[4])<br>Dst.lo = src1.lo >> RSCL[3:0])<br>Else<br>Dst.lo = src1.lo << RSCL[3:0])<br>If(RSCL[9])<br>Dst.hi = src1.hi >> RSCL[8:5])<br>Else<br>Dst.hi = src1.hi << RSCL[8:5]) | logic unit (i.e., 4346) | Unsigned Packed Scale |
| PSHL src1, src2, dst<br>Register form:<br>Dst.lo = src1.lo << src2[3:0]<br>Dst.hi = src1.hi << src2[15:12]<br>Immediate form:<br>Dst.lo = src1.lo << uc4<br>Dst.hi = src1.hi << uc4 | multiply unit (i.e., 4346)/logic unit (i.e., 4346) | Packed Shift Left |
| PSHL src1, uc4, dst<br>Register form:<br>Dst.lo = src1.lo << src2[3:0]<br>Dst.hi = src1.hi << src2[15:12]<br>Immediate form:<br>Dst.lo = src1.lo << uc4<br>Dst.hi = src1.hi << uc4 | multiply unit (i.e., 4346)/logic unit (i.e., 4346) | Packed Shift Left |
| PSHRU src1, src2, dst<br>Register form:<br>Dst.lo = src1.lo >> src2[3:0]<br>Dst.hi = src1.hi >> src2[15:12] | multiply unit (i.e., 4346)/logic unit (i.e., | Packed Shift Right, Logical |

TABLE 6-continued

| Instruction/Pseudocode | Issuing Unit | Comments |
|---|---|---|
| Immediate form:<br>Dst.lo = src1.lo >> uc4<br>Dst.hi = src1.hi >> uc4 | 4346) | |
| PSHRU src1, uc4, dst<br>Register form:<br>Dst.lo = src1.lo >> src2[3:0]<br>Dst.hi = src1.hi >> src2[15:12]<br>Immediate form:<br>Dst.lo = src1.lo >> uc4<br>Dst.hi = src1.hi >> uc4 | multiply unit (i.e., 4346)/logic unit (i.e., 4346) | Packed Shift Right, Logical |
| PSHR src1, src2, dst<br>Register form:<br>Dst.lo = $unsigned(src1.lo) >> src2[3:0]<br>Dst.hi = $unsigned(src1.hi) >> src2 [15 :12]<br>Immediate form:<br>Dst.lo = $unsigned(src1.lo) >> uc4<br>Dst.hi = $unsigned(src1.hi) >> uc4 | multiply unit (i.e., 4346)/logic unit (i.e., 4346) | Packed Shift Right, Arithmetic |
| PSHR src1, uc4, dst<br>Register form:<br>Dst.lo = $unsigned(src1.lo) >> src2[3:0]<br>Dst.hi = $unsigned(src1.hi) >> src2 [15:12]<br>Immediate form:<br>Dst.lo = $unsigned(src1.lo) >> uc4<br>Dst.hi = $unsigned(src1.hi) >> uc4 | multiply unit (i.e., 4346)/logic unit (i.e., 4346) | Packed Shift Right, Arithmetic |
| PSIGN src1, src2, dst<br>Dst.hi = (src1.hi < 0) ? −src2.hi : src2.hi<br>Dst.lo = (src1.lo < 0) ? −src2.lo : src2.lo | round unit (i.e., 4350) | Packed Change Sign |
| PSUB src1, src2, dst<br>Dst.hi = src1.hi − src2.hi<br>Dst.lo = src1.lo − src2.lo | logic unit (i.e., 4346)/round unit (i.e., 4350) | Packed Subtract |
| PSUBU src1, uc5, dst<br>Dst.hi = src1.hi − uc5<br>Dst.lo = src1.lo − uc5 | logic unit (i.e., 4346)/round unit (i.e., 4350) | Packed Subtract |
| PSUB2 src1, src2, dst<br>Dst.hi = (src1.hi − src2.hi) >> 1<br>Dst.lo = (src1.lo − src2.lo) >> 1 | logic unit (i.e., 4346)/round unit (i.e., 4350) | Packed Subtract with Divide by 2 |
| PSUBU2 src1, src2, dst<br>Dst.hi = (src1.hi − src2.hi) >> 1<br>Dst.lo = (src1.lo − src2.lo) >> 1 | logic unit (i.e., 4346)/round unit (i.e., 4350) | Packed Subtract with Divide by 2 |
| RND src2, dst, sr1<br>If RRND[3] = 1, Shift__value = 4<br>Else if RRND[2] = 1, Shift value = 3<br>Else if RRND[1] = 1, Shift value = 2<br>Else Shift value = 1<br>Dst = (src2 + RRND[3:0]) >> Shift__value | logic unit (i.e., 4346) | Round |
| RNDU src2, dst, sr1<br>If RRND[3] = 1, Shift__value = 4<br>Else if RRND[2] = 1, Shift value = 3<br>Else if RRND[1] = 1, Shift value = 2<br>Else Shift value = 1<br>Dst = (src2 + RRND[3:0]) >> Shift__value | logic unit (i.e., 4346) | Round, with Unsigned Extension |
| SCL src1, dst, sr1<br>shft = RSCL[4:0]<br>If(!RSCL[5]) dst = src1 << shft<br>If(RSCL[5]) dst = src1 >> shft | logic unit (i.e., 4346) | Scale |
| SCLU src1, dst, sr1<br>shft = RSCL[4:0]<br>If(!RSLC[5]) dst = src1 << shft<br>If(RSCL[5]) dst = $unsigned(src1) >> shft | logic unit (i.e., 4346) | Unsigned Scale |
| SHL src1, src2, dst<br>Register form:<br>dst = src1 << src2[4:0]<br>Immediate form:<br>Dst = src1 << uc5 | multiply unit (i.e., 4346)/logic unit (i.e., 4346) | Shift Left |
| SHL src1, uc5, dst<br>Register form:<br>dst = src1 << src2[4:0]<br>Immediate form:<br>Dst = src1 << uc5 | multiply unit (i.e., 4346)/logic unit (i.e., 4346) | Shift Left |
| SHRU src1, src2, dst<br>Register forms:<br>dst = $unsigned(src1) >> src2[4:0] | multiply unit (i.e., 4346)/logic | Shift Right, Logical |

TABLE 6-continued

| Instruction/Pseudocode | Issuing Unit | Comments |
|---|---|---|
| Immediate forms:<br>dst = $unsigned(src1) >> uc5 | unit (i.e.,<br>4346) | |
| SHRU src1, uc5, dst<br>Register forms:<br>dst = $unsigned(src1) >> src2[4:0]<br>Immediate forms:<br>dst = $unsigned(src1) >> uc5 | multiply unit<br>(i.e.,<br>4346)/logic<br>unit (i.e.,<br>4346) | Shift Right, Logical |
| SHR src1, src2, dst<br>Register forms:<br>dst = src1 >> src2[4:0]<br>Immediate forms:<br>dst = src1 >> uc5 | multiply unit<br>(i.e.,<br>4346)/logic<br>unit (i.e.,<br>4346) | Shift Right, Arithmetic |
| SHR src1, uc5, dst<br>Register forms:<br>dst = src1 >> src2[4:0]<br>Immediate forms:<br>dst = src1 >> uc5 | multiply unit<br>(i.e.,<br>4346)/logic<br>unit (i.e.,<br>4346) | Shift Right, Arithmetic |
| ST *lssrc(lssrc2),sc4, ua6, dst<br>Register form (circular addressing):<br>if lssrc2[7:4]==0<br>Addr = lssrc + (lssrc2[3:0]+sc4)<br>else if (lssrc2[3:0] + sc4 >= lssrc2[7:4])<br>Addr = lssrc + lssrc2[3:0] + sc4 − lssrc2[7:4]<br>else if (lssrc2[3:0] + sc4 < 0)<br>Addr = lssrc + lssrc2[3:0] + sc4 + lssrc2[7:4]<br>else<br>Addr = lssrc + lssrc2[3:0] + sc4<br>*Addr = dst<br>Register form (non-circular addressing):<br>*(lssrc + sc6) = dst<br>Immediate form:<br>*uc9 = dst | LS unit (i.e.,<br>4318-i) | Store |
| ST *lssrc(sc6), ua6, dst<br>Register form (circular addressing):<br>if lssrc2[7:4]==0<br>Addr = lssrc + (lssrc2[3:0]+sc4)<br>else if (lssrc2[3:0] + sc4 >= lssrc2[7:4])<br>Addr = lssrc + lssrc2[3:0] + sc4 − lssrc2[7:4]<br>else if (lssrc2[3:0] + sc4 < 0)<br>Addr = lssrc + lssrc2[3:0] + sc4 + lssrc2[7:4]<br>else<br>Addr = lssrc + lssrc2[3:0] + sc4<br>*Addr = dst<br>Register form (non-circular addressing):<br>*(lssrc + sc6) = dst<br>Immediate form:<br>*uc9 = dst | LS unit (i.e.,<br>4318-i) | Store |
| ST *uc9, ua6, dst<br>Register form (circular addressing):<br>if lssrc2[7:4]==0<br>Addr = lssrc + (lssrc2[3:0]+sc4)<br>else if (lssrc2[3:0] + sc4 >= lssrc2[7:4])<br>Addr = lssrc + lssrc2[3:0] + sc4 − lssrc2[7:4]<br>else if (lssrc2[3:0] + sc4 < 0)<br>Addr = lssrc + lssrc2[3:0] + sc4 + lssrc2[7:4]<br>else<br>Addr = lssrc + lssrc2[3:0] + sc4<br>*Addr = dst<br>Register form (non-circular addressing):<br>*(lssrc + sc6) = dst<br>Immediate form:<br>*uc9 = dst | LS unit (i.e.,<br>4318-i) | Store |
| STFMEMI *src1, uc4, p2<br>*uc4[src1]++ | LS unit (i.e.,<br>4318-i) | Store to Shared<br>function-memory<br>Increment |
| STFMEMW *src1, uc4, src2, p2<br>temp = *uc4[src1]++; temp1 = temp + src2;<br>*uc4[src1]++ = temp1; | LS unit (i.e.,<br>4318-i) | Store to Shared<br>function-memory<br>Weighted |
| STFMEM *src1, uc4, src2, p2<br>*uc4[src1]++ = src2; | LS unit (i.e.,<br>4318-i) | Store to Shared<br>function-memory |
| STK *lssrc, dst<br>Register form:<br>STK<br>*lssrc = dst[31:0] | LS unit (i.e.,<br>4318-i) | Store Data to LS Data<br>Memory |

TABLE 6-continued

| Instruction/Pseudocode | Issuing Unit | Comments |
|---|---|---|
| Immediate form:<br>STK<br>*uc9 = dst[31:0]<br>STK *uc9, dst<br>Register form:<br>STK<br>*lssrc = dst[31:0]<br>Immediate form:<br>STK<br>*uc9 = dst[31:0] | LS unit (i.e., 4318-i) | Store Data to LS Data Memory |
| SUB src1, src2, dst<br>Register form:<br>Dst = src1 − src2<br>Immediate form:<br>Dst = src1 − uc5 | logic unit (i.e., 4346)/round unit (i.e., 4350) | Subtract |
| SUBU src1, uc5, dst<br>Register form:<br>Dst = src1 − src2<br>Immediate form:<br>Dst = src1 − uc5 | logic unit (i.e., 4346)/round unit (i.e., 4350) | Subtract |
| XOR src1, src2, dst<br>Register form:<br>Dst = src1 ^ src2<br>Immediate form:<br>Dst = src1 ^ uc5 | logic unit i.e., 4346) | Bitwise XOR |
| XORU src1, uc5, dst<br>Register form:<br>Dst = src1 ^ src2<br>Immediate form:<br>Dst = src1 ^ uc5 | logic unit (i.e., 4346) | Bitwise XOR |

7. RISC Processor Cores

Within processing cluster 1400, general-purpose RISC processors serve various purposes. For example, node processor 4322 (which can be a RISC processor) can be used for program flow control. Below examples of RISC architectures are described.

7.1. Overview

Figure 111:
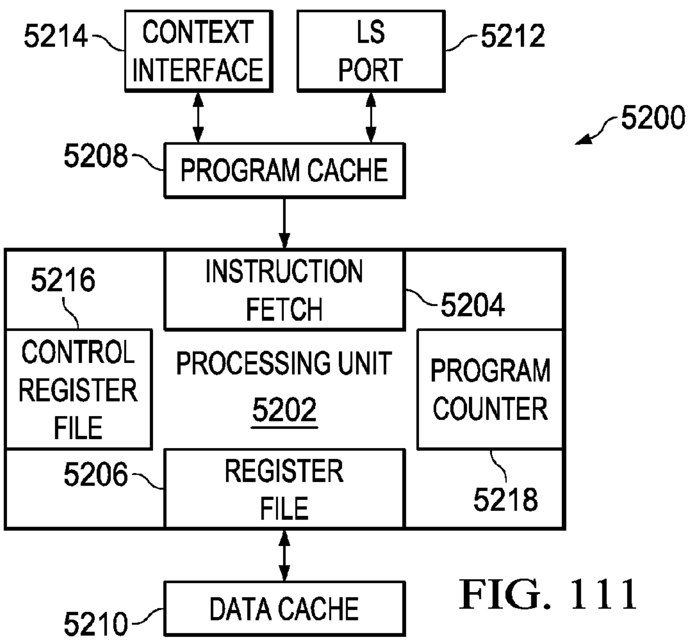
FIG. 111 is a more detailed diagram of a node processor or RISC processor.

Turning to FIG. 111, a more detailed example of RISC processor 5200 (i.e., node processor 4322) can be seen. The pipeline used by processor 5200 generally provides support for general high level language (i.e., C/C++) execution in processing cluster 1400. In operation, processor 5200 employs a three stage pipeline of fetch, decode, and execute. Typically, context interface 5214 and LS port 5212 provide instructions to the program cache 508, and the instructions can be fetched from the program cache 5208 by instruction fetch 5204. The bus between the instruction fetch 5204 and the program cache 5208 can, for example, be 40 bits wide, allowing the processor 5200 to support dual issue instructions (i.e., instructions can be 40 bits or 20 bits wide). Generally, "A-side" and "B-side" functional units (within processing unit 5202) execute the smaller instructions (i.e., 20-bit instructions), while the "B-side" functional units execute the larger instructions (i.e., 40-bit instructions). To execution the instructions provided, processing unit can use register file 5206 as a "scratch pad"; this register file 5206 can be (for example) a 16-entry, 32-bit register file that is shared between the "A-side" and "B-side." Additionally, processor 5200 includes a control register file 5216 and a program counter 5218. Processor 5200 can also be access through boundary pins; an example of each is described in Table 7 (with "z" denoting active low pins).

TABLE 7

| Pin Name | Width | Dir | Purpose |
|---|---|---|---|
| | | | Context Interface |
| cmem_wdata | 609 | Output | Context memory write data |
| cmem_wdata_valid | 1 | Output | Context memory read data |
| cmem_rdy | 1 | Input | Context memory ready |
| | | | Data Memory Interface |
| dmem_enz | 1 | Output | Data memory select |
| dmem_wrz | 1 | Output | Data memory write enable |
| dmem_bez | 4 | Output | Data memory write byte enables |
| dmem_addr | 16/32 | Output | Data memory address (32 bits for GLS processor 5402) |
| dmem_wdata | 32 | Output | Data memory write data |
| dmem_addr_no_base | 16/32 | Output | Data memory address, prior to context base address adjust (32 bits for GLS processor 5402) |

TABLE 7-continued

| Pin Name | Width | Dir | Purpose |
|---|---|---|---|
| dmem_rdy | 1 | Input | Data memory ready |
| dmem_rdata | 32 | Input | Data memory read data |
| Instruction Memory Interface | | | |
| imem_enz | 1 | Output | Instruction memory select |
| imem_addr | 16 | Output | Instruction memory address |
| imem_rdy | 1 | Input | Instruction memory ready |
| imem_rdata | 40 | Input | Instruction memory read data |
| Program Control Interface | | | |
| force_pcz | 1 | Input | Program counter write enable |
| new_pc | 17 | Input | Program counter write data |
| Context Control Interface | | | |
| force_ctxz | 1 | Input | Force context write enable which: writes the value on new_ctx to the internal machine state; and schedules a context save. |
| write_ctxz | 1 | Input | Write context enable which writes the value on new_ctx to the internal machine state. |
| save_ctxz | 1 | Input | Save context enable which schedules a context save. |
| new_ctx | 592 | Input | Context change write data |
| Context Base Address | | | |
| ctx_base | 11 | Input | Context change write address |
| Flag and Strapping Pins | | | |
| risc_is_idle | 1 | Output | Asserted in decode stage 5308 when an IDLE instruction is decoded. |
| risc_is_end | 1 | Output | Asserted in decode stage 5308 when an END instruction is decoded. |
| risc_is_output | 1 | Output | Decode flag asserted in decode stage 5308 on decode of an OUTPUT instruction |
| risc_is_voutput | 1 | Output | Decode flag asserted in decode stage 5308 on decode of a VOUTPUT instruction |
| risc_is_vinput | 1 | Output | Decode flag asserted in decode stage 5308 on decode of a VINPUT instruction |
| risc_is_mtv | 1 | Output | Asserted in decode stage 5308 when an MTV instruction is decoded. (move to vector or SIMD register from processor 5200, with replicate) |
| risc_is_mtvvr | 1 | Output | Asserted in decode stage 5308 when an MTVVR instruction is decoded. (move to vector or SIMD register from processor 5200) |
| risc_is_mfvvr | 1 | Output | Asserted in decode stage 5308 when an MFVVR instruction is decoded (move from vector or SIMD register to processor 5200) |
| risc_is_mfvrc | 1 | Output | Asserted in decode stage 5308 when an MFVRC instruction is decoded. (move to vector or SIMD register from processor 5200, with collapse) |
| risc_is_mtvre | 1 | Output | Asserted in decode stage 5308 when an MTVRE instruction is decoded. (move to vector or SIMD register from processor 5200, with expand) |
| risc_is_release | 1 | Output | Asserted in decode stage 5308 when a RELINP (Release Input) instruction is decoded. |
| risc_is_task_sw | 1 | Output | Asserted in decode stage 5308 when a TASKSW (Task Switch) instruction is decoded. |
| risc_is_taskswtoe | 1 | Output | Asserted in decode stage 5308 when a TASKSWTOE instruction is decoded. |
| risc_taskswtoe_opr | 2 | Output | Asserted in execution stage 5310 when a TASKSWTOE instruction is decoded. This bus contains the value of the U2 immediate operand. |
| risc_mode | 2 | Input | Statically strapped input pins to define reset behavior. |

| Value | Behavior |
|---|---|
| 00 | Exiting reset causes processor 5200 to fetch instruction memory address zero and load this into the program counter 5218 |
| 01 | Exiting reset causes processor 5200 to remain idle until the assertion of force_pcz |
| 10/11 | Reserved |

TABLE 7-continued

| Pin Name | Width | Dir | Purpose |
| --- | --- | --- | --- |
| risc_estate0 | 1 | Input | External state bit 0. This pin is directly mapped to bit 11 of the Control Status Register (described below) |
| wrp_terminate | 1 | Input | Termination message status flag sourced by external logic (typically the wrapper)<br>This pin readable via the CSR. |
| wrp_dst_output_en | 8 | Input | Asserted by the SFM wrapper to control OUTPUT instructions based on wrapper enabled dependency checking. |
| wrp_dst_voutput_en | 8 | Input | Asserted by the SFM wrapper to control VOUTPUT instructions based on wrapper enabled dependency checking. |
| risc_out_depchk_failed | 1 | Output | Flag asserted in D0 on failure of dependency checking during decode of an OUTPUT instruction. |
| risc_vout_depchk_failed | 1 | Output | Flag asserted in D0 on failure of dependency checking during decode of a VOUTPUT instruction. |
| risc_inp_depchk_failed | 1 | Output | Flag asserted in D0 on failure of dependency checking during decode of a VINPUT instruction. |
| risc_fill | 1 | Output | Asserted in execution stage 5310.<br>Typically, valid for the circular form of VOUTPUT (which is the 5 operand form of VOUTPUT).<br>See the P-code description for OPC_VOUTPUT_40b_235 for details. |
| risc_branch_valid | 1 | Output | Flag asserted in E0 when processing a branch instruction.<br>At present this flag does not assert for CALL and RET. This may change based on feedback from SDO. |
| risc_branch taken | 1 | Output | Flag asserted in E0 when a branch is taken.<br>At present this flag does not assert for CALL and RET. This may change based on feedback from SDO. |
| OUTPUT Instruction Interface | | | |
| risc_output_wd | 32 | Output | Contents of the data register for an OUTPUT or VOUTPUT instruction. This is driven in execution stage 5310. |
| risc_output_wa | 16 | Output | Contents of the address register for an OUTPUT or VOUTPUT instruction.<br>This is driven in execution stage 5310. |
| risc_output_disable | 1 | Output | Value of the SD (Store disable) bit of the circular addressing control register used in an OUTPUT or VOUTPUT instruction. See Section [00704] for a description of the circular addressing control register format.<br>This is driven in execution stage 5310. |
| risc_output_pa | 6 | Output | Value of the pixel address immediate constant of an OUTPUT instruction.<br>This is driven in execution stage 5310.<br>(U6, below, is the 6 bit unsigned immediate value of an OUTPUT instruction)<br>6'b000000 |
| | | | word store<br>6'b001100 |
| | | | Store lower half word of U6 to lower center lane<br>6'b001110 |
| | | | Store lower half word of U6 to upper center lane<br>6'b000011 |
| | | | Store upper half word of U6 to upper center lane<br>6'b000111 |
| | | | Store upper half word of U6 to lower center lane<br>All other values are illegal and result in unspecified behavior |
| risc_output_vra | 4 | Output | The vector register address of the VOUTPUT instruction |

TABLE 7-continued

| Pin Name | Width | Dir | Purpose |
|---|---|---|---|
| risc__vip__size | 8 | Output | This is the driven by the lower 8 bits (Block__Width/HG__SIZE) of Vertical Index Parameter register. The VIP is specified as an operand for some instructions. This is driven in execution stage 5310. |
| General Purpose Register to Vector/SIMD Register Transfer Interface | | | |
| risc__vec__ua | 5 | Output | Vector (or SIMD) unit (aka 'lane') address for MTVVR and MFVVR instructions This is driven in execution stage 5310. |
| risc__vec__wa | 5 | Output | For MTV, MTVRE and MTVVR instructions: Vector (or SIMD) register file write address. For MFVVR and MFVRC instructions: Contains the address of the T20 GPR which is to receive the requested vector data. This is driven in execution stage 5310. |
| risc__vec__wd | 32 | Output | Vector (or SIMD) register file write data. This is driven in execution stage 5310. |
| risc__vec__hwz | 2 | Output | Vector (or SIMD) register file write half word select<br>00 = write both<br>10 = write lower<br>01 = write upper<br>11= read<br>Gated with vec__regf__enz assertion.<br>This is driven in execution stage 5310. |
| risc__vec__ra | 5 | Output | Vector (or SIMD) register file read address. This is driven in execution stage 5310. |
| vec__risc__wrz | 1 | Input | Register file write enable. Driven by Vector (or SIMD) when it is returning write data as a result of a MFVVR or MFVRC instruction. |
| vec__risc__wd | 32 | Output | Vector (or SIMD) register file write data. This is driven in execution stage 5310. |
| vec__risc__wa | 4 | Input | The General purpose register file 5206 address that is the destination for vector data returning as a result of a MFVVR or MFVRC instruction. |
| Node Interface | | | |
| node__regf__wr[0:5]z | 1bx6 | Input | Register file write port write enable |
| node__regf__wa[0:5] | 4bx6 | Input | Register file write port address. There are 6 write ports into general purpose register file 5206 for node support |
| node__regf__wd[0:5] | 32bx6 | Input | Register file write port data. |
| node__regf__rd | 512 | Output | Register file read data. |
| node__regf__rdz | 1 | Input | General purpose register file 5206 contents read enable. |
| Global LS Interface (which can be used for GLS processor 5402) | | | |
| gls__is__stsys | 1 | Output | Attribute interface flag. Asserted in decode stage 5308 when an STSYS instruction is decoded. |
| gls__is__ldsys | 1 | Output | Attribute interface flag. Asserted in decode stage 5308 when an LDSYS instruction is decoded. |
| gls__posn | 3 | Output | Attribute value. Asserted in decode stage 5308, represents the immediate constant value of the LDATTR, STSYS, LDSYS instructions |
| gls__sys__addr | 32 | Output | Attribute interface system address. Asserted in decode stage 5308, represents the contents of the register specified on attr__regf__addr. |
| gls__vreg | 4 | Output | Attribute interface register file address. Asserted in decode stage 5308, this is the value (address) of the last operand (virtual GPR register address) in the LDATTR, STSYS, LDSYS instructions |
| Interrupt Interface | | | |
| nmi | 1 | Input | Level triggered non-mask-able interrupt |
| int0 | 1 | Input | Level triggered mask-able interrupt |
| int1 | 1 | Input | Level triggered externally managed interrupt |
| iack | 1 | Output | Interrupt acknowledge |
| inum | 3 | Output | Acknowledged interrupt identifier |
| Debug Interface | | | |
| dbg__rd | 32 | Output | Debug register read data |
| risc__brk__trc__match | 1 | Output | Asserted when the processor 5200 debug module detects either a break-point or trace-point match |
| risc__trc__pt__match | 1 | Output | Asserted when the processor 5200 debug module detects a trace-point match |

TABLE 7-continued

| Pin Name | Width | Dir | Purpose |
|---|---|---|---|
| risc__trc__pt__match__id | 2 | Output | The ID of the break/trace point register which detected a match. |
| dbg__req | 1 | Input | Debug module access request |
| dbg__addr | 5 | Input | Debug module register address |
| dbg__wrz | 1 | Input | Debug module register write enable. |
| dbg__mode__enable | 1 | Input | Debug module master enable |
| wp__cur__cntx | 4 | Input | Wrapper driven current context number |
| wp__events | 16 | Input | User defined event input bus |
| | | | Clocking and Reset |
| ck0 | 1 | Input | Primary clock to the CPU core |
| ck1 | 1 | Input | Primary clock to the debug module |

7.2 Pipeline

Figure 112:
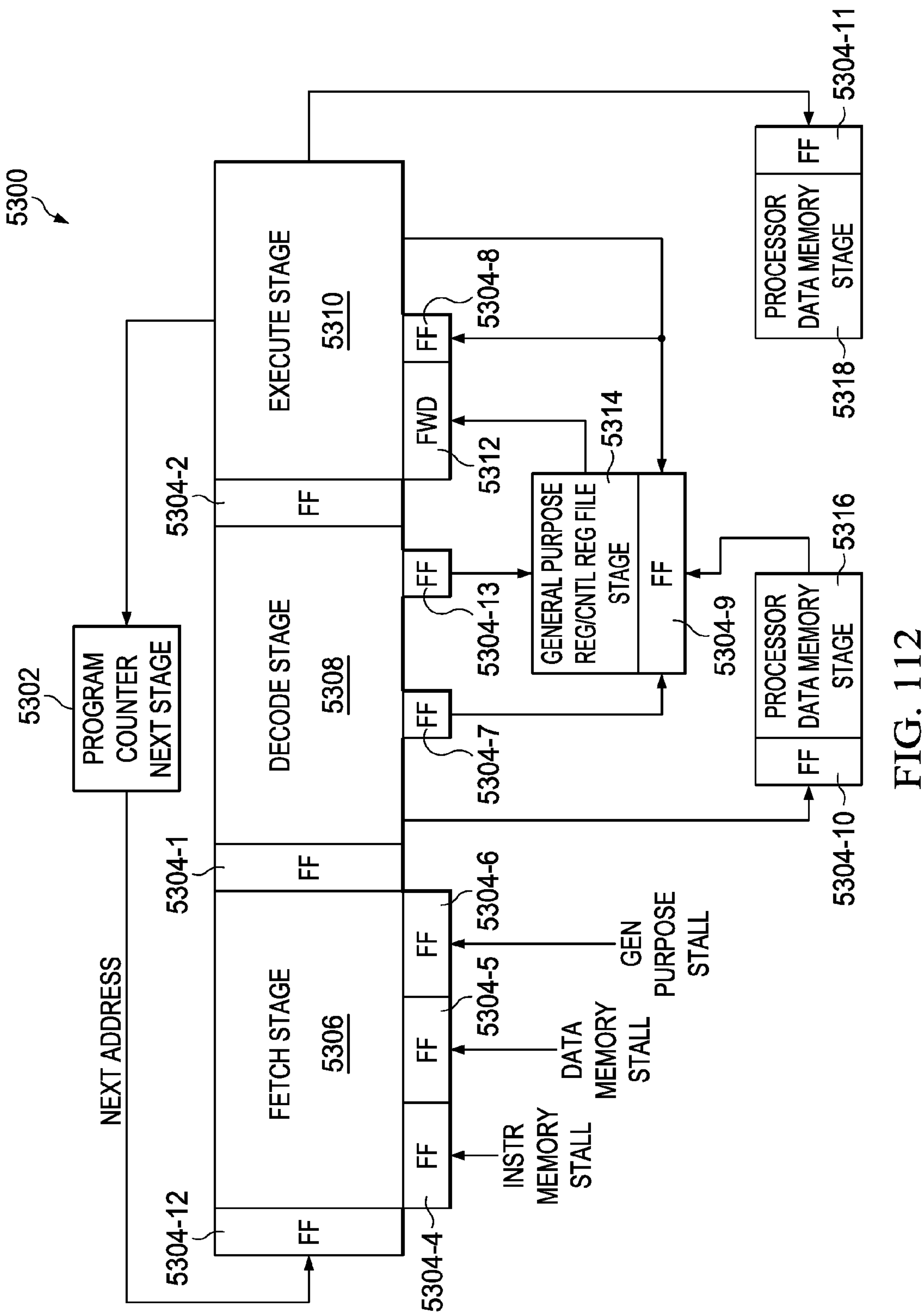

Turning to FIG. 112, an example 5300 of the pipeline for processor 5200 can be seen. As shown, this pipeline 5300 has three principal stages: fetch 5306, decode 5308, and execute 5310. In operation, an address is received by flip-flops 5304-12, which allows the fetch to occur in the fetch stage 5306. The result of the fetch stage is provided to flip-flop 5304-1, so that the decode stage 5308 can decode the instruction received during the fetch stage 5306. The results from the decode stage can then be provided to flip-flops 5304-2, 5304-7, 5304-13, and 5304-10. Namely, decode stage 5308 can provide a processor data memory (i.e., 4328) read address to flip-flop 5304-10, allowing the processor data memory stage 5316 to load data to flip-flop 5304-9 from processor data memory (i.e., 4328). Additionally, decode stage 5308 can provide a general purpose register (GPR) write address to flip-flop 5304-9 (through flip-flop 5304-7) and GPR read adder to GPR/control register file stage 5314 (through flip-flop 5304-14). The execute stage can then used date provided through flip-flops 5304-2, 5304-8 and forward stage 5312 to generate write address and write data for flip-flop 5304-11 so that the write address and write data can be written to processor data memory (i.e., 4328) in processor data memory stage 5318. Upon completion, the execution stage 5310 indicates to program counter next stage 5302 to provide the next address to flip-flop 5304-12.

There are typically two executable delay slots for instructions which modify the program counter. Instructions which exhibit branching behavior are not permitted in either delay slot of a branch. Instructions which are illegal in the delay slot of a branch may be identified by tooling using ProfAPI. If an instruction record's action field contains the keyword "BR", this instruction is illegal in either of the two delay slots of a branch. Load instructions can exhibit a one cycle load use delay. This delay is generally managed by software (i.e., there is no hardware interlock to enforce the associated stall). An example is:

```
SUB .SB R4,R2
LDW .SB *+R1,R2
ADD .SB R2,R3
MUL .SB R2,R4
```

In this case the ADD will use the contents of R2 resulting from the SUB and not the results of the load. The MUL will use the contents of R2 resulting from the load. Loads which calculate an address, or have a register based address access data memory (i.e., 4328) after address calculation has been completed in execution stage 5310. Loads with address operands fully expressed as an immediate value exhibit "zero" cycles of load use delay relative to the execution pipe stage, i.e. these instructions access data memory (i.e., 4328) from decode stage 5308 rather than the execution stage 5310. The compiler 706 is generally responsible for appropriately scheduling access to data memory (i.e., 4328), and register values in the presence of these two types of loads.

Primary input rose mode[1:0] controls T20's behavior on exit from reset. When risc_mode is set to 2'b00 and after the completion of reset processor 5200 will perform a data memory (i.e., 4328) load from address 0, the reset vector. The value contained there is loaded into the PC. Causing an effective absolute branch to the address contained in the reset vector. When risc_mode is set to 2'b01 the processor 5200 remains stalled until the assertion of force_pcz. The reset vector is not loaded in this case.

Boundary pins, however, can also indicate stall conditions. Generally, there are four stall conditions signaled by entity boundary pins: instruction memory stall; data memory stall, context memory stall, and function-memory stall. De-assertion of any of these pins will stall processor 5200 under the following conditions:

(1) Instruction memory stall (imem_rdy)

i. If this signal is low next address generation is disabled. The currently presented instruction memory address is held constant.

ii. All instructions in decode and execute are permitted to complete (if their associated ready signals are valid)

iii. External logic is responsible for correct usage of the force_pcz. force_pcz should be AND'ed with imem_rdy. For validation purposes force_pcz can be assumed to never be asserted (low) when imem_rdy is low.

(2) Data memory stall (dmem_rdy)

i. If this signal is low and there is a load instruction in the decode stage or a store instruction in the execute stage, the processor 5200 stalls. No further instructions are fetched, no register file updates occur, no condition code bits are updated and the data memory interface address (dmem_addr) pins are held at their current values.

ii. The processor data memory control pins dmem_enz, dmem_wrz and dmem_bez are forced high if dmem_rdy is low to avoid corruption of processor data memory (i.e., 4328).

(3) Context memory stall (cmem_rdy)

i. If this signal is low and there is pending context save the node processor 4322 stalls. No further instructions are fetched, no register file updates occur, no condition code bits are updated and the context memory interface address (cmem_addr) pins are held at their current values.

ii. The context memory control pins cmem_enz, cmem_wrz and cmem_bez are forced high if cmem_rdy is low to avoid corruption of context memory.

iii. External logic is responsible for correct usage of the force_ctxz. force_ctxz should be AND'ed with cmem_rdy. For validation purposes force_ctxz can be assumed to never be asserted (low) when cmem_rdy is low.

(4) vector-memory stall (vmem_rdy)

i. vmem_rdy is primarily supplied as a ready indicator for vector memory (VMEM). However it can be used as a general stall input which operates similar to dmem_rdy.

ii. instruction in the execute stage, the T20 stalls (and in the case of T80 the vector units also stall). No further instructions are fetched, no register file updates occur, no condition code bits are updated, the function memory interface address pins (vmem_addr) and the data memory interface address pins (dmem_addr) are held at their current values.

iii. The VMEM control pins vmem_enz, vmem_wrz and vmem_bez (which are described in section 8 below) are forced high if vmem_rdy is low to avoid corruption of VMEM.

iv. The VMEM control pins vmem_enz, vmem_wrz and vmem_bez are forced high if vmem_rdy is low to avoid corruption of VMEM.

Figure 113:
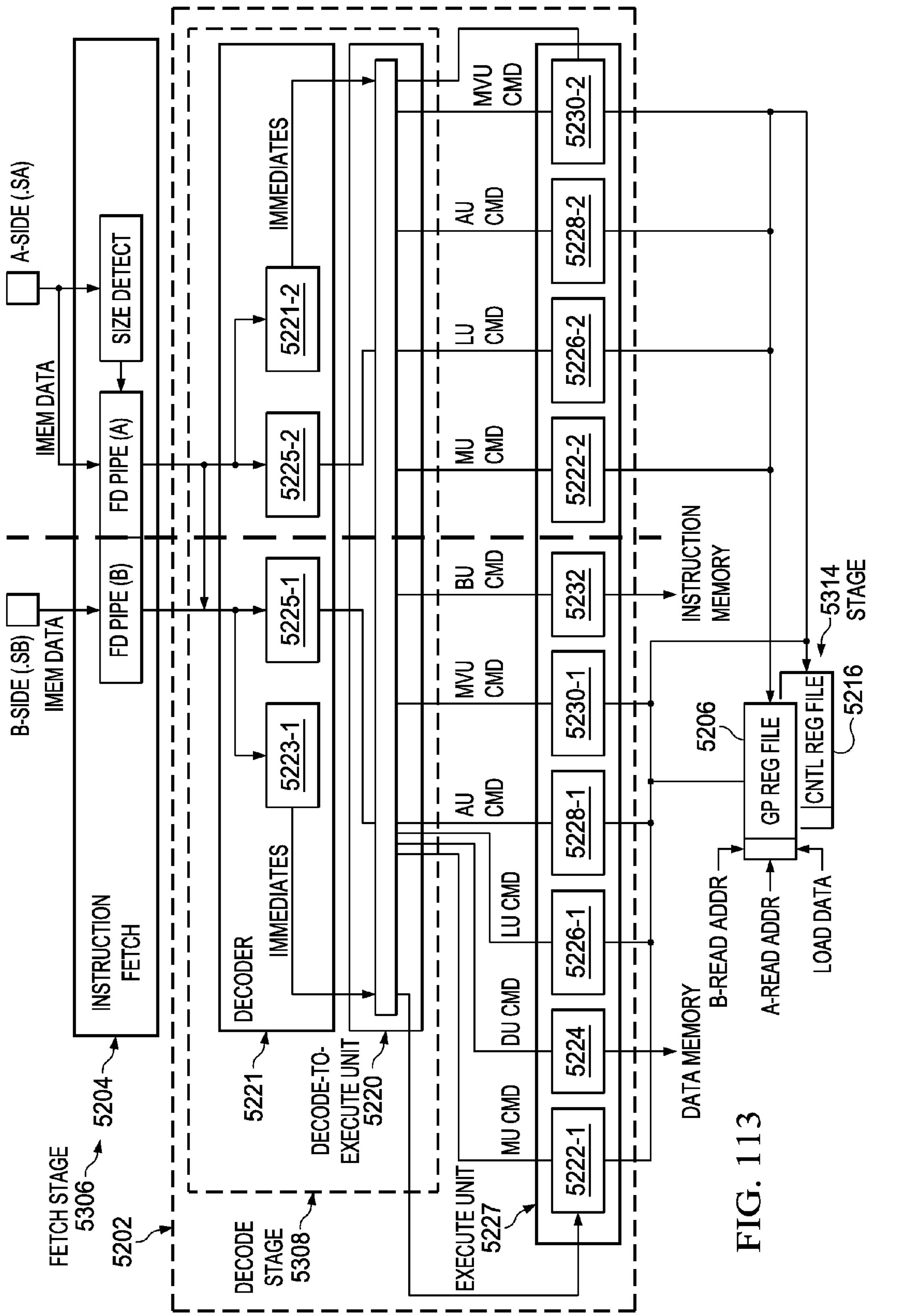

Turning to FIG. 113, the processor 5200 can be seen in greater detail shown with the pipeline 5300. Here, the instruction fetch 5204 (which corresponds to the fetch stage 5306) is divided into an A-side and B-side, where the A-side receives the first 20-bits (i.e, [19:0]) of a "fetch packet" (which can be a 40-bit wide instruction word having one 40-bit instruction or two 20-bit instructions) and the B-side receives the last 20-bits (i.e., [39:20]) of a fetch packet. Typically, the instruction fetch 5204 determines the structure and size of the instruction(s) in the fetch packet and dispatches the instruction(s) accordingly (which is discussed in section 7.3 below).

A decoder 5221 (which is part of the decode stage 5308 and processing unit 5202) decodes the instruction(s) from the instruction fetch 5204. The decoder 5221 generally includes a operator format circuit 5223-1 and 5223-2 (to generate intermediates) and a decode circuit 5225-1 and 5225-2 for the B-side and A-side, respectively. The output from the decoder 5221 is then received by the decode-to-execution unit 5220 (which is also part of the decode stage 5308 and processing unit 5202). The decode-to-execution unit 5220 generates command(s) for the execution unit 5227 that correspond to the instruction(s) received through the fetch packet.

The A-side and B-side of the execution unit 5227 is also subdivided. Each of the B-side and A-side of the execution unit 5227 respectively includes a multiply unit 5222-1/5222-2, a Boolean unit 5226-1/5226-2, a add/subtract unit 5228-1/5228-2, and a move unit 5330-1/5330-2. The B-side of the execution unit 5227 also includes a load/store unit 5224 and a branches unit 5232. The multiply unit 5222-1/5222-2, a Boolean unit 5226-1/5226-2, a add/subtract unit 5228-1/5228-2, and a move unit 5330-1/5330-2 can then, respectively, perform a multiply operation, a logical Boolean operation, add/subtract operation, and a data movement operation on data loaded into the general purpose register file 5206 (which also includes read addresses for each of the A-side and B-side). Move operations can also be performed in the control register file 5216.

The load/store unit 5224 can load and store data to processor data memory (i.e., 4328). In Table 8 below, loads for bytes, halfwords, and words and stores for bytes, unsigned bytes, halfwords, unsigned halfwords, and words can be seen.

TABLE 8

| | |
|---|---|
| stores for bytes, unsigned bytes, halfwords, unsigned halfwords, and words | STx .SB *+SBR[s1(R4 or U4)], s2(R4) |
| | STx .SB *SBR++[s1(R4 or U4)], s2(R4) |
| | STx .SB *+s1(R4), s2(R4) |
| | STx .SB *s1(R4)++, s2(R4) |
| | STx .SB *+s1[s2(U20)], s3(R4) |
| | STx .SB *s1(R4)++[s2(U20)], s3(R4) |
| | STx .SB *+SBR[s1(U24)], s2(R4) |
| | STx .SB *SBR++[s1(U24)], s2(R4) |
| | STx .SB *s1(U24), s2(R4) |
| | STx .SB *+SP[s1(U24)], s2(R4) |
| loads for bytes, halfwords, and words | LDy .SB *+LBR[s1(R4 or U4)], s2(R4) |
| | LDy .SB *LBR++[s1(R4 or U4)], s2(R4) |
| | LDy .SB *+s1(R4), s2(R4) |
| | LDy .SB *s1(R4)++, s2(R4) |
| | LDy .SB *+s1[s2(U20)], s3(R4) |
| | LDy .SB *s1(R4)++[s2(U20)], s3(R4) |
| | LDy .SB *+SBR[s1(U24)], s2(R4) |
| | LDy .SB *SBR++[s1(U24)], s2(R4) |
| | LDy .SB *s1(U24), s2(R4) |
| | LDy .SB *+SP[s1(U24)], s2(R4) |

The branch unit 5232 executed branch operations in instruction memory (i.e., 1404-1). The branch unit instructions are typically Bcc, CALL, DCBNZ, and RET, where RET generally has three executable delay slots and the remaining generally have two. Additionally, a load or store cannot generally be in the first delay slot during read of an RET.

Figure 114:
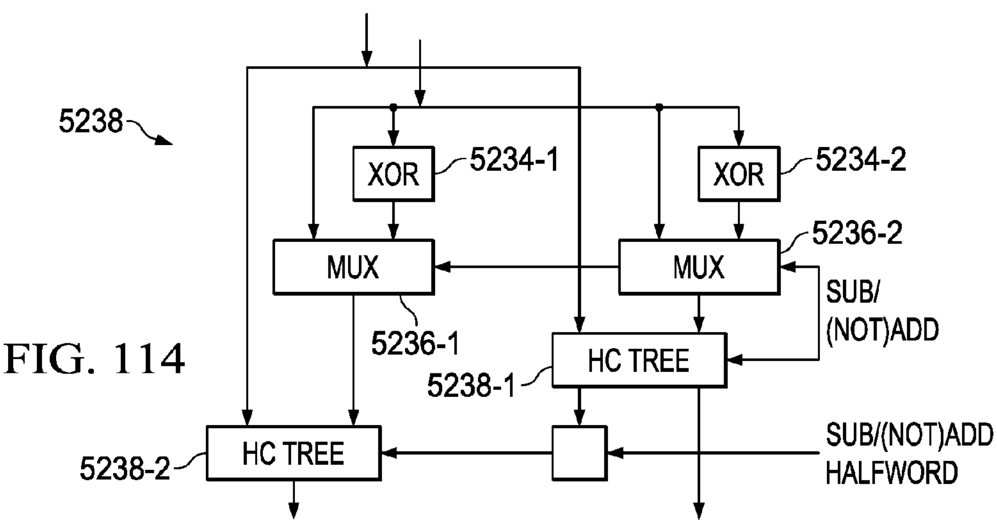
FIGS. 112 to 116 and 121 are diagrams of examples of portions of a pipeline for a node processor or RISC processor.
Figure 116:
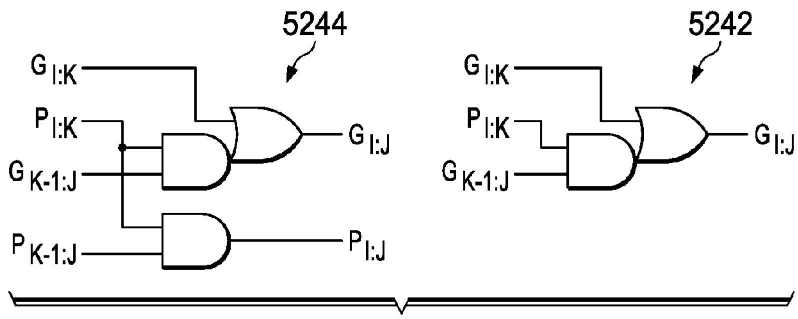

Tuning now to FIGS. 114 to 116, the add/subtract units 5228-1 and 5228-2 (hereinafter 5238) can be seen in greater detail. As shown, the add/subtract unit 5238 is circuitry that performs hardwired computations on data stored within the general purpose register file 5206 and generally comprises XOR circuits 5234-1 and 5334-2, multiplexers 5236-1 and 5236-2, and Han-Carlson (HC) trees 5238-1 and 5238-2 (hereinafter 5238) to form a cascaded HC arithmetic unit that supports word and half-word operations. These trees 5238-1 and 5238-2 (hereinafter 5238) are generally 16-bit that employs buffers 5240, logic units 5244 (in the upper half), and logic units 5242 (in the lower half).

7.3. Instruction Fetch and Dispatch

For processor 5200, there can be a single scalar instruction slot, therefore 'unaligned' has no relevance. Alternatively, aligned instructions can be provided for processor 5200. However, the benefit of unaligned instruction support on code size is reduced by new support for branches to the middle of fetch packets containing two twenty bit instructions. The additional branch support potentially provides both improved loop performance and code size reduction. The additional support for unaligned instructions potentially marginalizes the performance gain and has minimal benefit to code size.

20-bit instructions may also be executed serially. Generally, bit 19 of the fetch packet functions as the P-bit or parallel bit. This bit, when set (i.e. set to "1"), can indicate that the two 20-bit instructions form an execute packet. Non-parallel 20 bit instructions may also be placed on either half of the fetch packet, which is reflected in the setting of the P-bit or bit 19 of the fetch packet. Additionally, for a 40-bit instruction, the P-bit cannot be set, so either hardware or the system programming tool 718 can enforce this condition.

Figure 117:
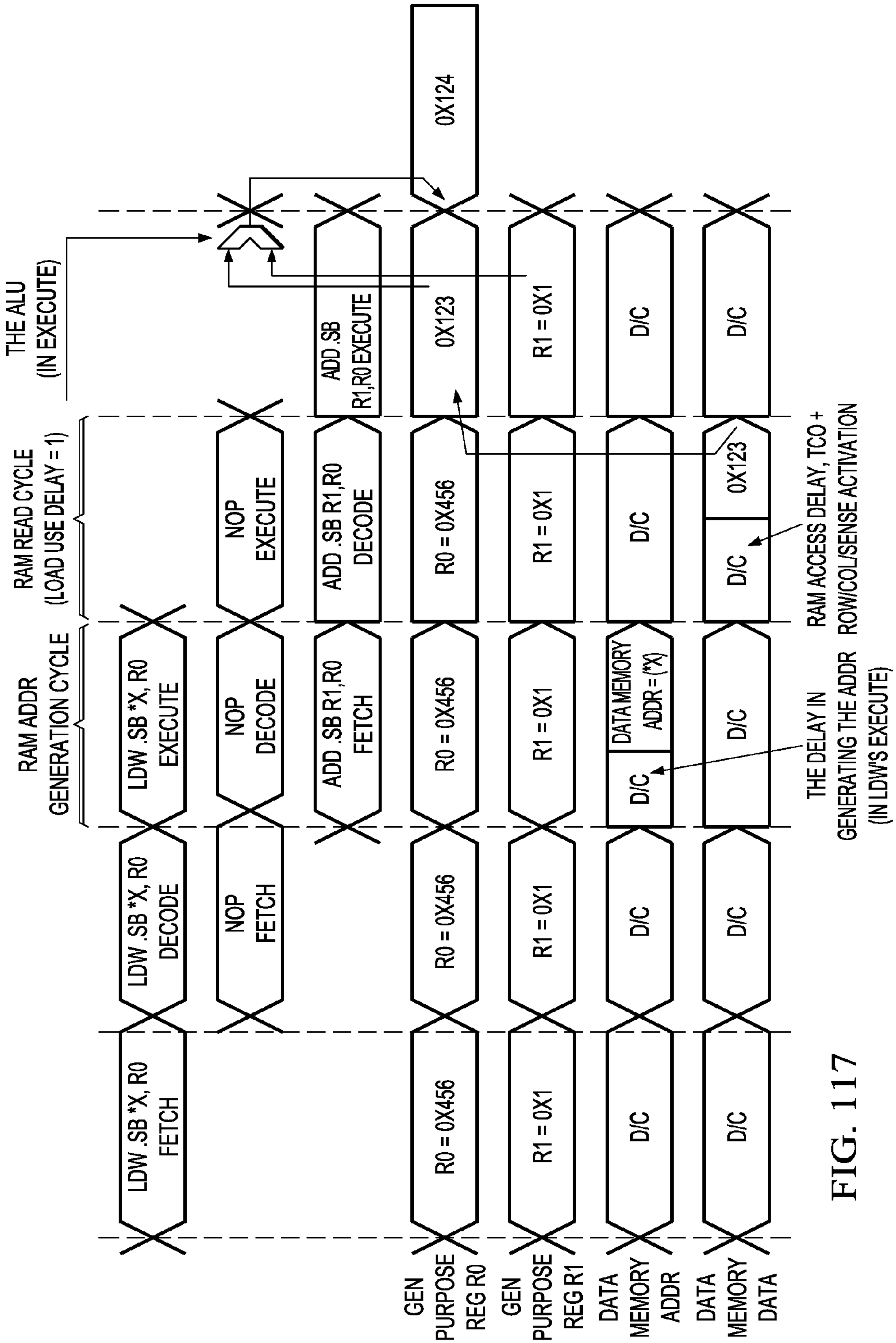
FIG. 117 an example of an execution of three non-parallel instructions.

Turning to FIG. 117, an example of an execution of three non-parallel instructions can be seen. The equivalent assembly source code for the example of FIG. 117 is:

```
            LDW .SB *+R5,R0
            NOP .SA
||          NOP .SB
            NOP.SA
||          ADD .SB R1,R0
```

In the first instruction, a load (on the B-side) to R0 (in the general purpose register file 5206) is performed, which followed by a no operation or nop. In the last instruction, a register (location R0) to register (location R1) add with R0 as the destination. All these instructions execute serially, and, in this example prior to execution, register location R0 contains 0x456, while register location R1 contains 0x1. The value from the load is 0x123 in this example. As shown, in the first cycle, the load instruction in the fetch stage 5306. In the second cycle, the decode for the load instruction is performed, while the nop instruction enters the fetch stage 5306. In the third cycle, the load instruction is executed, which loads an address into the processor data memory. Additionally, the add instruction enter the fetch stage 5306 in the third cycle. In the fourth cycle, the add instruction enters the decode stage 5308, and data is loaded into the processor data memory (which corresponds to the address loaded in the third cycle) and moved to register location R0. Finally, in the fifth and sixth cycles, the add instruction is executed, where the value 0x123 (from R0) and 0x1 (from R1) are added together and stored in location R0.

Since load (and store) instructions often calculate the effective RAM address, the RAM address is sent to the RAM in the execute stage 5310. A full cycle is usually allowed for RAM access, creating a 1 cycle penalty (which can be seen in FIG. 117). Additionally, the load instruction causes location R0 to be updated in the early part of the ADD instruction's execute phase. The add instruction's decode phase sets up the register file 5206 read ports with the register addresses of R0 and R1 in it's decode phase. These register addresses are flopped. This makes the register contents available in the execute phase.

Additionally, the GLS processor 5402 supports branches whose target is the high side of a fetch packet. An example is shown below:

```
LOOP:
        ADD .SA R0,R1   ; Line 1A
        || ADD .SB R2,R3   ; Line 1B
...more code...
        BR .SB &(LOOP+1)
        NOP .SA  ; Delay slot 1
        || NOP .SB
        NOP .SA   ; Delay slot 2
        || NOP .SB
```

Lines 1A and 1B represents the first fetch packet in the loop. On firstentry into the loop the Line 1A and Line 1B are executed. On subsequent loop iterations Line 1B is executed. Note that the branch target "&(LOOP+1)" specifies a high side branch. Offsets in GLS processor 5402 (for this example) are natively even, odd offsets specify the high side of a fetch packet. Labels are limited to even offsets, the LOOP+1 syntax specifies the high side of the target fetch packet. It should also be noted that specifying a high side target to a fetch packet containing a single 40 bit instruction is not generally permitted. Also, for high side branches, the high side of the target fetch packet is executed. This is usually true regardless of whether the target fetch packet contains two parallel or two serial instructions.

There is also a small set of loads which do not usually require an address computation since the load address is completely specified by an immediate operand, and these loads are specified to have a zero load use penalty. Using these loads it is not desired to insert a NOP for the load use penalty (the NOP shown is not in place to enforce a load use delay, the NOP is to simply disable the A-side for the purposes of explanation):

```
LDW .SB *+U24, R0
NOP .SA
|| ADD .SB    R1, R0
```

The top two waveforms show the pipeline advance of the two instructions through fetch, decode and execute. Note that the RAM address is sent to data memory in the load's decode stage 5308 phase. Otherwise the process is the same but with a performance benefit. However there is now an instruction scheduling requirement placed on code generation and validation when no hazard handling logic is included in processor 5200. All instructions which access data memory should be scheduled such that there is no contention for the data memory interface. This includes loads, stores, CALL, RET, LDRF, STRF, LDSYS and STSYS, where LDSYS and STSYS are instructions for the GLS processor 5402. A CALL combines the semantics of a store and a branch; it pushes the return PC value to the stack (in data memory) and branches to the CALL target. A RET combines the semantics of a load and a branch; it loads the return target from the stack (again, in DMEM) and then branches. In spite of the fact that these instructions do not update any internal state of the processor 5200, LDSYS and STSYS have load semantics similar to loads with 1 cycle of load use penalty and utilize the data memory interface in execution stage 5310.

Figure 118:
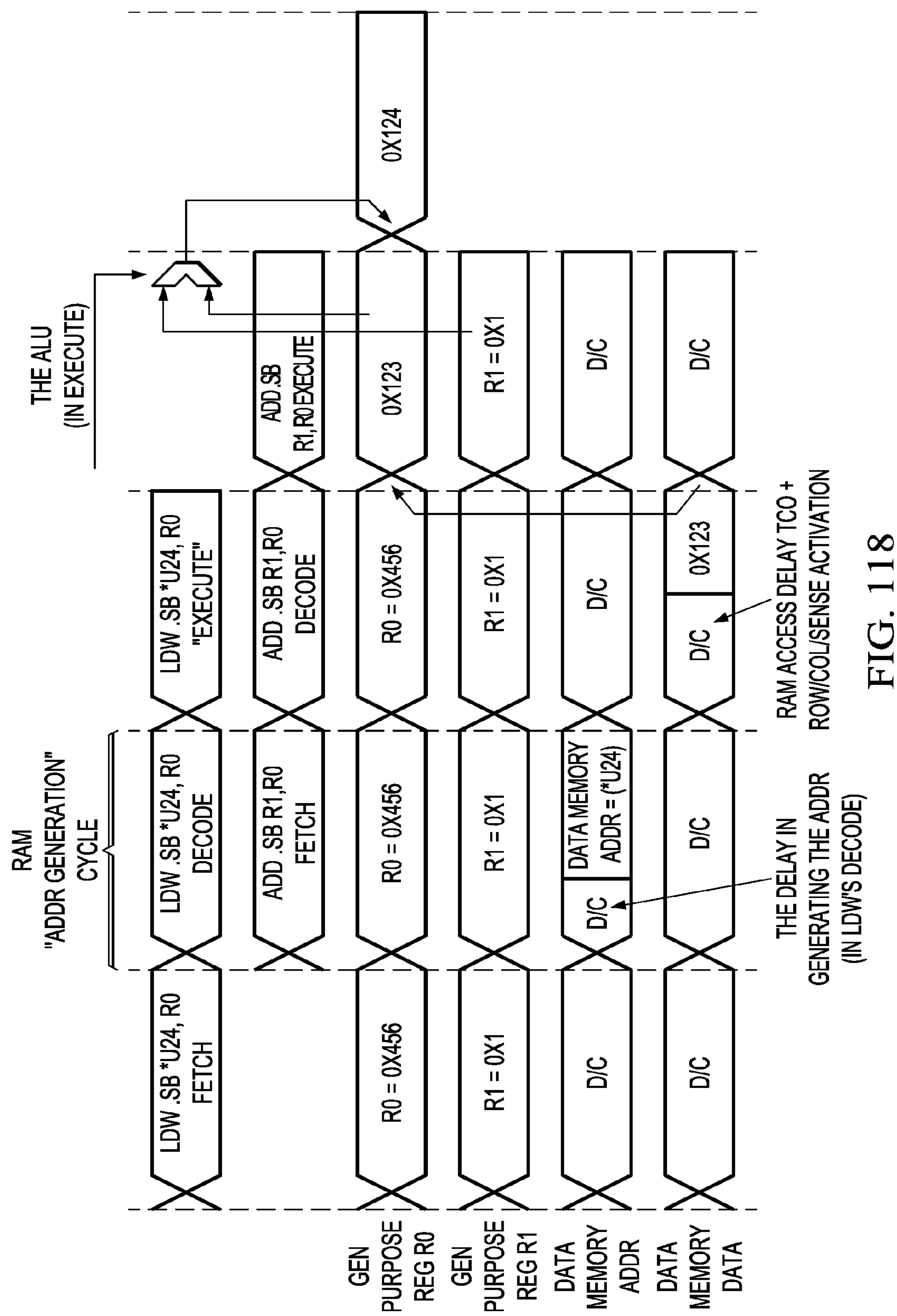
FIG. 118 is a non-parallel execution example for a Load with load use equal to zero.

Turning now to FIG. 118, a non-parallel execution example for a Load with load use equal to zero is shown. Contention will occur if loads with zero cycle load-use penalties which use the data memory interface in decode stage 5308 are scheduled to execute immediately after an instruction which uses the data memory interface in execution stage 5310. This sequence will create contention:

LDW .SB *+R5, R0; 1 cycle load use, uses data memory in execution stage 5310

LDW .SB *+U24, R1; 0 cycle load use, uses data memory in decode stage 5308

Figure 119:
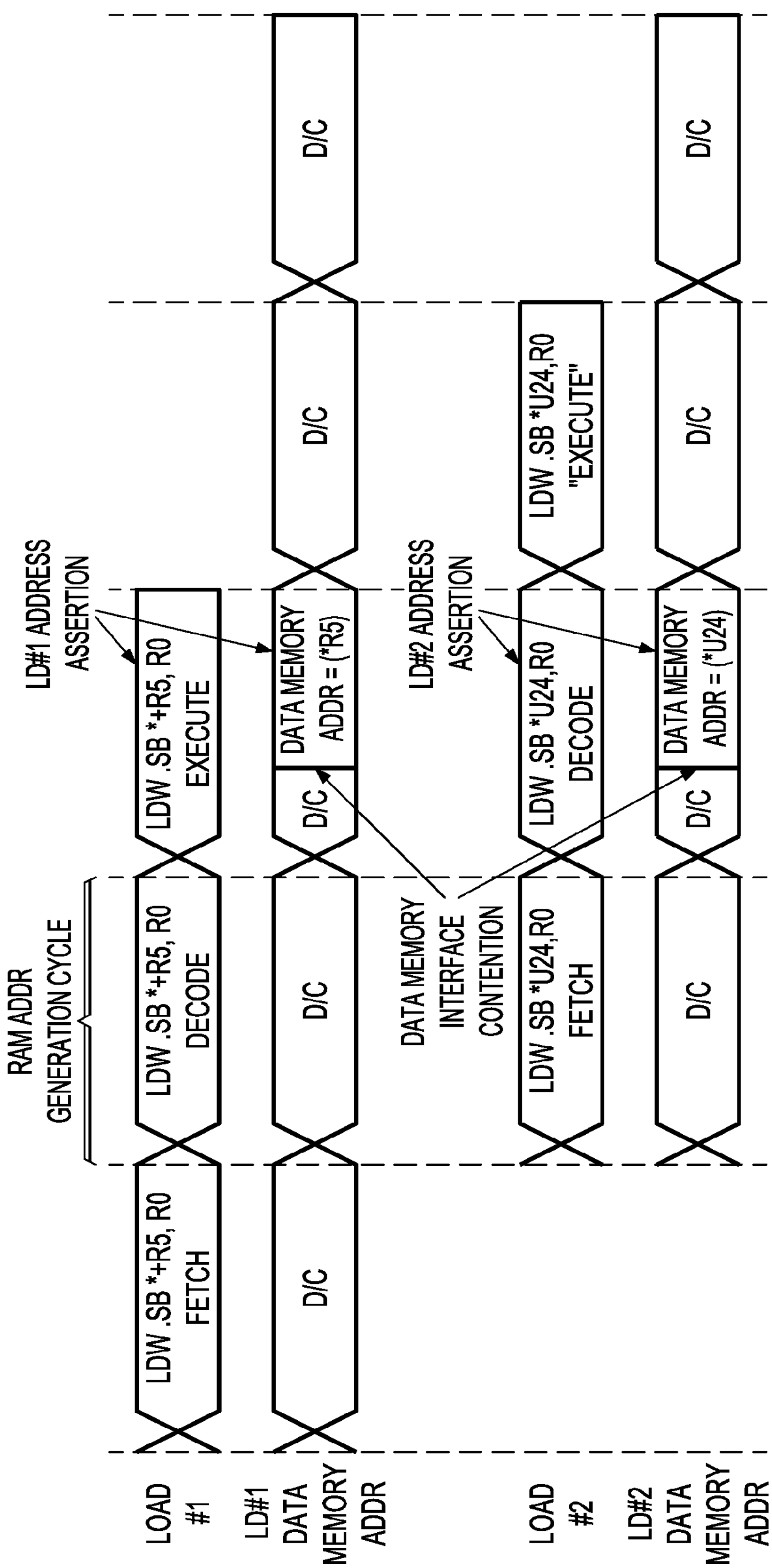
FIG. 119 is an example of a data memory interface conflict.

Contention can occur since the second load's decode stage 5308 cycle overlaps the first load's execution stage 5310 cycle these instructions attempt to use the data memory interface in the same clock cycle. Replacing the first load with a store, CALL, RET, LDRF, STRF, LDSYS or STSYS will cause the same situation, and in FIG. 119, a data memory interface conflict can be seen.

On execution of a CALL instruction the computed return address is written to the address contained in the stack pointer. The computed return address is a fixed positive offset from the current PC. The fixed offset is usually 3 fetch packets from the PC value of the CALL instruction.

Additionally, branch instructions or instructions which exhibit branch behavior, like CALL, have two executable delay slots before the branch occurs. The RET instruction has 3 executable delay slots. The delay slot count is usually measured in execution cycles. Serial instructions in the delay slots of a branch count as one delay slot per serial instruction. An example is shown below

```
    CALL .SB <xyz>   ; F#1 Ex#1 40b call instruction
    ADD .SA 0x1,R0   ; F#2 Ex#2 20b serial instruction
    SUB .SB 0x2,R1   ; F#2 Ex#3 20b serial
    MUL .SA 0x3,R2   ; F#3 Ex#4 20b parallel
 || SHL .SB 0x3,R2   ; F#3 Ex#4 20b parallel
```

The instructions above are labeled by their fetch packet, F#1 and their execute packet, Ex#1. The CALL is followed by two serial instructions and then a pair of parallel instructions. In this example the MUL||SHL fetch packet is not executed. Even though the ADD Ex#2 and the SUB Ex#3 occupy the same fetch packet they are serial so they consume the delay slot cycles in the shadow of the CALL. Rewriting the above code in a functionally equivalent, fully parallel form, makes this explicit:

```
    CALL .SB <xyz>   ; F#1 Ex#1 40b call instruction
    ADD .SA 0x1,R0   ; F#2 Ex#2 20b
 || NOP .SB          ; F#2 Ex#2 20b
    NOP .SA          ; F#3 Ex#3 20b
 || SUB .SB 0x2,R1   ; F#3 Ex#3 20b serial
    MUL .SA 0x3,R2   ; F#4 Ex#4 20b parallel
 || SHL .SB 0x3,R2   ; F#4 Ex#4 20b parallel
```

There is a difference in fetch behavior and code size, but the two fragments result in the same machine state after all delay slots have been executed.

Below is another example of non-parallel instructions, this time where the branch is located on the low side of the packet.

```
                 ; Fetch packet boundary
    B .SB R0         ; F#1 Ex#1 20b serial instruction
    ADD .SA 0x1,R0   ; F#1 Ex#2 20b serial instruction
                 ; Fetch packet boundary
    SUB .SA 0x2,R1   ; F#2 Ex#3 20b parallel
 || MUL .SB 0x3,R2   ; F#2 Ex#3 20b parallel
```

The fetch packet boundaries are explicitly commented. In this case the branch will execute before the ADD. Therefore the ADD counts as one executable delay slot and the SUB/MUL counts as the second executable delay slot. Finally the same example with no parallel instructions.

```
        ; Fetch packet boundary
    B .SB R0         ; F#1 Ex#1 20b serial instruction
    ADD .SA 0x1,R0   ; F#1 Ex#2 20b serial instruction
              ; Fetch packet boundary
    SUB .SA 0x2,R1   ; F#2 Ex#3 20b serial
    MUL .SB 0x3,R2   ; F#2 Not executed, 20b serial
```

The branch and the ADD execute as before, with the ADD counting as the first executable delay slot. However in this example the SUB is executed since it is serial in relationship to the MUL, and counts as the second executable delay slot.

7.4. General Purpose Register File

As stated above, the general purpose resister file 5206 can be a 16-entry by 32-bit general purpose register file. The widths of the general purpose registers (GPRs) can be parameterized. Generally, when processor 5200 is used for nodes (i.e., 808-*i*), there are 4+15 (15 are controlled by boundary pins) read ports and 4+6 (6 are controlled by boundary pins) write ports, while processor 5200 used for GLS unit 1408 has 4 read ports and 4 write ports.

7.5. Control Register File

Generally, all registers within the control register file 5216 are conventionally 16 bits wide; however, not all bits in each register are implemented and parameterization exists to extend or reduce the width of most registers. Twelve registers can be implemented in the control register file 5216. Address space is made available in the instruction set for processor 5200 (in the MVC instructions) for up to 32 control registers for future extensions. Generally, when processor 5200 is used for nodes (i.e., 808-*i*), there are 2 read ports and 2 write ports, while processor 5200 used for GLS unit 1408 has 4 read ports and 4 write ports. In the general case, the control register file is accessed by using the MVC instruction. MVC is generally the primary mechanism for moving the contents of registers between the register file 5206 and the control register file. MVC instructions are generally single cycle instructions which complete in the execute stage 5310. The register access is similar to that of a register file with by-passing for read-after-write dependency. Direct modification of the control register file entries is generally limited to a few special case instructions. For example, forms of the ADD and SUB instructions can directly modify the stack pointer to improve code execution performance (i.e., other instructions modify the condition code bits, etc.). In Table 9 below, the registers that can be included in control register file 5216 are described.

TABLE 9

| Mnemonic | Register Name | Description | Width | Address |
|---|---|---|---|---|
| CSR | Control status register | Contains global interrupt enable bit, and additional control/status bits | 12 | 0x00 |
| IER | Interrupt enable register | Allows manual enable/disable of individual interrupts | 4 | 0x01 |
| IRP | Interrupt return pointer | Interrupt return address. | 16 | 0x02 |
| LBR | Load base register | Contains the global data address pointer, used for some load instructions | 16 | 0x03 |
| SBR | Store base register | Contains the global data address pointer, used for some store instructions | 16 | 0x04 |
| SP | Stack Pointer | Contains the next available address in the stack memory region. This is a byte address. | 16 | 0x05 |

7.5.1. Stack Pointer (SP)

The stack pointer generally specifies a byte address in processor data memory (i.e., 4328). By convention the stack pointer can contain the next available address in processor data memory (i.e., 4328) for temporary storage. The LDRF instruction (which is pre-incremented) and the STRF instructions (which is post-decremented) can indirectly modify this register, storing or retrieving register file contents. The CALL instruction (which is post-decremented) and RET instructions (which is pre-incremented) indirectly modify this register, storing and retrieving the program counter or PC 5218. The stack pointer may be directly updated by software using the MVC instruction. The programmer is generally responsible for ensuring the correct alignment of the SP. Other instructions can be used to directly modify the stack pointer.

7.5.2. Control Status Register (CSR)

The control status register can contains control and status bits. Processor 5200 generally defines (for example) two sets of status bits, one set for each issue slot (i.e., A and B). As shown in the example for in Table 7 above, instructions which execute on the A-side update and read status bits CSR [4:0]. Instructions which execute on the B-side update and read status bits CSR [9:5]. All bits can be directly readable or writeable from either side using the MVC instructions. In Table 10 below, the bits for the control status register illustrated in Table 8 above are described.

TABLE 10

| Bit Position | Width | Field | Function |
|---|---|---|---|
| 15:11 | 16 | RSV | Reserved |
| 11 | 1 | ES0 | External state bit 0. This reflects the unflopped value of the boundary pin estate0. |
| 10 | 1 | GIE | Global interrupt enable |
| 9 | 1 | SAT (B) | B-side saturation bit, arithmetic operations whose results have been saturated set this bit. See individual instruction descriptions for instructions which modify the SAT bit. |
| 8 | 1 | C (B) | B-side carry bit, arithmetic operations which results in carry out, or borrow set this bit. See individual instruction descriptions for instructions which modify the C bit. |
| 7 | 1 | GT (B) | B-side greater-than bit, this bit is set or cleared based on the result of a CMP instruction. (i.e. GT = 1 if Rx > Ry else GT = 0) See individual instruction descriptions for instructions which modify the GT bit. |
| 6 | 1 | LT (B) | B-side less-than bit, this bit is set or cleared based on the result of a CMP instruction. (i.e. LT = 1 if Rx < Ry else LT = 0) See individual instruction descriptions for instructions which modify the LT bit. |
| 5 | 1 | EQ (B) | B-side equal(or zero) bit, this bit is set to 1 if the result of instruction execution results in a zero result or the result of a CMP instruction returns equality. (i.e. EQ = 1 if Rx == Ry else EQ = 0) See individual instruction descriptions for instructions which modify the EQ bit. |
| 4 | 1 | SAT (A) | A-side saturation bit, see above |
| 3 | 1 | C (A) | A-side carry bit, see above |
| 2 | 1 | GT (A) | A-side greater-than bit, see above |
| 1 | 1 | LT (A) | A-side less-than bit, see above |
| 0 | 1 | EQ (A) | A-side equal(or zero) bit, see above |

Execution of compare instructions will enforce a one-hot condition for greater than/less than/equal to (GT/LT/EQ). However the condition code bits GT, LT, EQ are generally not required to be one-hot but may be set in any combinations using the MVC or by combinations of CMP and instructions which update the EQ bit. Having more than one bit set will not effect conditional branch execution as each branch compares the respective condition bits (i.e., BGE .SA uses the CSR[2] and CSR[0] to determine if the branch is taken). The remaining condition bits have no effect on BGE .SA.

7.5.3. Interrupt Enable Register (IER)

This register is generally responds to register moves but has no effect on interrupts. The interrupt enable register (which can be about 16 bits) generally combines the functions of an interrupt status register, interrupt set register, interrupt clear register and interrupt mask register into a single register. The interrupt enable register's "E" bits can control individual enable and disable (masking) of interrupts. A one written to an interrupt enable bit (i.e., execution stage 5310 at [0] for int0 and E1 at [2] for int1) enables that interrupt. The interrupt enable register's "C" bits can provide status and control for the associated interrupts (i.e., C0 at [1] for int0 and C1 at [3] for int1). When an interrupt has been accepted the associated C bit is set and the remaining C bits are cleared. On execution of a RETI instruction all C bit values are cleared. The C bits can also be used to mimic the initiation of an interrupt. A 1 written to a C bit that is currently cleared initiates interrupt processing as if the associated interrupt pin had been asserted. All other processing steps and restrictions can the same as a pin asserted interrupt (GIE should be set, associated E bit should be set, etc). It should also be noted that if software wishes to use bit C1 (associated with int1) for this purpose external hardware should generally ensure that a valid value is driven onto new_pc and the force_pcz signal is held high, before writing to bit C1.

7.5.4. Interrupt Return Pointer (IRP)

This register (which can also be 16 bits) generally responds to register moves but has no effect on interrupts. The interrupt return pointer can contains the address of the first instruction in the program flow that was not executed due to occurrence of an interrupt. The value contained in the interrupt return pointer can be copied directly to the PC 5218 upon execution of a BIRP instruction.

7.5.5. Load Base Register (LBR)

The load base register (which can also be 16 bits) can contain a base address used in some load instruction types. This register generally contains a 16 bit base address which when combined with general purpose register contents or immediate values, provides a flexible method to access global data.

7.5.6. Store Base Register (SBR)

The store base register can contain a base address used in some store instruction types. This register generally contains a 16 bit base address which when combined with general purpose register contents or immediate values, provides a flexible method to access global data.

7.6. Program Counter

The program counter or PC 5218 is generally an architectural register (i.e., having contains machine state or execution unit 4344, but is not directly accessible through the instruction set). Instruction execution has an effect on the PC 5218, but the current PC value can not be read or written explicitly. The PC 5218 is (for example) 16 bits wide, representing the instruction word address of the current instruction. Internally, the PC 5218 can contain an extra LSB, the half word instruction address bit. This bit indicates (for example) the high or low half of an instruction word for 20-bit serially executed instructions (i.e. p-bit=0). This extra LSB is generally not visible nor is can it be manipulates the state of this bit through program or external pin control. For example, a force_pcz event implicitly clears the half word instruction address bit.

7.7. Circular Addressing

Processor 5200 generally includes instructions which use a circular addressing mode to access buffers in memory. These instructions can be the six forms of OUTPUT and the CIRC instruction, which can, for example, include:

(1) (V)OUTPUT .SB R4, R4, S8, U6, R4

(2) (V)OUTPUT .SB R4, S14, U6, R4

(3) (V)OUTPUT .SB U18, U6, R4

(4) CIRC .SB R4, S8, R4

These instructions are generally 40 bits wide, and the VOUTPUT instructions are generally the vector/SIMD equivalent of the scalar OUTPUT instructions. Circular addressing instructions generally use a buffer control register to determine the results of a circular address calculation, and an example of the register format can be seen in Table 11 below.

TABLE 11

| Bit Position | Width | Field | Function |
|---|---|---|---|
| 31:24 | 8 | SIZE OF BUFFER | |
| 23:16 | 8 | POINTER | |
| 15 | 1 | TF | Top Flag<br>0 = no boundary<br>1 = boundary |
| 14 | 1 | BF | Bottom Flag<br>0 = no boundary<br>1 = boundary |
| 13 | 1 | Md | Mode<br>0 = mirror boundary<br>1 = repeat boundary |
| 12 | 1 | SD | Store disable<br>0 = normal<br>1 = disable write<br>(Not used in RISC_SFM, used by RISC_TMC control logic and appears as an output pin in that variant of T20.) |
| 11 | 1 | RSV | Reserved |
| 10:8 | 3 | BLOCK SIZE | |
| 7:4 | 4 | TOP OFFSET | |
| 3:0 | 4 | BOTTOM OFFSET | |

7.8. Machine State Context Switch

The boundary pins new_ctx_data and cmem_wdata can be used to move machine state to and from the processor 5200 core. This movement is initiated by the assertion of force_ctxz. External logic can initiate a context switch by driving force_ctxz low and simultaneously driving new_ctx_ data with the new machine state. Processor 5200 detects force_ctxz on the rising edge of the clock. Assertion of force_ctxz can cause processor 5200 to begin saving its current state and load the data driven on new_ctx_data into the internal processor 5200 registers. Subsequently processor 5200 can assert the signal cmem_wdata_valid and drive the previous state onto the cmem_wdata bus. While the context switch can occur immediately, there can be a two cycle delay between detection of force_ctxz assertion, and the assertion by processor 5200 of cmem_wdata_valid and cmem_wdata. These two cycles generally allow instructions in the decode stage 5308 and execute stage 5310 at the assertion of force_ctxz, to properly update the machine state before this machine state is written to the context memories. Processor 5200 can continue to assert cmem_wdata_valid and cmem_wdata until the assertion of cmem_rdy. Typically, cmem_rdy is asserted, but this allows external control logic to determine how long processor 5200 should keep cmem_wdata_valid and cmem_wdata valid. The format of the new_ctx_data and cmem_wdata buses is shown in Table 12 below.

TABLE 12

| Bit Position | Width | Register Name | Comment |
|---|---|---|---|
| 608:592 | 17 | PC | These bits are generally used in cmem_wdata. New context data separately drives the new PC contents onto the new_pc bus. |
| 591:576 | 16 | SP | Control Register File 5216 |
| 575:560 | 16 | SBR | |
| 559:544 | 16 | LBR | |
| 543:528 | 16 | IRP | |
| 527:524 | 4 | IER | |
| 523:512 | 12 | CSR | |
| 511:480 | 32 | R15 | General Purpose Register (i.e., within register file 5206) |
| 479:448 | 32 | R14 | |
| 447:416 | 32 | R13 | |
| 415:384 | 32 | R12 | |
| 383:352 | 32 | R11 | |
| 351:320 | 32 | R10 | |
| 319:288 | 32 | R9 | |
| 287:256 | 32 | R8 | |
| 255:224 | 32 | R7 | |
| 223:192 | 32 | R6 | |
| 191:160 | 32 | R5 | |
| 159:128 | 32 | R4 | |
| 127:96 | 32 | R3 | |
| 95:64 | 32 | R2 | |
| 63:32 | 32 | R1 | |
| 31:0 | 32 | R0 | |

7.8. Node Access to General Purpose Register Contents

Nodes (i.e., 808-*i*) can require access to the general purpose registers of processor 5200 as part of the SIMD instruction set. A pin is provided which will cause processor 5200 to drive the general purpose register contents onto cmem_wdata, which is normally held at a constant value to reduce switching power consumption and is active during write back of the machine state of processor 5200 as a side effect of a context switch (force_ctxz assertion). The input pin cmem_gpr_renz is generally provided to allow external logic to read the current value of the register file 5206. This input pin is used combinatorially by processor 5200 to drive the register file 5206 onto bits cmem_wdata[511:0].

7.9. Interrupts

Figure 120:
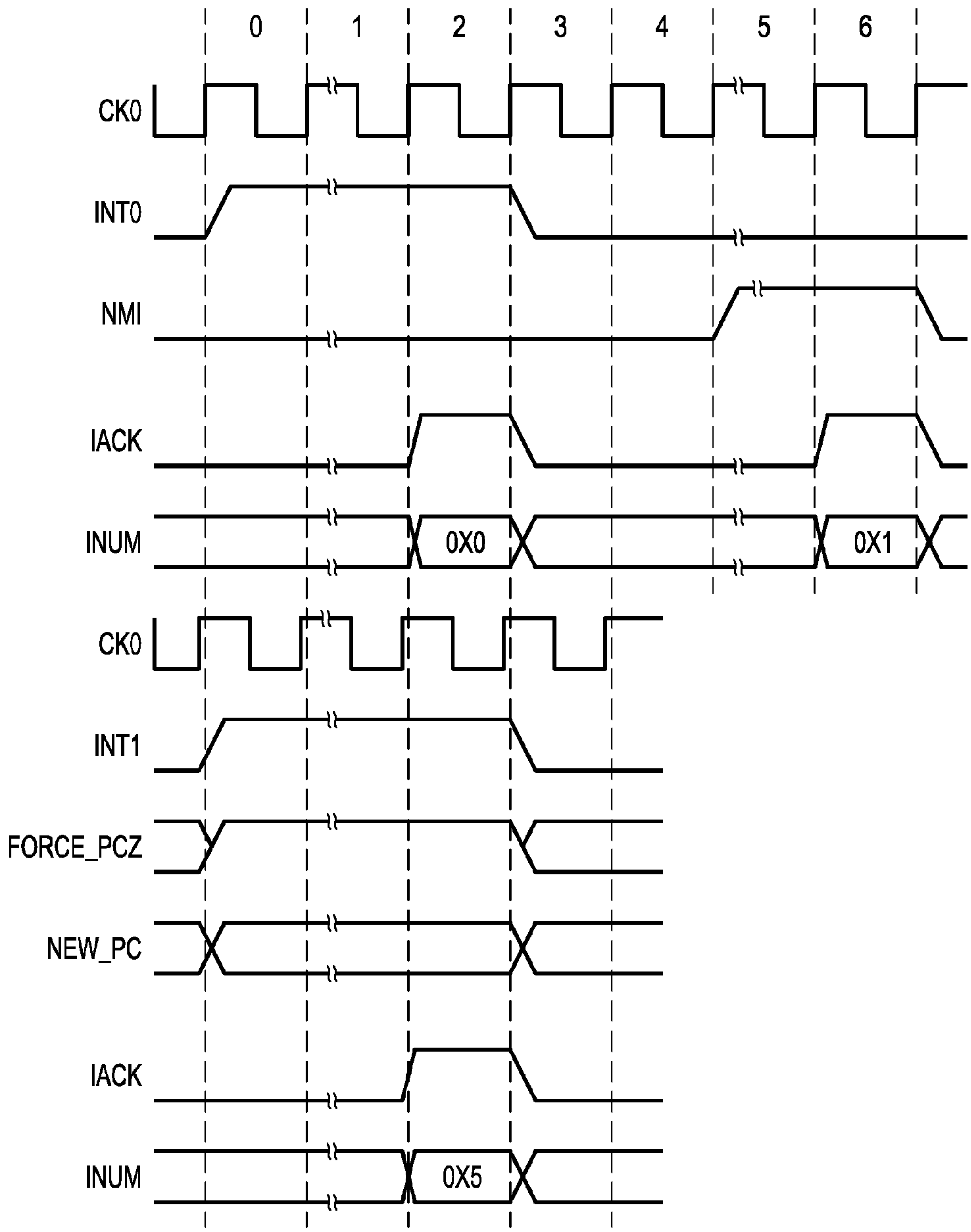
FIG. 120 is an example of logical timings for these interrupts.

Processor 5200 can support four externally signaled interrupts: reset (rst0z), a non-maskable interrupt (nmi), a maskable interrupt (int0) and an externally managed maskable interrupt (int1). int1 is typically the output of an external interrupt controller. In addition to reset, other events can be treated as interrupts by the hardware, namely and for example, Execution of a SWI (software interrupt) instruction and detection by the hardware of an undefined instruction. Table 13 below illustrates a summary of example interrupts for processor 5200, and the logical timings for these interrupts can be seen in FIG. 120.

TABLE 13

| Interrupt | Input Pin | Instruction Word Address | Comment | Priority | inum[2:0] |
|---|---|---|---|---|---|
| Reset | rst0z | 0x0000 | generally enabled | 1 | 0x0 |
| NMI | nmi | 0x0001 | Enabled if GIE is set | 2 | 0x1 |

TABLE 13-continued

| Interrupt | Input Pin | Instruction Word Address | Comment | Priority | inum[2:0] |
|---|---|---|---|---|---|
| SWI | No pin, decode of SWI instruction | 0x0002 | generally enabled | 3 | 0x2 |
| UNDEF | No pin, detection of undefined instruction | 0x0003 | generally enabled | 4 | 0x3 |
| INT0 | int0 | 0x0004 | Enabled if GIE is set | 5 | 0x4 |
| INT1 | int1 | 0x0005 (reserved but not used by INT1) | Enabled if GIE is set Externally managed interrupt, ISR entry point is specified through the Program control interface. | 6 | 0x5 |
| RSV1 | No pin, reserved | 0x0006 | generally disabled | N/A | 0x6 |
| RSV2 | No pin, reserved | 0x0007 | generally disabled | N/A | 0x7 |

7.10. Debug Module

The debug module for the processor 5200 (which is a part of the processing unit 5202) utilizes the wrapper interface (i.e., node wrapper 810-*i*) to simplify the design of the debug module. The boundary pins for debug support are listed in above in Table 7. The debug register set is summarized below in Table 14.

TABLE 14

| Register Name | Description | Field | Function | Width | Bit Position |
|---|---|---|---|---|---|
| DBG_CNTRL | Global debug mode control Address: 0x00 | | | 1 | 1 |
| RSRV0 | Not implemented, reads 0x00000000 Address: 0x01 | N/A | N/A | N/A | N/A |
| BRK0 | Break/trace point register 0 Address: 0x02 | RSRV | Reserved, not implemented, reads 0x0 | 3 | 31:29 |
| | | EN | Enable, =1 enables break/trace point comparisons | 1 | 28 |
| | | TM | Trace mode, =1 trace mode, =0 breakpoint mode | 1 | 27 |
| | | ID | Trace/breakpoint ID, this is asserted on risc_trc_pt_match_id | 2 | 26:25 |
| | | CNTX | When context comparison is enabled (CC = 1, below) this field is compared to the input pins wp_cur_cntx, to further qualify the match. When CC = 1 both the instruction memory address and the wp_cur_cntx value are compared to determine a match. When CC = 0 wp_cur_cntx is ignored when determining a match. | 4 | 24:21 |
| | | CC | Context compare enable, =1 enabled | 1 | 20 |
| | | RSRV | Reserved, not implemented, reads 0x0 | 4 | 19:16 |
| | | IA | Instruction memory address for the trace/breakpoint. This is compared to imem_addr to determine a potential match | 16 | 15:0 |

TABLE 14-continued

| Register Name | Description | Field | Function | Width | Bit Position |
|---|---|---|---|---|---|
| BRK1 | Break/trace point register 1 Address: 0x03 | RSRV | Reserved, not implemented, reads 0x0 | 3 | 31:29 |
| | | EN | Enable, =1 enables break/trace point comparisons | 1 | 28 |
| | | TM | Trace mode, =1 trace mode, =0 breakpoint mode | 1 | 27 |
| | | ID | Trace/breakpoint ID, this is asserted on risc_trc_pt_match_id | 2 | 26:25 |
| | | CNTX | When context comparison is enabled (CC = 1, below) this field is compared to the input pins wp_cur_cntx, to further qualify the match. When CC = 1 both the instruction memory address and the wp_cur_cntx value are compared to determine a match. When CC = 0 wp_cur_cntx is ignored when determining a match. | 4 | 24:21 |
| | | CC | Context compare enable, =1 enabled | 1 | 20 |
| | | RSRV | Reserved, not implemented, reads 0x0 | 4 | 19:16 |
| | | IA | Instruction memory address for the trace/breakpoint. This is compared to imem_addr to determine a potential match | 16 | 15:0 |
| BRK2 | Break/trace point register 2 Address: 0x04 | RSRV | Reserved, not implemented, reads 0x0 | 3 | 31:29 |
| | | EN | Enable, =1 enables break/trace point comparisons | 1 | 28 |
| | | TM | Trace mode, =1 trace mode, =0 breakpoint mode | 1 | 27 |
| | | ID | Trace/breakpoint ID, this is asserted on risc_trc_pt_match_id | 2 | 26:25 |
| | | CNTX | When context comparison is enabled (CC = 1, below) this field is compared to the input pins wp_cur_cntx, to further qualify the match. When CC = 1 both the instruction memory address and the wp_cur_cntx value are compared to determine a match. When CC = 0 wp_cur_cntx is ignored when determining a match. | 4 | 24:21 |
| | | CC | Context compare enable, =1 enabled | 1 | 20 |
| | | RSRV | Reserved, not implemented, reads 0x0 | 4 | 19:16 |
| | | IA | Instruction memory address for the trace/breakpoint. This is compared to imem_addr to determine a potential match | 16 | 15:0 |
| BRK3 | Break/trace point register 3 Address: 0x05 | RSRV | Reserved, not implemented, reads 0x0 | 3 | 31:29 |
| | | EN | Enable, =1 enables break/trace point comparisons | 1 | 28 |
| | | TM | Trace mode, =1 trace mode, =0 breakpoint mode | 1 | 27 |
| | | ID | Trace/breakpoint ID, this is asserted on risc_trc_pt_match_id | 2 | 26:25 |
| | | CNTX | When context comparison is enabled (CC = 1, below) this field is compared to the input pins wp_cur_cntx, to further qualify the match. | 4 | 24:21 |

TABLE 14-continued

| Register Name | Description | Field | Function | Width | Bit Position |
|---|---|---|---|---|---|
| | | | When CC = 1 both the instruction memory address and the wp_cur_cntx value are compared to determine a match. When CC = 0 wp_cur_cntx is ignored when determining a match. | | |
| | | CC | Context compare enable, =1 enabled | 1 | 20 |
| | | RSRV | Reserved, not implemented, reads 0x0 | 4 | 19:16 |
| | | IA | Instruction memory address for the trace/breakpoint. This is compared to imem_addr to determine a potential match | 16 | 15:0 |
| ECC0 | Event counter control register 0 Address: 0x06 | EN | Event count enable | 1 | 7 |
| | | SEL | Event select | 7 | 6:0 |
| | | | SEL Value — Event | | |
| | | | 0x00 — Instruction memory stall | | |
| | | | 0x01 — Data memory stall | | |
| | | | 0x02 — Scalar a-side instruction valid | | |
| | | | 0x03 — Scalar b-side instruction valid | | |
| | | | 0x04 — 40b instruction valid | | |
| | | | 0x05 — Non-parallel instruction valid | | |
| | | | 0x06 — CALL instruction executed | | |
| | | | 0x07 — RET instruction executed | | |
| | | | 0x08 — Branch instruction decoded | | |
| | | | 0x09 — Branch taken | | |
| | | | 0x0a — Scalar a- or b-side NOP executed | | |
| | | | 0x0b-1a — User events, 0x0b selects wp_events[0], etc | | |
| | | | 0x01b-7F — unused | | |
| ECC1 | Event counter control register 1 Address: 0x07 | EN | Event count enable | 1 | 7 |
| | | SEL | Event select | 7 | 6:0 |
| | | | SEL Value — Event | | |
| | | | 0x00 — Instruction memory stall | | |
| | | | 0x01 — Data memory stall | | |
| | | | 0x02 — Scalar a-side instruction valid | | |
| | | | 0x03 — Scalar b-side instruction valid | | |
| | | | 0x04 — 40b instruction valid | | |
| | | | 0x05 — Non-parallel instruction valid | | |
| | | | 0x06 — CALL instruction executed | | |
| | | | 0x07 — RET instruction executed | | |
| | | | 0x08 — Branch instruction decoded | | |

TABLE 14-continued

| Register Name | Description | Field | Function | | Width | Bit Position |
|---|---|---|---|---|---|---|
| | | | 0x09 | Branch taken | | |
| | | | 0x0a | Scalar a- or b-side NOP executed | | |
| | | | 0x0b-1a | User events, 0x0b selects wp_events[0], etc | | |
| | | | 0x01b-7F | unused | | |
| ECC2 | Event counter control register 2 Address: 0x08 | EN | Event count enable | | 1 | 7 |
| | | SEL | Event select | | 7 | 6:0 |
| | | | SEL Value | Event | | |
| | | | 0x00 | Instruction memory stall | | |
| | | | 0x01 | Data memory stall | | |
| | | | 0x02 | Scalar a-side instruction valid | | |
| | | | 0x03 | Scalar b-side instruction valid | | |
| | | | 0x04 | 40b instruction valid | | |
| | | | 0x05 | Non-parallel instruction valid | | |
| | | | 0x06 | CALL instruction executed | | |
| | | | 0x07 | RET instruction executed | | |
| | | | 0x08 | Branch instruction decoded | | |
| | | | 0x09 | Branch taken | | |
| | | | 0x0a | Scalar a- or b-side NOP executed | | |
| | | | 0x0b-1a | User events, 0x0b selects wp_events[0], etc | | |
| | | | 0x01b-7F | unused | | |
| ECC3 | Event counter control register 3 Address: 0x09 | EN | Event count enable | | 1 | 7 |
| | | SEL | Event select | | 7 | 6:0 |
| | | | SEL Value | Event | | |
| | | | 0x00 | Instruction memory stall | | |
| | | | 0x01 | Data memory stall | | |
| | | | 0x02 | Scalar a-side instruction valid | | |
| | | | 0x03 | Scalar b-side instruction valid | | |
| | | | 0x04 | 40b instruction valid | | |
| | | | 0x05 | Non-parallel instruction valid | | |
| | | | 0x06 | CALL instruction executed | | |
| | | | 0x07 | RET instruction executed | | |
| | | | 0x08 | Branch instruction decoded | | |
| | | | 0x09 | Branch taken | | |
| | | | 0x0a | Scalar a- or b-side NOP executed | | |

TABLE 14-continued

| Register Name | Description | Field | Function | | Width | Bit Position |
|---|---|---|---|---|---|---|
| | | | 0x0b-1a | User events, 0x0b selects wp_events[0], etc | | |
| | | | 0x01b-7F | unused | | |
| ECC4 | Event counter control register 4 Address: 0xa | EN | Event count enable | | 1 | 7 |
| | | SEL | Event select | | 7 | 6:0 |
| | | | SEL Value | Event | | |
| | | | 0x00 | Instruction memory stall | | |
| | | | 0x01 | Data memory stall | | |
| | | | 0x02 | Scalar a-side instruction valid | | |
| | | | 0x03 | Scalar b-side instruction valid | | |
| | | | 0x04 | 40b instruction valid | | |
| | | | 0x05 | Non-parallel instruction valid | | |
| | | | 0x06 | CALL instruction executed | | |
| | | | 0x07 | RET instruction executed | | |
| | | | 0x08 | Branch instruction decoded | | |
| | | | 0x09 | Branch taken | | |
| | | | 0x0a | Scalar a- or b-side NOP executed | | |
| | | | 0x0b-1a | User events, 0x0b selects wp_events[0], etc | | |
| | | | 0x01b-7F | unused | | |
| ECC5 | Event counter control register 5 Address: 0xb | EN | Event count enable | | 1 | 7 |
| | | SEL | Event select | | 7 | 6:0 |
| | | | SEL Value | Event | | |
| | | | 0x00 | Instruction memory stall | | |
| | | | 0x01 | Data memory stall | | |
| | | | 0x02 | Scalar a-side instruction valid | | |
| | | | 0x03 | Scalar b-side instruction valid | | |
| | | | 0x04 | 40b instruction valid | | |
| | | | 0x05 | Non-parallel instruction valid | | |
| | | | 0x06 | CALL instruction executed | | |
| | | | 0x07 | RET instruction executed | | |
| | | | 0x08 | Branch instruction decoded | | |
| | | | 0x09 | Branch taken | | |
| | | | 0x0a | Scalar a- or b-side NOP executed | | |
| | | | 0x0b-1a | User events, 0x0b selects wp_events[0], etc | | |
| | | | 0x01b-7F | unused | | |

TABLE 14-continued

| Register Name | Description | Field | Function | Width | Bit Position |
|---|---|---|---|---|---|
| ECC6 | Event counter control register 6 Address: 0xc | EN | Event count enable | 1 | 7 |
| | | SEL | Event select | 7 | 6:0 |
| | | | SEL Value / Event | | |
| | | | 0x00 Instruction memory stall | | |
| | | | 0x01 Data memory stall | | |
| | | | 0x02 Scalar a-side instruction valid | | |
| | | | 0x03 Scalar b-side instruction valid | | |
| | | | 0x04 40b instruction valid | | |
| | | | 0x05 Non-parallel instruction valid | | |
| | | | 0x06 CALL instruction executed | | |
| | | | 0x07 RET instruction executed | | |
| | | | 0x08 Branch instruction decoded | | |
| | | | 0x09 Branch taken | | |
| | | | 0x0a Scalar a- or b-side NOP executed | | |
| | | | 0x0b-1a User events, 0x0b selects wp_events[0], etc | | |
| | | | 0x01b-7F unused | | |
| ECC7 | Event counter control register 7 Address: 0xd | EN | Event count enable | 1 | 7 |
| | | SEL | Event select | 7 | 6:0 |
| | | | SEL Value / Event | | |
| | | | 0x00 Instruction memory stall | | |
| | | | 0x01 Data memory stall | | |
| | | | 0x02 Scalar a-side instruction valid | | |
| | | | 0x03 Scalar b-side instruction valid | | |
| | | | 0x04 40b instruction valid | | |
| | | | 0x05 Non-parallel instruction valid | | |
| | | | 0x06 CALL instruction executed | | |
| | | | 0x07 RET instruction executed | | |
| | | | 0x08 Branch instruction decoded | | |
| | | | 0x09 Branch taken | | |
| | | | 0x0a Scalar a- or b-side NOP executed | | |
| | | | 0x0b-1a User events, 0x0b selects wp_events[0], etc | | |
| | | | 0x01b-7f unused | | |
| EC0 | Event counter register 0 Address 0xe | | | 16 | 15:0 |
| EC1 | Event counter register 1 Address 0xf | | | 16 | 15:0 |

TABLE 14-continued

| Register Name | Description | Field | Function | Width | Bit Position |
|---|---|---|---|---|---|
| EC2 | Event counter register 2 Address 0x10 | | | 16 | 15:0 |
| EC3 | Event counter register 3 Address 0x11 | | | 16 | 15:0 |
| EC4 | Event counter register 4 Address 0x12 | | | 16 | 15:0 |
| EC5 | Event counter register 5 Address 0x13 | | | 16 | 15:0 |
| EC6 | Event counter register 6 Address 0x14 | | | 16 | 15:0 |
| EC7 | Event counter register 7 Address 0x15 | | | 16 | 15:0 |

Generally, the DBG_CNTRL register implements a single bit which re-enables event capture after the detection of an IDLE instruction. Processor 5200 indicates that it is in the IDLE state by the assertion of boundary pin risc_is_idle. To avoid counting irrelevant events event capture and counting is halted when the processor 5200 is in the idle state. DBG_CNTRL[0] is a sticky-bit which indicates an IDLE state has been detected. A write of 0x0 to DBG_CNTRL can be used to clear this bit. Once the processor 5200 has been moved out of the IDLE state, DBG_CNTRL[0]=0 will re-enable event counting.

There are also four instruction memory address break- or trace-point registers. A break- or trace-point match is indicated by assertion of the risc_brk_trc_match pin. A trace-point match is indicated by further assertion of risc_trc_pt_match. External logic can detect a break point by:

break point match=risc_brk_trc_match & !risc_trc_pt_match.

In cases where multiple BRKx registers are programmed identically, the BRKx register with the lowest address will control assertion of the risc_trc_pt_match_id, BRK0 will have precedence over BRK1, etc. Behavior is undetermined when two or more BRKx registers are identical with the exception of the TM bit. This is considered an illegal condition and should be avoided.

There are also 8 event counters and 8 associated event counter control registers. Each event counter can be programmed to count one type. There are 11 internal event types and 16 user defined event types. User events are supplied to the debug model via the pins wp_events. User defined events are expected to be single cycle per event and active high on the wp_events bus. The ECC0-ECC7 registers consist of a mux select field [6:0] and an enable bit [7]. The event count register EC0-EC7 simply contain the count values for the events programmed by the associated ECC0-ECC7 registers. EC0-EC7 are 16 bit registers which are cleared on reset. The upper 16 bits are not writeable and read as zeros.

7.11. Instruction Set Architecture Example

Table 15 below illustrates an example of an instruction set architecture for processor 5200, where:

(1) Unit designations .SA and .SB are used to distinguish in which issue slot a 20 bit instruction executes;

(2) 40 bit instructions are executed on the B-side (.SB) by convention;

(3) The basic form is <mnemonic><unit><comma separated operand list>; and (4) Pseudo code has a C++ syntax and with the proper libraries can be directly included in simulators or other golden models.

TABLE 15

| Syntax/Pseudocode | Description |
|---|---|
| ABS .(SA,SB) s1(R4)<br>void ISA::OPC_ABS_20b_9 (Gpr &s1,Unit &unit)<br>{<br>s1 = s1 < 0 ? −s1 : s1;<br>Csr.setBit(EQ,unit,s1.zero( ));<br>} | ABSOLUTE VALUE |
| ADD .(SA,SB) s1(R4), s2(R4)<br>void ISA::OPC_ADD_20b_106 (Gpr &s1, Gpr &s2,Unit &unit)<br>{<br>Result r1;<br>r1 = s2 + s1;<br>s2 = r1;<br>Csr.bit( C,unit) = r1.carryout( );<br>Csr.bit(EQ,unit) = s2.zero( );<br>} | SIGNED ADDITION |
| ADD .(SA,SB) s1(U4), s2(R4)<br>void ISA::OPC_ADD_20b_107 (U4 &s1, Gpr &s2,Unit &unit)<br>{ | SIGNED ADDITION, U4 IMM |

TABLE 15-continued

| Syntax/Pseudocode | Description |
|---|---|
| Result r1;<br>r1 = s2 + s1;<br>s2 = r1;<br>Csr.bit( C,unit) = r1.carryout( );<br>Csr.bit(EQ,unit) = s2.zero( );<br>} | |
| ADD .(SB) s1(S28),SP(R5)<br>void ISA::OPC_ADD_40b_210 (S28 &s1)<br>{<br>Sp += s1;<br>} | SIGNED ADDITION, SP, S28 IMM |
| ADD .(SB) s1(S24), SP(R5), s2(R4)<br>void ISA::OPC_ADD_40b_211 (U24 &s1, Gpr &s2)<br>{<br>s2 = Sp + s1;<br>} | SIGNED ADDITION, SP, S24 IMM, REG DEST |
| ADD .(SB) s1(S24),s2(R4)<br>void ISA::OPC_ADD_40b_212 (U24 &s1, Gpr &s2,Unit &unit)<br>{<br>Result r1;<br>r1 = s2 + s1;<br>s2 = r1;<br>Csr.bit(EQ,unit) = s2.zero( );<br>Csr.bit( C,unit) = r1.carryout( );<br>} | SIGNED ADDITION, S24 IMM |
| ADD2 .(SA,SB) s1(R4), s2(R4)<br>void ISA::OPC_ADD2_20b_363 (Gpr &s1, Gpr &s2)<br>{<br>s2.range(0,15) =<br>(s1.range(0,15) + s2.range(0,15)) >> 1;<br>s2.range(16,31) =<br>(s1.range(16,31) + s2.range(16,31)) >> 1;<br>} | HALF WORD ADDITION WITH DIVIDE BY 2 |
| ADD2 .(SA,SB) s1(U4), s2(R4)<br>void ISA::OPC_ADD2_20b_364 (U4 &s1, Gpr &s2)<br>{<br>s2.range(0,15) = (s1.value( ) + s2.range(0,15)) >> 1;<br>s2.range(16,31) = (s1.value( ) + s2.range(16,31)) >> 1;<br>} | HALF WORD ADDITION WITH DIVIDE BY 2 |
| ADD2U .(SA,SB) s1(R4), s2(R4)<br>void ISA::OPC_ADD2U_20b_365 (Gpr &s1, Gpr &s2)<br>{<br>s2.range(0,15) =<br>(_unsigned(s1.range(0,15)) + _unsigned(s2.range(0,15))) >> 1;<br>s2.range(16,31) =<br>(_unsigned(s1.range(16,31)) + _unsigned(s2.range(16,31))) >> 1;<br>} | HALF WORD ADDITION WITH DIVIDE BY 2, UNSIGNED |
| ADD2U .(SA,SB) s1(U4), s2(R4)<br>void ISA::OPC_ADD2U_20b_366 (U4 &s1, Gpr &s2)<br>{<br>s2.range(0,15) =<br>(s1.value( ) + _unsigned(s2.range(0,15))) >> 1;<br>s2.range(16,31) =<br>(s1.value( ) + _unsigned(s2.range(16,31))) >> 1;<br>} | HALF WORD ADDITION WITH DIVIDE BY 2, UNSIGNED |
| ADDU .(SA,SB) s1(R4), s2(R4)<br>void ISA::OPC_ADDU_20b_123 (Gpr &s1, Gpr &s2, Unit &unit)<br>{<br>Result r1;<br>r1 = _unsigned(s2) + _unsigned(s1);<br>s2 = r1;<br>Csr.bit( C,unit) = r1.overflow( );<br>Csr.bit(EQ,unit) = s2.zero( );<br>} | UNSIGNED ADDITION |
| ADDU .(SA,SB) s1(U4), s2(R4)<br>void ISA::OPC_ADDU_20b_124 (U4 &s1, Gpr &s2, Unit &unit)<br>{<br>Result r1;<br>r1 = _unsigned(s2) + s1;<br>s2 = r1;<br>Csr.bit( C,unit) = r1.overflow( );<br>Csr.bit(EQ,unit) = s2.zero( );<br>} | UNSIGNED ADDITION |

TABLE 15-continued

| Syntax/Pseudocode | Description |
| --- | --- |
| AND .(SA,SB) s1(R4), s2(R4)<br>void ISA::OPC_AND_20b_88 (Gpr &s1, Gpr &s2, Unit &unit)<br>{<br>s2 &= s1;<br>Csr.bit(EQ,unit) = s2.zero( );<br>} | BITWISE AND |
| AND .(SA,SB) s1(U4), s2(R4)<br>void ISA::OPC_AND_20b_89 (U4 &s1, Gpr &s2,Unit &unit)<br>{<br>s2 &= s1;<br>Csr.bit(EQ,unit) = s2.zero( );<br>} | BITWISE AND, U4 IMM |
| AND .(SB) s1(S3), s2(U20), s3(R4)<br>void ISA::OPC_AND_40b_213 (U3 &s1, U20 &s2, Gpr &s3,Unit &unit)<br>{<br>s3 &= (s2 << (s1*8));<br>Csr.bit(EQ,unit) = s3.zero( );<br>} | BITWISE AND, U20 IMM, BYTE ALIGNED |
| B .(SB) s1(R4)<br>void ISA::OPC_B_20b_0 (Gpr &s1)<br>{<br>Pc = s1;<br>} | UNCONDITIONAL BRANCH, REG, ABSOLUTE |
| B .(SB) s1(S8)<br>void ISA::OPC_B_20b_138 (S8 &s1)<br>{<br>Pc += s1;<br>} | UNCONDITIONAL BRANCH, S8 IMM, PC REL |
| B .(SB) s1(S28)<br>void ISA::OPC_B_40b_216 (S28 &s1)<br>{<br>Pc += s1;<br>} | UNCONDITIONAL BRANCH, S28 IMM, PC REL |
| BEQ .(SB) s1(R4)<br>void ISA::OPC_BEQ_20b_2 (Gpr &s1,Unit &unit)<br>{<br>if(Csr.bit(EQ,unit)) Pc = s1;<br>} | BRANCH EQUAL, REG, ABSOLUTE |
| BEQ .(SB) s1(S8)<br>void ISA::OPC_BEQ_20b_140 (S8 &s1,Unit &unit)<br>{<br>if(Csr.bit(EQ,unit)) Pc += s1;<br>} | BRANCH EQUAL, S8 IMM, PC REL |
| BEQ .(SB) s1(S28)<br>void ISA::OPC_BEQ_40b_218 (S28 &s1,Unit &unit)<br>{<br>if(Csr.bit(EQ,unit)) Pc += s1;<br>} | BRANCH EQUAL, S28 IMM, PC REL |
| BGE .(SB) s1(R4)<br>void ISA::OPC_BGE_20b_6 (Gpr &s1,Unit &unit)<br>{<br>if(Csr.bit(GT,unit) \|\| Csr.bit(EQ,unit))<br>{<br>Pc = s1;<br>}<br>} | BRANCH GREATER OR EQUAL, REG, ABSOLUTE |
| BGE .(SB) s1(S8)<br>void ISA::OPC_BGE_20b_144 (S8 &s1,Unit &unit)<br>{<br>if(Csr.bit(GT,unit) \|\| Csr.bit(EQ,unit)) Pc += s1;<br>} | BRANCH GREATER OR EQUAL, S8 IMM, PC REL |
| BGE .(SB) s1(S28)<br>void ISA::OPC_BGE_40b_222 (S28 &s1,Unit &unit)<br>{<br>if(Csr.bit(GT,unit) \|\| Csr.bit(EQ,unit)) Pc += s1;<br>} | BRANCH GREATER OR EQUAL, S28 IMM, PC REL |
| BGT .(SB) s1(R4)<br>void ISA::OPC_BGT_20b_4 (Gpr &s1,Unit &unit)<br>{<br>if(Csr.bit(GT,unit)) Pc = s1;<br>} | BRANCH GREATER, REG, ABSOLUTE |
| BGT .(SB) s1(S8)<br>void ISA::OPC_BGT_20b_142 (S8 &s1,Unit &unit)<br>{<br>if(Csr.bit(GT,unit)) Pc += s1;<br>} | BRANCH GREATER, S8 IMM, PC REL |

TABLE 15-continued

| Syntax/Pseudocode | Description |
|---|---|
| BGT .(SB) s1(S28)<br>void ISA::OPC_BGT_40b_220 (S28 &s1,Unit &unit)<br>{<br>  if(Csr.bit(GT,unit)) Pc += s1;<br>} | BRANCH GREATER, S28 IMM, PC REL |
| BKPT .(SB)<br>void ISA::OPC_BKPT_20b_12 (void)<br>{<br>  //This instruction effectively halts<br>  //instruction issue until intervention<br>  //by the debug system<br>  Pc = Pc;<br>} | BREAK POINT |
| BLE .(SB) s1(R4)<br>void ISA::OPC_BLE_20b_5 (Gpr &s1,Unit &unit)<br>{<br>  if(Csr.bit(LT,unit) \|\| Csr.bit(EQ,unit))<br>  {<br>    Pc = s1;<br>  }<br>} | BRANCH LESS OR EQUAL, REG, ABSOLUTE |
| BLE .(SB) s1(S8)<br>void ISA::OPC_BLE_20b_143 (S8 &s1,Unit &unit)<br>{<br>  if(Csr.bit(LT,unit) \|\| Csr.bit(EQ,unit)) Pc += s1;<br>} | BRANCH LESS OR EQUAL, S8 IMM, PC REL |
| BLE .(SB) s1(S28)<br>void ISA::OPC_BLE_40b_221 (S28 &s1,Unit &unit)<br>{<br>  if(Csr.bit(LT,unit) \|\| Csr.bit(EQ,unit)) Pc += s1;<br>} | BRANCH LESS OR EQUAL, S28 IMM, PC REL |
| BLT .(SB) s1(R4)<br>void ISA::OPC_BLT_20b_1 (Gpr &s1,Unit &unit)<br>{<br>  if(Csr.bit(LT,unit)) Pc = s1;<br>} | BRANCH LESS, REG, ABSOLUTE |
| BLT .(SB) s1(S8)<br>void ISA::OPC_BLT_20b_139 (S8 &s1,Unit &unit)<br>{<br>  if( Csr.bit(LT,unit)) Pc += s1;<br>} | BRANCH LESS, S8 IMM, PC REL |
| BLT .(SB) s1(S28)<br>void ISA::OPC_BLT_40b_217 (S28 &s1,Unit &unit)<br>{<br>  if(Csr.bit(LT,unit)) Pc += s1;<br>} | BRANCH LESS, S28 IMM, PC REL |
| BNE .(SB) s1(R4)<br>void ISA::OPC_BNE_20b_3 (Gpr &s1,Unit &unit)<br>{<br>  if(!Csr.bit(EQ,unit)) Pc = s1;<br>} | BRANCH NOT EQUAL, REG, ABSOLUTE |
| BNE .(SB) s1(S8)<br>void ISA::OPC_BNE_20b_141 (S8 &s1,Unit &unit)<br>{<br>  if(!Csr.bit(EQ,unit)) Pc += s1;<br>} | BRANCH NOT EQUAL, S8 IMM, PC REL |
| BNE .(SB) s1(S28)<br>void ISA::OPC_BNE_40b_219 (S28 &s1,Unit &unit)<br>{<br>  if(!Csr.bit(EQ,unit)) Pc += s1;<br>} | BRANCH NOT EQUAL, S28 IMM, PC REL |
| CALL .(SB) s1(R4)<br>void ISA::OPC_CALL_20b_7 (Gpr &s1)<br>{<br>  dmem->write(Sp,Pc+3);<br>  Sp −= 4;<br>  Pc = s1;<br>} | CALL SUBROUTINE, REG, ABSOLUTE |
| CALL .(SB) s1(S8)<br>void ISA::OPC_CALL_20b_145 (S8 &s1)<br>{<br>  dmem->write(Sp.value( ),Pc+3);<br>  Sp −= 4;<br>  Pc += s1;<br>} | CALL SUBROUTINE, S8 IMM, PC REL |
| CALL .(SB) s1(S28)<br>void ISA::OPC_CALL_40b_223 (S28 &s1)<br>{ | CALL SUBROUTINE, S28 IMM, PC REL |

TABLE 15-continued

| Syntax/Pseudocode | Description |
|---|---|
| dmem->write(Sp.value( ),Pc+3);<br>Sp -= 4;<br>Pc += s1;<br>} | |
| CIRC .(SB) s1(R4), s2(S8), s3(R4)<br>void ISA::OPC_CIRC_40b_260 (Gpr &s1,S8 &s2,Gpr &s3)<br>{<br>int imm_cnst = s2.value( );<br>int bot_off = s1.range(0,3);<br>int top_off = s1.range(4,7);<br>int blk_size = s1.range(8,10);<br>int str_dis = s1.bit(12);<br>int repeat = s1.bit(13);<br>int bot_flag = s1.bit(14);<br>int top_flag = s1.bit(15);<br>int pntr = s1.range(16,23);<br>int size = s1.range(24,31);<br>int tmp,addr;<br>if(imm_cnst > 0 && bot_flag && imm_cnst > bot_off)<br>{<br>if(!repeat)<br>{<br>tmp = (bot_off<<1) - imm_cnst;<br>}<br>else<br>{<br>tmp = bot_off;<br>}<br>}<br>else<br>{<br>if(imm_cnst < 0 && top_flag && -imm_cnst > top_off)<br>{<br>if(!repeat)<br>{<br>tmp = -(top_off<<1) - imm_cnst;<br>}<br>else<br>{<br>tmp = -top_off;<br>}<br>}<br>else<br>{<br>tmp = imm_cnst;<br>}<br>}<br>pntr = pntr << blk_size;<br>if(size == 0)<br>{<br>addr = pntr + tmp;<br>}<br>else<br>{<br>if((pntr + tmp) >= size)<br>{<br>addr = pntr + tmp - size;<br>}<br>else<br>{<br>if(pntr + tmp < 0)<br>{<br>addr = pntr + tmp + size;<br>}<br>else<br>{<br>addr = pntr + tmp;<br>}<br>}<br>}<br>s3 = addr;<br>} | CIRCULAR |
| CLRB .(SA,SB) s1(U2), s2(U2), s3(R4)<br>void ISA::OPC_CLRB_20b_86 (U2 &s1,U2 &s2,Gpr &s3,Unit &unit)<br>{<br>s3.range(s1*8,((s2+1)*8)-1) = 0;<br>Csr.bit(EQ,unit) = s3.zero( );<br>} | CLEAR BYTE FIELD |

TABLE 15-continued

| Syntax/Pseudocode | Description |
| --- | --- |
| CMP .(SA,SB) s1(S4), s2(R4)<br>void ISA::OPC_CMP_20b_78 (S4 &s1, Gpr &s2,Unit &unit)<br>{<br>Csr.bit(EQ,unit) = s2 == sign_extend(s1);<br>Csr.bit(LT,unit) = s2 < sign_extend(s1);<br>Csr.bit(GT,unit) = s2 > sign_extend(s1);<br>} | SIGNED COMPARE, S4 IMM |
| CMP .(SA,SB) s1(R4), s2(R4)<br>void ISA::OPC_CMP_20b_109 (Gpr &s1, Gpr &s2,Unit &unit)<br>{<br>Csr.bit(EQ,unit) = s2 == s1;<br>Csr.bit(LT,unit) = s2 < s1;<br>Csr.bit(GT,unit) = s2 > s1;<br>} | SIGNED COMPARE |
| CMP .(SB) s1(S24),s2(R4)<br>void ISA::OPC_CMP_40b_225 (S24 &s1, Gpr &s2,Unit &unit)<br>{<br>Csr.bit(EQ,unit) = s2 == sign_extend(s1);<br>Csr.bit(LT,unit) = s2 < sign_extend(s1);<br>Csr.bit(GT,unit) = s2 > sign_extend(s1);<br>} | SIGNED COMPARE, S24 IMM |
| CMPU .(SA,SB) s1(U4), s2(R4)<br>void ISA::OPC_CMPU_20b_77 (U4 &s1, Gpr &s2,Unit &unit)<br>{<br>Csr.bit(EQ,unit) = _unsigned(s2) == zero_extend(s1);<br>Csr.bit(LT,unit) = _unsigned(s2) < zero_extend(s1);<br>Csr.bit(GT,unit) = _unsigned(s2) > zero_extend(s1);<br>} | UNSIGNED COMPARE, U4 IMM |
| CMPU .(SA,SB) s1(R4), s2(R4)<br>void ISA::OPC_CMPU_20b_108 (Gpr &s1, Gpr &s2,Unit &unit)<br>{<br>Csr.bit(EQ,unit) = _unsigned(s2) == _unsigned(s1);<br>Csr.bit(LT,unit) = _unsigned(s2) < _unsigned(s1);<br>Csr.bit(GT,unit) = _unsigned(s2) > _unsigned(s1);<br>} | UNSIGNED COMPARE |
| CMPU .(SB) s1(U24),s2(R4)<br>void ISA::OPC_CMPU_40b_224 (U24 &s1, Gpr &s2,Unit &unit)<br>{<br>Csr.bit(EQ,unit) = _unsigned(s2) == zero_extend(s1);<br>Csr.bit(LT,unit) = _unsigned(s2) < zero_extend(s1);<br>Csr.bit(GT,unit) = _unsigned(s2) > zero_extend(s1);<br>} | UNSIGNED COMPARE, U24 IMM |
| CMVEQ .(SA,SB) s1(R4), s2(R4)<br>void ISA::OPC_CMVEQ_20b_149 (Gpr &s1, Gpr &s2,Unit &unit)<br>{<br>s2 = Csr.bit(EQ,unit) ? s1 : s2;<br>} | CONDITIONAL MOVE, EQUAL |
| CMVGE .(SA,SB) s1(R4), s2(R4)<br>void ISA::OPC_CMVGE_20b_155 (Gpr &s1, Gpr &s2, Unit &unit)<br>{<br>s2 = (Csr.bit(EQ,unit) \| Csr.bit(GT,unit)) ? s1 : s2;<br>} | CONDITIONAL MOVE, GREATER THAN OR EQUAL |
| CMVGT .(SA,SB) s1(R4), s2(R4)<br>void ISA::OPC_CMVGT_20b_148 (Gpr &s1, Gpr &s2,Unit &unit)<br>{<br>s2 = Csr.bit(GT,unit) ? s1 : s2;<br>} | CONDITIONAL MOVE, GREATER THAN |
| CMVLE .(SA,SB) s1(R4), s2(R4)<br>void ISA::OPC_CMVLE_20b_151 (Gpr &s1, Gpr &s2, Unit &unit)<br>{<br>s2 = (Csr.bit(EQ,unit) \| Csr.bit(LT,unit)) ? s1 : s2;<br>} | CONDITIONAL MOVE, LESS THAN OR EQUAL |
| CMVLT .(SA,SB) s1(R4), s2(R4)<br>void ISA::OPC_CMVLT_20b_147 (Gpr &s1, Gpr &s2,Unit &unit)<br>{<br>s2 = Csr.bit(LT,unit) ? s1 : s2;<br>} | CONDITIONAL MOVE, LESS THAN |
| CMVNE .(SA,SB) s1(R4), s2(R4)<br>void ISA::OPC_CMVNE_20b_150 (Gpr &s1, Gpr &s2,Unit &unit)<br>{<br>s2 = !Csr.bit(EQ,unit) ? s1 : s2;<br>} | CONDITIONAL MOVE, NOT EQUAL |

TABLE 15-continued

| Syntax/Pseudocode | Description |
| --- | --- |
| DCBNZ .(SB) s1(R4), s2(R4)<br>void ISA::OPC_DCBNZ_20b_152 (Gpr &s1, Gpr &s2)<br>{<br>--s1;<br>if(s1 != 0)<br>{<br>Pc = s2;<br>}<br>else<br>{<br>Pc = (cregs[aPC]+1)>>1;<br>}<br>} | DECREMENT, COMPARE, BRANCH NON-ZERO |
| DCBNZ .(SB) s1(R4),s2(U16)<br>void ISA::OPC_DCBNZ_40b_247 (Gpr &s1,U16 &s2)<br>{<br>--s1;<br>if(s1 != 0) Pc = s2;<br>} | DECREMENT, COMPARE, BRANCH NON-ZERO |
| END .(SA,SB)<br>void ISA::OPC_END_20b_10 (void)<br>{<br>//This instruction asserts the is_end flag<br>//in execution stage 5310 and then performs repeated<br>//nops until an external force PC event<br>//occurs.<br>risc_is_end._assert(1);<br>Pc = Pc;<br>} | END OF THREAD |
| EXTB .(SA,SB) s1(U2), s2(U2), s3(R4)<br>void ISA::OPC_EXTB_20b_122 (U2 &s1,U2 &s2,Gpr &s3,Unit &unit)<br>{<br>Result tmp;<br>tmp = s3;<br>s3.clear( );<br>s3.range(0,s2*8) = sign_extend(tmp.range(s1*8,((s2+1)*8)−1));<br>Csr.bit(EQ,unit) = s3.zero( );<br>} | EXTRACT SIGNED BYTE FIELD |
| EXTBU .(SA,SB) s1(U2), s2(U2), s3(R4)<br>void ISA::OPC_EXTBU_20b_87 (U2 &s1,U2 &s2,Gpr &s3,Unit &unit)<br>{<br>Result tmp;<br>tmp = s3;<br>s3.clear( );<br>s3 = tmp.range(s1*8,((s2+1)*8)−1);<br>Csr.bit(EQ,unit) = s3.zero( );<br>} | EXTRACT UNSIGNED BYTE FIELD |
| EXTU .(SB) s1(U6), s2(U6), s3(R4)<br>void ISA::OPC_EXTU_40b_282 (U6 &s1, U6 &s2,Gpr &s3,Unit &unit)<br>{<br>Result tmp;<br>tmp = s3;<br>s3.clear( );<br>s3 = tmp.range(s1,s2);<br>Csr.bit(EQ,unit) = s3.zero( );<br>} | EXTRACT UNSIGNED BIT FIELD |
| IDLE .(SB)<br>void ISA::OPC_IDLE_20b_13 (void)<br>{<br>//This instruction effectively halts<br>//instruction issue until an external<br>//event occurs.<br>Pc = Pc;<br>} | REPETITIVE NOP |
| LDB .(SB) *+LBR[s1(U4)], s2(R4)<br>void ISA::OPC_LDB_20b_50 (U4 &s1,Gpr &s2)<br>{<br>s2 = dmem->byte(Lbr+s1);<br>} | LOAD SIGNED BYTE, LBR, +U4 OFFSET |
| LDB .(SB) *+LBR[s1(R4)], s2(R4)<br>void ISA::OPC_LDB_20b_55 (Gpr &s1, Gpr &s2)<br>{<br>s2 = dmem->byte(Lbr+s1);<br>} | LOAD SIGNED BYTE, LBR, +REG OFFSET |

TABLE 15-continued

| Syntax/Pseudocode | Description |
|---|---|
| LDB .(SB) *LBR++[s1(U4)], s2(R4)<br>void ISA::OPC_LDB_20b_60 (U4 &s1, Gpr &s2)<br>{<br>s2 = dmem->byte(Lbr);<br>Lbr += s1;<br>} | LOAD SIGNED BYTE, LBR, +U4 OFFSET POST ADJ |
| LDB .(SB) *LBR++[s1(R4)], s2(R4)<br>void ISA::OPC_LDB_20b_65 (Gpr &s1, Gpr &s2)<br>{<br>s2 = dmem->byte(Lbr);<br>Lbr += s1;<br>} | LOAD SIGNED BYTE, LBR, +REG OFFSET, POST ADJ |
| LDB .(SB) *+s1(R4), s2(R4)<br>void ISA::OPC_LDB_20b_70 (Gpr &s1, Gpr &s2)<br>{<br>s2 = dmem->byte(s1);<br>} | LOAD SIGNED BYTE, ZERO OFFSET |
| LDB .(SB) *s1(R4)++, s2(R4)<br>void ISA::OPC_LDB_20b_75 (Gpr &s1, Gpr &s2)<br>{<br>s2 = dmem->byte(s1);<br>++s1;<br>} | LOAD SIGNED BYTE, ZERO OFFSET, POST INC |
| LDB .(SB) *+s1[s2(U20)], s3(R4)<br>void ISA::OPC_LDB_40b_188 (Gpr &s1, U20 &s2, Gpr &s3)<br>{<br>s3 = dmem->byte(s1+s2);<br>} | LOAD SIGNED BYTE, +U20 OFFSET |
| LDB .(SB) *s1++[s2(U20)], s3(R4)<br>void ISA::OPC_LDB_40b_193 (Gpr &s1, U20 &s2, Gpr &s3)<br>{<br>s3 = dmem->byte(s1);<br>s1 += s2;<br>} | LOAD SIGNED BYTE, +U20 OFFSET, POST ADJ |
| LDB .(SB) *+LBR[s1(U24)], s2(R4)<br>void ISA::OPC_LDB_40b_198 (U24 &s1, Gpr &s2)<br>{<br>s2 = dmem->byte(Lbr+s1);<br>} | LOAD SIGNED BYTE, LBR, +U24 OFFSET |
| LDB .(SB) *LBR++[s1(U24)], s2(R4)<br>void ISA::OPC_LDB_40b_203 (U24 &s1, Gpr &s2)<br>{<br>s2 = dmem->byte(Lbr+s1);<br>++Lbr;<br>} | LOAD SIGNED BYTE, LBR, +U24 OFFSET, POST ADJ |
| LDB .(SB) *s1(U24),s2(R4)<br>void ISA::OPC_LDB_40b_208 (U24 &s1, Gpr &s2)<br>{<br>s2 = dmem->byte(s1);<br>} | LOAD SIGNED BYTE, U24 IMM ADDRESS |
| LDB .(SB) *+SP[s1(U24)], s2(R4)<br>void ISA::OPC_LDB_40b_258 (U24 &s1, Gpr &s2)<br>{<br>s2 = sign_extend(dmem->byte(Sp+s1));<br>} | LOAD BYTE, SP, +U24 OFFSET |
| LDBU .(SB) *+LBR[s1(U4)], s2(R4)<br>void ISA::OPC_LDBU_20b_47 (U4 &s1,Gpr &s2)<br>{<br>s2.clear( );<br>s2 = dmem->ubyte(Lbr+s1);<br>} | LOAD UNSIGNED BYTE, LBR, +U4 OFFSET |
| LDBU .(SB) *+LBR[s1(R4)], s2(R4)<br>void ISA::OPC_LDBU_20b_52 (Gpr &s1, Gpr &s2)<br>{<br>s2.clear( );<br>s2 = dmem->ubyte(Lbr+s1);<br>} | LOAD UNSIGNED BYTE, LBR, +REG OFFSET |
| LDBU .(SB) *LBR++[s1(U4)], s2(R4)<br>void ISA::OPC_LDBU_20b_57 (U4 &s1, Gpr &s2)<br>{<br>s2.clear( );<br>s2 = dmem->ubyte(Lbr);<br>Lbr += s1;<br>} | LOAD UNSIGNED BYTE, LBR, +U4 OFFSET POST ADJ |

TABLE 15-continued

| Syntax/Pseudocode | Description |
|---|---|
| LDBU .(SB) *LBR++[s1(R4)], s2(R4)<br>void ISA::OPC_LDBU_20b_62 (Gpr &s1, Gpr &s2)<br>{<br>s2.clear( );<br>s2 = dmem->ubyte(Lbr);<br>Lbr += s1;<br>} | LOAD UNSIGNED BYTE, LBR, +REG OFFSET, POST ADJ |
| LDBU .(SB) *+s1(R4), s2(R4)<br>void ISA::OPC_LDBU_20b_67 (Gpr &s1, Gpr &s2)<br>{<br>s2.clear( );<br>s2 = dmem->ubyte(s1);<br>} | LOAD UNSIGNED BYTE, ZERO OFFSET |
| LDBU .(SB) *s1(R4)++, s2(R4)<br>void ISA::OPC_LDBU_20b_72 (Gpr &s1, Gpr &s2)<br>{<br>s2.clear( );<br>s2 = dmem->ubyte(s1);<br>++s1;<br>} | LOAD UNSIGNED BYTE, ZERO OFFSET, POST INC |
| LDBU .(SB) *+s1[s2(U20)], s3(R4)<br>void ISA::OPC_LDBU_40b_185 (Gpr &s1, U20 &s2, Gpr &s3)<br>{<br>s3.clear( );<br>s3.byte(0) = dmem->ubyte(s1+s2);<br>} | LOAD UNSIGNED BYTE, +U20 OFFSET |
| LDBU .(SB) *s1++[s2(U20)], s3(R4)<br>void ISA::OPC_LDBU_40b_190 (Gpr &s1, U20 &s2, Gpr &s3)<br>{<br>s3.clear( );<br>s3.byte(0) = dmem->ubyte(s1+s2);<br>s1+= s2;<br>} | LOAD UNSIGNED BYTE, +U20 OFFSET, POST ADJ |
| LDBU .(SB) *+LBR[s1(U24)], s2(R4)<br>void ISA::OPC_LDBU_40b_195 (U24 &s1, Gpr &s2)<br>{<br>s2.clear( );<br>s2.byte(0) = dmem->ubyte(Lbr+s1);<br>} | LOAD UNSIGNED BYTE, LBR, +U24 OFFSET |
| LDBU .(SB) *LBR++[s1(U24)], s2(R4)<br>void ISA::OPC_LDBU_40b_200 (U24 &s1, Gpr &s2)<br>{<br>s2.clear( );<br>s2.byte(0) = dmem->ubyte(Lbr);<br>Lbr += s1;<br>} | LOAD UNSIGNED BYTE, LBR, +U24 OFFSET, POST ADJ |
| LDBU .(SB) *s1(U24),s2(R4)<br>void ISA::OPC_LDBU_40b_205 (U24 &s1, Gpr &s2)<br>{<br>s2.clear( );<br>s2.byte(0) = dmem->ubyte(s1);<br>} | LOAD UNSIGNED BYTE, U24 IMM ADDRESS |
| LDBU .(SB) *+SP[s1(U24)], s2(R4)<br>void ISA::OPC_LDBU_40b_255 (U24 &s1,Gpr &s2)<br>{<br>s2.clear( );<br>s2.byte(0) = dmem->ubyte(Sp+s1);<br>} | LOAD UNSIGNED BYTE, SP, +U24 OFFSET |
| LDH .(SB) *+LBR[s1(U4)], s2(R4)<br>void ISA::OPC_LDH_20b_51 (U4 &s1,Gpr &s2)<br>{<br>s2 = dmem->half(Lbr+(s1<<1));<br>} | LOAD SIGNED HALF, LBR, +U4 OFFSET |
| LDH .(SB) *+LBR[s1(R4)], s2(R4)<br>void ISA::OPC_LDH_20b_56 (Gpr &s1, Gpr &s2)<br>{<br>s2 = dmem->half(Lbr+s1);<br>} | LOAD SIGNED HALF, LBR, +REG OFFSET |
| LDH .(SB) *LBR++[s1(U4)], s2(R4)<br>void ISA::OPC_LDH_20b_61 (U4 &s1, Gpr &s2)<br>{<br>s2 = dmem->half(Lbr);<br>Lbr += s1<<1;<br>} | LOAD SIGNED HALF, LBR, +U4 OFFSET POST ADJ |

TABLE 15-continued

| Syntax/Pseudocode | Description |
|---|---|
| LDH .(SB) *LBR++[s1(R4)], s2(R4)<br>void ISA::OPC_LDH_20b_66 (Gpr &s1, Gpr &s2)<br>{<br>s2 = dmem->half(Lbr);<br>Lbr += s1;<br>} | LOAD SIGNED HALF, LBR, +REG OFFSET, POST ADJ |
| LDH .(SB) *+s1(R4), s2(R4)<br>void ISA::OPC_LDH_20b_71 (Gpr &s1, Gpr &s2)<br>{<br>s2 = dmem->half(s1);<br>} | LOAD SIGNED HALF, ZERO OFFSET |
| LDH .(SB) *s1(R4)++, s2(R4)<br>void ISA::OPC_LDH_20b_76 (Gpr &s1, Gpr &s2)<br>{<br>s2 = dmem->half(s1);<br>s1 += 2;<br>} | LOAD SIGNED HALF, ZERO OFFSET, POST INC |
| LDH .(SB) *+s1[s2(U20)], s3(R4)<br>void ISA::OPC_LDH_40b_189 (Gpr &s1, U20 &s2, Gpr &s3)<br>{<br>s3 = dmem->half(s1+(s2<<1));<br>} | LOAD SIGNED HALF, +U20 OFFSET |
| LDH .(SB) *s1++[s2(U20)], s3(R4)<br>void ISA::OPC_LDH_40b_194 (Gpr &s1, U20 &s2, Gpr &s3)<br>{<br>s3 = dmem->half(s1);<br>s1 += s2<<1;<br>} | LOAD SIGNED HALF, +U20 OFFSET, POST ADJ |
| LDH .(SB) *+LBR[s1(U24)], s2(R4)<br>void ISA::OPC_LDH_40b_199 (U24 &s1, Gpr &s2)<br>{<br>s2 = dmem->half(Lbr+(s1<<1));<br>} | LOAD SIGNED HALF, LBR, +U24 OFFSET |
| LDH .(SB) *LBR++[s1(U24)], s2(R4)<br>void ISA::OPC_LDH_40b_204 (U24 &s1, Gpr &s2)<br>{<br>s2 = dmem->half(Lbr);<br>Lbr += s1<<1;<br>} | LOAD SIGNED HALF, LBR, +U24 OFFSET, POST ADJ |
| LDH .(SB) *s1(U24),s2(R4)<br>void ISA::OPC_LDH_40b_209 (U24 &s1, Gpr &s2)<br>{<br>s2 = dmem->half(s1<<1);<br>} | LOAD SIGNED HALF, U24 IMM ADDRESS |
| LDH .(SB) *+SP[s1(U24)], s2(R4)<br>void ISA::OPC_LDH_40b_259 (U24 &s1, Gpr &s2)<br>{<br>s2 = sign_extend(dmem->half(Sp+(s1<<1)));<br>} | LOAD HALF, SP, +U24 OFFSET |
| LDHU .(SB) *+LBR[s1(U4)], s2(R4)<br>void ISA::OPC_LDHU_20b_48 (U4 &s1,Gpr &s2)<br>{<br>s2.clear( );<br>s2 = dmem->uhalf(Lbr+(s1<<1));<br>} | LOAD UNSIGNED HALF, LBR, +U4 OFFSET |
| LDHU .(SB) *+LBR[s1(R4)], s2(R4)<br>void ISA::OPC_LDHU_20b_53 (Gpr &s1, Gpr &s2)<br>{<br>s2.clear( );<br>s2 = dmem->uhalf(Lbr+s1);<br>} | LOAD UNSIGNED HALF, LBR, +REG OFFSET |
| LDHU .(SB) *LBR++[s1(U4)], s2(R4)<br>void ISA::OPC_LDHU_20b_58 (U4 &s1, Gpr &s2)<br>{<br>s2.clear( );<br>s2 = dmem->uhalf(Lbr);<br>Lbr += s1<<1;<br>} | LOAD UNSIGNED HALF, LBR, +U4 OFFSET POST ADJ |
| LDHU .(SB) *LBR++[s1(R4)], s2(R4)<br>void ISA::OPC_LDHU_20b_63 (Gpr &s1, Gpr &s2)<br>{<br>s2.clear( );<br>s2 = dmem->uhalf(Lbr);<br>Lbr += s1;<br>} | LOAD UNSIGNED HALF, LBR, +REG OFFSET, POST ADJ |
| LDHU .(SB) *+s1(R4), s2(R4)<br>void ISA::OPC_LDHU_20b_68 (Gpr &s1, Gpr &s2)<br>{ | LOAD UNSIGNED HALF, ZERO OFFSET |

TABLE 15-continued

| Syntax/Pseudocode | Description |
|---|---|
| s2.clear( );<br>s2 = dmem->uhalf(s1);<br>} | |
| LDHU .(SB) *s1(R4)++, s2(R4)<br>void ISA::OPC_LDHU_20b_73 (Gpr &s1, Gpr &s2)<br>{<br>s2.clear( );<br>s2 = dmem->uhalf(s1);<br>s1 += 2;<br>} | LOAD UNSIGNED HALF, ZERO OFFSET, POST INC |
| LDHU .(SB) *+s1[s2(U20)], s3(R4)<br>void ISA::OPC_LDHU_40b_186 (Gpr &s1, U20 &s2, Gpr &s3)<br>{<br>s3.clear( );<br>s3.half(0) = dmem->uhalf(s1+(s2<<1));<br>} | LOAD UNSIGNED HALF, +U20 OFFSET |
| LDHU .(SB) *s1++[s2(U20)], s3(R4)<br>void ISA::OPC_LDHU_40b_191 (Gpr &s1, U20 &s2, Gpr &s3)<br>{<br>s3.clear( );<br>s3.half(0) = dmem->uhalf(s1);<br>s1 += s2<<1;<br>} | LOAD UNSIGNED HALF, +U20 OFFSET, POST ADJ |
| LDHU .(SB) *+LBR[s1(U24)], s2(R4)<br>void ISA::OPC_LDHU_40b_196 (U24 &s1, Gpr &s2)<br>{<br>s2.clear( );<br>s2.half(0) = dmem->uhalf(Lbr+(s1<<1));<br>} | LOAD UNSIGNED HALF, LBR, +U24 OFFSET |
| LDHU .(SB) *LBR++[s1(U24)], s2(R4)<br>void ISA::OPC_LDHU_40b_201 (U24 &s1, Gpr &s2)<br>{<br>s2.clear( );<br>s2.half(0) = dmem->uhalf(Lbr);<br>Lbr += s1<<1;<br>} | LOAD UNSIGNED HALF, LBR, +U24 OFFSET, POST ADJ |
| LDHU .(SB) *s1(U24),s2(R4)<br>void ISA::OPC_LDHU_40b_206 (U24 &s1, Gpr &s2)<br>{<br>s2.clear( );<br>s2.half(0) = dmem->uhalf(s1<<1);<br>} | LOAD UNSIGNED HALF, U24 IMM ADDRESS |
| LDHU .(SB) *+SP[s1(U24)], s2(R4)<br>void ISA::OPC_LDHU_40b_256 (U24 &s1,Gpr &s2)<br>{<br>s2.clear( );<br>s2.half(0) = dmem->uhalf(Sp+(s1<<1));<br>} | LOAD UNSIGNED HALF, SP, +U24 OFFSET |
| LDRF .SB s1(R4), s2(R4)<br>void ISA::OPC_LDRF_20b_80 (Gpr &s1, Gpr &s2)<br>{<br>if(s1 <= s2)<br>{<br>for(int r=s2.address( );r<s1.address( );−−r)<br>{<br>Sp += 4;<br>gprs[r] = dmem->read(Sp.value( ));<br>}<br>}<br>} | LOAD REGISTER FILE RANGE |
| LDSYS .(SB) s1(R4), s2(R4)<br>void ISA::OPC_LDSYS_20b_162 (Gpr &s1, Gpr &s2)<br>{<br>gls_is_load._assert(1);<br>gls_attr_valid._assert(1);<br>gls_is_ldsys._assert(1);<br>gls_regf_addr._assert(s2.address( ));<br>gls_sys_addr._assert(s1);<br>} | LOAD SYSTEM ATTRIBUTE (GLS) |
| LDW .(SB) *+LBR[s1(U4)], s2(R4)<br>void ISA::OPC_LDW_20b_49 (U4 &s1,Gpr &s2)<br>{<br>s2.clear( );<br>s2 = dmem->word(Lbr+(s1<<2));<br>} | LOAD WORD, LBR, +U4 OFFSET |

TABLE 15-continued

| Syntax/Pseudocode | Description |
|---|---|
| LDW .(SB) *+LBR[s1(R4)], s2(R4)<br>void ISA::OPC_LDW_20b_54 (Gpr &s1, Gpr &s2)<br>{<br>s2 = dmem->word(Lbr+s1);<br>} | LOAD WORD, LBR, +REG OFFSET |
| LDW .(SB) *LBR++[s1(U4)], s2(R4)<br>void ISA::OPC_LDW_20b_59 (U4 &s1, Gpr &s2)<br>{<br>s2 = dmem->half(Lbr);<br>Lbr += s1<<2;<br>} | LOAD WORD, LBR, +U4 OFFSET POST ADJ |
| LDW .(SB) *LBR++[s1(R4)], s2(R4)<br>void ISA::OPC_LDW_20b_64 (Gpr &s1, Gpr &s2)<br>{<br>s2 = dmem->word(Lbr);<br>Lbr += s1;<br>} | LOAD WORD, LBR, +REG OFFSET, POST ADJ |
| LDW .(SB) *+s1(R4), s2(R4)<br>void ISA::OPC_LDW_20b_69 (Gpr &s1, Gpr &s2)<br>{<br>s2 = dmem->word(s1);<br>} | LOAD WORD, ZERO OFFSET |
| LDW .(SB) *s1(R4)++, s2(R4)<br>void ISA::OPC_LDW_20b_74 (Gpr &s1, Gpr &s2)<br>{<br>s2 = dmem->word(s1);<br>s1 += 4;<br>} | LOAD WORD, ZERO OFFSET, POST INC |
| LDW .(SB) *+s1[s2(U20)], s3(R4)<br>void ISA::OPC_LDW_40b_187 (Gpr &s1, U20 &s2, Gpr &s3)<br>{<br>s3 = dmem->word(s1+(s2<<2));<br>} | LOAD WORD, +U20 OFFSET |
| LDW .(SB) *s1++[s2(U20)], s3(R4)<br>void ISA::OPC_LDW_40b_192 (Gpr &s1, U20 &s2, Gpr &s3)<br>{<br>s3 = dmem->word(s1);<br>s1 += s2<<2;<br>} | LOAD WORD, +U20 OFFSET, POST ADJ |
| LDW .(SB) *+LBR[s1(U24)], s2(R4)<br>void ISA::OPC_LDW_40b_197 (U24 &s1, Gpr &s2)<br>{<br>s2 = dmem->word(Lbr+(s1<<2));<br>} | LOAD WORD, LBR, +U24 OFFSET |
| LDW .(SB) *LBR++[s1(U24)], s2(R4)<br>void ISA::OPC_LDW_40b_202 (U24 &s1, Gpr &s2)<br>{<br>s2 = dmem->word(Lbr);<br>Lbr += s1<<2;<br>} | LOAD WORD, LBR, +U24 OFFSET, POST ADJ |
| LDW .(SB) *s1(U24),s2(R4)<br>void ISA::OPC_LDW_40b_207 (U24 &s1, Gpr &s2)<br>{<br>s2 = dmem->word(s1<<2);<br>} | LOAD WORD, U24 IMM ADDRESS |
| LDW .(SB) *+SP[s1(U24)], s2(R4)<br>void ISA::OPC_LDW_40b_257 (U24 &s1, Gpr &s2)<br>{<br>s2.word(0) = dmem->word(Sp+(s1<<2));<br>} | LOAD WORD, SP, +U24 OFFSET |
| LMOD .(SA,SB) s1(R4), s2(R4)<br>void ISA::OPC_LMOD_20b_82 (Gpr &s1, Gpr &s2, Unit &unit)<br>{<br>int test = 1;<br>int width = s1.size( ) − 1;<br>int i;<br>for(i=0;i<=width;++i)<br>{<br>if(s1.bit(width−i) == test) break;<br>}<br>s2 = i;<br>Csr.bit(EQ,unit) = s2.zero( );<br>} | LEFT MOST ONE DETECT |

TABLE 15-continued

| Syntax/Pseudocode | Description |
| --- | --- |
| LMODC .(SA,SB) s1(R4), s2(R4)<br>void ISA::OPC_LMODC_20b_83 (Gpr &s1, Gpr &s2, Unit &unit)<br>{<br>int test = 1;<br>int width = s1.size( ) − 1;<br>int i;<br>for(i=0;i<=width;++i)<br>{<br>if(s1.bit(width−i) == test)<br>{<br>s1.bit(width−i) = !(test&0x1);<br>break;<br>}<br>}<br>s2 = i;<br>Csr.bit(EQ,unit) = s2.zero( );<br>} | LEFT MOST ONE DETECT W/ CLEAR |
| LMZD .(SA,SB) s1(R4), s2(R4)<br>void ISA::OPC_LMZD_20b_84 (Gpr &s1, Gpr &s2, Unit &unit)<br>{<br>int test = 0;<br>int width = s1.size( ) − 1;<br>int i;<br>for(i=0;i<=width;++i)<br>{<br>if(s1.bit(width−i) == test) break;<br>}<br>s2 = i;<br>Csr.bi | LEFT MOST ZERO DETECT |
| LMZDS .(SA,SB) s1(R4), s2(R4)<br>void ISA::OPC_LMZDS_20b_85 (Gpr &s1, Gpr &s2, Unit &unit)<br>{<br>int test = 0;<br>int width = s1.size( ) − 1;<br>int i;<br>for(i=0;i<=width;++i)<br>{<br>if(s1.bit(width−i) == test)<br>{<br>s1.bit(width−i) = !(test&0x1);<br>break;<br>}<br>}<br>s2 = i;<br>Csr.bit(EQ,unit) = s2.zero( );<br>} | LEFT MOST ZERO DETECT W/ SET |
| MAX .(SA,SB) s1(R4), s2(R4)<br>void ISA::OPC_MAX_20b_121 (Gpr &s1, Gpr &s2,Unit &unit)<br>{<br>Csr.bit(LT,unit) = s2 < s1;<br>Csr.bit(GT,unit) = s2 > s1;<br>Csr.bit(EQ,unit) = s2 == s1;<br>if(Csr.bit(LT,unit)) s2 = s1;<br>} | SIGNED MAXIMUM |
| MAX2 .(SA,SB) s1(R4), s2(R4)<br>void ISA::OPC_MAX2_20b_133 (Gpr &s1, Gpr &s2)<br>{<br>Result tmp;<br>tmp.range( 0,15) = s1.range(16,31) > s2.range( 0,15)<br>? s1.range(16,31) : s2.range( 0,15);<br>tmp.range(16,31) = s1.range( 0,15) > s2.range(16,31)<br>? s1.range( 0,15) : s2.range(16,31);<br>s2.range(16,31) = s1.range(16,31) > s2.range(16,31)<br>? s1.range(16,31) : s2.range(16,31);<br>s2.range( 0,15) = s1.range(16,31) > s2.range(16,31)<br>? tmp.range(16,31) : tmp.range( 0,15);<br>} | HALF WORD MAXIMUM w/ REORDER |
| MAX2U .(SA,SB) s1(R4), s2(R4)<br>void ISA::OPC_MAX2U_20b_156 (Gpr &s1, Gpr &s2)<br>{<br>Result tmp;<br>tmp.range(0,15) = (s1.range(0,15) >=s2.range(0,15)) ? s1.range(0,15): s2.range(0,15);<br>tmp.range(16,31) = (s1.range(16,31) >=s2.range(16,31)) ? s1.range(16, 31):s2.range(16,31);<br>s2.range(0,15) = (tmp.range(16,31)>=tmp.range(0,15)) ? tmp.range(16, 31):tmp.range(0,15);<br>s2.range(16,31) = (tmp.range(16,31)>=tmp.range(0,15)) ? tmp.range(0, | HALF WORD MAXIMUM w/ REORDER, UNSIGNED |

TABLE 15-continued

| Syntax/Pseudocode | Description |
|---|---|
| 15):tmp.range(16,31);<br>} | |
| MAXH .(SA,SB) s1(R4), s2(R4)<br>void ISA::OPC_MAXH_20b_131 (Gpr &s1, Gpr &s2)<br>{<br>s2.range( 0,15) = s2.range( 0,15) > s1.range( 0,15)<br>? s2.range( 0,15) : s1.range( 0,15);<br>s2.range(16,31) = s2.range(16,31) > s1.range(16,31)<br>? s2.range(16,31) : s1.range(16,31);<br>} | HALF WORD MAXIMUM |
| MAXHU .(SA,SB) s1(R4), s2(R4)<br>void ISA::OPC_MAXHU_20b_132 (Gpr &s1, Gpr &s2)<br>{<br>s2.range( 0,15) = _unsigned(s2.range( 0,15)) > _unsigned(s1.range( 0,<br>15))<br>? s2.range( 0,15) : s1.range( 0,15);<br>s2.range(16,31) = _unsigned(s2.range(16,31)) > _unsigned(s1.range(16,<br>31))<br>? s2.range(16,31) : s1.range(16,31);<br>} | HALF WORD MAXIMUM, UNSIGNED |
| MAXMAX2 .(SA,SB) s1(R4), s2(R4)<br>void ISA::OPC_MAXMAX2_20b_157 (Gpr &s1, Gpr &s2)<br>{<br>Result tmp;<br>tmp.range(16,31) = (s1.range(0,15)>=s2.range(16,31)) ? s1.range(0,15):<br>s2.range(16,31);<br>tmp.range(0,15) = (s1.range(16,31)>=s2.range(0,15)) ? s1.range(16,31):<br>s2.range(0,15);<br>s2.range(16,31) = (s1.range(16,31)>=s2.range(16,31)) ? s1.range(16,31):<br>s2.range(16,31);<br>s2.range(0,15) = (s1.range(16,31)>=s2.range(16,31)) ? tmp.range(16,31) :<br>tmp.range(0,15);<br>} | HALF WORD MAXIMUM AND 2nd MAXIMUM |
| MAXMAX2U .(SA,SB) s1(R4), s2(R4)<br>void ISA::OPC_MAXMAX2U_20b_158 (Gpr &s1, Gpr &s2)<br>{<br>Result tmp;<br>tmp.range(16,31) = (_unsigned(s1.range(0,15)) >=_unsigned(s2.range(16,<br>31))) ? s1.range(0,15) : s2.range(16,31);<br>tmp.range(0,15) = (_unsigned(s1.range(16,31))>=_unsigned(s2.range(0,<br>15))) ? s1.range(16,31) : s2.range(0,15);<br>s2.range(16,31) = (_unsigned(s1.range(16,31))>=_unsigned(s2.range(16,<br>31))) ? s1.range(16,31) : s2.range(16,31);<br>s2.range(0,15) = (_unsigned(s1.range(16,31))>=_unsigned(s2.range(16,<br>31))) ? tmp.range(16,31) : tmp.range(0,15);<br>} | HALF WORD MAXIMUM AND 2nd MAXIMUM, UNSIGNED |
| MAXU .(SA,SB) s1(R4), s2(R4)<br>void ISA::OPC_MAXU_20b_120 (Gpr &s1, Gpr &s2,Unit &unit)<br>{<br>Csr.bit(LT,unit) = _unsigned(s2) < _unsigned(s1);<br>Csr.bit(GT,unit) = _unsigned(s2) > _unsigned(s1);<br>Csr.bit(EQ,unit) = s2 == s1;<br>if(Csr.bit(LT,unit)) s2 = s1;<br>} | UNSIGNED MAXIMUM |
| MFVRC .(SB) s1(R5),s2(R4)<br>void ISA::OPC_MFVRC_40b_266 (Vreg &s1, Gpr &s2)<br>{<br>Event initiate,complete;<br>Reg s2Save;<br>risc_is_mfvrc._assert(1);<br>vec_regf_enz._assert(0);<br>vec_regf_hwz._assert(0x3);<br>vec_regf_ra._assert(s1);<br>s2Save = s2.address( );<br>initiate.live(true);<br>complete.live(vec_wdata_wrz.is(0));<br>} | MOVE VREG TO GPR, COLLAPSE |
| MFVVR .(SB) s1(R5), s2(R5), s3(R4)<br>void ISA::OPC_MFVVR_40b_264 (Vunit &s1, Vreg &s2,Gpr &s3)<br>{<br>Event initiate,complete;<br>Reg s3Save;<br>risc_is_mfvvr._assert(1);<br>vec_regf_ua._assert(s1);<br>vec_regf_hwz._assert(0x3); | MOVE VUNIT/VREG TO GPR |

TABLE 15-continued

| Syntax/Pseudocode | Description |
|---|---|
| vec_regf_enz._assert(0);<br>vec_regf_ra._assert(s2);<br>s3Save = s3.address( );<br>initiate.live(true); //this is an modeling artifact<br>complete.live(vec_wdata_wrz.is(0)); //ditto<br>} | |
| MFVVR .SB s1(R5), s2(R5), s3(R4)<br>void ISA::OPC_MFVVR_40b_264 (Vunit &s1, Vreg &s2,Gpr &s3)<br>{<br>Reg s3Save;<br>risc_is_mfvvr._assert(1);<br>risc_vec_ua._assert(s1);<br>risc_vec_ra._assert(s2);<br>s3Save = s3.address( );<br>initiate.live(true);<br>vec_risc_wa._assert(s3);<br>vec_risc_wd gets value of Vreg(risc_vec_ra);<br>complete.live(vec_risc_wrz.is(0)); //ditto<br>} | MOVE VUNIT/VREG TO GPR |
| MIN .(SA,SB) s1(R4), s2(R4)<br>void ISA::OPC_MIN_20b_119 (Gpr &s1, Gpr &s2,Unit &unit)<br>{<br>Csr.bit(LT,unit) = s2 < s1;<br>Csr.bit(GT,unit) = s2 > s1;<br>Csr.bit(EQ,unit) = s2 == s1;<br>if(Csr.bit(GT,unit)) s2 = s1;<br>} | SIGNED MINIMUM |
| MIN2 .(SA,SB) s1(R4), s2(R4)<br>void ISA::OPC_MIN2_20b_166 (Gpr &s1, Gpr &s2)<br>{<br>Result tmp;<br>tmp.range(0,15) = (s1.range(0,15) <s2.range(0,15)) ? s1.range(0,15):<br>s2.range(0,15);<br>tmp.range(16,31) = (s1.range(16,31) <s2.range(16,31)) ? s1.range(16,<br>31):s2.range(16,31);<br>s2.range(0,15) = (tmp.range(16,31)<tmp.range(0,15)) ? tmp.range(16,<br>31):tmp.range(0,15);<br>s2.range(16,31) = (tmp.range(16,31)<tmp.range(0,15)) ? tmp.range(0,<br>15):tmp.range(16,31);<br>} | HALF WORD MINIMUM AND 2nd MINIMUM |
| MIN2U .(SA,SB) s1(R4), s2(R4)<br>void ISA::OPC_MIN2U_20b_167 (Gpr &s1, Gpr &s2)<br>{<br>Result tmp;<br>tmp.range(0,15) = (_unsigned(s1.range(0,15)) <_unsigned(s2.range(0,<br>15))) ? s1.range(0,15):s2.range(0,15);<br>tmp.range(16,31) = (_unsigned(s1.range(16,31)) <_unsigned(s2.range(16,<br>31))) ? s1.range(16,31):s2.range(16,31);<br>s2.range(0,15) = (_unsigned(tmp.range(16,31))<_unsigned(tmp.range(0,<br>15))) ? tmp.range(16,31):tmp.range(0,15);<br>s2.range(16,31) = (_unsigned(tmp.range(16,31))<_unsigned(tmp.range(0,<br>15))) ? tmp.range(0,15):tmp.range(16,31);<br>} | HALF WORD MINIMUM AND 2nd MINIMUM, UNSIGNED |
| MINH .(SA,SB) s1(R4), s2(R4)<br>void ISA::OPC_MINH_20b_160 (Gpr &s1, Gpr &s2, Unit &unit)<br>{<br>s2.range( 0,15) = s2.range( 0,15) < s1.range( 0,15)<br>? s2.range( 0,15) : s1.range( 0,15);<br>s2.range(16,31) = s2.range(16,31) < s1.range(16,31)<br>? s2.range(16,31) : s1.range(16,31);<br>} | HALF WORD MINIMUM |
| MINHU .(SA,SB) s1(R4), s2(R4)<br>void ISA::OPC_MINHU_20b_161 (Gpr &s1, Gpr &s2, Unit &unit)<br>{<br>s2.range( 0,15) = _unsigned(s2.range( 0,15)) < _unsigned(s1.range( 0,<br>15))<br>? s2.range( 0,15) : s1.range( 0,15);<br>s2.range(16,31) = _unsigned(s2.range(16,31)) < _unsigned(s1.range(16,<br>31))<br>? s2.range(16,31) : s1.range(16,31);<br>} | HALF WORD MINIMUM, UNSIGNED |
| MINMIN2 .(SA,SB) s1(R4), s2(R4)<br>void ISA::OPC_MINMIN2_20b_168 (Gpr &s1, Gpr &s2)<br>{ | HALF WORD MINIMUM AND 2nd MINIMUM |

TABLE 15-continued

| Syntax/Pseudocode | Description |
|---|---|
| Result tmp;<br>tmp.range(16,31) = s1.range(0,15) <s2.range(16,31) ? s1.range(0,15) : s2.range(16,31);<br>tmp.range(0,15) = s1.range(16,31)<s2.range(0,15) ? s2.range(16,31) : s1.range(16,31);<br>s2.range(16,31) = s1.range(16,31)<s2.range(16,31) ? s1.range(16,31) : s2.range(16,31);<br>s2.range(0,15) = s1.range(16,31)<s2.range(16,31) ? tmp.range(16,31): tmp.range(0,15);<br>} | |
| MINMIN2U .(SA,SB) s1(R4), s2(R4)<br>void ISA::OPC_MINMIN2U_20b_169 (Gpr &s1, Gpr &s2)<br>{<br>Result tmp;<br>tmp.range(16,31) = _unsigned(s1.range(0,15) )<_unsigned(s2.range(16, 31)) ? s1.range(0,15) : s2.range(16,31);<br>tmp.range(0,15) = _unsigned(s1.range(16,31))<_unsigned(s2.range(0, 15) ) ? s2.range(16,31) : s1.range(16,31);<br>s2.range(16,31) = _unsigned(s1.range(16,31))<_unsigned(s2.range(16, 31)) ? s1.range(16,31) : s2.range(16,31);<br>s2.range(0,15) = _unsigned(s1.range(16,31))<_unsigned(s2.range(16, 31)) ? tmp.range(16,31): tmp.range(0,15);<br>} | HALF WORD MINIMUM AND 2nd MINIMUM, UNSIGNED |
| MINU .(SA,SB) s1(R4), s2(R4)<br>void ISA::OPC_MINU_20b_118 (Gpr &s1, Gpr &s2,Unit &unit)<br>{<br>Csr.bit(LT,unit) = _unsigned(s2) < _unsigned(s1);<br>Csr.bit(GT,unit) = _unsigned(s2) > _unsigned(s1);<br>Csr.bit(EQ,unit) = s2 == s1;<br>if(Csr.bit(GT,unit)) s2 = s1;<br>} | UNSIGNED MINIMUM |
| MPY .(SA,SB) s1(R4), s2(R4)<br>void ISA::OPC_MPY_20b_115 (Gpr &s1, Gpr &s2,Unit &unit)<br>{<br>Result r1;<br>r1 = s2.range(0,15)*s1.range(0,15);<br>s2 = r1;<br>Csr.bit(EQ,unit) = s2.zero( );<br>} | SIGNED 16b MULTIPLY |
| MPYH .(SA,SB) s1(R4), s2(R4)<br>void ISA::OPC_MPYH_20b_116 (Gpr &s1, Gpr &s2,Unit &unit)<br>{<br>Result r1;<br>r1 = s2.range(16,31)*s1.range(16,31);<br>s1 = r1;<br>Csr.bit(EQ,unit) = s2.zero( );<br>} | SIGNED 16b MULTIPLY, HIGH HALF WORDS |
| MPYLH .(SA,SB) s1(R4), s2(R4)<br>void ISA::OPC_MPYLH_20b_117 (Gpr &s1, Gpr &s2,Unit &unit)<br>{<br>Result r1;<br>r1 = s2.range(16,31)*s1.range(0,15);<br>s2 = r1;<br>Csr.bit(EQ,unit) = s2.zero( );<br>} | SIGNED 16b MULTIPLY, LOW HALF TO HIGH HALF |
| MPYU .(SA,SB) s1(R4), s2(R4)<br>void ISA::OPC_MPYU_20b_159 (Gpr &s1, Gpr &s2,Unit &unit)<br>{<br>Result r1;<br>r1 = ((unsigned)s2.range(0,15)) * ((unsigned)s1.range(0,15));<br>s2 = r1;<br>Csr.bit(EQ,unit) = r1.zero( );<br>} | UNSIGNED 16b MULTIPLY |
| MTV .(SA,SB) s1(R4), s2(R5)<br>void ISA::OPC_MTV_20b_164 (Gpr &s1, Vreg &s2)<br>{<br>Result r1;<br>r1.clear( );<br>r1 = s1.range(0,15);<br>risc_is_mtv._assert(1);<br>vec_regf_enz._assert(0);<br>vec_regf_wa._assert(s2);<br>vec_regf_wd._assert(r1);<br>vec_regf_hwz._assert(0x0); //active low, write both halves<br>} | MOVE GPR TO VREG, REPLICATED (LOW VREG) |

TABLE 15-continued

| Syntax/Pseudocode | Description |
|---|---|
| MTV .(SA,SB) s1(R4), s2(R5)<br>void ISA::OPC_MTV_20b_165 (Gpr &s1, Vreg &s2)<br>{<br>Result r1;<br>r1.clear( );<br>r1.range(16,31) = s1.range(16,31);<br>risc_is_mtv._assert(1);<br>vec_regf_enz._assert(0);<br>vec_regf_wa._assert(s2);<br>vec_regf_wd._assert(r1);<br>vec_regf_hwz._assert(0x0); //active low, write both halves<br>} | MOVE GPR TO VREG, REPLICATED (HIGH VREG) |
| MTVRE .(SB) s1(R4),s2(R5)<br>void ISA::OPC_MTVRE_40b_265 (Gpr &s1, Vreg &s2)<br>{<br>risc_is_mtvre._assert(1);<br>vec_regf_enz._assert(0);<br>vec_regf_wa._assert(s2);<br>vec_regf_wd._assert(s1);<br>vec_regf_hwz._assert(0x0); //active low, both halves<br>} | MOVE GPR TO VREG, EXPAND |
| MTVVR .(SB) s1(R4), s2(R5), s3(R5)<br>void ISA::OPC_MTVVR_40b_263 (Gpr &s1,Vunit &s2,Vreg &s3)<br>{<br>risc_is_mtvvr._assert(1);<br>vec_regf_ua._assert(s2);<br>vec_regf_enz._assert(0);<br>vec_regf_wa._assert(s3);<br>vec_regf_wd._assert(s1);<br>vec_regf_hwz._assert(0x0); //active low, both halves<br>} | MOVE GPR TO VUNIT/VREG |
| MTVVR .SB s1(R4), s2(R5), s3(R5)<br>void ISA::OPC_MTVVR_40b_263 (Gpr &s1,Vunit &s2,Vreg &s3)<br>{<br>risc_is_mtvvr._assert(1);<br>risc_vec_ua._assert(s2);<br>risc_vec_wa._assert(s3);<br>risc_vec_wd._assert(s1);<br>risc_vec_hwz._assert(0x0); //active low, both halves<br>} | MOVE GPR TO VUNIT/VREG |
| MV .(SA,SB) s1(R4), s2(R4)<br>void ISA::OPC_MV_20b_110 (Gpr &s1, Gpr &s2)<br>{<br>s2 = s1;<br>} | MOVE GPR TO GPR |
| MVC .(SA,SB) s1(R5), s2(R4)<br>void ISA::OPC_MVC_20b_134 (Creg &s1, Gpr &s2)<br>{<br>s2 = s1;<br>} | MOVE (LOW) CONTROL REGISTER TO GPR |
| MVC .(SA,SB) s1(R5), s2(R4)<br>void ISA::OPC_MVC_20b_135 (Creg &s1, Gpr &s2)<br>{<br>s2 = s1;<br>} | MOVE (HIGH) CONTROL REGISTER TO GPR |
| MVC .(SA,SB) s1(R4), s2(R5)<br>void ISA::OPC_MVC_20b_136 (Gpr &s1, Creg &s2)<br>{<br>s2 = s1;<br>} | MOVE GPR TO (LOW) CONTROL REGISTER |
| MVC .(SA,SB) s1(R4), s2(R5)<br>void ISA::OPC_MVC_20b_137 (Gpr &s1, Creg &s2)<br>{<br>s2 = s1;<br>} | MOVE GPR TO (HIGH) CONTROL REGISTER |
| MVCSR .(SA,SB) s1(R4),s2(U4)<br>void ISA::OPC_MVCSR_20b_45 (Gpr &s1, U4 &s2)<br>{<br>//Copy bit 0 of s1 to the CSR bit defined<br>//by s2(U4), CSR[s2]<br>Csr.setBit(s2.value( ),s1.bit(0));<br>} | MOVE GPR BIT TO CSR |
| MVCSR .(SA,SB) s1(U4),s2(R4)<br>void ISA::OPC_MVCSR_20b_46 (U4 &s1, Gpr &s2)<br>{ | MOVE CSR BIT TO GPR |

TABLE 15-continued

| Syntax/Pseudocode | Description |
| --- | --- |
| //Copy the CSR bit defined by s1(U4), CSR[U4]<br>//to bit 0 of s2<br>s2.clear( );<br>s2.bit(0) = Csr.bit(s1.value( ));<br>} | |
| MVK .(SA,SB) s1(S4), s2(R4)<br>void ISA::OPC_MVK_20b_112 (S4 &s1, Gpr &s2)<br>{<br>s2 = sign_extend(s1);<br>} | MOVE S4 IMM TO GPR |
| MVK .(SB) s1(S24),s2(R4)<br>void ISA::OPC_MVK_40b_229 (S24 &s1,Gpr &s2)<br>{<br>s2 = sign_extend(s1);<br>} | MOVE S24 IMM TO GPR |
| MVKA .(SB) s1(S16), s2(U3), s3(R4)<br>void ISA::OPC_MVKA_40b_227 (S16 &s1, U3 &s2, Gpr &s3)<br>{<br>s3 = s1 << (s2*8);<br>} | MOVE S16 IMM TO GPR, ALIGNED |
| MVKAU .(SB) s1(U16), s2(U3), s3(R4)<br>void ISA::OPC_MVKAU_40b_226 (U16 &s1, U3 &s2, Gpr &s3)<br>{<br>s3.clear( );<br>s3 = (s1 << (s2*8));<br>} | MOVE U16 IMM TO GPR, ALIGNED |
| MVKCHU .(SB) s1(U32),s2(R5)<br>void ISA::OPC_MVKCHU_40b_250 (U32 &s1,Creg &s2)<br>{<br>s2.range(16,31) = s1.range(16,31);<br>} | MOVE IMM TO CREG, HIGH HALF |
| MVKCLHU .(SB) s1(U32),s2(R5)<br>void ISA::OPC_MVKCLHU_40b_251 (U32 &s1,Creg &s2)<br>{<br>s2.range(16,31) = s1.range(0,15);<br>} | MOVE IMM TO CREG, LOW TO HIGH HALF |
| MVKCLU .(SB) s1(U32),s2(R5)<br>void ISA::OPC_MVKCLU_40b_249 (U32 &s1,Creg &s2)<br>{<br>s2.range(0,15) = s1.range(0,15);<br>} | MOVE IMM TO CREG, LOW HALF |
| MVKHU .(SB) s1(U32),s2(R4)<br>void ISA::OPC_MVKHU_40b_242 (U32 &s1,Gpr &s2)<br>{<br>s2.range(16,31) = s1.range(16,31);<br>} | MOVE U16 TO GPR, HIGH HALF |
| MVKLHU .(SB) s1(U32),s2(R4)<br>void ISA::OPC_MVKLHU_40b_243 (U32 &s1,Gpr &s2)<br>{<br>s2.range(16,31) = s1.range(0,15);<br>} | MOVE U16 TO GPR, LOW TO HIGH HALF |
| MVKLU .(SB) s1(U32),s2(R4)<br>void ISA::OPC_MVKLU_40b_241 (U32 &s1,Gpr &s2)<br>{<br>s2 = s1;<br>} | MOVE U16 TO GPR, LOW HALF |
| MVKU .(SA,SB) s1(U4), s2(R4)<br>void ISA::OPC_MVKU_20b_111 (U4 &s1,Gpr &s2)<br>{<br>s2 = zero_extend(s1);<br>} | MOVE U4 IMM TO GPR |
| MVKU .(SB) s1(U24),s2(R4)<br>void ISA::OPC_MVKU_40b_228 (U24 &s1,Gpr &s2)<br>{<br>s2 = zero_extend(s1);<br>} | MOVE U24 IMM TO GPR |
| MVKVRHU .(SB) s1(U32), s2(R5), s3(R5)<br>void ISA::OPC_MVKVRHU_40b_268 (U16 &s1, Vunit &s2, Vreg &s3)<br>{<br>Result r1;<br>r1 = _unsigned(s1.range(16,31));<br>risc_is_mtvvr._assert(1);<br>vec_regf_ua._assert(s2);<br>vec_regf_enz._assert(0);<br>vec_regf_wa._assert(s3);<br>vec_regf_wd._assert(r1);<br>vec_regf_hwz._assert(0x1); //active low, high half<br>} | MOVE U16 TO VUNIT/VREG, HIGH HALF |

TABLE 15-continued

| Syntax/Pseudocode | Description |
|---|---|
| MVKVRLU .(SB) s1(U32), s2(R5), s3(R5)<br>void ISA::OPC_MVKVRLU_40b_267 (U16 &s1, Vunit &s2, Vreg &s3)<br>{<br>Result r1;<br>r1.clear( );<br>r1 = _unsigned(s1);<br>risc_is_mtvvr._assert(1);<br>vec_regf_ua._assert(s2);<br>vec_regf_enz._assert(0);<br>vec_regf_wa._assert(s3);<br>vec_regf_wd._assert(r1);<br>vec_regf_hwz._assert(0x0); //active low, both halves<br>} | MOVE U16 TO VUNIT/VREG, LOW HALF |
| NOP .(SA,SB)<br>void ISA::OPC_NOP_20b_17 (void)<br>{<br>} | NO OPERATION |
| NOT .(SA,SB) s1(R4)<br>void ISA::OPC_NOT_20b_8 (Gpr &s1,Unit &unit)<br>{<br>s1 = ~s1;<br>Csr.setBit(EQ,unit,s1.zero( ));<br>} | BITWISE INVERSION |
| OR .(SA,SB) s1(R4), s2(R4)<br>void ISA::OPC_OR_20b_90 (Gpr &s1, Gpr &s2,Unit &unit)<br>{<br>s2 \|= s1;<br>Csr.bit(EQ,unit) = s2.zero( );<br>} | BITWISE OR |
| OR .(SA,SB) s1(U4), s2(R4)<br>void ISA::OPC_OR_20b_91 (U4 &s1,Gpr &s2,Unit &unit)<br>{<br>s2 \|= s1;<br>Csr.bit(EQ,unit) = s2.zero( );<br>} | BITWISE OR, U4 IMM |
| OR .(SB) s1(S3), s2(U20), s3(R4)<br>void ISA::OPC_OR_40b_214 (U3 &s1, U20 &s2, Gpr &s3,Unit &unit)<br>{<br>s3 \|= (s2 << (s1*8));<br>Csr.bit(EQ,unit) = s3.zero( );<br>} | BITWISE OR, U20 IMM, BYTE ALIGNED |
| OUTPUT .(SB) *+s1[s2(R4)], s3(S8), s4(U6), s5(R4)<br>void ISA::OPC_OUTPUT_40b_238 (Gpr &s1,Gpr &s2,S8 &s3,U6 &s4, Gpr &s5)<br>{<br>int imm_cnst = s3.value( );<br>int bot_off = s2.range(0,3);<br>int top_off = s2.range(4,7);<br>int blk_size = s2.range(8,10);<br>int str_dis = s2.bit(12);<br>int repeat = s2.bit(13);<br>int bot_flag = s2.bit(14);<br>int top_flag = s2.bit(15);<br>int pntr = s2.range(16,23);<br>int size = s2.range(24,31);<br>int tmp,addr;<br>if(imm_cnst > 0 && bot_flag && imm_cnst > bot_off)<br>{<br>if(!repeat)<br>{<br>tmp = (bot_off<<1) − imm_cnst;<br>}<br>else<br>{<br>tmp = bot_off;<br>}<br>}<br>else<br>{<br>if(imm_cnst < 0 && top_flag && −imm_cnst > top_off)<br>{<br>if(!repeat)<br>{<br>tmp = −(top_off<<1) − imm_cnst;<br>} | OUTPUT, 5 operand |

TABLE 15-continued

| Syntax/Pseudocode | Description |
|---|---|

```
        else
        {
            tmp = −top_off;
        }
    }
    else
    {
        tmp = imm_cnst;
    }
}
pntr = pntr << blk_size;
if(size == 0)
{
    addr = pntr + tmp;
}
else
{
    if((pntr + tmp) >= size)
    {
        addr = pntr + tmp − size;
    }
    else
    {
        if(pntr + tmp < 0)
        {
            addr = pntr + tmp + size;
        }
        else
        {
            addr = pntr + tmp;
        }
    }
}
addr = addr + s1.value( );
risc_is_output._assert(1);
risc_output_wd._assert(s5);
risc_output_wa._assert(addr);
risc_output_pa._assert(s4);
risc_output_sd._assert(str_dis);
}
OUTPUT .(SB) *+s1[s2(S14)], s3(U6), s4(R4)                          OUTPUT, 4
void ISA::OPC_OUTPUT_40b_239 (Gpr &s1,S14 &s2,U6 &s3,Gpr &s4)       operand
{
    Result r1;
    r1 = s1 + s2;
    risc_is_output._assert(1);
    risc_output_wd._assert(s4);
    risc_output_wa._assert(r1);
    risc_output_pa._assert(s3);
    risc_output_sd._assert(s1.bit(12));
}
OUTPUT .(SB) *s1(U18), s2(U6), s3(R4)                               OUTPUT, 3
void ISA::OPC_OUTPUT_40b_240 (S18 &s1,U6 &s2,Gpr &s3)               operand
{
    risc_is_output._assert(1);
    risc_output_wd._assert(s3);
    risc_output_wa._assert(s1);
    risc_output_pa._assert(s2);
    risc_output_sd._assert(0);
}
PACKHH (.SA,.SB) s1(R4, s2(R4)                                      PACK REGISTER,
void ISA::OPC_PACKHH_20b_372 (Gpr &s1, Gpr &s2)                     HIGH/HIGH
{
    s2 = (s1.range(16,31) << 16) | s2.range(16,31);
}
PACKHL (.SA,.SB) s1(R4, s2(R4)                                      PACK REGISTER,
void ISA::OPC_PACKHL_20b_371 (Gpr &s1, Gpr &s2)                     HIGH/LOW
{
    s2 = (s1.range(16,31) << 16) | s2.range(0,15);
}
PACKLH (.SA,.SB) s1(R4, s2(R4)                                      PACK REGISTER,
void ISA::OPC_PACKLH_20b_370 (Gpr &s1, Gpr &s2)                     LOW/HIGH
{
    s2 = (s1.range(0,15) << 16) | s2.range(16,31);
}
```

TABLE 15-continued

| Syntax/Pseudocode | Description |
|---|---|
| PACKLL (.SA,.SB) s1(R4, s2(R4)<br>void ISA::OPC_PACKLL_20b_369 (Gpr &s1, Gpr &s2)<br>{<br>s2 = (s1.range(0,15) << 16) \| s2.range(0,15);<br>} | PACK REGISTER, LOW/LOW |
| RELINP .(SA,SB)<br>void ISA::OPC_RELINP_20b_18 (void)<br>{<br>risc_is_release._assert(1);<br>} | Release Input |
| REORD .(SA,SB) s1(U5), s2(R4)<br>void ISA::OPC_REORD_20b_330 (U5 &s1, Gpr &s2)<br>{<br>// U5 is used to reorder the bytes in<br>// s2 in one of the 24 possible combinations<br>//<br>// Macros and functions are defined to<br>// reduce the amount of text is in this<br>// p-code<br>//<br>//RORD is a macro function defined as<br>// RORD(w,x,y,z) {<br>// s2.range(0 ,7) = w;<br>// s2.range(8 ,15) = x;<br>// s2.range(16,23) = y;<br>// s2.range(24,31) = z;<br>// }<br>//<br>//RO_A-D are macros defined as<br>// RO_A => s2.range(0,7)<br>// RO_B => s2.range(8,15)<br>// RO_C => s2.range(16,23)<br>// RO_D => s2.range(24,31)<br>#define RORD(w,x,y,z) { \\<br>s2.range(0 ,7) = w; \\<br>s2.range(8 ,15) = x; \\<br>s2.range(16,23) = y; \\<br>s2.range(24,31) = z; \\<br>}<br>int sw = s1.value( );<br>switch(sw)<br>{<br>case 0x01: RORD(RO_A,RO_B,RO_D,RO_C); break;<br>case 0x02: RORD(RO_A,RO_C,RO_B,RO_D); break;<br>case 0x03: RORD(RO_A,RO_C,RO_D,RO_B); break;<br>case 0x04: RORD(RO_A,RO_D,RO_B,RO_C); break;<br>case 0x05: RORD(RO_A,RO_D,RO_C,RO_B); break;<br>case 0x06: RORD(RO_B,RO_A,RO_C,RO_D); break;<br>case 0x07: RORD(RO_B,RO_A,RO_D,RO_C); break;<br>case 0x08: RORD(RO_B,RO_C,RO_A,RO_D); break;<br>case 0x09: RORD(RO_B,RO_C,RO_D,RO_A); break;<br>case 0x0a: RORD(RO_B,RO_D,RO_A,RO_C); break;<br>case 0x0b: RORD(RO_B,RO_D,RO_C,RO_A); break;<br>case 0x0c: RORD(RO_C,RO_A,RO_B,RO_D); break;<br>case 0x0d: RORD(RO_C,RO_A,RO_D,RO_B); break;<br>case 0x0e: RORD(RO_C,RO_B,RO_A,RO_D); break;<br>case 0x0f: RORD(RO_C,RO_B,RO_D,RO_A); break;<br>case 0x10: RORD(RO_C,RO_D,RO_A,RO_B); break;<br>case 0x11: RORD(RO_C,RO_D,RO_B,RO_A); break;<br>case 0x12: RORD(RO_D,RO_A,RO_B,RO_C); break;<br>case 0x13: RORD(RO_D,RO_A,RO_C,RO_B); break;<br>case 0x14: RORD(RO_D,RO_B,RO_A,RO_C); break;<br>case 0x15: RORD(RO_D,RO_B,RO_C,RO_A); break;<br>case 0x16: RORD(RO_D,RO_C,RO_A,RO_B); break;<br>case 0x17: RORD(RO_D,RO_C,RO_B,RO_A); break;<br>}<br>} | REORDER WORD |
| RET .(SB)<br>void ISA::OPC_RET_20b_15 (void)<br>{<br>Sp +=4;<br>Pc = dmem->read(Sp);<br>} | RETURN FROM SUBROUTINE |
| REV .(SB) s1(U6), s2(U6), s3(R4)<br>void ISA::OPC_REV_40b_283 (U6 &s1, U6 &s2,Gpr &s3,Unit &unit)<br>{ | REVERSE BIT FIELD |

TABLE 15-continued

| Syntax/Pseudocode | Description |
| --- | --- |
| Reg tmp = s3; | |
| int j = s2.value( ); | |
| for(int i=s1.value( );i<=s2.value( );++i) | |
| { | |
| s3.bit(j−−) = tmp.bit(i); | |
| } | |
| Csr.bit(EQ,unit) = s3.zero( ); | |
| } | |
| REVB .(SA,SB) s1(U2), s2(U2), s3(R4) | REVERSE BITS |
| void ISA::OPC_REVB_20b_92 (U2 &s1, U2 &s2,Gpr &s3,Unit &unit) | WITHIN BYTE |
| { | FIELD |
| int istart = s1.value( ) *8; | |
| int iend = (s2.value( )+1)*8; | |
| int j = iend−1; | |
| Reg tmp = s3; | |
| for(int i=istart;i<iend;++i) | |
| { | |
| s3.bit(j−−) = tmp.bit(i); | |
| } | |
| Csr.bit(EQ,unit) = s3.zero( ); | |
| } | |
| ROT .(SA,SB) s1(R4), s2(R4) | ROTATE |
| void ISA::OPC_ROT_20b_93 (Gpr &s1, Gpr &s2,Unit &unit) | |
| { | |
| for(int i=0;i<s1.value( );++i) | |
| { | |
| int bit = s2.bit(0); | |
| unsigned int us2 = _unsigned(s2); | |
| s2 = (bit<<s2.width( )−1) \| (us2 >> 1); | |
| } | |
| Csr.bit(EQ,unit) = s2.zero( ); | |
| } | |
| ROT .(SA,SB) s1(U4), s2(R4) | ROTATE, U4 IMM |
| void ISA::OPC_ROT_20b_94 (U4 &s1, Gpr &s2,Unit &unit) | |
| { | |
| for(int i=0;i<s1.value( );++i) | |
| { | |
| int bit = s2.bit(0); | |
| unsigned int us2 = _unsigned(s2); | |
| s2 = (bit<<s2.width( )−1) \| (us2 >> 1); | |
| } | |
| Csr.bit(EQ,unit) = s2.zero( ); | |
| } | |
| ROTC .(SA,SB) s1(R4), s2(R4) | ROTATE THRU |
| void ISA::OPC_ROTC_20b_95 (Gpr &s1, Gpr &s2,Unit &unit) | CARRY |
| { | |
| for(int i=0;i<s1.value( );++i) | |
| { | |
| int bit = s2.bit(0); | |
| unsigned int us2 = _unsigned(s2); | |
| s2 = (Csr.bit(C,unit)<<s2.width( )−1) \| (us2 >> 1); | |
| Csr.bit(C,unit) = bit; | |
| } | |
| Csr.bit(EQ,unit) = s2.zero( ); | |
| } | |
| ROTC .(SA,SB) s1(U4), s2(R4) | ROTATE THRU |
| void ISA::OPC_ROTC_20b_96 (U4 &s1, Gpr &s2,Unit &unit) | CARRY, U4 IMM |
| { | |
| for(int i=0;i<s1.value( );++i) | |
| { | |
| int bit = s2.bit(0); | |
| unsigned int us2 = _unsigned(s2); | |
| s2 = (Csr.bit(C,unit)<<s2.width( )−1) \| (us2 >> 1); | |
| Csr.bit(C,unit) = bit; | |
| } | |
| Csr.bit(EQ,unit) = s2.zero( ); | |
| } | |
| RSUB .(SA,SB) s1(U4), s2(R4) | REVERSE |
| void ISA::OPC_RSUB_20b_125 (U4 &s1, Gpr &s2,Unit &unit) | SUBTRACT |
| { | |
| Result r1; | |
| r1 = s1 − s2; | |
| s2 = r1; | |
| Csr.bit( C,unit) = r1.underflow( ); | |
| Csr.bit(EQ,unit) = s2.zero( ); | |
| } | |

TABLE 15-continued

| Syntax/Pseudocode | Description |
|---|---|
| SADD .(SA,SB) s1(R4), s2(R4)<br>void ISA::OPC_SADD_20b_127 (Gpr &s1, Gpr &s2,Unit &unit)<br>{<br>Result r1;<br>r1 = s2 + s1;<br>if(r1.overflow( )) s2 = 0xFFFFFFFF;<br>else if(r1.underflow( )) s2 = 0;<br>else s2 = r1;<br>Csr.bit( C,unit) = r1.underflow( );<br>Csr.bit(EQ, unit) = s2.zero( );<br>Csr.bit(SAT,unit) = r1.overflow( ) \| r1.underflow( );<br>} | SATURATING ADDITION |
| SETB .(SA,SB) s1(U2), s2(U2), s3(R4)<br>void ISA::OPC_SETB_20b_97 (U2 &s1,U2 &s2,Gpr &s3,Unit &unit)<br>{<br>s3.range(s1*8,((s2+1)*8)−1) = 1;<br>Csr.bit(EQ,unit) = s3.zero( );<br>} | SET BYTE FIELD |
| SEXT .(SA,SB) s1(U3), s2(R4)<br>void ISA::OPC_SEXT_20b_79 (U3 &s1, Gpr &s2)<br>{<br>switch(s1.value( ))<br>{<br>case 0: s2 = sign_extend(s2.range(0,7));<br>case 1: s2 = sign_extend(s2.range(0,15));<br>case 2: s2 = sign_extend(s2.range(0,23));<br>case 3: s2 = s2.undefined(true); //future expansion<br>}<br>} | SIGN EXTEND |
| SHL .(SA,SB) s1(R4), s2(R4)<br>void ISA::OPC_SHL_20b_98 (Gpr &s1, Gpr &s2,Unit &unit)<br>{<br>s2 = s2 << s1;<br>Csr.bit(EQ,unit) = s2.zero( );<br>} | SHIFT LEFT |
| SHL .(SA,SB) s1(U4), s2(R4)<br>void ISA::OPC_SHL_20b_99 (U4 &s1,Gpr &s2,Unit &unit)<br>{<br>s2 = s2 << s1;<br>Csr.bit(EQ,unit) = s2.zero( );<br>} | SHIFT LEFT, U4 IMM |
| SHR .(SA,SB) s1(R4), s2(R4)<br>void ISA::OPC_SHR_20b_102 (Gpr &s1, Gpr &s2,Unit &unit)<br>{<br>s2 = s2 >> s1;<br>Csr.bit(EQ,unit) = s2.zero( );<br>} | SHIFT RIGHT, SIGNED |
| SHR .(SA,SB) s1(U4), s2(R4)<br>void ISA::OPC_SHR_20b_103 (U4 &s1, Gpr &s2,Unit &unit)<br>{<br>s2 = s2 >> s1;<br>Csr.bit(EQ,unit) = s2.zero( );<br>} | SHIFT RIGHT, SIGNED, U4 IMM |
| SHRU .(SA,SB) s1(R4), s2(R4)<br>void ISA::OPC_SHRU_20b_100 (Gpr &s1, Gpr &s2,Unit &unit)<br>{<br>s2 = (_unsigned(s2)) >> s1;<br>Csr.bit(EQ,unit) = s2.zero( );<br>} | SHIFT RIGHT, UNSIGNED |
| SHRU .(SA,SB) s1(U4), s2(R4)<br>void ISA::OPC_SHRU_20b_101 (U4 &s1, Gpr &s2,Unit &unit)<br>{<br>s2 = (_unsigned(s2)) >> s1;<br>Csr.bit(EQ,unit) = s2.zero( );<br>} | SHIFT RIGHT, UNSIGNED, U4 IMM |
| SSUB .(SA,SB) s1(R4), s2(R4)<br>void ISA::OPC_SSUB_20b_128 (Gpr &s1, Gpr &s2,Unit &unit)<br>{<br>Result r1;<br>r1 = s2 − s1;<br>if(r1 > 0xFFFFFFFF) s2 = 0xFFFFFFFF;<br>else if(r1 < 0) s2 = 0;<br>else s2 = r1;<br>Csr.bit( C,unit) = r1.underflow( );<br>Csr.bit(EQ, unit) = s2.zero( );<br>Csr.bit(SAT,unit) = r1.overflow( ) \| r1.underflow( );<br>} | SATURATING SUBTRACTION |

TABLE 15-continued

| Syntax/Pseudocode | Description |
|---|---|
| STB .(SB) *+SBR[s1(U4)], s2(R4)<br>void ISA::OPC_STB_20b_26 (U4 &s1,Gpr &s2)<br>{<br>dmem->byte(Sbr+s1) = s2.byte(0);<br>} | STORE BYTE, SBR, +U4 OFFSET |
| STB .(SB) *+SBR[s1(R4)], s2(R4)<br>void ISA::OPC_STB_20b_29 (Gpr &s1, Gpr &s2)<br>{<br>dmem->byte(Sbr+s1) = s2.byte(0);<br>} | STORE BYTE, SBR, +REG OFFSET |
| STB .(SB) *SBR++[s1(U4)], s2(R4)<br>void ISA::OPC_STB_20b_32 (U4 &s1,Gpr &s2)<br>{<br>dmem->byte(Sbr) = s2.byte(0);<br>Sbr += s1;<br>} | STORE BYTE, SBR, +U4 OFFSET, POST ADJ |
| STB .(SB) *SBR++[s1(R4)], s2(R4)<br>void ISA::OPC_STB_20b_35 (Gpr &s1, Gpr &s2)<br>{<br>dmem->byte(Sbr) = s2.byte(0);<br>Sbr += s1;<br>} | STORE BYTE, SBR, +REG OFFSET, POST ADJ |
| STB .(SB) *+s1(R4), s2(R4)<br>void ISA::OPC_STB_20b_38 (Gpr &s1, Gpr &s2)<br>{<br>dmem->byte(s1) = s2.byte(0);<br>} | STORE BYTE, ZERO OFFSET |
| STB .(SB) *s1(R4)++, s2(R4)<br>void ISA::OPC_STB_20b_41 (Gpr &s1, Gpr &s2)<br>{<br>dmem->byte(s1) = s2.byte(0);<br>++s1;<br>} | STORE BYTE, ZERO OFFSET, POST INC |
| STB .(SB) *+s1[s2(U20)], s3(R4)<br>void ISA::OPC_STB_40b_170 (Gpr &s1, U20 &s2, Gpr &s3)<br>{<br>dmem->byte(s1+s2) = s3.byte(0);<br>} | STORE BYTE, +U20 OFFSET |
| STB .(SB) *s1++[s2(U20)], s3(R4)<br>void ISA::OPC_STB_40b_173 (Gpr &s1, U20 &s2, Gpr &s3)<br>{<br>dmem->byte(s1) = s3.byte(0);<br>s1 += s2;<br>} | STORE BYTE, +U20 OFFSET, POST ADJ |
| STB .(SB) *+SBR[s1(U24)], s2(R4)<br>void ISA::OPC_STB_40b_176 (U24 &s1, Gpr &s2)<br>{<br>dmem->byte(Sbr+s1) = s2.byte(0);<br>} | STORE BYTE, SBR, +U24 OFFSET |
| STB .(SB) *SBR++[s1(U24)], s2(R4)<br>void ISA::OPC_STB_40b_179 (U24 &s1, Gpr &s2)<br>{<br>dmem->byte(Sbr) = s2.byte(0);<br>Sbr += s1;<br>} | STORE BYTE, SBR, +U24 OFFSET, POST ADJ |
| STB .(SB) *s1(U24),s2(R4)<br>void ISA::OPC_STB_40b_182 (U24 &s1, Gpr &s2)<br>{<br>dmem->byte(s1) = s2.byte(0);<br>} | STORE BYTE, U24 IMM ADDRESS |
| STB .(SB) *+SP[s1(U24)], s2(R4)<br>void ISA::OPC_STB_40b_252 (U24 &s1,Gpr &s2)<br>{<br>dmem->byte(Sp+s1) = s2.byte(0);<br>} | STORE BYTE, SP, +U24 OFFSET |
| STH .(SB) *+SBR[s1(U4)], s2(R4)<br>void ISA::OPC_STH_20b_27 (U4 &s1,Gpr &s2)<br>{<br>dmem->half(Sbr+(s1<<1)) = s2.half(0);<br>} | STORE HALF, SBR, +U4 OFFSET |
| STH .(SB) *+SBR[s1(R4)], s2(R4)<br>void ISA::OPC_STH_20b_30 (Gpr &s1, Gpr &s2)<br>{<br>dmem->half(Sbr+(s1<<1)) = s2.half(0);<br>} | STORE HALF, SBR, +REG OFFSET |

TABLE 15-continued

| Syntax/Pseudocode | Description |
|---|---|
| STH .(SB) *SBR++[s1(U4)], s2(R4)<br>void ISA::OPC_STH_20b_33 (U4 &s1,Gpr &s2)<br>{<br>dmem->half(Sbr) = s2.half(0);<br>Sbr += (s1<<1);<br>} | STORE HALF, SBR, +U4 OFFSET, POST ADJ |
| STH .(SB) *SBR++[s1(R4)], s2(R4)<br>void ISA::OPC_STH_20b_36 (Gpr &s1, Gpr &s2)<br>{<br>dmem->half(Sbr) = s2.half(0);<br>Sbr += s1;<br>} | STORE HALF, SBR, +REG OFFSET, POST ADJ |
| STH .(SB) *+s1(R4), s2(R4)<br>void ISA::OPC_STH_20b_39 (Gpr &s1, Gpr &s2)<br>{<br>dmem->half(s1) = s2.half(0);<br>} | STORE HALF, ZERO OFFSET |
| STH .(SB) *s1(R4)++, s2(R4)<br>void ISA::OPC_STH_20b_42 (Gpr &s1, Gpr &s2)<br>{<br>dmem->half(s1) = s2.half(0);<br>s1 += 2;<br>} | STORE HALF, ZERO OFFSET, POST INC |
| STH .(SB) *+s1[s2(U20)], s3(R4)<br>void ISA::OPC_STH_40b_171 (Gpr &s1, U20 &s2, Gpr &s3)<br>{<br>dmem->half(s1+(s2<<1)) = s3.half(0);<br>} | STORE HALF, +U20 OFFSET |
| STH .(SB) *s1++[s2(U20)], s3(R4)<br>void ISA::OPC_STH_40b_174 (Gpr &s1, U20 &s2, Gpr &s3)<br>{<br>dmem->half(s1) = s3.half(0);<br>s1 += s2<<1;<br>} | STORE HALF, +U20 OFFSET, POST ADJ |
| STH .(SB) *+SBR[s1(U24)], s2(R4)<br>void ISA::OPC_STH_40b_177 (U24 &s1, Gpr &s2)<br>{<br>dmem->half(Sbr+(s1<<1)) = s2.half(0);<br>} | STORE HALF, SBR, +U24 OFFSET |
| STH .(SB) *SBR++[s1(U24)], s2(R4)<br>void ISA::OPC_STH_40b_180 (U24 &s1, Gpr &s2)<br>{<br>dmem->half(Sbr) = s2.half(0);<br>Sbr += 2;<br>} | STORE HALF, SBR, +U24 OFFSET, POST ADJ |
| STH .(SB) *s1(U24),s2(R4)<br>void ISA::OPC_STH_40b_183 (U24 &s1, Gpr &s2)<br>{<br>dmem->half(s1<<1) = s2.half(0);<br>} | STORE HALF, U24 IMM ADDRESS |
| STH .(SB) *+SP[s1(U24)], s2(R4)<br>void ISA::OPC_STH_40b_253 (U24 &s1, Gpr &s2)<br>{<br>dmem->half(Sp+(s1<<1)) = s2.half(0);<br>} | STORE HALF, SP, +U24 OFFSET |
| STRF .SB s1(R4), s2(R4)<br>void ISA::OPC_STRF_20b_81 (Gpr &s1, Gpr &s2)<br>{<br>if(s1 >= s2)<br>{<br>for(int r=s2.address( );r<s1.address( );++r)<br>{<br>dmem->write(Sp,r);<br>Sp −= 4;<br>}<br>}<br>} | STORE REGISTER FILE RANGE |
| STSYS .(SB) s1(R4), s2(R4)<br>void ISA::OPC_STSYS_20b_163 (Gpr &s1, Gpr &s2)<br>{<br>gls_is_load._assert(0);<br>gls_attr_valid._assert(1);<br>gls_is_stsys._assert(1);<br>gls_regf_addr._assert(s2.address( )); //reg addr of s2<br>gls_sys_addr._assert(s1); //contents of s1<br>} | STORE SYSTEM ATTRIBUTE (GLS) |

TABLE 15-continued

| Syntax/Pseudocode | Description |
|---|---|
| STW .(SB) *+SBR[s1(U4)], s2(R4)<br>void ISA::OPC_STW_20b_28 (U4 &s1,Gpr &s2)<br>{<br>dmem->word(Sbr+(s1<<2)) = s2.word( );<br>} | STORE WORD, SBR, +U4 OFFSET |
| STW .(SB) *+SBR[s1(R4)], s2(R4)<br>void ISA::OPC_STW_20b_31 (Gpr &s1, Gpr &s2)<br>{<br>dmem->word(Sbr+(s1<<2)) = s2.word( );<br>} | STORE WORD, SBR, +REG OFFSET |
| STW .(SB) *SBR++[s1(U4)], s2(R4)<br>void ISA::OPC_STW_20b_34 (U4 &s1,Gpr &s2)<br>{<br>dmem->word(Sbr) = s2.word( );<br>Sbr += (s1<<2);<br>} | STORE WORD, SBR, +U4 OFFSET, POST ADJ |
| STW .(SB) *SBR++[s1(R4)], s2(R4)<br>void ISA::OPC_STW_20b_37 (Gpr &s1, Gpr &s2)<br>{<br>dmem->word(Sbr) = s2.word( );<br>Sbr += s1;<br>} | STORE WORD, SBR, +REG OFFSET, POST ADJ |
| STW .(SB) *+s1(R4), s2(R4)<br>void ISA::OPC_STW_20b_40 (Gpr &s1, Gpr &s2)<br>{<br>dmem->word(s1) = s2.word( );<br>} | STORE WORD, ZERO OFFSET |
| STW .(SB) *s1(R4)++, s2(R4)<br>void ISA::OPC_STW_20b_43 (Gpr &s1, Gpr &s2)<br>{<br>dmem->word(s1) = s2.word( );<br>s1 += 4;<br>} | STORE WORD, ZERO OFFSET, POST INC |
| STW .(SB) *+s1[s2(U20)], s3(R4)<br>void ISA::OPC_STW_40b_172 (Gpr &s1, U20 &s2, Gpr &s3)<br>{<br>dmem->word(s1+(s2<<2)) = s3.word( );<br>} | STORE WORD, +U20 OFFSET |
| STW .(SB) *s1++[s2(U20)], s3(R4)<br>void ISA::OPC_STW_40b_175 (Gpr &s1, U20 &s2, Gpr &s3)<br>{<br>dmem->word(s1) = s3.word( );<br>s1 += s2<<2;<br>} | STORE WORD, +U20 OFFSET, POST ADJ |
| STW .(SB) *+SBR[s1(U24)], s2(R4)<br>void ISA::OPC_STW_40b_178 (U24 &s1, Gpr &s2)<br>{<br>dmem->word(Sbr+(s1<<2)) = s2.word( );<br>} | STORE WORD, SBR, +U24 OFFSET |
| STW .(SB) *SBR++[s1(U24)], s2(R4)<br>void ISA::OPC_STW_40b_181 (U24 &s1, Gpr &s2)<br>{<br>dmem->word(Sbr) = s2.word( );<br>Sbr += s1<<2;<br>} | STORE WORD, SBR, +U24 OFFSET, POST ADJ |
| STW .(SB) *s1(U24),s2(R4)<br>void ISA::OPC_STW_40b_184 (U24 &s1, Gpr &s2)<br>{<br>dmem->word(s1<<2) = s2.word( );<br>} | STORE WORD, U24 IMM ADDRESS |
| STW .(SB) *+SP[s1(U24)], s2(R4)<br>void ISA::OPC_STW_40b_254 (U24 &s1,Gpr &s2)<br>{<br>dmem->word(Sp+(s1<<2)) = s2.word( );<br>} | STORE WORD, SP, +U24 OFFSET |
| SUB .(SA,SB) s1(R4), s2(R4)<br>void ISA::OPC_SUB_20b_113 (Gpr &s1, Gpr &s2,Unit &unit)<br>{<br>Result r1;<br>r1 = s2 − s1;<br>s2 = r1;<br>Csr.bit( C,unit) = r1.underflow( );<br>Csr.bit(EQ,unit) = s2.zero( );<br>} | SUBTRACT |
| SUB .(SA,SB) s1(U4), s2(R4)<br>void ISA::OPC_SUB_20b_114 (U4 &s1, Gpr &s2,Unit &unit)<br>{ | SUBTRACT, U4 IMM |

TABLE 15-continued

| Syntax/Pseudocode | Description |
|---|---|
| Result r1;<br>r1 = s2 − s1;<br>s2 = r1;<br>Csr.bit( C,unit) = r1.underflow( );<br>Csr.bit(EQ,unit) = s2.zero( );<br>} | |
| SUB .(SB) s1(U28),SP(R5)<br>void ISA::OPC_SUB_40b_231 (U28 &s1)<br>{<br>Sp −= s1;<br>} | SUBTRACT, SP, U28 IMM |
| SUB .(SB) s1(U24), SP(R5), s3(R4)<br>void ISA::OPC_SUB_40b_232 (U24 &s1, Gpr &s3)<br>{<br>s3 = Sp−s1;<br>} | SUBTRACT, SP, U24 IMM, REG DEST |
| SUB .(SB) s1(U24),s2(R4)<br>void ISA::OPC_SUB_40b_233 (U24 &s1,Gpr &s2,Unit &unit)<br>{<br>Result r1;<br>r1 = s2 − s1;<br>s2 = r1;<br>Csr.bit(EQ,unit) = s2.zero( );<br>Csr.bit( C,unit) = r1.carryout( );<br>} | SUBTRACT, U24 IMM |
| SUB2 .(SA,SB) s1(R4), s2(R4)<br>void ISA::OPC_SUB2_20b_367 (Gpr &s1, Gpr &s2)<br>{<br>s2.range(0,15) =<br>(s2.range(0,15) − s1.range(0,15)) >> 1;<br>s2.range(16,31) =<br>(s2.range(16,31) − s1.range(16,31)) >> 1;<br>} | HALF WORD SUBTRACTION WITH DIVIDE BY 2 |
| SUB2 .(SA,SB) s1(U4), s2(R4)<br>void ISA::OPC_SUB2_20b_368 (U4 &s1, Gpr &s2)<br>{<br>s2.range(0,15) = (s2.range(0,15) − s1.value( )) >> 1;<br>s2.range(16,31) = (s2.range(16,31) − s1.value( )) >> 1;<br>} | HALF WORD SUBTRACTION WITH DIVIDE BY 2 |
| SWAP .(SA,SB) s1(R4), s2(R4)<br>void ISA::OPC_SWAP_20b_146 (Gpr &s1, Gpr &s2)<br>{<br>Result tmp;<br>tmp = s1;<br>s1 = s2;<br>s2 = tmp;<br>} | SWAP REGISTERS |
| SWAPBR .(SA,SB)<br>void ISA::OPC_SWAPBR_20b_11 (void)<br>{<br>Result tmp;<br>tmp = Lbr;<br>Lbr = Sbr;<br>Sbr = tmp;<br>} | SWAP LBR and SBR |
| SWIZ .(SA,SB) s1(R4), s2(R4)<br>void ISA::OPC_SWIZ_20b_44 (Gpr &s1, Gpr &s2)<br>{<br>//This should be defined as a p-op, it overlaps<br>//one form of REORD<br>s2.range(0,7) = s1.range(24,31);<br>s2.range(8,15) = s1.range(16,23);<br>s2.range(16,23) = s1.range(8,15);<br>s2.range(24,31) = s1.range(0,7);<br>} | SWIZZLE, ENDIAN CONVERSION |
| TASKSW .(SA,SB)<br>void ISA::OPC_TASKSW_20b_19 (void)<br>{<br>risc_is_task_sw._assert(1);<br>} | TASK SWITCH |
| TASKSWTOE .(SA,SB) s1(U2)<br>void ISA::OPC_TASKSWTOE_20b_126 (U2 &s1)<br>{<br>risc_is_taskswtoe._assert(1);<br>risc_is_taskswtoe_opr._assert(s1);<br>} | TASK SWITCH TEST OUTPUT ENABLE |

TABLE 15-continued

| Syntax/Pseudocode | Description |
|---|---|
| VIDX .SB s1(R4), s2(S8), s3(R4) | VERTICAL INDEX CALCULATION |
| VINPUT (SB) *+s1(R4)[s2(R4)], s3(R4), s4(R4) | VINPUT, 4 |
| void ISA::OPC_VINPUT_40b_244 (Gpr &s1, Gpr &s2, Gpr &s3) | OPERAND, |
| { | REGISTER FORM |
| gls_is_vinput._assert(1); | |
| Result r1 = s1+s2; | |
| gls_sys_addr._assert(r1.value( )); | |
| gls_vreg._assert(s3.address( )); | |
| } | |
| VINPUT .SB *+s1(R4)[s2(U16)], s3(R4), s4(R4) | VINPUT, 4 |
| void ISA::OPC_VINPUT_40b_245 (Gpr &s1, U16 &s2, Gpr &s3, Vreg &s4) | OPERAND, IMMEDIATE |
| { | FORM |
| //S1 is base address | |
| //S2 is address offset | |
| //S3 is vertical index parameter | |
| //S4 is virtual register | |
| Result r1 = _unsigned(s1)+_unsigned(s2); | |
| risc_is_vinput._assert(1); //instruction flag | |
| gls_sys_addr._assert(r1.value( )); //calculated address | |
| risc_vip_size._assert(s3.range(0,7)); //size field from VIP | |
| risc_vip_valid._assert(1); //size field valid | |
| gls_vreg._assert(s3.address( )); //virtual register address | |
| } | |
| VOUTPUT .SB *+s1(R4)[s2(S10)], s3(R4), s4(U6), s5(R4) | VOUTPUT, 5 |
| void ISA::OPC_VOUTPUT_40b_235 (Gpr &s1,S10 &s2,Gpr &s3,U6 & s4,Vreg &s5) | operand |
| { | |
| //s1 is the 'base' address | |
| //s2 is the 'offset' address | |
| //s3 is the vertical index parameter register | |
| int buffer_size = s3.range(8,15); | |
| int store_disable = s3.bit(27); | |
| int pointer = s3.range(16,23); | |
| //hg_size aka Block_Width | |
| int hg_size = s3.range( 0, 7); | |
| int imm_cnst = sign_extend(s2.value( )); | |
| int addr = pointer + imm_cnst; | |
| if(addr >= buffer_size) addr −= buffer size; | |
| else if(addr < 0) addr += buffer_size; | |
| bool has_mul_shft = s4.bit(4); //MSB of the data_type from U6 operand | |
| if(has_mul_shft) addr = (addr*hg_size)<<5; | |
| addr = addr + s1.value( ); | |
| risc_is_voutput._assert(1); //instruction flag | |
| risc_output_vra._assert(s5.address( )); //virtual register address | |
| risc_output_wa._assert(addr); //calculated cir address | |
| risc_output_pa._assert(s4); //'pixel' address | |
| risc_vip_size._assert(s3.range(0,7)); //size field from VIP | |
| risc_vip_valid._assert(1); //size field valid | |
| risc_store_disable._assert(store_disable); //store disable | |
| bool sfm_block = (s3.range(28,29) == SFM_BLK); | |
| bool buf_eq_pntr = (s3.range(16,23) == (s3.range(8,15)−1)); | |
| if(buf_eq_pntr && !sfm_block) risc_fill._assert(1); | |
| else risc_fill._assert(0); | |
| } | |
| VOUTPUT .(SB) *+s1[s2(S14)], s3(U6), s4(R4) | VOUTPUT, 4 |
| void ISA::OPC_VOUTPUT_40b_236 (Gpr &s1,S14 &s2,U6 &s3,Vreg4 &s4) | operand |
| { | |
| Result r1; | |
| r1 = s1 + s2; | |
| risc_is_voutput._assert(1); | |
| risc_output_wd._assert(s4); | |
| risc_output_wa._assert(r1); | |
| risc_output_pa._assert(s3); | |
| risc_output_sd._assert(s1.bit(12)); | |
| } | |
| VOUTPUT .(SB) *s1(U18), s2(U6), s3(R4) | VOUTPUT, 3 |
| void ISA::OPC_VOUTPUT_40b_237 (S18 &s1,U6 &s2,Vreg4 &s3) | operand |
| { | |
| risc_is_voutput._assert(1); | |
| risc_output_wd._assert(s3); | |
| risc_output_wa._assert(s1); | |
| risc_output_pa._assert(s2); | |
| risc_output_sd._assert(0); | |
| } | |

TABLE 15-continued

| Syntax/Pseudocode | Description |
|---|---|
| XOR .(SA,SB) s1(R4), s2(R4)<br>void ISA::OPC_XOR_20b_104 (Gpr &s1, Gpr &s2,Unit &unit)<br>{<br>s2 ^= s1;<br>Csr.bit(EQ,unit) = s2.zero( );<br>} | BITWISE EXCLUSIVE OR |
| XOR .(SA,SB) s1(U4), s2(R4)<br>void ISA::OPC_XOR_20b_105 (U4 &s1, Gpr &s2,Unit &unit)<br>{<br>s2 ^= s1;<br>Csr.bit(EQ,unit) = s2.zero( );<br>} | BITWISE EXCLUSIVE OR, U4 IMM |
| XOR .(SB) s1(S3), s2(U20), s3(R4)<br>void ISA::OPC_XOR_40b_215 (U3 &s1, U20 &s2, Gpr &s3,Unit &unit)<br>{<br>s3 ^= (s2 << (s1*8));<br>Csr.bit(EQ,unit) = s3.zero( );<br>} | BITWISE EXCLUSIVE OR, U20 IMM, BYTE ALIGNED |

8. RISC Processor Core with a Vector Processing Module Example 8.1. Overview

A RISC processor with a vector processing module is generally used with shared function-memory 1410. This RISC processor is largely the same as the RISC processor used for processor 5200 but it includes a vector processing module to extend the computation and load/store bandwidth. This module can contain 16 vector units that are each capable of executing a 4-operation execute packet per cycle. A typical execute packet generally includes a data load from the vector memory array, two register-to-register operations, and a result store to the vector memory array. This type of RISC processor generally uses an instruction word that is 80 bits wide or 120 bits wide, which generally constitutes a "fetch packet" and which may include unaligned instructions. A fetch packet can contain a mixture of 40 bit and 20 bit instructions, which can include vector unit instructions and scalar instructions similar to those used by processor 5200. Typically, vector unit instructions can be 20 bits wide, while other instructions can be 20 bits or 40 bits wide (similar to processor 5200). Vector instructions can also be presented on all lanes of the instruction fetch bus, but, if the fetch packet contains both scalar and vector unit instructions the vector instructions are presented (for example) on instruction fetch bus bits [39:0] and the scalar instruction(s) are presented (for example) on instruction fetch bus bits [79:40]. Additionally, unused instruction fetch bus lanes are padded with NOPs.

An "execute packet" can then be formed from one or more fetch packets. Partial execute packets are held in the instruction queue until completed. Typically, complete execute packets are submitted to the execute stage (i.e., 5310). Four vector unit instructions (for example), two scalar instructions (for example), or a combination of 20-bit and 40-bit instructions (for example) may execute in a single cycle. Back-to-back 20-bit instructions may also be executed serially. If bit 19 of the current 20 bit instruction is set, this indicates that the current instruction, and the subsequent 20-bit instruction form an execute packet. Bit 19 can be generally referred to as the P-bit or parallel bit. If the P-bit is not set this indicates the end of an execute packet. Back-to-back 20 bit instructions with the P-bit not set cause serial execution of the 20 bit instructions. It should also be noted that this RISC processor (with a vector processing module) may include any of the following constraints:

(1) It is illegal for the P-bit to be set to 1 in a 40 bit instruction (for example);

(2) Load or store instructions should appear on the B-side of the instruction fetch bus (i.e., bits 79:40 for 40 bit loads and stores or on bits 79:60 of the fetch bus for 20 bit loads or stores);

(3) A single scalar load or store is legal;

(4) For the vector units both a single load and a single store can exist in a fetch packet;

(5) It is illegal for a 40 bit instruction to be preceded by a 20 bit instruction with a P-bit equal to 1; and (6) No hardware is in place to detect these illegal conditions. These restrictions are expected to be enforced by the system programming tool 718.

Figure 121:
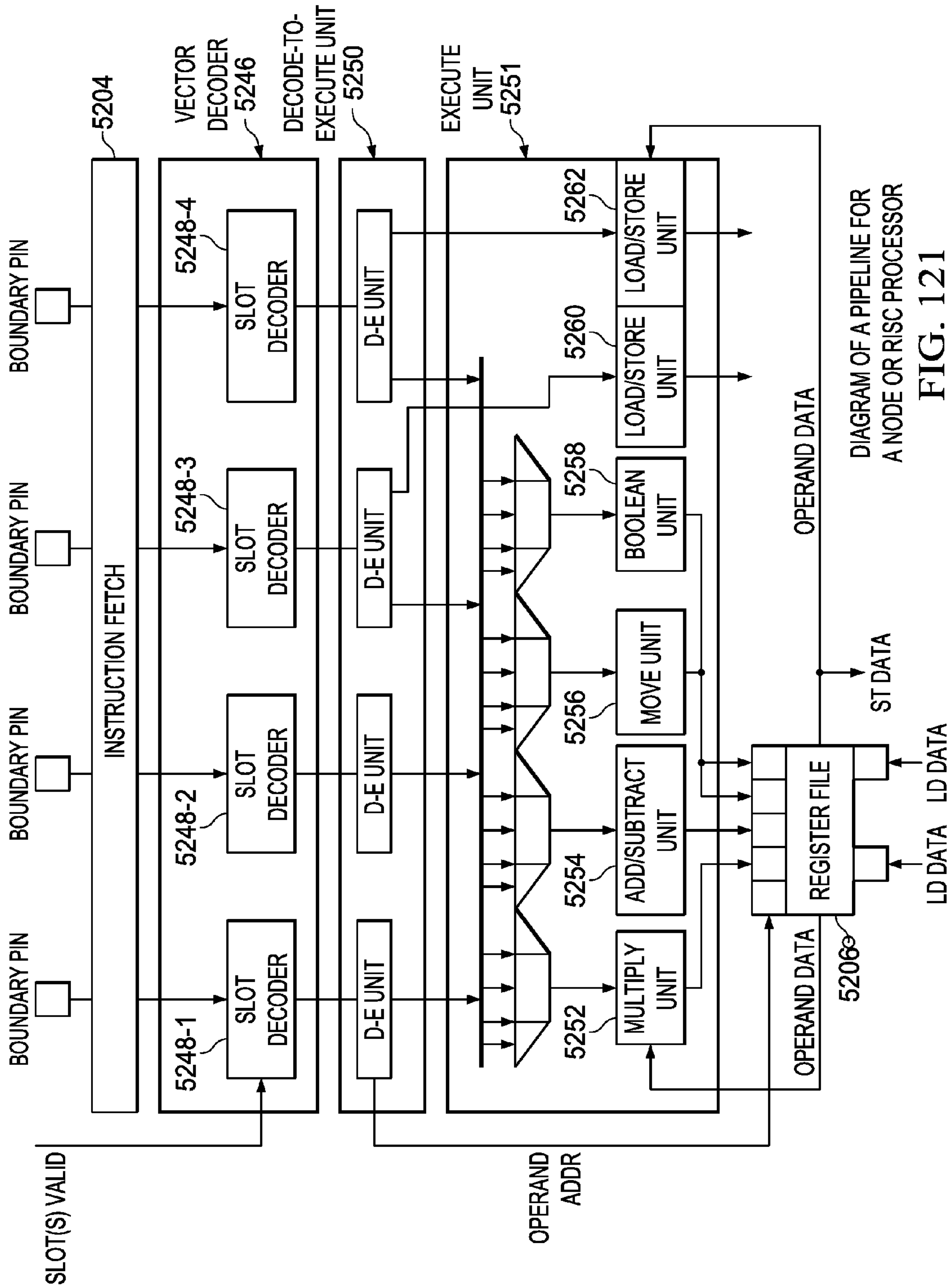

Turning to FIG. 121, an example of a vector module can be seen. The vector module includes a vector decoder 5246, decode-to-execution unit 5250, and an execution unit 5251. The vector decoder includes slot decoders 5248-1 to 5248-4 that receive instructions from the instruction fetch 5204. Typically, slot decoders 5248-1 and 5248-2 operate in a similar manner to one another, while slot decoders 5248-3 and 5248-4 include load/store decoding circuitry. The decode-to-execution unit 5250 can then generate instructions for the execution unit 5251 based on the decoded output of vector decoder 5246. Each of the slot decoders can generate instruction that can be used by the multiply unit 5252, add/subtract unit 5254, move unit 5256, and Boolean unit 5258 (that each use data and addresses in the general purpose register 5206). Additionally slot decoders 5248-3 and 5248-4 can generate load and store instructions for load/store units 5260 and 5262.

This RISC processor (which includes processor 5200 and a vector module) can also be accessed through boundary pins; an example of each is described in Table 16 (with "z" denoting active low pins).

TABLE 16

| Pin Name | Width | Dir | Purpose |
|---|---|---|---|
| | | | Context Interface |
| cmem_wdata | 609 | Output | Context memory write data |
| cmem_wdata_valid | 1 | Output | Context memory read data |
| cmem_rdy | 1 | Input | Context memory ready |
| | | | Data Memory Interface |
| dmem_enz | 1 | Output | Data memory select |
| dmem_wrz | 1 | Output | Data memory write enable |
| dmem_bez | 4 | Output | Data memory write byte enables |
| dmem_addr | 16 | Output | Data memory address |
| dmem_addr_no_base | 32 | Output | Data memory address, prior to context base address adj. |
| dmem_wdata | 32 | Output | Data memory write data |
| dmem_rdy | 1 | Input | Data memory ready |
| dmem_rdata | 32 | Input | Data memory read data |
| | | | Instruction Memory Interface |
| imem_enz | 1 | Output | Instruction memory select |
| imem_addr | 16 | Output | Instruction memory address |
| imem_rdy | 1 | Input | Instruction memory ready |
| imem_rdata | 40 | Input | Instruction memory read data |
| | | | Program Control Interface |
| force_pcz | 1 | Input | Program counter write enable |
| new_pc | 17 | Input | Program counter write data |
| | | | Context Control Interface |
| force_ctxz | 1 | Input | Force context write enable which: writes the value on new_ctx to the internal machine state; and schedules a context save. |
| write_ctxz | 1 | Input | Write context enable which writes the value on new_ctx to the internal machine state. |
| save_ctxz | 1 | Input | Save context enable which schedules a context save. |
| new_ctx | 592 | Input | Context change write data |
| | | | Context Base Address |
| ctx_base | 11 | Input | Context change write address |
| | | | Flag and Strapping Pins |
| risc_is_idle | 1 | Output | Asserted in decode stage 5308 when an IDLE instruction is decoded. |
| risc_is_end | 1 | Output | Asserted in decode stage 5308 when an END instruction is decoded. |
| risc_is_output | 1 | Output | Decode flag asserted in decode stage 5308 on decode of an OUTPUT instruction |
| risc_is_voutput | 1 | Output | Decode flag asserted in decode stage 5308 on decode of a VOUTPUT instruction |
| risc_is_vinput | 1 | Output | Decode flag asserted in decode stage 5308 on decode of a VINPUT instruction |
| risc_is_mtv | 1 | Output | Asserted in decode stage 5308 when an MTV instruction is decoded. (move to vector or SIMD register from processor 5200, with replicate) |
| risc_is_mtvvr | 1 | Output | Asserted in decode stage 5308 when an MTVVR instruction is decoded. (move to vector or SIMD register from processor 5200) |
| risc_is_mfvvr | 1 | Output | Asserted in decode stage 5308 when an MFVVR instruction is decoded (move from vector or SIMD register to processor 5200) |
| risc_is_mfvrc | 1 | Output | Asserted in decode stage 5308 when an MFVRC instruction is decoded. (move to vector or SIMD register from processor 5200, with collapse) |
| risc_is_mtvre | 1 | Output | Asserted in decode stage 5308 when an MTVRE instruction is decoded. (move to vector or SIMD register from processor 5200, with expand) |
| risc_is_release | 1 | Output | Asserted in decode stage 5308 when a RELINP (Release Input) instruction is decoded. |
| risc_is_task_sw | 1 | Output | Asserted in decode stage 5308 when a TASKSW (Task Switch) instruction is decoded. |
| risc_is_taskswtoe | 1 | Output | Asserted in decode stage 5308 when a TASKSWTOE instruction is decoded. |
| risc_taskswtoe_opr | 2 | Output | Asserted in execution stage 5310 when a TASKSWTOE instruction is decoded. This bus contains the value of the U2 immediate operand. |

TABLE 16-continued

| Pin Name | Width | Dir | Purpose |
|---|---|---|---|
| risc_mode | 2 | Input | Statically strapped input pins to define reset behavior.<br>Value / Behaviour<br>00 Exiting reset causes processor 5200 to fetch instruction memory address zero and load this into the program counter 5218<br>01 Exiting reset causes processor 5200 to remain idle until the assertion of force pcz<br>10/11 Reserved |
| risc_estate0 | 1 | Input | External state bit 0. This pin is directly mapped to bit 11 of the Control Status Register (described below) |
| wrp_terminate | 1 | Input | Termination message status flag sourced by external logic (typically the wrapper)<br>This pin readable via the CSR. |
| wrp_dst_output_en | 8 | Input | Asserted by the SFM wrapper to control OUTPUT instructions based on wrapper enabled dependency checking |
| risc_out_depchk_failed | 1 | Output | Flag asserted in D0 on failure of dependency checking during decode of an OUTPUT instruction.<br>See section Error! Reference source not found. for a description. |
| risc_vout_depchk_failed | 1 | Output | Flag asserted in D0 on failure of dependency checking during decode of a VOUTPUT instruction.<br>See section Error! Reference source not found. for a description. |
| risc_inp_depchk_failed | 1 | Output | Flag asserted in D0 on failure of dependency checking during decode of a VINPUT instruction. |
| risc_fill | 1 | Output | Asserted in E1.<br>This is valid for the circular form of VOUTPUT (which is the 5 operand form of VOUTPUT). |
| risc_branch_valid | 1 | Output | Flag asserted in E0 when processing a branch instruction.<br>At present this flag does not assert for CALL and RET. This may change based on feedback from SDO. |
| risc_branch_taken | 1 | Output | Flag asserted in E0 when a branch is taken.<br>At present this flag does not assert for CALL and RET. This may change based on feedback from SDO. |
| OUTPUT Instruction Interface | | | |
| risc_output_wd | 32 | Output | Contents of the data register for an OUTPUT or VOUTPUT instruction. This is driven in execution stage 5310. |
| risc_output_wa | 16 | Output | Contents of the address register for an OUTPUT or VOUTPUT instruction.<br>This is driven in execution stage 5310. |
| risc_output_disable | 1 | Output | Value of the SD (Store disable) bit of the circular addressing control register used in an OUTPUT or VOUTPUT instruction. See Section [00704] for a description of the circular addressing control register format.<br>This is driven in execution stage 5310. |
| risc_output_pa | 6 | Output | Value of the pixel address immediate constant of an OUTPUT instruction.<br>This is driven in execution stage 5310.<br>(U6, below, is the 6 bit unsigned immediate value of an OUTPUT instruction)<br>6'b000000<br>word store<br>6'b001100<br>Store lower half word of U6 to lower center lane<br>6'b001110<br>Store lower half word of U6 to upper center lane<br>6'b000011<br>Store upper half word of U6 to upper center lane<br>6'b000111<br>Store upper half word of U6 to lower center lane |

TABLE 16-continued

| Pin Name | Width | Dir | Purpose |
|---|---|---|---|
| | | | All other values are illegal and result in unspecified behavior |
| risc_output_vra | 4 | Output | The vector register address of the VOUTPUT instruction |
| risc_vip_size | 8 | Output | This is the driven by the lower 8 bits (Block_Width/HG_SIZE) of Vertical Index Parameter register. The VIP is specified as an operand for some instructions. See Section [00704] for a description of the VIP. This is driven in execution stage 5310. |
| General Purpose Register to Vector/SIMD Register Transfer Interface | | | |
| risc_vec_ua | 5 | Output | Vector (or SIMD) unit (aka 'lane') address for MTVVR and MFVVR instructions This is driven in execution stage 5310. |
| risc_vec_wa | 5 | Output | For MTV, MTVRE and MTVVR instructions: Vector (or SIMD) register file write address. For MFVVR and MFVRC instructions: Contains the address of the T20 GPR which is to receive the requested vector data. This is driven in execution stage 5310. |
| risc_vec_wd | 32 | Output | Vector (or SIMD) register file write data. This is driven in execution stage 5310. |
| risc_vec_hwz | 2 | Output | Vector (or SIMD) register file write half word select<br>00 = write both<br>10 = write lower<br>01 = write upper<br>11 = read<br>Gated with vec_regf_enz assertion.<br>This is driven in execution stage 5310. |
| risc_vec_ra | 5 | Output | Vector (or SIMD) register file read address. This is driven in execution stage 5310. |
| vec_risc_wrz | 1 | Input | Register file write enable. Driven by Vector (or SIMD) when it is returning write data as a result of a MFVVR or MFVRC instruction. |
| vec_risc_wd | 32 | Output | Vector (or SIMD) register file write data. This is driven in execution stage 5310. |
| vec_risc_wa | 4 | Input | The General purpose register file 5206 address that is the destination for vector data returning as a result of a MFVVR or MFVRC instruction. |
| vec_risc_wa | 4 | Input | The GPR address that is the destination for vector data returning as a result of a MFVVR or MFVRC instruction. |
| Shared Function-Memory Interface (which can be used for processor with Shared Function-Memory 1410) | | | |
| vmem_rdy | 1 | Input | Vector memory ready. Usually present, strapped high when not in use. |
| risc_vec_valid | 1 | Output | Indicates that the SFM instruction lanes are valid. This normally asserted but is de-asserted when the processor 5200 is executing the second half of a non-parallel 20-bit instruction pair. |
| risc_fmem_addr | 20 | Output | Vector implied load/store address bus |
| risc_fmem_bez | 4 | Output | Vector implied load/store byte enables |
| risc_vec_opr | 4 | Output | This bus represents the vector unit source register for vector implied stores, or the vector unit destination register for vector implied loads. |
| risc_is_vild | 1 | Output | Vector implied signed load flag. |
| risc_is vildu | 1 | Output | Vector implied unsigned load flag. |
| risc_is_vist | 1 | Output | Vector implied store flag |
| risc_hg_posn | 8 | Output | Reflects the current contents of the processor 5200 HG_POSN control register |
| risc_regf_ra[1:0] | 4b × 2 | Input | Register file read address ports. There are two ports. These pins are driven by lane 0 (left most) vector unit. Allows the vector unit to read one of the lower 4 registers in the GPR file. |
| risc_regf_rd[1:0]z | 1b × 2 | Input | When de-asserted gates off switching on the risc_regf_rdata0/1 buses. Should be driven low to read valid data on risc_regf_rdata. |
| risc_regf_rdata[1:0] | 32b × 2 | Output | Register file read data ports. There are two ports. These pins are driven by lane 0 (left most) vector unit. These are the read data buses associated with risc_regf_ra. |
| risc_inc_hg_posn | 1 | Output | Asserted in D0 when a BHGNE instruction is decoded. |

TABLE 16-continued

| Pin Name | Width | Dir | Purpose |
|---|---|---|---|
| wrp_hgposn_ne_hgsize | 1 | Input | Asserted by the SFM wrapper. Indicates whether the wrappers copy of HG_POSN and HG_SIZE are not equal. |
| | | Interrupt Interface | |
| nmi | 1 | Input | Level triggered non-mask-able interrupt |
| int0 | 1 | Input | Level triggered mask-able interrupt |
| int1 | 1 | Input | Level triggered externally managed interrupt |
| iack | 1 | Output | Interrupt acknowledge |
| inum | 3 | Output | Acknowledged interrupt identifier |
| | | Debug Interface | |
| dbg_rd | 32 | Output | Debug register read data |
| risc_brk_trc_match | 1 | Output | Asserted when the processor 5200 debug module detects either a break-point or trace-point match |
| risc_trc_pt_match | 1 | Output | Asserted when the processor 5200 debug module detects a trace-point match |
| risc_trc_pt_match_id | 2 | Output | The ID of the break/trace point register which detected a match. |
| dbg_req | 1 | Input | Debug module access request |
| dbg_addr | 5 | Input | Debug module register address |
| dbg_wrz | 1 | Input | Debug module register write enable. |
| dbg_mode_enable | 1 | Input | Debug module master enable |
| wp_events | 16 | Input | User defined event input bus |
| wp_cur_cntx | 4 | Input | Wrapper driven current context number |
| wp_event | 15:0 | Input | User defined event input bus |
| | | Clocking and Reset | |
| ck0 | 1 | Input | Primary clock to the CPU core |
| ck1 | 1 | Input | Primary clock to the debug module |

Within the vector units up to (for example) four instructions can execute simultaneously. This set of four instructions includes at most one load and one store and up to other instructions. Alternatively, up to four non-load and non-store instructions (for example) can be executed. All vector units can execute the same execute packet (the same set of up to four vector instructions, for example), but do so using their local register files.

8.3. General Purpose Register File

The general purpose register file is similar to register file 5206 described above.

8.4. Control Register File

The control register file here is similar to the control register file 5216 described above; however, the control register file here includes several more registers. In Table 17 below, the registers that can be included in this control register file are described, and the additional registers are described in the following sections.

TABLE 17

| Mnemonic | Register Name | Description | Width | Address |
|---|---|---|---|---|
| CSR | Control status register | Contains global interrupt enable bit, and additional control/status bits | 12 | 0x00 |
| IER | Interrupt enable register | Allows manual enable/disable of individual interrupts | 4 | 0x01 |
| IRP | Interrupt return pointer | Interrupt return address. | 16 | 0x02 |
| LBR | Load base register | Contains the global data address pointer, used for some load instructions | 16 | 0x03 |

TABLE 17-continued

| Mnemonic | Register Name | Description | Width | Address |
|---|---|---|---|---|
| SBR | Store base register | Contains the global data address pointer, used for some store instructions | 16 | 0x04 |
| SP | Stack Pointer | Contains the next available address in the stack memory region. This is a byte address. | 16 | 0x05 |
| HG_SIZE | Horizontal Size register | The value of this register is available on the risc_hg_size[7:0] boundary pins. This register adds 8 bits to the context save/write infomation. This register is accessible via the processor 5200 debug interface. | 8 | 0x07 |
| HG_POSN | Horizontal Position register | The value of this register is available on the risc_hg_posn[7:0] boundary pins. This register adds 8 bits to the context save/write information. Note: reads/writes to this register are through the conventional | 8 | 0x08 |

TABLE 17-continued

| Mnemonic | Register Name | Description | Width | Address |
|---|---|---|---|---|
| | | MVC instruction. HG_POSN has a special condition, if the value being written to HG_POSN is larger than the current value of HG_SIZE then HG_POSN is written with 0. This register is accessible via the processor 5200 debug interface. | | |

8.5. Horizontal Size Register (HG_SIZE)

The HG_SIZE register can be written by external logic using the debug interface. HG_SIZE can be used as an implied operand in some instructions.

8.6. Horizontal Position Register (HG_POSN)

The HG_POSN register can be written by external logic using the debug interface. HG_POSN can be used as an implied operand in some instructions. It should also be noted that HG_POSN has a special property, if the value to be written to HG_POSN is larger than the current value of the HG_SIZE register then HG_POSN is written with zero.

8.7. Interrupt Behavior

In conjunction with the interrupt behavior described with respect to node processor 4322 above, this RISC processor also includes a GIE bit or global interrupt enable bit. If GIE bit is cleared assertions on pins nmi, int0 and int1 are ignored. In addition, pins int0 and int1 each have an associated enable bit in the interrupt enable register, which individually masks the associated input. The "reset interrupt" (input pin rstz0) software interrupts (SWI instruction) and UNDEF interrupts (detection of an undefined instruction) are usually enabled. Theses interrupts are generally not effected by the GIE bit and do not have entries in the interrupt enable register.

Reset is generally considered the highest priority interrupt and can be used to halt the processing unit (i.e., 5202) and return it to a known state. Some of the characteristics of reset interrupt can be:

- rstz0 is an active-low signal, while other interrupts are active-high signals, or activated via the instruction decoder;
- rstz0 should be held low for 8 clock cycles before it goes high again to reinitialize properly; and
- rstz0 is generally not affected by branches or pending loads.

Reset uses interrupt semantics, i.e. loading of the IST tableentry, etc, however it is not required to issue a BIRP instruction to exit reset processing.

Here, two maskable interrupts (i.e., int0) and int1) can be supported. Assuming that a maskable interrupt does not occur during the delay slot of a branch, the following conditions should be met to process a maskable interrupt:

- Pending loads or stores have completed;
- The global interrupt enable bit (GIE) bit in the control status register (CSR) is set to 1;
- The corresponding interrupt enable (IE) bit in the interrupt enable register is set to 1; and
- No same or higher priority interrupts have been taken.

For maskable interrupts the IRP register is loaded with the return address of the next instruction to execute after the maskable interrupt service routine terminates. To exit a maskable interrupt service routine the BIRP instruction is used. (Note BIRP has a 2 cycle delay slot which is also executed before returning control.) Execution of BIRP causes T80 to copy the contents of the IRP register to the PC. For int0 and int1, assuming the GIE bit is set, and the associated interrupt enable register bit is also set, the following actions can be performed:

- The currently executing instruction is allowed to complete;
  - Completion includes any instruction in the delay slots of a branch, CALL, etc.;
  - Loads/stores are permitted to complete before processing of the interrupt occurs;
- The control status register is copied to the shadow control status register;
- The GIE bit is cleared;
- The PC value of the next instruction to execute (after completion of the interrupt service routine) is stored to the interrupt return pointer register. This is the return address.
- The associated bit for the interrupt is set;
- The ISTentry point is loaded into the program counter (i.e., 5218);
  - For int0 theentry point is specified in the int0 ISTentry stored in instruction memory as instruction word address 0x4.
  - For int1 theentry point is specified by the new_pc input pins.

Return from int0 and int1 service routines is accomplished using the BIRP instruction. Execution of BIRP causes: (1) The shadow control status register to be copied to the control status register; (2) all IFR bits are cleared; and (3) the program counter (i.e., 5218) is loaded with the contents of the instruction return pointer.

A non-maskable Interrupt or NMI is generally considered the second-highest priority interrupt and is generally used to alert of a serious hardware problem. For NMI processing to occur, the global interrupt enable (GIE) bit in the interrupt enable register (IER) should be set to 1. This simplifies external control logic typically desired to block NMI's during power on or reset. Processing of an NMI is similar to maskable interrupt processing, except for the requirement that the appropriate IER bit be set, (NMI has no such bit). Otherwise the same steps are taken forentry and exit from the interrupt service routines.

The software interrupt or SWI instruction is used to trigger the software interrupt. Decoding of SWI instruction generally causes the SWI ISTentry to be loaded into the program counter (i.e., 5218). Control can returned to the instruction immediately following the SWI instruction on the execution of a BIRP within the software interrupt service routine. Decode of an SWI instructions causes a store to the interrupt register pointer register with the return address of the next instruction to execute after the SWI service routine is complete. To exit a SWI service routine the BIRP instruction is used.

An UNDEF interrupt is triggered by decode stage (i.e., 5308) whenever an undefined instruction is detected. Detection of an undefined instruction causes the UNDEF ISTentry to be loaded into the program counter (i.e., 5218). Control is returned to the instruction immediately following the UNDEF on the execution of a BIRP within the UNDEF interrupt service routine. Decode of an undefined instruction causes a load of the interrupt enable register with the return address of the next instruction to execute after the UNDEF service routine is complete. For the purposes of next instruction address calculations, UNDEF instructions are treated as narrow instructions, where narrow instruction occupy a single instruction word and where as wide instructions occupy two instruction words. In many cases the UNDEF interrupt is an indication of a severe problem in the contents of the instruction memory; however, provisions are available to recover from an UNDEF interrupt.

8.8. Vector Implied Loads/Stores

Figure 122:
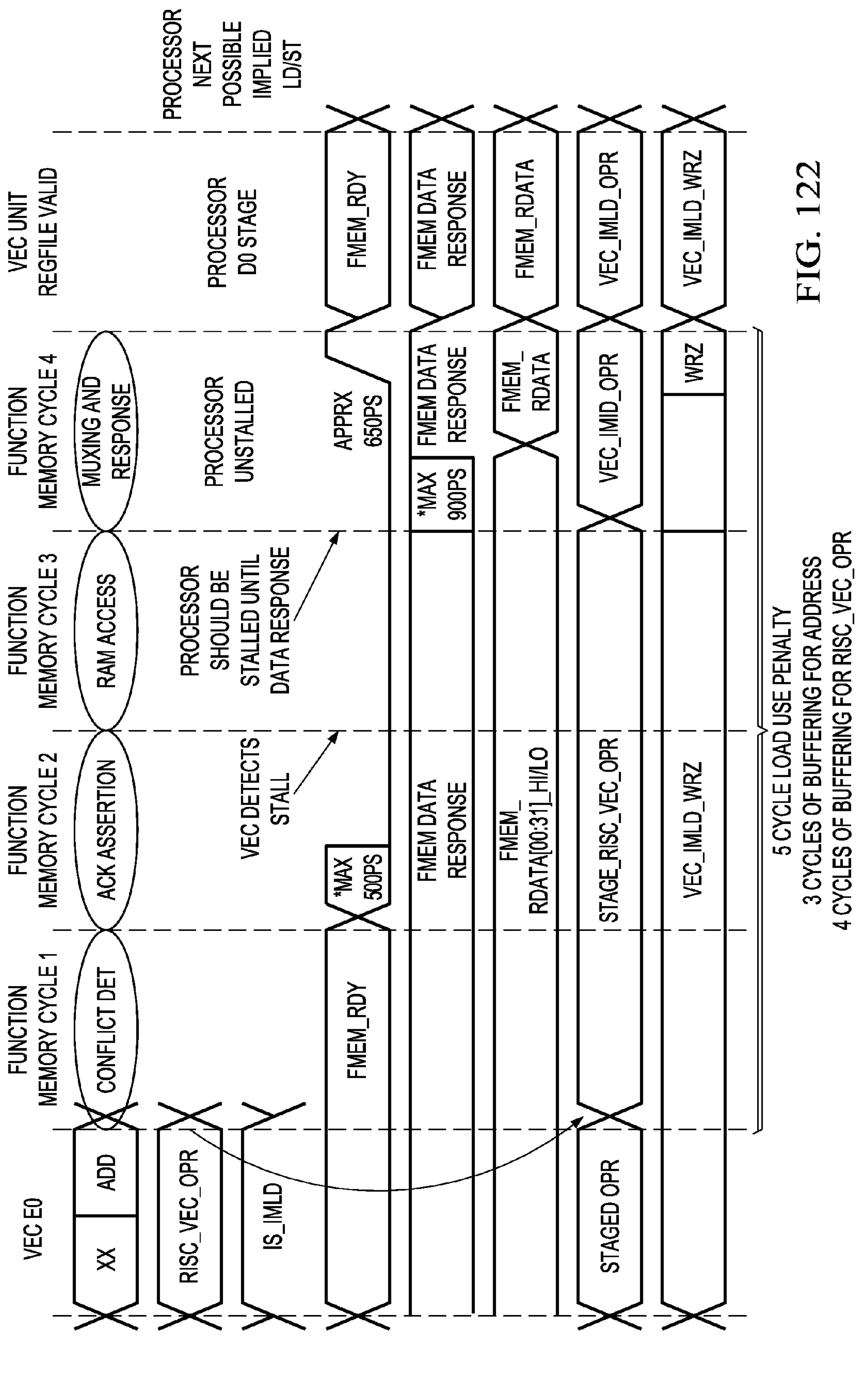
FIG. 122 is an example of a vector implied load.

A processor 5200 that includes a vector module (such as the processor for the shared function memory 1410, which is discussed in detail below) can support scalar initiated loads and stores to the function-memory (discussed below), these instructions used vector implied addressing. Address calculation and assertion of function-memory control signals are handled by instruction executing on the processor 5200. The source data (for vector implied stores) and the destination register (for vector implied loads) are sourced/received by the vector units. A handshake interface is present in processor 5200 (with a vector module) between the processor 5200 and the vector units. This interface provides operand information to the vector units. An example of a vector implied load can be seen in FIG. 122. Additionally, Table 18 below illustrates the boundary pins for processor 5200 that are associated with vector implied loads and stores.

TABLE 18

| Pin | Width | Dir | Purpose |
|---|---|---|---|
| vmem_rdy | 1 | Input | Function memory ready. |
| risc_vmem_addr | 20 | Output | Vector implied load/store address bus |
| risc_vmem_bez | 4 | Output | Vector implied load/store byte enables |
| risc_vec_opr | 4 | Output | This bus represents the vector unit source register for vector implied stores, or the vector unit destination register for vector implied loads. |
| risc_is_vild | 1 | Output | Vector implied load flag |
| risc_is_vist | 1 | Output | Vector implied store flag |

8.9. Debug Module

The debug module for the processor 5200 (which is a part of the processing unit 5202) utilizes the wrapper interface (i.e., node wrapper 810-*i*) to simplify the design of the debug module. The boundary pins for debug support are listed in above in Table 16. The debug register set is summarized below in Table 19.

TABLE 19

| Registger Name | Description | Field | Function | Width | Bit Position |
|---|---|---|---|---|---|
| DBG_CNTRL | Global debug mode control Address: 0x00 | | | 1 | |
| RSRV0 | Not implemented, reads 0x00000000 Address: 0x01 | N/A | N/A | N/A | N/A |
| BRK0 | Break/trace point register 0 Address: 0x02 | RSRV | Reserved, not implemented, reads 0x0 | 3 | 31:29 |
| | | EN | Enable, =1 enables break/trace point comparisons | 1 | 28 |
| | | TM | Trace mode, =1 trace mode, =0 breakpoint mode | 1 | 27 |
| | | ID | Trace/breakpoint ID, this is asserted on risc_trc_pt_match_id | 2 | 26:25 |
| | | CNTX | When context comparison is enabled (CC = 1, below) this field is compared to the input pins wp_cur_cntx, to further qualify the match. When CC = 1 both the instruction memory address and the wp_cur_cntx value are compared to determine a match. When CC = 0 wp_cur_cntx is ignored when determining a match. | 4 | 24:21 |
| | | CC | Context compare enable, =1 enabled | 1 | 20 |
| | | RSRV | Reserved, not implemented, reads 0x0 | 4 | 19:16 |
| | | IA | Instruction memory address for the trace/breakpoint. This is compared to imem_addr to determine a potential match | 16 | 15:0 |
| BRK1 | Break/trace point register 1 Address: 0x03 | RSRV | Reserved, not implemented, reads 0x0 | 3 | 31:29 |
| | | EN | Enable, =1 enables break/trace point comparisons | 1 | 28 |

TABLE 19-continued

| Registger Name | Description | Field | Function | Width | Bit Position |
|---|---|---|---|---|---|
| | | TM | Trace mode, =1 trace mode, =0 breakpoint mode | 1 | 27 |
| | | ID | Trace/breakpoint ID, this is asserted on risc_trc_pt_match_id | 2 | 26:25 |
| | | CNTX | When context comparison is enabled (CC = 1, below) this field is compared to the input pins wp_cur_cntx, to further qualify the match. When CC = 1 both the instruction memory address and the wp_cur_cntx value are compared to determine a match. When CC = 0 wp_cur_cntx is ignored when determining a match. | 4 | 24:21 |
| | | CC | Context compare enable, =1 enabled | 1 | 20 |
| | | RSRV | Reserved, not implemented, reads 0x0 | 4 | 19:16 |
| | | IA | Instruction memory address for the trace/breakpoint. This is compared to imem_addr to determine a potential match | 16 | 15:0 |
| BRK2 | Break/trace point register 2 Address: 0x04 | RSRV | Reserved, not implemented, reads 0x0 | 3 | 31:29 |
| | | EN | Enable, =1 enables break/trace point comparisons | 1 | 28 |
| | | TM | Trace mode, =1 trace mode, =0 breakpoint mode | 1 | 27 |
| | | ID | Trace/breakpoint ID, this is asserted on risc_trc_pt_match_id | 2 | 26:25 |
| | | CNTX | When context comparison is enabled (CC = 1, below) this field is compared to the input pins wp_cur_cntx, to further qualify the match. When CC = 1 both the instruction memory address and the wp_cur_cntx value are compared to determine a match. When CC = 0 wp_cur_cntx is ignored when determining a match. | 4 | 24:21 |
| | | CC | Context compare enable, =1 enabled | 1 | 20 |
| | | RSRV | Reserved, not implemented, reads 0x0 | 4 | 19:16 |
| | | IA | Instruction memory address for the trace/breakpoint. This is compared to imem_addr to determine a potential match | 16 | 15:0 |
| BRK3 | Break/trace point register 3 Address: 0x05 | RSRV | Reserved, not implemented, reads 0x0 | 3 | 31:29 |
| | | EN | Enable, =1 enables break/trace point comparisons | 1 | 28 |
| | | TM | Trace mode, =1 trace mode, =0 breakpoint mode | 1 | 27 |
| | | ID | Trace/breakpoint ID, this is asserted on risc_trc_pt_match_id | 2 | 26:25 |
| | | CNTX | When context comparison is enabled (CC = 1, below) this field is compared to the input pins wp_cur_cntx, to further qualify the match. When CC = 1 both the instruction memory address and the wp_cur_cntx value are compared to determine a match. When CC = 0 | 4 | 24:21 |

TABLE 19-continued

| Registger Name | Description | Field | Function | Width | Bit Position |
|---|---|---|---|---|---|
| | | | wp_cur_cntx is ignored when determining a match. | | |
| | | CC | Context compare enable, =1 enabled | 1 | 20 |
| | | RSRV | Reserved, not implemented, reads 0x0 | 4 | 19:16 |
| | | IA | Instruction memory address for the trace/breakpoint. This is compared to imem_addr to determine a potential match | 16 | 15:0 |
| ECC0 | Event counter control register 0 Address: 0x06 | EN | Event count enable | 1 | 7 |
| | | SEL | Event select | 7 | 6:0 |
| | | | SEL Value — Event | | |
| | | | 0x00 — Instruction memory stall | | |
| | | | 0x01 — Data memory stall | | |
| | | | 0x02 — Scalar a-side instruction valid | | |
| | | | 0x03 — Scalar b-side instruction valid | | |
| | | | 0x04 — 40b instruction valid | | |
| | | | 0x05 — Non-parallel instruction valid | | |
| | | | 0x06 — CALL instruction executed | | |
| | | | 0x07 — RET instruction executed | | |
| | | | 0x08 — Branch instruction decoded | | |
| | | | 0x09 — Branch taken | | |
| | | | 0x0a — Scalar a- or b-side NOP executed | | |
| | | | 0x0b-1a — User events, 0x0b selects wp_events[0], etc | | |
| | | | 0x01b-7F — unused | | |
| ECC1 | Event counter control register 1 Address: 0x07 | EN | Event count enable | 1 | 7 |
| | | SEL | Event select | 7 | 6:0 |
| | | | SEL Value — Event | | |
| | | | 0x00 — Instruction memory stall | | |
| | | | 0x01 — Data memory stall | | |
| | | | 0x02 — Scalar a-side instruction valid | | |
| | | | 0x03 — Scalar b-side instruction valid | | |
| | | | 0x04 — 40b instruction valid | | |
| | | | 0x05 — Non-parallel instruction valid | | |
| | | | 0x06 — CALL instruction executed | | |
| | | | 0x07 — RET instruction executed | | |
| | | | 0x08 — Branch instruction decoded | | |
| | | | 0x09 — Branch taken | | |
| | | | 0x0a — Scalar a- or b-side NOP executed | | |

TABLE 19-continued

| Registger Name | Description | Field | Function | | Width | Bit Position |
|---|---|---|---|---|---|---|
| | | | 0x0b-1a | User events, 0x0b selects wp_events[0], etc | | |
| | | | 0x01b-7F | unused | | |
| ECC2 | Event counter control register 2 Address: 0x08 | EN | Event count enable | | 1 | 7 |
| | | SEL | Event select | | 7 | 6:0 |
| | | | SEL Value | Event | | |
| | | | 0x00 | Instruction memory stall | | |
| | | | 0x01 | Data memory stall | | |
| | | | 0x02 | Scalar a-side instruction valid | | |
| | | | 0x03 | Scalar b-side instruction valid | | |
| | | | 0x04 | 40b instruction valid | | |
| | | | 0x05 | Non-parallel instruction valid | | |
| | | | 0x06 | CALL instruction executed | | |
| | | | 0x07 | RET instruction executed | | |
| | | | 0x08 | Branch instruction decoded | | |
| | | | 0x09 | Branch taken | | |
| | | | 0x0a | Scalar a- or b-side NOP executed | | |
| | | | 0x0b-1a | User events, 0x0b selects wp_events[0], etc | | |
| | | | 0x01b-7F | unused | | |
| ECC3 | Event counter control register 3 Address: 0x09 | EN | Event count enable | | 1 | 7 |
| | | SEL | Event select | | 7 | 6:0 |
| | | | SEL Value | Event | | |
| | | | 0x00 | Instruction memory stall | | |
| | | | 0x01 | Data memory stall | | |
| | | | 0x02 | Scalar a-side instruction valid | | |
| | | | 0x03 | Scalar b-side instruction valid | | |
| | | | 0x04 | 40b instruction valid | | |
| | | | 0x05 | Non-parallel instruction valid | | |
| | | | 0x06 | CALL instruction executed | | |
| | | | 0x07 | RET instruction executed | | |
| | | | 0x08 | Branch instruction decoded | | |
| | | | 0x09 | Branch taken | | |
| | | | 0x0a | Scalar a- or b-side NOP executed | | |
| | | | 0x0b-1a | User events, 0x0b selects wp_events[0], etc | | |
| | | | 0x01b-7F | unused | | |

TABLE 19-continued

| Registger Name | Description | Field | Function | Width | Bit Position |
|---|---|---|---|---|---|
| ECC4 | Event counter control register 4 Address: 0xa | EN<br>SEL | Event count enable<br>Event select | 1<br>7 | 7<br>6:0 |
| | | | SEL Value / Event: | | |
| | | | 0x00 Instruction memory stall | | |
| | | | 0x01 Data memory stall | | |
| | | | 0x02 Scalar a-side instruction valid | | |
| | | | 0x03 Scalar b-side instruction valid | | |
| | | | 0x04 40b instruction valid | | |
| | | | 0x05 Non-parallel instruction valid | | |
| | | | 0x06 CALL instruction executed | | |
| | | | 0x07 RET instruction executed | | |
| | | | 0x08 Branch instruction decoded | | |
| | | | 0x09 Branch taken | | |
| | | | 0x0a Scalar a- or b-side NOP executed | | |
| | | | 0x0b-1a User events, 0x0b selects wp_events[0], etc | | |
| | | | 0x01b-7F unused | | |
| ECC5 | Event counter control register 5 Address: 0xb | EN<br>SEL | Event count enable<br>Event select | 1<br>7 | 7<br>6:0 |
| | | | SEL Value / Event: | | |
| | | | 0x00 Instruction memory stall | | |
| | | | 0x01 Data memory stall | | |
| | | | 0x02 Scalar a-side instruction valid | | |
| | | | 0x03 Scalar b-side instruction valid | | |
| | | | 0x04 40b instruction valid | | |
| | | | 0x05 Non-parallel instruction valid | | |
| | | | 0x06 CALL instruction executed | | |
| | | | 0x07 RET instruction executed | | |
| | | | 0x08 Branch instruction decoded | | |
| | | | 0x09 Branch taken | | |
| | | | 0x0a Scalar a- or b-side NOP executed | | |
| | | | 0x0b-1a User events, 0x0b selects wp_events[0], etc | | |
| | | | 0x01b-7F unused | | |
| ECC6 | Event counter control register 6 Address: 0xc | EN<br>SEL | Event count enable<br>Event select | 1<br>7 | 7<br>6:0 |
| | | | SEL Value / Event: | | |
| | | | 0x00 Instruction memory stall | | |

TABLE 19-continued

| Registger Name | Description | Field | Function | | Width | Bit Position |
|---|---|---|---|---|---|---|
| | | | 0x01 | Data memory stall | | |
| | | | 0x02 | Scalar a-side instruction valid | | |
| | | | 0x03 | Scalar b-side instruction valid | | |
| | | | 0x04 | 40b instruction valid | | |
| | | | 0x05 | Non-parallel instruction valid | | |
| | | | 0x06 | CALL instruction executed | | |
| | | | 0x07 | RET instruction executed | | |
| | | | 0x08 | Branch instruction decoded | | |
| | | | 0x09 | Branch taken | | |
| | | | 0x0a | Scalar a- or b-side NOP executed | | |
| | | | 0x0b-1a | User events, 0x0b selects wp_events[0], etc | | |
| | | | 0x01b-7F | unused | | |
| ECC7 | Event counter control register 7 Address: 0xd | EN | Event count enable | | 1 | 7 |
| | | SEL | Event select | | 7 | 6:0 |
| | | | SEL Value | Event | | |
| | | | 0x00 | Instruction memory stall | | |
| | | | 0x01 | Data memory stall | | |
| | | | 0x02 | Scalar a-side instruction valid | | |
| | | | 0x03 | Scalar b-side instruction valid | | |
| | | | 0x04 | 40b instruction valid | | |
| | | | 0x05 | Non-parallel instruction valid | | |
| | | | 0x06 | CALL instruction executed | | |
| | | | 0x07 | RET instruction executed | | |
| | | | 0x08 | Branch instruction decoded | | |
| | | | 0x09 | Branch taken | | |
| | | | 0x0a | Scalar a- or b-side NOP executed | | |
| | | | 0x0b-1a | User events, 0x0b selects wp_events[0], etc | | |
| | | | 0x01b-7F | unused | | |
| EC0 | Event counter register 0 Address: 0xe | | | | 16 | 15:0 |
| EC1 | Event counter register 1 Address: 0xf | | | | 16 | 15:0 |
| EC2 | Event counter register 2 Address: 0x10 | | | | 16 | 15:0 |
| EC3 | Event counter register 3 Address: 0x11 | | | | 16 | 15:0 |

TABLE 19-continued

| Registger Name | Description | Field | Function | Width | Bit Position |
|---|---|---|---|---|---|
| EC4 | Event counter register 4 Address: 0x12 | | | 16 | 15:0 |
| EC5 | Event counter register 5 Address: 0x13 | | | 16 | 15:0 |
| EC6 | Event counter register 6 Address: 014 | | | 16 | 15:0 |
| EC7 | Event counter register 7 Address: 0x15 | | | 16 | 15:0 |
| HG_SIZE | This address allows direct read/write by the messaging wrapper to the control register HG_SIZE. Address: 0x16 | | | 8 | 7:0 |
| HG_POSN | This address allows direct read/write by the messaging wrapper to the control register HG_POSN. Address: 0x17 | | | 8 | 7:0 |
| V_RANGE | This address allows direct read/write by the messaging wrapper to the control register V_RANGE. Address: 0x18 | | | 8 | 7:0 |

8.16. Instruction Set Architecture Example

Table 20 below illustrates an example of an instruction set architecture for a RISC processor having a vector processing module:

TABLE 20

| Syntax/Pseudocode | Description |
|---|---|
| ABS .(SA,SB) s1(R4)<br>void ISA::OPC_ABS_20b_9 (Gpr &s1,Unit &unit)<br>{<br>s1 = s < 0 ? −s1 : s1;<br>Csr.setBit(EQ,unit,s1.zero( ));<br>} | ABSOLUTE VALUE |
| ABS .(V,VP) s1(R4)<br>void ISA::OPCV_ABS_20b_2 (Vreg4 &s1, Vreg4 &s2, Unit &unit)<br>{<br>if(isVPunit(unit))<br>{<br>s1.range(LSBL,MSBL) = s1.range(LSBL,MSBL) < 0 ? −s1.range(LSBL,MSBL) : s1.range(LSBL,MSBL);<br>s1.range(LSBU,MSBU) = s1.range(LSBU,MSBU) < 0 ? −s1.range(LSBU,MSBU) : s1.range(LSBU,MSBU);<br>Vr15.bit(EQA) = s1.range(LSBL,MSBL)==0;<br>Vr15.bit(EQB) = s1.range(LSBU,MSBU)==0;<br>}<br>else<br>{<br>s1 = s1 < 0 ? −s1 : s1;<br>Vr15.bit(EQ) = s1.zero( );<br>}<br>} | ABSOLUTE VALUE |
| ABSD .(VBx,VPx) s1(R4), s2(R4)<br>void ISA::OPCV_ABSD_20b_50 (Vreg4 &s1, Vreg4 &s2, Unit &unit)<br>{ | ABSOLUTE DIFFERENCE |

TABLE 20-continued

| Syntax/Pseudocode | Description |
|---|---|
| if(isVBunit(unit))<br>{<br>s2.range(24,31) = _abs(s2.range(24,31)) − s1.range(24,31);<br>s2.range(16,23) = _abs(s2.range(16,23)) − s1.range(16,23);<br>s2.range(8, 15) = _abs(s2.range(8, 15)) − s1.range(8,15);<br>s2.range(0, 7) = _abs(s2.range(0, 7)) − s1.range(0,7);<br>}<br>if(isVPunit(unit))<br>{<br>s2.range(16,31) = _abs(s2.range(16,31)) − s1.range(16,31);<br>s2.range(0, 15) = _abs(s2.range(0, 15)) − s1.range(0,15);<br>}<br>} | |
| ABSDU .(VBx,VPx) s1(R4), s2(R4)<br>void ISA::OPCV_ABSDU_20b_51 (Vreg4 &s1, Vreg4 &s2, Unit &unit)<br>{<br>if(isVBunit(unit))<br>{<br>s2.range(24,31) =<br>_abs(_unsigned(s2.range(24,31))) − _unsigned(s1.range(24,31));<br>s2.range(16,23) =<br>_abs(_unsigned(s2.range(16,23))) − _unsigned(s1.range(16,23));<br>s2.range(8, 15) =<br>_abs(_unsigned(s2.range(8, 15))) − _unsigned(s1.range(8,15));<br>s2.range(0, 7) =<br>_abs(_unsigned(s2.range(0, 7))) − _unsigned(s1.range(0,7));<br>}<br>if(isVPunit(unit))<br>{<br>s2.range(16,31) =<br>_unsigned(_abs(s2.range(16,31))) − _unsigned(s1.range(16,31));<br>s2.range(0, 15) =<br>_unsigned(_abs(s2.range(0, 15))) − _unsigned(s1.range(0,15));<br>}<br>} | ABSOLUTE DIFFERENCE, UNSIGNED |
| ADD .(SA,SB) s1(R4), s2(R4)<br>void ISA::OPC_ADD_20b_106 (Gpr &s1, Gpr &s2,Unit &unit)<br>{<br>Result r1;<br>r1 = s2 + s1;<br>s2 = r1;<br>Csr.bit( C,unit) = r1.carryout( );<br>Csr.bit(EQ,unit) = s2.zero( );<br>} | SIGNED ADDITION |
| ADD .(SA,SB) s1(U4), s2(R4)<br>void ISA::OPC_ADD_20b_107 (U4 &s1, Gpr &s2,Unit &unit)<br>{<br>Result r1;<br>r1 = s2 + s1;<br>s2 = r1;<br>Csr.bit( C,unit) = r1.carryout( );<br>Csr.bit(EQ,unit) = s2.zero( );<br>} | SIGNED ADDITION, U4 IMM |
| ADD .(SB) s1(S28),SP(R5)<br>void ISA::OPC_ADD_40b_210 (S28 &s1)<br>{<br>Sp += s1;<br>} | SIGNED ADDITION, SP, S28 IMM |
| ADD .(SB) s1(S24), SP(R5), s2(R4)<br>void ISA::OPC_ADD_40b_211 (U24 &s1, Gpr &s2)<br>{<br>s2 = Sp + s1;<br>} | SIGNED ADDITION, SP, S28 IMM, REG DEST |
| ADD .(SB) s1(S24),s2(R4)<br>void ISA::OPC_ADD_40b_212 (U24 &s1, Gpr &s2,Unit &unit)<br>{<br>Result r1;<br>r1 = s2 + s1;<br>s2 = r1;<br>Csr.bit(EQ,unit) = s2.zero( );<br>Csr.bit( C,unit) = r1.carryout( );<br>} | SIGNED ADDITION, S24 IMM |
| ADD .(V,VP) s1(R4), s2(R4)<br>void ISA::OPCV_ADD_20b_57 (Vreg4 &s1, Vreg4 &s2, Unit &unit)<br>{<br>if(isVPunit(unit))<br>{ | SIGNED ADDITION |

TABLE 20-continued

| Syntax/Pseudocode | Description |
|---|---|
| Reg s1lo = s1.range(LSBL,MSBL);<br>Reg s2lo = s2.range(LSBL,MSBL);<br>Reg resultlo = s1lo + s2lo;<br>Reg s1hi = s1.range(LSBU,MSBU);<br>Reg s2hi = s2.range(LSBU,MSBU);<br>Reg resulthi = s1hi + s2hi;<br>s2.range(LSBL,MSBL) = resultlo.range(LSBL,MSBL);<br>s2.range(LSBU,MSBU) = resulthi.range(LSBU,MSBU);<br>Vr15.bit(EQA) = s2.range(LSBL,MSBL)==0;<br>Vr15.bit(EQB) = s2.range(LSBU,MSBU)==0;<br>Vr15.bit(CA) = isCarry(s1lo,s2lo,resultlo);<br>Vr15.bit(CB) = isCarry(s1hi,s2hi,resulthi);<br>} else<br>{<br>Reg result = s2 + s1;<br>s2 = result;<br>Vr15.bit(EQ) = s2==0;<br>Vr15.bit(C) = isCarry(s1,s2,result);<br>}<br>} | |
| ADD .(V,VP) s1(U4), s2(R4)<br>void ISA::OPCV_ADD_20b_58 (U4 &s1, Vreg4 &s2, Unit &unit)<br>{<br>if(isVPunit(unit))<br>{<br>Reg s2lo = s2.range(LSBL,MSBL);<br>Reg resultlo = zero_extend(s1) + s2lo;<br>Reg s2hi = s2.range(LSBU,MSBU);<br>Reg resulthi = zero_extend(s1) + s2hi;<br>s2.range(LSBL,MSBL) = resultlo.range(LSBL,MSBL);<br>s2.range(LSBU,MSBU) = resulthi.range(LSBU,MSBU);<br>Vr15.bit(EQA) = s2.range(LSBL,MSBL)==0;<br>Vr15.bit(EQB) = s2.range(LSBU,MSBU)==0;<br>Vr15.bit(CA) = isCarry(s1,s2lo,resultlo);<br>Vr15.bit(CB) = isCarry(s1,s2hi,resulthi);<br>} else<br>{<br>Reg result = s2 + zero_extend(s1);<br>s2 = result;<br>Vr15.bit(EQ) = s2==0;<br>Vr15.bit(C) = isCarry(s1,s2,result);<br>}<br>} | SIGNED ADDITION, U4 IMM |
| ADD2 .(SA,SB) s1(R4), s2(R4)<br>void ISA::OPC_ADD2_20b_363 (Gpr &s1, Gpr &s2)<br>{<br>s2.range(0,15) =<br>(s1.range(0,15) + s2.range(0,15)) >> 1;<br>s2.range(16,31) =<br>(s1.range(16,31) + s2.range(16,31)) >> 1;<br>} | HALF WORD ADDITION WITH DIVIDE BY 2 |
| ADD2 .(SA,SB) s1(U4), s2(R4)<br>void ISA::OPC_ADD2_20b_364 (U4 &s1, Gpr &s2)<br>{<br>s2.range(0,15) = (s1.value( ) + s2.range(0,15)) >> 1;<br>s2.range(16,31) = (s1.value( ) + s2.range(16,31)) >> 1;<br>} | HALF WORD ADDITION WITH DIVIDE BY 2 |
| ADD2 .(VPx) s1(R4), s2(R4)<br>void ISA::OPCV_ADD2_20b_26 (Vreg4 &s1, Vreg4 &s2)<br>{<br>s2.range(0,15) =<br>(s1.range(0,15) + s2.range(0,15)) >> 1;<br>s2.range(16,31) =<br>(s1.range(16,31) + s2.range(16,31)) >> 1;<br>} | HALF WORD ADDITION WITH DIVIDE BY 2 |
| ADD2 .(VPx) s1(U4), s2(R4)<br>void ISA::OPCV_ADD2_20b_27 (U4 &s1, Vreg4 &s2)<br>{<br>s2.range(0,15) = (s1.value( ) + s2.range(0,15)) >> 1;<br>s2.range(16,31) = (s1.value( ) + s2.range(16,31)) >> 1;<br>} | HALF WORD ADDITION WITH DIVIDE BY 2 |
| ADD2U .(SA,SB) s1(R4), s2(R4)<br>void ISA::OPC_ADD2U_20b_365 (Gpr &s1, Gpr &s2)<br>{ | HALF WORD ADDITION WITH DIVIDE BY 2, |

TABLE 20-continued

| Syntax/Pseudocode | Description |
|---|---|
| s2.range(0,15) =<br>(_unsigned(s1.range(0,15)) + _unsigned(s2.range(0,15))) >> 1;<br>s2.range(16,31) =<br>(_unsigned(s1.range(16,31)) + _unsigned(s2.range(16,31))) >> 1;<br>} | UNSIGNED |
| ADD2U .(SA,SB) s1(U4), s2(R4)<br>void ISA::OPC_ADD2U_20b_366 (U4 &s1, Gpr &s2)<br>{<br>s2.range(0,15) =<br>(s1.value( ) + _unsigned(s2.range(0,15))) >> 1;<br>s2.range(16,31) =<br>(s1.value( ) + _unsigned(s2.range(16,31))) >> 1;<br>} | HALF WORD ADDITION WITH DIVIDE BY 2, UNSIGNED |
| ADD2U .(VPx) s1(R4), s2(R4)<br>void ISA::OPCV_ADD2U_20b_28 (Vreg4 &s1, Vreg4 &s2)<br>{<br>s2.range(0,15) =<br>(_unsigned(s1.range(0,15)) + _unsigned(s2.range(0,15))) >> 1;<br>s2.range(16,31) =<br>(_unsigned(s1.range(16,31)) + _unsigned(s2.range(16,31))) >> 1;<br>} | HALF WORD ADDITION WITH DIVIDE BY 2, UNSIGNED |
| ADD2U .(VPx) s1(U4), s2(R4)<br>void ISA::OPCV_ADD2U_20b_29 (U4 &s1, Vreg4 &s2)<br>{<br>s2.range(0,15) =<br>(s1.value( ) + _unsigned(s2.range(0,15))) >> 1;<br>s2.range(16,31) =<br>(s1.value( ) + _unsigned(s2.range(16,31))) >> 1;<br>} | HALF WORD ADDITION WITH DIVIDE BY 2, UNSIGNED |
| ADDU .(SA,SB) s1(R4), s2(R4)<br>void ISA::OPC_ADDU_20b_123 (Gpr &s1, Gpr &s2, Unit &unit)<br>{<br>Result r1;<br>r1 = _unsigned(s2) + _unsigned(s1);<br>s2 = r1;<br>Csr.bit( C,unit) = r1.overflow( );<br>Csr.bit(EQ,unit) = s2.zero( );<br>} | UNSIGNED ADDITION |
| ADDU .(SA,SB) s1(U4), s2(R4)<br>void ISA::OPC_ADDU_20b_124 (U4 &s1, Gpr &s2, Unit &unit)<br>{<br>Result r1;<br>r1 = _unsigned(s2) + s1;<br>s2 = r1;<br>Csr.bit( C,unit) = r1.overflow( );<br>Csr.bit(EQ,unit) = s2.zero( );<br>} | UNSIGNED ADDITION |
| ADDU .(Vx,VPx,VBx) s1(R4), s2(R4)<br>void ISA::OPCV_ADDU_20b_123 (Vreg4 &s1, Vreg4 &s2, Unit &unit)<br>{<br>if(isVPunit(unit))<br>{<br>Reg s1lo = _unsigned(s1.range(0,15));<br>Reg s2lo = _unsigned(s2.range(0,15));<br>Reg resultlo = s1lo + s2lo;<br>Reg s1hi = _unsigned(s1.range(16,31));<br>Reg s2hi = _unsigned(s2.range(16,31));<br>Reg resulthi = s1hi + s2hi;<br>s2.range(0,15) = resultlo.range(0,15);<br>s2.range(16,31) = resulthi.range(16,31);<br>Vr15.bit(tEQA) = s2.range(0,15)==0;<br>Vr15.bit(tEQB) = s2.range(16,31)==0;<br>Vr15.bit(tCB) = isCarry(s1lo,s2lo,resultlo);<br>Vr15.bit(tCA) = isCarry(s1hi,s2hi,resulthi);<br>} else if (isVBunit(unit))<br>{<br>Reg s1byte0 = _unsigned(s1.range(0,7));<br>Reg s2byte0 = _unsigned(s2.range(0,7));<br>Reg resultbyte0 = s1byte0 + s2byte0;<br>Reg s1byte1 = _unsigned(s1.range(8,15));<br>Reg s2byte1 = _unsigned(s2.range(8,15));<br>Reg resultbyte1 = s1byte1 + s2byte1;<br>Reg s1byte2 = _unsigned(s1.range(16,23));<br>Reg s2byte2 = _unsigned(s2.range(16,23));<br>Reg resultbyte2 = s1byte2 + s2byte2;<br>Reg s1byte3 = _unsigned(s1.range(24,31));<br>Reg s2byte3 = _unsigned(s2.range(24,31));<br>Reg resultbyte3 = s1byte3 + s2byte3; | UNSIGNED ADDITION |

TABLE 20-continued

| Syntax/Pseudocode | Description |
|---|---|
| s2.range(0,7) = resultbyte0.range(0,7); | |
| s2.range(8,15) = resultbyte1.range(8,15); | |
| s2.range(16,23) = resultbyte2.range(16,23); | |
| s2.range(31,23) = resultbyte3.range(31,23); | |
| Vr15.bit(tEQA) = s2.range(0,7)==0; | |
| Vr15.bit(tEQB) = s2.range(8,15)==0; | |
| Vr15.bit(tEQC) = s2.range(16,23)==0; | |
| Vr15.bit(tEQD) = s2.range(24,31)==0; | |
| Vr15.bit(tCA) = isCarry(s1byte0,s2byte0,resultbyte0); | |
| Vr15.bit(tCB) = isCarry(s1byte1,s2byte1,resultbyte1); | |
| Vr15.bit(tCC) = isCarry(s1byte2,s2byte2,resultbyte2); | |
| Vr15.bit(tCD) = isCarry(s1byte3,s2byte3,resultbyte3); | |
| } else | |
| { | |
| Reg result = _unsigned(s2) + _unsigned(s1); | |
| s2 = result; | |
| Vr15.bit(EQ) = s2==0; | |
| Vr15.bit(C) = isCarry(s1,s2,result); | |
| } | |
| } | |
| ADDU .(Vx,VPx,VBx) s1(U4), s2(R4) | UNSIGNED |
| void ISA::OPCV_ADDU_20b_124 (U4 &s1, Vreg4 &s2, Unit &unit) | ADDITION |
| { | |
| if(isVPunit(unit)) | |
| { | |
| Reg s2lo = _unsigned(s2.range(0,15)); | |
| Reg resultlo = zero_extend(s1) + s2lo; | |
| Reg s2hi = _unsigned(s2.range(16,31)); | |
| Reg resulthi = zero_extend(s1) + s2hi; | |
| s2.range(0,15) = resultlo.range(0,15); | |
| s2.range(16,31) = resulthi.range(16,31); | |
| Vr15.bit(tEQA) = s2.range(0,15)==0; | |
| Vr15.bit(tEQB) = s2.range(16,31)==0; | |
| Vr15.bit(tCB) = isCarry(s1,s2lo,resultlo); | |
| Vr15.bit(tCA) = isCarry(s1,s2hi,resulthi); | |
| } else if (isVBunit(unit)) | |
| { | |
| Reg s2byte0 = _unsigned(s2.range(0,7)); | |
| Reg resultbyte0 = zero_extend(s1) + s2byte0; | |
| Reg s2byte1 = _unsigned(s2.range(8,15)); | |
| Reg resultbyte1 = zero_extend(s1) + s2byte1; | |
| Reg s2byte2 = _unsigned(s2.range(16,23)); | |
| Reg resultbyte2 = zero_extend(s1) + s2byte2; | |
| Reg s2byte3 = _unsigned(s2.range(24,31)); | |
| Reg resultbyte3 = zero_extend(s1) + s2byte3; | |
| s2.range(0,7) = resultbyte0.range(0,7); | |
| s2.range(8,15) = resultbyte1.range(8,15); | |
| s2.range(16,23) = resultbyte2.range(16,23); | |
| s2.range(31,23) = resultbyte3.range(31,23); | |
| Vr15.bit(tEQA) = s2.range(0,7)==0; | |
| Vr15.bit(tEQB) = s2.range(8,15)==0; | |
| Vr15.bit(tEQC) = s2.range(16,23)==0; | |
| Vr15.bit(tEQD) = s2.range(24,31)==0; | |
| Vr15.bit(tCA) = isCarry(s1,s2byte0,resultbyte0); | |
| Vr15.bit(tCB) = isCarry(s1,s2byte1,resultbyte1); | |
| Vr15.bit(tCC) = isCarry(s1,s2byte2,resultbyte2); | |
| Vr15.bit(tCD) = isCarry(s1,s2byte3,resultbyte3); | |
| } else | |
| { | |
| Reg result = _unsigned(s2) + zero_extend(s1); | |
| s2 = result; | |
| Vr15.bit(EQ) = s2==0; | |
| Vr15.bit(C) = isCarry(s1,s2,result); | |
| } | |
| } | |
| AHLDHU .(VP3,VP4) s1(R4), s2(R4), s3(R4 | LOAD HALF |
| void ISA::OPCV_AHLDHU_20b_281 (Vreg4 &s1, Vreg4 &s2, Vreg4 & | UNSIGNED, |
| s3) | ABSOLUTE |
| { | HORIZONTAL |
| Result addrlo,addrhi; | ACCESS |
| addrlo.range(0,19) = | |
| _unsigned((s1.range(0,12)<<6)) + _unsigned(s2.range(0,13)); | |
| addrhi.range(0,19) = | |
| _unsigned((s1.range(16,28)<<6)) + _unsigned(s2.range(16,29)); | |
| s3.range(0,15) = fmem0->uhalf(addrlo); | |
| s3.range(16,31) = fmem1->uhalf(addrhi); | |
| } | |

TABLE 20-continued

| Syntax/Pseudocode | Description |
|---|---|
| AHLDHU .(VP3,VP4) s1(R4), s2(U6), s3(R4)<br>void ISA::OPCV_AHLDHU_40b_315 (Vreg4 &s1, U6 &s2, Vreg4 &s3)<br>{<br>Result addrlo,addrhi;<br>addrlo.range(0,19) =<br>_unsigned((s1.range(0,12)<<6)) + _unsigned(s2);<br>addrhi.range(0,19) =<br>_unsigned((s1.range(16,28)<<6)) + _unsigned(s2);<br>s3.range(0,15) = fmem0->uhalf(addrlo);<br>s3.range(16,31) = fmem1->uhalf(addrhi);<br>} | LOAD HALF UNSIGNED, ABSOLUTE HORIZONTAL ACCESS |
| AHSTH .(VP3,VP4) s1(R4), s2(R4), s3(R4)<br>void ISA::OPCV_AHSTH_20b_282 (Vreg4 &s1, Vreg4 &s2, Vreg4 &s3<br>)<br>{<br>Result addrlo,addrhi;<br>addrlo.range(0,19) =<br>_unsigned((s1.range(0,12)<<6)) + _unsigned(s2.range(0,13));<br>addrhi.range(0,19) =<br>_unsigned((s1.range(16,28)<<6)) + _unsigned(s2.range(16,29));<br>fmem0->half(addrlo) = s3.range(0,15);<br>fmem1->half(addrhi) = s3.range(16,31);<br>} | STORE HALF, ABSOLUTE HORIZONTAL ACCESS |
| AHSTH .(VP3,VP4) s1(R4), s2(U6), s3(R4)<br>void ISA::OPCV_AHSTH_40b_316 (Vreg4 &s1, U6 &s2, Vreg4 &s3)<br>{<br>Result addrlo,addrhi;<br>addrlo.range(0,19) =<br>_unsigned((s1.range(0,12)<<6)) + _unsigned(s2);<br>addrhi.range(0,19) =<br>_unsigned((s1.range(16,28)<<6)) + _unsigned(s2);<br>fmem0->half(addrlo) = s3.range(0,15);<br>fmem1->half(addrhi) = s3.range(16,31);<br>} | STORE HALF, ABSOLUTE HORIZONTAL ACCESS |
| ALD .V4 *+s1(R2)[s2(U6)], s3(R2), s4(R4)<br>void ISA::OPCV_ALD_20b_405 (Gpr2 &s1, U6 &s2, Vreg2 &s3, Vreg<br>&s4)<br>{<br>risc_regf_ra1._assert(D0,s1.address( ));<br>risc_regf_rd1z._assert(D0,0);<br>Result rBase = risc_regf_rd1.read( ); //E0 is implied<br>int u_offset = _unsigned(s2);<br>int addr_lo = rBase.range( 0,15) + s3.range( 0,15) + u_offset;<br>int addr_hi = rBase.range( 0,15) + s3.range(16,31) + u_offset;<br>s4.range( 0,15) = vmemLo->uhalf(addr_lo);<br>s4.range(16,31) = vmemHi->uhalf(addr_hi);<br>} | ABSOLUTE LOAD, IMM FORM |
| ALD .V4 *+s1(R2)[s2(R4)], s3(R2), s4(R4)<br>void ISA::OPCV_ALD_20b_407 (Gpr2 &s1, Vreg &s2, Vreg2 &s3, Vreg<br>&s4)<br>{<br>risc_regf_ra1._assert(D0,s1.address( ));<br>risc_regf_rd1z._assert(D0,0);<br>Result rBase = risc_regf_rd1.read( ); //E0 is implied<br>int u_offset_lo = s2.range( 0,15);<br>int u_offset_hi = s2.range(16,15);<br>int addr_lo = rBase.range( 0,15) + s3.range( 0,15) + u_offset_lo;<br>int addr_hi = rBase.range( 0,15) + s3.range(16,31) + u_offset_hi;<br>s4.range( 0,15) = vmemLo->uhalf(addr_lo);<br>s4.range(16,31) = vmemHi->uhalf(addr_hi);<br>} | ABSOLUTE LOAD, REG FORM |
| AND .(SA,SB) s1(R4), s2(R4)<br>void ISA::OPC_AND_20b_88 (Gpr &s1, Gpr &s2, Unit &unit)<br>{<br>s2 &= s1;<br>Csr.bit(EQ,unit) = s2.zero( );<br>} | BITWISE AND |
| AND .(SA,SB) s1(U4), s2(R4)<br>void ISA::OPC_AND_20b_89 (U4 &s1, Gpr &s2,Unit &unit)<br>{<br>s2 &= s1;<br>Csr.bit(EQ,unit) = s2.zero( );<br>} | BITWISE AND, U4 IMM |
| AND .(SB) s1(S3), s2(U20), s3(R4)<br>void ISA::OPC_AND_40b_213 (U3 &s1, U20 &s2, Gpr &s3,Unit &unit)<br>{ | BITWISE AND, U20 IMM, BYTE ALIGNED |

TABLE 20-continued

| Syntax/Pseudocode | Description |
|---|---|
| s3 &= (s2 << (s1*8)); | |
| Csr.bit(EQ,unit) = s3.zero( ); | |
| } | |
| AND .(V) s1(R4), s2(R4) | BITWISE AND |
| void ISA::OPCV_AND_20b_41 (U4 &s1, Vreg4 &s2, Unit &unit) | |
| { | |
| if(isVPunit(unit)) | |
| { | |
| s2.range(LSBL,MSBL)&=zero_extend(s1); | |
| s2.range(LSBU,MSBU)&=zero_extend(s1); | |
| Vr15.bit(EQA) = s2.range(LSBL,MSBL) == 0; | |
| Vr15.bit(EQB) = s2.range(LSBU,MSBU) == 0; | |
| } else | |
| { | |
| s2&=zero_extend(s1); | |
| Vr15.bit(EQ) = s2==0; | |
| } | |
| } | |
| AND .(V,VP) s1(U4), s2(R4) | BITWISE AND, U4 |
| void ISA::OPCV_AND_20b_41 (U4 &s1, Vreg4 &s2, Unit &unit) | IMM |
| { | |
| if(isVPunit(unit)) | |
| { | |
| s2.range(LSBL,MSBL)&=zero_extend(s1); | |
| s2.range(LSBU,MSBU)&=zero_extend(s1); | |
| Vr15.bit(EQA) = s2.range(LSBL,MSBL) == 0; | |
| Vr15.bit(EQB) = s2.range(LSBU,MSBU) == 0; | |
| } else | |
| { | |
| s2&=zero_extend(s1); | |
| Vr15.bit(EQ) = s2==0; | |
| } | |
| } | |
| AST .V4 *+s1(R2)[s2(U6)], s3(R2), s4(R4) | ABSOLUTE |
| void ISA::OPCV_AST_20b_406 (Gpr2 &s1, U6 &s2, Vreg2 &s3, Vreg | STORE, IMM |
| &s4) | FORM |
| { | |
| risc_vsr_rdz._assert(D0,0); | |
| risc_vsr_ra._assert(D0,s3.address( )); | |
| Result rVSR = risc_vsr_rdata.read( ); | |
| bool store_disable = rVSR.bit(8); | |
| if(store_disable) return; | |
| risc_regf_ra1._assert(D0,s1.address( )); | |
| risc_regf_rd1z._assert(D0,0); | |
| Result rBase = risc_regf_rd1.read( ); //E0 is implied | |
| int u_offset = _unsigned(s2); | |
| int addr_lo = rBase.range( 0,15) + s3.range( 0,15) + u_offset; | |
| int addr_hi = rBase.range( 0,15) + s3.range(16,31) + u_offset; | |
| vmemLo->uhalf(addr_lo) = s4.range( 0,15); | |
| vmemHi->uhalf(addr_hi) = s4.range(16,31); | |
| } | |
| AST .V4 *+s1(R2)[s2(R4)], s3(R2), s4(R4) | ABSOLUTE |
| void ISA::OPCV_AST_20b_408 (Gpr2 &s1, Vreg &s2, Vreg2 &s3, Vreg | STORE, REG |
| &s4) | FORM |
| { | |
| risc_vsr_rdz._assert(D0,0); | |
| risc_vsr_ra._assert(D0,s3.address( )); | |
| Result rVSR = risc_vsr_rdata.read( ); | |
| bool store_disable = rVSR.bit(8); | |
| if(store_disable) return; | |
| risc_regf_ra1._assert(D0,s1.address( )); | |
| risc_regf_rd1z._assert(D0,0); | |
| Result rBase = risc_regf_rd1.read( ); //E0 is implied | |
| int u_offset_lo = s2.range( 0,15); | |
| int u_offset_hi = s2.range(16,31); | |
| int addr_lo = rBase.range( 0,15) + s3.range( 0,15) + u_offset_lo; | |
| int addr_hi = rBase.range( 0,15) + s3.range(16,31) + u_offset_hi; | |
| vmemLo->uhalf(addr_lo) = s4.range( 0,15); | |
| vmemHi->uhalf(addr_hi) = s4.range(16,31); | |
| } | |
| B .(SB) s1(R4) | UNCONDITIONAL |
| void ISA::OPC_B_20b_0 (Gpr &s1) | BRANCH, REG, |
| { | ABSOLUTE |
| Pc = s1; | |
| } | |
| B .(SB) s1(S8) | UNCONDITIONAL |
| void ISA::OPC_B_20b_138 (S8 &s1) | BRANCH, S8 |
| { | IMM, PC REL |

TABLE 20-continued

| Syntax/Pseudocode | Description |
|---|---|
| Pc += s1;<br>} | |
| B .(SB) s1(S28)<br>void ISA::OPC_B_40b_216 (S28 &s1)<br>{<br>Pc += s1;<br>} | UNCONDITIONAL BRANCH, S28 IMM, PC REL |
| BEQ .(SB) s1(R4)<br>void ISA::OPC_BEQ_20b_2 (Gpr &s1,Unit &unit)<br>{<br>if(Csr.bit(EQ,unit)) Pc = s1;<br>} | BRANCH EQUAL, REG, ABSOLUTE |
| BEQ .(SB) s1(S8)<br>void ISA::OPC_BEQ_20b_140 (S8 &s1,Unit &unit)<br>{<br>if(Csr.bit(EQ,unit)) Pc += s1;<br>} | BRANCH EQUAL, S8 IMM, PC REL |
| BEQ .(SB) s1(S28)<br>void ISA::OPC_BEQ_40b_218 (S28 &s1,Unit &unit)<br>{<br>if(Csr.bit(EQ,unit)) Pc += s1;<br>} | BRANCH EQUAL, S28 IMM, PC REL |
| BGE .(SB) s1(R4)<br>void ISA::OPC_BGE_20b_6 (Gpr &s1,Unit &unit)<br>{<br>if(Csr.bit(GT,unit) \|\| Csr.bit(EQ,unit))<br>{<br>Pc = s1;<br>}<br>} | BRANCH GREATER OR EQUAL, REG, ABSOLUTE |
| BGE .(SB) s1(S8)<br>void ISA::OPC_BGE_20b_144 (S8 &s1,Unit &unit)<br>{<br>if(Csr.bit(GT,unit) \|\| Csr.bit(EQ,unit)) Pc += s1;<br>} | BRANCH GREATER OR EQUAL, S8 IMM, PC REL |
| BGE .(SB) s1(S28)<br>void ISA::OPC_BGE_40b_222 (S28 &s1,Unit &unit)<br>{<br>if(Csr.bit(GT,unit) \|\| Csr.bit(EQ,unit)) Pc += s1;<br>} | BRANCH GREATER OR EQUAL, S28 IMM, PC REL |
| BGT .(SB) s1(R4)<br>void ISA::OPC_BGT_20b_4 (Gpr &s1,Unit &unit)<br>{<br>if(Csr.bit(GT,unit)) Pc = s1;<br>} | BRANCH GREATER, REG, ABSOLUTE |
| BGT .(SB) s1(S8)<br>void ISA::OPC_BGT_20b_142 (S8 &s1,Unit &unit)<br>{<br>if(Csr.bit(GT,unit)) Pc += s1;<br>} | BRANCH GREATER, S8 IMM, PC REL |
| BGT .(SB) s1(S28)<br>void ISA::OPC_BGT_40b_220 (S28 &s1,Unit &unit)<br>{<br>if(Csr.bit(GT,unit)) Pc += s1;<br>} | BRANCH GREATER, S28 IMM, PC REL |
| BHGNE .{SA\|SB} s1(R4)<br>void ISA::OPC_BHGNE_20b_115 (Gpr &s1)<br>{<br>Result r1 = wrp_hgposn_ne_hgsize.read( );<br>if(r1.value( )) PC = s1;<br>risc_inc_hg_posn._assert(1);<br>} | BRANCH ON HG_POSN NOT EQUAL HG_SIZE |
| BKPT .(SB)<br>void ISA::OPC_BKPT_20b_12 (void)<br>{<br>//This instruction effectively halts<br>//instruction issue until intervention<br>//by the debug system<br>Pc = Pc;<br>} | BREAK POINT |
| BLE .(SB) s1(R4)<br>void ISA::OPC_BLE_20b_5 (Gpr &s1,Unit &unit)<br>{<br>if(Csr.bit(LT,unit) \|\| Csr.bit(EQ,unit))<br>{<br>Pc = s1;<br>}<br>} | BRANCH LESS OR EQUAL, REG, ABSOLUTE |

TABLE 20-continued

| Syntax/Pseudocode | Description |
|---|---|
| BLE .(SB) s1(S8)<br>void ISA::OPC_BLE_20b_143 (S8 &s1,Unit &unit)<br>{<br> if(Csr.bit(LT,unit) \|\| Csr.bit(EQ,unit)) Pc += s1;<br>} | BRANCH LESS OR EQUAL, S8 IMM, PC REL |
| BLE .(SB) s1(S28)<br>void ISA::OPC_BLE_40b_221 (S28 &s1,Unit &unit)<br>{<br> if(Csr.bit(LT,unit) \|\| Csr.bit(EQ,unit)) Pc += s1;<br>} | BRANCH LESS OR EQUAL, S28 IMM, PC REL |
| BLT .(SB) s1(R4)<br>void ISA::OPC_BLT_20b_1 (Gpr &s1,Unit &unit)<br>{<br> if(Csr.bit(LT,unit)) Pc = s1;<br>} | BRANCH LESS, REG, ABSOLUTE |
| BLT .(SB) s1(S8)<br>void ISA::OPC_BLT_20b_139 (S8 &s1,Unit &unit)<br>{<br> if( Csr.bit(LT,unit)) Pc += s1;<br>} | BRANCH LESS, S8 IMM, PC REL |
| BLT .(SB) s1(S28)<br>void ISA::OPC_BLT_40b_217 (S28 &s1,Unit &unit)<br>{<br> if(Csr.bit(LT,unit)) Pc += s1;<br>} | BRANCH LESS, S28 IMM, PC REL |
| BNE .(SB) s1(R4)<br>void ISA::OPC_BNE_20b_3 (Gpr &s1,Unit &unit)<br>{<br> if(!Csr.bit(EQ,unit)) Pc = s1;<br>} | BRANCH NOT EQUAL, REG, ABSOLUTE |
| BNE .(SB) s1(S8)<br>void ISA::OPC_BNE_20b_141 (S8 &s1,Unit &unit)<br>{<br> if(!Csr.bit(EQ,unit)) Pc += s1;<br>} | BRANCH NOT EQUAL, S8 IMM, PC REL |
| BNE .(SB) s1(S28)<br>void ISA::OPC_BNE_40b_219 (S28 &s1,Unit &unit)<br>{<br> if(!Csr.bit(EQ,unit)) Pc += s1;<br>} | BRANCH NOT EQUAL, S28 IMM, PC REL |
| CALL .(SB) s1(R4)<br>void ISA::OPC_CALL_20b_7 (Gpr &s1)<br>{<br> dmem->write(Sp,Pc+3);<br> Sp −= 4;<br> Pc = s1;<br>} | CALL SUBROUTINE, REG, ABSOLUTE |
| CALL .(SB) s1(S8)<br>void ISA::OPC_CALL_20b_145 (S8 &s1)<br>{<br> dmem->write(Sp.value( ),Pc+3);<br> Sp −= 4;<br> Pc += s1;<br>} | CALL SUBROUTINE, S8 IMM, PC REL |
| CALL .(SB) s1(S28)<br>void ISA::OPC_CALL_40b_223 (S28 &s1)<br>{<br> dmem->write(Sp.value( ),Pc+3);<br> Sp −= 4;<br> Pc += s1;<br>} | CALL SUBROUTINE, S28 IMM, PC REL |
| CIRC .(SB) s1(R4), s2(S8), s3(R4)<br>void ISA::OPC_CIRC_40b_260 (Gpr &s1,S8 &s2,Gpr &s3)<br>{<br> int imm_cnst = s2.value( );<br> int bot_off = s1.range(0,3);<br> int top_off = s1.range(4,7);<br> int blk_size = s1.range(8,10);<br> int str_dis = s1.bit(12);<br> int repeat = s1.bit(13);<br> int bot_flag = s1.bit(14);<br> int top_flag = s1.bit(15);<br> int pntr = s1.range(16,23);<br> int size = s1.range(24,31);<br> int tmp,addr;<br> if(imm_cnst > 0 && bot_flag && imm_cnst > bot_off)<br> { | CIRCULAR |

TABLE 20-continued

```
Syntax/Pseudocode                                                 Description
  if(!repeat)
  {
   tmp = (bot_off<<1) - imm_cnst;
  }
  else
  {
   tmp = bot_off;
  }
 }
 else
 {
  if(imm_cnst < 0 && top_flag && -imm_cnst > top_off)
  {
   if(!repeat)
   {
    tmp = -(top_off<<1) - imm_cnst;
   }
   else
   {
    tmp = -top_off;
   }
  }
  else
  {
   tmp = imm_cnst;
  }
 }
 pntr = pntr << blk_size;
 if(size == 0)
 {
  addr = pntr + tmp;
 }
 else
 {
  if((pntr + tmp) >= size)
  {
   addr = pntr + tmp - size;
  }
  else
  {
   if(pntr + tmp < 0)
   {
    addr = pntr + tmp + size;
   }
   else
   {
    addr = pntr + tmp;
   }
  }
 }
 s3 = addr;
}
CLRB .(SA,SB) s1(U2), s2(U2), s3(R4)                              CLEAR BYTE
void ISA::OPC_CLRB_20b_86 (U2 &s1,U2 &s2,Gpr &s3,Unit &unit)      FIELD
{
 s3.range(s1*8,((s2+1)*8)-1) = 0;
 Csr.bit(EQ,unit) = s3.zero( );
}
CLRB .(V) s1(U2), s2(U2), s3(R4)                                  CLEAR BYTE
void ISA::OPCV_CLRB_20b_39 (Vreg4 &s1, Vreg4 &s2, Vreg4 &s3)      FIELD
{
 s3.range(s1*8,((s2+1)*8)-1) = 0;
}
CMP .(SA,SB) s1(S4), s2(R4)                                       SIGNED
void ISA::OPC_CMP_20b_78 (S4 &s1, Gpr &s2,Unit &unit)             COMPARE, S4
{                                                                 IMM
 Csr.bit(EQ,unit) = s2 == sign_extend(s1);
 Csr.bit(LT,unit) = s2 < sign_extend(s1);
 Csr.bit(GT,unit) = s2 > sign_extend(s1);
}
CMP .(SA,SB) s1(R4), s2(R4)                                       SIGNED
void ISA::OPC_CMP_20b_109 (Gpr &s1, Gpr &s2,Unit &unit)           COMPARE
{
 Csr.bit(EQ,unit) = s2 == s1;
 Csr.bit(LT,unit) = s2 < s1;
 Csr.bit(GT,unit) = s2 > s1;
}
```

TABLE 20-continued

| Syntax/Pseudocode | Description |
| --- | --- |
| CMP .(SB) s1(S24),s2(R4)<br>void ISA::OPC_CMP_40b_225 (S24 &s1, Gpr &s2,Unit &unit)<br>{<br>Csr.bit(EQ,unit) = s2 == sign_extend(s1);<br>Csr.bit(LT,unit) = s2 < sign_extend(s1);<br>Csr.bit(GT,unit) = s2 > sign_extend(s1);<br>} | SIGNED COMPARE, S24 IMM |
| CMP .(V,VP) s1(S4), s2(R4)<br>void ISA::OPCV_CMP_20b_60 (Vreg4 &s1, Vreg4 &s2, Unit &unit)<br>{<br>if(isVPunit(unit))<br>{<br>Vr15.bit(EQA) = s2.range(LSBL,MSBL) == s1;<br>Vr15.bit(LTA) = s2.range(LSBL,MSBL) < s1;<br>Vr15.bit(GTA) = s2.range(LSBL,MSBL) > s1;<br>Vr15.bit(EQB) = s2.range(LSBU,MSBU) == s1;<br>Vr15.bit(LTB) = s2.range(LSBU,MSBU) < s1;<br>Vr15.bit(GTB) = s2.range(LSBU,MSBU) > s1;<br>} else<br>{<br>Vr15.bit(EQ) = s2 == s1;<br>Vr15.bit(LT) = s2 < s1;<br>Vr15.bit(GT) = s2 > s1;<br>}<br>} | SIGNED COMPARE, S4 IMM |
| CMP .(V,VP) s1(R4), s2(R4)<br>void ISA::OPCV_CMP_20b_60 (Vreg4 &s1, Vreg4 &s2, Unit &unit)<br>{<br>if(isVPunit(unit))<br>{<br>Vr15.bit(EQA) = s2.range(LSBL,MSBL) == s1;<br>Vr15.bit(LTA) = s2.range(LSBL,MSBL) < s1;<br>Vr15.bit(GTA) = s2.range(LSBL,MSBL) > s1;<br>Vr15.bit(EQB) = s2.range(LSBU,MSBU) == s1;<br>Vr15.bit(LTB) = s2.range(LSBU,MSBU) < s1;<br>Vr15.bit(GTB) = s2.range(LSBU,MSBU) > s1;<br>} else<br>{<br>Vr15.bit(EQ) = s2 == s1;<br>Vr15.bit(LT) = s2 < s1;<br>Vr15.bit(GT) = s2 > s1;<br>}<br>} | SIGNED COMPARE |
| CMPU .(SA,SB) s1(U4), s2(R4)<br>void ISA::OPC_CMPU_20b_77 (U4 &s1, Gpr &s2,Unit &unit)<br>{<br>Csr.bit(EQ,unit) = _unsigned(s2) == zero_extend(s1);<br>Csr.bit(LT,unit) = _unsigned(s2) < zero_extend(s1);<br>Csr.bit(GT,unit) = _unsigned(s2) > zero_extend(s1);<br>} | UNSIGNED COMPARE, U4 IMM |
| CMPU .(SA,SB) s1(R4), s2(R4)<br>void ISA::OPC_CMPU_20b_108 (Gpr &s1, Gpr &s2,Unit &unit)<br>{<br>Csr.bit(EQ,unit) = _unsigned(s2) == _unsigned(s1);<br>Csr.bit(LT,unit) = _unsigned(s2) < _unsigned(s1);<br>Csr.bit(GT,unit) = _unsigned(s2) > _unsigned(s1);<br>} | UNSIGNED COMPARE |
| CMPU .(SB) s1(U24),s2(R4)<br>void ISA::OPC_CMPU_40b_224 (U24 &s1, Gpr &s2,Unit &unit)<br>{<br>Csr.bit(EQ,unit) = _unsigned(s2) == zero_extend(s1);<br>Csr.bit(LT,unit) = _unsigned(s2) < zero_extend(s1);<br>Csr.bit(GT,unit) = _unsigned(s2) > zero_extend(s1);<br>} | UNSIGNED COMPARE, U24 IMM |
| CMPU .(V) s1(U4), s2(R4)<br>void ISA::OPCV_CMPU_20b_59 (Vreg4 &s1, Vreg4 &s2)<br>{<br>Vr15.bit(EQ) = _unsigned(s2) == _unsigned(s1);<br>Vr15.bit(LT) = _unsigned(s2) < _unsigned(s1);<br>Vr15.bit(GT) = _unsigned(s2) > _unsigned(s1);<br>} | UNSIGNED COMPARE, U4 IMM |
| CMPU .(V) s1(R4), s2(R4)<br>void ISA::OPCV_CMPU_20b_59 (Vreg4 &s1, Vreg4 &s2)<br>{<br>Vr15.bit(EQ) = _unsigned(s2) == _unsigned(s1);<br>Vr15.bit(LT) = _unsigned(s2) < _unsigned(s1);<br>Vr15.bit(GT) = _unsigned(s2) > _unsigned(s1);<br>} | UNSIGNED COMPARE |

TABLE 20-continued

| Syntax/Pseudocode | Description |
|---|---|
| CMVEQ .(SA,SB) s1(R4), s2(R4)<br>void ISA::OPC_CMVEQ_20b_149 (Gpr &s1, Gpr &s2,Unit &unit)<br>{<br>s2 = Csr.bit(EQ,unit) ? s1 : s2;<br>} | CONDITIONAL MOVE, EQUAL |
| CMVEQ .(V,VP) s1(R4), s2(R4)<br>oid ISA::OPCV_CMVEQ_20b_85 (Vreg4 &s1, Vreg4 &s2, Unit &unit)<br>{<br>if(isVPunit(unit))<br>{<br>s2.range(LSBL,MSBL) = Vr15.bit(EQA) ? s1.range(LSBL,MSBL) : s2.range(LSBL,MSBL);<br>s2.range(LSBU,MSBU) = Vr15.bit(EQB) ? s1.range(LSBU,MSBU) : s2.range(LSBU,MSBU);<br>} else<br>{<br>s2 = Vr15.bit(EQ) ? s1 : s2;<br>}<br>} | CONDITIONAL MOVE, EQUAL, R15 |
| CMVGE .(SA,SB) s1(R4), s2(R4)<br>void ISA::OPC_CMVGE_20b_155 (Gpr &s1, Gpr &s2, Unit &unit)<br>{<br>s2 = (Csr.bit(EQ,unit) \| Csr.bit(GT,unit)) ? s1 : s2;<br>} | CONDITIONAL MOVE, GREATER THAN OR EQUAL |
| CMVGE .(Vx,VPx,VBx) s1(R4), s2(R4)<br>void ISA::OPCV_CMVGE_20b_152 (Vreg4 &s1, Vreg4 &s2, Unit &unit)<br>{<br>if(isVPunit(unit))<br>{<br>s2.range(0,15) = (Vr15.bit(tEQA) \| Vr15.bit(tGTA)) ? s1.range(0,15) : s2.range(0,15);<br>s2.range(16,31) = (Vr15.bit(tEQB) \| Vr15.bit(tGTB)) ? s1.range(16,31) : s2.range(16,31);<br>} else if (isVBunit(unit))<br>{<br>s2.range(0,7) = (Vr15.bit(tEQA) \| Vr15.bit(tGTA)) ? s1.range(0,7) : s2.range(0,7);<br>s2.range(8,15) = (Vr15.bit(tEQB) \| Vr15.bit(tGTB)) ? s1.range(8,15) : s2.range(8,15);<br>s2.range(16,23) = (Vr15.bit(tEQC) \| Vr15.bit(tGTC)) ? s1.range(16,23) : s2.range(16,23);<br>s2.range(24,31) = (Vr15.bit(tEQD) \| Vr15.bit(tGTD)) ? s1.range(24,31 ) : s2.range(24,31);<br>} else<br>{<br>s2 = (Vr15.bit(EQ) \| Vr15.bit(GT)) ? s1 : s2;<br>}<br>} | CONDITIONAL MOVE, GREATER THAN OR EQUAL |
| CMVGT .(SA,SB) s1(R4), s2(R4)<br>void ISA::OPC_CMVGT_20b_148 (Gpr &s1, Gpr &s2,Unit &unit)<br>{<br>s2 = Csr.bit(GT,unit) ? s1 : s2;<br>} | CONDITIONAL MOVE, GREATER THAN |
| CMVGT .(V,VP) s1(R4), s2(R4)<br>void ISA::OPCV_CMVGT_20b_84 (Vreg4 &s1, Vreg4 &s2, Unit &unit)<br>{<br>if(isVPunit(unit))<br>{<br>s2.range(LSBL,MSBL) = Vr15.bit(GTA) ? s1.range(LSBL,MSBL) : s2.range(LSBL,MSBL);<br>s2.range(LSBU,MSBU) = Vr15.bit(GTB) ? s1.range(LSBU,MSBU) : s2.range(LSBU,MSBU);<br>} else<br>{<br>s2 = Vr15.bit(GT) ? s1 : s2;<br>}<br>} | CONDITIONAL MOVE, GREATER THAN, R15, |
| CMVLE .(SA,SB) s1(R4), s2(R4)<br>void ISA::OPC_CMVLE_20b_151 (Gpr &s1, Gpr &s2, Unit &unit)<br>{<br>s2 = (Csr.bit(EQ,unit) \| Csr.bit(LT,unit)) ? s1 : s2;<br>} | CONDITIONAL MOVE, LESS THAN OR EQUAL |
| CMVLE .(Vx,VPx,VBx) s1(R4), s2(R4)<br>void ISA::OPCV_CMVLE_20b_151 (Vreg4 &s1, Vreg4 &s2, Unit &unit)<br>{ | CONDITIONAL MOVE, LESS THAN OR EQUAL |

TABLE 20-continued

| Syntax/Pseudocode | Description |
|---|---|
| if(isVPunit(unit))<br>{<br>s2.range(0,15) = (Vr15.bit(tEQA) \| Vr15.bit(tLTA)) ? s1.range(0,15) :<br>s2.range(0,15);<br>s2.range(16,31) = (Vr15.bit(tEQB) \| Vr15.bit(tLTB)) ? s1.range(16,31)<br>: s2.range(16,31);<br>} else if (isVBunit(unit))<br>{<br>s2.range(0,7) = (Vr15.bit(tEQA) \| Vr15.bit(tLTA)) ? s1.range(0,7) :<br>s2.range(0,7);<br>s2.range(8,15) = (Vr15.bit(tEQB) \| Vr15.bit(tLTB)) ? s1.range(8,15) :<br>s2.range(8,15);<br>s2.range(16,23) = (Vr15.bit(tEQC) \| Vr15.bit(tLTC)) ? s1.range(16,23)<br>: s2.range(16,23);<br>s2.range(24,31) = (Vr15.bit(tEQD) \| Vr15.bit(tLTD)) ? s1.range(24,31)<br>: s2.range(24,31);<br>} else<br>{<br>s2 = (Vr15.bit(EQ) \| Vr15.bit(LT)) ? s1 : s2;<br>}<br>} | |
| CMVLT .(SA,SB) s1(R4), s2(R4)<br>void ISA::OPC_CMVLT_20b_147 (Gpr &s1, Gpr &s2,Unit &unit)<br>{<br>s2 = Csr.bit(LT,unit) ? s1 : s2;<br>} | CONDITIONAL MOVE, LESS THAN |
| CMVLT .(V,VP) s1(R4), s2(R4)<br>void ISA::OPCV_CMVLT_20b_83 (Vreg4 &s1, Vreg4 &s2, Unit &unit)<br>{<br>if(isVPunit(unit))<br>{<br>s2.range(LSBL,MSBL) = Vr15.bit(LTA) ? s1.range(LSBL,MSBL) :<br>s2.range(LSBL,MSBL);<br>s2.range(LSBU,MSBU) = Vr15.bit(LTB) ? s1.range(LSBU,MSBU) :<br>s2.range(LSBU,MSBU);<br>} else<br>{<br>s2 = Vr15.bit(LT) ? s1 : s2;<br>}<br>} | CONDITIONAL MOVE, LESS THAN, R15 |
| CMVNE .(SA,SB) s1(R4), s2(R4)<br>void ISA::OPC_CMVNE_20b_150 (Gpr &s1, Gpr &s2,Unit &unit)<br>{<br>s2 = !Csr.bit(EQ,unit) ? s1 : s2;<br>} | CONDITIONAL MOVE, NOT EQUAL |
| CMVNE .(V,VP) s1(R4), s2(R4)<br>void ISA::OPCV_CMVNE_20b_86 (Vreg4 &s1, Vreg4 &s2, Unit &unit)<br>{<br>if(isVPunit(unit))<br>{<br>s2.range(LSBL,MSBL) = !Vr15.bit(EQA) ? s1.range(LSBL,MSBL) :<br>s2.range(LSBL,MSBL);<br>s2.range(LSBU,MSBU) = !Vr15.bit(EQB) ? s1.range(LSBU,MSBU)<br>: s2.range(LSBU,MSBU);<br>} else<br>{<br>s2 = !Vr15.bit(EQ) ? s1 : s2;<br>}<br>} | CONDITIONAL MOVE, NOT EQUAL, R15 |
| CONS .{V1\|V2\|V3\|V4} s1(R4), s2(R4), s3(R4)<br>void ISA::OPCV_CONS_20b_398 (Vreg &s1, Vreg &s2, Vreg &s3)<br>{<br>s3.range(24,31) = s2.range(0,7);<br>s3.range(0,23) = s1.range(8,31);<br>} | CONCATENATE AND SHIFT |
| DCBNZ .(SB) s1(R4), s2(R4)<br>void ISA::OPC_DCBNZ_20b_152 (Gpr &s1, Gpr &s2)<br>{<br>--s1;<br>if(s1 != 0)<br>{<br>Pc = s2;<br>}<br>else<br>{<br>Pc = (cregs[aPC]+1)>>1;<br>}<br>} | DECREMENT, COMPARE, BRANCH NON-ZERO |

TABLE 20-continued

| Syntax/Pseudocode | Description |
|---|---|
| DCBNZ .(SB) s1(R4),s2(U16)<br>void ISA::OPC_DCBNZ_40b_247 (Gpr &s1,U16 &s2)<br>{<br>--s1;<br>if(s1 != 0) Pc = s2;<br>} | DECREMENT, COMPARE, BRANCH NON-ZERO |
| END .(SA,SB)<br>void ISA::OPC_END_20b_10 (void)<br>{<br>risc_is_end._assert(1);<br>Pc = Pc;<br>} | END OF THREAD |
| EXTB .(SA,SB) s1(U2), s2(U2), s3(R4)<br>void ISA::OPC_EXTB_20b_122 (U2 &s1,U2 &s2,Gpr &s3,Unit &unit)<br>{<br>Result tmp;<br>tmp = s3;<br>s3.clear( );<br>s3.range(0,s2*8) = sign_extend(tmp.range(s1*8,((s2+1)*8)-1));<br>Csr.bit(EQ,unit) = s3.zero( );<br>} | EXTRACT SIGNED BYTE FIELD |
| EXTB .(V) s1(U2), s2(U2), s3(R4)<br>void ISA::OPCV_EXTB_20b_73 (U2 &s1, U2 &s2, Vreg4 &s3)<br>{<br>Result tmp;<br>tmp = s3;<br>s3.clear( );<br>s3.range(0,s2*8) = sign_extend(tmp.range(s1*8,((s2+1)*8)-1));<br>} | EXTRACT SIGNED BYTE FIELD |
| EXTBU .(SA,SB) s1(U2), s2(U2), s3(R4)<br>void ISA::OPC_EXTBU_20b_87 (U2 &s1,U2 &s2,Gpr &s3,Unit &unit)<br>{<br>Result tmp;<br>tmp = s3;<br>s3.clear( );<br>s3 = tmp.range(s1*8,((s2+1)*8)-1);<br>Csr.bit(EQ,unit) = s3.zero( );<br>} | EXTRACT UNSIGNED BYTE FIELD |
| EXTBU .(V) s1(U2), s2(U2), s3(R4)<br>void ISA::OPCV_EXTBU_20b_40 (U2 &s1, U2 &s2, Vreg4 &s3)<br>{<br>Result tmp;<br>tmp = s3;<br>s3.clear( );<br>s3 = tmp.range(s1*8,((s2+1)*8)-1);<br>} | EXTRACT UNSIGNED BYTE FIELD |
| EXTHH.(VPx) s1(R4), s2(R4)<br>void ISA::OPCV_EXTHH_20b_294 (Vreg4 &s1, Vreg4 &s2)<br>{<br>s2.range(16,31) = _unsigned(s1.range(24,31));<br>s2.range(0,15) = _unsigned(s1.range(8,15));<br>} | HALF WORD EXTRACT, HIGH/HIGH |
| EXTHL .(VPx) s1(R4), s2(R4)<br>void ISA::OPCV_EXTHL_20b_293 (Vreg4 &s1, Vreg4 &s2)<br>{<br>s2.range(16,31) = _unsigned(s1.range(24,31));<br>s2.range(0,15) = _unsigned(s1.range(0,7));<br>} | HALF WORD EXTRACT, HIGH/LOW |
| EXTLH .(VPx) s1(R4), s2(R4)<br>void ISA::OPCV_EXTLH_20b_292 (Vreg4 &s1, Vreg4 &s2)<br>{<br>s2.range(16,31) = _unsigned(s1.range(16,23));<br>s2.range(0,15) = _unsigned(s1.range(8,15));<br>} | HALF WORD EXTRACT, LOW/HIGH |
| EXTLL .(VPx) s1(R4), s2(R4)<br>void ISA::OPCV_EXTLL_20b_291 (Vreg4 &s1, Vreg4 &s2)<br>{<br>s2.range(16,31) = _unsigned(s1.range(16,23));<br>s2.range(0,15) = _unsigned(s1.range(0,7));<br>} | HALF WORD EXTRACT, LOW/LOW |
| IDLE .(SB)<br>void ISA::OPC_IDLE_20b_13 (void)<br>{<br>//This instruction effectively halts<br>//instruction issue until an external<br>//event occurs.<br>Pc = Pc;<br>} | REPETITIVE NOP |

TABLE 20-continued

| Syntax/Pseudocode | Description |
| --- | --- |
| LDB .(SB) *+LBR[s1(U4)], s2(R4)<br>void ISA::OPC_LDB_20b_50 (U4 &s1,Gpr &s2)<br>{<br> s2 = dmem->byte(Lbr+s1);<br>} | LOAD SIGNED BYTE, LBR, +U4 OFFSET |
| LDB .(SB) *+LBR[s1(R4)], s2(R4)<br>void ISA::OPC_LDB_20b_55 (Gpr &s1, Gpr &s2)<br>{<br> s2 = dmem->byte(Lbr+s1);<br>} | LOAD SIGNED BYTE, LBR, +REG OFFSET |
| LDB .(SB) *LBR++[s1(U4)], s2(R4)<br>void ISA::OPC_LDB_20b_60 (U4 &s1, Gpr &s2)<br>{<br> s2 = dmem->byte(Lbr);<br>Lbr += s1;<br>} | LOAD SIGNED BYTE, LBR, +U4 OFFSET POST ADJ |
| LDB .(SB) *LBR++[s1(R4)], s2(R4)<br>void ISA::OPC_LDB_20b_65 (Gpr &s1, Gpr &s2)<br>{<br> s2 = dmem->byte(Lbr);<br> Lbr += s1;<br>} | LOAD SIGNED BYTE, LBR, +REG OFFSET, POST ADJ |
| LDB .(SB) *+s1(R4), s2(R4)<br>void ISA::OPC_LDB_20b_70 (Gpr &s1, Gpr &s2)<br>{<br> s2 = dmem->byte(s1);<br>} | LOAD SIGNED BYTE, ZERO OFFSET |
| LDB .(SB) *s1(R4)++, s2(R4)<br>void ISA::OPC_LDB_20b_75 (Gpr &s1, Gpr &s2)<br>{<br> s2 = dmem->byte(s1);<br> ++s1;<br>} | LOAD SIGNED BYTE, ZERO OFFSET, POST INC |
| LDB .(SB) *+s1[s2(U20)], s3(R4)<br>void ISA::OPC_LDB_40b_188 (Gpr &s1, U20 &s2, Gpr &s3)<br>{<br> s3 = dmem->byte(s1+s2);<br>} | LOAD SIGNED BYTE, +U20 OFFSET |
| LDB .(SB) *s1++[s2(U20)], s3(R4)<br>void ISA::OPC_LDB_40b_193 (Gpr &s1, U20 &s2, Gpr &s3)<br>{<br> s3 = dmem->byte(s1);<br> s1 += s2;<br>} | LOAD SIGNED BYTE, +U20 OFFSET, POST ADJ |
| LDB .(V3) *+s1(R4), s2(R4)<br>void ISA::OPCV_LDB_20b_25 (Vreg4 &s1, Vreg4 &s2)<br>{<br> s2.clear( );<br> s2 = dmem->byte(s1);<br>} | LOAD SIGNED BYTE, ZERO OFFSET |
| LDB .(V3) *s1(R4)++, s2(R4)<br>void ISA::OPCV_LDB_20b_30 (Vreg4 &s1, Vreg4 &s2)<br>{<br> s2.clear( );<br> s2 = dmem->byte(s1);<br> ++s1;<br>} | LOAD SIGNED BYTE, ZERO OFFSET, POST INC |
| LDB .(SB) *+LBR[s1(U24)], s2(R4)<br>void ISA::OPC_LDB_40b_198 (U24 &s1, Gpr &s2)<br>{<br> s2 = dmem->byte(Lbr+s1);<br>} | LOAD SIGNED BYTE, LBR, +U24 OFFSET |
| LDB .(SB) *LBR++[s1(U24)], s2(R4)<br>void ISA::OPC_LDB_40b_203 (U24 &s1, Gpr &s2)<br>{<br> s2 = dmem->byte(Lbr+s1);<br> ++Lbr;<br>} | LOAD SIGNED BYTE, LBR, +U24 OFFSET, POST ADJ |
| LDB .(SB) *s1(U24),s2(R4)<br>void ISA::OPC_LDB_40b_208 (U24 &s1, Gpr &s2)<br>{<br> s2 = dmem->byte(s1);<br>} | LOAD SIGNED BYTE, U24 IMM ADDRESS |
| LDB .(SB) *+SP[s1(U24)], s2(R4)<br>void ISA::OPC_LDB_40b_258 (U24 &s1, Gpr &s2)<br>{<br> s2 = sign_extend(dmem->byte(Sp+s1));<br>} | LOAD BYTE, SP, +U24 OFFSET |

TABLE 20-continued

| Syntax/Pseudocode | Description |
|---|---|
| LDBU .(SB) *+LBR[s1(U4)], s2(R4)<br>void ISA::OPC_LDBU_20b_47 (U4 &s1,Gpr &s2)<br>{<br>s2.clear( );<br>s2 = dmem->ubyte(Lbr+s1);<br>} | LOAD UNSIGNED BYTE, LBR, +U4 OFFSET |
| LDBU .(SB) *+LBR[s1(R4)], s2(R4)<br>void ISA::OPC_LDBU_20b_52 (Gpr &s1, Gpr &s2)<br>{<br>s2.clear( );<br>s2 = dmem->ubyte(Lbr+s1);<br>} | LOAD UNSIGNED BYTE, LBR, +REG OFFSET |
| LDBU .(SB) *LBR++[s1(U4)], s2(R4)<br>void ISA::OPC_LDBU_20b_57 (U4 &s1, Gpr &s2)<br>{<br>s2.clear( );<br>s2 = dmem->ubyte(Lbr);<br>Lbr += s1;<br>} | LOAD UNSIGNED BYTE, LBR, +U4 OFFSET POST ADJ |
| LDBU .(SB) *LBR++[s1(R4)], s2(R4)<br>void ISA::OPC_LDBU_20b_62 (Gpr &s1, Gpr &s2)<br>{<br>s2.clear( );<br>s2 = dmem->ubyte(Lbr);<br>Lbr += s1;<br>} | LOAD UNSIGNED BYTE, LBR, +REG OFFSET, POST ADJ |
| LDBU .(SB) *+s1(R4), s2(R4)<br>void ISA::OPC_LDBU_20b_67 (Gpr &s1, Gpr &s2)<br>{<br>s2.clear( );<br>s2 = dmem->ubyte(s1);<br>} | LOAD UNSIGNED BYTE, ZERO OFFSET |
| LDBU .(SB) *s1(R4)++, s2(R4)<br>void ISA::OPC_LDBU_20b_72 (Gpr &s1, Gpr &s2)<br>{<br>s2.clear( );<br>s2 = dmem->ubyte(s1);<br>++s1;<br>} | LOAD UNSIGNED BYTE, ZERO OFFSET, POST INC |
| LDBU .(SB) *+s1[s2(U20)], s3(R4)<br>void ISA::OPC_LDBU_40b_185 (Gpr &s1, U20 &s2, Gpr &s3)<br>{<br>s3.clear( );<br>s3.byte(0) = dmem->ubyte(s1+s2);<br>} | LOAD UNSIGNED BYTE, +U20 OFFSET |
| LDBU .(SB) *s1++[s2(U20)], s3(R4)<br>void ISA::OPC_LDBU_40b_190 (Gpr &s1, U20 &s2, Gpr &s3)<br>{<br>s3.clear( );<br>s3.byte(0) = dmem->ubyte(s1+s2);<br>s1+= s2;<br>} | LOAD UNSIGNED BYTE, +U20 OFFSET, POST ADJ |
| LDBU .(SB) *+LBR[s1(U24)], s2(R4)<br>void ISA::OPC_LDBU_40b_195 (U24 &s1, Gpr &s2)<br>{<br>s2.clear( );<br>s2.byte(0) = dmem->ubyte(Lbr+s1);<br>} | LOAD UNSIGNED BYTE, LBR, +U24 OFFSET |
| LDBU .(SB) *LBR++[s1(U24)], s2(R4)<br>void ISA::OPC_LDBU_40b_200 (U24 &s1, Gpr &s2)<br>{<br>s2.clear( );<br>s2.byte(0) = dmem->ubyte(Lbr);<br>Lbr += s1;<br>} | LOAD UNSIGNED BYTE, LBR, +U24 OFFSET, POST ADJ |
| LDBU .(SB) *s1(U24),s2(R4)<br>void ISA::OPC_LDBU_40b_205 (U24 &s1, Gpr &s2)<br>{<br>s2.clear( );<br>s2.byte(0) = dmem->ubyte(s1);<br>} | LOAD UNSIGNED BYTE, U24 IMM ADDRESS |
| LDBU .(SB) *+SP[s1(U24)], s2(R4)<br>void ISA::OPC_LDBU_40b_255 (U24 &s1,Gpr &s2)<br>{<br>s2.clear( );<br>s2.byte(0) = dmem->ubyte(Sp+s1);<br>} | LOAD UNSIGNED BYTE, SP, +U24 OFFSET |

TABLE 20-continued

| Syntax/Pseudocode | Description |
|---|---|
| LDBU .(V3) *+s1(R4), s2(R4)<br>void ISA::OPCV_LDBU_20b_22 (Vreg4 &s1, Vreg4 &s2)<br>{<br>s2.clear( );<br>s2 = dmem->ubyte(s1);<br>} | LOAD UNSIGNED BYTE, ZERO OFFSET |
| LDBU .(V3) *s1(R4)++, s2(R4)<br>void ISA::OPCV_LDBU_20b_27 (Vreg4 &s1, Vreg4 &s2)<br>{<br>s2.clear( );<br>s2 = dmem->ubyte(s1);<br>++s1;<br>} | LOAD UNSIGNED BYTE, ZERO OFFSET, POST INC |
| LDH .(SB) *+LBR[s1(U4)], s2(R4)<br>void ISA::OPC_LDH_20b_51 (U4 &s1,Gpr &s2)<br>{<br>s2 = dmem->half(Lbr+(s1<<1));<br>} | LOAD SIGNED HALF, LBR, +U4 OFFSET |
| LDH .(SB) *+LBR[s1(R4)], s2(R4)<br>void ISA::OPC_LDH_20b_56 (Gpr &s1, Gpr &s2)<br>{<br>s2 = dmem->half(Lbr+s1);<br>} | LOAD SIGNED HALF, LBR, +REG OFFSET |
| LDH .(SB) *LBR++[s1(U4)], s2(R4)<br>void ISA::OPC_LDH_20b_61 (U4 &s1, Gpr &s2)<br>{<br>s2 = dmem->half(Lbr);<br>Lbr += s1<<1;<br>} | LOAD SIGNED HALF, LBR, +U4 OFFSET POST ADJ |
| LDH .(SB) *LBR++[s1(R4)], s2(R4)<br>void ISA::OPC_LDH_20b_66 (Gpr &s1, Gpr &s2)<br>{<br>s2 = dmem->half(Lbr);<br>Lbr += s1;<br>} | LOAD SIGNED HALF, LBR, +REG OFFSET, POST ADJ |
| LDH .(SB) *+s1(R4), s2(R4)<br>void ISA::OPC_LDH_20b_71 (Gpr &s1, Gpr &s2)<br>{<br>s2 = dmem->half(s1);<br>} | LOAD SIGNED HALF, ZERO OFFSET |
| LDH .(SB) *s1(R4)++, s2(R4)<br>void ISA::OPC_LDH_20b_76 (Gpr &s1, Gpr &s2)<br>{<br>s2 = dmem->half(s1);<br>s1 += 2;<br>} | LOAD SIGNED HALF, ZERO OFFSET, POST INC |
| LDH .(SB) *+s1[s2(U20)], s3(R4)<br>void ISA::OPC_LDH_40b_189 (Gpr &s1, U20 &s2, Gpr &s3)<br>{<br>s3 = dmem->half(s1+(s2<<1));<br>} | LOAD SIGNED HALF, +U20 OFFSET |
| LDH .(SB) *s1++[s2(U20)], s3(R4)<br>void ISA::OPC_LDH_40b_194 (Gpr &s1, U20 &s2, Gpr &s3)<br>{<br>s3 = dmem->half(s1);<br>s1 += s2<<1;<br>} | LOAD SIGNED HALF, +U20 OFFSET, POST ADJ |
| LDH .(SB) *+LBR[s1(U24)], s2(R4)<br>void ISA::OPC_LDH_40b_199 (U24 &s1, Gpr &s2)<br>{<br>s2 = dmem->half(Lbr+(s1<<1));<br>} | LOAD SIGNED HALF, LBR, +U24 OFFSET |
| LDH .(SB) *LBR++[s1(U24)], s2(R4)<br>void ISA::OPC_LDH_40b_204 (U24 &s1, Gpr &s2)<br>{<br>s2 = dmem->half(Lbr);<br>Lbr += s1<<1;<br>} | LOAD SIGNED HALF, LBR, +U24 OFFSET, POST ADJ |
| LDH .(SB) *s1(U24),s2(R4)<br>void ISA::OPC_LDH_40b_209 (U24 &s1, Gpr &s2)<br>{<br>s2 = dmem->half(s1<<1);<br>} | LOAD SIGNED HALF, U24 IMM ADDRESS |
| LDH .(SB) *+SP[s1(U24)], s2(R4)<br>void ISA::OPC_LDH_40b_259 (U24 &s1, Gpr &s2)<br>{<br>s2 = sign_extend(dmem->half(Sp+(s1<<1)));<br>} | LOAD HALF, SP, +U24 OFFSET |

TABLE 20-continued

| Syntax/Pseudocode | Description |
|---|---|
| LDH .(V3) *+s1(R4), s2(R4)<br>void ISA::OPCV_LDH_20b_26 (Vreg4 &s1, Vreg4 &s2)<br>{<br>s2.clear( );<br>s2 = dmem->half(s1);<br>} | OAD SIGNED HALF, ZERO OFFSET |
| LDH .(V3) *s1(R4)++, s2(R4)<br>oid ISA::OPCV_LDH_20b_31 (Vreg4 &s1, Vreg4 &s2)<br>{<br>s2.clear( );<br>s2 = dmem->half(s1);<br>++s1;<br>} | LOAD SIGNED HALF, ZERO OFFSET, POST INC |
| LDHU .(SB) *+LBR[s1(U4)], s2(R4)<br>void ISA::OPC_LDHU_20b_48 (U4 &s1,Gpr &s2)<br>{<br>s2.clear( );<br>s2 = dmem->uhalf(Lbr+(s1<<1));<br>} | LOAD UNSIGNED HALF, LBR, +U4 OFFSET |
| LDHU .(SB) *+LBR[s1(R4)], s2(R4)<br>void ISA::OPC_LDHU_20b_53 (Gpr &s1, Gpr &s2)<br>{<br>s2.clear( );<br>s2 = dmem->uhalf(Lbr+s1);<br>} | LOAD UNSIGNED HALF, LBR, +REG OFFSET |
| LDHU .(SB) *LBR++[s1(U4)], s2(R4)<br>void ISA::OPC_LDHU_20b_58 (U4 &s1, Gpr &s2)<br>{<br>s2.clear( );<br>s2 = dmem->uhalf(Lbr);<br>Lbr += s1<<1;<br>} | LOAD UNSIGNED HALF, LBR, +U4 OFFSET POST ADJ |
| LDHU .(SB) *LBR++[s1(R4)], s2(R4)<br>void ISA::OPC_LDHU_20b_63 (Gpr &s1, Gpr &s2)<br>{<br>s2.clear( );<br>s2 = dmem->uhalf(Lbr);<br>Lbr += s1;<br>} | LOAD UNSIGNED HALF, LBR, +REG OFFSET, POST ADJ |
| LDHU .(SB) *+s1(R4), s2(R4)<br>void ISA::OPC_LDHU_20b_68 (Gpr &s1, Gpr &s2)<br>{<br>s2.clear( );<br>s2 = dmem->uhalf(s1);<br>} | LOAD UNSIGNED HALF, ZERO OFFSET |
| LDHU .(SB) *s1(R4)++, s2(R4)<br>void ISA::OPC_LDHU_20b_73 (Gpr &s1, Gpr &s2)<br>{<br>s2.clear( );<br>s2 = dmem->uhalf(s1);<br>s1 += 2;<br>} | LOAD UNSIGNED HALF, ZERO OFFSET, POST INC |
| LDHU .(SB) *+s1[s2(U20)], s3(R4)<br>void ISA::OPC_LDHU_40b_186 (Gpr &s1, U20 &s2, Gpr &s3)<br>{<br>s3.clear( );<br>s3.half(0) = dmem->uhalf(s1+(s2<<1));<br>} | LOAD UNSIGNED HALF, +U20 OFFSET |
| LDHU .(SB) *s1++[s2(U20)], s3(R4)<br>void ISA::OPC_LDHU_40b_191 (Gpr &s1, U20 &s2, Gpr &s3)<br>{<br>s3.clear( );<br>s3.half(0) = dmem->uhalf(s1);<br>s1 += s2<<1;<br>} | LOAD UNSIGNED HALF, +U20 OFFSET, POST ADJ |
| LDHU .(SB) *+LBR[s1(U24)], s2(R4)<br>void ISA::OPC_LDHU_40b_196 (U24 &s1, Gpr &s2)<br>{<br>s2.clear( );<br>s2.half(0) = dmem->uhalf(Lbr+(s1<<1));<br>} | LOAD UNSIGNED HALF, LBR, +U24 OFFSET |
| LDHU .(SB) *LBR++[s1(U24)], s2(R4)<br>void ISA::OPC_LDHU_40b_201 (U24 &s1, Gpr &s2)<br>{<br>s2.clear( );<br>s2.half(0) = dmem->uhalf(Lbr);<br>Lbr += s1<<1;<br>} | LOAD UNSIGNED HALF, LBR, +U24 OFFSET, POST ADJ |

TABLE 20-continued

| Syntax/Pseudocode | Description |
|---|---|
| LDHU .(SB) *s1(U24),s2(R4)<br>void ISA::OPC_LDHU_40b_206 (U24 &s1, Gpr &s2)<br>{<br>s2.clear( );<br>s2.half(0) = dmem->uhalf(s1<<1);<br>} | LOAD UNSIGNED HALF, U24 IMM ADDRESS |
| LDHU .(SB) *+SP[s1(U24)], s2(R4)<br>void ISA::OPC_LDHU_40b_256 (U24 &s1,Gpr &s2)<br>{<br>s2.clear( );<br>s2.half(0) = dmem->uhalf(Sp+(s1<<1));<br>} | LOAD UNSIGNED HALF, SP, +U24 OFFSET |
| LDHU .(V3) *+s1(R4), s2(R4)<br>void ISA::OPCV_LDHU_20b_23 (Vreg4 &s1, Vreg4 &s2)<br>{<br>s2.clear( );<br>s2 = dmem->uhalf(s1);<br>} | LOAD UNSIGNED HALF, ZERO OFFSET |
| LDHU .(V3) *s1(R4)++, s2(R4)<br>void ISA::OPCV_LDHU_20b_23 (Vreg4 &s1, Vreg4 &s2)<br>{<br>s2.clear( );<br>s2 = dmem->uhalf(s1);<br>} | LOAD UNSIGNED HALF, ZERO OFFSET, POST INC |
| LDRF .SB s1(R4), s2(R4)<br>void ISA::OPC_LDRF_20b_80 (Gpr &s1, Gpr &s2)<br>{<br>if(s1 <= s2)<br>{<br>for(int r=s2.address( );r<s1.address( );--r)<br>{<br>Sp += 4;<br>gprs[r] = dmem->read(Sp.value( ));<br>}<br>}<br>} | LOAD REGISTER FILE RANGE |
| LDSYS .(SB) s1(R4), s2(R4)<br>void ISA::OPC_LDSYS_20b_162 (Gpr &s1, Gpr &s2)<br>{<br>gls_is_load._assert(1);<br>gls_attr_valid._assert(1);<br>gls_is_ldsys._assert(1);<br>gls_regf_addr._assert(s2.address( ));<br>gls_sys_addr._assert(s1);<br>} | LOAD SYSTEM ATTRIBUTE (GLS) |
| LDW .(SB) *+LBR[s1(U4)], s2(R4)<br>void ISA::OPC_LDW_20b_49 (U4 &s1,Gpr &s2)<br>{<br>s2.clear( );<br>s2 = dmem->word(Lbr+(s1<<2));<br>} | LOAD WORD, LBR, +U4 OFFSET |
| LDW .(SB) *+LBR[s1(R4)], s2(R4)<br>void ISA::OPC_LDW_20b_54 (Gpr &s1, Gpr &s2)<br>{<br>s2 = dmem->word(Lbr+s1);<br>} | LOAD WORD, LBR, +REG OFFSET |
| LDW .(SB) *LBR++[s1(U4)], s2(R4)<br>void ISA::OPC_LDW_20b_59 (U4 &s1, Gpr &s2)<br>{<br>s2 = dmem->half(Lbr);<br>Lbr += s1<<2;<br>} | LOAD WORD, LBR, +U4 OFFSET POST ADJ |
| LDW .(SB) *LBR++[s1(R4)], s2(R4)<br>void ISA::OPC_LDW_20b_64 (Gpr &s1, Gpr &s2)<br>{<br>s2 = dmem->word(Lbr);<br>Lbr += s1;<br>} | LOAD WORD, LBR, +REG OFFSET, POST ADJ |
| LDW .(SB) *+s1(R4), s2(R4)<br>void ISA::OPC_LDW_20b_69 (Gpr &s1, Gpr &s2)<br>{<br>s2 = dmem->word(s1);<br>} | LOAD WORD, ZERO OFFSET |
| LDW .(SB) *s1(R4)++, s2(R4)<br>void ISA::OPC_LDW_20b_74 (Gpr &s1, Gpr &s2)<br>{ | LOAD WORD, ZERO OFFSET, POST INC |

TABLE 20-continued

| Syntax/Pseudocode | Description |
|---|---|
| s2 = dmem->word(s1); | |
| s1 += 4; | |
| } | |
| LDW .(SB) *+s1[s2(U20)], s3(R4) | LOAD WORD, |
| void ISA::OPC_LDW_40b_187 (Gpr &s1, U20 &s2, Gpr &s3) | +U20 OFFSET |
| { | |
| s3 = dmem->word(s1+(s2<<2)); | |
| } | |
| LDW .(SB) *s1++[s2(U20)], s3(R4) | LOAD WORD, |
| void ISA::OPC_LDW_40b_192 (Gpr &s1, U20 &s2, Gpr &s3) | +U20 OFFSET, |
| { | POST ADJ |
| s3 = dmem->word(s1); | |
| s1 += s2<<2; | |
| } | |
| LDW .(SB) *+LBR[s1(U24)], s2(R4) | LOAD WORD, |
| void ISA::OPC_LDW_40b_197 (U24 &s1, Gpr &s2) | LBR, +U24 |
| { | OFFSET |
| s2 = dmem->word(Lbr+(s1<<2)); | |
| } | |
| LDW .(SB) *LBR++[s1(U24)], s2(R4) | LOAD WORD, |
| void ISA::OPC_LDW_40b_202 (U24 &s1, Gpr &s2) | LBR, +U24 |
| { | OFFSET, POST |
| s2 = dmem->word(Lbr); | ADJ |
| Lbr += s1<<2; | |
| } | |
| LDW .(SB) *s1(U24),s2(R4) | LOAD WORD, U24 |
| void ISA::OPC_LDW_40b_207 (U24 &s1, Gpr &s2) | IMM ADDRESS |
| { | |
| s2 = dmem->word(s1<<2); | |
| } | |
| LDW .(SB) *+SP[s1(U24)], s2(R4) | LOAD WORD, SP, |
| void ISA::OPC_LDW_40b_257 (U24 &s1, Gpr &s2) | +U24 OFFSET |
| { | |
| s2.word(0) = dmem->word(Sp+(s1<<2)); | |
| } | |
| LDW .(V3) *+s1(R4), s2(R4) | LOAD WORD, |
| void ISA::OPCV_LDW_20b_24 (Vreg4 &s1, Vreg4 &s2) | ZERO OFFSET |
| { | |
| s2.clear( ); | |
| s2 = dmem->word(s1); | |
| } | |
| LDW .(V3) *s1(R4)++, s2(R4) | LOAD WORD, |
| void ISA::OPCV_LDW_20b_29 (Vreg4 &s1, Vreg4 &s2) | ZERO OFFSET, |
| { | POST INC |
| s2.clear( ); | |
| s2 = dmem->word(s1); | |
| LMOD .(SA,SB) s1(R4), s2(R4) | LEFT MOST ONE |
| void ISA::OPC_LMOD_20b_82 (Gpr &s1, Gpr &s2, Unit &unit) | DETECT |
| { | |
| int test = 1; | |
| int width = s1.size( ) − 1; | |
| int i; | |
| for(i=0;i<=width;++i) | |
| { | |
| if(s1.bit(width−i) == test) break; | |
| } | |
| s2 = i; | |
| Csr.bit(EQ,unit) = s2.zero( ); | |
| } | |
| LMOD .(V,VP) s1(R4), s2(R4) | LEFT MOST ONE |
| void ISA::OPCV_LMOD_20b_35 (Vreg4 &s1, Vreg4 &s2, Unit &unit) | DETECT |
| { | |
| int test = 1; | |
| int width,i; | |
| if(isVPunit(unit)) | |
| { | |
| width = (s1.size( )>>1) − 1; | |
| for(i=0;i<=width;++i) | |
| { | |
| if(s1.bit(width−i) == test) break; | |
| } | |
| s2 = i; | |
| width = s1.size( ) − 1; | |
| int numbits = (s1.size( )>>1)−1; | |
| for(i=0;i<=numbits;++i) | |
| { | |

TABLE 20-continued

```
Syntax/Pseudocode                                                    Description

      if(s1.bit(width−i) == test) break;
    }
    s2.range(16,31) = i;
  } else
  {
    width = s1.size( ) − 1;
    for(i=0;i<=width;++i)
    {
      if(s1.bit(width−i) == test) break;
    }
    s2 = i;
  }
}
LMODC .(SA,SB) s1(R4), s2(R4)                                        LEFT MOST ONE
void ISA::OPC_LMODC_20b_83 (Gpr &s1, Gpr &s2, Unit &unit)            DETECT W/
{                                                                    CLEAR
  int test = 1;
  int width = s1.size( ) − 1;
  int i;
  for(i=0;i<=width;++i)
  {
    if(s1.bit(width−i) == test)
    {
      s1.bit(width−i) = !(test&0x1);
      break;
    }
  }
  s2 = i;
  Csr.bit(EQ,unit) = s2.zero( );
}
LMODC .(V,VP) s1(R4), s2(R4)                                         LEFT MOST ONE
void ISA::OPCV_LMODC_20b_36 (Vreg4 &s1, Vreg4 &s2, Unit &unit)       DETECT W/
{                                                                    CLEAR
  int test = 1;
  int width,i;
  if(isVPunit(unit))
{
    width = (s1.size( )>>1) − 1;
    for(i=0;i<=width;++i)
    {
      if(s1.bit(width−i) == test)
      {
        s1.bit(width−i) = !(test&0x1);
        break;
      }
    }
    s2 = i;
    width     = s1.size( ) − 1;
    int numbits = (s1.size( )>>1)−1;
    for(i=0;i<=numbits;++i)
    {
      if(s1.bit(width−i) == test)
      {
        s1.bit(width−i) = !(test&0x1);
        break;
      }
    }
    s2.range(16,31) = i;
  } else
  {
  width = s1.size( ) − 1;
    for(i=0;i<=width;++i)
    {
      if(s1.bit(width−i) == test)
      {
        s1.bit(width−i) = !(test&0x1);
        break;
      }
    }
    s2 = i;
  }
}
LMZD .(SA,SB) s1(R4), s2(R4)                                         LEFT MOST ZERO
void ISA::OPC_LMZD_20b_84 (Gpr &s1, Gpr &s2, Unit &unit)             DETECT
{
  int test = 0;
  int width = s1.size( ) − 1;
  int i;
```

TABLE 20-continued

| Syntax/Pseudocode | Description |
|---|---|
| for(i=0;i<=width;++i) { if(s1.bit(width−i) == test) break; } s2 = i; Csr.bi | |
| LMZD .(V,VP) s1(R4), s2(R4) void ISA::OPCV_LMZD_20b_37 (Vreg4 &s1, Vreg4 &s2, Unit &unit) { int test = 0; int width = s1.size( ) − 1; int i; for(i=0;i<=width;++i) { if(s1.bit(width−i) == test) break; } s2 = i; Csr.bit(EQ,unit) = s2.zero( ); } | LEFT MOST ZERO DETECT |
| LMZDS .(SA,SB) s1(R4), s2(R4) void ISA::OPC_LMZDS_20b_85 (Gpr &s1, Gpr &s2, Unit &unit) { int test = 0; int width = s1.size( ) − 1; int i; for(i=0;i<=width;++i) { if(s1.bit(width−i) == test) { s1.bit(width−i) = !(test&0x1); break; } } s2 = i; Csr.bit(EQ,unit) = s2.zero( ); } | LEFT MOST ZERO DETECT W/ SET |
| LMZDS .(V,VP) s1(R4), s2(R4) void ISA::OPCV_LMZDS_20b_38 (Vreg4 &s1, Vreg4 &s2, Unit &unit) { int test = 0; int width,i; if(isVPunit(unit)) { width = (s1.size( )>>1) − 1; for(i=0;i<=width;++i) { if(s1.bit(width−i) == test) break; } s2 = i; } else { width = s1.size( ) − 1; int numbits = (s1.size( )>>1)−1; for(i=0;i<=numbits;++i) { if(s1.bit(width−i) == test) break; } s2.range(16,31) = i; width = s1.size( ) − 1; for(i=0;i<=width;++i) { if(s1.bit(width−i) == test) break; } s2 = i; } } | LEFT MOST ZERO DETECT W/ SET |
| MAX .(SA,SB) s1(R4), s2(R4) void ISA::OPC_MAX_20b_121 (Gpr &s1, Gpr &s2,Unit &unit) { Csr.bit(LT,unit) = s2 < s1; Csr.bit(GT,unit) = s2 > s1; Csr.bit(EQ,unit) = s2 == s1; if(Csr.bit(LT,unit)) s2 = s1; } | SIGNED MAXIMUM |
| MAX .(V,VP) s1(R4), s2(R4) void ISA::OPCV_MAX_20b_72 (Vreg4 &s1, Vreg4 &s2, Unit &unit) { | SIGNED MAXIMUM |

TABLE 20-continued

| Syntax/Pseudocode | Description |
|---|---|
| if(isVPunit(unit))<br>{<br>Vr15.bit(LTA) = (s2.range(0,15)) < (s1.range(0,15));<br>Vr15.bit(GTA) = (s2.range(0,15)) > (s1.range(0,15));<br>Vr15.bit(EQA) = (s2.range(0,15)) == (s1.range(0,15));<br>if(Vr15.bit(LTA)) (s2.range(0,15)) = (s1.range(0,15));<br>Vr15.bit(LTB) = (s2.range(16,31)) < (s1.range(16,31));<br>Vr15.bit(GTB) = (s2.range(16,31)) > (s1.range(16,31));<br>Vr15.bit(EQB) = (s2.range(16,31)) == (s1.range(16,31));<br>if(Vr15.bit(LTB)) (s2.range(16,31)) = (s1.range(16,31));<br>} else<br>{<br>Vr15.bit(LT) = (s2) < (s1);<br>Vr15.bit(GT) = (s2) > (s1);<br>Vr15.bit(EQ) = (s2) == (s1);<br>if(Vr15.bit(LT)) (s2) = (s1);<br>}<br>} | |
| MAX2 .(SA,SB) s1(R4), s2(R4)<br>void ISA::OPC_MAX2_20b_133 (Gpr &s1, Gpr &s2)<br>{<br>Result tmp;<br>tmp.range(0,15) = s1.range(16,31) > s2.range( 0,15)<br>? s1.range(16,31) : s2.range( 0,15);<br>tmp.range(16,31) = s1.range( 0,15) > s2.range(16,31)<br>? s1.range( 0,15) : s2.range(16,31);<br>s2.range(16,31) = s1.range(16,31) > s2.range(16,31)<br>? s1.range(16,31) : s2.range(16,31);<br>s2.range( 0,15) = s1.range(16,31) > s2.range(16,31)<br>? tmp.range(16,31) : tmp.range( 0,15);<br>} | HALF WORD MAXIMUM w/ REORDER |
| MAX2 .(VPx) s1(R4), s2(R4)<br>void ISA::OPCV_MAX2_20b_133 (Vreg4 &s1, Vreg4 &s2)<br>{<br>Result tmp;<br>tmp.range(16,31) = s1.range(16,31)>=s2.range(16,31) ?<br>s1.range(16,31) : s2.range(16,31);<br>tmp.range(0,15) = s1.range(0,15)>=s2.range(0,15) ?<br>s1.range(0,15) : s2.range(0,15);<br>s2.range(16,31) = tmp.range(16,31)>=tmp.range(0,15) ?<br>tmp.range(16,31) : tmp.range(0,15);<br>s2.range(0,15) = tmp.range(16,31)>=tmp.range(0,15) ?<br>tmp.range(0,15) : tmp.range(16,31);<br>} | HALF WORD MAXIMUM w/ REORDER |
| MAX2U .(SA,SB) s1(R4), s2(R4)<br>void ISA::OPC_MAX2U_20b_156 (Gpr &s1, Gpr &s2)<br>{<br>Result tmp;<br>tmp.range(0,15) = (s1.range(0,15) >=s2.range(0,15)) ? s1.range(0,15):<br>s2.range(0,15);<br>tmp.range(16,31) = (s1.range(16,31) >=s2.range(16,31)) ? s1.range(16,31)<br>:s2.range(16,31);<br>s2.range(0,15) = (tmp.range(16,31)>=tmp.range(0,15)) ? tmp.range(16,31)<br>:tmp.range(0,15);<br>s2.range(16,31) = (tmp.range(16,31)>=tmp.range(0,15)) ? tmp.range(0,15)<br>:tmp.range(16,31);<br>} | HALF WORD MAXIMUM w/ REORDER, UNSIGNED |
| MAX2U .(VPx) s1(R4), s2(R4)<br>void ISA::OPCV_MAX2U_20b_153 (Vreg4 &s1, Vreg4 &s2)<br>{<br>Result tmp;<br>tmp.range(0,15) = (s1.range(0,15) >=s2.range(0,15)) ? s1.range(0,15)<br>:s2.range(0,15);<br>tmp.range(16,31) = (s1.range(16,31) >=s2.range(16,31)) ? s1.range(16,31)<br>:s2.range(16,31);<br>s2.range(0,15) = (tmp.range(16,31)>=tmp.range(0,15)) ? tmp.range(16,31)<br>:tmp.range(0,15);<br>s2.range(16,31) = (tmp.range(16,31)>=tmp.range(0,15)) ? tmp.range(0,15)<br>:tmp.range(16,31);<br>} | HALF WORD MAXIMUM w/ REORDER, UNSIGNED |
| MAXH .(SA,SB) s1(R4), s2(R4)<br>void ISA::OPC_MAXH_20b_131 (Gpr &s1, Gpr &s2)<br>{<br>s2.range( 0,15) = s2.range( 0,15) > s1.range( 0,15)<br>? s2.range( 0,15) : s1.range( 0,15);<br>s2.range(16,31) = s2.range(16,31) > s1.range(16,31)<br>? s2.range(16,31) : s1.range(16,31);<br>} | HALF WORD MAXIMUM |

TABLE 20-continued

| Syntax/Pseudocode | Description |
| --- | --- |
| MAXHU .(SA,SB) s1(R4), s2(R4)<br>void ISA::OPC_MAXHU_20b_132 (Gpr &s1, Gpr &s2)<br>{<br>s2.range( 0,15) = _unsigned(s2.range( 0,15)) > _unsigned(s1.range( 0,15))<br>? s2.range( 0,15) : s1.range( 0,15);<br>s2.range(16,31) = _unsigned(s2.range(16,31)) > _unsigned(s1.range(16,<br>31))<br>? s2.range(16,31) : s1.range(16,31);<br>} | HALF WORD MAXIMUM, UNSIGNED |
| MAXMAX2 .(SA,SB) s1(R4), s2(R4)<br>void ISA::OPC_MAXMAX2_20b_157 (Gpr &s1, Gpr &s2)<br>{<br>Result tmp;<br>tmp.range(16,31) = (s1.range(0,15)>=s2.range(16,31)) ? s1.range(0,15)<br>: s2.range(16,31);<br>tmp.range(0,15) = (s1.range(16,31)>=s2.range(0,15)) ? s1.range(16,31)<br>: s2.range(0,15);<br>s2.range(16,31) = (s1.range(16,31)>=s2.range(16,31)) ? s1.range(16,31)<br>: s2.range(16,31);<br>s2.range(0,15) = (s1.range(16,31)>=s2.range(16,31)) ? tmp.range(16,31)<br>: tmp.range(0,15);<br>} | HALF WORD MAXIMUM AND 2nd MAXIMUM |
| MAXMAX2 .(VPx) s1(R4), s2(R4)<br>void ISA::OPCV_MAXMAX2_20b_154 (Vreg4 &s1, Vreg4 &s2)<br>{<br>Result tmp;<br>tmp.range(16,31) = (s1.range(0,15)>=s2.range(16,31)) ? s1.range(0,15)<br>: s2.range(16,31);<br>tmp.range(0,15) = (s1.range(16,31)>=s2.range(0,15)) ? s1.range(16,31)<br>: s2.range(0,15);<br>s2.range(16,31) = (s1.range(16,31)>=s2.range(16,31)) ? s1.range(16,31)<br>: s2.range(16,31);<br>s2.range(0,15) = (s1.range(16,31)>=s2.range(16,31)) ? tmp.range(16,31)<br>: tmp.range(0,15);<br>} | HALF WORD MAXIMUM AND 2nd MAXIMUM |
| MAXMAX2U .(SA,SB) s1(R4), s2(R4)<br>void ISA::OPC_MAXMAX2U_20b_158 (Gpr &s1, Gpr &s2)<br>{<br>Result tmp;<br>tmp.range(16,31) = (_unsigned(s1.range(0,15)) >=_unsigned(s2.range(16,31)))<br>? s1.range(0,15) : s2.range(16,31);<br>tmp.range(0,15) = (_unsigned(s1.range(16,31))>=_unsigned(s2.range(0,15)))<br>? s1.range(16,31) : s2.range(0,15);<br>s2.range(16,31) = (_unsigned(s1.range(16,31))>=_unsigned(s2.range(16,31)))<br>? s1.range(16,31) : s2.range(16,31);<br>s2.range(0,15) = (_unsigned(s1.range(16,31))>=_unsigned(s2.range(16,31)))<br>? tmp.range(16,31) : tmp.range(0,15);<br>} | HALF WORD MAXIMUM AND 2nd MAXIMUM, UNSIGNED |
| MAXMAX2U .(VPx) s1(R4), s2(R4)<br>void ISA::OPCV_MAXMAX2U_20b_155 (Vreg4 &s1, Vreg4 &s2)<br>{<br>Result tmp;<br>tmp.range(16,31) = (_unsigned(s1.range(0,15)) >=_unsigned(s2.range(16,31)))<br>? s1.range(0,15) : s2.range(16,31);<br>tmp.range(0,15) = (_unsigned(s1.range(16,31))>=_unsigned(s2.range(0,15)))<br>? s1.range(16,31) : s2.range(0,15);<br>s2.range(16,31) = (_unsigned(s1.range(16,31))>=_unsigned(s2.range(16,31)))<br>? s1.range(16,31) : s2.range(16,31); | HALF WORD MAXIMUM AND 2nd MAXIMUM, UNSIGNED |
| MAXU .(SA,SB) s1(R4), s2(R4)<br>void ISA::OPC_MAXU_20b_120 (Gpr &s1, Gpr &s2,Unit &unit)<br>{<br>Csr.bit(LT,unit) = _unsigned(s2) < _unsigned(s1);<br>Csr.bit(GT,unit) = _unsigned(s2) > _unsigned(s1);<br>Csr.bit(EQ,unit) = s2 == s1;<br>if(Csr.bit(LT,unit)) s2 = s1;<br>} | UNSIGNED MAXIMUM |
| MAXU .(V,VP) s1(R4), s2(R4)<br>void ISA::OPCV_MAXU_20b_71 (Vreg4 &s1, Vreg4 &s2, Unit &unit)<br>{<br>if(isVPunit(unit))<br>{<br>Vr15.bit(LTA) = _unsigned(s2.range(0,15)) < _unsigned(s1.range(0,15));<br>Vr15.bit(GTA) = _unsigned(s2.range(0,15)) > _unsigned(s1.range(0,15));<br>Vr15.bit(EQA) = _unsigned(s2.range(0,15)) == _unsigned(s1.range(0,15));<br>if(Vr15.bit(LTA)) s2.range(0,15) = s1.range(0,15);<br>Vr15.bit(LTB) = _unsigned(s2.range(16,31)) < _unsigned(s1.range(16,31));<br>Vr15.bit(GTB) = _unsigned(s2.range(16,31)) > _unsigned(s1.range(16,31));<br>Vr15.bit(EQB) = _unsigned(s2.range(16,31)) == _unsigned(s1.range(16,31)); | UNSIGNED MAXIMUM |

TABLE 20-continued

| Syntax/Pseudocode | Description |
|---|---|
| if(Vr15.bit(LTB)) s2.range(16,31) = s1.range(16,31); | |
| } else | |
| { | |
| Vr15.bit(LT) = _unsigned(s2) < _unsigned(s1); | |
| Vr15.bit(GT) = _unsigned(s2) > _unsigned(s1); | |
| Vr15.bit(EQ) = _unsigned(s2) == _unsigned(s1); | |
| if(Vr15.bit(LT)) s2 = s1; | |
| } | |
| } | |
| MFVRC .(SB) s1(R5),s2(R4) | MOVE VREG TO |
| void ISA::OPC_MFVRC_40b_266 (Vreg &s1, Gpr &s2) | GPR, COLLAPSE |
| { | |
| Event initiate,complete; | |
| Reg s2Save; | |
| risc_is_mfvrc._assert(1); | |
| vec_regf_enz._assert(0); | |
| vec_regf_hwz._assert(0x3); | |
| vec_regf_ra._assert(s1); | |
| s2Save = s2.address( ); | |
| initiate.live(true); | |
| complete.live(vec_wdata_wrz.is(0)); | |
| } | |
| MFVVR .(SB) s1(R5), s2(R5), s3(R4) | MOVE |
| void ISA::OPC_MFVVR_40b_264 (Vunit &s1, Vreg &s2,Gpr &s3) | VUNIT/VREG TO |
| { | GPR |
| Event initiate,complete; | |
| Reg s3Save; | |
| risc_is_mfvvr._assert(1); | |
| vec_regf_ua._assert(s1); | |
| vec_regf_hwz._assert(0x3); | |
| vec_regf_enz._assert(0); | |
| vec_regf_ra._assert(s2); | |
| s3Save = s3.address( ); | |
| initiate.live(true); //this is an modeling artifact | |
| complete.live(vec_wdata_wrz.is(0)); //ditto | |
| } | |
| MIN .(SA,SB) s1(R4), s2(R4) | SIGNED |
| void ISA::OPC_MIN_20b_119 (Gpr &s1, Gpr &s2,Unit &unit) | MINIMUM |
| { | |
| Csr.bit(LT,unit) = s2 < s1; | |
| Csr.bit(GT,unit) = s2 > s1; | |
| Csr.bit(EQ,unit) = s2 == s1; | |
| if(Csr.bit(GT,unit)) s2 = s1; | |
| } | |
| MIN .(V,VP) s1(R4), s2(R4) | SIGNED |
| void ISA::OPCV_MIN_20b_70 (Vreg4 &s1, Vreg4 &s2, Unit &unit) | MINIMUM |
| { | |
| if(isVPunit(unit)) | |
| { | |
| Vr15.bit(LTA) = (s2.range(0,15)) < (s1.range(0,15)); | |
| Vr15.bit(GTA) = (s2.range(0,15)) > (s1.range(0,15)); | |
| Vr15.bit(EQA) = (s2.range(0,15)) == (s1.range(0,15)); | |
| if(Vr15.bit(GTA)) (s2.range(0,15)) = (s1.range(0,15)); | |
| Vr15.bit(LTB) = (s2.range(16,31)) < (s1.range(16,31)); | |
| Vr15.bit(GTB) = (s2.range(16,31)) > (s1.range(16,31)); | |
| Vr15.bit(EQB) = (s2.range(16,31)) == (s1.range(16,31)); | |
| if(Vr15.bit(GTB)) (s2.range(16,31)) = (s1.range(16,31)); | |
| } else | |
| { | |
| Vr15.bit(LT) = (s2) < (s1); | |
| Vr15.bit(GT) = (s2) > (s1); | |
| Vr15.bit(EQ) = (s2) == (s1); | |
| if(Vr15.bit(GT)) (s2) = (s1); | |
| } | |
| } | |
| MIN2 .(SA,SB) s1(R4), s2(R4) | HALF WORD |
| void ISA::OPC_MIN2_20b_166 (Gpr &s1, Gpr &s2) | MINIMUM AND |
| { | 2nd MINIMUM |
| Result tmp; | |
| tmp.range(0,15) = (s1.range(0,15) <s2.range(0,15)) ? s1.range(0,15):s2.range(0,15); | |
| tmp.range(16,31) = (s1.range(16,31) <s2.range(16,31)) ? s1.range(16,31) :s2.range(16,31); | |
| s2.range(0,15) = (tmp.range(16,31)<tmp.range(0,15)) ? tmp.range(16,31) :tmp.range(0,15); | |
| s2.range(16,31) = (tmp.range(16,31)<tmp.range(0,15)) ? tmp.range(0,15) :tmp.range(16,31); | |
| } | |

TABLE 20-continued

| Syntax/Pseudocode | Description |
| --- | --- |
| MIN2 .(VPx) s1(R4), s2(R4)<br>void ISA::OPCV_MIN2_20b_166 (Vreg4 &s1, Vreg4 &s2)<br>{<br>Result tmp;<br>tmp.range(0,15) = (s1.range(0,15) <s2.range(0,15)) ? s1.range(0,15):s2. range(0,15);<br>tmp.range(16,31) = (s1.range(16,31) <s2.range(16,31)) ? s1.range(16,31) :s2.range(16,31);<br>s2.range(0,15) = (tmp.range(16,31)<tmp.range(0,15)) ? tmp.range(16,31) :tmp.range(0,15);<br>s2.range(16,31) = (tmp.range(16,31)<tmp.range(0,15)) ? tmp.range(0,15) :tmp.range(16,31);<br>} | HALF WORD MINIMUM AND 2nd MINIMUM |
| MIN2U .(SA,SB) s1(R4), s2(R4)<br>void ISA::OPC_MIN2U_20b_167 (Gpr &s1, Gpr &s2)<br>{<br>Result tmp;<br>tmp.range(0,15) = (_unsigned(s1.range(0,15)) <_unsigned(s2.range(0,15))) ? s1.range(0,15):s2.range(0,15);<br>tmp.range(16,31) = (_unsigned(s1.range(16,31)) <_unsigned(s2.range(16,31))) ? s1.range(16,31):s2.range(16,31);<br>s2.range(0,15) = (_unsigned(tmp.range(16,31))<_unsigned(tmp.range(0,15))) ? tmp.range(16,31):tmp.range(0,15);<br>s2.range(16,31) = (_unsigned(tmp.range(16,31))<_unsigned(tmp.range(0,15))) ? tmp.range(0,15):tmp.range(16,31);<br>} | HALF WORD MINIMUM AND 2nd MINIMUM, UNSIGNED |
| MIN2U .(VPx) s1(R4), s2(R4)<br>void ISA::OPCV_MIN2U_20b_167 (Vreg4 &s1, Vreg4 &s2)<br>{<br>Result tmp;<br>tmp.range(0,15) = (_unsigned(s1.range(0,15)) <_unsigned(s2.range(0,15))) ? s1.range(0,15):s2.range(0,15);<br>tmp.range(16,31) = (_unsigned(s1.range(16,31)) <_unsigned(s2.range(16,31))) ? s1.range(16,31):s2.range(16,31);<br>s2.range(0,15) = (_unsigned(tmp.range(16,31))<_unsigned(tmp.range(0,15))) ? tmp.range(16,31):tmp.range(0,15);<br>s2.range(16,31) = (_unsigned(tmp.range(16,31))<_unsigned(tmp.range(0,15))) ? tmp.range(0,15):tmp.range(16,31);<br>} | HALF WORD MINIMUM AND 2nd MINIMUM, UNSIGNED |
| MINH .(SA,SB) s1(R4), s2(R4)<br>void ISA::OPC_MINH_20b_160 (Gpr &s1, Gpr &s2, Unit &unit)<br>{<br>s2.range( 0,15) = s2.range( 0,15) < s1.range( 0,15)<br>? s2.range( 0,15) : s1.range( 0,15);<br>s2.range(16,31) = s2.range(16,31) < s1.range(16,31)<br>? s2.range(16,31) : s1.range(16,31);<br>} | HALF WORD MINIMUM |
| MINHU .(SA,SB) s1(R4), s2(R4)<br>void ISA::OPC_MINHU_20b_161 (Gpr &s1, Gpr &s2, Unit &unit)<br>{<br>s2.range( 0,15) = _unsigned(s2.range( 0,15)) < _unsigned(s1.range( 0,15))<br>? s2.range( 0,15) : s1.range( 0,15);<br>s2.range(16,31) = _unsigned(s2.range(16,31)) < _unsigned(s1.range(16,31))<br>? s2.range(16,31) : s1.range(16,31);<br>} | HALF WORD MINIMUM, UNSIGNED |
| MINMIN2 .(SA,SB) s1(R4), s2(R4)<br>void ISA::OPC_MINMIN2_20b_168 (Gpr &s1, Gpr &s2)<br>{<br>Result tmp;<br>tmp.range(16,31) = s1.range(0,15) <s2.range(16,31) ? s1.range(0,15) : s2. range(16,31);<br>tmp.range(0,15) = s1.range(16,31)<s2.range(0,15) ? s2.range(16,31) : s1. range(16,31);<br>s2.range(16,31) = s1.range(16,31)<s2.range(16,31) ? s1.range(16,31) : s2. range(16,31);<br>s2.range(0,15) = s1.range(16,31)<s2.range(16,31) ? tmp.range(16,31): tmp.range(0,15);<br>} | HALF WORD MINIMUM AND 2nd MINIMUM |
| MINMIN2 .(VPx) s1(R4), s2(R4)<br>void ISA::OPCV_MINMIN2_20b_168 (Vreg4 &s1, Vreg4 &s2)<br>{<br>Result tmp;<br>tmp.range(16,31) = s1.range(0,15) <s2.range(16,31) ? s1.range(0,15) : s2. range(16,31);<br>tmp.range(0,15) = s1.range(16,31)<s2.range(0,15) ? s2.range(16,31) : s1. range(16,31); | HALF WORD MINIMUM AND 2nd MINIMUM |

TABLE 20-continued

| Syntax/Pseudocode | Description |
|---|---|
| s2.range(16,31) = s1.range(16,31)<s2.range(16,31) ? s1.range(16,31) : s2.range(16,31);<br>s2.range(0,15) = s1.range(16,31)<s2.range(16,31) ? tmp.range(16,31): tmp.range(0,15);<br>} | |
| MINMIN2U .(SA,SB) s1(R4), s2(R4)<br>void ISA::OPC_MINMIN2U_20b_169 (Gpr &s1, Gpr &s2)<br>{<br>Result tmp;<br>tmp.range(16,31) = _unsigned(s1.range(0,15) )<_unsigned(s2.range(16,31)) ? s1.range(0,15) : s2.range(16,31);<br>tmp.range(0,15) = _unsigned(s1.range(16,31))<_unsigned(s2.range(0,15) ) ? s2.range(16,31) : s1.range(16,31);<br>s2.range(16,31) = _unsigned(s1.range(16,31))<_unsigned(s2.range(16,31)) ? s1.range(16,31) : s2.range(16,31);<br>s2.range(0,15) = _unsigned(s1.range(16,31))<_unsigned(s2.range(16,31)) ? tmp.range(16,31): tmp.range(0,15);<br>} | HALF WORD MINIMUM AND 2nd MINIMUM, UNSIGNED |
| MINMIN2U .(VPx) s1(R4), s2(R4)<br>void ISA::OPCV_MINMIN2U_20b_169 (Vreg4 &s1, Vreg4 &s2)<br>{<br>Result tmp;<br>tmp.range(16,31) = _unsigned(s1.range(0,15) )<_unsigned(s2.range(16,31)) ? s1.range(0,15) : s2.range(16,31);<br>tmp.range(0,15) = _unsigned(s1.range(16,31))<_unsigned(s2.range(0,15) ) ? s2.range(16,31) : s1.range(16,31);<br>s2.range(16,31) = _unsigned(s1.range(16,31))<_unsigned(s2.range(16,31)) ? s1.range(16,31) : s2.range(16,31);<br>s2.range(0,15) = _unsigned(s1.range(16,31))<_unsigned(s2.range(16,31)) ? tmp.range(16,31): tmp.range(0,15);<br>} | HALF WORD MINIMUM AND 2nd MINIMUM, UNSIGNED |
| MINU .(SA,SB) s1(R4), s2(R4)<br>void ISA::OPC_MINU_20b_118 (Gpr &s1, Gpr &s2,Unit &unit)<br>{<br>Csr.bit(LT,unit) = _unsigned(s2) < _unsigned(s1);<br>Csr.bit(GT,unit) = _unsigned(s2) > _unsigned(s1);<br>Csr.bit(EQ,unit) = s2 == s1;<br>if(Csr.bit(GT,unit)) s2 = s1;<br>} | UNSIGNED MINIMUM |
| MINU .(V,VP) s1(R4), s2(R4)<br>void ISA::OPCV_MINU_20b_69 (Vreg4 &s1, Vreg4 &s2, Unit &unit)<br>{<br>if(isVPunit(unit))<br>{<br>Vr15.bit(LTA) = _unsigned(s2.range(0,15)) < _unsigned(s1.range(0,15));<br>Vr15.bit(GTA) = _unsigned(s2.range(0,15)) > _unsigned(s1.range(0,15));<br>Vr15.bit(EQA) = _unsigned(s2.range(0,15)) == _unsigned(s1.range(0,15));<br>if(Vr15.bit(GTA)) s2.range(0,15) = s1.range(0,15);<br>Vr15.bit(LTB) = _unsigned(s2.range(16,31)) < _unsigned(s1.range(16,31));<br>Vr15.bit(GTB) = _unsigned(s2.range(16,31)) > _unsigned(s1.range(16,31));<br>Vr15.bit(EQB) = _unsigned(s2.range(16,31)) == _unsigned(s1.range(16,31));<br>if(Vr15.bit(GTB)) s2.range(16,31) = s1.range(16,31);<br>} else<br>{<br>Vr15.bit(LT) = _unsigned(s2) < _unsigned(s1);<br>Vr15.bit(GT) = _unsigned(s2) > _unsigned(s1);<br>Vr15.bit(EQ) = _unsigned(s2) == _unsigned(s1);<br>if(Vr15.bit(GT)) s2 = s1;<br>}<br>} | UNSIGNED MINIMUM |
| MPY .(SA,SB) s1(R4), s2(R4)<br>void ISA::OPC_MPY_20b_115 (Gpr &s1, Gpr &s2,Unit &unit)<br>{<br>Result r1;<br>r1 = s2.range(0,15)*s1.range(0,15);<br>s2 = r1;<br>Csr.bit(EQ,unit) = s2.zero( );<br>} | SIGNED 16b MULTIPLY |
| MPY .(V,VP) s1(R4), s2(R4)<br>void ISA::OPCV_MPY_20b_66 (Vreg4 &s1, Vreg4 &s2, Unit &unit)<br>{<br>if(isVPunit(unit))<br>{<br>Reg s1lo = s1.range(0,7);<br>Reg s2lo = s2.range(0,7);<br>Result r1lo = s2lo*s1lo;<br>s2.range(LSBL,MSBL) = r1lo.range(0,15); | SIGNED 8b/16b MULTIPLY |

TABLE 20-continued

| Syntax/Pseudocode | Description |
|---|---|
| Reg s1hi = s1.range(16,23); | |
| Reg s2hi = s2.range(16,23); | |
| Result r1hi = s2hi*s2hi; | |
| s2.range(LSBU,MSBU) = r1hi.range(0,15); | |
| Vr15.bit(EQA) = s2.range(LSBL,MSBL)==0; | |
| Vr15.bit(EQB) = s2.range(LSBU,MSBU)==0; | |
| Vr15.bit(CA) = isCarry(s1lo,s2lo,r1lo); | |
| Vr15.bit(CB) = isCarry(s1hi,s2hi,r1hi); | |
| } else | |
| { | |
| Result r1 = s2 * s1; | |
| s2 = r1; | |
| Vr15.bit(EQ) = s2==0; | |
| Vr15.bit(C) = isCarry(s1,s2,r1); | |
| } | |
| } | |
| MPYH .(SA,SB) s1(R4), s2(R4) | SIGNED 16b |
| void ISA::OPC_MPYH_20b_116 (Gpr &s1, Gpr &s2,Unit &unit) | MULTIPLY, HIGH |
| { | HALF WORDS |
| Result r1; | |
| r1 = s2.range(16,31)*s1.range(16,31); | |
| s1 = r1; | |
| Csr.bit(EQ,unit) = s2.zero( ); | |
| } | |
| MPYH .(V,VP) s1(R4), s2(R4) | SIGNED 8b/16b |
| void ISA::OPCV_MPYH_20b_67 (Vreg4 &s1, Vreg4 &s2, Unit &unit) | MULTIPLY, HIGH |
| { | HALF |
| if(isVPunit(unit)) | |
| { | |
| Reg s1lo = s1.range(8,15); | |
| Reg s2lo = s2.range(8,15); | |
| Result r1lo = s2lo*s1lo; | |
| s2.range(LSBL,MSBL) = r1lo.range(0,15); | |
| Reg s1hi = s1.range(24,31); | |
| Reg s2hi = s2.range(24,31); | |
| Result r1hi = s2hi*s1hi; | |
| s2.range(LSBU,MSBU) = r1lo.range(0,15); | |
| Vr15.bit(EQA) = s2.range(LSBL,MSBL)==0; | |
| Vr15.bit(EQB) = s2.range(LSBU,MSBU)==0; | |
| Vr15.bit(CA) = isCarry(s1lo, s2lo, r1lo); | |
| Vr15.bit(CB) = isCarry(s1hi, s2hi, r1hi); | |
| } else | |
| { | |
| Result r1 = s2.range(16,31) * s1.range(16,31); | |
| s2 = r1; | |
| Vr15.bit(EQ) = s2==0; | |
| Vr15.bit(C) = isCarry(s1, s2, r1); | |
| } | |
| } | |
| MPYLH .(SA,SB) s1(R4), s2(R4) | SIGNED 16b |
| void ISA::OPC_MPYLH_20b_117 (Gpr &s1, Gpr &s2,Unit &unit) | MULTIPLY, LOW |
| { | HALF TO HIGH |
| Result r1; | HALF |
| r1 = s2.range(16,31)*s1.range(0,15); | |
| s2 = r1; | |
| Csr.bit(EQ,unit) = s2.zero( ); | |
| } | |
| MPYLH .(V,VP) s1(R4), s2(R4) | SIGNED 8b/16b |
| void ISA::OPCV_MPYLH_20b_68 (Vreg4 &s1, Vreg4 &s2, Unit &unit) | MULTIPLY, LOW |
| { | TO HIGH |
| if(isVPunit(unit)) | |
| { | |
| Reg s1lo = s1.range(0,7); | |
| Reg s2hi = s2.range(8,15); | |
| Result r1lo = s2hi*s1lo; | |
| s2.range(LSBL,MSBL) = r1lo.range(0,15); | |
| Reg s1hi = s1.range(24,31); | |
| Reg s2lo = s2.range(16,23); | |
| Result r1hi = s2hi*s1hi; | |
| s2.range(LSBU,MSBU) = r1hi.range(0,15); | |
| Vr15.bit(EQA) = s2.range(LSBL,MSBL)==0; | |
| Vr15.bit(EQB) = s2.range(LSBU,MSBU)==0; | |
| Vr15.bit(CA) = isCarry(s1lo, s2lo, r1lo); | |
| Vr15.bit(CB) = isCarry(s1hi, s2hi, r1hi); | |
| } else | |
| { | |

TABLE 20-continued

| Syntax/Pseudocode | Description |
|---|---|
| Reg s1lo = s1.range(0,15);<br>Reg s2hi = s2.range(16,23);<br>Result r1 = s2hi * s1lo;<br>s2 = r1;<br>Vr15.bit(EQ) = s2==0;<br>Vr15.bit(C) = isCarry(s1lo, s2hi, r1);<br>}<br>} | |
| MPYU .(SA,SB) s1(R4), s2(R4)<br>void ISA::OPC_MPYU_20b_159 (Gpr &s1, Gpr &s2,Unit &unit)<br>{<br>Result r1;<br>r1 = ((unsigned)s2.range(0,15)) * ((unsigned)s1.range(0,15));<br>s2 = r1;<br>Csr.bit(EQ,unit) = r1.zero( );<br>} | UNSIGNED 16b MULTIPLY |
| MPYU .(V,VP) s1(R4), s2(R4)<br>void ISA::OPCV_MPYU_20b_87 (Vreg4 &s1, Vreg4 &s2, Unit &unit)<br>{<br>if(isVPunit(unit))<br>{<br>Result r1,r2;<br>Reg s1lo = _unsigned(s1.range(0,7));<br>Reg s1hi = _unsigned(s1.range(16,23));<br>Reg s2lo = _unsigned(s2.range(0,7));<br>Reg s2hi = _unsigned(s2.range(16,23));<br>r1 = s1lo * s2lo;<br>r2 = s1hi * s2hi;<br>s2.range(0,15) = r1.range(0,15);<br>s2.range(16,31) = r2.range(0,15);<br>Vr15.bit(EQA) = s2.range(LSBL,MSBL)==0;<br>Vr15.bit(EQB) = s2.range(LSBU,MSBU)==0;<br>Vr15.bit(CA) = isCarry(s1lo,s2lo,r1);<br>Vr15.bit(CB) = isCarry(s1hi,s2hi,r2);<br>} else<br>{<br>Result r1;<br>Reg s2lo = _unsigned(s2.range(0,15));<br>Reg s1lo = _unsigned(s1.range(0,15));<br>r1 = s1lo * s2lo;<br>s2 = r1;<br>Vr15.bit(EQ) = s2==0;<br>Vr15.bit(C) = isCarry(s1lo,s2lo,r1);<br>}<br>} | UNSIGNED 8b/16b MULTIPLY |
| MTV .(SA,SB) s1(R4), s2(R5)<br>void ISA::OPC_MTV_20b_164 (Gpr &s1, Vreg &s2)<br>{<br>Result r1;<br>r1.clear( );<br>r1 = s1.range(0,15);<br>risc_is_mtv._assert(1);<br>vec_regf_enz._assert(0);<br>vec_regf_wa._assert(s2);<br>vec_regf_wd._assert(r1);<br>vec_regf_hwz._assert(0x0); //active low, write both halves<br>} | MOVE GPR TO VREG, REPLICATED (LOW VREG) |
| MTV .(SA,SB) s1(R4), s2(R5)<br>void ISA::OPC_MTV_20b_165 (Gpr &s1, Vreg &s2)<br>{<br>Result r1;<br>r1.clear( );<br>r1.range(16,31) = s1.range(16,31);<br>risc_is_mtv._assert(1);<br>vec_regf_enz._assert(0);<br>vec_regf_wa._assert(s2);<br>vec_regf_wd._assert(r1);<br>vec_regf_hwz._assert(0x0); //active low, write both halves<br>} | MOVE GPR TO VREG, REPLICATED (HIGH VREG) |
| MTVRE .(SB) s1(R4),s2(R5)<br>void ISA::OPC_MTVRE_40b_265 (Gpr &s1, Vreg &s2)<br>{<br>risc_is_mtvre._assert(1);<br>vec_regf_enz._assert(0);<br>vec_regf_wa._assert(s2);<br>vec_regf_wd._assert(s1);<br>vec_regf_hwz._assert(0x0); //active low, both halves<br>} | MOVE GPR TO VREG, EXPAND |

TABLE 20-continued

| Syntax/Pseudocode | Description |
|---|---|
| MTVVR .(SB) s1(R4), s2(R5), s3(R5)<br>void ISA::OPC_MTVVR_40b_263 (Gpr &s1,Vunit &s2,Vreg &s3)<br>{<br>risc_is_mtvvr._assert(1);<br>vec_regf_ua._assert(s2);<br>vec_regf_enz._assert(0);<br>vec_regf_wa._assert(s3);<br>vec_regf_wd._assert(s1);<br>vec_regf_hwz._assert(0x0); //active low, both halves<br>} | MOVE GPR TO VUNIT/VREG |
| MTVVR .SB s1(R4), s2(R4), s3(R5)<br>void ISA::OPC_MTVVR_40b_261 (Gpr &s1,Gpr &s2,Vreg &s3)<br>{<br>risc_is_mtvvr._assert(1);<br>risc_vec_ua._assert(s2.range(0,3));<br>risc_vec_wa._assert(s3);<br>risc_vec_wd._assert(s1);<br>risc_vec_hwz._assert(0x0); //active low, both halves<br>} | MOVE GPR TO VUNIT/VREG |
| MV .(SA,SB) s1(R4), s2(R4)<br>void ISA::OPC_MV_20b_110 (Gpr &s1, Gpr &s2)<br>{<br>s2 = s1;<br>} | MOVE GPR TO GPR |
| MV .(V,VP) s1(R4), s2(R4)<br>void ISA::OPCV_MV_20b_61 (Vreg4 &s1, Vreg4 &s2, Unit &unit)<br>{<br>if(isVPunit(unit))<br>{<br>s2.range(LSBL,MSBL) = s1.range(LSBU,MSBU);<br>s2.range(LSBU,MSBU) = s1.range(LSBL,MSBL);<br>} else<br>{<br>s2 = s1;<br>}<br>} | MOVE VREG4 TO VREG4 |
| MVC .(SA,SB) s1(R5), s2(R4)<br>void ISA::OPC_MVC_20b_134 (Creg &s1, Gpr &s2)<br>{<br>s2 = s1;<br>} | MOVE (LOW) CONTROL REGISTER TO GPR |
| MVC .(SA,SB) s1(R5), s2(R4)<br>void ISA::OPC_MVC_20b_135 (Creg &s1, Gpr &s2)<br>{<br>s2 = s1;<br>} | MOVE (HIGH) CONTROL REGISTER TO GPR |
| MVC .(SA,SB) s1(R4), s2(R5)<br>void ISA::OPC_MVC_20b_136 (Gpr &s1, Creg &s2)<br>{<br>s2 = s1;<br>} | MOVE GPR TO (LOW) CONTROL REGISTER |
| MVC .(SA,SB) s1(R4), s2(R5)<br>void ISA::OPC_MVC_20b_137 (Gpr &s1, Creg &s2)<br>{<br>s2 = s1;<br>} | MOVE GPR TO (HIGH) CONTROL REGISTER |
| MVCSR .(SA,SB) s1(R4),s2(U4)<br>void ISA::OPC_MVCSR_20b_45 (Gpr &s1, U4 &s2)<br>{<br>Csr.setBit(s2.value( ),s1.bit(0));<br>} | MOVE GPR BIT TO CSR |
| MVCSR .(SA,SB) s1(U4),s2(R4)<br>void ISA::OPC_MVCSR_20b_46 (U4 &s1, Gpr &s2)<br>{<br>s2.clear( );<br>s2.bit(0) = Csr.bit(s1.value( ));<br>} | MOVE CSR BIT TO GPR |
| MVCSR .(Vx) s1(R4), s2(R4)<br>void ISA::OPCV_MVCSR_20b_46 (Vreg4 &s1, U5 &s2)<br>{<br>Vr15.setBit(s2.value( ),s1.bit(0));<br>} | MOVE VREG BIT TO CSR |
| MVCSR .(Vx) s1(U5),s2(R4)<br>void ISA::OPCV_MVCSR_20b_48 (U5 &s1, Vreg4 &s2)<br>{<br>s2.clear( );<br>s2.bit(0) = Vr15.bit(s1.value( ));<br>} | MOVE CSR BIT TO VREG |

TABLE 20-continued

| Syntax/Pseudocode | Description |
|---|---|
| MVK .(SA,SB) s1(S4), s2(R4)<br>void ISA::OPC_MVK_20b_112 (S4 &s1, Gpr &s2)<br>{<br>s2 = sign_extend(s1);<br>} | MOVE S4 IMM TO GPR |
| MVK .(SB) s1(S24),s2(R4)<br>void ISA::OPC_MVK_40b_229 (S24 &s1,Gpr &s2)<br>{<br>s2 = sign_extend(s1);<br>} | MOVE S24 IMM TO GPR |
| MVK .(V,VP) s1(S4), s2(R4)<br>void ISA::OPCV_MVK_20b_63 (S4 &s1, Vreg4 &s2, Unit &unit)<br>{<br>if(isVPunit(unit))<br>{<br>s2.range(LSBL,MSBL) = s1.value( );<br>s2.range(LSBU,MSBU) = s1.value( );<br>} else<br>{<br>s2 = s1;<br>}<br>} | MOVE S4 IMM TO VREG4 |
| MVKA .(SB) s1(S16), s2(U3), s3(R4)<br>void ISA::OPC_MVKA_40b_227 (S16 &s1, U3 &s2, Gpr &s3)<br>{<br>s3 = s1 << (s2*8);<br>} | MOVE S16 IMM TO GPR, ALIGNED |
| MVKAU .(SB) s1(U16), s2(U3), s3(R4)<br>void ISA::OPC_MVKAU_40b_226 (U16 &s1, U3 &s2, Gpr &s3)<br>{<br>s3.clear( );<br>s3 = (s1 << (s2*8));<br>} | MOVE U16 IMM TO GPR, ALIGNED |
| MVKCHU .(SB) s1(U32),s2(R5)<br>void ISA::OPC_MVKCHU_40b_250 (U32 &s1,Creg &s2)<br>{<br>s2.range(16,31) = s1.range(16,31);<br>} | MOVE IMM TO CREG, HIGH HALF |
| MVKCLHU .(SB) s1(U32),s2(R5)<br>void ISA::OPC_MVKCLHU_40b_251 (U32 &s1,Creg &s2)<br>{<br>s2.range(16,31) = s1.range(0,15);<br>} | MOVE IMM TO CREG, LOW TO HIGH HALF |
| MVKCLU .(SB) s1(U32),s2(R5)<br>void ISA::OPC_MVKCLU_40b_249 (U32 &s1,Creg &s2)<br>{<br>s2.range(0,15) = s1.range(0,15);<br>} | MOVE IMM TO CREG, LOW HALF |
| MVKHU .(SB) s1(U32),s2(R4)<br>void ISA::OPC_MVKHU_40b_242 (U32 &s1,Gpr &s2)<br>{<br>s2.range(16,31) = s1.range(16,31);<br>} | MOVE U16 TO GPR, HIGH HALF |
| MVKLHU .(SB) s1(U32),s2(R4)<br>void ISA::OPC_MVKLHU_40b_243 (U32 &s1,Gpr &s2)<br>{<br>s2.range(16,31) = s1.range(0,15);<br>} | MOVE U16 TO GPR, LOW TO HIGH HALF |
| MVKLU .(SB) s1(U32),s2(R4)<br>void ISA::OPC_MVKLU_40b_241 (U32 &s1,Gpr &s2)<br>{<br>s2 = s1;<br>} | MOVE U16 TO GPR, LOW HALF |
| MVKU .(SA,SB) s1(U4), s2(R4)<br>void ISA::OPC_MVKU_20b_111 (U4 &s1,Gpr &s2)<br>{<br>s2 = zero_extend(s1);<br>} | MOVE U4 IMM TO GPR |
| MVKU .(SB) s1(U24),s2(R4)<br>void ISA::OPC_MVKU_40b_228 (U24 &s1,Gpr &s2)<br>{<br>s2 = zero_extend(s1);<br>} | MOVE U24 IMM TO GPR |
| MVKU .(V,VP) s1(U4), s2(R4)<br>void ISA::OPCV_MVKU_20b_62 (U4 &s1, Vreg4 &s2, Unit &unit)<br>{ | MOVE U4 IMM TO VREG4 |

TABLE 20-continued

| Syntax/Pseudocode | Description |
|---|---|
| if(isVPunit(unit))<br>{<br>s2.range(LSBL,MSBL) = zero_extend(s1);<br>s2.range(LSBU,MSBU) = zero_extend(s1);<br>} else<br>{<br>s2 = s1;<br>}<br>} | |
| MVKVRHU .(SB) s1(U32), s2(R5), s3(R5)<br>void ISA::OPC_MVKVRHU_40b_268 (U16 &s1, Vunit &s2, Vreg &s3)<br>{<br>Result r1;<br>r1 = _unsigned(s1.range(16,31));<br>risc_is_mtvvr._assert(1);<br>vec_regf_ua._assert(s2);<br>vec_regf_enz._assert(0);<br>vec_regf_wa._assert(s3);<br>vec_regf_wd._assert(r1);<br>vec_regf_hwz._assert(0x1); //active low, high half<br>} | MOVE U16 TO VUNIT/VREG, HIGH HALF |
| MVKVRLU .(SB) s1(U32), s2(R5), s3(R5)<br>void ISA::OPC_MVKVRLU_40b_267 (U16 &s1, Vunit &s2, Vreg &s3)<br>{<br>Result r1;<br>r1.clear( );<br>r1 = _unsigned(s1);<br>risc_is_mtvvr._assert(1);<br>vec_regf_ua._assert(s2);<br>vec_regf_enz._assert(0);<br>vec_regf_wa._assert(s3);<br>vec_regf_wd._assert(r1);<br>vec_regf_hwz._assert(0x0); //active low, both halves<br>} | MOVE U16 TO VUNIT/VREG, LOW HALF |
| NOP .(SA,SB)<br>void ISA::OPC_NOP_20b_17 (void)<br>{<br>} | NO OPERATION |
| NOP .(V)<br>void ISA::OPC_NOP_20b_17 (void)<br>{<br>} | NO OPERATION |
| NOT .(SA,SB) s1(R4)<br>void ISA::OPC_NOT_20b_8 (Gpr &s1,Unit &unit)<br>{<br>s1 = ~s1;<br>Csr.setBit(EQ,unit,s1.zero( ));<br>} | BITWISE INVERSION |
| NOT .(V) s1(R4)<br>void ISA::OPCV_NOT_20b_1 (Vreg4 &s1,Unit &unit)<br>{<br>s1 = ~s1;<br>Vr15.bit(EQ) = s1.zero( );<br>} | BITWISE INVERSION |
| OR .(SA,SB) s1(R4), s2(R4)<br>void ISA::OPC_OR_20b_90 (Gpr &s1, Gpr &s2,Unit &unit)<br>{<br>s2 \|= s1;<br>Csr.bit(EQ,unit) = s2.zero( );<br>} | BITWISE OR |
| OR .(SA,SB) s1(U4), s2(R4)<br>void ISA::OPC_OR_20b_91 (U4 &s1,Gpr &s2,Unit &unit)<br>{<br>s2 \|= s1;<br>Csr.bit(EQ,unit) = s2.zero( );<br>} | BITWISE OR, U4 IMM |
| OR .(SB) s1(S3), s2(U20), s3(R4)<br>void ISA::OPC_OR_40b_214 (U3 &s1, U20 &s2, Gpr &s3,Unit &unit)<br>{<br>s3 \|= (s2 << (s1*8));<br>Csr.bit(EQ,unit) = s3.zero( );<br>} | BITWISE OR, U20 IMM, BYTE ALIGNED |
| OR .(V) s1(R4), s2(R4)<br>void ISA::OPCV_OR_20b_90 (Vreg4 &s1, Vreg4 &s2)<br>{<br>s2 \|=s1;<br>Vr15.bit(EQ) = s2==0;<br>} | BITWISE OR |

TABLE 20-continued

| Syntax/Pseudocode | Description |
| --- | --- |
| OR .(V,VP) s1(U4), s2(R4)<br>void ISA::OPCV_OR_20b_91 (U4 &s1, Vreg4 &s2, Unit &unit)<br>{<br>if(isVPunit(unit))<br>{<br>s2.range(0,15)\|=zero_extend(s1);<br>s2.range(16,31)\|=zero_extend(s1);<br>Vr15.bit(tEQB) = s2.range(0,15) == 0;<br>Vr15.bit(tEQA) = s2.range(16,31) == 0;<br>} else if(isVBunit(unit))<br>{<br>s2.range(0,7)\|=zero_extend(s1);<br>s2.range(8,15)\|=zero_extend(s1);<br>s2.range(16,23)\|=zero_extend(s1);<br>s2.range(24,31)\|=zero_extend(s1);<br>Vr15.bit(tEQA) = s2.range(0,7) == 0;<br>Vr15.bit(tEQB) = s2.range(8,15) == 0;<br>Vr15.bit(tEQC) = s2.range(16,23) == 0;<br>Vr15.bit(tEQD) = s2.range(24,31) == 0;<br>}<br>{<br>s2\|=zero_extend(s1);<br>Vr15.bit(EQ) = s2==0;<br>}<br>} | BITWISE OR, U4 IMM |
| OUTPUT .(SB) *+s1[s2(R4)], s3(S8), s4(U6), s5(R4)<br>void ISA::OPC_OUTPUT_40b_238 (Gpr &s1,Gpr &s2,S8 &s3,U6 &s4,<br>Gpr &s5)<br>{<br>int imm_cnst = s3.value( );<br>int bot_off = s2.range(0,3);<br>int top_off = s2.range(4,7);<br>int blk_size = s2.range(8,10);<br>int str_dis = s2.bit(12);<br>int repeat = s2.bit(13);<br>int bot_flag = s2.bit(14);<br>int top_flag = s2.bit(15);<br>int pntr = s2.range(16,23);<br>int size = s2.range(24,31);<br>int tmp,addr;<br>if(imm_cnst > 0 && bot_flag && imm_cnst > bot_off)<br>{<br>if(!repeat)<br>{<br>tmp = (bot_off<<1) − imm_cnst;<br>}<br>else<br>{<br>tmp = bot_off;<br>}<br>}<br>else<br>{<br>if(imm_cnst < 0 && top_flag && −imm_cnst > top_off)<br>{<br>if(!repeat)<br>{<br>tmp = −(top_off<<1) − imm_cnst;<br>}<br>else<br>{<br>tmp = −top_off;<br>}<br>}<br>else<br>{<br>tmp = imm_cnst;<br>}<br>}<br>pntr = pntr << blk_size;<br>if(size == 0)<br>{<br>addr = pntr + tmp;<br>} | OUTPUT, 5 operand |

TABLE 20-continued

| Syntax/Pseudocode | Description |
|---|---|
| else<br>{<br>if((pntr + tmp) >= size)<br>{<br>addr = pntr + tmp − size;<br>}<br>else<br>{<br>if(pntr + tmp < 0)<br>{<br>addr = pntr + tmp + size;<br>}<br>else<br>{<br>addr = pntr + tmp;<br>}<br>}<br>}<br>addr = addr + s1.value( );<br>risc_is_output._assert(1);<br>risc_output_wd._assert(s5);<br>risc_output_wa._assert(addr);<br>risc_output_pa._assert(s4);<br>risc_output_sd._assert(str_dis);<br>} | |
| OUTPUT .(SB) *+s1[s2(S14)], s3(U6), s4(R4)<br>void ISA::OPC_OUTPUT_40b_239 (Gpr &s1,S14 &s2,U6 &s3,Gpr &s4<br>)<br>{<br>Result r1;<br>r1 = s1 + s2;<br>risc_is_output._assert(1);<br>risc_output_wd._assert(s4);<br>risc_output_wa._assert(r1);<br>risc_output_pa._assert(s3);<br>risc_output_sd._assert(s1.bit(12));<br>} | OUTPUT, 4 operand |
| OUTPUT .(SB) *s1(U18), s2(U6), s3(R4)<br>void ISA::OPC_OUTPUT_40b_240 (S18 &s1,U6 &s2,Gpr &s3)<br>{<br>risc_is_output._assert(1);<br>risc_output_wd._assert(s3);<br>risc_output_wa._assert(s1);<br>risc_output_pa._assert(s2);<br>risc_output_sd._assert(0);<br>} | OUTPUT, 3 operand |
| PACKHH (.SA,.SB) s1(R4, s2(R4)<br>void ISA::OPC_PACKHH_20b_372 (Gpr &s1, Gpr &s2)<br>{<br>s2 = (s1.range(16,31) << 16) \| s2.range(16,31);<br>} | PACK REGISTER, HIGH/HIGH |
| PACKHH .(VPx) s1(R4), s2(R4), s3(R4)<br>void ISA::OPCV_PACKHH_20b_290 (Vreg4 &s1, Vreg4 &s2, Vreg4 &<br>s3)<br>{<br>s3 = (s1.range(16,31) << 16) \| s2.range(16,31);<br>} | HALF WORD PACK, HIGH/HIGH, 3 OPERAND |
| PACKHL (.SA,.SB) s1(R4, s2(R4)<br>void ISA::OPC_PACKHL_20b_371 (Gpr &s1, Gpr &s2)<br>{<br>s2 = (s1.range(16,31) << 16) \| s2.range(0,15);<br>} | PACK REGISTER, HIGH/LOW |
| PACKHL .(VPx) s1(R4), s2(R4), s3(R4)<br>void ISA::OPCV_PACKHL_20b_289 (Vreg4 &s1, Vreg4 &s2, Vreg4 &<br>s3)<br>{<br>s3 = (s1.range(16,31) << 16) \| s2.range(0,15);<br>} | HALF WORD PACK, HIGH/LOW, 3 OPERAND |
| PACKLH (.SA,.SB) s1(R4, s2(R4)<br>void ISA::OPC_PACKLH_20b_370 (Gpr &s1, Gpr &s2)<br>{<br>s2 = (s1.range(0,15) << 16) \| s2.range(16,31);<br>} | PACK REGISTER, LOW/HIGH |

TABLE 20-continued

| Syntax/Pseudocode | Description |
|---|---|

```
PACKLH .(VPx) s1(R4), s2(R4), s3(R4)
void ISA::OPCV_PACKLH_20b_288 (Vreg4 &s1, Vreg4 &s2, Vreg4 &
s3)
{
 s3 = (s1.range(0,15) << 16) | s2.range(16,31);
}
```

HALF WORD PACK, LOW/HIGH, 3 OPERAND

```
PACKLL (.SA,.SB) s1(R4, s2(R4)
void ISA::OPC_PACKLL_20b_369 (Gpr &s1, Gpr &s2)
{
 s2 = (s1.range(0,15) << 16) | s2.range(0,15);
}
```

PACK REGISTER, LOW/LOW

```
PACKLL .(VPx) s1(R4), s2(R4), s3(R4)
void ISA::OPCV_PACKLL_20b_287 (Vreg4 &s1, Vreg4 &s2, Vreg4 &s
3)
{
 s3 = (s1.range(0,15) << 16) | s2.range(0,15);
}
```

HALF WORD PACK, LOW/LOW, 3 OPERAND

```
RELINP .(SA,SB)
void ISA::OPC_RELINP_20b_18 (void)
{
 risc_is_release._assert(1);
}
```

RELEASE INPUT

```
REORD .(SA,SB) s1(U5), s2(R4)
void ISA::OPC_REORD_20b_330 (U5 &s1, Gpr &s2)
{
 #define RORD(w,x,y,z) { \
   s2.range(0 ,7) = w; \
   s2.range(8 ,15) = x; \
   s2.range(16,23) = y; \
   s2.range(24,31) = z; \
 }
 int sw = s1.value( );
 switch(sw)
 {
   case 0x01: RORD(RO_A,RO_B,RO_D,RO_C); break;
   case 0x02: RORD(RO_A,RO_C,RO_B,RO_D); break;
   case 0x03: RORD(RO_A,RO_C,RO_D,RO_B); break;
   case 0x04: RORD(RO_A,RO_D,RO_B,RO_C); break;
   case 0x05: RORD(RO_A,RO_D,RO_C,RO_B); break;
   case 0x06: RORD(RO_B,RO_A,RO_C,RO_D); break;
   case 0x07: RORD(RO_B,RO_A,RO_D,RO_C); break;
   case 0x08: RORD(RO_B,RO_C,RO_A,RO_D); break;
   case 0x09: RORD(RO_B,RO_C,RO_D,RO_A); break;
   case 0x0a: RORD(RO_B,RO_D,RO_A,RO_C); break;
   case 0x0b: RORD(RO_B,RO_D,RO_C,RO_A); break;
   case 0x0c: RORD(RO_C,RO_A,RO_B,RO_D); break;
   case 0x0d: RORD(RO_C,RO_A,RO_D,RO_B); break;
   case 0x0e: RORD(RO_C,RO_B,RO_A,RO_D); break;
   case 0x0f: RORD(RO_C,RO_B,RO_D,RO_A); break;
   case 0x10: RORD(RO_C,RO_D,RO_A,RO_B); break;
   case 0x11: RORD(RO_C,RO_D,RO_B,RO_A); break;
   case 0x12: RORD(RO_D,RO_A,RO_B,RO_C); break;
   case 0x13: RORD(RO_D,RO_A,RO_C,RO_B); break;
   case 0x14: RORD(RO_D,RO_B,RO_A,RO_C); break;
   case 0x15: RORD(RO_D,RO_B,RO_C,RO_A); break;
   case 0x16: RORD(RO_D,RO_C,RO_A,RO_B); break;
   case 0x17: RORD(RO_D,RO_C,RO_B,RO_A); break;
 }
}
```

REORDER WORD

```
REORD .(Vx) s1(U5), s2(R4)
void ISA::OPCV_REORD_20b_129 (U5 &s1, Vreg4 &s2)
{
 switch(s1.value( ))
 {
   case 0x01: RORD(RO_A,RO_B,RO_D,RO_C); break;
   case 0x02: RORD(RO_A,RO_C,RO_B,RO_D); break;
   case 0x03: RORD(RO_A,RO_C,RO_D,RO_B); break;
   case 0x04: RORD(RO_A,RO_D,RO_B,RO_C); break;
   case 0x05: RORD(RO_A,RO_D,RO_C,RO_B); break;
   case 0x06: RORD(RO_B,RO_A,RO_C,RO_D); break;
   case 0x07: RORD(RO_B,RO_A,RO_D,RO_C); break;
   case 0x08: RORD(RO_B,RO_C,RO_A,RO_D); break;
   case 0x09: RORD(RO_B,RO_C,RO_D,RO_A); break;
   case 0x0a: RORD(RO_B,RO_D,RO_A,RO_C); break;
   case 0x0b: RORD(RO_B,RO_D,RO_C,RO_A); break;
   case 0x0c: RORD(RO_C,RO_A,RO_B,RO_D); break;
   case 0x0d: RORD(RO_C,RO_A,RO_D,RO_B); break;
   case 0x0e: RORD(RO_C,RO_B,RO_A,RO_D); break;
```

REORDER WORD

TABLE 20-continued

| Syntax/Pseudocode | Description |
|---|---|
| case 0x0f: RORD(RO_C,RO_B,RO_D,RO_A); break; | |
| case 0x10: RORD(RO_C,RO_D,RO_A,RO_B); break; | |
| case 0x11: RORD(RO_C,RO_D,RO_B,RO_A); break; | |
| case 0x12: RORD(RO_D,RO_A,RO_B,RO_C); break; | |
| case 0x13: RORD(RO_D,RO_A,RO_C,RO_B); break; | |
| case 0x14: RORD(RO_D,RO_B,RO_A,RO_C); break; | |
| case 0x15: RORD(RO_D,RO_B,RO_C,RO_A); break; | |
| case 0x16: RORD(RO_D,RO_C,RO_A,RO_B); break; | |
| case 0x17: RORD(RO_D,RO_C,RO_B,RO_A); break; | |
| } | |
| } | |
| RET .(SB) | RETURN FROM |
| void ISA::OPC_RET_20b_15 (void) | SUBROUTINE |
| { | |
| Sp +=4; | |
| Pc = dmem->read(Sp); | |
| } | |
| REV .(SB) s1(U6), s2(U6), s3(R4) | REVERSE BIT |
| void ISA::OPC_REV_40b_283 (U6 &s1, U6 &s2,Gpr &s3,Unit &unit) | FIELD |
| { | |
| Reg tmp = s3; | |
| int j = s2.value( ); | |
| for(int i=s1.value( );i<=s2.value( );++i) | |
| { | |
| s3.bit(j−−) = tmp.bit(i); | |
| } | |
| Csr.bit(EQ,unit) = s3.zero( ); | |
| } | |
| REVB .(SA,SB) s1(U2), s2(U2), s3(R4) | REVERSE BITS |
| void ISA::OPC_REVB_20b_92 (U2 &s1, U2 &s2,Gpr &s3,Unit &unit) | WITHIN BYTE |
| { | FIELD |
| int istart = s1.value( ) *8; | |
| int iend = (s2.value( )+1)*8; | |
| int j = iend−1; | |
| Reg tmp = s3; | |
| for(int i=istart;i<iend;++i) | |
| { | |
| s3.bit(j−−) = tmp.bit(i); | |
| } | |
| Csr.bit(EQ,unit) = s3.zero( ); | |
| } | |
| REVB .(V) s1(U2), s2(U2), s3(R4) | REVERSE BITS |
| void ISA::OPCV_REVB_20b_45 (U2 &s1, U2 &s2, Vreg4 &s3) | WITHIN BYTE |
| { | FIELD |
| int istart = s1.value( )*8; | |
| int iend = (s2.value( )+1)*8; | |
| int j = iend−1; | |
| Reg tmp = s3; | |
| for(int i=istart;i<iend;++i) | |
| { | |
| s3.bit(j−−) = tmp.bit(i); | |
| } | |
| Vr15.bit(EQ) = s3==0; | |
| } | |
| RHLDHU .(VP3,VP4) s1(R4), s2(R4), s3(R4) | LOAD HALF |
| void ISA::OPCV_RHLDHU_20b_296 (Vreg4 &s1, Vreg4 &s2, Vreg4 & | UNSIGNED, |
| s3) | RELATIVE |
| { | HORIZONTAL |
| Result addrlo,addrhi; | ACCESS |
| addrlo.range(0,19) = _unsigned((s1.range(0,12)<<6)) | |
| + _signed(s2.range(0,13)) | |
| + _unsigned(((HG_POSN.range(0,7)<<6) \| POSN.range(0,5 | |
| ))); | |
| addrhi.range(0,19) = _unsigned((s1.range(16,27)<<6)) | |
| + _signed(s2.range(16,29)) | |
| + _unsigned(((HG_POSN.range(0,7)<<6) \| POSN.range(0,5 | |
| ))); | |
| s3.range(0,15) = fmem0->uhalf(addrlo); | |
| s3.range(16,31) = fmem1->uhalf(addrhi); | |
| } | |
| RHLDHU .(VP3,VP4) s1(R4), s2(S6), s3(R4) | LOAD HALF |
| void ISA::OPCV_RHLDHU_40b_317 (Vreg4 &s1, S6 &s2, Vreg4 &s3) | UNSIGNED, |
| { | RELATIVE |

TABLE 20-continued

| Syntax/Pseudocode | Description |
| --- | --- |
| Result addrlo,addrhi;<br>addrlo.range(0,19) = _unsigned((s1.range(0,12)<<6))<br>+ _signed(s2)<br>+ _unsigned(((HG_POSN.range(0,7)<<6) \| POSN.range(0,5<br>)));<br>addrhi.range(0,19) = _unsigned((s1.range(16,27)<<6))<br>+ _signed(s2)<br>+ _unsigned(((HG_POSN.range(0,7)<<6) \| POSN.range(0,5<br>)));<br>s3.range(0,15) = fmem0->uhalf(addrlo);<br>s3.range(16,31) = fmem1->uhalf(addrhi);<br>} | HORIZONTAL ACCESS |
| RHSTH .(VP3,VP4) s1(R4), s2(R4),s3(R4)<br>void ISA::OPCV_RHSTH_20b_297 (Vreg4 &s1, Vreg4 &s2, Vreg4 &s3<br>)<br>{<br>Result addrlo,addrhi;<br>addrlo.range(0,19) = _unsigned((s1.range(0,12)<<6))<br>+ _signed(s2.range(0,13))<br>+ _unsigned(((HG_POSN.range(0,7)<<6) \| POSN.range(0,5<br>)));<br>addrhi.range(0,19) = _unsigned((s1.range(16,27)<<6))<br>+ _signed(s2.range(16,29))<br>+ _unsigned(((HG_POSN.range(0,7)<<6) \| POSN.range(0,5<br>)));<br>fmem0->half(addrlo) = s3.range(0,15);;<br>fmem1->half(addrhi) = s3.range(16,31);<br>} | STORE HALF, RELATIVE HORIZONTAL ACCESS |
| RHSTH .(VP3,VP4) s1(R4), s2(S6), s3(R4)<br>void ISA::OPCV_RHSTH_40b_318 (Vreg4 &s1, S6 &s2, Vreg4 &s3)<br>{<br>Result addrlo,addrhi;<br>addrlo.range(0,19) = _unsigned((s1.range(0,12)<<6))<br>+ _signed(s2)<br>+ _unsigned(((HG_POSN.range(0,7)<<6) \| POSN.range(0,5<br>)));<br>addrhi.range(0,19) = _unsigned((s1.range(16,27)<<6))<br>+ _signed(s2)<br>+ _unsigned(((HG_POSN.range(0,7)<<6) \| POSN.range(0,5<br>)));<br>fmem0->half(addrlo) = s3.range(0,15);;<br>fmem1->half(addrhi) = s3.range(16,31);<br>} | STORE HALF, RELATIVE HORIZONTAL ACCESS |
| RLD .V4 *+s1(R2)[s2(S6)], s3(R2), s4(R4)<br>void ISA::OPCV_RLD_20b_401 (Gpr2 &s1, S6 &s2, Vreg2 &s3, Vreg<br>&s4)<br>{<br>risc_vsr_rdz._assert(D0,0);<br>risc_vsr_ra._assert(D0,s3.address( ));<br>Result rVSR = risc_vsr_rdata.read( );<br>risc_regf_ra1._assert(D0,s1.address( ));<br>risc_regf_rd1z._assert(D0,0);<br>Result rBase = risc_regf_rd1.read( ); //E0 is implied<br>bool vb_lo = s3.bit(15);<br>bool vb_hi = s3.bit(31);<br>bool sfmblock = rVSR.range(9,10) == 0x00;<br>bool mirror = rVSR.range(9,10) == 0x01;<br>bool repeat = rVSR.range(9,10) == 0x02;<br>bool saturate = rVSR.range(9,10) == 0x03;<br>bool saturate_lo = saturate && vb_lo;<br>bool saturate_hi = saturate && vb_hi;<br>if(saturate_lo && saturate_hi)<br>{<br>s4 = 0x7FFF7FFF;<br>return;<br>}<br>int base = rBase.range( 0,15);<br>int v_index_lo = s3.range( 0,14);<br>int v_index_hi = s3.range(16,30);<br>Result rPOSN = risc_posn.read( );<br>int posn_lo = (rPOSN.range(0,3)<<1) + 1;<br>int posn_hi = (rPOSN.range(0,3)<<1);<br>int pos2_lo = (rHG_POSN.range(0,7) << 5) \| posn_lo;<br>int pos2_hi = (rHG_POSN.range(0,7) << 5) \| posn_hi;<br>int s_offset = sign_extend(s2);<br>int h_index_lo = s_offset + pos2_lo;<br>int h_index_hi = s_offset + pos2_hi;<br>int hg_size = rVSR.range(0,7); | RELATIVE LOAD, IMM FORM |

TABLE 20-continued

| Syntax/Pseudocode | Description |
|---|---|
| int hg_size_32 = hg_size + 32;<br>bool left_size_lo = (h_index_lo < 0);<br>bool right_size_lo = (h_index_lo >= hg_size_32);<br>bool left_size_hi = (h_index_hi < 0);<br>bool right_size_hi = (h_index_hi >= hg_size_32);<br>bool bounded_lo = !sfmblock && (left_size_lo \|\| right_size_lo);<br>bool bounded_hi = !sfmblock && (left_size_hi \|\| right_size_hi);<br>if((bounded_lo && saturate))<br>{<br>s4.range( 0,15) = 0x7FFF;<br>}<br>else<br>{<br>if(bounded_lo && mirror)<br>{<br>if(left_size_lo) h_index_lo = −h_index_lo;<br>else h_index_lo = (hg_size_32<<1)−h_index_lo;<br>}<br>if(bounded_lo && repeat)<br>{<br>if(left_size_lo) h_index_lo = 0;<br>else h_index_lo = hg_size_32 − 1;<br>}<br>int addr_lo = h_index_lo + base + v_index_lo;<br>s4.range( 0,15) = vmemLo->uhalf(addr_lo);<br>}<br>//High range<br>if((bounded_hi && saturate))<br>{<br>s4.range(16,31) = 0x7FFF;<br>}<br>else<br>{<br>if(bounded_hi && mirror)<br>{<br>if(left_size_hi) h_index_hi = −h_index_hi;<br>else h_index_hi = (hg_size_32<<1)−h_index_hi;<br>}<br>if(bounded_hi && repeat)<br>{<br>if(left_size_hi) h_index_hi = 0;<br>else h_index_hi = hg_size_32 − 1;<br>}<br>int addr_hi = h_index_hi + base + v_index_hi;<br>s4.range(16,31) = vmemHi->uhalf(addr_hi);<br>}<br>} | |
| RLD .V4 *+s1(R2)[s2(R4)], s3(R2), s4(R4)<br>void ISA::OPCV_RLD_20b_403 (Gpr2 &s1, Vreg &s2, Vreg2 &s3, Vreg &s4)<br>{<br>risc_vsr_rdz._assert(D0,0);<br>risc_vsr_ra._assert(D0,s3.address( ));<br>Result rVSR = risc_vsr_rdata.read( );<br>risc_regf_ra1._assert(D0,s1.address( ));<br>risc_regf_rd1z._assert(D0,0);<br>Result rBase = risc_regf_rd1.read( ); //E0 is implied<br>bool vp_lo = s3.bit(15);<br>bool vp_hi = s3.bit(31);<br>bool sfmblock = rVSR.range(9,10) == 0x00;<br>bool mirror = rVSR.range(9,10) == 0x01;<br>bool repeat = rVSR.range(9,10) == 0x02;<br>bool saturate = rVSR.range(9,10) == 0x03;<br>bool saturate_lo = saturate && vp_lo;<br>bool saturate_hi = saturate && vp_hi;<br>if(saturate_lo && saturate_hi)<br>{<br>s4 = 0x7FFF7FFF;<br>return;<br>}<br>int base = rBase.range( 0,15);<br>int v_index_lo = s3.range( 0,14);<br>int v_index_hi = s3.range(16,30);<br>Result rPOSN = risc_posn.read( );<br>int posn_lo = (rPOSN.range(0,3)<<1) + 1;<br>int posn_hi = (rPOSN.range(0,3)<<1);<br>int pos2_lo = (rHG_POSN.range(0,7) << 5) \| posn_lo;<br>int pos2_hi = (rHG_POSN.range(0,7) << 5) \| posn_hi; | RELATIVE LOAD, REG FORM |

TABLE 20-continued

| Syntax/Pseudocode | Description |
|---|---|
| int s_offset_lo = sign_extend(s2.range( 0,15)); | |
| int s_offset_hi = sign_extend(s2.range(16,31)); | |
| int h_index_lo = s_offset_lo + pos2_lo; | |
| int h_index_hi = s_offset_hi + pos2_hi; | |
| int hg_size = rVSR.range(0,7); | |
| int hg_size_32 = hg_size + 32; | |
| bool left_size_lo = (h_index_lo < 0); | |
| bool right_size_lo = (h_index_lo >= hg_size_32); | |
| bool left_size_hi = (h_index_hi < 0); | |
| bool right_size_hi = (h_index_hi >= hg_size_32); | |
| bool bounded_lo = !sfmblock && (left_size_lo \|\| right_size_lo); | |
| bool bounded_hi = !sfmblock && (left_size_hi \|\| right_size_hi); | |
| if((bounded_lo && saturate)) | |
| { | |
| s4.range( 0,15) = 0x7FFF; | |
| } | |
| else | |
| { | |
| if(bounded_lo && mirror) | |
| { | |
| if(left_size_lo) h_index_lo = −h_index_lo; | |
| else h_index_lo = (hg_size_32<<1)−h_index_lo; | |
| } | |
| if(bounded_lo && repeat) | |
| { | |
| if(left_size_lo) h_index_lo = 0; | |
| else h_index_lo = hg_size_32 − 1; | |
| } | |
| int addr_lo = h_index_lo + base + v_index_lo; | |
| s4.range( 0,15) = vmemLo->uhalf(addr_lo); | |
| } | |
| if((bounded_hi && saturate)) | |
| { | |
| s4.range(16,31) = 0x7FFF; | |
| } | |
| else | |
| { | |
| if(bounded_hi && mirror) | |
| { | |
| if(left_size_hi) h_index_hi = −h_index_hi; | |
| else h_index_hi = (hg_size_32<<1)−h_index_hi; | |
| } | |
| if(bounded_hi && repeat) | |
| { | |
| if(left_size_hi) h_index_hi = 0; | |
| else h_index_hi = hg_size_32 − 1; | |
| } | |
| int addr_hi = h_index_hi + base + v_index_hi; | |
| s4.range(16,31) = vmemHi->uhalf(addr_hi); | |
| } | |
| } | |
| ROT .(SA,SB) s1(R4), s2(R4) | ROTATE |
| void ISA::OPC_ROT_20b_93 (Gpr &s1, Gpr &s2,Unit &unit) | |
| { | |
| for(int i=0;i<s1.value( );++i) | |
| { | |
| int bit = s2.bit(0); | |
| unsigned int us2 = _unsigned(s2); | |
| s2 = (bit<<s2.width( )−1) \| (us2 >> 1); | |
| } | |
| Csr.bit(EQ,unit) = s2.zero( ); | |
| } | |
| ROT .(SA,SB) s1(U4), s2(R4) | ROTATE, U4 IMM |
| void ISA::OPC_ROT_20b_94 (U4 &s1, Gpr &s2,Unit &unit) | |
| { | |
| for(int i=0;i<s1.value( );++i) | |
| { | |
| int bit = s2.bit(0); | |
| unsigned int us2 = _unsigned(s2); | |
| s2 = (bit<<s2.width( )−1) \| (us2 >> 1); | |
| } | |
| Csr.bit(EQ,unit) = s2.zero( ); | |
| } | |
| ROT .(V,VP) s1(R4), s2(R4) | ROTATE |
| void ISA::OPCV_ROT_20b_46 (Vreg4 &s1, Vreg4 &s2, Unit &unit) | |
| { | |

TABLE 20-continued

| Syntax/Pseudocode | Description |
| --- | --- |
| if(isVPunit(unit))<br>{<br>//Lower<br>Reg s2lo(s2.range(LSBL,MSBL));<br>for(int i=0;i<s1.value( );++i)<br>{<br>int bit = s2lo.bit(0);<br>unsigned int us2 = _unsigned(s2lo);<br>s2lo = (bit<<s2lo.width( )−1) \| (us2 >> 1);<br>}<br>//Upper<br>Reg s2hi(s2.range(LSBL,MSBL));<br>for(int i=0;i<s1.value( );++i)<br>{<br>int bit = s2hi.bit(0);<br>unsigned int us2 = _unsigned(s2hi);<br>s2hi = (bit<<s2hi.width( )−1) \| (us2 >> 1);<br>}<br>s2.range(LSBL,MSBL) = s2lo.value( );<br>s2.range(LSBU,MSBU) = s2hi.value( );<br>Vr15.bit(EQA) = s2lo==0;<br>Vr15.bit(EQB) = s2hi==0;<br>} else<br>{<br>for(int i=0;i<s1.value( );++i)<br>{<br>int bit = s2.bit(0);<br>unsigned int us2 = _unsigned(s2);<br>s2 = (bit<<s2.width( )−1) \| (us2 >> 1);<br>}<br>Vr15.bit(EQ) = s2==0;<br>}<br>} | |
| ROT .(V,VP) s1(U4), s2(R4)<br>void ISA::OPCV_ROT_20b_47 (U4 &s1, Vreg4 &s2, Unit &unit)<br>{<br>if(isVPunit(unit))<br>{<br>//Lower<br>Reg s2lo(s2.range(LSBL,MSBL));<br>for(int i=0;i<s1.value( );++i)<br>{<br>int bit = s2lo.bit(0);<br>unsigned int us2 = _unsigned(s2lo);<br>s2lo = (bit<<s2lo.width( )−1) \| (us2 >> 1);<br>}<br>//Upper<br>Reg s2hi = s2.range(LSBL,MSBL);<br>for(int i=0;i<s1.value( );++i)<br>{<br>int bit = s2hi.bit(0);<br>unsigned int us2 = _unsigned(s2hi);<br>s2hi = (bit<<s2hi.width( )−1) \| (us2 >> 1);<br>}<br>s2.range(LSBL,MSBL) = s2lo.value( );<br>s2.range(LSBU,MSBU) = s2hi.value( );<br>Vr15.bit(EQA) = s2lo==0;<br>Vr15.bit(EQB) = s2hi==0;<br>} else<br>{<br>for(int i=0;i<s1.value( );++i)<br>{<br>int bit = s2.bit(0);<br>unsigned int us2 = _unsigned(s2);<br>s2 = (bit<<s2.width( )−1) \| (us2 >> 1);<br>}<br>Vr15.bit(EQ) = s2==0;<br>}<br>} | ROTATE, U4 IMM |
| ROTC .(SA,SB) s1(R4), s2(R4)<br>void ISA::OPC_ROTC_20b_95 (Gpr &s1, Gpr &s2,Unit &unit)<br>{<br>for(int i=0;i<s1.value( );++i)<br>{<br>int bit = s2.bit(0);<br>unsigned int us2 = _unsigned(s2);<br>s2 = (Csr.bit(C,unit)<<s2.width( )−1) \| (us2 >> 1); | ROTATE THRU CARRY |

TABLE 20-continued

| Syntax/Pseudocode | Description |
|---|---|
| ` Csr.bit(C,unit) = bit;`<br>` }`<br>` Csr.bit(EQ,unit) = s2.zero( );`<br>`}` | |
| ROTC .(SA,SB) s1(U4), s2(R4)<br>void ISA::OPC_ROTC_20b_96 (U4 &s1, Gpr &s2,Unit &unit)<br>{<br> for(int i=0;i<s1.value( );++i)<br> {<br>  int bit = s2.bit(0);<br>  unsigned int us2 = _unsigned(s2);<br>  s2 = (Csr.bit(C,unit)<<s2.width( )−1) \| (us2 >> 1);<br>  Csr.bit(C,unit) = bit;<br> }<br> Csr.bit(EQ,unit) = s2.zero( );<br>} | ROTATE THRU CARRY, U4 IMM |
| ROTC .(Vx,VPx,VBx) s1(R4), s2(R4)<br>Code:<br>void ISA::OPCV_ROTC_20b_95 (Vreg4 &s1, Vreg4 &s2, Unit &unit)<br>{<br> if(isVunit(unit))<br> {<br>  for(int i=0;i<s1.value( );++i)<br>  {<br>   int bit = s2.bit(0);<br>   unsigned int us2 = _unsigned(s2);<br>   s2 = (Vr15.bit(tCA)<<(s2.width( )−1)) \| (us2 >> 1);<br>   Csr.bit(C,unit) = bit;<br>  }<br>  Csr.bit(EQ,unit) = s2.zero( );<br> }<br> if(isVPunit(unit))<br> {<br>  unsigned int width = s2.width( )>>1;<br>  for(int i=0;i<s1.value( );++i)<br>  {<br>   int bitlo = s2.bit(0);<br>   int bithi = s2.bit(16);<br>   unsigned int us2lo = _unsigned(s2.range(0,15));<br>   unsigned int us2hi = _unsigned(s2.range(16,31));<br>   s2.range(0,15) = (Vr15.bit(tCA)<<(width−1)) \| (us2lo >> 1);<br>   s2.range(16,31) = (Vr15.bit(tCB)<<(width−1)) \| (us2hi >> 1);<br>   Vr15.bit(tCA) = bitlo;<br>   Vr15.bit(tCB) = bithi;<br>  }<br>  Vr15.bit(tCA) = s2.bit(0);<br>  Vr15.bit(tCB) = s2.bit(16);<br> }<br> if(isVBunit(unit))<br> {<br>  unsigned int width = s2.width( )>>2;<br>  for(int i=0;i<s1.value( );++i)<br>  {<br>   int bit0 = s2.bit(0);<br>   int bit8 = s2.bit(8);<br>   int bit16 = s2.bit(16);<br>   int bit24 = s2.bit(24);<br>   unsigned int us2_0 = _unsigned(s2.range(0,7));<br>   unsigned int us2_8 = _unsigned(s2.range(8,15));<br>   unsigned int us2_16 = _unsigned(s2.range(16,23));<br>   unsigned int us2_24 = _unsigned(s2.range(24,31));<br>   s2.range(0,7) = (Vr15.bit(tCA)<<(width−1)) \| (us2_0 >> 1);<br>   s2.range(8,15) = (Vr15.bit(tCB)<<(width−1)) \| (us2_8 >> 1);<br>   s2.range(16,23) = (Vr15.bit(tCC)<<(width−1)) \| (us2_16 >> 1);<br>   s2.range(24,31) = (Vr15.bit(tCD)<<(width−1)) \| (us2_24 >> 1);<br>   Vr15.bit(tCA) = bit0;<br>   Vr15.bit(tCB) = bit8;<br>   Vr15.bit(tCC) = bit16;<br>   Vr15.bit(tCD) = bit24;<br>  }<br>  Vr15.bit(tCA) = s2.bit(0);<br>  Vr15.bit(tCB) = s2.bit(8);<br>  Vr15.bit(tCC) = s2.bit(16);<br>  Vr15.bit(tCD) = s2.bit(24);<br> }<br>} | ROTATE THRU CARRY |

TABLE 20-continued

| Syntax/Pseudocode | Description |
|---|---|
| ROTC .(Vx,VPx,VBx) s1(U4), s2(R4)<br>void ISA::OPCV_ROTC_20b_96 (U4 &s1, Vreg4 &s2, Unit &unit)<br>{<br> if(isVunit(unit))<br> {<br>  for(int i=0;i<s1.value( );++i)<br>  {<br>   int bit = s2.bit(0);<br>   unsigned int us2 = _unsigned(s2);<br>   s2 = (Vr15.bit(tCA)<<(s2.width( )−1)) \| (us2 >> 1);<br>   Csr.bit(C,unit) = bit;<br>  }<br>  Csr.bit(EQ,unit) = s2.zero( );<br> }<br> if(isVPunit(unit))<br> {<br>  unsigned int width = s2.width( )>>1;<br>  for(int i=0;i<s1.value( );++i)<br>  {<br>   int bitlo = s2.bit(0);<br>   int bithi = s2.bit(16);<br>   unsigned int us2lo = _unsigned(s2.range(0,15));<br>   unsigned int us2hi = _unsigned(s2.range(16,31));<br>   s2.range(0,15) = (Vr15.bit(tCA)<<(width−1)) \| (us2lo >> 1);<br>   s2.range(16,31) = (Vr15.bit(tCB)<<(width−1)) \| (us2hi >> 1);<br>   Vr15.bit(tCA) = bitlo;<br>   Vr15.bit(tCB) = bithi;<br>  }<br>  Vr15.bit(tCA) = s2.bit(0);<br>  Vr15.bit(tCB) = s2.bit(16);<br> }<br> if(isVBunit(unit))<br> {<br>  unsigned int width = s2.width( )>>2;<br>  for(int i=0;i<s1.value( );++i)<br>  {<br>   int bit0 = s2.bit(0);<br>   int bit8 = s2.bit(8);<br>   int bit16 = s2.bit(16);<br>   int bit24 = s2.bit(24);<br>   unsigned int us2_0 = _unsigned(s2.range(0,7));<br>   unsigned int us2_8 = _unsigned(s2.range(8,15));<br>   unsigned int us2_16 = _unsigned(s2.range(16,23));<br>   unsigned int us2_24 = _unsigned(s2.range(24,31));<br>   s2.range(0,7) = (Vr15.bit(tCA)<<(width−1)) \| (us2_0 >> 1);<br>   s2.range(8,15) = (Vr15.bit(tCB)<<(width−1)) \| (us2_8 >> 1);<br>   s2.range(16,23) = (Vr15.bit(tCC)<<(width−1)) \| (us2_16 >> 1);<br>   s2.range(24,31) = (Vr15.bit(tCD)<<(width−1)) \| (us2_24 >> 1);<br>   Vr15.bit(tCA) = bit0;<br>   Vr15.bit(tCB) = bit8;<br>   Vr15.bit(tCC) = bit16;<br>   Vr15.bit(tCD) = bit24;<br>  }<br>  Vr15.bit(tCA) = s2.bit(0);<br>  Vr15.bit(tCB) = s2.bit(8);<br>  Vr15.bit(tCC) = s2.bit(16);<br>  Vr15.bit(tCD) = s2.bit(24);<br> }<br>} | ROTATE THRU CARRY, U4 IMM |
| RST .V4 *+s1(R2)[s2(R4)], s3(R2), s4(R4)<br>void ISA::OPCV_RST_20b_404 (Gpr2 &s1, Vreg &s2, Vreg2 &s3, Vreg &s4)<br>{<br> risc_vsr_rdz._assert(D0,0);<br> risc_vsr_ra._assert(D0,s3.address( ));<br> Result rVSR = risc_vsr_rdata.read( );<br> bool store_disable = rVSR.bit(8);<br> if(store_disable) return;<br> risc_regf_ra1._assert(D0,s1.address( ));<br> risc_regf_rd1z._assert(D0,0);<br> Result rBase = risc_regf_rd1.read( ); //E0 is implied<br> bool vb_lo = s3.bit(15);<br> bool vb_hi = s3.bit(31);<br> if(vb_lo && vb_hi) return;<br> int base = rBase.range( 0,15);<br> int v_index_lo = s3.range( 0,14);<br> int v_index_hi = s3.range(16,30); | RELATIVE STORE, REG FORM |

TABLE 20-continued

| Syntax/Pseudocode | Description |
|---|---|
| Result rPOSN = risc_posn.read( );<br>int posn_lo = (rPOSN.range(0,3)<<1) + 1;<br>int posn_hi = (rPOSN.range(0,3)<<1);<br>int pos2_lo = (rHG_POSN.range(0,7) << 5) \| posn_lo;<br>int pos2_hi = (rHG_POSN.range(0,7) << 5) \| posn_hi;<br>int s_offset_lo = sign_extend(s2.range( 0,15));<br>int s_offset_hi = sign_extend(s2.range(16,31));<br>int h_index_lo = s_offset_lo + pos2_lo;<br>int h_index_hi = s_offset_hi + pos2_hi;<br>int hg_size = rVSR.range(0,7);<br>int hg_size_32 = hg_size + 32;<br>bool suppress_lo = (h_index_lo < 0) \|\| (h_index_lo >= hg_size_32) \|\| vb_lo;<br>bool suppress_hi = (h_index_hi < 0) \|\| (h_index_hi >= hg_size_32) \|\| vb_hi;<br>if(!suppress_lo)<br>{<br>int addr_lo = h_index_lo + base + v_index_lo;<br>vmemLo->uhalf(addr_lo) = s4.range( 0,15);<br>}<br>if(!suppress_hi)<br>{<br>int addr_hi = h_index_hi + base + v_index_hi;<br>vmemHi->uhalf(addr_hi) = s4.range(16,31);<br>}<br>} | |
| RST .V4 *+s1(R2)[s2(S6)], s3(R2), s4(R4)<br>void ISA::OPCV_RST_20b_402 (Gpr2 &s1, S6 &s2, Vreg2 &s3, Vreg &s4)<br>{<br>risc_vsr_rdz._assert(D0,0);<br>risc_vsr_ra._assert(D0,s3.address( ));<br>Result rVSR = risc_vsr_rdata.read( );<br>bool store_disable = rVSR.bit(8);<br>if(store_disable) return;<br>risc_regf_ra1._assert(D0,s1.address( ));<br>risc_regf_rd1z._assert(D0,0);<br>Result rBase = risc_regf_rd1.read( ); //E0 is implied<br>bool vb_lo = s3.bit(15);<br>bool vb_hi = s3.bit(31);<br>if(vb_lo && vb_hi) return;<br>int base = rBase.range( 0,15);<br>int v_index_lo = s3.range( 0,14);<br>int v_index_hi = s3.range(16,30);<br>Result rPOSN = risc_posn.read( );<br>int posn_lo = (rPOSN.range(0,3)<<1) + 1;<br>int posn_hi = (rPOSN.range(0,3)<<1);<br>int pos2_lo = (rHG_POSN.range(0,7) << 5) \| posn_lo;<br>int pos2_hi = (rHG_POSN.range(0,7) << 5) \| posn_hi;<br>int s_offset = sign_extend(s2);<br>int h_index_lo = s_offset + pos2_lo;<br>int h_index_hi = s_offset + pos2_hi;<br>int hg_size = rVSR.range(0,7);<br>int hg_size_32 = hg_size + 32;<br>bool suppress_lo = (h_index_lo < 0) \|\| (h_index_lo >= hg_size_32) \|\| vb_lo;<br>bool suppress_hi = (h_index_hi < 0) \|\| (h_index_hi >= hg_size_32) \|\| vb_hi;<br>if(!suppress_lo)<br>{<br>int addr_lo = h_index_lo + base + v_index_lo;<br>vmemLo->uhalf(addr_lo) = s4.range( 0,15);<br>}<br>if(!suppress_hi)<br>{<br>int addr_hi = h_index_hi + base + v_index_hi;<br>vmemHi->uhalf(addr_hi) = s4.range(16,31);<br>}<br>} | RELATIVE STORE, IMM FORM |
| RSUB .(SA,SB) s1(U4), s2(R4)<br>void ISA::OPC_RSUB_20b_125 (U4 &s1, Gpr &s2,Unit &unit)<br>{<br>Result r1;<br>r1 = s1 − s2;<br>s2 = r1;<br>Csr.bit( C,unit) = r1.underflow( );<br>Csr.bit(EQ,unit) = s2.zero( );<br>} | REVERSE SUBTRACT |
| RSUB .(V,VP) s1(U4), s2(R4)<br>void ISA::OPCV_RSUB_20b_75 (Vreg4 &s1, Vreg4 &s2, Unit &unit)<br>{ | REVERSE SUBTRACT |

TABLE 20-continued

| Syntax/Pseudocode | Description |
|---|---|
| if(isVPunit(unit)) | |
| { | |
| Reg s2lo = s2.range(LSBL,MSBL); | |
| Reg s2hi = s2.range(LSBU,MSBU); | |
| Result r1lo = s1 − s2lo; | |
| Result r1hi = s1 − s2hi; | |
| s2.range(LSBL,MSBL) = r1lo.range(LSBL,MSBL); | |
| s2.range(LSBU,MSBU) = r1hi.range(LSBU,MSBU); | |
| Vr15.bit(EQA) = s2.range(LSBL,MSBL)==0; | |
| Vr15.bit(EQB) = s2.range(LSBU,MSBU)==0; | |
| Vr15.bit(CA) = isCarry(s1,s2lo,r1lo); | |
| Vr15.bit(CB) = isCarry(s1,s2hi,r1hi); | |
| } else | |
| { | |
| Result r1 = s1 − s2; | |
| s2 = r1; | |
| Vr15.bit(EQ) = s2==0; | |
| Vr15.bit(C) = isCarry(s1,s2,r1); | |
| } | |
| } | |
| SABSD .(VBx,VPx) s1(R4), s2(R4) | ABSOLUTE |
| void ISA::OPCV_SABSD_20b_52 (Vreg4 &s1 , Vreg4 &s2, Unit &unit) | DIFFERENCE |
| { | AND SUM |
| if(isVBunit(unit)) | |
| { | |
| s2 = _abs(s2.range(24,31) − s1.range(24,31)) | |
| + _abs(s2.range(16,23) − s1.range(16,23)) | |
| + _abs(s2.range(8,15) − s1.range(8,15)) | |
| + _abs(s2.range(0,7) − s1.range(0,7)); | |
| } | |
| if(isVPunit(unit)) | |
| { | |
| s2 = _abs(s2.range(16,31) − s1.range(16,31)); | |
| + _abs(s2.range(0,15) − s1.range(0,15)); | |
| } | |
| } | |
| SABSDU .(VBx,VPx) s1(R4), s2(R4) | ABSOLUTE |
| void ISA::OPCV_SABSDU_20b_53 (Vreg4 &s1, Vreg4 &s2, Unit &unit | DIFFERENCE |
| ) | AND SUM, |
| { | UNSIGNED |
| if(isVBunit(unit)) | |
| { | |
| s2 = _abs(_unsigned(s2.range(24,31)) − _unsigned(s1.range(24,31))) | |
| + _abs(_unsigned(s2.range(16,23)) − _unsigned(s1.range(16,23))) | |
| + _abs(_unsigned(s2.range(8,15)) − _unsigned(s1.range(8,15))) | |
| + _abs(_unsigned(s2.range(0,7)) − _unsigned(s1.range(0,7))); | |
| } | |
| if(isVPunit(unit)) | |
| { | |
| s2 = _abs(_unsigned(s2.range(16,31)) − _unsigned(s1.range(16,31))) | |
| + _abs(_unsigned(s2.range(0,15)) − _unsigned(s1.range(0,15))); | |
| } | |
| SADD .(SA,SB) s1(R4), s2(R4) | SATURATING |
| void ISA::OPC_SADD_20b_127 (Gpr &s1, Gpr &s2,Unit &unit) | ADDITION |
| { | |
| Result r1; | |
| r1 = s2 + s1; | |
| if(r1.overflow( )) s2 = 0xFFFFFFFF; | |
| else if(r1.underflow( )) s2 = 0; | |
| else s2 = r1; | |
| Csr.bit( C,unit) = r1.underflow( ); | |
| Csr.bit(EQ, unit) = s2.zero( ); | |
| Csr.bit(SAT,unit) = r1.overflow( ) \| r1.underflow( ); | |
| } | |
| SADD .(V,VP) s1(R4), s2(R4) | SATURATING |
| void ISA::OPCV_SADD_20b_76 (Vreg4 &s1, Vreg4 &s2, Unit &unit) | ADDITION |
| { | |
| if(isVPunit(unit)) | |
| { | |
| Result r1,r2; | |
| r1 = s2.range(0,15) + s1.range(0,15); | |
| r2 = s2.range(16,31) + s1.range(16,31); | |
| if(r1 > 0xFFFF) s2.range(0,15) = 0xFFFF; | |
| else if(r1 < 0) s2.range(0,15) = 0; | |
| else s2.range(0,15) = r1.range(0,15); | |
| if(r2 > 0xFFFF) s2.range(16,31) = 0xFFFF; | |
| else if(r2 < 0) s2.range(16,31) = 0; | |
| else s2.range(16,31) = r2.range(0,15); | |

TABLE 20-continued

```
Syntax/Pseudocode                                                       Description

   Vr15.bit(EQA) = s2.range(LSBL,MSBL)==0;
   Vr15.bit(EQB) = s2.range(LSBU,MSBU)==0;
   Vr15.bit(CA) = isCarry(s1,s2,r1);
   Vr15.bit(CB) = isCarry(s1,s2,r2);
  } else
  {
   Result r1;
   r1 = s2 + s1;
   if(r1.overflow( ))    s2 = 0xFFFFFFFF;
   else if(r1.underflow( )) s2 = 0;
   else          s2 = r1;
   Vr15.bit(EQ) = s2==0;
   Vr15.bit(C) = isCarry(s1,s2,r1);
   Vr15.bit(SAT) = isSat(s1,s2,r1);
  }
}
SETB .(SA,SB) s1(U2), s2(U2), s3(R4)                                    SET BYTE FIELD
void ISA::OPC_SETB_20b_97 (U2 &s1,U2 &s2,Gpr &s3,Unit &unit)
{
 s3.range(s1*8,((s2+1)*8)-1) = 1;
 Csr.bit(EQ,unit) = s3.zero( );
}
SETB .(V) s1(U2), s2(U2), s3(R4)                                        SET BYTE FIELD
void ISA::OPCV_SETB_20b_48 (U2 &s1, U2 &s2, Vreg4 &s3)
{
 s3.range(s1*8,((s2+1)*8)-1) = 1;
 Vr15.bit(EQ) = s3==0;
}
SEXT .(SA,SB) s1(U3), s2(R4)                                            SIGN EXTEND
void ISA::OPC_SEXT_20b_79 (U3 &s1, Gpr &s2)
{
 switch(s1.value( ))
 {
  case 0: s2 = sign_extend(s2.range(0,7));
  case 1: s2 = sign_extend(s2.range(0,15));
  case 2: s2 = sign_extend(s2.range(0,23));
  case 3: s2 = s2.undefined(true); //future expansion
 }
}
SEXT .(V,VP) s1(U3), s2(R4)                                             SIGN EXTEND
void ISA::OPCV_SEXT_20b_34 (U3 &s1, Vreg4 &s2, Unit &unit)
{
 if(isVPunit(unit))
 {
  s2.range(0,15 ) = sign_extend(s2.range(0, 7 ));
  s2.range(16,31) = sign_extend(s2.range(16,23));
 } else
 {
  switch(s1.value( ))
  {
   case 0: s2 = sign_extend(s2.range(0,7));
   case 1: s2 = sign_extend(s2.range(0,15));
   case 2: s2 = sign_extend(s2.range(0,23));
   case 3: s2 = s2.undefined(true); //future expansion
  }
 }
}
SHL .(SA,SB) s1(R4), s2(R4)                                             SHIFT LEFT
void ISA::OPC_SHL_20b_98 (Gpr &s1, Gpr &s2,Unit &unit)
{
 s2 = s2 << s1;
 Csr.bit(EQ,unit) = s2.zero( );
}
SHL .(SA,SB) s1(U4), s2(R4)                                             SHIFT LEFT, U4
void ISA::OPC_SHL_20b_99 (U4 &s1,Gpr &s2,Unit &unit)                    IMM
{
 s2 = s2 << s1;
 Csr.bit(EQ,unit) = s2.zero( );
}
SHL .(V,VP) s1(R4), s2(R4)                                              SHIFT LEFT
void ISA::OPCV_SHL_20b_49 (Vreg4 &s1, Vreg4 &s2, Unit &unit)
{
 if(isVPunit(unit))
 {
  s2.range(LSBL,MSBL) = s2.range(LSBL,MSBL) << s1.value( );
  s2.range(LSBU,MSBU) = s2.range(LSBU,MSBU) << s1.value( );
  Vr15.bit(EQA) = s2.range(LSBL,MSBL)==0;
  Vr15.bit(EQB) = s2.range(LSBU,MSBU)==0;
```

TABLE 20-continued

| Syntax/Pseudocode | Description |
|---|---|
| } else<br>{<br>s2 = s2 << s1;<br>Vr15.bit(EQ) = s2==0;<br>}<br>} | |
| SHL .(V,VP) s1(U4), s2(R4)<br>void ISA::OPCV_SHL_20b_50 (U4 &s1, Vreg4 &s2, Unit &unit)<br>{<br>if(isVPunit(unit))<br>{<br>s2.range(LSBL,MSBL) = s2.range(LSBL,MSBL) << zero_extend(s1);<br>s2.range(LSBU,MSBU) = s2.range(LSBU,MSBU) << zero_extend(s1)<br>;<br>Vr15.bit(EQA) = s2.range(LSBL,MSBL)==0;<br>Vr15.bit(EQB) = s2.range(LSBU,MSBU)==0;<br>} else<br>{<br>s2 = s2 << zero_extend(s1);<br>Vr15.bit(EQ) = s2==0;<br>}<br>} | SHIFT LEFT, U4 IMM |
| SHR .(SA,SB) s1(R4), s2(R4)<br>void ISA::OPC_SHR_20b_102 (Gpr &s1, Gpr &s2,Unit &unit)<br>{<br>s2 = s2 >> s1;<br>Csr.bit(EQ,unit) = s2.zero( );<br>} | SHIFT RIGHT, SIGNED |
| SHR .(SA,SB) s1(U4), s2(R4)<br>void ISA::OPC_SHR_20b_103 (U4 &s1, Gpr &s2,Unit &unit)<br>{<br>s2 = s2 >> s1;<br>Csr.bit(EQ,unit) = s2.zero( );<br>} | SHIFT RIGHT, SIGNED, U4 IMM |
| SHR .(V,VP) s1(R4), s2(R4)<br>Code:<br>void ISA::OPCV_SHR_20b_53 (Vreg4 &s1, Vreg4 &s2, Unit &unit)<br>{<br>if(isVPunit(unit))<br>{<br>s2.range(LSBL,MSBL) = s2.range(LSBL,MSBL) >> s1.value( );<br>s2.range(LSBU,MSBU) = s2.range(LSBU,MSBU) >> s1.value( );<br>Vr15.bit(EQA) = s2.range(LSBL,MSBL)==0;<br>Vr15.bit(EQB) = s2.range(LSBU,MSBU)==0;<br>} else<br>{<br>s2 = s2 >> s1;<br>Vr15.bit(EQ) = s2==0;<br>}<br>} | SHIFT RIGHT, SIGNED |
| SHR .(V,VP) s1(U4), s2(R4)<br>void ISA::OPCV_SHR_20b_54 (U4 &s1, Vreg4 &s2, Unit &unit)<br>{<br>if(isVPunit(unit))<br>{<br>s2.range(LSBL,MSBL) = s2.range(LSBL,MSBL) >> zero_extend(s1);<br>s2.range(LSBU,MSBU) = s2.range(LSBU,MSBU) >> zero_extend(s1)<br>;<br>Vr15.bit(EQA) = s2.range(LSBL,MSBL)==0;<br>Vr15.bit(EQB) = s2.range(LSBU,MSBU)==0;<br>} else<br>{<br>s2 = s2 >> zero_extend(s1);<br>Vr15.bit(EQ) = s2==0;<br>}<br>} | SHIFT RIGHT, SIGNED, U4 IMM |
| SHRU .(SA,SB) s1(R4), s2(R4)<br>void ISA::OPC_SHRU_20b_100 (Gpr &s1, Gpr &s2,Unit &unit)<br>{<br>s2 = (_unsigned(s2)) >> s1;<br>Csr.bit(EQ,unit) = s2.zero( );<br>} | SHIFT RIGHT, UNSIGNED |
| SHRU .(SA,SB) s1(U4), s2(R4)<br>void ISA::OPC_SHRU_20b_101 (U4 &s1, Gpr &s2,Unit &unit)<br>{ | SHIFT RIGHT, UNSIGNED, U4 IMM |

TABLE 20-continued

| Syntax/Pseudocode | Description |
|---|---|
| s2 = (_unsigned(s2)) >> s1;<br>Csr.bit(EQ,unit) = s2.zero( );<br>} | |
| SHRU .(V,VP) s1(R4), s2(R4)<br>void ISA::OPCV_SHRU_20b_51 (Vreg4 &s1, Vreg4 &s2, Unit &unit)<br>{<br>if(isVPunit(unit))<br>{<br>s2.range(LSBL,MSBL) = _unsigned(s2.range(LSBL,MSBL)) >> s1.value( );<br>s2.range(LSBU,MSBU) = _unsigned(s2.range(LSBU,MSBU)) >> s1.value( );<br>Vr15.bit(EQA) = s2.range(LSBL,MSBL)==0;<br>Vr15.bit(EQB) = s2.range(LSBU,MSBU)==0;<br>} else<br>{<br>s2 = _unsigned(s2) >> s1;<br>Vr15.bit(EQ) = s2==0;<br>}<br>} | SHIFT RIGHT, UNSIGNED |
| SHRU .(V,VP) s1(U4), s2(R4)<br>void ISA::OPCV_SHRU_20b_52 (U4 &s1, Vreg4 &s2, Unit &unit)<br>{<br>if(isVPunit(unit))<br>{<br>s2.range(LSBL,MSBL) = _unsigned(s2.range(LSBL,MSBL)) >> zero_extend(s1);<br>s2.range(LSBU,MSBU) = _unsigned(s2.range(LSBU,MSBU)) >> zero_extend(s1);<br>Vr15.bit(EQA) = s2.range(LSBL,MSBL)==0;<br>Vr15.bit(EQB) = s2.range(LSBU,MSBU)==0;<br>} else<br>{<br>s2 = _unsigned(s2) >> zero_extend(s1);<br>Vr15.bit(EQ) = s2==0;<br>}<br>} | SHIFT RIGHT, UNSIGNED, U4 IMM |
| SSUB .(SA,SB) s1(R4), s2(R4)<br>void ISA::OPC_SSUB_20b_128 (Gpr &s1, Gpr &s2,Unit &unit)<br>{<br>Result r1;<br>r1 = s2 − s1;<br>if(r1 > 0xFFFFFFFF) s2 = 0xFFFFFFFF;<br>else if(r1 < 0) s2 = 0;<br>else s2 = r1;<br>Csr.bit( C,unit) = r1.underflow( );<br>Csr.bit(EQ, unit) = s2.zero( );<br>Csr.bit(SAT,unit) = r1.overflow( ) \| r1.underflow( );<br>} | SATURATING SUBTRACTION |
| SSUB .(V,VP) s1(R4), s2(R4)<br>void ISA::OPCV_SSUB_20b_77 (Vreg4 &s1, Vreg4 &s2, Unit &unit)<br>{<br>if(isVPunit(unit))<br>{<br>Result r1,r2;<br>r1 = s2.range(0,15) − s1.range(0,15);<br>r2 = s2.range(16,31) − s1.range(16,31);<br>if(r1 > 0xFFFF) s2.range(0,15) = 0xFFFF;<br>else if(r1 < 0) s2.range(0,15) = 0;<br>else s2.range(0,15) = r1.range(0,15);<br>if(r2 >0xFFFF) s2.range(16,31) = 0xFFFF;<br>else if(r2 < 0) s2.range(16,31) = 0;<br>else s2.range(16,31) = r2.range(0,15);<br>Vr15.bit(EQA) = s2.range(LSBL,MSBL)==0;<br>Vr15.bit(EQB) = s2.range(LSBU,MSBU)==0;<br>Vr15.bit(CA) = isCarry(s1,s2,r1);<br>Vr15.bit(CB) = isCarry(s1,s2,r2);<br>} else<br>{<br>Result r1;<br>r1 = s2 − s1;<br>if(r1.overflow( )) s2 = 0xFFFFFFFF;<br>else if(r1.underflow( )) s2 = 0;<br>else s2 = r1;<br>Vr15.bit(EQ) = s2==0;<br>Vr15.bit(C) = isCarry(s1,s2,r1);<br>Vr15.bit(SAT) = isSat(s1,s2,r1);<br>}<br>} | SATURATING SUBTRACTION |

TABLE 20-continued

| Syntax/Pseudocode | Description |
|---|---|
| STB .(SB) *+SBR[s1(U4)], s2(R4)<br>void ISA::OPC_STB_20b_26 (U4 &s1,Gpr &s2)<br>{<br>dmem->byte(Sbr+s1) = s2.byte(0);<br>} | STORE BYTE, SBR, +U4 OFFSET |
| STB .(SB) *+SBR[s1(R4)], s2(R4)<br>void ISA::OPC_STB_20b_29 (Gpr &s1, Gpr &s2)<br>{<br>dmem->byte(Sbr+s1) = s2.byte(0);<br>} | STORE BYTE, SBR, +REG OFFSET |
| STB .(SB) *SBR++[s1(U4)], s2(R4)<br>void ISA::OPC_STB_20b_32 (U4 &s1,Gpr &s2)<br>{<br>dmem->byte(Sbr) = s2.byte(0);<br>Sbr += s1;<br>} | STORE BYTE, SBR, +U4 OFFSET, POST ADJ |
| STB .(SB) *SBR++[s1(R4)], s2(R4)<br>void ISA::OPC_STB_20b_35 (Gpr &s1, Gpr &s2)<br>{<br>dmem->byte(Sbr) = s2.byte(0);<br>Sbr += s1;<br>} | STORE BYTE, SBR, +REG OFFSET, POST ADJ |
| STB .(SB) *+s1(R4), s2(R4)<br>void ISA::OPC_STB_20b_38 (Gpr &s1, Gpr &s2)<br>{<br>dmem->byte(s1) = s2.byte(0);<br>} | STORE BYTE, ZERO OFFSET |
| STB .(SB) *s1(R4)++, s2(R4)<br>void ISA::OPC_STB_20b_41 (Gpr &s1, Gpr &s2)<br>{<br>dmem->byte(s1) = s2.byte(0);<br>++s1;<br>} | STORE BYTE, ZERO OFFSET, POST INC |
| STB .(SB) *+s1[s2(U20)], s3(R4)<br>void ISA::OPC_STB_40b_170 (Gpr &s1, U20 &s2, Gpr &s3)<br>{<br>dmem->byte(s1+s2) = s3.byte(0);<br>} | STORE BYTE, +U20 OFFSET |
| STB .(SB) *s1++[s2(U20)], s3(R4)<br>void ISA::OPC_STB_40b_173 (Gpr &s1, U20 &s2, Gpr &s3)<br>{<br>dmem->byte(s1) = s3.byte(0);<br>s1 += s2;<br>} | STORE BYTE, +U20 OFFSET, POST ADJ |
| STB .(SB) *+SBR[s1(U24)], s2(R4)<br>void ISA::OPC_STB_40b_176 (U24 &s1, Gpr &s2)<br>{<br>dmem->byte(Sbr+s1) = s2.byte(0);<br>} | STORE BYTE, SBR, +U24 OFFSET |
| STB .(SB) *SBR++[s1(U24)], s2(R4)<br>void ISA::OPC_STB_40b_179 (U24 &s1, Gpr &s2)<br>{<br>dmem->byte(Sbr) = s2.byte(0);<br>Sbr += s1;<br>} | STORE BYTE, SBR, +U24 OFFSET, POST ADJ |
| STB .(SB) *s1(U24),s2(R4)<br>void ISA::OPC_STB_40b_182 (U24 &s1, Gpr &s2)<br>{<br>dmem->byte(s1) = s2.byte(0);<br>} | STORE BYTE, U24 IMM ADDRESS |
| STB .(SB) *+SP[s1(U24)], s2(R4)<br>void ISA::OPC_STB_40b_252 (U24 &s1,Gpr &s2)<br>{<br>dmem->byte(Sp+s1) = s2.byte(0);<br>} | STORE BYTE, SP, +U24 OFFSET |
| STB .(V4) *+s1(R4), s2(R4)<br>void ISA::OPCV_STB_20b_16 (Vreg4 &s1, Vreg4 &s2)<br>{<br>dmem->byte(s1) = s2.byte(0);<br>} | STORE BYTE, ZERO OFFSET |
| STB .(V4) *s1(R4)++, s2(R4)<br>void ISA::OPCV_STB_20b_19 (Vreg4 &s1, Vreg4 &s2)<br>{<br>dmem->byte(s1) = s2.byte(0);<br>++s1;<br>} | STORE BYTE, ZERO OFFSET, POST INC |

TABLE 20-continued

| Syntax/Pseudocode | Description |
|---|---|
| STH .(SB) *+SBR[s1(U4)], s2(R4)<br>void ISA::OPC_STH_20b_27 (U4 &s1,Gpr &s2)<br>{<br>dmem->half(Sbr+(s1<<1)) = s2.half(0);<br>} | STORE HALF, SBR, +U4 OFFSET |
| STH .(SB) *+SBR[s1(R4)], s2(R4)<br>void ISA::OPC_STH_20b_30 (Gpr &s1, Gpr &s2)<br>{<br>dmem->half(Sbr+(s1<<1)) = s2.half(0);<br>} | STORE HALF, SBR, +REG OFFSET |
| STH .(SB) *SBR++[s1(U4)], s2(R4)<br>void ISA::OPC_STH_20b_33 (U4 &s1,Gpr &s2)<br>{<br>dmem->half(Sbr) = s2.half(0);<br>Sbr += (s1<<1);<br>} | STORE HALF, SBR, +U4 OFFSET, POST ADJ |
| STH .(SB) *SBR++[s1(R4)], s2(R4)<br>void ISA::OPC_STH_20b_36 (Gpr &s1, Gpr &s2)<br>{<br>dmem->half(Sbr) = s2.half(0);<br>Sbr += s1;<br>} | STORE HALF, SBR, +REG OFFSET, POST ADJ |
| STH .(SB) *+s1(R4), s2(R4)<br>void ISA::OPC_STH_20b_39 (Gpr &s1, Gpr &s2)<br>{<br>dmem->half(s1) = s2.half(0);<br>} | STORE HALF, ZERO OFFSET |
| STH .(SB) *s1(R4)++, s2(R4)<br>void ISA::OPC_STH_20b_42 (Gpr &s1, Gpr &s2)<br>{<br>dmem->half(s1) = s2.half(0);<br>s1 += 2;<br>} | STORE HALF, ZERO OFFSET, POST INC |
| STH .(SB) *+s1[s2(U20)], s3(R4)<br>void ISA::OPC_STH_40b_171 (Gpr &s1, U20 &s2, Gpr &s3)<br>{<br>dmem->half(s1+(s2<<1)) = s3.half(0);<br>} | STORE HALF, +U20 OFFSET |
| STH .(SB) *s1++[s2(U20)], s3(R4)<br>void ISA::OPC_STH_40b_174 (Gpr &s1, U20 &s2, Gpr &s3)<br>{<br>dmem->half(s1) = s3.half(0);<br>s1 += s2<<1;<br>} | STORE HALF, +U20 OFFSET, POST ADJ |
| STH .(SB) *+SBR[s1(U24)], s2(R4)<br>void ISA::OPC_STH_40b_177 (U24 &s1, Gpr &s2)<br>{<br>dmem->half(Sbr+(s1<<1)) = s2.half(0);<br>} | STORE HALF, SBR, +U24 OFFSET |
| STH .(SB) *SBR++[s1(U24)], s2(R4)<br>void ISA::OPC_STH_40b_180 (U24 &s1, Gpr &s2)<br>{<br>dmem->half(Sbr) = s2.half(0);<br>Sbr += 2;<br>} | STORE HALF, SBR, +U24 OFFSET, POST ADJ |
| STH .(SB) *s1(U24),s2(R4)<br>void ISA::OPC_STH_40b_183 (U24 &s1, Gpr &s2)<br>{<br>dmem->half(s1<<1) = s2.half(0);<br>} | STORE HALF, U24 IMM ADDRESS |
| STH .(SB) *+SP[s1(U24)], s2(R4)<br>void ISA::OPC_STH_40b_253 (U24 &s1, Gpr &s2)<br>{<br>dmem->half(Sp+(s1<<1)) = s2.half(0);<br>} | STORE HALF, SP, +U24 OFFSET |
| STH .(V4) *+s1(R4), s2(R4)<br>void ISA::OPCV_STH_20b_17 (Vreg4 &s1, Vreg4 &s2)<br>{<br>dmem->half(s1) = s2.byte(0);<br>} | STORE HALF, ZERO OFFSET |
| STH .(V4) *s1(R4)++, s2(R4)<br>void ISA::OPCV_STH_20b_20 (Vreg4 &s1, Vreg4 &s2)<br>{<br>dmem->half(s1) = s2.byte(0);<br>++s1;<br>} | STORE HALF, ZERO OFFSET, POST INC |

TABLE 20-continued

| Syntax/Pseudocode | Description |
|---|---|
| STRF .SB s1(R4), s2(R4)<br>void ISA::OPC_STRF_20b_81 (Gpr &s1, Gpr &s2)<br>{<br>if(s1 >= s2)<br>{<br>for(int r=s2.address( );r<s1.address( );++r)<br>{<br>dmem->write(Sp,r);<br>Sp −= 4;<br>}<br>}<br>} | STORE REGISTER FILE RANGE |
| STSYS .(SB) s1(R4), s2(R4)<br>void ISA::OPC_STSYS_20b_163 (Gpr &s1, Gpr &s2)<br>{<br>gls_is_load._assert(0);<br>gls_attr_valid._assert(1);<br>gls_is_stsys._assert(1);<br>gls_regf_addr._assert(s2.address( )); //reg addr of s2<br>gls_sys_addr._assert(s1); //contents of s1<br>} | STORE SYSTEM ATTRIBUTE (GLS) |
| STW .(SB) *+SBR[s1(U4)], s2(R4)<br>void ISA::OPC_STW_20b_28 (U4 &s1,Gpr &s2)<br>{<br>dmem->word(Sbr+(s1<<2)) = s2.word( );<br>} | STORE WORD, SBR, +U4 OFFSET |
| STW .(SB) *+SBR[s1(R4)], s2(R4)<br>void ISA::OPC_STW_20b_31 (Gpr &s1, Gpr &s2)<br>{<br>dmem->word(Sbr+(s1<<2)) = s2.word( );<br>} | STORE WORD, SBR, +REG OFFSET |
| STW .(SB) *SBR++[s1(U4)], s2(R4)<br>void ISA::OPC_STW_20b_34 (U4 &s1,Gpr &s2)<br>{<br>dmem->word(Sbr) = s2.word( );<br>Sbr += (s1<<2);<br>} | STORE WORD, SBR, +U4 OFFSET, POST ADJ |
| STW .(SB) *SBR++[s1(R4)], s2(R4)<br>void ISA::OPC_STW_20b_37 (Gpr &s1, Gpr &s2)<br>{<br>dmem->word(Sbr) = s2.word( );<br>Sbr += s1;<br>} | STORE WORD, SBR, +REG OFFSET, POST ADJ |
| STW .(SB) *+s1(R4), s2(R4)<br>void ISA::OPC_STW_20b_40 (Gpr &s1, Gpr &s2)<br>{<br>dmem->word(s1) = s2.word( );<br>} | STORE WORD, ZERO OFFSET |
| STW .(SB) *s1(R4)++, s2(R4)<br>void ISA::OPC_STW_20b_43 (Gpr &s1, Gpr &s2)<br>{<br>dmem->word(s1) = s2.word( );<br>s1 += 4;<br>} | STORE WORD, ZERO OFFSET, POST INC |
| STW .(SB) *+s1[s2(U20)], s3(R4)<br>void ISA::OPC_STW_40b_172 (Gpr &s1, U20 &s2, Gpr &s3)<br>{<br>dmem->word(s1+(s2<<2)) = s3.word( );<br>} | STORE WORD, +U20 OFFSET |
| STW .(SB) *s1++[s2(U20)], s3(R4)<br>void ISA::OPC_STW_40b_175 (Gpr &s1, U20 &s2, Gpr &s3)<br>{<br>dmem->word(s1) = s3.word( );<br>s1 += s2<<2;<br>} | STORE WORD, +U20 OFFSET, POST ADJ |
| STW .(SB) *+SBR[s1(U24)], s2(R4)<br>void ISA::OPC_STW_40b_178 (U24 &s1, Gpr &s2)<br>{<br>dmem->word(Sbr+(s1<<2)) = s2.word( );<br>} | STORE WORD, SBR, +U24 OFFSET |
| STW .(SB) *SBR++[s1(U24)], s2(R4)<br>void ISA::OPC_STW_40b_181 (U24 &s1, Gpr &s2)<br>{<br>dmem->word(Sbr) = s2.word( );<br>Sbr += s1<<2;<br>} | STORE WORD, SBR, +U24 OFFSET, POST ADJ |

TABLE 20-continued

| Syntax/Pseudocode | Description |
|---|---|
| STW .(SB) *s1(U24),s2(R4)<br>void ISA::OPC_STW_40b_184 (U24 &s1, Gpr &s2)<br>{<br> dmem->word(s1<<2) = s2.word( );<br>} | STORE WORD, U24 IMM ADDRESS |
| STW .(SB) *+SP[s1(U24)], s2(R4)<br>void ISA::OPC_STW_40b_254 (U24 &s1,Gpr &s2)<br>{<br> dmem->word(Sp+(s1<<2)) = s2.word( );<br>} | STORE WORD, SP, +U24 OFFSET |
| STW .(V4) *+s1(R4), s2(R4)<br>void ISA::OPCV_STW_20b_18 (Vreg4 &s1, Vreg4 &s2)<br>{<br> dmem->word(s1) = s2.byte(0);<br>} | STORE WORD, ZERO OFFSET |
| STW .(V4) *s1(R4)++, s2(R4)<br>void ISA::OPCV_STW_20b_21 (Vreg4 &s1, Vreg4 &s2)<br>{<br> dmem->word(s1) = s2.byte(0);<br> ++s1;<br>} | STORE WORD, ZERO OFFSET, POST INC |
| SUB .(SA,SB) s1(R4), s2(R4)<br>void ISA::OPC_SUB_20b_113 (Gpr &s1, Gpr &s2,Unit &unit)<br>{<br> Result r1;<br> r1 = s2 − s1;<br> s2 = r1;<br> Csr.bit( C,unit) = r1.underflow( );<br> Csr.bit(EQ,unit) = s2.zero( );<br>} | SUBTRACT |
| SUB .(SA,SB) s1(U4), s2(R4)<br>void ISA::OPC_SUB_20b_114 (U4 &s1, Gpr &s2,Unit &unit)<br>{<br> Result r1;<br> r1 = s2 − s1;<br> s2 = r1;<br> Csr.bit( C,unit) = r1.underflow( );<br> Csr.bit(EQ,unit) = s2.zero( );<br>} | SUBTRACT, U4 IMM |
| SUB .(SB) s1(U28),SP(R5)<br>void ISA::OPC_SUB_40b_231 (U28 &s1)<br>{<br> Sp −= s1;<br>} | SUBTRACT, SP, U28 IMM |
| SUB .(SB) s1(U24), SP(R5), s3(R4)<br>void ISA::OPC_SUB_40b_232 (U24 &s1, Gpr &s3)<br>{<br> s3 = Sp−s1;<br>} | SUBTRACT, SP, U24 IMM, REG DEST |
| SUB .(SB) s1(U24),s2(R4)<br>void ISA::OPC_SUB_40b_233 (U24 &s1,Gpr &s2,Unit &unit)<br>{<br> Result r1;<br> r1 = s2 − s1;<br> s2 = r1;<br> Csr.bit(EQ,unit) = s2.zero( );<br> Csr.bit( C,unit) = r1.carryout( );<br>} | SUBTRACT, U24 IMM |
| SUB .(V,VP) s1(R4), s2(R4)<br>void ISA::OPCV_SUB_20b_64 (Vreg4 &s1, Vreg4 &s2, Unit &unit)<br>{<br> if(isVPunit(unit))<br> {<br>  Reg s1lo = s1.range(LSBL,MSBL);<br>  Reg s2lo = s2.range(LSBL,MSBL);<br>  Reg resultlo = s2lo − s1lo;<br>  Reg s1hi = s1.range(LSBU,MSBU);<br>  Reg s2hi = s2.range(LSBU,MSBU);<br>  Reg resulthi = s2hi − s1hi;<br>  s2.range(LSBL,MSBL) = resultlo.range(LSBL,MSBL);<br>  s2.range(LSBU,MSBU) = resulthi.range(LSBU,MSBU);<br>  Vr15.bit(EQA) = s2.range(LSBL,MSBL)==0;<br>  Vr15.bit(EQB) = s2.range(LSBU,MSBU)==0;<br>  Vr15.bit(CA) = isCarry(s1lo,s2lo,resultlo);<br>  Vr15.bit(CB) = isCarry(s1hi,s2hi,resulthi);<br> } else<br> { | SUBTRACT |

TABLE 20-continued

| Syntax/Pseudocode | Description |
|---|---|
| Reg result = s2 − s1;<br>s2 = result;<br>Vr15.bit(EQ) = s2==0;<br>Vr15.bit(C) = isCarry(s1,s2,result);<br>}<br>} | |
| SUB .(V,VP) s1(U4), s2(R4)<br>void ISA::OPCV_SUB_20b_65 (U4 &s1, Vreg4 &s2, Unit &unit)<br>{<br>if(isVPunit(unit))<br>{<br>Reg s2lo = s2.range(LSBL,MSBL);<br>Reg resultlo = s2lo − zero_extend(s1);<br>Reg s2hi = s2.range(LSBU,MSBU);<br>Reg resulthi = s2hi − zero_extend(s1);<br>s2.range(LSBL,MSBL) = resultlo.range(LSBL,MSBL);<br>s2.range(LSBU,MSBU) = resulthi.range(LSBU,MSBU);<br>Vr15.bit(EQA) = s2.range(LSBL,MSBL)==0;<br>Vr15.bit(EQB) = s2.range(LSBU,MSBU)==0;<br>Vr15.bit(CA) = isCarry(s1,s2lo,resultlo);<br>Vr15.bit(CB) = isCarry(s1,s2hi,resulthi);<br>} else<br>{<br>Reg result = s2 − zero_extend(s1);<br>s2 = result;<br>Vr15.bit(EQ) = s2==0;<br>Vr15.bit(C) = isCarry(s1,s2,result);<br>}<br>} | SUBTRACT, U4 IMM |
| SUB2 .(SA,SB) s1(R4), s2(R4)<br>void ISA::OPC_SUB2_20b_367 (Gpr &s1, Gpr &s2)<br>{<br>s2.range(0,15) =<br>(s2.range(0,15) − s1.range(0,15)) >> 1;<br>s2.range(16,31) =<br>(s2.range(16,31) − s1.range(16,31)) >> 1;<br>} | HALF WORD SUBTRACTION WITH DIVIDE BY 2 |
| SUB2 .(SA,SB) s1(U4), s2(R4)<br>void ISA::OPC_SUB2_20b_368 (U4 &s1, Gpr &s2)<br>{<br>s2.range(0,15) = (s2.range(0,15) − s1.value( )) >> 1;<br>s2.range(16,31) = (s2.range(16,31) − s1.value( )) >> 1;<br>} | HALF WORD SUBTRACTION WITH DIVIDE BY 2 |
| SUB2 .(VPx) s1(R4), s2(R4)<br>void ISA::OPCV_SUB2_20b_30 (Vreg4 &s1, Vreg4 &s2)<br>{<br>s2.range(0,15) =<br>(s2.range(0,15) − s1.range(0,15)) >> 1;<br>s2.range(16,31) =<br>(s2.range(16,31) − s1.range(16,31)) >> 1;<br>} | HALF WORD SUBTRACTION WITH DIVIDE BY 2 |
| SUB2 .(VPx) s1(U4), s2(R4)<br>void ISA::OPCV_SUB2_20b_31 (U4 &s1, Vreg4 &s2)<br>{<br>s2.range(0,15) = (s2.range(0,15) − s1.value( )) >> 1;<br>s2.range(16,31) = (s2.range(16,31) − s1.value( )) >> 1;<br>} | HALF WORD SUBTRACTION WITH DIVIDE BY 2 |
| SUM .(VBx,VPx) s1(R4), s2(R4)<br>void ISA::OPCV_SUM_20b_54 (Vreg4 &s1, Vreg4 &s2, Unit &unit)<br>{<br>if(isVBunit(unit))<br>{<br>s2 = s1.range(24,31)<br>+ s1.range(16,23)<br>+ s1.range(8,15)<br>+ s1.range(0,7);<br>}<br>if(isVPunit(unit))<br>{<br>s2 = s1.range(16,31)<br>+ s1.range(0,15);<br>}<br>} | SUMMATION |
| SUMU .(VBx,VPx) s1(R4), s2(R4)<br>void ISA::OPCV_SUMU_20b_55 (Vreg4 &s1, Vreg4 &s2, Unit &unit)<br>{ | SUMMATION, UNSIGNED |

TABLE 20-continued

| Syntax/Pseudocode | Description |
|---|---|
| if(isVBunit(unit))<br>{<br>s2 = _unsigned(s1.range(24,31))<br>+ _unsigned(s1.range(16,23))<br>+ _unsigned(s1.range(8,15))<br>+ _unsigned(s1.range(0,7));<br>}<br>if(isVPunit(unit))<br>{<br>s2 = _unsigned(s1.range(16,31))<br>+ _unsigned(s1.range(0,15));<br>}<br>} | |
| SWAP .(SA,SB) s1(R4), s2(R4)<br>void ISA::OPC_SWAP_20b_146 (Gpr &s1, Gpr &s2)<br>{<br>Result tmp;<br>tmp = s1;<br>s1 = s2;<br>s2 = tmp;<br>} | SWAP REGISTERS |
| SWAP .(V,VP) s1(R4), s2(R4)<br>void ISA::OPCV_SWAP_20b_82 (Vreg4 &s1, Vreg4 &s2, Unit &unit)<br>{<br>if(isVPunit(unit))<br>{<br>Result tmp;<br>tmp = s1;<br>s1.range(LSBL,MSBL) = s2.range(LSBU,MSBU);<br>s1.range(LSBU,MSBU) = s2.range(LSBL,MSBL);<br>s2.range(LSBU,MSBU) = tmp.range(LSBL,MSBL);<br>s2.range(LSBL,MSBL) = tmp.range(LSBU,MSBU);<br>} else<br>{<br>Result tmp;<br>tmp = s1;<br>s1 = s2;<br>s2 = tmp;<br>}<br>} | SWAP REGISTERS |
| SWAPBR .(SA,SB)<br>void ISA::OPC_SWAPBR_20b_11 (void)<br>{<br>Result tmp;<br>tmp = Lbr;<br>Lbr = Sbr;<br>Sbr = tmp;<br>} | SWAP LBR and SBR |
| SWIZ .(SA,SB) s1(R4), s2(R4)<br>void ISA::OPC_SWIZ_20b_44 (Gpr &s1, Gpr &s2)<br>{<br>//This should be defined as a p-op, it overlaps<br>//one form of REORD<br>s2.range(0,7) = s1.range(24,31);<br>s2.range(8,15) = s1.range(16,23);<br>s2.range(16,23) = s1.range(8,15);<br>s2.range(24,31) = s1.range(0,7);<br>} | SWIZZLE, ENDIAN CONVERSION |
| SWIZ .(Vx) s1(R4), s2(R4)<br>void ISA::OPCV_SWIZ_20b_44 (Vreg4 &s1, Vreg4 &s2)<br>{<br>//This should be defined as a p-op, it overlaps<br>//one form of REORD<br>s2.range(0,7) = s1.range(24,31);<br>s2.range(8,15) = s1.range(16,23);<br>s2.range(16,23) = s1.range(8,15);<br>s2.range(24,31) = s1.range(0,7);<br>} | SWIZZLE, ENDIAN CONVERSION |
| TASKSW .(SA,SB)<br>void ISA::OPC_TASKSW_20b_19 (void)<br>{<br>risc_is_task_sw._assert(1);<br>} | TASK SWITCH |
| TASKSWTOE .(SA,SB) s1(U2)<br>void ISA::OPC_TASKSWTOE_20b_126 (U2 &s1)<br>{ | TASK SWITCH TEST OUTPUT ENABLE |

TABLE 20-continued

| Syntax/Pseudocode | Description |
|---|---|
| risc_is_taskswtoe._assert(1);<br>risc_is_taskswtoe_opr._assert(s1);<br>} | |
| VIC .V3 s1(R4), s2(S9), s3(R2)<br>void ISA::OPCV_VIC_20b_399 (Gpr &s1, S9 &s2, Vreg2 &s3)<br>{<br>risc_regf_ra0._assert(D0,s1.address( ));<br>risc_regf_rd0z._assert(D0,0);<br>Result rVIP = risc_regf_rd0.read( ); //E0 is implied<br>int mode = rVIP.range(28,29);<br>bool store_disable = rVIP.bit(27);<br>int hg_size = rVIP.range( 0, 7); //aka Block_Width<br>int buffer_size = rVIP.range( 8,15);<br>bool block = mode == 0x00;<br>if(block)<br>{<br>unsigned int u_offset = _unsigned(s2.range(0,7));<br>int addr = (hg_size<<5) * u_offset;<br>s3.range( 0,15) = addr;<br>s3.range(16,31) = addr;<br>}<br>else<br>{<br>bool top_flag = rVIP.bit(31);<br>bool bot_flag = rVIP.bit(30);<br>int tboffset = rVIP.range(24,26);<br>int pointer = rVIP.range(16,23);<br>int s_offset = sign_extend(s2.range(0,7));<br>bool top_bound = top_flag && (s_offset < (−tboffset));<br>bool bot_bound = bot_flag && (s_offset > ( tboffset));<br>bool mirror = (mode == 0x01);<br>bool repeat = (mode == 0x02);<br>if(mirror)<br>{<br>int tboffset_x2 = tboffset << 1;<br>if(top_bound) s_offset = −(tboffset_x2 + s_offset);<br>if(bot_bound) s_offset = (tboffset_x2 − s_offset);<br>}<br>else if(repeat)<br>{<br>if(top_bound) s_offset = −tboffset;<br>if(bot_bound) s_offset = tboffset;<br>}<br>int addr = pointer + s_offset;<br>if(addr > buffer_size) addr −= buffer_size;<br>else if(addr < 0) addr += buffer_size;<br>addr *= hg_size << 5;<br>Result r1 = addr;<br>bool bounded = top_bound \|\| bot_bound;<br>s3.bit(31) = bounded;<br>s3.bit(15) = bounded;<br>s3.range(16,30) = r1.range(0,14);<br>s3.range(0,14) = r1.range(0,14);<br>}<br>Result newSreg;<br>newSreg.range(9,10) = mode;<br>newSreg.bit(8) = store_disable;<br>newSreg.range(0,7) = hg_size;<br>risc_vsr_wrz._assert(E1,0);<br>risc_vsr_wa._assert(E1,s3.address( ));<br>risc_vsr_wd._assert(E1,newSreg.range(0,10));<br>} | VERTICAL INDEX CALC, IMMEDIATE FORM |
| VIC .V3 s1(R4), s2(R4), s3(R2)<br>void ISA::OPCV_VIC_20b_400 (Gpr &s1, Vreg &s2, Vreg2 &s3)<br>{<br>risc_regf_ra0._assert(D0,s1.address( ));<br>risc_regf_rd0z._assert(D0,0);<br>Result rVIP = risc_regf_rd0.read( ); //E0 is implied<br>int mode = rVIP.range(28,29);<br>int buffer_size = rVIP.range(16,23);<br>bool store_disable = rVIP.bit(27);<br>int hg_size = rVIP.range( 0, 7); //aka Block_Width<br>bool block = mode == 0x00; | VERTICAL INDEX CALC, REGISTER FORM |

TABLE 20-continued

| Syntax/Pseudocode | Description |
|---|---|

```
 if(block)
 {
  //For block processing s2 is treated as an unsigned
  //absolute offset value
  unsigned int u_offset_lo = _unsigned(s2.range( 0,15));
  unsigned int u_offset_hi = _unsigned(s2.range(16,31));
  int addr_lo = (hg_size<<5) * u_offset_lo;
  int addr_hi = (hg_size<<5) * u_offset_hi;
  s3.range( 0,15) = addr_lo;
  s3.range(16,31) = addr_hi;
  //The shadow register is updated below the else clause
 }
 else
 {
  //Extract the other VIP contents that are used here
  bool top_flag = rVIP.bit(31);
  bool bot_flag = rVIP.bit(30);
  int tboffset = rVIP.range(24,26);
  int pointer = rVIP.range(16,23);
  //s_offset is aka the imm_cnst found in the T20 ISA.
  //Aligning names to System Spec.
  int s_offset_lo = sign_extend(s2.range( 0,15));
  int s_offset_hi = sign_extend(s2.range(16,31));
  //Detect the boundary processing conditions
  bool top_bound_lo = top_flag && (s_offset_lo < (−tboffset));
  bool bot_bound_lo = bot_flag && (s_offset_lo > ( tboffset));
  bool bounded_lo = top_bound_lo || bot_bound_lo;
  bool top_bound_hi = top_flag && (s_offset_hi < (−tboffset));
  bool bot_bound_hi = bot_flag && (s_offset_hi > ( tboffset));
  bool bounded_hi = top_bound_hi || bot_bound_hi;
  //Form the mode flags
  bool mirror = (mode == 0x01);
  bool repeat = (mode == 0x02);
  if(mirror)
  {
   int tboffset_x2 = tboffset << 1;
   if(top_bound_lo) s_offset_lo = −(tboffset_x2 + s_offset_lo);
   if(top_bound_hi) s_offset_hi = −(tboffset_x2 + s_offset _hi);
   if(bot_bound_lo) s_offset_lo = (tboffset_x2 − s_offset_lo);
   if(bot_bound_hi) s_offset_hi = (tboffset_x2 − s_offset_hi);
  }
  else if(repeat)
  {
   if(top_bound_lo) s_offset_lo = −tboffset;
   if(top_bound_hi) s_offset_hi = −tboffset;
   if(bot_bound_lo) s_offset_lo = tboffset;
   if(bot_bound_hi) s_offset_hi = tboffset;
  }
  int addr_lo = pointer + s_offset_lo;
  if(addr_lo > buffer_size) addr_lo −= buffer_size;
  else if(addr_lo < 0) addr_lo += buffer_size;
  int addr_hi = pointer + s_offset_hi;
  if(addr_hi > buffer_size) addr_hi −= buffer_size;
  else if(addr_hi < 0) addr_hi += buffer_size;
  // Shift and mul by hg_size
  addr_lo *= hg_size << 5;
  addr_hi *= hg_size << 5;
  // Assign addr to a Result type so we can use range( ) instead
  // of C bit manipulation;
  Result r_lo = addr_lo;
  Result r_hi = addr_hi;
  // Assign the boundary processing flag bit
  s3.bit(15)      = bounded_lo;
  s3.bit(31)      = bounded_hi;
  s3.range(0,14) = r_lo.range(0,14);
  s3.range(16,30) = r_hi.range(0,14);
 }
 // Form the contents of the shadow register
 Result newSreg;
 newSreg.range(9,10) = mode;
 newSreg.bit(8) = store_disable;
 newSreg.range(0,7) = hg_size;
 // Update the shadow register
 risc_vsr_wrz._assert(E1,0);
 risc_vsr_wa._assert(E1,s3.address( ));
 risc_vsr_wd._assert(E1,newSreg.range(0,10));
}
```

TABLE 20-continued

| Syntax/Pseudocode | Description |
|---|---|
| VINPUT (SB) s1(R4), s2(R4)<br>void ISA::OPC_VINPUT_20b_129 (Gpr &s1, Gpr &s2)<br>{<br>gls_is_vinput._assert(1);<br>gls_sys_addr._assert(s1);<br>gls_vreg._assert(s2.address( ));<br>} | VECTOR INPUT, 2 OPERAND |
| VINPUT (SB) *+s1(R4)[s2(R4)], s3(R4)<br>void ISA::OPC_VINPUT_40b_244 (Gpr &s1, Gpr &s2, Gpr &s3)<br>{<br>gls_is_vinput._assert(1);<br>Result r1 = s1+s2;<br>gls_sys_addr._assert(r1.value( ));<br>gls_vreg._assert(s3.address( ));<br>} | VINPUT, 3 OPERAND, REGISTER FORM |
| VINPUT (SB) *+s1(R4)[s2(U16)], s3(R4)<br>void ISA::OPC_VINPUT_40b_245 (Gpr &s1, U16 &s2, Gpr &s3)<br>{<br>gls_is_vinput._assert(1);<br>Result r1 = s1+s2;<br>gls_sys_addr._assert(r1.value( ));<br>gls_vreg._assert(s3.address( ));<br>} | VINPUT, 3 OPERAND, IMMEDIATE FORM |
| VINPUT .SB *+s1(R4)[s2(U16)], s3(R4), s4(R4)<br>void ISA::OPC_VINPUT_40b_245 (Gpr &s1, U16 &s2, Gpr &s3, Vreg &s4)<br>{<br>Result r1 = _unsigned(s1)+_unsigned(s2);<br>risc_is_vinput._assert(1); //instruction flag<br>gls_sys_addr._assert(r1.value( )); //calculated address<br>risc_vip_size._assert(s3.range(0,7)); //size field from VIP<br>risc_vip_valid._assert(1); //size field valid<br>gls_vreg._assert(s3.address( )); //virtual register address<br>} | VINPUT, 4 OPERAND, IMMEDIATE FORM |
| VINPUT .SB *+s1(R4)[s2(R4)], s3(R4), s4(R4)<br>void ISA::OPC_VINPUT_40b_244 (Gpr &s1, Gpr &s2, Gpr &s3, Vreg &s4)<br>{<br>Result r1 = _unsigned(s1)+_unsigned(s2);<br>risc_is_vinput._assert(1); //instruction flag<br>gls_sys_addr._assert(r1.value( )); //calculated address<br>risc_vip_size._assert(s3.range(0,7)); //size field from VIP<br>risc_vip_valid._assert(1); //size field valid<br>gls_vreg._assert(s4.address( )); //virtual register address<br>} | VINPUT, 4 OPERAND, REGISTER FORM |
| VLDB .(SB) *+LBR[s1(U4)], s2(R4)<br>void ISA::OPC_VLDB_20b_336 (U4 &s1, Gpr &s2)<br>{<br>Result r1 = Lbr + s1;<br>risc_fmem_addr._assert(r1.range(2,19));<br>risc_fmem_bez._assert(byte_decode(r1));<br>risc_vec_opr._assert(s2.address( ));<br>risc_is_vild._assert(1);<br>} | VECTOR IMPLIED LOAD SIGNED BYTE, LBR, +U4 OFFSET |
| VLDB .(SB) *+LBR[s1(R4)], s2(R4)<br>void ISA::OPC_VLDB_20b_341 (Gpr &s1, Gpr &s2)<br>{<br>Result r1 = Lbr + s1;<br>risc_fmem_addr._assert(r1.range(2,19));<br>risc_fmem_bez._assert(byte_decode(r1));<br>risc_vec_opr._assert(s2.address( ));<br>risc_is_vild._assert(1);<br>} | VECTOR IMPLIED LOAD SIGNED BYTE, LBR, +REG OFFSET |
| VLDB .(SB) *LBR++[s1(U4)], s2(R4)<br>void ISA::OPC_VLDB_20b_346 (U4 &s1, Gpr &s2)<br>{<br>risc_fmem_addr._assert(Lbr.range(2,19));<br>risc_fmem_bez._assert(byte_decode(Lbr));<br>risc_vec_opr._assert(s2.address( ));<br>risc_is_vild._assert(1);<br>Lbr += s1;<br>} | VECTOR IMPLIED LOAD SIGNED BYTE, LBR, +U4 OFFSET POST ADJ |
| VLDB .(SB) *LBR++[s1(R4)], s2(R4)<br>void ISA::OPC_VLDB_20b_351 (Gpr &s1, Gpr &s2)<br>{ | VECTOR IMPLIED LOAD SIGNED BYTE, LBR, +REG |

TABLE 20-continued

| Syntax/Pseudocode | Description |
|---|---|
| risc_fmem_addr._assert(Lbr.range(2,19));<br>risc_fmem_bez._assert(byte_decode(Lbr));<br>risc_vec_opr._assert(s2.address( ));<br>risc_is_vild._assert(1);<br>Lbr += s1;<br>} | OFFSET, POST ADJ |
| VLDB .(SB) *+s1(R4), s2(R4)<br>void ISA::OPC_VLDB_20b_356 (Gpr &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vild._assert(1);<br>} | VECTOR IMPLIED LOAD SIGNED BYTE, ZERO OFFSET |
| VLDB .(SB) *s1(R4)++, s2(R4)<br>void ISA::OPC_VLDB_20b_361 (Gpr &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vild._assert(1);<br>++s1;<br>} | VECTOR IMPLIED LOAD SIGNED BYTE, ZERO OFFSET, POST INC |
| VLDB .(SB) *+s1(R4)[s2(U20)], s3(R4)<br>void ISA::OPC_VLDB_40b_474 (Gpr &s1, U20 &s2, Gpr &s3)<br>{<br>Result r1 = s1 + s2;<br>risc_fmem_addr._assert(r1.range(2,19));<br>risc_fmem_bez._assert(byte_decode(r1));<br>risc_vec_opr._assert(s3.address( ));<br>risc_is_vild._assert(1);<br>} | VECTOR IMPLIED LOAD SIGNED BYTE, +U20 OFFSET |
| VLDB .(SB) *s1(R4)++[s2(U20)], s3(R4)<br>void ISA::OPC_VLDB_40b_479 (Gpr &s1, U20 &s2, Gpr &s3)<br>{<br>risc_fmem_addr._assert(s1.range(2,19));<br>risc_fmem_bez._assert(byte_decode(s1));<br>risc_vec_opr._assert(s3.address( ));<br>risc_is_vild._assert(1);<br>s1 += s2;<br>} | VECTOR IMPLIED LOAD SIGNED BYTE, +U20 OFFSET, POST ADJ |
| VLDB .(SB) *+LBR[s1(U24)], s2(R4)<br>void ISA::OPC_VLDB_40b_484 (U24 &s1, Gpr &s2)<br>{<br>Result r1 = Lbr + s1;<br>risc_fmem_addr._assert(r1.range(2,19));<br>risc_fmem_bez._assert(byte_decode(r1));<br>risc_vec_opr._assert(s2.address( ));<br>risc_is_vild._assert(1);<br>} | VECTOR IMPLIED LOAD SIGNED BYTE, LBR, +U24 OFFSET |
| VLDB .(SB) *LBR++[s1(U24)], s2(R4)<br>void ISA::OPC_VLDB_40b_489 (U24 &s1, Gpr &s2)<br>{<br>risc_fmem_addr._assert(Lbr.range(2,19));<br>risc_fmem_bez._assert(byte_decode(Lbr));<br>risc_vec_opr._assert(s2.address( ));<br>risc_is_vild._assert(1);<br>Lbr += s1;<br>} | VECTOR IMPLIED LOAD SIGNED BYTE, LBR, +U24 OFFSET, POST ADJ |
| VLDB .(SB) *s1(U24),s2(R4)<br>void ISA::OPC_VLDB_40b_494 (U24 &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vild._assert(1);<br>} | VECTOR IMPLIED LOAD SIGNED BYTE, U24 IMM ADDRESS |
| VLDBU .(SB) *+LBR[s1(U4)], s2(R4)<br>void ISA::OPC_VLDBU_20b_333 (U4 &s1, Gpr &s2)<br>{<br>Result r1 = Lbr + s1;<br>risc_fmem_addr._assert(r1.range(2,19));<br>risc_fmem_bez._assert(byte_decode(r1));<br>risc_vec_opr._assert(s2.address( ));<br>risc_is_vildu._assert(1);<br>} | VECTOR IMPLIED LOAD UNSIGNED BYTE, LBR, +U4 OFFSET |

TABLE 20-continued

| Syntax/Pseudocode | Description |
|---|---|
| VLDBU .(SB) *+LBR[s1(R4)], s2(R4)<br>void ISA::OPC_VLDBU_20b_338 (Gpr &s1, Gpr &s2)<br>{<br>Result r1 = Lbr + s1;<br>risc_fmem_addr._assert(r1.range(2,19));<br>risc_fmem_bez._assert(byte_decode(r1));<br>risc_vec_opr._assert(s2.address( ));<br>risc_is_vildu._assert(1);<br>} | VECTOR IMPLIED LOAD UNSIGNED BYTE, LBR, +REG OFFSET |
| VLDBU .(SB) *LBR++[s1(U4)], s2(R4)<br>void ISA::OPC_VLDBU_20b_343 (U4 &s1, Gpr &s2)<br>{<br>Result r1 = Lbr + s1;<br>risc_fmem_addr._assert(Lbr.range(2,19));<br>risc_fmem_bez._assert(byte_decode(Lbr));<br>risc_vec_opr._assert(s2.address( ));<br>risc_is_vildu._assert(1);<br>Lbr += s1;<br>} | VECTOR IMPLIED LOAD UNSIGNED BYTE, LBR, +U4 OFFSET POST ADJ |
| VLDBU .(SB) *LBR++[s1(R4)], s2(R4)<br>void ISA::OPC_VLDBU_20b_348 (Gpr &s1, Gpr &s2)<br>{<br>risc_fmem_addr._assert(Lbr.range(2,19));<br>risc_fmem_bez._assert(byte_decode(Lbr));<br>risc_vec_opr._assert(s2.address( ));<br>risc_is_vildu._assert(1);<br>Lbr += s1;<br>} | VECTOR IMPLIED LOAD UNSIGNED BYTE, LBR, +REG OFFSET, POST ADJ |
| VLDBU .(SB) *+s1(R4), s2(R4)<br>void ISA::OPC_VLDBU_20b_353 (Gpr &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vildu._assert(1);<br>} | VECTOR IMPLIED LOAD UNSIGNED BYTE, ZERO OFFSET |
| VLDBU .(SB) *s1(R4)++, s2(R4)<br>void ISA::OPC_VLDBU_20b_358 (Gpr &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vildu._assert(1);<br>++s1;<br>} | VECTOR IMPLIED LOAD UNSIGNED BYTE, ZERO OFFSET, POST INC |
| VLDBU .(SB) *+s1(R4)[s2(U20)], s3(R4)<br>void ISA::OPC_VLDBU_40b_471 (Gpr &s1, U20 &s2, Gpr &s3)<br>{<br>Result r1 = s1 + s2;<br>risc_fmem_addr._assert(r1.range(2,19));<br>risc_fmem_bez._assert(byte_decode(r1));<br>risc_vec_opr._assert(s3.address( ));<br>risc_is_vildu._assert(1);<br>} | VECTOR IMPLIED LOAD UNSIGNED BYTE, +U20 OFFSET |
| VLDBU .(SB) *s1(R4)++[s2(U20)], s3(R4)<br>void ISA::OPC_VLDBU_40b_476 (Gpr &s1, U20 &s2, Gpr &s3)<br>{<br>risc_fmem_addr._assert(s1.range(2,19));<br>risc_fmem_bez._assert(byte_decode(s1));<br>risc_vec_opr._assert(s3.address( ));<br>risc_is_vildu._assert(1);<br>s1 += s2;<br>} | VECTOR IMPLIED LOAD UNSIGNED BYTE, +U20 OFFSET, POST ADJ |
| VLDBU .(SB) *+LBR[s1(U24)], s2(R4)<br>void ISA::OPC_VLDBU_40b_481 (U24 &s1, Gpr &s2)<br>{<br>Result r1 = Lbr + s1;<br>risc_fmem_addr._assert(r1.range(2,19));<br>risc_fmem_bez._assert(byte_decode(r1));<br>risc_vec_opr._assert(s2.address( ));<br>risc_is_vildu._assert(1);<br>} | VECTOR IMPLIED LOAD UNSIGNED BYTE, LBR, +U24 OFFSET |
| VLDBU .(SB) *LBR++[s1(U24)], s2(R4)<br>void ISA::OPC_VLDBU_40b_486 (U24 &s1, Gpr &s2)<br>{ | VECTOR IMPLIED LOAD UNSIGNED BYTE, LBR, +U24 |

TABLE 20-continued

| Syntax/Pseudocode | Description |
|---|---|
| risc_fmem_addr._assert(Lbr.range(2,19));<br>risc_fmem_bez._assert(byte_decode(Lbr));<br>risc_vec_opr._assert(s2.address( ));<br>risc_is_vildu._assert(1);<br>Lbr += s1;<br>} | OFFSET, POST ADJ |
| VLDBU .(SB) *s1(U24),s2(R4)<br>void ISA::OPC_VLDBU_40b_491 (U24 &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vildu._assert(1);<br>} | VECTOR IMPLIED LOAD UNSIGNED BYTE, U24 IMM ADDRESS |
| VLDH .(SB) *+LBR[s1(U4)], s2(R4)<br>void ISA::OPC_VLDH_20b_337 (U4 &s1, Gpr &s2)<br>{<br>Result r1 = Lbr + (s1<<1);<br>risc_fmem_addr._assert(r1.range(2,19));<br>risc_fmem_bez._assert(half_decode(r1));<br>risc_vec_opr._assert(s2.address( ));<br>risc_is_vild._assert(1);<br>} | VECTOR IMPLIED LOAD SIGNED HALF, LBR, +U4 OFFSET |
| VLDH .(SB) *+LBR[s1(R4)], s2(R4)<br>void ISA::OPC_VLDH_20b_342 (Gpr &s1, Gpr &s2)<br>{<br>Result r1 = Lbr + s1;<br>risc_fmem_addr._assert(r1.range(2,19));<br>risc_fmem_bez._assert(half_decode(r1));<br>risc_vec_opr._assert(s2.address( ));<br>risc_is_vild._assert(1);<br>} | VECTOR IMPLIED LOAD SIGNED HALF, LBR, +REG OFFSET |
| VLDH .(SB) *LBR++[s1(U4)], s2(R4)<br>void ISA::OPC_VLDH_20b_347 (U4 &s1, Gpr &s2)<br>{<br>risc_fmem_addr._assert(Lbr.range(2,19));<br>risc_fmem_bez._assert(half_decode(Lbr));<br>risc_vec_opr._assert(s2.address( ));<br>risc_is_vild._assert(1);<br>Lbr += s1<<1;<br>} | VECTOR IMPLIED LOAD SIGNED HALF, LBR, +U4 OFFSET POST ADJ |
| VLDH .(SB) *LBR++[s1(R4)], s2(R4)<br>void ISA::OPC_VLDH_20b_352 (Gpr &s1, Gpr &s2)<br>{<br>risc_fmem_addr._assert(Lbr.range(2,19));<br>risc_fmem_bez._assert(half_decode(Lbr));<br>risc_vec_opr._assert(s2.address( ));<br>risc_is_vild._assert(1);<br>Lbr += s1;<br>} | VECTOR IMPLIED LOAD SIGNED HALF, LBR, +REG OFFSET, POST ADJ |
| VLDH .(SB) *+s1(R4), s2(R4)<br>void ISA::OPC_VLDH_20b_357 (Gpr &s1, Gpr &s2)<br>{<br>risc_fmem_addr._assert(s1.range(2,19));<br>risc_fmem_bez._assert(half_decode(s1));<br>risc_vec_opr._assert(s2.address( ));<br>risc_is_vild._assert(1);<br>} | VECTOR IMPLIED LOAD SIGNED HALF, ZERO OFFSET |
| VLDH .(SB) *s1(R4)++, s2(R4)<br>void ISA::OPC_VLDH_20b_362 (Gpr &s1, Gpr &s2)<br>{<br>risc_fmem_addr._assert(s1.range(2,19));<br>risc_fmem_bez._assert(half_decode(s1));<br>risc_vec_opr._assert(s2.address( ));<br>risc_is_vild._assert(1);<br>s1 += 2;<br>} | VECTOR IMPLIED LOAD SIGNED HALF, ZERO OFFSET, POST INC |
| VLDH .(SB) *+s1(R4)[s2(U20)], s3(R4)<br>void ISA::OPC_VLDH_40b_475 (Gpr &s1, U20 &s2, Gpr &s3)<br>{<br>Result r1 = s1 + (s2<<1);<br>risc_fmem_addr._assert(r1.range(2,19));<br>risc_fmem_bez._assert(half_decode(r1));<br>risc_vec_opr._assert(s3.address( ));<br>risc_is_vild._assert(1);<br>} | VECTOR IMPLIED LOAD SIGNED HALF, +U20 OFFSET |

TABLE 20-continued

| Syntax/Pseudocode | Description |
|---|---|
| VLDH .(SB) *s1(R4)++[s2(U20)], s3(R4)<br>void ISA::OPC_VLDH_40b_480 (Gpr &s1, U20 &s2, Gpr &s3)<br>{<br>risc_fmem_addr._assert(s1.range(2,19));<br>risc_fmem_bez._assert(half_decode(s1));<br>risc_vec_opr._assert(s3.address( ));<br>risc_is_vild._assert(1);<br>s1 += (s2<<1);<br>} | VECTOR IMPLIED LOAD SIGNED HALF, +U20 OFFSET, POST ADJ |
| VLDH .(SB) *+LBR[s1(U24)], s2(R4)<br>void ISA::OPC_VLDH_40b_485 (U24 &s1, Gpr &s2)<br>{<br>Result r1 = Lbr + s1;<br>risc_fmem_addr._assert(r1.range(2,19));<br>risc_fmem_bez._assert(half_decode(r1));<br>risc_vec_opr._assert(s2.address( ));<br>risc_is_vild._assert(1);<br>} | VECTOR IMPLIED LOAD SIGNED HALF, LBR, +U24 OFFSET |
| VLDH .(SB) *LBR++[s1(U24)], s2(R4)<br>void ISA::OPC_VLDH_40b_490 (U24 &s1, Gpr &s2)<br>{<br>risc_fmem_addr._assert(Lbr.range(2,19));<br>risc_fmem_bez._assert(half_decode(Lbr));<br>risc_vec_opr._assert(s2.address( ));<br>risc_is_vild._assert(1);<br>Lbr += s1<<2;<br>} | VECTOR IMPLIED LOAD SIGNED HALF, LBR, +U24 OFFSET, POST ADJ |
| VLDH .(SB) *s1(U24),s2(R4)<br>void ISA::OPC_VLDH_40b_495 (U24 &s1, Gpr &s2)<br>{<br>Result r1 = s1<<1;<br>risc_fmem_addr._assert(r1.range(2,19));<br>risc_fmem_bez._assert(half_decode(r1));<br>risc_vec_opr._assert(s2.address( ));<br>risc_is_vild._assert(1);<br>} | VECTOR IMPLIED LOAD SIGNED HALF, U24 IMM ADDRESS |
| VLDHU .(SB) *+LBR[s1(U4)], s2(R4)<br>void ISA::OPC_VLDHU_20b_334 (U4 &s1, Gpr &s2)<br>{<br>Result r1 = Lbr + (s1<<1);<br>risc_fmem_addr._assert(r1.range(2,19));<br>risc_fmem_bez._assert(half_decode(r1));<br>risc_vec_opr._assert(s2.address( ));<br>risc_is_vildu._assert(1);<br>} | VECTOR IMPLIED LOAD UNSIGNED HALF, LBR, +U4 OFFSET |
| VLDHU .(SB) *+LBR[s1(R4)], s2(R4)<br>void ISA::OPC_VLDHU_20b_339 (Gpr &s1, Gpr &s2)<br>{<br>Result r1 = Lbr + s1;<br>risc_fmem_addr._assert(r1.range(2,19));<br>risc_fmem_bez._assert(half_decode(r1));<br>risc_vec_opr._assert(s2.address( ));<br>risc_is_vildu._assert(1);<br>} | VECTOR IMPLIED LOAD UNSIGNED HALF, LBR, +REG OFFSET |
| VLDHU .(SB) *LBR++[s1(U4)], s2(R4)<br>void ISA::OPC_VLDHU_20b_344 (U4 &s1, Gpr &s2)<br>{<br>risc_fmem_addr._assert(Lbr.range(2,19));<br>risc_fmem_bez._assert(half_decode(Lbr));<br>risc_vec_opr._assert(s2.address( ));<br>risc_is_vildu._assert(1);<br>Lbr += s1<<1;<br>} | VECTOR IMPLIED LOAD UNSIGNED HALF, LBR, +U4 OFFSET POST ADJ |
| VLDHU .(SB) *LBR++[s1(R4)], s2(R4)<br>void ISA::OPC_VLDHU_20b_349 (Gpr &s1, Gpr &s2)<br>{<br>risc_fmem_addr._assert(Lbr.range(2,19));<br>risc_fmem_bez._assert(half_decode(Lbr));<br>risc_vec_opr._assert(s2.address( ));<br>risc_is_vildu._assert(1);<br>Lbr += s1;<br>} | VECTOR IMPLIED LOAD UNSIGNED HALF, LBR, +REG OFFSET, POST ADJ |
| VLDHU .(SB) *+s1(R4), s2(R4)<br>void ISA::OPC_VLDHU_20b_354 (Gpr &s1, Gpr &s2)<br>{<br>risc_fmem_addr._assert(s1.range(2,19));<br>risc_fmem_bez._assert(half_decode(s1)); | VECTOR IMPLIED LOAD UNSIGNED HALF, ZERO OFFSET |

TABLE 20-continued

| Syntax/Pseudocode | Description |
| --- | --- |
| risc_vec_opr._assert(s2.address( ));<br>risc_is_vildu._assert(1);<br>} | |
| VLDHU .(SB) *s1(R4)++, s2(R4)<br>void ISA::OPC_VLDHU_20b_359 (Gpr &s1, Gpr &s2)<br>{<br>risc_fmem_addr._assert(s1.range(2,19));<br>risc_fmem_bez._assert(half_decode(s1));<br>risc_vec_opr._assert(s2.address( ));<br>risc_is_vildu._assert(1);<br>s1 += 2;<br>} | VECTOR IMPLIED LOAD UNSIGNED HALF, ZERO OFFSET, POST INC |
| VLDHU .(SB) *+s1(R4)[s2(U20)], s3(R4)<br>void ISA::OPC_VLDHU_40b_472 (Gpr &s1, U20 &s2, Gpr &s3)<br>{<br>Result r1 = s1 + (s2<<1);<br>risc_fmem_addr._assert(r1.range(2,19));<br>risc_fmem_bez._assert(half_decode(r1));<br>risc_vec_opr._assert(s3.address( ));<br>risc_is_vildu._assert(1);<br>} | VECTOR IMPLIED LOAD UNSIGNED HALF, +U20 OFFSET |
| VLDHU .(SB) *s1(R4)++[s2(U20)], s3(R4)<br>void ISA::OPC_VLDHU_40b_477 (Gpr &s1, U20 &s2, Gpr &s3)<br>{<br>risc_fmem_addr._assert(s1.range(2,19));<br>risc_fmem_bez._assert(half_decode(s1));<br>risc_vec_opr._assert(s3.address( ));<br>risc_is_vildu._assert(1);<br>s1 += (s2<<1);<br>} | VECTOR IMPLIED LOAD UNSIGNED HALF, +U20 OFFSET, POST ADJ |
| VLDHU .(SB) *+LBR[s1(U24)], s2(R4)<br>void ISA::OPC_VLDHU_40b_482 (U24 &s1, Gpr &s2)<br>{<br>Result r1 = Lbr + (s1<<1);<br>risc_fmem_addr._assert(r1.range(2,19));<br>risc_fmem_bez._assert(half_decode(r1));<br>risc_vec_opr._assert(s2.address( ));<br>risc_is_vildu._assert(1);<br>} | VECTOR IMPLIED LOAD UNSIGNED HALF, LBR, +U24 OFFSET |
| VLDHU .(SB) *LBR++[s1(U24)], s2(R4)<br>void ISA::OPC_VLDHU_40b_487 (U24 &s1, Gpr &s2)<br>{<br>risc_fmem_addr._assert(Lbr.range(2,19));<br>risc_fmem_bez._assert(half_decode(Lbr));<br>risc_vec_opr._assert(s2.address( ));<br>risc_is_vildu._assert(1);<br>Lbr += s1<<1;<br>} | VECTOR IMPLIED LOAD UNSIGNED HALF, LBR, +U24 OFFSET, POST ADJ |
| VLDHU .(SB) *s1(U24),s2(R4)<br>void ISA::OPC_VLDHU_40b_492 (U24 &s1, Gpr &s2)<br>{<br>Result r1 = s1<<1;<br>risc_fmem_addr._assert(r1.range(2,19));<br>risc_fmem_bez._assert(half_decode(r1));<br>risc_vec_opr._assert(s2.address( ));<br>risc_is_vildu._assert(1);<br>} | VECTOR IMPLIED LOAD UNSIGNED HALF, U24 IMM ADDRESS |
| VLDW .(SB) *+LBR[s1(U4)], s2(R4)<br>void ISA::OPC_VLDW_20b_335 (U4 &s1, Gpr &s2)<br>{<br>Result r1 = Lbr + (s1<<2);<br>risc_fmem_addr._assert(r1.range(2,19));<br>risc_fmem_bez._assert(0);<br>risc_vec_opr._assert(s2.address( ));<br>risc_is_vild._assert(1);<br>} | VECTOR IMPLIED LOAD WORD, LBR, +U4 OFFSET |
| VLDW .(SB) *+LBR[s1(R4)], s2(R4)<br>void ISA::OPC_VLDW_20b_340 (Gpr &s1, Gpr &s2)<br>{<br>Result r1 = Lbr + s1;<br>risc_fmem_addr._assert(r1.range(2,19));<br>risc_fmem_bez._assert(0);<br>risc_vec_opr._assert(s2.address( ));<br>risc_is_vild._assert(1);<br>} | VECTOR IMPLIED LOAD WORD, LBR, +REG OFFSET |
| VLDW .(SB) *LBR++[s1(U4)], s2(R4)<br>void ISA::OPC_VLDW_20b_345 (U4 &s1, Gpr &s2)<br>{ | VECTOR IMPLIED LOAD WORD, LBR, +U4 OFFSET |

TABLE 20-continued

| Syntax/Pseudocode | Description |
|---|---|
| risc_fmem_addr._assert(Lbr.range(2,19));<br>risc_fmem_bez._assert(0);<br>risc_vec_opr._assert(s2.address( ));<br>risc_is_vildu._assert(1);<br>Lbr += s1<<2;<br>} | POST ADJ |
| VLDW .(SB) *LBR++[s1(R4)], s2(R4)<br>void ISA::OPC_VLDW_20b_350 (Gpr &s1, Gpr &s2)<br>{<br>risc_fmem_addr._assert(Lbr.range(2,19));<br>risc_fmem_bez._assert(0);<br>risc_vec_opr._assert(s2.address( ));<br>risc_is_vild._assert(1);<br>Lbr += s1;<br>} | VECTOR IMPLIED LOAD WORD, LBR, +REG OFFSET, POST ADJ |
| VLDW .(SB) *+s1(R4), s2(R4)<br>void ISA::OPC_VLDW_20b_355 (Gpr &s1, Gpr &s2)<br>{<br>risc_fmem_addr._assert(s1.range(2,19));<br>risc_fmem_bez._assert(0);<br>risc_vec_opr._assert(s2.address( ));<br>risc_is_vild._assert(1);<br>} | VECTOR IMPLIED LOAD WORD, ZERO OFFSET |
| VLDW .(SB) *s1(R4)++, s2(R4)<br>void ISA::OPC_VLDW_20b_360 (Gpr &s1, Gpr &s2)<br>{<br>risc_fmem_addr._assert(s1.range(2,19));<br>risc_fmem_bez._assert(0);<br>risc_vec_opr._assert(s2.address( ));<br>risc_is_vild._assert(1);<br>s1 += 4;<br>} | VECTOR IMPLIED LOAD WORD, ZERO OFFSET, POST INC |
| VLDW .(SB) *+s1(R4)[s2(U20)], s3(R4)<br>void ISA::OPC_VLDW_40b_473 (Gpr &s1, U20 &s2, Gpr &s3)<br>{<br>Result r1 = s1 + (s2<<2);<br>risc_fmem_addr._assert(r1.range(2,19));<br>risc_fmem_bez._assert(0);<br>risc_vec_opr._assert(s3.address( ));<br>risc_is_vild._assert(1);<br>} | VECTOR IMPLIED LOAD WORD, +U20 OFFSET |
| VLDW .(SB) *s1(R4)++[s2(U20)], s3(R4)<br>void ISA::OPC_VLDW_40b_478 (Gpr &s1, U20 &s2, Gpr &s3)<br>{<br>risc_fmem_addr._assert(s1.range(2,19));<br>risc_fmem_bez._assert(0);<br>risc_vec_opr._assert(s3.address( ));<br>risc_is_vild._assert(1);<br>s1 += (s2<<2);<br>} | VECTOR IMPLIED LOAD WORD, +U20 OFFSET, POST ADJ |
| VLDW .(SB) *+LBR[s1(U24)], s2(R4)<br>void ISA::OPC_VLDW_40b_483 (U24 &s1, Gpr &s2)<br>{<br>Result r1 = Lbr + (s1<<2);<br>risc_fmem_addr._assert(r1.range(2,19));<br>risc_fmem_bez._assert(0);<br>risc_vec_opr._assert(s2.address( ));<br>risc_is_vild._assert(1);<br>} | VECTOR IMPLIED LOAD WORD, LBR, +U24 OFFSET |
| VLDW .(SB) *LBR++[s1(U24)], s2(R4)<br>void ISA::OPC_VLDW_40b_488 (U24 &s1, Gpr &s2)<br>{<br>risc_fmem_addr._assert(Lbr.range(2,19));<br>risc_fmem_bez._assert(half_decode(Lbr));<br>risc_vec_opr._assert(s2.address( ));<br>risc_is_vild._assert(1);<br>Lbr += s1<<2;<br>} | VECTOR IMPLIED LOAD WORD, LBR, +U24 OFFSET, POST ADJ |
| VLDW .(SB) *s1(U24),s2(R4)<br>void ISA::OPC_VLDW_40b_493 (U24 &s1, Gpr &s2)<br>{<br>Result r1 = s1<<2;<br>risc_fmem_addr._asser(r1.range(2,19));<br>risc_fmem_bez._assert(0);<br>risc_vec opr._assert(s2.address( ));<br>risc_is_vild._assert(1);<br>} | VECTOR IMPLIED LOAD WORD, U24 IMM ADDRESS |

TABLE 20-continued

| Syntax/Pseudocode | Description |
|---|---|
| VOUTPUT .(SB) *+s1 [s2(R4)], s3(S8), s4(U6), s5(R4)<br>void ISA::OPC_VOUTPUT_40b_235 (Gpr &s1,Gpr &s2,S8 &s3,U6 &s 4,Vreg4 &s5)<br>{<br>int imm_cnst = s3.value( );<br>int bot_off = s2.range(0,3);<br>int top_off = s2.range(4,7);<br>int blk_size = s2.range(8,10);<br>int str_dis = s2.bit(12);<br>int repeat = s2.bit(13);<br>int bot_flag = s2.bit(14);<br>int top_flag = s2.bit(15);<br>int pntr = s2.range(16,23);<br>int size = s2.range(24,31);<br>int tmp,addr;<br>if(imm_cnst > 0 && bot_flag && imm_cnst > bot_off)<br>{<br>if(!repeat)<br>{<br>tmp = (bot_off<<1) − imm_cnst;<br>}<br>else<br>{<br>tmp = bot_off;<br>}<br>}<br>else<br>{<br>if(imm_cnst < 0 && top_flag && −imm_cnst > top_off)<br>{<br>if(!repeat)<br>{<br>tmp = −(top_off<<1) − imm_cnst;<br>}<br>else<br>{<br>tmp = −top_off;<br>}<br>}<br>else<br>{<br>tmp = imm_cnst;<br>}<br>}<br>pntr = pntr << blk_size;<br>if(size == 0)<br>{<br>addr = pntr + tmp;<br>}<br>else<br>{<br>if((pntr + tmp) >= size)<br>{<br>addr = pntr + tmp − size;<br>}<br>else<br>{<br>if(pntr + tmp < 0)<br>{<br>addr = pntr + tmp + size;<br>}<br>else<br>{<br>addr = pntr + tmp;<br>}<br>}<br>}<br>addr = addr + s1.value( );<br>risc_is_voutput._assert(1);<br>risc_output_wd._assert(s5);<br>risc_output_wa._assert(addr);<br>risc_output_pa._assert(s4);<br>risc_output_sd._assert(str_dis);<br>} | VOUTPUT, 5 operand |
| VOUTPUT .(SB) *+s1[s2(S14)], s3(U6), s4(R4)<br>void ISA::OPC_VOUTPUT_40b_236 (Gpr &s1,S14 &s2,U6 &s3,Vreg4 &s4)<br>{ | VOUTPUT, 4 operand |

TABLE 20-continued

| Syntax/Pseudocode | Description |
|---|---|
| Result r1;<br>r1 = s1 + s2;<br>risc_is_voutput._assert(1);<br>risc_output_wd._assert(s4);<br>risc_output_wa._assert(r1);<br>risc_output_pa._assert(s3);<br>risc_output_sd._assert(s1.bit(12));<br>} | |
| VOUTPUT .(SB) *s1(U18), s2(U6), s3(R4)<br>void ISA::OPC_VOUTPUT_40b_237 (S18 &s1,U6 &s2,Vreg4 &s3)<br>{<br>risc_is_voutput._assert(1);<br>risc_output_wd._assert(s3);<br>risc_output_wa._assert(s1);<br>risc_output_pa._assert(s2);<br>risc_output_sd._assert(0);<br>} | VOUTPUT, 3 operand |
| VSTB .(SB) *+SBR[s1(U4)], s2(R4)<br>void ISA::OPC_VSTB_20b_312 (U4 &s1, Gpr &s2)<br>{<br>Result r1 = Sbr + s1;<br>risc_fmem_addr._assert(r1.range(2,19));<br>risc_fmem_bez._assert(byte_decode(r1));<br>risc_vec_opr._assert(s2.address( ));<br>risc_is_vist._assert(1);<br>} | VECTOR IMPLIED STORE BYTE, SBR, +U4 OFFSET |
| VSTB .(SB) *+SBR[s1(R4)], s2(R4)<br>void ISA::OPC_VSTB_20b_315 (Gpr &s1, Gpr &s2)<br>{<br>Result r1 = Sbr + s1;<br>risc_fmem_addr._assert(r1.range(2,19));<br>risc_fmem_bez._assert(byte_decode(r1));<br>risc_vec_opr._assert(s2.address( ));<br>risc_is_vist._assert(1);<br>} | VECTOR IMPLIED STORE BYTE, SBR, +REG OFFSET |
| VSTB .(SB) *SBR++[s1(U4)], s2(R4)<br>void ISA::OPC_VSTB_20b_318 (U4 &s1, Gpr &s2)<br>{<br>risc_fmem_addr._assert(Sbr.range(2,19));<br>risc_fmem_bez._assert(byte_decode(Sbr));<br>risc_vec_opr._assert(s2.address( ));<br>risc_is_vist._assert(1);<br>Sbr += s1;<br>} | VECTOR IMPLIED STORE BYTE, SBR, +U4 OFFSET, POST ADJ |
| VSTB .(SB) *SBR++[s1(R4)], s2(R4)<br>void ISA::OPC_VSTB_20b_321 (Gpr &s1, Gpr &s2)<br>{<br>Result r1 = Sbr + s1;<br>risc_fmem_addr._assert(Sbr.range(2,19));<br>risc_fmem_bez._assert(byte_decode(Sbr));<br>risc_vec_opr._assert(s2.address( ));<br>risc_is_vist._assert(1);<br>Sbr += s1;<br>} | VECTOR IMPLIED STORE BYTE, SBR, +REG OFFSET, POST ADJ |
| VSTB .(SB) *+s1(R4), s2(R4)<br>void ISA::OPC_VSTB_20b_324 (Gpr &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vist._assert(1);<br>} | VECTOR IMPLIED STORE BYTE, ZERO OFFSET |
| VSTB .(SB) *s1(R4)++, s2(R4)<br>void ISA::OPC_VSTB_20b_327 (Gpr &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vist._assert(1);<br>s1 += 1;<br>} | VECTOR IMPLIED STORE BYTE, ZERO OFFSET, POST INC |
| VSTB .(SB) *+s1(R4)[s2(U20)], s3(R4)<br>void ISA::OPC_VSTB_40b_456 (Gpr &s1, U20 &s2, Gpr &s3)<br>{<br>Result r1 = s1 + s2;<br>risc_fmem_addr._assert(r1.range(2,19));<br>risc_fmem_bez._assert(byte_decode(r1)); | VECTOR IMPLIED STORE BYTE, +U20 OFFSET |

TABLE 20-continued

| Syntax/Pseudocode | Description |
|---|---|
| risc_vec_opr._assert(s2.address( ));<br>risc_is_vist._assert(1);<br>} | |
| VSTB .(SB) *s1(R4)++[s2(U20)], s3(R4)<br>void ISA::OPC_VSTB_40b_459 (Gpr &s1, U20 &s2, Gpr &s3)<br>{<br>risc_fmem_addr._assert(s1.range(2,19));<br>risc_fmem_bez._assert(byte_decode(s1));<br>risc_vec_opr._assert(s3.address( ));<br>risc_is_vist._assert(1);<br>s1 += s2;<br>} | VECTOR IMPLIED STORE BYTE, +U20 OFFSET, POST ADJ |
| VSTB .(SB) *+SBR[s1(U24)], s2(R4)<br>void ISA::OPC_VSTB_40b_462 (U24 &s1, Gpr &s2)<br>{<br>Result r1 = Sbr + s1;<br>risc_fmem_addr._assert(r1.range(2,19));<br>risc_fmem_bez._assert(byte_decode(r1));<br>risc_vec_opr._assert(s2.address( ));<br>risc_is_vist._assert(1);<br>} | VECTOR IMPLIED STORE BYTE, SBR, +U24 OFFSET |
| VSTB .(SB) *SBR++[s1(U24)], s2(R4)<br>void ISA::OPC_VSTB_40b_465 (U24 &s1, Gpr &s2)<br>{<br>risc_fmem_addr._assert(Sbr.range(2,19));<br>risc_fmem_bez._assert(byte_decode(Sbr));<br>risc_vec_opr._assert(s2.address( ));<br>risc_is_vist._assert(1);<br>Sbr += s1;<br>} | VECTOR IMPLIED STORE BYTE, SBR, +U24 OFFSET, POST ADJ |
| VSTB .(SB) *s1(U24),s2(R4)<br>void ISA::OPC_VSTB_40b_468 (U24 &s1, Gpr &s2)<br>{<br>risc_fmem_addr._assert(s1.range(2,19));<br>risc_fmem_bez._assert(byte_decode(s1));<br>risc_vec_opr._assert(s2.address( ));<br>risc_is_vist._assert(1);<br>} | VECTOR IMPLIED STORE BYTE, U24 IMM ADDRESS |
| VSTH .(SB) *+SBR[s1(U4)], s2(R4)<br>void ISA::OPC_VSTH_20b_313 (U4 &s1, Gpr &s2)<br>{<br>Result r1 = Sbr + (s1<<1);<br>risc_fmem_addr._assert(r1.range(2,19));<br>risc_fmem_bez._assert(half_decode(r1));<br>risc_vec_opr._assert(s2.address( ));<br>risc_is_vist._assert(1);<br>} | VECTOR IMPLIED STORE HALF, SBR, +U4 OFFSET |
| VSTH .(SB) *+SBR[s1(R4)], s2(R4)<br>void ISA::OPC_VSTH_20b_316 (Gpr &s1, Gpr &s2)<br>{<br>Result r1 = Sbr + (s1<<1);<br>risc_fmem_addr._assert(r1.range(2,19));<br>risc_fmem_bez._assert(half_decode(r1));<br>risc_vec_opr._assert(s2.address( ));<br>risc_is_vist._assert(1);<br>} | VECTOR IMPLIED STORE HALF, SBR, +REG OFFSET |
| VSTH .(SB) *SBR++[s1(U4)], s2(R4)<br>void ISA::OPC_VSTH_20b_319 (U4 &s1, Gpr &s2)<br>{<br>risc_fmem_addr._assert(Sbr.range(2,19));<br>risc_fmem_bez._assert(half_decode(Sbr));<br>risc_vec_opr._assert(s2.address( ));<br>risc_is_vist._assert(1);<br>Sbr += s1<<1;<br>} | VECTOR IMPLIED STORE HALF, SBR, +U4 OFFSET, POST ADJ |
| VSTH .(SB) *SBR++[s1(R4)], s2(R4)<br>void ISA::OPC_VSTH_20b_322 (Gpr &s1, Gpr &s2)<br>{<br>risc_fmem_addr._assert(Sbr.range(2,19));<br>risc_fmem_bez._assert(half decode(Sbr));<br>risc_vec_opr._assert(s2.address( ));<br>risc_is_vist._assert(1);<br>Sbr += s1;<br>} | VECTOR IMPLIED STORE HALF, SBR, +REG OFFSET, POST ADJ |
| VSTH .(SB) *+s1(R4), s2(R4)<br>void ISA::OPC_VSTH_20b_325 (Gpr &s1, Gpr &s2)<br>{ | VECTOR IMPLIED STORE HALF, ZERO OFFSET |

TABLE 20-continued

| Syntax/Pseudocode | Description |
| --- | --- |
| risc_fmem_addr._assert(s1.range(2,19));<br>risc_fmem_bez._assert(half_decode(s1));<br>risc_vec_opr._assert(s2.address( ));<br>risc_is_vist._assert(1);<br>} | |
| VSTH .(SB) *s1(R4)++, s2(R4)<br>void ISA::OPC_VSTH_20b_328 (Gpr &s1, Gpr &s2)<br>{<br>risc_fmem_addr._assert(s1.range(2,19));<br>risc_fmem_bez._assert(half_decode(s1));<br>risc_vec_opr._assert(s2.address( ));<br>risc_is_vist._assert(1);<br>s1 += 2;<br>} | VECTOR IMPLIED STORE HALF, ZERO OFFSET, POST INC |
| VSTH .(SB) *+s1(R4)[s2(U20)], s3(R4)<br>void ISA::OPC_VSTH_40b_457 (Gpr &s1, U20 &s2, Gpr &s3)<br>{<br>Result r1 = s1 + s2;<br>risc_fmem_addr._assert(r1.range(2,19));<br>risc_fmem_bez._assert(half_decode(r1));<br>risc_vec_opr._assert(s3.address( ));<br>risc_is_vist._assert(1);<br>} | VECTOR IMPLIED STORE HALF, +U20 OFFSET |
| VSTH .(SB) *s1(R4)++[s2(U20)], s3(R4)<br>void ISA::OPC_VSTH_40b_460 (Gpr &s1, U20 &s2, Gpr &s3)<br>{<br>risc_fmem_addr._assert(s1.range(2,19));<br>risc_fmem_bez._assert(half_decode(s1));<br>risc_vec_opr._assert(s3.address( ));<br>risc_is_vist._assert(1);<br>s1 += s2<<1;<br>} | VECTOR IMPLIED STORE HALF, +U20 OFFSET, POST ADJ |
| VSTH .(SB) *+SBR[s1(U24)], s2(R4)<br>void ISA::OPC_VSTH_40b_463 (U24 &s1, Gpr &s2)<br>{<br>Result r1 = Sbr + (s1<<1);<br>risc_fmem_addr._assert(r1.range(2,19));<br>risc_fmem_bez._assert(half_decode(r1));<br>risc_vec_opr._assert(s2.address( ));<br>risc_is_vist._assert(1);<br>} | VECTOR IMPLIED STORE HALF, SBR, +U24 OFFSET |
| VSTH .(SB) *SBR++[s1(U24)], s2(R4)<br>void ISA::OPC_VSTH_40b_466 (U24 &s1, Gpr &s2)<br>{<br>risc_fmem_addr._assert(Sbr.range(2,19));<br>risc_fmem_bez._assert(half_decode(Sbr));<br>risc_vec_opr._assert(s2.address( ));<br>risc_is_vist._assert(1);<br>Sbr += s1<<1;<br>} | VECTOR IMPLIED STORE HALF, SBR, +U24 OFFSET, POST ADJ |
| VSTH .(SB) *s1(U24),s2(R4)<br>void ISA::OPC_VSTH_40b_469 (U24 &s1, Gpr &s2)<br>{<br>Result r1 = s1<<1;<br>risc_fmem_addr._assert(r1.range(2,19));<br>risc_fmem_bez._assert(half_decode(r1));<br>risc_vec_opr._assert(s2.address( ));<br>risc_is_vist._assert(1);<br>} | VECTOR IMPLIED STORE HALF, U24 IMM ADDRESS |
| VSTW .(SB) *+SBR[s1(U4)], s2(R4)<br>void ISA::OPC_VSTW_20b_314 (U4 &s1, Gpr &s2)<br>{<br>Result r1 = Sbr + (s1<<2);<br>risc_fmem_addr._assert(r1.range(2,19));<br>risc_fmem_bez._assert(0);<br>risc_vec_opr._assert(s2.address( ));<br>risc_is_vist._assert(1);<br>} | VECTOR IMPLIED STORE WORD, SBR, +U4 OFFSET |
| VSTW .(SB) *+SBR[s1(R4)], s2(R4)<br>void ISA::OPC_VSTW_20b_317 (Gpr &s1, Gpr &s2)<br>{<br>Result r1 = Sbr + (s1<<2);<br>risc_fmem_addr._assert(r1.range(2,19));<br>risc_fmem_bez._assert(0);<br>risc_vec_opr._assert(s2.address( ));<br>risc_is_vist._assert(1);<br>} | VECTOR IMPLIED STORE WORD, SBR, +REG OFFSET |

TABLE 20-continued

| Syntax/Pseudocode | Description |
|---|---|
| VSTW .(SB) *SBR++[s1(U4)], s2(R4)<br>void ISA::OPC_VSTW_20b_320 (U4 &s1, Gpr &s2)<br>{<br>Result r1 = Sbr + (s1<<2);<br>risc_fmem_addr._assert(Sbr.range(2,19));<br>risc_fmem_bez._assert(0);<br>risc_vec_opr._assert(s2.address( ));<br>risc_is_vist._assert(1);<br>Sbr += s1<<2;<br>} | VECTOR IMPLIED STORE WORD, SBR, +U4 OFFSET, POST ADJ |
| VSTW .(SB) *SBR++[s1(R4)], s2(R4)<br>void ISA::OPC_VSTW_20b_323 (Gpr &s1, Gpr &s2)<br>{<br>risc_fmem_addr._assert(Sbr.range(2,19));<br>risc_fmem_bez._assert(0);<br>risc_vec_opr._assert(s2.address( ));<br>risc_is_vist._assert(1);<br>Sbr += s1;<br>} | VECTOR IMPLIED STORE WORD, SBR, +REG OFFSET, POST ADJ |
| VSTW .(SB) *+s1(R4), s2(R4)<br>void ISA::OPC_VSTW_20b_326 (Gpr &s1, Gpr &s2)<br>{<br>risc_fmem_addr._assert(s1.range(2,19));<br>risc_fmem_bez._assert(0);<br>risc_vec_opr._assert(s2.address( ));<br>risc_is_vist._assert(1);<br>} | VECTOR IMPLIED STORE WORD, ZERO OFFSET |
| VSTW .(SB) *s1(R4)++, s2(R4)<br>void ISA::OPC_VSTW_20b_329 (Gpr &s1, Gpr &s2)<br>{<br>risc_fmem_addr._assert(s1.range(2,19));<br>risc_fmem_bez._assert(half_decode(s1));<br>risc_vec_opr._assert(s2.address( ));<br>risc_is_vist._assert(1);<br>s1 += 4;<br>} | VECTOR IMPLIED STORE WORD, ZERO OFFSET, POST INC |
| VSTW .(SB) *+s1(R4)[s2(U20)], s3(R4)<br>void ISA::OPC_VSTW_40b_458 (Gpr &s1, U20 &s2, Gpr &s3)<br>{<br>Result r1 = s1 + s2;<br>risc_fmem_addr._assert(r1.range(2,19));<br>risc_fmem_bez._assert(0);<br>risc_vec_opr._assert(s3.address( ));<br>risc_is_vist._assert(1);<br>} | VECTOR IMPLIED STORE WORD, +U20 OFFSET |
| VSTW .(SB) *s1(R4)++[s2(U20)], s3(R4)<br>void ISA::OPC_VSTW_40b_461 (Gpr &s1, U20 &s2, Gpr &s3)<br>{<br>risc_fmem_addr._assert(s1.range(2,19));<br>risc_fmem_bez._assert(0);<br>risc_vec_opr._assert(s3.address( ));<br>risc_is_vist._assert(1);<br>s1 += s2<<2;<br>} | VECTOR IMPLIED STORE WORD, +U20 OFFSET, POST ADJ |
| VSTW .(SB) *+SBR[s1(U24)], s2(R4)<br>void ISA::OPC_VSTW_40b_464 (U24 &s1, Gpr &s2)<br>{<br>Result r1 = Sbr + (s1<<2);<br>risc_fmem_addr._assert(r1.range(2,19));<br>risc_fmem_bez._assert(half_decode(r1));<br>risc_vec_opr._assert(s2.address( ));<br>risc_is_vist._assert(1);<br>} | VECTOR IMPLIED STORE WORD, SBR, +U24 OFFSET |
| VSTW .(SB) *SBR++[s1(U24)], s2(R4)<br>void ISA::OPC_VSTW_40b_467 (U24 &s1, Gpr &s2)<br>{<br>risc_fmem_addr._assert(Sbr.range(2,19));<br>risc_fmem_bez._assert(half_decode(Sbr));<br>risc_vec_opr._assert(s2.address( ));<br>risc_is_vist._assert(1);<br>Sbr += s1<<2;<br>} | VECTOR IMPLIED STORE WORD, SBR, +U24 OFFSET, POST ADJ |
| VSTW .(SB) *s1(U24),s2(R4)<br>void ISA::OPC_VSTW_40b_470 (U24 &s1, Gpr &s2)<br>{<br>Result r1 = s1<<2;<br>risc_fmem_addr._assert(r1.range(2,19));<br>risc_fmem_bez._assert(0); | VECTOR IMPLIED STORE WORD, U24 IMM ADDRESS |

TABLE 20-continued

| Syntax/Pseudocode | Description |
|---|---|
| risc_vec_opr._assert(s2.address( ));<br>risc_is_vist._assert(1);<br>} | |
| XOR .(SA,SB) s1(R4), s2(R4)<br>void ISA::OPC_XOR_20b_104 (Gpr &s1, Gpr &s2,Unit &unit)<br>{<br>s2 ^= s1;<br>Csr.bit(EQ,unit) = s2.zero( );<br>} | BITWISE EXCLUSIVE OR |
| XOR .(SA,SB) s1(U4), s2(R4)<br>void ISA::OPC_XOR_20b_105 (U4 &s1, Gpr &s2,Unit &unit)<br>{<br>s2 ^= s1;<br>Csr.bit(EQ,unit) = s2.zero( );<br>} | BITWISE EXCLUSIVE OR, U4 IMM |
| XOR .(SB) s1(S3), s2(U20), s3(R4)<br>void ISA::OPC_XOR_40b_215 (U3 &s1, U20 &s2, Gpr &s3,Unit &unit)<br>{<br>s3 ^= (s2 << (s1*8));<br>Csr.bit(EQ,unit) = s3.zero( );<br>} | BITWISE EXCLUSIVE OR, U20 IMM, BYTE ALIGNED |
| XOR .(V) s1(R4), s2(R4)<br>void ISA::OPCV_XOR_20b_55 (Vreg4 &s1, Vreg4 &s2)<br>{<br>s2 = s2 ^ s1;<br>Vr15.bit(EQ) = s2==0;<br>} | BITWISE EXCLUSIVE OR |
| XOR .(V,VP) s1(U4), s2(R4)<br>void ISA::OPCV_XOR_20b_56 (U4 &s1, Vreg4 &s2, Unit &unit)<br>{<br>if(isVPunit(unit))<br>{<br>s2.range(LSBL,MSBL) = s2.range(LSBL,MSBL) ^ zero_extend(s1);<br>s2.range(LSBU,MSBU) = s2.range(LSBU,MSBU) ^ zero_extend(s1);<br>Vr15.bit(EQA) = s2.range(LSBL,MSBL)==0;<br>Vr15.bit(EQB) = s2.range(LSBU,MSBU)==0;<br>} else<br>{<br>s2 = s2 ^ zero_extend(s1);<br>Vr15.bit(EQ) = s2==0;<br>}<br>} | BITWISE EXCLUSIVE OR, U4 IMM |

9. Global Load/Store Architecture 9.1. Overview

The GLS unit 1408 can map a general C++ model of data types, objects, and assignment of variables to the movement of data between the system memory 1416, peripherals 1414, and nodes, such as node 808-*i*, (including hardware accelerators if applicable). This enables general C++ programs which are functionally equivalent to operation of processing cluster 1400, without requiring simulation models or approximations of system Direct Memory Access (DMA). The GLS unit can implement a fully general DMA controller, with random access to system data structures and node data structures, and which is a target of a C++ compiler. The implementation is such that, even though the data movement is controlled by a C++ program, the efficiency of data movement approaches that of a conventional DMA controller, in terms of utilization of available resources. However, it generally avoids the desire to map between system DMA and program variables, avoiding possibly many cycles to pack and unpack data into DMA payloads. It also automatically schedules data transfers, avoiding overhead for DMA register setup and DMA scheduling. Data is transferred with almost no overhead and no inefficiency due to schedule mismatches.

Figure 123:
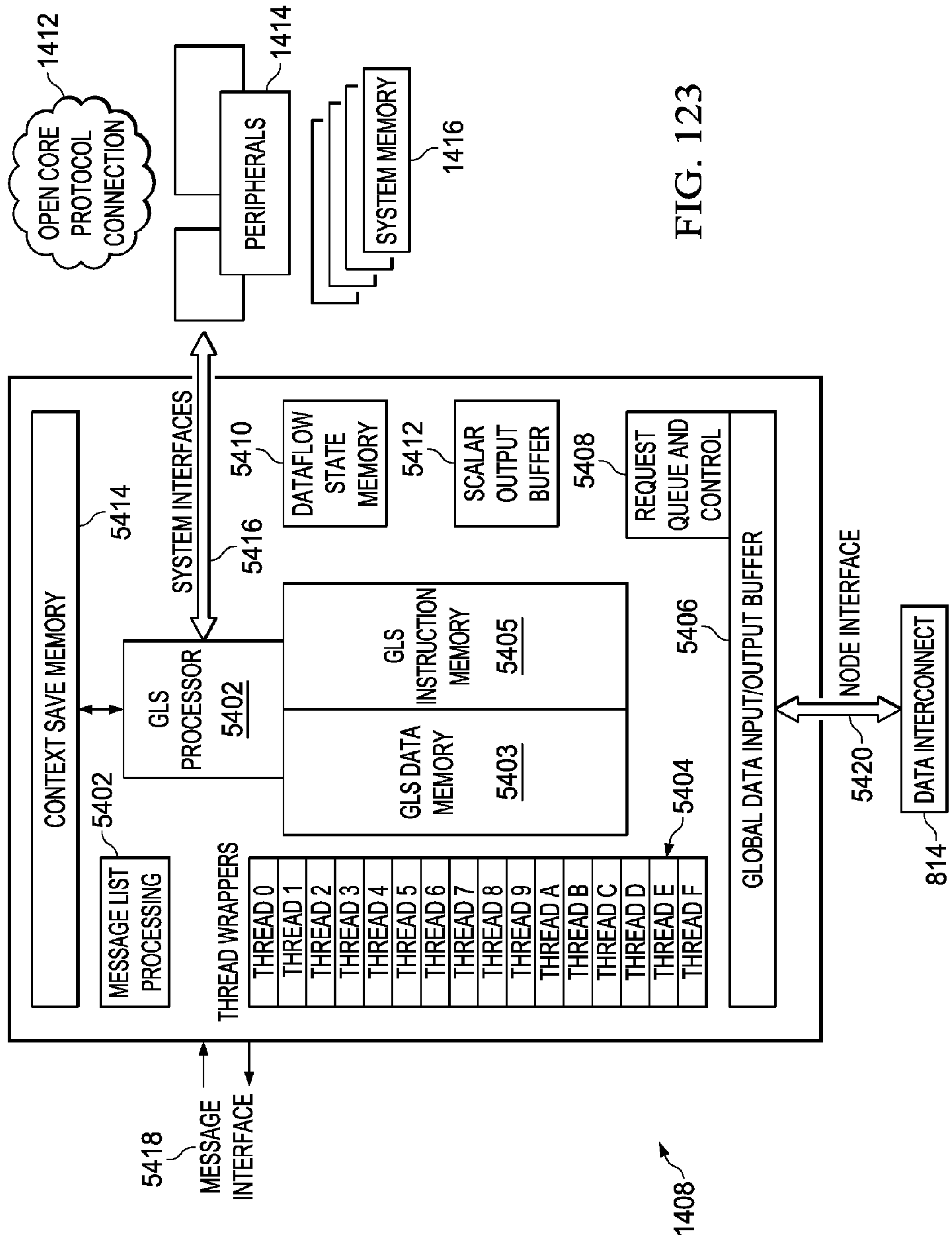
FIG. 123 is a diagram of an example of a global Load/Store (GLS) unit.

Turning now to FIG. 123, the Global Load Store (GLS) unit 1408 can be seen in greater detail. The main processing component of GLS unit 1408 is GLS processor 5402, which can be a general 32-bit RISC processor similar to node processor 4322 detailed above but may be customized for use in the GLS unit 1408. For example, GLS processor 5402 may be customized to be able to replicate the addressing modes for the SIMD data memory for the nodes (i.e., 808-*i*) so that compiled programs can generate addresses for node variables as desired. The GLS unit 1408 also can generally comprise context save memory 5414, a thread-scheduling mechanism (i.e., message list processing 5402 and thread wrappers 5404), GLS instruction memory 5405, GLS data memory 5403, request queue and control circuit 5408, dataflow state memory 5410, scalar output buffer 5412, global data IO buffer 5406, and system interfaces 5416. The GLS unit 5402 can also include circuitry for interleaving and de-interleaving that converts interleaved system data into de-interleaved processing cluster data, and vice versa and circuitry for implementing a Configuration Read thread, which fetches a configuration for the processing cluster 1400 from memory 1416 (containing programs, hardware initialization, etc.) and distributes it to the processing cluster 1400.

For GLS unit 1408, there can be three main interfaces (i.e., system interface 5416, node interface 5420, and messaging interface 5418). For the system interface 5416, there is typically a connection to the system L3 interconnect, for access to system memory 1416 and peripherals 1414. This interface 5416 generally has two buffers (in a ping-pong arrangement) large enough to store (for example) 128 lines of 256-bit L3 packets each. For the messaging interface 5418, the GLS unit 1408 can send/receive operational messages (i.e., thread scheduling, signaling termination events, and Global LS-Unit configuration), can distribute fetched configurations for processing cluster 1400, and can transmit transmitting scalar values to destination contexts. For node interface 5420, the global IO buffer 5406 is generally coupled to the global data interconnect 814. Generally, this buffer 5406 is large enough to store 64 lines of node SIMD data (each line, for example, can contain 64 pixels of 16 bits). The buffer 5406 can also, for example, be organized as 256×16×16 bits to match the global transfer width of 16 pixels per cycle.

Now, turning to the memories 5403, 5405, and 5410, each contains information that is generally pertinent to resident threads. The GLS instruction memory 5405 generally contains instructions for all resident threads, regardless of whether the threads are active or not. The GLS data memory 5403 generally contains variables, temporaries, and register spill/fill values for all resident threads. The GLS data memory 5403 can also have an area hidden from the thread code which contains thread context descriptors and destination lists (analogous to destination descriptors in nodes). There is also a scalar output buffer 5412 which can contain outputs to destination contexts; this data is generally held in order to be copied to multiple destinations contexts in a horizontal group, and pipelines the transfer of scalar data to match the processing cluster 1400 processing pipeline. The dataflow state memory 5410 generally contains dataflow state for each thread that receives scalar input from the processing cluster 1400, and controls the scheduling of threads that depend on this input.

Typically, the data memory for the GLS UNIT 1408 is organized into several portions. The thread context area of data memory 5403 is visible to programs for GLS processor 5402, while the remainder of the data memory 5403 and context save memory 5414 remain private. The Context Save/Restore or context save memory is usually a copy of GLS processor 5402 registers for all suspended threads (i.e., 16×16×32-bit register contents). The two other private areas in the data memory 5403 contain context descriptors and destination lists.

The Request Queue and Control 5408 generally monitors load and store accesses for the GLS processor 5402 outside of the GLS data memory 5403. These load and store accesses are performed by threads to move system data to the processing cluster 1400 and vice versa, but data usually does not physically flow through the GLS processor 5402, and it generally does not perform operations on the data. Instead, the Request Queue 5408 converts thread "moves" into physical moves at the system level, matching load with store accesses for the move, and performing address and data sequencing, buffer allocation, formatting, and transfer control using the system L3 and processing cluster 1400 dataflow protocols.

The Context Save/Restore Area or context save memory 5414 is generally a wide RAM that can save and restore all registers for the GLS processor 5402 at once, supporting 0-cycle context switch. Thread programs can require several cycles per data access for address computation, condition testing, loop control, and so forth. Because there are a large number of potential threads and because the objective is to keep all threads active enough to support peak throughput, it can be important that context switches can occur with minimum cycle overhead. It should also be noted that thread execution time can be partially offset by the fact that a single thread "move" transfers data for all node contexts (e.g., 64 pixels per variable per context in the horizontal group). This can allow a reasonably large number of thread cycles while still supporting peak pixel throughputs.

Now, turning to the thread-scheduling mechanism, this mechanism generally comprises message list processing 5402 and thread wrappers 5404. The thread wrappers 5404 typically receive incoming messages, into mailboxes, to schedule threads for GLS unit 1408. Generally, there is a mailboxentry per thread, which can contain information (such as the initial program count for the thread and the location in processor data memory (i.e., 4328) of the thread's destination list. The message also can contain a parameter list that is written starting at offset 0 into the thread's processor data memory (i.e., 4328) context area. The mailboxentry also is used during thread execution to save the thread program count when the thread is suspended, and to locate destination information to implement the dataflow protocol.

In additional to messaging, the GLS unit also performs configuration processing. Typically, this configuration processing can implement a Configuration Read thread, which fetches a configuration for processing cluster 1400 (containing programs, hardware initialization, and so forth) from memory and distributes it to the remainder of processing cluster 1400. Typically, this configuration processing is performed over the node interface 5420. Additionally, the GLS data memory 5403 can generally comprise sections or areas for context descriptors, destination lists, and thread contexts. Typically, the thread context area can be visible to the GLS processor 5402, but the remaining sections or areas of the GLS data memory 5403 may not be visible.

9.2. Context Descriptors

The context descriptors contain the base addresses, in GLS data memory 5403, of contexts for all resident threads, whether active or not. A resident thread generally has the associated code located somewhere in GLS instruction memory 5405. The base address is generally located somewhere in the thread context area; this is generally the available portion of the GLS data memory 5403, not including words in the context descriptor area, and not including whatever portion of the GLS data memory 5403 is taken by the destination lists (variable). Contexts areas are generally provided for resident threads whether or not they have been scheduled to execute because a resident thread can be scheduled at any time, and its context should be available at that time.

Turning to FIG. 124, an example of a context descriptor 5502 for GLS unit 1408 can be seen. As shown in this example, there are a total of 16 descriptors in the first 8 words of GLS data memory, allocated as two entries per word, with entries for contexts 1 and 0 in halfwords 1 and 0 of the first word, and so on. Each descriptor (i.e., 5502) in this example is simply the base address of the associated context. The system programming tool 718 allocates these base addresses somewhere within the thread context area, based on the memory requirements of the thread program and the size of the thread-context area. Each descriptor (i.e., 5502) can also specify whether the thread depends on scalar input from a nodes (or other threads), and, if so, how many sources of data there are.

9.3. Destination List

A destination list provides the capability for a read thread to output to multiple destinations. The structure of entries on the destination list depends on the use of the list. Read-thread programs access entries on the destination list as an array, analogous to node destination descriptors. For hardware access, when Output_Terminate (OT) has to be signaled to destinations, the destination list is organized as a sequential list of destination entries (there is no active program in this situation). In FIG. 125, an example of a format of entries 5504 on a destination list can be seen. The Bk bit identifies the lastentry on the list when accessed sequentially by hardware.

As an example, the message that schedules a read thread contains the base address of the thread's array of destination entries (this is a halfword address). Each output of the read thread has a corresponding destination-tag identifier (Dst_Tag), which is the index into this array. When hardware accesses the list, it sends OT signals to all initial destinations identified by the list with OTe=1, starting at the firstentry, up to and including theentry with Bk set.

Typically, destination-list entries contain two sets of related fields, containing information for destination segment identifiers, node identifiers, and context numbers or thread identifiers. The first halfword (i.e., bits 15:0) can contain information for the initial destination, set by the thread scheduling message: these fields do not generally change during execution. The second halfword (i.e., bits 31:16) can contains information for the next destination: these fields are updated by the dataflow protocol to enable the next transfer and to indicate the destination information for this transfer. The initial destination information is used to sequence back to the first context when the right boundary is encountered as a destination (the Rt bit is set in the Source Permission). It is also used as the destination for Output Termination messages from the thread (the destination context forwards this to other contexts in the horizontal group). It also can be used to sequence back to the first context when the right boundary is encountered as a destination (the Rt bit is set in the Source Permission), except that this information can also be obtained by enabling forwarding of a Source Notification to the right-boundary context.

Destination-list entries can also contain a Src_Tag field to identify this source to the destination, and a Permission-Count field to store the enabled number of transfers for thread destinations (this field is set to 1111'b for non-thread destinations, enabling an unlimited number of transfers). The Bk and OTe bits can control OT signals when the thread terminates. Some destinations are defined so that a read thread can provide initialization data to programs that don't participate in the main dataflow from the thread. These destinations should not receive an OT from the read thread, but instead from their own dataflow sources. Upon termination, hardware transmits an OT to every enabled destination (OTe=1), up to theentry with Bk=1.

In this example, eachentry on the list can be updated with new destination information returned in Source Permission messages. The Source Permission contains the Thread_ID and Dst_Tag of the read or multi-cast thread, sent originally with the Source Notification. The Thread_ID selects the destination-list base address from the corresponding mailboxentry. The Dst_Tag selects the position of theentry relative to the base address. Dst_Tag 0 identifies the first listentry, and so on.

9.4. GLS Unit Principles of Operation

In order for the program for GLS processor 5402 to function correctly, it should have a view of memory that is generally consistent with other 32-bit processors in the processing cluster 1400, and also generally consistent with the node processors (i.e., node processor 4322) and SFM processor 7614 (which is described below). Generally, it is straightforward for GLS processor 5402 to have common addressing modes with the processing cluster 1400 because it is a general-purpose, 32-bit processor, with comparable addressing modes for system variables and data structures as other processors and peripherals (i.e., 1414). The issues can arise with software for the GLS processor 5402 operating correctly with data types and context organizations, and correctly performing data transfers using a C++ programming model.

Conceptually, the GLS processor 5492 can be considered a special form of vector processor (where vectors are, for example, in the form of all pixels on a scan line in a frame or, for example, in the form of a horizontal group within the node contexts). These vectors can have a variable number of elements, depending on the frame width and context organization. The vector elements also can be of variable size and type, and adjacent elements do not necessarily have the same type because pixels, for example, can be interleaved with other types of pixels on the same line. The program for the GLS processor 5402 can converts system vectors into the vectors used by node contexts; this is not a general set of operations but usually involves movement and formatting of these vectors with the dataflow protocol assisting in ordering and keeping the program for the GLS processor 5402 abstracted from the node-context organization for a particular use-case.

System data can have many different formats, which can reflect different pixel types, data sizes, interleaving patterns, packing, and so on. In a node (i.e., 808-*i*), SIMD data memory pixel data is, for example, in wide, de-interleaved formats of 64 pixels, aligned 16 bits per pixel. The correspondence between system data and node data is further complicated by the fact that a "system access" is intended to provide input data for all input contexts of a horizontal group: the configuration of this group, and its width, depend on factors outside the application program. It is generally very undesirable to expose this level of detail—either the format conversions to and from the specific node formats, or the variable node-context organization—to the application program. These are typically very complex to handle at the application level, and the details are implementation-dependent.

In source code for GLS processor 5402, value assignment of a system variable to a local variable generally can require that the system variable have a data type that can be converted to a local data type, and vice versa. Examples of basic system data types are characters and short integers, which can be converted to 8-, 10-, or 12-bit pixels. System data also can have synthetic types such as packed arrays of pixels, in either interleaved or de-interleaved formats, and pixels can have various formats, such as Bayer, RGB, YUV, and so forth. Examples of basic local data types are integers (32 bits) short integers (16 bits), and paired short integers (two, 16-bit values packed into 32 bits). Variables of the basic system and local data types can appear as elements in arrays, structures, and combinations of these. System data structures can contain compatible data elements in combination with other C++ data types. Local data structures usually can contain local data types as elements. Nodes (i.e., 808-*i*) provide a unique type of array that implements a circular buffer directly in hardware, supporting vertical context sharing, including top- and bottom-edge boundary processing. Typically, the GLS processor is included in the GLS unit 1408 to (1) abstract the above details from users, using C++ object classes; (2) provide dataflow to and from the system that maps to the programming model; (3) perform the equivalent of very general, high-performance direct memory access that conforms to the data-dependency framework of processing cluster 1400; and (4) schedule dataflow automatically for efficient processing cluster 1400 operation.

Application programs use objects of a class, called Frame, to represents system pixels in an interleaved format (the format of an instance is specified by an attribute). Frames are organized as an array of lines, with the array index specifying the location of a scan-line at a given vertical offset. Different instances of a Frame object can represent different interleaved formats of different pixels types, and multiples of these instances can be used in the same program. Assignment operators in Frame objects perform de-interleaving or interleaving operations appropriate to the format, depending on whether data is being transferred to or from processing cluster 1400.

The details of local data types and context organization are abstracted by introducing the concept of a class Line (in GLS UNIT 1408, Block data is treated as an array of Line data, with explicit iteration providing multiple lines to the block). Line objects, as implemented by the program for GLS processor 5402, generally support no operations other than variable assignment from, or assignment to, compatible system data-types. Line objects usually encapsulate all the attributes of system/local data correspondence, such as: pixel types, both node inputs and outputs; whether data is packed or not, and how data is packed and unpacked; whether data is interleaved or not, and the interleaving and de-interleaving patterns; and context configurations of the nodes.

Figure 126:
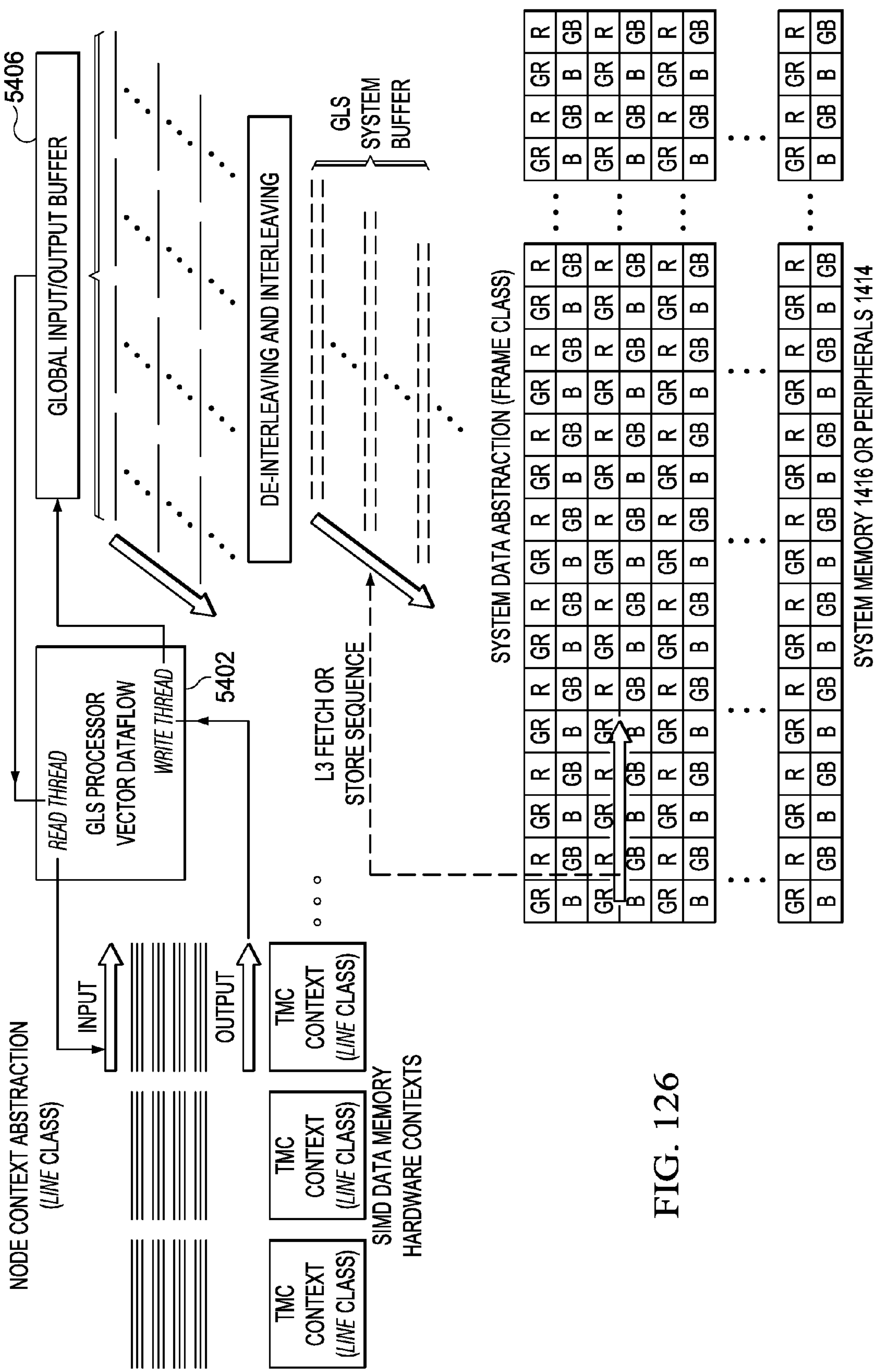
FIG. 126 is a diagram of the conceptual operation of the GLS processor.
Figure 128:
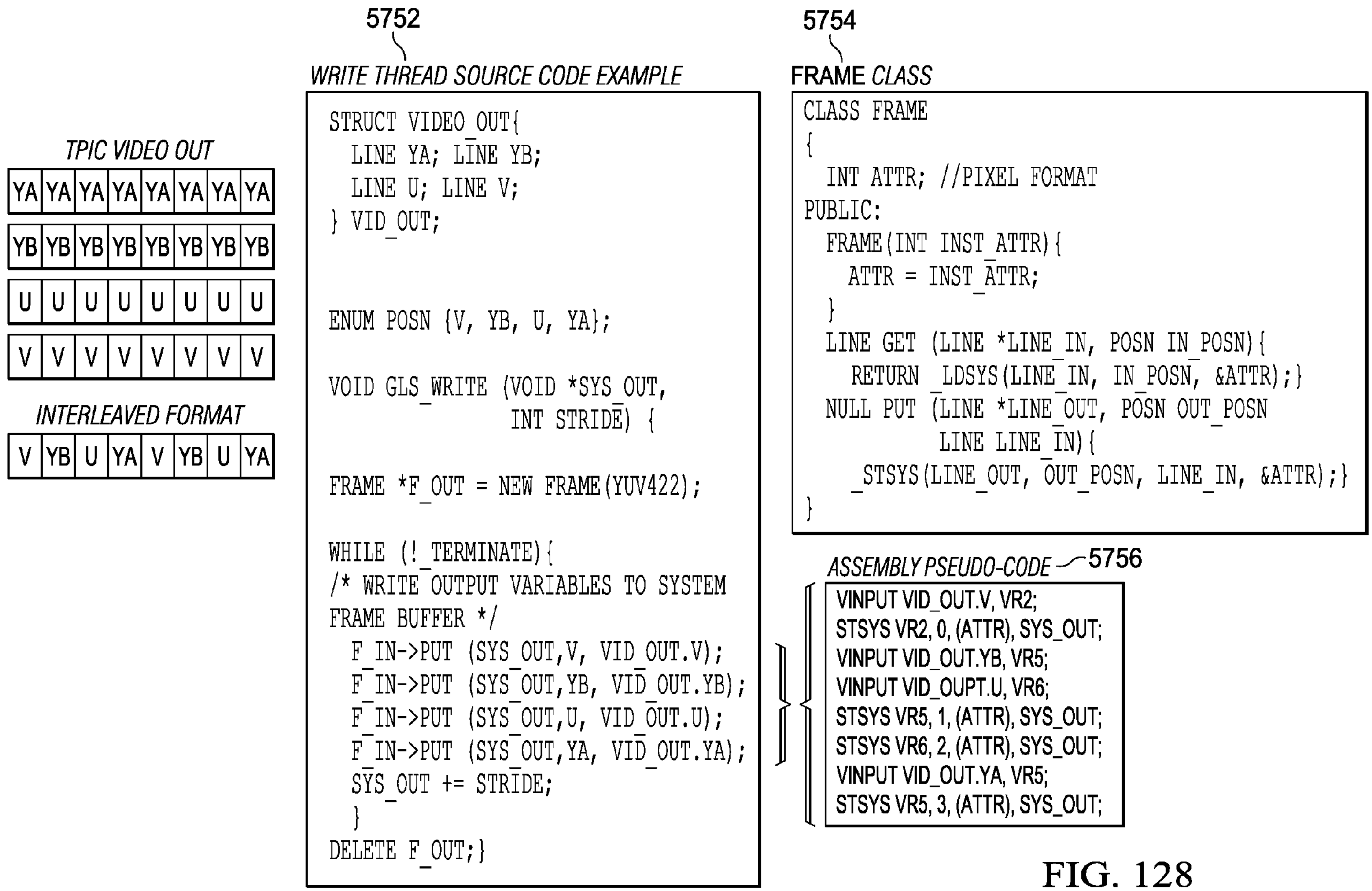
FIG. 128 is an example of GLS processor Write Thread and Pseudo-Assembly.

Turning to FIG. 126, an example of the conceptual operation of read and write threads for an image processing application for the GLS processor 5402 can be seen. In the programmer's view, in this example, the frame is generally comprised of a buffer of interleaved Bayer pixels. It is generally inefficient for a node (i.e., 808-*i*) or SIMD within the shared function-memory 1410 to operate on interleaved pixels, because normally different operations are performed on different pixel types, so a single instruction cannot generally apply to all pixels in an interleaved format. For this reason, the Line data shown in the node context in FIG. 126 are obtained by de-interleaving. System data is not necessarily interleaved—for example, an application can use system memory 1416 for intermediate results that remain in the de-interleaved formats used by processing cluster 1400. However, most input and output formats are interleaved, and the GLS unit 1408 should convert between these formats and the de-interleaved processing cluster 1400 representations.

The GLS processor 5402 processes vectors of pixels in either system formats or node-context formats. However, the datapath for the GLS processor 5402 in this example does not directly perform any operations on these vectors. The operations that can be supported by the programming model in this example are assignment from Frame to Line or shared function-memory 1410 Block types, and vice versa, performing any formatting required to achieve the equivalent of direct operation on Frame objects by processing cluster nodes operating on Line or Block objects.

The size of a frame is determined by several parameters, including the number of pixel types, pixel widths, padding to byte boundaries, and the width and height of the frame in number of pixels per scan-line and number of scan-lines, which can vary according to the resolution. A frame is mapped to processing cluster 1400 contexts, normally organized as horizontal groups less wide than the actual image, frame divisions, which are swapped into processing cluster 1400 for processing as Line or Block types. This processing produces results: when a result is another Frame, that result normally is reconstructed from the partial intermediate results of processing cluster 1400 operation on frame divisions.

In a cross-hosted C++ programming environment, an object of class Line is considered to be the entire width of an image in this example, to generally eliminate the complexity required in hardware to process frame divisions. In this environment, an instance of a Line object includes the iteration in the horizontal direction, across the entire scan-line. The details of Frame objects are not abstracted by the object implementation, but also by intrinsics within the Frame objects, to hide the bit-level formatting required for de-interleaving and interleaving and to enable translation to instructions for the GLS processor 5402. This permits a cross-hosted C++ program to obtain results equivalent to execution in the environment of the processing cluster 1400, independent of the environment for processing cluster 1400.

In the code-generation environment for the processing cluster 1400, a Line is a scalar type (generally equivalent to an integer), except that code generation supports addressing attributes that correspond to horizontal pixel offsets for access from SIMD data memory. Iteration on scan-lines in this example is accomplished by a combination of parallel operation in the SIMD, iteration between contexts on a node (i.e., 808-*i*), and parallel operation of nodes. Frame divisions can be controlled by a combination of host software (which knows the parameters of the frame and frame division), GLS software (using parameters passed by the host), and hardware (detecting right-most boundaries using the dataflow protocol). A Frame is an object class implemented by GLS programs, except that most of the class implementation is accomplished directly by instructions for GLS processor 5402, as described below. Access functions defined for Frame objects have a side-effect of loading the attributes of a given instance into hardware, so that hardware can control access and formatting operations. These operations would generally be much too inefficient to implement in software at the desired throughputs, especially with multiple threads active.

Since there can be several active instances of Frame objects, it is expected that there are several configurations active in hardware at any given point in time. When an object is instantiated, the constructor associates attributes to the object. Access of a given instance loads the attributes of that instance into hardware, similar in concept to hardware registers defining the instance's data type. Since each instance has its own attributes, multiple instances can be active, each with their own hardware settings to control formatting.

Read threads and write threads are written as independent programs, so each can be scheduled independently based on their respective control and dataflow. The following two sections provide examples of a read thread and a write thread, showing the thread code, the Frame class declaration, and how these are used to implement very large data transfers, with very complex pixel formatting, using a very small number of instructions.

9.5. Read Thread Coding and Implementation

A read thread assigns variables representing system data to variables representing the input to processing cluster 1400 programs. These variables can be of any type, including scalar data. Conceptually, a read thread executes some form of iteration, for example in the vertical direction within a fixed-width frame division. Within the loop, pixels within Frame objects are assigned to Line objects, with the details of the Frame, and the organization of the frame division (the width of the Line), hidden from the source code. There also can be assignments of other vector or scalar types. At the end of each loop iteration, the destination processing cluster 1400 program(s) is/are invoked using Set_Valid. A loop iteration normally executes very quickly with respect to the hardware transfer of data. Loop execution configures hardware buffers and control to perform the desired transfer. At the end of an iteration, the thread execution is suspended (by a task switch instruction) while the hardware transfer continues. This frees the GLS processor 5402 to execute other threads, which can be important because there can be a single GLS processor 5402 processor controlling up to (for example) 16 thread transfers. The suspended thread is enabled to execute again once the hardware transfers are complete.

Turning to FIG. 127, an example of source code 5702 for a read thread for an example application of image processing, the declaration 5704 of the Frame class (which is generally common to all threads), and the resulting GLS processor 5402 assembly pseudo-code 5706. The source code 5702 is for illustration, rather than accurately reflecting how source code is structured for the processing cluster 1400, and the assembly syntax is for clarity rather than accuracy. The following is a line-by-line description of the source-code example 5702:

The declaration of NF_IN defines the structure of the node input for a noise filter. This input consists of four circular buffers, one for each of the Bayer pixels types, of three entries each.

The declaration of nsf_in, of structure type NF_IN, is the actual input variable to nodes, the output variable of the read thread. This is defined as an extern because its offset is determined by code generation for the nodes (i.e., 808-*i*), and this offset is provided to the read thread by a link phase after code generation.

The enum POSN assigns numerical values to the position of Bayer pixels in the interleaved format. The corresponding enum value assignments are used to identify the position to hardware, and the enum members are used instead of absolute values for clarity in the source code.

The prototype for the read-thread function includes parameters that are "passed" by the host (in a Schedule Read Thread message). In this example, the parameters are: 1) a pointer to the frame buffer in the system, 2) the Height of the frame, 3) and a stride which indicates the address offset from one scan-line to the next.

The program declares a pointer to an instance of an input frame, f_in, assigning it the attribute RAW8. This attribute is a defined constant corresponding to the hardware settings that enable de-interleaving from (or interleaving to) a Bayer "RAW8" pattern (this is the Bayer pattern shown in FIG. 126). As shown in the declaration of the Frame class, this simply sets a private variable attr.

The iteration loop iterates over half of the frame Height, to account for the fact that Bayer pixels appear on two lines. To access all required input pixels, any given access has to index two lines per iteration.

Within the iteration loop, the thread code calls the read-access function get in f_in, passing pointers to the frame in the system and referencing the pixel position by name of the corresponding pixel (this is simply an integer assigned in the enum declaration). There are two calls for the first line, to get Gr and R pixels, and two calls for the second line, to get B and Gb pixels. The first and second line are offset by stride. The get access function returns a Line of the configured width by extracting pixels of the given type from the interleaved format (in the abstract). Each Line returned by get is assigned to one of the node input buffers, at the current circular-buffer index, which is a modulus of the loop index.

At the bottom of the loop, the system address sys_in is incremented by twice the stride, again to account for the fact that Bayer pixels appear on two lines.

After all iterations complete, the input frame is de-allocated. The thread can remain resident and be scheduled again, so the memory used by the instance should be freed (although not shown in this example, the same code can be used for different formats of input frames, using different attribute settings, so the frame instance is not necessarily static).

In a cross-hosted environment for the example of FIG. 127, the get function in the Frame class simply calls the intrinsic _LDSYS, passing input parameters plus a pointer to the attribute attr. This intrinsic extracts all the pixels of the associated type at the given address, and returns a Line of these pixels that is the entire width of the scan-line. This extraction is done for each call to get, for each pixel type. Since pixels are byte-aligned (in this example), and since the frame can be very wide (thousands of pixels), this is a very slow implementation, but has the benefit of functional equivalence to processing cluster 1400 in the cross-hosted environment. In the processing cluster 1400 itself, performance is generally unacceptably slow by orders of magnitude. The remainder of this section describes how the source code, Frame class, and _LDSYS intrinsic are used to perform very high-throughput transfers with a very small number of instructions.

The example in FIG. 127 also includes pseudo assembly-code 5706 for the inner loop of the read thread. The first two instructions illustrate how the assignment to the destination context of a Line, returned by get, translates into GLS processor 5402 code. The first of these instructions, LDSYS, is a straightforward translation of the intrinsic _LDSYS resulting from the call to get.

Figure 129:
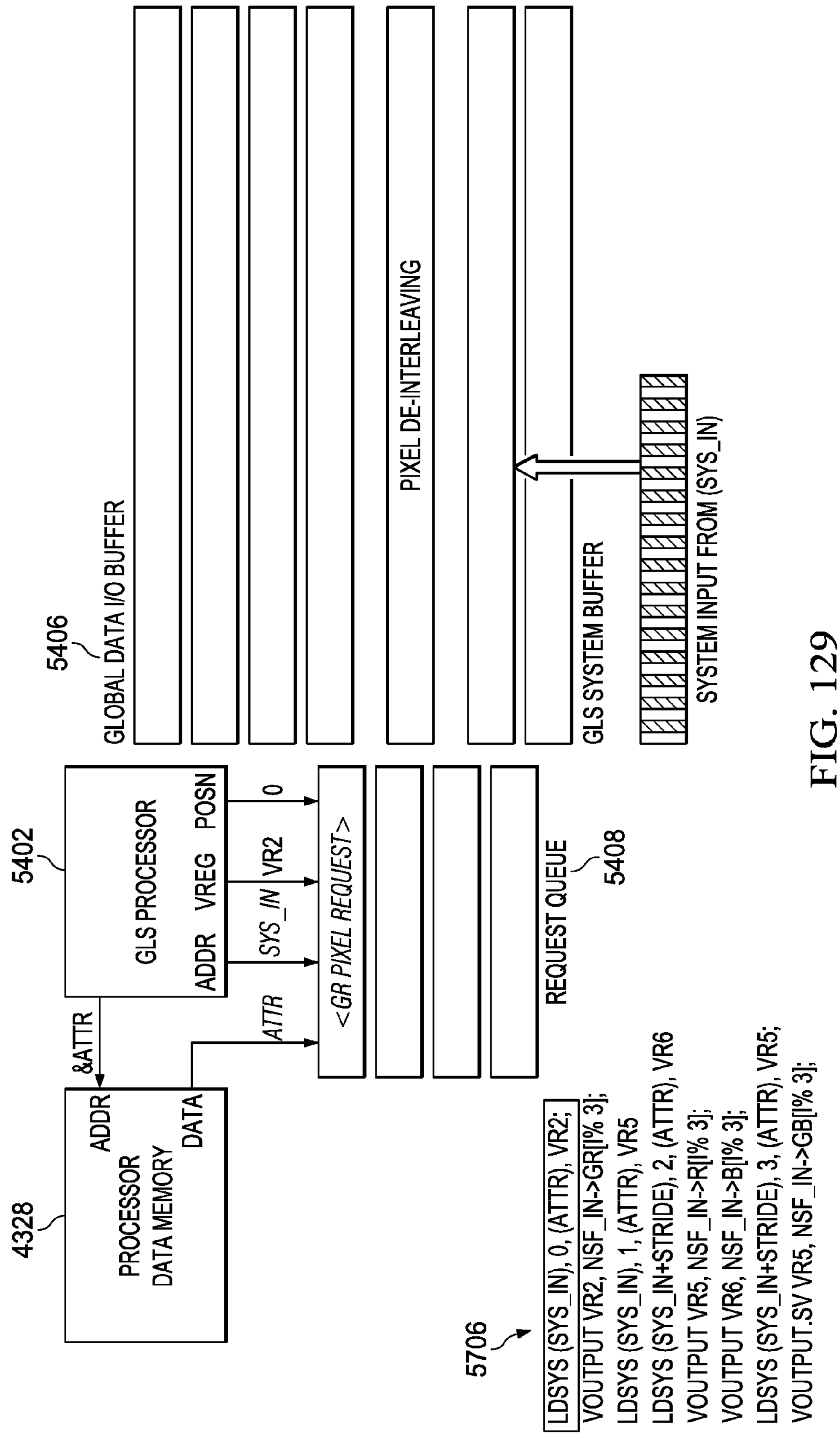
FIG. 129 is a diagram depicting the execution of the LDSYS instruction of the pseudo-assembly code of FIG. 127.

Turning to FIG. 129, an example of the execution of the instruction LDSYS(sys_in), 0, (attr), VR2 of pseudo assembly-code 5706 can be seen. In addition to the GLS processor 5402 interfaces used to access its own instructions and data, the processor 5402 also includes an interface that controls data movement between the system and processing cluster 1400, the GLS Data Interface. Along with other information, this interface specifies system and processing cluster 1400 addresses ("Addr"), a virtual GLS processor 5402 register used as a target or source for vector data ("Vreg"), and the relative position of a pixel in an interleaved format ("Posn"). The source statement f_in→get(sys_in, Gr) results in a LDSYS instruction that performs the following operations in this example:

The address of the Frame instance's attr variable is used to access the attribute value in processor data memory 4328. In this case, the attribute value corresponds to a RAW8 frame.

The address sys_in, virtual register ID VR2, and the pixel position for Gr (0), is placed on the data interface.

This information is captured by a request-queueentry allocated to the thread. At this point, there is sufficient information to allocate a GLS System Bufferentry-1 and initiate a system access at the address sys_in.

In the source code 5702, the Line returned by the call to f_in→get(sys_in, Gr) is assigned to the node input variable nsf_in→Gr[i %3] (a Line in a circular buffer). In the generated code, this vector assignment to an extern variable results in a vector output instruction, VOUTPUT, using as a source register the virtual register loaded by the preceding LDSYS, and specifying the offset for nsf_in→Gr[i %3] in the destination context (the offset for nsf_in→Gr[0] is linked into the code after compilation, and the actual offset is computed using circular addressing compatible with the destination addressing). An example of the execution of this instruction is illustrated in FIG. 130.

Figure 130:
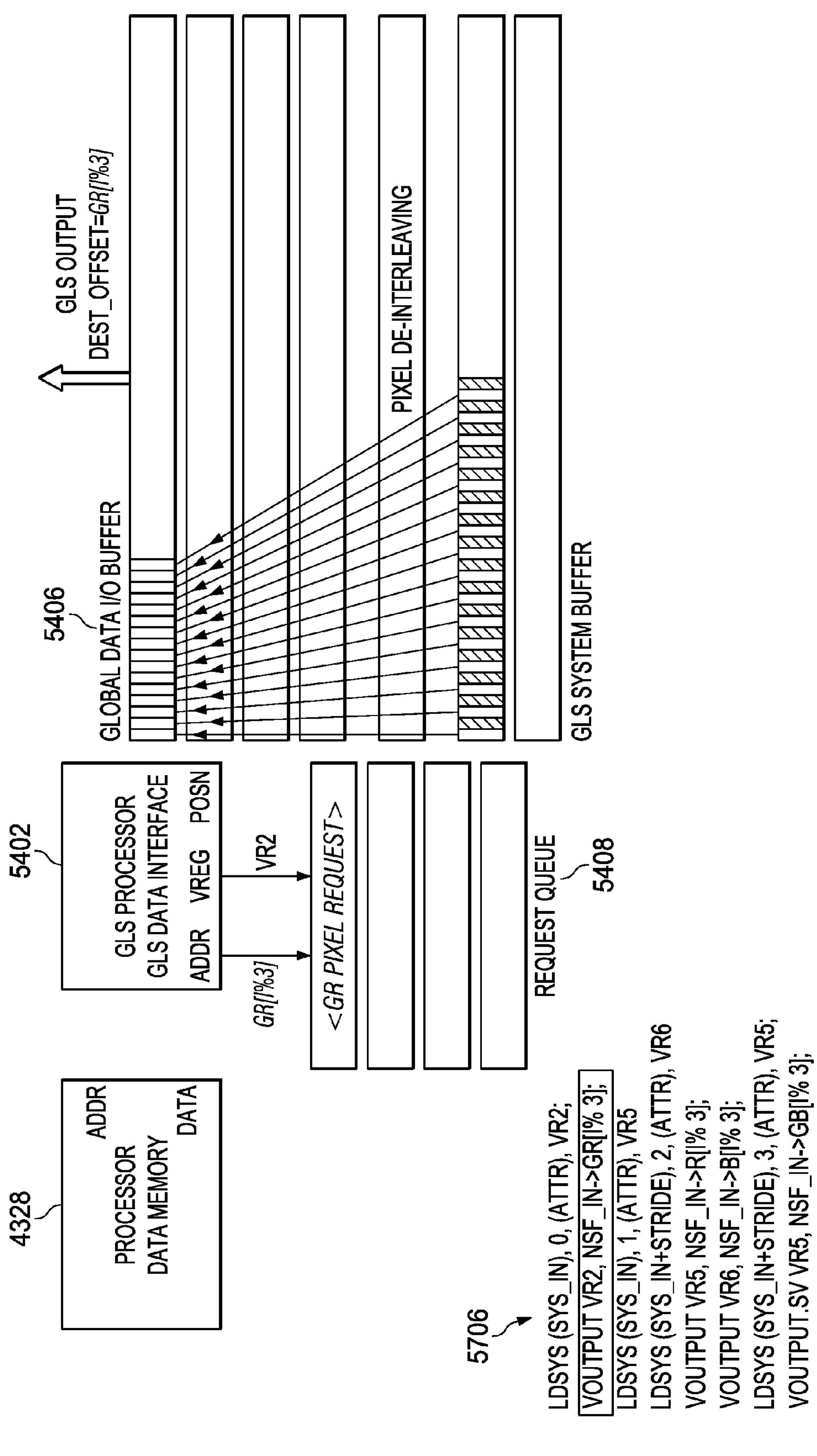
FIG. 130 is a diagram depicting the execution of the VOUTPUT instruction of the pseudo-assembly code of FIG. 127.

In the example of FIG. 130, the VOUTPUT instruction places the offset and HG_Size parameter for nsf_in→Gr[i %3] on the GLS Data Interface, and identifies VR2 as the source of the data. (For Block transfers, Block_Width is specified instead of HG_Size, with the same effect in hardware.) By matching the source-register ID with the previous target-register ID (VR2), the request-queueentry can associate the data accessed by the LDSYS instruction with the destination of the VOUTPUT instruction. As shown in the figure, this can initiate a de-interleaving operation to create the Gr pixels for the destination context. The initial system fetch isn't sufficient to provide the 32 pixels required, so a partial operation is shown. The hardware continues to fetch system data from the starting point sys_in to provide all required data at all destination contexts Turning to FIG. 131, an example of a steady-state result of executing the inner loop of the read thread can be seen. Using the process described above, the Request Queue 5408 associates system accesses and pixel positions with pixel types and offsets in destination contexts. This results in an access of interleaved system data sufficient to provide input to all destination contexts in the horizontal group. The GLS System Buffer uses a ping-pong arrangement, so that oneentry can be used as a target for the system access while the other is being used to de-interleave data. After the final assignment in the loop, the code contains a task switch instruction that suspends the thread while hardware completes the transfers. This instruction has a side-effect of indicating that all output from the loop is valid. Because the final assignment is to the variable nsf_in→Gb[i %3], Set_Valid is signaled by the GLS source to all destination contexts when the Gb pixels are transmitted. As shown in this example, there is no guaranteed order between LDSYS and VOUTOUT instructions for different accesses, and virtual-register identifiers are not necessarily unique. However, the instruction order does satisfy dependencies, so that the Request Queue can match system source addresses with destination offsets by pairing virtual register IDs, despite the order of instructions and despite the re-use of these ID.

After the thread is suspended at the end of the loop, GLS processor 5402 can execute other threads in parallel with this thread's hardware transfers. The hardware detects the final transfer using the HG_Size parameter (or Block_Width for Block transfers). At this point, the thread can be re-enabled to execute the next loop iteration. If the loop terminates instead, the thread executes an END instruction, resulting in an Output_Terminate signal to the first (left-most) destination context. This context propagates the termination to all other contexts in the horizontal group, as well as to dependent destination contexts of that group. When the thread executes an END instruction, and all hardware transfers to TPIC are complete, the thread sends a Thread Termination message.

9.6. Write Thread Coding and Implementation

A write thread assigns variables representing output from processing cluster 1400 programs to variables representing system data. These variables can be of any type, including scalar data, but this section shows an example of assigning pixels in Line objects to Frame objects, since this is the most complex example of the operation of a write thread. A write thread typically is data-driven, in that it moves input data to the system as long as this data is provided. In most cases, this data is processing cluster 1400 output that is the ultimate result of read-thread input to processing cluster 1400, so the write thread effectively executes within the same iteration loop as the read thread. Within the write thread for an example application of image processing, pixels of Line objects are assigned to Frame objects, with the organization of the frame division (the width of the Line), and the details of the Frame, hidden from the source code. As with read threads, an iteration of a write thread normally executes very quickly with respect to the hardware transfer of data. Thread execution configures hardware buffers and control to perform the desired transfer. At the end of an iteration, the thread execution is suspended (by a task switch instruction) while the hardware transfer continues. This frees the GLS processor 5402 to execute other threads, which is important because there is a single GLS processor 5402 processor controlling up to 16 thread transfers. The suspended thread is enabled to execute again once the hardware transfers are complete.

Figure 131:
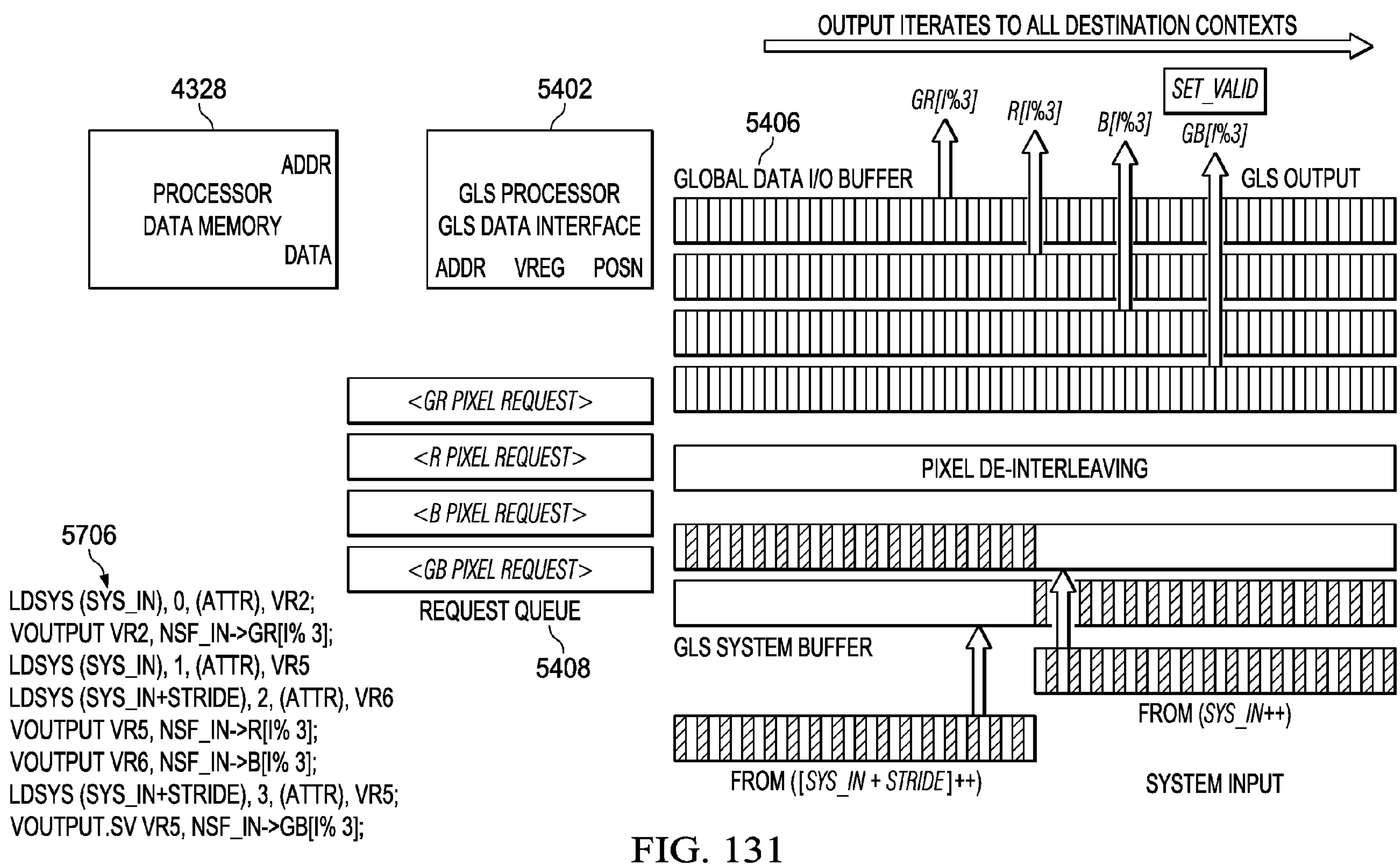
FIG. 131 is a diagram depicting the after execution of read thread inner-loop assignments for the pseudo-assembly code of FIG. 127.

Turning to FIG. 131 an example of source code 5752 for a write thread, the declaration of the Frame class 5754 (which is common to all threads), and the resulting GLS processor 5402 assembly pseudo-code 5756. Since the output of processing cluster 1400 to a write thread is often different than the read-thread input, this example uses 422 YUV output, illustrating how the sub-sampled chroma can handled by the write thread (the pixels also appear on a single line of output, in contrast to Bayer data) for image processing applications (as an example). The following is a line-by-line description of the source-code 5752:

- The declaration of VIDEO_OUT defines the structure of the processing cluster 1400 output to the write thread. The variable vid_out with this structure is the input variable to the write thread. The processing cluster 1400 program that provides this input has an extern variable with the same name (this is for illustration, and does not accurately reflect how source code is structured for processing cluster 1400). This input consists of four Line variables, two for luma pixels (Ya, Yb), and one for each of the chroma pixels (U, V). Chroma data is sub-sampled, so there are two luma pixels for every pair of chroma pixels.
- The enum POSN assigns numerical values to the position of YUV pixels in the interleaved format. The corresponding enum value assignments are used to identify the position to hardware, and the enum members are used instead of absolute values for clarity in the source code 5752.
- The prototype for the write-thread function includes parameters that are "passed" by the host (in a Schedule Write Thread message). In this example, the parameters are a pointer to the frame buffer in the system, sys_out, and a stride which indicates the address offset from one scan-line to the next. Unlike the read thread, the write thread is independent of frame height, because it effectively gets this information from the input dataflow.
- The program declares a pointer to an instance of an input frame, f_out, assigning it the attribute YUV422. This attribute is a defined constant corresponding to the hardware settings that enable interleaving to (or de-interleaving from) a video "YUV422" pattern (this is shown in the figure). This simply sets a private variable attr in f_out.

The write thread iterates on input data being provided. This is indicated by the absence of a hardware flag, _terminate, which indicates that the thread has received an Output Termination message (this flag is tested as a bit in the GLS processor 5402 Condition Status register).

Within the iteration loop, the thread code calls the write-access function put in f_out, passing pointers to the frame in the system, referencing the pixel position by name of the corresponding pixel (this is simply an integer assigned in the enum declaration), and passing the Line variable to be written. There are four calls, two for chroma data and two for luma, all at the same system address (but different pixel positions). The put function writes a Line of the configured width by inserting pixels of the given type into the interleaved format (in the abstract).

At the bottom of the loop, the system address sys_out is incremented by the stride, since all output pixels appear on the same line.

When dataflow terminates the write thread, the output frame is de-allocated. The thread can remain resident and be scheduled again, so the memory used by the instance should be freed (although not shown in this example, the same code can be used for different formats of output frames, using different attribute settings, so the frame instance may not necessarily be static).

Figure 132:
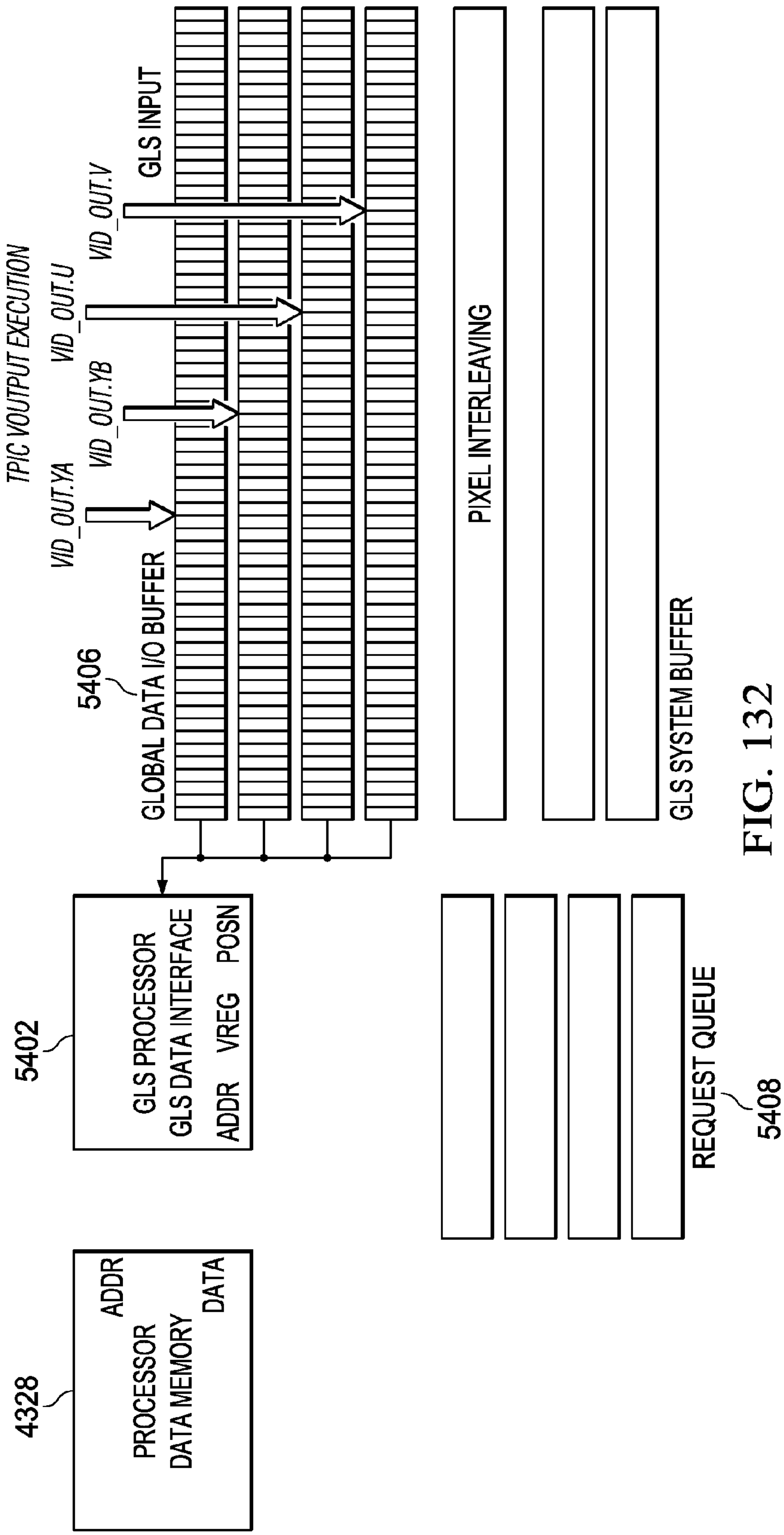
FIG. 132 is a diagram depicting the input from processing cluster scheduling write thread for the pseudo-assembly code of FIG. 128.

In a cross-hosted environment, the put function in the Frame class simply calls the intrinsic _STSYS, passing input parameters plus the attribute attr. This intrinsic inserts all the pixels from the input Line parameter, the entire width of the frame, into the associated positions at the given address. This insertion is done for each call to put, for each pixel type. As with the _LDSYS intrinsic, this implementation is functionally equivalent to processing cluster 1400's, but performance is unacceptably slow. The remainder of this section describes how the source code, Frame class, and _STSYS intrinsic are used to perform very high-throughput transfers with a very small number of instructions. When the write thread is first scheduled, it cannot execute right away because input data has not been provided. The thread remains idle until a processing cluster 1400 context outputs data, identifying the GLS unit 1408 as the destination node and the write thread as the destination thread. This enables the write thread to execute, as shown in FIG. 132. A processing cluster 1400 context outputs data to the write thread by executing a VOUTPUT instruction, identifying the offset, in the write thread's context, of the corresponding member of the input structure vid_out. Since the write thread does not generally have memory for vector data, this offset is actually for a dummy variable, in processor data memory 4328, treating the Line variable as an integer (code generation also treats a Line as an integer, with the vector being implied by the SIMD instead of explicit in the source). This offset is linked to the processing cluster 1400 code after compilation, based on the offset of the variable in the write-thread context.

Figure 133:
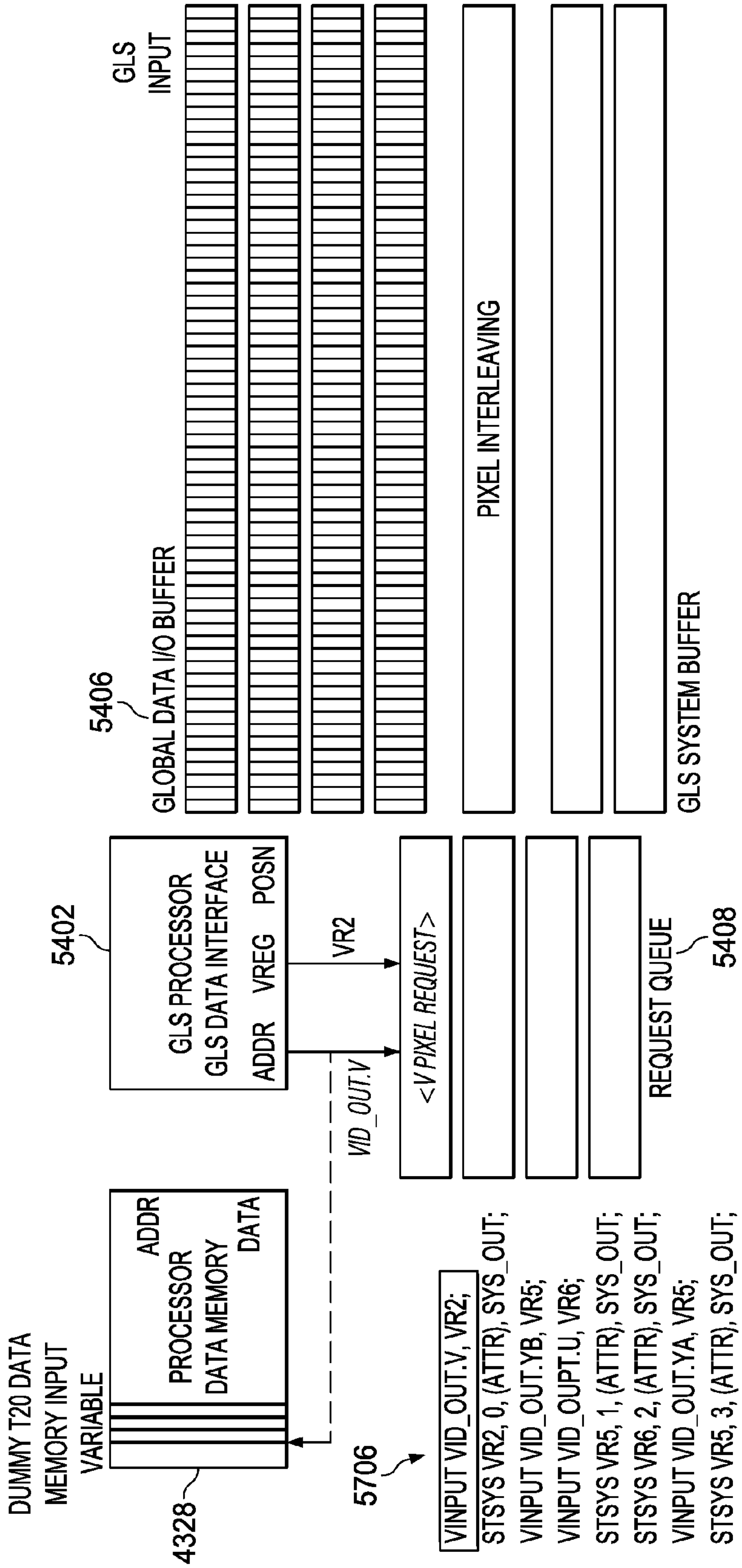
FIG. 133 is a diagram depicting the execution of the VINPUT instruction of the pseudo-assembly code of FIG. 128.

The example in FIG. 133 includes pseudo assembly-code 5706 for the inner loop of the write thread. The first two instructions illustrate how an input Line, passed to put, is translated into GLS processor 5402 code that writes interleaved pixels into a system Frame. The source statement f_out→get(sys_out, V, vid_out.V) first generates an instruction, VINPUT, to load a virtual GLS processor 5402 register from the dummy input-structure element vid_out.V, so that it can be passed to put (conceptually). FIG. 133 illustrates an example of the execution of this instruction. The VINPUT instruction places the offset and HG_Size parameter for vid_out.V on the GLS data interface, and identifies VR2 as the target register. This information is captured by a request-queueentry allocated to the thread. There is no actual data access or movement—this is simply to provide information to the Request Queue 5408. For Block transfers, Block_Width is specified instead of HG_Size, with the same effect in hardware.

Figure 134:
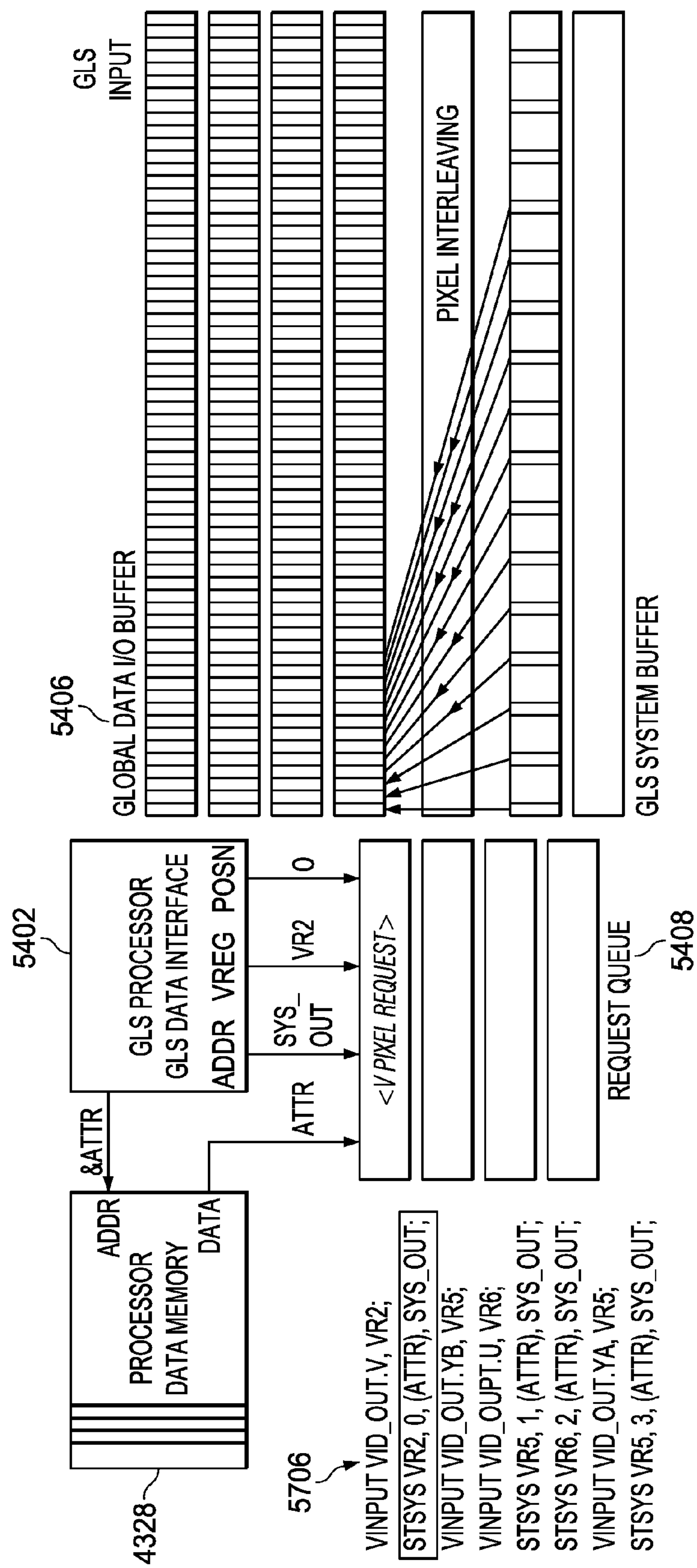
FIG. 134 is a diagram depicting the execution of the STSYS instruction of the pseudo-assembly code of FIG. 128.

The second instruction, STSYS, is a straightforward translation of the intrinsic STSYS resulting from the call to put. FIG. 134 illustrates an example of the execution of this instruction. The address of the Frame instance's attr variable is used to access the attribute value in processor data memory 4328 (a YUV422 frame), and the address sys_out, the virtual register ID (VR2), and the pixel position for V (0) are placed on the GLS Data Interface. By matching the source-register ID of the STSYS with the previous VINPUT target-register ID (VR2), the request-queueentry can associate the information provided by the STSYS instruction with the VINPUT data. As shown in the figure, this can initiate an interleaving operation to place the V pixels into the system format.

Figure 135:
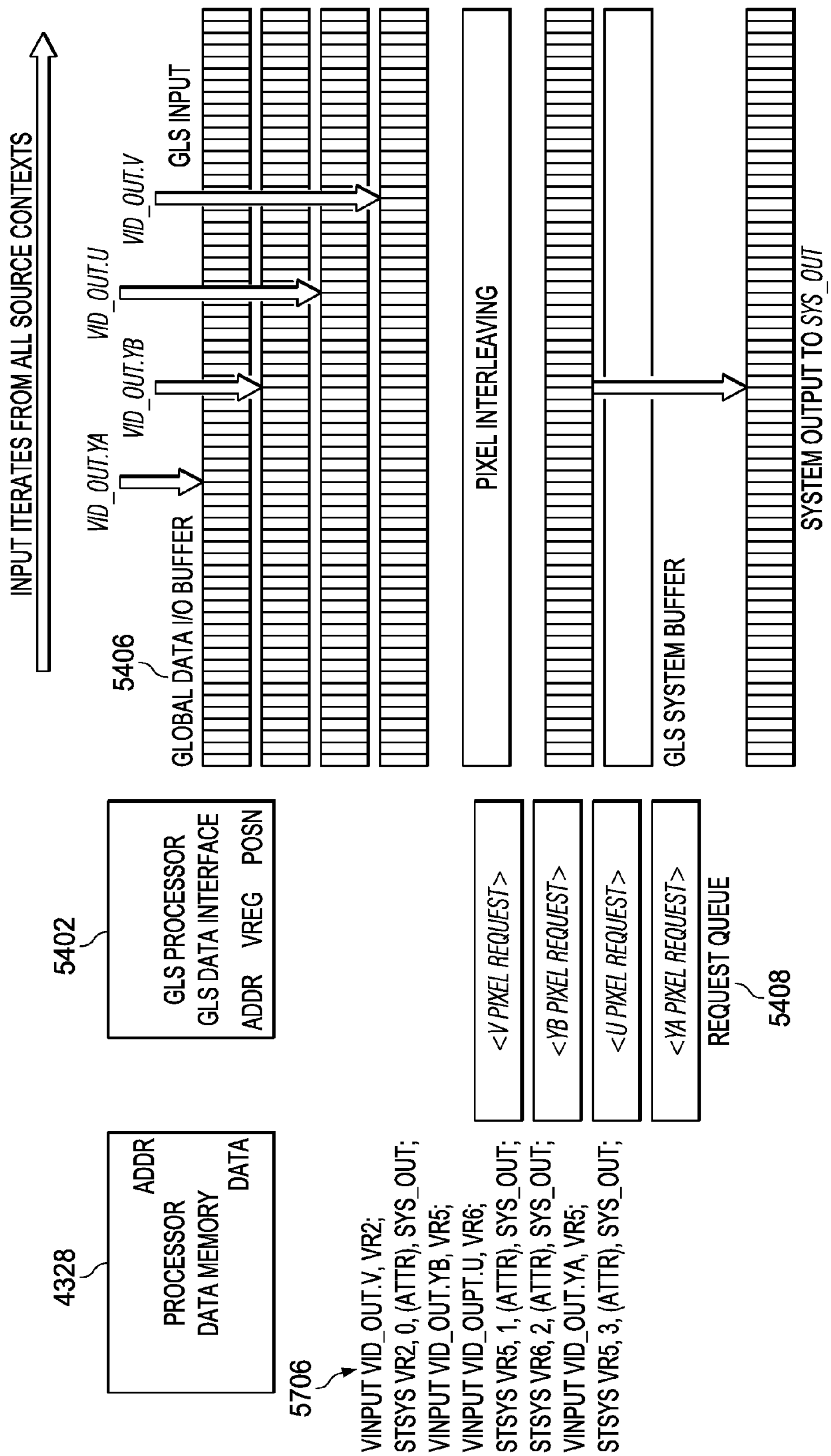
FIG. 135 is a diagram depicting the after execution of read thread inner-loop assignments for the pseudo-assembly code of FIG. 127.

Other inputs can be identified before they can be interleaved into the frame and the result written to the system. This is accomplished by the other instructions in the loop, with the steady-state result shown in FIG. 135. Using the process described above, the Request Queue 5408 associates input pixels from processing cluster 1400 sources with pixel types and positions in the system frame, along with the system destination address. This results in output of interleaved system data for all source contexts. The GLS System Buffer uses a ping-pong arrangement, so that oneentry can be used for writing to the system while the other is being used to interleave data.

As shown in this example, there is no guaranteed order between VINPUT and STSYS instructions for different accesses, and virtual-register identifiers are not necessarily unique. However, the instruction order does satisfy dependencies, so that the Request Queue 5408 can match write-thread inputs with system positions and addresses by pairing virtual register IDs, despite the order of instructions and despite the re-use of these IDs.

At the end of the loop, the thread is suspended while hardware transfers are completed. The hardware detects the final transfer because Set_Valid is asserted for the source context that has Rt=1 in its Source Notification message. At this point, the thread is in a condition to be re-enabled to execute the next loop iteration, but is not actually enabled to execute until new data is received. The thread has to detect the combination of Set_Valid and Rt=1 in order to distinguish data from a previous iteration from data for a new iteration, so that it is enabled to execute for new input. In addition to being enabled by new input, the thread is also enabled to execute when it receives an Output Termination message. This causes the loop condition to end the loop. When the thread executes an END instruction, all hardware transfers to the system should complete before the thread can send a Thread Termination message.

9.7. Dataflow Protocol Implementation

GLS UNIT 1408 generally conforms to the dataflow protocol between processing nodes (i.e., 808-*i*), but the internal implementation is significantly different than in the nodes (i.e., 808-*i*) and SFM 1410. GLS UNIT 1408 transfers can be highly parallel and overlapped, as defined by a program performing data movement to and from GLS processor 5402 virtual registers, converted by hardware into large transfers of system data to and from processing cluster, with de-interleaving and interleaving as required or desired. In contrast, node and SFM transfers are generally synchronous with program execution, and normally represent a relatively small amount of activity with respect to the entire program. Furthermore, because of conditional program execution, there can be a large variability in the output created by different iterations of a read thread. Output can be to different set of variables at a given destination, of a different set of types, and the order of output instructions can be different. On top of this variability, an iteration can also output to a different set of destinations. This variability is handled by the GLS dataflow protocol.

9.7.1 Vector Outputs to the Processing Cluster 1400

Figure 136:
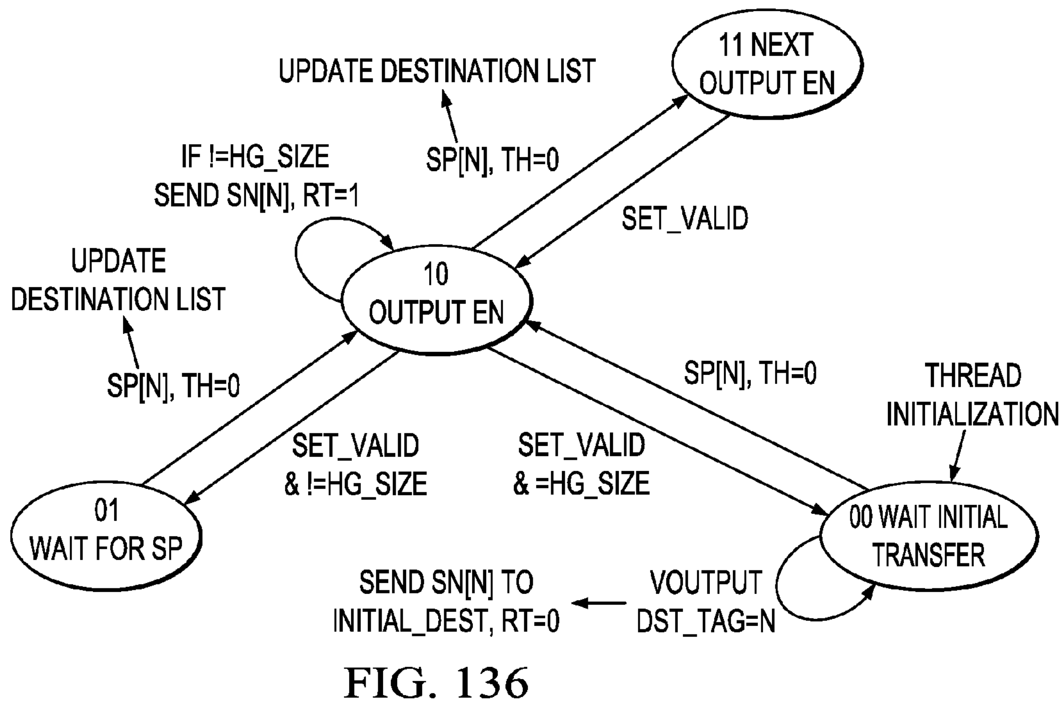
FIGS. 136 to 139 are example state diagrams for the operation of the GLS unit.

The destination-list entries for a read thread enable a large amount of overlap between the dataflow protocol and data transfer, and between transfers to different destinations on the list. The dataflow protocol does not generally appear in series with data transfers into the contexts associated with a particular destination, and each destination be can be provided with data at the maximum rate permitted by the destination. The destination list buffers an identifier for the next destination context while the current transfer is being serviced. When the current transfer is complete, this identifier can be used to transition immediately to the next destination context. In parallel, the thread can sends a Source Notification to the destination context, which forwards the notification. The context receiving the forwarded Source Notification responds with a Source Permission when it is ready to receive data, and the read thread stores the identifier from the permission in the destination-listentry. This protocol operates independently for each set of destination contexts—for eachentry on the destination list. There is generally no serialization or synchronization between independent destinations. f Turning to FIG. 136, a GLS output-state transitions for Line output to a node can be seen. This is comparable to node and SFM OutSt transitions, except that the states are in hardware and operate in parallel with other threads, instead of as dataflow state that is accessed per program context. The initial state is 00'b, to wait on a VOUTPUT instruction at the given Dst_Tag value. This triggers and SN to that destination, except that this doesn't occur immediately. Instead, the hardware records the fact that this iteration of the read thread creates vector output to the destination. The hardware waits until the thread suspends, so that it can detect whether there is also scalar output to the same destination, which is required to set the Type field in the SN. Because of program conditions in the thread, it can output any combination of vector and scalar data, to any combination of destinations, in any given iteration. This information should be collected before the proper SNs can be sent. When the thread suspends, the SN is sent, with Rt=0, to the left-boundary context. This context is identified by the initial destination ID in word 0 of the destination list. The resulting SP enables output to the destination, with a transfer to the state 10'b. The identifier of this destination is placed in the Request Queue to route data as it's received from the system.

In state 10'b, at any time during a current transfer, the thread can send a Source Notification (SN) to the current destination, enabling the destination to forward the SN to the next destination (Rt=1), up to the right-boundary context. The read thread determines the number of node destination contexts using the HG_Size parameter, which is provided to hardware on the GLS Data Interface (it is contained in the vertical-index parameter of the VOUTPUT instruction). Thus, the SN is sent up to the point where HG_Size sets of outputs have been done. After the SN is sent, the next two events can occur in any order:

- An SP can be received from the next destination context before the current one is complete: completion of the current transfer is signaled by Set_Valid from GLS. In this case, the SP updates the destination list, and the state transitions to 11'b to wait on Set_Valid to the current destination. Upon Set_Valid, the state transitions to 10'b, where output is enabled to the next destination, and an SN can be sent to this destination for forwarding, assuming that this is not the right-boundary context as determined by HG_Size.
- The current transfer can complete, with Set_Valid before an SP is received from the next destination context. In this case, the state transitions to 01'b to wait on the SP. The SP updates the destination list but also can immediately enable the transfer to the next destination. An SN is also sent for forwarding depending on the number of sets of transfers compared to HG_Size.

When the final set of transfers is complete, detected by Set_Valid and HG_Size, the state transitions to 00'b to wait on the next iteration of the read thread.

Figure 137:
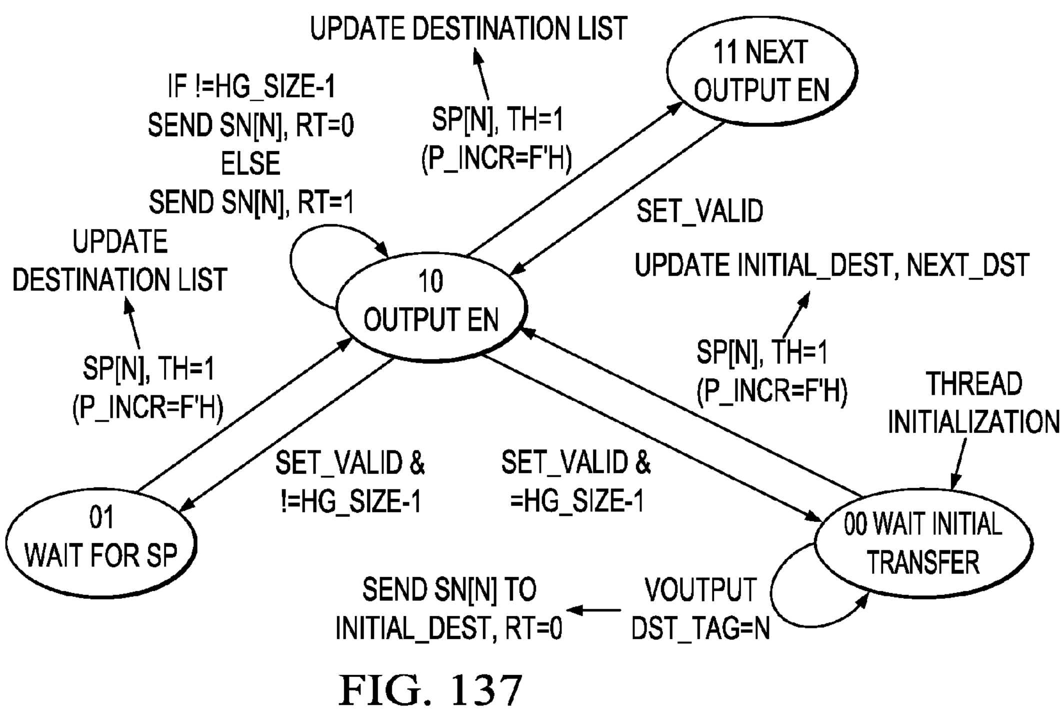

The dataflow protocol for Line output to shared function-memory 1410 is similar to that for Line output to a node (the two are distinguished by a datatype field in the VOUTPUT instruction, which appears on the GLS Data Interface). However, there are several differences required by the SFM destination, since it is a single destination context, possibly in a continuation group (FIG. 137):

- To support output of LineArray data to an SFM continuation group, the SP received on the transition from state 00'b to 10'b updates the initial-destination ID in word 0 of the destination-listentry. In this case, the destination typically is the same over a large number of transfers, but changes to the next continuation context after the final current transfer. The first transfer of the next iteration is then to the continuation context, not the initial, and this is also the context that should receive an OT. The next-destination ID is also updated, and is used to send SNs and to route Line transfers.
- The value of P_Incr should be recorded, since the destination is threaded. However, for Line transfers, the value is F'h which enables any number of outputs.
- SNs are not forwarded at the destination with Rt=1. Instead, all but the final transfer on the scan-line have Rt=0, and Rt=1 is used for the final transfer to indicate the end of the scan-line to SFM (this is the same indication for Line transfers from a node). The final transfer is the one with the count HG_Size−1.
- For compatibility with node Line data, SPs received out of state 01'b or into state 11'b update the destination list, but these do not usually change the value of the next-destination ID because it is usually the same.

To properly address the data in the destination context, the GLS unit 1408 can increment the offsets of successive transfers (for example, by 32 pixels each transfer), so that SFM input is directly addressed. Line transfers to node contexts are to the same address in SIMD data memory, but in different contexts. GLS unit 1408 also indicates the last line in a circular buffer, using Fill (from Data Interface), so that SFM 1410 can distinguish the final transfer of LineArray data.

Figure 138:
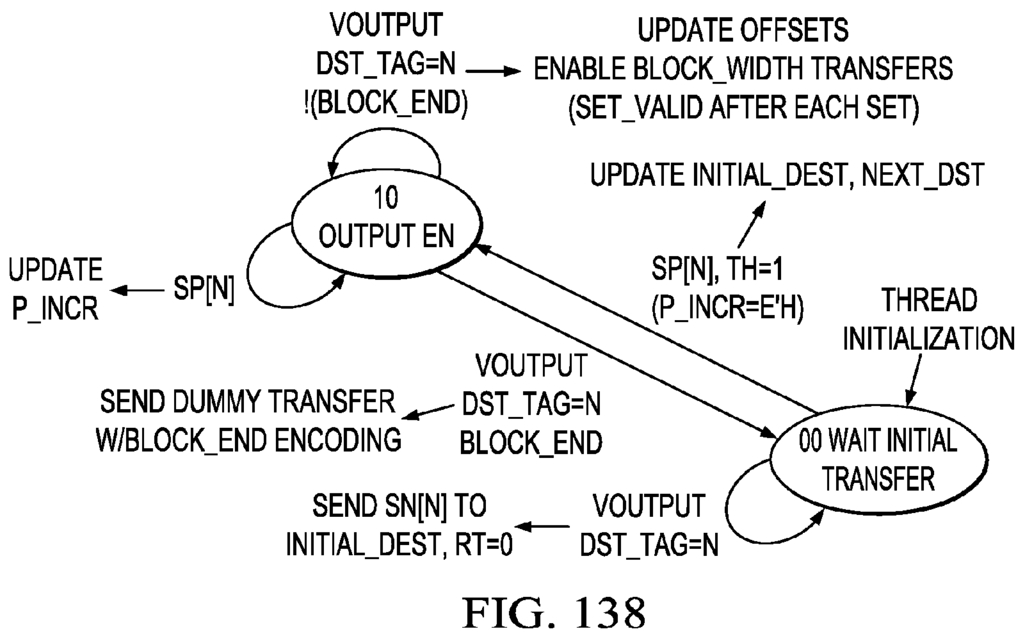

Turning to FIG. 138, it shows the GLS output-state transitions for Block output to SFM 1410. In this case, thread software iterates by rows, and hardware iterates over the columns in each row using the Block_Width parameter, which is indicated on the same interface as HG_Size and also based on the vertical-index parameter, except that the indicated datatype is Block. Iteration over the columns is done to limit the number of GLS processor 5402 cycles spent doing Block output, making the processor loading similar for Line and Block output.

Usually, a single SN (or source notification) is sent for all blocks sent to a destination context. This is sent in state 00'b, after the thread suspends, to all destinations that have output in that iteration. When the output is enabled, block data is transferred such that the same column in all blocks are transferred, with Set_Valid after the final block transfer at each column position. Addressing in the destination context is accomplished by incrementing offsets by (for example) 32 pixels for each column position.

Because of the possible existence of continuation contexts, the SP received on the transition from state 00'b to 10'b updates the initial-destination ID in the destination-listentry, as well as the next-destination ID. The initial-destination ID is updated to transition continuation contexts, and the next-destination ID is used to route transfers. The initial-destination ID is also used to send and OT, because this should be sent to the last continuation context to receive data. Blocks of different widths can also be output. When the number of column transfers for any given block reaches its Block_Width, no more output to that block is done. However, output continues to wider blocks, up to the block or blocks with the greatest width. The number of columns output, with Set_Valid, usually cannot exceed the number permitted by the PermissionCount field of the destination list. This field is incremented by the P_Incr field in SPs that are received during the transfer, and decremented for each Set_Valid. This is required so that SFM 1410 can control the relative rates of different inputs, if desired, to perform dependency checking.

When output of all columns in an iteration is complete to all blocks, the thread is re-scheduled to execute. This occurs in state 10'b and output is still enabled. This iteration results in a new set of VOUTPUT instructions, which set new values for offsets in the destination context: these offsets are to the first columns in the next rows of the output blocks. This is not necessarily the same set of rows that was output in the previous iteration, because program conditions can be used to stop output to blocks that have fewer rows than others. However, the same techniques as just described are used to output whatever blocks have a corresponding VOUTPUT.

At the end of all iterations, the thread signals Block_End to the given destination. This is a special encoding of VOUTPUT, to properly order this signal to come after any prior data, but should not initiate a block transfer. Instead, the GLS UNIT 1408 performs a single dummy transfer with the Block_End encoding, and transitions to the state 00'b. The thread doesn't necessarily terminate at this point: subsequent iterations can perform block output either to the same destination, the continuation context of this destination, or another destination entirely.

9.7.2. Vector Inputs to GLS UNIT 1408

A write threads iterates on the receipt of data, up to the point where an OT signal is received. This is based on a WHILE loop testing for the absence of termination. Set_Valid, though set by sources, is mostly irrelevant, because write threads process data and transmit to the system as it is received, and do not have to wait for an entire context to be valid. Once software execution has initiated a transfer, transfers from all source contexts are performed by hardware, using the dataflow protocol to perform flow control and to order inputs. Set_Valid is relevant for detecting the final transfer of an iteration (based on HG_Size or Block_Width). The final source context sends an OT after it has completed the final transfer. The OT schedules the write thread to execute, and the hardware provides a termination status that can be tested as a bit in the Condition Status Register for the GLS processor 5402. This causes the loop condition not to be met, so that the write thread no longer iterates, and instead terminates. For Block output to GLS UNIT 1408, the source can signal Block_End with a transfer after the final Set_Valid. This can be ignored.

9.7.3. Scalar Outputs to the Processing Cluster 1400

In addition to vector (including pixel vector) data to SIMD data memory for the nodes (i.e., 4306-1) and shared function contexts (which are discussed in greater detail below), the read thread can also provide scalar data to node contexts for processor data memory (i.e., 4328). This can be either data that is explicitly coded in the application program, or implicit data such as parameters, initialization and/or configuration data, and control words for circular buffers (controlling boundary conditions, buffer latency, etc.). Buffering in the GLS units 1408 limits the number of vector outputs to four sets of destination contexts (each with a separate destination-listentry, identified by source tag). However, there can be up to sixteen (for example) outputs for scalar data, to provide a means for a read thread to perform initialization and control functions even to contexts where it has no direct, explicit involvement in dataflow (the initialization and control code is added to the read thread by the system programming tool 718, depending on the use-case, and is not explicitly coded into the read-thread applications code).

There is generally no particular order to scalar outputs with respect to their source-tag fields or with respect to vector outputs; this order generally depends on the source program and code generation. There can be any combination of outputs, with any source tag, in any number. The final scalar output at each source tag is flagged with Set_Valid. The outputs are queued in the order received in the Scalar Output Buffer (i.e., within global IO buffer 5406). This buffer contains scalar outputs from all threads that are in process, with each thread having pointers to the head and tail entries for its specific set of outputs in the buffer. Eachentry includes the scalar data, their offsets in the destination contexts, and their Dst_Tag values.

Scalar data is generally provided to all destination contexts that are associated with a given Dst_Tag. Unlike vector data, which is different for every destination context, the same scalar data is copied to each destination context associated with the Dst_Tag. Scalar data is transferred over the messaging interconnect or bus 1420, using Update messages.

Destination-list entries can control both vector and scalar transfers, because a Source Permission from a destination context applies to both. Outputs of scalar-only data can proceed independent of any other vector or scalar transfers, but outputs of both scalar and vector data to a given set of destination contexts has to be synchronized with the dataflow protocol of the destination contexts, as reflected in the destination list. Because vector data is generally much larger than scalar data, it generally controls the rate of transfer and thus the rate of the dataflow protocol. Scalar transfers remain in the Scalar Output Buffer (i.e., within global IO buffer 5406) until all outputs to all destinations have been performed. When a vector output occurs to a given destination context, the Scalar Output Buffer (i.e., within global IO buffer 5406) is scanned for any scalar transfers with the given Dst_Tag field, and, if anyentry has a matching Dst_Tag, the scalar transfer is performed. These transfers occur in parallel with the vector transfers.

Scalar output (if applicable) occurs along with vector outputs to all destination contexts, using repeated scans of the queue entries in the Scalar Output Buffer (i.e., within global IO buffer 5406), for example one for each context. If there are no vector outputs at a given Dst_Tag, the scalar output is accomplished the same way, but isn't synchronized with vector output, and uses a different dataflow-protocol sequence. By scanning all entries associated with the read thread, and by matching Dst_Tag fields of these entries with the Dst_Tag of the destination contexts, all data is correctly transferred to all destinations regardless of the order and number of output instructions from the read-thread code.

Scalar input is treated as separate from vector input by node destination contexts. Each is specified separately by the ValFlag LSB in the dataflow state. Scalar transfers have Set_Valid signals, on the messaging interconnect 1420, separate from Set_Valid for vector data on the global data interconnect. These signals are accounted for independently in the ValFlag fields in the node dataflow-state entries. There is also a separate Input_Done encoding of the scalar transfer from GLS that has the same effect as Set_Valid without providing new data (this is encoded in the scalar OUTPUT instruction).

If scalar data is provided along with vector data for a given destination, the scalar output is synchronized with vector output, and the vector dataflow protocol controls both. If scalar data is provided, then another set of state transitions is used to control output, and this is performed independently from other vector output.

Figure 139:
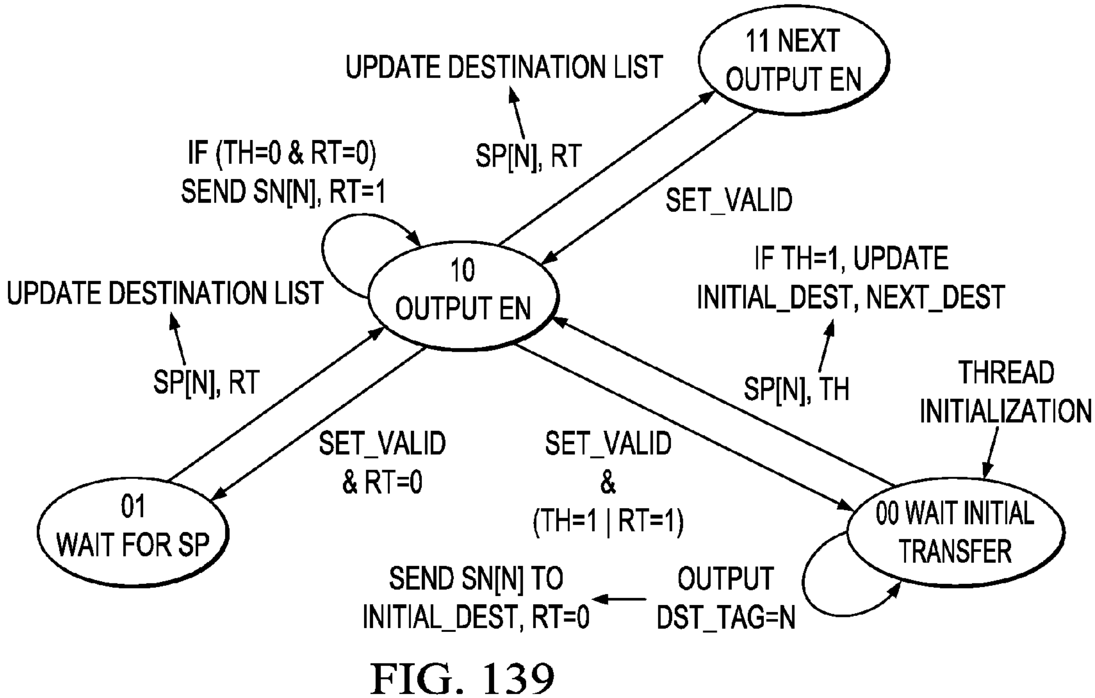

In FIG. 139, the state transitions for scalar-only output is shown. This applies regardless of whether or not the destination is threaded (but the state of Th in the SPs affect operation). As for vector data, the initial state 00'b records OUTPUT instructions to the destination, placing the data in the Scalar Output Buffer and sending an SN to the destination (with Type=01'b) when the thread suspends. If Th=1 in the resulting SP, the initial- and next-destination IDs are updated to properly transition continuation contexts. In any case, this SP causes a transition to 10'b where scalar output is enabled.

In state 10'b scalar data is transferred usually once to a thread destination (SFM Line or Block), but is transferred to every data memory (i.e., 5403) context in a horizontal group (the same data is provided to all contexts). In the first case, as soon as all data has been transferred, with Set_Valid, the state transitions to 00'b for subsequent output from the thread (because Th=1). The second case—output to a horizontal group—is described below.

For a non-threaded destination, in state 10'b, an SN is sent for forwarding if the most recent SP was not received from a right-boundary context (Rt=1). This SP is forwarded at the destination to the next destination context, resulting in an SP from that context: this updates the next-destination ID. As with Line output this SP can come before or after the Set_Valid indicating the final transfer to the current destination. The state 11'b records the SP, re-enabling output after Set_Valid occurs, and the state 01'b records the Set_Valid and waits for the SP before re-enabling output. In both cases the next state is 10'b. This continues until an SP is received from the right-boundary context, at which point a Set_Valid causes a transition to 00'b to wait for subsequent output from the thread.

Program control flow can cause variability in read-thread output from one iteration to the next. Each thread has an iteration queue (which can be part of the thread wrapper 5404) that records information from the thread as it executes instructions for the iteration, and controls output for that iteration. This recording starts when the thread is scheduled, and stops when it is suspended. Eachentry of the queue has a two-bit type flag for each of the eight possible destinations, recording the type of output to the destination for that iteration (none, scalar, vector, or both). Theentry also contains the iteration's head and tail pointers into the Scalar Output Buffer 5412 for all scalar output (if any), to all destinations. The iteration queue is managed as a First-in-First-Out or FIFO queue, with the most recent iteration writing the tail of the FIFO, and entries being removed from the head once all transfers for an iteration are complete.

Figure 140:
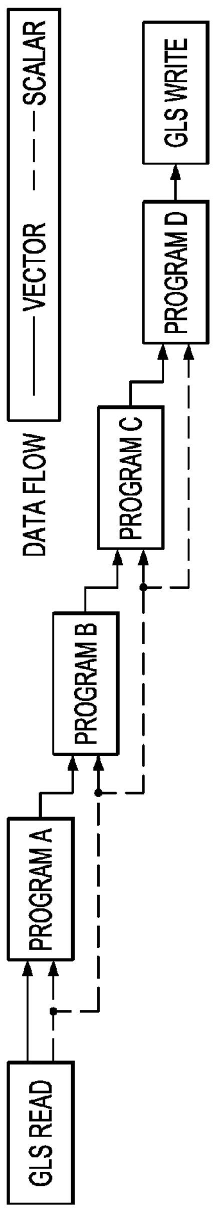
FIGS. 140 and 141 are diagrams depicting examples of dataflow for the GLS unit.

Vector output is normally controlled by theentry at the tail of the iteration queue, with this and other entries controlling scalar data. The reason for this is to support output of scalar parameters to programs that do not receive vector data directly from the thread, as illustrated in FIG. 140. In this example, the read thread provides vector data to program A, and scalar data to programs A-D. This style of dataflow introduces serialization that eliminates the potential for parallel execution of programs A-D. In this case, parallel execution is accomplished by pipelining execution, so that program A receives data from an iteration N of the read thread, executes and outputs data to the same iteration N of program B, and so on. At any given point in execution, programs A-D are executing based on read-thread iterations N through N−3, respectively. To support this, the read thread should output data for iterations N through N−3 at the same time. If it does not, and the iteration of the read thread is interlocked with all output of that iteration, then iteration N of the read thread would have to wait for program D to accept input for iteration N, and other programs would be suspended during this interval.

This serialization can be avoided by having read threads input to the same level of the processing pipeline (programs with the same value of OutputDelay in the context descriptors), so that the read thread operates at the pipeline stage of its output. This costs of an additional read thread for every level of input: this is acceptable for vector input, because there are generally a limited number of stages where vector input is input from the system. However, it is likely that every program can require scalar parameters to be updated for each iteration, either from the system or computed by a read thread (for example, vertical-index parameters that control circular buffers in each processing stage). This would require a read thread for every pipeline stage, placing too much demand on the number of read threads.

Since scalar data can require much less memory than vector data, the GLS unit 1408 stores the scalar data from each iteration in the Scalar Output Buffer 5412, and, using the iteration queue, can provide this data as required to support the processing pipeline. This usually is not feasible for vector data, because the buffering required would be on the order of the size all node SIMD memory.

Figure 141:
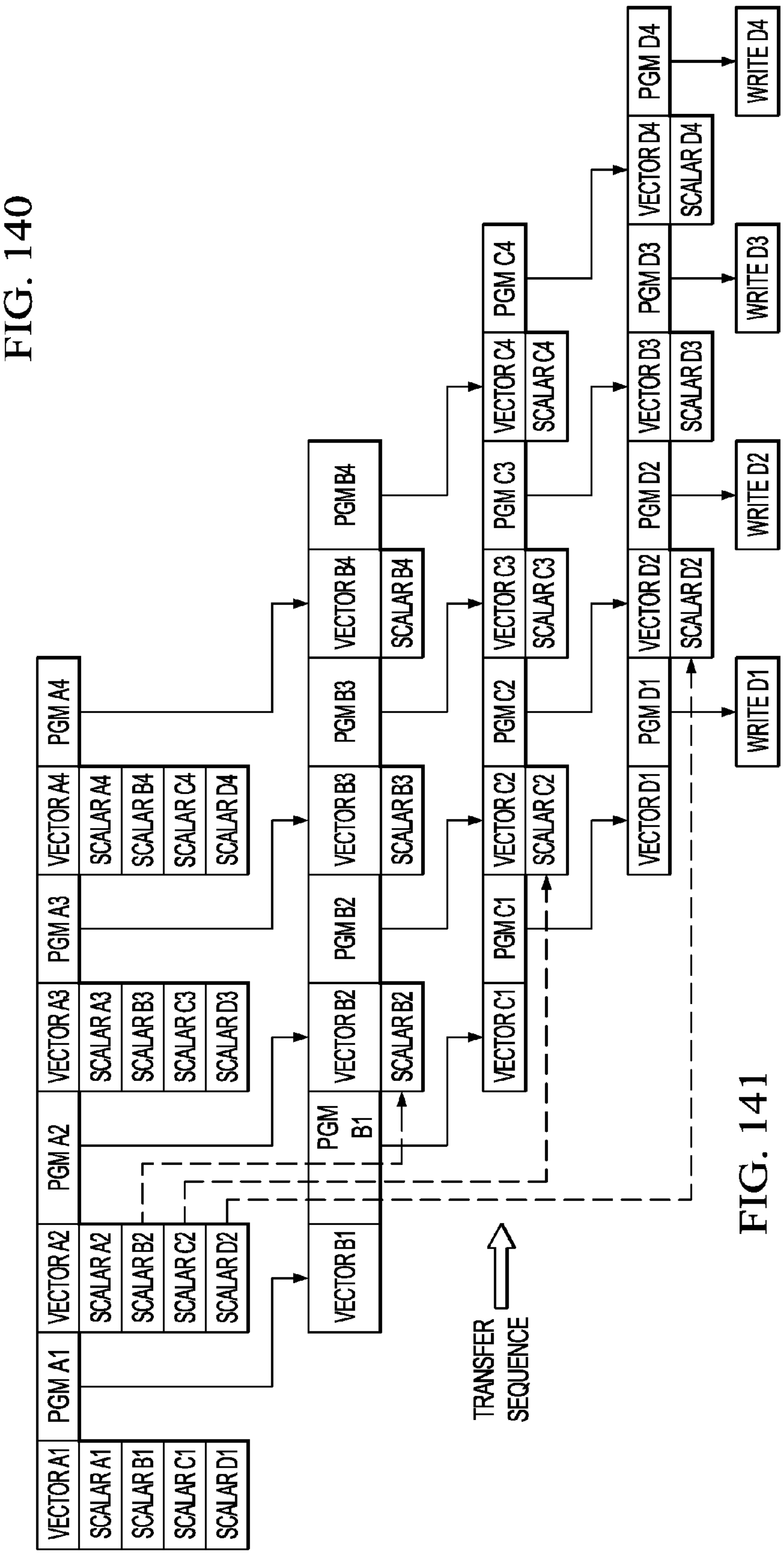

Pipelining of scalar output from the GLS unit 1408 is illustrated in FIG. 141. As shown, there is GLS unit 1408 activity, program execution, and transfers between programs. The sequence at the top shows GLS thread activity interleaved with the execution of program A. (For simplicity, the vector and scalar transfers are shown taking the same amount of time. In reality, the vector transfer takes much longer, and writes into multiple destination contexts of program A, copying scalar data into these contexts along with vector data. This has the effect of pipelining instances of program A that is not shown.) In the first iteration, the read thread triggers output of vector data for program A, and scalar data for programs A-D: this is denoted by Vector A1 and Scalar A1-Scalar D1. Since this is the first iteration, all destination contexts are idle, and all of these transfers can be performed. So, for this iteration, the iteration-queueentry can be freed after these transfers are complete. The output of this iteration enables the execution of program A, which outputs data Vector B1.

Subsequent programs execute as they receive input, skewing in time to reflect the execution pipeline. Until each program signals Release_Input during the first iteration, the read thread cannot output scalar data to the destination contexts. For this reason Scalar B2—Scalar D2 are retained in the Scalar Output Buffer 5412 until the destination contexts enable input with an SP. The duration of this data in the Scalar Output Buffer 5412 is indicated by the grey dashed arrows, showing scalar data synchronized with vector input from source programs. During this time, data for other iterations is also accumulated in the Scalar Output Buffer, up to the depth of the processing pipeline, in this example roughly four iterations. Each of these iterations has an iteration-queueentry that records data types, destinations, and location of scalar data in the Scalar Output Buffer for the successive iterations.

When scalar output is completed to each destination, that fact is recorded in the iteration queue (by setting the type flag to 00'b—the LSB will be 1). When all type flags are 0, this indicates that all output from the iteration is complete, and the iteration-queueentry can be freed. At this point, the content of the Scalar Output Buffer 5412 is discarded for this iteration, and the memory freed for allocation by subsequent thread execution.

9.7.4. Scalar Inputs to the GLS Unit 1408

Nodes (i.e., 808-*i*) can provide scalar input to GLS threads to control system data movement. For example, a node can set block dimensions, determined by a region of interest based on pixel analysis, for a GLS read thread to fetch the block into as shared function-memory continuation context. For this reason, GLS unit 1408 can implement the dataflow protocol for scalar input to threads. This is a small subset of what's required for processing and SFM nodes: there are no side contexts nor forwarding of SNs. The GLS thread simply can track SN messages for up to four sources, and count Set_Valid signals from each source.

FIG. 142 shows the dataflow-state entries 5950 contained in the dataflow state memory 5410. There is anentry for each of the threads (for example): words 0-3 for threads 0-15 are contained at addresses 0-3F'h, and words 4 for the respective threads are at addresses 40-4F'h. Pending-permission entries have the same interpretation as for processing nodes and shared function-memory nodes (typically, two bits are desired for the Dst_Tag fields 5951 from processing nodes and shared function-memory nodes, but three are provided because scalar inputs can also be provided by another GLS thread, which has up to eight destinations). In this example (shown in FIG. 138), each of the first four words (words 0-3) a source context number or thread identifier 5949, source segment identifier 5952, source node identifier 5953. Dataflow-state entries also have the same interpretation as for processing nodes and shared function-memory 1410, with the exception that Vin (in field 5957) indicates a valid input context, corresponding to Cvin/Lvin/Rvin for node and Fill for shared function-memory 1410. In this example, the last word (word 4) also includes an input terminated field 5954, a context execution end field 5955, an input enabled field 5956, number of Set_Valid signals received 5958, and an input state field 5959

When a thread is scheduled, and the In=1 in the context descriptor, the thread should receive the required number of inputs, each signaled with Set_Valid, before it can execute. If In=0, the thread can be scheduled for execution any time after the scheduling message is received. Otherwise, the thread first waits for scalar input.

Figure 143:
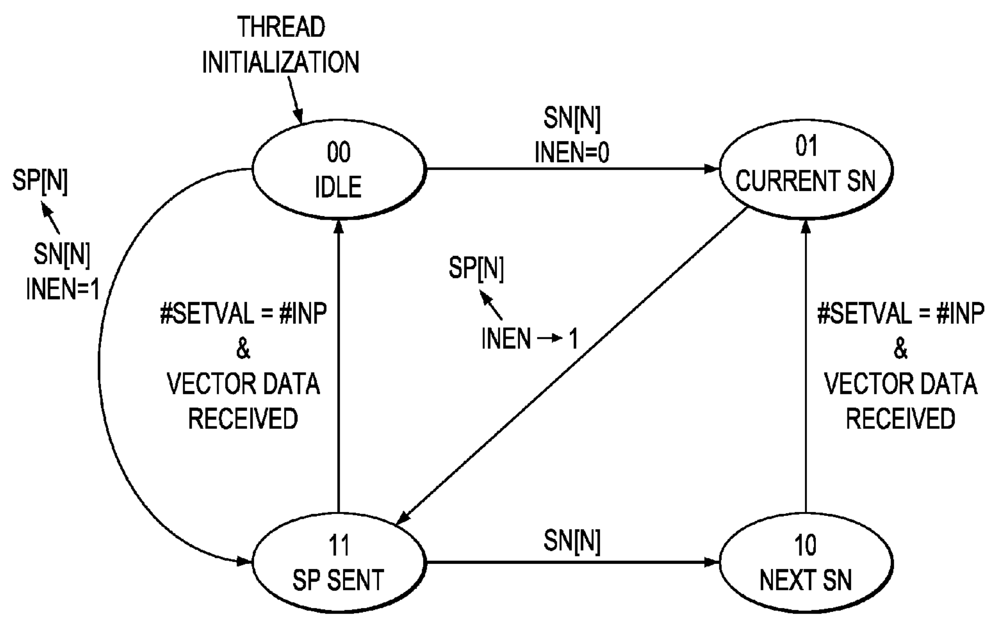
FIG. 143 is an example of a state diagram for an operation of the GLS unit.

In FIG. 143, the InSt transitions for scalar input to a GLS thread is shown. The initial state is 00'b, with input enabled (InEn=1). When an SN is received with Src_Tag=n, an SP is sent, and the state transitions to 11'b. In this state, this input can receive Set_Valid from the source, and a subsequent SN from the same source, before other inputs have been set valid. In this case, the state transitions to 10'b to record this SN. Alternatively, all input can be received before the SN, in which case the state returns to 00'b to wait on the next SN (this occurs because #SetVal=#Inp; the condition "vector data received" applies to write threads and is described below). The condition #SetVal=#Inp resets InEn to prevent further input until the current input is no longer desired.

In state 00'b, if an SN is received with InEn=0, the state transitions to 01'b to indicate that there is a valid SN recorded in the pending permission. If an SN was received from this source before other data was received, the pending permission cannot be used to generate an SP until all other input has been received, indicated by #SetVal=#Inp and resetting InEn. Input is re-enabled when the program signals Release_Input, which sets InEn, and the state transitions to 11'b. It is also possible for a source to signal Input_Done for scalar data, which indicates that the scalar data isn't updated, because of program conditions, but that the previous data should be considered valid. This is equivalent to a Set_Valid except that the scalar data is not updated.

Write threads should have special treatment for scalar input, because they also receive vector input, and these should be handled differently. Scalar input is received before the thread executes, but vector input is received after the thread executes. If input is enabled, scalar data is guaranteed to have memory allocation in data memory (i.e., 5403), but vector data should have a buffer allocation that can receive all input at a given column or horizontal position, before it can enable input. This causes a circularity in the dataflow protocol. The thread should send an SP if the SN Type indicates scalar data, to enable this scalar input; however, the source might also provide vector data, and this cannot be enabled until the thread executes and the required buffer allocation is determined.

To resolve this circularity, if Type[0]=1, the thread responds with an SP, but with P_Incr=0. The permission count should not apply to scalar output, so this enables the scalar output but does not permit the source to output vector data. Because the scalar data controls the output of vector data, it has to precede the output of vector data, so the source program can make progress even though vector output is disabled (if it were to output vector data first, it would deadlock, but this style of output isn't useful).

A similar issue applies in determining when to enable the SP response to the next SN. This SP can occur after all vector output for the previous SN has been received, and new buffers allocated for the next input. This condition is hardware-specific, and is indicated by the condition "vector data received" in the state-transition diagram, on the arcs that enable the SP.

Read-thread iterations complete very quickly compared to the data transfers that are initiated by the iteration, and the program enters a suspended state as the hardware completes the transfers. The thread is re-scheduled once all of these hardware transfers have been performed. In most cases, the program executes another iteration and initiates a new set of transfers. However, after the final iteration, there are no transfers indicated, and the program terminates instead. At this point, to signal that there are no more transfers from the thread, the hardware sends Output_Terminate (OT) signals to all destinations that are enabled to receive OT from the thread (these are normally destinations that receive data during thread iterations, rather than destinations that just receive initialization data at the beginning of the thread). Hardware transmits an OT to every destination on the destination list enabled by OTe=1, up to theentry with Bk=1.

9.8. Thread Scheduling

GLS threads are scheduled by Schedule Read Thread and Schedule Write Thread messages. If the thread does not depend on scalar input (read or write thread) or vector input (write thread), it becomes ready to execute when the scheduling message is received: otherwise the thread becomes ready when Vin is set, for threads that depend on scalar input, or until vector data is received over global interconnect (write thread). Ready threads are enabled to execute in round-robin order.

When a thread begins executing, it continues to execute until all transfers have been initiated for a given iteration, at which point the thread is suspended by an explicit task-switch instruction while the hardware transfers complete. The task switch is determined by code generation, depending on variable assignments and flow analysis. For a read thread, all vector and scalar assignments to processing cluster 1400, to all destinations, have to be complete at the point of thread suspension (this typically is after the final assignment along any code path within an iteration). The task-switch instruction causes Set_Valid to be asserted for the final transfer to each destination (based on hardware knowing the number of transfers). For a write thread, the analysis is similar, except that the assignment is to the system, and Set_Valid is not explicitly set. When the thread is suspended, hardware saves all context for the suspended thread, and schedules the next ready thread, if any.

Once a thread is suspended, it can remains suspended until hardware has completed all data transfers initiated by the thread. This is indicated several different ways, depending on transfer conditions:

- For a read thread outputting scan-lines to horizontal groups (multiple processing node contexts or single SFM context), the completion of data transfer is indicated by the last transfer to the right-most context or shared function-memory input, indicated by the Set_Valid flag being transmitted to the context that has Rt=1 in the SP that enables the transfer.
- For a read thread outputting a block to an SFM context, hardware provides all data in the horizontal dimension, similar to lines, and the final transfer is determined by Block_Width. Explicit software iteration provides block data in the vertical dimension
- For a write thread receiving input from node or SFM contexts, the final data transfer is indicated by Set_Valid for the transfer that matches HG_Size or Block_Width.

When a thread is re-enabled to execute, it can either initiate another set of transfers, or terminate. A read thread terminates by executing an END instruction, which results in OT signals to all destinations that have OTe=1, using the initial-destination IDs. A write thread generally terminates because it receives an OT from one or more sources, but isn't considered fully terminated until it executes an END instruction: it's possible that the while loop terminates but the program continues with a subsequent while loop based on termination. In either case, the thread can send a Thread Termination message after it executes END, all data transfers are complete, and all OTs have been transmitted.

Read threads can have two forms of iteration: an explicit FOR loop or other explicit iteration, or a loop on data input from processing cluster 1400, similar to a write thread (looping on the absence of termination). In the first case, any scalar inputs are not considered to be released until all loop iterations have been executed—the scalar input applies to the entire span of execution for the thread. In the second case, inputs are released (Release_Input signaled) after each iteration, and new input should be received, setting Vin, before the thread can be scheduled for execution. The thread terminates on dataflow, as a write thread does, after receiving an OT.

9.9. GLS Processor Data Interface

The GLS processor 5402 can include a dedicated interface to support hardware control based on read- and write-thread operation. This interface can permit the hardware to distinguish specific or specialized accesses from normal accesses for the GLS processor 5402 to GLS data memory 5403. Additionally, there can be instructions for the GLS processor 5402 to control this interface, which are as follows:

- A load system (LDSYS) instruction which can load a register of the GLS processor 5402 from a specified system address. This is generally a dummy load, which can be for the purpose of identifying the target register and the system address to hardware. This instruction also accesses an attribute word from GLS data memory 5403, containing formatting information for the system Frame to be transferred to processing cluster 1400 as a Line or Block. The attribute access does not target a GLS processor 5402 register, but instead loads a hardware register with this information, so that hardware can control the transfer. Finally, the instruction contains a three-bit field indicating to hardware the relative position of the accessed pixels in the interleaved Frame format.
- Scalar and vector output instructions (OUTPUT, VOUTPUT) which can store a register of the GLS processor 5402 into a context. For scalar output, the GLS processor 5402 directly provides the data. For vector output, this is a dummy store, for the purpose of identifying the source register—which associates the output with a previous LDSYS address—and for specifying the offset in the destination contexts. Line or Block output have an associated vertical-index parameter for specifying HG_Size or Block_Width, so that the hardware knows the number of (for example) 32-pixel elements to transfer to the line or block.
- Vector input instructions (VINPUT) load a data memory 5403 location into a GLS processor 5402 virtual register. This is a dummy load of a virtual Line or Block variable from data memory 5403, for the purpose of identifying the target virtual register and the offset in data memory 5403 for the virtual variable. Line or Block output have an associated vertical-index parameter for specifying HG_Size or Block_Width, so that the hardware knows the number of (for example) 32-pixel elements to transfer to the line or block.
- A store system (STSYS) instruction stores a virtual GLS processor 5402 register to a specified system address. This is a dummy store, for the purpose of identifying the virtual source register—which associates the store with a previous VINPUT offset—and for specifying the system address where it is to be stored (usually after interleaving with other input received). This instruction also accesses an attribute word from data memory 5403, containing formatting information for the system Frame to be transferred from the processing cluster 1400 Line or Block. The attribute access does not target a GLS processor 5402, but instead loads a hardware register with this information, so that hardware can control the transfer. Finally, the instruction contains a three-bit field indicating to hardware the relative position of the accessed pixels in the interleaved Frame format.

The data interface for the GLS processor 5402 can includes the following information and signals:

An address bus, which specifies: 1) a system address for LDSYS and STSYS instructions, 2) a processing cluster 1400 offset for OUTPUT and VOUTPUT instructions, or 3) a data memory 5403 offset for VINPUT instructions. These are distinguished by the instruction that provides the address.

A parameter HG_Size/Block_Width that specifies the number of transfers and controls address sequencing for Line or Block transfers.

A virtual-register identifier that is the dummy target or source for a load-type or store-type instruction.

A value for Dst_Tag from the instruction, for OUTPUT and VOUTPUT instructions.

A strobe to load formatting attributes from data memory 5403 into a GLS hardware register.

A two-bit field to indicate the width of a scalar transfer, for OUTPUT instructions, or to distinguish node Line, SFM Line, and Block output, for VOUTPUT instructions. Vector output can require different address sequencing and dataflow-protocol operation depending on the datatype. This field also encodes Block_End for vector output and Input_Done for scalar and vector output.

A signal to indicate the last line in a circular buffer, for SFM Line input. This is based on the circular-buffer vertical-index parameter, when Pointer=Buffer_Size, and is used to signal Fill for LineArray output.

An input to GLS processor 5402, asserted for a thread that has received an Output_Terminate signal when the thread is activated. This is tested as a GLS processor 5402 Condition Status Register bit, and causes thread termination when asserted.

9.10 Example GLS Unit 1408

The GLS unit 1408 for this example can have any of the following features:

Support up to 8 read and write threads simultaneously;

The OCP connection 1412 can have a 128-bit connection for read and writing data (upto 8-beats for normal read, write thread operation and 16-beat reads for configuration read operation)

A 256-bit 2-beat burst interconnect master and a 256-bit 2-beat burst slave interface for sending and receiving data from nodes/partitions within the processing cluster 1400;

A 32-bit 32-beat (upto) messaging master interface for GLS unit 1408 to send messages to the rest of the processing cluster 1400;

A 32-bit 32-beat (upto) messaging slave interface for GLS unit 1408 to receive messages from the rest of the processing cluter 1400;

An interconnect monitor block to monitor the data activity on the interconnect 814 and signal to the control node when there is no activity so that the control node can power down the sub-system for the processing cluster 1400;

Assign and manage multiple tags on the system interface 5416 (upto 32-tags)

A deinterleaver in the read thread data path;

An interleaver in the write path;

Support upto 8 colors (positions) per line for both read and write thread;

Support a maximum of 8 lines (pixel+data) for read thread;

Support a max of 4 lines (pixel+data) for read thread 9.10.1. Input/Output Example Table 21 below shows the list of pins and input/output (I/O) signals for an example of the GLS unit 1408 instantiated in the processing cluster 1400.

TABLE 21

| Name | Bits | I/O | Connects from/to | Description |
|---|---|---|---|---|
| | | | Global Pins | |
| reset_n | 1 | I | | System Reset signal (active low) for internal core |
| clk | 1 | I | | Control Node global Clock (OCP Clock 400 MHZ) |
| clk_ocp | 1 | I | | Control Node Messaging interface OCP interface Clock (OCP Clock 400 MHZ) |
| intercon_ocp_clken | 1 | I | From (PRCM) ### | Interconnect Clock enable from PRCM |
| MESSAGE_CLK_ENABLE | 1 | I | From control node 1406 | Message Clock enable from control node 1406 |
| MESSAGE_OCP_SLAVE_CLKEN | 1 | I | From PRCM #### | Indication for ½ OCP rate from PRCM<br>1 -> Full-rate<br>0 -> Half-rate |
| MESSAGE_OCP_MASTER_CLKEN | 1 | I | From PRCM#### | Indication for ½ OCP rate from PRCM<br>1 -> Full-rate<br>0 -> Half-rate |
| Ic_no_activity | 1 | O | To control node 1406 | Interconnect no activity indication to control node 1406 (1 -> No activity, 0 -> Activity on the IC) |

TABLE 21-continued

| Name | Bits | I/O | Connects from/to | Description |
|---|---|---|---|---|
| System Master Interface 6023 | | | | |
| ocp_13_mcmd | 3 | O | To OCP connection 1412 | MCMD to OCP connection 1412 |
| ocp_13_maddr | 32 | O | To OCP connection 1412 | MADDR to OCP connection 1412 |
| ocp_13_mreqinfo | 5 | O | To OCP connection 1412 | MREQINFO to OCP connection 1412 |
| ocp_13_mburstlen | 4 | O | To OCP connection 1412 | Burst Length to OCP connection 1412 |
| ocp_13_mdata | 128 | O | To OCP connection 1412 | MDATA to OCP connection 1412 |
| ocp_13_mdata_valid | 1 | O | To OCP connection 1412 | |
| ocp_13_mdata_last | 1 | O | To OCP connection 1412 | |
| ocp_13_mbyteen | 16 | O | To OCP connection 1412 | Byte Enable to OCP connection 1412 |
| ocp_13_mtagid | 5 | O | To OCP connection 1412 | MTAGID to OCP connection 1412 |
| ocp_13_mdatatagid | 5 | O | To OCP connection 1412 | MDATATAGID to OCP connection 1412 |
| ocp_13_scmdaccept | 1 | I | From OCP connection 1412 | CMD Accept from OCP connection 1412 |
| ocp_13_sresp | 2 | I | From OCP connection 1412 | SRESP from OCP connection 1412 |
| ocp_13_sresplast | 1 | I | From OCP connection 1412 | |
| ocp_13_sdataaccept | 1 | I | From OCP connection 1412 | |
| ocp_13_sdata | 128 | I | From OCP connection 1412 | Read Data from OCP connection 1412 |
| ocp_13_stagid | 5 | I | From OCP connection 1412 | Slave TagID from OCP connection 1412 |
| Interconnect Bus Master Interface (Global IO Buffer 5406) | | | | |
| ocp_gls_pixel_mcmd | 3 | O | To Data Interconnect 814 | MCMD to Data Interconnect 814 |
| ocp_gls_pixel_maddr | 18 | O | To Data Interconnect 814 | MADDR to Data Interconnect 814 |
| ocp_gls_pixel_mreqinfo | 32 | O | To Data Interconnect 814 | MREQINFO to Data Interconnect 814 |
| ocp_gls_pixel_mburstlen | 4 | O | To Data Interconnect 814 | Burst Length to Data Interconnect 814 |
| ocp_gls_pixel_mdata | 256 | O | To Data Interconnect 814 | MDATA to Data Interconnect 814 |
| ocp_gls_pixel_mdata_valid | 1 | O | To Data Interconnect 814 | |
| ocp_gls_pixel_mdata_last | 1 | O | To Data Interconnect 814 | |
| ocp_pintercon_gls_scmdaccept | 1 | I | From Data Interconnect 814 | CMD Accept from Data Interconnect 814 |

TABLE 21-continued

| Name | Bits | I/O | Connects from/to | Description |
|---|---|---|---|---|
| ocp_pintercon_gls_sdataaccept | 2 | I | From Data Interconnect 814 | SRESP from Data Interconnect 814 |
| ocp_pintercon_gls_sresp | 1 | I | From Data Interconnect 814 | Unused |
| ocp_pintercon_gls_sresplast | 1 | I | From Data Interconnect 814 | Unused |
| Interconnect Bus Slave Interface (Global IO Buffer 5406) | | | | |
| ocp_pintercon_gls_mcmd | 3 | I | From Data Interconnect 814 | MCMD from Data Interconnect 814 |
| ocp_pintercon_gls_maddr | 18 | I | From Data Interconnect 814 | MADDR from Data Interconnect 814 |
| ocp_pintercon_gls_mreqinfo | 32 | I | From Data Interconnect 814 | MREQINFO from Data Interconnect 814 |
| ocp_pintercon_gls_mburstlen | 4 | I | From Data Interconnect 814 | Burst Length from Data Interconnect 814 |
| ocp_pintercon_gls_mdata | 256 | I | From Data Interconnect 814 | MDATA from Data Interconnect 814 |
| ocp_pintercon_gls_mdata_valid | 1 | I | From Data Interconnect 814 | |
| ocp_pintercon_gls_mdata_last | 1 | I | From Data Interconnect 814 | |
| ocp_gls_pixel_scmdaccept | 1 | O | To Data Interconnect 814 | CMD Accept To Data Interconnect 814 |
| ocp_gls_pixel_sdataaccept | 2 | O | To Data Interconnect 814 | SRESP To Data Interconnect 814 |
| ocp_gls_pixel_sresp | 1 | O | To Data Interconnect 814 | Unused |
| ocp_gls_pixel_sresplast | 1 | O | To Data Interconnect 814 | Unused |
| Slave Messaging Interface 6004 | | | | |
| ocp_mintercon_gls_mcmd | 3 | I | From control node 406 | MCMD from control node 406 |
| ocp_mintercon_gls_maddr | 9 | I | From control node 406 | MADDR from control node 406 |
| ocp_mintercon_gls_mreqinfo | 4 | I | From control node 406 | MREQINFO from control node 406 |
| ocp_mintercon_gls_mburstlen | 6 | I | From control node 406 | Burst Length from control node 406 |
| ocp_mintercon_gls_mdata | 32 | I | From control node 406 | MDATA from control node 406 |
| ocp_mintercon_gls_mdata_valid | 1 | I | From control node 406 | |
| ocp_mintercon_gls_mdata_last | 1 | I | From control node 406 | |
| ocp_mintercon_gls_mcmd | 1 | O | To control node 406 | CMD Accept To control node 406 |
| ocp_mintercon_gls_maddr | 2 | O | To control node 406 | SRESP To control node 406 |
| ocp_mintercon_gls_mreqinfo | 1 | O | To control node 406 | Unused |
| ocp_mintercon_gls_mburstlen | 1 | O | To control node 406 | Unused |
| Master Messaging Interface 6003 | | | | |
| ocp_mintercon_gls_mcmd | 3 | O | To control node 406 | MCMD to control node 406 |
| ocp_mintercon_gls_maddr | 9 | O | To control node 406 | MADDR to control node 406 |
| ocp_mintercon_gls_mreqinfo | 4 | O | To control node 406 | MREQINFO to control node 406 |

TABLE 21-continued

| Name | Bits | I/O | Connects from/to | Description |
|---|---|---|---|---|
| ocp_mintercon_gls_mburstlen | 6 | O | To control node 406 | Burst Length to control node 406 |
| ocp_mintercon_gls_mdata | 32 | O | To control node 406 | MDATA to control node 406 |
| ocp_mintercon_gls_mdata_valid | 1 | O | To control node 406 | |
| ocp_mintercon_gls_mdata_last | 1 | O | To control node 406 | |
| ocp_mintercon_gls_mcmd | 1 | I | From control node 406 | CMD Accept From control node 406 |
| ocp_mintercon_gls_maddr | 2 | I | From control node 406 | SRESP From control node 406 |
| ocp_mintercon_gls_mreqinfo | 1 | I | From control node 406 | Unused |
| ocp_mintercon_gls_mburstlen | 1 | I | From control node 406 | Unused |
| DFT Signals | | | | |
| MESSAGE_CLK_TE | 1 | I | | ICG DFT bypass to messaging clock control |
| CMEM_RAM_TE | 1 | I | | ICG DFT bypass to context RAM clock control |
| IMEM_RAM_TE | 1 | I | | ICG DFT bypass to IMEM clock control |
| DMEM_RAM_TE | 1 | I | | ICG DFT bypass to DMEM clock control |
| SCALAR_RAM_TE | 1 | I | | ICG DFT bypass to Scalar RAM clock control |
| PENDING_PERM_RAM_TE | 1 | I | | ICG DFT bypass to Pending Permission RAM clock control |
| REQUEST_QUEUE_TE | 1 | I | | ICG DFT bypass to Request Queue clock control |
| L3_RAM_TE | 1 | I | | ICG DFT bypass to L3 RAM clock control |
| IC_RAM_TE | 1 | I | | ICG DFT bypass to Interconnect RAM clock control |

9.10.2. Architecture for an Example of the GLS 1408

Figure 144:
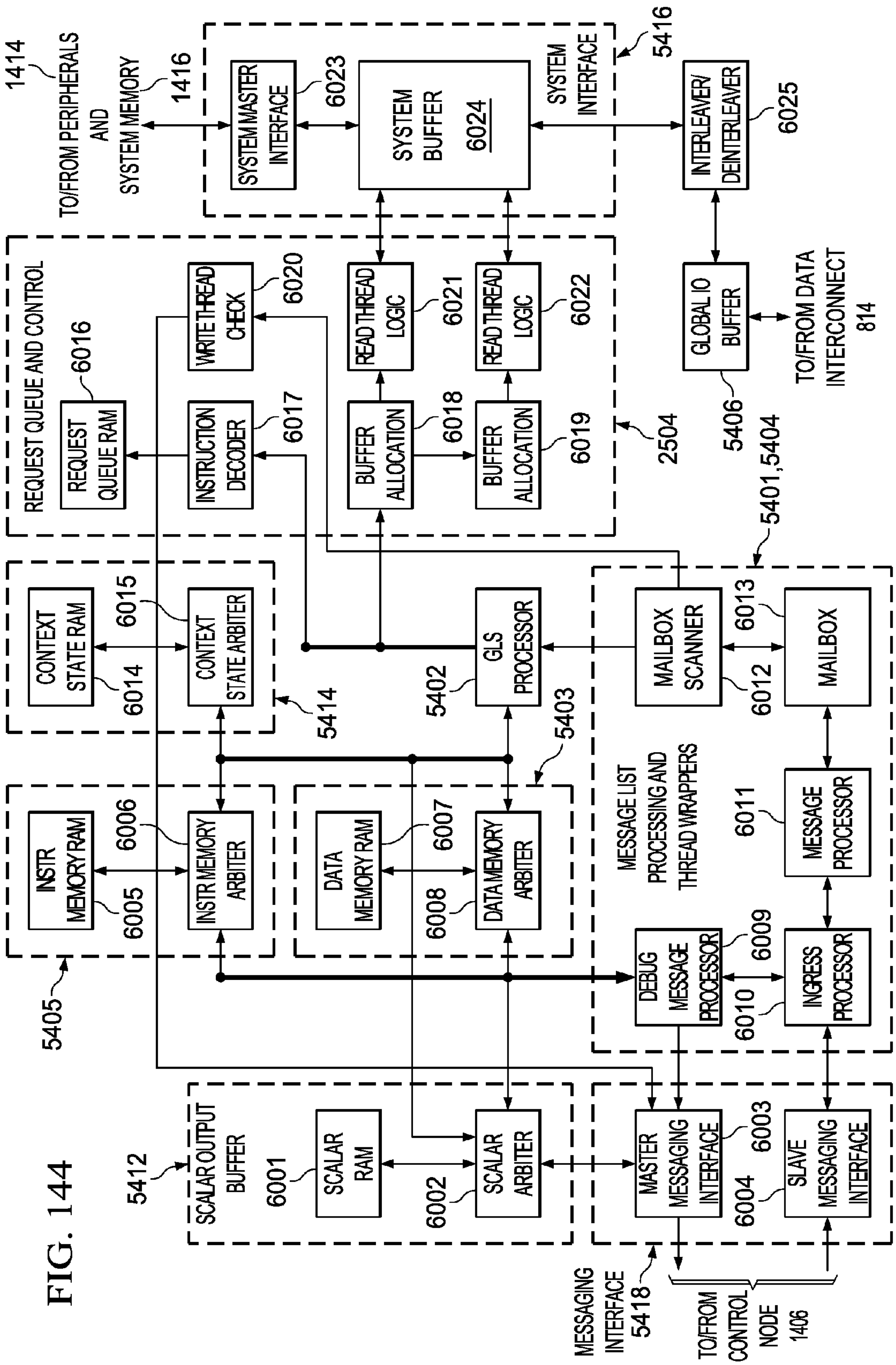
FIG. 144 is a diagram of a more detailed example of the GLS unit.

Turning to FIG. 144, a more detailed example of the GLS unit 1408 can be seen. As shown, the core of the GLS unit 1408 is the GLS processor 5402, which can run various thread programs. The thread programs can be preloaded as instructions at various locations in the instruction memory 5405 (which generally comprises an instruction memory RAM 6005 and an instruction memory arbiter 6006) and can be invoked whenever the threads are activated. A thread/context can be activated whenever a read thread or write thread is scheduled. A thread is scheduled to run via the messages received by the GLS unit 1408 via the messaging interface 5418 (which generally comprises a master messaging interface 6003 and a slave messaging interface 6004).

Turning first to read thread data flow, a read thread is processed by the GLS unit 1408 when data should to be transferred from the OCP connection 1412 on to the interconnect 814. A read thread is scheduled by a Schedule Read thread Message, and once the thread is scheduled, the GLS unit 1408 can trigger the GLS processor 5402 to obtain the parameters (i.e., pixel parameters) for the thread and can access the OCP connection 1412 to fetch the data (i.e., pixel data). Once the data has been fetched, it can be deinterleaved and upsampled according to the configuration information stored (which is received from the GLS processor 5402) and sent to the proper destination via the data interconnect 814. The dataflow is maintained using the Source Notification, Source Permission, and output termination messages until the thread is terminated (as informed by the GLS processor 5402). The scalar data flow is maintained using an update data memory message.

Another data flow is the configuration read thread, the configuration read thread is processed by the GLS unit 1408 when configuration data should be to be transferred from the OCP connection 1412 to either GLS instruction memory 5405 or to other modules within the processing cluster 1400. A configuration read thread is scheduled by a Schedule Configuration Read message, and, once the message has been scheduled, the OCP connection 1412 is accessed to obtain the basic configuration information. The basic configuration information is decoded to obtain the actual configuration data and sent to the proper destination (via the data interconnect 814 if the destination is external module within the processing cluster 1400).

Yet another data flow is the write thread. A write thread is processed by GLS unit 1408 when data should to be transferred from the data interconnect 814 to the OCP connection 1412. A write thread is scheduled by a Schedule Write thread Message, and, once the thread is scheduled, the GLS unit 1408 triggers the GLS processor 5402 to obtain the parameters (i.e., pixel parameters) for the thread. After that the GLS unit 1408 waits for the data (i.e., pixel data) to arrive via the data interconnect 814, and, once the data from data interconnect 814 has been received, it is interleaved and downsampled according to the configuration information stored (received from the GLS processor 5402) and sent to the OCP connection 1412. The dataflow is maintained using the Source Notification, Source Permission, and output termination messages until the thread is terminated (as informed by the GLS processor 5402). The scalar data flow is maintained using the update data memory message.

Now, turning to the organization for the GLS data memory 5403 (which generally comprises a data memory RAM 6007 and a data memory arbiter 6008), this memory 5403 is configured to stores the various variables, temporaries, and register spill/fill values for all resident threads. It can also have an area hidden from the thread code which contains thread context descriptors and destination lists (analogous to destination descriptors in nodes). Specifically, for this example, the first 8 locations of the data memory RAM 6007 are allocated for the context descriptors so as to hold 16 context descriptors (where an example of the general structure for a context descriptor 5502 can be seen in FIG. 124. As shown in FIG. 124, these context descriptors 5502 include a context base address (which is the base address of the destination listentry). The destination list for this example occupies the next 16 locations of the data memory RAM 6007, where an example of the format for a destination listentry can be seen in FIG. 125. Additionally, each context descriptor specifies whether the thread depends on scalar values from other processing nodes (or other threads), and, if so, how many sources of data there are for the scalar data. The remainder of the GLS data memory 5403 for this example holds the thread contexts (which has variable allocation).

Figure 145:
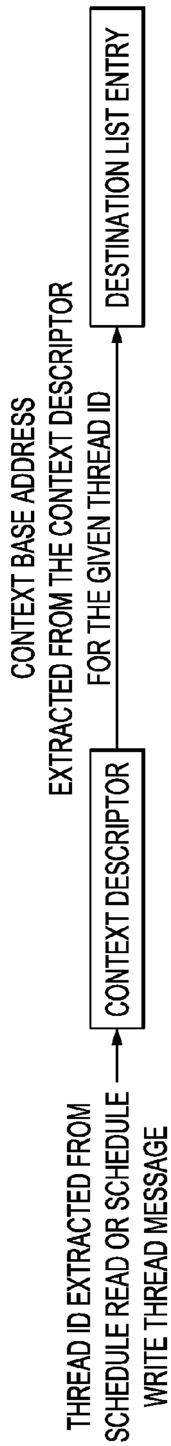
FIG. 145 is a diagram depicting the relation between the structures of the GLS data memory.

The GLS data memory 5403 can be accessed by multiple sources. The multiple sources are internal logic for the GLS unit 1408 (i.e., interfaces to the OCP connection 1412 and data interconnect 814), debug logic for the GLS processor 5402 (which can modify data memory 5403 contents during a debug mode of operation), messaging interface 5418 (both the slave messaging interface 6003 and the master messaging interface 6004), and the GLS processor 5402. The data memory arbiter 6008 is able to arbitrate access to the data memory RAM 6007. As an example (which is shown in FIG. 145) the relation between the structures of the GLS data memory 5403 can be seen.

Turning now to the context save memory 5414 (which generally comprises a context state RAM 6014 and a context state arbiter 6015), this memory 5414 can be used by the GLS processor 5402 to save context information when a context switch is done in the GLS unit 1408. The context memory has a location for each thread (i.e., 16 in total supported). Each context save line is, for example, 609 bits, and an example of the organization of each line is detailed above. The arbiter 6015 arbitrates access to the context state RAM 6014 for accesses from the GLS processor 5402 and debug logic for the GLS processor 5402 (which can modify context same memory RAM 6014) contents during a debug mode of operation). Typically, a context switching occurs whenever a read or write thread is scheduled by the GLS wrapper.

With the instruction memory 5405 (which generally comprises an instruction memory RAM 6005 and an instruction memory arbiter 6006), it can store an instruction for the GLS processor 5402 in every line. Typically, arbiter 6006 can arbitrate access to the instruction memory RAM 6005 for accesses from GLS processor 5402 and debug logic for the GLS processor 5402 (which can modify instruction memory RAM 6005) contents during a debug mode of operation). The instruction memory 5405 is usually initialized as a result of the configuration read thread message, and, once the instruction memory 5405 is initialized, the program can be accessed using the Destination List Base address present in the schedule read thread or write thread. The address in the message is used as the instruction memory 5405 starting address for the thread whenever the context switch occurs.

Turning now to the scalar output buffer 5412 (which generally comprises a scalar RAM 6001 and arbiter 6002), the scalar output buffer 5414 (and the scalar RAM 6001, in particular) stores the scalar data that is written by the GLS processor 5402 and the messaging interface 5418 via a data memory update message, and the arbiter 6002 can arbitrate these sources. As part of the scalar output buffer 5412, there is also associated logic, and the architecture for this scalar logic can be seen in FIG. 146.

Figure 146:
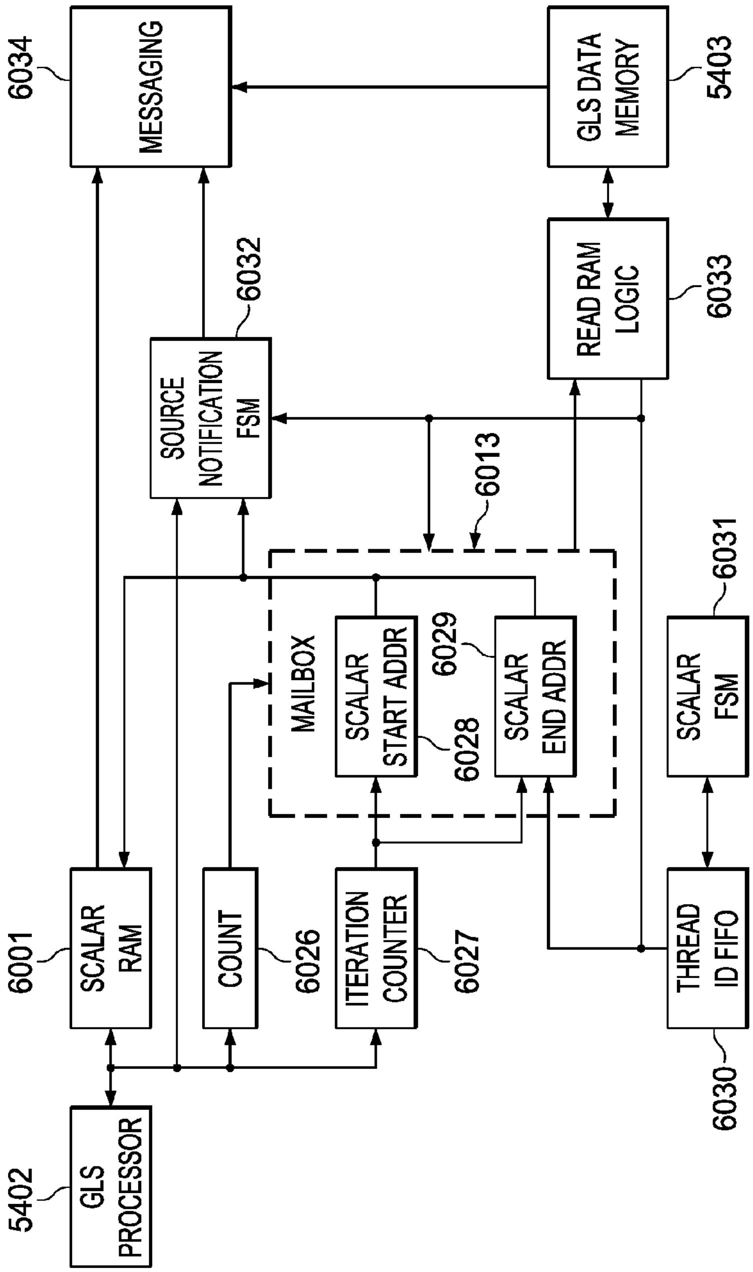
FIG. 146 is a diagram depicting scalar logic for the GLS unit.

In FIG. 146, an example of the steps followed by the scalar logic for read thread can be seen. In this example, there are two parallel processes steps that occur when a read thread is scheduled. In one process, the GLS processor 5402 is triggered to extract the scalar information, and the extracted scalar information is written into the scalar RAM 6001. The scalar information typically includes the data memory line, destination tag, scalar data, and HI and LO information, which are usually written into the RAM 6001 linearly. The scalar start address 6028 and scalar end address 6029 for that thread are also latched into the mailbox 6013 (thought count 2026). Once the GLS processor 5402 completes the write process (as indicated by a context switch), the scalar output buffer 5412 will begin sending a source notification message to all the destinations (as indicated by the stored destination tags) in the scalar RAM 6001. Additionally, the scalar logic includes a scalar iteration counter 6027 (which is maintained for each thread and can be maintained for 8 iterations). The iteration counter 6027 is initialized when the thread moves from scheduled state to execution state for the first time and is incremented every time the GLS processor 5402 is triggered.

In other parallel process for this example (which usually occurs for scalar-only read threads) and when SRC permission is received for a scheduled read thread (in response to previously sent SRC notification by the GLS unit 1408), the mailbox 6013 is updated with information extracted from the message. It should be noted that the source notification message can (for example) be sent by the scalar output buffer 5412 for read thread which has scalar-only transfer enabled. For read threads with both scalar and vector enabled, source notification message may not be sent. The pending permission table can then be read to determine if the DST_TAG sent in the source permission message matches with the one stored for that thread ID (previous source notification message would have written the DST_TAG). Once a match is obtained, the bits of the pending permission table for that thread for the scalar finite state machine (FSM) 6031 are updated. Then, the GLS data memory 5403 is updated with the new destination node and segment ID along with the thread ID. The GLS data memory 5403 is read to obtain the PINCR value from the destination listentry and update it). It is assumed that for scalar transfer the PINCR value sent by the destination will be '0'. Then the thread ID is latched into the Thread ID FIFO 6030 along with the status indication whether it is the left most thread or not.

Now, GLS unit 1408 has permission to transfer scalar data to the destination. The thread FIFO 6030 is read to extract the latched thread ID. The extracted thread ID along with the destination tag is used as index to fetch the proper data from the scalar RAM 6001. Once the data is read out, the destination index present is the data is extracted and matched with the destination tag stored in the request queue. Once a match is obtained, the extracted thread ID is used to index into the mailbox 6013 to fetch the GLS data memory 5403 destination address. The matched DST_TAG is then added to the GLS data memory 5403 destination address to determine the final address to the GLS data memory 5403.

The GLS data memory 5403 is then accessed to fetch the destination listentry. The GLS unit 1408 sends an update GLS data memory 5403 message to the destination node (identified by the node id, seg ID extracted from the GLS data memory 5403) with data from the scalar RAM 6001, which is repeated until the entire data for the iteration is sent. Once the end of the data for the thread is reached, the GLS unit 1408 moves on to the next thread ID (if that thread has been pushed into the FIFO as active) as well as indicate to the global interconnect logic that end of the thread has been reached. This update sequence can be seen in FIG. 147, and the scalar data is written by the GLS processor 5402 using the OUTPUT instruction.

The scalar data contained in the execution is either from the program itself or fetched from a peripheral 1414 via OCP connection 1412 or from other blocks in the processing cluster 1400 via update data memory update message if scalar dependency is enabled. When the scalar is to be fetched from OCP connection 1412 by the GLS processor 5402, and it would send an address (for example) from 0→1M on its data memory address lines. The GLS unit 1408 translates that access to the OCP connection 1412 master read access (i.e., burst of 1-word). Once the GLS unit 1408 reads the word, it passes it to the GLS processor 5402 (i.e., 32 bits; which 32-bits depends on the address sent by the GLS processor 5402) which sends the data to the scalar RAM 6001.

In case the scalar data should be received from another processing cluster 1400 module, the scalar dependency bit will be set in the context descriptor for that thread. When the input dependency bit is set, the number of sources that would be sending the scalar data is also set in the same descriptor. Once the GLS unit 1408 receives the scalar data from all the sources and stored in the GLS data memory 5403, the scalar dependency is met. Once the dependency is met, the GLS processor 5402 is triggered. At this point, the GLS processor 5402 will the read the stored data and write to the scalar RAM 6001 using the OUTPUT instruction (normally for read threads).

The GLS processor 5402 may also choose to write the data (or any data) to the OCP connection 1412. When the data should to be written to the OCP connection 1412 by the GLS processor 1408, and it would send (for example) an address from 0→1M on its GLS data memory 5403 address lines. The GLS unit 1408 translates that access to OCP connection master write access (i.e., burst of 1-word) and write the (for example) 32 bits to the OCp connection 1412.

Figure 147:
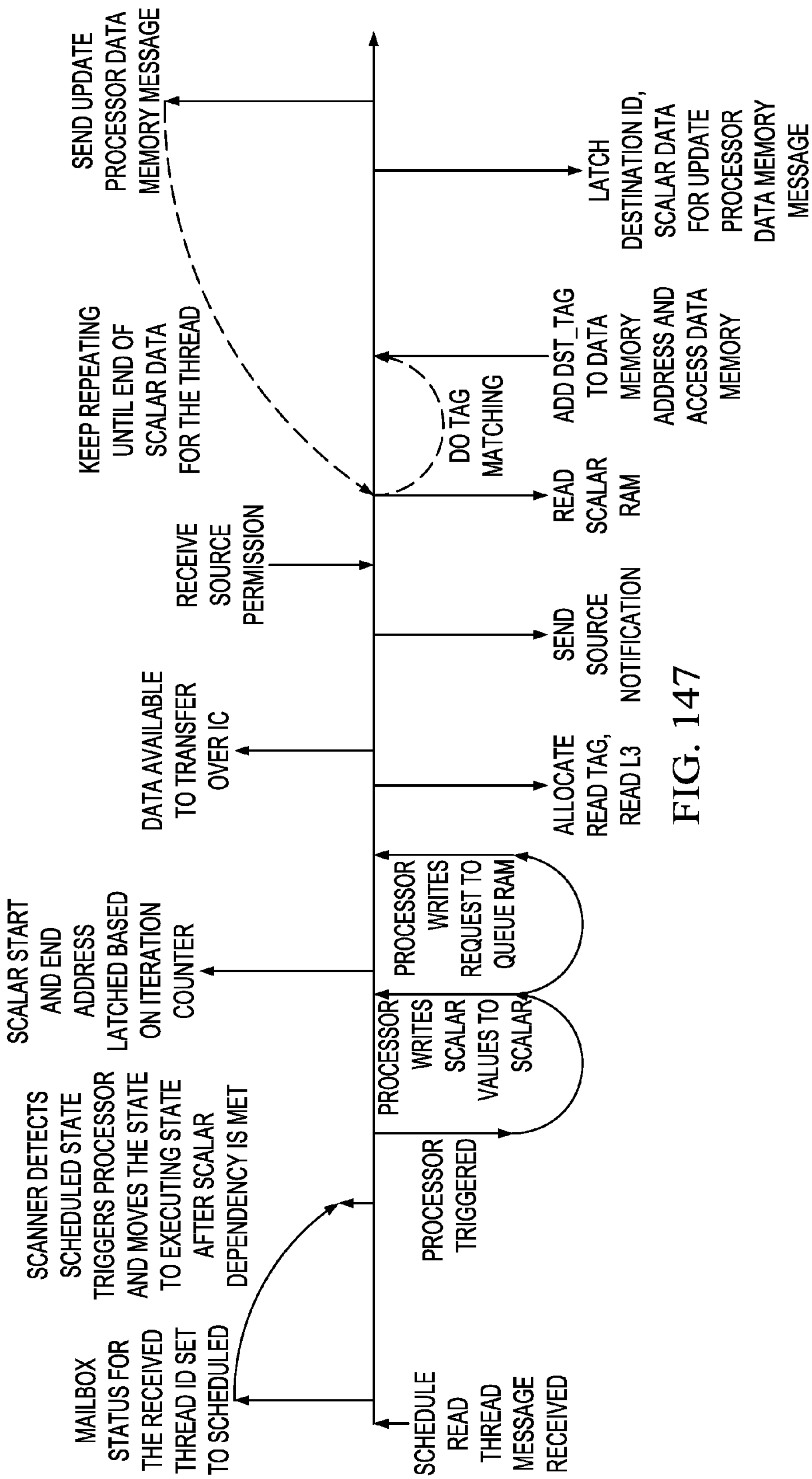
FIG. 147 is an example of an update sequence for the GLS unit.

The mailbox 6013 in the GLS unit 1408 can be used to handle information flow between the messaging, scanner, and the data path. When a schedule read thread, schedule config read thread or a schedule write thread message is received by the GLS unit 1408, the values extracted from the message are stored in the mailbox 6013. Then the corresponding thread is put in scheduled state (for schedule read thread or schedule write thread) so that the scanner can move it to execution state to trigger the GLS processor 5402. The mailbox 6013 also latches values from the source notification message (for write threads), source permission message (for read threads) to be used by the GLS unit 1408. Interactions among various internal blocks of the GLS unit 1408 update the mailbox 6007 at various points in time (as shown in FIGS. 146 and 147 for example).

The ingress message processor 6010 handles the messages received from the control node 1406, and Table 22 shows the list of messages received by the GLS unit 1408.

The GLS can be accessed in the processing cluster 1400 subsystem with Seg_ID, Node_ID as {3,1} respectively.

TABLE 22

| Message Type | Purpose |
|---|---|
| Initialization of Data Memory 5403 | Used to initialize the context descriptor area for Data Memory 5403 as well as destination list entry area |
| Schedule Read Thread | Used to schedule a read thread for the context. |
| Schedule Write Thread | Used to schedule a write thread for the context. |
| Schedule Configuration Read Thread | Schedules a configuration read to INIT the instruction memory of various instruction memories in the processing cluster 1400 subsystem as well as control node action list |
| Source Notification | SN is sent to a node for starting a data transfer during read thread |
| Source Permission | SP is sent to the requesting node for receiving data during write thread |
| Output Termination | Sent by Sources to indicate no more data from the source |
| Halt | Debug message to halt the GLS processor 5402. Will result in HALT ACK message. |
| Step N Instructions | Debug message to step the GLS processor 5402 for N-clock cycles (GLS processor 5402 executes one instruction per clock) |
| Resume | Debug message to resume normal execution after a HALT message was received |
| Node State Read | Debug message to read the GLS instruction memory 5405. Will result in Node state read response |
| Node State Write | Debug message to write to the GLS instruction memory 5405 |

Figure 148:
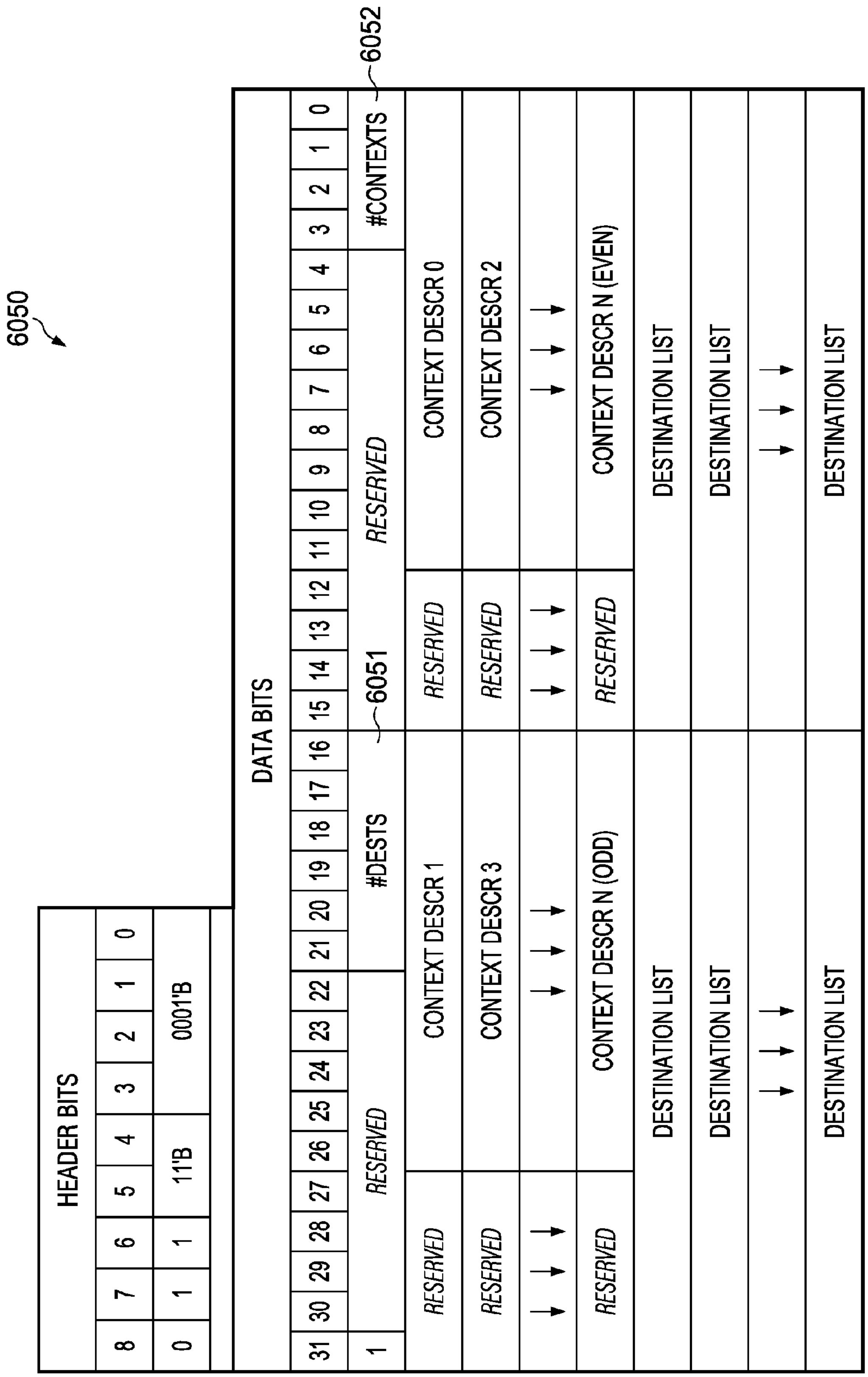
FIG. 148 is an example format for an initialization message.

Turning to FIG. 148, an example of an initialization message 6050 for data memory 5403 (or Data Memory Init Message 6050) can be seen. When this message is received by the GLS unit 1408, the #Dests (which provides the number of destination list entires contained in the message in field 6051) and #Contexts (which provides the number of context descriptors contained in the message in field 6052) are initially extracted from the message. The #Contexts can then be used as a count to extract the GLS processor 5402 context Descriptors from the message and write to location 0→(#Contexts/2) in GLS data memory 5403. The #Dests can also be used as a count to extract the Destination listentry from the message and write to location in GLS data memory 5403 starting from 8→(#Dests/2). Odd boundaries can also be handled properly.

Figure 150:
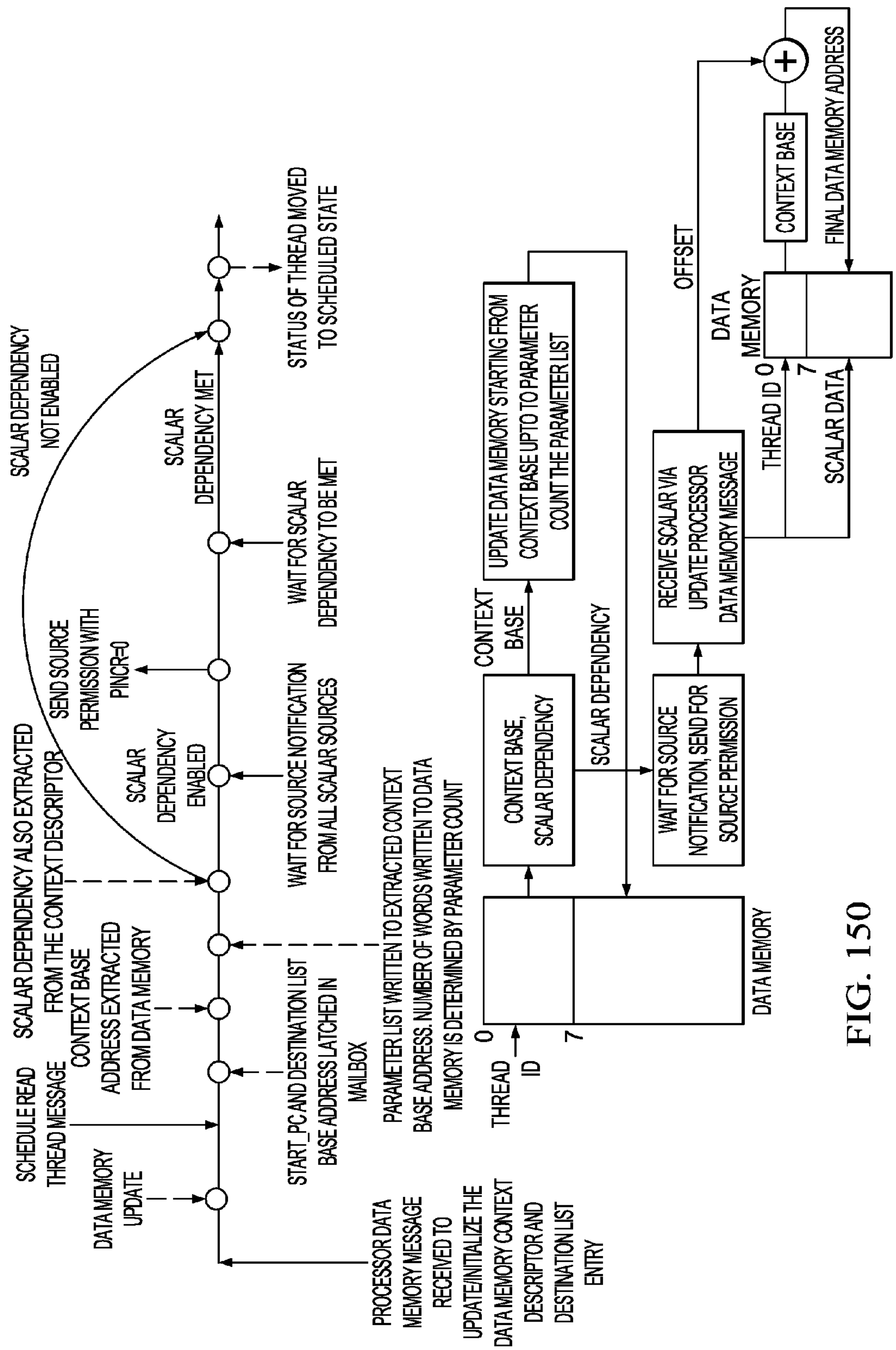

In FIGS. 149 and 150, a schedule read thread message 6060 and response to the schedule read thread message can be seen. When a schedule read thread message 6060 (which is indicated by 00'b in field 6062) is received by the control node 1406, the START_PC (from field 6065) is extracted from the message and latched in the mailbox 6013 for the "Thread ID" (from field 6063) given in the same message. The latched START_PC value will be used later as the instruction memory base address for the GLS processor 5403 during context switching when the thread starts execution. The Destination List Base (from field 6066) can then be stored in the mailbox 6013 for the "Thread ID" to be used later when the thread starts executing. The context descriptor corresponding to the thread ID (location 0→7) can then be extracted from the data memory 5403. This forms the base address starting from which the Parameter List values (in the fields 6061) embedded in the message are written, and scalar dependency parameter is also latched. The Parameter List values can then be written to the data memory 5403 (starting from the Context Base address), and the number of words to be written is given by the Parameter Count (in field 6064)

provided in the message. If scalar dependency is enabled, it means the thread should receive scalar data from other modules within processing cluster 1400 before the GLS processor 5402 can be initiated. If scalar dependency is enabled, then the sources that should send the scalar data will send a source notification message. In response to that, the GLS unit 1408 responds with source permission message with PINCR=0 (indicating scalar transfer), and the source will begin sending scalar data using the update message for the data memory 5403. End of scalar data from a source is indicated via set_valid set in the message (in the REQ-INFO), and, as each source completes it scalar transfer (as indicated by set_valid), the internal source counter is incremented. When the internal counter value equals the #Inp in the context descriptor, the scalar dependency has been met. If scalar dependency is not enabled, the GLS unit 1408 does not wait for any scalar data, and the thread can be then moved to scheduled state in the mailbox 6013 for the scanner to move it to execution state.

Figure 152:
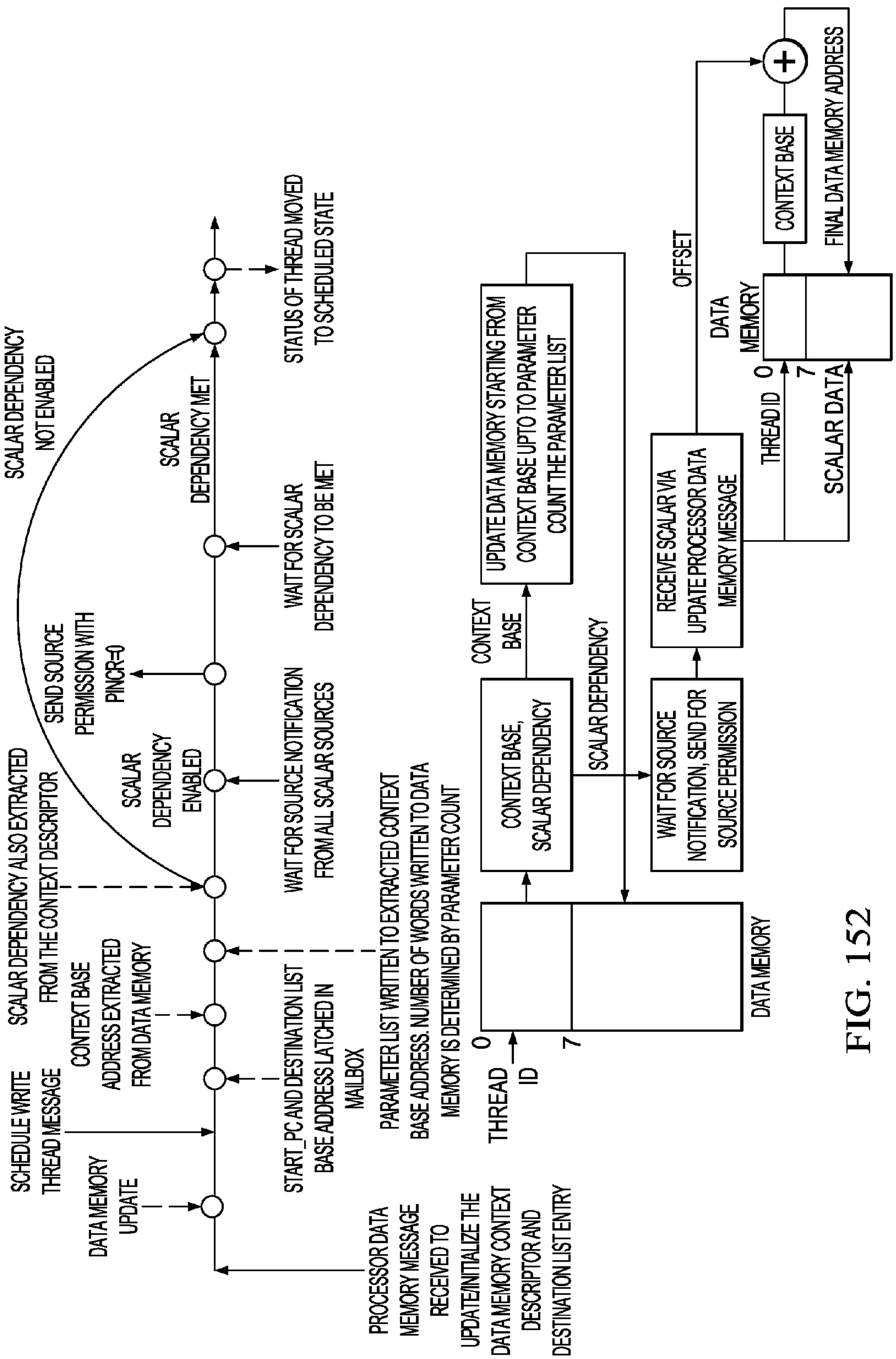

Turning to FIGS. 151 and 152, a schedule write thread message 6067 and response to the schedule read thread message can be seen. When a schedule read thread message 6067 (which is indicated by 01'b in field 6069) is received by the control node 1406, the START_PC is extracted from the message from field 6072 and latched in the mailbox for the "Thread ID" given in the same message from field 6070, and the latched START_PC value will be used later as the instruction memory base address for the GLS processor 5402 during context switching when the thread starts execution. The Destination List Base can then be stored in the mailbox 6013 for the "Thread ID" to be used later when the thread starts executing. The context descriptor corresponding to the thread ID (location 0→7) can then extracted from the data memory 5403 so as to form the base address starting from which the Parameter List values embedded in the message are written. Scalar dependency parameter can also be latched, and the Parameter List values can be written to the data memory 5403 (starting from the Context Base address). The number of words to be written is given by the Parameter Count (from field 6071) provided in the message. If scalar dependency is enabled, it means the thread should receive scalar data from other modules within processing cluster 1400 before the GLS processor 5402 can be initiated. If scalar dependency is enabled, then the sources that should send the scalar data will send a source notification message. In response to that, the GLS unit 1408 responds with source permission message with PINCR=0 (indicating scalar transfer). The source should then start sending scalar data using the update message for data memory 5403. End of scalar data from a source is indicated via set_valid set in the message (in the REQINFO), and, as each source completes it scalar transfer (as indicated by set_valid), the internal source counter is incremented. When the internal counter value equals the #Inp in the context descriptor, the scalar dependency has been met. If scalar dependency is not enabled, the GLS unit 1408 does not wait for any scalar data, and the thread can be then moved to scheduled state in the mailbox 6013 for the scanner to move it to execution state.

Figure 154:
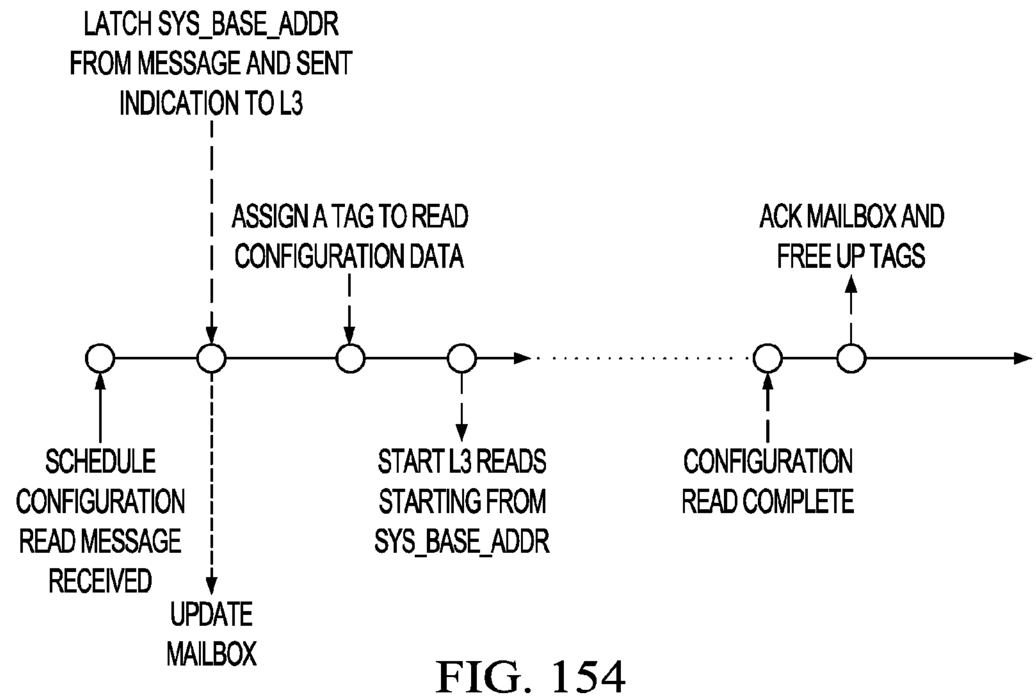

In FIGS. 153 and 154, a schedule configuration read message 6073 and response to the schedule configuration read message 6073 can be seen. The schedule configuration read message 6073 (which is indicated by 11'b in field 6074 and which includes a Thread_ID in field 7075) is sent to indicate to the GLS unit 1408 to start configuring the processing cluster 1400. When this message is received it assumed the entire processing cluster 1400 sub-system is in idle state. When a schedule configuration read message 6073 is received by GLS, the system base address is latched and passed to the OCP connection 1412, and the OCP connection 1412 can indicate that a configuration read thread message 6060 has been received. A tag is assigned to fetch the initial configuration information from the OCP connection 1412 (namely from system memory 1416) starting from SYSTEM_BASE_ADDRESS. The configuration information is decoded one by one to complete the data transfer, and, once data transfer is complete and ACK is sent to mailbox 601, the thread as well as the tag(s) allocated.

Figure 156:
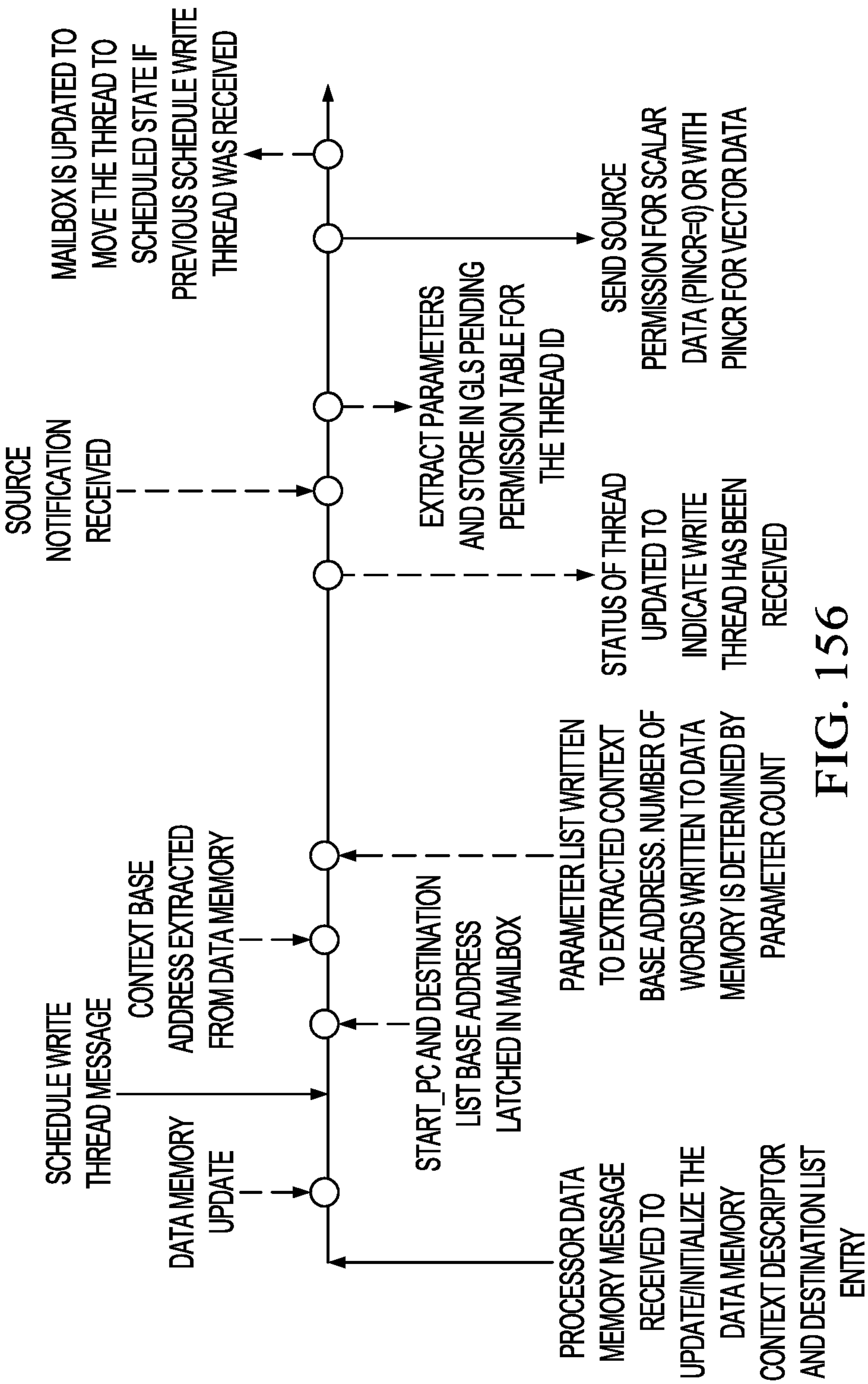

Turning to FIGS. 155 and 156, a source notification message 6076 and response to the source notification message 6076 can be seen. The source notification message 6076 received by the GLS unit 1408 is part of the write thread data protocol. The source notification message 6076 can also be received in case scalar dependency is enabled indicating that the GLS unit 1408 should receive scalar data prior to receiving pixel data. When the source notification is received by the GLS unit 1408, the SrCtx#ThID, SrSeg, SrNode, Src_Tag, and Rt fields are extracted and stored in the mailbox 6013 for the context pointed by the DstCtx#ThID. The Src_Tag is used as an index to store the SrCtx#ThID, Dst_Tag, SrSeg, SrNode information in the GLS pending permission table. If scalar dependency is enabled, then pending state machine states for the received SRC_TAG of the thread is checked. SRC permission can then be sent; if scalar data should to be received first, PINCR is set to '0' to indicate to the sender scalar data should be sent. Once the entire scalar is received (if scalar dependency is enabled), the thread is moved to scheduled state (if the thread had already received a schedule write thread message).

Figure 158:
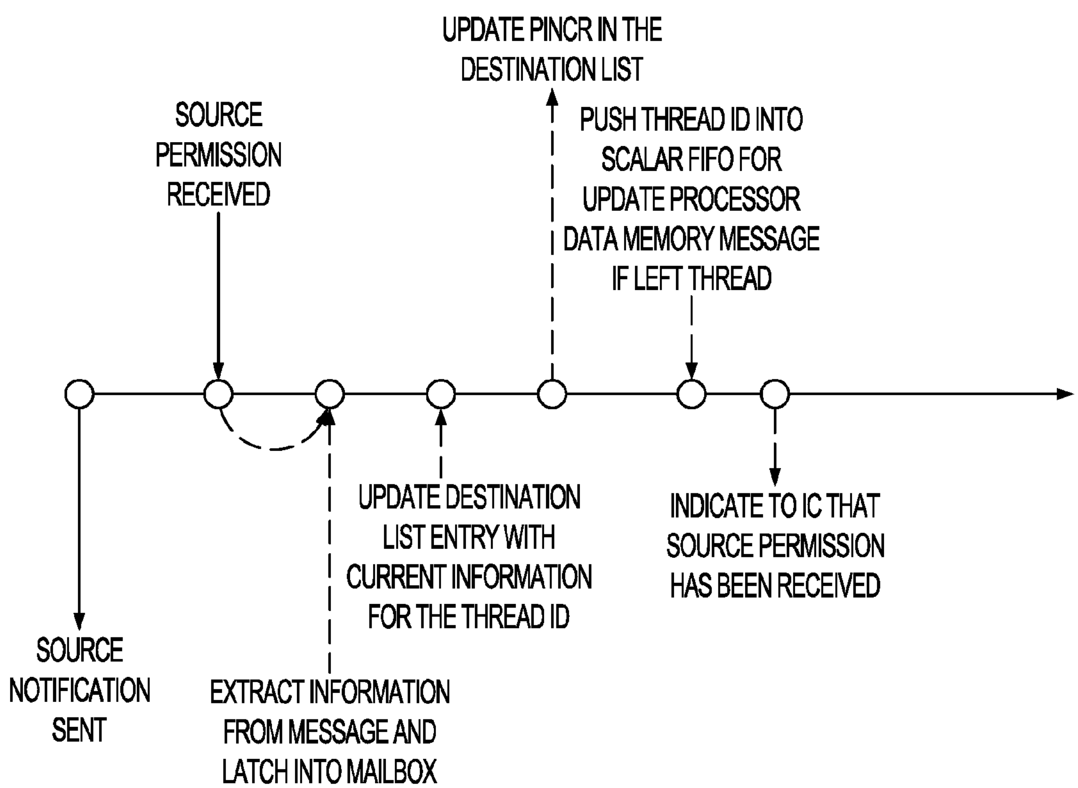

In FIGS. 157 and 158, a source permission message 6077 and response to the source permission message 6077 can be seen. The source permission message 6077 is usually received by the GLS unit 1408 for read threads in response to the source notification message 6076 sent by the GLS unit 1408. When the source permission message 6077 is received by GLS unit 1408 and when source permission message 6076 is received (due to a previous source notification message) sent by the GLS unit 1408, the mailbox 6013 can be updated with the information from the source permission message 6077. The data memory 5403 can then be updated (next destination listentry is updated with information from the message for the thread ID+DST_TAG), and, once the update of the data memory 5403 is complete, the PINCR update from the message is also used to update the PINCR value in the destinationentry. If scalar transfer is enabled for the iteration, then the permission information is pushed into the scalar thread ID FIFO for subsequent actions. Interconnect 814 is sent an indication that source permission message 6077 has been received to transfer data. For scalar transfer, the source permission message should be received with PINCR=0 (indicating scalar transfer).

Turning to FIG. 159, the output termination message 6078 can be seen. The output termination message can be received by the GLS unit 1408 as a part of write thread operation or read thread. When this message is sent by the source, it means the source has no more data to send to the GLS unit 1408 as the source thread has terminated the source context. The output termination message normally results in thread termination message from the GLS unit 1408.

Figures 160, 161:
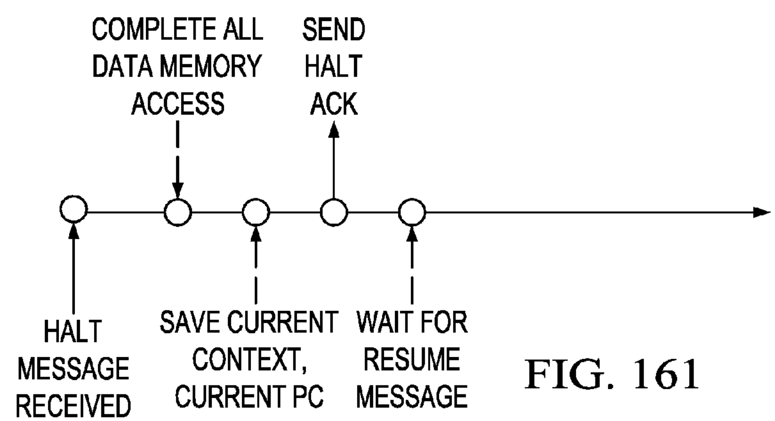
FIGS. 160 and 161 are an example of the format for a HALT message and response to the HALT message.

In FIGS. 160 and 161, a HALT message 6079 and response to the HALT message 6079 can be seen. The HALT message 6079 is part of the debug message for the GLS processor 5402 received by the GLS unit 1408. When a HALT message is received the GLS unit 1408, the GLS processor 5402 is halted by gating the instruction memory data ready message. This prevents the GLS processor 5402 from fetching an instruction, thereby halting the GLS processor 5402. Once the GLS processor 5402 is halted, a corresponding HALT_ACK is sent by the GLS unit 1408. When a HALT message 607 is received by the GLS unit 1408, a check to see if there are any pending accesses to data memory 5403 is performed, and if there are accesses, the accesses are allowed to complete. Once there are no pending accesses, the instruction memory ready message to the GLS processor 5403 is gated, and the GLS processor 5403 context is saved in the context memory. The current PC value and current context are also stored to be sent as part of HALT ACK message. Once context save is done, HALT ACK message is sent, and, once HALT ACK is sent, the GLS unit 5403 moves into a wait state gating instruction memory ready message until RESUME message 6081 (described below) is received.

Figures 162, 163:
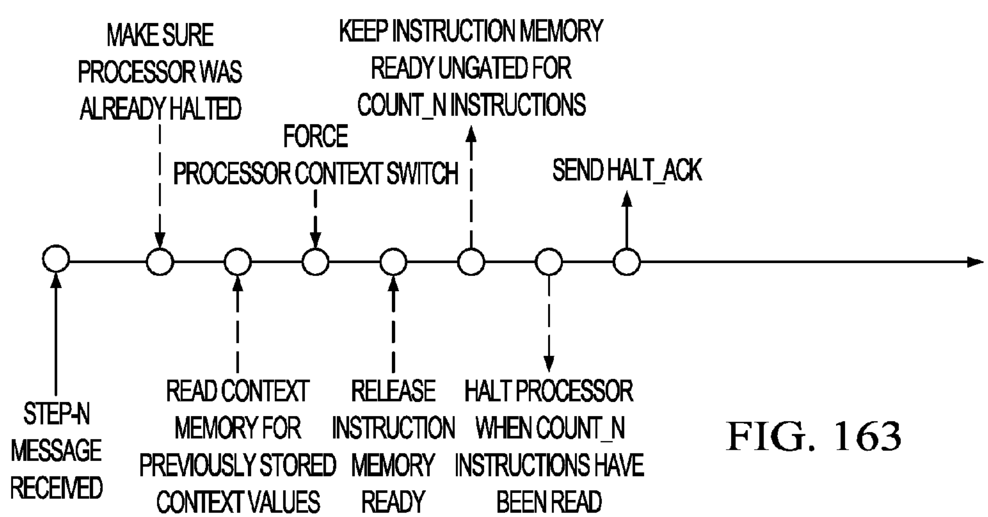
FIGS. 162 and 163 are an example of the format for the STEP-N instruction and response to the STEP-N message.

Turning to FIGS. 162 and 163, the STEP-N instruction 6080 and response to the STEP-N message can be seen. The STEP-N message 6080 is usually used in conjunction with HALT message 6079, and the assumption is that the HALT message 6079 should precede STEP-N instruction 6080. The STEP-N instruction 6080 allows the GLS processor 5403 to execute N instructions from the point where it was halted. When a STEP-N instruction 6080 is received by the GLS unit 1408, the GLS processor 5402 is checked to ensure that it is halted, but, if it is not halted, the STEP-N message 6080 is ignored. If the GLS processor 5402 has been halted, the context memory for the previously halted context can be read, and a context switch on the GLS processor 5402 with the saved context ID and read context data can be forced. The GLS unit 1408 then waits for the GLS processor 5402 to indicate context has been restored (indirectly by asserting the cmem_wdata_valid). The instruction memory ready message is ungated so that the GLS processor 5402 can read instructions, and the number of instructions read by the GLS processor 5402 can be counted. If the number of instructions read is equal to COUNT_N, then the GLS processor 5402 is haled, and a HALT_ACK is sent with new PC value and context ID.

Figures 164, 165:
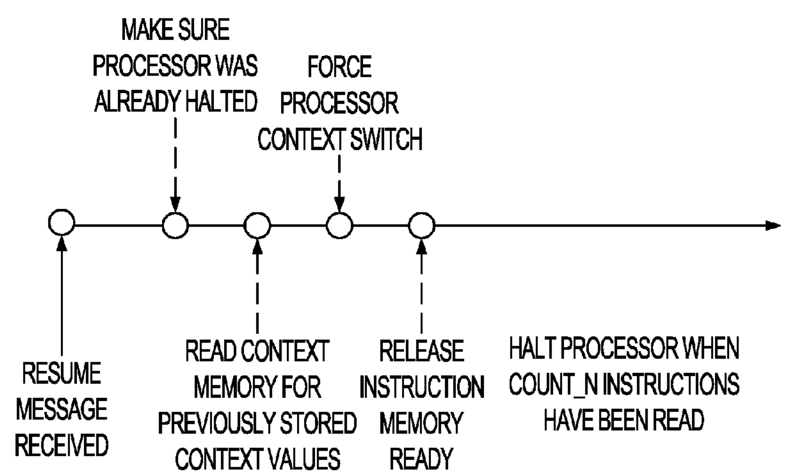
FIGS. 164 and 165 are an example of the format for a RESUME instruction and response to the RESUME instruction.

Turning to FIGS. 164 and 165, a RESUME instruction 6081 and response to the RESUME instruction 6081 can be seen. The RESUME instruction 6081 "unhalts" the previously halted GLS processor 5402. When the RESUME instruction 6081 is received by the GLS unit 1408, the GLS processor 5402 is checked to ensure that it is halted, but, if it is not halted, the RESUME instruction is ignored. If the GLS processor 5402 is halted, the context memory for the previously halted context can be read, and a context switch on the GLS processor 5402 with the saved context ID and read context data can be forced. The GLS unit 1408 then waits for the GLS processor 5402 to indicate context has been restored (indirectly by asserting the cmem_wdata_valid). The instruction memory ready message is ungated so that the GLS processor 5402 can read instructions.

Turning to FIG. 166, a node state read message 6082 can be seen. The node state read message 6082 is sent to the GLS unit 1408 to read the instruction memory 5405. Upon reception of the message a node state read response message 6082 is sent by the GLS unit 1408 with the contents of the instruction memory 5405. When a node state read message 6082 is received by the GLS unit 1408, the tgt field is extracted and checked to see if it is 2'b00. If it is not 2'b00, the message is ignored. If the target is the instruction memory 5405, the selector filed is used as a starting address to access the instruction memory 5405, and the node state read response message is formed with data count field is set to "30" (beat−0). The data beats following the first beat are sent as (1) Beat−1: Lower 32-bit of base address+0; (2) Beat−2: Upper 8 bits of base address+0; (3) Beat−3: Lower 32-bit of base address+1; and (4) Beat−4: Upper 8 bits of base address+1.

Turning to FIG. 167, a node state write message 6083 can be seen. The node state write 6083 is sent by the debugger to the GLS unit 1408 to write to the instruction memory 5405. The data_count specifies the number of data words in the data filed of the message. For example, 0x1E is the maximum that can be used because 0x1E corresponds to a full 40-bit instruction memory data. The selector provides the start address of the instruction memory 5405. As an example, if the selector is even, then: (1) $1^{st}$ 32-bit data is written to lower 32-bits of the instruction memory 5405 at location {selector+0}; (2) $2^{nd}$ 32-bit data lower 8-bits is written to upper 8-bits of the instruction memory 5405 at location {selector+0}; (3) $3^{rd}$ 32-bit data is written to lower 32-bits of the instruction memory 5405 at location {selector+1}; and (4) $4^{th}$ 32-bit data lower 8-bits is written to upper 8-bits of the instruction memory 5405 at location {selector+1}. As another example, if the selector is odd, then: (1) $1^{st}$ 32-bit data lower 8-bits is written to upper 8-bits of the instruction memory 5405 at location {selector+1}; (2) $2^{nd}$ 32-bit data is written to lower 32-bits of the instruction memory 5405 at location {selector+1}; (3) $3^{rd}$ 32-bit data lower 8-bits is written to upper 8-bits of the instruction memory 5405 at location {selector+1}; and (4) $4^{th}$ 32-bit data is written to lower 32-bits of the instruction memory 5405 at location {selector+1}.

Turning to FIG. 168, an enable task/branch trace message 6084 can be seen. This message 6084 can be used to enable task/branch trace in the GLS unit 1408. When this message 6084 is received the task/branch tracing is enabled in the GLS unit 1408, and it results in task/branch trace vector message.

Turning to FIG. 169 a set breakpoint/tracepoint message 6085 can be seen. This message 6085 can be used to set breakpoint/tracepoint in the GLS processor 5402. When this message 6085 is received by the GLS unit 1408, bits 26:25 (for example) are extracted and written as debug address for the GLS processor 5402, and {1, bits[27:0]} (for example) are written as debug data to the GLS processor 5402.

Turning to FIG. 170, a clear breakpoint/tracepoint message 6086 can be seen. This message 6086 can be used to clear breakpoint/tracepoint in the GLS processor 5402. When this message 6086 is received by the GLS unit 1408, bits 26:25 (for example) are extracted and written as debug address for the GLS processor 5402, and {3'b000, 1'b0, bits[27:0]} (for example) are written as debug data to the GLS processor 5402.

Turning to FIG. 171, a read data memory message 6087 can be seen. This message 6087 is sent by the debugger to read the context save memory 5414 or data memory 5403. When this message 6087 is received by the GLS unit 1408, the Context# and CX bits are extracted from the message, and if CX bit is set to '1', debugger intends to read (1) the context memory 5414, (2) data memory context descriptor, (3) rest of the data memory 5403, or (4) the debug registers for the GLS processor 5402. The context state area can be mapped as follows:

Offset 0→0x16→Context save memory location pointed to by Context # field in the message. The 609-bits are broken into 32-bits and sent to the debugger as data memory read response message according to the DMEM_OFFSET set in the message Offset 0x17→0x1e→ data memory address range 0x0→0x7 (context descriptor area)

Offset 0x1f 0x37→Register updates for the GLS processor 5402 via debug port for the GLS processor 5402

0x38 and Beyond: data memory 5403. Final data memory address=Context Base address extracted for Context#+(DMEM_OFFSET-0x38)

If CX bit is set to '0', then the data memory context descriptor area pointed to by Context # is read to obtain the base address. The base address is then added to the offset provided in the message to get the final address. The final address is then used to index the data memory 5403 to obtain the data The 32-bit data is then sent as data memory 5403 read response message to the debugger by the GLS unit 1408.

Turning to FIG. 172, an update data memory message 6088 can be seen. This message 6088 is used to update the context save area, registers for the GLS processor 5402, or data memory 5403 (when used by the debugger or to write the scalar data received from nodes to the data memory 5403 during read/write thread operation). If the message 6088 is sent by the node (for read or write thread), the message contains the scalar data. In this case the data is written to the data memory 5403 that uses the same procedure used for debugger write when CX=0. The number of set_valids received in the REQINFO is counted and updated in the GLS pending permissions table. This lets the GLS unit 1408 sync up the scalar data with the vector data it receives. When sent by the debugger, the GLS unit 1408 ensures that the GLS processor 5402 is halted, and the Context # and CX bits are extracted from the message if CX bit is set to '1', debugger intends to read (1) the context memory 5414, (2) data memory context descriptor, (3) rest of the data memory 5403, or (4) the debug registers for the GLS processor 5402. The context state area can be mapped as follows:

Offset 0→0x16→Context save memory location pointed to by Context # field in the message. The 609-bits are broken into 32-bits and sent to the context save memory. The HI, LO bits are ignored.

Offset 0x17→0x1e→ data memory address range 0x0→0x7 (context descriptor area).

Offset 0x1f→0x37→Register updates for the GLS processor 5402 via debug port for the GLS processor 5402. The HI, LO bits are ignored.

0x38 and Beyond: data memory 5403. Final data memory address=Context Base address extracted for Context#+(DMEM_OFFSET-0x38).

The final address is then used to write the data memory 5403

Depending upon the HI, LO setting the upper and lower halfwords are written to the data memory 5403

If CX bit is set to '0', then the data memory context descriptor area pointed to by Context # is read to obtain the base address. The base address is then added to the offset provided in the message to get the final address, and the final address is then used to write the data memory 5403. Depending upon the HI, LO setting the upper and lower halfwords are written to the data memory 5403.

Turning to FIG. 173, messages related to egress message processing. The egress message processor (which may be part of message list processing 5401 and/or interface 5418) can handle, create, and send all the messages from the GLS unit 1408 to the control node 1406. FIG. 173 shows the messages that are received by the GLS unit 1408.

Turning to FIG. 174, node instruction memory initialization message 6089 can be seen. The node instruction memory initialization message 6089 is sent as part of the initialization routine to initialize the instruction memory (i.e., 1401-1) of the selected destination. A node instruction memory initialization message is sent to the shared function-memory 1410 or the nodes in the partition via the control node 1408 when there is instruction memory data to be sent (when configuration read thread message is scheduled in the GLS unit 1408). The node instruction memory initialization message 6089 can also be used by the control node 1406 to turn on power-domains. This message 6089 is sent by the GLS unit 1408 when it has determined that there is instruction memory initialization data to be sent to the selected {Seg_ID, Node_ID} upon reading the data in the system memory 1416. The start_offset field maybe used by the destination as starting address, from which the initialization data should to be stored.

Turning to FIGS. 175 to 180, thread termination 6090, HALT_ACK message 6091, node state read response 6092, task/branch trace vector 6093, break/tracepoint match 9064, and data memory read response messages 6095 can be seen. The thread termination message 6090 is sent from the GLS unit 1408 whenever a write/read thread is terminated. HALT_ACK message 6091 is sent to HALT and STEP-N messages 6079 and 6080 received by the control node 1406. The node state read response message 6092 is sent with the instruction memory data in response to the node state read message 6092 received by the GLS unit 1408. Tracing message 6093 is sent by the GLS unit 1408 when max trace vector is reached or when a new program is scheduled in the GLS unit 1408. The trace vector has a free form, and the filed encoding contained in the trace vector is as follows: (1) 2'b11: Branch Taken; (2) 2'b10: Branch not taken; (3) 6'b01nnnn: Task Switch to context n; and (4) 2'b00: End of vector. When this message 6093 is received by the GLS unit 1408, it starts trapping various events to construct the trace vector. The constructed trace message 6093 is sent by the GLS unit 1408 to the control node 1406. Breakpoint/tracepoint match 6094 message is sent by the GLS unit 1408 when a previous set breakpoint/tracepoint was reached by the GLS processor 5402. When the previously set breakpoint/tracepoint is reached by the GLS processor 5402, the parameters used to construct the match message 6094 are sent by the GLS processor 5402. The GLS unit 1408 latches it and sends it. The data memory read response message 6095 is sent in response to data memory read message discussed above.

9.10.3. Read Thread Control and Data Flow for an Example of the GLS 1408

The read thread is generally responsible for several functions in the GLS unit 1408, namely: (1) scheduling a read thread when the message is received by the GLS unit 1408; (2) sending source notification to destinations based on information stored in the data memory 5403; (3) managing data transmission to various nodes/shared function-memory 1410 based on PINCR sent by the destinations in the source permission message; (4) reading data from peripherals (i.e., system memory 1416) and send it to various destinations using the global interconnect master interface; (5) de-interleaving (and/or upsampling) the image data; and (6) sending scalar data to destinations as required. The data flow protocol for a read thread is initiated when the GLS unit 1408 receives a schedule read thread message. The following steps are performed within the GLS unit 1408 upon receipt of the message:

(1) Once a schedule read thread message is received the actions that take place within the GLS are described above. Once the actions have been completed the GLS processor 5402 is "triggered" or initiated.

(2) The GLS processor 5402 is triggered (context switch) with the context base address extracted from the read thread message.

i. In response to the context switch, the GLS processor 5402 executes the program which corresponds to the read thread. The program writes the following information into the Parameter RAM.

ii. The GLS processor 5402 also writes the scalar RAM 6001 for the thread into the scalar RAM 6001.

(3) tag id for the thread for OCP connection 1412 read transfer is assigned (4) The GLS unit 1408 starts preparing to send source notification message.

i. The Left indication is set (in the mailbox 6013) to indicate that the current thread is the left most thread (as we just triggered the GLS processor 5402).

ii. The destination list base latched in the mailbox 6013 (obtained from the schedule read thread message for the thread ID) is obtained and the corresponding data memory address is read.

iii. The data returned is examined.

i. If the initialentry in the accessed destination list is GLS unit 1408 and the initial context is multicast, the GLS unit 1408 fetches the thread ID of the previously scheduled multicast thread (as pointed by the initial thread ID in the destination list), stores the current data memory address accesses (so that it can come to it later) and branches off to the new data memory address stored in the mailbox 6013 for the multicast thread. The new thread ID is also stored to be used for sending source notification.

ii. If the initialentry is not a multicast then a source notification is sent as follows:

1. If the Left indication is set (will be the case as GLS processor 5402 was just triggered), the INITIALentry in the destination list is used to construct the source notification message. The destination tag is picked from the parameter RAM. The SRC_TAG is picked up from the destination listentry.

2. If a multicast was scheduled then source notification message is sent to all the destinations obtained from the destination listentry (which will be sequentially accessed after each SN is sent). In this case the CURRENTentry in the destination is used to construct the source notification message. The destination tag is picked from the parameter RAM. The SRC_TAG is picked up from the destination listentry. This process is repeated until the BK bit='1' in the destination listentry. When BK=1 is encountered, the GLS unit 1408 reverts back to the original data memory location from where it branched off.

iii. For all the source notification message messages sent, the RT bit in the source notification message is set to '0'. The mailbox 6013 is also updated to indicate the last source notification message was sent for the thread (will be used later when source permission message is received)

Figure 181:
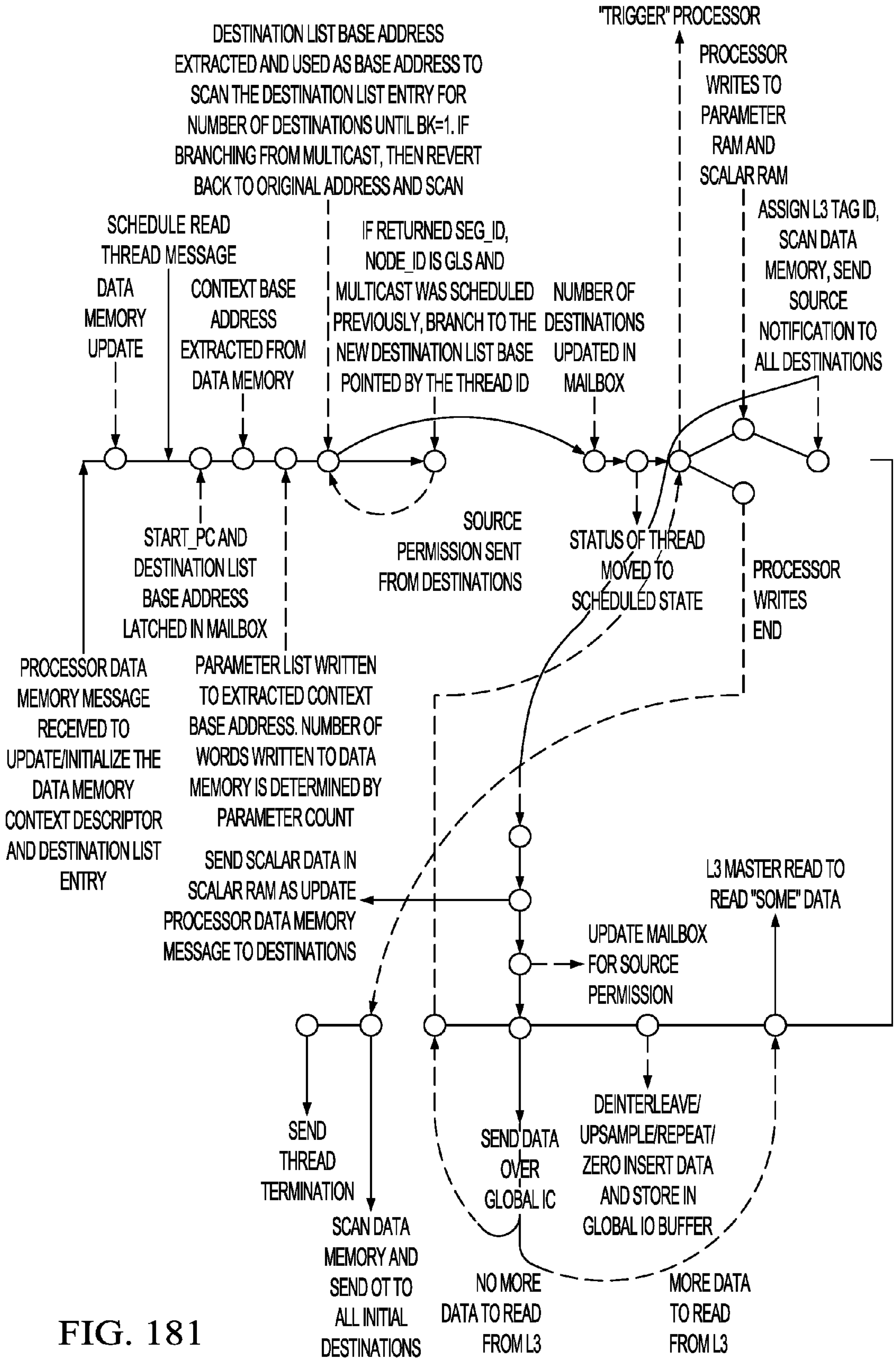

(5) Two parallel events now occur:

i. Event-1: The OCP (over OCP connection 1412) read starts with the assigned tag.

i. The Parameter RAM is read to obtain the parameters required for the OCP read operation and OCP read starts (8-burst read to read 8 128-bits from the peripheral). The data returned is stored in the ping-pong IO buffer 6024.

ii. From the buffer 6024 the data is passed to the deinterleaver while new data is fetched from the peripheral. At the same time as when data is passed to the deinterleaver 6025, the Parameter RAM is read out for the obtaining the image format information, data memory offsets and passed onto the deinterleaver 2025 (the tagID used to read data from OCP connection 1412 is reverse mapped to obtain the thread ID and that is used to access the parameter RAM)

iii. The deinterleaved data is stored in the Global IO buffer 5406 for transmission.

ii. Event-2: The GLS unit 1408 starts receiving source permission messages from the destinations that received source notification message from the GLS unit 1408.

iii. At this point the GLS unit 1408 checks to see if the current thread ID has received source permission message from the destination. If the source permission message has indeed been received, the data is sent on the global interconnect 814.

iv. New source notification is sent is sent. The source permission message indication in the mailbox 6013 is cleared for the thread. Before the source notification message is sent, the HG_SIZE is compared with the PERMISSION_COUNT present in the data memory 5403. If the permission count is 1 less than the max_count (as indicated by the HG_SIZE), then the SN is sent with RT=1. Otherwise the source notification message is sent with RT=0 v. When buffer 6024 is free to read more data more data is read as long as it may be desired the desired (see, e.g., FIG. 181).

(6) Output termination message is initiated by the GLS processor 5402 upon execution of END instruction. The GLS unit 1408 captures this event and starts sending OT to the first destination in each destination listentry. This is done by scanning the data memory 5403 with the thread ID. There are two cases to consider here. If the initialentry in the GLS unit 1408 and the thread ID is multicast type, then the data memory 5403 is scanned until BK=1. For everyentry (initialentry) in the list (until BK=1), an OT is sent. If the initialentry is not multicast, then the OT is sent to the destination pointed to by the initialentry in the destination list.

(7) When all OTs are sent and data has been transferred, a thread termination is sent. The mailbox state is also move to "STOPPED" state for that thread ID.

9.10.3.1. Instructions for Read Threads

For read threads used with the GLS processor 5402, there are several instructions associated with the read threads: LDSYS, VOUTPUT, OUTPUT, END, and TASKSW.

Looking first to the LDSYS instruction, this is a load instruction. When the GLS processor 5402 executes the LDSYS instruction, the GLS processor 5402 asserts the following signals on it ports or boundry pins: (1) gls_is_ldsys is set to '1'; (2) gls_vreg (4-bits); (3) gls_sys_addr; and (4) gls_posn (3-bits) When the gls_is_ldsys='1', the GLS unit 1408 will latch gls_vreg, and it will use it to cross-reference with the VOUTPUT instruction executed later. The GLS unit 1408 latches the gls_sys_addr to the image address of PARAMETER RAM as pointed to by the previously stored Context ID (from mailbox 6013). The format bits are obtained from the data lines of data memory 5403 when the GLS processor 5402 reads the data memory 5403 in response to the LDSYS instruction and stored in the PARAMETER RAM also. The POSN is also captured and stored to be used for storing DMEM_OFFSET that emerge from the VOUTPUT instruction.

Now turning to VOUTPUT instruction, this is a vector output instruction. When the GLS processor 5403 executes the VOUTPUT instruction, it asserts the following output signals on its bountry pins: (1) risc_is_voutput is set to '1'; (2) risc_output_wd (4-bits) drives the VREG to cross-ref with VREG obtained from LDSYS instruction; (3) risc_output_wa (18-bits) provides data memory offset information; (4) risc_output_pa (6-bits) extract DST tag from bit 2:0; and (5) risc_vip_size (8-bits) provides an 8-bit HG_SIZE value. The VREG information stored as a result of LDSYS execution is cross-referenced with VREG from VOUTPUT. If they match then the DMEM_OFFSET information is written into the Parameter RAM. The POSN obtained from LDSYS instruction is used as index to store the DMEM_OFFSET. It should be noted that there is no relation between the VREG value and the 64-pair present in the PARAMETER RAM. The GLS unit 1408 stores the 64-bit pair based on the time-order in which the VREG emerges from the GLS processor 5402.

The OUTPUT instruction is used by the GLS processor 5402 to load scalar information to the scalar RAM 6001. When the OUTPUT instruction is executed the GLS processor 5402 asserts the following signals: (1) risc_is_output is set to '1'; (2) risc_output_wd (32-bits)→Scalar data to be written to the scalar RAM 6001; (3) risc_output_wa (11-bits)→Lower 9-bits are the data memory offset that should to written to the scalar RAM 6001; (4) risc_output_pa with bit 2:0→DST_TAG to be latched into the scalar RAM, bits 4:3 as '11' (Hi='1', Lo='1'), '10' (Hi='0', Lo='1'), or '00' (Hi='0', Lo='0'), and bit 5 set_to 'valid'; and (5) risc_store_disable. The risc_store_disable is sent by the GLS processor 5402 to be transmitted along with the scalar data to the destination (via MREQINFO). This bit informs the destination not to store the scalar data but process the set_valid sent normally. The set_valid bit is also sent as part of MREQINFO to indicate the last scalar data for the thread.

The END instruction from GLS processor 5402 is asserted in when the GLS processor 5402 determines that there is no more data to be read from the OCP connection 1412. When the END instruction is encountered, the GLS processor 5402 will assert the risc_is_end signal on its interface. This indicates to the GLS to start sending OT messages to all the destinations for the context, followed by thread termination.

The TASKSW instruction is a task switch instruction, and the TASKSW instruction asserts the risc_is_task_sw signal on the GLS processor interface. This signal is captured and it serves as the BK bit for the parameter RAM. It also serves as set_valid signal for the GLS logic to indicate that the last word for the PARAMETER RAM has been written by the GLS processor.

9.10.3.2. Deinterleaver, Up-Sampling and Repetition/Zero Insertion

Figures 180, 183:
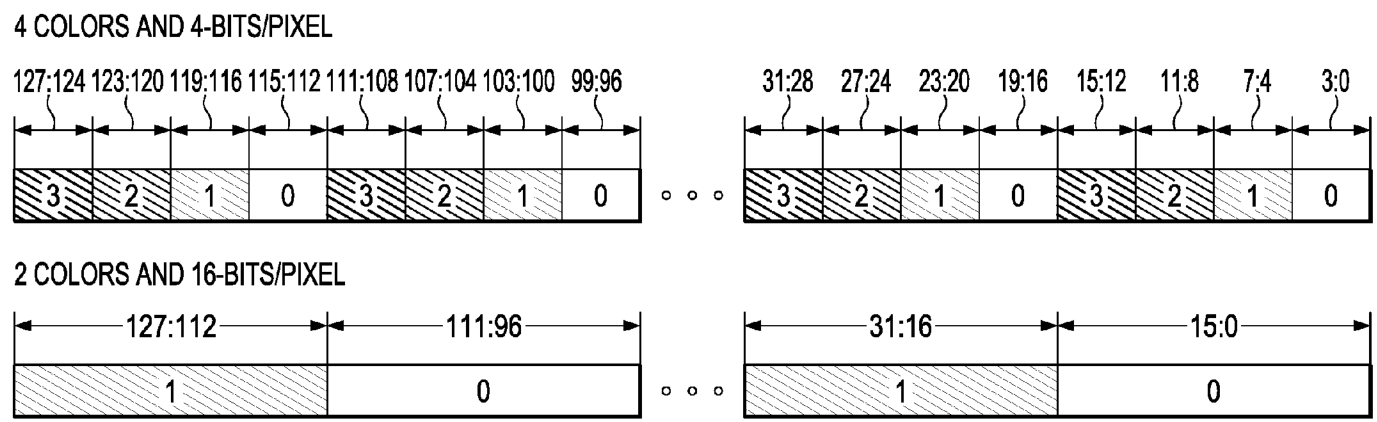
Figure 184:
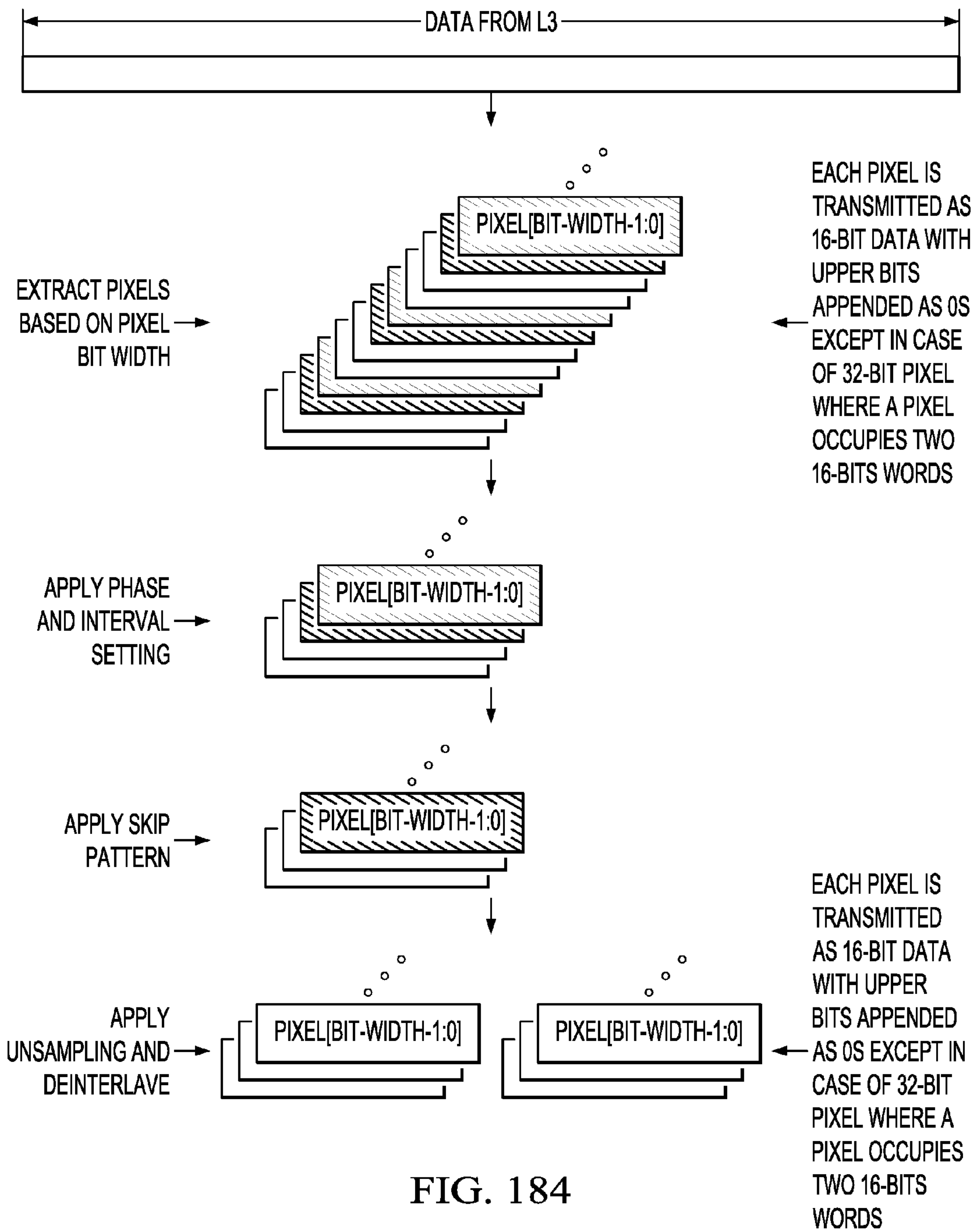

When the data from the OCP connection 1412 (i.e., from system memory 1416 or peripherals 1414) is passed to interconnect 814, it should to be deinterleaved, upsampled, repeated, and/or zero-inserted. After these operations are performed, the data should ready to be transmitted to the destinations via interconnect 814. The data in the peripheral (i.e., over OCP connection 1412) is fetched (for example) 128-bits at a time. From these 128-bit words, pixels (for example) should to be extracted, and the actions mentioned above (deinterleaved, upsampled, repeated, and/or zero-inserted) should to be performed. The format and type operation that should to be performed by the block is provided in the format information stored in the parameter RAM can be seen in FIG. 182. The number of colors provides the GLS unit 1408 with information on number of interleaved color components present in the 128-bit data read. The bit-width dictates how the pixels are extracted from the 128-bit word obtained via OCP connection 1412. Both these settings dictate how the data is arranged in the 128-bit data extracted. FIGS. 183 and 184 shows an example of how the 128-bit data is organized for a few cases and the steps involved in extraction of data and sending them over on the interconnect 814.

Figure 185:
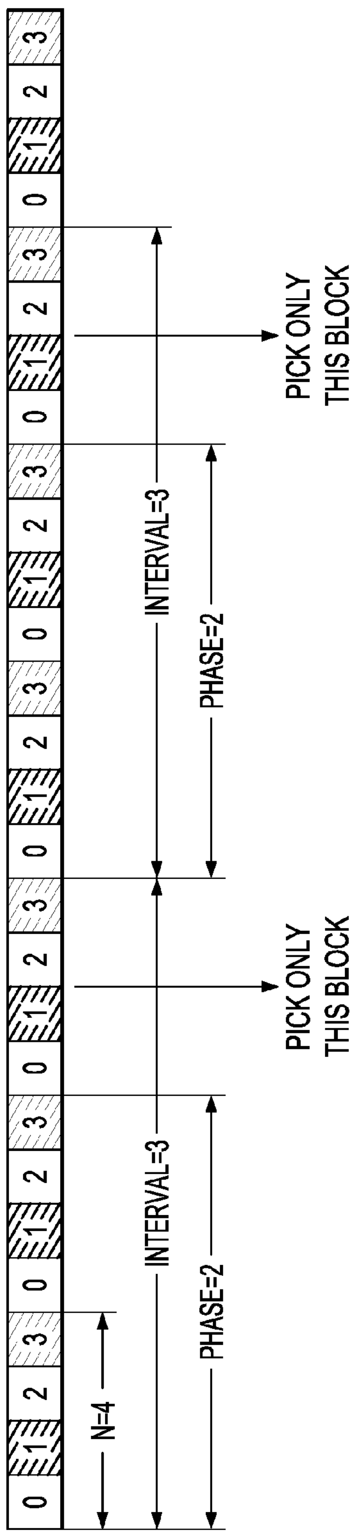
Figure 186:
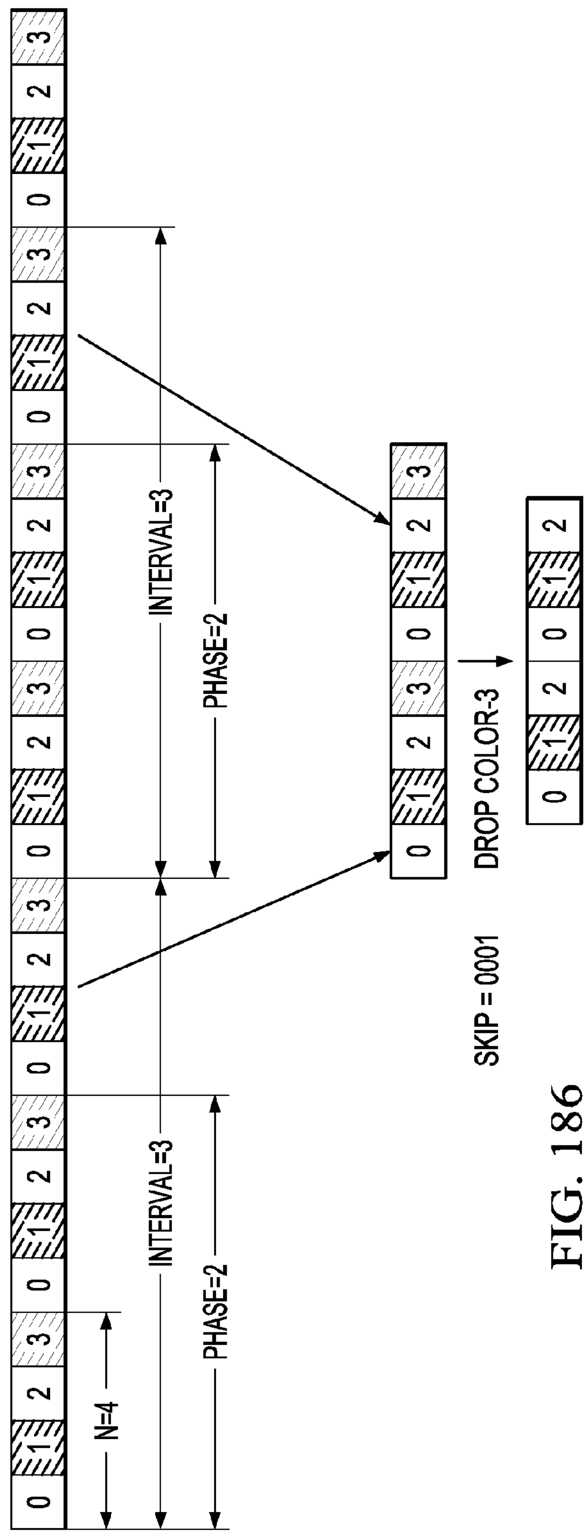
Figure 187:
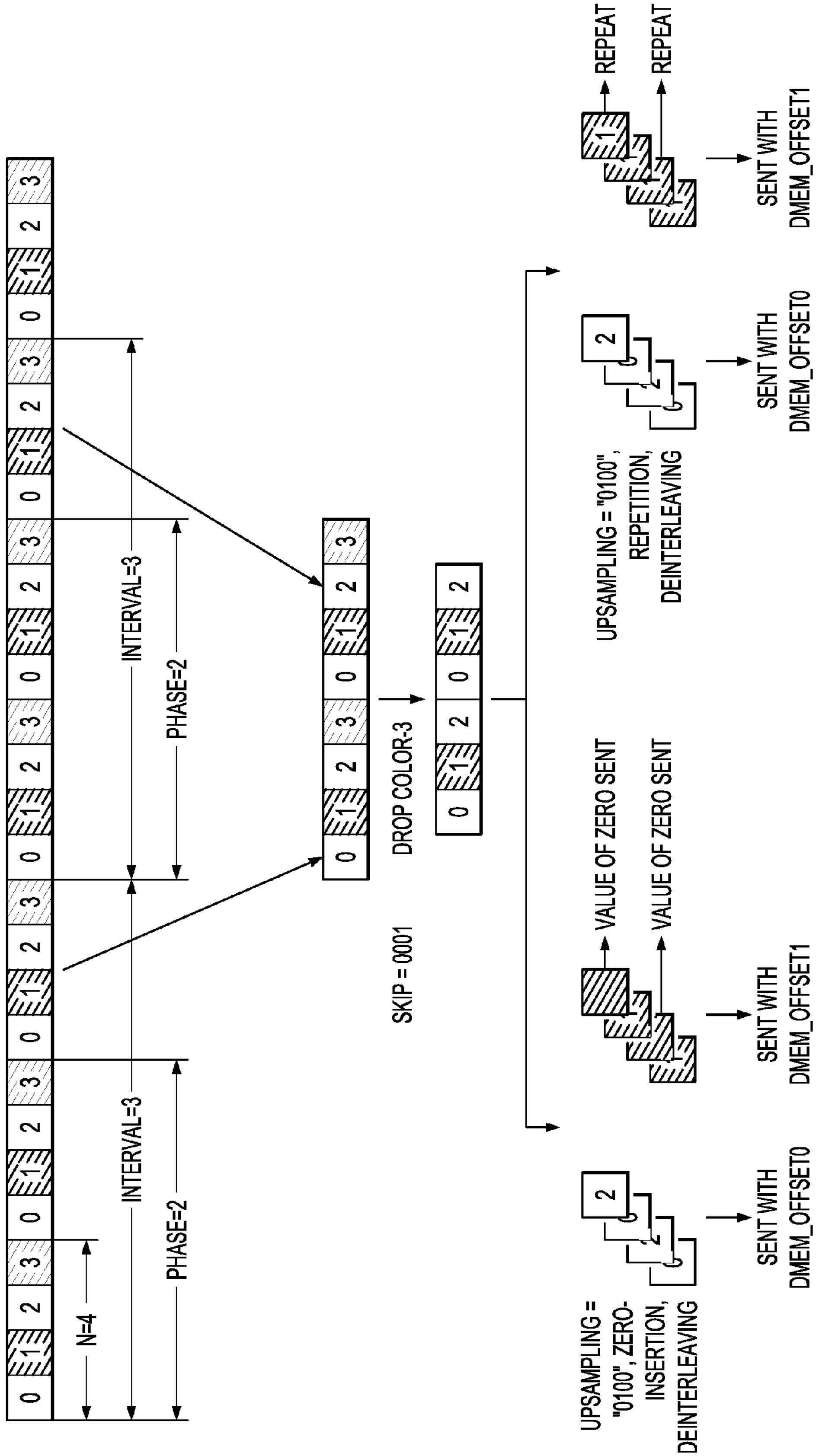

The first step performed by the GLS unit 1408 is to extract the pixels according to their bit-widths irrespective of the colors. Once that is done, the pixels are collected as per phase and interval settings in the format. The interval setting in the format allows the GLS unit 1408 to select blocks of N pixels (N is number of colors) and apply the phase setting to it. FIG. 185 shows the interval and phase setting relation. After picking up the appropriate pixels, the skip pattern is applied to drop the selected colors to obtain the final colors desired to apply upsampling as shown in FIG. 186. Now the GLS unit 1408 has the actual colors that should to be upsampled (as well as repeated or zero inserted) and deinterleaved. Upsampling, zero-insertion/repetition and deinterleaving generally occurs at the same time. Upsampling along with zero-insertion/repetition is generally responsible for arranging the color components with respect to the data memory offset (or vice-versa). FIG. 187 shows the interaction of these settings and resulting final output.

9.10.4. Write Thread Control and Data Flow for an Example of the GLS 1408

In the GLS unit 1408, the write thread is generally responsible for (1) scheduling a write thread when the message is received by the GLS unit 1408; (2) source notification reception; (3) responding with a source permission message for the source notification message sent by a node (i.e., node 808-*i*); (4) sending PINCR value according to the buffer space available in the GLS unit 1408 for receiving data; (5) update GLS pending permission table and manage the table; (6) receive data from the nodes on the data interconnect slave interface and store it in the interconnect IO RAM (i.e., in buffer 5406); interleaving (and/or down-sampling) the received data and sent to the peripheral (i.e., system memory 1416) based on the information from the parameter RAM; and (7) synchronizing and updating data memory 5403 with scalar data received from nodes (if enabled). The following steps are performed within the GLS unit 1408 upon the reception of the schedule write thread message:

- Once the initial actions within the GLS unit 1408 (as described above) have been completed the thread is kept in suspended state until reception of source notification message for the thread which received the schedule write thread message.
- Once the actions in response to the source notification message (as described above) have been completed, the GLS unit 1408 extracts and stores in the GLS pending permissions table (which is indexed using the DST Context_ID, SRC_TAG) the SRC CTX#ThID, Sr_Seg, Node_ID, DST_TAG before responding with source permission message for the source notification message received.

Figure 188:
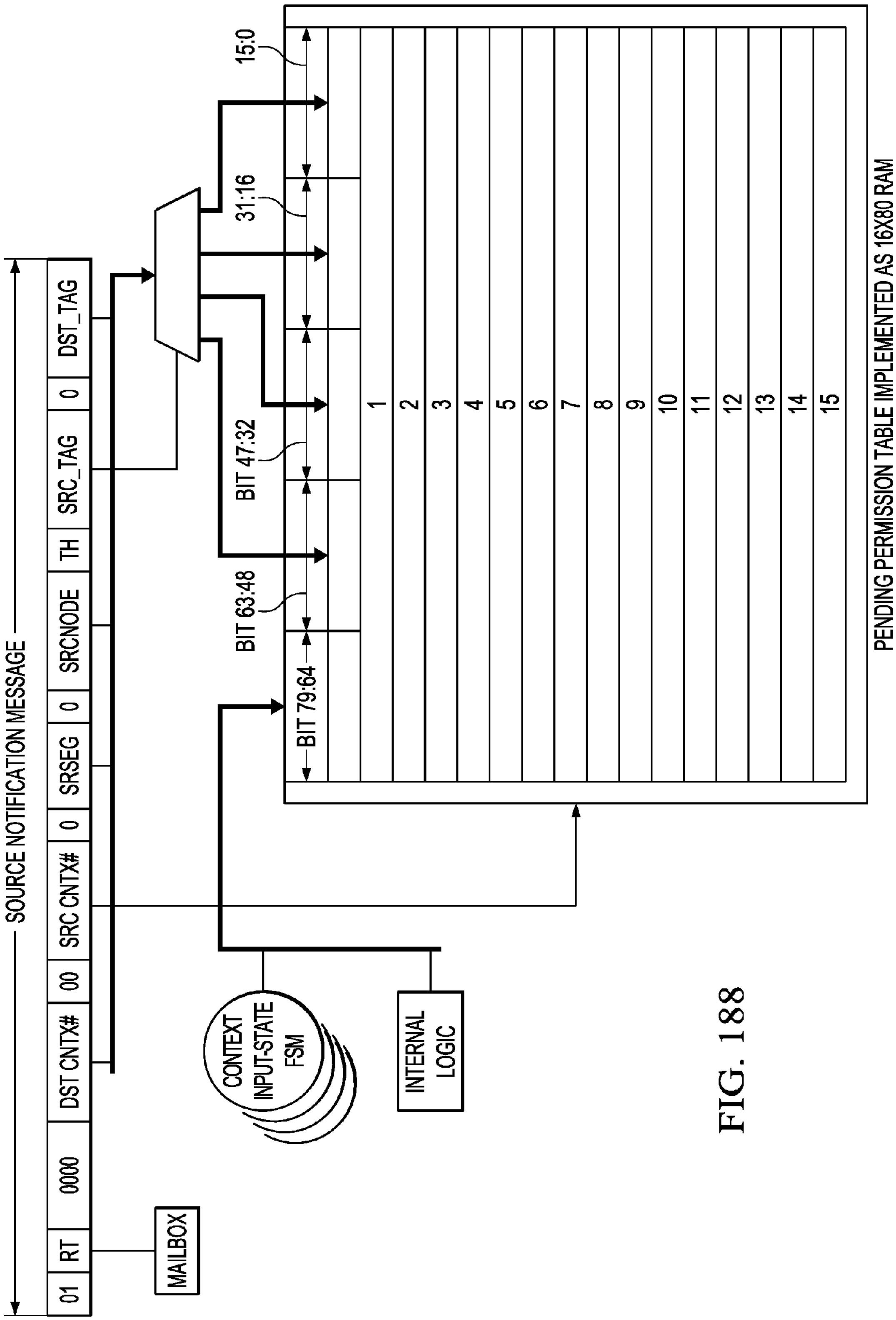

Each DST Context ID# has a correspondingentry in the table which is implemented as (for example) an 80×16 Word RAM. There are (for example) five 32-bit words for each context ID that is assigned for the write thread. The first 4 words store information extracted from the source notification message and are indexed using the DST_TAG received. The $5^{th}$ word displays the internal status of the GLS processing that context ID. FIG. 188 shows the indexing performed for filling the pending permission table.

Figure 189:
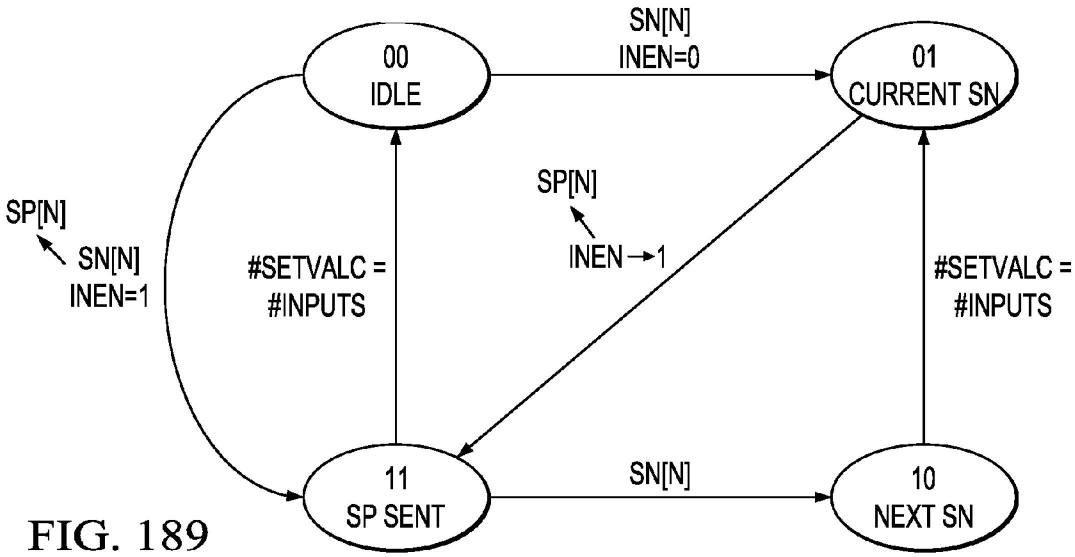

A 2-state functional state machine is implemented for each Src_Tag received in the source notification message. FIG. 189 shows the state transition by the 2-state function state memory. In FIG. 189, SN[n] indicates a Source Notification for Src_Tag=n (the tag for the source at the destination), and SP[n] indicates the corresponding Source Permission to that source. From the idle state (00'b), an SN results in an immediate SP if InEn=1, and the state transitions to 11'b; if InEn=0, the SN is recorded, and the state transitions to 01'b. When InEn is set in the state 01'b, an SP is sent for the recorded SN, and the state transitions to 11'b. In the state 11'b, there are two possibilities: (1) the context receives all Set_Valid signals, and is set valid. This places the state back into the idle state until a subsequent SN is received for the Src_Tag; and (2) the context receives a second SN before it is set valid. The context records this SN and transitions to the state 10'b, indicating that the recorded SN is for a subsequent input. From this state, when the context is set valid, the state transitions to 01'b, indicating that there is a permission to be sent for the recorded SN when InEn is set" The finite state machine or FSM state is stored in the pending permission table for each context.

Figure 190:
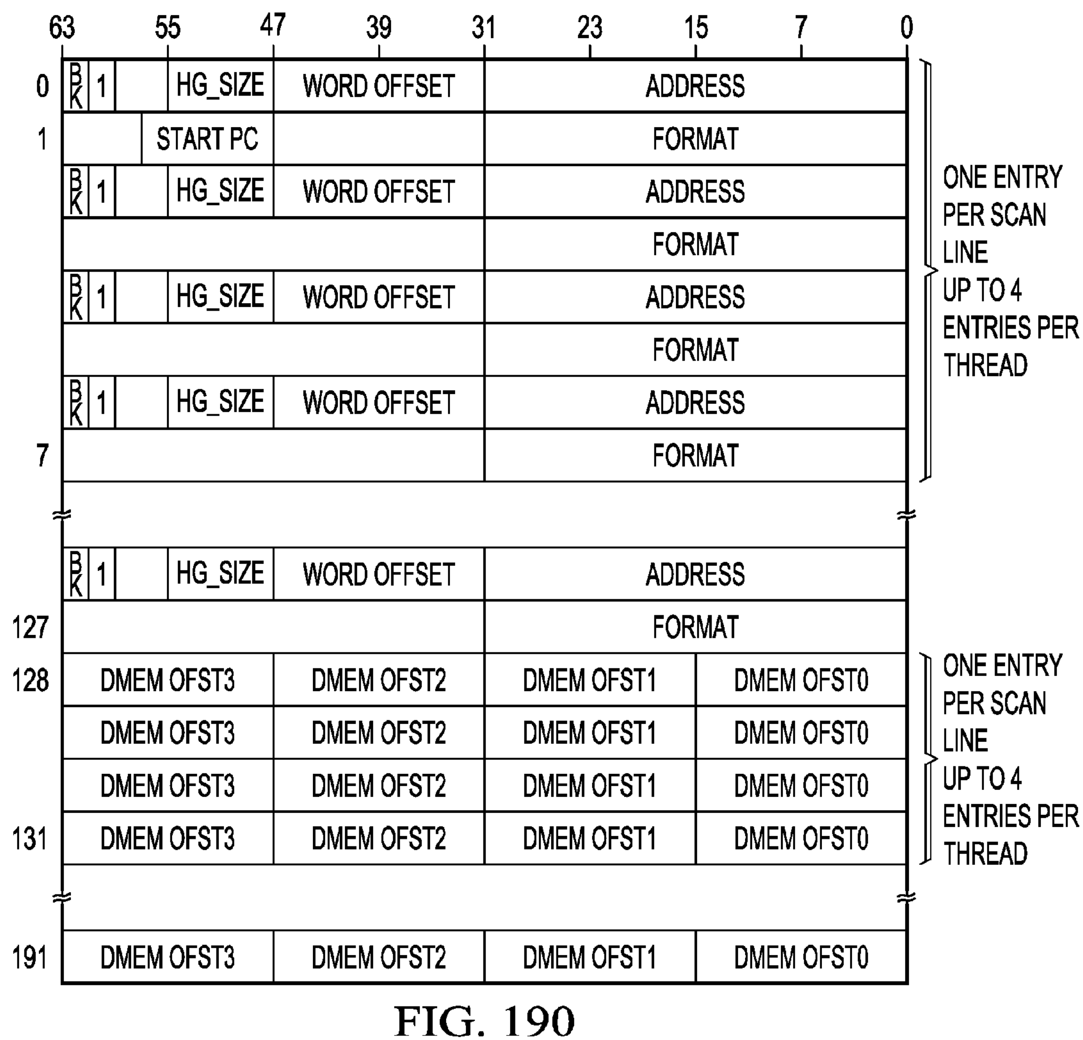

Once the FSM state reaches the state to send source permission message, the GLS unit 1408 determines the amount of buffer space it has to store the write thread data for that context. It executes a lookup procedure to determine the buffer space amount available in the Global Interconnect IO RAM (i.e., buffer 5406) and determines the PINCR value to be used in the source permission message, uses that PINCR value, constructs the SRC permission message and sends it to the {SEG_ID, NODE_ID} destination. The GLS processor 5402 is triggered (context switch) with the context base address extracted from the write thread message. In response to the context switch, the GLS processor 5402 executes the program which corresponds to the write thread. As a result of the program writes the information shown in FIG. 190 into the Parameter RAM.

The GLS processor 5402 can write up to (for example) four 64-bit pairs (upto 4 SRC-tags) for a write thread. Each 64-bit pair contains the following information that will be used by the GLS unit 1408 to send the write thread data to the peripheral (i.e., system memory 1416). The address is starting address in the peripheral (i.e., system memory 1416) for the data corresponding to the Src_Tag (or image line) to be written. The offset is the data memory offset that will used by the source to identify the color component of an image line (part of the MREQINFO sent by the source node sent on the interconnect 814 along with the data). BK identifies the last 64-bit pair for the write thread.

Once the GLS processor 5402 completes writing the information, the GLS processor 5402 performs a task switch which is interpreted by the GLS unit 1408 as the last word in the PARAMETER RAM (BK=1). A source permission message is sent for each source notification message received if there is buffer space to receive data from the source. If there is no buffer space, the source notification message received is kept in pending state until there is room in the buffer 5406 to receive data. The mailbox status is updated so that the GLS processor 5402 is not triggered repeatedly for subsequent source notification messages until the thread is terminated.

Figure 191:
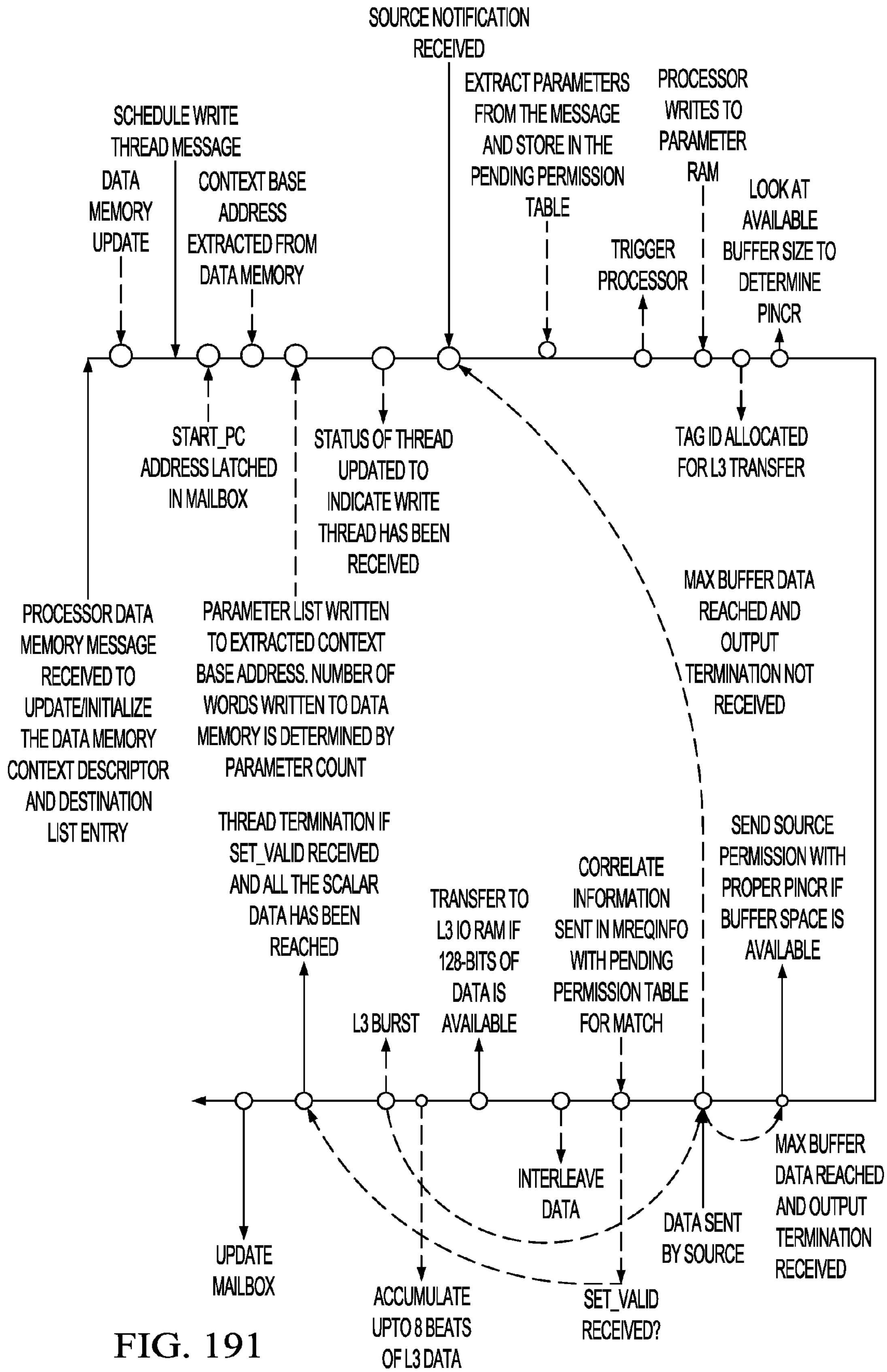

A Tag id for OCP transmissions is also allocated for the write thread. The allocated tag id will be used to write data to the peripheral. A new tag_id is allocated for each SRC_TAG that would be used by the write thread (identified, for example, by the number of 64-bit pairs written by the GLS processor 5402). Once the source permission is sent the write thread is put in a suspended state until the data arrives from the source. When the source(s) starts sending the data, it sends the data in bursts (for example) of two 256-bit bursts. Along with the data the source(s) send the following information in the MREQINFO:

Thread/Context ID→Used to identify the thread ID for which the data was sent. Also used to index into the parameter RAM (written previously by GLS processor 5402) as well as pending permissions table;

SRC_TAG→Used to index into the pending permissions table as well as parameter RAM as well as update the 2-state finite state machine;

DMEM Offset→This data memory offset is used to identify the color component for the image line, and it should be correlated with the information in the PARAMETER RAM;

Set_valid→Set valid bit is sent by the source when it has no more data to send for the src_tag. When the set_valid is sent for the src_tag whose source notification has the RT bit set or when HG_SIZE is equal to the internal counter value, then once the data is transferred to the peripheral via L3, an thread termination message is sent. The following also shows the MREQINFO bits transmitted from the sources to the GLS unit 1408 over the interconnect 814 during a write thread:

- i. 8:0: data memory offset/shared function-memory offset 8:0
- ii. 12:9: dest context #
- iii. 13: set valid
- iv. 15:14
  1. 00: instruction memory
  2. 01: data memory
  3. 10: function-memory
- v. 16: Fill
- vi. 17: reserved
- vii. 18: output killed (don't perform store—but set_valid still desires to be done)
- viii. 25:19: SFMEM offset 15:9 (not used for write thread)
- ix. 27:26: src_tag
- x. 29:28: Data Type (from ua6[4:3] of VOUTPUT)
- xi. 31:30: Reserved The two beats of data are stored in the interconnect RAM and passed on to the interleaver 6025 to interleave data. Once interleaved data (the format of the interleaved data has been already written by the GLS processor 5402 to the parameter RAM), for a SRC_TAG (or image line) is (for example) 128-bit wide, it is transferred to the buffer 6024. Once the buffer 6024 accumulates (for example) 8-beats worth of the data (or less if there is no more data to send), the beats are burst to the peripheral via the OCP connection 1412 using the previously assigned tag ID. At the same time the parameter RAM is updated with the new word offset (the word offset in the parameter RAM is maintained by the GLS unit 1408). The updated word offset will be added to the base address for subsequent data transfers. This process is repeated until set_valid for the SRC_TAG whose RT-bit was set in the source notification message is received or when HG_SIZE is equal to the internal counter value. When that condition occurs, the thread is terminated with a thread termination message sent to the processing cluster 1400 sub-system via the messaging interconnect and the thread state is moved to "non-executable state". FIG. 191 shows the write thread execution timeline discussed above.

Figure 192:
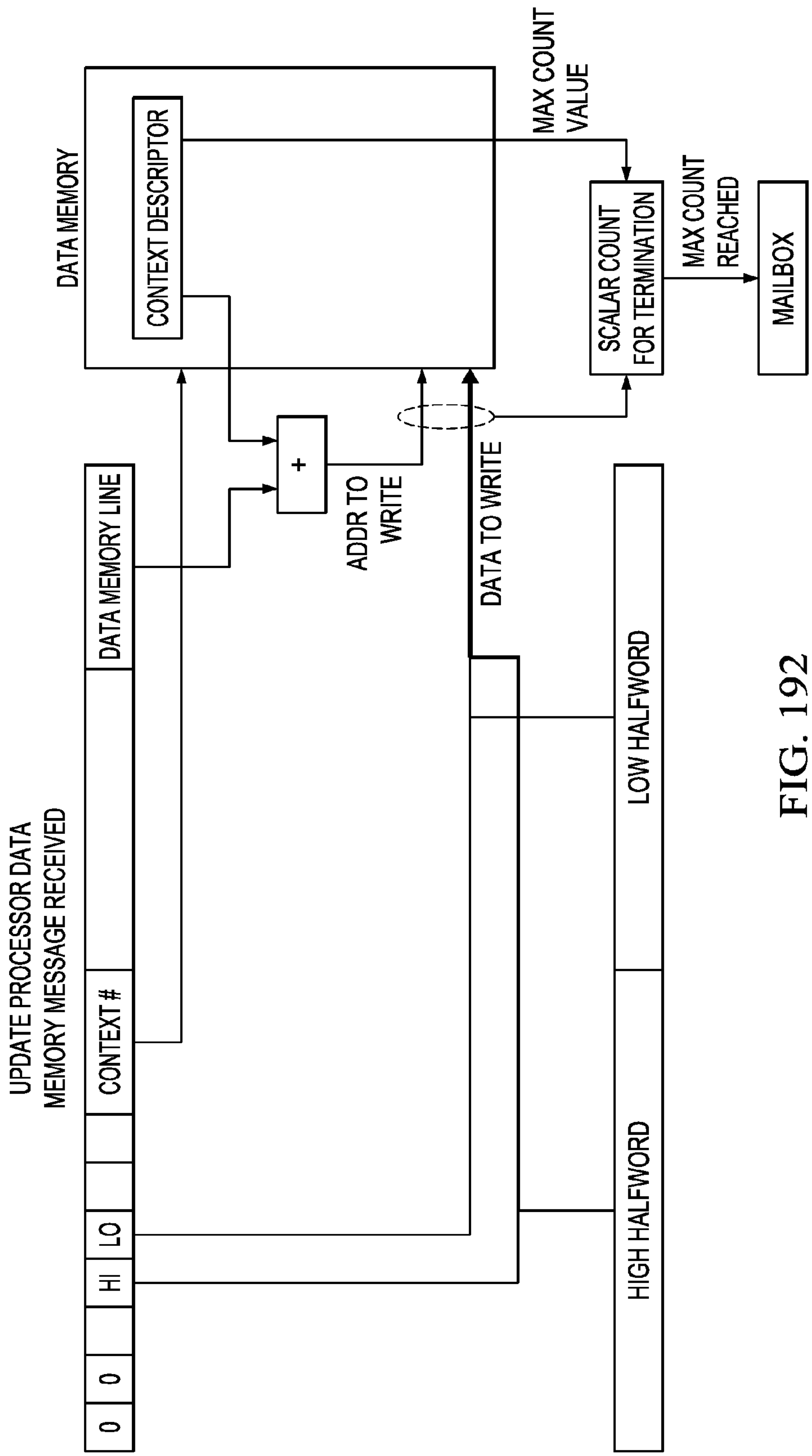

When the context descriptor is accessed upon reception of the schedule write thread message, the descriptor contains information whether the thread depends upon reception of scalar input. When the In bit is set to '1' for the thread's context descriptor, then it means the thread will also receive scalar input from nodes which desires to be written into the data memory 5403 at the address specified. The number of scalar inputs received for the thread is provided by the #Inp bits in the context descriptor. The GLS unit 1408 should to keep track of this also. The scalar input will be received by the GLS unit 1408 using the update data memory message. The data memory address to update the (for example) 32-bit scalar word (16-bits at a time depending upon the HI/LO setting in the message) is extracted from the message as well. This extracted address is added to the address in the context descriptor to determine the final address. This can be seen in FIG. 192.

9.10.4.1. Output Termination

When the source has no more data to send, it normally sends an OUTPUT termination message. When this message is received by the GLS 1408, the destination context ID is extracted from the message and the GLS pending permission table is accessed to extract the information stored for the context. A scan of the table for the destination context is then performed to match the stored source information with the information received in the message. If a match is found, it means that source has no more output to send. The InTm bit is set to '1' in the pending table. The GLS processor 5403 is indicated that the thread has been terminated by driving the wrp_terminate signal. The GLS processor 5403 executes the END instruction, and the GLS unit 1408 detects the END instruction and terminates the thread in the mailbox. 6013. A thread termination is then sent to the processing cluster 1400 sub-system.

9.10.4.2. Instructions for Write Thread

The relevant instructions for the GLS processor 5403 are VINPUT, STSYS, END, and TASKSW. When the GLS processor 5403 executes the VINPUT instruction it asserts: risc_is_vinput (set to '1'); gls_sys_addr; gls_vreg (4-bits); and risc_vip_size (8-bits). The GLS unit captures gls_vreg when risc_is_vinput is set to '1'. The gls_vreg is a 4-bit index which serves as a cross-reference to latch values that result from execution of STSYS instruction by the GLS processor 5403. The gls_sys_addr is also captured and the value is the DMEM_OFFSET value that desires to be latched into the Parameter RAM. When the GLS processor 5402 executes the STSYS instruction it asserts: gls_is_stsys (set to '1'); gls_vreg (4 bits will be cross-referenced with stored value from VINPUT); gls_sys_addr (image address); and gls_posn (3-bits). When the gls_is_stsys='1', the GLS unit 1408 will compare the previously latched gls_vreg value and if a match is obtained, it latches the gls_sys_addr to the image address of PARAMETER RAM as pointed to by the previously stored Context ID (from mailbox 6013). The format bits are obtained from the data memory data lines when the GLS processor 5402 reads the data memory 5403. POSN is used as index to write the DMEM_OFFSET value into proper bits of the parameter RAM. It should also be noted that there is no relation between the VREG value and the 64-pair present in the PARAMETER RAM. The GLS unit 1408 (for example) stores the 64-bit pair based on the time-order in which the VREG emerges from the GLS processor 5402. The END instruction from the GLS processor 5402 is asserted in response to Output Termination indication by the GLS unit 1408. When the END instruction is encountered, the GLS processor 5402 will assert the risc_is_end signal on its interface. This indicates to the GLS unit 1408 to move the thread to HALTED state as well as update the GLS pending permissions table. The TASKSW instruction asserts the risc_is_task_sw signal on the GLS processor 5402 interface. This signal is captured and it serves as the BK bit for the parameter RAM. It also serves as set_valid signal for the GLS logic to indicate that the last word for the PARAMETER RAM has been written by the GLS processor 5402.

9.10.4.3. Interleaver for Write Thread

The interleaver 6025 is generally responsible for interleaving the data from the nodes/partitions so that it can be sent on the OCP connection 1412. FIG. 193 shows the format written into the parameter RAM by GLS processor 5402 for write thread. As mentioned before, the GLS unit 1408 will receive (for example) 2-beats worth of data via interconnect 814. The DMEM_OFFSET received is compared with the DMEM_OFFSET in the PARAMETER RAM. A match indicates the line number to which the data belongs. The Pixels are then extracted according to bit-widths, and the transmitted pixel format can be seen in FIG. 194. Once the line number is determined, the pixels are extracted from the transmitted word. The number of colors determines the number of interleaved colors that desire to be created by the interleaver to send on the OCP connection 1412. Down-sampling setting along with repetition/zero-insertion is used to extract pixels and interleave data to create the (for example) 128-bit image data for transmission, and FIG. 195 shows the relation.

In the example shown in FIG. 60BA, the NUM_OF_COLORS is 4. It means that the interleaver 6025 should to create an image line with 4 color components with each pixel of "PIXEL_WIDTH" length. The transmitter will first send data on the interconnect 814 with DMEM_OFFSET0 (possibly). The interleaver 6025 is responsible for extracting the pixels based on the pixel width (drop the leading 0s also), and use the downsampling information to latch the extracted pixels at appropriate offset. In the above example the down-sampling setting="0101". This means that when data with DMEM_OFFSET0 is transmitted, the pixels extracted from the (for example) 256-bit word occupy the outgoing pixel location-0, 2, and so forth. Once the data with DMEM_OFFSET1 is received, the zero-insertion/repetition bit is examined. In either case, the pixels are picked up from the appropriate locations (after extraction) and latched at appropriate offsets. In the above example, the pixels extracted for DMEM_OFFSET1 are latched in pixel location 1, 5, and so forth When data with DMEM_OFFSET2 is received the pixels are latched into appropriate offsets. In the above example, the pixels extracted for DMEM_OFFSET2 are latched in pixel location 2, 6, and so forth. As explained above, once data worth (for example) 128-bits are formed, the interleaved data is transferred to the buffer 6024.

9.10.5. Multicasting

The GLS unit 1408 supports multicasting of read thread data and write thread data. The multicast option for a thread is enabled when Schedule multicast message is received by the GLS unit 1408. A multicast thread can either receive data from the OCP connection 1412 (read thread) or receive data from the global interconnect (write thread). During a write thread when the data is received via interconnect 814 and if the thread had already received a schedule multicast message, the GLS unit 1408 performs extracts the previously stored DESTINATION_LIST_BASE from the mailbox 6013 for the thread (it would have been written by the multicast message). Then the data memory 5403 is scanned to determine the list of destinations. As source notification message is then sent to all the destinations present in the list which are not write threads. The destination can also include a write thread which is not "multicast". When a source permission message is received from the destinations for which the source notification messages were sent, the data received via interconnect 814 is sent to the destination. If the destination happens to be a write thread, then the data is sent to the interleaver 6025 in the GLS unit 1408 for transfer to the OCP connection 1412. When data to all destinations have been transferred to them, the buffer 5406 is made free to receive new data 9.10.6. Reset The primary source is the asynchronous reset provided to the GLS unit 1408. This reset fans out to all the modules of the GLS unit 1408.

9.10.7. Clock

There is limited clock gating in the GLS unit 1408. The GLS unit 1408 has ability to gate its messaging clock interface when the clock enable from the control node indicates so. The control node 1406 sends a MESSAGE_CLK_ENABLE signal which when set to '1', enables the internal clock to the ingress and egress messaging interface. When it is set to '0', the clocks to these modules are disabled.

9.10.8. Power Management

Interconnect monitor is (for example) a 32-bit counter which monitors the interconnect 814 to detect activity on the data bus 1422. Whenever there is no interconnect activity, the counter starts counting upto 0x1fff_ffff. Whenever there is activity the counter is reset back to '0'. When the counter reaches the max count (0x1fff_ffff), an "no activity" signal is sent to the control node 1406. When the control node 1406 receives this signal, it starts initiating the power down sequence to power-down the processing cluster 1400 subsystem.

10. Control Node Architecture

As shown in FIG. 18, the control node 1406 can be responsible for handling the message traffic that flows between the partitions 1402-1 to 1402-R, shared function-memory 1410, GLS unit 1408, and hardware accelerators 1418. The messages can be categorized as initialization messages and steady state messages. The initialization messages include messages that are intended to the control node 1406 itself, for example, action update list messages from GLS unit 1408 or control node data memory initialization message. The messages that are intended for the control node 1406 are either action list messages to initialize the action list memory or cause some sort of interrupt from the control node 1406 (for example, HALT-ACK message). These messages are identified by using the {SEG_ID, NODE_ID} combination (which is described in greater detail below).

10.1. IO Signal

In Table 23 below, an example of a list of IO signals of the Control Node 1406 that interacts with two partitions (labeled partition-0 and partition-1) can be seen.

TABLE 23

| Name | Bits | I/O | Connects from/to | Description |
|---|---|---|---|---|
| | | | Global Pins | |
| rst_n | 1 | I | | System Reset signal (active low) for internal core |
| Clk | 1 | I | | Control Node global Clock (i.e., 400 MHZ) |
| ocp_clken_slave | 4 | I | | Indication for ½ rate<br>1 -> Full-rate<br>0 -> Half-rate<br>Bit-0 is used for parititon-0 slave<br>Bit-1 is used for parititon-1 slave<br>Bit-2 is used for parititon-2 slave (SFM)<br>Bit-3 is used for parititon-3 slave (G-LS) |
| ocp_clken_master | 4 | I | | Indication for ½ rate<br>1 -> Full-rate<br>0 -> Half-rate<br>Bit-0 is used for parititon-0 master<br>Bit-1 is used for parititon-1 master<br>Bit-2 is used for parititon-2 master (SFM)<br>Bit-3 is used for parititon-3 master (G-LS) |
| ocp_clken_trace | 1 | I | | Indication for ½ OCP rate<br>1 -> Full-rate<br>0 -> Half-rate |
| Bus Master Interface (EGRESS OCP Ports) x range 0 -> 3 for current Control Node 1406<br>0 normally connects to partition-0<br>1 normally connects to partition-1 | | | | |

TABLE 23-continued

| Name | Bits | I/O | Connects from/to | Description |
|---|---|---|---|---|
| 2 normally connects to shared function-memory 1410<br>3 normally connects to GLS unit 1408 | | | | |
| ocp__partx__msg__scmdaccept | 1 | I | Partition-x | CMD accept from partition-x |
| ocp__partx__msg__sresp | 2 | I | Partition-x | Sresponse from partition-x (unused) |
| ocp__partx__msg__sresplast | 1 | I | Partition-x | Sresponse accept from partition-x (unused) |
| ocp__partx__msg__sdataaccept | 1 | I | Partition-x | Data accept from partition-x |
| ocp__mintercon__partx__mcmd | 3 | O | Partition-x | MCMD to partition-X |
| ocp__mintercon__partx__maddr | 9 | O | Partition-x | MADDR to partition-X. Assumed to be in the format {OPCODE, SEG__ID, NODE__ID} format where, OPCODE -> Bit 8:6 SEG__ID -> Bit 5:4 Node__ID -> Bit 3:0 |
| ocp__mintercon__partx__mreqinfo | 1 | O | Partition-x | MREQINFO to partition-X |
| ocp__mintercon__partx__mburstlen | 6 | O | Partition-x | Burst length to partition-X (MAX beat length supported is 32) |
| ocp__mintercon__partx__mdata | 32 | O | Partition-x | MDATA to partition-X |
| ocp__mintercon__partx__mdata__valid | 1 | O | Partition-x | MDATAVALID to partition-X |
| ocp__mintercon__partx__mdata__last | 1 | O | Partition-x | MDATALAST to partition-X |
| Bus Slave Interface (INGRESS OCP Ports) x range 0 -> 3 for current Control Node<br>0 normally connects to partition-0<br>1 normally connects to partition-1<br>2 normally connects to shared function-memory 1410<br>3 normally connects to GLS unit 1408 | | | | |
| ocp__partx__msg__mcmd | 3 | I | Partition-x | MCMD from partition-x |
| ocp__partx__msg__maddr | 9 | I | Partition-x | MADDR from partition-x. Assumed to be in the format {MSG__OPS, SEG__ID, NODE__ID} format where, MSG__OPS -> Bit 8:6 SEG__ID -> Bit 5:4 Node__ID -> Nit 3:0 |
| ocp__partx__msg__mreqinfo | 1 | I | Partition-x | MREQINFO from partition-x |
| ocp__partx__msg__mburstlen | 6 | I | Partition-x | Burst length from partition-x (MAX beat length supported is 32) |
| ocp__partx__msg__mdata | 32 | I | Partition-x | MDATA from partition-x |
| ocp__partx__msg__mdata__valid | 1 | I | Partition-x | MDATAVALID from partition-x |
| ocp__partx__msg__mdata__last | 1 | I | Partition-x | MDATALAST from partition-x |
| ocp__mintercon__partx__scmdaccept | 1 | O | Partition-x | CMD accept to partition-x |
| ocp__mintercon__partx__sresp | 2 | O | Partition-x | Sresponse to partition-x (undriven) |
| ocp__mintercon__partx__sresplast | 1 | O | Partition-x | Sresponse accept to partition-x (undriven) |
| ocp__mintercon__partx__sdataaccept | 1 | O | Partition-x | Data accept to partition-x |
| OCP Bus Master Interface with the Event Translator | | | | |
| ocp__partx__et__scmdaccept | 1 | I | Event translator | CMD accept from Event translator |
| ocp__partx__et__sresp | 2 | I | Event translator | Sresponse from Event translator (unused) |
| ocp__partx__et__sresplast | 1 | I | Event translator | Sresponse accept from Event translator (unused) |
| ocp__partx__et__sdataaccept | 1 | I | Event translator | Data accept from Event translator |
| ocp__mintercon__et__mcmd | 3 | O | Event translator | MCMD to Event translator |
| ocp__mintercon__et__maddr | 9 | O | Event translator | MADDR to Event translator. Assumed to be in the format {OPCODE, SEG__ID, NODE__ID} format where, OPCODE -> Bit 8:6 SEG__ID -> Bit 5:4 Node__ID -> Bit 3:0 |
| ocp__mintercon__et__mreqinfo | 1 | O | Event translator | MREQINFO to Event translator |
| ocp__mintercon__et__mburstlen | 6 | O | Event translator | Burst length to ET (MAX beat length supported is 32) |
| ocp__mintercon__et__mdata | 32 | O | Event translator | MDATA to Event translator |

TABLE 23-continued

| Name | Bits | I/O | Connects from/to | Description |
|---|---|---|---|---|
| ocp__mintercon__et__mdata__valid | 1 | O | Event translator | MDATAVALID to Event translator |
| ocp__mintercon__et__mdata__last | 1 | O | Event translator | MDATALAST to Event translator |
| OCP Bus Slave Interface with the Event Translator | | | | |
| ocp__partx__et__mcmd | 3 | I | Event translator | MCMD from Event translator |
| ocp__partx__et__maddr | 9 | I | Event translator | MADDR from Event translator. Assumed to be in the format {MSG__OPS, SEG__ID, NODE__ID} format where, MSG__OPS -> Bit 8:6 SEG__ID -> Bit 5:4 Node__ID -> Nit 3:0 |
| ocp__partx__et__mreqinfo | 1 | I | Event translator | MREQINFO from Event translator |
| ocp__partx__et__mburstlen | 6 | I | Event translator | Burst length from Event translator (MAX beat length supported is 32) |
| ocp__partx__et__mdata | 32 | I | Event translator | MDATA from Event translator |
| ocp__partx__et__mdata__valid | 1 | I | Event translator | MDATAVALID from Event translator |
| ocp__partx__et__mdata__last | 1 | I | Event translator | MDATALAST from Event translator |
| ocp__mintercon__et__scmdaccept | 1 | O | Event translator | CMD accept to Event translator |
| ocp__mintercon__et__sresp | 2 | O | Event translator | Sresponse to Event translator (undriven) |
| ocp__mintercon__et__sresplast | 1 | O | Event translator | Sresponse accept to Event translator (undriven) |
| ocp__mintercon__et__sdataaccept | 1 | O | Event translator | Data accept to Event translator |
| Host processor (slave) Interface | | | | |
| host__mcmd | 3 | I | From Host | MCMD from host |
| host__maddr | 12 | I | From Host | MADDR from host |
| host__mdata | 32 | I | From Host | MDATA from host |
| host__mbyteen | 4 | I | From Host | MBYTEEN from host |
| host__mrespaccept | 1 | I | From Host | MRESPACCEPT from host |
| host__scmdaccept | 1 | O | To Host | CMDACCEPT to host |
| host__sresp | 2 | O | To Host | SRESP to host |
| host__sdata | 32 | O | To Host | SDATA to host |
| Debug Bus Master Interface | | | | |
| debug__mcmd | 3 | I | From Debug | MCMD from debug |
| debug__maddr | 12 | I | From Debug | MADDR from debug |
| debug__mdata | 32 | I | From Debug | MDATA from debug |
| debug__mbyteen | 4 | I | From Debug | MBYTEEN from debug |
| debug__mrespaccept | 1 | I | From Debug | MRESPACCEPT from debug |
| debug__scmdaccept | 1 | O | To Debug | CMDACCEPT to debug |
| debug__sresp | 2 | O | To Debug | SRESP to debug |
| debug__sdata | 32 | O | To Debug | SDATA to debug |
| Trace Bus Master Interface | | | | |
| trace__scmdaccept | 1 | I | Partition-x | CMD accept from trace slave |
| trace__sresp | 2 | I | Partition-x | Sresponse from trace slave (unused) |
| trace__sresplast | 1 | I | Partition-x | Sresponse accept from trace slave (unused) |
| trace__sdataaccept | 1 | I | Partition-x | Data accept from trace slave |
| trace__mcmd | 3 | O | Partition-x | MCMD to trace slave |
| trace__maddr | 9 | O | Partition-x | MADDR to trace slave |
| trace__mreqinfo | 1 | O | Partition-x | MREQINFO to trace slave |
| trace__mburstlen | 6 | O | Partition-x | Burst length to trace slave |
| trace__mdata | 32 | O | Partition-x | MDATA to trace slave |
| trace__mdata__valid | 1 | O | Partition-x | MDATAVALID to trace slave |
| trace__mdata__last | 1 | O | Partition-x | MDATALAST to trace slave |
| Event Translator Interrupt Input | | | | |
| et__interrupt__en | 1 | I | From Event Translator | Pulse from Event Translator to indicate underflow or overflow of interrupt has occurred within the ET block |

TABLE 23-continued

| Name | Bits | I/O | Connects from/to | Description |
|---|---|---|---|---|
| et__interrupt__vector | 4 | I | From Event Translator | Interrupt vector for which underflow or overflow has happened |
| et__overflow__underflow | 1 | I | From Event Translator | Overflow (1) or Underflow (0) interrupt status |
| | | Interrupt | | |
| tpic__interrupt__1 | 1 | O | Host Interrupt | Control Node Host interrupt (active low). Active low pulse from ipgenericirq block |
| tpic__interrupt__l__pending | 1 | O | Host interrupt pending | Control Node Host interrupt (active low). Active low pending from ipgenericirq block |
| tpic__debug__interrupt__1 | 1 | O | Debug Interrupt | Control Node Debug interrupt (active low). Active low pulse from ipgenericirq block |
| tpic__debug__interrupt__1__pending | 1 | O | Debug interrupt pending | Control Node Debug interrupt (active low). Active low pending from ipgenericirq block |
| | Debug Monitor Signals | | | |
| partition0__debug | 32 | I | | |
| partition1__debug | 32 | I | | |
| sfm__debug | 32 | I | | |
| gls__debug | 32 | I | | |
| debug__bus | 32 | O | | |
| | Clock Control Signals | | | |
| downstream__clock__enable | 4 | O | \|To partitions | Clock control signals to various egress ports<br>0 −> Clock is turned off<br>1 −> Clock is turned on<br>1__0 −> Goes to Seg ID = 1, Node ID = 0<br>1__1 −> Goes to Seg ID = 1, Node ID = 1<br>1__2 −> Goes to Seg ID = 2, Node ID = 2<br>1__3 −> Goes to Seg ID = 3, Node ID = 3<br>1__4 −> Goes to Seg ID = 4, Node ID = 4<br>1__5 −> Goes to Seg ID = 5, Node ID = 5<br>1__6 −> Goes to Seg ID = 6, Node ID = 6<br>1__7 −> Goes to Seg ID = 7, Node ID = 7<br>1__E −> Goes to Seg ID = 1, Node ID = E<br>3__1 −> Goes to Seg ID = 3, Node ID = 1 |
| Power__down__enable*__* | 1 | O | \|To partitions | Power down enable signal to PRCM for various egress ports<br>0 −> Donot power down<br>1 −> Power down<br>1__0 −> Goes to Seg ID = 1, Node ID = 0<br>1__1 −> Power down Seg ID = 1, Node ID = 1<br>1__2 −> Power down Seg ID = 2, Node ID = 2<br>1__3 −> Power down Seg ID = 3, Node ID = 3<br>1__4 −> Power down Seg ID = 4, Node ID = 4<br>1__5 −> Power down Seg ID = 5, Node ID = 5<br>1__6 −> Power down Seg ID = 6, Node ID = 6<br>1__7 −> Power down Seg ID = 7, |

TABLE 23-continued

| Name | Bits | I/O | Connects from/to | Description |
|---|---|---|---|---|
| | | | | Node ID = 7<br>1_E -> Goes to Seg ID = 1, Node ID = E<br>3_1 -> Goes to Seg ID = 3, Node ID = 1 |
| DFT Signals | | | | |
| rst__bypass | 1 | I | | DFT bypass to ipgvrstgen |
| host__idle__intr__disable | 1 | I | | DFT signals to host interrupt ipgvmodirq |
| host__int__rst__bypass | 1 | I | | DFT signals to host interrupt ipgvmodirq |
| host__int__dft__event__ctrl | 1 | I | | DFT signals to host interrupt ipgvmodirq |
| host__dft__clkinvdis | 1 | I | | DFT signals to host interrupt ipgvmodirq |
| host__top__eoi__in | 1 | I | | DFT signals to host interrupt ipgvmodirq |
| host__top__eoi__out | 1 | O | | DFT signals from host interrupt ipgvmodirq |
| debug__idle__intr__disable | 1 | I | | DFT signals to debug interrupt ipgvmodirq |
| debug__int__rst__bypass | 1 | I | | DFT signals to debug interrupt ipgvmodirq |
| debug__int__dft__event__ctrl | 1 | I | | DFT signals to debug interrupt ipgvmodirq |
| debug__dft__clkinvdis | 1 | I | | DFT signals to debug interrupt ipgvmodirq |
| debug__top__eoi__in | 1 | I | | DFT signals to debug interrupt ipgvmodirq |
| debug__top__eoi__out | 1 | O | | DFT signals from debug interrupt ipgvmodirq |
| action__ram__memwrap__gpi | | I | | Action RAM Memory DFT control |
| action__ram__memwrap__gpo | | O | | Action RAM Memory DFT control |
| Disconnect Signals | | | | |
| debug__idle__disconnect__req | 1 | I | | |
| debug__top__mconnect | 2 | I | | |
| debug__idle__disconnect__ack | 1 | O | | |
| debug__top__sconnect | 3 | O | | |
| host__idle__disconnect__req | 1 | I | | |
| host__top__mconnect | 2 | I | | |
| host__idle__disconnect__ack | 1 | O | | |
| host__top__sconnect | 3 | O | | |
| trace__stby__disconnect__req | 1 | I | | |
| trace__top__sconnect | 3 | I | | |
| trace__stby__disconnect__ack | 1 | O | | |
| trace__top__mconnect | 2 | O | | |

10.2. Functional Basics

Turning to FIGS. 196 and 197, however, the general structure for the control node 1408 can be seen. Preferably, control node 1408 can implement the system-wide messaging interconnect, event processing and scheduling, and interface to the host processor (slave). An example of the of functions that can be implemented by the control node 1408 are as follows:

(1) Routing and distribution of messages; typically, all messages can be routed through the Control Node 1406, which can provide a means for generating message traces for debug. It also can serializes event notifications, to avoid race conditions that could occur without this centralized distribution point.
(2) Processing of messages for sequencing and control.
(3) Interfacing the host processor, including data/address and interrupt interfaces.
(4) Supporting debug either by the host processor or a specialized debug port.
(5) Provide trace messages via trace port
(6) Provide a message queue Additionally, the control node is responsible for (1) Routing the incoming processing cluster 1400 messages to proper ports based on the input {segment id.node id} header information
(2) Process termination messages internally based on information in its action list RAM
(3) Allow host interface to configure internal registers
(4) Allow debug interface to configure internal registers (if host is not accessing)
(5) Allow action list RAM to be accessed by the host/debugger interface or via messaging interface
(6) Support a messaging queue for action list update message that allows "unlimited" message processing
(7) Handle action list type encoding in the message queue
(8) Route all processed messages to the ATB trace interface for upstream monitoring/debug
(9) Assert interrupts based on "messaging" demands As shown in FIG. 196, the control node 1406 is generally comprised of a message queue 6102, node input buffer 6134, and an output buffer 6124. Typically, the message queue 6102 receives input messages 6104 from a host processor through interface 1405. These input messages 6104 generally include data (i.e., message content 6106) and an address (i.e., opcode 6108, segment ID 6110, and node ID 6112). The node input buffer 6134 generally receives messages from nodes (i.e., 808-*i*) and generally comprises a control node memory 6114 that can store action listentry processing or action list 6116 (which can include program IDs/thread Ids 6118, segments IDs 6120, and node IDs 6122). The output buffer 6124 general stores output messages, having data (i.e., message content 6132) and addresses (i.e., opcode 6126, segments IDs 6128, and node IDs 6130), that can be sent to nodes (i.e., 808-*i*) or trace and debug hardware.

Turning to FIG. 197, the architecture of the control node 1406 can be seen in greater detail. As shown, control node 1406 is able to interact with partitions 1402-1 to 1402-R (or nodes) through slave interfaces 6134-1 to 6134-R and master interfaces 6138-1 to 6138-R, with GLS unit 1408 through slave interface 6134-(R+1) and master interface 6138-(R+1), host processor through interface 1405, debugger through interface 6133, and trace through interface 6135. Additionally, the control node 1406 also generally comprises message pre-processors 6136-1 to 6136-(R+1), sequential processor 6140, extractor 6142, registers 6144, and arbiter 6146.

Typically, the input slave interfaces 6134-1 to 6134-(R+1) are generally responsible for handling all the ingress slave accesses from the upstream modules (i.e., GLS unit 1408). An example of the protocol between the slave and master can be seen in FIG. 198. It can be assumed that data presented to the slave interface (i.e., 6134-1) is accepted by the control node 1406, but in most cases that would not be the case. Data-stall will be internally generated which will gate the SDATAACCEPT to the master. The master is then expected to hold the MDATA value until the corresponding SDATAACCEPT is sent by the slave interface.

The message pre-processors 6138-1 to 6138-(R+1) are generally responsible for determining if the control node 1406 should act upon the current message or forward it. This is determined by the decoding the latched header byte first. Table 24 below shows examples of the list of messages that the control node 1406 can decode and act upon when received from the upstream master.

TABLE 24

| Message Type | Header Information | Action Taken |
|---|---|---|
| Control node memory initialization | 9'b011_11_0001 | Updated with termination headers and action list words provided in the data beat |
| Control Node Message Read Thread Input | 9'b100_11_0001 | Send the message to the internal message queue |
| Termination | 9'b001_11_0001 | Program or thread termination message. Read action list RAM and perform subsequent actions |
| Halt ACK | 9'b110_11_0001 and first message beat data-bits[31:28] = 4'b0011 | HALT ACK. Latch the data beats into the debugger FIFO for debugger to read |
| Breakpoint | 9'b110_11_0001 and first message beat data-bits[31:28] = 4'b1010, bit[27] = 1'b0 | Break point. Interrupt the debugger and store the data beats into the debugger FIFO for debugger to read |
| TracePoint | 9'b110_11_0001 and first message beat data-bits[31:28] = 4'b1010, bit[27] = 1'b1 | No action. Internally "drop" all the data beats. |
| Node State Response | 9'b110_11_0001 and first message beat data-bits[31:28] = 4'b0101 | Store the data beats into the debugger FIFO for debugger to read |
| Processor data memory Read Response | 9'b111_11_0001 | Store the data beats into the debugger FIFO for debugger to read |
| Rest if addressed to control node | 9'bxxx_11_0001 | "Drop" them as they are not supported and not intended to be processed by the control node |

As shown, when the {SEG_ID, NODE_ID} combination indicates a valid output port, the message is forwarded to the proper egress node.

The control node data memory initialization message is employed for action RAM initialization. As an example, when the control node 1410 receives this message, the control node 1410 examines the #Entries information contained in the data field. The #Entries field usually indicates the number of action list entries excluding the termination headers. For example, if the number of action list entries to be updated is 1 (i.e., action_list_0) then the #Entries=1; if action list _0 and action list _1 should be updated then the #Entries=2. Therefore the valid range of #Entries is 1→246. There are cases where the number of action list entries make the total number of beats exceed (for example) 32 (where max beat count is, for example, 32). For example, if the number of action list entries is 19 then total number of data beats for the message is 1 (#Entries)+8 (node termination header)+8 (thread termination header)+20 (15 action list entries translate to 20 beats)=37 beats. The upstream is supposed to divide this into two beats (32 beats in the first packet and 5 beats in the next packet).

Registers 6144 are generally comprised of several registers, and a list of examples of some of the registers 6144 can be seen below in Table 25.

TABLE 25

| Name | Addr | Attr | Field Name | Function | Type | Rst | Group |
| --- | --- | --- | --- | --- | --- | --- | --- |
| Version | 31:16 | R | MAJOR_VERSION | Major version Number | REG | 0 | Parameter |
| | 15:0 | R | MINOR_VERSION | Minor Version | | 1 | Parameter |
| Parameter | 31:0 | R | NUMBER_OF_PARTITIONS | Number of partitions supported | REG | 4 | Parameter |
| Control_Node_CTRL | 31:3 | R | RESERVED | | REG | 0 | Parameter |
| | 2 | R/W | ACTION_RAM_READ_CTRL | 0 -> Read lower 31-bits of the action RAM word<br>1 -> Read upper 9-bits of the action RAM word | | 0 | |
| | 1:0 | R/W | TRACE_FORWARD_SELECT | 0 -> Select input side messages to be sent on trace port when forwarding<br>1 -> Select output side messages to be sent on trace port when forwarding | | 0 | |
| | 0 | R | RESERVED | | | 0 | |
| SW Reset | 31:2 | R | RESERVED | | REG | 0 | Parameter |
| | 1 | W-CLR | MSG_QUEUE_RESET | 0 -> Do not reset message queue<br>1 -> Reset message queue (self cleared) | | 0 | |
| | 0 | W-CLR | SW_RESET | 0 -> Do not set SW reset<br>1 -> Assert SW reset (auto-cleared)<br>SW would usually read '0' | | 0 | |
| Debug Port Enable | 31:1 | R | RESERVED | | REG | 0 | Parameter |
| | 0 | R/W | DEBUG PORT ENABLE | 0 -> Debug Port disabled<br>1 -> Debug Port enabled | | 0 | |

TABLE 25-continued

| Name | Addr | Attr | Field Name | Function | Type | Rst | Group |
|---|---|---|---|---|---|---|---|
| Control_Node_Status | 31:24 | R | RESERVED | | REG | 0 | Information |
| | 23 | RCLR | MSG_QUEUE_RESET_COMPLETE | Message queue reset complete status 0 -> MSG Queue reset not complete 1 -> MSG Queue reset complete The information should be used when MSG Queue reset is actually set. Will be auto-cleared upon read | | 0 | |
| | 22:19 | R | DEBUGGER INTERRUPT FIFO COUNT | Count of number of words stored in the Debugger interrupt FIFO | | 0x0 | |
| | 18 | R | DEBUGGER INTERRUPT FIFO VALID STATUS | DEBUGGER interrupt FIFO Valid Status 0 -> DEBUGGER interrupt FIFO contents are not valid 1 -> DEBUGGER interrupt FIFO has valid contents | | 0 | |
| | 17 | R | DEBUGGER INTERRUPT FIFO FULL STATUS | DEBUGGER interrupt FIFO Full Status 0 -> DEBUGGER interrupt FIFO not full 1 -> DEBUGGER interrupt FIFO full | | 0 | |
| | 16 | R | DEBUGGER INTERRUPT FIFO EMPTY STATUS | DEBUGGER interrupt FIFO EMPTY Status 0 -> | | 1 | |

TABLE 25-continued

| Name | Addr | Attr | Field Name | Function | Type | Rst | Group |
|---|---|---|---|---|---|---|---|
| | | | | DEBUGGER interrupt FIFO not empty 1 -> DEBUGGER interrupt FIFO empty | | | |
| | 15 | R | RESERVED | | | 0 | |
| | 14:11 | R | HOST INTERRUPT FIFO COUNT | Count of number of words stored in the host interrupt FIFO | | 0x0 | |
| | 10 | R | HOST INTERRUPT FIFO VALID STATUS | HOST interrupt FIFO Valid Status 0 -> HOST interrupt FIFO contents are not valid 1 -> HOST interrupt FIFO has valid contents | | 0 | |
| | 9 | R | HOST INTERRUPT FIFO FULL STATUS | HOST interrupt FIFO Full Status 0 -> HOST interrupt FIFO not full 1 -> HOST interrupt FIFO full | | 0 | |
| | 8 | R | HOST INTERRUPT FIFO EMPTY STATUS | HOST interrupt FIFO EMPTY Status 0 -> HOST interrupt FIFO not empty 1 -> HOST interrupt FIFO empty | | 1 | |
| | 7:4 | R | DEBUG INTERRUPT FIFO COUNT | Count of number of words stored in the debug interrupt FIFO | | 0x0 | |
| | 3 | R | DEBUG INTERRUPT FIFO VALID | DEBUG interrupt FIFO Valid Status | | 0 | |

TABLE 25-continued

| Name | Addr | Attr | Field Name | Function | Type | Rst | Group |
|---|---|---|---|---|---|---|---|
| | | | STATUS | 0 -> DEBUG interrupt FIFO contents are not valid 1 -> DEBUG interrupt FIFO has valid contents | | | |
| | 2 | R | DEBUG INTERRUPT FIFO FULL STATUS | DEBUG interrupt FIFO Full Status 0 -> DEBUG interrupt FIFO not full 1 -> DEBUG interrupt FIFO full | | 0 | |
| | 1 | R | DEBUG INTERRUPT FIFO EMPTY STATUS | DEBUG interrupt FIFO EMPTY Status 0 -> DEBUG interrupt FIFO not empty 1 -> DEBUG interrupt FIFO empty | | 1 | |
| | 0 | RCLR | SW__RESET__COMPLETE | SW reset complete status 0 -> SW reset not complete 1 -> SW reset complete The information should be used when SW reset is actually set. Will be auto-cleared upon read | | 1 | |
| EGRESS__CLOCK__COUNT | 31 | R/W | EGRESS__CLOCK__COUNT__ENB | Enable clock counting registers for egress port clock control 0 -> Do not enable clock counter(s) for clock gating 1 -> Enable clock counter(s) for clock gating | REG | 0 | Parameter |

TABLE 25-continued

| Name | Addr | Attr | Field Name | Function | Type | Rst | Group |
|---|---|---|---|---|---|---|---|
| | 30:0 | R/W | CLOCK_COUNT | MAX Clock count value to turn off egress clock | | 0 | |
| POWER_DOWN_COUNT | 31 | R/W | POWER_DOWN_COUNT_ENB | Enable Power down counting for TPIC<br>0 -> Do not enable power down counting<br>1 -> Enable power down counting | REG | 0 | Parameter |
| | 30:0 | R/W | COUNT | MAX power down count value | | | |
| ACTION_HOST_INTR | 31:0 | R | HOST_INTERRUPT_INFO | Host interrupt info extracted from Action RAM<br>A value of 0xdeadbeef will be returned when the internal FIFO that holds the read values is empty | | 0xdead beef | Interrupt Status Word |
| DEBUG_HOST_INTR | 31:0 | R | DEBUG_INTERRUPT_INFO | Debug interrupt info extracted from Action RAM<br>A value of 0xdeadbeef will be returned when the internal FIFO that holds the read values is empty | | 0xdead beef | Interrupt Status Word |
| MESSAGE_COUNT_ENB | 31:2 | R | RESERVED | | REG | 0 | Control |
| | 1 | R/W | CLR_COUNT | Clear all message counters. SW is responsible for setting and resetting it)<br>0 -> Do not clear the counters | | 0 | |

TABLE 25-continued

| Name | Addr | Attr | Field Name | Function | Type | Rst | Group |
|---|---|---|---|---|---|---|---|
| | | | | 1 -> Clear the counters. SW is responsible for setting this bit back to '0'. Until SW sets the bit back to '0', the HW will continue to clear the counters. | | | |
| | 0 | R/W | ENABLE_COUNT | Enable all message counters 0 -> Do not enable message counters 1 -> Enable Message counters | | 0 | |
| ACTION_COUNT | 31:0 | RO | ACTION_COUNT | Count of number of messages sent by control node based on action list (cleared to 0 by CLR_COUNT) | REG | 0 | Control |
| INPUT0_MSG_COUNT | 31:0 | RO | INPUT_MSG_COUNT | Count of number of messages received on a particular ingress port (cleared to 0 by CLR_COUNT) | REG | 0 | Control |
| INPUT1_MSG_COUNT | 31:0 | RO | INPUT_MSG_COUNT | Count of number of messages received on a particular ingress port (cleared to 0 by CLR_COUNT) | REG | 0 | Control |
| INPUT2_MSG_COUNT | 31:0 | RO | INPUT_MSG_COUNT | Count of number of messages | REG | 0 | Control |

TABLE 25-continued

| Name | Addr | Attr | Field Name | Function | Type | Rst | Group |
|---|---|---|---|---|---|---|---|
| | | | | received on a particular ingress port (cleared to 0 by CLR_COUNT) | | | |
| INPUT3_MSG_COUNT | 31:0 | RO | INPUT_MSG_COUNT | Count of number of messages received on a particular ingress port (cleared to 0 by CLR_COUNT) | REG | 0 | Control |
| DEBUG_MUX_CTRL | 31:4 | R | RESERVED | | REG | 0 | Parameter |
| | 3:0 | R/W | HW DEBUG SIGNAL MUX CONTROL | 0 -> Partition-0 debug signals are routed to the debug monitor port<br>1 -> Partition-1 debug signals are routed to the debug monitor port<br>2 -> SFM debug signals are routed to the debug monitor port<br>3 -> G-LS debug signals are routed to the debug monitor port<br>4 -> Control Node debug signals are routed to the debug monitor port<br>5:15 -> 32'd0 | | | |
| DEBUG_READ_PART | 31:0 | RO | DEBUGGER READ VALUES | This register serves as the address for reading the contents of the FIFO that stores the | REG | 0xdead beef | Debugger information from partitions |

TABLE 25-continued

| Name | Addr | Attr | Field Name | Function | Type | Rst | Group |
|---|---|---|---|---|---|---|---|
| | | | | HALT__ACK, Breakpoint, RISC__DMEM read response (addressed to the control node) and Node State read response data. This register should be used in conjunction with the DEBUG__IRQSTATUS register (for Breakpoint message) when the status register reflects that these messages caused the interrupt to the debugger. A value of 0xdeadbeef will be returned when the internal FIFO that holds the read values is empty | | | |
| HW__SIG__MUX__CTRL | 31:0 | R/W | HW DEBUG SIGNAL MUX CONTROL FOR SIGNALS IN CONTROL NODE | | REG | | Mux control for all control node HW signals |
| MESSAGE__QUEUE__WRITE | 31:0 | WO | DATA | This register serves as the address for writing any packed message to the message queue of the control node | REG | 0 | Message queue write address |
| HOST__LOCK | 31:1 | R | RESERVED | | REG | 0 | Information |
| | 0 | RO | HOST BUSY | This bit reflects the status of who is accessing the | | 0 | |

TABLE 25-continued

| Name | Addr | Attr | Field Name | Function | Type | Rst | Group |
|---|---|---|---|---|---|---|---|
| | | | | register bank at certain point in time 0 -> Host is accessing the register bank 0 -> Debugger is accessing the register bank | | | |
| FORWARD0_COUNT | 31:0 | RO | FORWARD_COUNT | Count of number of messages forwarded by the control node (cleared to 0 by CLR_COUNT) | REG | 0 | Information |
| FORWARD1_COUNT | 31:0 | RO | FORWARD_COUNT | Count of number of messages forwarded by the control node (cleared to 0 by CLR_COUNT) | REG | 0 | Information |
| FORWARD2_COUNT | 31:0 | RO | FORWARD_COUNT | Count of number of messages forwarded by the control node (cleared to 0 by CLR_COUNT) | REG | 0 | Information |
| FORWARD3_COUNT | 31:0 | RO | FORWARD_COUNT | Count of number of messages forwarded by the control node (cleared to 0 by CLR_COUNT) | REG | 0 | Information |
| TERM0_COUNT | 31:0 | RO | TERMINATION_COUNT | Count of number of termination messages received by the control node (cleared to 0 by CLR_COUNT) | REG | 0 | Information |
| TERM1_COUNT | 31:0 | RO | TERMINATION_COUNT | Count of number of termination messages | REG | 0 | Information |

TABLE 25-continued

| Name | Addr | Attr | Field Name | Function | Type | Rst | Group |
|---|---|---|---|---|---|---|---|
| | | | | received by the control node (cleared to 0 by CLR_COUNT) | | | |
| TERM2_COUNT | 31:0 | RO | TERMINATION_COUNT | Count of number of termination messages received by the control node (cleared to 0 by CLR_COUNT) | REG | 0 | Information |
| TERM3_COUNT | 31:0 | RO | TERMINATION_COUNT | Count of number of termination messages received by the control node (cleared to 0 by CLR_COUNT) | REG | 0 | Information |
| ACT0_UPDATE_COUNT | 31:0 | RO | ACTION UPDATE COUNT | Count of number of ACTION LIST UPDATE messages received by the control node (cleared to 0 by CLR_COUNT) | REG | 0 | Information |
| ACT1_UPDATE_COUNT | 31:0 | RO | ACTION UPDATE COUNT | Count of number of ACTION LIST UPDATE messages received by the control node (cleared to 0 by CLR_COUNT) | REG | 0 | Information |
| ACT2_UPDATE_COUNT | 31:0 | RO | ACTION UPDATE COUNT | Count of number of ACTION LIST UPDATE messages received by the control node (cleared to 0 by CLR_COUNT) | REG | 0 | Information |
| ACT3_UPDATE_COUNT | 31:0 | RO | ACTION UPDATE | Count of number of | REG | 0 | Information |

TABLE 25-continued

| Name | Addr | Attr | Field Name | Function | Type | Rst | Group |
|---|---|---|---|---|---|---|---|
| | | | COUNT | ACTION LIST UPDATE messages received by the control node (cleared to 0 by CLR__COUNT) | | | |
| CONTROL0__COUNT | 31:0 | RO | CONTROL__COUNT | Count of number of messages received by the control node that are specifically addressed to the control node ((excludes action message, termination and action list update) (cleared to 0 by CLR__COUNT) | REG | 0 | Information |
| CONTROL1__COUNT | 31:0 | RO | CONTROL__COUNT | Count of number of messages received by the control node that are specifically addressed to the control node ((excludes action message, termination and action list update) (cleared to 0 by CLR__COUNT) | REG | 0 | Information |
| CONTROL2__COUNT | 31:0 | RO | CONTROL__COUNT | Count of number of messages received by the control node that are | REG | 0 | Information |

TABLE 25-continued

| Name | Addr | Attr | Field Name | Function | Type | Rst | Group |
|---|---|---|---|---|---|---|---|
| | | | | specifically addressed to the control node ((excludes action message, termination and action list update) (cleared to 0 by CLR_COUNT) | | | |
| CONTROL3_COUNT | 31:0 | RO | CONTROL_COUNT | Count of number of messages received by the control node that are specifically addressed to the control node ((excludes action message, termination and action list update) (cleared to 0 by CLR_COUNT) | REG | 0 | Information |
| Termination Header | | R/W | | | RAM | | Parameter |
| Action words (0 -> 247) | | R/W | | | RAM | | Parameter |
| HOST_IRQ_EOI | 31:1 | RO | RESERVED | | REG | 0 | Control |
| | 0 | WO | EOI FOR HOST INTERRUPT | Write 0 to clear the host interrupt (will return 0 on read) | | 0 | |
| HOST_IRQSTATUS_RAW | 31:2 | RO | RESERVED | | REG | 0 | Parameter |
| | 1 | RO | HOST ET UNDERFLOW/OVERFLOW_RAW | This bit reflects the RAW status of the Event Translator underflow/overflow. This bit cannot be gated. SW should write a '1' to corresponding bit in the | | | |

TABLE 25-continued

| Name | Addr | Attr | Field Name | Function | Type | Rst | Group |
|---|---|---|---|---|---|---|---|
| | | | | HOST__IRQSTATUS to clear it Writing '1' to this bit will assert the interrupt provided it is enabled using the HOST__IRQENABLE__SET register. This is normally used for testing the interrupt assertion and deassertion 1 -> ET block has set the interrupt status bit 0 -> No Event Translator block event event This bit in normal mode will be set as long as there are contents in the host interrupt queue to read (host has to use Error! Reference source not found. to read the contents of the FIFO) | | | |
| | 0 | RW | HOST IRQSTATUS__RAW | This bit reflects the RAW status of the host interrupt. This bit cannot be gated. SW should write a '1' to corresponding bit in the HOST__IRQSTATUS to clear it | | | |

TABLE 25-continued

| Name | Addr | Attr | Field Name | Function | Type | Rst | Group |
|---|---|---|---|---|---|---|---|
| | | | | Writing '1' to this bit will assert the interrupt provided it is enabled using the HOST_IRQENABLE_SET register. This is normally used for testing the interrupt assertion and deassertion 1 -> Message Queue has set the interrupt status bit 0 -> No message queue event This bit in normal mode will be set as long as there are contents in the host interrupt queue to read | | | |
| HOST_IRQSTATUS | 31:2 | RO | RESERVED | | REG | 0 | Parameter |
| | 1 | RO | HOST ET UNDERFLOW/OVERFLOW | This bit reflects the status of the Event Translator underflow/overflow. This bit is set if the corresponding Error! Reference source not found. bit is set. SW should write a '1' to this bit to clear interrupt set by writing to the | | | |

TABLE 25-continued

| Name | Addr | Attr | Field Name | Function | Type | Rst | Group |
|---|---|---|---|---|---|---|---|
| | | | | HOST ET UNDERFLOW/OVERFLOW__RAW BIT Writing '1' to this bit will deassert the interrupt set provided it is enabled using the HOST__IRQENABLE__SET register. 1 -> Event Translator has set the interrupt status bit 0 -> No Event Translator event event This bit in normal mode will be set as long as there are contents in the host interrupt queue to read (host has to use Error! Reference source not found. to read the contents of the FIFO) | | | |
| | 0 | RW | HOST IRQSTATUS | This bit reflects the status of the host interrupt. This bit is set if the corresponding HOST__IRQ__ENABLE bit is set. SW should write a '1' to this bit to clear interrupt set by writing to the HOST__IRQSTATUS__RAW Writing '1' to this bit will deassert the interrupt set | | | |

TABLE 25-continued

| Name | Addr | Attr | Field Name | Function | Type | Rst | Group |
|---|---|---|---|---|---|---|---|
| | | | | provided it is enabled using the HOST_IRQENABLE_SET register. 1 -> Message Queue has set the interrupt status bit 0 -> No message queue event This bit in normal mode will be set as long as there are contents in the host interrupt queue to read | | | |
| HOST_IRQENABLE_SET | 31:2 | RO | RESERVED | | REG | 0 | Parameter |
| | 1 | RW | HOST ET IRQENABLE_SET | Writing a '1' to this register causes interrupt to be asserted if the interrupt causing event happens. Writing '0' has no effect. Reading the bit back will reflect the status of the internal IRQ enable | | | |
| | 0 | RW | HOST IRQENABLE_SET | Writing a '1' to this register causes interrupt to be asserted if the interrupt causing event happens. Writing '0' has no effect. | | 0 | |

TABLE 25-continued

| Name | Addr | Attr | Field Name | Function | Type | Rst | Group |
|---|---|---|---|---|---|---|---|
| | | | | Reading the bit back will reflect the status of the internal IRQ enable | | | |
| HOST_IRQENABLE_CLR | 31:2 | RO | RESERVED | | REG | 0 | Parameter |
| | 1 | RW | HOST ET IRQENABLE_CLR | Writing a '1' to this register causes interrupt enable to be cleared. Writing '0' has no effect. Reading the bit back will reflect the status of the internal IRQ enable | | | |
| | 0 | RW | HOST IRQENABLE_CLR | Writing a '1' to this register causes interrupt enable to be cleared. Writing '0' has no effect. Reading the bit back will reflect the status of the internal IRQ enable | | | |
| DEBUG_IRQ_EOI | 31:1 | RO | RESERVED | | REG | 0 | Control |
| | 0 | WO | EOI FOR DEBUG INTERRUPT | Write 1 to clear the DEBUG interrupt (will return 0 on read) | | 0 | |
| DEBUG_IRQSTATUS_RAW | 31:3 | RO | RESERVED | | REG | 0 | Parameter |
| | 2 | RO | DEBUG ET UNDERFLOW/OVERFLOW_RAW | This bit reflects the RAW status of the ET underflow/overflow. This bit cannot be gated. SW should write a '1' to corresponding bit in the DEBUG_IRQSTATUS register to clear it Writing '1' to | | | |

TABLE 25-continued

| Name | Addr | Attr | Field Name | Function | Type | Rst | Group |
|---|---|---|---|---|---|---|---|
| | | | | this bit will assert the interrupt provided it is enabled using the DEBUG__IRQSTATUS register. This is normally used for testing the interrupt assertion and deassertion<br>1 -> ET block has set the interrupt status bit<br>0 -> No ET block event<br>This bit in normal mode will be set as long as there are contents in the host interrupt queue to read (host has to use ET__DEBUG__INTR register to read the contents of the FIFO) | | | |
| | 1:0 | RW | DEBUG IRQSTATUS__RAW | These bits reflect the RAW status of the DEBUG interrupt. This bit cannot be gated. SW should write a '1' to corresponding bit in the DEBUG__IRQSTATUS to clear it<br>Writing '1' to this bit will assert the interrupt provided it is | | | |

TABLE 25-continued

| Name | Addr | Attr | Field Name | Function | Type | Rst | Group |
|---|---|---|---|---|---|---|---|
| | | | | enabled using the DEBUG__IRQENABLE__SET register. This is normally used for testing the interrupt assertion and deassertion<br>Bit-0: 1 -> Message Queue has set the bit<br>0 -> Message queue has not set the bit<br>This bit in normal mode will be set as long as there are contents in the debug interrupt queue to read<br>Bit-1: 1 -> BREAKPOINT message from a partition has set the bit<br>0 -> HALT__ACK message from partition-0 has not set the bit<br>This bit in normal mode will be set as long as there are contents to read in the debug FIFO corresponding to the partition | | | |

TABLE 25-continued

| Name | Addr | Attr | Field Name | Function | Type | Rst | Group |
|---|---|---|---|---|---|---|---|
| DEBUG_IRQSTATUS | 31:3 | RO | RESERVED | | REG | 0 | Parameter |
| | 2 | RO | DEBUG ET UNDERFLOW/OVERFLOW | This bit reflects the status of the ET underflow/overflow. This bit is set if the corresponding DEBUG_IRQENABLE_SET register bit is set. SW should write a '1' to this bit to clear interrupt set by writing to the DEBUG ET UNDERFLOW/ OVERFLOW_RAW BIT Writing '1' to this bit will deassert the interrupt set provided it is enabled using the DEBUG_IRQENABLE_SET register. 1 -> ET block has set the interrupt status bit 0 -> No ET block event event This bit in normal mode will be set as long as there are contents in the host interrupt queue to read (host has to use ET_DEBUG_INTR register to read the contents of the FIFO) | | | |
| | 1:0 | RW | DEBUG IRQSTATUS_RAW | These bit reflect the status of the debug interrupt. | | 0 | |

TABLE 25-continued

| Name | Addr | Attr | Field Name | Function | Type | Rst | Group |
|---|---|---|---|---|---|---|---|
| | | | | These bits are set if the corresponding DEBUG__IRQ ENABLE bit are set. SW should write a '1' to these bits to clear interrupt set by writing to the DEBUG__IRQSTATUS__RAW Writing '1' to these bits will deassert the interrupt set provided it is enabled using the HOST__IRQENABLE__SET register. This is normally used for testing the interrupt assertion and deassertion Bit-0: 1 -> Message Queue has set the bit 0 -> | | | |

TABLE 25-continued

| Name | Addr | Attr | Field Name | Function | Type | Rst | Group |
|---|---|---|---|---|---|---|---|
| | | | | Message queue has not set the bit This bit in normal mode will be set as long as there are contents in the debug interrupt queue to read This bit in normal mode will be set as long as there are contents in the debug interrupt queue to read Bit-1: 1 -> BREAKPOINT message from a partition has set the bit 0 -> BREAKPOINT message from partition-0 has not set the bit This bit in normal mode will be set as long as there are contents to read in the debug FIFO corresponding to the partition | | | |
| DEBUG_IRQENABLE_SET | 31:3 | RO | RESERVED | | REG | 0 | Parameter |
| | 2 | RW | DEBUG ET IRQENABLE_SET | Writing a '1' to this register causes interrupt to be asserted if the interrupt causing event happens. Writing '0' has no effect. Reading the bit back will reflect the status of the internal IRQ enable | | | |

TABLE 25-continued

| Name | Addr | Attr | Field Name | Function | Type | Rst | Group |
|---|---|---|---|---|---|---|---|
| | 1 | RW | DEBUG_SET_MESSAGE_QUEUE_INTR | Writing a '1' to these bits cause interrupt to be asserted if the interrupt causing event happens. Writing '0' has no effect. Reading back will reflect the status of the internal IRQ enable | | 0 | |
| | 0 | R/W | DEBUG_SET_BREAKPOINT_INTR | Writing a '1' to these bits cause interrupt to be asserted if the interrupt causing event happens. Writing '0' has no effect. Reading back will reflect the status of the internal IRQ enable | | 0 | |
| DEBUG_IRQENABLE_CLR | 31:3 | RO | RESERVED | | REG | 0 | Parameter |
| | 2 | RW | DEBUG ET IRQENABLE_CLR | Writing a '1' to this register causes interrupt enable to be cleared. Writing '0' has no effect. Reading the bit back will reflect the status of the internal IRQ enable | | | |
| | 1 | RW | DEBUG_SET_MESSAGE_QUEUE_CLR | Writing a '1' to these bits cause interrupt enables to be cleared. Writing '0' has no effect. Reading the bit back will reflect the status of the | | 0 | |

TABLE 25-continued

| Name | Addr | Attr | Field Name | Function | Type | Rst | Group |
|---|---|---|---|---|---|---|---|
| | | | | internal IRQ enable | | | |
| | 0 | R/W | DEBUG_SET_BREAKPOINT_CLR | Writing a '1' to these bits cause interrupt enables to be cleared. Writing '0' has no effect. Reading the bit back will reflect the status of the internal IRQ enable | | 0 | |
| ATB_ID | 31:7 | R | RESERVED | | REG | | |
| | 6:0 | R/W | ATB_ID | ATB ID to used in the trace port | | | Parameter |
| ATB_SYNC_COUNT | 31:0 | R/W | ATB_SYNC_COUNT | Counter to control the interval between SYNC header information sent on the ATB port | REG | | Parameter |
| ET_HOST_INTR | 31:0 | R | ET_HOST_INTERRUPT_INFO | ET overflow underflow status for host to read Bit 3:0 -> ET interrupt Vector number Bit 4 -> 0: Underflow 1: Overflow A value of 0xdeadbeef will be returned when the internal FIFO that holds the read values is empty | REG | 0xdead beef | Host overflow/under flow interrupt status word |
| ET_DEBUG_INTR | 31:0 | R | ET_HOST_INTERRUPT_INFO | ET overflow underflow status for debugger to read Bit 3:0 -> ET interrupt Vector number | REG | 0xdead beef | Host overflow/underflow interrupt status word |

TABLE 25-continued

| Name | Addr | Attr | Field Name | Function | Type | Rst | Group |
|---|---|---|---|---|---|---|---|
| | | | | Bit 4 -> 0: Underflow 1: Overflow A value of 0xdeadbeef will be returned when the internal FIFO that holds the read values is empty | | | |
| ET_STATUS | 13:10 | R | ET HOST INTERRUPT FIFO COUNT | Count of number of words stored in the ET host interrupt FIFO | REG | 0X0 | |
| | 9 | R | ET HOST INTERRUPT FIFO VALID STATUS | ET HOST interrupt FIFO Valid Status 0 -> ET HOST interrupt FIFO contents are not valid 1 -> ET HOST interrupt FIFO has valid contents | | 0 | |
| | 8 | R | ET HOST INTERRUPT FIFO FULL STATUS | ET HOST interrupt FIFO Full Status 0 -> ET HOST interrupt FIFO not full 1 -> ET HOST interrupt FIFO full | | 0 | |
| | 7 | R | ET HOST INTERRUPT FIFO EMPTY STATUS | ET HOST interrupt FIFO EMPTY Status 0 -> ET HOST interrupt FIFO not empty 1 -> ET HOST interrupt FIFO empty | | 1 | |
| | 6:3 | R | ET DEBUG INTERRUPT FIFO COUNT | Count of number of words stored in the ET debug interrupt FIFO | | 0x0 | |

TABLE 25-continued

| Name | Addr | Attr | Field Name | Function | Type | Rst | Group |
|---|---|---|---|---|---|---|---|
| | 2 | R | ET DEBUG INTERRUPT FIFO VALID STATUS | ET DEBUG interrupt FIFO Valid Status 0 -> ET DEBUG interrupt FIFO contents are not valid 1 -> ET DEBUG interrupt FIFO has valid contents | | 0 | |
| | 1 | R | ET DEBUG INTERRUPT FIFO FULL STATUS | ET DEBUG interrupt FIFO Full Status 0 -> ET DEBUG interrupt FIFO not full 1 -> ET DEBUG interrupt FIFO full | | 0 | |
| | 0 | R | ET DEBUG INTERRUPT FIFO EMPTY STATUS | ET DEBUG interrupt FIFO EMPTY Status 0 -> ET DEBUG interrupt FIFO not empty 1 -> ET DEBUG interrupt FIFO empty | | 1 | |

The sequential processor or sequencer 6140 sequences the access to the control node memory 6114 based at least in part on the indication is receives from various message pre-processors 6136-1 to 6136-(R+1). After the sequencer 6140 completes its actions that are generally used for a termination message, it indicates to the Message forwarder or master interfaces 6138-1 to 6138-(R+1) that a message is ready for transmission. Once the message forwarder (i.e., 6138-1) accepts the message and releases the sequencer 6140, it moves to the next termination message. At the same time it also indicates to the message pre-processor (i.e., 6136-1) that the actions have been completed for the termination message. This in turn triggers the message pre-processor (i.e., 6136-1) release of the message buffer for accepting new messages.

The message forwarder (i.e., 6138-1) forwards all the messages it receives from its message pre-processor (i.e., 6136-1) as well as the sequencer 6140. The message forwarder (i.e., 6138-1) can communicate with the master egress blocks to send the constructed/forwarded message by the control node 1406. Once the corresponding master indicates the completion of the transmission, the message forwarder (i.e., 6138-1) should the release the corresponding message pre-processor (i.e., 6136-1), which will in turn release the message buffer.

10.3. Input Message Format

Turning to FIG. 199, message 6104 can be seen in greater detail. As shown, message 6104 (which can be received by the control node 1406) generally comprises a 9-bit header (which can generally correspond to the address portion of the message 6104) and 1 or more data-bits, up to 32 bits, for example, (which can generally correspond to the data portion or message content 6106 of message 6104). The opcode 6108 (which generally comprises three bits) can determine what action should be taken by the control node 1406. In addition to the opcode 6108 and for example, the upper 4-bits (i.e. bits 28 to 31) of the message content 6106 can serve as opcode extension bits 6202. Table 26 below show examples of opcodes (including opcode extension bits).

TABLE 26

| Opcode 6108 | Opcode Extension bits 6202 | Message Type | Action Taken by Control Node 1406 |
|---|---|---|---|
| 000 | — | Scheduling | Forwarding |
| 001 | 00 | Program or Thread Termination | Decode and access control node memory 6114 for further "actions" |
| | 01 | Source Notification | Forwarding |
| | 10 | Output Termination | Forwarding |
| | 11 | Source Permission | Forwarding |
| 010 | — | Instruction Memory (i.e., 1404-1) Initialization | Forwarding |
| 011 | 0 | Instruction Memory (i.e., 1404-1) Initialization | If {SEG_ID, NODE_ID} = {3, 2} then action message for the message queue; otherwise forwarding |
| | 1 | Instruction Memory (i.e., 1404-1) Initialization | If {SEG_ID, NODE_ID} = {3, 2} then control node memory 6114 update; otherwise forwarding |
| 100 | — | | If {SEG_ID = 3, NODE_ID = 1}, Control Node Message Queue write; otherwise forwarding |
| 101 | — | Reserved | Forwarding |
| 110 | 0000 | Halt | Forwarding |
| | 0001 | StepN | Forwarding |
| | 0010 | Resume | Forwarding |
| | 0011 | Halt Acknowledge | HALT ACK message processed by control node if {SEG_ID, NODE_ID} = {3, 2}; otherwise forwarding |
| | 0100 | Node State Read (except processor data memory (i.e., 4328)) | Forwarding |
| | 0101 | Node State Read Response | If {SEG_ID, NODE_ID} = {3, 2} then node state response (interrupt queue); otherwise forwarding |
| | 0110 | Node State Write (except processor data memory (i.e., 4328)) | Forwarding |
| | 0111 | Reserved | Forwarding |
| | 1000 | Set Breakpoint/Tracepoint | Forwarding |
| | 1001 | Clear Breakpoint/Tracepoint | Forwarding |
| | 10100 | Breakpoint | Breakpoint message processed by control node (debugger interrupt is set) if {SEG_ID, NODE_ID} = {3, 2}; otherwise forwarding |

TABLE 26-continued

| Opcode 6108 | Opcode Extension bits 6202 | Message Type | Action Taken by Control Node 1406 |
|---|---|---|---|
| | 10101 | Tracepoint Match | Tracepoint message processed by control node if {SEG_ID, NODE_ID} = {3, 2}; otherwise forwarding. When it is tracepoint message for control node, the data beats are not stored |
| | Others | Reserved | Forwarding |
| 111 | 0 | processor data memory (i.e., 4328) update, control node memory 6114 update | If {SEG_ID, NODE_ID} = {3, 2} then control node memory 6114 update; otherwise forwarding |
| | 1 | processor data memory (i.e., 4328) Read | Forwarding |
| | — | processor data memory (i.e., 4328) Read Response (to Debug/Control Node) | If {SEG_ID, NODE_ID} = {3, 2} then control node interrupt queue; otherwise forwarding |

In most cases, the control node 1406 typically does not act upon the message (i.e., 6104) except forward it to the correct destination master port. The control node can, however, takes action when a message contains segment ID 6110 and node ID 6112 combination that is addressed to it. Table 27 below shows an example of the various segment ID 6110 and node ID 6112 combinations that can be supported by the control node 1406.

TABLE 27

| SEG_ID | NODE_ID | Accessed Sub-set |
|---|---|---|
| 1 | 1 to 4 | Partition-0 sub-set (i.e., 1402-1) |
| 1 | 5 to 8 | Partition-1 sub-set (i.e., 1402-2) |
| 1 | F | Partition-2 sub-set (i.e., Shared function-memory 1410) |
| 3 | 2 | Partition-3 sub-set (i.e., GLS unit 1408) |
| 3 | 1 | Control Node (i.e., 1406) |
| Rest | Rest | Unsupported (will hang the system) |

10.3. Handling of the Termination Messages

Turning to FIG. 200, an example of the format of the termination message 6300 can be seen. When the control node 1406 receives termination messages 6300, the control node 1406 can takes the following steps. First, the control node 1406 determines if the termination message 6300 is from a node (i.e., 808-*i*) or from the GLS unit 1408, which can be based on segments 6314 and 6310, and the outcome of this can forms the base address to the control node memory 6114. Second, the control node 1406 can then determine whether it is a thread termination or program termination (which can be based on segment 6312). In case of thread termination, the thread_id contained in the data-bits 6304 (namely, in segment 6308) can be used as an index to extract the action header. In case of program termination, the node_id contained in the data-bits 6304 (namely segment 6310) can be used as an index to control node memory 6114.

In FIG. 201, an example of termination message handling flow 6400 can be seen. When the control node 1406 determines that a termination message (i.e., 6300) is received and depending upon the source of the termination message (i.e., 6300), action addresses (0 to 3 for node terminations and 4 to 7 for GLS unit terminations) is read; namely, the action can be determined from the node termination action headers 6402 or the load/store termination action headers 6404. The thread_id or node_id can then be used to determine the exact header word 6406. Typically, each header word 6406 can, for example, be 10-bits, and there can be 4 header-bits per word in the control node memory 6114 (of which one may be extracted). Then, the header word 6406 can be checked for validity, and the action table base (i.e., bits 7:0) can be extracted and used as is for threads or for program threads. When used for program threads, the following formulas can be used:

Base_Address=Action_table_base+(Prog_ID*2); or

Base_Address=Action_table_base+(Prog_ID*4)

Bit-8 of the header word 6406 can control the multiplier (i.e., 0 for *2 and 1 for *4), while Prog_ID can be extracted from the program termination message. Then, the base address can be used to extract action lists 6116 from the memory 6114. This 41-bit word, for example, is divided into header word and data-word to be sent as message to the destination nodes.

10.4. Action List Message Handling

Turning to FIG. 202, an example of the format of the messageentry 6500 in an action list 6116 can be seen. As can be seen, messageentry 6500 is generally comprised of a header (i.e., a message opcode 6502, a segment ID 6504, and a node ID 6506) and a message payload 6508. This messageentry 6500 can represent both normal entries as well as special encodings (examples of which can be seen in Table 28 below).

TABLE 28

| message opcode 6502 | segment ID 6504 | node ID 6506 | Name | Description |
|---|---|---|---|---|
| 000'b | 00'b | 0000'b | Payload Count (bits 7:0) | The number of additional payload words following the first word |
| 000'b | 00'b | 0001'b | Message Continuation Payload | Additional payload for previous message (Payload Count entries) |
| 000'b | 00'b | 0010'b | Action List End | End action list (no other action) |
| 000'b | 00'b | 0011'b | Host Interrupt Info End | Host interrupt enable, priority, vector, status, etc.; end action list |

TABLE 28-continued

| message opcode 6502 | segment ID 6504 | node ID 6506 | Name | Description |
|---|---|---|---|---|
| 000'b | 00'b | 0111'b | Debug Notification Info End | Information provided to the debugger; end action list |
| 000'b | 00'b | 1000'b | Next List Entry (bits 7:0) | A pointer to the next entry on the action list (for arbitrary list length) |

An "action list end" encoding (as shown in Table 28 above) generally signifies the end of action list messages. Typically, for this encoding the control node 1406 can determine if the message ID and segment ID are equal to "0." If not, then the header and data word are sent; otherwise an end is reached.

"Next listentry" and "message continuation" encodings (as shown in Table 28 above) can be used when the numbers of messages exceed the allowableentry list. Typically, for the "next listentry" encoding the control node 1406 can determine if the message ID and segment ID are equal to "0." If not, then the header and data word are sent; otherwise, there is a move to the nextentry. If node_ID is equal to 4'b1000 (for example), the information for "next listentry" is extracted to firm the base address to a new address in control node memory 6114. If node_ID is equal to "1," however, then the encoding is "message continuation," causing the next address to be read.

The "host interrupt info end" encoding (as shown in Table 28 above) is generally a special encoding to interrupt a host processor. When this encoding is decoded by the control node 1406, the contents of the encoded word bits (i.e., bits 31:0) can be written to an internal register and a host interrupt is asserted. The host would read the status register and clear the interrupt. An example for the message opcode 6502, a segment ID 6504, and a node ID 6506 can be 000'b, 00'b, and 0010'b, respectively.

The "debug notification info end" encoding (as shown in Table 28 above) is generally similar to "host interrupt info end" encoding. A difference, however, is that when this type of encoding is encountered as debug interrupt is asserted. The debugger would read the status register and clear the interrupt. An example for the message opcode 6502, a segment ID 6504, and a node ID 6506 can be 000'b, 00'b, and 0010'b, respectively.

An ACTION_LIST_END encoding signifies the end of action list messages, and turning to FIG. 203, a process for how the control node 1410 handles the Action List encoding (assuming a node termination with two entries) can be seen. This sequence can be stored in the control node memory 6114 as shown in FIG. 204.

Figure 210:
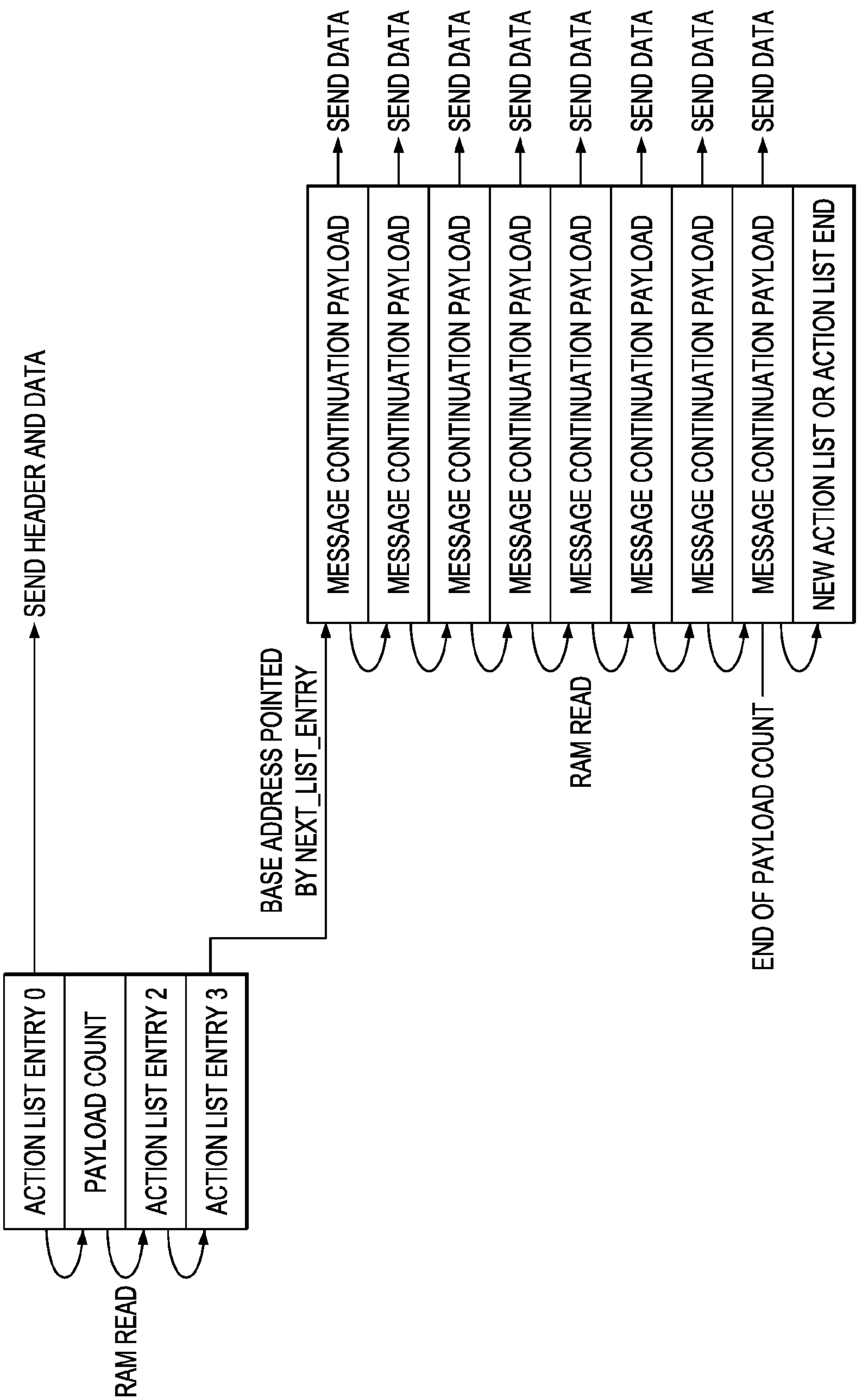
Figure 216:
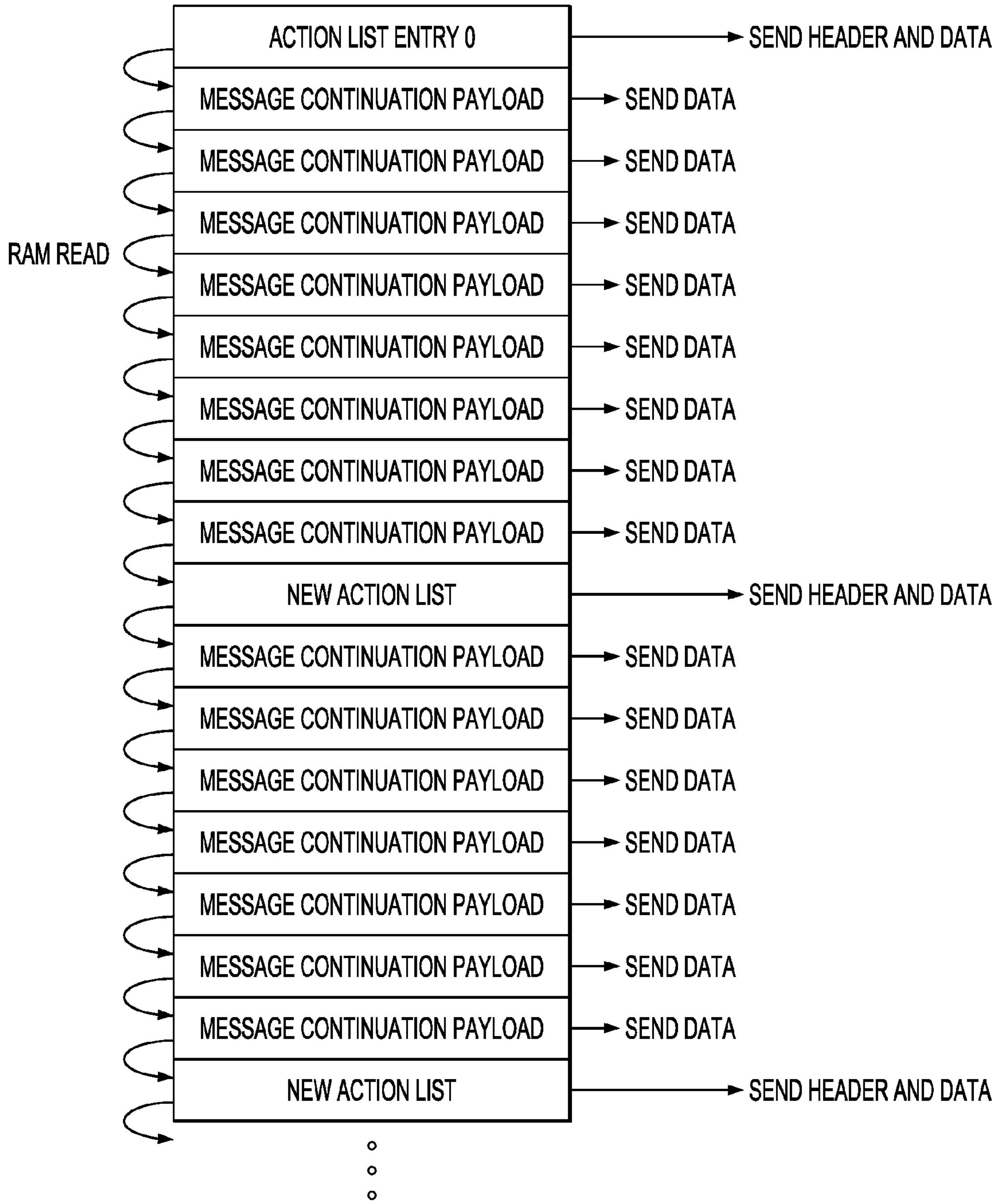
Figure 218:
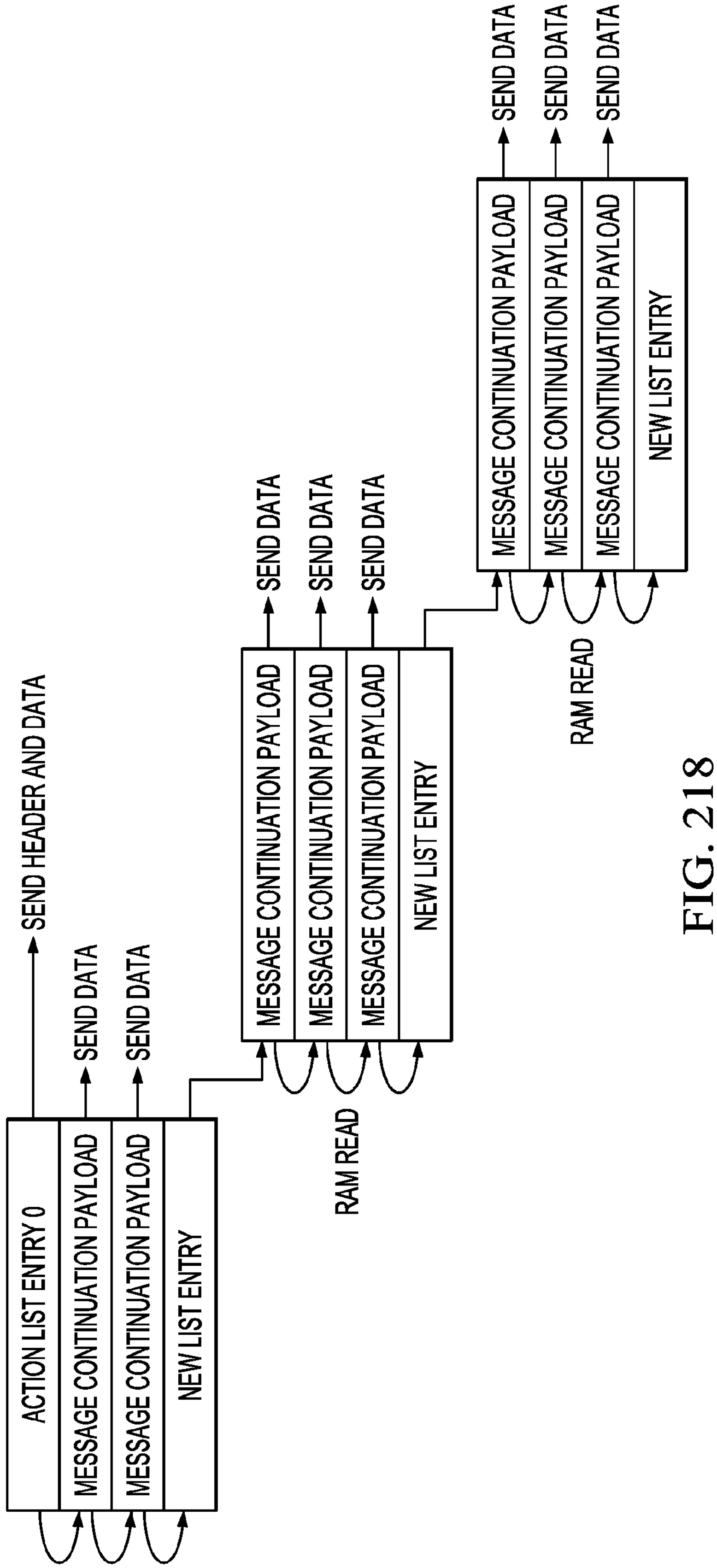

The NEXT_LIST_ENTRY-1, MESSAGE_CONTINUATION encodings can be used when the numbers of messages exceed the allowableentry-1 list. These three encodings are used together to form a linked list of messages as shown in the flow diagram of FIGS. 205 and 206, and the sequence from FIGS. 205 and 206 can be stored in the control node memory 6114 as shown in FIG. 207. Additionally, in FIG. 208, there is no action list end at the end of a current sequence of messages, and these messages can be stored in the control node memory 6114 as shown in FIG. 209. In this example, the control node 1406 should recognize that a new message payload is starting without an action list end and new series of messages are formed. Also, since the payload counter presence is encountered after the first few (i.e., 3) message payloads, the payload count should exclude those. However, the control node 1406 will set the proper outgoing burst size that includes the initial few (i.e., 3) payloads also. Another example is also shown in FIG. 210, where the messages stored in the control node memory 1406 can be seen in FIG. 211. In this above example (i.e., FIGS. 210 and 211), the presence of payload count in the initial series of messages alters the value of the payload count.

The HOST_INTERRUPT_INFO_END encoding is a special encoding to interrupt the host processor 1316. When this encoding is decoded by the control node 1406, the contents of the encoded word bits 31:0 is written to an internal register (ACTION_HOTS INTR register), and a host interrupt is asserted. The host processor 1316 would read the status register and clear the interrupt. An example of which is shown in FIG. 212, where the sequence is stored in the control node memory 6114 as shown in FIG. 213.

The DEBUG_NOTIFICATION_INFO_END is similar to HOST_INTERRUPT_INFO_END encoding. But, a difference between the two is that when this type of encoding is encountered as debug interrupt is asserted. The debugger would read the status register and clear the interrupt. An example of which is shown in FIG. 214, where the sequence is stored in the control node memory 6114 as shown in FIG. 215.

10.5. Reception/Transmission of Header and Data Words of the Messages

The header word received is a master address sent by the source master on the ingress side. On the egress side, there are typically two cases to consider: forwarding and termination. With forwarding, the buffered master address is can be forwarded on the egress master if the message should be forwarded. For termination, if the ingress message is termination message, then the egress master address can be the combination of message, segment, and node IDs. Additionally, the data word on the ingress side can be extracted from the slave data bus of the ingress port. On the egress side, there are (again) typically two cases to consider: forwarding and termination. For forwarding, the data word on the egress side can be the buffered message from the ingress side, and for termination, a (for example) 32-bit message payload can be forwarded.

10.6. No Payload Count (Handled by Control Node 1406)

The control node 1406 can handles series of action list entries with no payload count. Namely, a sequence of action list entries with no payload count or link listentry can be handled by control node 1406. It is assumed that at the end somewhere an action list end message will be inserted. But in this scenario, the control node 1406 will generally send the first series of payload as a burst until it encounters the first "NEW Action list Entry-1". Then the subsequent subset is set as a burst. This process is repeated until an action list end is encountered. The above sequence can be stored in the control node memory 6114. An exception of this sequence can occur when there are single beat sequences to send. In this case, an action list end desires to be added after every beat. Examples of which can be seen in FIGS. 216 and 217

10.7. Multiple Next List Entries (Handled by Control Node 1406)

Using the Next listentry, the control node provides a way to create linked entries of arbitrary lengths. Whenever a next listentry is encountered, the read pointer is updated with the new address and the control node continues processing normally. For this situation, it is assumed that at the end somewhere an action list end message will be inserted.

Additionally, the control node 1406 can continually adjust its internal pointers as pointed by next listentry. This process can be repeated until an action list end is encountered or a new series of entries start. The above sequence can be stored in the control node memory 6114. Examples of which can be seen in FIGS. 218 and 219.

10.8. Multiple Payload Counts (Handled by Control Node 1406)

The control node 1406 can also handle multiple payload counts. If multiple payload counts are encountered within a series of messages without encountering an action list end or new series of entries, the control node 1406 can update its internal burst counter length automatically.

10.9. Long Burst Lengths (Handled by Control Node 1406)

The maximum number of beats handled by the control node 1406 can (for example) be 32. If for some reason the beat length is greater than 32, then in case of termination messages, the control node 1406 can break the beats into smaller subsets. Each subset (for this example) can have a maximum of 32-beats. This scenario is typically encountered when the payload count is set to a value greater than 32 or multiple payload counts are encountered or a series of message continuation messages are encountered without an action list of or new sequence start. For example if the payload count in a sequence is set to 48, then the control node 1406 can break this into a 32-beat sequence followed by a 17-beat sequence (16+1) and send it to the same egress node.

10.10. Messages for Message Pre-Processors 6136-1 to 6136-(R+1)

Message pre-processors 6136-1 to 6136-(R+1) also can handle the HALT_ACK, Breakpoint, Tracepoint, NodeState Response and processor data memory read response messages. When a partition (i.e., 1402-1) sends one of these messages message pre-processor (i.e., 6136-1) can extract the data and store it in the debugger FIFO to be accessed by either the debugger or the host. The format of the HALT_ACK, Breakpoint, Tracepoint, and NodeState Response messages can be seen in FIGS. 220 through 223 (and which are labeled 6600 through 6900, respectively).

Looking first to FIG. 220, HALT_ACK Message 6600 can be seen. This message 6600 generally comprises a header 6602 and data 6604. Segments 6606, 6608, 6610, and 6612 are generally encoding bits, context number, segment ID, and node ID, respectively, while segment 6614 generally reflects the current program counter. When a HALT_ACK message 6600 is received on one of the ingress ports, the control node 1406 can extract the data (which generally includes 2 32-bit data segments or beats) and stores it in the debugger FIFO (accessible via DEBUG_READ_PART Register). Generally, no interrupt is asserted by the control node 1406. Software is generally responsible is maintaining the system synchronization and should read out both the words per ingress node.

In FIG. 221, a Breakpoint Message 6700 can be seen. This message 6700 generally comprises a header 6702 and data 6704. Segments 6706, 6708, 6710, 6712, 6714, and 6716 are generally encoding bits, tracepoint match (which is set to "0"), breakpoint identifier, context number, segment ID, and node ID, respectively, while segment 6718 generally reflects the current program counter. When a Breakpoint message 6700 is received on one of the ingress ports, the control node 1406 can extract the data (which generally includes 2 32-bit data segments or beats) and store it in the debugger FIFO (accessible via DEBUG_READ_PART Register). Generally, an interrupt can be asserted by the control node 1406 to the debugger (host will not generally receive an interrupt). Software should read out both the words per ingress node (i.e., 808-*i*).

Turning to FIG. 222, Tracepoint Message 6800 can be seen. This message 6800 generally comprises a header 6802 and data 6804. Segments 6806, 6808, 6810, 6812, 6814, and 6816 are generally encoding bits, tracepoint match (which is set to "1"), tracepoint identifier, context number, segment ID, and node ID, respectively, while segment 6718 generally reflects the current program counter. When a tracepoint message 6800 is received on one of the ingress ports, the control node 1406 will not general store the data beats. The data beats should be dropped and no indication will be provided.

In FIG. 223, Node State Read Response message 6900 can be seen. This message 6800 generally comprises a header 6802 and data 6804. Segments 6806 and 6808 are generally encoding bits and the number of data words, while segment 6810 generally corresponds to data for subsequent beats. When a node state read response message 6900 is received on one of the ingress ports, the control node 1406 should extract the data beats (1+DATA_COUNT in total) and store it in the debugger FIFO (accessible via DEBUG_READ_PART Register). Generally, no interrupt should asserted by the control node 1406. Software is generally responsible for maintaining the system synchronization and should read out all the words per ingress node.

Turning to FIG. 224, the arbiter 6146 can be seen in greater detail. Generally, the arbiter 6146 (which can operate at least in part as an arbiter for debugger data FIFO 7002) can receive several messages (i.e., 6600, 6700, 6800, or 6900). The internal FIFO size that holds the extracted data beats is typically about 8×32 bit. When the software attempts to an empty FIFO a predefined pattern (0xdeadbeef) should be returned from multiplexer 7004. When the FIFO 7002 is full, no new data beat can be latched into the FIFO 7002. The arbiter 6146 generally enables the control node 1406 to arbitrate the FIFO access by the ingress nodes when there is simultaneous or near simultaneous access to the debugger Data FIFO 7002. The arbiter 6146 generally handles the arbitration in a FIFO-manner. When a second node/partition tries to access the FIFO while it is busy processing another, that node/partition is made to wait until the previous access is complete. The ingress node that is made to wait should not be acknowledged by not asserting the MDATAACCEPT to that node (in the process the node waits).

10.11. Sequencer and Extractor

The sequential processor 6140 generally sequences the access to the control node memory 6114 based at least in part on the indication is receives from various message pre-processors 6136-1 to 6136-(R+1). Processor 6140 initiates sequential access to the control node memory 6140. After the sequencer completes its actions for a termination message, it indicates to the Message forwarder that a message is ready for transmission. Once the message forwarder accepts the message and releases the sequencer 6140, it moves to the next termination message. At the same time it also indicates to the message pre-processor (i.e., 6136-1) that the actions have been completed for the termination message. This in turn triggers the message pre-processor release of the message buffer for accepting new messages.

10.12. Message Forwarder

The message forwarder, as the name indicates, forwards all the messages it receives from the message pre-processors 6136-1 to 6136-(R+1) (forwarding message) as well as the sequencer 6140. The message forwarder block communicates with the OCP master egress block to send the constructed/forwarded message by the control node. Once the corresponding OCP master indicates the completion of the transmission, the message forwarder will the release the corresponding message pre-processor, which will in turn release the message buffer.

10.13. Host Interface and Configuration Registers

The host interface and configuration register module provides the slave interfaces for the host processor 1316 to control the control node 1406. The host interface 1405 is a non-burst single read/write interface to the host processor 1316. It handles both posted and non-posted OCP writes in the same non-posted write manner. In FIGS. 225 to 228, the supported OCP protocol for single writes (posted or non-posted) with idle cycles, back-to-back single writes (posted or non-posted) with no idle cycles, single read with idle cycles, and single read with no idle cycles can, respectively, be seen. Additionally, the SRESP from the control node 1406 shown in FIGS. 225 to 228 shows the best case. In reality, the SRESP should be delayed in case of access to control node memory 6114 or if a debugger access has already started for the control node 1406.

The entries in the action lists 6116 are generally memory mapped for host read or for host write (normally not done). When the entries are to be written, the control node 1406 sends the contents in a "packed" form, which can be seen in FIG. 229. The "packed" format 7100 can be used to represent 41-bit content using 32-bit data lines. For example and as shown, in order to write the 41-bit listentry-0, two writes should be performed by the host. In FIGS. 229 and 230, entries 7102 to 7122 demonstrate the writing of action_list_entry_0 to action_list_entry_N. As shown in this example, the first write should have the lower 32-bits (i.e., bits 31:0) of the action listentry-0 (which can be seen inentry 7102) and the second write will have the upper 9-bits (i.e., bits 40:32), which can occupy the lower bits (i.e., bits 8:0) of theentry 7104. Care should also be taken not to "corrupt" action listentry _1 bits [20:0] while writing the second 32-bit word for action listentry-0. The reverse is also true while writing to actionentry-1. In this case, action listentry-0 upper 9-bits should not be "corrupted."

The control node 1406 would also generally handle the dual writes in certain cases (for example, action listentry-1 bits 20:0 and bits 40:21 of entries 7104 and 7106). Entry-1-1 bits 7104 are written first by the host along withentry-0 bits 7104. In this example, the control node 1406 will first write theentry-0 data 7102 followed byentry-1 data 7104. The host sresp is sent usually after the two writes have been completed.

Additionally, termination headers for nodes 7202 to 7212 and for threads 7214 to 722, which should be written by the host and which is generally a 10-bit header, can be seen in FIG. 231. The control node 1406 can internally handle the concatenation of the headers into lineentry of the control node memory 6114. On the read side the control node 1406 should return the termination header values as shown. The action list entries can be accessed in unpacked format by setting bit-2 of CONTROL_NODE_CNTL Register (set to '0' to read the lower 32-bits and set-1 to read the 9-bits). Typically, there is no "packed" format read support.

10.14. Debugger Interface

The debugger interface 6133 is similar to the host or system interface 1405. It, however, generally has lower priority than the host interface 1405. Thus, whenever there is an access collision between the host interface 1405 and the debugger interface 6133, the host interface 1405 controls. The control node 1406 generally will not send any accept or response signal until the host has completed its access to the control node 1406.

10.15. Message Queue

The control node 1406 can support a message queue 6102 that is capable of handling messages related to update of control node memory 6114 and forwarding of messages that are sent in a packed format by one of the ingress ports or by the host/debugger. The message queue 6102 can be accessed by the host or debugger by writing packed format messages to MESSAGE_QUEUE_WRITE Register. The ingress ports can also access the message queue 6102 by setting the master address to the "b100_11_0001" (OPCODE=4, SEG_ID=3, NODE_ID=1). The message queue 6102 generally expects the payload data (i.e., action_0 to action_N) to be packed format shown in FIG. 232, where the payload data (i.e., action_0 to action_N) is packed in entries 7302 to 7324 in a similar manner to the data in entries 7102 to 7122 of FIG. 229.

Typically, the upper 9-bits in each action (i.e., action_0 to action_N) can indicate to the message queue 6102 what type of action the message queue 6102 should take. As shown in FIG. 233, each action or message is generally comprised of a header (i.e., message opcode 7402, segment ID 7404, and node ID 7406) and a message payload. The upper 9-bits or header can also utilize the special encoding scheme shown for messages 7410 to 7420 in FIG. 233. As shown, the payload count of message 7402 can be used to indicate the burst size of messages forwarded from the message queue 6116 (control node 1406 should add a '1' to it to get the final burst size). The payload count can be ignored for the CONTROL_DMEM_INIT messages. The NOP message (as shown in message 7420) can be used to indicate to the control node 1406 not to act of the current action word. The rest of the messages (shown in messages 7404 to 7410) can performs the same function action list entries described above.

Additionally, the message queue 6116 handles a special action update message 7500 for control node memory 6114 as shown in FIG. 234. As can be seen, this message 3500 generally includes a header 7502 and data 7504. Segments 7506, 7508, and 7510 of data 7504 generally correspond to an encoding bit, upper 9 bits of anentry, and line number in an control node memory 6114. This message 7500 is generally provided to enable line by line update of the control node memory 6114 via the message queue 6102.

10.15. Trace Port

Turning to FIG. 235, an example of the architecture for the trace circuit 7511 for control node 1406 can be seen. This trace architecture 7511 generally comprises a trace message FIFO 7513, a sync message generator 7514, a multiplexer or mux 7515, and an export interface 7516. The sync pattern generator 7514 generates a synchronization pattern (which can, for example be 88 bits) that should not occur with regular data. For example, this pattern can be 10 bytes of 0xFF followed by one byte of 0x00. This often occurs when the trace function of control node 1406 is enabled, during periodic requests, and an external request. Additionally, the sync pattern generator 7514 notifies the message formatter 7512 whenever a synchronization is pending. The export interface 7516 is able to obtain messages from the FIFO 7513, perform packing of transmission, and handles flush requests. The mux 7515 handles arbitration between the FIFO 7513 and generator 7514. The message formatter 7512 performs the following functions: (1) filter out undesired messages; (2) keep track of the origin of the last message sent into the message FIFO to optimize the header if after filtering the next message is from the same originator; (3) reset the last SEG_ID and NODE_ID tracked to zero upon a synchronization event; (4) reset the (for example) 64-bit internal timestamp (the last one sent out) to 0x0 upon a sync request; (5) take processing cluster messages of up to (for example) 32 beats long and organize them into FIFO 7513; (6) identify overflow scenarios in which TPIC message queue is full.

Looking the FIFO 7513, it generally has includes a general messageentry FIFO (i.e., up to 3 header bytes, up to 8 bytes of payload, up to 2 bytes of timestamp and an extension timestamp FIFO (i.e., configurable depth that can support up to 6 additional bytes of timestamp). Typical messages from processing cluster 1400 should have a maximum (for example) of 2 beats of payload and (for example) between 2-3 bytes of header. If a timestamp is present in dense traffic less than (for example) 14 bits of LSB are likely to have changed since the last time it was transmitted. An extension timestamp FIFO can be used to hold up to (for example) 42 additional bits which may be desired in case of a sync request. The number of rows can be 4, 8, or 16, for example. The number of rows in general message FIFO can, for example, be 32+2), 64+2, or 128+2. The area used can be 466 bytes. A minimum of 32 rows is can be employed to ensure two consecutive processing cluster 1400 messages of 32 beats of payload each can be transmitted. The additional 2 rows are to buffer data in case of consecutive synchronization messages being inserted into the data stream. The transmission byte order can also be: H0→H1(if present) →H2(if present)→M(beat0)→LS byte 0→M(beat0) LS byte 1→M (beat0) LS byte 2→M (beat0) LS byte 3→(if present) M (beat1) LS byte 0→ . . . →M (beat1) LS byte 3→TS(7:0) (if present)→TS (15:8) (if present)→(if present) TS(23:16) . . . TS(63:56) (if present)

Turning back to the sync message generator 7514, as stated above, the sync message generator 7514 performs periodic synchronization. Periodic synchronization can use a count of message bytes transmitted (including timestamp as applicable) to be used to determine when sync markers should be added to the datastream. Sync markers are added at message boundaries and the byte count is used as a hint to determine when the markers are desired. Periodic Synchronization is enabled by the following programmable register:

- 31:14 reserved
- 13—Periodic Sync Enable Bit
- 12—Mode Control
  - b0=Count[11:0] defines a value N. Synchronization period is N bytes
  - b1=COUNT[11:7] defines a value N. Synchronization period is 2N bytes. N should be in the range of 12 to 27 inclusive and other values yield unpredictable results.
- 11:0—CountCounter value for the number of bytes between synchronization packets. Reads return the value of this register. This should not be zero when periodic sync is enabled otherwise sync will be added after every message.

Trace messages are typically comprised of a trace header and a trace body. These trace messages can support any number of message continuation fragments so as to support infinitely long message payloads. The message header for first or fragment of a message is a minimum of one byte in length. A second byte is required when the segment and node identifier pair cannot be inferred. A third byte should be sent to transmit the mreqinfo information, if required.

To preserve the order of the header bytes the following combinations are allowed for a trace message:

(1) Header0, header1, header2=>ReqInfo required.

(2) Header0=>No Reqinfo required and destination seg/node id is not required.

(3) Header0, Header1=>No ReqInfo required and destination seg/node id is required.

The message header for any fragment of a multi-fragment message other than first fragment can, for example, be one byte in length. This implementation can reduce bandwidth overhead of splitting multiple beat (greater than 2) payloads across message fragments and can also optimize the header of single fragment messages to reduce bandwidth requirements. This implementation also encodes the timestamp after a message payload in order to eliminate transmission of an additional header with the timestamp. A timestamp is optionally present after the payload of the last fragment of a multi-fragment message or after the first and fragment of a single fragment message. The trace header is typically comprised of three bytes (examples of which are shown in FIGS. 236 to 238).

A trace message may (for example) have up to 32 beats of payload, where each beat can be 32-bits of data. Typically, the FIFO memory can be organized for steady state operation in which typical messages are 1 beat in length, and the length of synchronization sequences (which generally entails breaking up infrequent messages with long payloads with a known patterns that allows sync pattern to be reduced in length) can be reduced. This is due to there being no control over the contents of message payloads which could in essence be from trace perspective arbitrary sequences of '0's and '1's. Additionally, trace message less than or equal to (for example) 2 beats can be comprised of single fragment of the message with payload up to 2 beats and/or variable length timestamp. A trace message that is (for example) longer than 2 beats can be comprised of first fragment of the message with payload up to 2 beats; second and subsequent continuation fragments with payload up to 2 beats; last fragment with payload of up to 2 beats; and variable length timestamp payload. Examples of a trace messages with a 1-beat payload and a one-byte header, a 1-beat payload and a two-byte header, a 2-beat payload and three-byte header, and a 6-beat payload, all with no timestamps, can be seen can be seen in FIGS. 239 to 242, respectively. An example of a timestamp format can be seen in FIG. 243, and example of trace messages having a 1-beat payload with a two-byte header and two time stamps and a 5-beat payload with two bytes of timestamp can be seen in FIGS. 243-245, respectively.

10.16. Clock and Reset 10.16.1. Reset

There can be two sources of reset to the control node 1406. The primary source is generally the asynchronous reset provided to the control node 1406. The second source is generally the internal soft reset performed by the host/debugger. FIG. 246 shown the rest strategy for the control node 1406.

10.16.2. Clock

The control node 1406 generally operates in a single clock domain, which is shown in FIG. 247. The first ICG is used to control the ATB clock and the second ICG is used to control the clock to the action list RAM. The following figure shows the two ICGs in the control node 1406. The trace port logic clock is controlled by the atclken in functional mode. This signal is provided to the control node by an input port. Similarly the action RAM clock is controlled by internal logic. The clock to the RAM is enabled when the RAM is accessed by the internal logic. This is done to conserve power consumed by the RAM during idle periods. In DFT mode the clocks to the respective domains can be enabled by setting the *TE pins to '1' thereby bypassing the internal logic control. Examples of the clocking system can be seen in FIG. 247.

10.17. Power Management

The control node 1406 generally controls the clocks of the downstream module (as shown in FIG. 248) by sending a downstream clock enable signal per egress port. These signals can be controlled by the EGRESS_CLOCK_COUNT Register. When bit-31 (for example) of this register is set, each egress port clock counter is enabled. When the counter reaches the a predetermined maximum value given by lower 31-bits (for example) in the register, the clock enable signals are set to '0' indicating to the respective downstream module to turn off their clocks. The internal clock counter corresponding to each port is reset to '0' every time there is a message that should be sent on that port. As a result of that the clock control signals are set to '1'.

10.18. Interrupts

The control node 1406 typically includes two interrupt lines. These interrupts are generally, active low interrupts and, for example, are a host interrupt and a debug interrupt. An example of a generic integration can be seen in FIG. 249.

The host interrupt can be asserted because of the following events: if the action list encoding at the end of a series of action list actions is action list end with host interrupt; if the actions processed by the message queue has a action list end with host interrupt; or if the event translator indicates an underflow or overflow status. In these cases the host apart from reading the HOST_IRQSTATUS_RAW Register and HOST_IRQSTATUS, also can read the FIFO accessible by reading the ACTION_HOST_INTR_Register for interrupts caused by action events. For events caused by the event translator, the host (i.e., 1316) reads the ET_HOST_INTR register. The interrupt can be enabled by writing '1' to HOST_IRQENABLE_SET Register. The enabled interrupt can be disabled by writing '1' to HOST_IRQSTATUS_CLR Register. When the host has completed processing the interrupt, it is generally expected to write '0' to HOST_IRQ_EOI Register. In addition to these, the interrupt can be asserted for test purpose by writing a '1' to the bits of the HOST_IRQSTATUS_RAW Register (after enabling the interrupt using the HOST_IRQENABLE_SET Register). In order to clear the interrupt, the host should to write a '1' to HOST_IRQSTATUS register. This is normally used to test the assertion and deassertion of the interrupt. In normal mode, the interrupt should stay asserted as long as the FIFOs pointed to by ACTION_HOST_INTR register and ET_HOST_INTR register are not empty. Software is generally responsible for reading all the words from the FIFO and can obtain the status of the FIFOs by reading either the CONTROL_NODE_STATUS register or ET_STATUS register.

The debug interrupt can be asserted because of the following events: if the action list encoding at the end of a series of action list actions is action list end with debug interrupt; if the actions processed by the message queue has a action list end with debug interrupt; of if the event translator indicates an underflow or overflow status. In these cases, the host/debugger apart from reading the DEBUG_IRQSTATUS_RAW Register and DEBUG_IRQSTATUS Register, also can to read the FIFO accessible by reading the DEBUG_HOST_INTR Register for interrupts caused by action event. For events caused by the event translator, the host (i.e., 1316) reads the ET_DEBUG_INTR register. In this cases the debugger apart from reading the DEBUG_IRQSTATUS_RAW Register and DEBUG_IRQSTATUS Register, also can read the FIFO accessible by reading the DEBUG_READ_PART Register. The interrupt should be enabled by writing '1' to one of the bits in DEBUG_IRQENABLE_SET Register. The enabled interrupt can be disabled by writing '1' to DEBUG_IRQENABLE_CLR Register. When the debugger has completed processing the interrupt, it should be expected to write '1' to DEBUG_IRQ_EOI Register. In addition to these, the interrupt can be asserted for test purpose by writing a '1' to the bits of the DEBUG_IRQSTATUS_RAW Register (after enabling the interrupt using the DEBUG_IRQENABLE_SET Register). In order to clear the interrupt, the host should to write a '1' to corresponding bit in DEBUG_IRQSTATUS Register. This is normally used to test the assertion and deassertion of the interrupt. In normal mode, the interrupt should remain asserted as long as the FIFO pointed to by DEBUG_HOST_INTR register and ET_DEBUG_INTR register are is not empty. Software is generally responsible for reading all the words from the FIFO and can obtain the status of the FIFOs by reading either the CONTROL_NODE_STATUS register or ET_STATUS register.

The event translator, whenever it detects an overflow or underflow condition while handling interrupts from external IP, will assert et_interrupt_en along with the vector number and overflow/underflow indication to the control node. The control node 1406 buffers these indications in a FIFO for host or debugger to read. When an overflow/underflow indication comes from the ET block, the control node 1406 stores the overflow/underflow indication along with the vector number in the FIFO and indicates to the host/debugger via interrupt an error has occurred. The host or debugger is responsible for reading the corresponding FIFOs. An example of error handling by the event translator (which is described in detail below) can be seen in FIG. 250.

10.19. Examples of Message Used by the Control Node 1406

Turning to FIG. 251, an example of a node instruction memory initialization message 7520 can be seen. The instruction memory (i.e., 1401-1) of the node identified in the header is updated with instruction lines supplied over the data interconnect 814. Interconnect 814 is used for bandwidth, because instructions can be very wide. Updating begins at the instruction memory line identified by Start_Line in the respective instruction memory (i.e., 1401-1), and proceeds until a Set_Valid is signaled on the interconnect 814 (with the last transfer).

Turning to FIG. 252, an example of a node control initialization message 7521 can be seen. This message 7521 can directly initialize the local node processor context descriptors and the SIMD data memory context and destination descriptors. (The rest of the Context State RAM is managed by the wrapper, based on this information and information in the node scheduling message.) It initializes the number of context and destination descriptors, given by the #Contexts field.

Turning to FIG. 253, an example of a GLS control initialization message 7522 can be seen. This message 7522 can directly initialize the GLS processor context descriptor area and destination list in the GLS data memory 5403. It generally initializes the number of context descriptors, given by the #Contexts field, and the number of destination-list entries, given by the #Dests field.

Turning to FIG. 254, an example of an SFM control initialization message 7523 can be seen. This message 7523 can directly initialize the SFM data memory context descriptors, function-memory table descriptors, vector-memory/function-memory context descriptors, and destination descriptors. It initializes the number of context and destination descriptors given by the #Contexts field and the number of table-descriptor entries given by the #Tables field.

Turning to FIG. 255, an example of an SFM function-memory initialization message 7524 can be seen. The function-memory (which is described below) can (for example) be updated with 16×16-bit data packets, supplied over the data interconnect 814. This message 7524 is distinguished from an SFM Control Initialization message 7523 by the upper bit of the payload being 0'b. Updating begins at the location identified by Start_Address (bank-aligned) in the function-memory, and proceeds until a Set_Valid is signaled on the global interconnect (with the last transfer).

Turning to FIG. 256, an example of a control node configuration read thread message 7525 can be seen. This message 7525 can cause direct interpretation of the actions in the message by the Control Node 1406. The GLS unit 1408 can reads these actions from a message structure in system memory and transmits the actions to the Control Node 1406, where the actions are formatted and placed onto the Message Processing Queue. Entries in this queue are processed in order, and the resulting messages distributed throughout processing cluster 1400. This permits initialization of processing cluster 1400 by the message structure, instead of relying on a host processor 1316, and the final action can result in an interrupt to the host processor 1316 to notify the end of initialization. Processing continues until a decodedentry indicates the end of the list: this can optionally interrupt the host processor 1316 or debugger.

Turning to FIG. 257, an example of an update data memory message 7526 can be seen. This message 7526 can enable a source node to modify processor state in another node. For example, GLS unit 1408 can use this message (instead of the data interconnect 814) to modify nodes' processor data memory, e.g., to set input parameters, or local context such as circular-buffer addressing information.

Turning to FIG. 258, an example of an update action list RAM message 7527 can be seen. This message 7527 can enable the host processor 1316 to modify the Action List RAM, for functions such as interrupting continuous processing. The host processor 1316 can writes this message into the Message Processing Queue, in a packed format.

Turning to FIG. 259, an example of a schedule node program message 7528 can be seen. This message 7528 can schedule a program at the node indicated in the header. The payload contains program parameters and enables termination when the program ends (instead of using dataflow termination). Up to (for example) eight programs may be scheduled at the same time on a node, and up to (for example) sixteen on an SFM node, and the node multi-tasks between them.

11. Shared Function-Memory

Turning to FIG. 260, the shared function-memory 1410 can be seen. The shared function-memory 1410 is generally a large, centralized memory supporting operations that are not well-supported by the nodes (i.e., for cost reasons). The main component of the shared function-memory 1410 are the two large memories: the function-memory 7602 and the vector-memory 7603 (each of which has a configurable size between, for example 48 to 1024 Kbytes and organization). This function-memory 7602 implements a synchronous, instruction-driven implementation of high-bandwidth, vector-based lookup-tables (LUTs) and histograms. The vector-memory 7603 can support operations by (for example) a 6-issue processor (i.e., SFM processor 7614) that employs vector instructions (as detailed in section 8 above), which can, for example, be used for block-based pixel processing. Typically, this SFM processor 7614 can be accessed using the messaging interface 1420 and data bus 1422. The SFM processor 7614 can, for example, operate on wide pixel contexts (64 pixels) that can have a much more general organization and total memory size than SIMD data memory in the nodes, with much more general processing applied to the data. It supports scalar, vector, and array operations on standard C++ integer datatypes as well as operations on packed pixels that are compatible with various datatypes. For example and as shown, the SIMD data paths associated with the vector memory 7603 and function-memory 7602 generally include ports 7605-1 to 7605-Q and functional units 7605-1 to 7605-P.

The function-memory 7602 and vector-memory 7603 are generally "shared" in the sense that all processing nodes (i.e., 808-*i*) can access function-memory 7602 and vector-memory 7603. Data provided to the function-memory 7602 can be accessed via the SFM wrapper (typically in a write-only manner). This sharing is also generally consistent with the context management described above for processing nodes (i.e., 808-*i*). Data I/O between processing nodes and shared function-memory 1410 also uses the dataflow protocol, and processing nodes, typically, cannot directly access vector-memory 7603. The shared function-memory 1410 can also write to the function-memory 7602, but not while it is being accessed by processing nodes. Processing nodes (i.e., 808-*i*) can read and write common locations in function-memory 7602, but (usually) either as read-only LUT operations or write-only histogram operations. It is also possible for a processing node to have read-write access to a function-memory 7602 region, but this should be exclusive for access by a given program.

11.1. IO and Ports

In Table 29 below, an example of a partial list of example IO signals, pins, or lead of the shared function-memory 1410 can be seen

TABLE 29

| Name | Bits | I/O | Connects from/to | Description |
|---|---|---|---|---|
| | | Global Pins | | |
| clk | 1 | Input | | SFM global Clock (OCP Clock 400 MHZ) |
| reset_n | 1 | Input | | System Reset signal (active low) for internal core |

TABLE 29-continued

| Name | Bits | I/O | Connects from/to | Description |
|---|---|---|---|---|
| ocp__sfm__master__clken | 1 | output | | func__clk__enable [SFM__CLKEN__W-1: 0] Implemented for OCP Masters, |
| ocp__sfm__slave__clken | 1 | input | | func__clk__enable [SFM__CLKEN__W-1: 0] Iplemented for OCP Slaves, |
| sfm__clkgen__te | 1 | input | | test__clk__enable [SFM__CLKGEN__W-1: 0] inputs are implemented for OCP Slaves, |
| ocp__sfm__clkrate | 1 | input | prcm | Indication for ½ OCP rate 1–> Full-Rate, 0–> Half-Rate, |
| Master OCP Interconnect | | | | |
| ocp__sfm__pixel__mcmd | 3 | output | Interconnect 814 | |
| ocp__sfm__pixel__maddr | 18 | output | Interconnect 814 | |
| ocp__sfm__pixel__mreqinfo | 32 | output | Interconnect 814 | |
| ocp__sfm__pixel__mburstlen | 4 | output | Interconnect 814 | |
| ocp__sfm__pixel__mdata | 256 | output | Interconnect 814 | |
| ocp__sfm__pixel__mdata__valid | 1 | output | Interconnect 814 | |
| ocp__sfm__pixel__mdata__last | 1 | output | Interconnect 814 | |
| ocp__sfm__pixel__clken | 1 | output | interconnect 814 | |
| ocp__pintercon__sfm__scmdaccept | 1 | input | Interconnect 814 | |
| ocp__pintercon__sfm__sdataaccept | 1 | input | Interconnect 814 | |
| Slave OCP Interconnect | | | | |
| ocp__pintercon__sfm__mcmd | 3 | input | Interconnect 814 | |
| ocp__pintercon__sfm__maddr | 18 | input | Interconnect 814 | |
| ocp__pintercon__sfm__mreqinfo | 32 | input | Interconnect 814 | |
| ocp__pintercon__sfm__mburstlen | 4 | input | Interconnect 814 | |
| ocp__pintercon__sfm__mdata | 256 | input | Interconnect 814 | |
| ocp__pintercon__sfm__mdata__valid | 1 | input | Interconnect 814 | |
| ocp__pintercon__sfm__mdata__last | 1 | input | Interconnect 814 | |
| ocp__pintercon__sfm__clken | 1 | input | Interconnect 814 | |
| ocp__sfm__pixel__scmdaccept | 1 | output | Interconnect 814 | |
| ocp__sfm__pixel__sdataaccept | 1 | output | Interconnect 814 | |
| Master OCP Control Node | | | | |
| ocp__sfm__msg__mcmd | 3 | output | Control Node 1406 | |
| ocp__sfm__msg__maddr | 9 | output | Control Node 1406 | |
| ocp__sfm__msg__mreqinfo | 4 | output | Control Node 1406 | |
| ocp__sfm__msg__mburstlen | 6 | output | Control Node 1406 | |
| ocp__sfm__msg__mdata | 32 | output | Control Node 1406 | |
| ocp__sfm__msg__mdata__valid | 1 | output | Control Node 1406 | |
| ocp__sfm__msg__mdata__last | 1 | output | Control Node 1406 | |
| ocp__sfm__msg__clken | 1 | output | Control Node 1406 | |

TABLE 29-continued

| Name | Bits | I/O | Connects from/to | Description |
|---|---|---|---|---|
| ocp__mintercon__sfm__scmdaccept | 1 | input | Control Node 1406 | |
| ocp__mintercon__sfm__sresp | 2 | input | Control Node 1406 | |
| ocp__mintercon__sfm__sresplast | 1 | input | Control Node 1406 | |
| ocp__mintercon__sfm__sdataaccept | 1 | input | Control Node 1406 | |
| sdata | | | | |
| Slave OCP Control Node | | | | |
| ocp__mintercon__sfm__mcmd | 3 | input | Control Node 1406 | |
| ocp__mintercon__sfm__maddr | 9 | input | Control Node 1406 | |
| ocp__mintercon__sfm__mreqinfo | 4 | input | Control Node 1406 | |
| ocp__mintercon__sfm__mburstlen | 6 | input | Control Node 1406 | |
| ocp__mintercon__sfm__mdata | 32 | input | Control Node 1406 | |
| ocp__mintercon__sfm__mdata__valid | 1 | input | Control Node 1406 | |
| ocp__mintercon__sfm__mdata__last | 1 | input | Control Node 1406 | |
| ocp__mintercon__sfm__clken | 1 | input | Control Node 1406 | |
| ocp__sfm__msg__scmdaccept | 1 | output | Control Node 1406 | |
| ocp__sfm__msg__sresp | 2 | output | Control Node 1406 | |
| ocp__sfm__msg__sresplast | 1 | output | Control Node 1406 | |
| ocp__sfm__msg__sdataaccept | 1 | output | Control Node 1406 | |
| sdata | | | | |
| Slave OCP Partition x | | | | |
| ocp__partx__luthis__mcmd | 3 | input | Partition x | |
| ocp__partx__luthis__maddr | 256 | input | Partition x | MAddr = 256 * # of nodes |
| ocp__partx__luthis__mreqinfo | 9 | input | Partition 0 | MReqinfo:<br>0: LUT/HIST indication<br>1: LUT<br>0: HIST<br>2:1: Packed/unpacked<br>00: packed addr and 16 bit data<br>01: unpacked address and 16 bit data<br>11: unpacked address and 32 bit data<br>4:3: HIST has weight<br>00: Incr<br>01: weight<br>10: store<br>8:5: LUT/HIST type<br>4 bits identify the type of LUT/HIST (TPIC Interconnect Functional Specification) |
| ocp__partx__luthis__mburstlen | 3 | input | Partition 0 | |
| ocp__partx__luthis__mdata | 256 | input | Partition 0 | MWdata = 256* # of nodes |
| ocp__partx__luthis__mbyteen | 4(was1) | input | Partition 0 | MByteen—enables 256 bit portions |
| ocp__partx__luthis__clken | 1 | input | Partition 0 | |
| ocp__luthis__partx__scmdaccept | 1 | output | Partition 0 | |
| ocp__luthis__partx__sresp | 2 | output | Partition 0 | |
| ocp__luthis__partx__sdata | 256 | output | Partition 0 | |
| ocp__luthis__partx__sbyteen | 4 | output | Partition 0 | |

In Table 30 below, an example of a partial list of example slave OCP ports of the shared function-memory 1410 can be seen

TABLE 30

| | Value options | Default | Value |
|---|---|---|---|
| Interface information | | | |
| Interface name | characters and "_" | No default | Global Interconnect |
| Interface type | master/slave | No default | Slave |
| Interface timing | synchronous/ asynchronous | synchronous | synchronous |
| Profile parameter name | | | |
| ReadCapable | boolean | 1 | 0 |
| WriteCapable | boolean | 1 | 1 |
| WriteNonPostCapable | boolean | 1 | 0 |
| LazySynchronisation | boolean | 0 | 0 |
| DataWidth | in (32-64-128-256) | 64 | 256 |
| AddrWidth | in (4-40) | 32 | 18 |
| RespAccept | boolean | 1 | 0 |
| AddrSpaces | in (1-4) | 1 | 0 |
| ForceAligned | boolean | 0 | 0 |
| ReqInfos | in (0-32) | 0 | 18 |
| RespInfos | in (0-32) | 0 | 0 |
| BurstAligned | boolean | 0 | 0 |
| BurstSize (words) | in (1, 2, 4, 8, 16, 32) | 8 | 4 |
| WrapBursts | boolean | 1 | 0 |
| ConnIdWidth | in (0-8) | 0 | 0 |
| NrTags | in (1-256) | 16 | 1 |
| EndianNess | in (neutral, little, big, both) | little | little |
| StreamBursts | boolean | 0 | 0 |
| WriteResp | boolean | 1 | 0 |
| DividedClock | boolean | 0 | 0 |

In Table 31 below, an example of a partial list of example slave OCP port configurations of the shared function-memory 1410 can be seen.

TABLE 31

| OCP parameter name | OCP parameter value | OCP default value | Value options |
|---|---|---|---|
| broadcast__enable | 0 | 0 | boolean |
| burst__aligned | 0 | 0 | boolean |
| burstseq__blck__enable | 0 | 0 | boolean |
| burstseq__dflt1__enable | 0 | 0 | boolean |
| burstseq__dflt2__enable | 0 | 0 | boolean |
| burstseq__incr__enable | 1 | 1 | boolean |
| burstseq__strm__enable | 0 | 0 | boolean |
| burstseq__unkn__enable | 0 | 0 | boolean |
| burstseq__wrap__enable | 0 | 0 | boolean |
| burstseq__xor__enable | 0 | 0 | boolean |
| endian | little | little | |
| force__aligned | 0 | 0 | boolean |
| mthreadbusy__exact | 0 | 0 | boolean |
| rdlwrc__enable | 0 | 0 | boolean |
| read__enable | 0 | 1 | boolean |
| readex__enable | 0 | 0 | boolean |
| sdatathreadbusy__exact | 0 | 0 | boolean |
| sthreadbusy__exact | 0 | 0 | boolean |
| tag__interleave__size | 0 | 1 | |
| write__enable | 1 | 1 | boolean |
| writenonpost__enable | 0 | 0 | boolean |
| datahandshake | 1 | 0 | boolean |
| reqdata__together | 0 | 0 | boolean |
| writeresp__enable | 0 | 0 | boolean |
| addr | 1 | 1 | boolean |
| addr__wdth | 18 | | integer |

TABLE 31-continued

| OCP parameter name | OCP parameter value | OCP default value | Value options |
|---|---|---|---|
| addrspace | 0 | 0 | boolean |
| addrspace__wdth | 1 | | integer |
| atomiclength | 0 | 0 | integer |
| atomiclength__wdth | 0 | | integer |
| blockheight | 0 | 0 | boolean |
| blockheight__wdth | 0 | | integer |
| blockstride | 0 | 0 | boolean |
| blockstride__wdth | 0 | | integer |
| burstlength | 1 | 0 | boolean |
| burstlength__wdth | 4 | | integer |
| burstprecise | 0 | 0 | boolean |
| burstseq | 0 | 0 | boolean |
| burstsinglereq | 0 {tie__off 1} | 0 | boolean |
| byteen | 0 | 0 | boolean |
| cmdaccept | 1 | 1 | boolean |
| connid | 0 | 0 | boolean |
| connid__wdth | 0 | | integer |
| dataaccept | 1 | 0 | boolean |
| datalast | 1 | 0 | boolean |
| datarowalast | 0 | 0 | boolean |
| data__wdth | 256 | | integer |
| enableclk | 0 | 0 | boolean |
| mdata | 1 | 1 | boolean |
| mdatabyteen | 0 | 0 | boolean |
| mdatainfo | 0 | 0 | boolean |
| mdatainfo__wdth | 0 | | integer |
| mdatainfobyte__wdth | 0 | | integer |
| mthreadbusy | 0 | 0 | boolean |
| mthreadbusy__pipelined | 0 | 0 | boolean |
| reqinfo | 1 | 0 | boolean |
| reqinfo__wdth | 18 | | integer |
| reqlast | 0 | 0 | boolean |
| reqrowlast | 0 | 0 | boolean |
| resp | 1 | 1 | boolean |
| respaccept | 0 | 0 | boolean |
| respinfo | 0 | 0 | boolean |
| respinfo__wdth | 1 | | integer |
| resplast | 1 | 0 | boolean |
| resprowlast | 0 | 0 | boolean |
| sdata | 0 | 1 | boolean |
| sdatainfo | 0 | 0 | boolean |
| sdatainfo__wdth | 0 | | integer |
| sdatainfobyte__wdth | 0 | | integer |
| sdatathreadbusy | 0 | 0 | boolean |
| sdatathreadbusy__pipelined | 0 | 0 | boolean |
| sthreadbusy | 0 | 0 | boolean |
| sthreadbusy__pipelined | 0 | 0 | boolean |
| tags | 1 | 1 | boolean |
| taginorder | 0 | 0 | boolean |
| threads | 1 | 1 | boolean |
| control | 0 | 0 | boolean |
| controlbusy | 0 | 0 | boolean |
| control__wdth | 0 | | integer |
| controlwr | 0 | 0 | boolean |
| interrupt | 0 | 0 | boolean |
| merror | 0 | 0 | boolean |
| mflag | 0 | 0 | boolean |
| mflag__wdth | 0 | | integer |
| mreset | 0 | | integer |
| serror | 0 | 0 | boolean |
| sflag | 0 | 0 | boolean |
| sflag__wdth | 0 | | integer |
| sreset | 1 | | integer |
| status | 0 | 0 | boolean |
| statusbusy | 0 | 0 | boolean |
| statusrd | 0 | 0 | boolean |
| status__wdth | 0 | | integer |

In Table 32 below, an example of a partial list of example master OCP ports of the shared function-memory 1410 can be seen.

TABLE 32

| | Value options | Default | Value |
|---|---|---|---|
| Interface information | | | |
| Interface name | characters and "_" | No default | global_ interconnect |
| Interface type | master/slave | No default | master |
| Interface timing | synchronous/ asynchronous | synchronous | synchronous |
| Profile parameter name | | | |
| ReadCapable | boolean | 1 | 0 |
| WriteCapable | boolean | 1 | 1 |
| WriteNonPostCapable | boolean | 1 | 0 |
| LazySynchronisation | boolean | 0 | 0 |
| DataWidth | in (32-64-128-256) | 64 | 256 |
| AddrWidth | in (4-40) | 32 | 18 |
| RespAccept | boolean | 1 | 0 |
| AddrSpaces | in (1-4) | 1 | 0 |
| ForceAligned | boolean | 0 | 0 |
| ReqInfos | in (0-32) | 0 | 18 |
| RespInfos | in (0-32) | 0 | 0 |
| BurstAligned | boolean | 0 | 0 |
| BurstSize (words) | in (1, 2, 4, 8, 16, 32) | 8 | 4 |
| WrapBursts | boolean | 1 | 0 |
| ConnIdWidth | in (0-8) | 0 | 0 |
| NrTags | in (1-256) | 16 | 1 |
| EndianNess | in (neutral, little, big, both) | little | little |
| StreamBursts | boolean | 0 | 0 |
| WriteResp | boolean | 1 | 0 |
| DividedClock | boolean | 0 | 0 |

In Table 33 below, an example of a partial list of example master OCP port configurations of the shared function-memory 1410 can be seen.

TABLE 33

| OCP parameter name | OCP parameter value | OCP default value | Value options |
|---|---|---|---|
| broadcast_enable | 0 | 0 | boolean |
| burst_aligned | 0 | 0 | boolean |
| burstseq_blck_enable | 0 | 0 | boolean |
| burstseq_dflt1_enable | 0 | 0 | boolean |
| burstseq_dflt2_enable | 0 | 0 | boolean |
| burstseq_incr_enable | 1 | 1 | boolean |
| burstseq_strm_enable | 0 | 0 | boolean |
| burstseq_unkn_enable | 0 | 0 | boolean |
| burstseq_wrap_enable | 0 | 0 | boolean |
| burstseq_xor_enable | 0 | 0 | boolean |
| endian | little | little | |
| force_aligned | 0 | 0 | boolean |
| mthreadbusy_exact | 0 | 0 | boolean |
| rdlwrc_enable | 0 | 0 | boolean |
| read_enable | 0 | 1 | boolean |
| readex_enable | 0 | 0 | boolean |
| sdatathreadbusy_exact | 0 | 0 | boolean |
| sthreadbusy_exact | 0 | 0 | boolean |
| tag_interleave_size | 0 | 1 | integer |
| write_enable | 1 | 1 | boolean |
| writenonpost_enable | 0 | 0 | boolean |
| datahandshake | 1 | 0 | boolean |
| reqdata_together | 0 | 0 | boolean |
| writeresp_enable | 0 | 0 | boolean |
| addr | 1 | 1 | boolean |
| addr_wdth | 18 | | integer |
| addrspace | 0 | 0 | boolean |
| addrspace_wdth | 1 | | integer |
| atomiclength | 0 | 0 | integer |
| atomiclength_wdth | 0 | | integer |
| blockheight | 0 | 0 | boolean |
| blockheight_wdth | 0 | | integer |
| blockstride | 0 | 0 | boolean |
| blockstride_wdth | 0 | | integer |

TABLE 33-continued

| OCP parameter name | OCP parameter value | OCP default value | Value options |
|---|---|---|---|
| burstlength | 1 | 0 | boolean |
| burstlength_wdth | 4 | | integer |
| burstprecise | 0 | 0 | boolean |
| burstseq | 0 | 0 | boolean |
| burstsinglereq | 0 {tie_off 1} | 0 | boolean |
| byteen | 0 | 0 | boolean |
| cmdaccept | 1 | 1 | boolean |
| connid | 0 | 0 | boolean |
| connid_wdth | 0 | | integer |
| dataaccept | 1 | 0 | boolean |
| datalast | 1 | 0 | boolean |
| datarowalast | 0 | 0 | boolean |
| data_wdth | 256 | | integer |
| enableclk | 0 | 0 | boolean |
| mdata | 1 | 1 | boolean |
| mdatabyteen | 0 | 0 | boolean |
| mdatainfo | 0 | 0 | boolean |
| mdatainfo_wdth | 0 | | integer |
| mdatainfobyte_wdth | 0 | | integer |
| mthreadbusy | 0 | 0 | boolean |
| mthreadbusy_pipelined | 0 | 0 | boolean |
| reqinfo | 1 | 0 | boolean |
| reqinfo_wdth | 18 | | integer |
| reqlast | 0 | 0 | boolean |
| reqrowlast | 0 | 0 | boolean |
| resp | 1 | 1 | boolean |
| respaccept | 0 | 0 | boolean |
| respinfo | 0 | 0 | boolean |
| respinfo_wdth | 1 | | integer |
| resplast | 1 | 0 | boolean |
| resprowlast | 0 | 0 | boolean |
| sdata | 0 | 1 | boolean |
| sdatainfo | 0 | 0 | boolean |
| sdatainfo_wdth | 0 | | integer |
| sdatainfobyte_wdth | 0 | | integer |
| sdatathreadbusy | 0 | 0 | boolean |
| sdatathreadbusy_pipelined | 0 | 0 | boolean |
| sthreadbusy | 0 | 0 | boolean |
| sthreadbusy_pipelined | 0 | 0 | boolean |
| tags | 1 | 1 | boolean |
| taginorder | 0 | 0 | boolean |
| threads | 1 | 1 | boolean |
| control | 0 | 0 | boolean |
| controlbusy | 0 | 0 | boolean |
| control_wdth | 0 | | integer |
| controlwr | 0 | 0 | boolean |
| interrupt | 0 | 0 | boolean |
| merror | 0 | 0 | boolean |
| mflag | 0 | 0 | boolean |
| mflag_wdth | 0 | | integer |
| mreset | 1 | | integer |
| serror | 0 | 0 | boolean |
| sflag | 0 | 0 | boolean |
| sflag_wdth | 0 | | integer |
| sreset | 0 | | integer |
| status | 0 | 0 | boolean |
| statusbusy | 0 | 0 | boolean |
| statusrd | 0 | 0 | boolean |
| status_wdth | 0 | | integer |

11.2. LUTs and Histograms

In FIG. 260, the example of shared function-memory 1410 there are ports 7624-1 to 7624-R for node access (the actual number is configurable, but there is typically one port per partition). The ports 7624-1 to 7624-R are generally organized to support parallel access, so that all datapaths in the node SIMD, from any given node, can perform a simultaneous LUT or histogram access.

The function-memory 7602 organization in this example has 16 banks containing 16, 16-bit pixels each. It can be assumed that there is a lookup table or LUT of 256 entries, aligned starting at bank 7608-1. The nodes present input vectors of pixel values (16 pixels per cycle, 4 cycles for an entire node), and the table is accessed in one cycle using vector elements to access the LUT. Since this table is represented on a single line of each bank (i.e., 7608-1 to 7608-J), all nodes can perform a simultaneous access because no element of any vector can create a bank conflict. The result vector is created by replicating table values into elements of the result vector. For each element in the result vector, the result value is determined by the LUTentry selected by the value of the corresponding element of the input vector. If, at any given bank (i.e., 7608-1 to 7608-J), input vectors from two nodes create different LUT indexes into the same bank, the bank access is prioritized in favor of the least recent input, or, if all inputs occur at the same time, the left-most port input. Bank conflicts are not expected to occur very often, or to have much if any effect on throughput. There are several reasons for this:

- Many tables are small compared to the total number of entries (i.e., 256) that can be accessed at the same time in the same table.
- Input vectors are usually from relatively small, local horizontal regions of pixels (for example), and the values are not generally expected to have much variation (which should not cause much variation in LUT index). For example, if the image frame is 5400 pixels wide, the input vector of 16 pixels per cycle represents less than 0.3% of the total scan-line.
- Finally, the processor (i.e., 4322) instruction that accesses the LUT is decoupled from the instruction that uses the result of the LUT operation. The processor (i.e., 4322) compiler attempts to schedule the use as far as possible from the initial access. If there is sufficient separation between LUT access and use, there are no stalls even when a few additional cycles are taken by LUT bank conflicts.

Within a partition, one node (i.e., node 808-*i*) usually accesses the function memory 7602 at any given time, but this should not have a significant affect on performance. Nodes (i.e., node 808-*i*) executing the same program are at different points in the program, and distribute access to a given LUT in time. Even for nodes executing different programs, LUT access frequency is low, and there is a very low probability of a simultaneous access to different LUTs at the same time. If this does occur, the impact is generally minimized because the compiler schedules LUT access as far as possible from the use of the results.

Nodes in different partitions can access function memory 7602 at the same time, assuming no bank conflicts, but this should rarely occur. If, at any given bank, input vectors from two partitions create different LUT indexes into the same bank, the bank access is prioritized in favor of the least recent input, or, if all inputs occur at the same time, the left-most port input (e.g. Port 0 is prioritized over Port 1).

Histogram access is similar to LUT access, except that there is no result returned to the node. Instead, the input vectors from the nodes are used to access histogram entries, these entries are updated by an arithmetic operation, and the result placed back into the histogram entries. If multiple elements of the input vector select the same histogramentry, thisentry is updated accordingly: for example, if three input elements select a given histogramentry, and the arithmetic operation is a simple increment, the histogramentry can be incremented by 3. Histogram updates can typically take one of three forms:

- The entries can be incremented by a constant in the histogram instruction.
- The entries can be incremented by the value of a variable in a register within a processor (i.e., 4322).
- The entries can be incremented by a separate weight vector that is sent with the input vector. For example, this can weight the histogram update depending on the relative positions of pixels in the input vector.

The format of the LUT and histogram table descriptors 7700 is shown in FIG. 261. Each descriptor 7700 can specify the base address of the associated table (bank-aligned) 7704, the size of the input data used to form the indexes 7702, and two, 16-bit (for example) masks 7706 and 7708 used to form indexes into this table relative to the base address. The masks 7706 and 7708 generally determine which bits of the pixel(s) (for example) can be selected to form indexes—any contiguous bits—and thus indirectly indicates the table size. When a node executes a LUT or Histogram instruction, it typically uses a 4-bit field to select the descriptor 7700. The instruction determines the operation on the table, so LUTs and histograms can be in any combination. For example, a node (i.e., 808-*i*) can access histogram entries by performing a lookup-table operation into the histogram. The table descriptors 7700 can be initialized as part of SFM data memory 7618 initialization. However, these values can also be copied to hardware descriptors, so that LUT and histogram operations can access the descriptors, in parallel if desired, without requiring an access to SFM data memory 7618.

11.3. Shared Function-Memory Processing

Turning back to FIG. 260, the SFM processor 7616 generally provides for general programming access to relatively wide (for example) pixel contexts in a large region of the function-memory 7602. This can includes: (1) general vector and array operations; (2) operations on horizontal groups of pixels (for example), compatible with Line datatypes; and (3) operations on (for example) pixels in Block datatypes, which can support two-dimensional access for data such as video macroblocks or rectangular regions of a frame. Thus, processing cluster 1400 can support both scan-line-based and block-based pixel processing. The size of function-memory 7602 is also configurable (i.e., from 48 to 1024 Kbytes). Typically, a small portion of this memory 7602 is taken for LUT and histogram use, so the remaining memory can be used for general vector operations on banks 7608-1 to 7608-J, including and for example vectors of related pixels.

As shown, SFM processor 7614 uses a RISC processor (as described in sections 7 and 8 above) for 32-bit (for example) scalar processing (i.e., two-issue in this case), and extends the instruction set architecture to support vector and array processing (as described in section 8 above) in (for example) 16, 32-bit datapaths, which can also operate on packed, 16-bit data for up to twice the operational throughput, and on packed, 8-bit data for up to four times the operational throughput. The SFM processor 7614 permits the compilation of any C++ program, while making available the ability to perform operations (for example) on wide pixel contexts, compatible with pixel datatypes (Line, Pair, and uPair). SFM processor 7614 also can provide more general data movement between (for example) pixel positions, rather than the limited side-context access and packing provided by process 4322, including both in the horizontal and vertical directions. This generality, compared to node processor 4322, is possible because SFM processor 7614 uses the 2-D access capability of the functional memory 7302, and because it can support a load and a store every cycle instead of four loads and two stores.

SFM processor 7614 can perform operations such as motion estimation, resampling, and discrete-cosine transform, and more general operations such as distortion correction. Instruction packets can be 120 bits wide (as described in section 8 above), providing for up to parallel issue of two scalar and four vector operations in a single cycle. In code regions where there is less instruction parallelism, scalar and vector instructions can be executed in any combination less than six wide, including serial issue of one instruction per cycle. Parallelism is detected using an instruction bit to indicate parallel issue with the preceding instruction, and instructions are issued in-order. There are two forms of load and store instructions for the SIMD datapath, depending on whether the generated function-memory address is linear or two-dimensional. The first type of access of function-memory 7602 is performed in the scalar datapath, and the second in the vector datapaths. In the latter case, the addresses can be completely independent, based on (for example) 16-bit register values in each datapath half (to access up to, for example, 32 pixels from independent addresses).

The node wrapper 7626 and control structures of the SFM processor 7614 are similar to those of node processor 4322 (as described in section 8 above), and share many common components, with some exceptions. The SFM processor 7614 can support (for example) very general pixel access in the horizontal direction, and the side-context management techniques used for nodes (i.e., 808-*i*) is generally not possible. For example, the offsets used can be based on program variables (in node processor 4322, pixel offsets are typically instruction immediates), so the compiler 706 cannot generally detect and insert task boundaries to satisfy side-context dependencies. For node processor 4322, the compiler 706 should know the location of these boundaries and can ensure that register values are not expected to live across these boundaries. For the SFM processor 7614, hardware determines when task switching should be performed and provides hardware support to save and restore all registers, in both the scalar and the SIMD vector units. Typically, the hardware used for save and restore is the context save restore circuitry 7610 and the context-state circuit 7612 (which can be, for example 16×256 bits). This circuitry 7610 (for example) comprises a scalar context save circuits (which can be, for example, 16×16×32 bits) and 32 vector context save circuits (which can each, for example, be 16×512 bits), which can be used to save and restore SIMD registers. Generally, the vector-memory 7603 does not support side-context RAMs, and, since pixel offsets (for example) can be variables, it does not generally permit the same dependency mechanisms used in node processor 4322 (and as described in section 7 above). Instead, pixels (for example) within a region of a frame are within the same context, rather than distributed across contexts. This provides functionality similar to node contexts, except that the contexts should not be shared horizontally across multiple, parallel nodes. The shared function-memory 1410 also generally comprises an SFM data memory 7618, SFM instruction memory 7616, and a global IO buffer 7620. Additionally, the shared function-memory 1410 also includes a interface 7606 that can perform prioritization, bank select, index select and result assembly and that is coupled to the node ports (i.e., 7624-1 to 7624-4) through partition BIUs (i.e., 4710-*i*).

Turing to FIG. 262, an example of the SIMD data paths 7800 for the shared function-memory 1410. For example, eight SIMD data paths (which can be partitioned into two, 16-bit halves because it can operate on 16-bit packed data) can be used. As shown, these SIMD data paths generally comprise set of banks 7802-1 to 7802-L, associated registers 7804-1 to 7804-L, and associated sets of functional units 7806-1 to 7806-L.

In FIG. 263, an example of a portion of one SIMD data path (namely and for example, a portion of one of the registers 7804-1 to 7804-L and a portion of one of the functional units 7806-1 to 7806-L) can be seen. As shown and for example, this SIMD data path can include includes a 16-entry, 32-bit register file 7902, two 16-bit multipliers 7904 and 7906, and a single, 32-bit arithmetic/logical unit 7908 that can also perform two, 16-bit packed operations in a cycle. Also, as an example, each SIMD data path can perform two, independent 16-bit operations, or a combined, 32-bit operation. For example, this can form a 32-bit multiply using the 16-bit multipliers combined with 32-bit adds. Additionally, the arithmetic/logical unit 7908 can be capable of performing addition, subtraction, logical operations (i.e., AND), comparisons, and conditional moves.

Turning back to FIG. 262, the SIMD data path registers 7804-1 to 7804-L can use a load/store interface to the vector memory 7603. These loads and stores can use features of the vector memory 7603 that are provided for parallel LUT and histogram access by nodes (i.e., 808-*i*): for nodes, each SIMD data path half can provide an index into function-memory 7602; and, similarly, each SIMD data path half in SFM processor 7614 can provide an independent vector memory 7603 address. Addressing is generally organized so that adjacent data paths can perform the same operation on multiple instances of datatypes such as scalars, vectors, and arrays of 8-, 16-, or 32-bit (for example) data: these are called vector-implied addressing modes (the vector is implied by the SIMD with linear vector memory 7603 addressing). Alternatively, each data path can operate on packed pixels from regions of a frame within banks 7608-1 to 7608-J: these are called vector-packed addressing modes (vectors of packed pixels are implied by the SIMD, with two-dimensional vector memory 7603 addressing). In both cases, as with the node processor 4322, the programming model can hide the width of the SIMD, and programs are written as if they operate on a single pixel or element of other datatype.

Vector-implied datatypes are generally SIMD-implemented vectors of either 8-bit chars, 16-bit halfwords, or 32-bit ints, operated on individually by each SIMD data path (i.e., FIG. 263). These vectors are not generally explicit in the program, but rather implied by hardware operation. These datatypes can also be structured as elements within explicit program vectors or arrays: the SIMD effectively adds a hidden second or third dimension to these program vectors or arrays. In effect, the programming view can be a single SIMD data path with a dedicated, 32-bit data memory, and this memory is accessed using conventional addressing modes. In the hardware, this view is mapped in a way that each of the 32 SIMD data paths has the appearance of a private data memory, but the implementation takes advantage of the wide, banked organization of vector memory 7603 to implement this functionality in the shared function-memory 1410.

The SFM processor 7614 SIMD generally operates within vector memory 7603 contexts similar node processor 4322 contexts, with descriptors having a base address aligned to the sets of banks 7802-1, and sufficiently large to address the entire vector memory 7603 (i.e., 13 bits for the size of 1024 kBytes). Each half of the a SIMD data path is numbered with a 6-bit identifier (POSN), starting at 0 for the left-most data path. For vector-implied addressing, the LSB of this value is generally ignored, and the remaining five bits are used to align the vector memory 7603 addresses generated by the data path to the respective words in the vector memory 7603.

In FIG. 264, an example of address formation can be seen. Typically, a load or store instruction executed by the SIMD results in an address being generated by each data path, based on registers in the data path and/or instruction-immediate values: this is the address, in the programming view, that accesses a single, private data memory. Since this can, for example, be a 32-bit access, the two LSBs of this address can be ignored for vector memory 7603 accesses and may be used to address the byte or halfword within the word. The address is added to the context base address, resulting in a context index for the implied vector. Each data path concatenates this index with bits (i.e., bits 5:1) of the POSN value (since this is for a word access), and the resulting value is the index for vector memory 7603 within the context for the datapath. The address is added to the context base address, resulting in an vector memory 7603 address for the implied vector.

These addresses access values aligned to a bank from each set 7802-1 to 7802-L (i.e., four of the sixteen banks), and the access can occur in a single cycle. No bank conflicts occur, since all addresses are based on the same scalar register and/or immediate values, differing in the POSN value in the LSBs.

FIGS. 265 and 266 illustrate examples of how addressing can be performed for vectors and arrays that are explicitly in the source program. The program computes the address of the desired element for the first 32-bit data path (with POSN values of 0 and 1 for the two 16-bit halves of the data path) using conventional base-plus-offset addition. Other data paths perform the same computation and compute the same value for the address, but the final address is offset for each data path by the relative position of the data path. This results in an access to four vector memory banks (i.e., 7608-1, 7608-5, 7608-9, and 7608-12) that (for example) access 32 adjacent, 32-bit values, illustrating how addressing modes typically use the vector memory 7603 organization efficiently. Because each data path addresses a private set of function-memory 7602 entries, store-to-load dependencies are checked within the local data path, with forwarding applied when there is a dependency. There is generally no desire to check dependencies between data paths, which would be very complex. These dependencies should be avoided by the compiler 706 scheduling delay slots after a store before a dependent load can be performed (the number of cycles is TBD but likely 3-4 cycles).

Vector-packed addressing modes generally permit the SFM processor 7616 SIMD data paths to operate on datatypes that are compatible with (for example) packed pixels in nodes (808-*i*). The organization of these datatypes is significantly different in function-memory 7602 compared to the organization in node data memory (i.e., 4306-1). Instead of storing horizontal groups across multiple contexts, these groups can be stored in a single context. The SFM processor 7614 can take advantage of the vector memory 7603 organization to pack (for example) pixels from any horizontal or vertical location into data path registers, based on variable offsets, for operations such as distortion correction. In contrast, nodes (i.e., 808-*i*) access pixels in the horizontal direction using small, constant offsets, and these pixels are all in the same scan-line. Addressing modes for shared function-memory 1410 can support one load and one store per cycle, and performance is variable depending on vector memory bank (i.e., 7608-1) conflicts created by the random accesses.

Vector-packed addressing modes generally employ addressing analogous to the addressing of two-dimensional arrays, where the first dimension corresponds to the vertical direction within the frame and the second to the horizontal. To access a pixel (for example) at a given vertical and horizontal index, the vertical index is multiplied by the width of the horizontal group, in the case of a Line, or by the width of a Block. This results in an index to the first pixel located at that vertical offset: to this is added to the horizontal index to obtain the vector memory 7603 address of the accessed pixel within the given data structure.

The vertical index calculation is based on a programmed parameter, an example of which is shown in FIG. 267. This parameter controls the vertical address of both Line and Block datatypes. The fields for this example are generally defined as follows (circular buffers generally contain Line data):

- Top Flag (TF): This indicates that a circular buffer is near the top edge of the frame.
- Bottom Flag (BF): This indicates that a circular buffer is near the bottom edge of the frame.
- Mode (Md): This two-bit field encodes information related to the access. A value 00'b means that the access is for a Block. The values 01-11'b encode the type of boundary processing used for circular buffers: 01'b to mirror across the boundary, 10'b to repeat the boundary pixel across the boundary, and 11'b to return a saturated value 7FFF'h (a pixel is a 16-bit value).
- Store Disable (SD): This suppresses writes using this pointer, to account for start-up delays in a series of dependent buffers.
- Top/Bottom Offset (TPOffset): This field indicates, for relative location 0 of a circular buffer, how far the location is below the top, or above the bottom, of a frame, in terms of the number of scan-lines. This locates the boundary of the frame with respect to negative (top) or positive (bottom) offsets from location 0.
- Pointer: This is a pointer to the scan-line at relative offset 0 in the vertical direction. This can be at any absolute position within the buffer's address range.
- Buffer_Size: This is the total vertical size of a circular buffer in number of scan-lines. It controls modulo addressing within the buffer.
- HG_Size/Block_Width: This is the width, in units of 32 pixels, of a horizontal group (HG_Size) or Block (Block_Width). It is the magnitude of the first dimension used to form the vector-packed address.

This parameter is encoded so that, for a Block, all fields but Block_Width are zeros, and code generation can treat the value as a char, based on the dimensions of a Block declaration. The other fields are usually used for circular buffers, and are set by both the programmer and code-generation.

Turning to FIG. 268, an example of how horizontal groups can be stored in function-memory contexts can be seen. This organization of horizontal groups mimics the horizontal groups allocated across nodes (i.e., 808-*i*), except that these groups (as shown and for example) are stored in a single function-memory context, instead of multiple node contexts. The example shows a horizontal group that is the equivalent of six node contexts wide. The first 64 pixels of the group, numbered 0, are stored in contiguous locations in banks 0-3. The second 64 pixels of The group, numbered 1, are stored in banks 4-7. This pattern repeats up to the sixth set of 64 pixels, numbered 5 and stored in banks 4-7, one line below the second set of 64 pixels, relative to the bank. In this example, the first 64 pixels of the next vertical line, numbered 0, are stored in banks 8-B'h, below the third set of 64 pixels in the first line. These pixels correspond to node pixels stored in the next scan-line in a circular buffer in SIMD data memory. Pixels in the scan-line are accessed using packed addresses generated by the datapaths. Each half of the datapath generates an address for a pixel to be packed into that half of the datapath, or to be written to function-memory 7602 from that half of the datapath. To mimic the node context organization, the SIMD can be conceptually centered on a given set of 64 pixels in the horizontal group. In this case, each half of a datapath is centered on a single pixel within the set, addressed using the POSN value for that half of the datapath. Vector-packed addressing modes define a signed offset from this pixel location, either an instruction immediate or a packed, signed value in a register half associated with the datapath half. This is comparable to the pixel offsets in the node processor 4322 instruction set, but is more general, since it has a larger range of values and can be based on a program variable.

In FIG. 269, an example of a circular buffer of SFM Line data is shown. In this example, there are four buffers of Bayer data, with five scan-lines per buffer. Each line represents a set of 32 pixels: the central scan-lines are shown as hashed lines, and other scan-lines as solid lines. The total width of the horizontal group, in sets of 32 pixels, is given by the HG_Size field in the vertical-index parameter. SFM contexts maintain a value in hardware, HG_POSN, to center the SIMD on one of the 32-pixel elements. In this example, relative to node contexts, HG_POSN is on the $2^{nd}$ context to the right of the left-boundary context.

Turning to FIG. 270, an example of pixel data from a node data memory contexts (Line datatype) is mapped to a single shared function-memory context. This data is stored in circular buffers in both contexts, so that addressing can be relative to the scan-line position. Absolute offsets for the circular buffer are shown, but it should be understood that the relative position 0 (the central scan-line) rotates through these absolute values as processing progresses in the vertical direction. A buffer for each pixel type (e.g., one of the four Bayer types shown) has a unique base address, based on how code generation allocates memory for the buffer. The same name is used for these base addresses in both contexts, for clarity, but these addresses are unrelated. Both are based on code generation for the respective processors, and the addressing of output by sources is accomplished by linking offsets in the destination contexts into the output instructions of the sources.

As shown in this example, addresses for each buffer increase linearly in the vertical direction (downward) from the respective base address. In the node (i.e., 808-*i*), this address indexes the circular buffer, and the horizontal group for a given scan-line appears at the same index, across multiple contexts that are associated by left-context and right-context pointers. In shared function-memory 1410, this address indexes a two-dimensional array, implemented by vector-packed addressing modes. The first dimension of this array is the circular-buffer index, and the second dimension is the relative position of the pixels in the horizontal group (HG_POSN) relative to the left-most node context. The size of this second dimension is variable, depending on the size of the horizontal group (HG_Size), and is specified in the shared function-memory context descriptor configured by system programming tool 718. The value HG_POSN is maintained by hardware for the context, to mimic node iteration across horizontal groups; however, in this case, the iteration is serial within a single context instead of possibly parallel. The function-memory 7602 generally does not permit dependency checking between contexts in the horizontal direction.

This mapping of horizontal groups in the shared function-memory context in this example permits the SFM processor 7614 SIMD to access pixels at any position in the vertical and horizontal directions. The circular-buffer index has the same values as the related node index, to permit input and output between contexts using the same values. When a source generates output to a circular buffer, it specifies the offset in the destination context of the buffer base address, with a separate circular index into the buffer; this index is usually zero for other types of output. In the shared function-memory context, this circular-buffer index is multiplied by HG_Size to index to the first 64 pixels in the horizontal group at that index. At that point, HG_POSN is used to index into the horizontal group, and POSN aligns a data path half to a unique pixel in the group. This unique pixel is the current central pixel for the data path half. Note that the central pixel can be at any circular-buffer index for the data path half—each half of the data path can compute this index independently.

Node processor (i.e., 4322) typically uses the same vertical-index parameter as shared function-memory 1410 to access circular buffers, except that HG_Size is usually zero because the buffer is effectively one-dimensional within the context (the second dimension is introduced by other contexts in the horizontal group). For output from a node (i.e., 808-*i*) to shared function memory 1410 contexts, the node (i.e., 808-*i*) context has a vertical-index parameter for the shared function-memory 1410 circular buffer, and this parameter has HG_Size set to the width of the horizontal group (in increments of 32 pixels, for example). For code generation, node Line and shared function-memory Line are different datatypes (though, compatible for assignment), and the width of the horizontal group is known: this permits code generation to form the appropriate vertical-index parameter for local node (i.e., 808-*i*) and shared function-memory 1410 accesses and for I/O between node (i.e., 808-*i*) and shared function-memory 1410. For output from node (i.e., 808-*i*) to shared function-memory 1410, the node (808-*i*) can directly address the shared function-memory 1410 input using Horiz_Position to form the two-dimensional address. For output from shared function-memory 1410 to node (i.e., 808-*i*), shared function-memory 1410 uses one-dimensional addressing (i.e., HG_Size is 0 for node Line data), and the second dimension is implemented by the dataflow protocol because the SFM context is threaded, and provides output in scan-line order.

To mimic node (i.e., 808-*i*) hardware iteration over horizontal groups, in multiple node contexts, shared function-memory contexts generally implement hardware iteration using HG_POSN to center the SIMD datapath on a particular (for example) 32-pixel element corresponding to a node context. This iteration is implicit in that it is not generally expressed directly in the source code. Instead, the code is written, as for nodes (i.e., 808-*i*), as an inner loop with the iteration controlled by dataflow. Shared function-memory 1410 hardware increments—HG_POSN at the end of each iteration, and a new iteration is started based on new input data being received. Both shared function-memory 1410 and node (i.e., 808-*i*) iterate in the vertical direction using vertical-index parameters that are supplied by a system-level iterator, typically in the GLS unit 1408.

Turning to FIG. 271, an example of a high-level view of this iteration, oriented to the node (i.e., 808-*i*) view. In this example, the circular buffer contains three scan-lines, and width of the horizontal group is 4 (HG_Size=3). The 32-pixel element at HG_POSN=0 corresponds to the left-most node context, and the 32-pixel element at HG_POSN=HG_Size corresponds to the right-most node context. The dashed lines in the shaded regions indicate pixels outside of the left and right boundaries, where boundary processing applies. Shard function-memory 1410 iterates in the horizontal direction, starting at the left-most element, incrementing HG_POSN for each execution of the program, up to the right-most context, where HG_POSN wraps back to 0. When HG_POSN wraps, the vertical iteration is implemented by incrementing the Pointer in the vertical-index parameter, but this is performed globally, in software, for all circular buffers, not by shared function-memory 1410 hardware, which is synchronized with replacing the oldest scan-line in the buffer with the newest.

In FIG. 272, an example of a detailed view of iteration of FIG. 270 can be seen in how it relates to vector memory 7603 addressing and the SIMD datapaths. Linearly-increasing vector memory 7603 indexes address pixels moving left-to-right within a horizontal group, and top-to-bottom in a circular buffer. Incrementing HG_POSN for horizontal iteration places the SIMD datapath on successive 32-pixel elements in the horizontal group, and POSN positions each datapath half on the respective pixel within the element. From this position, a relative, signed offset can access pixels to the left or right of the datapath, using negative or positive offsets, respectively. These offsets can span the entire horizontal group, but don't extend into the vertical direction: boundary processing applies instead. Also, the offsets can be provided in register halves, so the offset can be different for each datapath half.

Vector-packed accesses for Line data should be perform or enable the following operations:

- Compute the vertical index into the circular buffer.
- Perform vertical boundary processing. Mirroring and repeating are accomplished during the vertical-index calculation, by modifying the vertical index. However, since the vertical-index calculation does not generally result in a data value, it usually cannot directly return a saturated value.
- Access vector memory 7603 at the given vertical and horizontal index in the given buffer, either a load or store.
- Perform boundary processing during the vector memory 7603 access. If the access is a read, horizontal boundary processing is performed by modifying the horizontal index, or by returning a saturated value instead of the vector memory 7603 contents. If vertical boundary processing can require returning a saturated value, this value is returned instead of the vector memory 7603 contents. If the access is a store, the write is suppressed if either vertical or horizontal boundary processing applies.
- Enable dependency checking on input data during the access. This involves checking both vertical and horizontal indexes against valid input ranges.

Turning to FIG. 273, an example of the operation of the instructions that computes the vertical index can be seen. Both the immediate and register-based forms are shown, which differ in the source of the signed vertical offset (s_offset). The first two operations add the Pointer in the vertical-index parameter to s_offset, and apply the modulus for the circular buffer, depending on Buffer_Size, also in the vertical-index parameter (which can also perform boundary processing on the index). The result of these operations is multiplied by HG_Size (in the vertical-index parameter) scaled by (for example) 32, and the resulting vertical index, V_Index, is placed into the low-order (for example) 14 bits of the destination register half. For the immediate form, the same value is placed into each register half (but can later operate on different horizontal indexes). For the register-based form, each register half gets a value that depends on the source register half.

To support boundary processing and dependency checking, there is "hidden" state written by these instructions to be used during the vector memory 7603 access. Even though this state is written as a side-effect, it conforms to the register allocation done for the other operands, and it is saved and restored on context switches, so it does not generally require special treatment. The first item of state is a bit, VB, that indicates that boundary processing was performed during the vertical-index calculation. This state applies to each datapath half, and is stored in the MSB of the result register half (the maximum V_Index is a 14-bit value). The other state is the values for Md, SD, and HG_Size from the vertical-index parameter. This state applies to all results, and is written to a "shadow" register associated with all SIMD registers having the same identifier. To limit the number of vector shadow registers, and to provide for an 8-bit immediate s_idx, the destination vector registers are limited to the range of V0-V3, so that two bits can be used in the instruction to encode the register identifier.

Turning to FIG. 274, an example of the operation of the instructions that performs a vector-packed access of Line data (loads and stores use the same addressing) can be seen. Both the immediate and register-based forms are shown, which differ in the source of the signed horizontal offset (s_offset). These instructions are effectively four-operand instructions, with the operands being: the buffer base address, the vertical index (and shadow state), the horizontal offset, and the target (load) or source (store) register. To accommodate these operands, the buffer base address is in one of the scalar registers (i.e., SFM processor 7614), so that two bits can encode the register identifier (the source of the vertical index also has a two-bit identifier, as mentioned above).

The first pair of operations add the buffer base address to the vertical index, to form a buffer vertical index. The second pair of operations form a horizontal index; this index is generally computed by adding the position of the datapath half, which is a concatenation of HG_POSN and POSN, to the horizontal s_offset. The result of this add is the horizontal index, H_Index. The address of the given pixel, relative to the context base address, is formed by adding the buffer vertical index to the horizontal index. This in turn is added to the context base address to form the vector memory 7603 address of the pixel, where the pixel address is shown (for example) as bits 19:1 because it is usually a halfword address with respect to vector memory 7603. The pixel at this address is either loaded into the target register half or stored from the source register half, subject to boundary processing and dependency checking. The latter are controlled by the hidden state written during the vertical-index calculation.

Because the addresses generated by vector-packed operations are random, and can span a large range of vector memory 7603 addresses, there are many potential store-to-load dependencies in the SIMD pipeline. These are generally not checked by hardware because it would entail comparing (for example) each of the 32 load addresses, in each stage of the load pipeline, against all 32 store address in every stage of the store pipeline. Given the immense complexity, the compiler instead schedules vector-packed loads from a given buffer so that vector-packed loads cannot appear sooner than a number of cycles after a vector-packed store into the same buffer. The number of cycles is TBD but is likely on the order of 3 or 4 cycles. Vector-packed stores are rarely interspersed with loads from the same buffer; typically, vector-packed loads are used to access input data, with vector-implied or vector-packed stores placing results in different buffers. Since these accesses are to different variables, they are independent by definition, and there are no store-to-load delays.

Boundary processing provides predictable values for Line accesses that lie outside of a frame in the vertical direction, or outside of a frame division in the horizontal direction. Nodes (i.e., 808-*i*) perform boundary processing directly in the ISA of node processor 4322, and this is limited in scope because vertical indexing is one-dimensional and horizontal offsets are instruction constants in the range of (for example) −2/+2, where horizontal boundary processing is performed in the left- and right-boundary contexts. Shared function-memory 1410 boundary processing is more complex, because shared function-memory 1410 Line accesses are two-dimensional, and because vertical and horizontal indexing is more general.

In the shared function-memory 1410, vertical boundary processing is performed both during the vertical-index calculation and during the vector-packed access. Horizontal boundary processing is performed during the vector-packed access. Both are controlled by the Md field in the vertical-index parameter (the encoding 00'b specifies and shared function-memory 1410 Block, in which case boundary processing does not generally apply).

Turning to FIG. 275, an example of boundary processing in the vertical direction can be seen. As shown, an entire frame division can be seen, from the top to bottom boundaries of the frame, with boundary processing represented by dashed lines in the shaded regions above and below the frame division. Iteration in the vertical direction begins with the first scan-line, just below the top boundary, at relative offset 0 in the circular buffer (also absolute location 0). During this iteration, TF=1 to indicate that offset 0 is near the top boundary, and TPOffset=000'b to indicate that it is 0 scan-lines below the boundary. The second iteration has relative offset 0 on the second scan line (the Pointer parameter is 01'h), TF=1, and TBOffset=001'b. This continues up to the point where TPOffset=111'b (the maximum value): after this point, TF=0 and boundary processing is disabled. When iteration reaches the $8^{th}$ line from the bottom of the frame, BF=1 and TPOffset=111'b, and subsequent iterations decrement TPOffset with BF=1 until iteration terminates at the bottom of the frame division. These parameters are maintained by the code that iterates in the vertical direction, typically in the GLS unit 1408, and are updated before each (implied) iteration in shared function-memory 1410 or a node (i.e., 808-*i*).

Boundary processing applies when one of the following conditions is detected during the vertical-index calculation: 1) TF=1 and TBOffset+s_offset<0 (a negative offset is beyond the first scan-line), or 2) BF=1 and s_offset>TBOffset (a positive offset is beyond the last scan-line). Boundary processing is accomplished as follows:

- To mirror the boundary pixel, the offset is modified by reflecting across the boundary. The effective offset for top-boundary processing is −(TBOffset+s_offset), and the offset for bottom-boundary processing is 2*TBOffset−s_offset.
- To repeat the boundary pixel, the offset is modified to index the boundary pixel. The effective offset for top-boundary processing is −TBOffset, and the offset for bottom-boundary processing is TBOffset.
- Saturation cannot be performed during the vertical-index calculation, because it returns an address instead of a data value. Instead, this is indicated to the vector-packed access by VB=1 in the V_Index destination register halves, and Md=11'b in the corresponding vector shadow register.

Regardless of the type of boundary processing performed, the VB bits are set in the vector destination register halves. This bit is used to suppress stores from the corresponding datapath half during a vector-packed store. Stores are invalid outside of the boundaries, and create incorrect results in vector memory 4703 if a store is performed using a vertical index modified for boundary processing.

Turning to FIG. 276, an example of boundary processing in the horizontal direction can be seen. As shown, a current set of circular buffers (for four Bayer pixel types) can be seen, from the left to the right boundaries of the frame division, with boundary processing represented by dashed lines in the shaded regions to the left and right of the frame division. Boundary processing applies when one of the following conditions is detected during the vector-packed access: 1) H_Index<0 (left side), or 2) H_Index≥(HG_Size+32) (right side). In this case, HG_Size is contained in the vector shadow register, as well as the Md field and SD bit. Boundary processing is accomplished as follows:

- To mirror the boundary pixel, the index is modified by reflecting across the boundary. The effective index for left-boundary processing is −H_Index, and the index for right-boundary processing is 2*(HG_Size+32)−H_Index.
- To repeat the boundary pixel, the index is modified to index the boundary pixel. The effective index for left-boundary processing is 0, and the index for right-boundary processing is HG_Size+31.
- Saturation is performed if Md=11'b in the vector shadow register, and either VB=1 in the vector shadow register or the horizontal boundary-processing conditions are met.

If the vector-packed access is a store, the store is suppressed if boundary processing applies. This is indicated either by VB=1 (vertical boundary processing) or by a horizontal boundary-processing condition being met. (The store is also suppressed if SD=1 in the vector shadow register.)

Shared function-memory 1410 Block datatypes represent fixed, rectangular regions of a frame, providing addressing of pixels (for example) in both vertical and horizontal directions. These are not directly compatible with Line datatypes, because they do not use implicit iteration, and do not support circular addressing and boundary processing. However, the Block datatypes similar in that the Block datatypes implemented using vector-packed addressing, and any pixel from any location can be loaded into (or stored from) a vector register half.

Iteration on Block data is explicit in the source code. Accesses use absolute, unsigned offsets from the relative position [0,0] in the block (the top, right-hand corner with respect to the frame), and iteration can explicitly modify these offsets. For example, iteration within the block can be accomplished by nested FOR loops, with the outer loop indexing the vertical direction, and the inner loop indexing in the horizontal direction at the given vertical index. This is just one example—any general form of indexing can be used.

Turning to FIG. 277, an example of the operation of the instructions that compute the vertical index for Block data. Both the immediate and register-based forms are shown: they differ in the source of the unsigned vertical offset (u_offset). These are the same instructions used to form a vertical index for Line data: the operation of the instruction is distinguished by the Md field being 00'b in the vertical-index parameter. The instructions simply multiply u_offset by Block_Width (in the vertical-index parameter) scaled (for example) by 32. The result is the (for example) 16-bit vertical index for the datapath half, stored in the destination register half. For the immediate form, the same value is placed into each register half (but they can later operate on different horizontal indexes). For the register-based form, each register half gets a value that depends on the source register half. No boundary processing is performed, and there are no side-effects.

In FIG. 278, shows the operation of the instructions that perform a vector-packed access of Block data (loads and stores use the same addressing). Both the immediate and register-based forms are shown, which differ in the source of the unsigned horizontal offset (u_offset). These instructions are effectively four-operand instructions, with the operands being: the buffer base address, the vertical index, the horizontal offset, and the target (load) or source (store) register. To accommodate these operands, the buffer base address is in one of the scalar registers, so that two bits can encode the register identifier (the source of the vertical index also has a two-bit identifier, as mentioned earlier).

The index into a block, Blk_Index, is formed by adding the vertical index to an unsigned offset, u_offset, which is the same as H_Index in this case. The Blk_Index is added to the buffer base address to form a buffer index: this is the address of the given pixel, relative to the context base address. This in turn is added to the context base address to form the VMEM address of the pixel (the pixel address is shown as (for example) bits 19:1 because it is a halfword address with respect to vector memory 7603). The pixel at this address is either loaded into the target register half or stored from the source register half. As with Line data, the compiler schedules vector-packed loads from a given buffer so that they cannot appear sooner than a number of cycles (TBD) after a vector-packed store into the same buffer.

Vector-packed addressing permits block vertical and horizontal offsets to be based on vector-implied variables. Also, each datapath half can access its own POSN value to create this vector-implied data. This enables partitioning the SIMD to operate on separate regions of a block, because the position can be used by each datapath half to form its own set of vertical and horizontal indexes into the block. For example, a block of 32×32 pixels can be partitioned into four regions of 16×16 pixels, each operated on by four SIMD datapaths (eight datapath halves). In this case, for example, each group of eight SIMDs would be positioned, respectively, at pixels [0,0], [0,16], [16,0], and [16,16]. These vertical and horizontal base coordinates can be formed independently using the base POSN value for the datapath halves in each SIMD partition, and each region iterated independently using these base coordinates to form V_Index and H_Index offsets within the region.

A subset of the shared function-memory 1410 Block datatype can be considered to be an array of Line data, a datatype called LineArray. The distinction is that the LineArray data is in a linear array, rather than a circular buffer, and can be operated on using explicit iteration. This can require that the vertical dimension of the circular buffer in nodes (i.e., 808-*i*), which provides input to the array, be the same as the first dimension of the array. Each iteration through the circular buffer, from absolute index 0 to the maximum index, provides input to a single array, and the next iteration provides input to a new array instance. This new input can be either in the same shared function-memory 1410 context as the first (after input is released), or in a different context, to provide overlapped I/O and/or parallelism.

Nodes (i.e., 808-*i*) implement Block datatypes in function-memory 4702, though the implementation of node (i.e., 808-*i*) Block data is different than the implementation of share function-memory 1410 Block data. For example, the vertical- and horizontal-index calculations are not available in the ISA for the nodes (i.e., 808-*i*), so these addresses should be formed explicitly by other instructions (for example, the horizontal position of a datapath is available to each datapath, but this should be explicitly added to the horizontal index). Furthermore, the node wrapper (i.e., 810-*i*) does not generally support dependency checking on Block input, which can be significantly different than node (i.e., 808-*i*) Line input. Instead, an shared function-memory 1410 context is used to do this dependency checking and enable the node context to execute.

11.4. Context Management

Since the SFM processor 7614 performs processing operations analogous to a node (i.e., 808-*i*), it is scheduled and sequenced much like a node, with analogous context organization and program scheduling. However, unlike a node, data is not necessarily shared between contexts horizontally across a scan line. Instead, the SFM processor 7614 can operate on much larger, standalone contexts. Additionally, because side contexts may not be dynamically shared, there is no requirement to support fine-grained multi-tasking between contexts, though the scheduler can still use program pre-emption to schedule around dataflow stalls.

Turning to FIG. 279, an example of the organization for SFM data memory 7618 can be seen. This memory 7618 is generally scalar data path for SFM processor 7614, which can, for example have 2048 entries, each 32 bits wide. The first eight locations, for example, of this SFM data memory 7618 generally contain context descriptors 8502 for the SFM data memory 7618 contexts. The next 32 locations, for example, of the SFM data memory 7618 generally contain table descriptors 8504 for up to (for example) 16 LUT and histogram tables in function-memory 7602, with two, 32-bit words taken for each of the table descriptor 8504. Though these table descriptors 8504 are generally located in SFM data memory 8504, these table descriptors 8504 can be copied during initialization of the SFM data memory 7618 into hardware registers used to control LUT and histogram operations from nodes (i.e., 808-*i*). The remainder of the SFM data memory 7618 generally contains program data memory contexts 8506, which have variable allocations. Additionally, the vector memory 7603 can function as the data memory for the SIMD of SFM processor 7614.

SFM processor 7614 can also support fully general task switch, with full context save and restore, including SIMD registers. The Context Save/Restore RAMs supports 0-cycle context switch. This is similar to the SFM processor 7614 Context Save/Restore RAM, except in this case there are 16 additional memories to save and restore SIMD registers. This allows program pre-emption to occur with no penalty, which is important for supporting dataflow into and out of multiple SFM processor 7614 programs. The architecture uses pre-emption to permit execution on partially-valid blocks, which can optimize resource utilization since blocks can require a large amount of time to transfer in their entirety. The Context State RAM is analogous to the node (i.e., 808-*i*) Context State RAM, and provides similar functionality. There are some differences in the context descriptors and dataflow state, reflecting the differences in SFM functionality, and these differences are described below. The destination descriptors and pending permissions tables are usually the same as nodes (808-*i*). SFM contexts can be organized a number of ways, supporting dependency checking on various types of input data and the overlap of Line and Block input with execution.

In FIGS. 280 and 281, examples of the format 8600 for a context descriptor stored in SFM data memory 7618 and the format 8700 context descriptor for function-memory 7602 and vector memory 7603 can be seen. As shown, the format 8600 is generally the same format as those for node processor 4322 (as shown in FIG. 42). Format 8700, on the other hand, is generally similar to those for SIMD data memory context descriptors (as shown in FIG. 42), but there are some differences. Some examples of possible differences are as follows:

- The context base address can be up to 13 bits long, and is aligned on 128-byte boundaries to comprehend the width of the SIMD (32×32 bits), which can allow the addressing of function-memory 7602/vector memory 7603 in sizes up to 1024 kBytes.
- Shared function-memory 1410 generally does not iterate over multiple contexts in a horizontal group, so there is no Bk bit. Iteration can be accomplished within a single context, as described later.
- There is no sharing of side contexts, so there are no left-context or right-context pointers.
- The second word specifies the HG_Size parameter, indicating the size of the horizontal group in units of 64 pixels (a value zero indicates a size of one). This is used in vector-packed addressing modes, and also affects the operation of the dataflow protocol, since the context should receive data from, or provide data to, a number of node contexts.
- There are fields to indicate that there is a continuation context, and the identifier information for this context. Continuation contexts are used to enable data transfer into shared function-memory 1410 despite the state of execution of any particular context. This allows data transfer to be overlapped with execution, and permits multiple contexts to multi-task on input/output dataflow.
- An alternate encoding of the continuation node ID specifies a shared context number for this context. Shared contexts permit mixing Line and Block input in the same program, with separate dependency checking on each type of input. They also allow input and intermediate context to be shared between different invocations of the same program.

Unlike node (i.e., 808-*i*) contexts, an SFM context can receive a large amount of vector data, from multiple sources, for each set of scalar input data received. To permit operation on partially-valid vector input, SFM dataflow-state entries track vector and scalar input separately, with vector input summarized by the V_Input, HG_Input, and Blk_Input fields of the context descriptor. Turning to FIG. 282, the dataflow stateentry 8801 for an SFM context. Differences with node dataflow state are:

- In place of dependency bits (word 12), SFM uses independent counters for Set_Valid signals received with vector data from each source (selected by the Src_Tag received with the data).
- A Fill bit is used to distinguish circular buffers that are in a start-up state (being filled for the first time) from those in a steady state (being replenished one scan-line at a time).There is no PgmQ_ID field in the dataflow state, because each SFM context is scheduled individually (in the nodes, a program operates on multiple contexts, so context can share a common program-queueentry).

SFM contexts typically receive a large amount of data for processing, compared to the operational bandwidth of the SIMD for SFM processor 7614. It is generally inefficient for the processor to wait until all input has been received—or even a single scan-line—before processing begins. This would serialize the transfer into the context with processing by the context, severely limiting the amount of potential overlap. To permit processing to overlap with execution, SFM program scheduling permits programs to execute using inputs that are partially valid (either Line or Block input).

Dependency analysis usually recognizes when an access within the input region, by any SIMD datapath, attempts to access data that has not yet been received. When desired for Line input, this assumes that contexts are threaded, so that input, even if from multiple processing node contexts, is provided first for the top, left-most input (with respect to the frame) and proceeds in scan-line order to the bottom, right-most input. It also assumes that Block input is from programs that iterate from left-to-right and top-to-bottom with respect to the frame (since the input is in-order because of serial program execution, the SFM context is not necessarily threaded, though can be). With these restrictions, this provides a significant opportunity to overlap SFM Line and Block input with execution. It permits the context to track valid input regions using valid index pointers that specify the range of valid data in any input data structure.

For Line input, the dependency checking should account for wrapping of addresses within the circular buffer. For this reason, two valid-index pointers are provided in the dataflow state: one specifying the vertical index of valid input, and one specifying the horizontal index. Any scalar input is provided once per scan-line, unless it is provided once for the entire program, as indicated by Input_Done.

For Block input, dependency checking uses a single valid-index pointer for all input, regardless of the size of the input (different block inputs can have different sizes). Accesses into blocks still use two-dimensional addressing, but the resulting address is linear within any given block. Any scalar input is provided once per block, unless it is provided once for the entire program, as indicated by Input_Done.

SFM dataflow state can track either Line or Block input, but not both. However, as described later, it is possible to overlay multiple context-state entries to track input to a program that mixes Line and Block input, so that dependencies are checked for each type independently.

To track vector input, the context should know the number of vector sources. A source signals Set_Valid whenever it has provided all data from an iteration, either implicit (Line) or explicit (Block). However, this usually is not sufficient to determine to what degree input is valid—this is determined by the valid-index pointers. In order to maintain these pointers, the context should know how many vector inputs to consider in updating the pointers: for example, if there are three vector sources, the context should receive a Set_Valid from each source in order to increment the valid-index pointer to increase the range of valid input.

The number of vector inputs is detected after initialization, as the context receives the first set of inputs. During this time, the #InpV field counts the number of initial Set_Valid signals received from independent vector sources, based on independent Src_Tag values. The #SetValV[n] fields are used to count all Set_Valid signals from each vector source. The context is enabled to execute when all of the first set of inputs has been received, determined by #Inputs, and, when this condition is met, #InpV indicates the number of vector sources. Following this, the #InpV field is not updated.

In FIG. 283, an example of how the SFM wrapper 7626 tracks valid Line input can be seen. FIG. 283 generally corresponds to the mapping of processing node context inputs shown in FIG. 269, except in this case inputs that haven't been received yet are marked by "x," and since any of the scan-lines can be the central scan-line of the circular buffers, the central line is not indicated. HG_POSN centers current SIMD execution on a group of 32 pixels, and the valid input region is shown shaded in green. The SFM wrapper 7626 generally maintains two valid-index pointers to track input data and perform dependency checking. One of these, V_Input, is a vertical index into the current input scan-line. The other, HG_Input, is the location of the next set of input pixels in the horizontal group. In this example, V_Input indexes the fourth scan-line, and HG_Input indexes the fifth 32-pixel elements of the horizontal group. HG_Input and V_Input apply to all circular buffers. Since the SFM context is threaded, inputs from processing node contexts arrive in order, resulting in a valid region being defined by the parameters V_Input and HG_Input. Each 32-pixel (for example) input is accompanied by a context number and an index into the context for a specific circular buffer. For input from processing node contexts, the offset of theentry is computed directly at the source, using a vertical-index parameter for the destination. The destination type is an SFM Line, which is distinct from a processing node Line, and a different vertical-index parameter applies: specifically, it has a non-zero HG_Size, whereas processing node Line data has HG_Size=0. The following expression computes the index, in the destination context, of a given 32-pixel output to an SFM Line (Circ_Index is the index into the circular buffer after applying the offset and modulus): Buffer_Base_Address+Circ_Index*HG_Size+Horiz_Position.

The Buffer_Base_Address is available in the source context by linking the offset in the destination context during final code generation. The Circ_Index and HG_Size are determined by the vertical-index parameter at the source, and Horiz_Position is contained in the source's context descriptor. In the SFM context, this index is added to the context base address, and the input is written starting at the resulting address, 16 pixels per cycle (for example). The resulting address selects an even bank of vector-memory 7603, and updates all entries of this bank and the next odd bank The parameter Valid_Input is initialized to zero, and is updated as inputs arrive, based on the dataflow protocol. The following discussion starts by assuming that Line input is from a single set of source contexts (a single horizontal group), so that the basic concepts of dependency checking can be understood. In reality, input can be from multiple sources which provide data at different rates. Furthermore, the width of input data can be different for different sources: even though all Line data corresponds to the same region of a frame, data elements can be of different sizes, for example when some input is sub-sampled with respect to other input. Dependency checking should comprehend these more general cases.

In FIG. 284, an example of the sequence of inputs from a single set of processing node sources to a circular SFM Line buffer after initialization is shown. It should also be note that there can be inputs to multiples of these buffers from the sources, but one is shown for clarity. The first three illustrations in the sequence are the first three, 32-pixel inputs, and the fourth is the final input of the first scan-line, when the line is filled.

In the first step of the sequence shown, a Source Notification message (SN) is received from the left-boundary node context, and the SFM context responds with a Source Permission (SP). The P_Incr field in the SP has the value 1111'b, because the context is guaranteed to have enough VMEM allocated for all input. (Block input uses a different P_Incr sequence; this difference is based on the Blk bit being set in the context descriptor.)

The SP enables output from the source context, with Set_Valid indicating the final output, as shown in the second step in the figure (Set_Valid is assumed to be to the buffer shown in the example, though it can be to any buffer receiving input from the source contexts). The Set_Valid increments Valid_Input and causes the source context to forward the SN to the next source context, which in turn sends an SN to the destination SFM context. This sequence continues, providing inputs to the first scan-line, shown in the third and fourth steps. At the end of the scan-line, the SN from the node context has Rt=1. The resulting Set_Valid causes sets the entire scan-line valid, and disables dependency checking using Valid_Input.

Execution in the context is enabled as long as there is valid input at the position of current execution on the line, HG_POSN. This is indicated by Valid_Input>HG_POSN. Before the scan-line is filled, dependency checking is performed during execution by comparing the H_Index values of relative vector-packed accesses to Valid_Input. The condition tested is whether H_Index is on or beyond the current input set (H_Index≥Valid_Input). If this condition is met, dependency checking fails.

If horizontal boundary processing applies, dependency checking uses H_Index as modified for boundary processing. However, if the boundary processing is specified to return a saturated value, this disables dependency checking because this value does not depend on input.

As mentioned above, dependency checking doesn't detect whether entire scan-lines of input are invalid (for example, all but the first line in the figure). Software handles these cases by special treatment of circular buffers at the top and bottom of frame boundaries.

After the scan-line is filled, Valid_Input is incremented to the value HG_Size. Since dependency checking is disabled, Valid_Input is used instead to indicate when a new scan-line can be accepted. This is illustrated in FIG. 285. In this case, all input scan-lines are valid, and should remain valid until the oldest input scan-line is no longer desired. If an SN is received in this state, as shown, an SP is not sent because it could cause valid data to be overwritten. The logical condition for enabling the SP is that execution at HG_POSN=HG_Size−1 has signaled Release_Input. However, HG_Size is encoded in vertical-index parameters, and isn't directly available to hardware to determine when an SP can be sent. Instead, the value of HG_Size for the program is inferred from the final value of Valid_Input, set based on Rt. Other input data might have a smaller HG_Size, but hardware iteration is determined by the input with the largest HG_Size.

The conditions for enabling new input are that: Release_Input is signaled, HG_POSN=Valid_Input, and input is disabled (InEn=0 or all ValFlag bits are 0). At this point, InEn is set, Valid_Input is reset to 0, and the SP response is enabled (the SP is sent immediately if an SN has been previously received). Before this set of conditions is satisfied, Release_Input is signaled by every program at other values of HG_POSN, but this no effect on the dataflow protocol. When input is enabled, the ValFlag[n] bits are set to reflect the number of sources (#Sources) to ensure that an SN is received from each source, setting the ValFlag field with the Type, before dependency checking is fully operational.

The final three steps in the figure are similar to the steps shown in FIG. 284. In both cases a single scan-line is input, up to the point where Rt=1 in the SN. The difference is the validity of other input data. As before, the SFM context responds with an SP to any SN with Rt=0, because the right-most Release_Input has released an entire horizontal group—it can respond with an SP until the final input has been received from the right-boundary context.

This iteration over input scan-lines continues until terminated by an Output_Terminate signal (OT). The OT can be received at any point during the final scan-line input, but does not take effect until the program ends.

In the description above, it assumed input from a single set of source contexts, in order to describe how the valid-input pointer is managed and how it is used to check dependencies on Line input. In the more general case, input can come from multiple sets of source contexts, and each set of sources can supply data at different rates. The dataflow protocol orders data from each set of sources, but there is no mechanism to synchronize the sets of sources with each other, and this would be undesirable because it is generally inefficient to stall one or more sources in order to synchronize them with other sources. Moreover, the data from multiple sets of sources can be of different effective HG_Size, even though they represent pixels from the same set of scan-lines. This can occur when pixels represent different sampling rates: for example, it is common for chroma YUV data to be sampled at half the rate of luma data, in which case two de-interleaved chroma inputs are half the width of luma input.

To track Line input from multiple sets of sources, the number of Set_Valid signals from each set of sources is counted independently, using the #SetValV[n] entries in the dataflow state. The valid-input pointer cannot be updated until each source at a given position has signaled Set_Valid, because all data up to the valid-input pointer is considered valid. When the last Set_Valid is received at a given horizontal position, allowing the pointer to be incremented, other sets of source contexts might be significantly ahead in providing input.

When Set_Valid is received with vector data, the Src_Tag accompanying the data is used to increment the corresponding #SetValV[n] field (n=Srg_Tag). Another source context with the same Src_Tag can be enabled to input after Set_Valid, so the respective #SetValV[n] can be incremented multiple times with respect to other sources with different Src_Tag values. Vector sources are indicated by ValFlag[n, 1]=1, and this indicates which of the #SetValV[n] fields are counting vector Set_Valid signals. Each successive source context sends an SN which updates the ValFlag bits, but, because each SN sets ValFlag to the same value, the MSB still indicates which #SetValV fields are active.

The first set of vector inputs from all sources is valid when the final expected Set_Valid is received for the left-most input (Valid_Input=0). This is indicated by all active #SetValV[n] fields having non-zero values (the final input increments the corresponding #SetValV field from 0 to 1). This condition captures the fact that a Set_Valid has been received from all vector sources (unique Src_Tag values) at the left boundary. At this point Valid_Input is incremented, and the #SetValV[n] fields are decremented to account for the incrementing of Valid_Input: the valid-inut pointer captures the fact that a vector Set_Valid has been received for each vector Src_Tag at the respective input position.

For input at each successive value of Valid_Input, the process just described is used to determine when all inputs are valid at the respective horizontal position. The valid-input pointer is incremented when all #SetValV[n] fields with ValFlag[n,1]=1 are non-zero. At this point, Valid_Input is incremented, and the #SetValV[n] fields are decremented to reflect the new values of the pointer.

Inputs that have smaller HG_Size than others encounter the right-boundary source context at smaller horizontal positions with respect to the others. This position, for each Src_Tag, is indicated by Rt=1 in the SN message (outputs with the same Src_Tag are in the same horizontal group and should have the same effective HG_Size). When a Set_Valid is received at this position, ValFlag[n,1] is reset, and the value of the corresponding #SetValV[n] field is no longer considered in updating Valid_Input. However, the #SetValV[n] field might be non-zero at this point, depending on the current position of other sources, even though it is no longer considered for updating the valid-input pointer. When Valid_Input passes this position of input, the corresponding #SetValV[n] field is decremented to zero by definition, because Valid_Input reflects all Set_Valid signals beyond that position. Beyond this point, the condition for updating the valid-input pointer is the same as before, with a smaller number of non-zero #SetValV[n] expected, still indicated by corresponding ValFlag[n,1]=1, so the valid-input pointer increments beyond this point. Any access to the smaller input passes horizontal dependency checking by definition in this state, because it cannot generate (without boundary processing) an access with H_Index larger than Valid_Input. The source of this input can send an SN for new input, but this is recorded in the pending-permissionentry, and the SP is held until all current input is received and the conditions for enabling new input are met.

This process is repeated until all sources have provided data from right-boundary contexts. At this point, all ValFlag [n,1] bits are 0, and all #SetValV[n] fields have been decremented to zero. Valid_Input is not incremented, and its value defines the final value of HG_POSN when iterating over the horizontal group.

The value of the #SetValV[n] field for any source cannot be allowed to wrap from 1111'b to 0000'b. This shouldn't be common, but should be explicitly avoided for correct operation of dependency checking based on counting Set_Valid signals. To prevent this, the SFM context withholds the SP to the next source under conditions where the pointer might wrap. This is handled by InSt sequencing.

Scalar data provided to an SFM context processing Line data falls into one of three categories: 1) parameter data, provided without vector data from the source; 2) scalar data provided along with vector data from a GLS source thread, provided once per iteration; and 3) scalar data from processing node source contexts, provided along with vector data from all contexts per iteration. Each of these cases is handled differently by dependency checking on scalar input.

Scalar parameter data is indicated by Type=01'b in the SN from the source. This updates the ValFlag field with a value that prevents the source from participating in vector input-dependency checking, since the MSB is 0. When Set_Valid is signaled for the scalar input, ValFlag[n,0] is reset, and, since both valid-input flags are 0, all dependencies are released for that source.

GLS scalar data, provided with vector data per iteration, is provided once per destination context. This data is provided to all destination node contexts, but once to an SFM context. It is received by the SFM context at the beginning of each input scan-line, when Valid_Input=0. The scalar Set_Valid from GLS resets ValFlag[n,0], releasing the scalar dependency even though vector data from GLS can still be participating in vector input-dependency checking Node scalar data, provided with vector data per iteration, is provided from each source context, and so is received multiple times. The SN from each source context provides the same Type field, setting the ValFlag bits the same way, and new scalar input is provided by each source context. Execution is enabled when all scalar Set_Valid signals have been received from all sources, resetting the corresponding ValFlag[n,0] bits. The scalar input doesn't necessarily correspond to the source context at the current valid-input pointer, because some sources can be ahead of this position, but in this case all source contexts provide the same values for scalar input, so this lack of correspondence usually does not matter.

Dependency checking of SFM Block input is conceptually similar to dependency checking of Line input, with two major differences. First, Block input uses linear addressing in the SFM context, in contrast to the modulus used for circular-buffer addressing of scan-lines. This means that dependency checking with the valid-input pointer can cover both vertical and horizontal indexes. Second, source data is provided from single contexts or threads (node, SFM, or GLS). These sources have explicit iteration to provide block input (in GLS, this is in hardware, based on block parameters, instead of software). There is a single exchange of SN and SP messages at the beginning of the program, and then a Set_Valid to mark the end of output from each iteration without any additional SN-SP exchanges. This is in contrast to Line data, where there is a one-to-one correspondence between SN-SP message-exchange and Set_Valid from the source contexts.

At the source, the end of block output is determined by the end of all iterations that output block data. Set_Valid is used to mark the individual output of each iteration, so another method is desired to signal that all iterations are complete. This is based on a separate signal, Block_End, emitted in the code after all block output from the source, which is the point in the control flow after all iterations and conditional statements that perform block output. Since Block_End is based on control flow, it's awkward for it to be accompanied by valid data: for example, the last valid transfer would have to be moved beyond the end of an iteration loop, meaning that the loop would have to be written with one remaining output to be done. Instead, Block_End is handled similarly to Input_Done. This uses an encoding of the instruction that normally outputs vector data, but the accompanying data is not valid. The use of this encoding is to signal to the destination that there is no more current block output from the source.

Turning now to FIG. 286, an example of how the SFM wrapper tracks valid Block input is illustrated. This example shows an input sequence for four blocks, each of a different size, from four sources. Valid input is marked by solid lines, and inputs that haven't been received yet are marked by "x." The first step of the sequence illustrates the exchange of SN-SP messages at the beginning of input, and the resulting first Set_Valid signals from each source. Although these are shown in the same step, it should be understood that these events happen at different points in time, and that inputs are not synchronized in time, so that each source has its own range of valid input, unlike the first step in the figure where each source has provided one input.

As with Line input, Set_Valid signals are counted in the #SetValV[n] fields for block input from each source, and these fields are used to determine when Valid_Input can be incremented. And, as with Line input, the #SetVal[n] fields cannot be allowed to wrap from the value 1111'b to 0000'b. However, since there's a single SN-SP exchange for all block input, the destination SFM context cannot limit the output from a source, and the number of Set_Valid signals, by withholding an SP message. Instead, for Block input, the context uses P_Incr to limit output. This is denoted in the figure by P_Incr=E'h (1110'b). P_Incr=E'h limits each source 14 sets of block outputs (14 elements for each block), to prevent the potential overflow of #SetValV[n] for the corresponding source, in the extreme case where it gets very far ahead of other sources. (The value F'h enables an unlimited number of outputs, and so doesn't restrict output from a source.) Blocks often require more than 14 outputs, but this is handled by updating P_Incr during execution.

Block inputs arrive in order, due to restrictions in the programming model that iteration is linear in the horizontal direction, then linear in the vertical (if this restriction cannot be met, other forms of dependency checking apply, as described later, but block input cannot be overlapped with execution). Each 32-pixel (for example) input is accompanied by a context number and an offset into the context for a specific block element. The offset of the element is computed directly at the source, using a vertical-index parameter for the destination (this parameter specifies Block_Width). In the SFM context, this offset is added to the context base address, and the input is written starting at the resulting address, 16 pixels per cycle. The resulting address selects an even VMEM bank, and updates all entries of this bank and the next odd bank.

As shown, Valid_Input marks the block index at which at least one input is not yet valid (the block index, Blk_Index, is computed during an absolute vector-packed access). This valid-input pointer applies to all input blocks. Valid_Input is initialized to zero, and is updated as inputs arrive. The context expects block input for all sources that have ValFlag [n,1]=1. When all corresponding #SetValV[n] fields are non-zero, this indicates that a vector Set_Valid has been received from all sources at the current Valid_Input position. At this point, Valid_Input is incremented, and the #SetValV [n] fields are decremented to reflect the new value for Valid_Input.

Before all input is received, dependency checking is performed by comparing the index into a block of an absolute vector-packed access, Blk_Index, to Valid_Input. The condition tested is whether Blk_Index is on or beyond the current set of valid input (Blk_Index≥Valid_Input). If this condition is met, dependency checking fails.

Inputs of smaller blocks generally complete sooner than other inputs, as illustrated in the third step in the figure. The completion of block input is indicated by Block_End from the source. At this point, the ValFlag[n,1] bit is reset, removing this source from block input-dependency checking, and when Blk_Input passes this point of this input, the corresponding #SetValV[n] field will be decremented to zero (by definition, because Valid_Input reflects all Set_Valid signals from the sources). Beyond this point, the condition for updating Valid_Input is based on non-zero #SetValV[n] fields for sources that have ValFlag[n,1]=1, so that other sources increment the pointer beyond this point. Any access to the smaller input passes dependency checking, because it cannot generate an access with Blk_Index larger than Valid_Input.

This process is repeated until all sources have provided data and signaled Block_End. At this point, all #SetValV[n] fields have been decremented to zero, and all ValFlag bits are 0. There are no more expected Set_Valid signals, and dependency checking is disabled.

It is possible to receive block input with Output_Kill signaled, as a result of SD=1 in the source's vertical-index parameter. In this case, the input data is not written, and the block input state is not updated.

It has so far been assumed for these examples that a source provides a single block input. This is not a restriction on the programming model, because a program can contain a number of different iteration loops for different block output. However, the block output from the final set of iteration loops signals Set_Valid, because in the program flow these loops contain the final output in the program to the given destination. At this point, previous input is already valid, and so dependency checking is undesired—it applies to the final block. This limits the potential for overlap, but does not restrict the structure of programs.

SFM program scheduling is based on active contexts, and does not use a scheduling queue. The program-scheduling message identifies the context that the program executes in, and the program identifier is equivalent to the context number. If more than one context executes the same program, each context is scheduled separately. Scheduling a program in a context causes the context to become active, and it remains active until it terminates, either by executing an END instruction with Te=1 in the scheduling message, or by dataflow termination.

Active contexts are ready to execute as long as Valid_Input>HG_POSN, for Line input, or Blk_Input>0. Ready contexts are scheduled in round-robin priority, and each context executes until it encounters a dataflow stall or until it executes an END instruction. A dataflow stall occurs when a program attempts to read invalid input data, as determined by valid-input pointers, or when a program attempts to execute an output instruction and the output hasn't been enabled by a Source Permission. In either case, if there is another ready program, the stalled program is suspended and its state is stored in the Context Save/Restore RAM. The scheduler schedules the next ready context in round-robin order, providing time for the stall condition to be resolved. All ready contexts are scheduled before the suspended context is resumed.

If there is a dataflow stall and no other program is ready, the program remains active in the stalled condition. It remains stalled until either the stall condition is resolved, in which case it resumes from the point of the stall, or until another context becomes ready, in which case it is suspended to execute the ready program. If the program is suspended for input, it should receive at least one more set of inputs (incrementing Valid_Input) before it can become ready for execution again.

There are four major attributes of an SFM context, supporting various types of data and control flow for vector-memory 7603/function-memory 7602 and SFM and node processing:

- Non-threaded/Threaded contexts: Non-threaded contexts have a one-to-one relationship with node contexts, and process either Line or Block data, with the restriction that this data is provided by a single source. Non-threaded contexts can retain results in the vertical direction but cannot share data between contexts in the horizontal direction. Threaded contexts receive data in-order, possibly from multiple sources, and are used to construct circular buffers of Line or Block data in a single SFM context. Ordering is required so that SFM can perform dependency checking on input: input can be partially valid, but the valid region should be contiguous, starting with the first Line or Block input. Non-threaded contexts are useful mainly for parallelism between SFM nodes.
- Continuation contexts permit one or more programs, in different contexts, to participate in the same Block dataflow. They enable overlap of data transfer with execution, and also support parallelism between multiple SFM nodes (multiple nodes aren't in the current TPIC definition).
- Extended contexts permit a context to have more than four destination descriptors, up to a total of eight. This is used to support conditional dataflow, where the output to a given destination depends on program control flow. This increases the desired number of possible outputs, because control flow effectively switches output sets.
- Synchronization contexts have a valid context-state configuration, including context descriptors, destination descriptors, and dataflow state, but don't have a program scheduled for the context. Synchronization contexts perform I/O and synchronization for data transfers into FMEM and VMEM that don't permit overlapping input with execution.
- Shared contexts use two or more context-state entries to perform dependency checking on a shared area of VMEM. This enables dependency checking for programs that operate on both Line and Block input within the same (physical) context, and also enables input and intermediate context to be retained for multiple invocations of a program that operates on the same input context.

These attributes are not mutually exclusive, and there are several useful combinations.

Non-threaded contexts provide the capability for a one-to-one mapping between SFM contexts and node or other SFM contexts, as shown in FIG. 287. This configuration is enabled by Th=0 in the context descriptor. Each SFM context receives data from, and/or provides data to, a unique node context. These contexts can be in a horizontal group, for Line data, or standalone contexts, for Block data. Data input and output is out-of-order between these contexts, with respect to other contexts. However, between any given set of source and destination contexts, the data is provided in-order because of sequential program execution. The SFM contexts cannot share data in the horizontal direction, though they can retain intermediate results in the vertical direction. Data output to node contexts reconstructs the side-context information in those contexts, as with any other transfer into node contexts. Non-threaded contexts can have HG_Size=00'h and operate on blocks or lines that are 32 pixels wide (for example).

A threaded SFM context receives Line input from a node horizontal group, and permits constructing the output of an entire node horizontal group within a single SFM context, permitting node-compatible operations on Line data as described in Section Error! Reference source not found. The system-level dataflow into and out of the threaded context is shown in FIG. 288. This configuration is enabled by Th=1, Blk=0, and Cn=0 in the context descriptor. Data is input to the threaded context in scan-line order from the node sources, using the dataflow protocol for thread destinations. Data is output from the threaded context also in scan-line order, using the dataflow protocol for thread sources. Within the context, the SFM processor 7618 permits full, general access to pixel data in the horizontal group, including intermediate vertical data retained in circular buffers and including boundary processing.

Even though FIG. 288 shows the same number of node contexts as the sources and destinations of the threaded SFM context, this is not necessarily the case. For example, the SFM processor 7618 permits general down-sampling and up-sampling operations, in which case the sizes of the input and output horizontal groups do not match. Because the threaded context is both a thread destination and a thread source, the dataflow protocol correctly matches source and destination data with the horizontal-group size of the source and destination contexts, and correctly orders the data from and to those contexts. In either case, width of the input controls the number of iterations using HG_POSN.

In FIG. 289, an example of the InSt transitions for ordered Line input from multiple node source contexts is shown. The main input state is 00'b, and the main activity in this state is to respond to an SN (if Rt=0) with an SP with P_Incr=F'h (the condition related to #SetVal is to keep this value from wrapping from F'h to 0'H, as explained below, and isn't discussed until the basic operation is described). This accepts most of the input to the scan-line, up to the right-boundary source, where Rt=1 in the SN. The context responds to this SN with an SP, and enters the state 01'b to record the fact that the input is at the right boundary. When Set_Valid is received in this state, ValFlag[n,1] is reset, because all Line input has been received from this set of sources for the current input phase.

In the state 01'b, one of two events can occur next (both occur eventually unless there's an output termination). The context can receive an SN from the left-boundary context for the next input phase, in which case it should be stored in the pending permissions until input is enabled: this is the transition to 10'b. Or, input can be re-enabled: on the transition of InEn from 0 to 1, the state transitions to 00'b to wait on the next SN (termination might occur instead of an SN).

In the state 10'b, where the context has received an SN and is waiting for input to be re-enabled, it's possible for Set_Valid to be received for the right-boundary input of the previous input phase. The reason for this is that the source forwards an SN to the left-boundary context after it signals Set_Valid, but there's no ordering at the destination between the SN received as a result of the forwarded SN and the vector data received with Set_Valid. These transfers occur on different interconnect and have different buffering at source and destination, and on the interconnect. Thus, a Set_Valid received in state 10'b also resets ValFlag[n,1] (Set_Valid cannot be received in state 10'b if it was received in state 01'b).

In state 10'b, when input is re-enabled, the context sends an SP using the pending-permissionentry. Though it's an unlikely corner case, it's possible for the original SN to have Rt=1, in which case the state transitions to 01'b to record this boundary. (After initialization, or if input is enabled before the SN is received, the state is 00'b when the SN is received, but transitions immediately to 01'b after the SN is received.) Otherwise, if Rt=0, the state transitions to 00'b.

The transitions to 00'b from states 01'b and 10'b that depend on input being enabled occur on the transition of InEn from 0 to 1 (InEn→1), rather that InEn=1. When any given source completes its input, it is possible that InEn is still 1 because other sources have not yet completed InEn should first be reset to ensure that all current input data, from all sources, is used in execution. When this input is no longer desired, the program signals Release_Input, causing InEn→1 and enabling the next set of input. It is at this point that the context can respond with SP and permit previous input to be over-written.

The state 11'b is used to hold an SP response to an SN if the resulting Set_Valid might cause the value of #SetValV[n] to wrap from F'h to 0'h, which would lead to incorrect operation of input-dependency checking. Because of the lack of ordering between messages and vector data, the SP is held if an SN is received with #SetValV[n]=E'h, instead of the actual condition to be avoided. The reason for this is that the SN can be received because of a forwarded SN at the source of vector data, received before the Set_Valid that triggered the forwarded SN. If this transition were based on #SetValV[n]=F'h, it would be possible to receive the Set_Valid after the SN, causing the value to wrap. Basing the transition on the value E'h means that, in this worst-case scenario, #SetValV[n] increments to F'h, but the held SP prevents any further Set_Valid. From the state 11'b, once #SetValV[n] is decremented (based on other input from other sources), the state transitions either to 00'b or 01'b, based on the Rt bit in the SN that originally caused the transition to 11'b.

Turning to FIG. 290, an example of the OutSt transitions for Line output to multiple node destination contexts can be seen. The state is initialized to 00'b, and, as soon as the context program begins execution, the context sends an SN with Rt=0 to the initial destination context. This occurs when the program first begins to execute after being scheduled, and uses the shadow destination descriptor, because it's possible that the destination descriptor has a stale value from previous execution: this case arises when the program is re-scheduled in the context without re-initializing the context. All other SN messages have Rt=1 until the program terminates.

When the SP is received in response to the SN, the state transitions to 01'b, where output is enabled for Dst_Tag n, for the program iteration with HG_POSN=0 (the identifier in the SP updates the destination descriptor, as it usually does, which has the effect of re-initializing the descriptor). When the output to that destination is set valid, the state transitions back to 00'b, causing an SN to the original destination with Rt=1. The destination forwards this SN, and the resulting SP identifies the next destination context: this updates the destination descriptor and enables output for the iteration with HG_POSN=1. This process repeats until the program terminates. Even though program iteration is based on the effective HG_Size of the largest input context, the destination contexts can have a different effective HG_Size. The dataflow protocol routes data to the correct destinations by virtue of the forwarded SNs even when HG_POSN does not correspond to the relative horizontal position of the destination context.

Feedback loops require special treatment beyond what is required for nodes (i.e., 808-*i*), because the SFM context should release the dependencies of all contexts in the destination horizontal group, and the DelayCount value applies to all of these contexts. If FdBk is set when the program is scheduled, the context immediately sends an SN to the first destination context (using the identifier in the shadow destination descriptor). When the SP is received, the state transitions to 01'b. At this point, the context should send an SN with Rt=1 so that it can be forwarded to the next destination context. However, this should not be done in state 00'b because there is nothing to distinguish this SN from the first one sent. Instead, if feedback is enabled, the state transitions to 10'b, where the SN is sent for forwarding, then the state transitions to 11'b to wait for the SP response.

This process continues until an SP is received with Rt=1, indicating the right-boundary destination. At this point, the state is 01'b, the state transitions to 10'b, the forwarded SN is sent, and the state transitions to 11'b. Here, because the earlier SP had Rt=1, DelayCount is incremented, and the next SP is from the left-boundary context, because of forwarding from the right-boundary context. If there are multiple feedback destinations, all should meet the condition to increment DelayCount before it's incremented.

As long as DelayCount hasn't reached the value of OutputDelay, subsequent iterations of this process continue to release dependencies, based on receiving SP messages from all destination contexts, until DelayCount=OutputDelay. At this point, an SP received from the left-boundary context enables output to that context, and the SFM context becomes ready for execution when it receives valid input (by the definition of OutputDelay). This execution results in Set_Valid and a transition to 00'b, where normal operation begins. Because this isn't the first execution, the SN sent in this state has Rt=1, as required.

Line data input to an SFM context is relatively small compared to the total data retained by the context, because this input is provided one scan-line at a time. Most of the data in the circular buffer remains valid, and this provides significant opportunity to overlap execution with data transfer. In contrast, Block data is input and operated on an entire block at a time, with the block being discarded upon Release_Input.

Because block transfer and execution times are potentially very large, it is undesirable to serialize data transfer with execution. To avoid this, the SFM context descriptor provides the capability to define a pointer to a continuation context. A continuation context is associated with the defining context, in that it participates in the same dataflow and executes the same program. The continuation context can in turn define its own continuation context, and so contexts can be organized as a context group that participates in the same dataflow and executes the same program.

Continuation contexts permit overlapping dataflow with execution, by providing multiple buffers (contexts) for dataflow independent of execution. This supports the streaming of large amounts of block data into multiple contexts while execution is performed on the blocks. A high degree of overlapped execution is possible, because execution is permitted on partially-valid blocks as they are being filled, assuming dependency checking passes, and on fully-valid blocks as other continuation contexts receive input.

Continuation contexts provide two degrees of freedom to match the computation rate to the dataflow rate:

- If the contexts are on the same node, the execution cycles effectively serialize between contexts. This can slow the effective execution rate to match the dataflow bandwidth.
- If the contexts are on different nodes, the execution cycles are in parallel. This can increase throughput to match the dataflow bandwidth.

Turning to FIG. 291, an example of how a block of 128 pixels by 8 lines is input to a continuation context is shown. The sequence starts with an SN received by the context. For the first block transfer after initialization, to the first context, this SN comes directly from the source context or thread. After that transfer, SNs are propagated by the continuation contexts themselves forwarding the SNs to the next continuation context. The dataflow protocol operates so that the entire buffer is filled on input and the entire buffer is freed upon Release_Input. In response to the first SN, the context sends SP, which can include a Release_Input except immediately after initialization. The source signals Set_Valid after each set of block inputs, causing Valid_Input to increment. one block is shown, but there can be inputs to multiple blocks. The final input is marked with Block_End (the last input precedes this signal). Data can be provided by multiple sources into multiple input blocks of different sizes.

After the entire block is valid, the next SN received by the context is forwarded to the next continuation context, using the continuation pointer in the context descriptor. This forwarding uses the messaging interconnect, and, for the receiving context, is functionally equivalent to receiving the SN from the next source context (which can be different than the previous source, due to source contexts doing their own forwarding to provide thread input). The forwarding context is enabled to execute because all of its input is valid, and this execution can (and should) be overlapped with block input to the next context.

In FIG. 292, an example of a high-level overview of input to a group of continuation contexts that are organized as a circular buffer of contexts can be seen. In this example, there are four contexts in the continuation group, A-D, which can be either on the same or different SFM nodes. In this example, context B receives a block, then forwards an SN to the next continuation context C. Context C receives the next input block. At context D, the continuation pointer wraps back to context A.

The dataflow protocol supports complex transitions between source and destination contexts that are required for transfers between continuation contexts and threads for Block input and output, or node horizontal groups for Line input and output. Since continuation contexts are used to overlap input of linear-addressed blocks, rather than circular buffers, Line input is for the subset block type of an array of Line data (LineArray). The following two sections describe operation in these cases.

Turning to FIG. 293, an example the sequence of dataflow messages for a source thread or context to transition input from one continuation context to the next (a source of Block data is either a GLS thread or a sequential program in a threaded node or SFM context) is shown. The first exchange of SN and SP messages shown is for input of the block to context B (the SP contains a P_Incr value). The last input is signaled with Block_End following the final data transfer. This sets the entire block valid and disables dependency checking. When the next SN is received in this state, the receiving context B forwards the SN, using the message interconnect, to the context identified by its continuation pointer, context C. This context responds to the source with an SP (with P_Incr) when it is ready to receive input. At the source, the destination ID in the SP updates the destination descriptor, so that subsequent output is to this next context.

In FIG. 294, an example of the sequence of dataflow messages for source continuation contexts to transition input to a thread is shown. The first SP message shown enables block output from context B (the SP contains a P_Incr value). The last output from B is signaled with Block_End following the final data transfer. At this point, context B creates a forwarded SN to its destination, on behalf of the next source context C, using the message interconnect. This forwarded SN is created using the identifier of the continuation context C instead of the sending context B. The forwarded SN contains the ID of the current destination, but the destination can also forward this SN as shown in FIG. 293. The ultimate destination of the forwarded SN responds, when it is ready, with an SP (with P_Incr). At the next source context C, the destination ID in the SP updates the destination descriptor, so that subsequent output is transmitted to the correct destination.

Block input isn't required to use a continuation context, though it's normally more efficient. Setting Cn=0 in the context descriptor is functionally equivalent to setting Cn=1 and setting the continuation context ID to the current context ID. In this case, the continuation context and the defining context are the same, with the effect that overlapped input and execution are defined by the behavior of the program in a single context. Either encoding can be used, but the second alternative is more compatible with the encoding of LineArray input: in this case Blk=0 to enable Line input, but Cn=1 indicates that the context operation is on Block data. In this case, if there is a single context, the context ID has to be the same as the defining context.

In FIG. 295, an example of the InSt transitions for Block input to an SFM context is shown. This should apply whether or not a continuation context is defined. The state is initialized to 10'b, where the context is waiting on an SN from the source (this can be either an original SN or a forwarded SN). When this SN is received, and InEn=1, the context responds with an SP with P_Incr=E'h. The value of P_Incr=E'h in this case is used to prevent #SetValV[n] from wrapping from F'h to 0'h. However, there can easily be more than 14 inputs (E'h) from the source. Thus, while input is enabled in the state 00'b, additional SPs are sent to the source whenever required to enable more input. The condition for this SP is that Valid_Input[3] toggles, indicating that at least eight input elements have been received for all current active inputs (the ones that haven't signaled Block_End). At this point, the context enables eight more inputs by sending an SP with P_Incr=8'h. (The value of #SetValV[n] should not be used as an indication of how many transfers have occurred from the source, because it measures the difference between the number of transfers from multiple sources, not the absolute number of transfers: Valid_Input is a measure of the absolute number. Valid_Input[3] is used as a threshold to limit the number of SPs to update P_Incr. This threshold can be adjusted if desired for performance.)

The SPs sent in state 00'b eventually enable all block input, signaled by Block_End. After this, the source can generate an SN for new input, or might forward an SN. Since the SN message and the Block_End signal are not ordered at the destination, either one can occur first, and either signals the end of the block input, causing a transition to state 01'b to record the end of the block. However, Block_End should be received before ValFlag[n] is reset, because this is the guarantee that the final data has been received (it is ordered to be received after the final block input).

The transitions from the state 01'b implement the behavior required if there is a continuation context, and determine the ordering of SN and Block_End from the previous input (if there is an SN, it should be recorded and handled correctly). The two cases, without a continuation context or with, are described separately (the continuation context can be the same as the current context):

Without a continuation context (Cn=0): If an SN or Block_End is received in state 01'b, this indicates that both and SN and Block_End have been received (in one of two orders). This causes a transition to state 11'b, to record the SN and wait until input is enabled. A transition of InEn→1 in this state causes an SP to be sent, again with P_Incr=E'h. Using the transition of InEn (rather than InEn=1) ensures that all previous input has been operated on, and the context is ready for new input. Alternatively, if input is re-enabled in state 01'b, this means that an SN hasn't been received. In this case, the state transitions to 10'b to wait on the SN (this is the same as the initialization state). Here, the condition InEn=1 is used to send the SP, because the SN comes after the transition InEn→1, and the transition has already been recorded by state 10'b.

With a continuation context (Cn=1): If an SN or Block_End is received in state 01'b, this indicates that both an SN and Block_End have been received (in one of two orders). This causes a transition to state 10'b, to record the SN for forwarding. Forwarding doesn't occur until all other input is received, resetting InEn, to prevent a race in the forwarded SN being received back into this context before other input is complete (which could result in an SP that causes valid input to be overwritten). At this point, the context waits for an SN to be received, and sends an SP (with P_Incr) when InEn=1: this can be either on the transition of InEn or the receipt of an SN, depending on which occurs first.

In FIG. 296, an example of the OutSt transitions for Block output from an SFM context is shown. This generally applies whether or not a continuation context is defined. one context in a continuation group is enabled to be the first to output, as indicated by the $1^{st}$ bit being 1 in the context descriptor: this is the context that sends the SN when execution begins in the context, and which handles releasing feedback dependencies, if required. Other contexts, with $1^{st}$=0, are initialized to state 11'b and wait until they receive an SP which results from some other context sending an SN on their behalf. The basic operation is described first, before the description for feedback loops.

For the context with $1^{st}$=1, the state is initialized to 00'b, and, as soon as the context program begins execution, the context sends an SN to the initial destination context. This uses the shadow destination descriptor, because it is possible that the destination descriptor has a stale value from previous execution: this case arises when the program is rescheduled in the context without re-initializing the context. When the SP is received in response to the SN, the state transitions to 01'b, where output is enabled for Dst_Tag n, up to the number of Set_Valid transfers specified by P_Incr (the identifier in the SP updates the destination descriptor, as it usually does, which has the effect of re-initializing the descriptor). During execution, the context can receive SPs which update the permission count. When the block output is set valid with Block_End, the state transitions to 10'b, where an SN is sent on behalf of the continuation context, if Cn=1, or the current context, if Cn=0 (the continuation pointer can also be to the current context if Cn=1). At this point, the state transitions to 11'b, where an SP should be received (from a forwarded SN) before output can be re-enabled for Dst_Tag n: this SP updates the destination descriptor with the new destination ID. The context can be enabled to execute by new input at any point, but cannot output to a destination unless enabled by OutSt[n]=01'b. It's also possible that the program terminates after forwarding the SN, in which case an OT is sent from the context to the most recent destination.

Feedback dependencies are handled by the context with $1^{st}$=1. If FdBk is set when the program is scheduled, the context immediately sends an SN to the first destination context (using the identifier in the shadow destination descriptor). When the SP is received, the state transitions to 01'b and the DelayCount value is incremented (this is based on the value not already being equal to OutputDelay, to prevent incrementing DelayCount in normal operation). After incrementing DelayCount, if the value has not reached OutputDelay, the state transitions back to 00'b where another SN is sent. If there are multiple feedback destinations, all should meet the condition to increment DelayCount before it is incremented.

As long as DelayCount has not reached the value of OutputDelay, subsequent iterations of this process continue to release dependencies, based on receiving SP messages, until DelayCount=OutputDelay. At this point, the state is 01'b, and the SP just received enables output to that context. The SFM context becomes ready for execution when it receives valid input (by the definition of OutputDelay). This execution results in Block_End and a transition to 10'b, where normal operation begins.

Feedback dependencies can be released in multiple destination contexts in this manner when the destination is a continuation group. SP messages in response to feedback SNs update the destination descriptors so that subsequent SNs are sent to the proper destination contexts. Each destination context enabled to execute by the release of feedback dependencies executes a valid program even though there is no data provided by the feedback source for OutputDelay iterations.

As previously discussed, a subset of a Block datatype, LineArray, is a linear array of Line data, in contrast to a circular buffer. This data is provided as input from or output to a node horizontal group, using processing node circular buffers with the same vertical dimension as the SFM LineArray block. The width of a LineArray input is the same as the width of the source horizontal group, but input can be accepted, into different LineArray variables, from sources of different widths. LineArray data is distinguished from more general Block data in that the source and/or destination node or processing node contexts are non-threaded. This type of input is encoded by Blk=0 (encoding Line input), and Cn=1 (enabling a continuation context, which usually applies to SFM Block data: this encoding can require a continuation context, which can be the same as the current context if a single context is allocated).

The dataflow protocol for LineArray input and output is a hybrid of the protocol for Line and Block data. The program explicitly iterates on the input as a Block (the program datatype), and there's no notion of Line boundaries even though the source contexts provide output as Line. For this reason, the input usually does not wait at the right boundary for other input and for execution to begin (there is no boundary, though there is a right-boundary indication from the source). Instead, the end of input for the current program is indicated by a signal that accompanies the input data, called Fill, which indicates the last line in a circular buffer (the vertical index is equal to the buffer size). Input is overlapped with execution using the valid-index pointer to check dependencies, but this pointer is updated and used as for Block input. When the last set of inputs is received from a source, the next set of inputs is directed to the continuation context. The continuation context can receive new input while the current context continues processing. The input remains valid until Release_Input is signaled, when the entire block is released.

Turning to FIG. 297, an example of the sequence of dataflow messages for multiple source node contexts, in a horizontal group, to sequence their input to an SFM context in a continuation group is shown. This is the same as to a single, threaded SFM context, but is shown here to introduce the sequence to transition from one continuation context to the next. The left-boundary context exchanges SN and SP messages with the SFM context, and, after the output is set valid, forwards the SN to the context on its right. This repeats up to the right-boundary context, which provides the final input on the scan-line. The right-boundary context forwards the SN through its right-context pointer, which is linked to the left-boundary context, and input continues on the next scan-line in the LineArray.

In FIG. 298, an example of the sequence of dataflow messages for multiple source node contexts, in a horizontal group, to transition input from one continuation context to the next is shown. This sequence starts with the right-boundary node context providing the final input to the right-most continuation context (this could be any of the continuation contexts, but final output is usually from the right-boundary node context). Once that input has been set valid (with Fill=1), the source context forwards the SN to the left-boundary context, which sends an SN to the right-most continuation context. Because this context previously received Fill=1, and since it has a continuation context, it forwards the SN to its continuation context, which is the left-most context in this example. When this context is ready for input, it responds to the left-boundary node context with an SP (and P_Incr, not shown). The destination ID in the SP updates the node destination descriptor to point to this next continuation context, and subsequent node contexts also update the destination ID as a result of the SP responses. After this transition, the node horizontal group is outputting to the new continuation context. Operation continues as shown.

In FIG. 299, an example of the sequence of dataflow messages for an SFM context, in a continuation group, to sequence its output to multiple node contexts in a horizontal group is shown. This is usually the same as from a single, threaded SFM context, but is shown here to introduce the sequence to transition from one continuation context to the next. After the SFM context provides all output to the left-boundary context, signaled by Set_Valid, it sends an SN to that context, with Rt=1. The receiving context forwards this SN to the context on its right, which, when it's ready, responds with an SP. This repeats up to the right-boundary context, which receives the final output on the scan-line. The right-boundary context forwards the SN through its right-context pointer, which is linked to the left-boundary context, and output continues on the next scan-line in the LineArray.

In FIG. 300, an example of the sequence of dataflow messages for an SFM context, in a continuation group, to transition output to a processing node horizontal group from one continuation context to the next is shown. This sequence starts with the right-most continuation context providing the final input to the right-boundary node context (this could be any of the continuation contexts, but final output is usually to the right-boundary node context). Once that input has been set valid, iteration on the LineArray data completes, resulting in a Block_End indication. This cannot be signaled for Line output. Instead, the fact that this is LineArray output suppresses the Block_End to the destination. Instead, the Block_End indication causes the source context to send an SN to the right-boundary context, on behalf of its continuation context, with Rt=1. The right-boundary context forwards the SN to the left-boundary context, which replies to the next continuation context when it's ready. The destination ID in the SP updates the SFM destination descriptor to point to the left-boundary context. After this transition, the new continuation context is outputting to the processing node horizontal group.

Turning to FIG. 301, an example of the InSt transitions for ordered LineArray input from multiple node source contexts is shown. There are two main differences between Line and LineArray input. The first is that the input does not wait at the right boundary for other input. Instead, the end of input for the current program from a given set of sources is indicated by Fill with Rt=1 in the SN. The purpose of transitioning from 00'b to 01'b is to record input from the right-boundary source, so that a Set_Valid with Fill=1 can reset ValFlag[n,1] and release the dependency on this source. If Set_Valid is signaled with Fill=0, the state transitions to 00'b for the next input from the source horizontal group. The second difference between Line and LineArray input is properly handling the forwarding of SNs to the next continuation context (which can be the current context) and also handling the lack of ordering between SN and Set_Valid, as well as the fact that an SN forwarded to the continuation context can result in an SN being received by the current context. The various cases are described separately. In state 01'b, after the sequence just described:

- An SN can be received before Set_Valid, causing a transition to 10'b. This SN can be for any set of inputs from the source, including the next set of inputs that should be directed to the continuation context. If the SN is for the current set of inputs, the condition of Set_Valid with Fill=0 causes a transition to 00'b: the SP is sent at this time (InEn→1 cannot occur at this point, because not all input has been received). If it's for the next set of inputs, the condition of Set_Valid with Fill=1 resets ValFlag[n,1], and the state transitions to 01'b, forwarding the SN to the continuation context in the process.
- Input can be received with Set_Valid and Fill=1 (this also resets ValFlag[n,1]). In this case, the state transitions to 10'b to wait on the next SN, from the left-boundary source context, to be forwarded to the continuation context. When this SN is received, and the state transitions to 01'b, forwarding the SN to the continuation context in the process.

In both of the above cases, if an SN is forwarded, the state is still 01'b after the sequence. However, there can be no Set_Valid in this condition, so state transitions are used to order the events of: 1) input being re-enabled, and 2) an SN being received as a result of forwarding from another (or the current) SFM context. If input is re-enabled first (InEn→1), the state transitions to 00'b to wait on the SN. If the SN is received first, the state transitions to 10'b, and the possible event at this point is for input to be re-enabled, at which point the state transitions to 00'b.

FIG. 302 shows the OutSt transitions for LineArray output to multiple node destination contexts. For Line output, the state transitions 01'b→10'b→11'b→01'b are used for releasing feedback dependencies. These transitions are used for the same purpose in the case of LineArray output, but they are also used to send SNs on behalf of continuation contexts. Both cases are discussed separately below. The context that has $1^{st}$=1 releases feedback dependencies, accomplished by initializing OutSt to 00'b for this context. Other contexts are initialized to the state 11'b, and don't become active until receiving an SP resulting from an SN being sent on their behalf. The state transitions for feedback are the same as for Line output, except that more conditions are placed on the transitions and the resulting actions, because these states are also used in normal operation to forward to continuation contexts. There are two primary differences:

- In the state 01'b, during feedback iterations, the source ID in the SN is usually the current context, regardless of the continuation context. This holds until DelayCount reaches the value of OutputDelay, where the continuation context is used instead (which can also be the current context, but based on the setting of the context descriptor).
- In the state 11'b, DelayCount is incremented if it hasn't already reached the value of OutputDelay. This doesn't matter for Line output, because this state is entered during feedback iterations, but it can be used in normal operation to prevent DelayCount from being incremented and re-enabling feedback operation in other states. If there are multiple feedback destinations, all should meet the condition to increment DelayCount before it's incremented.

Normal operation for the contexts with $1^{st}$=0 begins in state 11'b when an SP is received. The context receives this SP without sending and SN, because the SN was sent on it's behalf by another continuation context (the SP updates the destination descriptor, as usual). This SP enables output whether or not the context is ready to execute, but this output does not begin until sufficient input is provided for the program to be scheduled—the order of these two event does not matter. During execution, the transitions 01'b→00'b→01'b are used to send the SN to be forwarded by the destination context, and receive the SP as a result of this SN to enable output to the next context.

This continues until the program signals Block_End, indicating that output is complete in the current context and should be passed to the continuation context. As mentioned already, the transfer with Block_End signaled is suppressed (the accompanying data is invalid, and the destination does not desire this signal). Instead, Block_End causes a transition to 10'b, where an SN is sent on behalf of the continuation context (which can be set to the current context). At this point, the state transitions to 11'b, where the context waits again for an SP resulting from an SN sent by another context in state 10'b.

One continuation context in the group usually receives an Output_Terminate signal (OT); this is the context that receives the final block input. For block input received from one or more node contexts, the OT is sent by the context that performs the final input (for horizontal groups, this is the right-boundary context), and it is sent after the block has been set valid. For block input received from a read thread, the OT can be received at any time after the final set of inputs, and is recorded (InTm) and doesn't take effect until the entire block is set valid, and the program completes execution with an END instruction (it's possible, but unlikely, that the END will occur before OT, with the same effect).

When this context terminates, it sends an OT to each destination. If the destination is a write thread, this occurs after the final input to the thread. If the destination is a processing node horizontal group, the OT is sent to the left-boundary context, whose destination ID is in the shadow destination descriptor. This is not the context that received final data, but in any case the receiving context treats the OT in the usual manner. Once the left-boundary context terminates (if either it executes an END, or has already executed and END), it sends OT to any non-threaded destination, and forwards the OT to the right-side context for any threaded destination. This forwarding continues as contexts terminate, up to the left-boundary context, which then sends the OT on to any thread destination.

Since the SFM continuation contexts are threaded, one is enabled for output at any given time, and this is the one that receives and sends the OTs. Other contexts in the group have ended output at this point, and will not execute again, but don't receive an OT. In this case, the terminating context transmits a Node Program Termination message, which can result in other contexts in the group being re-initialized and/or re-scheduled, with the same effect as termination. To avoid having to predict which context receives the OT, the Control Node should be configured so that termination in each of the contexts has the same effect.

If an SN sets ValFlag[n,1:0] to 01'b, the input is for scalar-data. This occurs in situations where a source provides scalar data such as vertical-index parameters, with vector data being provided by other sources. If a source provides both scalar and vector data, the InSt transitions for vector input also cover scalar input. For scalar-only input, there are no vector transfers, but the vector input-state transitions can be used by treating this input as a special case of vector input. The special casing uses the following rules:

For Line input (Blk=0, Cn=0), the scalar input is treated as an input from the right-boundary context, as if the SN had Rt=1 regardless of the value in the SN. The scalar Set Valid resets the ValFlag[n] LSB.

For Block input (Blk=1), the scalar Set_Valid is considered to also signal Block_End. The scalar Set_Valid resets the ValFlag[n] LSB.

For LineArray input (Blk=0, Cn=1), the scalar input is treated as an input from the right-boundary context, as for Line input, but also with Fill=1. The scalar Set_Valid resets the ValFlag[n] LSB.

Note that treating scalar-only input as a special case of vector input also properly sequences the dataflow protocol for continuation contexts, which also apply to scalar-only input though defined for Block input.

Unlike processing nodes (i.e., 808-*i*), which supports program loops, the shared function-memory 1410 supports conditional statements (such as if statements). Some applications require that output be performed within conditional statements, so that destination programs are enabled to execute, or not, based on control flow. This is similar in concept to a switch statement where the case statements invoke the destination programs (though the control flow is more general). This form of output puts more pressure on the desired number of destinations, because the number of outputs is a function of the combination of program conditions, not just the number of destinations.

Because of this, shared function-memory 1410 can supports up to eight destinations (for example), using an extended context. If Ext=1 in the context descriptor, the program can use the destination descriptors and dataflow state of both the current and next sequential context-state entries. Dst_Tag values 0-3 use the current descriptor, and values 4-7 use the next sequential descriptor. The current descriptor defines all other attributes, such as the continuation context (note that other contexts in a continuation group should also have extended contexts).

An SFM context can be configured to perform synchronization operations for blocks that are operated on in other contexts. A synchronization context is used when other dependency mechanisms cannot be used. There are two case where this applies. The first is to provide Block input to function-memory 7602, to be operated on by a processing node (using LUT accesses). Processing node contexts do not generally support dependency checking on function-memory 7602, so the synchronization context is used instead to enable node execution. The second case is to provide Block input to vector-memory 7603 to be operated on by another SFM context on the same node, when the block input is randomly addressed instead of sequentially. Neither case should permit overlap of input and execution, but still supports parallel execution between nodes.

In FIG. 303, an example of the operation of a synchronization context for the input of an function-memory 7602 block to a node context is shown. The operation is identical to vector-memory 7603 block input to an shared context, and the descriptor settings are the same, except that Fm=1 for a write to function-memory 7602. The synchronization context is null, in that it has valid context and destination descriptors, but no program scheduled. In this example, the context base address is configured in function-memory 7602, with the same value as the processing node LUT base address, and the destination descriptor points to the node context.

To properly handle the dependencies for the node context, the SFM context performs the dataflow protocol on behalf of the node context, forwarding SNs to the node context and forwarding SP replies from the node context back to the source. When all input has been provided, the source signals Block_End. This normally enables the SFM context to execute, but, since it is null, it effectively executes nothing, but provides "output" to the node context by signaling Set_Valid (Set_Valid is used instead of Block_End because node contexts do not generally interpret Block_End. This enables the node context to execute (depending on other input into the context), and prevents further input using the dataflow protocol until Release_Input. Since there is no execution in the synchronization context, a synchronization context has no continuation context. However, if the destination is an SFM context (for random vector-memory 7603 block input, with Fm=0), that context can be part of a continuation group to provide overlap with execution, though not on partially-valid blocks.

SFM context-state entries can be shared for use by a program, to provide more general forms of dependency checking and input sequencing than is possible with a singleentry. A context is configured to share another context-stateentry by setting the Shr bit in the context descriptor, and setting both the vector-memory 7603 and data memory context base addresses to the same value. In this configuration, the descriptorentry that is used to specify a continuation-context node ID is used instead to specify a share pointer indicating the context number of the sharedentry. Continuation contexts are still possible, because shared contexts by definition are on the same node, so the Cn_Cntx# field is desired to specify the continuation context.

The basic use of a shared SFM context is to enable input dependency checking on both Line and Block input as shown in FIG. 304. A typical use of this configuration is to provide blocks as templates to be compared against a frame division of scan-lines. In this case, two descriptors are used: one for Block input, with Blk=1, and another for Line input, with the Blk=0. If Blk=1, the descriptor provides the valid-input pointer for block-access dependency checking, and if Blk=0, it provides the valid-input pointer for line-access dependency checking. These are independent parameters in the SFM processor 7614 datapaths, and are selected based on the instruction that does a vector-packed access.

As shown, the Line input descriptor points to the Block input descriptor. Normally, the block input is provided once, with input complete upon Block_End from all sources, and the Line data is provided as recurring input, with implicit iteration on the input. In this case, the Block input context is null, and the program is scheduled for the Line context. In any case, the non-null context contains the share pointer, and Release_Input releases input in this context. Input in the null context is released when the scheduled program terminates in the non-null context.

If both Cn and Shr bits are set in a context descriptor, the descriptor contains both a pointer to a continuation context and to a shared context-stateentry, both on the same node. Since continuation contexts are used for block input, and since block dimensions are specified by a program, one descriptor is desired to check dependencies on any given set of inputs. Instead, the share pointer is used to control the persistence of input state, by controlling which dataflow state, and associated input, is affected by a Release_Input executed within the context.

Because shared continuation contexts execute the same program within the same address space, and share input and intermediate data, execution should be exclusive, such that the program executes in one context at a time, and runs to completion in that context. This is accomplished by scheduling the program in one of the continuation contexts, determined by how many sets of input are required before the program can begin execution. Once this program completes execution, it's scheduled to execute in the next context as determined by the continuation pointer.

Turning to FIG. 305, an example of how program scheduling and the share pointer can be used to implement ping-pong block input to the shared context is shown. This allows overlap of input and execution, while also sharing intermediate results between inputs. In the first step of the sequence shown, block A is valid, and the program is executing in context A. When the A input is set valid, the continuation pointer enables block B to be input while the program is operating on A. This is illustrated by the darker color and solid lines for block A, and lighter color and dashed lines for block B.

The share pointer of A points to A itself, so when the program signals Release_Input, block A is released. If the input to B is complete, A can receive new input while it completes execution. If A completes execution first, the program scheduling information is copied to B and execution begins on that input, possibly overlapped with the completion of input to B. The second step of the sequence shows the case where B input is complete and B is executing, while A receives input. The third step shows the completion of the ping-pong cycle, the same as the first step.

In FIG. 306, an example of a more general use of shared continuation contexts is shown, in this case an example of a rolling window (FIFO) of three blocks, which permits sharing of this input across multiple executions of the same program. There are two major issues to be resolved: execution cannot begin until there is sufficient input—in this case three blocks—and, after execution, the oldest block should be discarded and input enabled for the next block. The first issue is resolved by scheduling the first execution of the program in the third context, C. This execution usually does not begin until blocks A and B have been input, and block C is at least partially input. The share pointers are set to the same values as the continuation pointers, so when the initial program in C signals Release_Input, this releases context A to receive input. When the program completes in context C, the scheduling information is copied to context A, where execution can begin when block A is at least partially valid. Since the program shares intermediate state, including intermediate data memory state, the program can manage the FIFO by updating pointers to the oldest, middle, and newest block to point to blocks A, B, and C as required. There can also be a fourth context that is usually used to receive input, while the program operates on three completely-valid sets of input blocks.

Turning to FIG. 307, another example of the use of shared continuation contexts is shown, in this case to input a block that is persistent during execution on other block input. In this example, context A has a continuation pointer to context B, but the continuation pointer for B also points to B. The initialization block(s) is/are provided to A, which is null, as shown in the first step. As soon as these blocks are set valid, input transitions to B, which begins execution when it has received sufficient input: this is the second step shown. Recurring input is to B, and B can overlap input with execution, both by operating on partially-valid blocks, and by continuing execution after Release_Input. However, further overlap can be accomplished using more continuation contexts as shown in the previous figures: it should be understood that there are many general ways to organize these contexts.

Turning to FIG. 308, the dataflow state 9000 for shared function-memory 1410 context can be seen. As shown, the dataflow state 9000 is similar to dataflow state 4210 (of FIG. 68), but there are some differences. As shown and for example, there is an HG_POSN parameter, which can be used to iterate computation within threaded contexts. Here, dependency checking uses the V_Input and HG_Input fields to detect attempted access of input that is not valid. The sizes of these fields are programmable, as determined by the V_Range parameter in the context descriptor. This supports algorithms that require very large horizontal contexts but not much vertical context, such as image processing, while also supporting algorithms that require more uniform, rectangular blocks, such as video processing.

11.5. SFM Wrapper

SFM node wrapper 7626 is a component of shared function-memory 1410 which implements the control and dataflow around the SFM processor 7614. SFM node wrapper 7626 generally implements the interface of the SFM to other nodes in processing cluster 1400. Namely, the SFM wrapper 7626 can implement following functions: initialization of the node configuration (IMEM, LUT); context management; programs scheduling, switching and termination; input dataflow and enables for input dependency checking; output dataflow and enables for output dependency checking; handling dependencies between contexts; and signal events on the node and support node-debug operations.

11.5.1. Interface and Functionality

SFM wrapper 7626 typically has 3 main interfaces to other blocks in processing cluster 1400: messaging interface, data interface, and partition interface. The message interface is on OCP interconnect where input and output messages map to slave and master port of message interconnect respectively. The input messages from the interface are written into (for example) a 4-deep message buffer to decouple message processing from ocp interface. Unless if the message buffer is full, the ocp burst is accepted and processed offline. If the message buffer gets full, then the OCP interconnect is stalled until more message can be accepted. The data interface is generally used for exchanging vector data (input and output), as well as initialization of instruction memory 7616 and function-memory LUTs. The partition interface is on the generally includes at least one dedicated port in shared function-memory 1410 for each partition.

The initialization of instruction memory 7616 is done using node instruction memory initialization message. The message sets up the initialization process, and the instruction lines are sent on data interconnect. The initialization data is sent by GLS unit 1408 in multiple burst. MReqInfo[15:14] ="00" (for example) can identified the data on data interconnect 814 as instruction memory initialization data. In each burst, the starting instruction memory location is sent on MreqInfo[20:19] (MSBs) and MreqInfo[8:0] (LSBs). Within a burst, the address is internally incremented with each beat. Mdata[119:0] (for example) carries the instruction data. A portion of instruction memory 7616 can be reinitialized by providing starting address to reinit a selected program.

The initialization of function-memory 7602 lookup tables or LUTs is generally performed using an SFM function-memory initialization message. The message sets up the initialization process, and the data word lines are sent on data interconnect 814. The initialization data is sent by GLS unit 1408 in multiple burst. MReqInfo[15:14]="10" can identifies the data on data interconnect 814 as function-memory 7602 initialization data. In each burst, the starting function-memory address location is sent on MreqInfo[25:19] (MSBs) and MreqInfo[8:0] (LSBs). Within a burst, the address is internally incremented with each beat. A portion of function-memory 1410 can be reinitialized by providing starting address. Function-memory 1410 initialization access to memory has lower priority than partition access to function-memory 1410.

Various control settings of SFM are initialized using a SFM control initialization message. This initializes context descriptors, function-memory table descriptor, and destination descriptors. Since the number of words required to initialize the SFM control are expected to be more than message OCP interconnect max burst length, this message can be split in multiple OCP bursts. The message bursts for control initializations can be contiguous, with no other message type in between. The total number of words for control initialization should be (1+#Contexts/2+#Tables+4*#Contexts). The SFM control initialization should be completed before any input or program scheduling to shard function-memory 7616.

Now, turning to input dataflow and dependency checking, the input dataflow sequence generally starts with Source Notification message from source. The SFM destination context processes the source notification message and responds by Source Permission (SP) messages to enable data from source. Then the source sends data on respective interconnect followed by Set_Valid (encoded on MReqInfo bit on interconnect). The scalar data is sent using an update data memory message to be written into data memory 7618. The vector data is sent on data interconnect 814 to be written into vector-memory 7603 (or function-memory 7602 for synchronization context with Fm=1). SFM wrapper 7626 also maintains dataflow state variables, which are used to control the dataflow and also to enable the dependency checking in SFM processor 7614.

The input vector data is from OCP interconnect 1412 is first written into (for example) two 8entry global input buffer 7620—consecutive data is written into/read from alternate buffers in ping pong arrangement. Unless if the input data buffer is full, the ocp burst is accepted and processed offline. The data is written into vector-memory 7603 (or function-memory 7602) in a spare cycle when the SFM processor 7614 (or partition) is not accessing the memory. If the global input buffer 7620 becomes full, then the OCP interconnect 1412 is stalled until more data can get accepted. In input buffer full condition, SFM processor 7614 is also stalled to write into the data memory and avoid stalling the interconnect 1412. The scalar data on the OCP message interconnect is also into (for example) a 4 entry message buffer, to decouple message processing from OCP interface. Unless the message buffer is full, the OCP burst is accepted and data is processed offline. The data is written to data memory 7618 in a spare cycle when SFM processor 7614 is not accessing the data memory 7618. If the message buffer becomes full, then the OCP interconnect 1412 is stalled until more message can be accepted, and SFM processor 7614 is stalled to write into memory 7618.

Input dependency checking is employed to generally ensure that the vector data being accessed by SFM processor 7614 from vector memory 7603 is a valid data (already received from input). Input dependency check is done for vector packed load instructions. Wrapper 7626 maintains a pointer (valid_inp_ptr) to the largest valid index in the memory 7618. Dependency check fails in a SFM processor 7614 vector unit, if H_Index is greater than valid_input_ptr (RLD) or Blk_Index is greater than valid_index_ptr (ALD). Wrapper 7626 also provides a flag to indicate that the complete input has been received and dependency checking is not desired. Input dependency check failure in SFM processor 7614 also causes stall or context switch—signals dependency check failure to wrapper and wrapper does task switch to switch to another ready program (or stalls processor 7614 if there are no ready programs). After a dependency check failure, when the same context program can be executed into again after at least another input has been received (so that dependency checking may pass). When the context program is enabled to execute again, the same instruction packet has to be re-executed. This employs special handling in processor 7614 because the input dependency check failure is detected in execute stage in pipeline. So this means that the other instructions in the instruction packet have already executed before processor 7614 stalls due to dependency check failure. To handle this special case, wrapper 7626 provides a signal to processor 7614 (wp_mask_non_vpld_instr), when it re-enabling a context program to execute after a previous dependency check failure. The vector packed load access is usually in a specific slot in the instruction packet, so one slot instruction is re-executed next time, and instruction in other slots are masked for execution. Below is sample logic for input dependency check:

```
if (wp_Blk_access)
        inp_dep_check_failed = (Blk_Index >= Blk_Input) &
        wp_en_dep_check
else
        inp_dep_check_failed = (H_Index >= HG_Input) &
        wp_en_dep_check
if wp_Shr=1, then vector unit chooses either
wp_en_dep_check+wp_valid_inp_ptr or
    wp_en_dep_check_shr+wp_valid_inp_ptr_shr depending on
    access type.
    if access type is Blk (ALD)
        if wp_Blk_ctx=1,
            use wp_en_dep_check+wp_valid_inp_ptr
        else
            use wp_en_dep_check_shr+wp_valid_inp_ptr_shr
```

Turning now to the Release_Input, once the complete input is received for an interation, no more inputs can be accepted from sources. The source permission is not sent to the sources to enable more input. Programs may release the inputs before end of iteration, so that the input for next iteration can be received. This is done through a Release_Input instruction, and signaled to processor 7614 through flag risc_is_release.

HG_POSN is position for current execution or Line data. For Line data context, HG_POSN is used for relative addressing of a pixel. HG_POSN is initialized to 0, and increment on the execution of a branch instruction (TBD) in processor 7614. The execution of the instruction is indicated to wrapper by flag: risc_inc_hg_posn. HG_POSN is wrapped to 0 after it reaches the right most pixel (HG_Size) and a increment flag is received form instruction execution.

11.5.2. Program Scheduling and Switching

The wrapper 7626 also provides program scheduling and switching. A Schedule Node Program message is generally used for program scheduling, and the Program scheduler does following functions: maintains a list of scheduled programs (active contexts) and the data structure from "schedule node progam" message; maintaints a list of ready contexts. It marks a program as "ready" when the context becomes ready to execute: active context on receiving sufficient inputs become ready; schedules a ready program for execution (based on round robin priority); provides program counter (Start_PC) to processor 7614 for a program being scheduled to execute for the first time; and provides dataflow variables to processor 7614 for dependency checking as well as some states variables for execution. The scheduler also can continuously keep looking for next ready context (next ready in priority after current executing context).

SFM wrapper 7626 can also maintain a local copy of descriptor and state bits for current executing context for instant access—these bits normally reside in data memory 7618 or Context descriptor memory. It keeps the local copy coherent when state variables in context descriptor memory are updated. For executing context, these following bits are usually used by processor 7614 for execution: data memory context base address; vector-memory context base address; input dependency check state variables; output dependency check state variables; HG_POSN; and flag for hg_posn !=hg_size SFM_Wrapper also maintains a local copy of descriptor and state bits for next ready context. When a different context becomes the "next ready context", it again loads the required state variables and configuration bits from data memory 7618 and context descriptor memory. This is done so that the context switching is efficient, and does not wait to retrieve settings from memory access.

Task switching suspends the current executing program and moves the processor 7614 execution to "next ready context". Shared function-memory 1410 dynamically does a task switch in case of dataflow stall (examples of which can be seen in FIGS. 309 and 310). Dataflow stall is input dependency check failure or output dependency check failure. In case of dataflow stall, processor 7614 signal dependency check failure flag to SFM wrapper 7626. Based on dependency check failed flag, SFM wrapper 7626 starts task switching to a different ready program. While wrapper does the task switch, processor 7614 enters IDLE and flush the pipeline for instructions already in fetch and decode stage—those instruction will be re-fetched when program resumes next time. If there are no other ready contexts, then execution remains suspended until dataflow stall condition can get resolved—respectively on receiving inputs or receiving output permissions. It should also be noted that SFM wrapper 7626 usually guesses whether the dataflow stall has resolved or not, since it does not know the actual Index failing input dependency check, or the actual destination failing output dependency check. On receiving any new input (increment of valid_inp_ptr) or output permission (receiving SP from any destination), the program is marked ready again (and resumed if no other program is executing). It is therefore possible that the program might again fail dependency check after resuming and go through task switch. The task suspend and resume sequence in same context is same as task switch sequence to a different context. Task switch can also attempted on execution of END instruction in a program (examples of which can be seen in FIGS. 311 and 312). This is to give all ready programs a chance to run. If there are no other ready programs, then same program continues to execute. Additionally, the following steps are followed by SFM wrapper 7626 on a task switch:

(1) Assert force_ctxz=0 to processor 7614
   i. Save the processor 7614 state for this program into context state memory
   ii. Restore the T20 and T80 state for new program from context state memory
(2) Assert force_pcz=0 and provide new_pc to processor 7614.
   i. For program getting suspended or resuming execution, the PC is saved/restored from context state memory.
   ii. For program starting execution for first time, the PC is from Start_PC of "Schedule Node Program" message.
(3) Load the state variable and config bits copy of "next ready context" to "current executing context"

Turning now to the output data protocol for different datatype, In general, at the start of a program execution, SFM wrapper 7626 sends Source Notification message to all destinations. The destinations are programmed in destination descriptors, and destinations respond with Source Permission to enable output. For vector output, P_Incr field in source permission message indicate the number of transfers (vector set_valid) permitted to be sent to respective destination. OutSt state machine govern the behaviour of output dataflow. Two types of outputs can be produced by SFM 1410: scalar output and vector output. Scalar output is sent on message bus 1420 using update data memory message, and vector output is sent on data interconnect 814 (over data bus 1422). Scalar output is result of execution of OUTPUT instruction in processor 7614, and processor 7614 provides an output address (computed), control word (U6 instruction immediate) and output data word (32-bit from GPR). The format of (for example) a 6-bit control word is Set_Valid ([5]),Output Data Type ([4:3] which is Input Done(00), node line (01), Block (10), or SFM Line (11)), and destination number ([2:0] which can be 0-7). Vector output occurs by execution of VOUTPUT instruction in processor 7614, and processor 7614 provides an output address (computed) and control word (U6 instruction immediate). The output data is provided by a vector unit (i.e, 512-bit, [32-bit per T80 vector unit GPR]*16 vector units) within processor 7614. The format of (for example) a 6-bit control word for VOUTPTU is same as OUTPUT. The output data, address and controls from processor 7614 can be first written into a (for example) 8entry global output buffer 7620. SFM wrapper 7626 reads the outputs from global output buffer 7620 and drives on the bus 1422. This scheme is done so that processor 7614 can continue execution while output data is being sent out on interconnect. If the interconnect 814 is busy and the global output buffer 7620 becomes full, then processor 7614 can be stalled.

For output dependency checking, the processor 7614 is allowed to execute output if the respective destination has given permission to SFM source context for sending data. If processor 7614 encounters a OUTPUT or VOUTPTU instruction when the output to the destination is not enabled, it results in a output dependency check failure causing task switch. SFM wrapper 7626 provides two flags to processor 7614 as enable, per-destination, for scalar and vector output respectively. Processor 7614 flag output dependency check failure to SFM wrapper 7626 to start task switch sequence. Output dependency check failure is detected in decode pipeline stage of processor 7614, and processor 7614 enters IDLE and flushes the fetch and decode pipeline if it encounters output dependency check failure. Typically, 2 delay slots are employed between OUTPUT or VOUTPUT instruction with Set_Valid so as to update the OutSt state machine based on Set_Valid and update the output_enable to processor 7614 before the next Set_Valid.

SFM wrapper 7626 also handles the program termination for SFM contexts. There are typically two mechanisms for program termination in processing cluster 1400. If the schedule node program message had Te=1, then the program terminates on END instruction. The other mechanism is based on dataflow termination. With dataflow termination, the program terminates when it has finished execution on all the input data. This allows the same program to run multiple iterations before termination (multiple END and multiple iteration of input data). A source signals Output Termination (OT) to its destinations when it has no more data to send—no more program iterations. The destination context stores the OT signal and terminates at the end of last iteration (END)—when it has completed execution on the last iteration of input data. Or, it may receive the OT signal after finishing the last iteration execution, in which case it immediately terminates.

The source signals the OT through same interconnect path as the last output data (scalar or vector). If the last output data from the source was scalar, then the output termination is signalled by scalar output termination message on message bus 1420 (same as scalar output). If the last output data from the source was vector, then the output termination is signalled by vector termination packet on data interconnect 814 or bus 1422 (same as data). This is to generally ensure that destination never received OT signal before the last data. On termination, an executing context sends OT message to all its destinations. The OT is sent on the same interconnect as the last output from this program. After finishing sending OT, the context sends node program termination message to control node 1406.

InTm state machine can also be used for termination. In particular, the InTm state machine can be used to store the Output Termination message and sequence the termination. SFM 1410 uses same InTm state machine as the nodes, but used "first set_valid" for state transitions instead of any set_valid like in the nodes Following sequence ordering are possible between input (set valid), OT and END at destination context: Input Set_Valid—OT—END: terminate on END; Input Set_Valid—END—OT: terminate on OT; Input Set_Valid (iter n−1)—Release_Input—Input Set_Valid (iter n)—OT—END—END: terminate on $2^{nd}$ END: last iteration; Input Set_Valid (iter n−1)—Release_Input—Input Set_Valid (iter n)—END—OT-END: terminate on $2^{nd}$ END: last iteration; and Input Set_Valid (iter n−1)—Release_Input—Input Set_Valid (iter n)—END—END—OT: terminate on OT.

11.5.3. Example Pin Interface or IO

In Table 34 below, an example of a partial list of IO pins or signals of the wrapper 7626 can be seen.

TABLE 34

| Pin | I/O | Description |
|---|---|---|
| Descriptor bits for executing context | | |
| wp_en_dep_check | OUT | flag to enable dependency check. If this bit is 0, then dependency check is not desired (can't fail, since buffer is full) |
| wp_Blk_ctx | OUT | executing context has Blk dataflow |
| wp_valid_inp_ptr[13:0] | OUT | Blk_Input[13:0]/ HG_Input[7:0]. without context base addition. |
| Descriptor bits for shared context | | |
| wp_Shr | OUT | shared context enabled |
| wp_en_dep_check_shr | OUT | en_dep_check for shared context |
| wp_Blk_shr_ctx | OUT | shared context has Blk dataflow |
| wp_valid_inp_ptr_shr[13:0] | OUT | Blk_Input[13:0]/HG_Input[7:0] for shared context. without context base addition |
| wp_mask_non_vpld_instr | OUT | mask non vector packed load instruction execution (slot0-2) |
| SFM wrapper Inputs | | |
| inp_dep_check_failed | IN | input dependency check failed during address computation (OR of dependency check fail in all T80 Vector Unit) |
| Release_Input | | |
| risc_is_release | IN | Instruction flag for Release_Input |
| Wrapper interface for program execution | | |
| wp_hg_posn[ ] | OUT | hg_posn for Line |
| wp_hgposn_ne_hgsize | OUT | flag for (hg_posn != hg_size) for T20 branch instruction |
| risc_inc_hg_posn | IN | instruction flag to increment HG_POSN |
| risc_is_end | IN | instruction flag for END |
| Wrapper interface for program scheduling/switching | | |
| wp_imem_rdy | OUT | 1: unstall T20 and enables execution. 0: stalls T20 |
| wp_force_pcz | OUT | force the PC to new value - for task switching. |
| wp_new_pc[ ] | OUT | PC value (loaded by T20 when force_pcz = 0). Used when program starts execution for first time |
| wp_sel_new_pc | OUT | 1: new_pc to T20 from wrapper 0: new_pc to T20 from context save memory restore data. |
| wp_force_ctxz | OUT | triggers restoring new context progam state into T20 and T80, and saving the old context program state. |
| lsdmem_local_base[ ] | OUT | context base address for T20-DMEM |
| wp_vmem_ctx_base_addr[ ] | OUT | context base address for VMEM |
| Output Dataflow interfaces | | |
| risc_is_output | IN | OUTPUT instruction executed flag |
| risc_is_voutput | IN | VOUTPUT instruction executed flag |
| risc_output_wa | IN | (V)OUTPUT address |
| risc_output_pa | IN | (V)OUTPUT controls. Value of U6 immediate in ISA |
| risc_output_store_disable | IN | SD (output_killed) |
| risc_fill | IN | Fill bit |
| risc_output_wd[31:0] | IN | OUTPUT data |
| risc_voutput_wd[511:0] | IN | VOUTPUT data |

TABLE 34-continued

| Pin | I/O | Description |
|---|---|---|
| out__dep__check__failed | IN | Dependency check failed for OUTPUT or VOUTPUT (OR of both flags from T20) |
| wp__dst__output__en[7:0] | OUT | OUTPUT instruction enable per destination |
| wp__dst__voutput__en[7:0] | OUT | VOUTPUT instruction enable per destination |

11.5.4. Messaging

Node wtate write message can update instruction memory 7616 (i.e., 256 bits wide), data memory 7618 (i.e., 1024 bits wide), and SIMD register (i.e., 1024 bits wide). Example lengths of the bursts for these can be as follows: instruction memory—9 beats; data memory—33 beats; and SIMD register—33 beats. In partition biu (i.e., 4710-*i*), there is a counter called debug_cntr which increments for every data beat received—once the count reaches (for example) 7 which means 8 data beats (does not count the first header beat that has data_count), debug_stall is asserted which will disable cmd_accept and data_accept till the write is done to the destination. The debug_stall is a state bit that is set in partition_biu and reset by node_wrapper when the write is done by node wrapper (i.e., 810-1)—unstall comes on nodex_unstall_msg_in (for partition 1402-*x*) input in partition biu 4710-*x*. An example of 32 data beats sent from partition biu 4710-*x* to node wrapper on bus:

- nodex_wp_msg_en[2:0] which is set to M_DEBUG
- nodex_wp_msg_wdata['M_DEBUG_OP]=='M_NODE_STATE_WR where M_DEBUG_OP is bits 31:29 identifying message traffic as node state write when message address[8:6] has 110 encoding
- this then fires node_state_write signal in node_wrapper—here two counters are maintained called debug_cntr and simd_wr_cntr (analogous to the ones in partition_biu). Look for NODE_STATE_WRITE comment in node_wrapper.v to look for this code.
- The 32 bit packets are then accumulated in node_state_wr_data flop—256 bits.
- When the 256 bits are filled—instruction memory is written.
- Similarly for SIMD data memory—when we have 256 bits, SIMD data memory is written—partition_biu stalls message interconnect from sending more data beats till node_wrapper successfully updates SIMD data memory as other traffic could be updating SIMD data memory—like for example data from global data interconnect in global IO buffers. Once the update into DMEM is done—unstall is enabled through debug_node_state_wr_done which has a debug_imem_wr|debug_simd_wr|debug_dmem_wr components. This will then unstall the partition_biu to accept 8 more data packets and do the next 256 bit write till the entire 1024 bits are done. Simd_wr_cntr counts 256 bit packets.

When node state read message comes in—the appropriate slave—instruction memory, SIMD data memory and SIMD register are read and then placed into the (for example) 16×1024 bit global output buffer 7620. From there the data is sent to partition biu (i.e., 4710-1_which then pumps the data out to message bus 1420. When global output buffer 7620 is read, following signals can (for example) be enabled out of node wrapper—these buses typically carry traffic for vector outputs—but are overloaded to carry node state read data as well—therefore not all bits of nodeX_io_buffer_ctrl are typically pertinent:

- nodeX_io_buf_has_data—tells partition_biu that data is being sent by node_wrapper
- nodeX_io_buffer_data[255:0] has the IMEM read data or DMEM (256 bits at a time) or SIMD register data (256 bits at a time)
- nodeX_read_io_buffer[3:0] has signals that indicate the bus availability—using which output buffer is read and data sent to partition_biu
- nodeX_io_buffer_ctrl indicates various pieces of information
  - relevant information is on bits 16:14
    - // 16:14:3 bit op
    - // 000: node state read—IOBUF_CNTL_OP_DEB
    - // 001: LUT
    - // 010: his_i
    - // 011: his_w
    - // 100: his
    - // 101: output
    - // 110: scalar output
    - // 111: nop
  - 32:31
    - 00: imem read
    - 10: SIMD register
    - 11: SIMD DMEM In partition biu, look for comments SCALAR_OUTPUTS: and follow the signal node0_msg_misc_en and node0_imem_rd_out_en. These then setup ocp_msg_master instance. Various counters are used again. debug_cntr_out breaks the (for example) 256 bit packet into 32 bit packets that desire to be sent to message bus 1420. The message that is sent is Node State Read Response.

Reading of data memory is similar to Node State read—then appropriate slave is read and then placed into the global output buffer and from there it goes to partition biu. For example, bits 32:31 of nodeX_io_buffer_ctrl are set to 01, and the message to be sent can (for example) be 32 bits wide and is sent as data memory read response. Bits 16:14 should also indicate IOBUF_CNTL_OP_DEB. The slaves can (for example) be:

1. Data memory, CX=0 (aka LS-DMEM) application data—using context number we get the descriptor base and then add the offset that comes along with the message—address bits
2. Data memory descriptor area, CX=1, message data beat [8:7]=00 identifies this area—use context number to figure out which descriptor is being updated
3. SIMD descriptor—8:7=01 identifies this area—context number provides address
4. context save memory—8:7=10 identifies this area—context number provides address
5. registers inside of processor 7614—like breakpoint, tracepoint and event registers—8:7=11 identifies this area
   a. Following signals are then setup on interface for processor 7614:
      i. .dbg_req (dbg_req),
      ii. .dbg_addr ({15'b000_0000_0000_0000, dbg_addr}),
      iii. .dbg_din (dbg_din),
      iv. .dbg_xrw (dbg_xrw),
   b. Following parameters are defined in tx_sim_defs in tpic_library directory:
      i. 'define NODE_EVENT_WIDTH 16
      ii. 'define NODE_DBG_ADDR_WIDTH 5 c. Dbg_addr[4:0] is set as follows for breakpoint/tracepoint—comes from bits 26:25 of Set Breakpoint/Tracepoint message i. Address of 0 is for breakpoint/tracepoint register 0 ii. Address of 1 is for breakpoint/tracepoint register 1 iii. Address of 2 is for breakpoint/tracepoint register 2 iv. Address of 3 is for breakpoint/tracepoint register 3 d. Dbg_addr[4:0] is set to lower 5 bits of read data memory offset when event registers are addressed—these have to be set to 4 and above in message.

The context save memory 7610 that holds the state for processor 7614 also can have (for example) address offsets as follows:

1. the 16 general purpose registers have address offsets 0,4,8,C, 10, 14,18,1C, 20, 24, 28, 2C, 30, 34, 38 and 3C
2. the rest of the registers are updated as follows:
   a. 40—CSR—12 bits wide
   b. 42—IER—4 bits wide
   c. 44—IRP—16 bits
   d. 46—LBR—16 bits
   e. 48—SBR—16 bits
   f. 4A—SP—16 bits
   g. 4C—PC—17 bits When Halt messge is receives, halt_acc signal is enabled which then sets state halt_seen. This is then sent on a bus 1420 as follows:

Halt t20[0]: halt_seen
Halt t20[1]: save context
Halt t20[2]: restore context
Halt t20[3]: step Halt_seen state is then sent to ls_pc.v which is then used to disable imem_rdy so that no more instructions are fetched and executed. However we desire to make sure that both processor 7614 and SIMD pipes are empty before continuing. Once the pipe is drained—that is there are no stalls, then pipe_stall[0] is enabled as input to node wrapper (i.e., 810-1)—using this signal—the halt acknowledge message is sent and the entire context of processor 7614 is saved into context memory. Debugger can then come and modify the state in context memory using update data memory message with CX=1 and address bits 8:7 to indicate context save memory 7610.

When the resume message is received, halt_risc[2] is enabled which will the restore the context—a force_pcz is then asserted to continue execution from the PC from context state. Processor 7614 uses force_pcz to enable cmem_wdata_valid which is disabled by node wrapper if the force_pcz is due to resume. Resume_seen signal also resets various states—like for example halt_seen and the fact that halt ack message was sent.

When the step N instruction message is received, the number of instructions to step comes on (for example) bits 20:16 of message data payload. Using this—imem_rdy is throttled. The way the throttling works is as below:

1. reload everything from context state as debugger could have changed state 2. mem_rdy is disabled for a clock—one instruction is fetched and executed 3. then pipe_stall[0] is examined—to see if instruction has completed execution 4. once pipe_stall[0] is asserted high—means pipes are drained—then context is saved process is repeated till the step counter goes to 0—once this goes to 0, a halt acknowledge message is sent Breakpoint match/tracepoint matches can be indicated (for example) as follows:

risc_brk_trc_match—breakpoint or tracepoint match took place risc_trc_pt_match—means it was a tracepoint match risc_brk_trc_match_id[1:0] indicates which one of the 4 registers matched Breakpoint can occur when we are halted; when this happens, a halt acknowledge message is sent. Tracepoint match can occur when not halted. Back-to-back tracepoint matches are handled by stalling the second one till the first one has had a chance to send the halt acknowledge message.

11.6. Program Scheduling

Shared function-memory 1410 program scheduling is generally based on active contexts, and does not use a scheduling queue. The program scheduling message can identify the context that the program executes in, and the program identifier is equivalent to the context number. If more than one context executes the same program, each context is scheduled separately. Scheduling a program in a context causes the context to become active, and it remains active until it terminates, either by executing an END instruction with Te=1 in the scheduling message, or by dataflow termination.

Active contexts are ready to execute as long as HG_Input>HG_POSN. Ready contexts can be scheduled in round-robin priority, and each context can execute until it encounters a dataflow stall or until it executes an END instruction. A dataflow stall can occur when the program attempts to read invalid input data, as determined by HG_POSN and the relative horizontal-group position of the access with respect to HG_Input, or when the program attempts to execute an output instruction and the output has not been enabled by a Source Permission. In either case, if there is another ready program, the stalled program is suspended and its state is stored in the context save/restore circuit 7610. The scheduler can schedule the next ready context in round-robin order, providing time for the stall condition to be resolved. All ready contexts should be scheduled before the suspended context is resumed.

If there is a dataflow stall and no other program is ready, the program remains active in the stalled condition. It remains stalled until either the stall condition is resolved, in which case it resumes from the point of the stall, or until another context becomes ready, in which case it is suspended to execute the ready program.

11.7. Messaging and Control

As described above, all system-level control is accomplished by messages. Messages can be considered system-level instructions or directives that apply to a particular system configuration. In addition, the configuration itself, including program and data memory initialization—and the system response to events within the configuration—can be set by a special form of messages called initialization messages.

With respect to the shared function-memory 1410, there are several types of messages that can be used, which can be seen in FIGS. 313-316. Namely, these messages include local data memory initialization message 9100, function-memory initialization message 9200, schedule program message 9300, and termination message 9400. The local data memory initialization message 9100 can directly initializes the SFM data memory 7618 (i.e., context descriptors 8502, table descriptors 8504, and the destination list in the SFM data memory). The number of contexts is generally given by the #Contexts field, while the number of tables and the size of the destination list (in number of entries) are generally is given by the #Tables field and #Dests field, respectively. The function-memory initialization message 9200 can update the function-memory 7602 with Line_Count 16×16-bit data packets, supplied over the global data interconnect 814. Global interconnect 814 is typically used for bandwidth. This message 9200 is generally distinguished from a message 9100 by the upper 12 bits of the payload being 000000000000'b. This is an invalid encoding of a context descriptor, because it specifies a base address of 0 in the local data memory (i.e., SFM data memory 7618), which is the context descriptor area. The schedule program message 9300 typically schedules a program in the shared function-memory 7602. The payload generally contains a variable number of program parameters. For example, up to 16 programs may be scheduled at the same time, and the SFM processor 7614 can multi-task between them. The termination message 9400 generally signals to the control node 14065 that a node program has terminated. This event can be used to schedule subsequent messages, of any type, from the control node memory 6114. It can also be used by debug to trace termination messages without causing other message activity. It is usually sent after the node program has terminated in all contexts on the node. Additionally, in Tables 35 and 36 below, the ports for the shared function-memory 1410 and details for the LUT and histograms can be seen.

TABLE 35

| Type | Data Width | Max Burst | SRMD or MRMD | Crossbar or POP | Sources | Destinations | Auto-gen | Read Data? |
|---|---|---|---|---|---|---|---|---|
| Global Data interconnect | 256 | 8 beats | SRMD | crossbar | partitions, global L/S, SFM, accelerators | partitions, global L/S, SFM, accelerators | yes | no |
| Left context interconnect | 128 | 1 beat | MRMD | crossbar | partitions | partitions | yes | no |
| Right context interconnect | 128 | 1 beat | MRMD | crossbar | partitions | partitions | yes | no |
| Message/ control node interconnect | 32 | 32 beats | SRMD | point to point | partitions, global L/S, SFM, accelerators | partitions, global L/S, SFM, accelerators | no | no |
| LUT/HIS interconnect | number of nodes in partition * 256 | 4 | MRMD | point to point | partitions | partitions | no | yes |
| host slave port | 32 | 1 | MRMD | point to point | L3 interconnect | control node | Async bridge | yes |
| L3 interconnect/ async | 128 | 8 | SRMD | goes to L3 | global L/S | L3 interconnect | async bridge | yes |

TABLE 36

| | | | |
|---|---|---|---|
| ocp__partX__luthis__mcmd | output | [2:0] | MCmd |
| ocp__partX__luthis__maddr | output | [255:0] | MAddr = 256 * # of nodes |
| ocp__partX__luthis__mreqinfo | output | [8:0] | MReqinfo:<br>0: LUT/HIST indication<br>1: LUT<br>0: HIST<br>2:1: Packed/unpacked<br>00: packed addr and 16 bit data<br>01: unpacked address and 16 bit data<br>11: unpacked address and 32 bit data<br>4:3: HIST has weight<br>00: Incr<br>01: weight<br>10: store<br>8:5: LUT/HIST type<br>4 bits identify the type of LUT/HIST |
| ocp__partX__luthis__mburstlen | output | [2:0] | MBurstLen |
| ocp__partX__luthis__mdata | output | [255:0]* | MWdata = 256 * # of nodes |
| ocp__partX__luthis__mbyteen | output | [3:0] | MByteen - enables 256 bit portions |
| ocp__luthis__partX__scmdaccept | input | | SCmdAcc |
| ocp__luthis__partX__sresp | input | [1:0] | SResp |
| ocp__luthis__partX__sdata | input | [255:0]* | SData = 256 * # of nodes |
| ocp__luthis__partX__sbyteen | input | [3:0] | SByteen - enables 256 bit portions |

11.8. Other Example Messages

Turning to FIG. 317, an example of an SFM control initialization message 9402 can be seen. This message 9402 can directly initialize the SFM data memory context descriptors, function-memory table descriptors, vector-memory/function-memory context descriptors, and destination descriptors. It initializes the number of context and destination descriptors, given by the #Contexts field, and the required number of table-descriptor entries, given by the #Tables field.

Turning to FIG. 318, an example of an SFM LUT initialization message 9404 can be seen. The function-memory 7602 is typically updated with (for example) 16×16-bit data packets, supplied over the data interconnect 814. This message is distinguished from an SFM Control Initialization message by the upper bit of the payload being 0'b. Updating begins at location 0 in the function-memory 7602 and proceeds until a Set_Valid is signaled on the global interconnect 814 (with the last transfer).

Turning to FIG. 319, an example of a schedule multi-cast thread message 9406 can be seen. Schedule a multi-cast thread in the GLS unit 1408. Typically, this is a hardware-only function, and there is no related GLS processor 5402 program. The hardware multi-cast is usually accomplished by sending multi-cast data to the indicated thread on the GLS unit 1408.

Turning to FIG. 320, an example of a breakpoint/tracepoint match message 9408 can be seen. This message 9408 is sent by a node (i.e., 808-1) whenever it encounters a breakpoint or a tracepoint. It indicates the type of event, the breakpoint or tracepoint identifier, the segment ID and node ID of the signaling node, and the current context number and PC (instruction-line aligned). A breakpoint interrupts the debugger, and a tracepoint creates a trace event on the trace port.

11.9. SFM Controller and its Example Implementation

The SFM controller is the physical memory controller that implements at least some of the functionality of the shared function-memory 1410. It can be used in the context of a higher-level instantiation which includes OCP interfaces and memory instances. An example of a supported port mapping is: PORT 0: Node 1; PORT 1: Node 2; PORT 2: Global Data; PORT 3: read; and PORT 4: write. The signal interface is generic so the memory controller functionality can be maximized. OCP interfacing will usually limit the bandwidth of the memory controller function by having all data to be available at the same time. The interface supports partial accesses for flexibility, however. For SIMD operations all data can be returned at the same time, but the flexibility exists at the interface regardless. The context of the SFM controller is shown in FIG. 321.

The SFM controller is capable of high bandwidth read memory accesses. Each port access is capable of (for example) 16 unique memory accesses. Port addresses are structured for SIMD operations. However, other sources can utilize the ports as desired. For SIMD operations, it is expected that all addresses are used and are returned at the same time. There is flexibility to support partial port addresses and partial data (i.e., less than the 16 addresses used for any port) for non SIMD operations. Each port can support reads, writes, or a histogram increment function. Reads return a 16b element for each address (generally, a pixel location). Writes store (for example) a 16-bit element directly into memory for each address. Histogram functions increment the value of the data at the memory location with the data on the write bus. If there are multiple histogram accesses to a given memory location, all of them will be incremented for that access. In order to support the high bandwidth requirement for servicing multiple ports with minimized conflicts, the memories are banked every (for example) 32 bytes. This corresponds to the data size of all of the addresses provided by a port.

Figure 322:
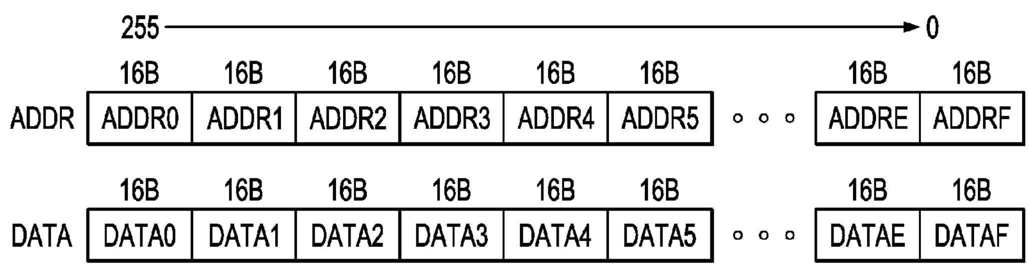
Figure 323:
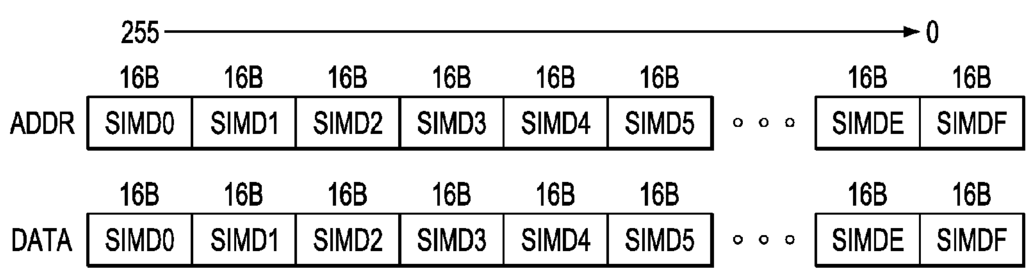
Figure 324:
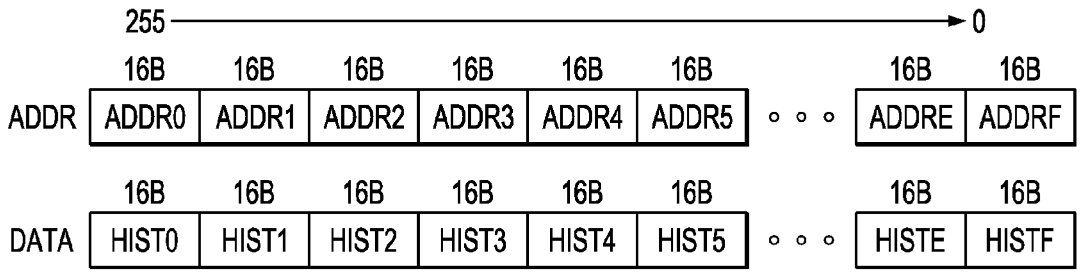
Figure 325:
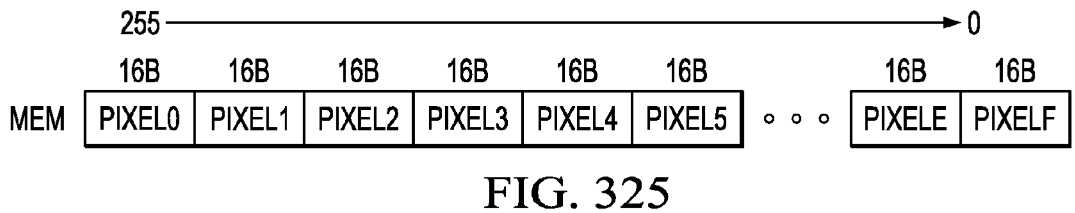
Figure 326:
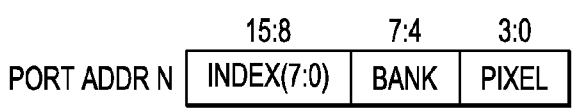
Figure 327:
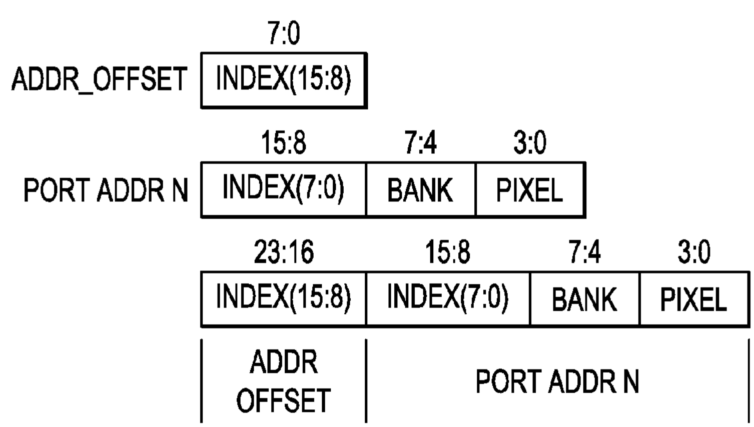

Address formats can be seen in FIGS. 322 to 327. The basic address format is shown in FIG. 322, and, as shown in this example, each address consists of 16 addresses of 16-bits. The resulting data for each address is located in a corresponding data location. This data format is valid for regular reads and writes. For SIMD accesses, this format is mapped as shown in FIG. 323. For histogram processing, the write data is used to increment the histogram value, and the histogram increment values in relationship to the write data is shown in FIG. 324. Each port address uniquely identifies a different pixel location. Within these formats, each pixel is accessed in the format shown in FIG. 325. This also corresponds to the width of each memory bank. Each of these memory banks is addressed (for example) by each 32 bytes of 16-bit pixels. This is the individual 16b address in each port address. Each port address physically addresses pixels as show in FIG. 326. For memory sizes greater than can be supported by (for example) index(7:0) addressing, or (for example) 64 KB, an extension bus is used and appended as shown in FIG. 327. An example of a full addressing sequence is shown also shown in FIG. 328.

The SFM controller also performs read arbitration. Read arbitration can occur in three stages: (1) arbitration between port addresses; (2) arbitration between all resulting addresses; and (3) temporal arbitration. The first stage of arbitration allows for SIMD elements across nodes to compete for the same memory resource. For example, SIMD0 for Node1 arbitrates directly with SIMD0 of Node2. This allows for SIMDs in a Node to be serviced together. However, if the accesses from Node1 and Node2 do not conflict, they are both serviced. The second stage of arbitration resolves conflicts on a single bank between the individual address elements. The arbitration priority is based on element number. For example, PORT0 has highest priority, then PORT1, etc. The secondary priority is given to ADDR0, then ADDR1 and so forth. The third stage of arbitration is temporal ordering. All of the priorities are resolved for each cycle before advancing to the next cycle. It is not possible for a higher priority port to starve other ports. An example of read arbitration for the first two sequences is shown in FIG. 329.

Although ports and element addresses compete for arbitration, it is still possible to service requests if the resulting addresses are within the region of a memory bank. In FIG. 329, once the bank winner is determined, the index of the resulting addresses are compared with the index of the winning address. This is used in the data demuxing to resolve data for an address which has lost arbitration, but is available due to the access. In this way, all of the resulting addresses within a region are returned, if available. This is shown in FIG. 330.

The SFM controller also performs write arbitration. The arbitration for writes can also occurs in three stages: (1) arbitration between ports; (2) arbitration between all resulting addresses; and (3) temporal arbitration. Unlike reads, writes are arbitrated in the first stage immediately, according to port. The memory system is usually capable of managing a single write from any port at any time. The second stage of arbitration resolves conflicts on a single bank between the individual address elements. The arbitration priority is based on element number. For example, PORT0 has highest priority, then PORT1, etc. The secondary priority is given to ADDR0, then ADDR1 and so forth. The third stage of arbitration is temporal ordering. All of the priorities are resolved for each cycle before advancing to the next cycle. It is not usually possible for a higher priority port to starve other ports. The write arbitration for the first two sequences is shown in FIG. 331. Like reads, resulting addresses in the same 32B index are serviced at the same time. This is done by comparing the indexes of the write data. However, unlike reads, if there is a conflict on a specific address location, then the resultant addresses with the lower element number is written and any others are discarded. For example, if ADDR0 and ADDRF both address the same data location, ADDR0 will be written and ADDRF will be discarded. After port arbitration, index comparators are used to resolve possible index combinations. The index comparisons are shown in the black boxes in FIG. 332. Each of these comparisons are presented as a full vector for all of the resulting addresses during the memory write to determine if multiple writes are usually required.

Histogram accesses utilize the write arbitration flow, as shown FIG. 333. However, instead of writing the memory with the data element values, the memory location is read and then incremented with the data element values. The full pipeline of this behavior is shown in FIG. 334. In order to determine immediately which addresses desire to be added together for each set of port addresses, the entire address of the accesses is compared in a similar matrix as shown in FIG. 332. When the histogram access is detected, the entire address range is compared instead of the indexes as in the case of simple writes. The data of addresses, which are equivalent, are added together across four pipeline stages as shown in FIG. 333. Each resulting data address is combined with the read value of the 16b data of the element address.

The SFM pipeline allows for back to back reads and writes as shown in the example of FIG. 334 and describe in the example manner below. If there is a bank conflict, the next request will not be accepted at the interface. Memory flow control is managed by a request accept mechanism. If requests are accepted, the pipeline is capable of receiving back to back requests. All returned data is accompanied by a response to indicate that the data is valid. Reads are serviced across ports. They are arbitrated for each individual port address (many ports can access as long as there is no bank conflict), and then arbitrated across the resulting addresses. Writes are arbitrated between ports directly. Writes which are accepted indicate the write hazard boundary (any reads after this time will reflect the write value). Write data does not have a response. Histogram accesses stall until the increment value is calculated and written. This will cause the memory system to stall four cycles, for example.

In Table 37 below, an example of a partial list of IO pins or signals for the SFM controller can be seen. For these examples, inputs are prefixed by "gl_", outputs are prefixed by "finem_", synchronous is suffixed by "_{t/n}r", t=active high, n=active low, r=rising edge, and asynchronous is suffixed by "_{t/n} a", t=active high, n=active low, a=asynchronous. Busses which reflect multiple ports identify the lower number port in the lower bits. For example, PORT0 is identified by req_tr(0) and addr_tr(255:0), and PORT1 is identified by req(1) and addr_tr(511:256).

TABLE 37

| | DIR | HIGH | LOW | COMMENTS |
|---|---|---|---|---|
| clk_tr | in | na | na | input clock |
| reset_na | in | na | na | logic reset |
| req_tr | in | NPORTS*3-1 | 0 | interface request (5 deep deep pipeline throttled by ack) |
| rnw_tr | in | NPORTS-1 | 0 | 0 = write, 1 = read (histogram is a write) 0 = normal write, 1 = write data indicates |
| hist_tr | in | NPORTS-1 | 0 | histogram increment |
| addr_tr | in | NPORTS*256-1 | 0 | 16 × 16 b addresses |
| addr_offset_tr | in | NPORTS*8-1 | 0 | address offset |
| addr_valid_tr | in | NPORTS*16-1 | 0 | address enable for each 16 addresses |
| ack_tr | out | NPORTS-1 | 0 | request accept (writes are usually posted - no response) |
| wr_data_tr | in | NPORTS*256-1 | 0 | 256 b write data (each 16 × 16 b qualified by addr_valid) |
| rd_data_tr | out | NPORTS*256-1 | 0 | 256 b read data (each 16 × 16 b qualified by rd_data_valid) |
| rd_data_valid_tr | out | NPORTS*16-1 | 0 | data valid for each 16 b data |
| rd_data_valid_ack_tr | in | NPORTS*16-1 | 0 | data has been accepted by source |
| rd_resp_tr | out | NPORTS-1 | 0 | full read has been completed (can be tied to all bits of rd_data_valid_ack) |
| event_bank_stall_tr | out | NPORTS-1 | 0 | bank conflict |
| event_source_stall_tr | out | NPORTS-1 | 0 | source conflict |
| event_hist_stall_tr | out | NPORTS-1 | 0 | histogram updating conflict |
| event_stream_tr | out | NPORTS-1 | 0 | data has been streamed from another access |
| ram_req_tr | out | 15 | 0 | ram request |
| ram_addr_tr | out | 175 | 0 | ram addr (each ram 10:0) |
| ram_rnw_tr | out | 15 | 0 | ram rnw |
| ram_wren_tr | out | 255 | 0 | ram 16 b write enables |
| ram_wrdata_tr | out | 4095 | 0 | ram write data (each ram 255:0) |
| ram_rddata_tr | in | 4095 | 0 | ram read data (each ram 255:0) |

For reset timing, there is a single asynchronous reset, gl_reset_na. All outputs are typically inactive during reset. An example of a port interface read with no conflicts can be seen in FIG. 335. An example of a port interface read with bank conflicts can be seen in FIG. 336. An example of a port interface write with no conflicts can be seen in FIG. 337, and an example of a port interface write with bank conflicts can be seen in FIG. 338.

For benchmarking timing, the following signals can be used to indicate event causes in the memory controller: event_bank_stall_tr (bank conflict); event_source_stall_tr (source conflict); event_hist_stall_tr (histogram updating conflict); and event_stream_tr (data has been streamed from another access). For each cycle the system undergoes a stall, the event should be active for one cycle. At least one of the stall signal should be active whenever the port interface is not acknowledging input requests. Informational events (like event_stream) should be active whenever the rd_data_valid signal is active. An example of memory interface timing can also be seen in FIG. 339.

11.10. Power Management

For power saving features in SFM 1410, the memories are implemented using PM signals to chain all memory banks allowing PRCM (described below) to execute Power On/Off for particular memory. Power chain allows proper Power On and Power Off. FIG. 340 shows an example of a SFM power management signal chain.

12. Interconnect Architecture 12.1. General Structure

Turning to FIG. 341, an example of the interconnect architecture for processing cluster 1400 can be seen. As shown, the partitions 1402-1 to 1402-R are coupled shared function-memory 1410 (namely the LUTs and histograms in the function-memory 7602) via busses, which can (for example) be 768 bits wide, with each partition 1402-1 to 1402-R being able to send (for example) 64 address (i.e., 16 from each of four nodes). The shared function-memory 1410 and partitions 1402-1 to 1402-R can also be coupled to the data interconnect 814 (which can, for example, be a 192-bit crossbar or R×R crossbar with R being the number of partitions) and to the left and right interconnects 4702 and 4704 (which can each, for example, be 48-bit crossbars). The GLS unit 1408 can also be coupled to the data interconnect 814. Additionally, there is a message interconnect or message bus (which is not shown and which is generally not a crossbar) that is coupled between the control node 1406 and partitions 1402-1 to 1402-R, between the control node 1406 and the shared function-memory 1410, and between the control node 1406 and the GLS unit 1408. Typically and for example, this message interconnect can be about 32-bits wide.

Typically, data interconnect 814 crossbar uses "wormhole" routing, based on the Segment_ID and Node_ID of the destination. The source's Segment_ID and Node_ID are also transmitted, along with the Set_Valid signal if applicable. Nodes (i.e., 808-1) within a partition (i.e., 1402-1) can communicate locally without using the data interconnect 814 (as described above). Within a partition, one node can be using the global interconnect at any given time. This simplifies the interconnect within the partition, and the partition's connection to the data interconnect 814. Data can be transferred concurrently within partitions, or between partitions, if there are no resource conflicts on different interconnects.

The messaging interconnect can also be considered a crossbar (of sorts), but designed for lower cost than the data interconnect 814, since message throughput is much lower than data throughput. In a partition, there is separate message input interconnect and output interconnect. All nodes within a partition share this interconnect, so one node can use either interconnect at a time, although two nodes can be sending and receiving at the same time. It is also possible for the same node to be sending and receiving messages at the same time. Essentially, the message interconnect can logically be considered an N×N crossbar, implemented by the control node 1406.

Generally, the interconnects are hierarchical and to achieve high utilization, it is important that mcmd_accept and sdata_accept is not used to back off the interconnect. Instead they should be normally high to accept accesses into a buffer at the destination and the buffer can then update a target for example load/store data memory in a node when load/store data memory is free. If the buffer becomes full, then SIMD is stalled and buffer is drained to make room for incoming data. This way interconnect data does not have the higher priority over SIMD accesses and usually stalls SIMD. It attempts to find an idle cycle—and when buffer becomes full, it stalls the SIMD. Most of the time, you should be able to find an empty cycle to update target. Note that the buffer should be easily configurable from 1 entry to multiple entries so that performance studies can be used to design the depth. Though be mindful of area as these buffers are flop based. In a partition there is a (for example) 16×512 global IO buffer to absorb pixel data which is part of the micro-architecture. The node wrappers have a 2 entry buffer for messages to tolerate SIMD being busy for one cycle—and most the control messages are typically 1 data to 2 data pieces. The longer messages are typically initialization messages during which time SIMD's are idle anyways.

In processing cluster 1400, sources and destinations negotiate through source notifications and permissions—therefore pushes or writes will usually succeed—that is there is usually space. There are write buffers for side contexts in the node wrappers of every node—these can become full—but, again here as well, if the write buffer is full and we are getting a new store, space is made by stalling the SIMD's if SIMD is busy and write buffer can update side context memory. Therefore, it can be important to make sure that these interconnects behave like as though they are tied high. Of course, there could be cases where multiple sources could be sending to same destination in which case there has to be enough buffering to make sure it doesn't stall sources. Destination also has to make sure that it has enough buffering to accept the data. Examples of such cases are control node and data interconnect. Typically though there is usually enough space in nodes and GLS unit 1408 as they both negotiate data transfers and have large global IO buffers.

For SRMD protocol, the command and data should be driven in the same cycle by the master. Data should not be driven before command. Master will probably issue command2 after it has sent the last piece of data for command1/data1. Slaves should be able to either accept command2 while the last packet of command1/data1 is still pending or slave should be able to not accept command2 while the last packet of command1/data1 is still pending.

All OCP ports should have a signal or pin called OCP_CLKEN which is used to indicate to master that is running at a higher frequency when to sample slave data or drive data to slave. Master sampling slave data (which is running at half the master clock) is shown in FIG. 342. If the master and slave are running at same clock—then clken should be tied high. All interface signals are sampled as shown by master from slave. Clken makes sure that we can time ½ domain as ½× rather than full speed when interactive with full speed clock domains. Multi-cycle path of 2 will be set for such paths—multi-cycle will not be use anywhere else in design unless they are power ports/dft ports or special ports etc or where clken is used. For functional paths—specifying multi-cycle should be avoided. Additionally, a master driving to slave that runs at ½ its clock is shown in FIG. 343.

12.2. Example IO for Data Interconnect 814

In Table 38 below, an example of a partial list of IO pins or signals for the data interconnect 814 can be seen.

TABLE 38

| Pin | I/O | Width | Description |
|---|---|---|---|
| Global Interconnect Master port from each partition to data interconnect 814 | | | |
| ocp_partX_pixel_mcmd | output | [2:0] | MCmd |
| ocp_partX_pixel_maddr | output | [17:0] | MAddr 11:0: set to 0 15:12: node_num 17:16: segment_num |
| ocp_partX_pixel_mreqinfo | output | [31:0] | MReqinfo: 8:0: DMEM offset/SFMEM offset 8:0 12:9: dest context # 13: set_valid 15:14 00: IMEM 01: DMEM 10: FMEM 16: Fill 17: reserved 18: output killed (don't perform store - but set_valid still desires to be done) 25:19: SFMEM offset 15:9 27:26: src_tag 29:28: Data Type (from ua6[4:3] of VOUTPUT) 31:30: Reserved |
| ocp_partX_pixel_mburstlen | output | [3:0] | MBurstLen |
| ocp_partX_pixel_mdata | output | [255:0] | MWdata |
| ocp_partX_pixel_mdata_valid | output | | MDataValid |
| ocp_partX_pixel_mdata_last | output | | MdataLast |
| ocp_pintercon_partX_scmdaccept | input | | SCmdAcc |
| ocp_pintercon_partX_sresp | input | [1:0] | SResp - this may not be desired. |
| ocp_pintercon_partX_sresplast | input | | SRespLast - this may not be desired |
| ocp_pintercon_partX_sdataaccept | input | | SDataAcc |
| Global Interconnect Slave port at each partition from data interconnect 814 | | | |
| ocp_pintercon_partX_mcmd | input | [2:0] | MCmd |
| ocp_pintercon_partX_maddr | input | [17:0] | MAddr 11:0: set to 0 15:12: node_num 17:16: segment_num |
| ocp_pintercon_partX_mreqinfo | input | [31:0] | MReqinfo 8:0: DMEM offset/ SFMEM offset 8:0 12:9: dest context # 13: set_valid 15:14 00: IMEM 01: DMEM 10: FMEM 16: Fill 17: Reserved 18: output killed (don't perform store - but set_valid still desires to be done) 25:19: SFEM offset 15:9 27:26: src_tag 29:28: Data Type (from ua6[4:3] of VOUTPUT) 31:30: Reserved |
| ocp_pintercon_partX_mburstlen | input | [3:0] | MBurstLen |
| ocp_pintercon_partX_mdata | input | [255:0] | MWdata |
| ocp_pintercon_partX_mdata_valid | input | | MDataValid |
| ocp_pintercon_partX_mdata_last | input | | MdataLast |
| ocp_partX_pixel_scmdaccept | output | | SCmdAcc |
| ocp_partX_pixel_sresp | output | [1:0] | |
| ocp_partX_pixel_sresplast | output | | |
| ocp_partX_pixel_sdataaccept | output | | SDataAcc |

12.3. Example IO for Left Context Interconnect 4704

In Table 39 below, an example of a partial list of IO pins or signals for the left context interconnect can be seen.

TABLE 39

| Pin | I/O | Width | Description |
|---|---|---|---|
| Left context Master port from each partition to left context interconnect 4704 | | | |
| ocp__partX__lcst__mcmd | output | [2:0] | MCmd |
| ocp__partX__lcst__maddr | output | [17:0] | MAddr |
| | | | 11:0: 0 |
| | | | 15:12: node__num |
| | | | 17:16: segment__num |
| ocp__partX__lcst__mburstlen | output | | MBurstLen |
| ocp__partX__lcst__mdata | output | [127:0] | MWdata |
| | | | define DIR__CONT |
| | | | 3:0 |
| | | | `define DIR__CNTR |
| | | | 7:4 |
| | | | `define DIR__ADDR0 |
| | | | 16:8 |
| | | | `define DIR__DATA0 |
| | | | 48:17 |
| | | | `define DIR__EN0 49 |
| | | | `define DIR__LOHI0 |
| | | | 51:50 |
| | | | `define DIR__ADDR1 |
| | | | 60:52 |
| | | | `define DIR__DATA1 |
| | | | 92:61 |
| | | | `define DIR__EN1 93 |
| | | | `define DIR__LOHI1 |
| | | | 95:94 |
| | | | `define DIR__FWD__NOT__EN |
| | | | 96 |
| | | | `define DIR__INP__EN |
| | | | 97 |
| | | | `define SET__VIN 98 |
| | | | `define RST__VIN 99 |
| | | | `define SET__VLC |
| | | | 100 |
| | | | `define RST__VLC |
| | | | 101 |
| | | | `define INP__BUF__FULL |
| | | | 102 |
| | | | `define WB__FULL |
| | | | 103 |
| | | | `define REM__R__FULL |
| | | | 104 |
| | | | `define REM__L__FULL |
| | | | 105 |
| | | | `define ACT__CONT |
| | | | 109:106 |
| | | | `define ACT__CONT__VAL |
| | | | 110 |
| ocp__lcstintercon__partX__scmdaccept | input | [1:0] | SCmdAcc |
| ocp__lcstintercon__partX__sresp | input | | |
| Left context Slave port at each partition from left context interconnect 4704 | | | |
| ocp__lcstintercon__partX__mcmd | input | [2:0] | MCmd |
| ocp__lcstintercon__partX__maddr | input | [17:0] | MAddr |
| | | | 11:0: 0 |
| | | | 15:12: node__num |
| | | | 17:16: segment__num |
| ocp__lcstintercon__partX__mburstlen | input | | MBurstLen |
| ocp__lcstintercon__partX__mdata | input | [127:0] | MWdata |
| | | | define DIR__CONT |
| | | | 3:0 |
| | | | `define DIR__CNTR |
| | | | 7:4 |
| | | | `define DIR__ADDR0 |
| | | | 16:8 |
| | | | `define DIR__DATA0 |
| | | | 48:17 |
| | | | `define DIR__EN0 49 |
| | | | `define DIR__LOHI0 |
| | | | 51:50 |

TABLE 39-continued

| Pin | I/O | Width | Description |
|---|---|---|---|
| | | | `define DIR__ADDR1 60:52<br>`define DIR__DATA1 92:61<br>`define DIR__EN1 93<br>`define DIR__LOHI1 95:94<br>`define DIR__FWD__NOT__EN 96<br>`define DIR__INP__EN 97<br>`define SET__VIN 98<br>`define RST__VIN 99<br>`define SET__VLC 100<br>`define RST__VLC 101<br>`define INP__BUF__FULL 102<br>`define WB__FULL 103<br>`define REM__R__FULL 104<br>`define REM__L__FULL 105<br>`define ACT__CONT 109:106<br>`define ACT__CONT__VAL 110 |
| ocp__partX__lcst__scmdaccept | output | [1:0] | SCmdAcc |
| ocp__partX__lcst__sresp | output | | |

12.4. Example IO for Right Context Interconnect 4702

In Table 40 below, an example of a partial list of IO pins or signals for the left context interconnect can be seen.

TABLE 40

| Pin | I/O | Width | Description |
|---|---|---|---|
| Right context Master port from each partition to right context interconnect 4702 | | | |
| ocp__partX__rcst__mcmd | output | [2:0] | MCmd |
| ocp__partX__rcst__maddr | output | [17:0] | MAddr<br>11:0: 0<br>15:12: node__num<br>17:16: segment__num |
| ocp__partX__rcst__mburstlen | output | | MBurstLen |
| ocp__partX__rcst__mdata | output | [127:0] | MWdata<br>`define DIR__CONT 3:0<br>`define DIR__CNTR 7:4<br>`define DIR__ADDR0 16:8<br>`define DIR__DATA0 48:17<br>`define DIR__EN0 49<br>`define DIR__LOHI0 51:50<br>`define DIR__ADDR1 60:52<br>`define DIR__DATA1 92:61<br>`define DIR__EN1 93<br>`define DIR__LOHI1 95:94<br>`define DIR__FWD__NOT__EN 96<br>`define DIR__INP__EN 97<br>`define SET__VIN |

TABLE 40-continued

| Pin | I/O | Width | Description |
|---|---|---|---|
| | | | 98 |
| | | | `define RST__VIN |
| | | | 99 |
| | | | `define SET__VLC |
| | | | 100 |
| | | | `define RST__VLC |
| | | | 101 |
| | | | `define INP__BUF__FULL |
| | | | 102 |
| | | | `define WB__FULL |
| | | | 103 |
| | | | `define REM__R__FULL |
| | | | 104 |
| | | | `define REM__L__FULL |
| | | | 105 |
| | | | `define ACT__CONT |
| | | | 109:106 |
| | | | `define ACT__CONT__VAL |
| | | | 110 |
| ocp__rcstintercon__partX__scmdaccept | input | [1:0] | SCmdAcc |
| ocp__rcstintercon__partX__sresp | input | | |
| Right context Slave port at each partition from right context interconnect 4702 | | | |
| ocp__rcstintercon__partX__mcmd | input | [2:0] | MCmd |
| ocp__rcstintercon__partX__maddr | input | [20:0] | MAddr: |
| | | | 11:0: 0 |
| | | | 15:12: node__num |
| | | | 17:16: segment__num |
| | | | 20:18: opcode |
| ocp__rcstintercon__partX__mreqinfo | input | [0:0] | MReqinfo |
| ocp__rcstintercon__partX__mburstlen | input | | MBurstLen |
| ocp__rcstintercon__partX__mdata | input | [127:0] | MWdata |
| | | | define DIR__CONT |
| | | | 3:0 |
| | | | `define DIR__CNTR |
| | | | 7:4 |
| | | | `define DIR__ADDR0 |
| | | | 16:8 |
| | | | `define DIR__DATA0 |
| | | | 48:17 |
| | | | `define DIR__EN0 |
| | | | 49 |
| | | | `define DIR__LOHI0 |
| | | | 51:50 |
| | | | `define DIR__ADDR1 |
| | | | 60:52 |
| | | | `define DIR__DATA1 |
| | | | 92:61 |
| | | | `define DIR__EN1 |
| | | | 93 |
| | | | `define DIR__LOHI1 |
| | | | 95:94 |
| | | | `define |
| | | | DIR__FWD__NOT__EN 96 |
| | | | `define DIR__INP__EN |
| | | | 97 |
| | | | `define SET__VIN |
| | | | 98 |
| | | | `define RST__VIN |
| | | | 99 |
| | | | `define SET__VLC |
| | | | 100 |
| | | | `define RST__VLC |
| | | | 101 |
| | | | `define INP__BUF__FULL |
| | | | 102 |
| | | | `define WB__FULL |
| | | | 103 |
| | | | `define REM__R__FULL |
| | | | 104 |
| | | | `define REM__L__FULL |
| | | | 105 |
| | | | `define ACT__CONT |

TABLE 40-continued

| Pin | I/O | Width | Description |
|---|---|---|---|
| | | | 109:106 `define ACT_CONT_VAL 110 |
| ocp_partX_rcst_scmdaccept | output | [1:0] | SCmdAcc |
| ocp_partX_rcst_sresp | output | | |

12.5. Example IO for LUT Interconnect

In Table 41 below, an example of a partial list of IO pins or signals for the LUT interconnect can be seen.

TABLE 41

| Pin | I/O | Width | Description |
|---|---|---|---|
| ocp_partX_luthis_mcmd | output | [2:0] | MCmd |
| ocp_partX_luthis_maddr | output | [255:0] | MAddr |
| ocp_partX_luthis_mreqinfo | output | [8:0] | MReqinfo: 0: LUT/HIST indication 1: LUT 0: HIST 2:1: Packed/unpacked 00: packed addr and 16 bit data 01: unpacked address and 16 bit data 11: unpacked address and 32 bit data 4:3: HIST has weight 00: Incr 01: weight 10: store 8:5: LUT/HIST type 4 bits identify the type of LUT/HIST |
| ocp_partX_luthis_mburstlen | output | [2:0] | MBurstLen |
| ocp_partX_luthis_mdata | output | [255:0] | MWdata |
| ocp_partX_luthis_mbyteen | output | [3:0] | MByteen - indicates which node in a partition is driving this request |
| ocp_luthis_partX_scmdaccept | input | | SCmdAcc |
| ocp_luthis_partX_sresp | input | [1:0] | SResp |
| ocp_luthis_partX_sdata | input | [255:0] | SData |
| ocp_luthis_partX_sbyteen | input | [3:0] | SByteen - sent back by SFM indicating the node the result is intended for |

12.6. Example IO for Host Slave Port

In Table 42 below, an example of a partial list of IO pins or signals for the host slave port can be seen.

TABLE 42

| Pin | I/O | Width | Description |
|---|---|---|---|
| ocp_tpic_ctrl_node_mcmd | input | [2:0] | MCmd |
| ocp_tpic_ctrl_node_maddr | input | [8:0] | MAddr |
| ocp_tpic_ctrl_node_mreqinfo | input | [4:0] | MReqinfo - will be expanded later |
| ocp_tpic_ctrl_node_mburstlen | input | | MBurstLen |
| ocp_tpic_ctrl_node_mdata | input | [31:0] | MWdata |
| ocp_tpic_ctrl_node_scmdaccept | output | | SCmdAcc |
| ocp_tpic_ctrl_node_sresp | output | [1:0] | |
| ocp_tpic_ctrl_node_sdata | output | [31:0] | SData |

12.6. Example IO for OCP Interconnect Port

In Table 43 below, an example of a partial list of IO pins or signals for the OCP interconnect port can be seen.

TABLE 43

| Pin | I/O | Width | Description |
|---|---|---|---|
| ocp_tpic_l3_mcmd | output | [2:0] | MCmd |
| ocp_tpic_l3_maddr | output | [31:0] | MAddr |
| ocp_tpic_l3_mreqinfo | output | [4:0] | |
| ocp_tpic_l3_mburstlen | output | [3:0] | MBurstLen |
| ocp_tpic_l3_mdata | output | [127:0] | MWdata |
| ocp_tpic_l3_mdata_valid | output | | MDataValid |
| ocp_tpic_l3_mdata_last | output | | MdataLast |
| ocp_tpic_l3_mbyteen | output | [15:0] | MByteen |
| ocp_tpic_l3_mtagid | output | [4:0] | Mtagid |
| ocp_tpic_l3_mdatatagid | output | [4:0] | MDataTagID |
| ocp_tpic_l3_scmdaccept | input | | SCmdAcc |
| ocp_tpic_l3_sresp | input | [1:0] | SResp |
| ocp_tpic_l3_sresplast | input | | SRespLast |
| ocp_tpic_l3_sdataaccept | input | | SDataAcc |
| ocp_tpic_l3_sdata | input | [127:0] | SData |
| ocp_tpic_l3_stagid | input | [4:0] | Stagid |

13. Initialization and Configuration Structure

Turning to FIG. 344, the message flow for initialization can be seen. In operation, the GLS unit 1408 can implements a special type of read thread, called a configuration read thread 9602, for reading a configuration structure 9800 (shown in FIGS. 98A and 98B) in system memory 1416 and distributing throughout processing cluster 1400. This thread 9602 is implemented in hardware. The message 9610 that schedules the configuration read thread 9602 originates in the host processor, based on higher-level control information such as the use-case required to be implemented by the configuration structure 9800. The configuration structure 9800 in system memory 1416 is built by the system programming tool 718, which generally contains program binary codes, initialization of control information (such as descriptors and the Global LS-Unit destination lists), and so forth. Message header and payload information are packed in this structure 9500 so memory fragmentation caused by variable-length messages or reserved bits can be reduced. The message 9610 that schedules the configuration read thread 9602 provides a single parameter that indicates the structure's base address in the processing cluster 1400.

Hardware in the GLS unit 1408 fetches this structure 9500, parses it, distributes instructions, and LUT initialization data over the global data interconnect 814, and forwards packed message structures to the control node 1406 over the messaging interconnect. The control node 1406 then can processes these structures.

As part of initialization, initializations messages 9604, 9606, and 9608 are generally used to initialize instruction memories and the function-memory 7602. In particular, messages 9604 and 9606 can be used to inform nodes (i.e., 808-*i*) and the shared function-memory 1410 that the next transfers over the data interconnect 814 are lines of instructions with instructions being written to consecutive locations starting at location 0 that continues until a Set_Valid is received. Also, message 9608 can inform the shared function-memory 1410 that the next transfers over the data interconnect 1414 are for function-memory 7602 with instructions being written to consecutive locations starting at location 0 and LUT entries being bank-aligned that continues until a Set_Valid is received.

In FIG. 345, the schedule message read thread 9610 (namely the message 9500 from the control node 1406 to the GLS unit 1408) can be seen in greater detail. As shown, this message 9500 includes a header 9502 and data 9504. The data 9504 includes segments 9506 and 9508 that generally indentify type and thread ID, respectively. Typically, this message 9500 is sent to initialize or re-configure processing cluster 1400 with possible source being the control node 1406 (as a result of a termination message), the host processor, or debugger. As indicated above, this thread 9610 itself is implemented in hardware within the GLS unit 1408 so as to enable the GLS unit 1408 to fetches and process a configuration structure 9800 (as shown in FIG. 346) at the given address with the thread ID of segment 9508 being used for termination.

The configuration read thread is responsible for initializing the instruction memories 5403, 7618, and 1401-1 to 1401-R as well LUT of the shared function-memory 1410. The information regarding which destination is/are initialized is contained in the data stored in the system memory 1416. FIG. 346 shows the data flow for a configuration read thread. The configuration read thread is normally scheduled by the host processor 1316 by writing into the message queue of the control node 1406. When message queue is written to schedule a configuration read thread message, that message is sent to the GLS unit 1408. Once the SYS_BASE_ADDR is latched in the GLS unit 1408, the GLS unit 1408 starts creating master read accesses to the peripherals (i.e., peripherals 1414 and system memory 1416).

Turning to FIG. 347, the configuration structure 9800 can be seen in greater detail. As shown, the system_base_address is provided from the schedule read message 9610. Also, as shown, this structure 9800 is generally comprised of an instruction memory initialization section 9802 (which can provide program images 9808-1 through 9808-4), LUT initialization section 9804 (which can include LUT images 9810-1 and 9810-2), and a message action list section 9806 (which can include packed action lists 9812-1 to 9812-4).

In FIG. 348, the instruction memory initialization section 9802 can be seen in greater detail, which generally includes segments 9902, 9904, 9908, 9910, and 9912 that generally correspond to encoding, segment ID, node ID, instruction size, continuation, and number of instruction lines, respectively.

In FIG. 349, LUT initialization section 9804 can be seen in greater detail, which generally includes segments 10002, 10004, 10006, 10008, and 10010 that generally correspond to the encoding, segment ID, node ID, continuation, and the number of LUT blocks, respectively.

In FIG. 350, the message action list section 9806 can be seen in greater detail, which generally includes segments 10102, 10104, 10106, 10108, and 10110 that generally correspond to the encoding, segment ID, node ID, continuation, and the number of packed message action words, respectively. Depending upon the configuration type, the configuration word occupies (for example) either 4 32-bits words or two 32-bit words in the peripheral (i.e., system memory 1416). The first 32-bit (for example) identifies the type of init message along with the destination {SEG_ID, NODE_ID}. Also the number of instructions (if it is instruction memory initialization structure) or LUT blocks or number of action list entries is also contained in the first 32-bit word. A Cn bit is also present in the word to indicate whether is the current structure is a continuation of a previous structure or a new structure. In case of instruction memory or function-memory initialization, the second word contains the starting offset. The third 32-bit word is the actual system word address where the data contents to be transferred to the destination is located. The fourth 32-bit word is reserved. An exception to this scheme is when the type field indicates that the data is for control node action list. In that case, the second 32 bit word is the actual system word address where the data contents to be transferred to the destination is located. An encoding of 0x6 in the encoding field signifies the end of encoding sequence.

Figure 351:
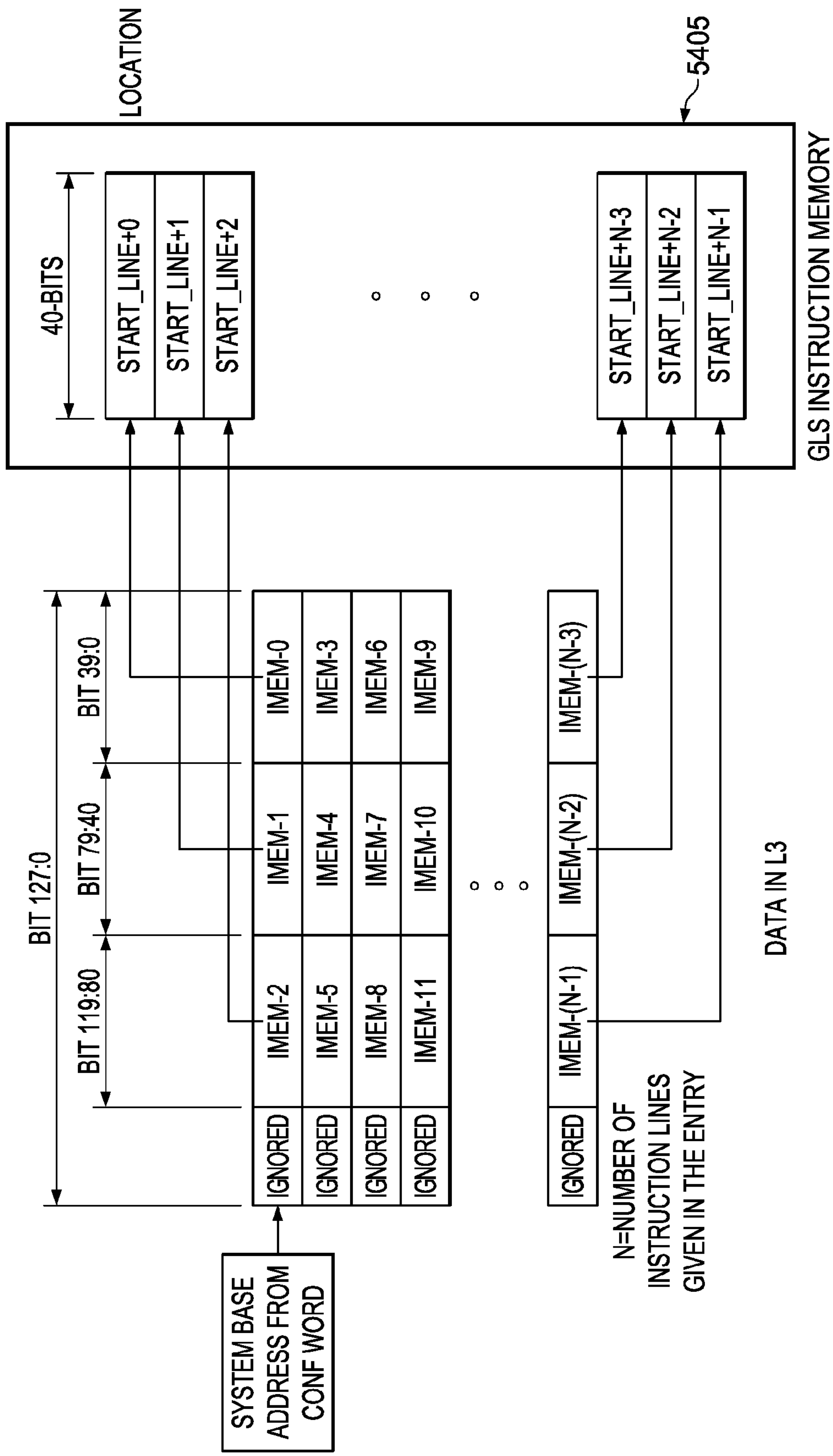
Figure 352:
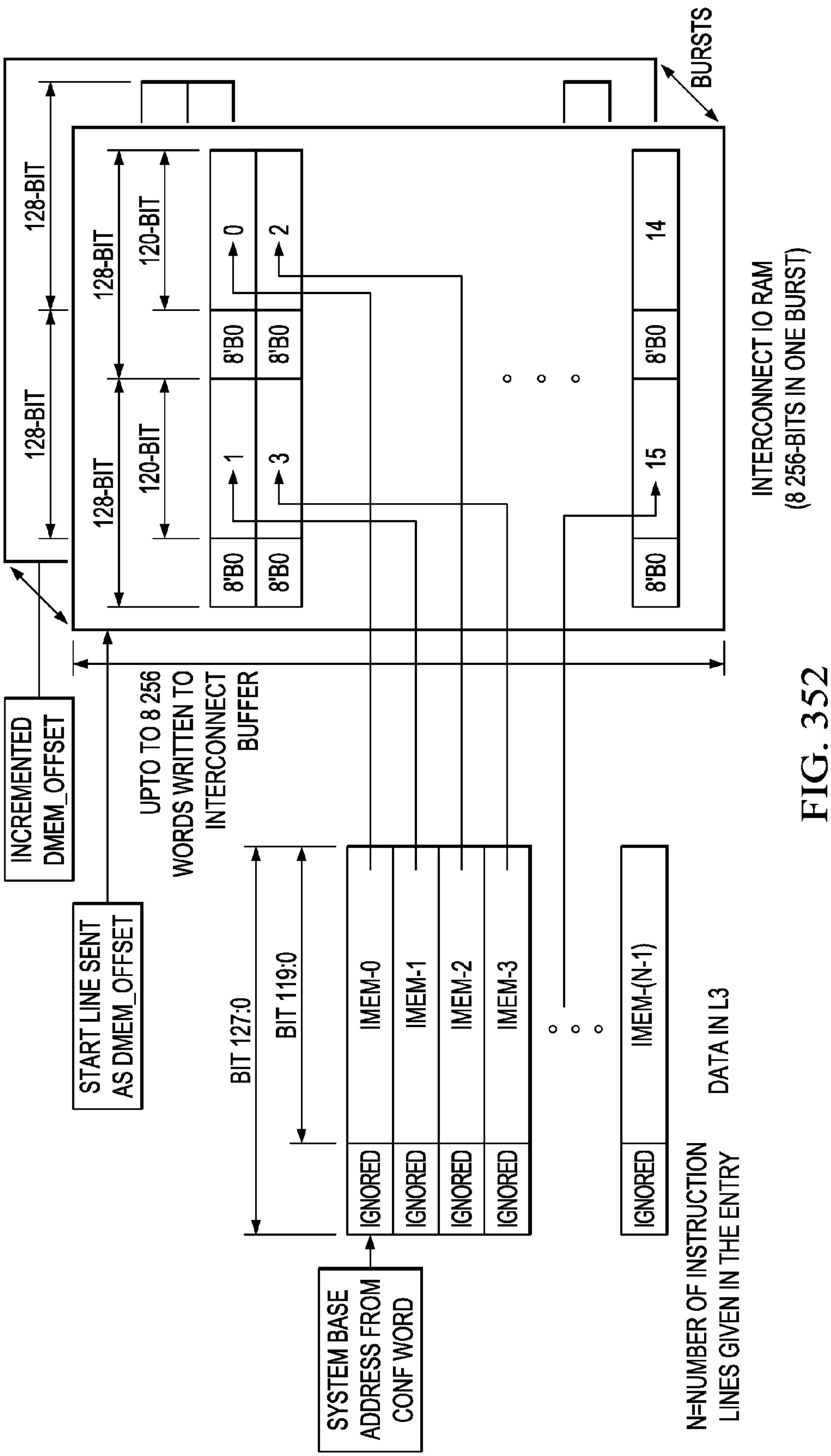
Figure 353:
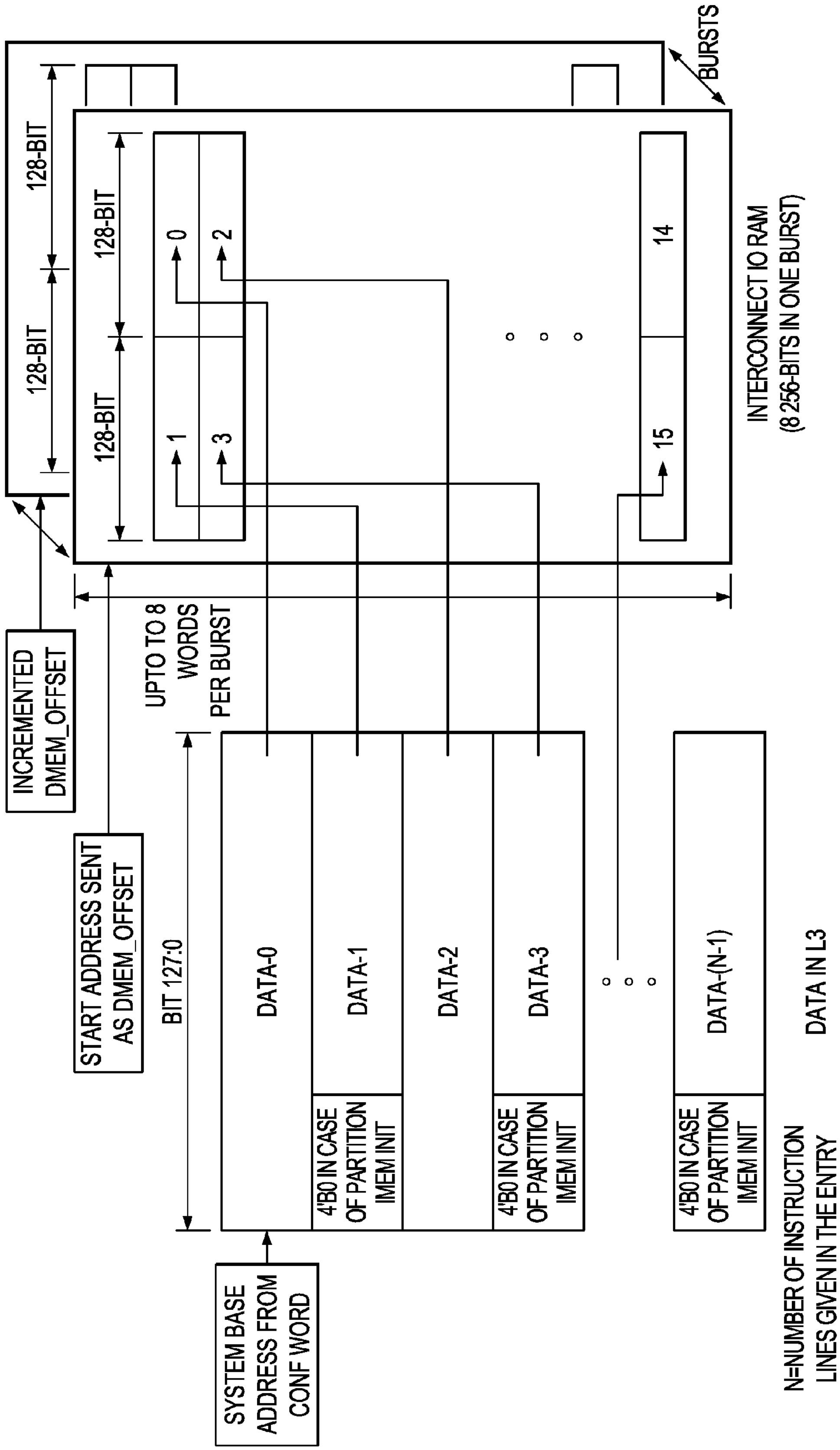
Figure 354:
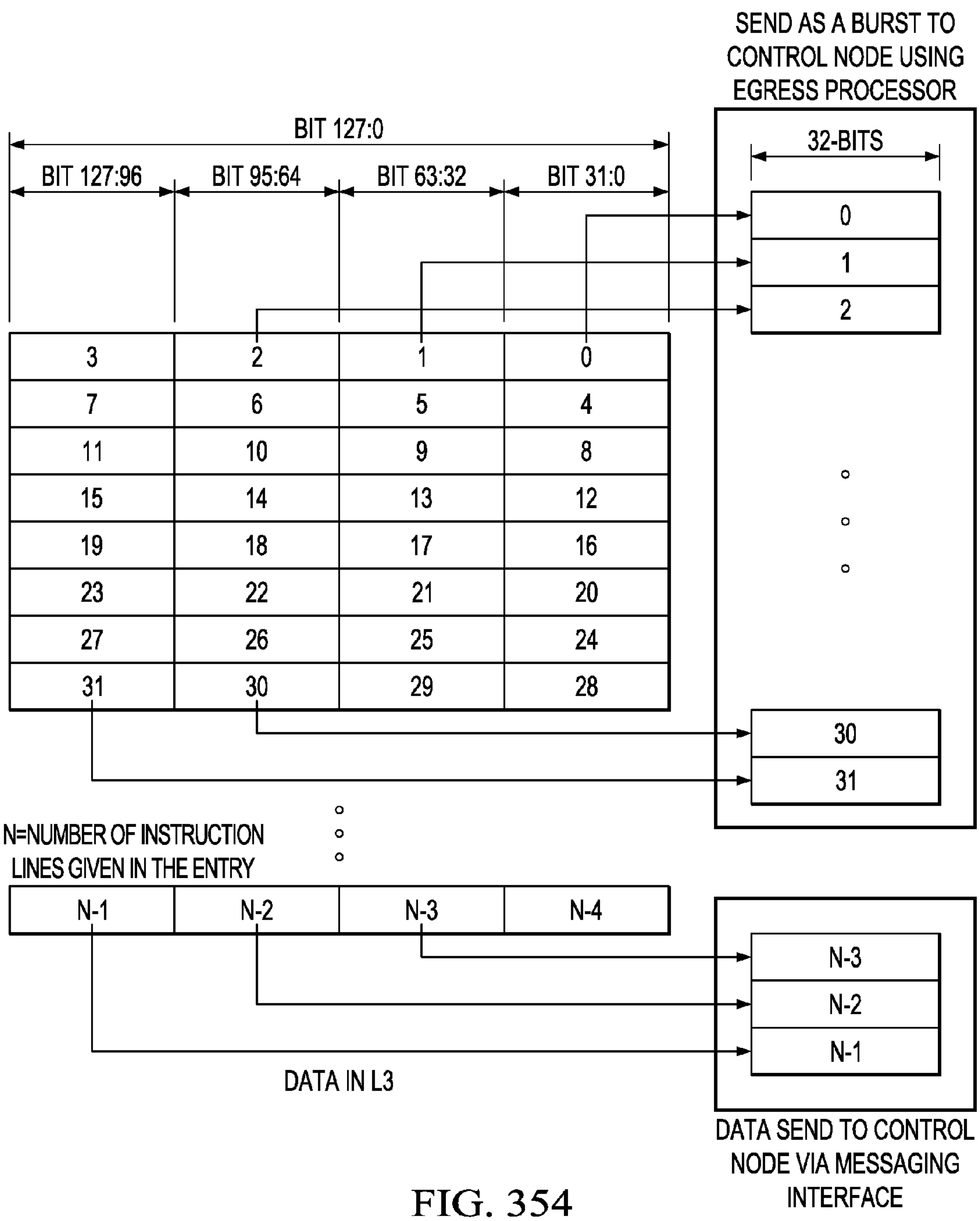
Figure 355:
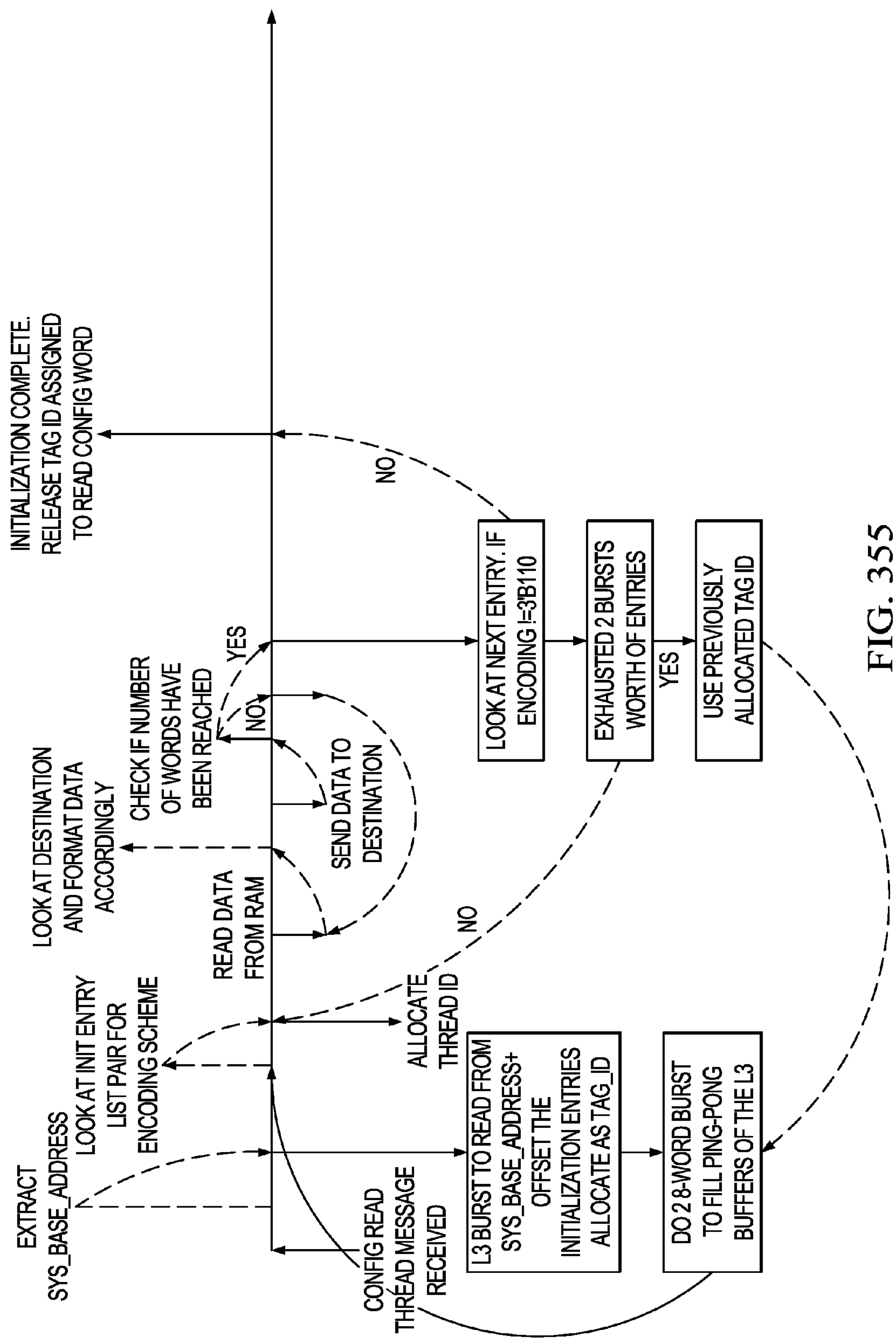

The GLS unit 1408 can performs the following example steps once the first configuration structure is accessed. The encoding type is looked at to determine what type of init message is stored. If the encoding type is 3, then the LUT initialization is requested. If the encoding type is 2, then the IMEM initialization is requested. If the encoding type is 4, then control node action list initialization is requested. If the Cn bit=0, then the number of lines to initialize are the NUMBER_OF_LINES or NUMBER_OF_BLOCKS given in the message structure. If Cn=1, then we add the current NUMBER_OF_LINES or NUMBER_OF_BLOCKS with the previous. The destination SEG_ID, NODE_ID are also latched. The system address and start offset values are latched into the request queue RAM along with internal offset parameters. A tag is assigned for reading data from the assigned SYSTEM_BASE_ADDRESS and read commences. The node instruction memory init message is sent to the latched destination in case the destination is not GLS unit 1408 or control node 1410. Write data to the proper destination is also either directly (for GLS instruction memory case) or via egress message processor (control node action list update) or via interconnect 814. If the destination is instruction memory 5403, then 40-bits (for example) are extracted at a time from the data latched in the buffer 6024 and written into the instruction memory 5403 as shown in FIG. 351. If the destination is instruction memory 7618 (as identified by INST_SIZE=32 in the initentry and encoding scheme of 2), then 120-bits (for example) are extracted at a time from the data latched in the buffer 6024 and written into the buffer 5406 as shown in FIG. 352. Buffer 5406 can include a RAM that is filled upto 8 256-bits (or 16 128-bits) and a burst is sent to the shared function-memory 1410. In the last burst set_valid bit is set to '1 in the MREQINFO to indicate the last burst transfer. The DMEM_OFFSET is also sent as part of MREQINFO (for each burst the DMEM_OFFSET is incremented by the burst size*2 as we are sending two instruction words per beat). If the encoding is not meant for the control node 1406 or initialization of memories 5403 and 7618, then 128-bits (for example) are extracted at a time from the data latched in the buffer 6024 and written into the buffer 5406 as shown in FIG. 353.

Reset of the information sent on the interconnect 814 is the similar as SFM IMEM INIT (for each burst the DMEM_OFFSET is incremented by the burst size even for partition instruction memory init case as instruction memory data is 252-bits for partition). As shown in FIG. 101E, it is assumed that the upper 4-bits of even data from OCP connection 1412 are populated with 0's. If the encoding indicates that the initialization is to the control node, then 32-bits are extracted at a time and latched into the egress processing block as shown FIG. 354.

The egress processor will accumulate (for example) upto 32-beats worth of data and send it to the control node 1410 via the messaging bus 1420. When the number of instructions/number of blocks/number of entries field in theentry list in the GLS unit 1408 keeps sending initialization data to the destination. Once the max count is reached, the GLS unit 1408 moves on to process the nextentry. When the GLS unit 1408 encounters 3'b110 in the encoding filed for anentry, the GLS unit 1408 terminates the initialization routine. The allocated tag id for reading config word is also released to the general pool of free tag ids. An example of this can be seen in FIG. 355.

14. Data Movement

Transfers are generally performed by write and read threads. There can be up to 16 active thread transfers, using their own sets of sources and destinations, with independent addressing. Each GLS unit 1408 thread, executed by GLS processor 5402, can implement an independent read or write thread, forming various types of processing flows: read thread; write thread; or read and write thread with intermediate processing. In the dataflow protocol, the fields used to identify nodes and contexts instead identify the GLS unit 1408 (Segment_ID, Node_ID), with the context-number field identifying the thread number instead.

Turning to FIG. 356, an example of a read thread can be seen. A read thread is generally a sequence of data transfers from system memory 1416 or peripherals 1414 to destination contexts. At some time before the access, the next destination node sends a Source Permission message to the GLS unit 1408. The GLS unit 1408 cannot generally buffer all read data for all contexts, but can buffer a sufficient number of entries that the bandwidth from the processing cluster 1400 can be used as efficiently as possible. The GLS unit 1408 normally allocates a number of entries, and uses the dataflow protocol so that these entries can be tagged with destination information before system data arrives, so that data can be transferred to the node as soon as it arrives from the system, and spend a minimum amount of time in the buffer.

In this example of FIG. 356, when a buffer has been allocated in the GLS unit 1408, a read request is generated to the processing cluster 1400. This uses an address determined by the GLS processor 5402 program for the respective thread, which in turn can be based on the location of a program variable in the system (possibly dynamically allocated by the host). The read operation can, for example, involve alignment, buffering, access coalescing, unpacking, and pixel de-interleaving that is outside the scope of this specification. Data is returned from the system and placed into the allocated buffer in the GLS unit 1408. The permission associated with the bufferentry is used to push data to the destination's global input buffer 4210-*i*, tagged with the destination context number and offset within that context. The offset is determined by the GLS processor 5402 program, based on it having a compatible view of context addressing. At the destination, the context number is used to access the context descriptor, and data is written into data memory (i.e., 4306-1), when there is an available cycle, using that context's base address and the offset sent with the data. Note that this supports moving any data type and structure from the system into any data type and structure in the context's input variables. Read threads can have outputs to multiple destination contexts or threads, similar to a node context.

In FIG. 357, when node (i.e., 808-(*i*+1)) writes data into a context from the global input buffer (i.e., 4210-(*i*+1)), it also sets the shared side contexts on the left and right. As data is read from the buffer to write SIMD data memory (i.e., 4306-1), the data is also sent to the contexts pointed to by the left- and right-context pointers. This data sets the Rin and Lin buffers 4212-(*i*+1) and 4214-(*i*+1). This applies in all the cases discussed here where data is pushed to a node destination.

Turning now to FIG. 358, an example of a node-to-node write can be seen. As shown, node-to-node writes output data from source contexts to inputs of destination contexts. These contexts have a common view of the allocation and layout of the destination's input variables, so the source can directly compute the offset into the destination context. This offset is sent with the data, and the destination node relocates the offset based on its local context descriptor. At some time before the node-to-node write, the destination node 808-(*i*+1) sends a Source Permission message to the source node 808-*i*, based on the dataflow protocol. This enables the source context to execute output instructions to the destination context. Any number of data transfers are enabled by the Source Permission, because the destination context is available to receive all input. Since these inputs are based on program variables, and they can be any data of any type or structure. The source node 808-*i* executes an output instruction, which places data into the global output buffer 4210-*i*, and normally does not stall the node 808-*i*. The output instruction computes a SIMD data memory offset for the output, as for a local store, and this information, along with information about the destination node and context number, is also placed into the buffer 4210-*i*. The output instruction generally contains an identifier for the destination-descriptorentry used for the transfer. When enabled by arbitration for interconnect, the data is pushed from the global output buffer 4210-*i* of the source node 808-*i* to the global input buffer 4210-(*i*+1) of the destination node 808-(*i*+1). This push can be to the same node (no interconnect used), a node in the same partition (local interconnect such as BIU 4710-*i* can be used), or to a node on another partition (data interconnect 814 can be used). Interconnect arbitration generally depends on which interconnect is used for the transfer. At the destination, the context number is used to access the context descriptor. Data is written into data memory (i.e., 4306-1), when there is an available cycle, using that context's base address and the offset sent with the data. Left-side and right-side shared contexts are also set at the destination.

Tuning now to FIG. 359, an example of a write thread can be seen. A write thread is generally a sequence of data transfers from nodes (i.e., 808-*i*) to system memory 1416 or peripherals 1414. At some time before the node output, the GLS unit 1408 sends a Source Permission message to the source node. This enables the source context to execute an output instruction to the GLS unit 1408. As discussed above, the GLS unit 1408 can use the dataflow protocol to order the writes and to perform flow control. In this case, ordering is used so that system outputs remain in order. The source program is ordered so that it creates a limited number of outputs for every Source Permission, and the GLS unit 1408 can restrict the number of permissions outstanding to different contexts to enable re-ordering by a limited number of buffer entries allocated to the thread. The source node 808-*i* executes an output instruction, which pushes data into the global output buffer 4210-*i*. The output instruction computes an offset for the output, as for a local store, and this information, along with the GLS unit 1408's node address and thread ID, is also placed into the buffer 4210-*i*. The offset locates the data, in a conceptual sense, in the write thread's GLS processor data memory 5403 context. This data is usually not written into GLS processor data memory 5403; instead, it can be used by the GLS unit 1408 to identify which variable is being written to the processing cluster 1400. For example, multiple node variables can be written to multiple system buffers in memory, in which case the GLS unit 1408 can receive multiple types of data that are associated with different system destination addresses. The GLS unit 1408 identifies variables, and makes the association to the system destination, by matching offsets from the node with offsets generated by the GLS processor 5402 write-thread program to access a dummy copy of the variable in GLS data memory 5403. When enabled by arbitration for system access, the data is written from the GLS unit 1408 buffer to the system. This uses an address determined by the GLS processor 5403 program for the respective thread, which in turn is based on the location of buffers or peripherals in the system (possibly dynamically allocated by the host). The write operation can involve alignment, buffering, access coalescing, packing, and pixel interleaving that is outside the scope of this specification. Write threads can have inputs from multiple sources, indicated by the thread receiving multiple Source Notification messages. The thread manages different sets of buffers in this case, and performs independent flow control and ordering, though based on the same protocol as for a single source.

Turning to FIG. 360 a multi-cast thread can be seen. A multi-cast thread is a specialized thread that moves source data to multiple destinations, which can be of any type. This thread is distinguished from multiple context outputs because the same data is sent to multiple destinations. Multi-cast threads are generally processed by hardware in the GLS unit 1408, and there is usually no associated GLS processor 5402 program. The thread is invoked by a source node 808-*i* sending data to the thread. These lists for multi-casts (which is generally maintained by GLS unit 1408) can contain the destination identifiers for all output from the thread. This list can also process and retain permissions received from all destinations. Because there are multiple destinations (i.e., node 808-(*i*+1)), a Source Permission should be received from all destinations before the multi-cast operation can complete. Each response received can be placed in the correspondingentry in the multi-cast list. As multi-casts are processed, list entries are updated with permissions and next-destination identifiers. A Src_Tag field in the dataflow messages is used to distinguish the entries on the multi-cast list: eachentry usually has a unique Src_Tag, which is the offset in the multi-cast list pointing to the destination. If the source of multi-cast data is a node (i.e., 808-*i*), then the GLS unit 1408 should have been sent a Source Permission from the source node 808-*i*.

As with a write thread, the dataflow protocol can performs ordering and flow control, so that all destinations can be ordered regardless of type (some can be write threads), and because it can take several cycles to process the multi-cast list and send data to all destinations. The source node 808-*i* does not distinguish the multi-cast thread from other types of output, and in fact can have multiple outputs including node-to-node, write, and multi-cast threads. There are two cases for source data. In the first, a multi-cast read thread (a), the GLS unit 1408 can perform a system read and place the data into a buffer. This operation is generally the same as for a read thread. In the second, a multi-cast write thread (b), the source node outputs data which identifies the GLS unit 1408 node and the thread number of the multi-cast thread. This operation is generally the same as for a write thread. Once source data is received by the GLS unit 1408 buffer, it accesses the thread's multi-cast list and transmits the data to all destinations—any combination of nodes or write threads on the GLS unit 1408. A multi-cast read thread allows a single system access to provide input data to multiple programs, and a multi-cast thread can be used when a node program writes a single set of output variables that have multiple destinations (for example, the destination node input is also copied to memory). In contrast, multiple node outputs, specified by the node context descriptors, are used when the program outputs multiple sets of variables, each to a unique destination context (program).

15. Resource Allocation

Resource allocation in processing cluster 1400 is analogous in many ways to resource allocation in an optimizing compiler, particularly a compiler that schedules operations on a VLIW or superscalar microarchitecture. However, instead of allocating registers, functional units, and memory to generate an instruction sequence to optimize performance (or memory usage, and so forth), system programming tool 718 can allocates "processors" and memory to generate binaries and messages to optimize the use of resources based on a throughput. The objective is to use a minimum, or near-minimum, allocation to accomplish the objectives. This permits scalability—that is, area and power are adjusted to performance requirements, nearly linearly. For example, doubling throughput doubles the resources employed.

A characteristic of processing cluster 1400 that simplifies resource allocation is that nodes of a specific type, such as node 808-*i*, are generally uniform. Also, nodes can be designed to support a very fine grain of resource allocation—for example in the definition of contexts, context descriptors, and fine-grained multi-tasking. Because of this general uniformity, generality, and flexibility, relatively simple allocation strategies can be employed to achieve optimum, or nearly optimum, allocations.

Resource allocation, in general, involves a circularity between the available resources, the allocation of those resources, data dependencies, and the resulting performance of the chosen allocation. Typically, these circularities are broken by ignoring certain constraints in early stages, generating an optimistic (and usually unrealistic) allocation as a starting point. From that starting point the allocation is refined by introducing successive constraints, and iterating on the allocation until a solution is found (or the allocation fails, meaning that there are not sufficient resources for the specified use-case).

In system programming tool 718, the initial assumptions are that there is an unlimited number of nodes of the required type (i.e. customization), each with unlimited instruction and data memory. From this starting point, allocation determines a bounded number of nodes and amount of memory. This bounded allocation assumes that each algorithm module executes in a dedicated set of compute nodes (i.e., node 808-*i*). That is, no two modules share the same hardware, and a criterion is that sufficient nodes are allocated that each module satisfies the throughput requirement. This allocation most likely uses more than the available number of nodes; it is, typically, the starting point for node allocation. However, the allocation fails if the number of nodes used by a single module, to achieve the specified throughput, is more than the available number of nodes (this should not be common).

Once the initial allocation is set, optimization can be performed. The system programming tool 718 iterates on the allocation, attempting to find shared allocations of nodes and contexts. The result of this allocation is either an organization of nodes and contexts that meets the desired requirements, or a failure to find a suitable allocation.

15.1 Initial Node Allocation

Initial node allocation begins by allocating each module a number of nodes of the required type that meets or exceeds the throughput requirements, based on number of cycles taken to execute that module (this information is provided by the compiler, based on compiling the module as a stand-alone program). Desired throughput requirements can be expressed in terms of cycles taken per pixel output: for example, in processing cluster 1400, if the output rate is 200 Mpixel/second, and a node (i.e., 808-*i*) operates at 400 MHz, the desired throughput requirement should be 2 cycles/pixel (400 Mcycles/sec÷200 Mpixel/sec). To meet the desired throughput requirements, the node allocation should output a number of pixels, in parallel, so that no more than 2 cycles are taken in the module for every pixel output. For example, a program that takes 58 cycles should generate at least 29 output pixels to maintain a rate of 2 cycles/pixel.

Turning to FIG. 361, an example basic node allocation for processing cluster 1400 for image processing using module 1004 can be seen. As just described, the minimum number of pixels output can be a function of cycle count and throughput. The actual number of pixels output, which should be equal to or larger than this minimum, can be the number of nodes allocated multiplied by the width of a node in pixels (for example, a node 808-*i* can be 64 pixels wide, but in system programming tool 718 this is a parameter for more general use in other organizations). Since nodes have a certain granularity in terms of the number of pixels generated, they also have a corresponding granularity in terms of the number of cycles that are available to the allocation at a given throughput. For example, with nodes (i.e., 808-*i*) being 64 pixels wide, cycle granularity is 128 cycles at 2 cycles/pixel. The excess, if any, of cycles permitted by the allocation over the actual requirement can introduces the concept of slack cycles, which is the amount by which the cycle count can be increased while still meeting throughput. For example, a program that takes 58 cycles has 70 slack cycles (128−58) in the node organization of 64 pixels. Slack cycles are taken into account during optimization, because they indicate opportunities for sharing (time-multiplexing) node computing resources.

The second step in node allocation is the analyze the relationships between individual modules, determined from the use-case graph 1100 of FIGS. 11, 37, and 362. Programmable modules are grouped into path segments, as shown in FIG. 362, which originate and terminate at either memory buffers (i.e., memory 1416), peripherals 1414, or hardware accelerators 1418. It is assumed that system bandwidth and accelerator throughput is sufficient for the use case because system programming tool 718 typically has little to no control over these components of the use-case.

Each path segment (i.e., 10802 and 10804) generally has its own natural throughput, based on the resource allocation of that segment, and this is likely different than the throughput of the system interfaces 1405 and of the hardware accelerators 1418. For this reason, the allocation is considered separately for each path segment, to decompose the analysis. As discussed later, resources can be shared between modules (i.e., 1004) on different path segments, but the allocation of resources is based on independent analysis of each segment—otherwise there can be an intractable interaction between the path segments, owing to their different natural throughput rates and resulting allocation tradeoffs.

Additionally, each path in a segment (i.e., 10802 and 10804) can have several paths through the programmable blocks, as shown in FIG. 363, for example. Each path in a segment (i.e., 10802 and 10804) generally has an associated path length, which is simply the total number of cycles of each module in the path. The so-called "critical path" is generally the longest path in the segment, which generally determines the throughput of the path segment if the modules were executed in series. The "critical path" typically has an associated parameter, known generally as "critical slack cycles," which is typically the sum of slack cycles for all modules (i.e., 1004) in the "critical path." It should be noted, as well, that the "critical path" is conceptual because all modules execute in parallel, but it can used in resource allocation because resource allocation can allow modules (i.e., 1004) to execute in series by sharing hardware.

15.2. Initial Context Allocation

Turning to FIG. 364, an illustration of a frame-division processing example for processing cluster 1400 can be seen. In this example, scan lines in terms of de-interleaved Bayer data (normally several different types of pixel representations are used in various processing stages) can be seen. A frame division can be a set of contexts corresponding to a vertical slice of the image. Input contexts are fetched within this region of the image and processing produces outputs that normally correspond to a subset of this region. Typically, it can be assumed that there are fewer pixels in the horizontal direction than the input contexts, which can be due to the data at the right-side boundary is not valid for cases where the frame division is not the entire image frame. Any computation that relies on data beyond this right-side boundary is not generally considered valid, and invalid data can accumulate for attempted uses of this context through the processing chain (i.e., within processing cluster 1400). Compensation for the "lost" output context can be performed by overlapping the fetched input contexts so that the outputs are generally contiguous after accounting for the narrower output with respect to input. The relative amount of this loss, with respect to the input, can determine the execution efficiency and throughput. The minimum number of contexts can be determined by the minimum number of parallel nodes (i.e., 808-1) determined from the initial node allocation, where each node should have at least one context. The total number of contexts can then be some multiple of this minimum.

In FIG. 365, an example of compensation for a "lost" output context can be seen. Here, in this example, the minimum number of parallel nodes (Min||(Nodes) is four, and the number of contexts per node is three, for a total of twelve total contexts. The total number of output pixels, in this example, (not all valid) is 768 (768 pixels=4 Nodes*3 Context*64 pixels/node/context). If, for example, pixels can be generated at 2 cycles/pixel, there would be 1536 cycles (768 pixels*2 cycles/pixel) permitted in the "critical path" of this path segment. However, not all output pixels are valid, so the actual permissible cycles is less than 1536 cycles For example, 658 pixels may be valid, allowing 1316 cycles (which is a 14% reduction in available cycles). A reduction in the available cycles (i.e., 14%) can have several effects:

1) reduce slack time, reducing the opportunities for sharing nodes; 2) increase the number of parallel nodes that should be used to meet throughput, or; 3) increase the number of contexts, to reduce the relative inefficiency. The expression that captures this relationship is:

$$\text{Critical\_Path\_Cycles}+\text{Critical\_Slack\_Cycles}\leq(\text{Node\_Width}*\text{Min}\|\text{Nodes}-\text{Lost\_Pixel}\div\#\text{Contexts})*(\text{Cycles/Pixel})$$

The term “Lost_Pixels” generally captures the reduction in output width allocated to the path segment. It is based on a parameter given by the user which specifies the end-to-end reduction because since system programming tool 718 cannot estimate it from the programmable components alone. This parameter can be an estimate, rather than being precise, at a potential loss in allocation efficiency. The number of contexts that can be used to meet this condition is evaluated for all path segments individually, and the path segment with the largest number of contexts sets all path segments. To properly share data within contexts, the number of contexts should be the same for all programmable components.

15.3. Resource Optimization

Turning to FIG. 366, the calculations for allocation can be seen. As shown, there are two sets of equations that are generally used: basic node allocation 11202 and basic context allocation 11204. The system programming tool 718 can use the equations for basic node allocation 11202 to allocate resources for each program and can use the equations for basic context allocation 11204 for all programs and all segments (i.e., 10802). Typically, an initial allocation indicates the worst-case allocation of nodes and contexts. Allocation fails if the number of nodes (i.e., 808-1) for any module (i.e., 1006) is larger than the total number available or if the total data memory (i.e., SIMD data memory 4306-1) that should be used is larger than the total amount of data memory on all nodes, but allocation failure, however, is unlikely. Failure normally can be determined after the system programming tool 718 attempts to optimize the allocation.

In FIG. 367, an example of node allocation for segments 10802 and 10804 is shown. Here, there are 20 nodes allocated for the segments 10802 and 10804 (i.e., nodes 808-*k* to 808-*k*+3) for modules 1102 and 1014, nodes 808-(*k*+4) and 808-(*k*+5) for modules 1006, 1010, and 1016, and nodes 808-(*k*+6) to 808-(*k*+8) for nodes 1008 and 1022). If the processing cluster 1400 has fewer than 20 total nodes, in this example, then nodes or node resources can be shared between modules. In general, it is desirable to find the minimum allocation, not simply an allocation that fits the available resources; this provides scalability (resources matched to performance) and minimizes power for a given use-case.

As with most allocation problems, optimizing resources generally means having tradeoffs. Typically, the longest programs use the minimum number of parallel nodes, but these nodes can be shared by one or more other modules. Slack cycles generally indicate the degree to which this sharing can occur, and sharing increases path cycles because of time-multiplexing between modules. However, sharing can beneficial when path cycles are not increased within a path segment (i.e., 10802) to the point where the “critical path” (which may change due to sharing) exceeds the original length of the “critical path” plus the critical slack cycles. If this does occur, the question becomes whether the net benefit gained by sharing (reducing nodes) is greater or less than the additional node(s) that should be added to compensate for the increase in the critical path length beyond the original slack time available for it.

Sharing nodes also interacts with the memory allocation. In the initial allocation, the Critical_Cycles parameter can determine the choice of the number of contexts. Reducing the number of slack cycles by sharing nodes can increase the number of contexts. Furthermore, modules that share nodes can increase the number of contexts on those shared nodes, which increases the amount of data memory (i.e., SIMD data memory 4306-1) allocated to those nodes. If the total allocated data memory exceeds that available, one or more nodes should be added to provide sufficient data memory, and these additional nodes can change the optimum node allocation from a performance standpoint.

Resource allocation can be further complicated by combining source code for modules within a path segment into a larger program in a more efficient manner so as to affect sharing of resources. The larger program can be optimized by the compiler 706 to reduce cycles and data memory by scheduling resource usage over a larger program scope. Resources then can be allocated using these larger (but more efficient) programs.

There are a number of approaches that can be used for optimization, including exhaustive searches and constraints already imposed by throughput. FIG. 368 shows a basic algorithm for node allocation, for illustration. The algorithm 11400 in this example ignores all constraints on allocation, other than throughput, and attempts to find a “best fit” of modules to nodes. The algorithm 11400 maintains a list in step 11402 of programs sorted by cycle count from largest to smallest. Starting with the largest cycle count or largest program in step 11410, which can sets the minimum number of parallel nodes, the algorithm 11400 searches the list, in order, to see if the number of cycles for the listentry can be fit into the node allocation in steps 11412, 11414 and 11416. For example, as shown in FIG. 368, the nodes for module 1010 “fit” into the allocation for module 1004. It should also be noted that this allocation does not have to use all the nodes, and any remaining nodes (i.e., 15405) can participate in further allocation. In the event that there are unused nodes, the slack time can be recalculated in step 11414, and the algorithm 11400 can continue with remaining list entries, searching for additional opportunities to allocate to this set of unused nodes. Any modules that cannot be allocated are placed onto a new sorted list in steps 15403 and 11418. After considering all entries in the list, the algorithm 11400 can begins the process again using the new sorted module list in steps 11406 and 11404.

Turning to FIG. 369, segments 10802 and 10804 are again shown so as to illustrate an example result of basic node allocation. In the example, module 1014 is allocated on node 808-*j*, while modules 1022/1006 and 1008/1016 share respectively nodes 808-(*j*+1) and 808-(*j*+2). Additionally, as shown, module 1010 shares one of nodes 808-(*j*+3) and 808-(*j*+4) allocated to module 1004. In this example path_1 and path_4 of segments 10802 and 10804 (which are the “critical paths” for segments 10802 and 10804) are respectively shown. Executing multiple modules (i.e., 1022 and 1006) on the same node (i.e., 808-(*j*+1)) can reduce the available slack cycles because execution is serialized on the shared node; using modules 1022 and 1006 as an example, modules 1022 and 1006 can execute in the number of cycles that is the sum of cycles for modules 1022 and 1006, reducing the slack cycles of each to a single value determined by the total cycle count. Slack cycles can be recomputed based on node sharing, with slack cycles generally being associated with nodes, not modules. Since node allocation has not exceeded the slack cycles of any of modules 1014, 1022, 1006, 1008, 1016, 1006 and 1010, the "critical slack cycles" have not been exceeded.

At this point, the updated slack cycles can be used to refine the context allocation. The original context allocation was based on each program having its own node allocation, and the term "Critical_Slack_Cycles" that was used in context allocation has a different value after allocation due to node sharing. Furthermore, node sharing can complicate the determination of a value for Critical_Slack_Cycles, based on whether or not the sharing modules are from the same path segment. Modules (i.e., module 1014) that do not share nodes generally use the original slack time. Modules that share nodes, but which are in different path segments, can independently use the slack cycles for those nodes (e.g., modules 1022/1006 and 1008/1016 in this example). Slack cycles can be based on the largest number of cycles within the node allocation. For example, module 1010 uses one node (of the two allocated for modules 1004/1010), but the slack cycles are determined by the sum of the cycles of modules 1004 and 1010. For context allocation, "Critical_ Cycles" (the sum of cycles and slack cycles of nodes in the "critical path") can be affected in two ways. First, the term can be reduced because a module in the "critical path" is sharing a node with a module that is not in the "critical path." For example, the path from module 1004 to module 1022 can include critical cycles reduced by the cycle count of module 1006. Second, if two or more modules in a "critical path" share a node allocation, the slack cycles of this allocation can be counted once in the critical path. For example, the path from module 1004 to module 1010 counts the slack cycles for modules 1004 and 1008 but not module 1010, and, furthermore, the slack cycles of module 1008 are reduced by sharing with module 1016. The resulting values for Critical_Cycles in each path segment (i.e., 10802 and 10804) can be used in the context allocation equation from the set of equations for basic context allocation 11204 to determine the number of contexts required by the shared node allocation.

In FIG. 370, an example context allocation for the node allocation of FIG. 369 can be seen. As shown in this example, module or program 1014, 1022, 1006, 1008, 1016, 1004, and 1010 includes eight contexts (labeled Context0 to Contect7). As can be seen, the data memory (i.e., SIMD data memory 4306-1) is balanced for nodes 808-*j* to 808-(*j*+2), but there is an imbalance for nodes 808-(*j*+3) and 808-(*j*+4). Allocating module 1010 to node 808-(*j*+3) creates undesired data memory pressure, and increases the likelihood that the context allocation fits the available amount of data memory. A solution to this imbalance might be to move half of the allocation for module 1010 to node 808-(*j*+4), but such an allocation may create of problems. If, for example, iterations for module 1010 are scheduled at the same rate as iterations for module 1004, then module 1010 would consume input and generates output at a much higher rate that other modules in the path segment 10802 because it operates on two contexts at the same time and generates twice as many pixels (for example) per iteration as it should based on the node allocation. This means that the throughput of module 1010 would be too high, possibly leading to deadlock conditions.

Deadlock conditions, however, should not occur in processing cluster 1400 because execution is data-driven. Programs or modules are generally scheduled to execute if input data is valid. So, in this example, module 1004 should become ready at half the rate of module 1004, as desired. However, to efficiently use computing resources, module 1010 should execute in an inter-node organization, so that each iteration of module 1010 executes on nodes 808-(*j*+3) and 808-(*j*+4) at about the same time, enabling module 1010 to compute twice as many pixels at half the rate. This allocation for modules 1010 and 1004 can be seen in FIG. 371.

16. Code Generation

In section 4 above, autogeneration of hosted application code by the system programming tool 718 is described, but the ultimate target of the code is the processing cluster 1400. The structure of this code targeted for the processing cluster 1400 depends on resource allocation decisions, as discussed above in section 15. One extreme example being that all applications source code is compiled as a single program and executed on a single compute node, and another extreme example is code is compiled as separate programs executing on a parallel allocation of multiple nodes, up to the total number of nodes available in the system 1400. Compiling sources for programmable nodes is generally not sufficient to complete the application. Node execution is data-driven but nodes (i.e., 808-*i*) by themselves have no mechanism for data and control flow. This in performed instead by mapping the iterator 602, and read/write threads 904/908 to sources compiled for the GLS processor 5402, which is discussed at least in part is section 5 above. Following this, the system programming tool 718 can generates a configuration structure which is used by a configuration read thread 9402 to load programs and LUT images and to perform initialization of all other hardware for the use-case.

16.1. Programmable-Node Code Generation

Autogeneration for programmable nodes (i.e., 808-*i*) in the environment for processing cluster 1400 generally follows a process similar to that used to generate source code for the hosted environment (section 4 above). This code can also follow the same serial execution model, but the concept of objects is eliminated from node programs. Instead, sources are compiled more like conventional, standalone C programs, and mimic the object model by executing in dedicated node contexts. Global and local variables can appear as public and private variables because these variables are not generally accessible by other programs except being written by known sources of input data, to variables that are read-only at the destinations. The iterator 602, read thread 904, and write thread 908 do preserve the concept of objects. This abstracts the interfaces to the node programs—node programs in contexts are treated as objects even though they execute in distributed nodes with separate program counters.

16.2. Monolithic Program Sources

Turning to FIG. 372, an example of autogenerated source code resulting from an allocation decision that all simple_ISP modules (which is described with respect to simple_ISP pipeline of FIG. 24 through 34 above) can execute in a single node and context allocation. For this example, all simple_ISP components are in the same path segment and can be executed synchronously. The result is likely the most optimum in terms of memory usage and cycle count. For the hosted environment, the code is constructed by emitting text strings during a traversal of the use-case graph. In this case, the structure of the code is more straightforward because the goal is to generate binaries for the programmable node, not an entire program for the use-case. The following describes the content of the various sections (which were described, for the most part, in sections 4 and 5 above):

The file tmc.h is a header file for the environment of the processing cluster 1400, including specific data types and intrinsic prototypes.

The files ending in _io.h generally define the input data structures for the components.

The two outputs from this program are generally defined as a single extern structure to the write thread. Typically, this program does not allocate local memory for this structure since it can form offsets for member variables allocated in the write thread's memory. In this case, the variables can be allocated to the write thread as if they were scalars. The offsets are used to match vector outputs to system Frame assignments, in the hardware associated with the write thread. The vector output bypasses the GLS processor 5402 datapath and is written directly to the system using the addresses computed by the assignments to the Frame variables.

The files ending in _input.h are generally the declaration of program input variables.

The files ending in _func.h are generally the function prototypes of all functions in the application so that the following .cpp files can call function before being declared (all functions are usually expanded in-line by the compiler 706).

The algorithm kernels are generally included in the files with the .cpp extensions.

The final section is the main program, which simple calls all modules in the sequence given by the use-case diagram. This is also the point at which the internal and external dataflow is defined, by passing pointers to input variables to the functions that output to these variables. In the final code, these procedures can all be expanded in-line.

To complete code generation for a use-case, the system programming tool 718 create the source code for the iterator 602, read thread 904, and write thread 908. Turning back to FIG. 35, as an example, node programs or stages 3006, 3008, 3010, and 3012 are implemented as described in section 4, but these programs, by themselves, contain no provision for system-level data and control flow, and no provision for variable initialization and parameter passing. Typically, these are provided by the programs that execute as GLS processor 5402 threads. As shown, there are two types each of data and control flow: explicit dataflow (solid arrows), and implicit dataflow (dashed arrows). Internal data and control flow, from stage 3006 output to stage 2012 input is accomplished by the node programming flow. All other data and control flow is generally accomplished by the GLS processor 5402 threads.

Unlike most node programs, source code for the GLS processor 5402 is free-form, C++ code, including procedure calls and objects. The overhead in cycle count is acceptable because iterations typically result in the movement of a very large amount of data relative to the number of cycle spent in the iteration. For example, for a read thread that moves interleaved Bayer data into three node contexts, this data is represented as four lines of 64 pixels each in each context. Across the three contexts, this is twelve, 64-pixels lines total, or 768 pixels. Assuming that all threads (i.e., 16) are active and presenting roughly equivalent execution demand (this is very rarely the case), and a throughput of one pixel per cycle (a likely upper limit), each iteration of a thread can use 48 cycles. Setting up the Bayer transfer generally can require on the order of six instructions, so there are 42 cycles remaining in this extreme case for loop overhead, state maintenance, and so forth.

16.3. Iterator and Read Thread

Since the read thread 904 is logically embedded within the iterator 602, they can be merged into one program source (independent iterators and read threads can be combined in any functionally-correct combination). The system programming tool 718 generates this source code in a manner very similar to the hosted program (as described in sections 4 and 5 above), traversing the use-case diagram as a graph, and emitting source text strings within sections of a code template 11902, shown in the example of FIG. 119. This template 11902 is similar to the hosted-program template 1700, but template 11902 is adapted for the environment of processing cluster 1400. A difference is that the source code associated with template 11902 implements the iterator and read-thread functionality, and that dataflow is accomplished by linking external variables instead of setting output pointers in algorithm objects (which are not used in this environment). The iterator and read thread are still implemented as objects in code for GLS processor 5402.

The read thread, as written by the programmer, contains the code that moves data from the system to algorithm objects. There is, typically, no provision for parameter initialization, managing circular buffer state, and so forth. Instead, this code is added to the source code by system programming tool 718 based on the use-case. Variable declarations are added to the read thread, with output identifiers, so that the thread has access to the scalar input variables of all node programs. Code is also added to initialize these programs and to manage their circular-buffer state.

Also, as shown in FIG. 373, there are examples of sections autogenerated code for the input type definitions 11904 and output variable declarations 11906. Input types are generally defined by including all _io.h files (i.e., simple_ISP0_io.h of section 11904). This generally permits the declaration of output variables in section 11906, as external variables in this source, using the inputs types and input variables of destination modules (which follows the naming conventions described herein). The vector input variable to simple_ISP0, for example, may be required by the read thread for explicit dataflow, and the scalar input variables can be used for implicit dataflow. Pointers to these scalar variables can also declared, providing functionality similar to output pointers in hosted programs. Output are numbered using pragmas, which determines the identifiers in output instructions in the generated code. An identifier is used in hardware to select anentry from the destination list for the thread, which indicates the destination identifier (segment and node identifiers, and context or thread numbers). Every unique destination program has a unique identifier, but a destination can include both vector and scalar data (for example, to simple_ISP0), and merged programs can be considered a single destination (for example, the merged simple_ISP1 and simple_ISP2). Scalar and vector inputs can be distinguished by data types, and are output either to the node processor data memory 4328 or the SIMD data memory (i.e., 4306-1) of the destination node. Inputs to merged programs can be distinguished by the offset, within the contexts of the merged program, of the respective input variables. The dependency protocol can operate on entire contexts, and comprehends both scalar and vector data, and the inputs of merged programs.

This programming model currently has a limitation caused by potential name conflict of input variables. These conflicts can occur when the iterator/read thread provides data to more than one program from the same algorithm class. Each of these programs can use the same name for input variables, so these cannot be independently declared in the source program. Consequently, these programs would generally require a unique read thread (though possibly within another instance of the same iterator). The best workaround for this problem is to use script tools to re-name these input variables. This approach could also relax the requirement to embed input variables within structures. If these improvements are implemented, existing code would remain compatible.

In FIG. 373, there are also examples of sections autogenerated code for the class declarations 11908 and instance declarations 11910. The iterator 902 and read thread 904 can implemented as instances of the respective classes. The class declarations can 11908 be provided by including the .h files for the classes, and instance names can be created from the use-case diagram.

The initialization section 11912 can includes the initialization code for each programmable node. The included files are typically named by the corresponding components in the use-case diagram. Programmable nodes are generally initialized in this way: iterators, read threads, and write threads are passed parameters, similar to function calls, to control their behaviour. Programmable nodes usually do not support a procedure-call interface; instead, initialization can be accomplished by writing into the respective object's scalar input data structure, similar to other input data. In the hosted environment, the initialization functions are typically called, whereas, in the environment for the processing cluster 1400, initialization functions are expanded in-line. The writes to input parameters, in the generated code, generally results in output instructions identifying the destination and an offset of the parameter in the destination context. These are scalar variables, and, unlike vector variables, are copied into each processor data memory 4328 context associated with a horizontal group. These contexts are typically "discovered" using the dataflow protocol.

The composite_read function 11914 is the inner loop of the iterator, can also be created by code autogeneration. The name generally reflects that the function performs both implicit dataflow (in this case, to maintain circular-buffer state) and explicit dataflow as implemented by the read-thread object. The hosted program can calls each algorithm instance in an order that satisfies data dependencies, but in the environment for processing cluster 1400, calling the read thread alone is usually sufficient to accomplish the same logical functionality. However, environment for processing cluster 1400, execution can be highly parallel, implemented by data-driven execution as determined by node allocation, context organization, destination descriptors, and the operation of the dataflow protocol between source and destination contexts. The composite_read function 11914 can be passed the same parameters as the traverse function in the hosted environment, for example: 1) an index (idx) indicating the vertical scan line for the iteration, 2) the height of the frame division, 3) the number of circular buffers in the use-case (circ_no), and 4) the array of circular-buffer addressing state for the use-case, c_s. Before calling the read thread, composite_read function 11914 can calls the function _set_circ for each element in the c_s array, passing the height and scan-line number. The _set_circ function can update the values of all Circ variables in all contexts, based on this information and also can update the state of array entries for the next iteration. Circ variables are generally written using pointers to the extern scalar input structures. This results, in the generated code, in output instructions identifying the destination and an offset of the Circ variable in the destination context. As with scalar parameters, these variables can be copied into each context associated with a horizontal group, based on the dataflow protocol. After the circular-buffer addressing state has been set, composite_read function 11914 can call the execution member-function (run) of the read thread. The read thread is passed a parameter, the index into the current scan-line, to perform addressing. The output identifier associated with the read-thread output selects a destination, and the call to the read thread results in system data being moved to all destination contexts—a different portion of the scan line into every context. This behaviour is distinguished from the output of scalar data by virtue of the data types being moved, for example: Frame objects in the system into Line objects in the programmable nodes. The destination contexts are provided data in scan-line order by virtue of the dataflow protocol. Additionally, dataflow pointers can be seen in section 11918.

The iterator and read thread are implemented in a function 11926 (here called ISP_iter_read) intended to be called by a host processor that interfaces to the processing cluster 1400. The call generally executes the use-case on a unit of input data, such as a frame division for imaging, with system input and output. The ISP_iter_read function 11926 is not usually called directly. Instead, the host maps an API call into a Schedule Read Thread message and passes the required parameters in the message, structured as they would be passed by a conventional procedure call. The function prototype can be used in the API implementation to indicate which parameters are passed, and their types. When the GLS unit 1408 receives the scheduling message, it copies these parameters into the thread's context, starting at location 0, and this effectively serves as the top of a stack containing the parameters for the host "call" (though this is not the same stack used by the GLS processor 5402 code for internal procedure calls). This function 11926 can pass, for example, four parameters: the first two indicate the height and width of the frame, and the second two contain a pointer to the memory buffer containing Bayer data (in this case) and a pixel offset into the buffer (FD_offset). The height, width, and buffer pointer can be used by the read thread as for the hosted case. However, an additional parameter can be used in the environment of processing cluster 1400, where the width of the context allocation in hardware is generally less that the width of the frame, and frame-division processing is used. Frame-division processing generally can require fetching overlapped regions of the input data to generate contiguous output data. The amount of overlap is algorithm-dependent, and the FD_offset parameter is used by the read thread to determine the amount of overlap by specifying an offset with respect to the buffer pointer.

Also shown in FIG. 373, the read object instance section 11916 can be created as in the hosted environment, passing parameters to the constructor, in this case including the FD_offset parameter. The output pointer of this object can be set to the input vector structure of simple_ISP0. The output pointers can also be also assigned.

The initialization section 11920 can set the circ_s array, containing state for maintaining the values of Circ variables. In this case, pointers to the external variables are used, instead of pointers to public variables as in the hosted environment. This section 11920 then calls each initialization function, which in the environment for processing cluster 1400 results in this code being expanded in-line.

The code in FIG. 373 can creates an instance of the iterator frame_loop in section 11922, using the name from the use-case diagram. The remaining statements simply create a pointer to the composite_read function and call the iterator with this pointer. The pointer is used to call composite_read within the main body of the iterator.

Section 11924 can de-allocates the read thread and iterator object instances and frees the memory associated with them. When the function ends, it remains resident and can be called again by the host, for example to operate on another frame division within the frame. Deleting objects prevents memory leaks from one invocation to the next.

16.4. Write Thread

Turning to FIG. 374, an example of a write thread can be seen. The write thread can implemented as a stand-alone program as shown, which is similar to the hosted environment. The thread is called by the host, passing parameters as previously described. The thread creates an instance of the object class, named according to the use-case diagram, and constructed with parameters passed. The code can then set the buffer pointers of the object and calls the execution function (run) of the object within a loop based on the thread not having received a termination message from the source. Since iteration is determined by dataflow initiated by the read thread (within the iterator body), the iteration of the write thread can be controlled by dataflow. The termination of the read thread propagates through the dataflow, ultimately terminating the write thread. The write thread can terminate after the read thread terminates, terminating all dependent contexts, and after all terminating contexts have provided all data to the write thread. This termination sequence is implemented by the dataflow protocol and Output Termination messages. The write thread receives the termination signal after the last output of the right-most context, which is the final ordered output from the nodes.

16.5. Overall Flow

To summarize the generation of programs for the environment for processing cluster 1400, these are the operations that are usually performed by the system programming tool 718:

- Allocate nodes and contexts based on throughput requirements and the inefficiency of frame-division processing.
- Merge code from the same path segment that also share a node allocation.
- Construct side-context dependency graphs based on the context organization and the task tables associated with application modules, and split tasks to balance resources and dependencies.
- Build source code for programmable nodes.
- Build source code for the iterator, read thread, and write thread.
- Provide source code to the compiler 706, along with other directives such as task-splitting information.
- Link offsets of external variables into compiled output instructions.
- Divide linked object code into node and GLS processor 5402 object images, to be executed in parallel.
- Create the data structure to configure the processing cluster 1400 for the use-case. This structure, in system memory, is fetched by a configuration-read thread in the global LS-unit 1408 and used to configure the processing cluster 1400.

17. Alternative Resource Allocation Protocol

Turning to FIGS. 375 through 380, an alternative resource allocation protocol can be seen. Sources can be maximally combined into compilation units based on constraints other than resource usage (i.e., node and SFM programs generally cannot be combined because the compilers and instruction sets are different). Resources can be allocated based on the cycle and memory requirements of the compiled results. This permits the compiler (i.e., 706) to see the maximum optimization opportunities, since combined programs are logically one large, serial program. Users should specify context widths for the use-case because the users have better understanding of the algorithm behavior and margin required and because the context organization is much more general. Analysis of side-context dependencies during compile can be performed to generally avoid multiple passes. This is usually possible if the context width is known before compile. Additionally, throughput metrics for allocation can be used instead of "path length." Additionally, computing resources and memory can be allocated in the same pass.

18. Power Clock Reset Management Subsystem

The Power Clock Reset Management Subsystem (PRCM) generally controls the clock and reset distribution in the processing cluster 1400. Typically, the processing cluster 1400 has several power domains: The Control Node PD (CTRL_PD); Global LS Power Domain (GLS_PD); Shared Functional Memory Power Domain (SFM_PD); and Partition 0 Power Domain (Part0_PD) to Partition x Power Domain (Partx_PD). The internal interconnects (Interconnect 814, Right and Left Context Interconnects 5702 and 4704) are part of the GLS power domain since anytime there is traffic inbetween the different nodes the GLS unit 4708 will be involved and thus the interconnects and the GLS unit 4708 should be on. The messaging infrastructure below shows the logical paths the PRCM should follow to each power domain. Clocking for the processing cluster 1400 can be seen in FIG. 381, with example clocking frequencies provided in Table 44 below.

TABLE 44

| S. No | Clock | Frequency |
|---|---|---|
| 1 | wbrclk_gl_l3m_clk_respfifo | 266 MHz |
| 2 | gl_clk_in | 300 MHz |
| 3 | DFTSHIFTCLK | 75 MHz |
| 4 | wbrclk_gl_sapp_clk_reqfifo | 200 MHz |
| 5 | wbrclk_gl_trm_clk_respfifo | 200 MHz |
| 6 | wbrclk_gl_sdbg_clk_reqfifo | 200 MHz |

An example of the IO signals or pins for the PRCM can be seen in Table 45 below.

TABLE 45

| Name | Timing | Direction | Reset/Idle Value | comment |
|---|---|---|---|---|
| topclk | | input | | Clk from DPLL |
| top_rst_n | | input | | Reset from External PRCM |
| dft_rst_bypass | | input | | one dft_rst_bypass for all rstgens |
| //DFT controls from DFTSS PRCM | | | | |
| dftss_out_top_clkdiv [29:0] | 30 | input | | |
| dftss_out_dft_rcg_te [29:0] | 30 | input | | |

TABLE 45-continued

| Name | Timing | Direction | Reset/Idle Value | comment |
|---|---|---|---|---|
| dftss_out_dft_lcg_te [29:0] | 30 | input | | |
| dftss_out_dft_lcg_ctrl_en_n [29:0] | 30 | input | | |
| dftss_out_shaper_out_clk [29:0] | 30 | input | | |
| dftss_out_dft_clkinvdis [29:0] | 30 | input | | |
| dftss_out_dft_clk_bypass [29:0] | 30 | input | | |
| dftss_out_test_div_on [29:0] | 30 | input | | |
| //Power down controls from control node | | | | |
| downstream_clock_enable1_1 | | output | | |
| downstream_clock_enable1_2 | | output | | |
| downstream_clock_enable1_3 | | output | | |
| downstream_clock_enable1_4 | | output | | |
| downstream_clock_enable1_5 | | output | | |
| downstream_clock_enable1_6 | | output | | |
| downstream_clock_enable1_7 | | output | | |
| downstream_clock_enable1_8 | | output | | |
| downstream_clock_enable1_F | | output | | |
| downstream_clock_enable3_2 | | output | | |
| power_down_enable1_1 | | input | | |
| power_down_enable1_2 | | input | | |
| power_down_enable1_3 | | input | | |
| power_down_enable1_4 | | input | | |
| power_down_enable1_5 | | input | | |
| power_down_enable1_6 | | input | | |
| power_down_enable1_7 | | input | | |
| power_down_enable1_8 | | input | | |
| power_down_enable1_F | | input | | |
| power_down_enable3_2 | | input | | |
| // Power switch controls for prcm as a switchable domain | | | | |
| pilogicPONIN | | input | | |
| pilogicPGOODIN | | input | | |
| PologicPONOUT | | output | | |
| pologicPGOODOUT | | output | | |
| Gl_ck_p0 | | output | | Clk from clkgen to Partition 0 |
| Gl_arst_p0 | | output | | Rst from rstgen to Partition 0 |
| Gl_ck_Lf | | output | | |
| Gl_arst_Lf | | output | | |
| Gl_ck_Rt | | output | | |
| Gl_arst_Rt | | output | | |
| Gl_ck_p1 | | output | | |
| Gl_arst_p1 | | output | | |
| Gl_ck_ocp | | output | | |
| Gl_arst_cn | | output | | |
| Gl_ck_l3 | | output | | |
| Gl_arst_l3 | | output | | |
| Gl_ck_gls | | output | | |
| Gl_arst_gls | | output | | |
| Gl_ck_sfm | | output | | |
| Gl_arst_sfm | | output | | |
| // Clock enable to the control node | | | | |
| ocp_clk_en | | output | | Clock enable to the control node |

The PRCM typically residing inside the Control Node 1406 and is responsible for providing clocks to all the power domains except its own. The Control Node 1406 receives the SoC level clock (gl_clk_in) and wakes up based on the wakeup instructions from a SoC level Master module. The Control Node 1406 initiates the internal PRCM on wakeup following which the PRCM starts clock and reset generation and propagation to the processing cluster 1400 and submodules. The following are example features of the PRCM:

1. It houses two submodules a power management state machine and the clk reset controller or CLK_RESET module.
2. The CLK_RESET module holds ipgvrstgens for reset generation and provides enables to the sub blocks to generate their own clocks i.e each sub module generates its own divided clock (OCP clock). The OCP clock can run at 1× or ½× (200 MHz) and when it does run at ½×, it will be generated by the sub module using icgs that are controlled by the enables generated by the PRCM. The diagram below shows the distribution of the resets from the PRCM.

FIG. 382 outlines the general reset distribution of processing cluster 1400. Since the Control Node 1408 power domain is the main power domain in processing cluster 1400, it is where the PRCM resides. The control node itself though, controls the reset distribution for the Control Node PD. A global asynchronous reset is provided directly to the control node. The control node is the first of the submodules of the processing cluster 1400 to wake up. Control Node desires to have CFG=0 set since it receives a purely asynchronous reset. The rest of the modules gets a conditioned reset which is the asynchronous assert and synchronous deassert. The Control Node generates a conditioned reset for the associated Debug, Apps and Trace bridges in its power domain. Shown in FIGS. 383 and 384 are the structure and schematic of the ipgvrstgen module.

19. Event Translator

Event Translator is within the is designed to accept events and translate them to processing cluster 1400 messages, as well as accept processing cluster 1400 messages and translate them to events. Within processing cluster 1400, ET interfaces directly with the Control Node 1406. When an event is received from a hardware (HW) accelerator outside of the processing cluster 1400 boundary, that event is translated to a TPIC message and sent to the Control Node over an OCP interface. In the case where the Control Node 1406 sends a message to ET over a separate OCP interface, the event information is extracted from that message and sent out of the processing cluster 1400 boundary to the HW accelerator. In addition to the OCP interfaces between ET and the Control Node, there is a signal sent by ET to the Control Node 1406 when an event overflow or underflow occurs and which event bit caused this. This basically indicates that a particular event in ET has overflown or underflown and processing cluster 1400 is issuing an interrupt. ET does not generate the external interrupt. Once the Control Node 1406 receives the information about an overflow or underflow, it is responsible for generating an external interrupt. FIGS. 385 and 386 show the interfaces between ET and other modules, and, in Table 46, the examples of the IO signals or pins for the ET can be seen.

TABLE 46

| Port Name | Direction | Width | Description |
|---|---|---|---|
| clk | in | 1 | TPIC global clock |
| rst_n | in | 1 | TPIC global reset |
| ocp_clken_slave | in | 1 | clken for OCP slave port |
| ocp_clken_master | in | 1 | clken for OCP master port |
| External Events | | | |
| interrupt_in | in | configurable | Incoming event bus with configurable width. Each bit corresponds to an event. Currently, width is set to 16. |
| interrupt_out | out | configurable | Outoing event bus with configurable width. Each bit corresponds to an event. Currently, width is set to 16. |
| External Interrupt | | | |
| int_overflow_underflow | out | 1 | 1: overflow, 0: underflow |
| external_interrupt_en | out | 1 | Indicates overflow/underflow has occurred |
| external_interrupt_num | out | configurable | Indicates which event caused an overflow/underflow. Currently, width is set to 4. |
| OCP Master Port | | | |
| ocp_m_scmdaccept | in | 1 | |
| ocp_m_sresp | in | 2 | |
| ocp_m_sresplast | in | 1 | |
| ocp_m_sdataaccept | in | 1 | |
| ocp_m_mcmd | out | 3 | |
| ocp_m_maddr | out | 9 | |
| ocp_m_mreqinfo | out | 4 | Not used |
| ocp_m_mburstlength | out | 1 | |
| ocp_m_mdata | out | 32 | Translated message from incoming event |
| ocp_m_mdatavalid | out | 1 | |
| ocp_m_mdatalast | out | 1 | |
| OCP Slave Port | | | |
| ocp_s_mcmd | in | 3 | |
| ocp_s_maddr | in | 9 | |
| ocp_s_mreqinfo | in | 4 | |
| ocp_s_mburstlength | in | 1 | |
| ocp_s_mdata | in | 32 | Message to be translated to outgoing event |
| ocp_s_mdatavalid | in | 1 | |
| ocp_s_mdatalast | in | 1 | |
| ocp_s_scmdaccept | out | 1 | |
| ocp_s_sresp | out | 2 | |

TABLE 46-continued

| Port Name | Direction | Width | Description |
|---|---|---|---|
| ocp_s_sresplast | out | 1 | |
| ocp_s_sdataaccept | out | 1 | |
| | | DFT | |
| dft_rst_bypass | in | 1 | |
| dft_event_ctrl | in | 1 | |
| dft_clkinvdis | in | 1 | |

20. Zero-Cycle Context Switch

Turning to FIG. 387, a timing diagram for an example of a zero-cycle context switch can be seen. The zero cycle context switch feature can be used to change program execution from a currently running task to a new task or to restore execution of a previously running task. The hardware implementation allows this to occur without penalty. A task may be suspended and a different task invoked with no cycle penalties for the context switch. In FIG. 387, Task Z is currently running Task A's object code is currently loaded in instruction memory, and Task A's program execution context has been saved in context save memory. In cycle 0, a context switch is invoked by assertion of the control signals on pins force_pcz and force_ctxz. The context for Task A is read from context save memory and supplied on processor input pins new_ctx and new_pc. Pin new_ctx contains the resolved machine state subsequent to Task A's suspension, and pin new_pc is the program counter value for Task A indicating the address of the next Task A instruction to execute. The output pins imem addr are also supplied to the instruction memory. Combinatorial logic drives the value of new_pc onto imem addr when force_pcz is asserted, shown as "A" in FIG. 387. In cycle 1, the instruction at location "A" is fetched, marked as "Ai" in the FIG. 387 and supplied to the processor instruction decoder at the cycle "1|2" boundary. Assuming a three-stage pipeline, instructions from previously running Task Z are still progressing through the pipeline in cycles 1/2/3. At the end of cycle 3 all pending instructions of Task Z have completed the execute pipe phase, (i.e. the context for Task Z is now completely resolved and can be saved). In cycle 4, the processor performs a context save operation to context save memory by assertion of context save memory write enable pin cmem_wrz and by driving the resolved Task Z context onto the context save memory data input pins, cmem_wdata. This operation is fully pipelined and can support a continuous sequence of force_pcz/force_ctxz without penalty or stall. This example is artificial since continuous assertion of these signals would result in a single instruction being executed for each task, but there is generally no limit to the size of a Task nor the frequency of task switches and the system retains full performance regardless of frequency of context switch and regardless of size of a task's object code.

Having thus described the present disclosure by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present disclosure may be employed without a corresponding use of the other features. Accordingly, it is appropriate that the appended claims be construed broadly and in a manner consistent with the scope of the disclosure.

The invention claimed is:

1. An integrated circuit comprising:

(A) system address leads;

(B) system data leads;

(C) an interface having address leads and data leads coupled to the system address leads and the system data leads;

(D) control node circuitry having:

a control node message queue coupled to the interface, the control node message queue having storage places for data and addresses, a node input buffer separate from the control node message queue and having a control serial message input, and a node output buffer, separate from the control node message queue and the node input buffer, and having a control serial message output, the node output buffer having storage places for data and addresses; and (E) processing circuitry having:

a global data input and output buffer having processor data leads; and a node wrapper program queue having:

multiple program entries with plural words for eachentry to store information for scheduled programs, in an order of message receipt, and used to schedule execution of the processing circuitry, a processor serial message input coupled with the control serial message output, and a processor serial message output coupled with the control serial message input.

2. The integrated circuit of claim 1 including functional circuitry coupled to the system address and system data leads, the functional circuitry being separate from the control node circuitry and the processing circuitry.

3. The integrated circuit of claim 1 including host processing circuitry coupled to the system address and system data leads, the host processing circuitry being separate from the control node circuitry and the processing circuitry.

4. The integrated circuit of claim 1 including peripheral interface circuitry coupled to the system address and system data leads.

5. The integrated circuit of claim 1 including memory controller circuitry coupled to the system address and system data leads.

6. The integrated circuit of claim 1 in which the processor serial message input receives serial packet messages and the processor serial message output sends serial packet messages.

7. The integrated circuit of claim 1 in which the control node message queue includes positions for header bits and data bits.

* * * * *